United States Patent [19]

Christopher et al.

[11] 4,075,679

[45] Feb. 21, 1978

[54] PROGRAMMABLE CALCULATOR

[75] Inventors: Chris J. Christopher; Fred W. Wenninger; Donald E. Morris; Wayne F. Covington; Jerry B. Folsom; Joseph W. Beyers, all of Loveland; John H. Nairn; Jeffrey C. Osborne, both of Longmont, all of Colo.

[73] Assignee: Hewlett-Packard Company, Palo Alto, Calif.

[21] Appl. No.: 638,381

[22] Filed: Dec. 8, 1975

[51] Int. Cl.[2] .......................... G06F 3/02; G06F 9/18

[52] U.S. Cl. .................................. 364/200; 364/900; 340/365 R; 364/706

[58] Field of Search ........................ 340/172.5, 365 R; 445/1; 235/152, 156; 364/200, 900

[56] References Cited

U.S. PATENT DOCUMENTS

| | | | |
|---|---|---|---|
| 3,495,222 | 2/1970 | Perotto et al. | 340/172.5 |
| 3,593,313 | 7/1971 | Tomaszewski et al. | 340/172.5 |
| 3,610,902 | 10/1971 | Rahenkamp | 235/152 |
| 3,623,012 | 11/1971 | Lowry et al. | 340/172.5 |
| 3,675,213 | 7/1972 | Spangler | 340/172.5 |
| 3,769,621 | 10/1973 | Osborne | 340/172.5 |
| 3,839,630 | 10/1974 | Olander et al. | 235/156 |
| 3,859,630 | 1/1975 | Watson et al. | 340/172.5 |
| 4,015,245 | 3/1977 | Mercurio et al. | 340/172.5 |

*Primary Examiner*—Mark E. Nusbaum
*Attorney, Agent, or Firm*—William E. Hein

[57] ABSTRACT

An adaptable programmable calculator employs modular read-write and read-only memories separately expandable to provide additional program and data storage functions within the calculator oriented toward the environment of the user, and an LSI NMOS central processing unit, capable of handling sixteen-bit parallel binary operations, binary-coded-decimal arithmetic, sixteen-bit parallel input/output operations, two-level interrupt from up to sixteen input/output devices, and a direct memory access channel. The input/output units include a keyboard input unit having a full complement of alphanumeric keys, a magnetic tape cassette reading and recording unit capable of bidirectionally transferring programs and data between the calculator and a magnetic tape, a 32-character solid state output display unit capable of displaying every alphabetic and numeric character and many other symbols individually or in combination, and a sixteen-column alphanumeric thermal printer for printing results of computations, program listings, messages generated by the user and the calculator itself, and error conditions encountered during use of the calculator. All of these input/output units are included within the calculator itself. Many other external input/output units may be employed with the calculator. The calculator may be operated manually by the user from the keyboard input unit or automatically through a program stored within the read-write memory to perform calculations and to provide an output indication of the results thereof. While a program stored within the read-write memory is being executed, the user can perform calculations manually from the keyboard. Execution of the program is temporarily suspended at convenient points within the program to allow execution of the calculations manually selected by the user. If desired, the user may be prevented from manually selecting calculations from the keyboard input unit by disabling the keyboard input unit during program execution. The calculator employs a natural algebraic program language that allows the user to enter lines of one or more alphanumeric algebraic statements into the calculator from the keyboard input unit while visually observing each line as it is entered to check for errors therein. The user may immediately execute each entered line or store that line as part of a program in the read-write memory, may subsequently recall the executed or stored line so that it may be reinspected, and, if necessary, edited and re-executed or re-stored, thereby automatically replacing the previously stored line. The program language of the calculator is contained within a plug-in language read-only memory and may be changed by inserting a different language read-only memory.

8 Claims, 276 Drawing Figures

FIG I

| MEMORY SIZE | STARTING ADDRESS |
|---|---|
| 4K | 70000 |
| 8K | 60000 |

—— NOTES ——

① OPTION ROM AT 30K TAKES MEMORY FIRST, BINARY PROGRAMS TAKE MEMORY LAST.

② ADVANCED PROGRAMING ROM.

③ STRING VARIABLES ORGANIZATION INFORMATION AND VALUES.

NOTE: THIS STACK IS NULL UNLESS THE ADVANCED PROGRAMMING ROM IS IN USE.

Base Page Description

CURRENT PAGE ABSOLUTE ADDRESSING CORRESPONDENCE
FOR MEMORY REFERENCE INSTRUCTIONS

| LEAST 10 BITS OF ASSEMBLER OUTPUT (octal) | "REAL ADDRESS" | |
|---|---|---|
| | TOP 5 BITS (of P) | LOWER 10 BITS (octal) |
| 1 0 0 0 | X X X X X | 0 0 0 0 START OF PAGE |
| 1 0 0 1 | X X X X X | 0 0 0 1 |
| 1 0 0 2 | X X X X X | 0 0 0 2 |
| . | . | . |
| . | . | . |
| . | . | . |
| . | . | . |
| . | . | . |
| . | . | . |
| 1 7 7 7 | . | 0 7 7 7 |
| 0 0 0 0 | . | 1 0 0 0 |
| 0 0 0 1 | . | 1 0 0 1 |
| 0 0 0 2 | . | 1 0 0 2 |
| . | . | . |
| . | . | . |
| . | . | . |
| . | . | . |
| . | . | . |
| . | . | . |
| 0 7 7 7 | X X X X X | 1 7 7 7 END OF PAGE |

FIG 22

RELATIVE ADDRESSING

BPC INSTRUCTION BIT PATTERNS

GROUP: MEMORY REFERENCE

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| LDA | D/I | 0 | 0 | 0 | 0 | B/$\overline{B}$ | | | | | | | | | | |
| LDB | D/I | 0 | 0 | 0 | 1 | B/$\overline{B}$ | | | | | | | | | | |
| CPA | D/I | 0 | 0 | 1 | 0 | B/$\overline{B}$ | | | | | | | | | | |
| CPB | D/I | 0 | 0 | 1 | 1 | B/$\overline{B}$ | | | | | | | | | | |
| ADA | D/I | 0 | 1 | 0 | 0 | B/$\overline{B}$ | | | | | | | | | | |
| ADB | D/I | 0 | 1 | 0 | 1 | B/$\overline{B}$ | | | | | | | | | | |
| STA | D/I | 0 | 1 | 1 | 0 | B/$\overline{B}$ | | | | | | | | | | |
| STB | D/I | 0 | 1 | 1 | 1 | B/$\overline{B}$ | | | | | | | | | | |
| JSM | D/I | 1 | 0 | 0 | 0 | B/$\overline{B}$ | | | | | | | | | | |
| ISZ | D/I | 1 | 0 | 0 | 1 | B/$\overline{B}$ | | | | | | | | | | |
| AND | D/I | 1 | 0 | 1 | 0 | B/$\overline{B}$ | | | | | | | | | | |
| DSZ | D/I | 1 | 0 | 1 | 1 | B/$\overline{B}$ | | | | | | | | | | |
| IOR | D/I | 1 | 1 | 0 | 0 | B/$\overline{B}$ | | | | | | | | | | |
| JMP | D/I | 1 | 1 | 0 | 1 | B/$\overline{B}$ | | | | | | | | | | |

(Bits 9–0:)

* 10 BIT ADDRESS FIELD.
* ADDRESSES 0-$37_8$ ARE REGISTERS.
* FOR BIT 9=0, BITS 0-8 = POSITIVE ADDR.
* FOR BIT 9=1, ADDRESS IS NEGATIVE. IGNORE BIT 9, COMPLIMENT BITS 0-8, THEN ADD ONE.
* BASE PAGE ADDRESS ENCODING IS ALWAYS WITH RESPECT TO MEMORY LOCATION ZERO.
* CURRENT PAGE ENCODING:
  (ABSOLUTE) RELATIVE TO THE MIDDLE OF THE PAGE (1000B, 3000B, ETC.)
  (RELATIVE) RELATIVE TO THE CURRENT VALUE OF P, +511, -512.

D/I (DIRECT/INDIRECT) AND B/$\overline{B}$ (BASE PAGE/ NOT BASE PAGE) ARE CODED AS 0/1.

FIG 24A

BPC INSTRUCTION BIT PATTERNS (CONTINUED)

GROUP: SHIFT-ROTATE

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| AAR | 1 | 1 | 1 | 1 | 0 | 0 | 0 | 1 | 0 | 0 | 0 | 0 | | | | |
| ABR | 1 | 1 | 1 | 1 | 1 | 0 | 0 | 1 | 0 | 0 | 0 | 0 | | | | |
| SAR | 1 | 1 | 1 | 1 | 0 | 0 | 0 | 1 | 0 | 1 | 0 | 0 | | | | |
| SBR | 1 | 1 | 1 | 1 | 1 | 0 | 0 | 1 | 0 | 1 | 0 | 0 | | | | |
| SAL | 1 | 1 | 1 | 1 | 0 | 0 | 0 | 1 | 1 | 0 | 0 | 0 | | | | |
| SBL | 1 | 1 | 1 | 1 | 1 | 0 | 0 | 1 | 1 | 0 | 0 | 0 | | | | |
| RAR | 1 | 1 | 1 | 1 | 0 | 0 | 0 | 1 | 1 | 1 | 0 | 0 | | | | |
| RBR | 1 | 1 | 1 | 1 | 1 | 0 | 0 | 1 | 1 | 1 | 0 | 0 | | | | |

(Bits 3–0:)

* 4 BITS OF SHIFT-ROTATE FIELD.
* IN SOURCE $1 \leq N \leq 16$.
* BINARY IN THIS FIELD IS N-1.

FIG 24B

BPC INSTRUCTION BIT PATTERNS (CONTINUED)

GROUP: ALTER

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| RLA | 0 | 1 | 1 | 1 | 0 | 1 | 1 | 1 | $H/\overline{H}$ | C/S | | | | | | |
| RLB | 0 | 1 | 1 | 1 | 1 | 1 | 1 | 1 | $H/\overline{H}$ | C/S | | | | | | |
| SLA | 0 | 1 | 1 | 1 | 0 | 1 | 1 | 0 | $H/\overline{H}$ | C/S | | | | | | |
| SLB | 0 | 1 | 1 | 1 | 1 | 1 | 1 | 0 | $H/\overline{H}$ | C/S | | | | | | |
| SAP | 1 | 1 | 1 | 1 | 0 | 1 | 0 | 0 | $H/\overline{H}$ | C/S | | | | | | |
| SBP | 1 | 1 | 1 | 1 | 1 | 1 | 0 | 0 | $H/\overline{H}$ | C/S | | | | | | |
| SAM | 1 | 1 | 1 | 1 | 0 | 1 | 0 | 1 | $H/\overline{H}$ | C/S | | | | | | |
| SBM | 1 | 1 | 1 | 1 | 1 | 1 | 0 | 1 | $H/\overline{H}$ | C/S | | | | | | |
| SOC | 1 | 1 | 1 | 1 | 0 | 1 | 1 | 0 | $H/\overline{H}$ | C/S | | | | | | |
| SOS | 1 | 1 | 1 | 1 | 0 | 1 | 1 | 1 | $H/\overline{H}$ | C/S | | | | | | |
| SEC | 1 | 1 | 1 | 1 | 1 | 1 | 1 | 0 | $H/\overline{H}$ | C/S | | | | | | |
| SES | 1 | 1 | 1 | 1 | 1 | 1 | 1 | 1 | $H/\overline{H}$ | C/S | | | | | | |

(Bits 5–0:)

* 6 BIT SKIP FIELD, +31, -32.
* IF BIT 5=0, SKIP TO P+#; #=BITS 0 THRU 4.
* IF BIT 5=1, SKIP TO P-#, #=1+ COMP OF BITS 0-4.

$H/\overline{H}$ (HOLD/DON'T HOLD) AND C/S (CLEAR/SET) ARE CODED AS 0/1.

HOWEVER: $H/\overline{H}$ IS SET BY THE ASSEMBLER ITSELF. IF NEITHER S NOR C IS PRESENT, BOTH $H/\overline{H}$ AND C/S ARE MADE 0'S. THE PRESENCE OF EITHER A C OR AN S PRODUCES H (A 1).

FIG 24C

BPC INSTRUCTION BIT PATTERNS (CONTINUED)

GROUP: SKIP

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| RZA | 0 | 1 | 1 | 1 | 0 | 1 | 0 | 0 | 0 | 0 | | | | | | |
| RZB | 0 | 1 | 1 | 1 | 1 | 1 | 0 | 0 | 0 | 0 | | | | | | |
| SZA | 0 | 1 | 1 | 1 | 0 | 1 | 0 | 1 | 0 | 0 | | | | | | |
| SZB | 0 | 1 | 1 | 1 | 1 | 1 | 0 | 1 | 0 | 0 | | | | | | |
| RIA | 0 | 1 | 1 | 1 | 0 | 1 | 0 | 0 | 0 | 1 | | | | | | |
| RIB | 0 | 1 | 1 | 1 | 1 | 1 | 0 | 0 | 0 | 1 | | | | | | |
| SIA | 0 | 1 | 1 | 1 | 0 | 1 | 0 | 1 | 0 | 1 | | | | | | |
| SIB | 0 | 1 | 1 | 1 | 1 | 1 | 0 | 1 | 0 | 1 | | | | | | |
| SFS | 0 | 1 | 1 | 1 | 0 | 1 | 0 | 0 | 1 | 0 | | | | | | |
| SFC | 0 | 1 | 1 | 1 | 0 | 1 | 0 | 1 | 1 | 0 | | | | | | |
| SSS | 0 | 1 | 1 | 1 | 1 | 1 | 0 | 0 | 1 | 0 | | | | | | |
| SSC | 0 | 1 | 1 | 1 | 1 | 1 | 0 | 1 | 1 | 0 | | | | | | |
| SDS | 0 | 1 | 1 | 1 | 0 | 1 | 0 | 0 | 1 | 1 | | | | | | |
| SDC | 0 | 1 | 1 | 1 | 0 | 1 | 0 | 1 | 1 | 1 | | | | | | |
| SHS | 0 | 1 | 1 | 1 | 1 | 1 | 0 | 0 | 1 | 1 | | | | | | |
| SHC | 0 | 1 | 1 | 1 | 1 | 1 | 0 | 1 | 1 | 1 | | | | | | |

* 6 BIT SKIP FIELD, +31, -32.

* IF BIT 5=0, SKIP TO P+#; #=BITS 0 THRU 4.

* IF BIT 5=1, SKIP TO P-#; #=1+ COMP OF BITS 0-4.

FIG 24D

BPC INSTRUCTION BIT PATTERNS (CONT.)

GROUP: RETURN

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| RET | 1 | 1 | 1 | 1 | 0 | 0 | 0 | 0 | 1 | $\overline{P}$/P | 6 BIT, 2'S COMPLIMENT SKIP FIELD (ALLOWS -32 THRU +31). | | | | | |

$\overline{P}$/P (DON'T POP/POP THE IOC) ENCODED AS 0/1.

FIG 24E

GROUP: COMPLIMENT

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| CMA | 1 | 1 | 1 | 1 | 0 | 0 | 0 | 0 | 0 | 1 | 1 | 0 | 0 | 0 | 0 | 0 |
| CMB | 1 | 1 | 1 | 1 | 1 | 0 | 0 | 0 | 0 | 1 | 1 | 0 | 0 | 0 | 0 | 0 |
| TCA | 1 | 1 | 1 | 1 | 0 | 0 | 0 | 0 | 0 | 0 | 1 | 0 | 0 | 0 | 0 | 0 |
| TCB | 1 | 1 | 1 | 1 | 1 | 0 | 0 | 0 | 0 | 0 | 1 | 0 | 0 | 0 | 0 | 0 |

FIG 24F

GROUP: EXECUTE

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| EXE | D/I | 1 | 1 | 1 | 0 | 0 | 0 | 0 | 0 | 0 | 0 | 5 BIT REGISTER ADDRESS ($0-37_8$). | | | | |

D/I (DIRECT/INDIRECT) ENCODED AS 0/1.

FIG 24G

NOTES:

1.  DENOTES A MICRO-INSTRUCTION DECODED IN THE ROM.

2.  AND  DENOTE ONE- AND TWO-WAY INTERCONNECTIONS TO A BUS; ALWAYS CONTROLLED BY A ROM MICRO-INSTRUCTION.

3. 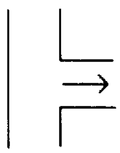 DENOTES A DIRECT CONNECTION BETWEEN TWO ITEMS.

4. 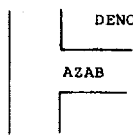

DENOTES A CONNECTION BETWEEN TWO ITEMS THAT IS ACTIVE ONLY WHEN THE STATED SIGNAL IS GIVEN. SUCH SIGNALS ARE NOT ROM DECODED MICRO-INSTRUCTIONS. SOME ARE PRESENT THROUGHOUT AN ENTIRE EXECUTION CYCLE, WHILE OTHERS REFLECT MORE TEMPORARY CONDITIONS.

OR

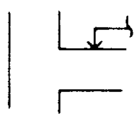

5. 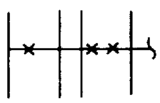 DENOTES THAT THE STATED LINE REPRESENTS A DECODED CONDITION.

6. 

REPRESENTS A NON-MICRO-INSTRUCTION CONTROL LINE OR SOME OTHER SIGNAL.

7. 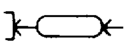 REPRESENTS AN INPUT TERMINAL TO THE BPC

8.  REPRESENTS AN OUTPUT TERMINAL FROM THE BPC

9. 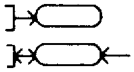 REPRESENTS A TERMINAL THAT IS BOTH AN INPUT AND AN OUTPUT.

10. NUMBERS IN PARENTHESES INDICATE THE NUMBER OF BITS A MECHANISM HANDLES.

11. THE LOGICAL SENSE (XXX VERSUS $\overline{XXX}$) OF THE I/O TERMINALS IS CORRECTLY INDICATED. HOWEVER, THE DRAWING IS NOT A RELIABLE INDICATOR OF THE EXACT SENSE OF THE INTERNAL SIGNALS. TYPICALLY BOTH SENSES EXIST, AND FREQUENTLY THE PHYSICAL PROXIMITY OF SIGNALS TO THEIR DESTINATIONS WAS MORE IMPORTANT IN DECIDING WHICH SENSE TO USE, RATHER THAN AGREEMENT OF LOGICAL SENSE.
BECAUSE STRICT ACCURACY IN REPORTING SIGNAL SENSES ON SUCH A GENERAL LEVEL DRAWING WOULD SHARPLY INCREASE THE NUMBER OF INTERCONNECTIONS, WITH ONLY A SLIGHT INCREASE IN USEFULNESS, WE USUALLY SHOW ONLY THE NAME OF THE SIGNAL.

FIG 25C

| SIGNAL NAME | MEANING AND ASSOCIATED ASSEMBLY LANGUAGE INSTRUCTIONS | FORMULA FOR GENERATION |
|---|---|---|
| LD* | INSTRUCTION IS EITHER LDA OR LDB (LOAD A OR LOAD B). $\overline{I11}$ DIFFERENTIATES BETWEEN THE TWO. | $\overline{I}_{14} \cdot \overline{I}_{13} \cdot \overline{I}_{12}$ |
| ST* | INSTRUCTION IS EITHER STA OR STB (STORE A OR STORE B). $\overline{I11}$ DIFFERENTIATES BETWEEN THE TWO. | $\overline{I}_{14} \cdot I_{13} \cdot I_{12}$ |
| AD* | INSTRUCTION IS EITHER ADA OR ADB (ADD TO A OR ADD TO B). $\overline{I11}$ DIFFERENTIATES BETWEEN THE TWO. | $\overline{I}_{14} \cdot I_{13} \cdot \overline{I}_{12}$ |
| CP* | INSTRUCTION IS EITHER CPA OR CPB (COMPARE TO A OR COMPARE TO B). $\overline{I11}$ DIFFERENTIATES BETWEEN THE TWO. | $\overline{I}_{14} \cdot \overline{I}_{13} \cdot I_{12}$ |
| $\overline{I11}$ | DIFFERENTIATES BETWEEN INSTRUCTIONS INVOLVING THE A REGISTER AND THOSE INVOLVING THE B REGISTER. | $\overline{I}_{11}$ |
| JMP | INSTRUCTION IS JMP (JUMP). | $I_{14} \cdot I_{13} \cdot \overline{I}_{12} \cdot I_{11}$ |
| JSM | INSTRUCTION IS JSM (JUMP TO SUBROUTINE). | $I_{14} \cdot \overline{I}_{13} \cdot \overline{I}_{12} \cdot \overline{I}_{11}$ |
| ISZ | INSTRUCTION IS ISZ (INCREMENT AND THEN SKIP IF ZERO). | $I_{14} \cdot \overline{I}_{13} \cdot \overline{I}_{12} \cdot I_{11}$ |
| DSZ | INSTRUCTION IS DSZ (DECREMENT AND THEN SKIP IF ZERO). | $I_{14} \cdot \overline{I}_{13} \cdot I_{12} \cdot I_{11}$ |
| AND | INSTRUCTION IS AND (AND TO A). | $I_{14} \cdot \overline{I}_{13} \cdot I_{12} \cdot \overline{I}_{11}$ |
| IOR | INSTRUCTION IS IOR (INCLUSIVE OR WITH A). | $I_{14} \cdot I_{13} \cdot \overline{I}_{12} \cdot \overline{I}_{11}$ |
| ASG | INSTRUCTION IS AND ALTER-SKIP GROUP INSTRUCTION:<br>RLA SKIP IF $A_0$=1, ALTER $A_0$.<br>RLB SKIP IF $B_0$=1, ALTER $B_0$.<br>SLA SKIP IF $A_0$=0, ALTER $A_0$.<br>SLB SKIP IF $B_0$=0, ALTER $B_0$.<br>SAP SKIP IF $A_{15}$=0, ALTER $A_{15}$.<br>SBP SKIP IF $B_{15}$=0, ALTER $B_{15}$.<br>SAM SKIP IF $A_{15}$=1, ALTER $A_{15}$.<br>SBM SKIP IF $B_{15}$=1, ALTER $B_{15}$. | $I_{14} \cdot I_{13} \cdot I_{12} \cdot I_{10}$ |

FIG 34A

| SIGNAL NAME | MEANING AND ASSOCIATED ASSEMBLY LANGUAGE INSTRUCTIONS | FORMULA FOR GENERATION |
|---|---|---|
| ASG (CONT.) | SOC SKIP IF OVERFLOW=0, ALTER OVERFLOW.<br>SOS SKIP IF OVERFLOW=1, ALTER OVERFLOW.<br>SEC SKIP IF EXTEND=0, ALTER EXTEND.<br>SES SKIP IF EXTEND=1, ALTER EXTEND.<br>RZA SKIP IF A IS NOT ZERO.<br>RZB SKIP IF B IS NOT ZERO.<br>SZA SKIP IF A IS ZERO.<br>SZB SKIP IF B IS ZERO.<br>RIA RZA, THEN INCREMENT A.<br>RIB RZB, THEN INCREMENT B.<br>SIA SZA, THEN INCREMENT A.<br>SIB SZB, THEN INCREMENT B.<br>SFS SKIP IF FLAG SET.<br>SFC SKIP IF FLAG CLEAR.<br>SSS SKIP IF STATUS SET.<br>SSC SKIP IF STATUS CLEAR.<br>SDS SKIP IF DECIMAL CARRY SET.<br>SDC SKIP IF DECIMAL CARRY CLEAR.<br>SHS SKIP IF HALT SET.<br>SHC SKIP IF HALT CLEAR. | |
| I7 | DIFFERNETIATES BETWEEN HOLD, AND ALTER BY SETTING OR CLEARING, THE TESTED BIT IN THE FOLLOWING ALTER INSTRUCTIONS: RLA, RLB, SLA, SLB, SAP, SBP, SAM, SBM, SOC, SOS, SEC, SES. I7=0 IMPLIES HOLD; I7=1 IMPLIES ALTER. | $I_7$ |
| $\overline{I6}$ | IF I7=0, $\overline{I6}$ DIFFERENTIATES BETWEEN CLEARING OR SETTING THE TESTED BIT, WHEN DOING AN ALTER INSTRUCTION. $\overline{I6}$=1 IMPLIES CLEAR; $\overline{I6}$=0 IMPLIES SET. | $\overline{I}_6$ |
| LSC | INSTRUCTION IS AN ALTER INSTRUCTION INVOLVING A LEAST-SIGNIFICANT BIT: RLA, RLB, SLA, SLB. | $\overline{I}_{15} \cdot I_{14} \cdot I_{13} \cdot I_{12} \cdot I_{10} \cdot I_9$ |
| MSC | INSTRUCTION IS AN ALTER INSTRUCTION INVOLVING A MOST-SIGNIFICANT BIT, EXTEND, OR OVERFLOW: SAP, SAM, SBP, SBM, SOC, SOS, SEC, SES. | $I_{15} \cdot I_{14} \cdot I_{13} \cdot I_{12} \cdot I_{10}$ |

FIG 34B

| SIGNAL NAME | MEANING AND ASSOCIATED ASSEMBLY LANGUAGE INSTRUCTIONS | FORMULA FOR GENERATION |
|---|---|---|
| RSS | DIFFERENTIATES BETWEEN THE SKIP AND REVERSE-SKIP SENSES AMONG THE ALTER AND SKIP GROUP INSTRUCTIONS. | $I_{14} \cdot I_{13} \cdot I_{12} \cdot I_{10} \cdot I_8$ |
| EQ | INSTRUCTION IS EITHER SEC OR SES. RSS DIFFERENTIATES BETWEEN THE TWO. | $I_{15} \cdot I_{14} \cdot I_{13} \cdot I_{12} \cdot I_{11} \cdot I_{10} \cdot I_9$ |
| OQ | INSTRUCTION IS EITHER SOC OR SOS. RSS DIFFERENTIATES BETWEEN THE TWO. | $I_{15} \cdot I_{14} \cdot I_{13} \cdot I_{12} \cdot \overline{I}_{11} \cdot I_{10} \cdot I_9$ |
| S/RI | INSTRUCTIONS IS A "SKIP/REVERSE-SKIP, THEN INCREMENT" INSTRUCTION: SIA, RIA, SIB, RIB. | $\overline{I}_{15} \cdot I_{14} \cdot I_{13} \cdot I_{12} \cdot I_{10} \cdot \overline{I}_9 \cdot \overline{I}_7 \cdot I_6$ |
| S/RZ | INSTRUCTION IS A "SKIP/REVERSE-SKIP, WITHOUT INCREMENT" INSTRUCTION: SZA, RZA, SZB, RZB. | $\overline{I}_{15} \cdot I_{14} \cdot I_{13} \cdot I_{12} \cdot I_{10} \cdot \overline{I}_9 \cdot \overline{I}_7 \cdot \overline{I}_6$ |
| FGC | IF ASG IS A 1, AND EACH OF S/RI, S/RZ, MSC AND LSC ARE 0'S, INSTRUCTION IS EITHER SFS OR SFC. RSS DIFFERENTIATES BETWEEN THE TWO. | $\overline{I}_{11} \cdot \overline{I}_6$ |
| STC | IF ASG IS A 1, AND EACH OF S/RI, S/RZ, MSC AND LSC ARE 0'S, INSTRUCTION IS EITHER SSS OR SSC. RSS DIFFERENTIATES BETWEEN THE TWO. | $I_{11} \cdot \overline{I}_6$ |
| HTC | IF ASG IS A 1, AND EACH OF S/RI, S/RZ, MSC AND LSC ARE 0'S, INSTRUCTION IS EITHER SHS OR SHC. RSS DIFFERENTIATES BETWEEN THE TWO. SEE NOTE AT BOTTOM. | $I_{11} \cdot I_6$ |
| RET | INSTRUCTION IS RET (RETURN). [THE $\overline{P}$/P BIT ($I_6$) IS A DON'T CARE BIT FOR THE BINARY PROCESSOR CHIP.] | $I_{15} \cdot I_{14} \cdot I_{13} \cdot I_{12} \cdot \overline{I}_{11} \cdot \overline{I}_{10} \cdot \overline{I}_9 \cdot \overline{I}_8 \cdot I_7$ |
| EXE | INSTRUCTION IS EXE (EXECUTE). | $I_{14} \cdot I_{13} \cdot I_{12} \cdot \overline{I}_{11} \cdot \overline{I}_{10} \cdot \overline{I}_9 \cdot \overline{I}_8 \cdot \overline{I}_7 \cdot \overline{I}_6 \cdot \overline{I}_5$ |

NOTE: THE NOR OF FGC, STC AND HTC, IF TRUE WHILE ASG IS ALSO TRUE, WHILE S/RI, S/RZ, MSC AND LSC ARE FALSE, SPECIFIES EITHER SDS OR SDC. RSS DIFFERENTIATES BETWEEN THE TWO.

FIG 34C

| SIGNAL NAME | MEANING AND ASSOCIATED ASSEMBLY LANGUAGE INSTRUCTIONS | FORMULA FOR GENERATION |
|---|---|---|
| T/CM | INSTRUCTION IS ANY COMPLEMENT INSTRUCTION: CMA, CMB, TCA, TCB (ONE'S COMPLEMENT OF A, ONE'S COMPLEMENT OF B, TWO'S COMPLEMENT OF A, TWO' COMPLEMENT OF B). | $I_{15}\cdot I_{14}\cdot I_{13}\cdot I_{12}\cdot \overline{I}_{10}\cdot \overline{I}_{9}\cdot \overline{I}_{8}\cdot \overline{I}_{7}\cdot I_{5}$ |
| TC* | INSTRUCTION IS EITHER TCA OR TCB (TWO'S COMPLEMENT A OR TWO'S COMPLEMENT B). | $I_{15}\cdot I_{14}\cdot I_{13}\cdot I_{12}\cdot \overline{I}_{10}\cdot \overline{I}_{9}\cdot \overline{I}_{8}\cdot \overline{I}_{7}\cdot \overline{I}_{6}\cdot I_{5}$ |
| SRG | SHIFT-ROTATE GROUP—INSTRUCTION IS ONE OF THE FOLLOWING:<br>AAR ARITHMETIC RIGHT SHIFT OF A.<br>ABR ARITHMETIC RIGHT SHIFT OF B.<br>SAR SHIFT A RIGHT.<br>SBR SHIFT B RIGHT.<br>SAL SHIFT A LEFT.<br>SBL SHIFT B LEFT.<br>RAR ROTATE A RIGHT.<br>RBR ROTATE B RIGHT.<br>$\overline{I6}$, I7 AND $\overline{I11}$ ARE USED TO DISTINGUISH BETWEEN THESE INSTRUCTIONS. | $I_{15}\cdot I_{14}\cdot I_{13}\cdot I_{12}\cdot \overline{I}_{10}\cdot \overline{I}_{9}\cdot I_{8}\cdot \overline{I}_{5}$ |

FIG 34D

GROUP: ALTER

PART OF INSTRUCTION CATEGORY IDENTIFIED BY ASG

RSS=ASG• $I_8$

| | INST. NAME | 15 | 14 | 13 | 12 | 11 | 10 | 9 | 8 | 7 | 6 |
|---|---|---|---|---|---|---|---|---|---|---|---|
| LSC | RLA | 0 | 1 | 1 | 1 | 0 | 1 | 1 | 1 | H/$\overline{H}$ | C/S |
| LSC | RLB | 0 | 1 | 1 | 1 | 1 | 1 | 1 | 1 | H/$\overline{H}$ | C/S |
| LSC | SLA | 0 | 1 | 1 | 1 | 0 | 1 | 1 | 0 | H/$\overline{H}$ | C/S |
| LSC | SLB | 0 | 1 | 1 | 1 | 1 | 1 | 1 | 0 | H/$\overline{H}$ | C/S |
| MSC | SAP | 1 | 1 | 1 | 1 | 0 | 1 | 0 | 0 | H/$\overline{H}$ | C/S |
| MSC | SBP | 1 | 1 | 1 | 1 | 1 | 1 | 0 | 0 | H/$\overline{H}$ | C/S |
| MSC | SAM | 1 | 1 | 1 | 1 | 0 | 1 | 0 | 1 | H/$\overline{H}$ | C/S |
| MSC | SBM | 1 | 1 | 1 | 1 | 1 | 1 | 0 | 1 | H/$\overline{H}$ | C/S |
| MSC, OQ | SOC | 1 | 1 | 1 | 1 | 0 | 1 | 1 | 0 | H/$\overline{H}$ | C/S |
| MSC, OQ | SOS | 1 | 1 | 1 | 1 | 0 | 1 | 1 | 1 | H/$\overline{H}$ | C/S |
| MSC, EQ | SEC | 1 | 1 | 1 | 1 | 1 | 1 | 1 | 0 | H/$\overline{H}$ | C/S |
| MSC, EQ | SES | 1 | 1 | 1 | 1 | 1 | 1 | 1 | 1 | H/$\overline{H}$ | C/S |

Bit 11: $\overline{I11}$; Bit 7: I7; Bit 6: $\overline{I6}$

Bits 5–0:

* 6 BIT SKIP FIELD, +31, -32.

* IF BIT 5=0, SKIP TO P+#; #=BITS 0 THRU 4.

* IF BIT 5=1, SKIP TO P-#, #=1+ COMP OF BITS 0-4.

H /$\overline{H}$ (HOLD/DON'T HOLD) AND C/S (CLEAR/SET) ARE CODED AS 0/1.

GROUP: COMPLEMENT

| | INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| T/CM | CMA | 1 | 1 | 1 | 1 | 0 | 0 | 0 | 0 | 0 | 1 | 1 | 0 | 0 | 0 | 0 | 0 |
| T/CM | CMB | 1 | 1 | 1 | 1 | 1 | 0 | 0 | 0 | 0 | 1 | 1 | 0 | 0 | 0 | 0 | 0 |
| T/CM, TC* | TCA | 1 | 1 | 1 | 1 | 0 | 0 | 0 | 0 | 0 | 0 | 1 | 0 | 0 | 0 | 0 | 0 |
| T/CM, TC* | TCB | 1 | 1 | 1 | 1 | 1 | 0 | 0 | 0 | 0 | 0 | 1 | 0 | 0 | 0 | 0 | 0 |

GROUP: RETURN

| | INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| RET | RET | 1 | 1 | 1 | 1 | 0 | 0 | 0 | 0 | 1 | $\overline{P}$/P | 6 BIT, 2'S COMPLEMENT SKIP FIELD (ALLOWS -32 THRU +31). | | | | | |

$\overline{P}$/P (DON'T POP/POP THE IOC) ENCODED AS 0/1.

GROUP: EXECUTE

| | INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| EXE | EXE | D/I | 1 | 1 | 1 | 0 | 0 | 0 | 0 | 0 | 0 | 0 | 5 BIT REGISTER ADDRESS ($0-37_8$). | | | | |

D/I (DIRECT/INDIRECT) ENCODED AS 0/1.

GROUP: SHIFT-ROTATE

I̅11 → bit 11; I7 → bit 7; I̅6 → bit 6

| | INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| SRG | AAR | 1 | 1 | 1 | 1 | 0 | 0 | 0 | 1 | 0 | 0 | 0 | 0 | * | | | |
| SRG | ABR | 1 | 1 | 1 | 1 | 1 | 0 | 0 | 1 | 0 | 0 | 0 | 0 | * | | | |
| SRG | SAR | 1 | 1 | 1 | 1 | 0 | 0 | 0 | 1 | 0 | 1 | 0 | 0 | * | | | |
| SRG | SBR | 1 | 1 | 1 | 1 | 1 | 0 | 0 | 1 | 0 | 1 | 0 | 0 | * | | | |
| SRG | SAL | 1 | 1 | 1 | 1 | 0 | 0 | 0 | 1 | 1 | 0 | 0 | 0 | * | | | |
| SRG | SBL | 1 | 1 | 1 | 1 | 1 | 0 | 0 | 1 | 1 | 0 | 0 | 0 | * | | | |
| SRG | RAR | 1 | 1 | 1 | 1 | 0 | 0 | 0 | 1 | 1 | 1 | 0 | 0 | * | | | |
| SRG | RBR | 1 | 1 | 1 | 1 | 1 | 0 | 0 | 1 | 1 | 1 | 0 | 0 | * | | | |

* 4 BITS OF SHIFT-ROTATE FIELD.
* IN SOURCE $1 \leq N \leq 16$.
* BINARY IN THIS FIELD IS N-1.

FIG 35E

TABLE OF GROUP
ENCODING QUALIFIER GENERATION

| INSTRUCTION CATEGORY | GROUP QUALIFIERS GENERATED | | | |
|---|---|---|---|---|
| | G3 | G2 | G1 | G0 |
| ST* | 1 | 1 | 1 | 1 |
| AD* | 0 | 1 | 1 | 1 |
| JMP | 1 | 0 | 1 | 0 |
| EXE | 1 | 1 | 1 | 0 |
| ASG | 1 | 1 | 0 | 0 |
| LD* | 0 | 1 | 1 | 1 |
| SRG | 0 | 1 | 0 | 0 |
| ISZ | 0 | 0 | 1 | 0 |
| JSM | 1 | 0 | 1 | 1 |
| DSZ | 0 | 0 | 1 | 0 |
| RET | 1 | 0 | 0 | 0 |
| T/CM | 0 | 1 | 0 | 1 |
| CP* | 0 | 1 | 1 | 0 |
| AND | 0 | 1 | 1 | 1 |
| IOR | 0 | 1 | 1 | 1 |

FIG 36

RULE FOR COMPUTING NTH STATE COUNT FROM N-1TH STATE COUNT:

1. ↘ DENOTES NTH SC(I)= N-1TH SC(I-1)
2. ↘ (with circle) DENOTES NTH SC(I)= N-1TH $\overline{SC(I-1)}$

ROM STATE-COUNTS

| ASM CHART STATE # | ROM STATE-COUNTER OUTPUTS SC3 | SC2 | SC1 | SC0 |
|---|---|---|---|---|
| 14 | 0 | 1 | 1 | 1 |
| 0 | 1 | 0 | 1 | 0 |
| 1 | 0 | 1 | 0 | 0 |
| 2 | 1 | 0 | 1 | 1 |
| 3 | 1 | 1 | 0 | 0 |
| 4 | 1 | 1 | 1 | 1 |
| 5 | 1 | 1 | 1 | 0 |
| 6 | 0 | 1 | 1 | 0 |
| 7 | 0 | 0 | 1 | 0 |
| 8 | 0 | 0 | 0 | 0 |
| 9 | 1 | 0 | 0 | 1 |
| 10 | 0 | 1 | 0 | 1 |
| 11 | 0 | 0 | 1 | 1 |
| 12 | 1 | 0 | 0 | 0 |
| 13 | 1 | 1 | 0 | 1 |
| 14 | 0 | 1 | 1 | 1 |

THESE STATES NOT USED (states 11, 12, 13)

START-UP STATE (CAUSED BY POP) (state 14)

"FORBIDDEN" STATE (TRANSITIONS TO ITSELF ONLY)

| SC3 | SC2 | SC1 | SC0 |
|---|---|---|---|
| 0 | 0 | 0 | 1 |
| 0 | 0 | 0 | 1 |

THE ASM CHART HAS THESE 20 NON-SEQUENTIAL STATE-COUNT TRANSITIONS:

| | | | | |
|---|---|---|---|---|
| 0 TO 0 | 3 TO 2 | 2 TO 4 | 3 TO 7 | 2 TO 10 |
| 5 TO 0 | 4 TO 2 | 4 TO 4 | 5 TO 7 | 6 TO 10 |
| 10 TO 0 | 3 TO 3 | 2 TO 6 | 4 TO 9 | 7 TO 10 |
| 2 TO 2 | 6 TO 3 | 3 TO 6 | 9 TO 9 | 14 TO 10 |

REQUIRING THESE 8 "NEXT-STATE IS..." NON-SEQUENTIAL STATE-COUNT MICRO-INSTRUCTIONS:

| | | | |
|---|---|---|---|
| NS0 | NS3 | NS6 | NS9 |
| NS2 | NS4 | NS7 | NS10 |

DEFINITION OF THE "NEXT-STATE IS..." NON-SEQUENTIAL MICRO-INSTRUCTIONS:

| NON-SEQUENTIAL STATE-COUNT MICRO-INSTRUCTION | STATE-COUNTER CONTROL LINES | | | | |
|---|---|---|---|---|---|
| | INC1 | NSC3 | $\overline{\text{NSC2}}$ | $\overline{\text{NSC1}}$ | $\overline{\text{NSC0}}$ |
| NS0 | 0 | 1 | 1 | 0 | 1 |
| NS2 | 0 | 1 | 1 | 0 | 0 |
| NS3 | 0 | 1 | 0 | 1 | 1 |
| NS4 | 0 | 1 | 0 | 0 | 0 |
| NS6 | 0 | 0 | 0 | 0 | 1 |
| NS7 | 0 | 0 | 1 | 0 | 1 |
| NS9 | 0 | 1 | 1 | 1 | 0 |
| NS10 | 0 | 0 | 0 | 1 | 0 |
| NONE OF THE ABOVE | 1 | - | - | - | - |

← THESE PATTERNS, WHEN PUT THROUGH THE STATE-COUNTER'S RULE FOR STATE-TO-STATE TRANSITIONS, RESULT IN THE DESIRED STATE-COUNTS.

FIG 43

S REGISTER OPERATIONS:
SET S ($\overline{IDB}$ BUS TO S)
RIGHT SHIFT WITH $0 \rightarrow S_{15}$
ARITHMETIC RIGHT SHIFT ($S_{15}$ UNALTERED)
ROTATE S RIGHT ($S_0 \rightarrow S_{15}$)
SHIFT S LEFT WITH $0 \rightarrow S_0$

| INSTRUCTION | ACTION | $I_7$ | $I_6$ | CONTROL SIGNALS |
|---|---|---|---|---|
| AAR, ABR | SHIFT RIGHT/KEEP BIT 15 | 0 | 0 | SSE, SR, AMS |
| SAR, SBR | SHIFT RIGHT/0→BIT 15 | 0 | 1 | SSE, SR, SRM |
| SAL, SBL | SHIFT LEFT/0→BIT 15 | 1 | 0 | SSE, SL |
| RAR, RBR | ROTATE RIGHT/BIT 0→BIT 15 | 1 | 1 | SSE, SR, RSM |

RULES FOR GENERATING SUM AND CARRY BITS

| SERVICE LOGIC SIGNALS | INPUTS | | | OUTPUTS | |
|---|---|---|---|---|---|
| | $CIN_i$ | $ZAB_i$ | $S_i$ | $COUT_i$ | $SUM_i$ |
| NOR | 0 | 0 | 0 | 0 | 0 |
| XOR | 0 | 0 | 1 | 0 | 1 |
| XOR | 0 | 1 | 0 | 0 | 1 |
| AND | 0 | 1 | 1 | 1 | 0 |
| CIN•NOR | 1 | 0 | 0 | 0 | 1 |
| CIN•XOR | 1 | 0 | 1 | 1 | 0 |
| CIN•XOR | 1 | 1 | 0 | 1 | 0 |
| CIN•AND | 1 | 1 | 1 | 1 | 1 |

"AND","NOR" AND "XOR" ARE MUTUALLY EXCLUSIVE CONDITIONS, AMONG WHICH EXACTLY ONE MUST ALWAYS BE TRUE. NOW:

A. $SUM_i=1$ IF EXACTLY ONE OR THREE INPUTS (AMONG $S_i$, $ZAB_i$ AND $CIN_i$)=1.

B. $COUT_i=1$ IF $AND_i+(XOR_i \cdot CIN_i)=1$.

A AND B CAN BE IMPLEMENTED BY CIRCUITRY THAT PERFORMS THE FOLLOWING OPERATIONS:

1. IF $NOR_i=1$, THEN $SUM_i=CIN_i$; $COUT_i=0$ (FOR ODD BITS), $\overline{COUT_i}=1$ (FOR EVEN BITS)
2. IF $XOR_i=1$, THEN $SUM_i=\overline{CIN_i}$; $COUT_i=CIN_i$
3. IF $AND_i=1$, THEN $SUM_i=CIN_i$; $COUT_i=1$

FIG 55

D/I (DIRECT/INDIRECT) AND B/B̄ (BASE PAGE/NOT BASE PAGE) CODED AS 0/1

*ACTIVE PULL-UP DURING MECD
**ACTIVE PULL-UP DURING MECR

HOW TO INTERPRET THE BPC ASM CHART

1. What we usually refer to simply as a state ("state 4 for LOAD A") is generally a coincidence of that particular state-count and some group encoding qualifier pattern (representing a particular group). The most precise way to refer to a location on the ASM chart is indicate both the group and state-counts, (say, B4). Some states (0,1,and 14) are completely group independent. States are indicated by circles with numbers in them: (4). Group information is prominently displayed next to sections to which it pertains.

2. Each state represents a Ø2 pre-charge and Ø1 decode in the ROM. The ASM chart represents what is decoded from the ROM in the various states; it does not necessarily represent end-results that occur simultaneously. If, for instance, two instructions decoded in the same state have different delays coming from the ROM, then they do not result in simultaneous activity, even though they are drawn as being in the same state.

3. Rectangular boxes ([SET A]) denote micro-instructions. Diamonds (<MEC=1?>) denote qualifiers affecting the decoding of micro-instructions. Ovals ((STM)) denote micro-instructions that are actually decoded and given, but that are "don't-cares". That is, they are present but do not affect the algorithmic process. Sometimes these don't-cares are the result of minimization, and sometimes they are a result of the way the flow charts have been drawn (in an attempt to make them more easily understood).

4. All activity within a state is decoded and initiated (its delay is begun) at the same time. The fact that a state is shown as a sequential arrangement of boxes and diamonds does not imply sequential activity; the entire state is decoded simultaneously. For example, state 0 is represented below:

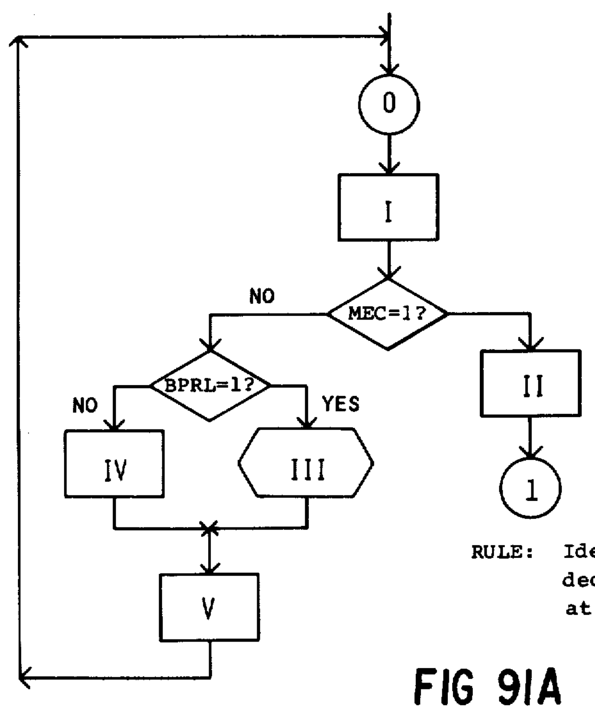

RULE: Identify the path, then decode all instructions at once.

FIG 91A

HOW TO INTERPRET THE BPC ASM CHART, CONT.

Another way to represent the same activity is illustrated below. We don't draw the ASM chart that way because of the increased size and because of problems in achieving connectedness. Also, overall algorithmic process would be hard to see; the more compact notation results in a more effective visual outline. Within a state however, the expanded notation is often less confusing as it more closely represents the actual way things are done.

If MEC=1, then: | If MEC=0, and BPRL=0, then: | If MEC=0 and BPRL=1, then:

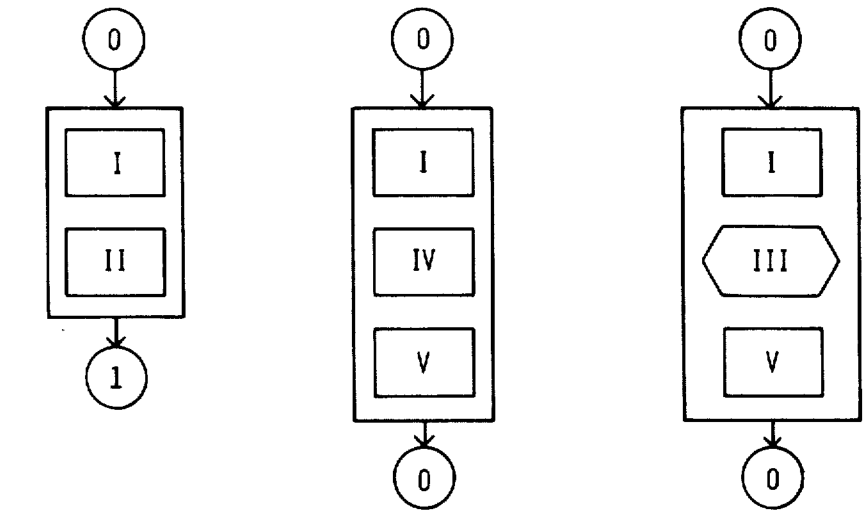

5. Within a state, related instructions are grouped together in the same box solely for the sake of algorithmic clarity.

6. Because of limitations on transistor device size, and the large capacitances of the IDA lines, two consecutive SET IDA's are required to ensure that IDA lines assume their proper final values. If what is being transmitted with the SET IDA is an address for Memory, the STM will accompany the second SET IDA. If data is being written to Memory, DVAL will accompany the second and all subsequent SET IDA's until Memory Complete is received. In either case, the IDA lines will be stable before the start of the second SET IDA.

7. The symbol 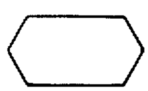 represents activity controlled by the M-Section. The micro-instructions shown inside are encoded in the ROM, just as are any other micro-instructions. However, these particular instances of decoding those micro-instructions are independent of all group and state-count qualifier lines in the ROM. They are decoded against qualifiers generated by the M-Section and Address Decode. ($\overline{RDR}$, $\overline{WTR}$, $\overline{DRQ}$, M00-M03).

8. The qualifiers that enable such M-Section activity are generated when STM occurs in conjuction with an address on the IDA lines that specifies a register within the BPC. These qualifiers are not always generated immediately, nor are they necessarily co-incident with one another.

FIG 91B

HOW TO INTERPRET THE BPC ASM CHART, CONT.

9. Consider the following typical situation:

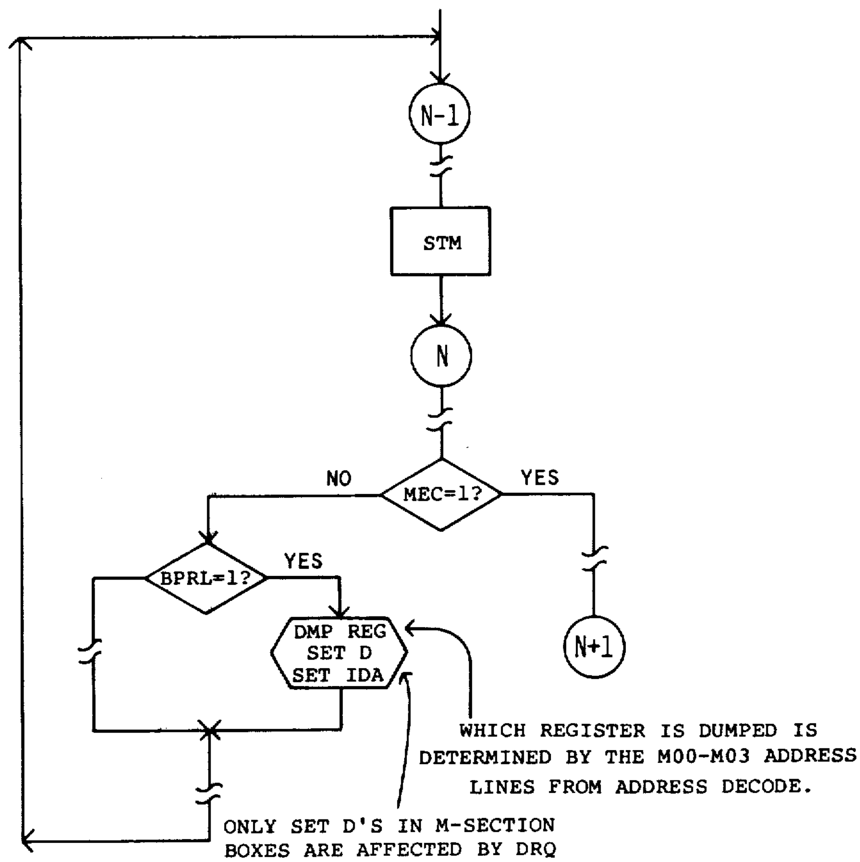

In this example the STM occurs in the state prior to the one with the M-Section activity. The machine will stay in state N for 4 consecutive state-times: 3 "no's" and a "yes" for the MEC qualifier. The BPRL qualifier (from Address Decode) will be met each time, but due to delays in the M-Section the first pass through state N generates none of the M-Section activity. The second and third passes do perform the indicated activity, except for the SET D. It is done during the second pass, but not during the third. This is a result of $\overline{\text{DRQ}}$, and prevents D from tracking the pre-charge of the $\overline{\text{IDB}}$ Bus which follows the execution of the SET D. This prevents the second SET IDA from producing a glitch on the IDA lines.

Sometimes the STM is given in state N-2. In such a case the one state of M-Section delay is spent while in state N-1, and only three state-times are spent in state N. When this happens the M-Section activity occurs immediately on the first and second of these; the third meets the MEC qualifier. As before, the SET D is done only once.

Such an instance occurs between states C2 and C9. There are several others.

FIG 9IC

HOW TO INTERPRET THE BPC ASM CHART, CONT.

10. Sometimes, as in state C9, the BPRL qualifier is shown by a dotted line: <BPRL=1?> This occurs only when the machine represented by the ASM chart has no activity in that state that is conditional upon BPRL. Therefore, BPRL is a don't-care for the ASM chart at that state, and indeed is not used in the ROM there. However, it still initiates M-Section activity when met. And when it is met no externally caused MEC will be forthcoming, since no memory external to the BPC is involved. The MEC will be supplied by the M-Section itself, as soon as its activity is finished. In these cases the timing is as outlined in 9 above, and we show a BPRL qualifier that affects the M-Section, but not that point in the ROM, to remind the reader of what's happening.

11. Finally, a word about the correspondence between what's in the ROM and how the flow charts are drawn. The flow charts have been "de-minimized" to promote their ease of understanding. For instance, state A5 is shown as:

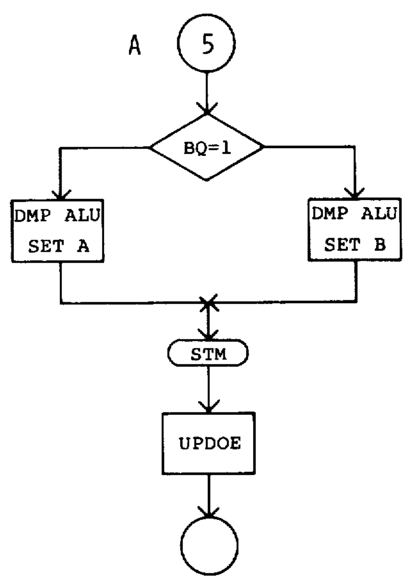

There are not two instances of decoding DMP ALU for state A5. The decoding of DMP ALU in that state is independent of the BQ qualifier, as it is done regardless of that qualifiers outcome.

State A5 could just as easily be drawn with a single DMP ALU in the same box as the UPDOE, or in a separate box of its own, ahead of the BQ qualifier.

Such redrawing often adds a welcome measure of clarity in loops involving repeated SET IDA's and multiple qualifiers. It lets us indicate what's in D at the time a SET IDA is given after certain qualifiers have been met or failed.

FIG 9D

HOW TO INTERPRET THE BPC ASM CHART, CONT.

Not all instances of the same instruction appearing twice in the same state are the result of de-minimization, however. The two SET D's in state A/B3 represent separate instances of decoding that instruction. The partial structure of the state is shown below:

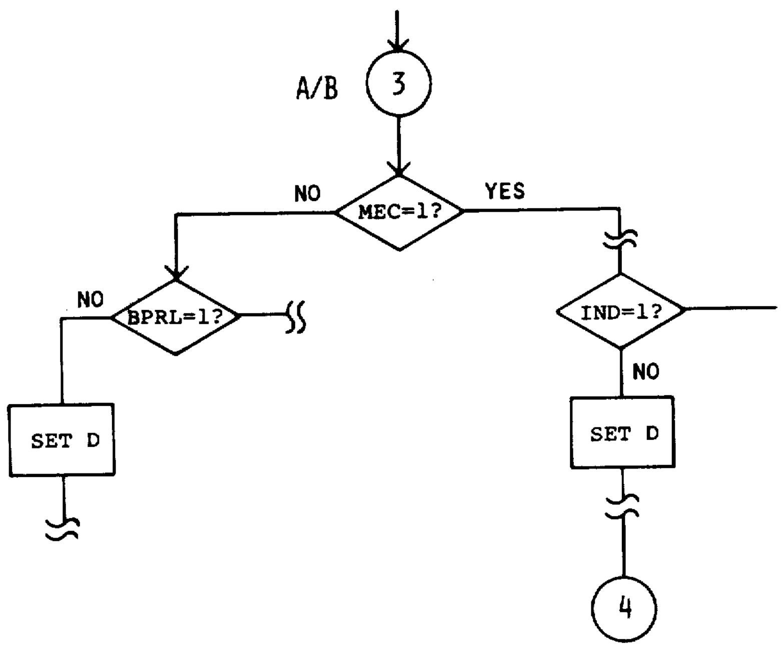

Here each SET D is conditional upon a different qualifier. Because of the way the ROM is organized, an instance of an instruction being decoded represents the "AND" of selected conditions:

IF STATE 3 AND GROUP A/B AND NOT BPRL, THEN SET D

GROUP A/B = $GP1 \cdot GP2 \cdot \overline{GP3}$ ← (GP0=1 for A, 0 for B)

The other instance of decoding SET D in that state is:

IF STATE 3 AND GROUP A/B AND NOT IND, THEN SET D

The combination:

THE CONDITION OR CONDITION, THEN SET D does not exist as a single encoding. It is simply the "OR" (during fan-in) of the two separate "AND's" as shown above.

FIG 91E

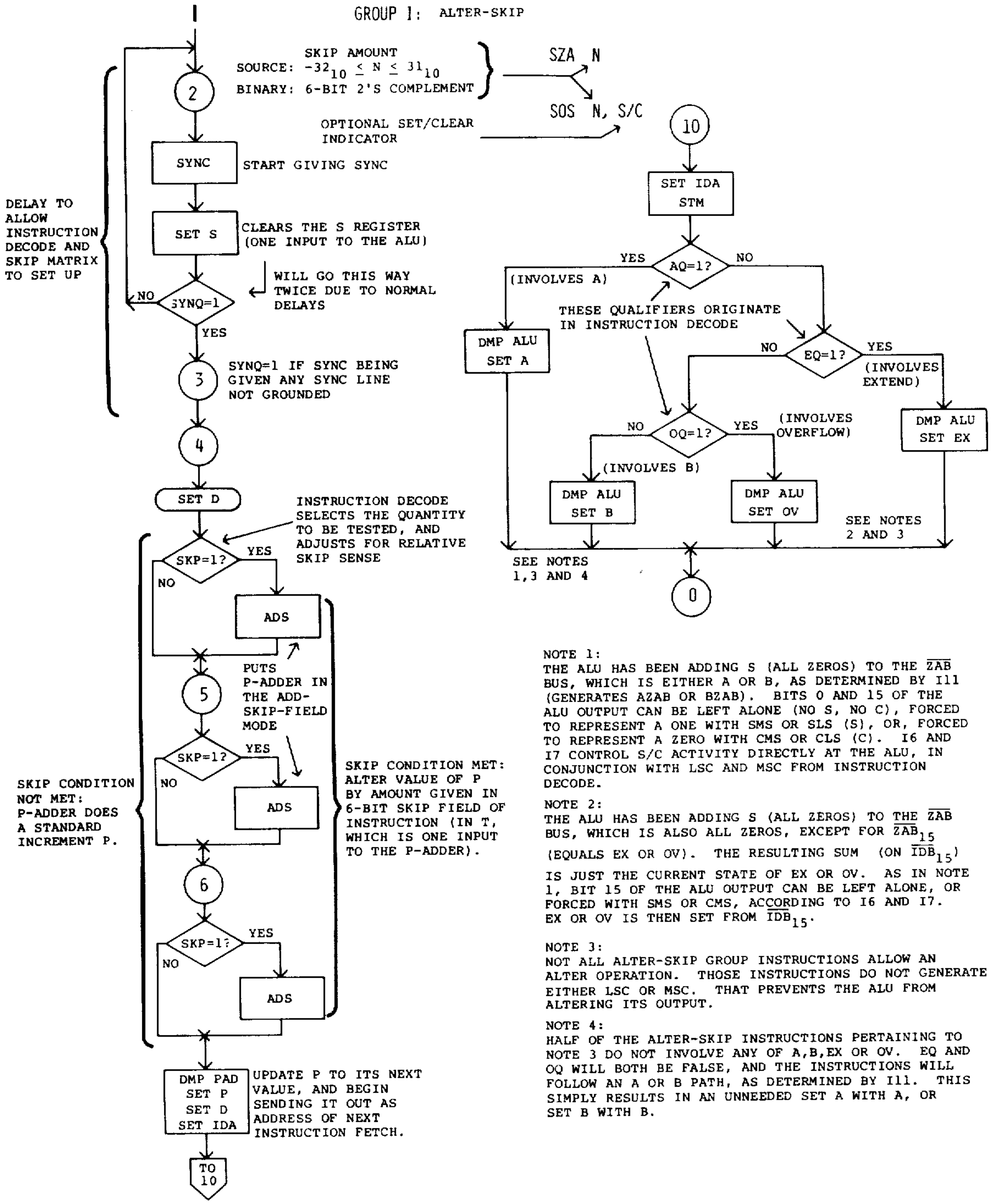

NOTE 1:
THE ALU HAS BEEN ADDING S (ALL ZEROS) TO THE $\overline{ZAB}$ BUS, WHICH IS EITHER A OR B, AS DETERMINED BY I11 (GENERATES AZAB OR BZAB). BITS 0 AND 15 OF THE ALU OUTPUT CAN BE LEFT ALONE (NO S, NO C), FORCED TO REPRESENT A ONE WITH SMS OR SLS (S), OR, FORCED TO REPRESENT A ZERO WITH CMS OR CLS (C). I6 AND I7 CONTROL S/C ACTIVITY DIRECTLY AT THE ALU, IN CONJUNCTION WITH LSC AND MSC FROM INSTRUCTION DECODE.

NOTE 2:
THE ALU HAS BEEN ADDING S (ALL ZEROS) TO THE $\overline{ZAB}$ BUS, WHICH IS ALSO ALL ZEROS, EXCEPT FOR $\overline{ZAB}_{15}$ (EQUALS EX OR OV). THE RESULTING SUM (ON $\overline{IDB}_{15}$) IS JUST THE CURRENT STATE OF EX OR OV. AS IN NOTE 1, BIT 15 OF THE ALU OUTPUT CAN BE LEFT ALONE, OR FORCED WITH SMS OR CMS, ACCORDING TO I6 AND I7. EX OR OV IS THEN SET FROM $\overline{IDB}_{15}$.

NOTE 3:
NOT ALL ALTER-SKIP GROUP INSTRUCTIONS ALLOW AN ALTER OPERATION. THOSE INSTRUCTIONS DO NOT GENERATE EITHER LSC OR MSC. THAT PREVENTS THE ALU FROM ALTERING ITS OUTPUT.

NOTE 4:
HALF OF THE ALTER-SKIP INSTRUCTIONS PERTAINING TO NOTE 3 DO NOT INVOLVE ANY OF A,B,EX OR OV. EQ AND OQ WILL BOTH BE FALSE, AND THE INSTRUCTIONS WILL FOLLOW AN A OR B PATH, AS DETERMINED BY I11. THIS SIMPLY RESULTS IN AN UNNEEDED SET A WITH A, OR SET B WITH B.

FIG 100

BPC ERA ADDRESSING

| IDA ADDRESS (OCTAL) | READ/WRITE | RESULTING u-INSTRUCTION (S) |
|---|---|---|
| (NOTE 1) | | |
| 40 | R | DMP PAD (,INC P) } (NOTE 2) |
| 41 | R | DMP PAD, ADS } (NOTE 2) |
| 42 | R | DMP PAD, ADM } (NOTE 2) |
| 42 | R | DMP PAD (,INC P) } (NOTE 2) |
| 44 | R | DMP EX |
| 44 | W | SET EX |
| 45 | R | DMP OV |
| 45 | W | SET OV |
| 46 | R | DMP T |
| 46 | W | SET T |
| 47 | W | SET D |
| 51 | R | DMP ALU (NOTE 3) |
| 52 | W | SET S |
| 53 | R | DMP ST |
| 53 | W | SET I |
| 54 | R | DMP A |
| 54 | W | SET A |
| 55 | R | DMP B |
| 55 | W | SET B |
| 56 | R | DMP P |
| 56 | W | SET P |
| 57 | R | DMP R |
| 57 | W | SET R |

NOTES

1. IN THE ERA MODE, THE BPC REGISTER ADDRESS DETECTOR RESPONDS TO IDA BUS ADDRESSES, AS SHOWN. HOWEVER, ONLY THE FOUR LEAST SIGNIFICANT BITS OF THAT ADDRESS ARE USED AS QUALIFIERS IN THE ROM. HENCE, WHILE $57_8$ IS DECODED (FOR R), THE SET R AND DMP R IN THE ROM RESPOND TO $17_8$ ON THE M-ADDRESS LINES.
2. INC P (P-ADDER OUTPUT = P+1) IS THE NOR OF ADM AND ADS. IN GENERAL, THE RESULT OF A DUM PAD IS DIFFICULT TO PREDICT, AS IT DEPENDS UPON WHERE IN ITS FLOW CHART THE BPC IS STOPPED.
3. IN GENERAL, THE RESULT OF A DMP ALU IS DIFFICULT TO PREDICT. IT DEPENDS UPON WHAT IS IN THE I, A, AND B REGISTERS.

FIG 105

1.  OR 

TRANSITION UP OR TRANSITION DOWN CAN OCCUR ANYTIME WITHIN THE INDICATED INTERVAL. USED TO INDICATE TIME-WINDOWS WITHIN WHICH EXTERNALLY ORIGINATED EVENTS CAN HAPPEN. REPRESENTS IDEALIZED LOGICAL ACTIVITY; RISE TIMES AND DELAYS ARE NOT TAKEN INTO CONSIDERATION.

2. 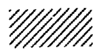

REPRESENTS THE SET-UP TIME OF A SIGNAL BEING DRIVEN.

3. 

REPRESENTS A LINE THAT IS EITHER UNDEFINED OR A DON'T CARE.

4. 

REPRESENTS A LINE THAT IS ACTIVELY PULLED-UP.

5. CAPITAL LETTERS FROM THE START OF THE ALPHABET REPRESENT EXPLANATORY NOTES. LETTERS FROM THE END OF ALPHABET ARE SOMETIMES USED TO DENOTE DIFFERENT STATES (IN THE ROM).

6. NUMERALS IN THE $\phi 2$-$\phi 1$ WAVEFORMS ARE STRICTLY FOR REFERENCE WITHIN ANY PARTICULAR SET OF WAVEFORMS, AND HAVE NO SIGNIFICANCE OUTSIDE THAT SET.

7. IN GENERAL, THE WAVEFORMS ARE QUITE IDEALIZED. THEY EXPLAIN THE LOGICAL RELATIONSHIPS BETWEEN SIGNALS, BUT ACTUAL DELAYS, RISE TIMES, SIGNAL LEVELS AND THRESHOLDS ARE NOT INDICATED.

CONVENTIONS USED IN THE WAVEFORMS

FIG 106

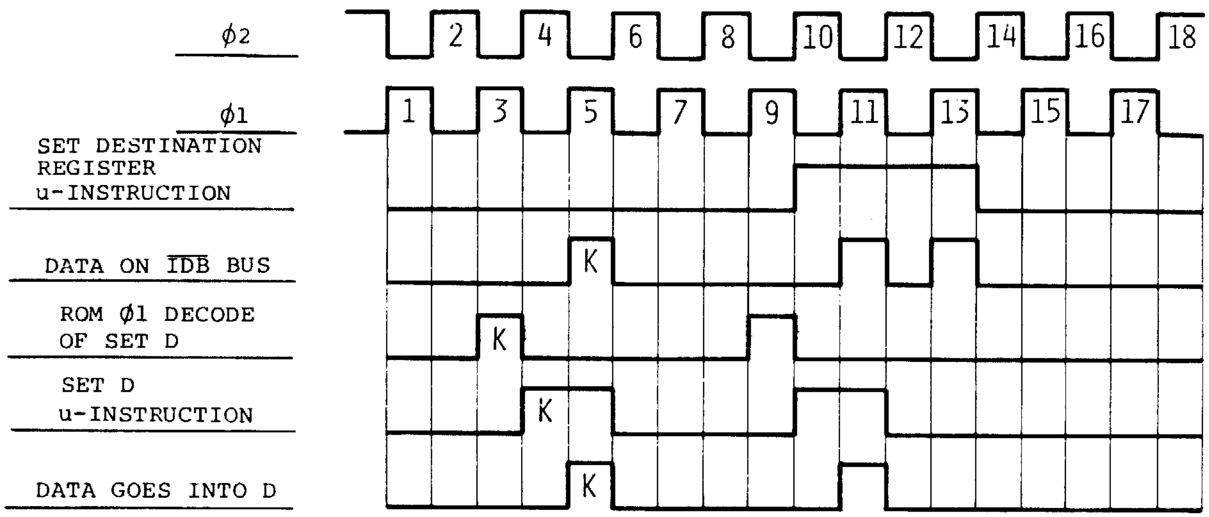

NOTES

A. PRESENT ONLY IF THE BPC IS THE ORIGINATOR OF THE MEMORY CYCLE.

B. DEPENDS UPON WHEN THE ADDRESS ON THE IDA BUS STABILIZES.

C. LATCHED WHEN STMA IS TRUE.

D. IF THIS READ MEMORY CYCLE IMMEDIATELY FOLLOWS A PREVIOUS WRITE CYCLE, THE START OF THIS $\phi$2 IS WHEN RDW WILL GO HIGH.

E. ACTIVE PULL-UP OF RDW AND $\overline{STM}$ DURING MECD.

F. THIS NOTE HAS BEEN DELETED.

G. LATCHED WHEN STMP IS FALSE.

H. TRANSITIONS AT THE START OF $\phi$1 IF THE BPC IS THE ORIGINATOR. AN EXTERNAL AGENCY HAS UNTIL PRIOR TO $\phi$2.

I. EARLIEST NEXT STM.

J. FOLLOWS STM.

K. PRESENT ONLY IF THE BPC IS THE ORIGINATOR OF THE MEMORY CYCLE. PART OF SENDING OUT THE ADDRESS AND THE DATA ON THE IDA BUS TO PRESERVE THE BUS CONVENTIONS.

FIG 107C

BPC READS MEMORY (TWO CONSECUTIVE FASTEST CYCLES SHOWN)

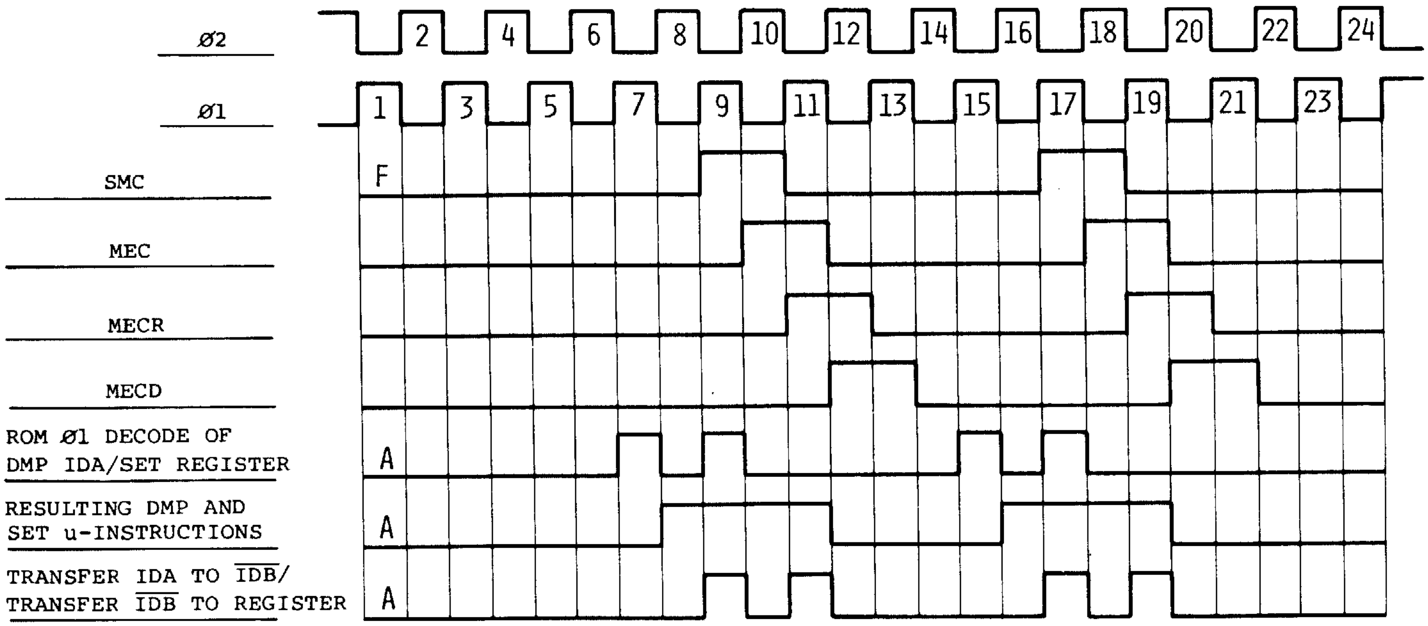

NOTES

A. PRESENT ONLY IF THE BPC IS THE ORIGINATOR OF THE MEMORY CYCLE. (SOME OTHER ENTITY ON THE BUS COULD BE READING MEMORY)

B. MEANINGFUL DURING THIS TIME, BUT LATCHED DURING STMA ONLY. SHOULD BE LOOKED AT DURING STM ONLY.

C. SOONEST POSSIBLE TRANSITION TO WRITE IF NEXT MEMORY CYCLE WERE A WRITE INSTEAD OF A READ.

D. TRANSITIONS IMMEDIATELY AT THE START OF Ø1 IF THE BPC IS THE ORIGINATOR OF THE MEMORY CYCLE.

E. ACTIVE PULL-UP ON $\overline{STM}$.

F. FOLLOWS STM.

G. UMC NEED NOT BE USED IF SMC IS GIVEN BY THE ORIGINATOR EXACTLY AS SHOWN, INSTEAD. HOWEVER, IF UMC IS GIVEN AS SHOWN, IT WILL ALSO RESULT IN SMC AS SHOWN. UMC IS IDLE IF THE BPC IS THE ORIGINATOR.

BPC READS MEMORY (TWO CONSECUTIVE FASTEST CYCLES SHOWN)

FIG 108B

NOTES

A. ACTIVE PULL UP DURING MECD.

B. DOTTED LINES REPRESENT ZERO OR ANY INTEGRAL NUMBER OF Ø1-Ø2 PAIRS.

C. NOTE THAT UMC COULD EQUAL STM.

GENERALIZED 4-STATE BPC READ MEMORY CYCLE (WITH IMPLICIT HANDSHAKE BASED ON UMC AND SMC)

WRITE TO A BPC REGISTER

WRITE TO A BPC REGISTER

WRITE TO A BPC REGISTER

NOTES

A. PRESENT ONLY IF THE BPC IS THE ORIGINATOR OF THE MEMORY CYCLE.
B. ACTIVE PULL-UP OF $\overline{DVAL}$, RDW AND $\overline{STM}$ DURING MECD.
C. DEPENDS UPON WHEN THE ADDRESS ON THE IDA BUS STABILIZES.
D. LATCHED WHEN STMA GOES TRUE.
E. IF THE BPC IS THE ORIGINATOR, RDW WILL TRANSITION AT THE START OF Ø2. AN EXTERNAL AGENCY HAS UNTIL THE END OF Ø2.
F. EARLIEST RELEASE OF RDW IF AN EXTERNAL AGENCY WERE THE ORIGINATOR OF THE MEMORY CYCLE.
G. THIS NOTE HAS BEEN DELETED.
H. LATCHED WHEN STMP GOES FALSE.
I. TRANSITIONS AT THE START OF Ø1 IF THE BPC IS THE ORIGINATOR. AN EXTERNAL AGENCY HAS UNTIL PRIOR TO Ø2.
J. FOLLOWS STM.
K. FOR THE ADDRESS.
L. FOR THE DATA.
M. FOR THE ADDRESS. SEE NOTE N.
N. FOR THE DATA. ADDRESS AND DATA TYPICALLY INVOLVE DIFFERENT REGISTERS.

WRITE TO A BPC REGISTER

FIG 110D

WRITE MEMORY (TWO CONSECUTIVE FASTEST CYCLES SHOWN)

WRITE MEMORY (TWO CONSECUTIVE FASTEST CYCLES SHOWN)

NOTES

A. THIS WAVE FORM PRESENT ONLY IF THE BPC IS THE ORIGINATOR OF THE MEMORY CYCLE.

B. ACTIVE PULL-UP DURING MECD ON $\overline{\text{DVAL}}$, RDW, AND $\overline{\text{STM}}$.

C. MEANING DURING THIS TIME, BUT LATCHED DURING STMA ONLY. SHOULD BE LOOKED AT DURING STM ONLY.

D. WAVEFORM SHOWN ASSUMES BPC AS THE ORIGINATOR OF THE MEMORY CYCLE. IF THE ORIGINATOR WERE AN EXTERNAL AGENCY, RDW COULD TRANSITION TOGETHER WITH STM.

E. EARLIEST RELEASE OF RDW IF AN EXTERNAL AGENCY WERE THE ORIGINATOR OF THE MEMORY CYCLE.

F. TRANSITIONS IMMEDIATELY AT THE START OF Ø1 IF THE BPC IS THE ORIGINATOR OF THE MEMORY CYCLE.

G. FOLLOWS STM.

H. UMC NEED NOT BE USED IF SMC IS GIVEN BY THE ORIGINATOR EXACTLY AS SHOWN, INSTEAD. HOWEVER, IF UMC IS GIVEN AS SHOWN, IT WILL RESULT IN SMC AS SHOWN.
UMC IS IDLE IF THE BPC IS THE ORIGINATOR.

I. FOR ADDRESS.

J. FOR DATA.

WRITE MEMORY (TWO CONSECUTIVE FASTEST CYCLES SHOWN)

FIG 111C

NOTES

A. ACTIVE PULL-UP DURING MECD.

B. DOTTED LINES REPRESENT ZERO ON ANY INTEGRAL NUMBER OF Ø1-Ø2 PAIRS.

C. NOTE THAT $\overline{UMC}$ COULD EQUAL $\overline{STM}$.

GENERALIZED 4-STATE BPC WRITE MEMORY CYCLE WITHOUT HANDSHAKE

NOTES

A. ACTIVE PULL-UP DURING MECD.

B. DOTTED LINES REPRESENT ZERO OR ANY INTEGRAL NUMBER OF Ø1-Ø2 PAIRS.

C. NOTE THAT $\overline{SMC}$ CANNOT EQUAL $\overline{DVAL}$; $\overline{DVAL}$ LASTS TOO LONG.

GENERALIZED 5-STATE BPC WRITE MEMORY CYCLE WITH HANDSHAKE (LEADING EDGE OF DVAL USED TO INITIATE SMC)

NOTES

A. ACTIVE PULL-UP DURING MECD.

B. DOTTED LINES REPRESENT ZERO OR ANY INTEGRAL NUMBER OF Ø1-Ø2 PAIRS.

C. NOTE THAT $\overline{UMC}$ COULD EQUAL $\overline{DVAL}$.

GENERALIZED 6-STATE BPC WRITE MEMORY CYCLE WITH HANDSHAKE (LEADING EDGE OF DVAL USED TO INITIATE UMC)

BPC START-UP AND FIRST INSTRUCTION FETCH SEQUENCE

BPC START-UP AND FIRST INSTRUCTION FETCH SEQUENCE

NOTES

A. IDA EQUALS THE INSTRUCTION FETCHED FROM LOCATION $40_8$. IN THIS EXAMPLE WE ASSUME THAT IT IS JMP $41_8$, I.

B. ACTIVE PULL-UP ON $\overline{STM}$ DURING MECD.

C. MEC RESETS THE LATCHED ROM OUTPUT FOR SYNC.

D. POP FORCES AN INITIAL SYNC. SYNC IS ALWAYS PRE-CHARGED ON Ø1.

E. DOTTED LINES REPRESENT AN INDEFINITE DELAY.

BPC START-UP AND FIRST INSTRUCTION FETCH SEQUENCE

FIG 115C

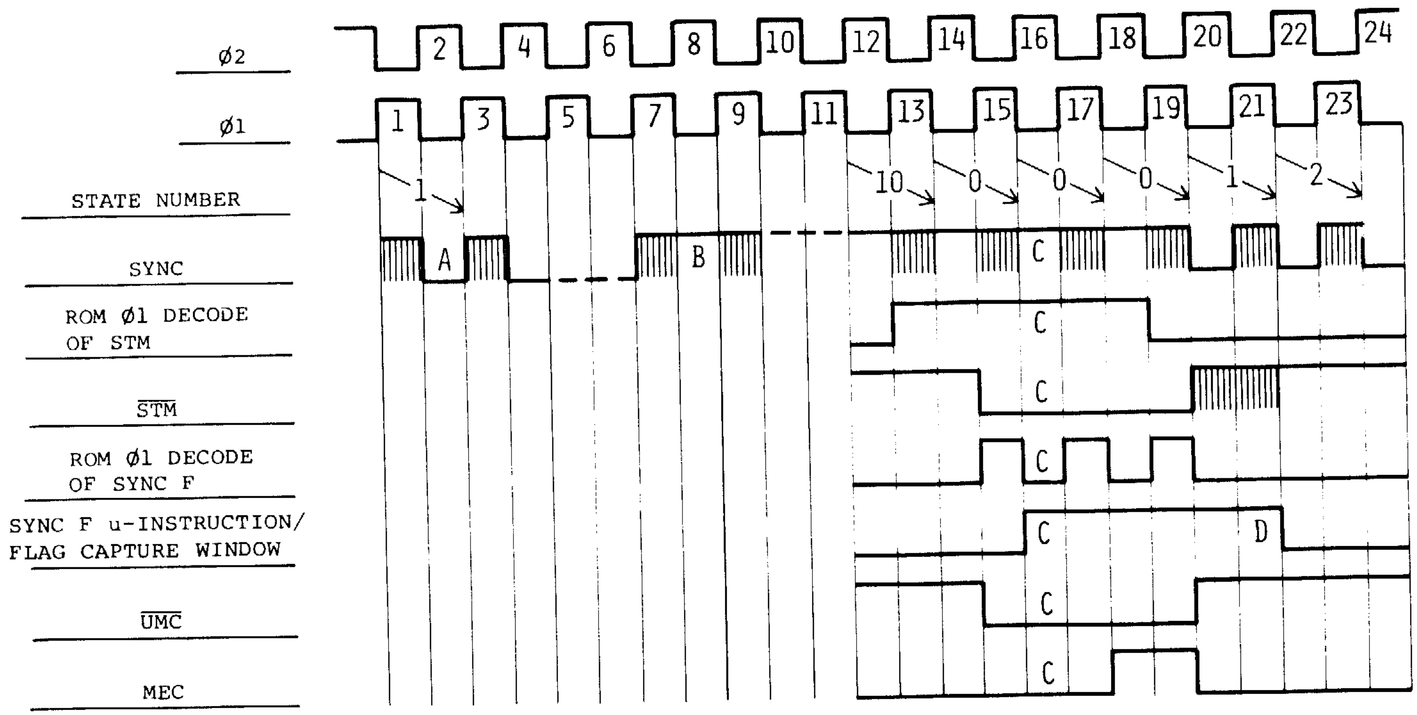

NOTES

A. SYNC IS FALSE AT THE END OF THE PREVIOUS INSTRUCTION FETCH.

B. DURING THE EXECUTION OF THE PREVIOUS INSTRUCTION, SYNC GOES TRUE ON OR BEFORE STATE 10.

C. CAN BE IN STATE 0 FOR 2, 3, OR 4 STATES. TYPICALLY IT IS 3. THE EXACT NUMBER DEPENDS UPON WHEN STM WAS GIVEN, AND WHETHER OR NOT THE FETCH IS FROM A BPC REGISTER.

D. AT VERY LEAST, FLAGS MUST BE TRUE DURING THIS Ø2.

CAPTURE OF FLAGS DURING BPC INSTRUCTION FETCH

FIG 116

INTERRUPT DURING A BPC INSTRUCTION FETCH

NOTES

A. $\overline{INT}$ MUST NOT BE PULLED BEFORE SYNC IS GIVEN.

B. IF THE PREVIOUS INSTRUCTION WAS A GROUP A INSTRUCTION, ONE LESS STATE-TIME IS SPENT IN STATE 0, AND THIS PULSE DOES NOT OCCUR. ALSO, THE STATE NUMBERS CHANGE AS INDICATED IN THE PARENTHESIS.

C. DEPENDS UPON $\overline{INT}$. IF NOTE B APPLIES, YINT TRANSITIONS AT START OF CLOCK #16.

D. FETCHED INSTRUCTION THAT IS ABORTED AND REPLACED INTERNALLY BY JSM $10_8$, I.

E. PRESENT VERSION OF THE BPC DOES NOT ALLOW AN INSTRUCTION FETCH FROM A BPC REGISTER TO BE INTERRUPTED.

INTERRUPT DURING A BPC INSTRUCTION FETCH

FIG 117B

EQUIVALENT STRUCTURE OF TWO BACK TO BACK MEMORY CYCLES

BUS REQUEST AND BUS GRANT DURING MEMORY CYCLES

BUS REQUEST AND BUS GRANT DURING MEMORY CYCLES

NOTES

A. THIS IS THE FIRST OF TWO SET IDA'S. THE SECOND ONE IS NOT DECODED DUE TO THE GRANTING OF THE BUS. NOTE THAT EXTERNAL USE OF THE BUS MUST WAIT UNTIL THE EFFECT OF THIS SET IDA IS OVER.

B. THIS IS A RE-DECODING OF THE SAME SET IDA MENTIONED IN NOTE A. IN THIS WAY THE SET IDA/SET IDA-STM SEQUENCE IS PRESERVED.

C. MEMORY DATA. IT SO HAPPENS WE SHOW DATA FOR A READ CYCLE, AS OPPOSED TO THAT FOR A WRITE CYCLE. IT DOESN'T MATTER.

D. EARLIEST POSSIBLE USE OF THE BUS.

E. ACTIVE PULL-UP ON $\overline{STM}$ DURING MECD.

F. DOTTED LINES REPRESENT AN INDEFINITE INTERRUPTION.

G. IF AN IOC IS IN THE SYSTEM, IT WILL PRE-CHARGE $\overline{BR}$ DURING $\phi 2$.

H. ACTIVE PULL-UP OF BG DURING $\phi 1$.

I. SSTP ENDS SOONER THAN STP. THIS ALLOWS A POSSIBLE SET IDA TO BE RE-DECODED 1 STATE PRIOR TO ALL OTHER RESUMED ROM ACTIVITY.

BUS REQUEST AND BUS GRANT DURING MEMORY CYCLES

FIG 119B

TABLE OF BPC ROM CONTENTS

| MICRO-INSTRUCTION | ROM LINE | GIVEN IN ANY OF THESE GROUPS | WHEN IN ANY OF THESE STATES | PROVIDED ALL OF THESE CONDITIONS ARE MET |
|---|---|---|---|---|
| INTE | 1 | ABCDEFGHIJKM | 0 | $\overline{MEC}$ |
| SET IDA | 2 | ABCDEFGHIJKM | 0 1 2 3 4 5 6 7 8 9 10 14 | RDR |
| | 3 | ABCDEFGHIJKM | 1 6 7 8 10 14 | $\overline{SSTP}$ |
| | 4 | ABCDEFG | 1 3 8 9 10 | MEC · $\overline{SSTP}$ |
| | 5 | ABCDEFG | 2 4 14 | $\overline{SSTP}$ |
| | 6 | ABCDEFGHIJKM | 9 10 | $\overline{SSTP}$ |
| | 7 | EFH | 2 9 | $\overline{SSTP}$ |
| | 8 | HM | 1 3 8 9 10 | $\overline{SSTP}$ |
| SET D | 9 | ABCDEFGHIJKM | 0 1 2 3 4 5 6 7 8 9 10 14 | RDR · DRQ |
| | 10 | ABCDEFGHIJKM | 0 1 2 3 4 5 6 7 8 9 10 14 | M-ADD 7 · WTR |
| | 11 | ABCDEFGHIJKM | 6 14 | $\overline{STP}$ |
| | 12 | ABCDEFGHIJKM | 1 8 | $\overline{STP}$ |
| | 13 | ABCDEFG | 1 3 8 | $\overline{BPRL}$ · $\overline{MEC}$ · $\overline{STP}$ |
| | 14 | ABD | 1 3 8 | $\overline{IND}$ · MEC · $\overline{STP}$ |
| | 15 | ABCGIJK | 7 8 | $\overline{STP}$ |
| | 16 | CGI | 4 | |
| | 17 | ABCDEFGHIJKM | 9 | MEC |
| | 18 | H | 2 9 | $\overline{STP}$ |
| | 19 | H | 2 9 | $\overline{STP}$ |
| DMP IDA | 20 | ABCDEFG | 3 | $\overline{BPRL}$ · $\overline{MEC}$ |
| | 21 | ABCDEFGHIJKM | 0 1 2 3 4 5 6 7 8 9 10 14 | WTR |
| | 22 | D | 2 | $\overline{STP}$ |
| | 23 | DEF | 2 | $\overline{IND}$ · $\overline{STP}$ |
| | 24 | H | 4 | $\overline{BPRL}$ · $\overline{MEC}$ |
| | 25 | ABCDEFGHIJKM | 0 | $\overline{BPRL}$ · $\overline{MEC}$ |
| DMP T | 27 | ABCDEFGHIJKM | 0 1 2 3 4 5 6 7 8 9 10 14 | M-ADD 6 · RDR |
| | 30 | D | 3 4 5 | $\overline{IND}$ · MEC |
| | 31 | EFH | 9 | MEC |
| STM | 28 | ABD | 2 | $\overline{STP}$ |
| | 29 | AK | 4 5 | $\overline{STP}$ |
| | 32 | ABCDEFGHIJKM | 10 | $\overline{STP}$ |
| | 33 | AC | 2 | $\overline{STP}$ |
| | 36 | ABCDEFG | 2 | IND · $\overline{STP}$ |

FIG 120A

TABLE OF BPC ROM CONTENTS

| MICRO-INSTRUCTION | ROM LINE | GIVEN IN ANY OF THESE GROUPS | WHEN IN ANY OF THESE STATES | PROVIDED ALL OF THESE CONDITIONS ARE MET |
|---|---|---|---|---|
| STM | 37 | DEF | 7 8 | $\overline{STP}$ |
| (CONT.) | 40 | HM | 3 9 | $\overline{STP}$ |
| SET T | 34 | ABCDEFGHIJKM | 0 1 2 3 4 5 6 7 8 9 10 14 | M-ADD 6·WTR |
| | 35 | ABCDEFGHIJKM | 0 | $\overline{MEC}$ |
| | 38 | DM | 2 | $\overline{STP}$ |
| | 39 | F | 2 | $\overline{IND}\cdot\overline{STP}$ |
| | 41 | F | 2 | $\overline{IND}\cdot\overline{STP}$ |
| ADM | 42 | ABCDEFGHIJKM | 0 1 2 3 4 5 6 7 8 9 10 14 | M-ADD 2·RDR |
| | 43 | ABCDEFGHIJKM | 0 | |
| | 45 | ABCDEFGHIJKM | 1 | |
| DVAL | 44 | ABCDEFGHIJKM | 9 | $\overline{MEC}$ |
| SET P | 46 | ABCDEFGHIJKM | 0 1 2 3 4 5 6 7 8 9 10 14 | M-ADD 16·WTR |
| | 47 | AB | 3 | $\overline{IND}$·MEC |
| | 48 | ABD | 7 | $\overline{STP}$ |
| | 49 | ABCDEFGHIJKM | 9 | MEC |
| | 50 | E | 2 4 14 | $\overline{IND}\cdot\overline{STP}$ |
| | 51 | HIJKM | 6 14 | $\overline{STP}$ |
| | 52 | H | 4 | $\overline{MEC}$ |
| | 53 | ABCDEFGHIJKM | 14 | |
| DMP P | 54 | ABCDEFGHIJKM | 0 1 2 3 4 5 6 7 8 9 10 14 | M-ADD 16·RDR |
| | 55 | CEFGHI | 8 | |
| | 56 | ABD | 9 | $\overline{SKP}$·MEC |
| | 57 | ABCG | 7 8 | $\overline{SKP}\cdot\overline{STP}$ |
| DMP R | 58 | ABCDEFGHIJKM | 0 1 2 3 4 5 6 7 8 9 10 14 | M-ADD 17·RDR |
| | 59 | ABCDEFGHIJKM | 0 | MEC |
| | 61 | H | 2 | $\overline{STP}$ |
| WRITE | 60 | C | 2 4 | $\overline{IND}\cdot\overline{STP}$ |
| | 64 | ABCDEFGHIJKM | 9 | $\overline{MEC}$ |
| | 65 | DEF | 7 8 | $\overline{STP}$ |
| SET R | 62 | ABCDEFGHIJKM | 0 1 2 3 4 5 6 7 8 9 10 14 | M-ADD 17·WTR |
| | 63 | ABCDEFG | 6 14 | $\overline{STP}$ |
| | 66 | H | 9 10 | $\overline{STP}$ |

FIG 120B

TABLE OF BPC ROM CONTENTS

| MICRO-INSTRUCTION | ROM LINE | GIVEN IN ANY OF THESE GROUPS | WHEN IN ANY OF THESE STATES | PROVIDED ALL OF THESE CONDITIONS ARE MET |
|---|---|---|---|---|
| SET S | 67 | ABCDEFGHIJKM | 0 1 2 3 4 5 6 7 8 9 10 14 | M-ADD 12·WTR |
| | 68 | ABCDEFGHIJKM | 0 | MEC |
| | 69 | ABD | 3 | $\overline{IND}$·$\overline{MEC}$·$\overline{STP}$ |
| | 70 | IJK | 2 | $\overline{STP}$ |
| SSE | 71 | J | 3 9 | $\overline{STP}$ |
| SYNC | 72 | AB | 3 9 | $\overline{IND}$·MEC |
| | 73 | ABCDEFGHIJKM | 9 | MEC |
| | 76 | EG | 2 4 | $\overline{IND}$ |
| | 77 | H | 4 | MEC |
| | 80 | IJK | 2 | |
| | 81 | JKM | 2 | |
| DMP EX/OV | 75 | ABCDEFGHIJKM | 0 1 2 3 4 5 6 7 8 9 10 14 | (M-ADD 4 + M-ADD 5)·RDR |
| SET OV | 78 | ABCDEFGHIJKM | 0 1 2 3 4 5 6 7 8 9 10 14 | M-ADD 5·WTR |
| | 79 | I | 9 10 | OQ·$\overline{STP}$ |
| SET EX | 82 | ABCDEFGHIJKM | 0 1 2 3 4 5 6 7 8 9 10 14 | M-ADD 4·WTR |
| | 83 | I | 9 10 | EQ·$\overline{STP}$ |
| DMP PAD | 84 | ABCDEFGHIJKM | 0 1 2 3 4 5 6 7 8 9 10 14 | (M-ADD 0 + M-ADD 1 + M-ADD 2 + M-ADD 3)·RDR |
| | 85 | AB | 3 9 | $\overline{IND}$·MEC |
| | 86 | ACK | 9 | MEC |
| | 87 | DM | 7 | $\overline{STP}$ |
| | 88 | HIJKM | 1 6 | $\overline{STP}$ |
| | 89 | ABCDEFGHIJKM | 1 | $\overline{STP}$ |
| | 90 | BG | 7 8 | SKP·$\overline{STP}$ |
| | 91 | ABD | 9 | SKP·MEC |
| RTP | 92 | ABCDEFGHIJKM | 0 | |
| NSO | 93 | ABCDEFGHIJKM | 0 | $\overline{MEC}$ |
| | 96 | AC | 5 6 | |
| | 97 | ABCDEFGHIJKM | 10 | |
| ADS | 94 | HI | 4 5 6 14 | SKP |
| | 95 | H | 4 5 6 14 | |

FIG 120C

TABLE OF BPC ROM CONTENTS

| MICRO-INSTRUCTION | ROM LINE | GIVEN IN ANY OF THESE GROUPS | WHEN IN ANY OF THESE STATES | PROVIDED ALL OF THESE CONDITIONS ARE MET |
|---|---|---|---|---|
| UPDOE | 98 | K | 10 | |
| | 99 | A | 5 6 | |
| NS9 | 100 | C | 4 | |
| | 101 | ABCDEFGHIJKM | 9 | $\overline{MEC}$ |
| DMP ALU | 102 | ABCDEFGHIJKM | 0 1 2 3 4 5 6 7 8 9 10 14 | M-ADD 11·RDR |
| | 103 | ABCDEFG | 5 6 | $\overline{STP}$ |
| | 106 | ABDJKM | 8 | |
| | 107 | HIJKM | 10 | $\overline{STP}$ |
| NS7 | 104 | BG | 5 6 | |
| | 105 | D | 3 4 5 | $\overline{IND}$·MEC |
| NS4 | 108 | CF | 2 | $\overline{IND}$ |
| | 109 | HM | 4 | $\overline{MEC}$ |
| SET B | 111 | ABCDEFGHIJKM | 0 1 2 3 4 5 6 7 8 9 10 14 | M-ADD 15·WTR |
| | 114 | ACK | 5 | BQ |
| | 115 | IJK | 9 10 | BQ·$\overline{STP}$ |
| NS6 | 112 | JK | 3 | CTQ |
| | 113 | M | 2 | SYNCQ |
| | 116 | K | 3 | |
| | 117 | M | 2 | GNI |
| DMP B | 118 | ABCDEFGHIJKM | 0 1 2 3 4 5 6 7 8 9 10 14 | M-ADD 15·RDR |
| | 119 | J | 2 4 | BQ·$\overline{STP}$ |
| | 122 | C | 4 | BQ·$\overline{STP}$ |
| NS10 | 120 | ABCG | 7 8 | |
| | 121 | HIJM | 6 14 | $\overline{GNI}$ |
| | 124 | IJK | 6 14 | |
| | 125 | ABCDEFGHIJKM | 14 | |
| | 128 | EG | 2 4 9 | $\overline{IND}$ |
| DMP A | 123 | ABCDEFGHIJKM | 0 1 2 3 4 5 6 7 8 9 10 14 | M-ADD 14·RDR |
| | 126 | J | 2 4 | AQ·$\overline{STP}$ |
| | 127 | C | 4 | AQ·$\overline{STP}$ |

FIG 120D

TABLE OF BPC ROM CONTENTS

| MICRO-INSTRUCTION | ROM LINE | GIVEN IN ANY OF THESE GROUPS | WHEN IN ANY OF THESE STATES | PROVIDED ALL OF THESE CONDITIONS ARE MET |
|---|---|---|---|---|
| NS2 | 129 | ABD | 3 | IND·MEC |
| | 132 | CEFG | 3 | MEC |
| | 133 | I | 2 | $\overline{\text{SYNCQ}}$ |
| | 136 | M | 2 | $\overline{\text{SYNCQ}}\cdot\overline{\text{GNI}}$ |
| | 137 | DM | 4 | MEC |
| SET A | 130 | ABCDEFHGIJKM | 0 1 2 3 4 5 6 7 8 9 10 14 | M-ADD 14·WTR |
| | 131 | ACK | 5 | AQ |
| | 134 | IJK | 9 10 | AQ·$\overline{\text{STP}}$ |
| DMP ST | 135 | ABCDEFGHIJKM | 0 1 2 3 4 5 6 7 8 9 10 14 | M-ADD 13·RDR |
| | 138 | ABCDEFGHIJKM | 14 | $\overline{\text{STP}}$ |
| SET I | 139 | ABCDEFGHIJKM | 0 1 2 3 4 5 6 7 8 9 10 14 | M-ADD 13·WTR |
| | 142 | ABCDEFGHIJKM | 0 | $\overline{\text{MEC}}$ |
| NS3 | 140 | ABCDEFG | 3 | $\overline{\text{MEC}}$ |
| | 141 | DM | 5 6 | GNI |
| | 144 | J | 3 4 5 | $\overline{\text{CTQ}}$ |
| SYNC F | 143 | ABCDEFGHIJKM | 0 | |

FIG 120E

NOTES

1. THIS I/O BUS CYCLE WAS INITIATED BY ANY WRITE-INTO-MEMORY INSTRUCTION WHICH REFERENCED ONE OF R4 THRU R7.
2. CONTROL INFORMATION IS VALID ON BOTH EDGES OF IOSB.
3. DATA IS LATCHED INTO THE INTERFACE ON THE TRAILING EDGE OF IOSB.

WRITE I/O BUS CYCLE

NOTES

1. THIS I/O BUS CYCLE WAS INITIATED BY ANY READ-FROM-MEMORY INSTRUCTION WHICH REFERENCED ONE OF R4 THRU R7.
2. CONTROL INFORMATION IS VALID ON BOTH EDGES OF IOSB.
3. DATA FROM THE INTERFACE IS LATCHED INTO THE BPC DURING T4.

READ I/O BUS CYCLE

JSM THROUGH THE INTERRUPT TABLE

THE IOC IS NOT REQUESTING THE IDA BUS. IT PASSES BUS GRANT ALONG AS EXBG. THE TESTER IS REQUESTING THE BUS; IT USES EXBG AS BUS GRANT, AND DOES <u>NOT</u> PASS EXBG ALONG.

EXTENDED BUS GRANT

IOC INSTRUCTION BIT PATTERNS

GROUP: STACK

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| PWC | 0 | 1 | 1 | 1 | 0 | 0 | 0 | 1 | I/D | 1 | 1 | 0 | 0 | | | |
| PBC | 0 | 1 | 1 | 1 | 1 | 0 | 0 | 1 | I/D | 1 | 1 | 0 | 0 | | | |
| PWD | 0 | 1 | 1 | 1 | 0 | 0 | 0 | 1 | I/D | 1 | 1 | 0 | 1 | | | |
| PBD | 0 | 1 | 1 | 1 | 1 | 0 | 0 | 1 | I/D | 1 | 1 | 0 | 1 | | | |
| WWC | 0 | 1 | 1 | 1 | 0 | 0 | 0 | 1 | I/D | 1 | 1 | 1 | 0 | | | |
| WBC | 0 | 1 | 1 | 1 | 1 | 0 | 0 | 1 | I/D | 1 | 1 | 1 | 0 | | | |
| WWD | 0 | 1 | 1 | 1 | 0 | 0 | 0 | 1 | I/D | 1 | 1 | 1 | 1 | | | |
| WBD | 0 | 1 | 1 | 1 | 1 | 0 | 0 | 1 | I/D | 1 | 1 | 1 | 1 | | | |

* 3 BIT REGISTER ADDRESS FIELD $(0\text{-}7_8)$.
* PLACE INST'S INC/DEC THE STACK POINTER BEFORE THE OPERATION.
* WITHDRAW INST'S INC/DEC THE STACK POINTER AFTERWARDS.

1. I/D (INCREMENT/DECREMENT) IS ENCODED AS 0/1
2. FOR BYTE INSTRUCTIONS, A 1 IN BIT 15 OF THE POINTER REGISTER IMPLIES A LEFT-HALF

FIG 125A

IOC INSTRUCTION BIT PATTERNS (CONTINUED)

GROUP: INTERRUPT

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| EIR | 0 | 1 | 1 | 1 | 0 | 0 | 0 | 1 | 0 | 0 | 0 | 1 | 0 | 0 | 0 | 0 |
| DIR | 0 | 1 | 1 | 1 | 0 | 0 | 0 | 1 | 0 | 0 | 0 | 1 | 1 | 0 | 0 | 0 |

FIG 125B

GROUP: DMA

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| DMA | 0 | 1 | 1 | 1 | 0 | 0 | 0 | 1 | 0 | 0 | 1 | 0 | 0 | 0 | 0 | 0 |
| PCM | 0 | 1 | 1 | 1 | 0 | 0 | 0 | 1 | 0 | 0 | 1 | 0 | 1 | 0 | 0 | 0 |
| DDR | 0 | 1 | 1 | 1 | 0 | 0 | 0 | 1 | 0 | 0 | 1 | 1 | 1 | 0 | 0 | 0 |

FIG 125C

NOTES:

1.  DENOTES A MICRO-INSTRUCTION DECODED IN THE ROM.

2.  AND  DENOTE ONE- AND TWO-WAY INTERCONNECTIONS TO A BUS; ALWAYS CONTROLLED BY A ROM MICRO-INSTRUCTION.

3. 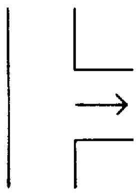 DENOTES A DIRECT CONNECTION BETWEEN TWO ITEMS.

4. 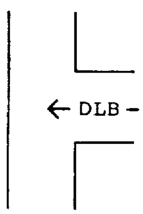

DENOTES A CONNECTION BETWEEN TWO ITEMS THAT IS ACTIVE ONLY WHEN THE STATED SIGNAL IS GIVEN. SOME SUCH SIGNALS ARE ROM DECODED MICRO-INSTRUCTIONS, WHILE OTHERS ARE PRESENT THROUGHOUT AN ENTIRE EXECUTION CYCLE.

5. 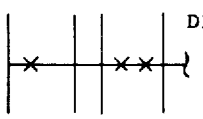 DENOTES THAT THE STATED LINE REPRESENTS A DECODED CONDITION.

6. 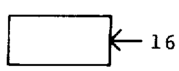

REPRESENTS A NON-MICRO-INSTRUCTION CONTROL LINE OR SOME OTHER SIGNAL.

7.  REPRESENTS AN INPUT TERMINAL TO THE IOC.

8.  REPRESENTS AN OUTPUT TERMINAL FROM THE IOC.

9. 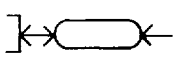 REPRESENTS A TERMINAL THAT IS BOTH AN INPUT AND AN OUTPUT.

10. NUMBERS IN PARENTHESES INDICATE THE NUMBER OF BITS A MECHANISM HANDLES.

11. THE LOGICAL SENSE (XXX VERSUS $\overline{XXX}$) OF THE I/O TERMINALS IS CORRECTLY INDICATED. HOWEVER, THE DRAWING IS NOT A RELIABLE INDICATOR OF THE EXACT SENSE OF THE INTERNAL SIGNALS. TYPICALLY BOTH SENSES EXIST, AND FREQUENTLY THE PHYSICAL PROXIMITY OF SIGNALS TO THEIR DESTINATIONS WAS MORE IMPORTANT IN DECIDING WHICH SENSE TO USE, RATHER THAN AGREEMENT OF LOGICAL SENSE.
BECAUSE STRICT ACCURACY IN REPORTING SIGNAL SENSES ON SUCH A GENERAL LEVEL DRAWING WOULD SHARPLY INCREASE THE NUMBER OF INTERCONNECTIONS, WITH ONLY A SLIGHT INCREASE IN USEFULNESS, WE USUALLY SHOW ONLY THE NAME OF THE SIGNAL.

FIG 126C

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| M | $E_S$ | TWO'S COMPLEMENT EXPONENT | | | | | | | | | EMPTY | | | | | $M_S$ |
| M + 1 | $D_1$ | | | | $D_2$ | | | | $D_3$ | | | | $D_4$ | | | |
| M + 2 | $D_5$ | | | | $D_6$ | | | | $D_7$ | | | | $D_8$ | | | |
| M + 3 | $D_9$ | | | | $D_{10}$ | | | | $D_{11}$ | | | | $D_{12}$ | | | |

| THE BCD DIGITS | | | |
|---|---|---|---|
| 0 | 0000 | 5 | 0101 |
| 1 | 0001 | 6 | 0110 |
| 2 | 0010 | 7 | 0111 |
| 3 | 0011 | 8 | 1000 |
| 4 | 0100 | 9 | 1001 |

THE INTERNAL FLOATING POINT REPRESENTATION OF

.003587219 ( $= 3.587219 \times 10^{-3}$ )

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| M | 1 | 1 | 1 | 1 | 1 | 1 | 1 | 1 | 0 | 1 | 0 | 0 | 0 | 0 | 0 | 0 |
| M + 1 | 0011 | | | | 0101 | | | | 1000 | | | | 0111 | | | |
| M + 2 | 0010 | | | | 0001 | | | | 1001 | | | | 0000 | | | |
| M + 3 | 0000 | | | | 0000 | | | | 0000 | | | | 0000 | | | |

BCD FLOATING POINT FORMAT

FIG 127

EMC INSTRUCTION BIT PATTERNS

GROUP: ARITHMETIC

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| FXA | 0 | 1 | 1 | 1 | 0 | 0 | 1 | 0 | 1 | 0 | 0 | 0 | 0 | 0 | 0 | 0 |
| MWA | 0 | 1 | 1 | 1 | 0 | 0 | 1 | 0 | 0 | 0 | 0 | 0 | 0 | 0 | 0 | 0 |
| CMX | 0 | 1 | 1 | 1 | 0 | 0 | 1 | 0 | 0 | 1 | 1 | 0 | 0 | 0 | 0 | 0 |
| CMY | 0 | 1 | 1 | 1 | 0 | 0 | 1 | 0 | 0 | 0 | 1 | 0 | 0 | 0 | 0 | 0 |
| FMP | 0 | 1 | 1 | 1 | 1 | 0 | 1 | 0 | 0 | 0 | 0 | 0 | 0 | 0 | 0 | 0 |
| FDV | 0 | 1 | 1 | 1 | 1 | 0 | 1 | 0 | 0 | 0 | 1 | 0 | 0 | 0 | 0 | 1 |
| MPY | 0 | 1 | 1 | 1 | 1 | 0 | 1 | 1 | 1 | 0 | 0 | 0 | 1 | 1 | 1 | 1 |
| CDC | 0 | 1 | 1 | 1 | 0 | 0 | 1 | 1 | 1 | 1 | 0 | 0 | 0 | 0 | 0 | 0 |

FIG 128A

EMC INSTRUCTION BIT PATTERNS (CONTINUED)

GROUP: FOUR WORD OPERATION

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| CLR | 0 | 1 | 1 | 1 | 0 | 0 | 1 | 1 | 1 | 0 | 0 | 0 | | | | |
| XFR | 0 | 1 | 1 | 1 | 0 | 0 | 1 | 1 | 0 | 0 | 0 | 0 | | | | |

* 4 BIT FIELD
OF WORDS
* BINARY = N-1

FIG 128B

GROUP: MANTISSA SHIFT

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| MRX | 0 | 1 | 1 | 1 | 1 | 0 | 1 | 1 | 0 | 0 | 0 | 0 | 0 | 0 | 0 | 0 |
| DRS | 0 | 1 | 1 | 1 | 1 | 0 | 1 | 1 | 0 | 0 | 1 | 0 | 0 | 0 | 0 | 1 |
| MLY | 0 | 1 | 1 | 1 | 1 | 0 | 1 | 1 | 0 | 1 | 1 | 0 | 0 | 0 | 0 | 1 |
| MRY | 0 | 1 | 1 | 1 | 1 | 0 | 1 | 1 | 0 | 1 | 0 | 0 | 0 | 0 | 0 | 0 |
| NRM | 0 | 1 | 1 | 1 | 0 | 0 | 1 | 1 | 0 | 1 | 0 | 0 | 0 | 0 | 0 | 0 |

FIG 128C

NOTES:

1.  DENOTES A MICRO-INSTRUCTION DECODED IN THE ROM.

2.  AND 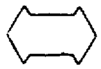 DENOTE ONE- AND TWO-WAY INTERCONNECTIONS TO A BUS; ALWAYS CONTROLLED BY A ROM MICRO-INSTRUCTION.

3. 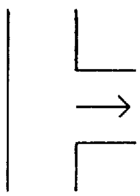 DENOTES A DIRECT CONNECTION BETWEEN TWO ITEMS.

4. 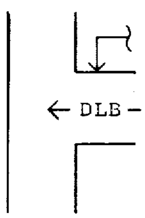

DENOTES A CONNECTION BETWEEN TWO ITEMS THAT IS ACTIVE ONLY WHEN THE STATED SIGNAL IS GIVEN. SOME SUCH SIGNALS ARE ROM DECODED MICRO-INSTRUCTIONS, WHILE OTHERS ARE PRESENT THROUGHOUT AN ENTIRE EXECUTION CYCLE.

5. 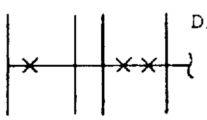 DENOTES THAT THE STATED LINE REPRESENTS A DECODED CONDITION.

6. 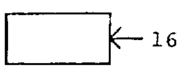

REPRESENTS A NON-MICRO-INSTRUCTION CONTROL LINE OR SOME OTHER SIGNAL.

7. 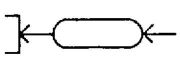 REPRESENTS AN INPUT TERMINAL TO THE EMC.

8. 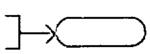 REPRESENTS AN OUTPUT TERMINAL FROM THE EMC.

9.  REPRESENTS A TERMINAL THAT IS BOTH AN INPUT AND AN OUTPUT.

10. NUMBERS IN PARENTHESES INDICATE THE NUMBER OF BITS A MECHANISM HANDLES.

11. THE LOGICAL SENSE (XXX VERSUS $\overline{XXX}$) OF THE I/O TERMINALS IS CORRECTLY INDICATED. HOWEVER, THE DRAWING IS NOT A RELIABLE INDICATOR OF THE EXACT SENSE OF THE INTERNAL SIGNALS. TYPICALLY BOTH SENSES EXIST, AND FREQUENTLY THE PHYSICAL PROXIMITY OF SIGNALS TO THEIR DESTINATIONS WAS MORE IMPORTANT IN DECIDING WHICH SENSE TO USE, RATHER THAN AGREEMENT OF LOGICAL SENSE.

BECAUSE STRICT ACCURACY IN REPORTING SIGNAL SENSES ON SUCH A GENERAL LEVEL DRAWING WOULD SHARPLY INCREASE THE NUMBER OF INTERCONNECTIONS, WITH ONLY A SLIGHT INCREASE IN USEFULNESS, WE USUALLY SHOW ONLY THE NAME OF THE SIGNAL.

FIG 129C

READ/WRITE MEMORY CONTROL TIMING

① UMC IS GIVEN BY MEMORY TIMING AND CONTROL CIRCUIT.
② CS AND RW ARE NECESSARY DURING A REFRESH FOR A MOTOROLA OR AMI PART. TI'S PART DOESN'T CARE.

KDP CONTROL I/O INTERFACE

BASIC TIMING

KDP CLOCK IS 1.5 MHZ (DERIVED FROM 6MHZ SYSTEM CLOCK)

MAIN TIMING SIGNALS (COMPLEMENTS ALSO USED)

KDP CONTROL MEMORY SECTION

* A1-A8 DISPLAY CHARACTER & COLUMN ADDRESS

B1-B8 PRINTER CHARACTER & ROW ADDRESS

KDP CONTROL-PRINTER CONTROL SECTION

PRINTER BLOCK DIAGRAM

LIVE KEYBOARD KEY PROCESSING

LIVE KEYBOARD

CASSETTE OPERATING SYSTEM LEVEL
PARTITION SUPPORT CODE

CODE TO CALCULATE PARTITION LENGTHS
AS TAPE IS MOVING-WRITING INNER-PARTITION GAP

THE FOLLOWING CHARTS OUTLINE THE STEPS TAKEN IN LOADING A FILE. (READING THE RECORD'S PARTITIONS)

THE LINE BRIDGES ARE USED TO LINK ONE LINE TO ANOTHER IN THE FORM OF A DOUBLY-LINKED LIST. THE ABSOLUTE MACHINE ADDRESS OF EACH LINE IS OBTAINED FROM THE ABSOLUTE ADDRESS OF THE PREVIOUS LINE (FORWARD OR BACKWARD) ADDED TO (OR SUBTRACTED FROM) THAT PREVIOUS LINE'S FORWARD (OR BACKWARD) LINK. THE LEFT BYTE IS THE BACKWARD LINK WHILE THE RIGHT BYTE IS THE FORWARD LINK.

ENTER EXECUTION PROLOGUE:

EOL EXECUTION

CSTAT SETTING

| | |
|---|---|
| 0 IDLE | 1 EXECUTE |
| 2 RUN | 3 LIVE-KEYBOARD RUN |
| 4 ENT WAIT | 5 ENT RUN |
| 6 GSB IN LIVE KEYBOARD | |

PROGRAMMABLE CALCULATOR

BACKGROUND OF THE INVENTION

This invention relates generally to calculators and improvements therein and more particularly to programmable calculators that may be controlled both manually from the keyboard input unit and automatically by means of a stored program that has previously been loaded into the calculator memory from the keyboard input unit or an external magnetic record member.

Computational problems may be solved manually, with the aid of a calculator (a dedicated computational keyboard-given machine that may be either programmable or nonprogrammable) or a general purpose computer. Manual solution of computational problems is often very slow, so slow in many cases so as to be an impractical, expensive, and ineffective use of the human resource, particularly when there are other alternatives for solution of the computational problems.

Nonprogrammable calculators may be employed to solve many relatively simple computational problems more efficiently than they could be solved by manual methods. However, the keyboard operations or language employed by these calculators is typically trivial in structure, thereby requiring many keyboard operations to solve more general arithmetic problems. Programmable calculators may be employed to solve many additional computational problems at rates hundreds of times faster than manual methods. However, the keyboard language employed by these calculators is also typically relatively simple in structure, thereby again requiring many keyboard operations to solve more general arithmetic problems.

Conventional programmable calculators have also been restricted to operation in accordance with a single fixed program language. It would be advantageous to provide a programmable calculator in which the user may select at will any one of a number of different calculator or computer languages.

SUMMARY OF THE INVENTION

The principal object of this invention is to provide an improved programmable calculator that has more capability and flexibility than conventional programmable calculators, that is smaller, less expensive, and more efficient in evaluating mathematical functions than are conventional computer systems, and that is much easier for the unskilled user to operate than either conventional programmable calculators or computer systems.

Another object of this invention is to provide a programmable calculator in which the user may employ a reset key at any time during operation of the calculator to initialize the calculator without thereby erasing any information stored in the calculator memory.

Another object of this invention is to provide a programmable calculator in which a visual cursor can be selectively entered into a displayed line of alphanumeric characters from either the left-hand end of that line or the right-hand end of that line.

Another object of this invention is to provide a programmable calculator in which the user may execute statements manually from the keyboard at the same time the calculator is executing a program stored in the calculator memory.

Another object of this invention is to provide a programmable calculator in which the user may obtain, under program control, a printed listing of selected information stored in the calculator memory.

Another object of this invention is to provide a programmable calculator in which the user may, at any point during execution of a program stored in the calculator read-write memory, transfer the entire contents of the read-write memory, including all data and relevant housekeeping information existing at the time of transfer, to an external magnetic tape, and may thereafter load that transferred information back into the calculator read-write memory for automatic resumption of execution of the program at the point therein at which the transfer occurred.

Another object of this invention is to provide a programmable calculator in which the user may insert additional characters at a designated position in a line of alphanumeric information by moving an insert cursor to that position and by then simply actuating keys representing the desired characters to be inserted.

Another object of this invention is to provide a programmable calculator in which the user may coarsely and finely position, within a display, a line of alphanumeric information whose length exceeds that of the display by selectively actuating a group of display position control keys.

Another object of this invention is to provide a programmable calculator in which an attempt to store a line of alphanumeric statements containing a syntax error results in a visual error message being indicated to the user and in which subsequent actuation of a recall key results in that erroneous line being visually displayed with a cursor indicating the location of the syntax error.

Another object of this invention is to provide a programmable calculator in which the user may select either one of two visual cursors to designate separate editing functions to be performed in connection with a displayed line of alphanumeric information.

Another object of this invention is to provide a programmable calculator in which interrupt service routines employed in connection with peripheral input/output units may be written by the user in keyboard language.

Another object of this invention is to provide a programmable calculator in which the user can declare an interrupt priority among a plurality of peripheral input/output units to eliminate user attention to interrupt requests.

Another object of this invention is to provide a programmable calculator that automatically adjusts addresses designated in relative branch statements of a program stored in the calculator memory in accordance with any program editing performed by the user.

Another object of this invention is to provide a programmable calculator in which the user may specify an array through use of a dimension statement that includes one or more variables to represent the size of the array.

Another object of this invention is to provide a programmable calculator in which the user may specify, as part of an enter statement, an array that may include an expression to specify a subscript thereof and in which the expression is automatically evaluated by the calculator and the result thereof displayed for the user.

Another object of this invention is to provide a programmable calculator in which a specified array may include an expression to designate a subscript thereof and in which a trace mode of operation is provided to automatically evaluate the expression and display the result thereof to the user.

Another object of this invention is to provide a programmable calculator in which the user may completely change the language of the calculator by replacing a plug-in language read-only memory.

Another object of this invention is to provide a programmable calculator in which the user may call a rounding function for rounding a number to a specified number of digits.

Another object of this invention is to provide a programmable calculator in which the user may call a tangent function and specify as an argument of that function any angle up to $10^{99°}$.

Another object of this invention is to provide a programmable calculator in which the user may direct execution of a program to begin or continue at a labelled program statement.

Another object of this invention is to provide a programmable calculator in which the user may select an exclusive or logic operator for use in constructing alphanumeric statements.

Another object of this invention is to provide a programmable calculator in which the user may recall into the display either the last or the penultimate line of one or more alphanumeric statements executed by the calculator or stored in the calculator memory by actuating a recall key either once or twice, respectively.

Another object of this invention is to provide a programmable calculator in which the user may, during program execution, direct execution of the program to any one of a plurality of program lines by simply actuating an appropriate one of the keys of a keyboard input unit.

Another object of this invention is to provide a programmable calculator in which the user may communicate via the calculator keyboard with a plurality of peripheral input/output units connected to the calculator by means of a universal interface but without regard for conventions of that universal interface bus.

Other and incidental objects of this invention will become apparent to those persons skilled in the art upon detailed examination of the following portions of this specification.

These objects are accomplished in accordance with the illustrated preferred embodiment of this invention by employing a keyboard input unit, a magnetic tape cassette reading and recording unit, a 32-character light-emitting diode (LED) display, a 16-character thermal printer unit, a memory unit, and a central processing unit (CPU) to provide an adaptable programmable calculator having manual operating, automatic operating, program entering, magnetic tape reading, and magnetic tape recording modes.

The keyboard input unit includes a group of numeric data keys for entering data into the calculator, a group of algebraic operator keys for use in entering algebraic statements into the calculator, a second set of numeric keys, a complete set of alphabetic keys and a group of special character keys all arranged in a configuration slightly modified from that of a typewriter keyboard, a group of program editing and display control keys useful in editing displayed lines of alphanumeric information, a group of system command keys for listing programs of alphanumeric statements stored in the calculator memory, for controlling the operation of the magnetic tape cassette reading and recording unit, for controlling the calculator memory, and for otherwise controlling operation of the calculator, and a group of user-definable keys. Many of these groups of keys are useful in both the manual and automatic operating modes of the calculator.

The magnetic tape cassette reading and recording unit includes a reading and recording head, a drive mechanism for driving a magnetic tape past the reading and recording head, and reading and recording drive circuits coupled to the reading and recording head for bidirectionally transferring information between the magnetic tape and the calculator as determined by alphanumeric statements executed from the keyboard or as part of a program stored in the calculator memory.

The memory unit includes a modular random-access read-write memory having a dedicated system area and a separate user area for storing alphanumeric program statements and/or data. The user portion of the read-write memory may be expanded without increasing the overall dimensions of the calculator by the addition of a plug-in read-write memory module. Additionl read-write memory made available to the user is automatically accommodated by the calculator, and the user is automatically informed of the number of available program storage locations and when the storage capacity of the read-write memory has been exceeded.

The memory unit also includes a modular read-only memory in which routines and subroutines of assembly language instructions for performing the various functions of the calculator are stored. The read-only memory comprises a plug-in mainframe language read-only memory for defining the language of the calculator and a group of optional plug-in function read-only memories that may be selectively added by the user to increase the functional capability of the calculator within the framework of the language defined by the mainframe language ROM. Receptacles are provided in the front base of the calculator housing to accommodate up to four plug-in function read-only memories. A receptacle is likewise provided on the right side panel of the calculator housing to accommodate the single mainframe language ROM. By plugging an appropriate different mainframe language ROM into the receptacle provided therefore, the operating language of the calculator can be changed from the standard algebraic language described hereinafter to either BASIC, FORTRAN, ALGOL or APL computer languagte, for example. Different mainframe language plug-in read-only memories, as well as any plug-in function read-only memories added by the user, are automatically accommodated by the calculator.

Exemplary of the plug-in function read-only memories that the user may add to increase the functional capabilities of the calculator are a plotter ROM, a string variables ROM, a general input/output ROM, a matrix ROM, an advanced programming ROM, an extended input/output ROM, and a disc memory ROM.

The LED display unit is hardware-refreshed and features 32-character 5 × 7 dot matrix alphanumeric capability. Hardware refreshing of the display allows the user to use the display in connection with keyboard calculations at the same time the microprocessor is executing a program stored in the calculator memory.

The central processing unit (CPU) may comprise, for example, an LSI MOS hybrid microprocessor that includes a binary processor chip, an input/output (I/O) chip, and an extended math chip together with necessary buffering circuitry. This processor utilizes 16-bit parallel bus architecture which, at various points in time, handles address, instruction or data information. Also included are two 16-bit general purpose accumulators, memory stack instruction capability, two-level vectored interrupt capability, a single direct memory access channel, and math instructions for handling binary-coded-decimal floating point numbers.

In the run mode of operation, the calculator is controlled by an internal stored format generated by the calculator in response to actuation by the user of selected keys of the keyboard input unit. Each internal stored format is employed as a pointer to the address of the routine stored in the calculator read-only memory that is required for execution of the selected keyboard instruction.

In the program mode of operation, the internal stored format generated by the calculator during entry of a program is stored in the program storage area of the user read-write memory. This internal stored format, compiled from lines of alphanumeric statements entered into the calculator by the user, constitutes a program that may be automatically executed by the calculator upon request by the user. During program entry, the output printer may be commanded, by means of a keyboard switch, to provide a printed listing of the keyboard statements entered by the user together with the corresponding program line at which the associated internal stored format is stored. Since several key actuations may result in generation by the calculator of a single compiled instruction code and since the calculator executes only these internal instruction codes, a complex program can be stored and executed by the calculator very efficiently and in a short period of time.

DESCRIPTION OF THE DRAWINGS

FIG. 22 is a diagram illustrating current page absolute addressing employed by the BPC of FIG. 19.

FIGS. 24A-G are a tabular illustration of the instruction set and corresponding bit patterns associated with the BPC of FIG. 19.

FIGS. 25A-C are a detailed block diagram of the BPC of FIG. 19.

FIGS. 34A-D are a table of the 29 instruction categories decoded by the instruction category identifier of FIG. 33.

FIGS. 35A-E are a tabular illustration of the relationship between the 29 instruction categories of FIGS. 34A-D and the instruction bit patterns of FIGS. 24A-G.

FIG. 36 is a tabular illustration of the details of generation of the instruction group qualifiers appearing at the output of the instruction group decoder of FIG. 33 from the outputs of the instruction category identifier of FIG. 33.

FIG. 43 is a diagram illustrating the logical properties of the non-sequential state-count generator of FIG. 38.

FIG. 55 is a diagram illustrating the rules for generating sum and carry bits during addition operations performed by the ALU of FIG. 52.

FIG. 60 is a detailed block diagram of the extend and overflow registers of FIGS. 25A–B connected in an ERA mode.

FIGS. 91A–E are illustrations of the conventions used in the BPC ASM chart of FIGS. 92–103.

FIG. 100 is a flow chart segment of the alter-skip group of machine instructions executed by the BPC of FIG. 19.

FIG. 105 is a tabular illustration of the addressing capability embodied in the flow chart of FIG. 104.

FIG. 106 is an illustration of the conventions used in the waveform diagrams of FIGS. 107A–119B.

FIGS. 107A–C are a waveform diagram illustrating a read memory cycle in which the source address is a BPC register.

FIGS. 108A–B are a waveform diagram illustrating two consecutive read memory cycles originating with the BPC in which the source addresses are in the external memory.

FIGS. 110A–D are a waveform diagram illustrating a write memory cycle in which the destination address is a BPC register FIGS. 111A–C are a waveform diagram illustrating two consecutive write memory cycles originating with the BPC in which the destination addresses are in the external memory.

FIGS. 115A–C are a waveform diagram illustrating the initial start up and first instruction fetch of the BPC.

FIG. 116 is a waveform diagram illustrating the capture of external flags during a BPC instruction fetch.

Figure 117A:
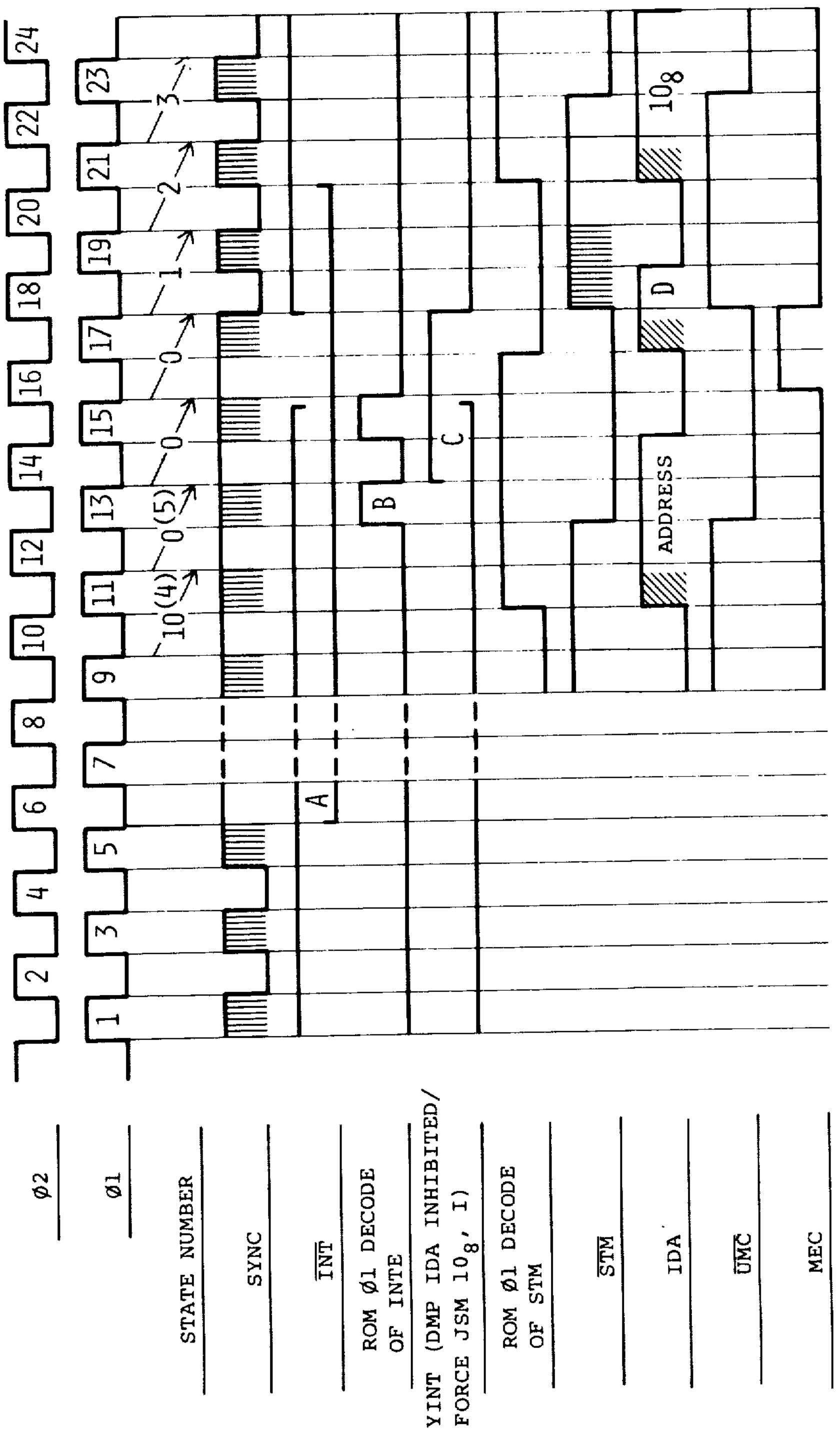

FIGS. 117A–B are a waveform diagram illustrating an interrupt of the BPC during an instruction fetch.

Figure 118:
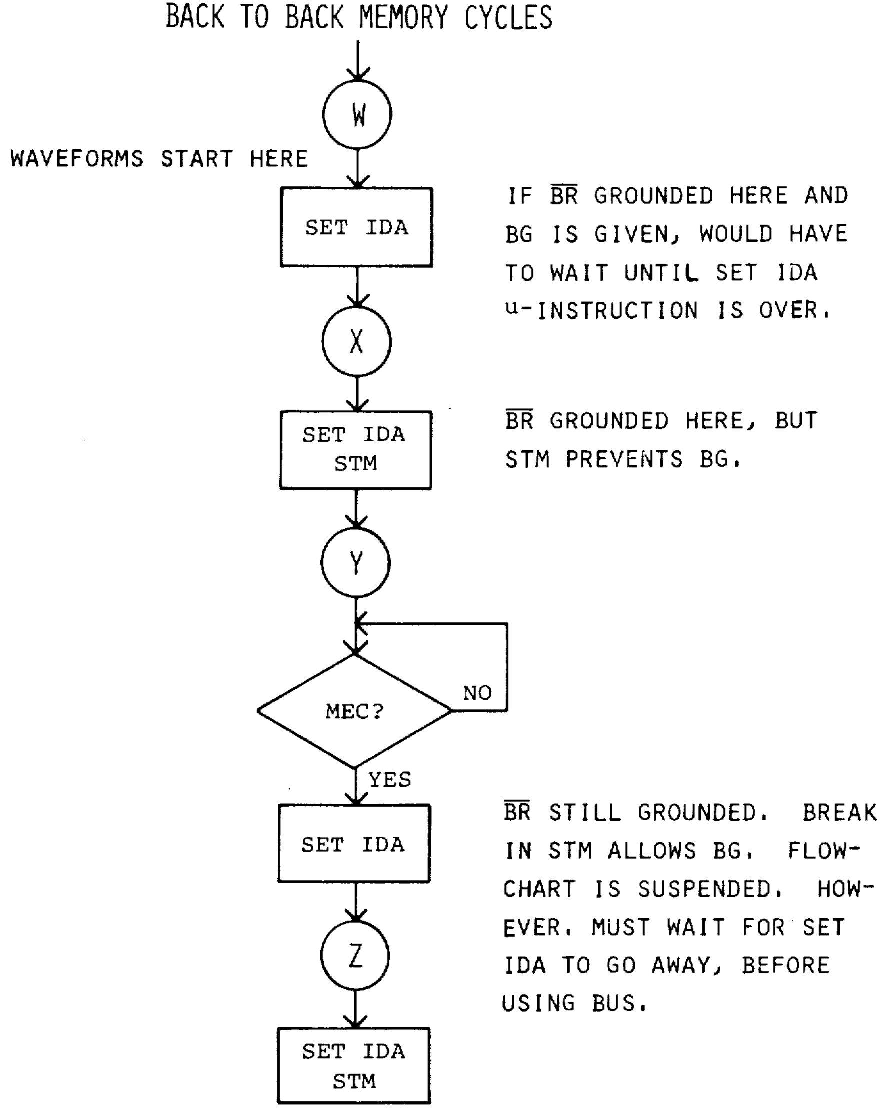

FIG. 118 is a flow chart illustrating the logical relationship betweeen a bus request and a bus grant.

Figure 119A:
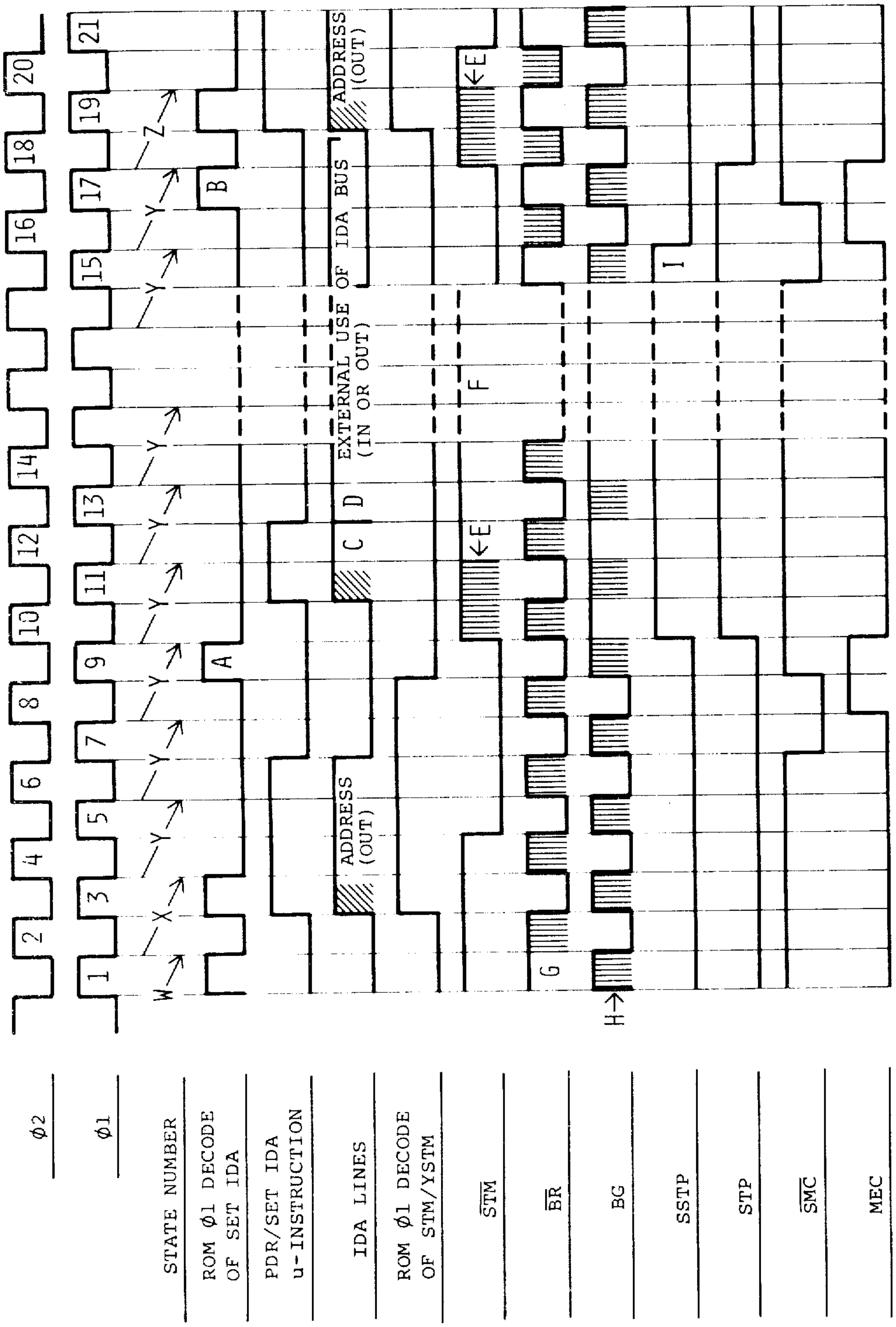

FIGS. 119A–B are a waveform diagram illustrating the timing relationship between a bus request and a bus grant.

Figure 19:
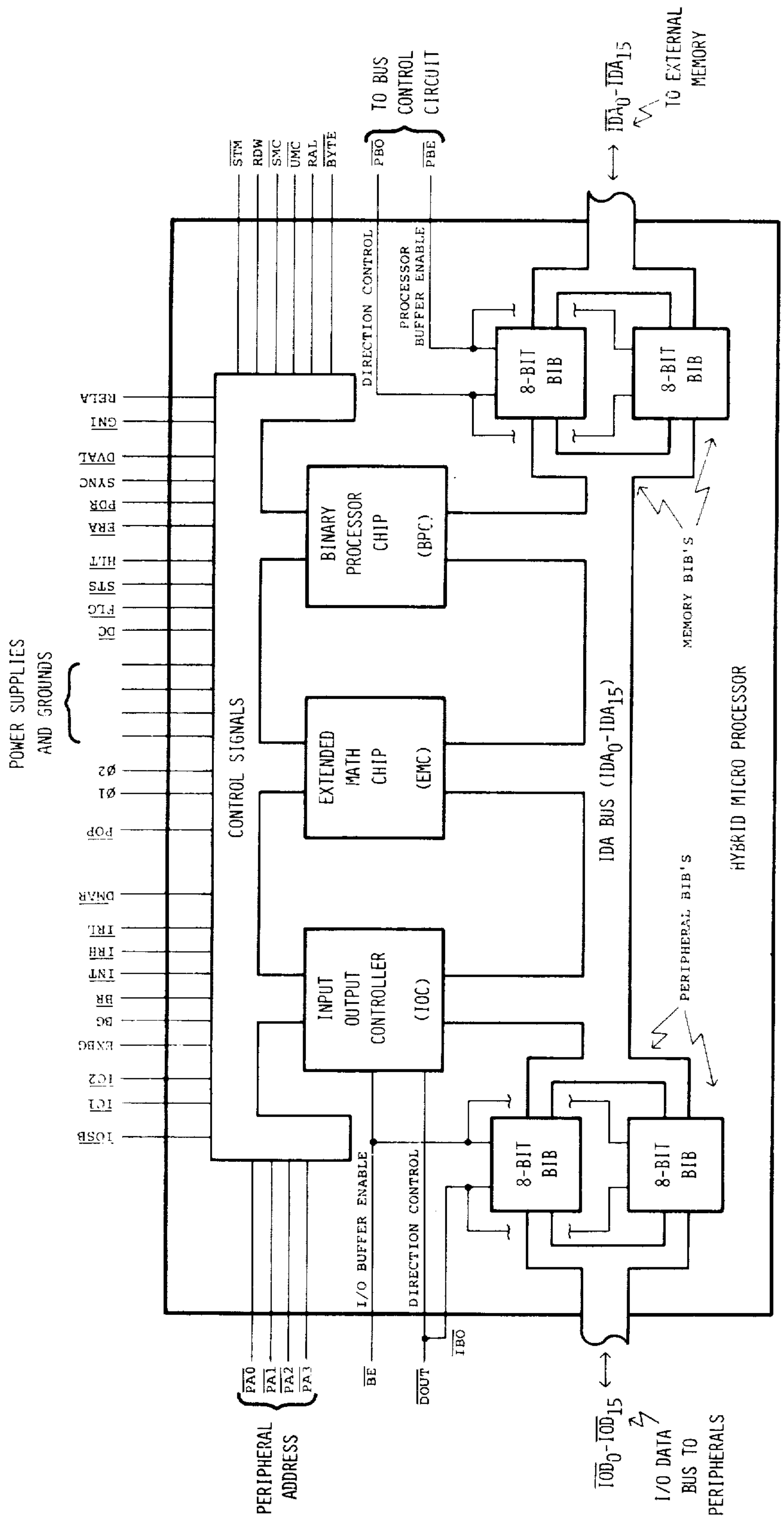
FIG. 19 is a detailed block diagram of the microprocessor of FIG. 16.
Figure 25A:
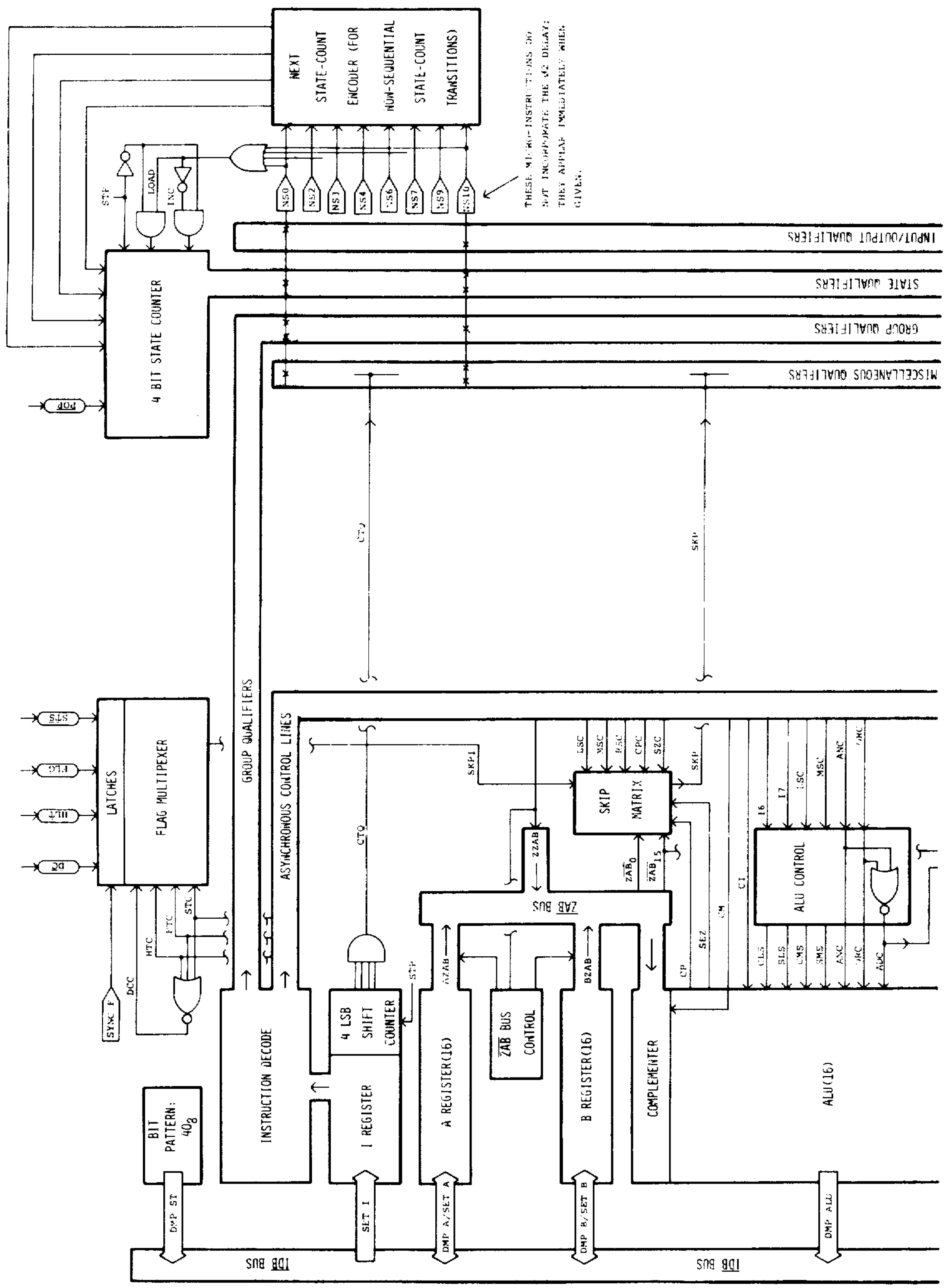
Figure 25B:
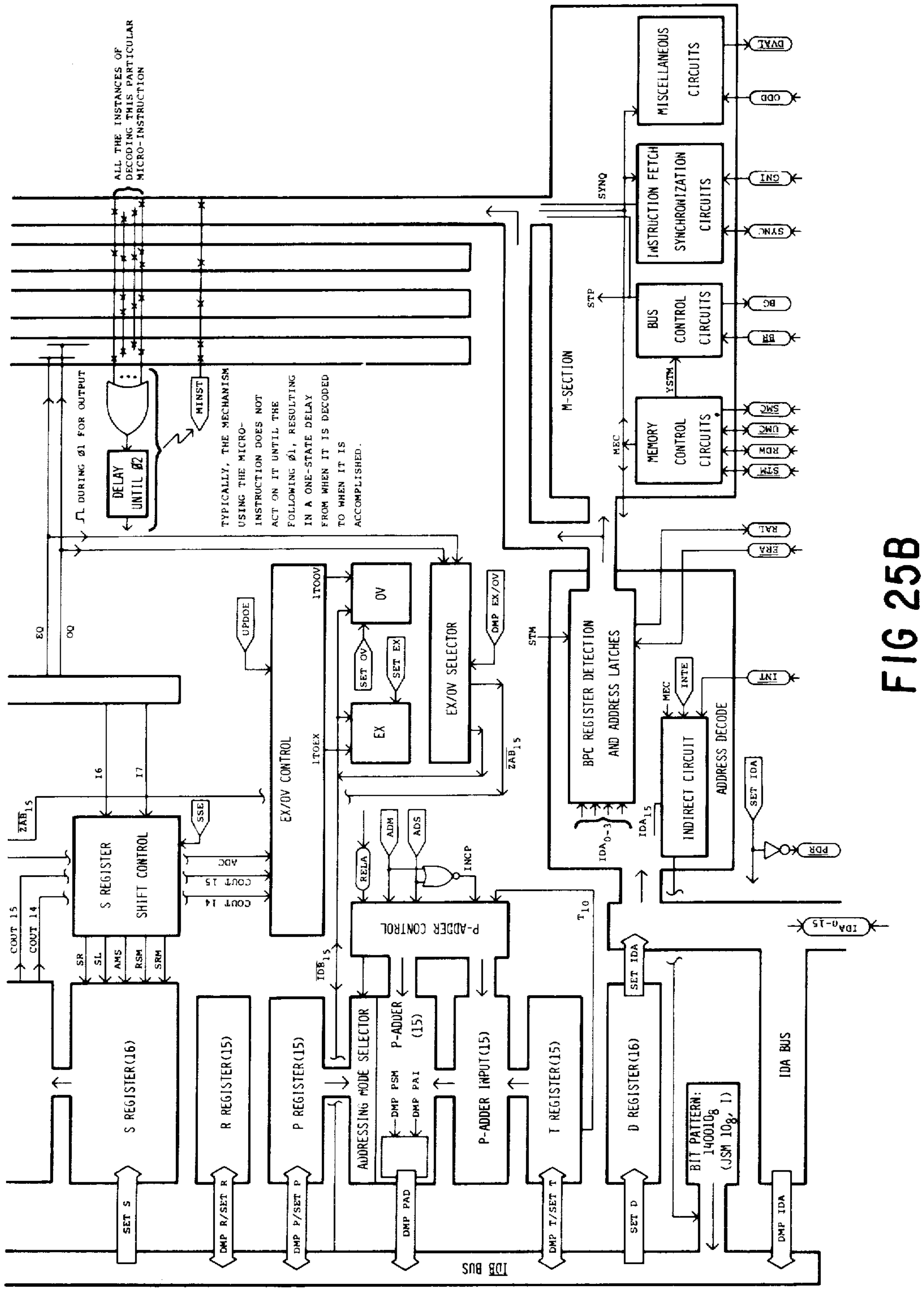
Figure 26:
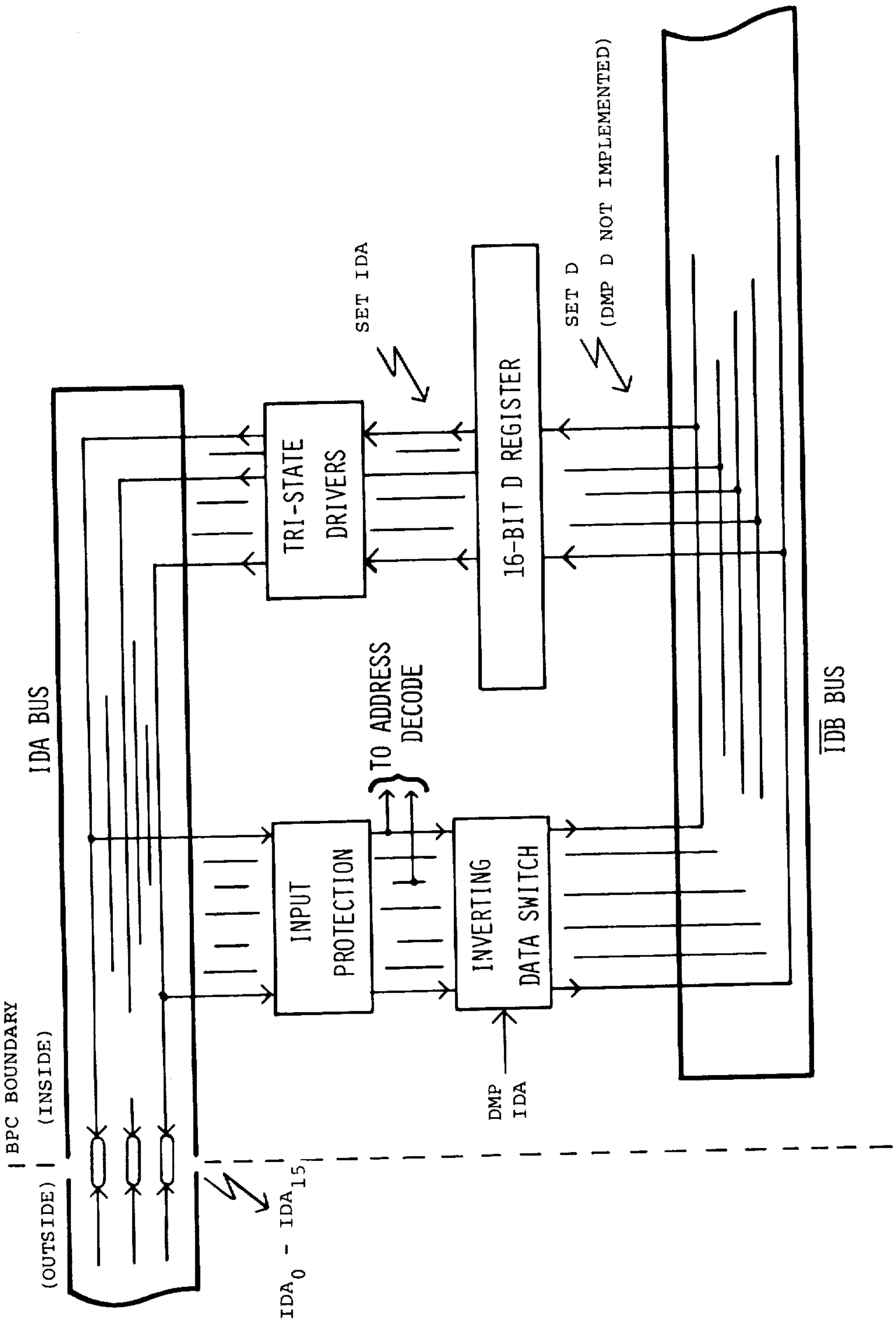
FIG. 26 is a detailed block diagram of the connection between the IDA bus of FIG. 19 and the $\overline{\text{IDB}}$ bus of FIGS. 25A-B.
Figure 27:
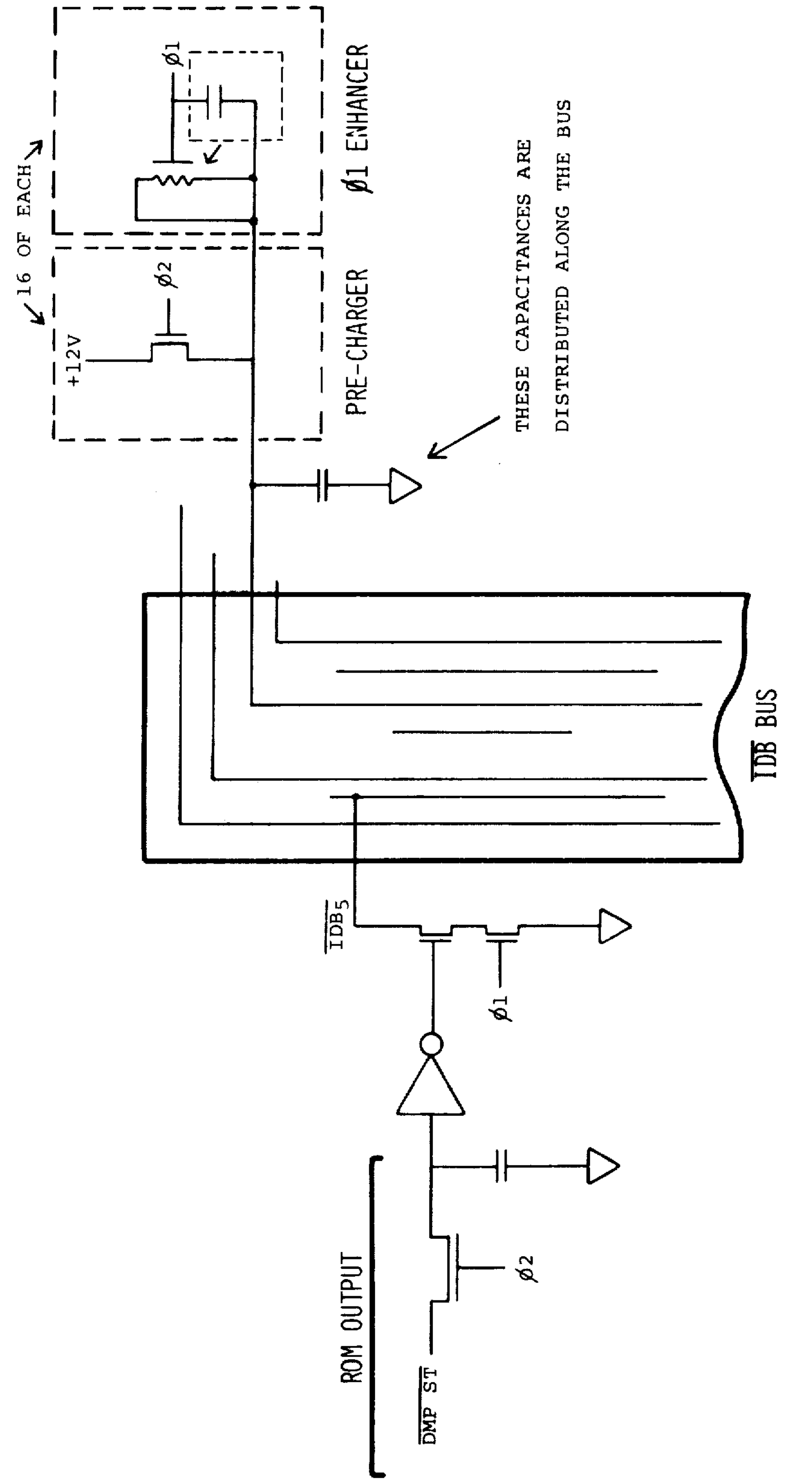
FIG. 27 is a detailed schematic diagram illustrating how the DMP ST microinstruction is placed on the $\overline{\text{IDB}}$ bus of FIGS. 25A-B and illustrating the details of a pre-charger and a 01 enhancer associated with the $\overline{\text{IDB}}$ bus.
Figure 28:
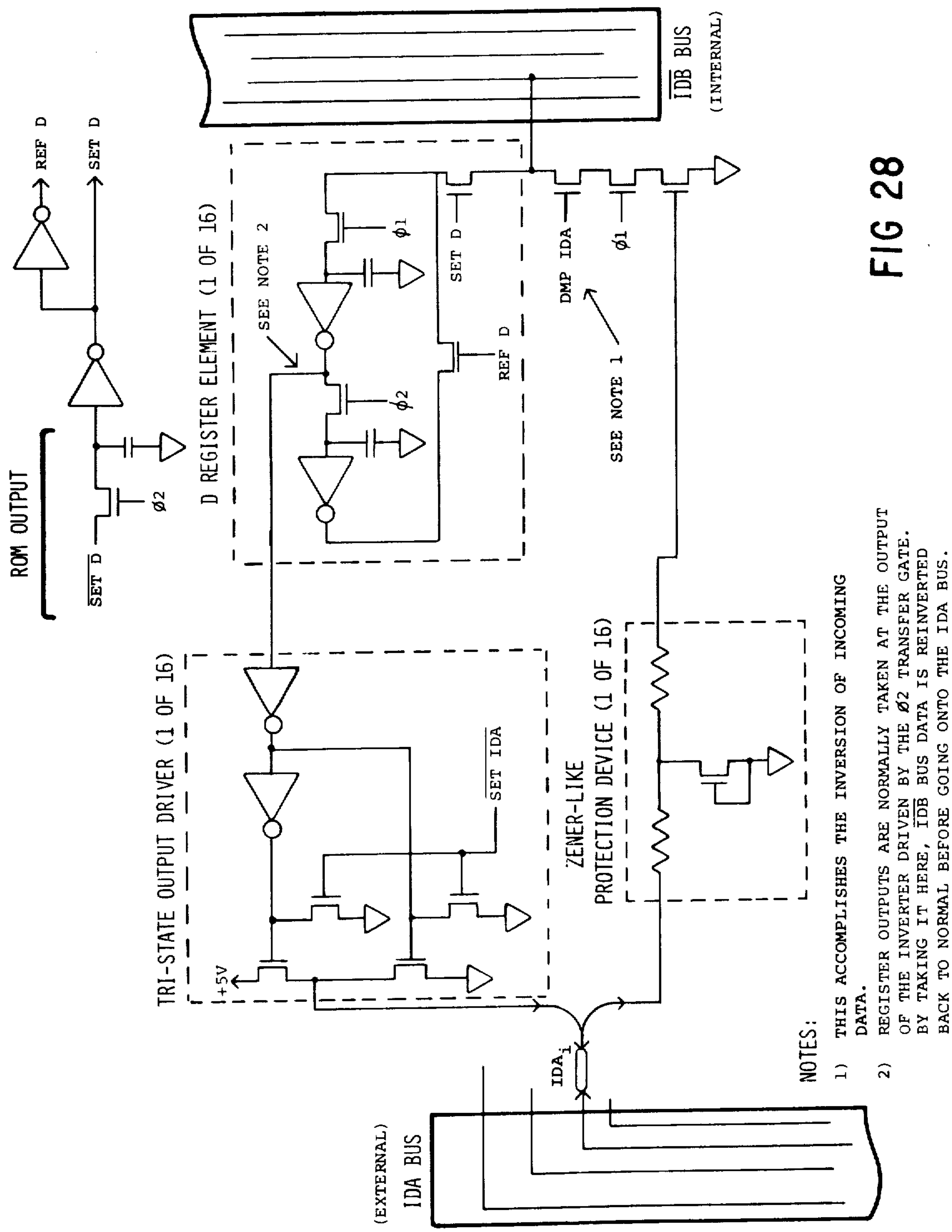
FIG. 28 is a detailed schematic diagram of the D register of FIGS. 25A-B.
Figure 29:
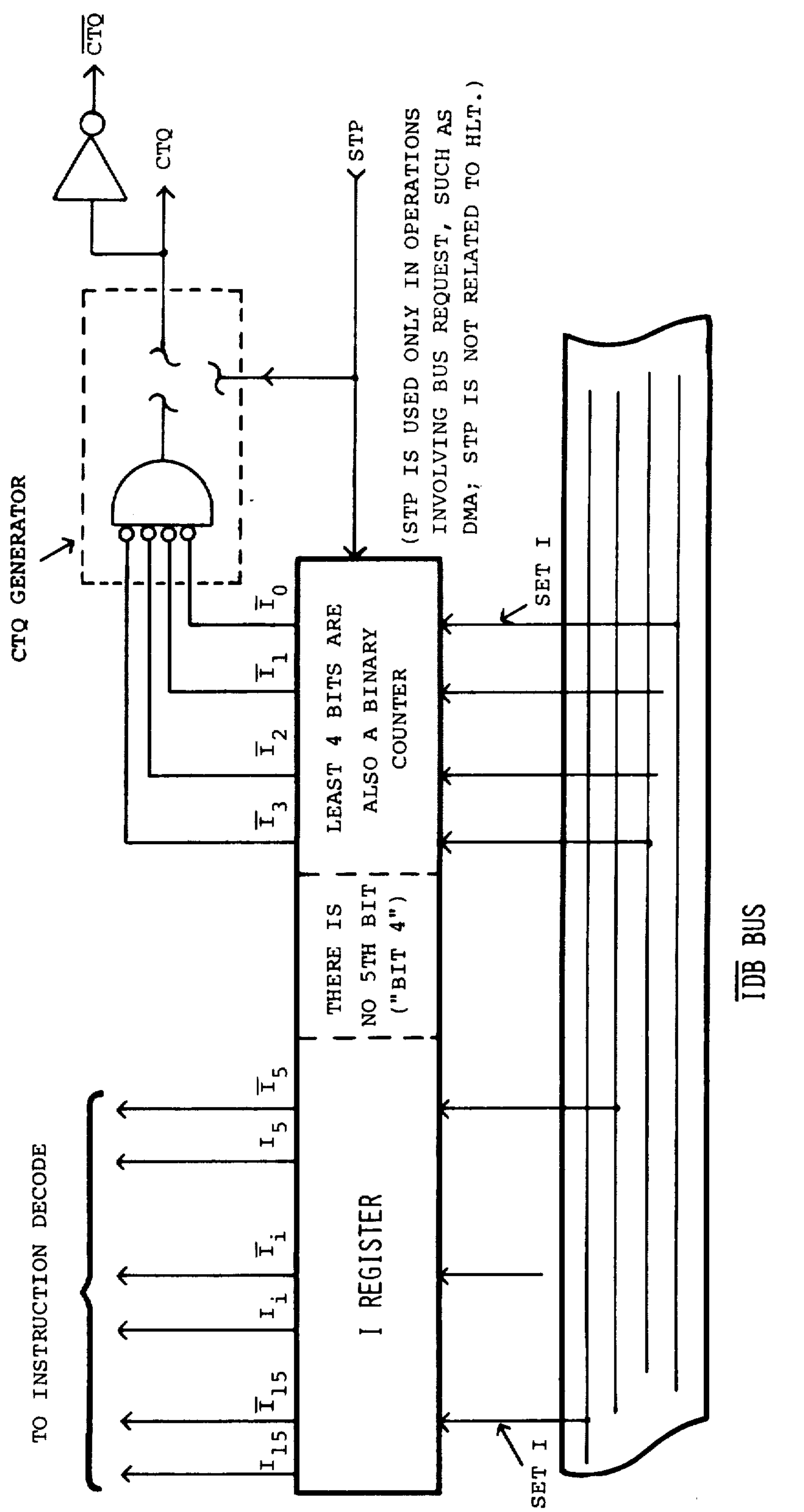
FIG. 29 is a detailed block diagram of the I register of FIGS. 25A-B.
Figure 30:
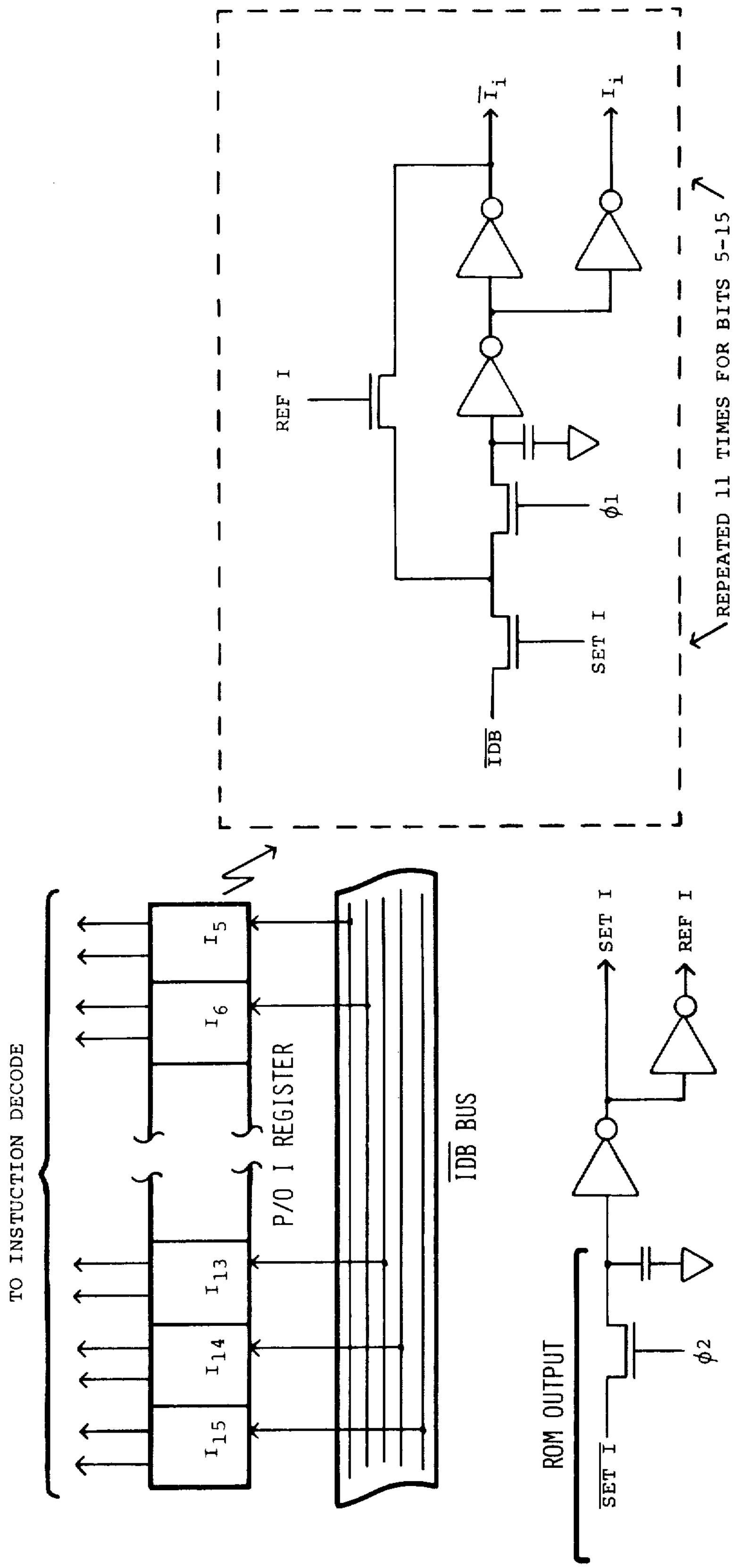
FIG. 30 is a detailed schematic diagram of the upper twelve bits of the I register of FIG. 29.
Figure 31:
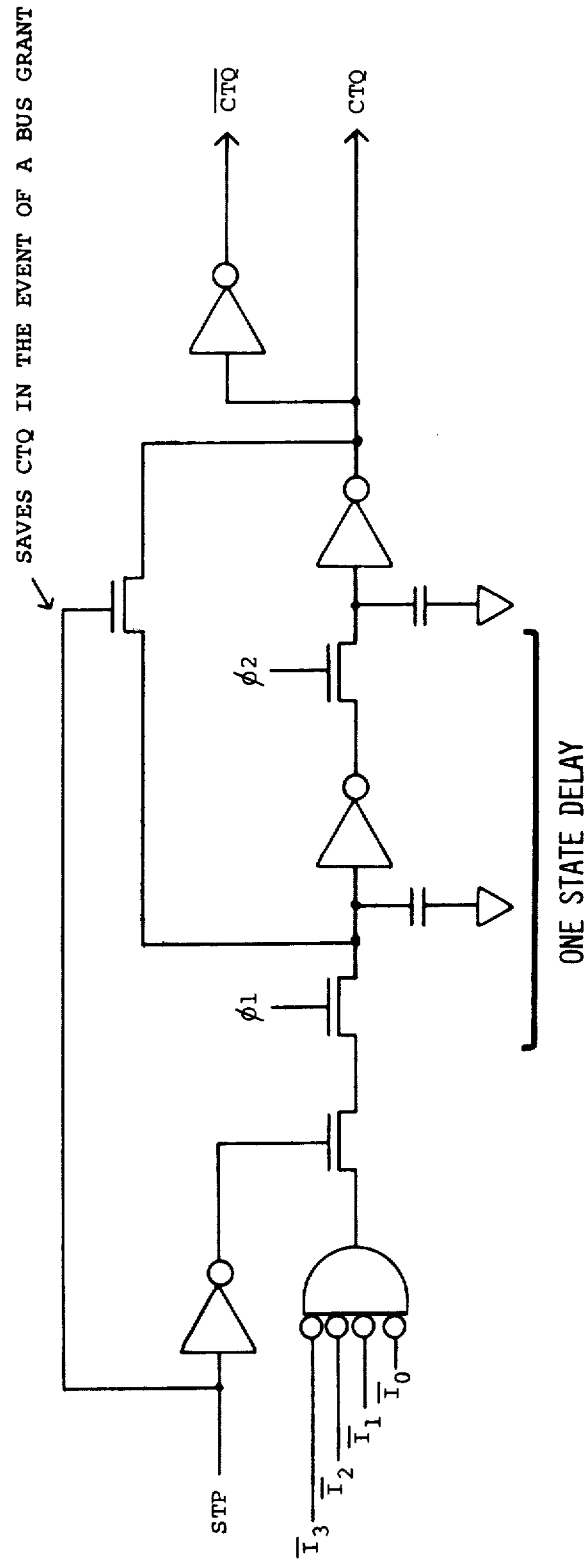
FIG. 31 is a detailed schematic diagram of the CTQ generator of FIG. 29.
Figure 32:
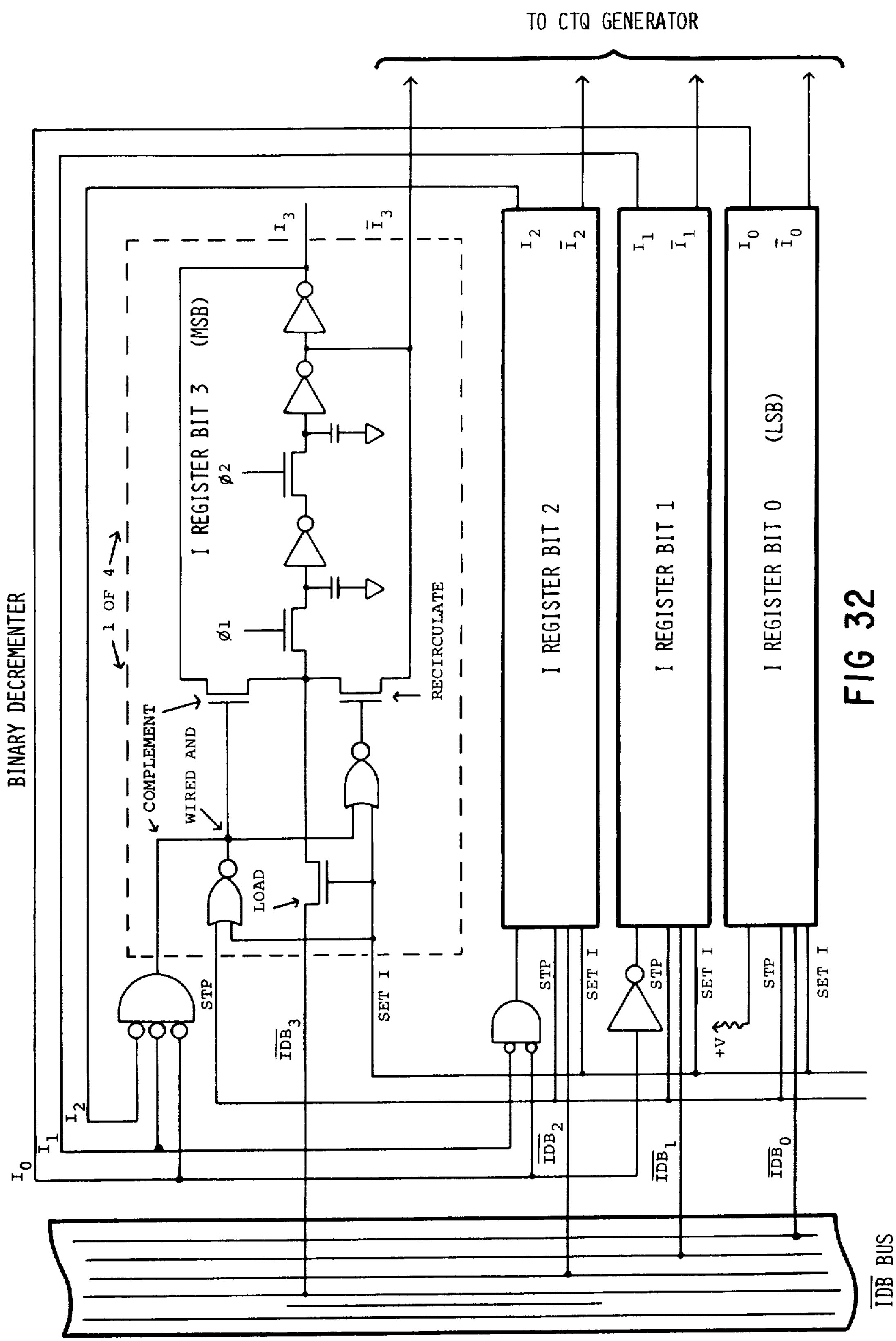
FIG. 32 is a detailed schematic diagram of the lower four bits of the I register of FIG. 29.
Figure 33:
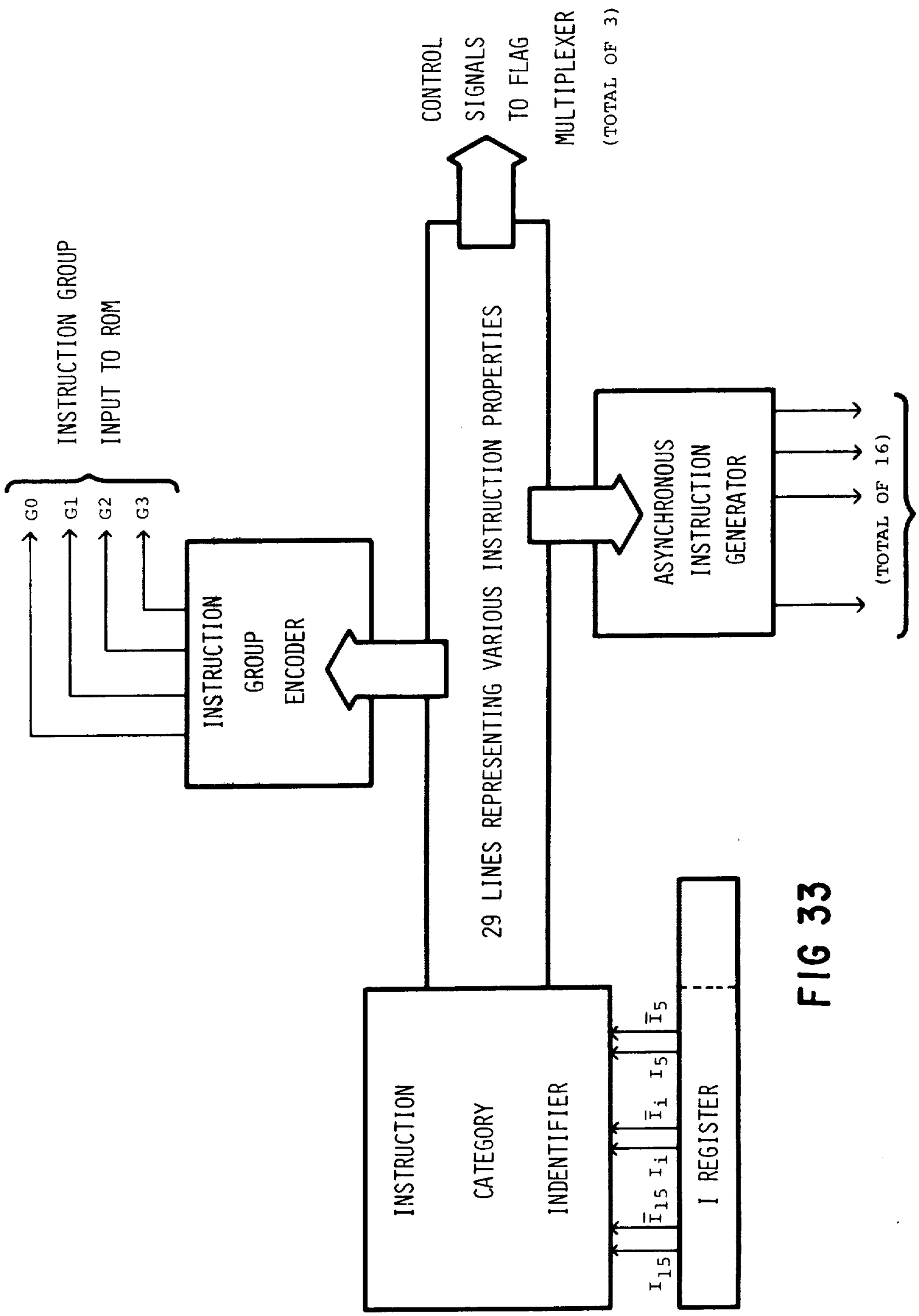
FIG. 33 is a detailed block diagram of the instruction decode block of FIGS. 24A-B.
Figure 35A:
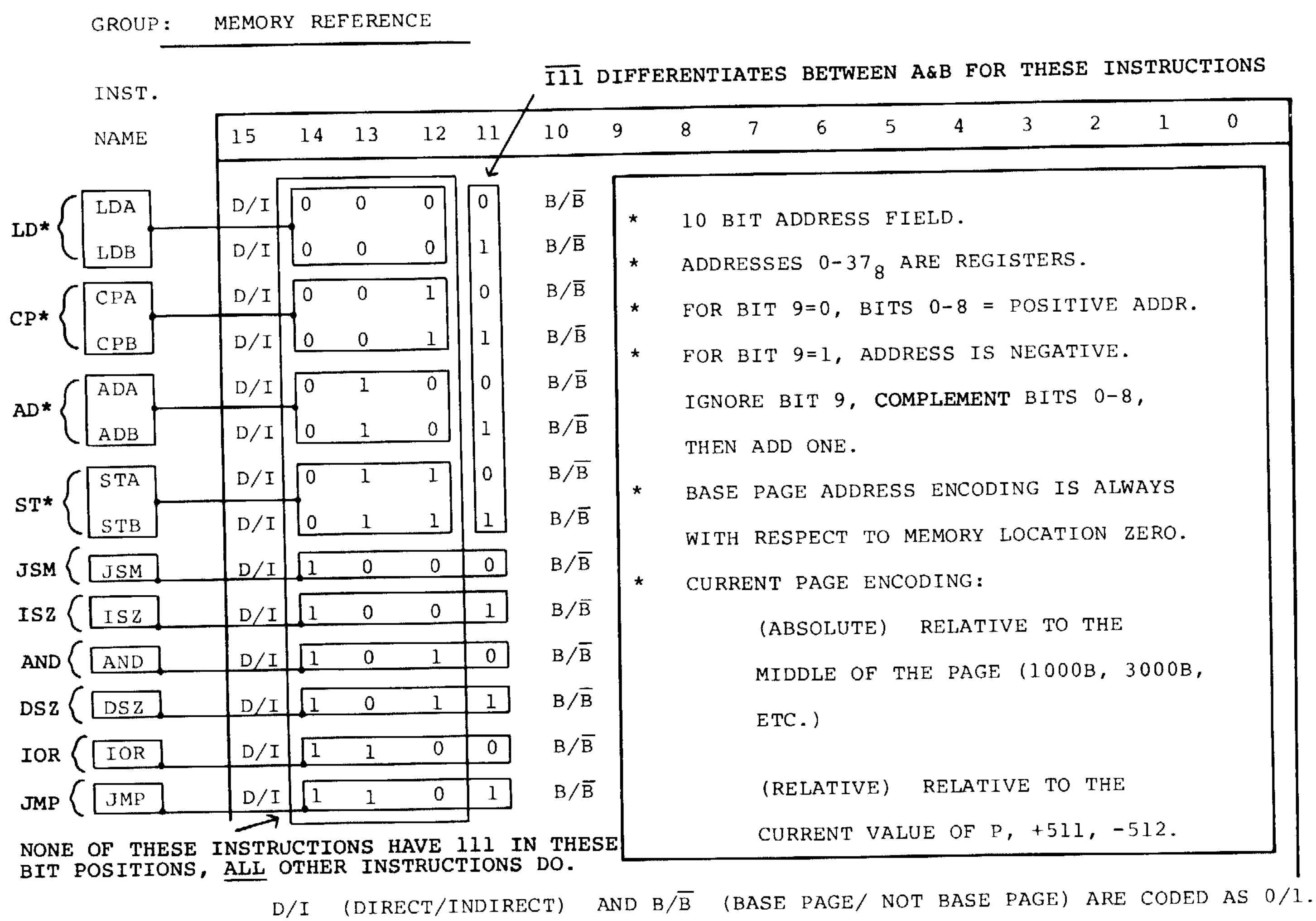
Figure 35C:
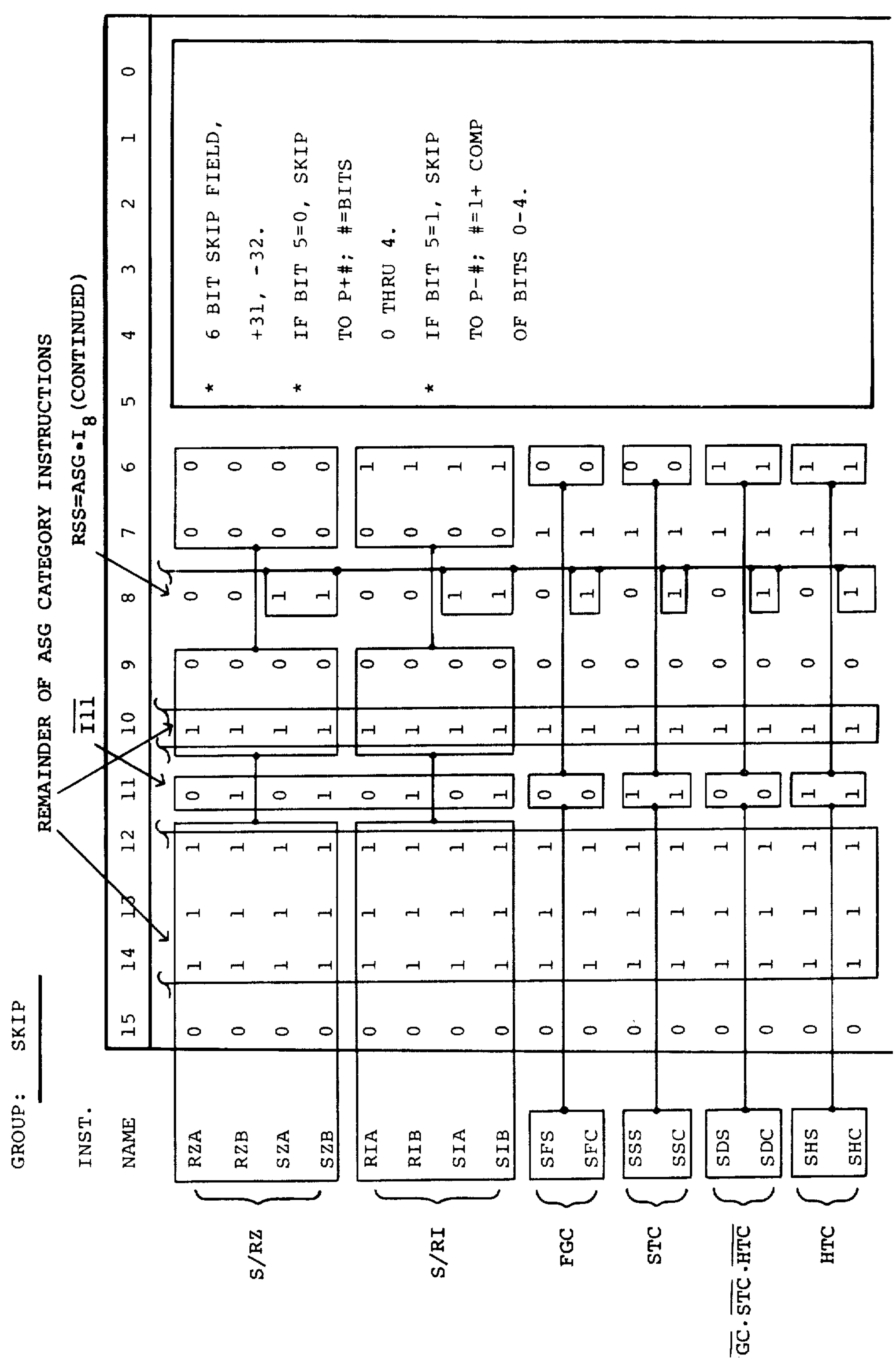
Figure 37:
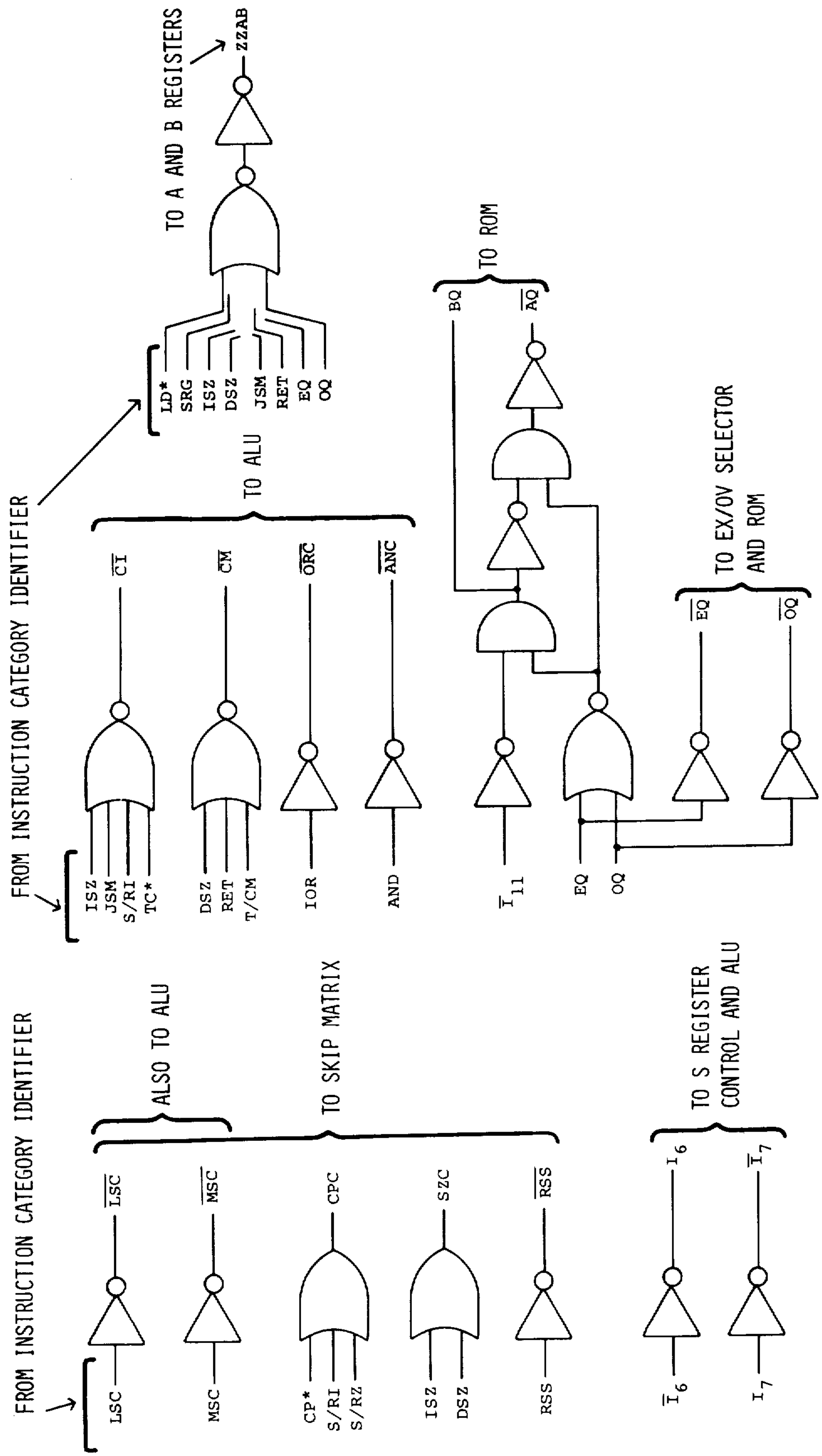
FIG. 37 is a detailed schematic diagram of the asynchronous instruction generator of FIG. 33.
Figure 38:
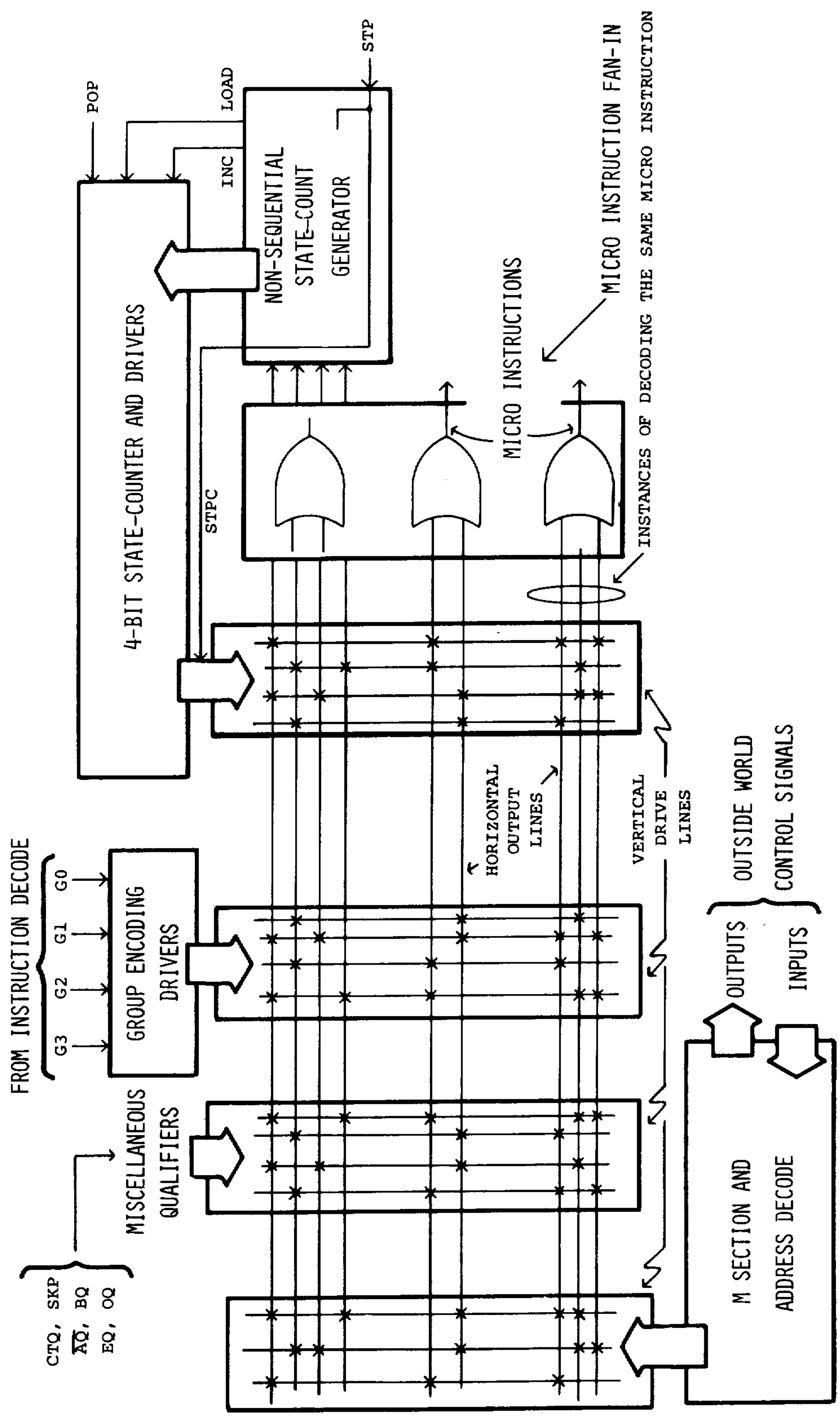
FIG. 38 is a detailed block diagram of the control ROM included within the BPC of FIGS. 25A-B.
Figure 39:
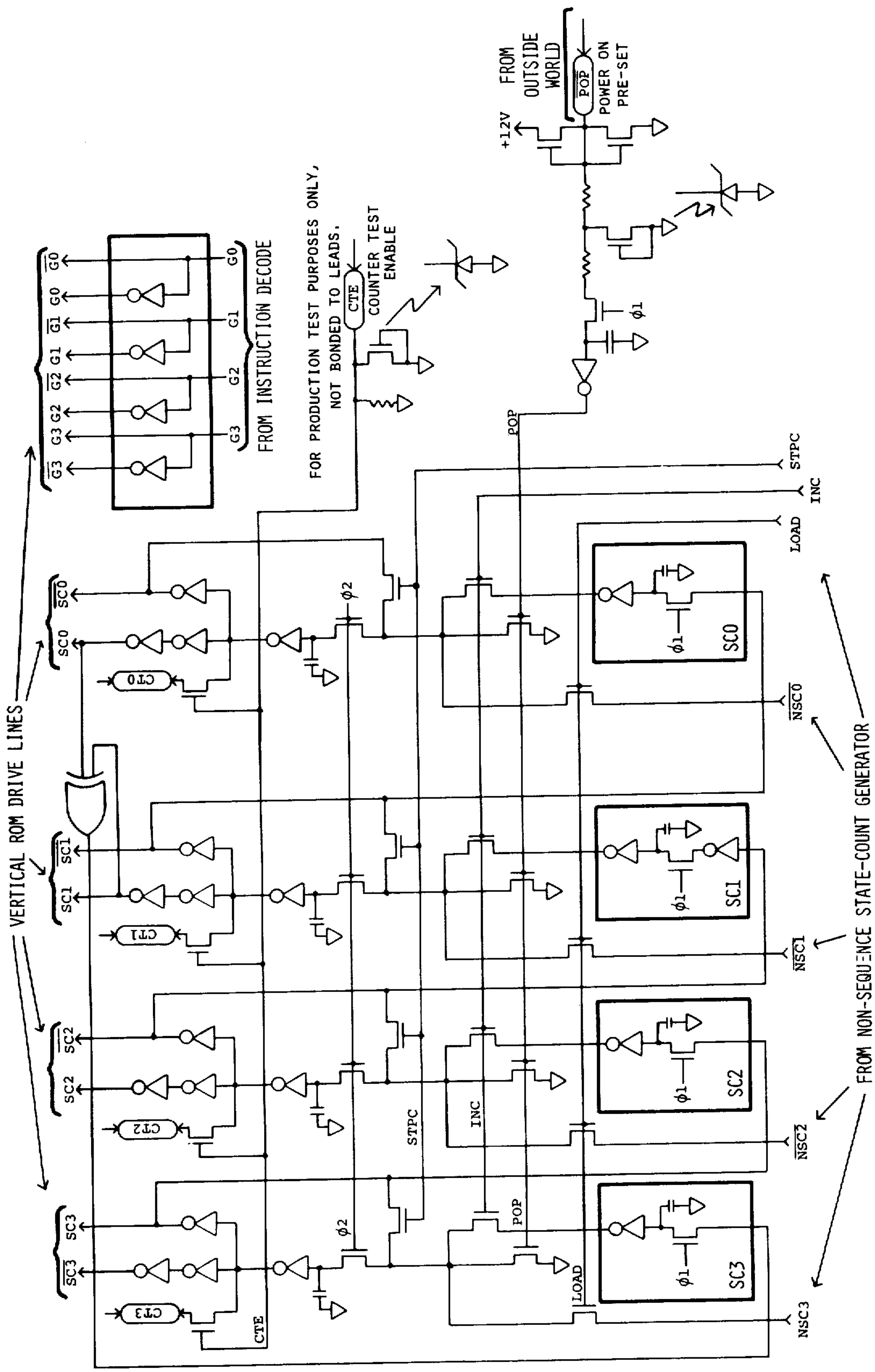
FIG. 39 is a detailed schematic diagram of the 4-bit state counter and drivers of FIG. 38.
Figure 40:
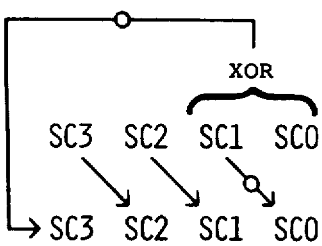
FIG. 40 is a diagram illustrating the natural state sequence of the state counter of FIG. 38.
Figure 41:
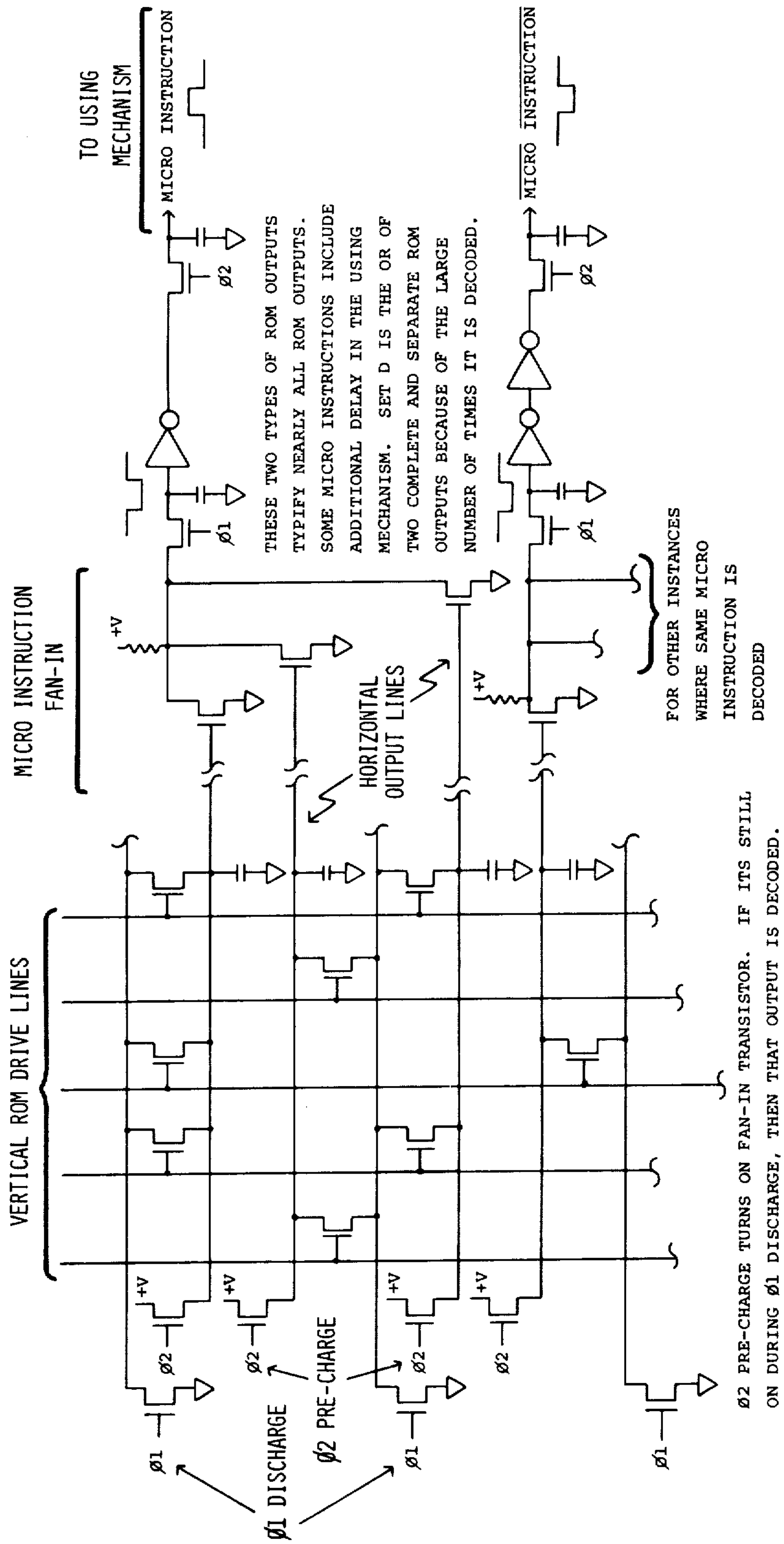
FIG. 41 is a detailed schematic diagram of the micro-instruction decoding circuitry of FIG. 38.
Figure 42:
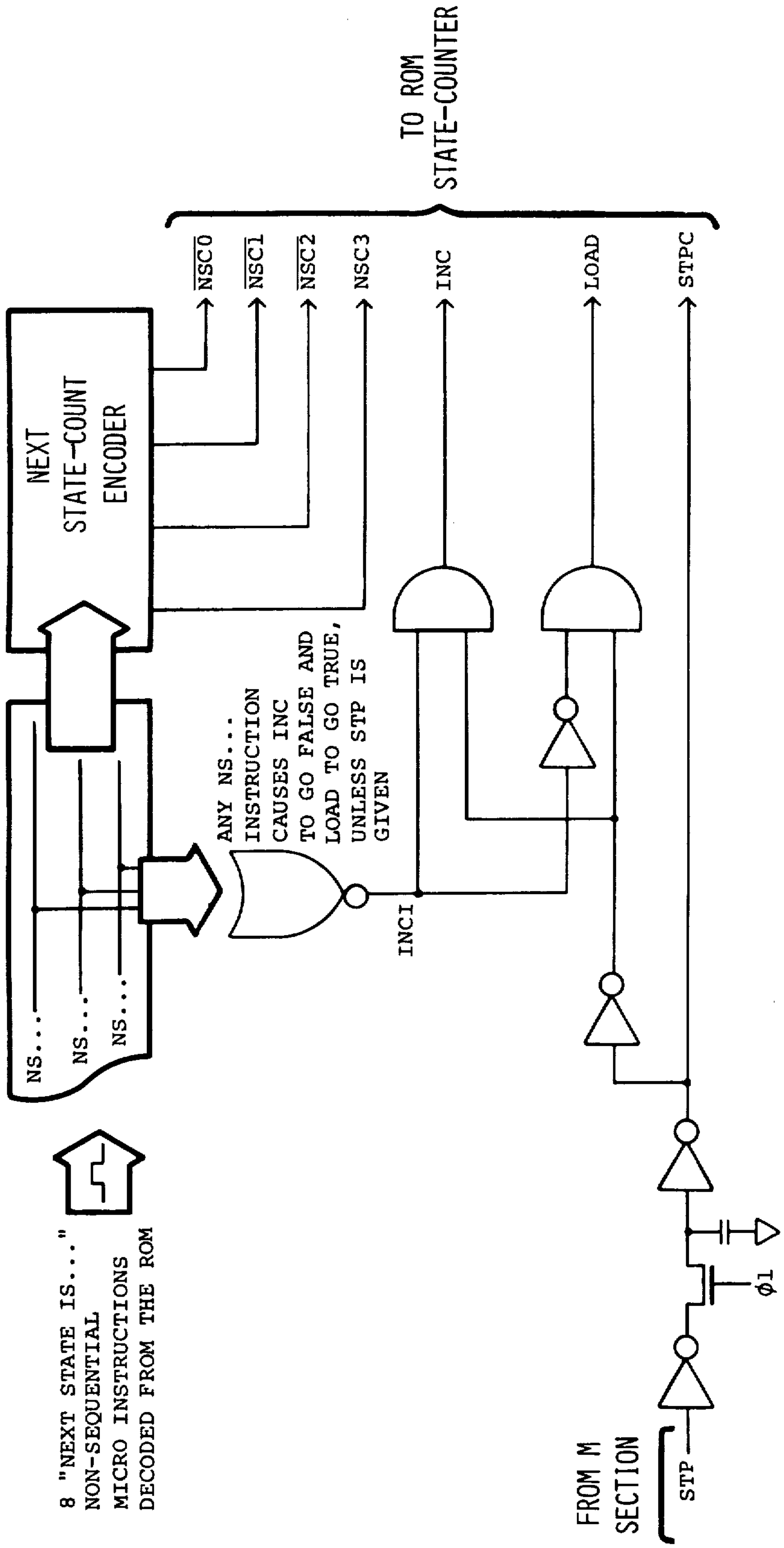
FIG. 42 is a detailed schematic diagram of the non-sequential state-count generator of FIG. 38.
Figure 44:
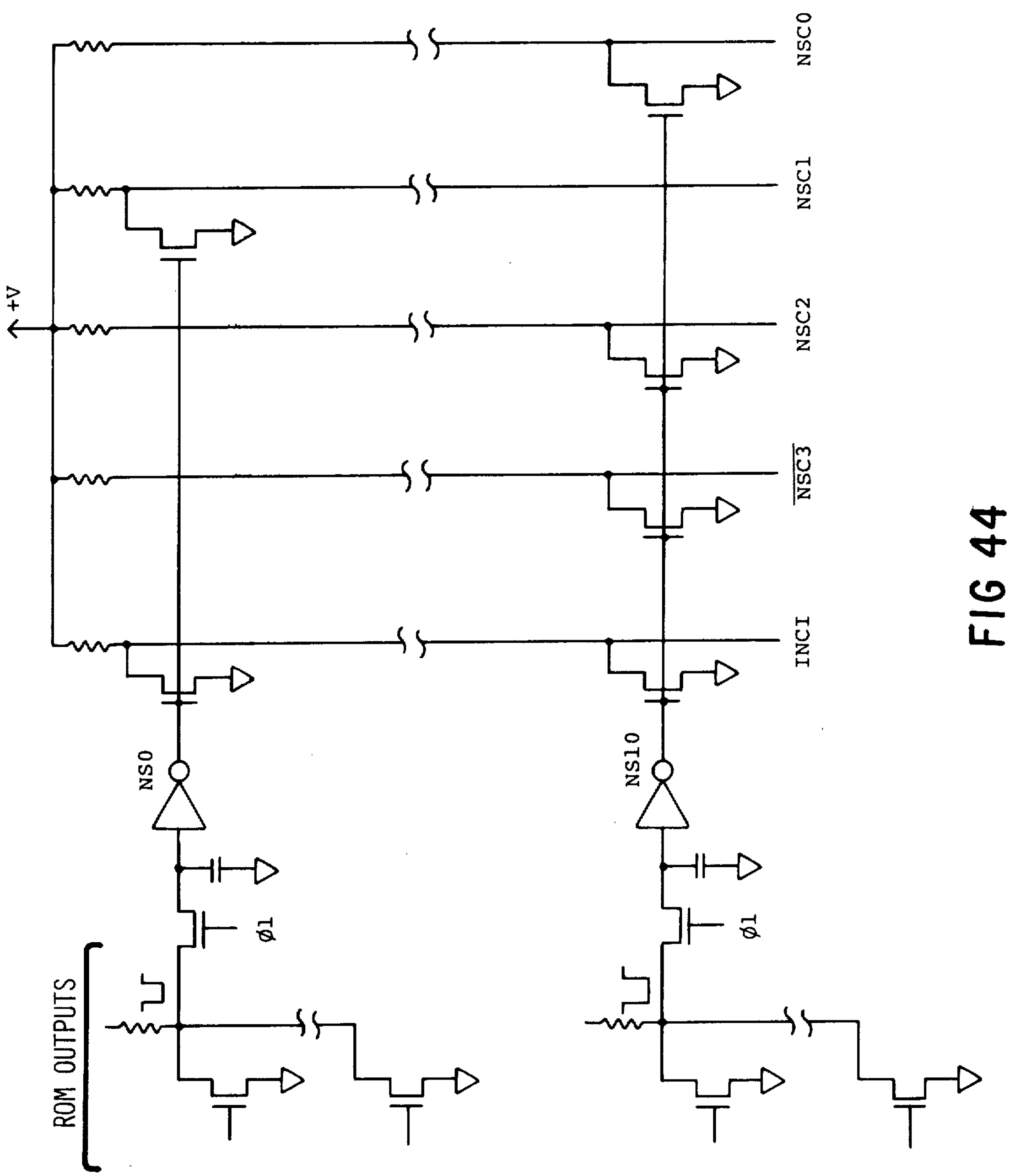
FIG. 44 is a detailed schematic diagram of the next state-count encoder of FIG. 42.
Figure 45B:
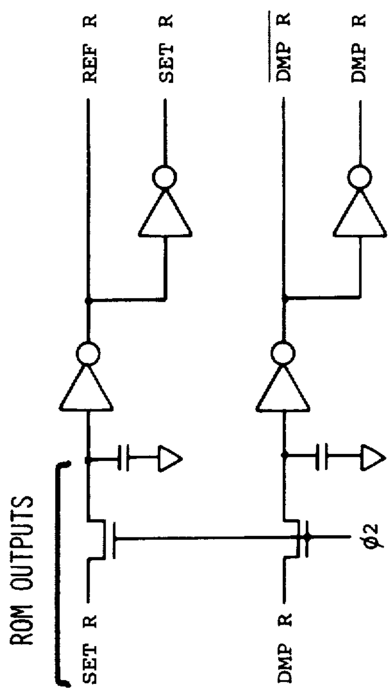
FIG. 45B is a detailed schematic diagram showing the origin of various signals employed by the R register of FIG. 45A.
Figure 45A:
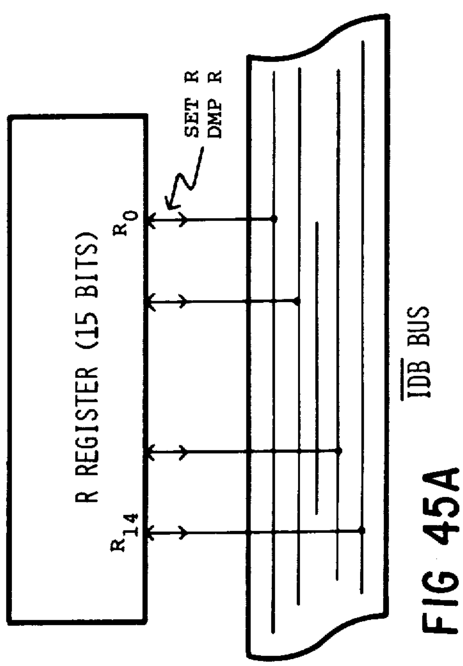
FIG. 45A is a detailed block diagram of the R register of FIG. 25A–B.
Figure 45C:
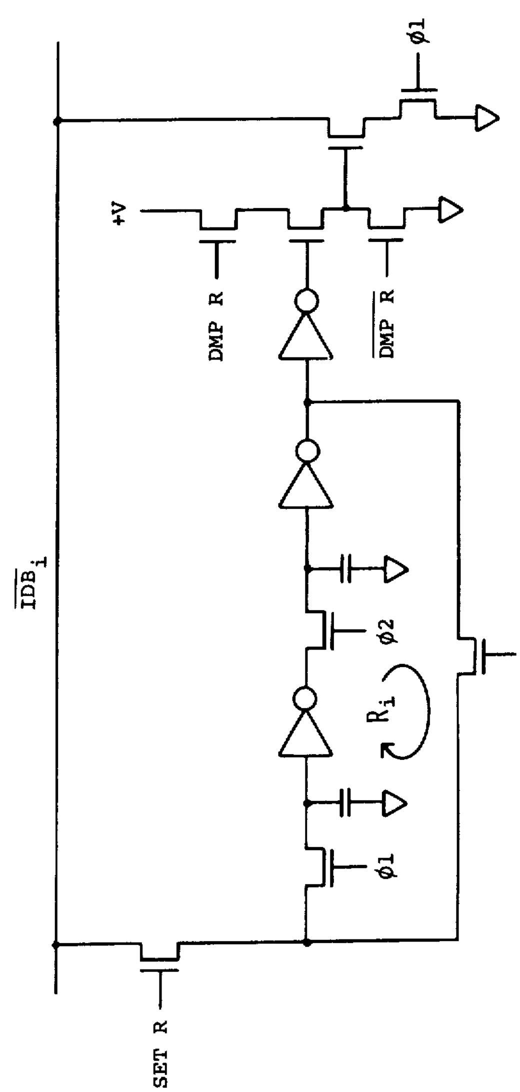
FIG. 45C is a detailed schematic diagram of one of the bits of the R register of FIG. 45A.
Figure 46B:
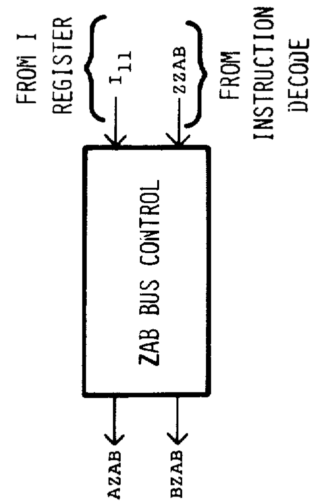
FIG. 46B is a detailed block diagram of the ZAB bus control of FIGS. 25A–B.
Figure 46A:
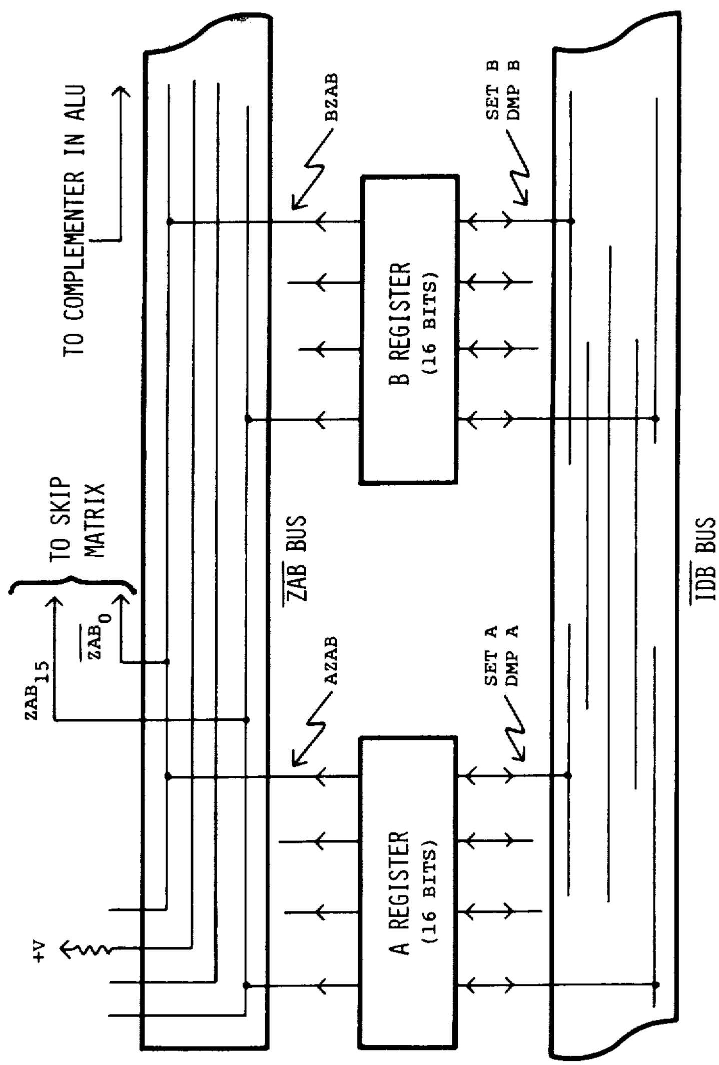
FIG. 46A is a detailed block diagram of the A and B registers of FIGS. 25A–B.
Figure 47B:
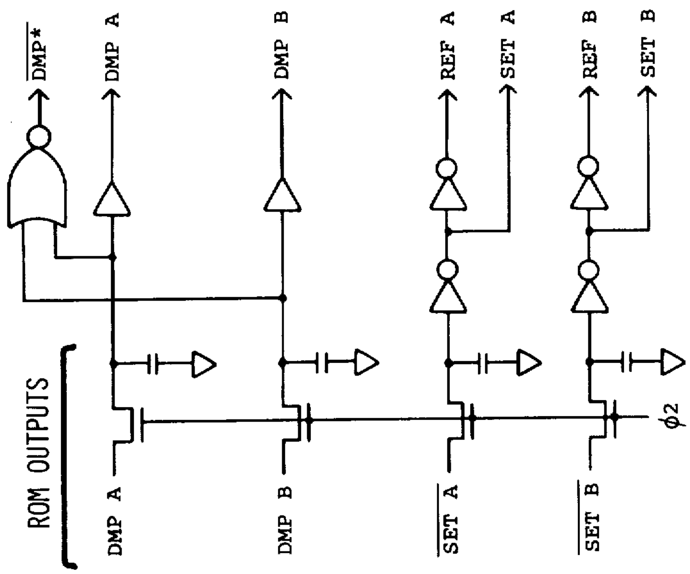
FIG. 47A is a detailed schematic diagram of one of the bits of each of the A and B registers of FIG. 46A.
Figure 47A:
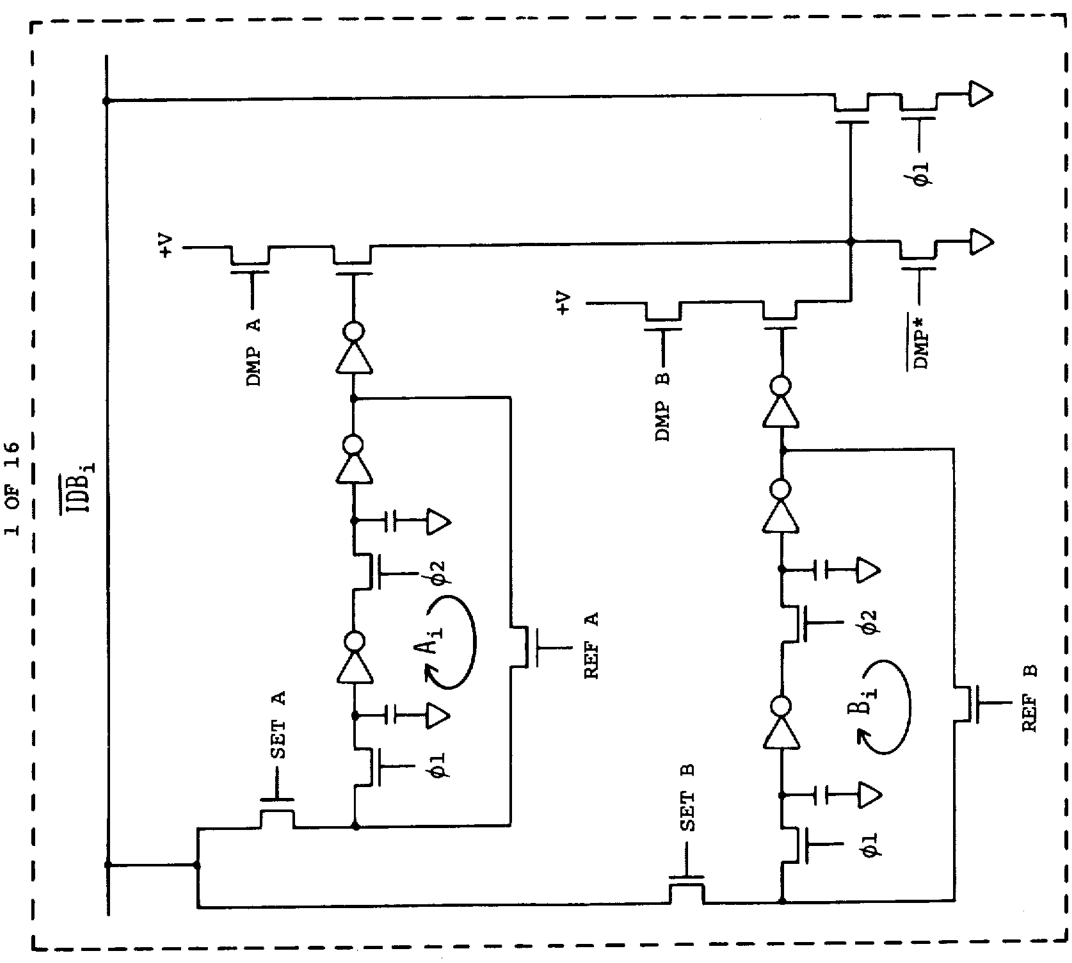
Figure 48:
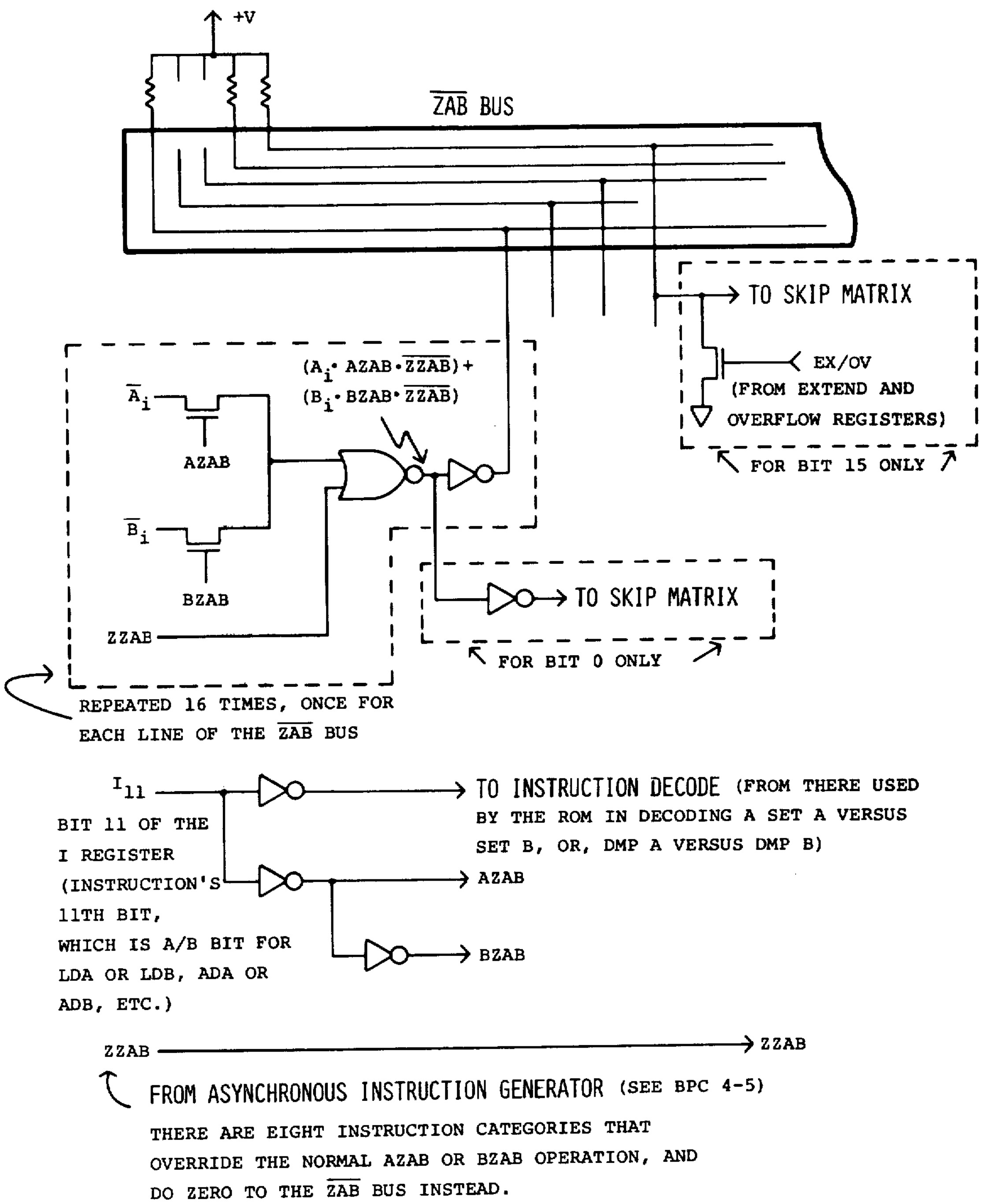
FIG. 48 is a detailed schematic diagram of the $\overline{ZAB}$ bus and the $\overline{ZAB}$ bus control block of FIGS. 25A–B.
Figure 49:
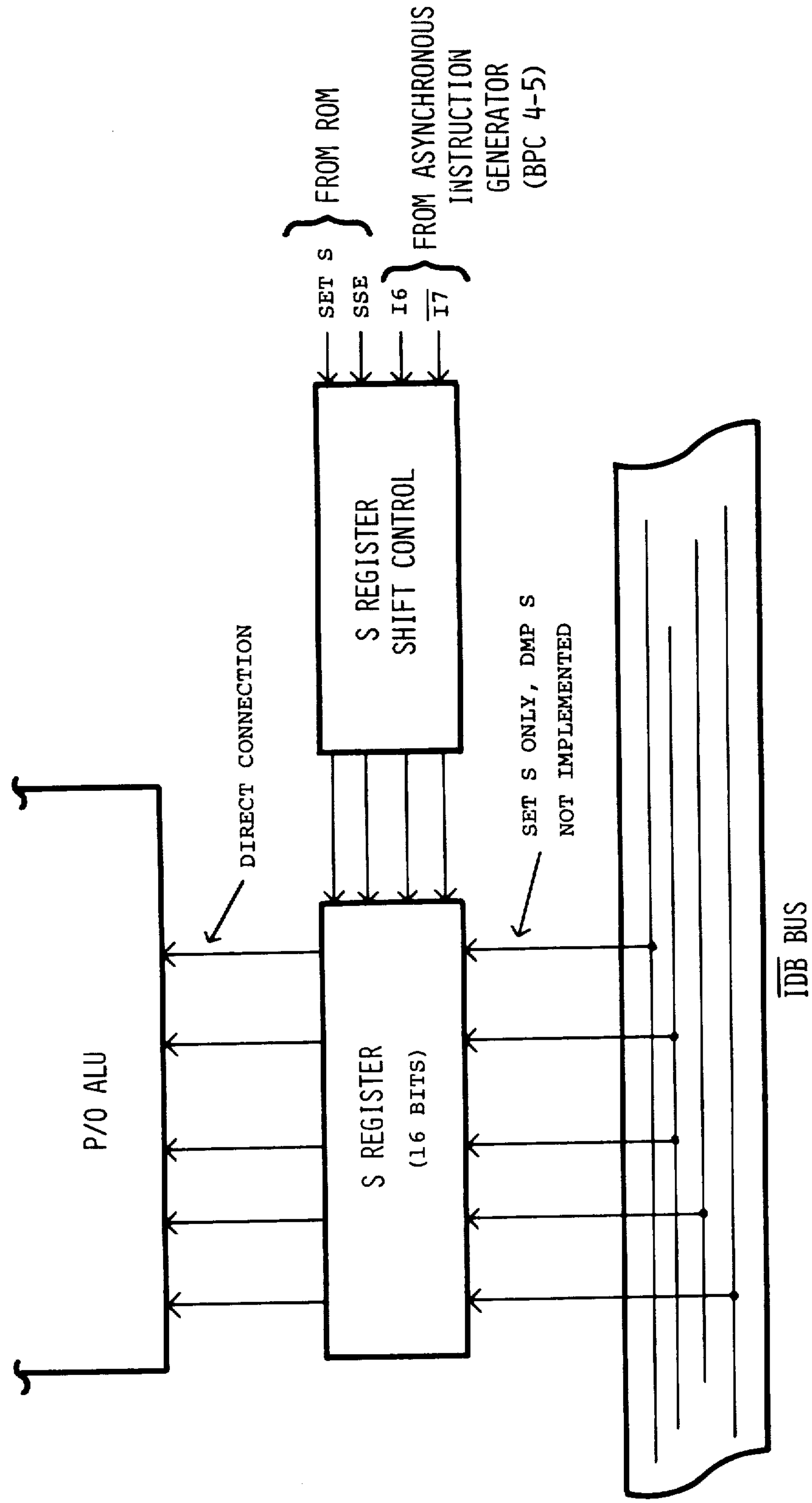
FIG. 49 is a detailed block diagram of the S register and the S register shift control block of FIGS. 25A–B.
Figure 50:
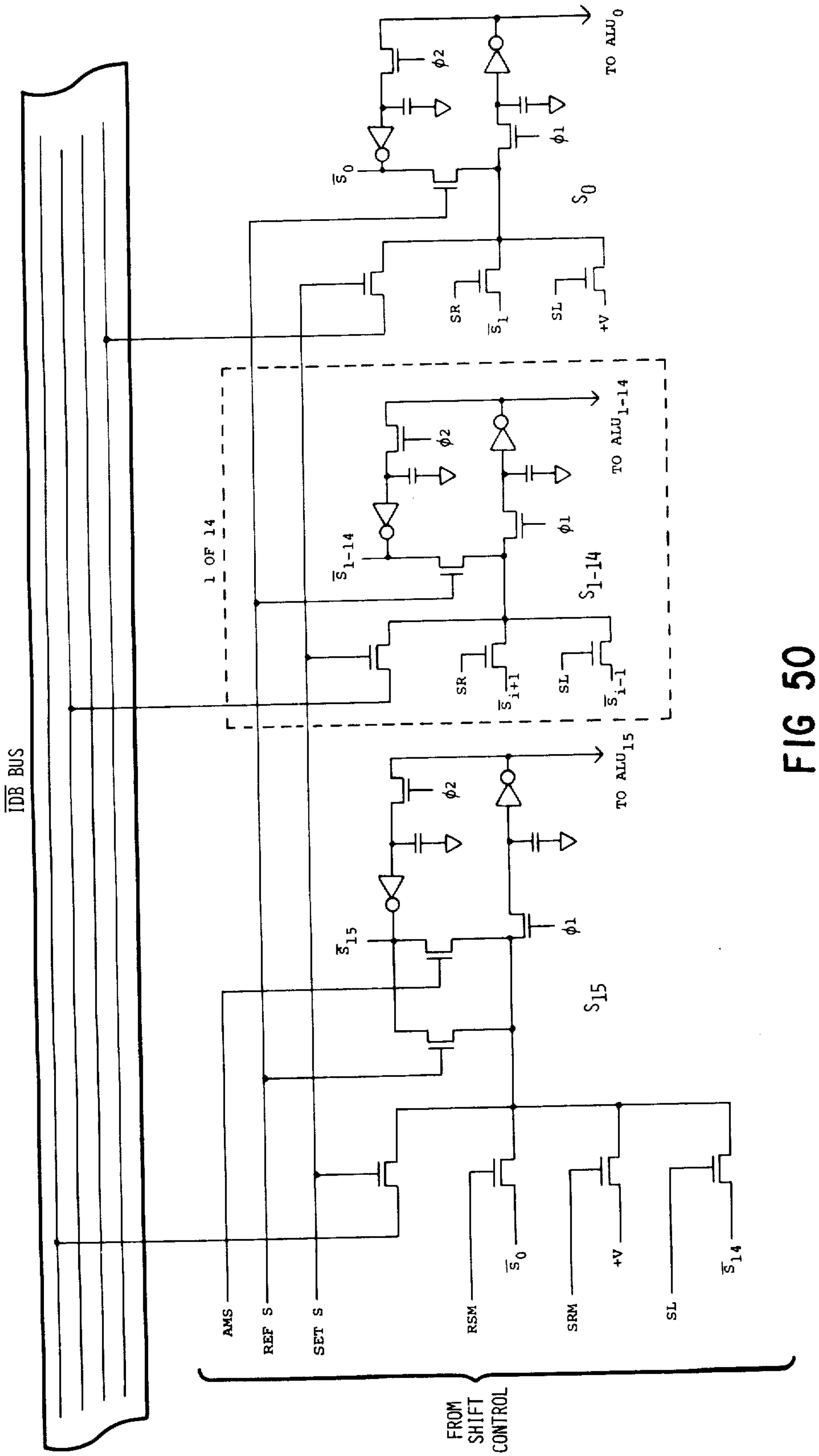
FIG. 50 is a detailed schematic diagram of the S register of FIG. 49.
Figure 51:
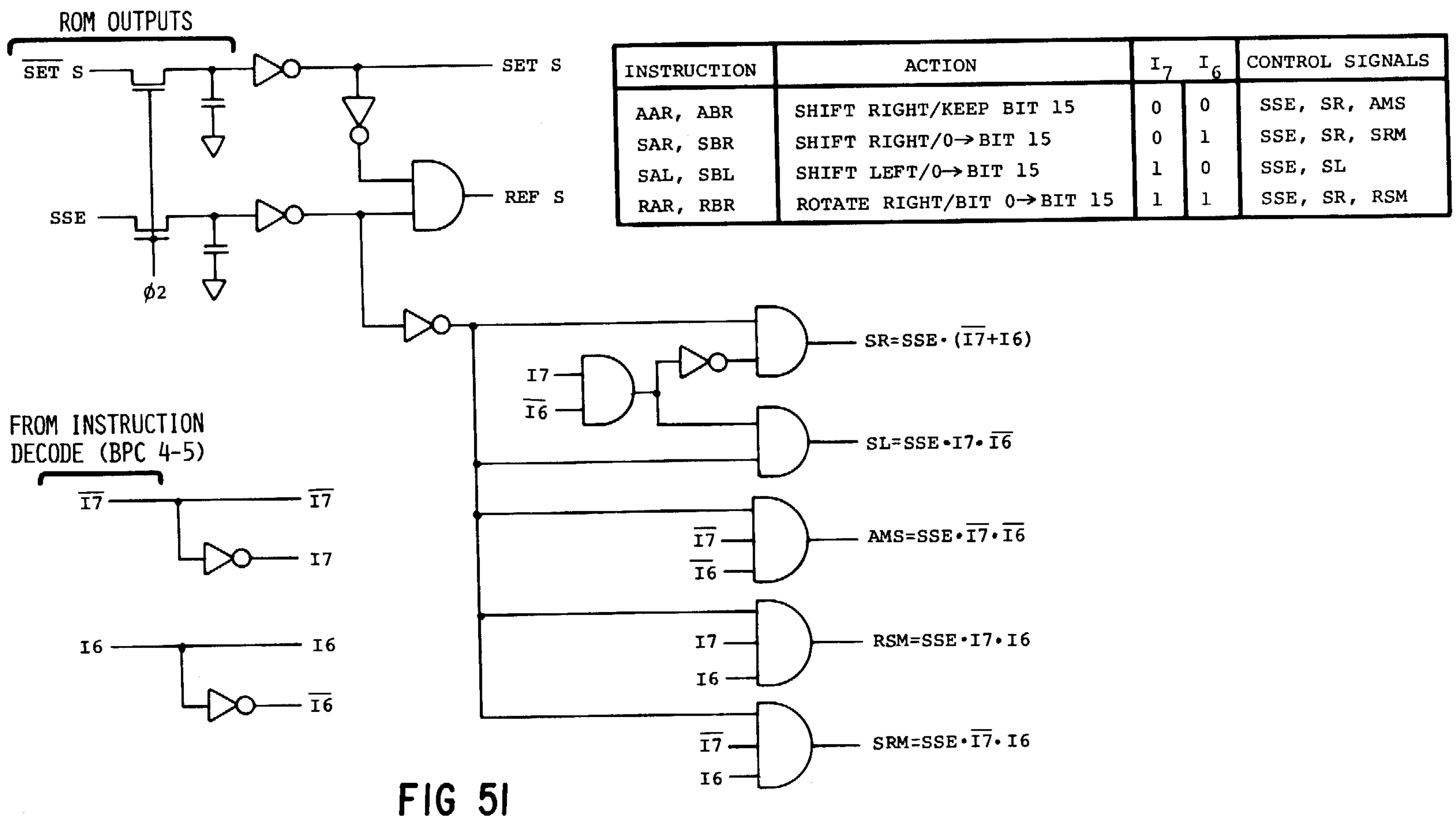
FIG. 51 is a detailed schematic diagram of the S register shift control block of FIG. 49.
Figure 52:
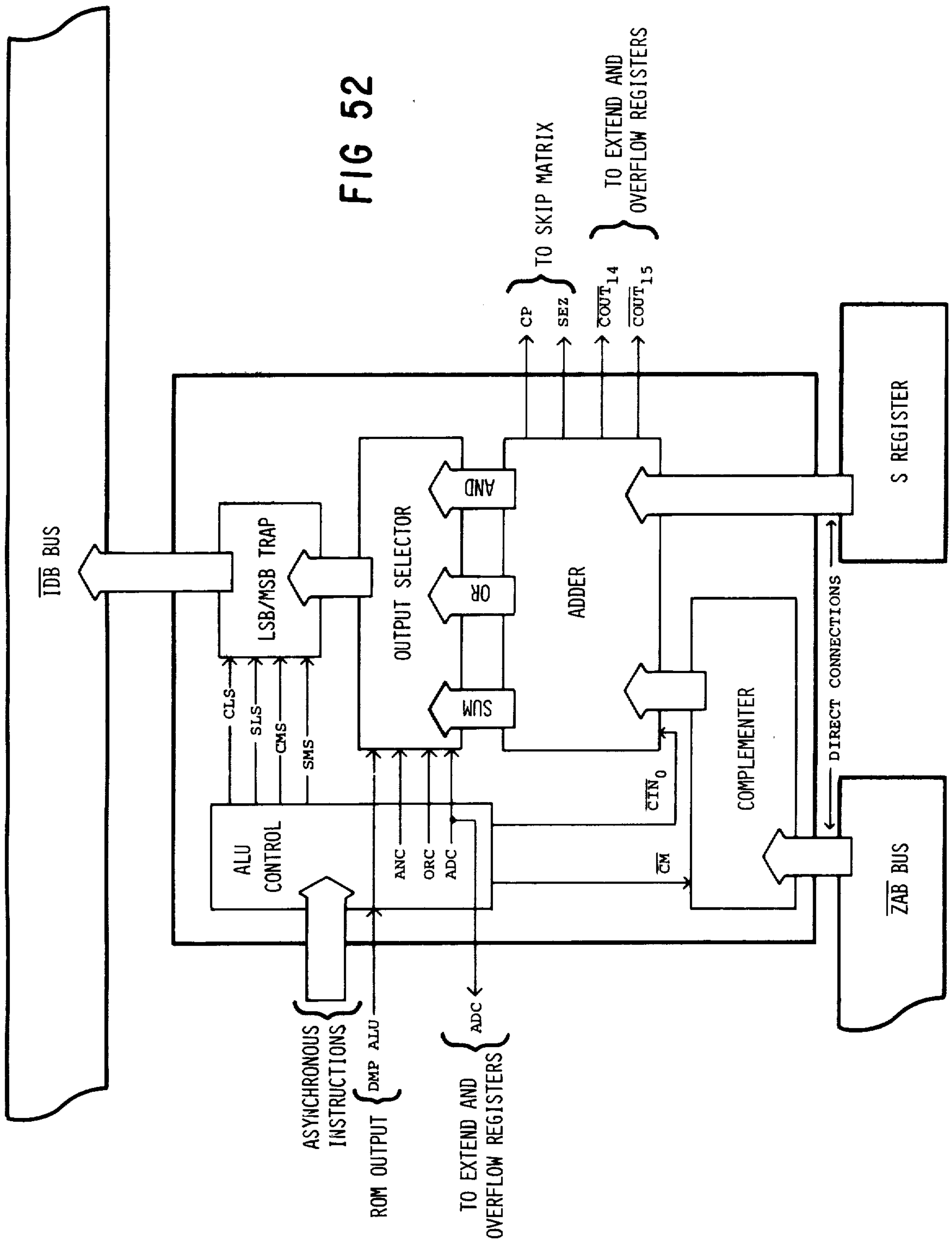
FIG. 52 is a detailed schematic diagram of the ALU of FIGS. 25A–B.
Figure 53:
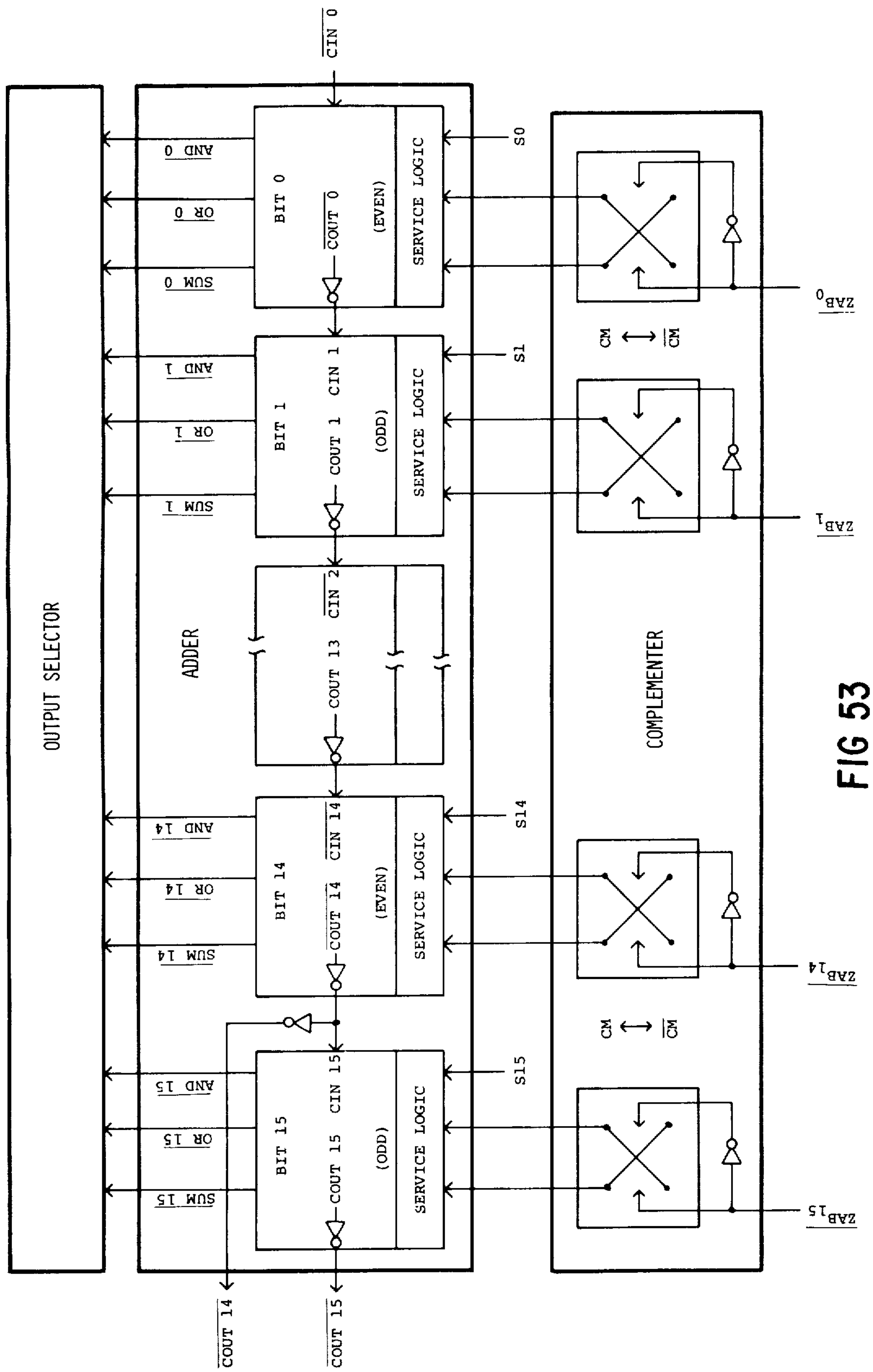
FIG. 53 is a detailed block diagram of the adder and complementer of FIG. 52.
Figure 54:
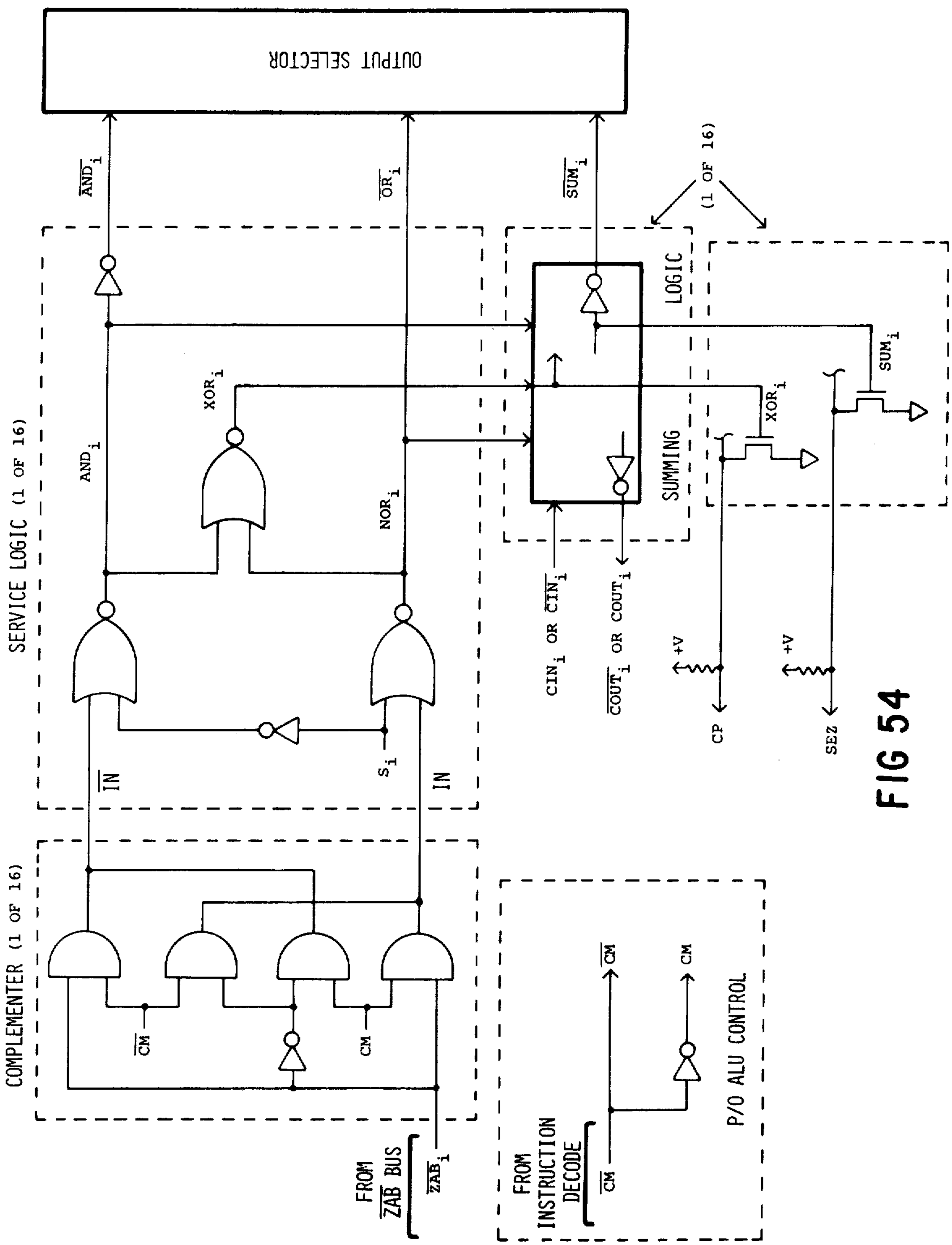
FIG. 54 is a detailed schematic diagram of the complementer of FIG. 53 together with its associated circuitry.
Figure 56:
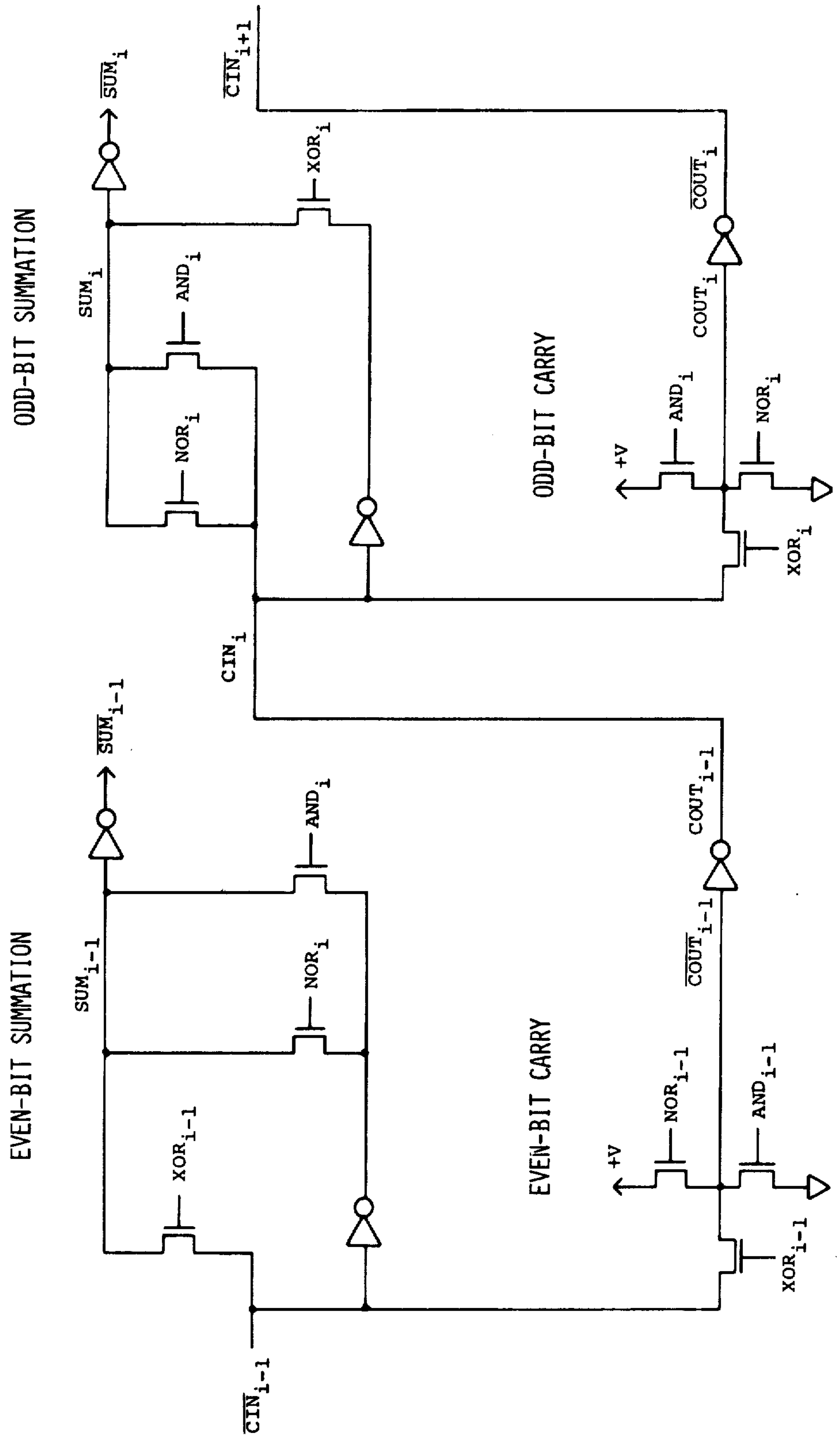
FIG. 56 is a detailed schematic diagram of a portion of the circuitry within the adder of FIG. 53.
Figure 57:
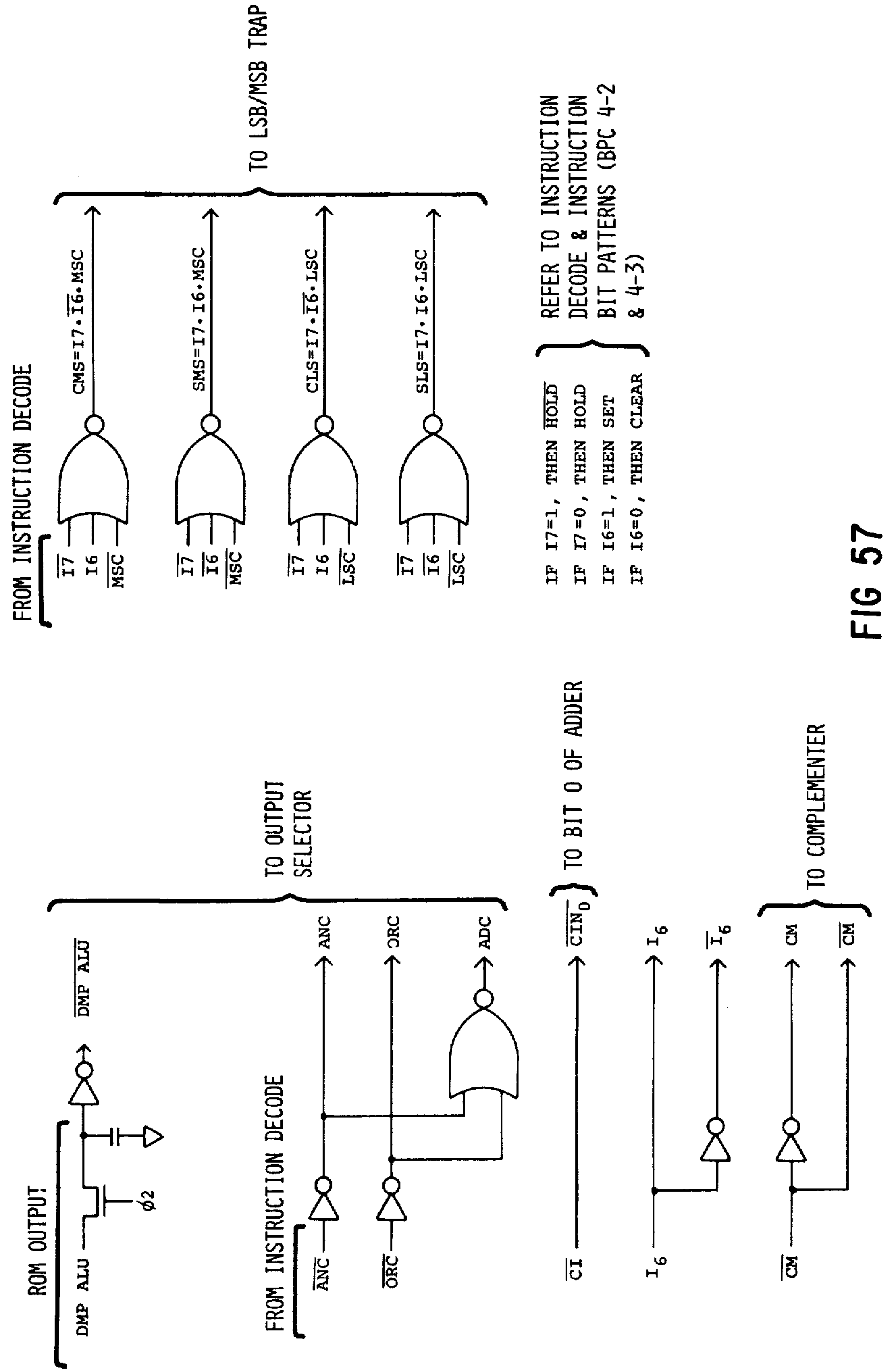
FIG. 57 is a detailed schematic diagram of the ALU control block of FIG. 52.
Figure 58:
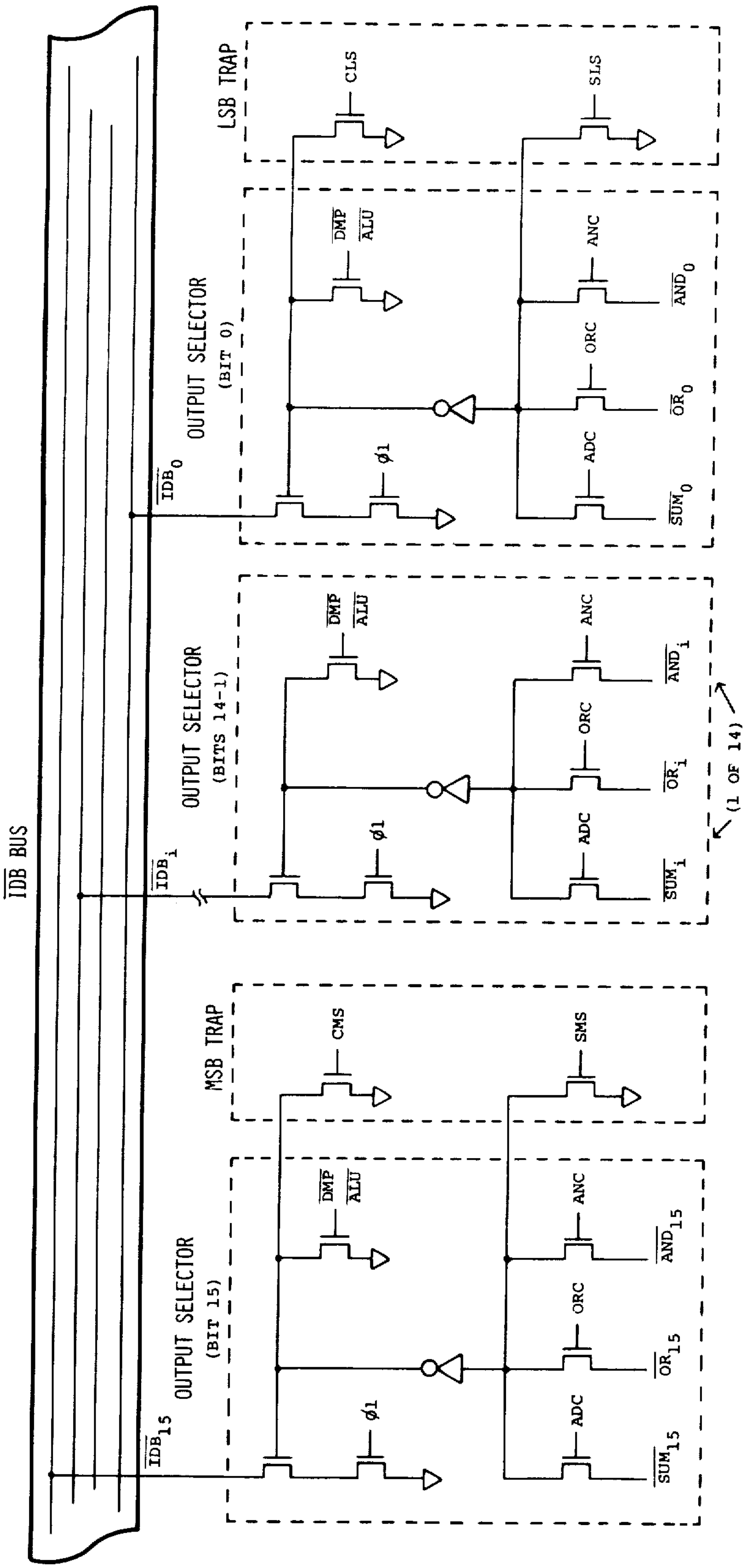
FIG. 58 is a detailed schematic diagram of the output selector and LSB/MSB trap blocks of FIG. 52.
Figure 59:
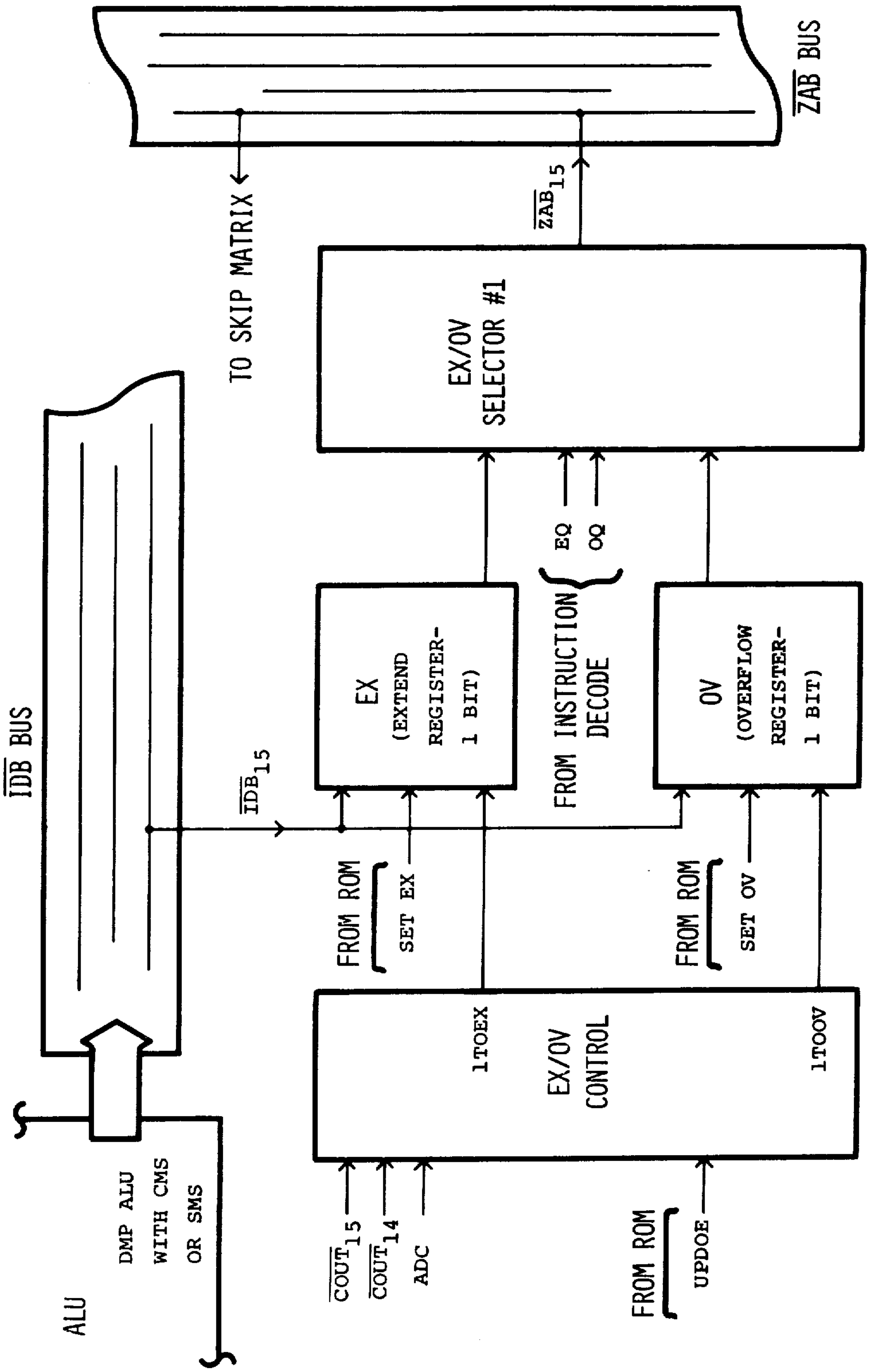
FIG. 59 is a detailed block diagram of the extend and overflow registers of FIGS. 25A–N in a non-ERA mode.
Figure 60:
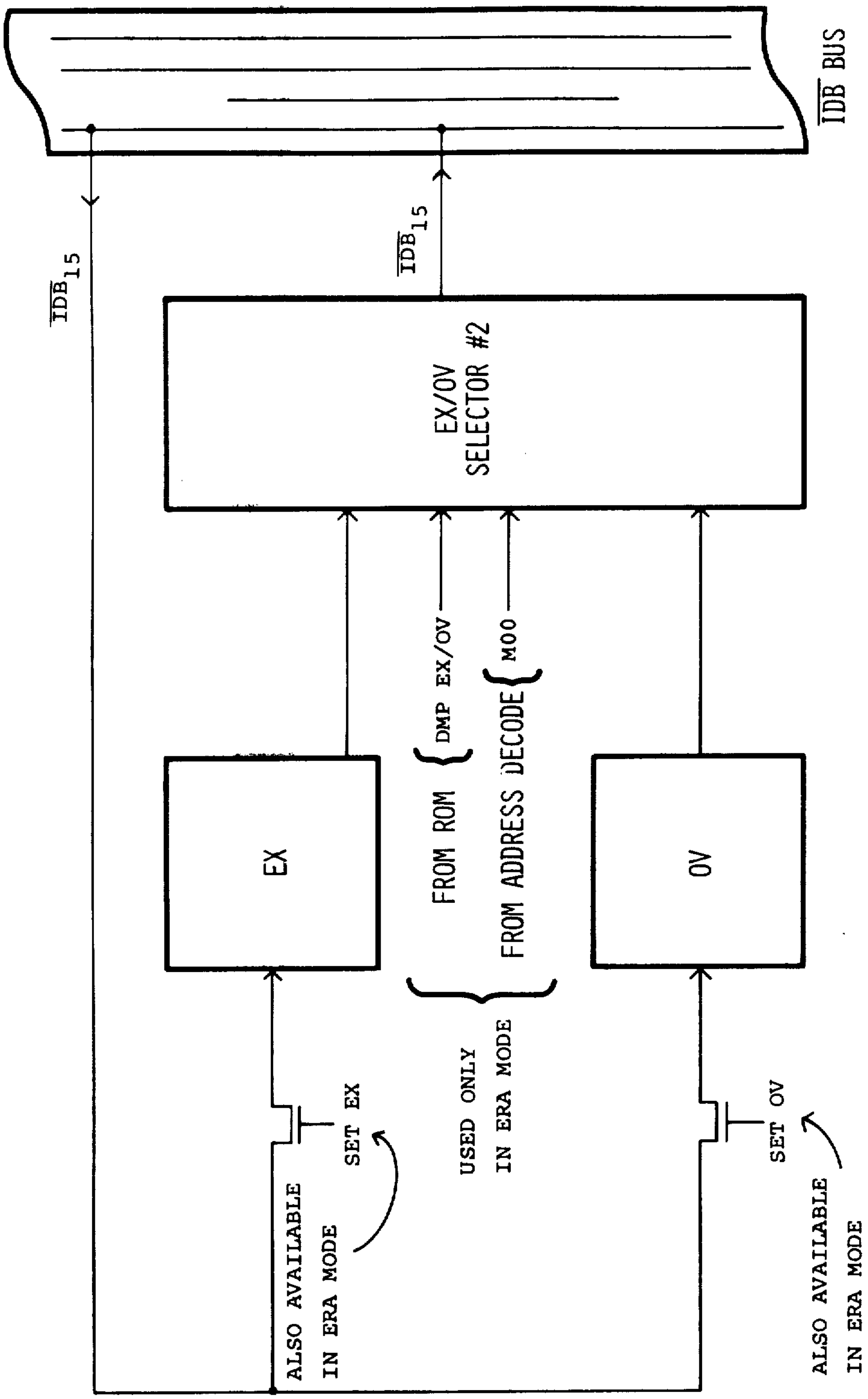
FIG. 60 is a detailed block diagram of the extend and overflow registers of FIGS. 25A–B connected in a non-ERA mode.
Figure 61:
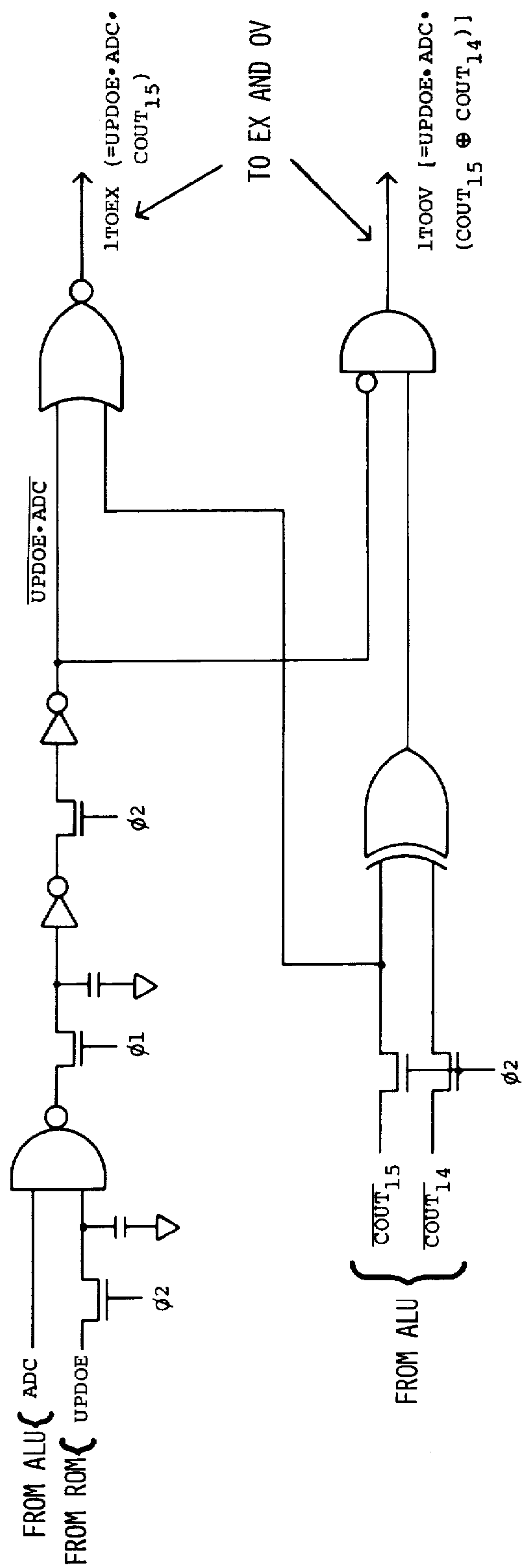
FIG. 61 is a detailed schematic diagram of the EX/OV control block FIG. 59.
Figure 62:
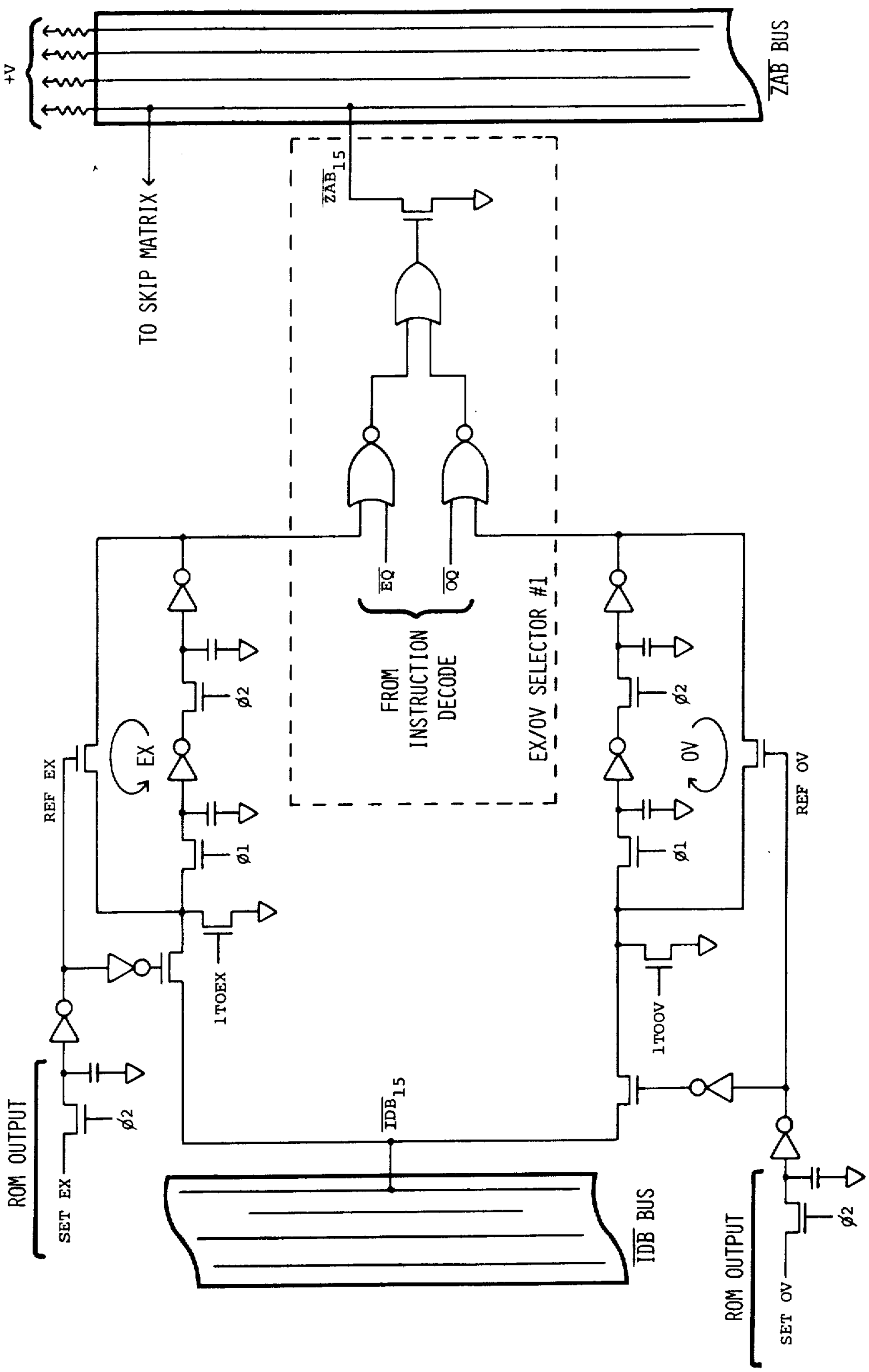
FIG. 62 is a detailed schematic diagram of the extend, overflow, set EX, set OV, and EX/OV selector #1 blocks of FIG. 59.
Figure 63:
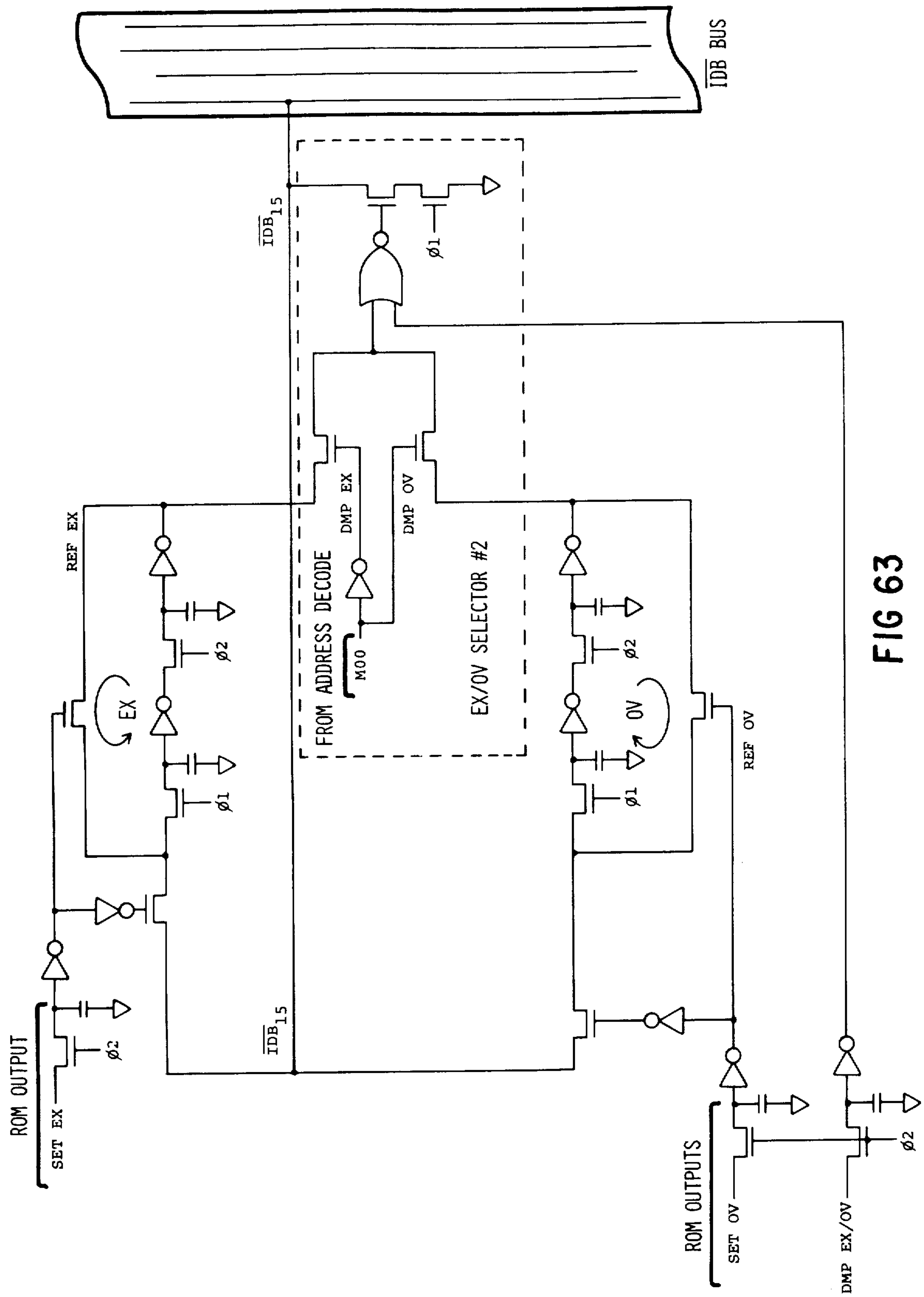
FIG. 63 is a detailed schematic diagram of EX, OV, and EX/OV selector #2 of blocks of FIG. 60.
Figure 64:
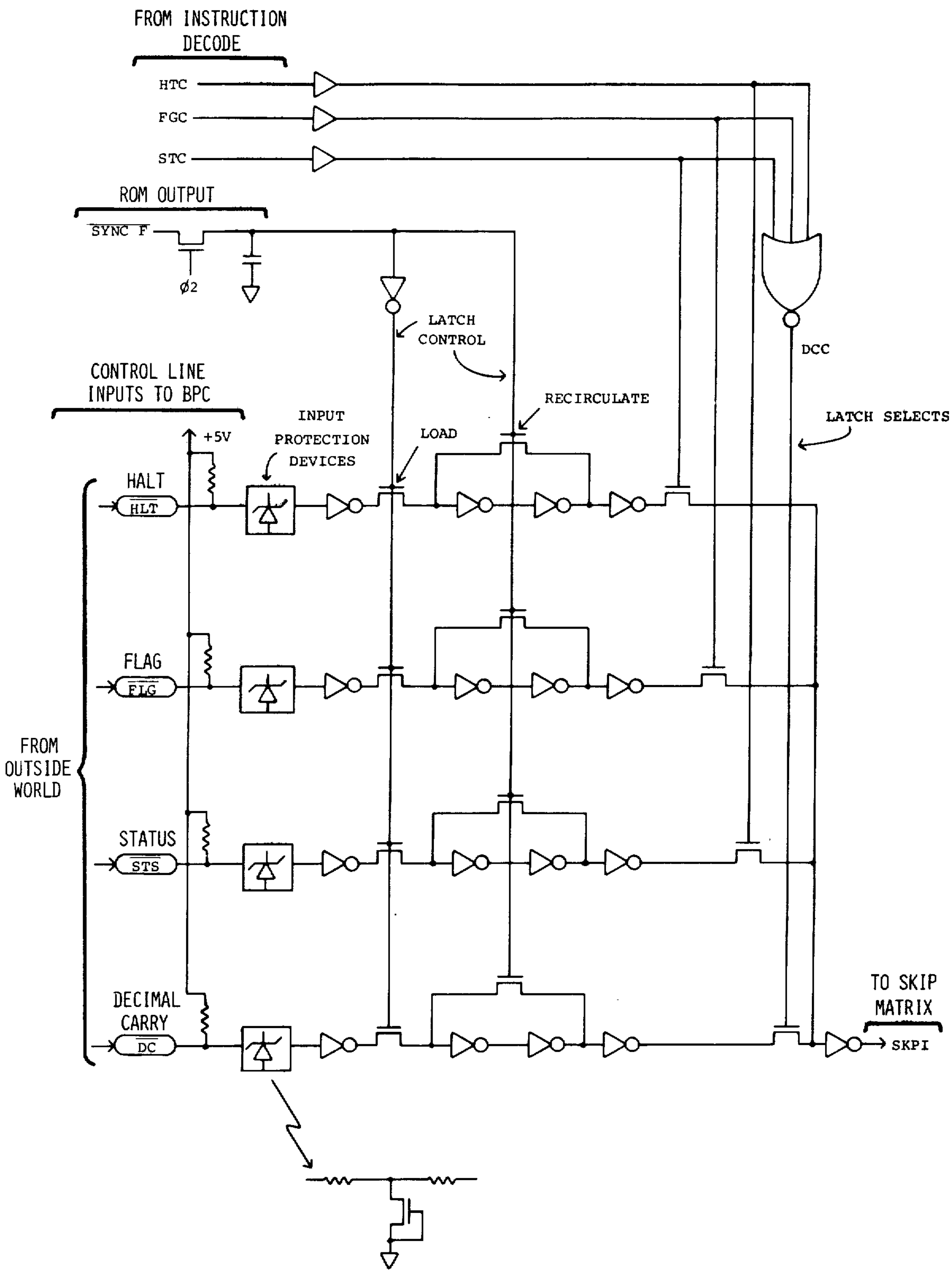
FIG. 64 is a detailed schematic diagram of the flag multiplexor of FIGS. 25A–B.
Figure 65:
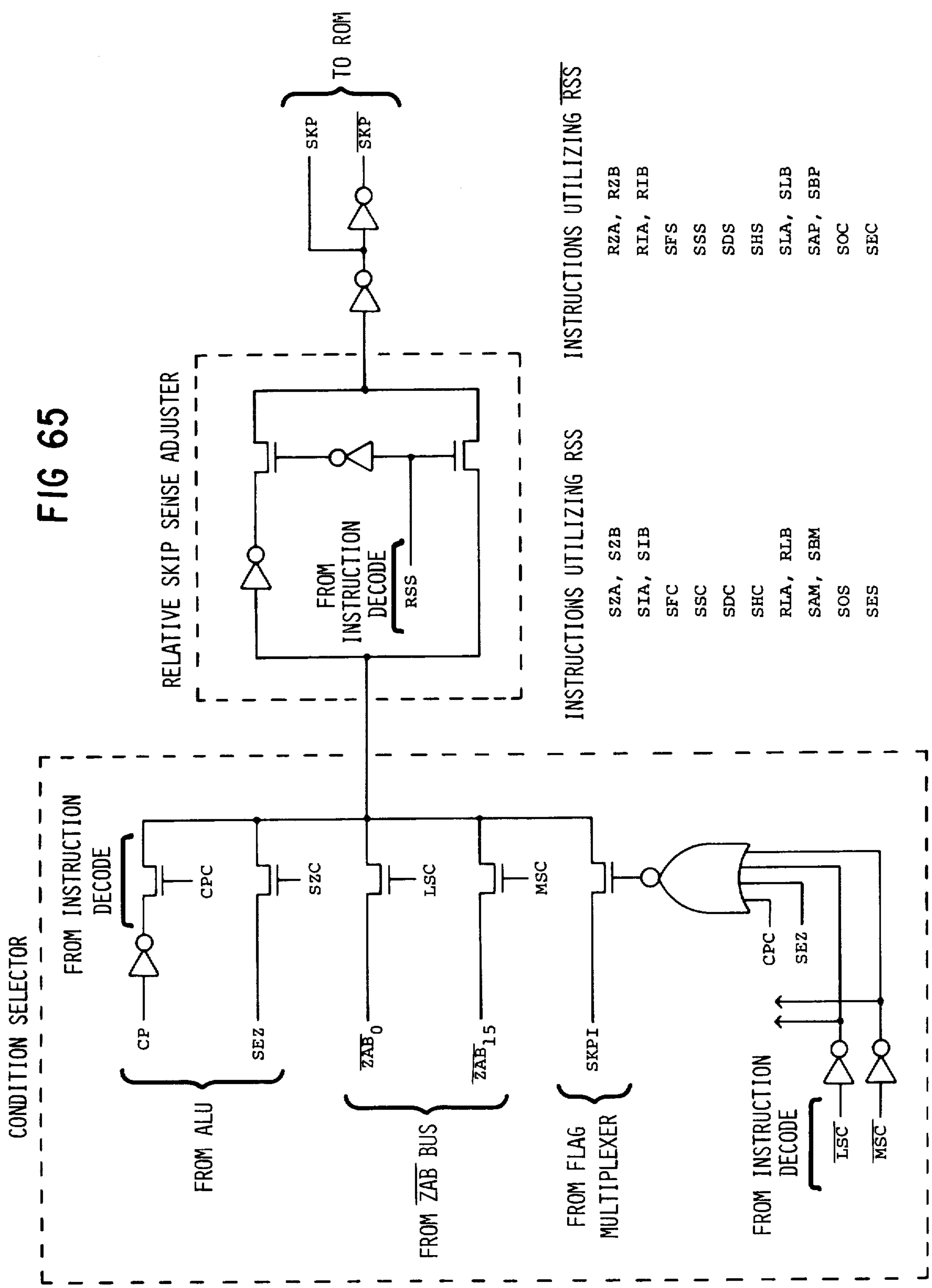
FIG. 65 is a detailed schematic diagram of the skip matrix of FIGS. 25–B.
Figure 66:
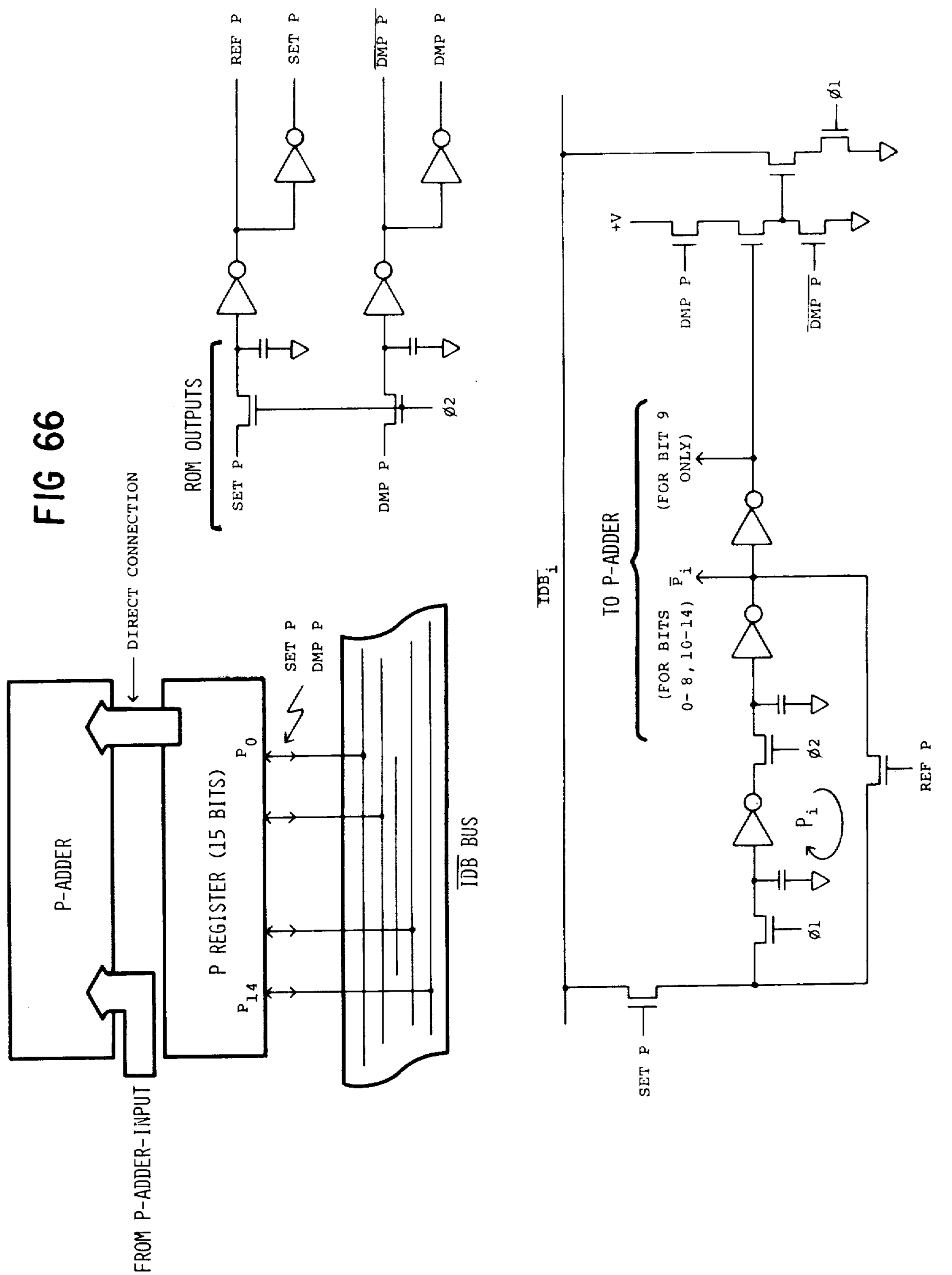
FIG. 66 is a detailed schematic diagram of the P register of FIGS. 25A–B.
Figure 67:
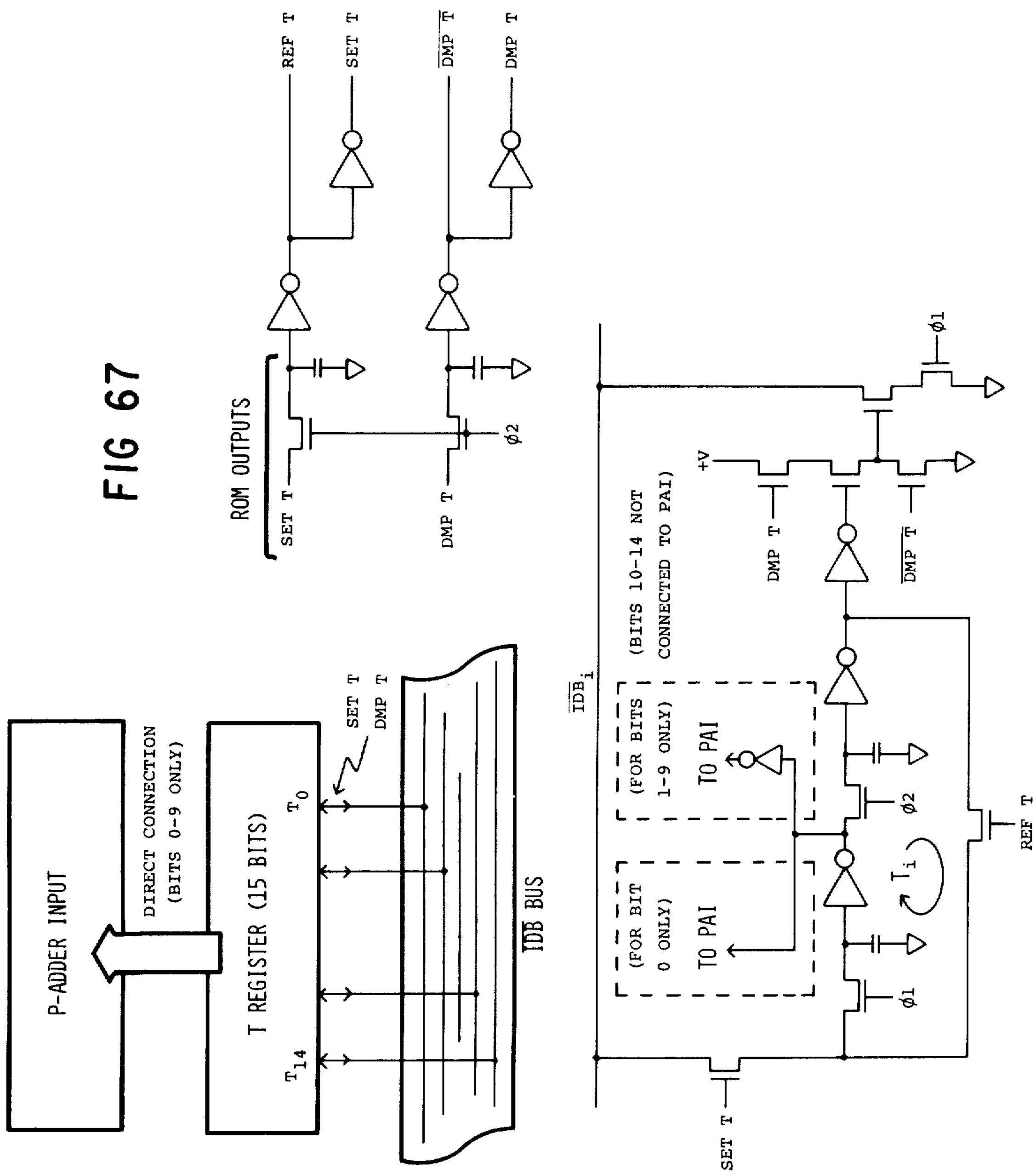
FIG. 67 is a detailed schematic diagram of the T register of FIGS. 25A–B.
Figure 68:
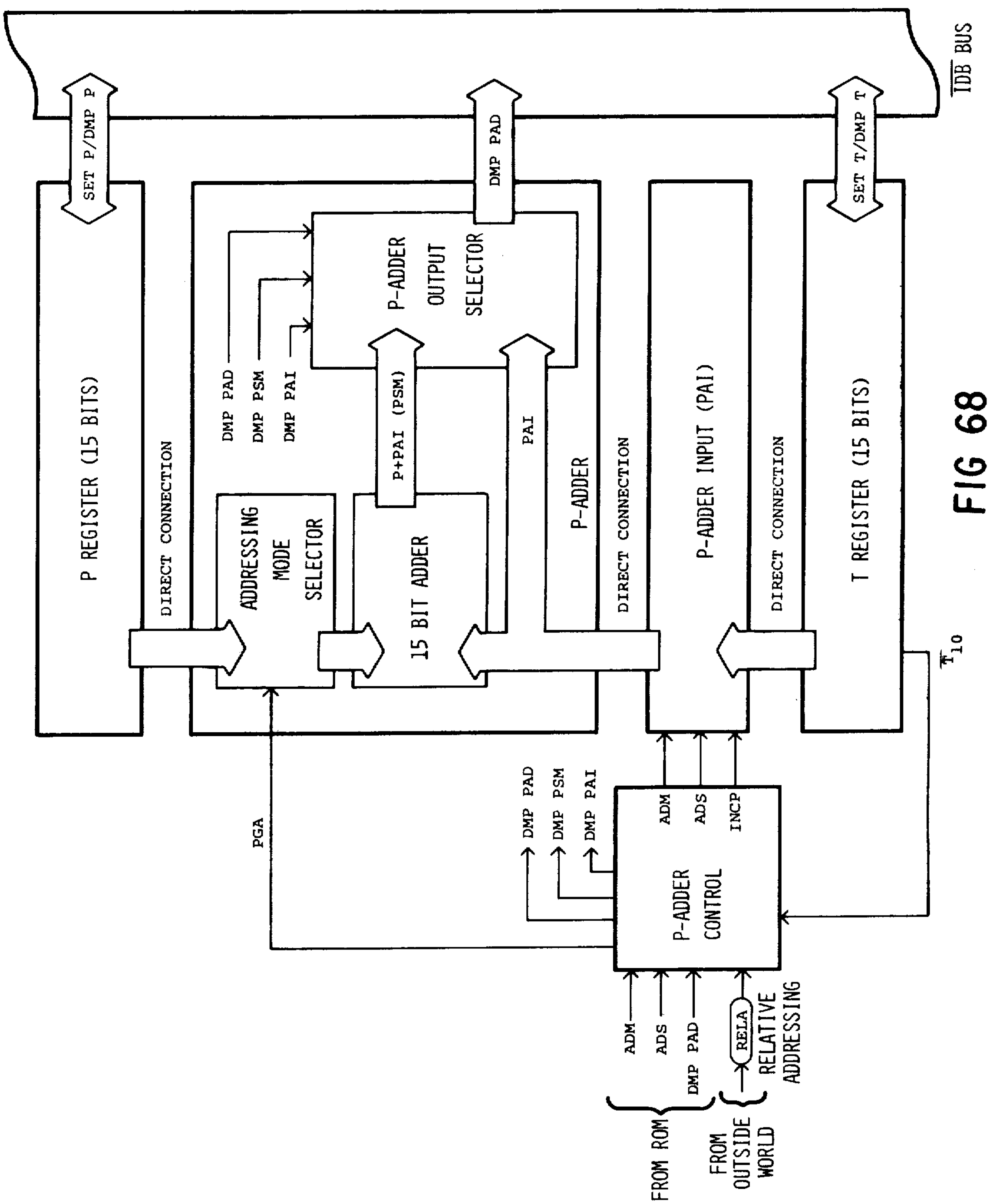
FIG. 68 is a detailed block diagram of a portion of the overall block diagram of FIGS. 25A–B that comprises a program adder section.
Figure 69:
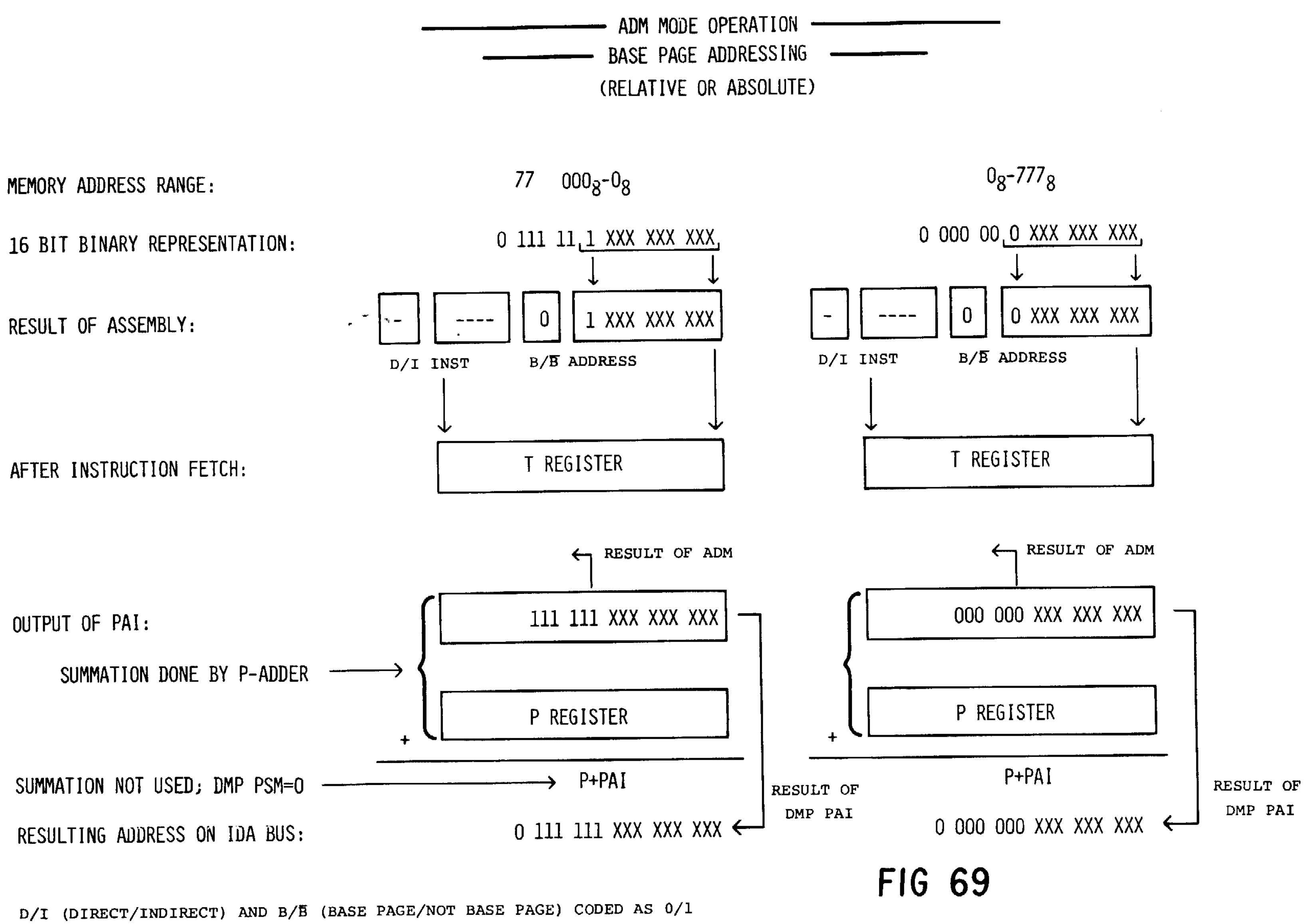
FIG. 69 is a diagram illustrating how the program adder section of FIG. 68 generates a 15-bit base page address from the 10-bit field of a memory reference instruction.
Figure 70:
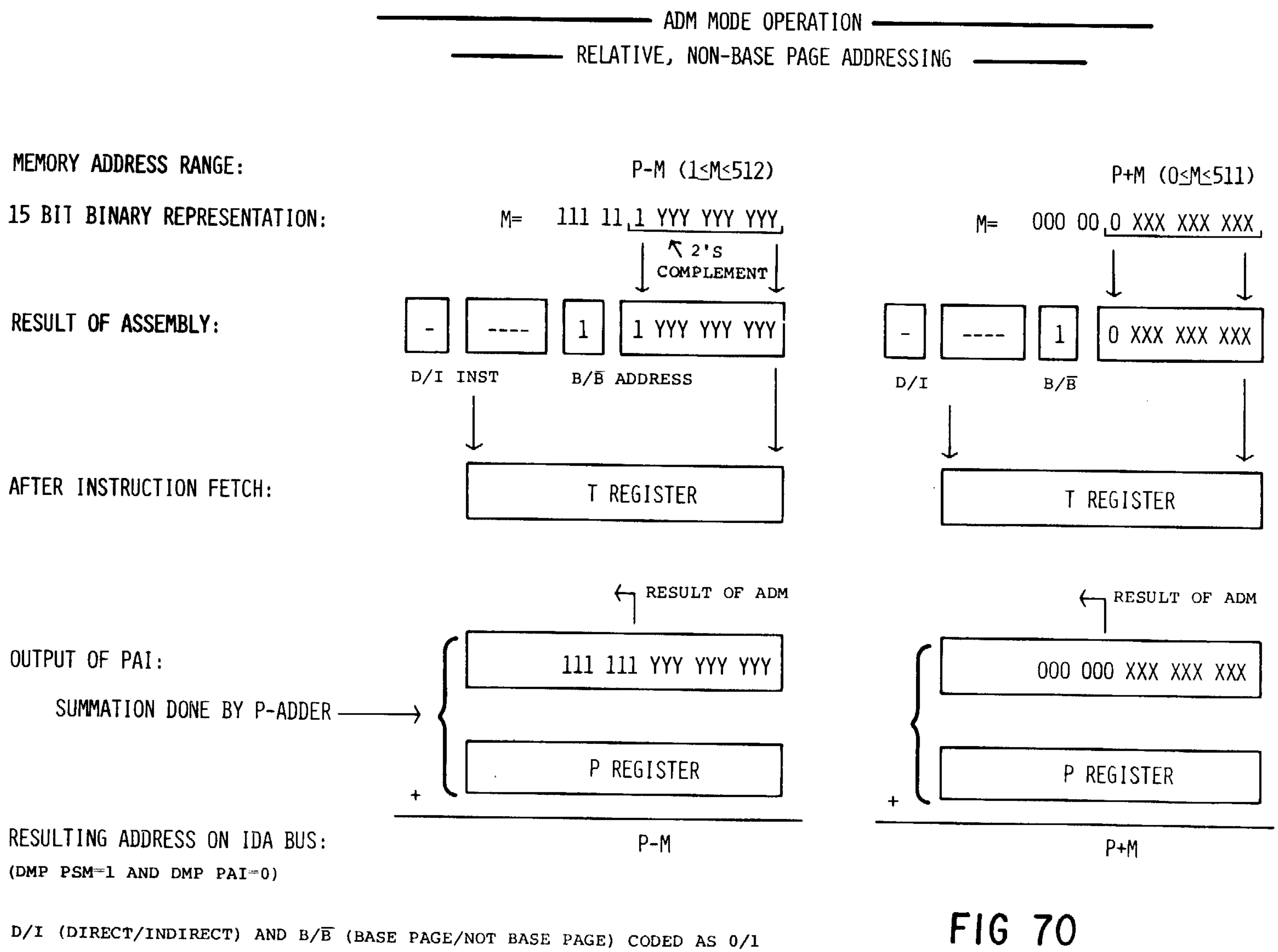
FIG. 70 is a diagram illustrating how the program adder section of FIG. 68 generates a 15-bit relative current page address from the 10-bit field of a memory reference instruction.
Figure 71:
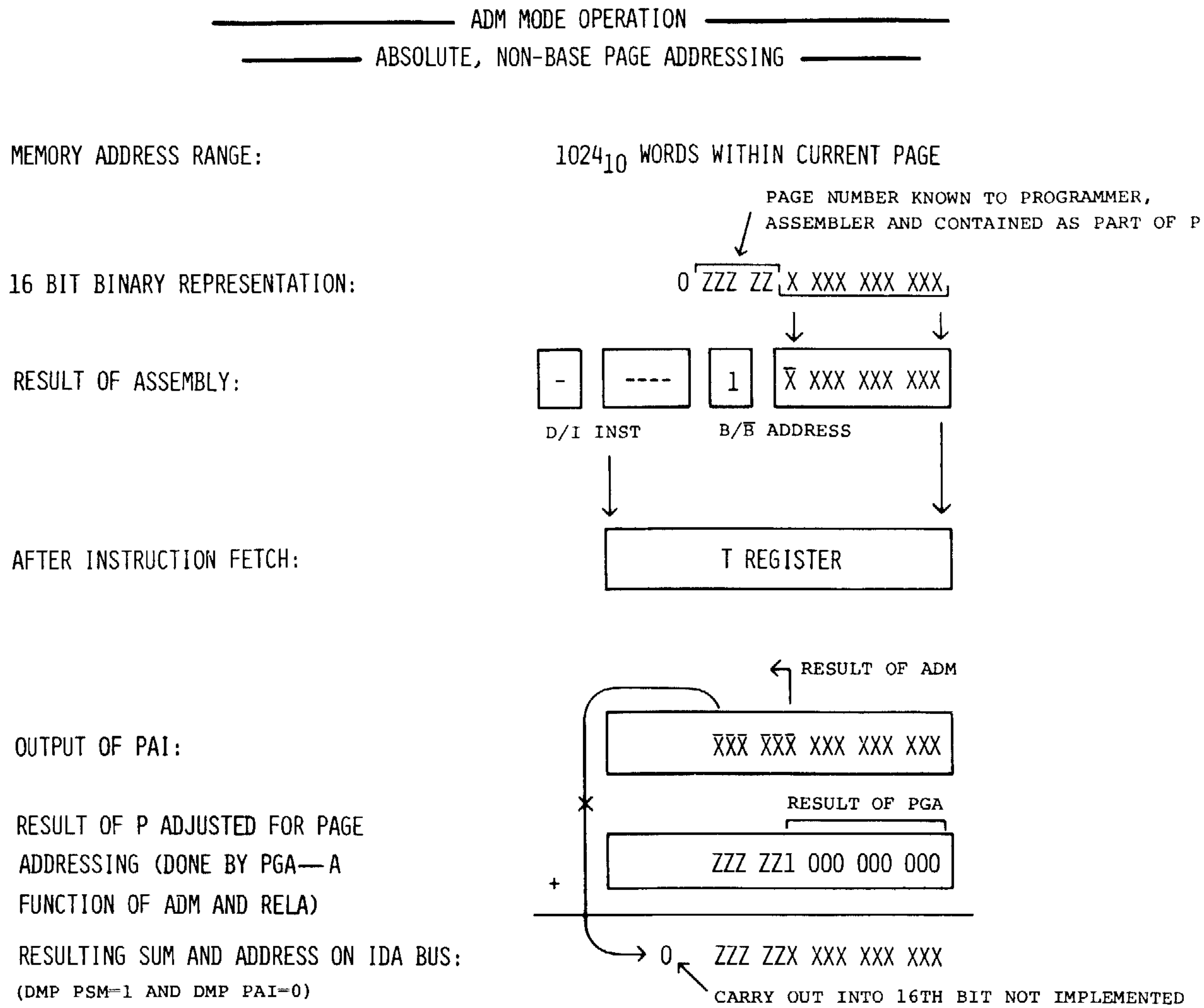
FIG. 71 is a diagram illustrating how the program adder section of FIG. 68 generates a 15-bit absolute current page address from the 10-bit field of a memory reference instruction.
Figure 72:
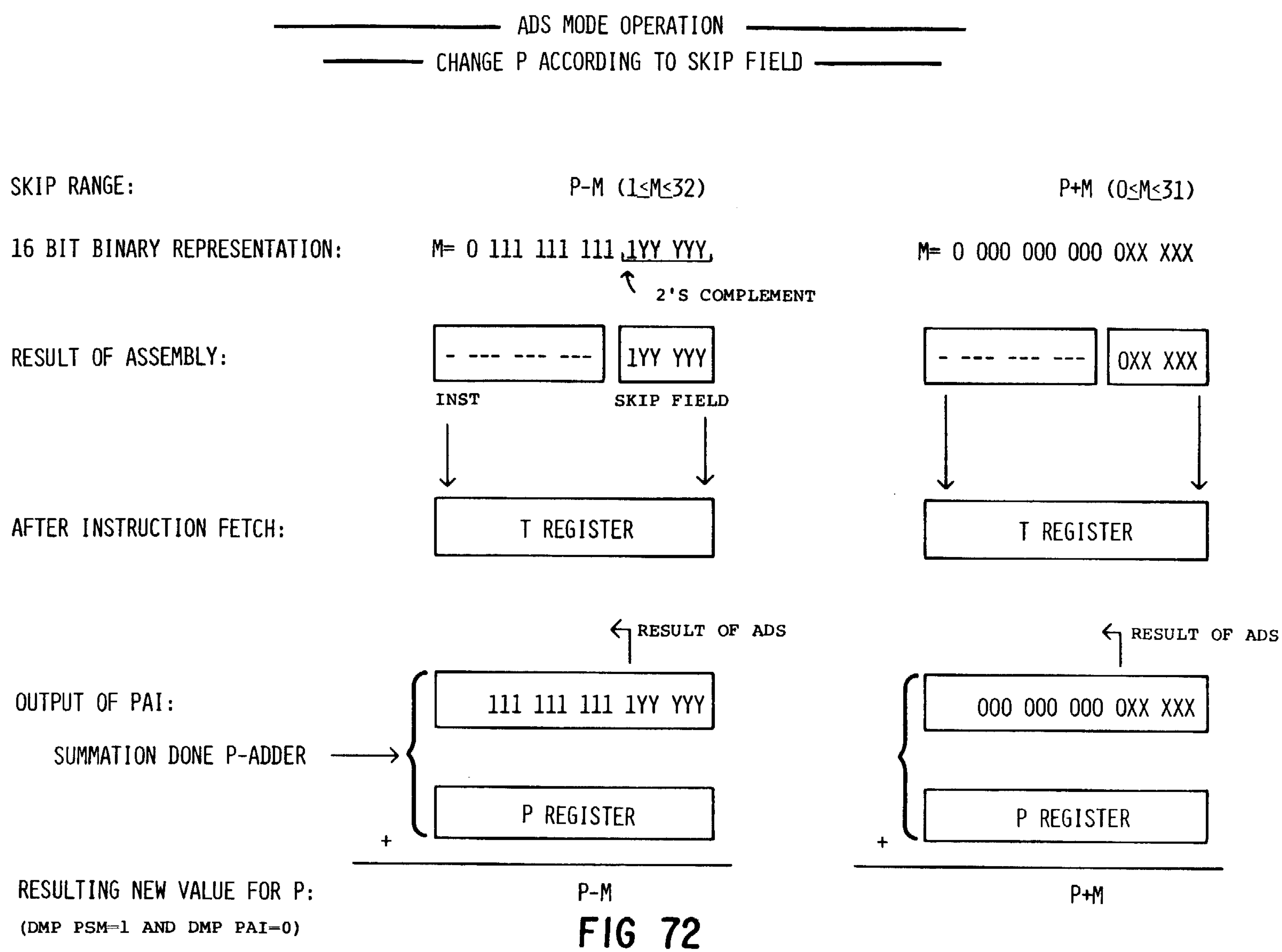
FIG. 72 is a diagram illustrating how the program adder section of FIG. 68 generates a 15-bit memory address from the 6-bit field of a skip instruction.
Figure 73:
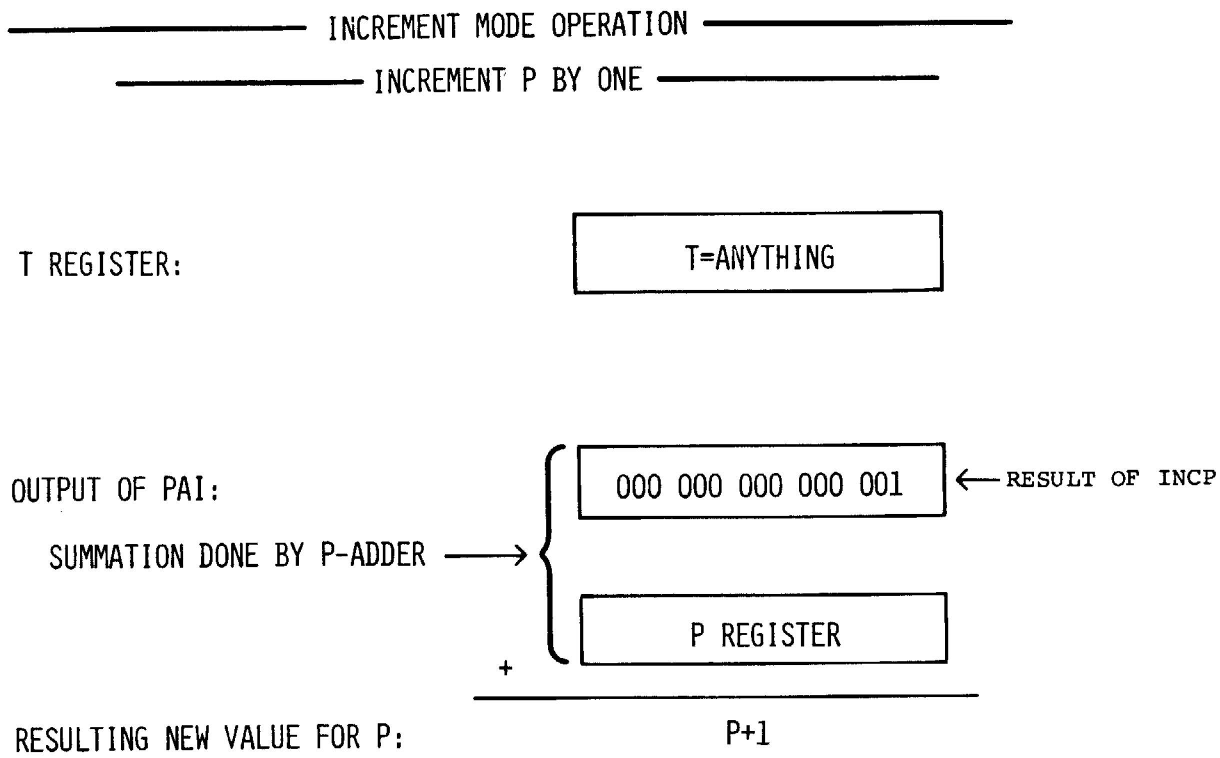
FIG. 73 is a diagram illustrating the increment P mode of operation of the program adder section of FIG. 68.
Figure 74:
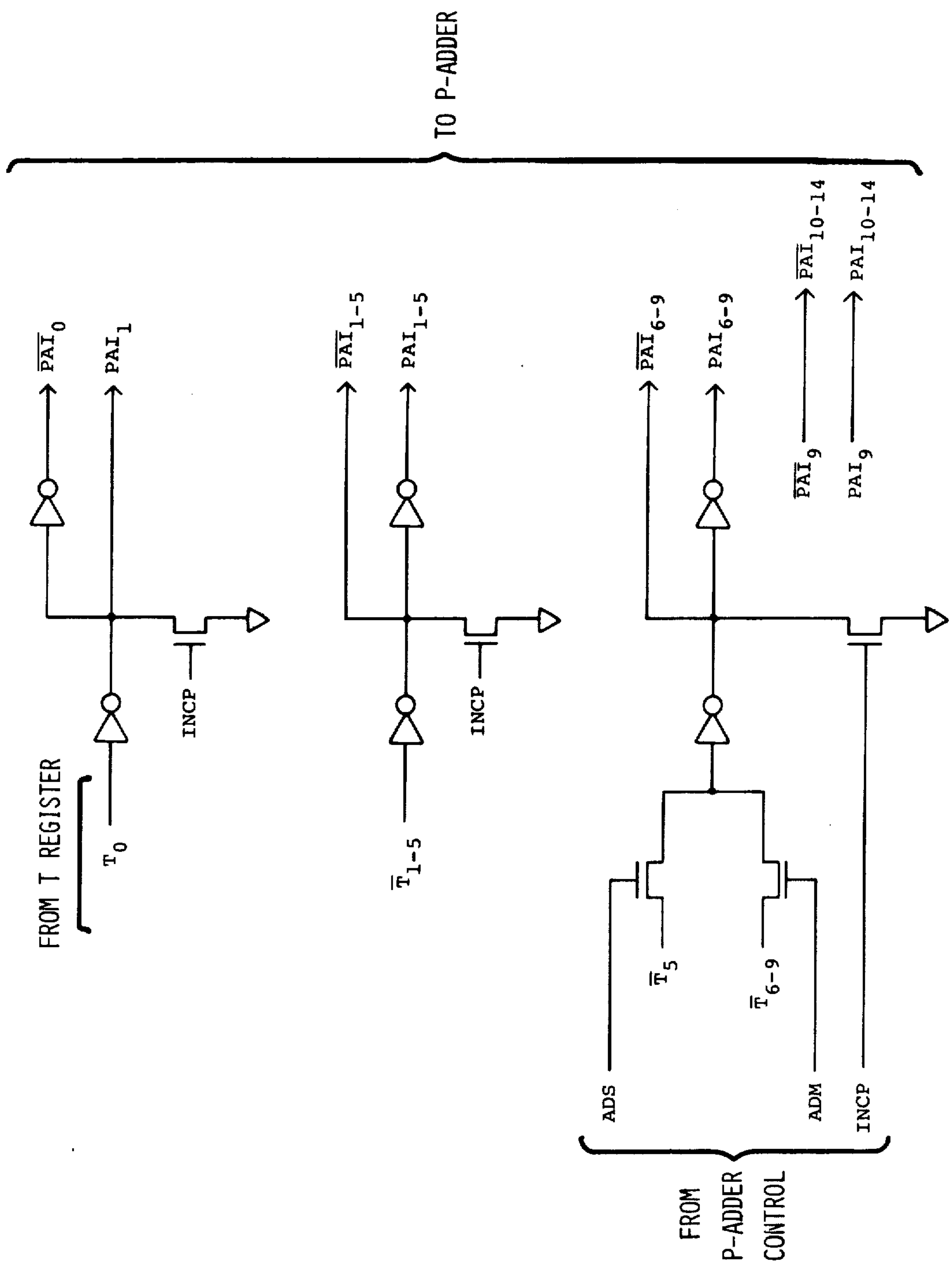
FIG. 74 is a detailed schematic diagram of the P-adder input (PAI) of FIG. 68.
Figure 75:
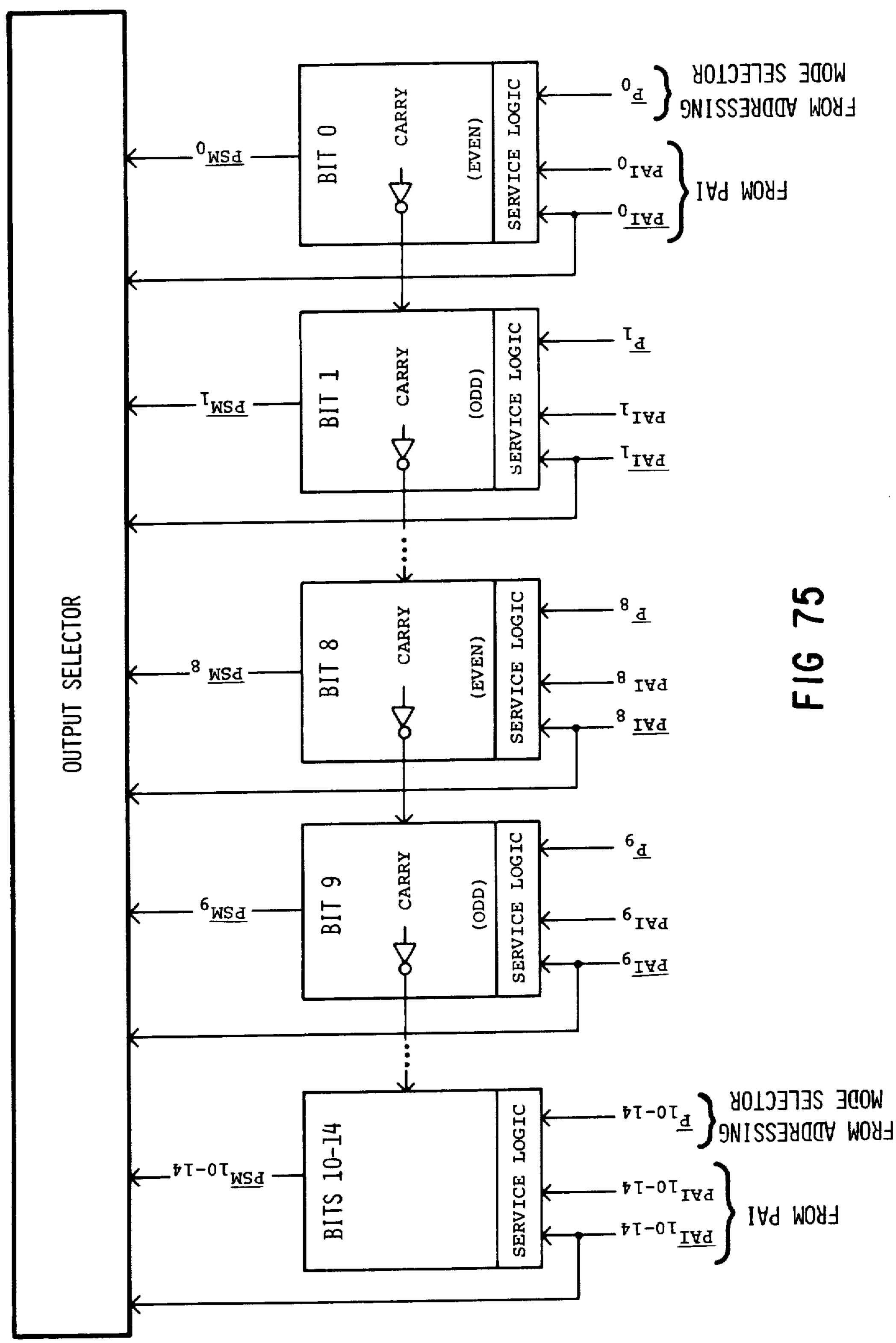
FIG. 75 is a detailed block diagram of the P-adder of FIG. 68.
Figure 76:
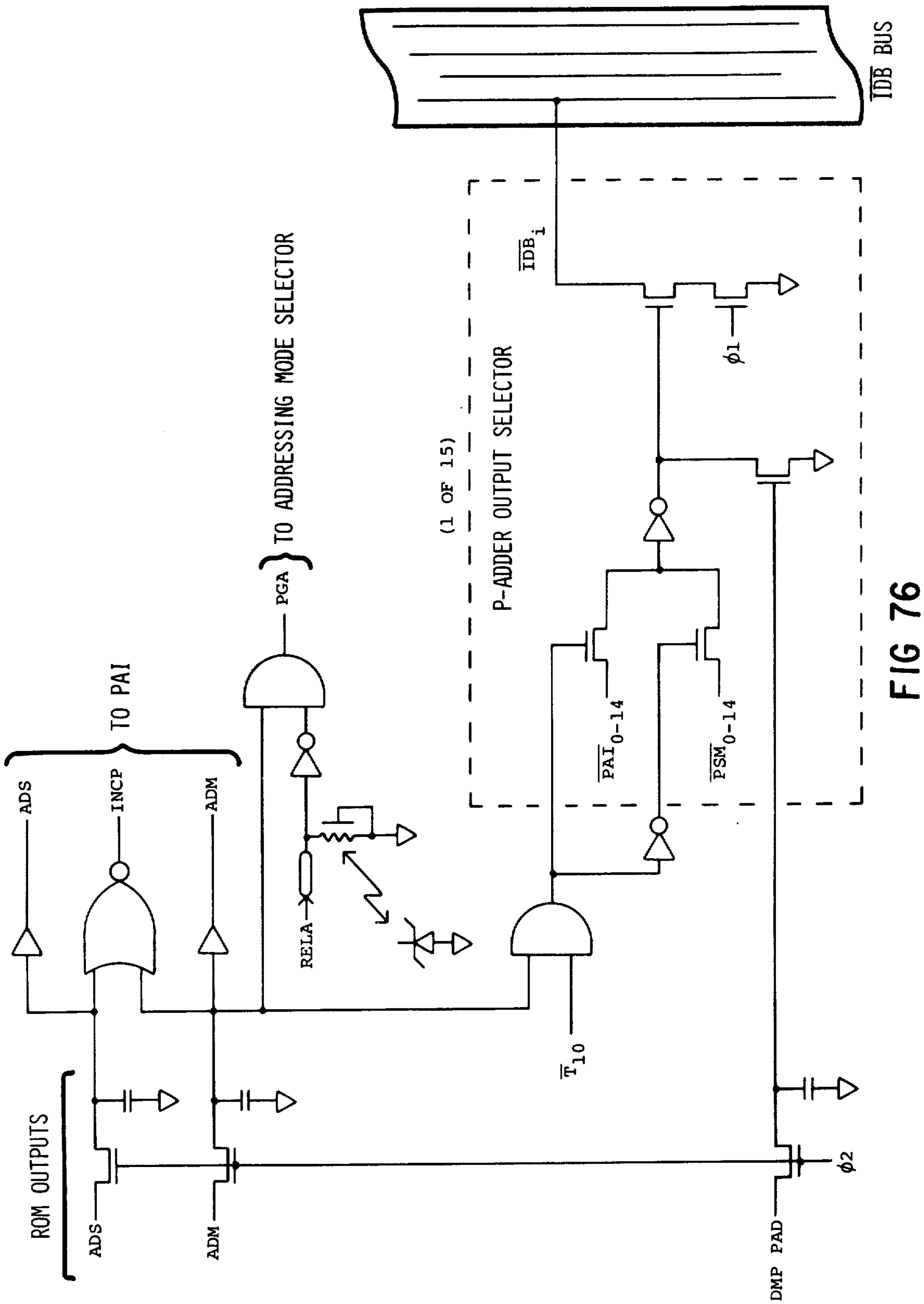
FIG. 76 is a detailed schematic diagram of the P-adder control and the P-adder output selector blocks of FIG. 68.
Figure 77:
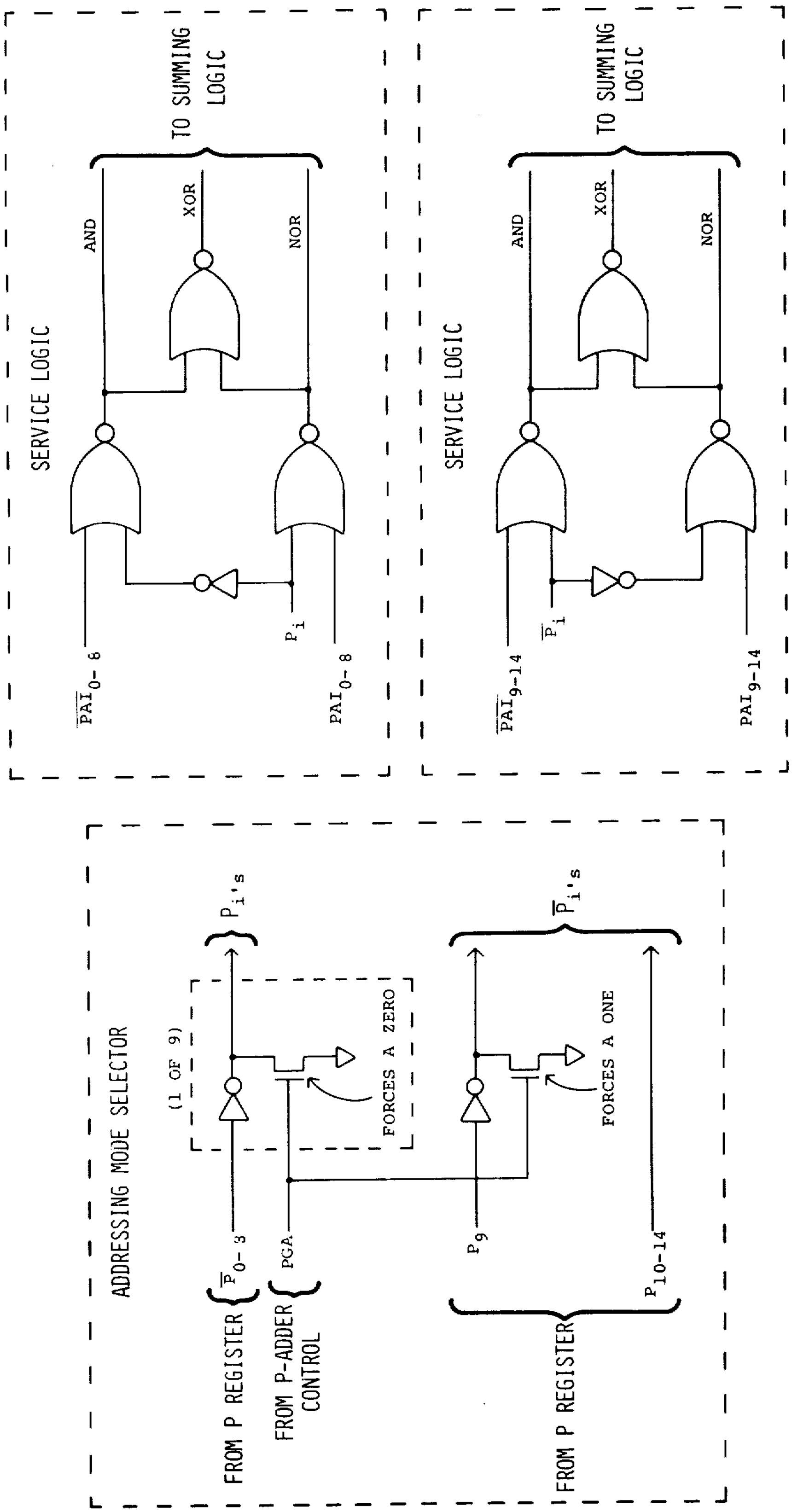
FIG. 77 is a detailed schematic diagram of the addressing mode selector of FIG. 68 and the service logic of FIG. 75.
Figure 78:
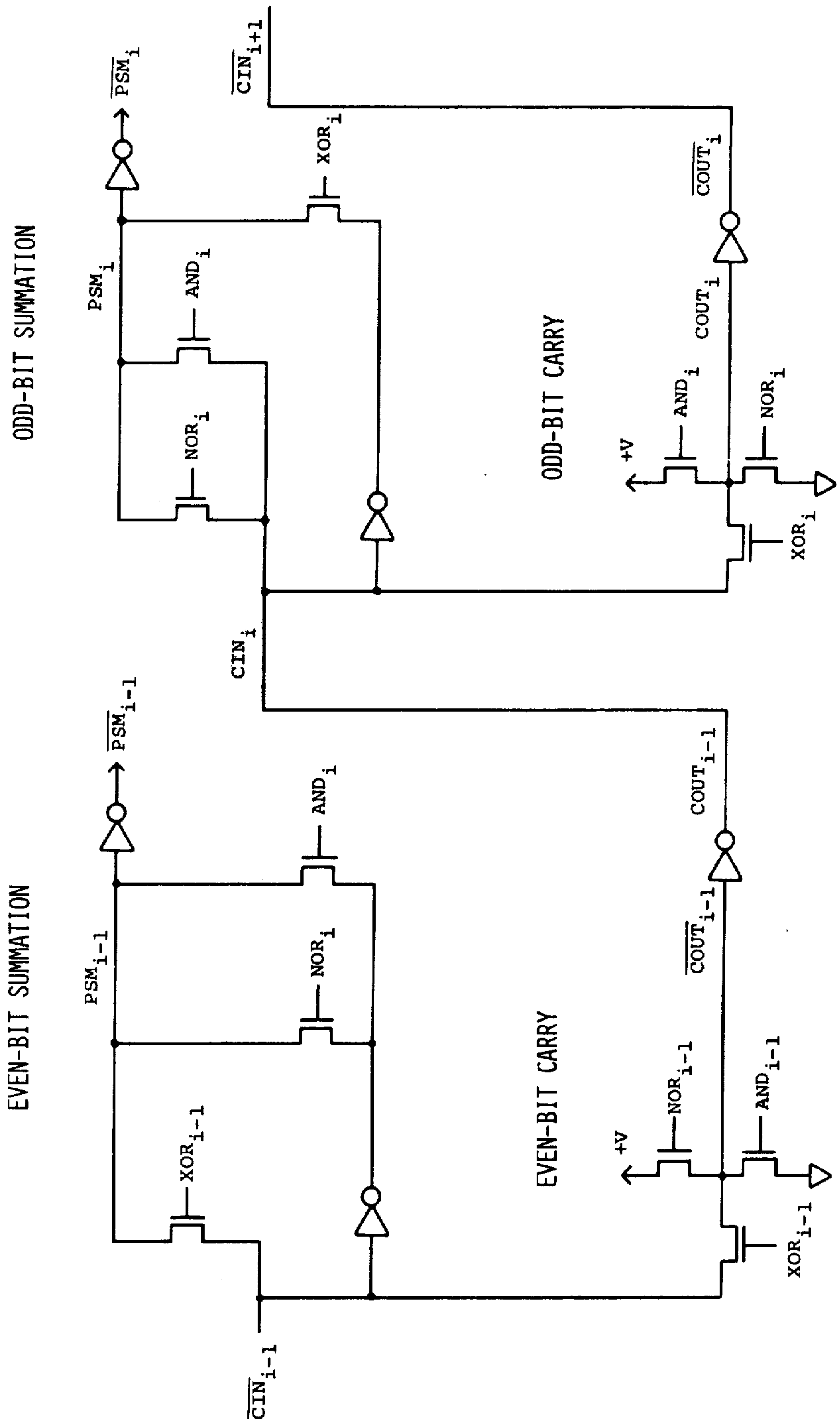
FIG. 78 is a detailed schematic diagram of the P-adder of FIG. 75.
Figure 79:
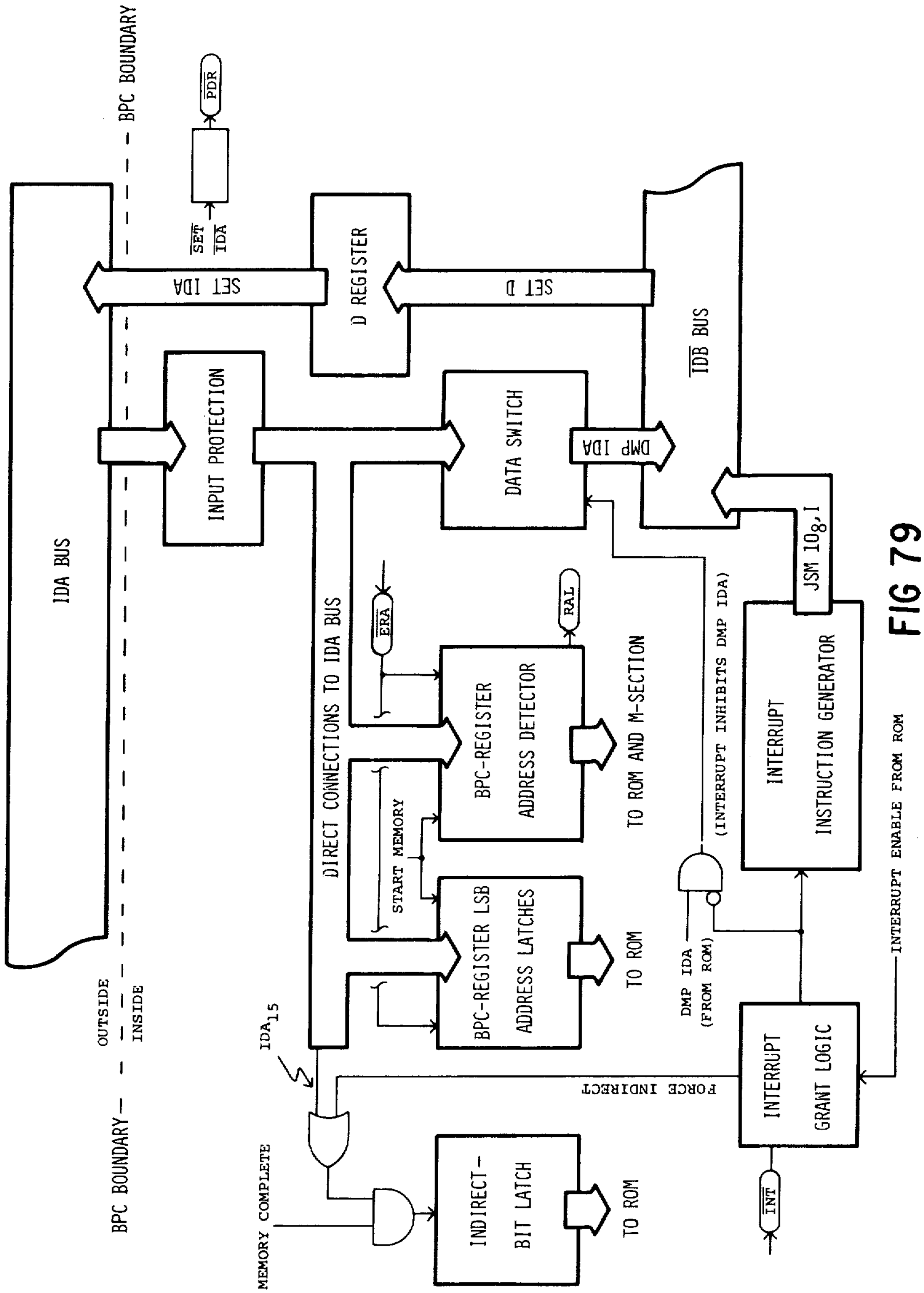
FIG. 79 is a detailed block diagram of the BPC register detection and address latches block and the indirect circuit of FIGS. 25A–B.
Figure 80:
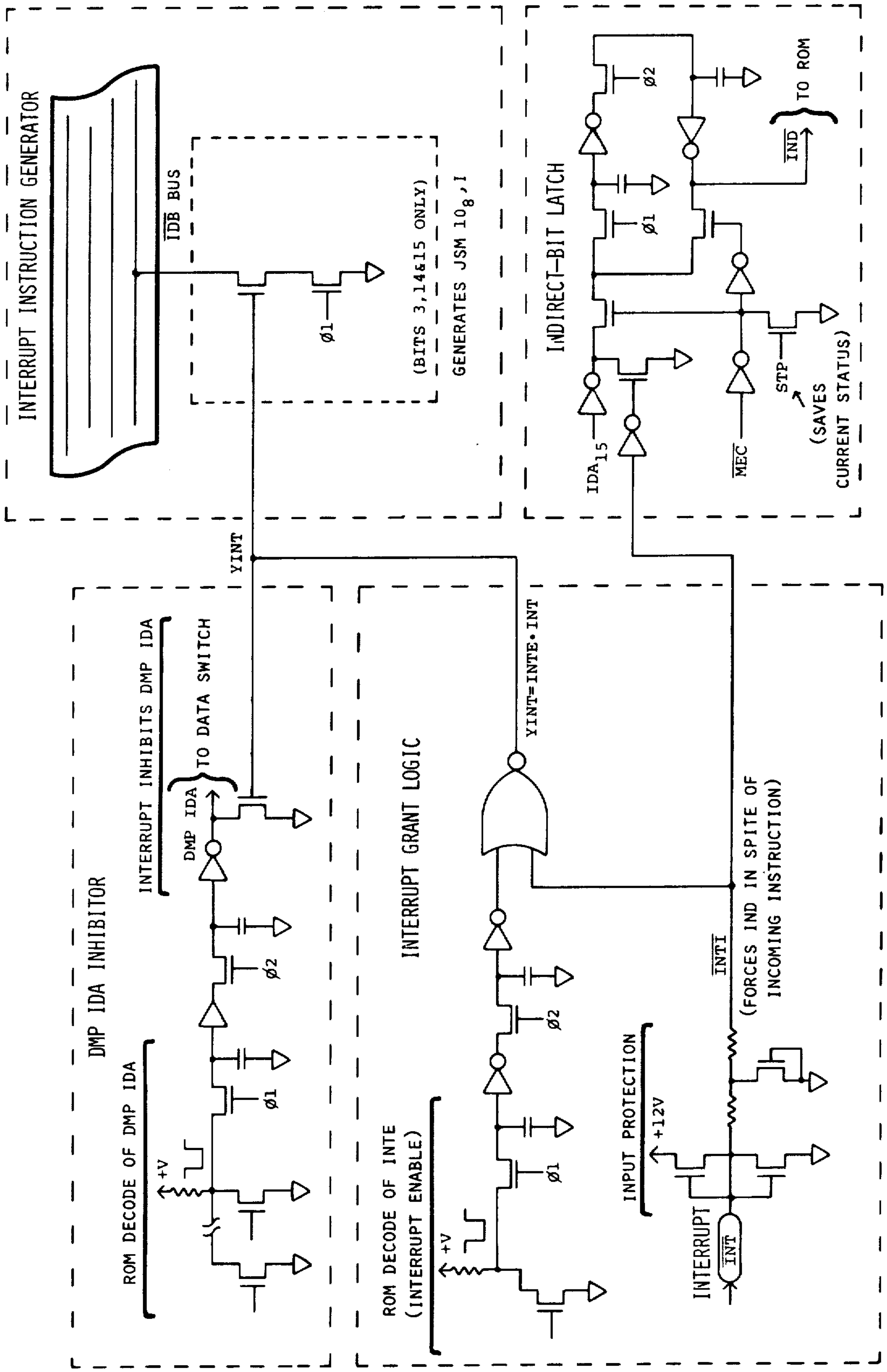
FIG. 80 is a detailed schematic diagram of a portion of the circuitry of FIG. 79.
Figure 81:
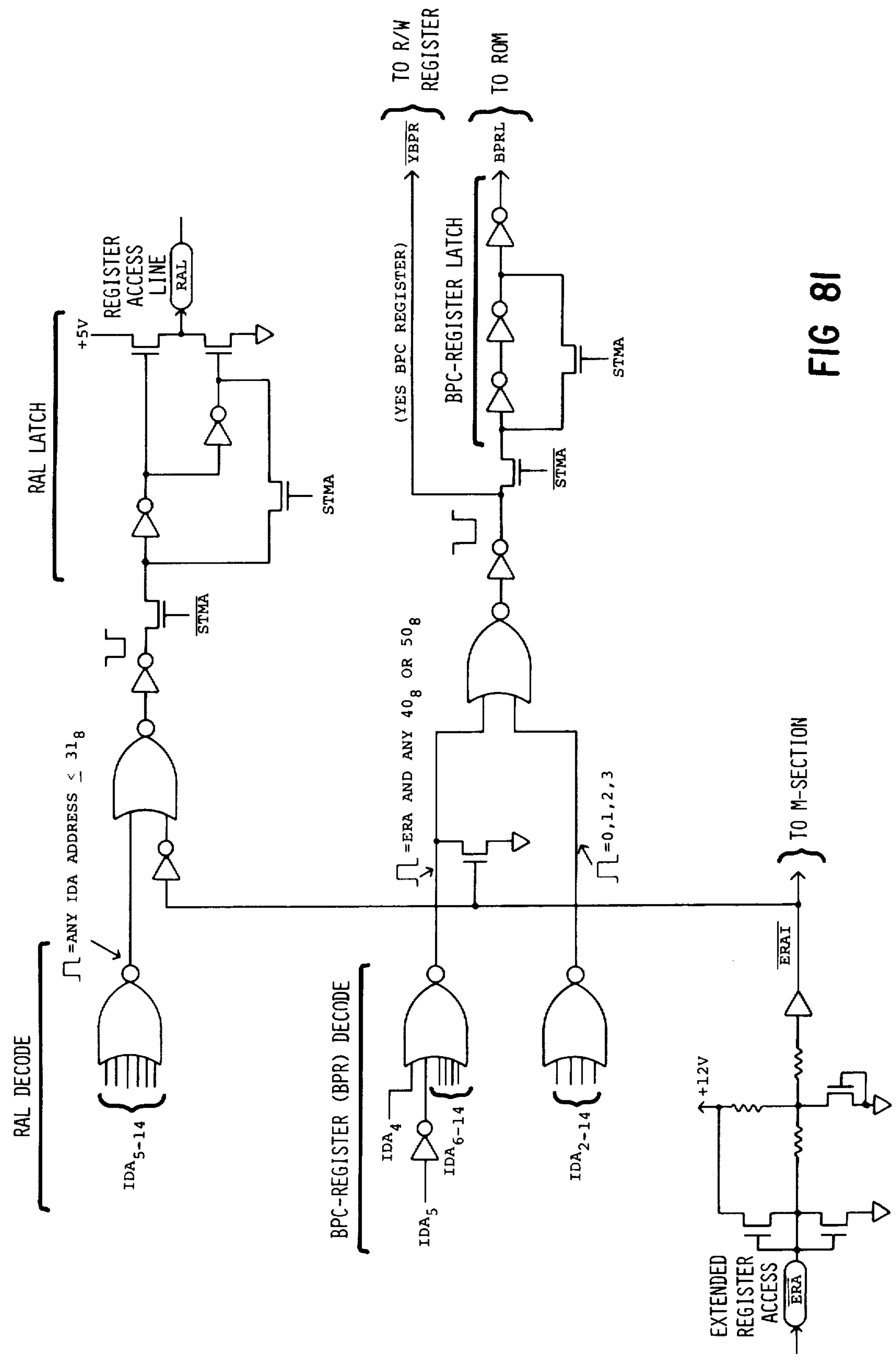
FIG. 81 is a detailed schematic diagram of the BPC-register address detector of FIG. 79.
Figure 82:
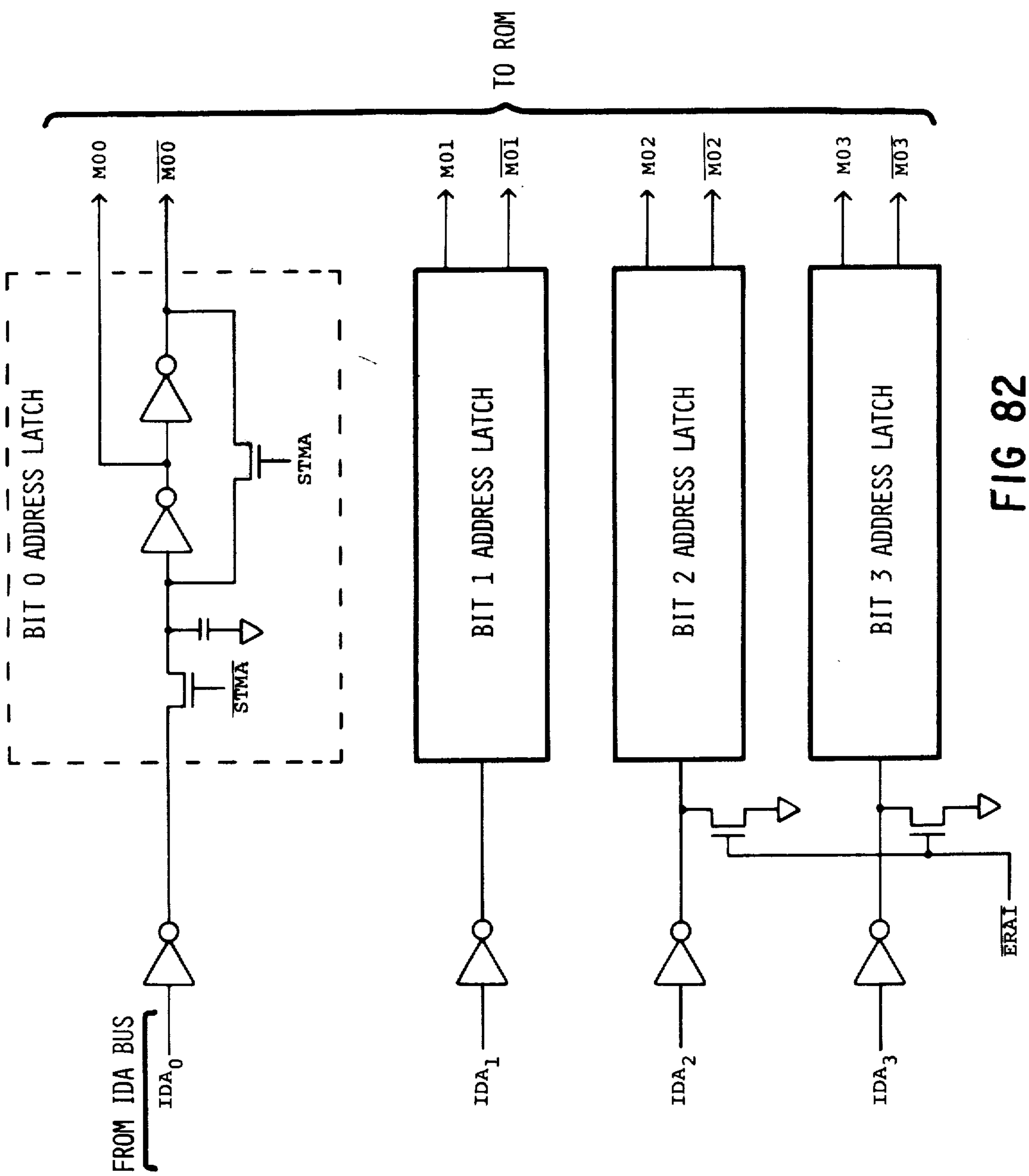
FIG. 82 is a detailed schematic diagram of the BPC-register LSB address latches of FIG. 79.
Figure 83A:
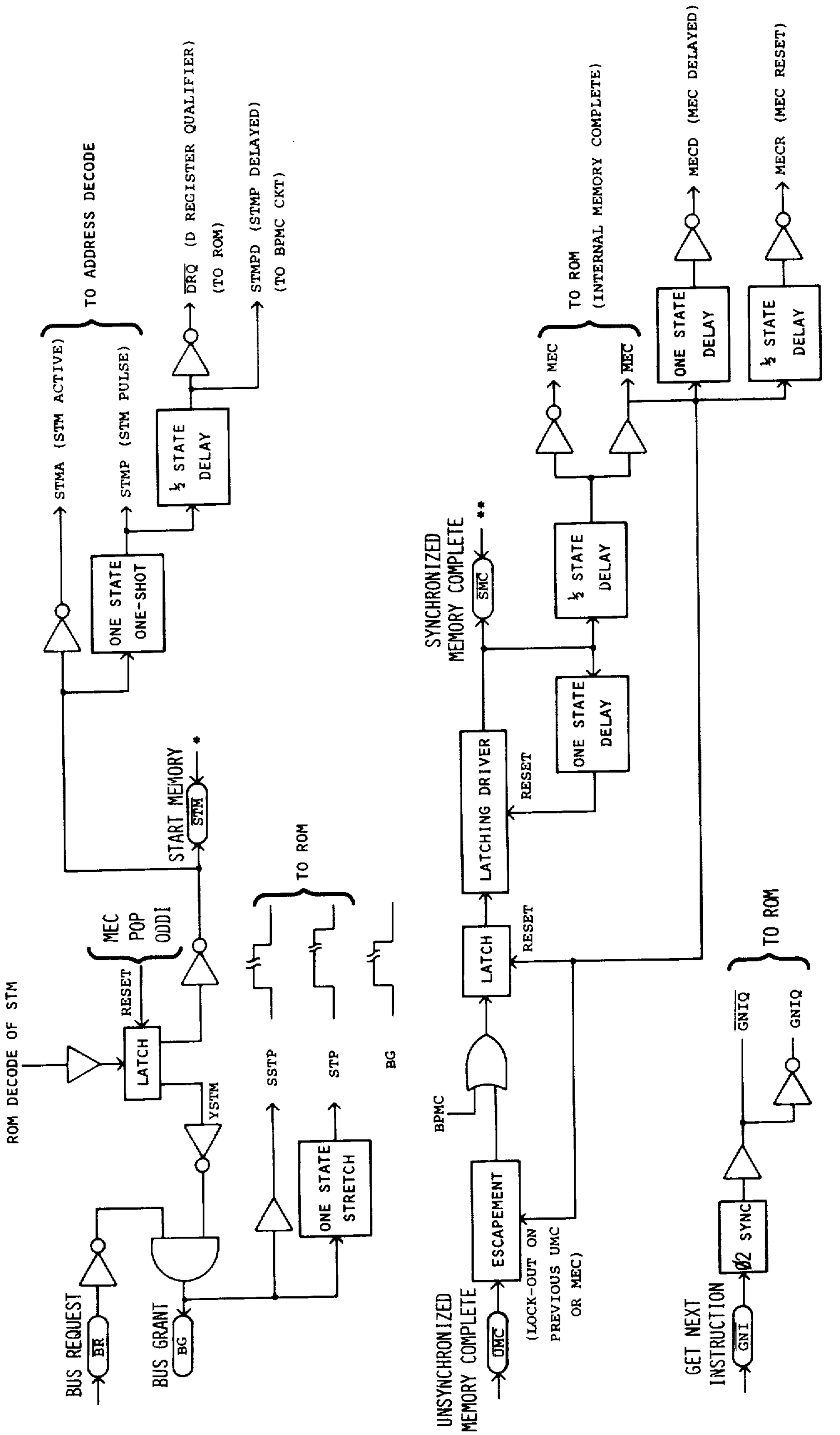
FIGS. 83A–B are a detailed block diagram of the M-section of FIGS. 25A–B.
Figure 83B:
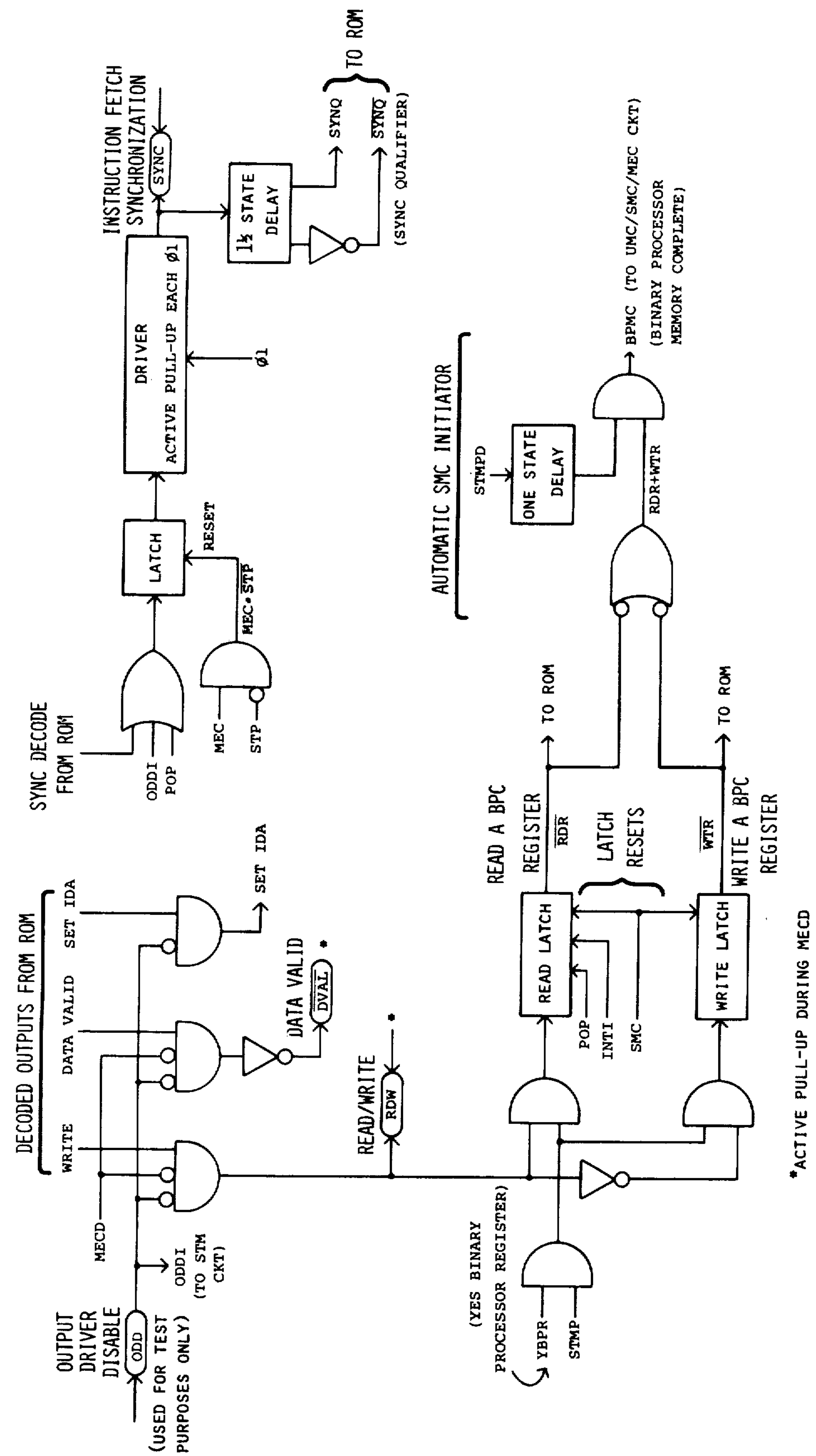
Figure 84:
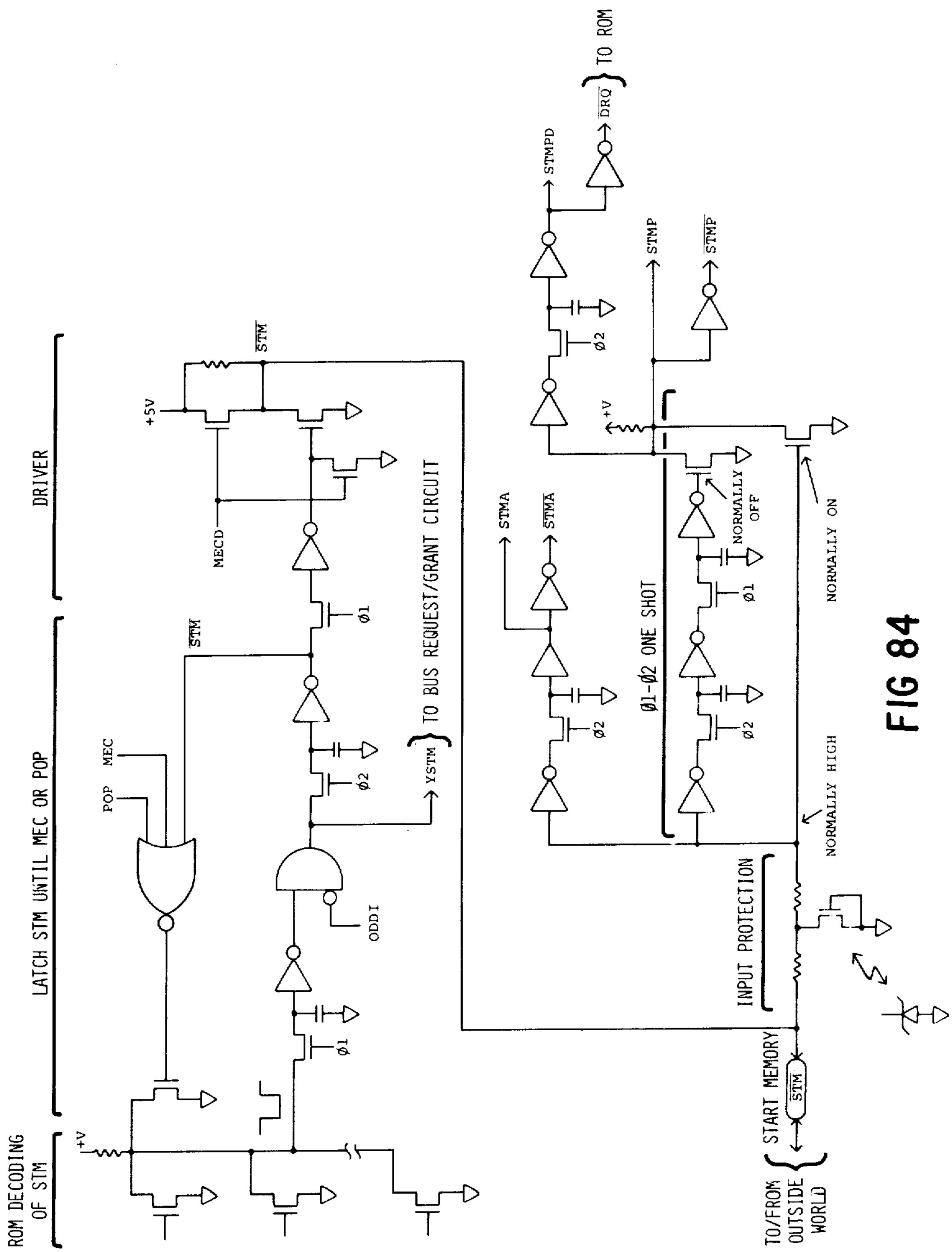
FIG. 84 is a detailed schematic diagram of a portion of the circuitry of FIG. 83A.
Figure 85:
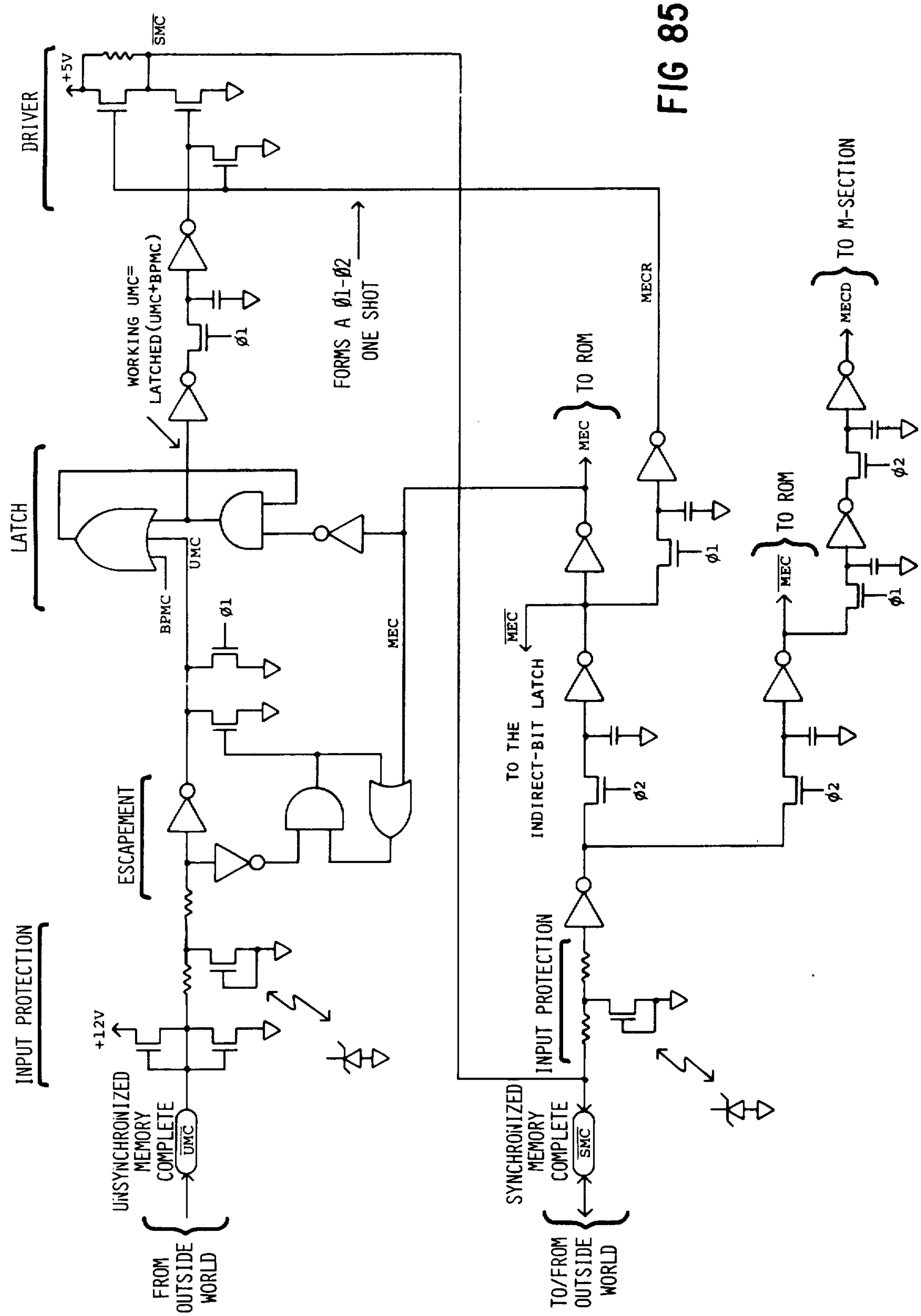
FIG. 85 is a detailed schematic diagram of a portion of the circuitry of FIG. 83A.
Figure 86:
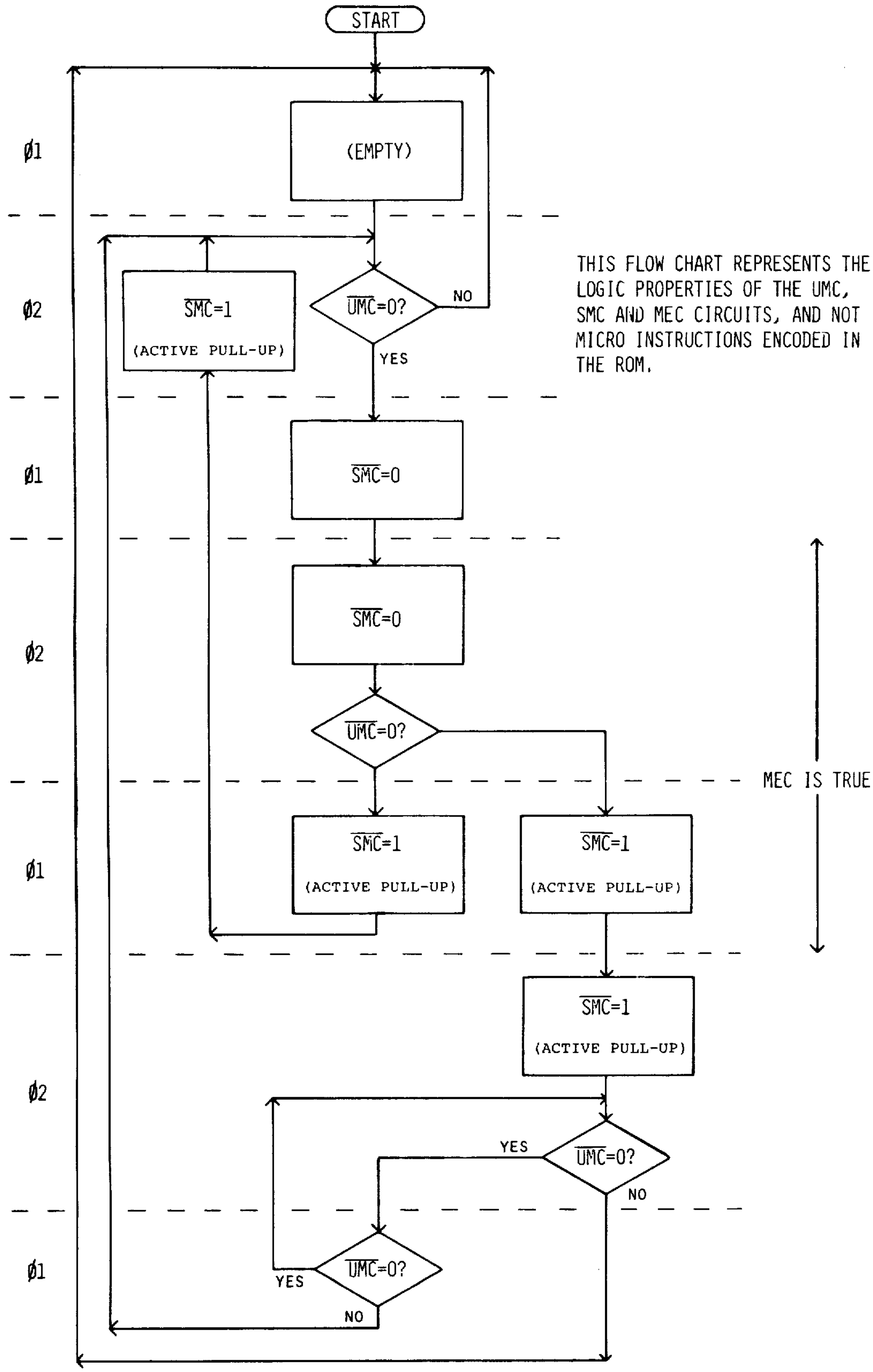
FIG. 86 is a flow chart illustrating the logic flow of the circutry of FIGS. 84 and 85.
Figure 87:
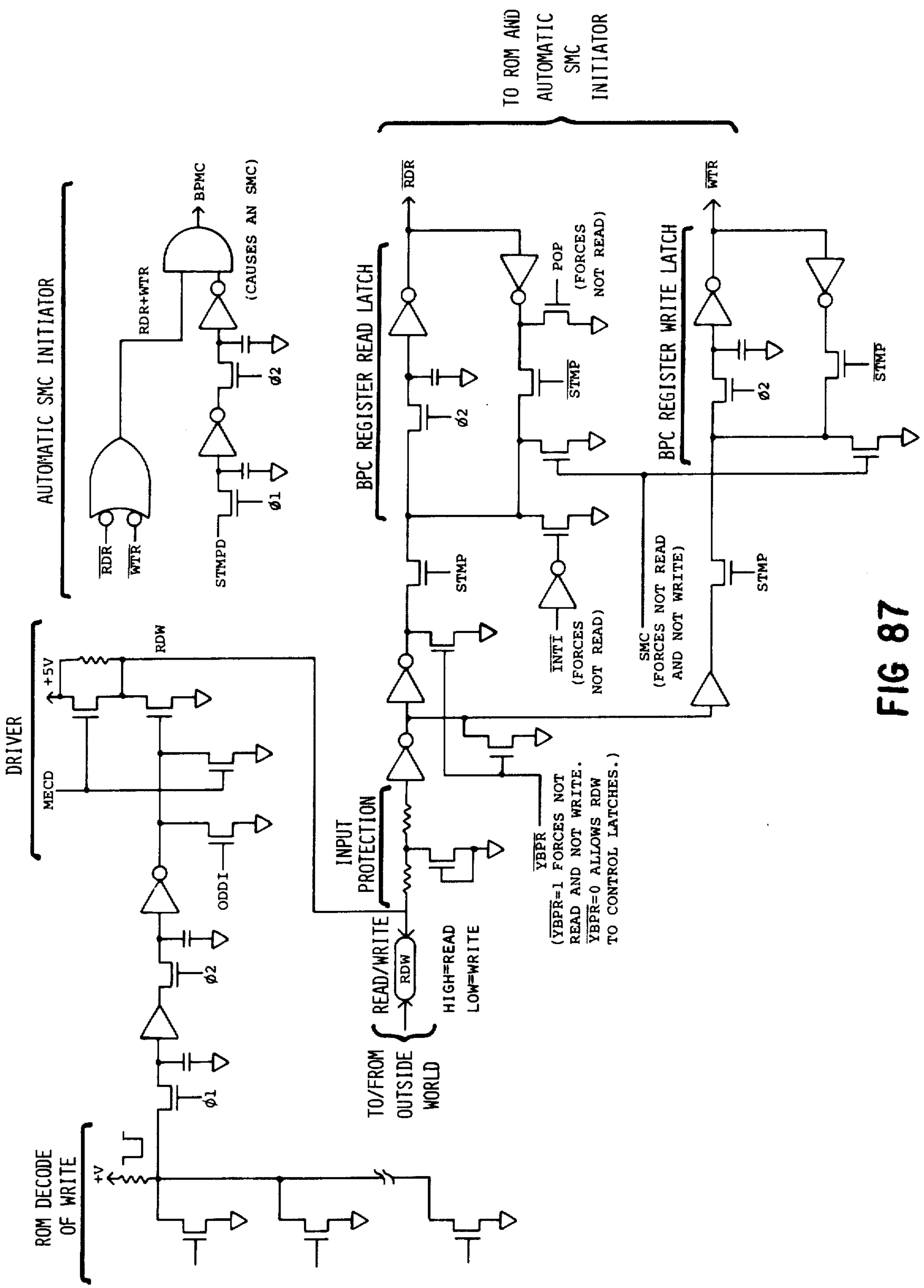
FIG. 87 is a detailed schematic diagram of a portion of the circuitry of FIG. 83B.
Figure 88:
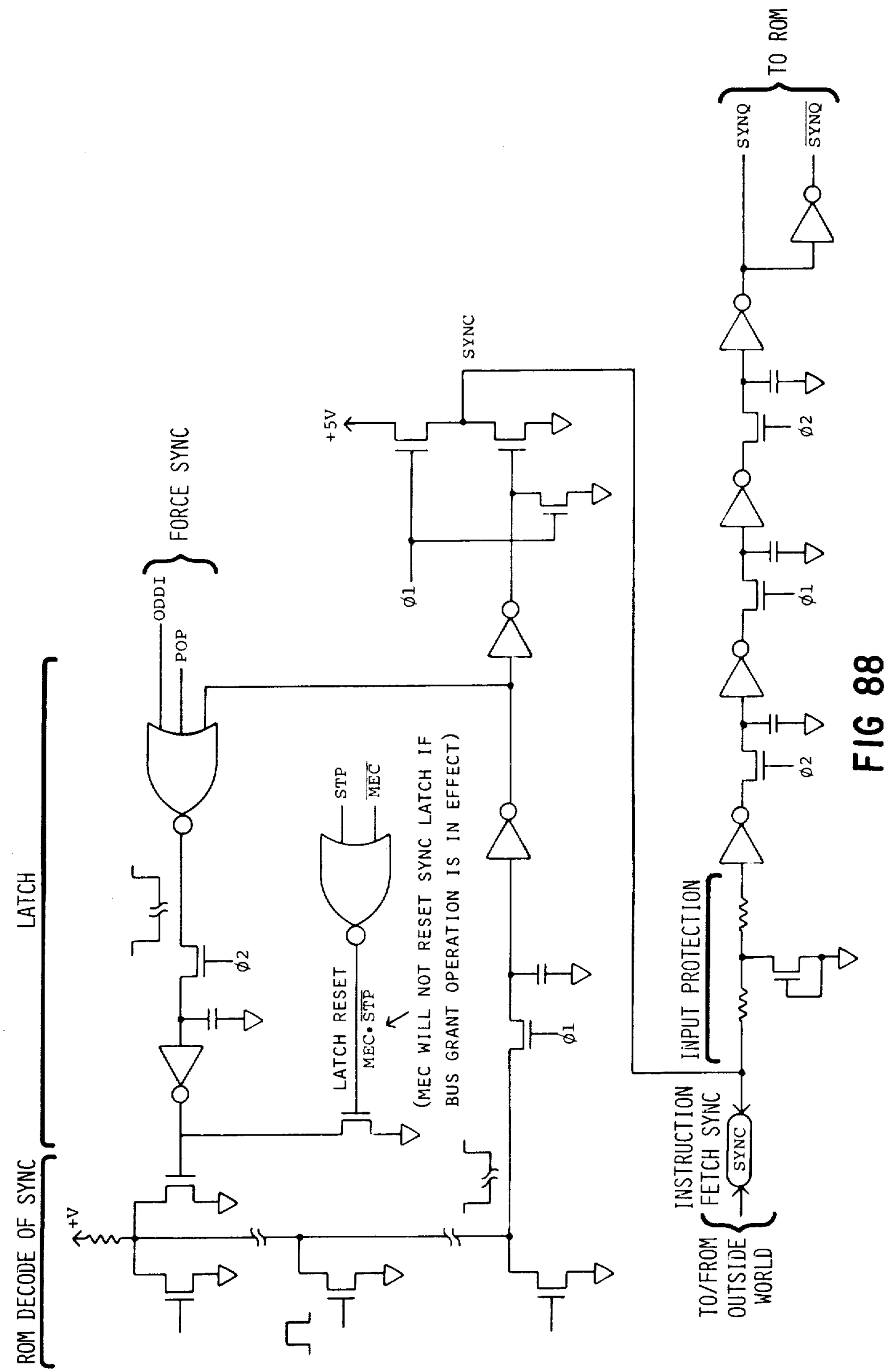
FIG. 88 is a detailed schematic diagram of a portion of the circuitry of FIG. 83B.
Figure 89:
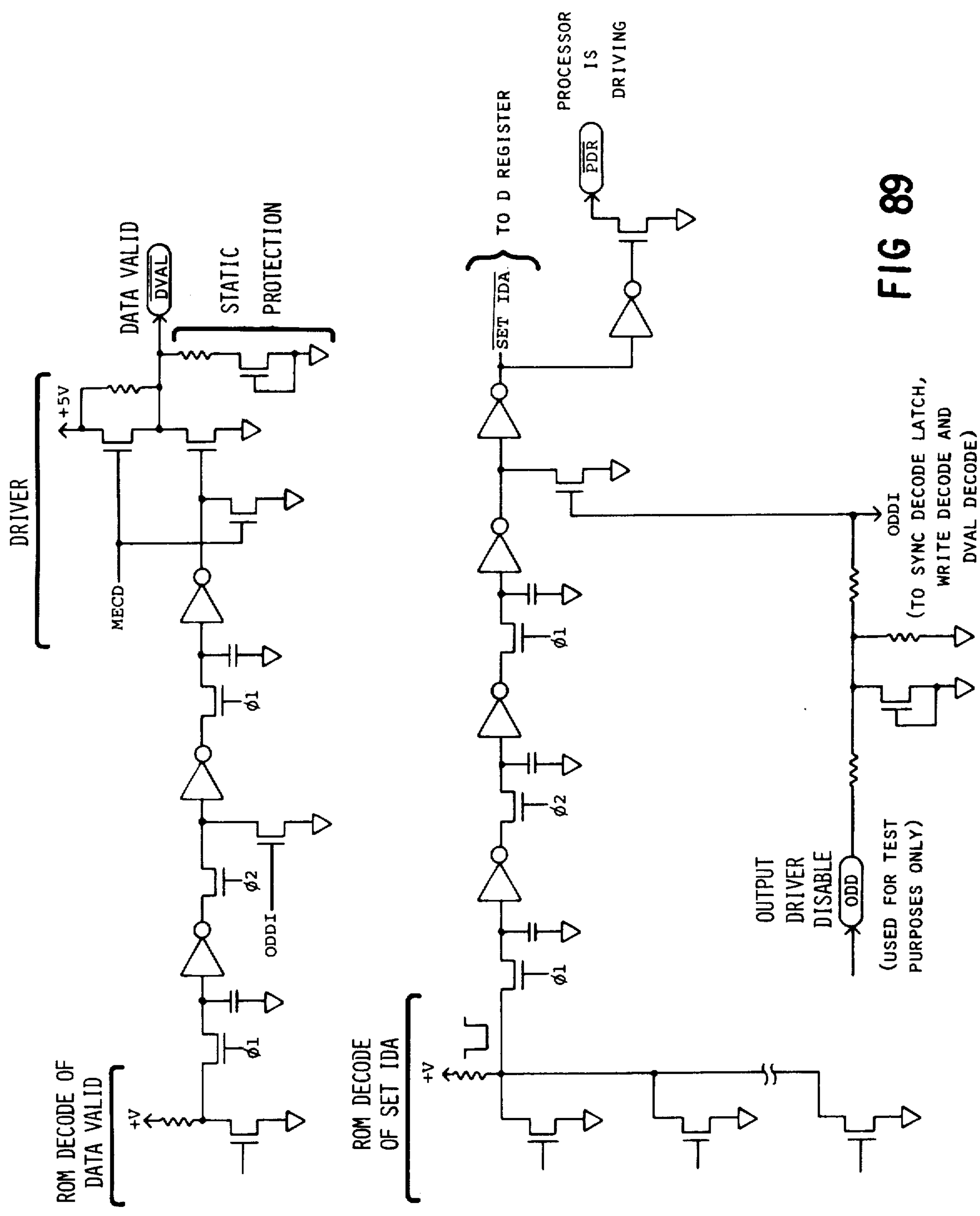
FIG. 89 is a detailed schematic diagram of a portion of the M-section of FIGS. 25A–B.
Figure 90:
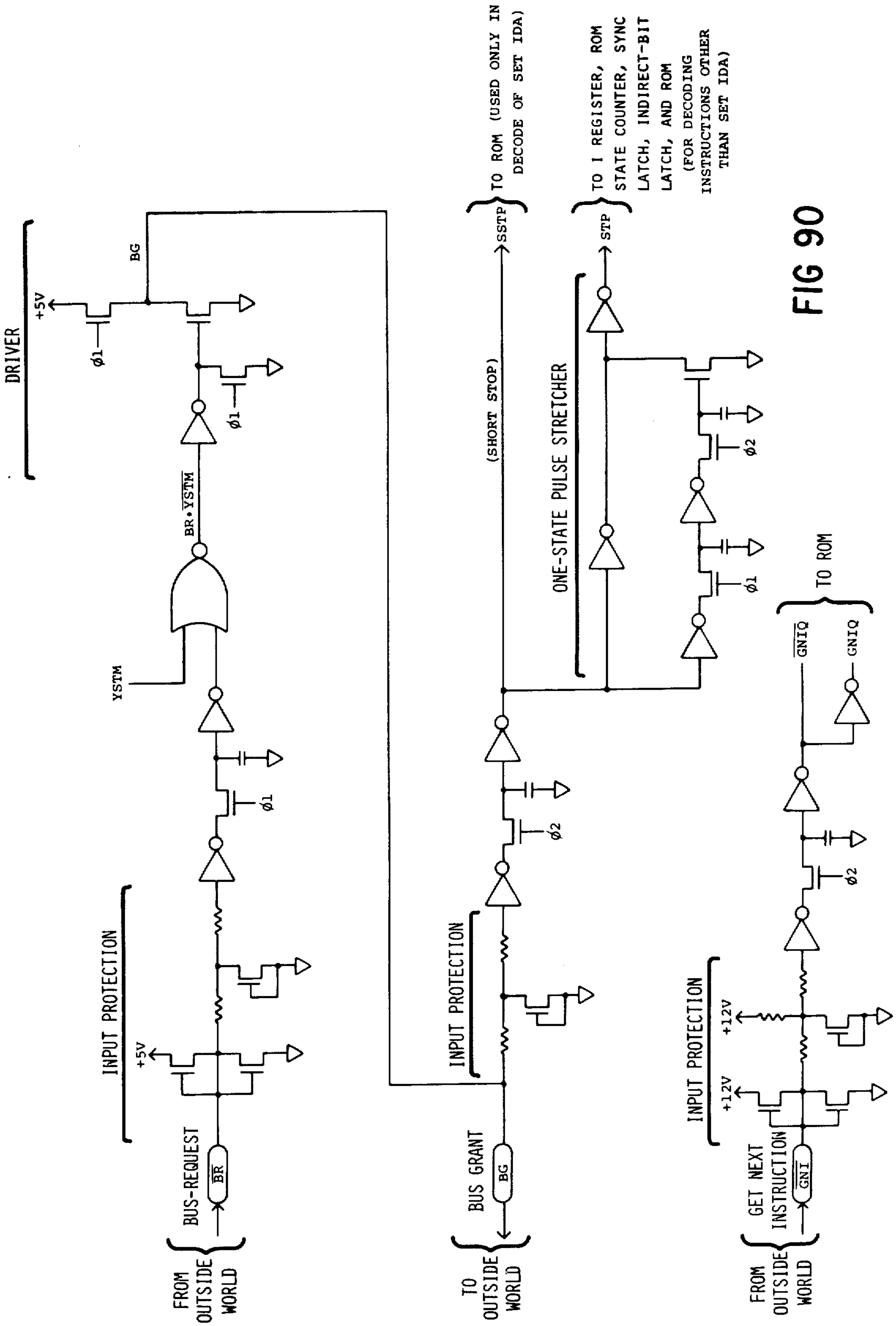
FIG. 90 is a detailed schematic diagram of a portion of the circuitry of FIG. 83A.
Figure 92:
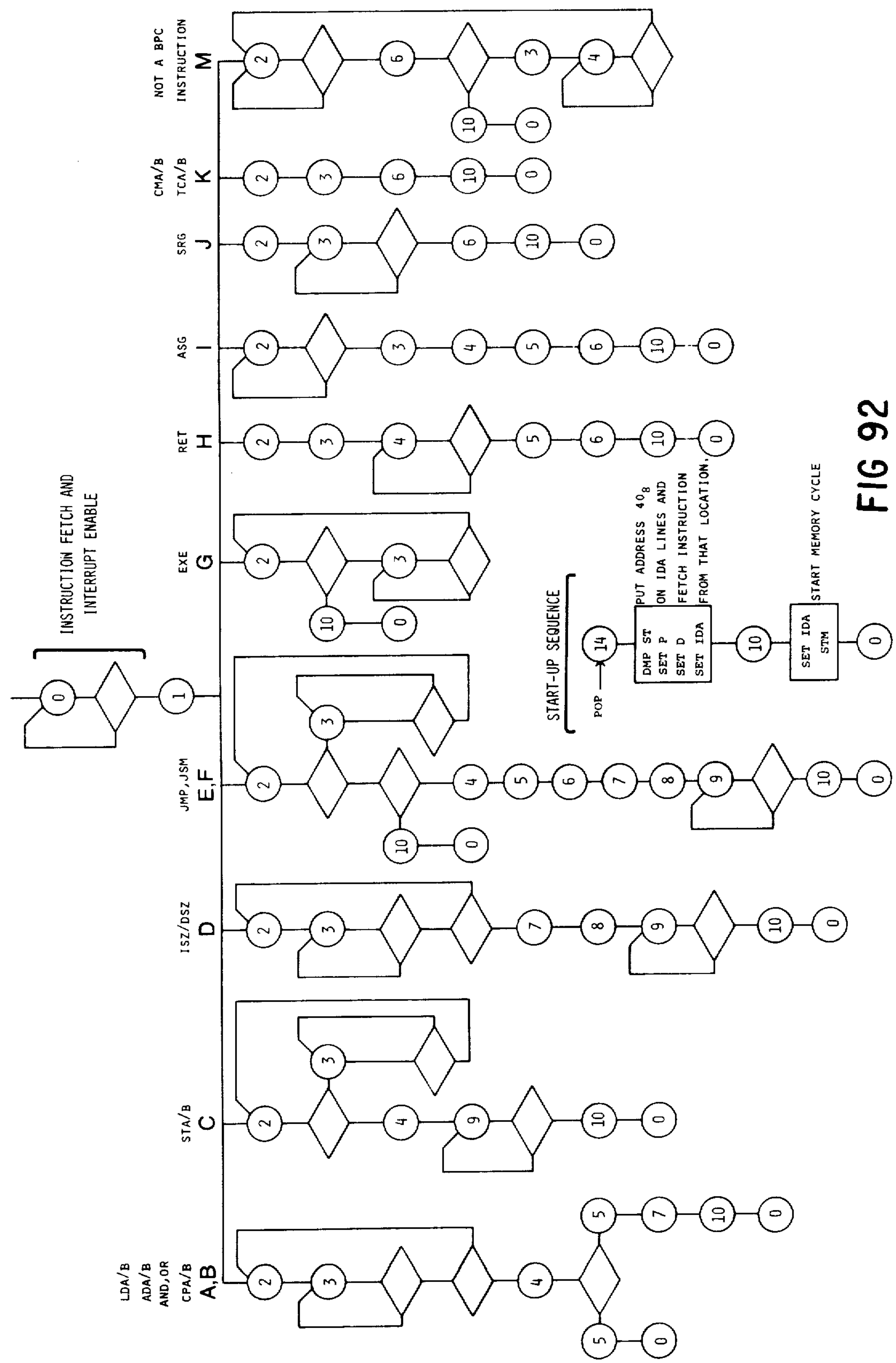
FIG. 92 is a diagram showing the overall relationship of the flow chart segments of FIGS. 93–103.
Figure 93:
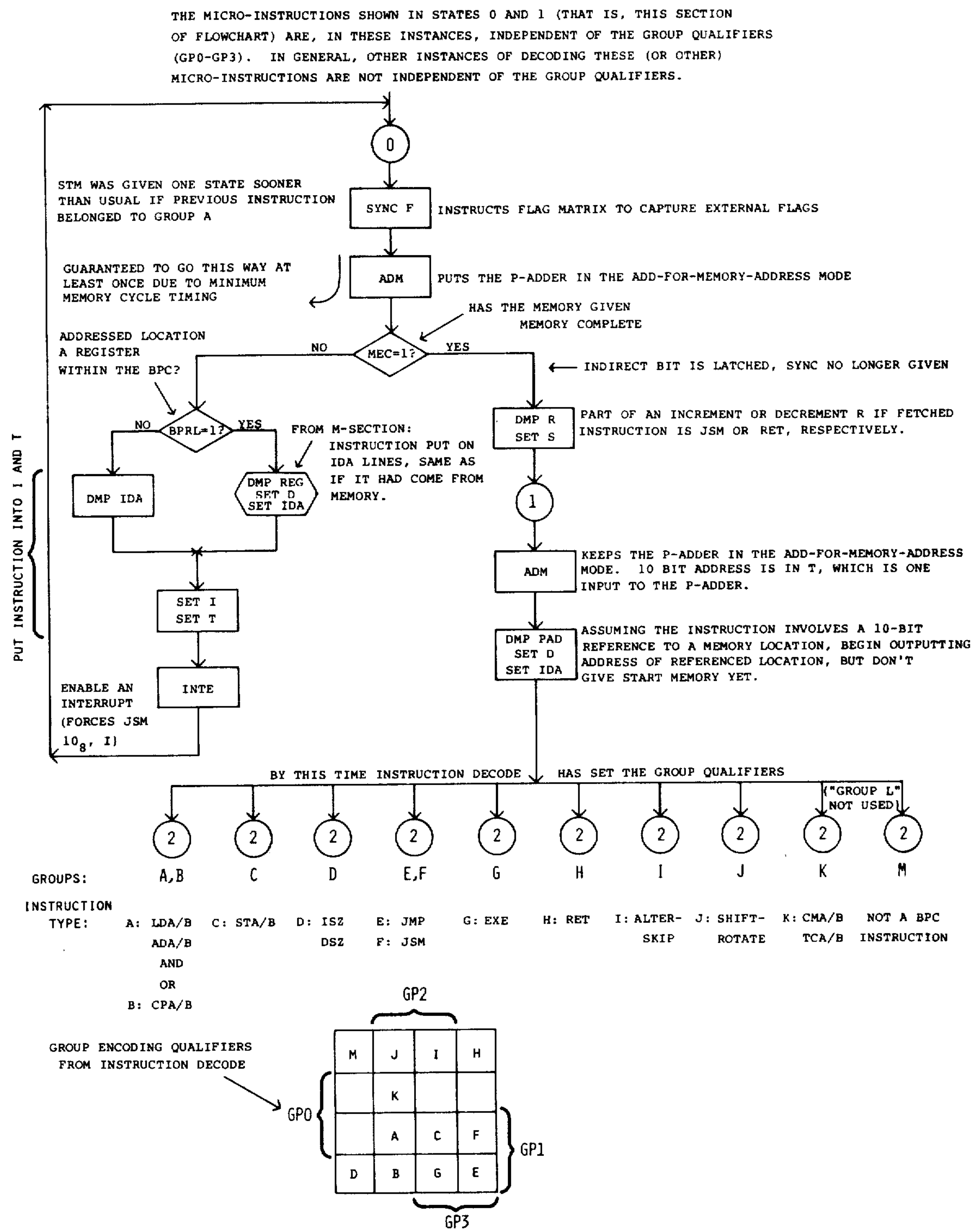
FIG. 93 is a flow chart segment of the instruction fetch and fanout activity of the BPC of FIG. 19.
Figure 94:
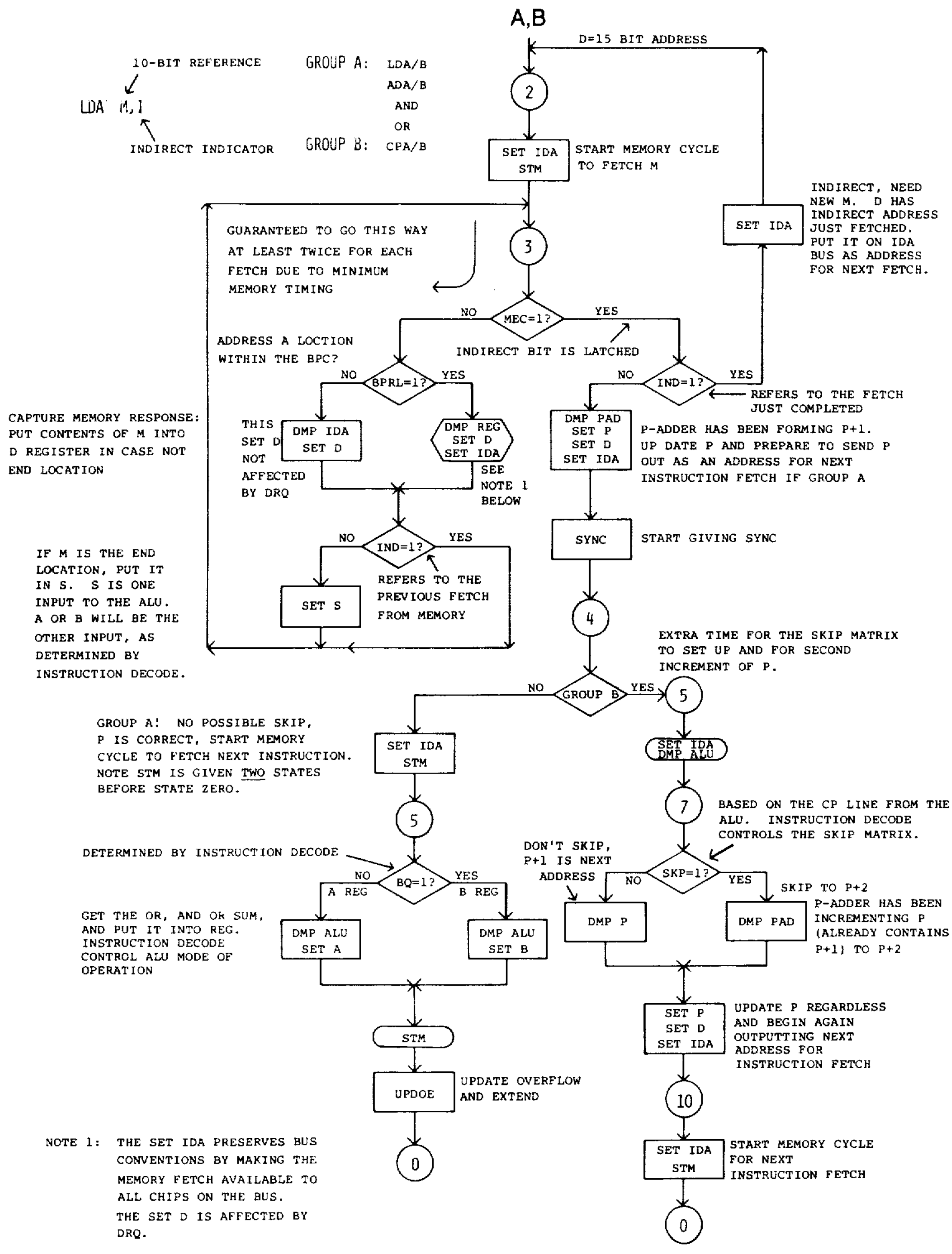
FIG. 94 is a flow chart segment of the load, add, and, or, and compare machine instructions executed by the BPC of FIG. 19.
Figure 95:
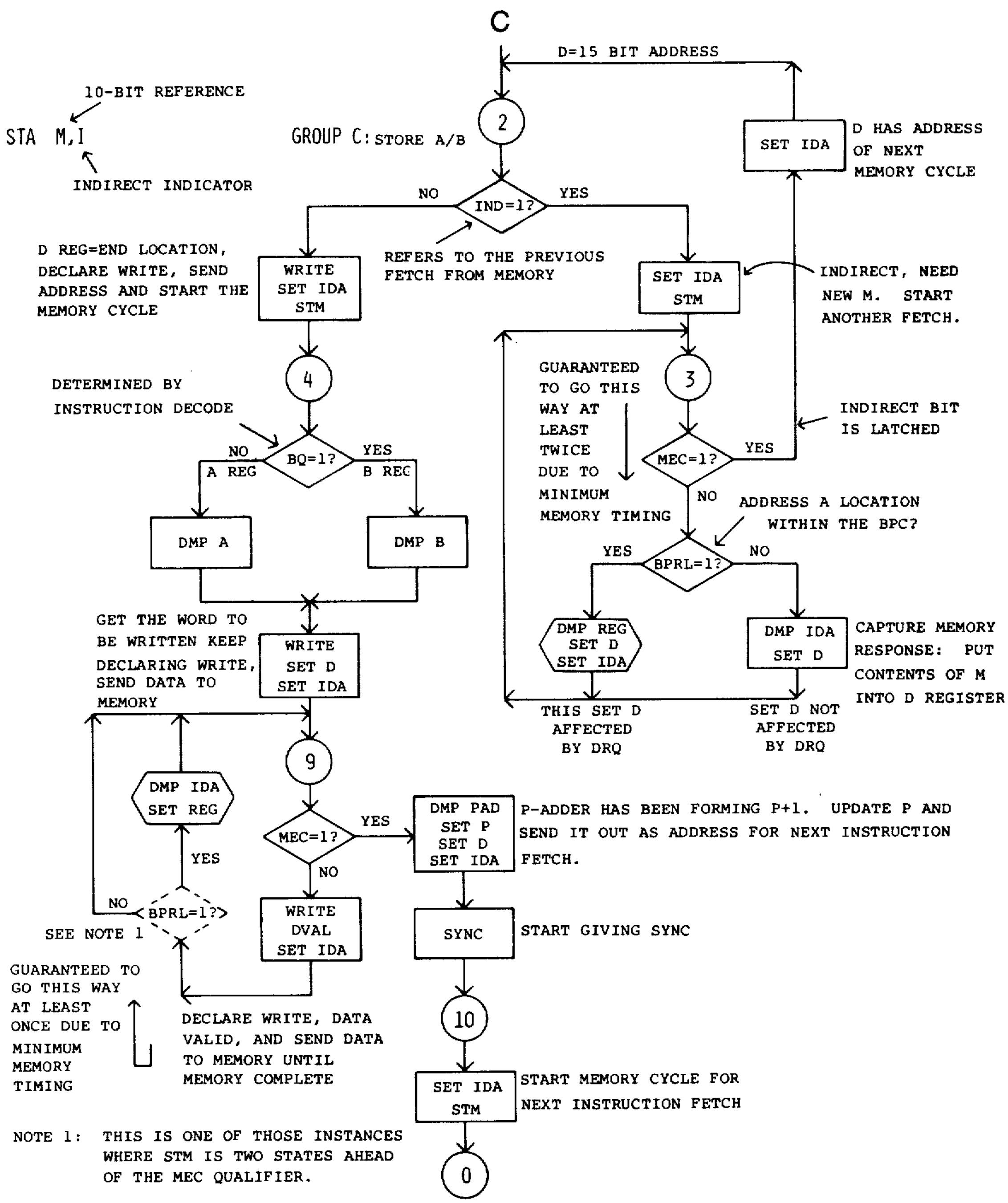
FIG. 95 is a flow chart segment of the STA and STB machine instruction executed by the BPC of FIG. 19.
Figure 96:
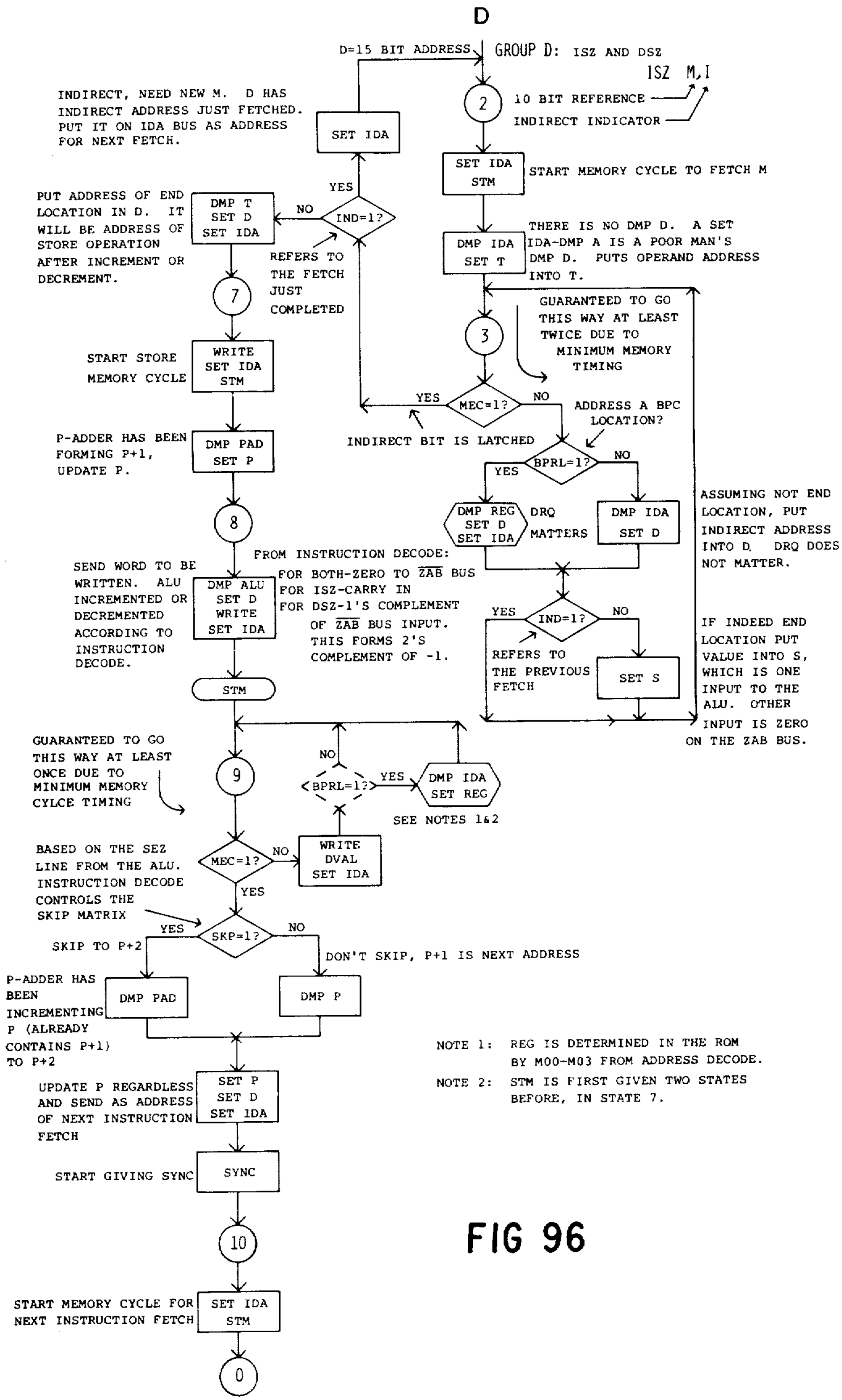
FIG. 96 is a flow chart segment of the ISZ and DSZ machine instructions executed by the BPC of FIG. 19.
Figure 97:
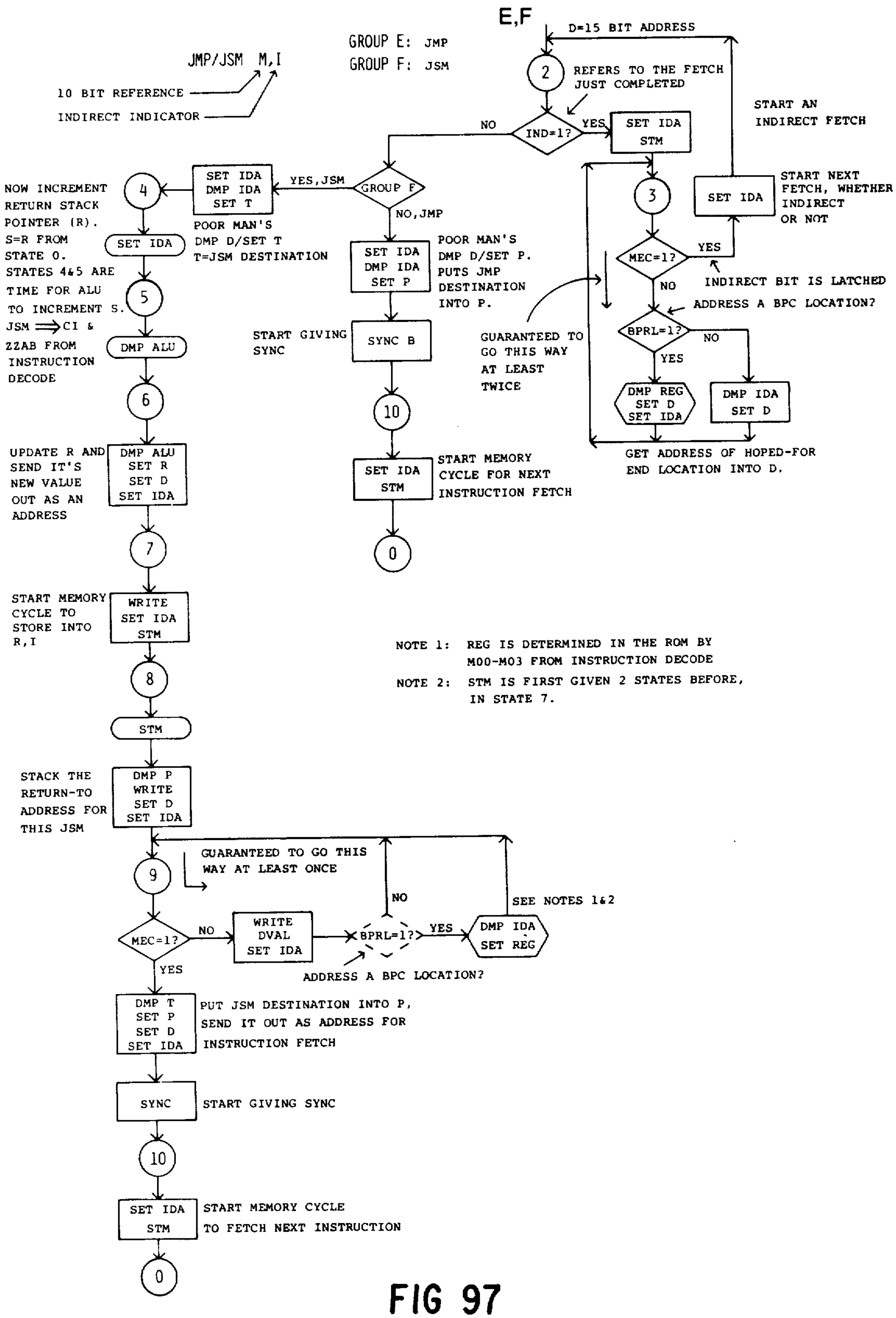
FIG. 97 is a flow chart segment of the JMP and JSM machine instructions executed by the BPC of FIG. 19.
Figure 98:
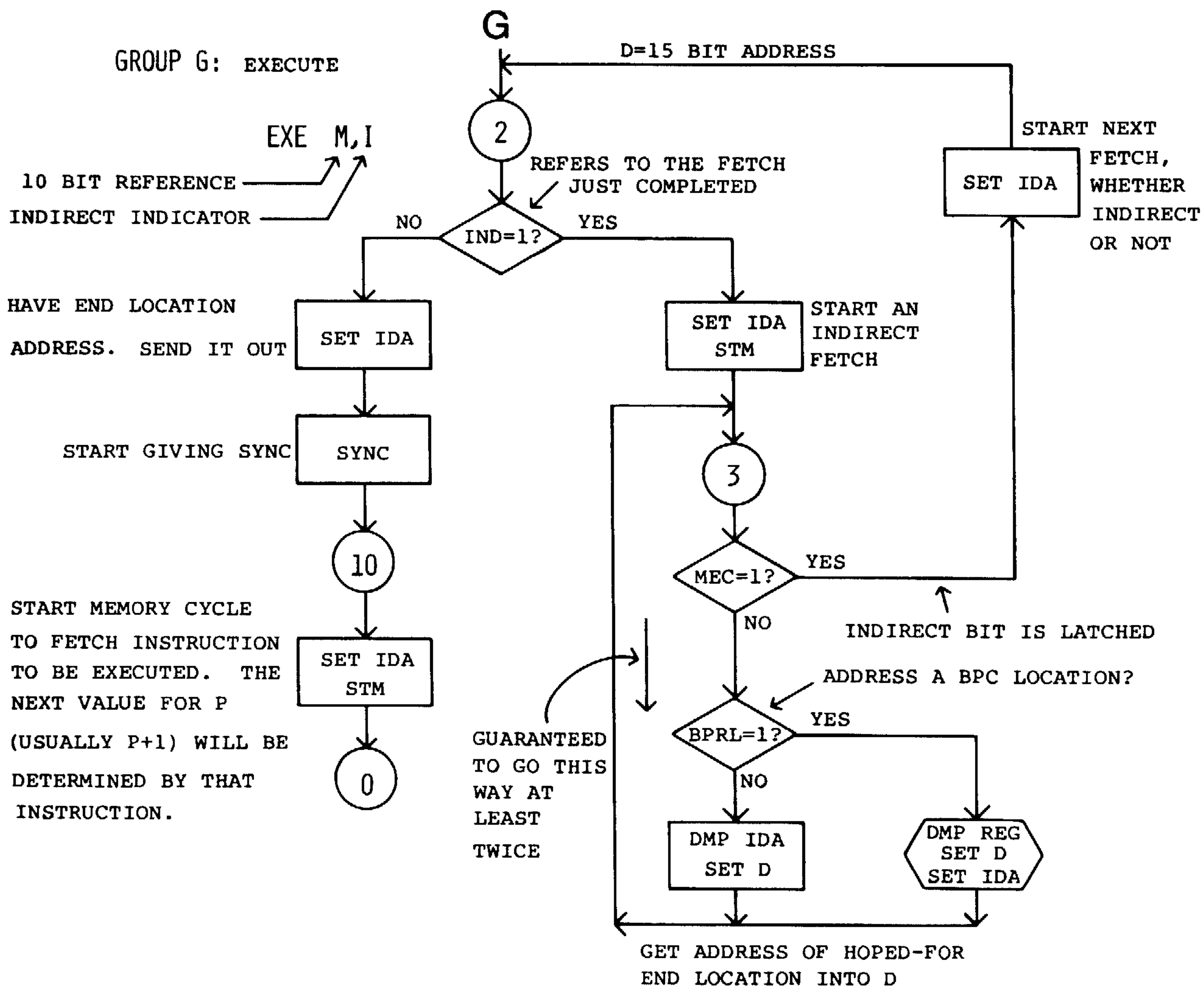
FIG. 98 is a flow chart segment of the EXE machine instruction executed by the BPC of FIG. 19.
Figure 99:
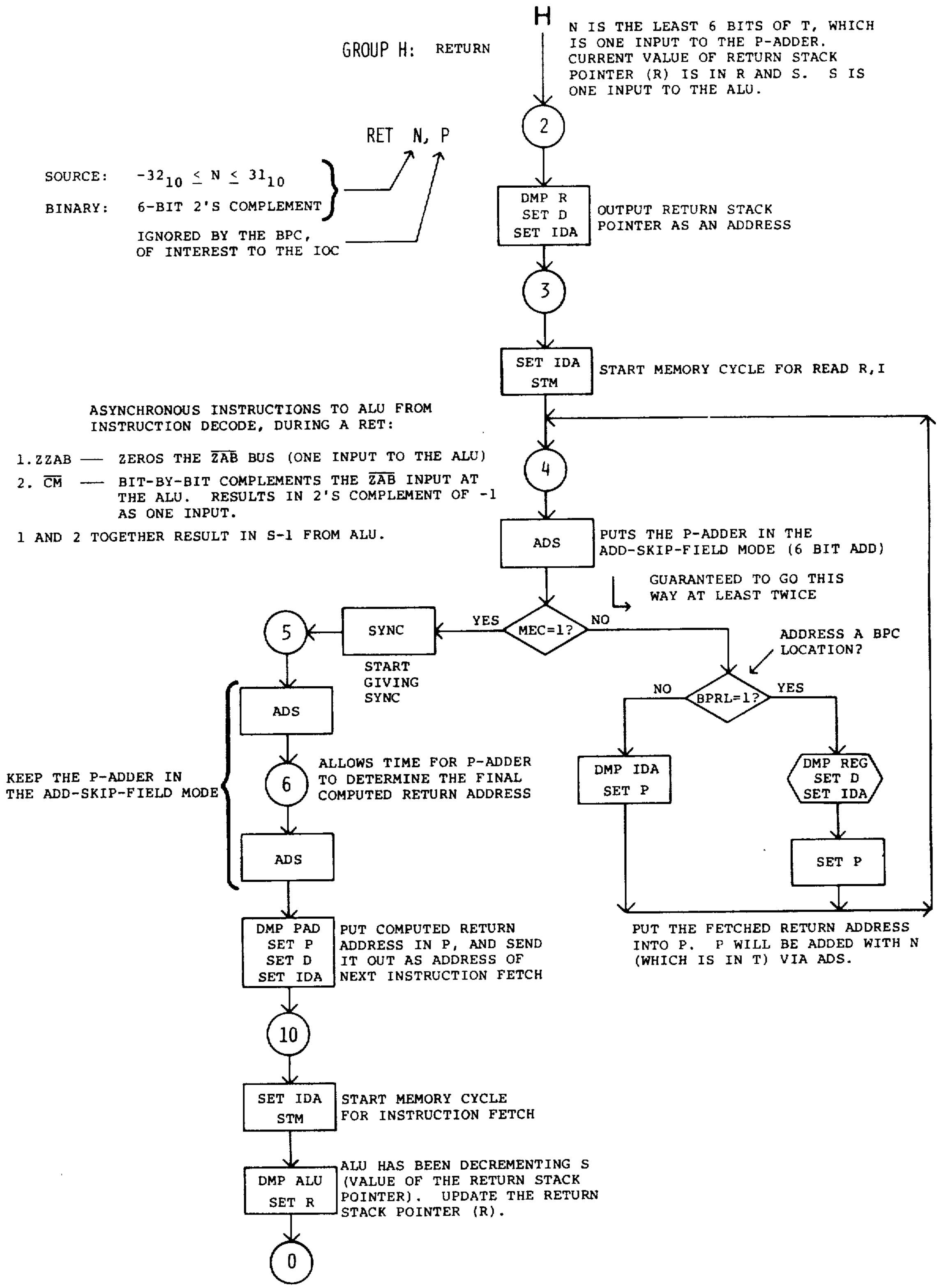
FIG. 99 is a flow chart segment of the RET machine instruction executed by the BPC of FIG. 19.
Figure 101:
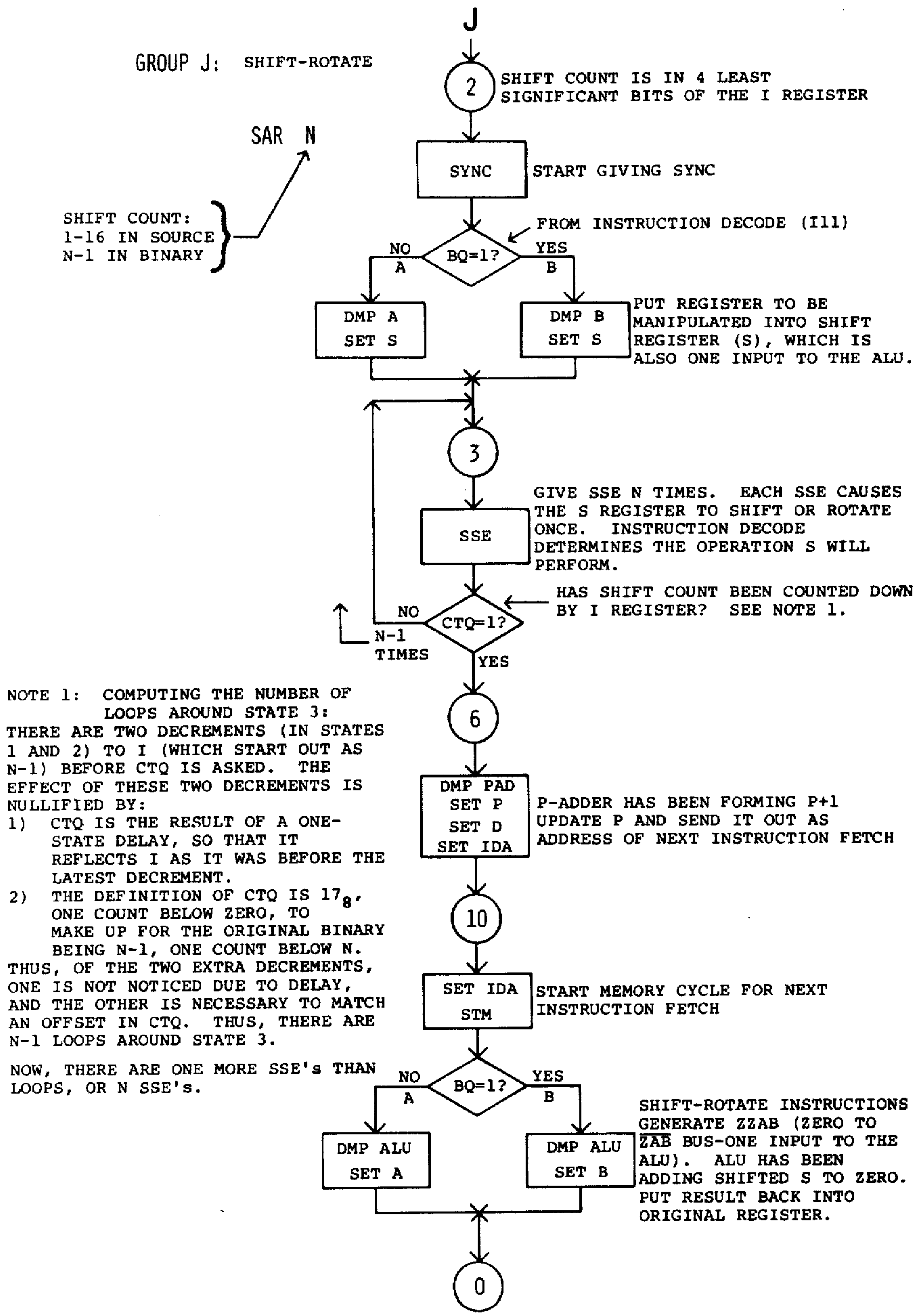
FIG. 101 is a flow chart segment of the shift-rotate group of machine instructions executed by the BPC of FIG. 19.
Figure 102:
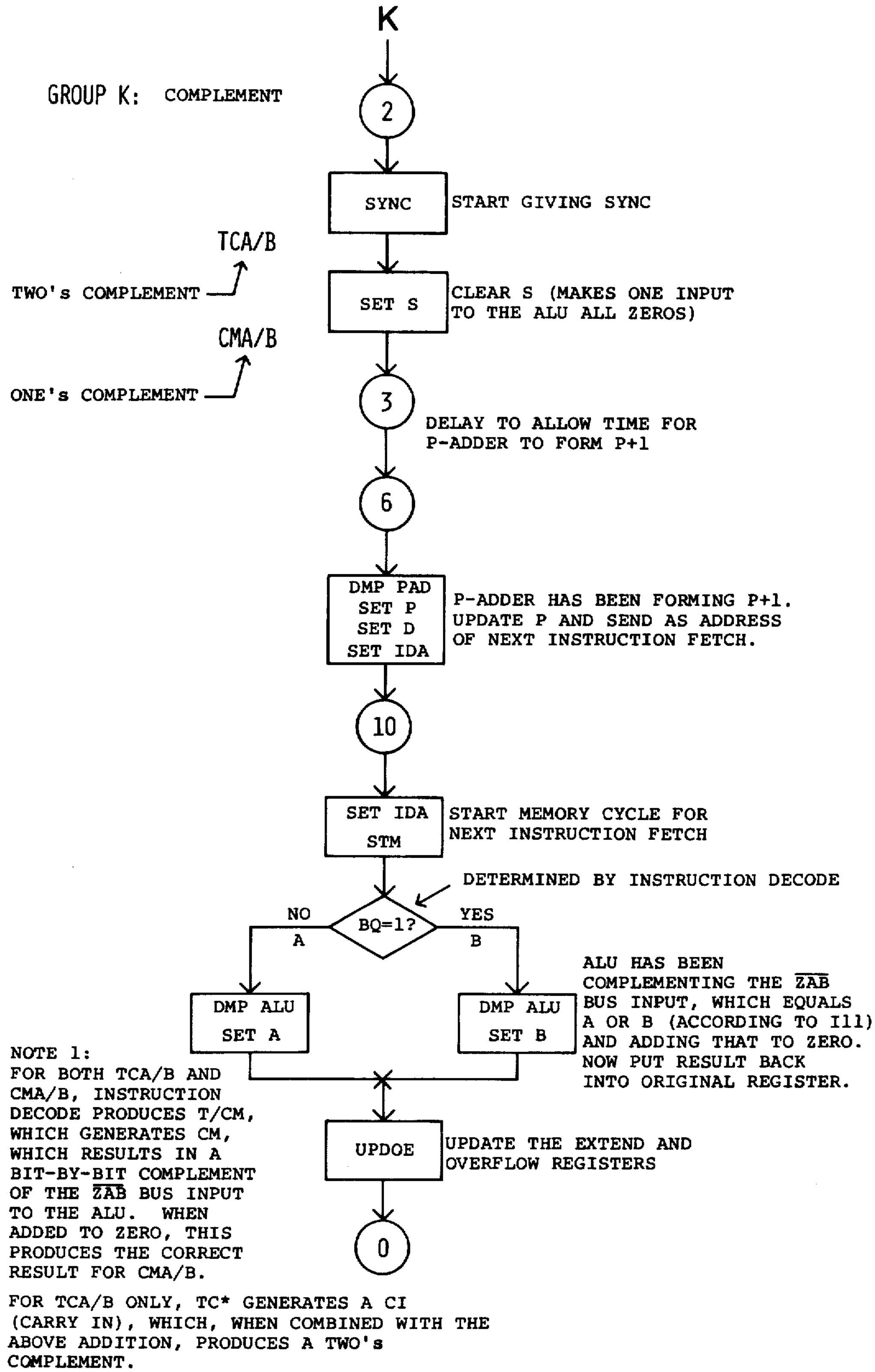
FIG. 102 is a flow chart segment of the complement group of machine instructions executed by the BPC of FIG. 19.
Figure 103:
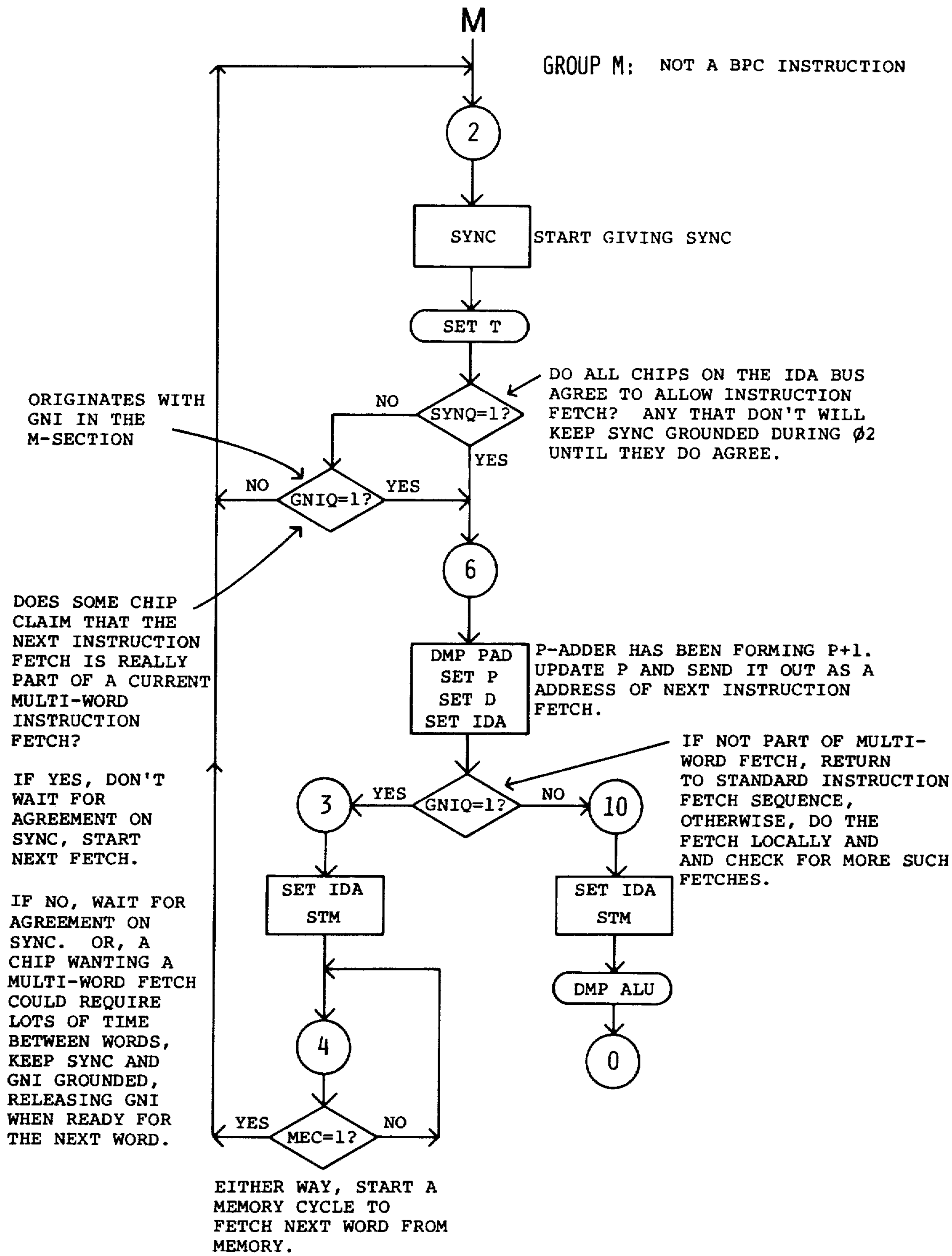
FIG. 103 is a flow chart segment illustrating the response of the BPC of FIG. 19 to a request for execution of a non-BPC machine instruction.
Figure 104:
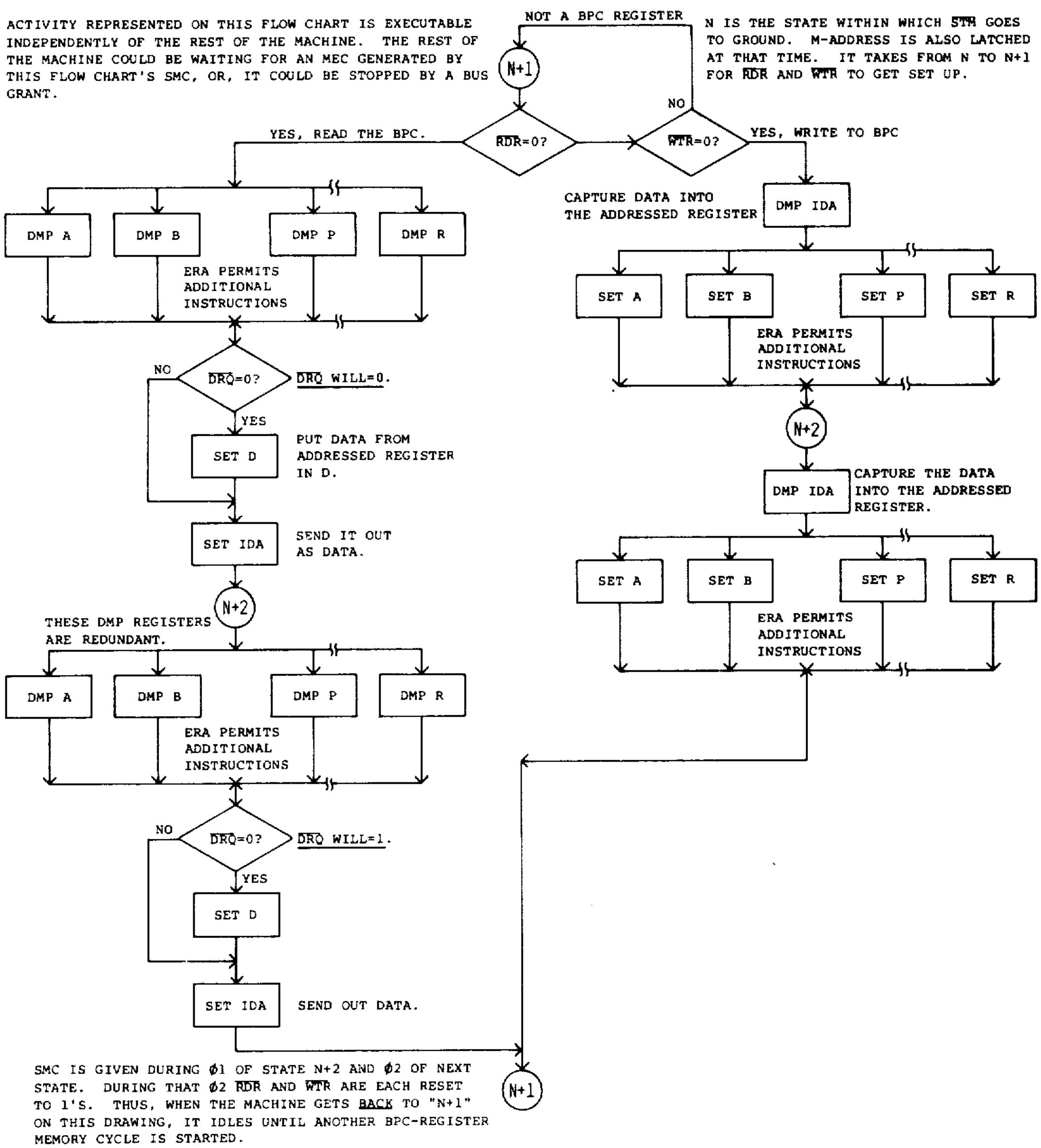
FIG. 104 is a flow chart of memory cycle operation initiated by the M-section of FIGS. 25A–B.
Figure 107A:
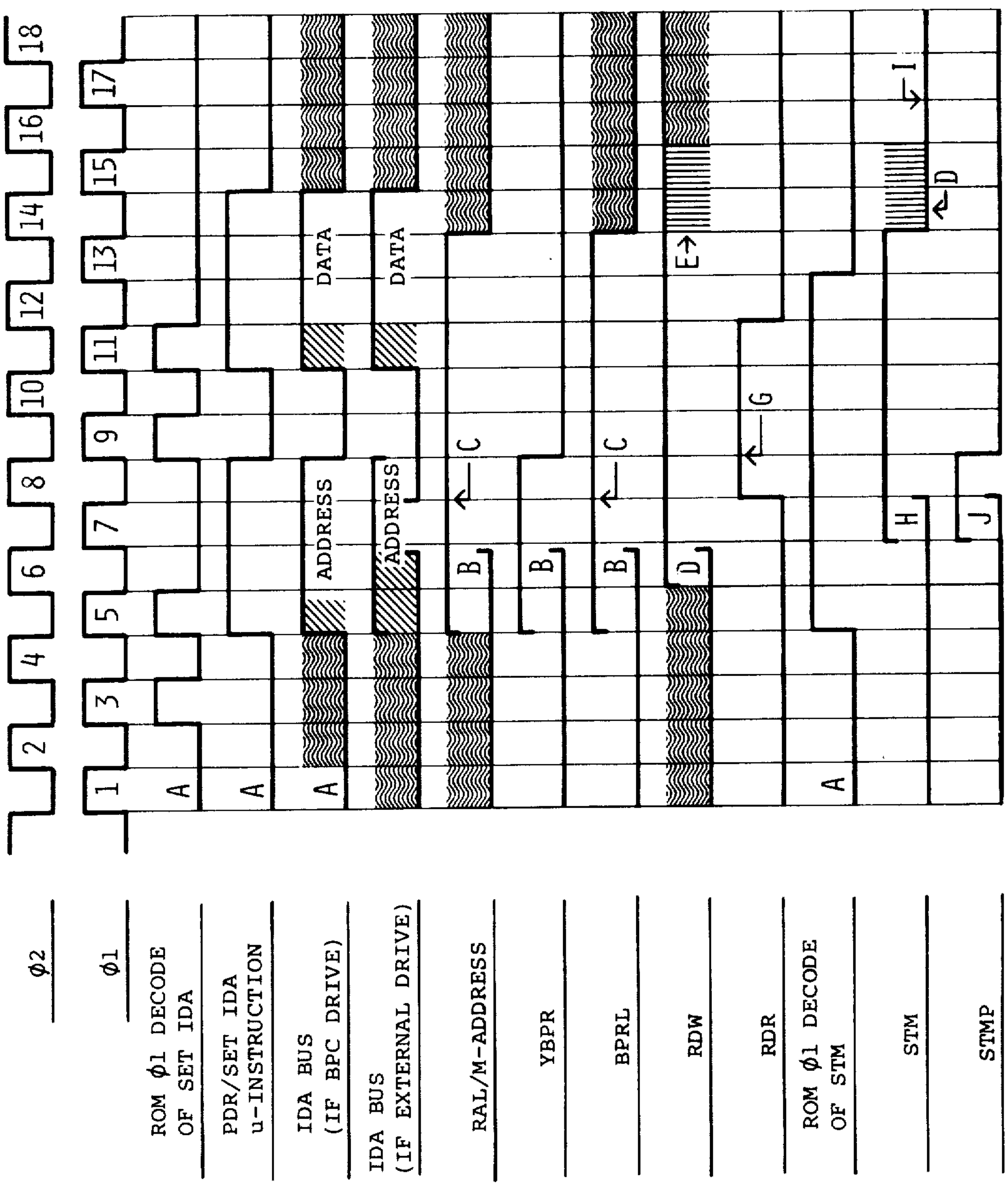
Figure 107B:
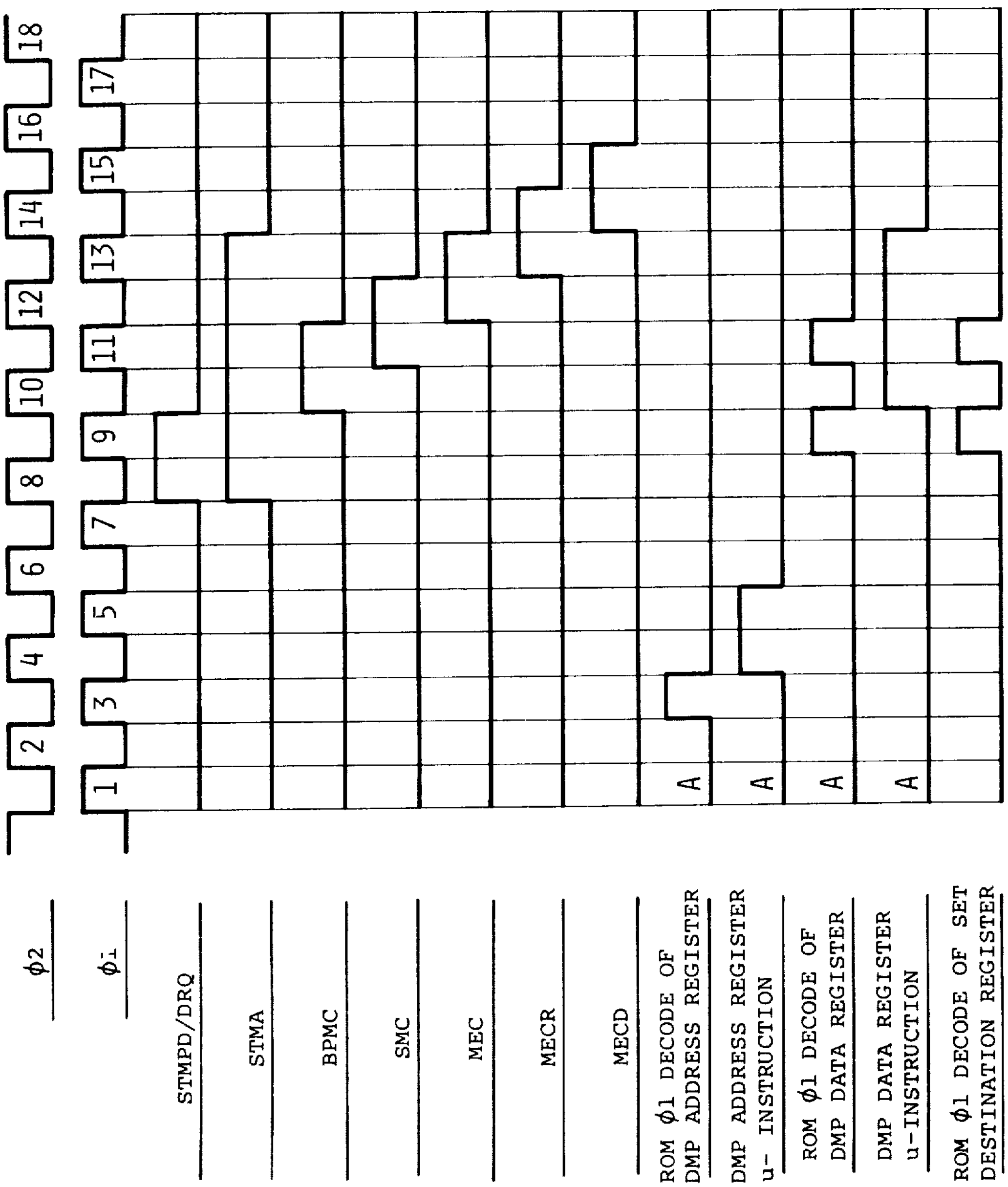
Figure 108A:
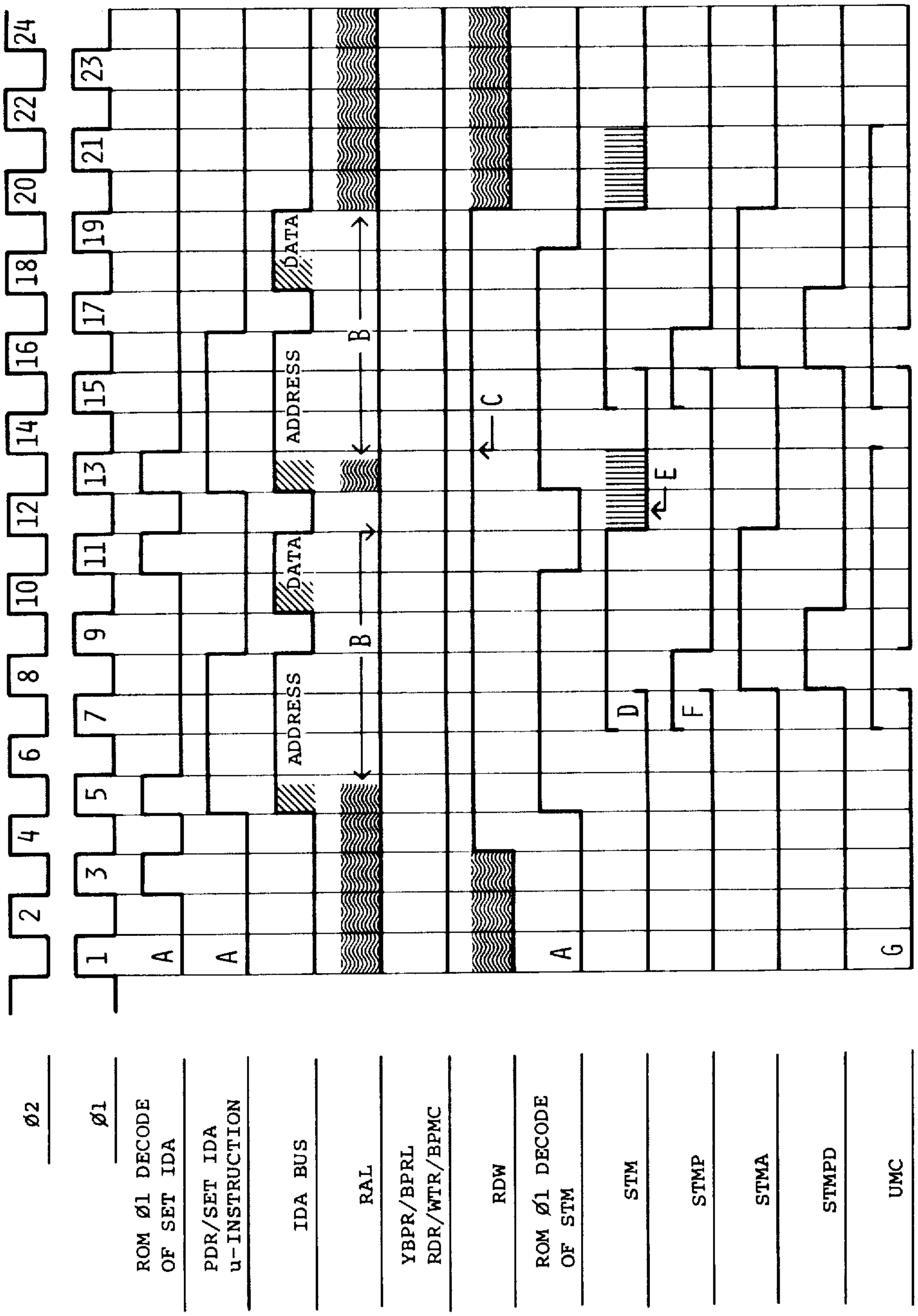

FIGS. 120A–E are a tabular representation of the contents of the read-only memory portion of the BPC of FIGS. 19 and 25A–B.

Figure 121:
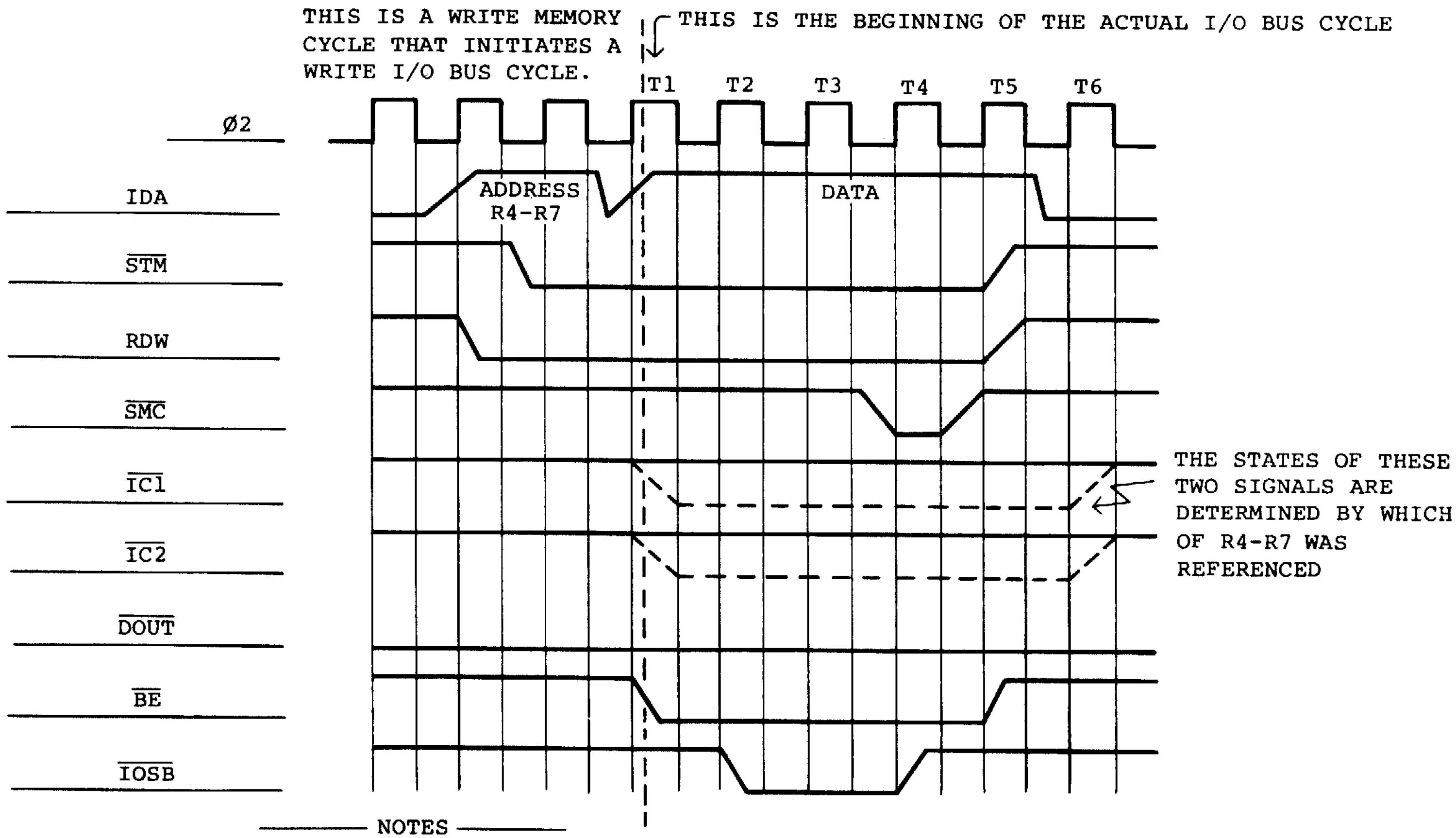

FIG. 121 is a waveform diagram illustrating a write I/O bus cycle.

Figure 122:
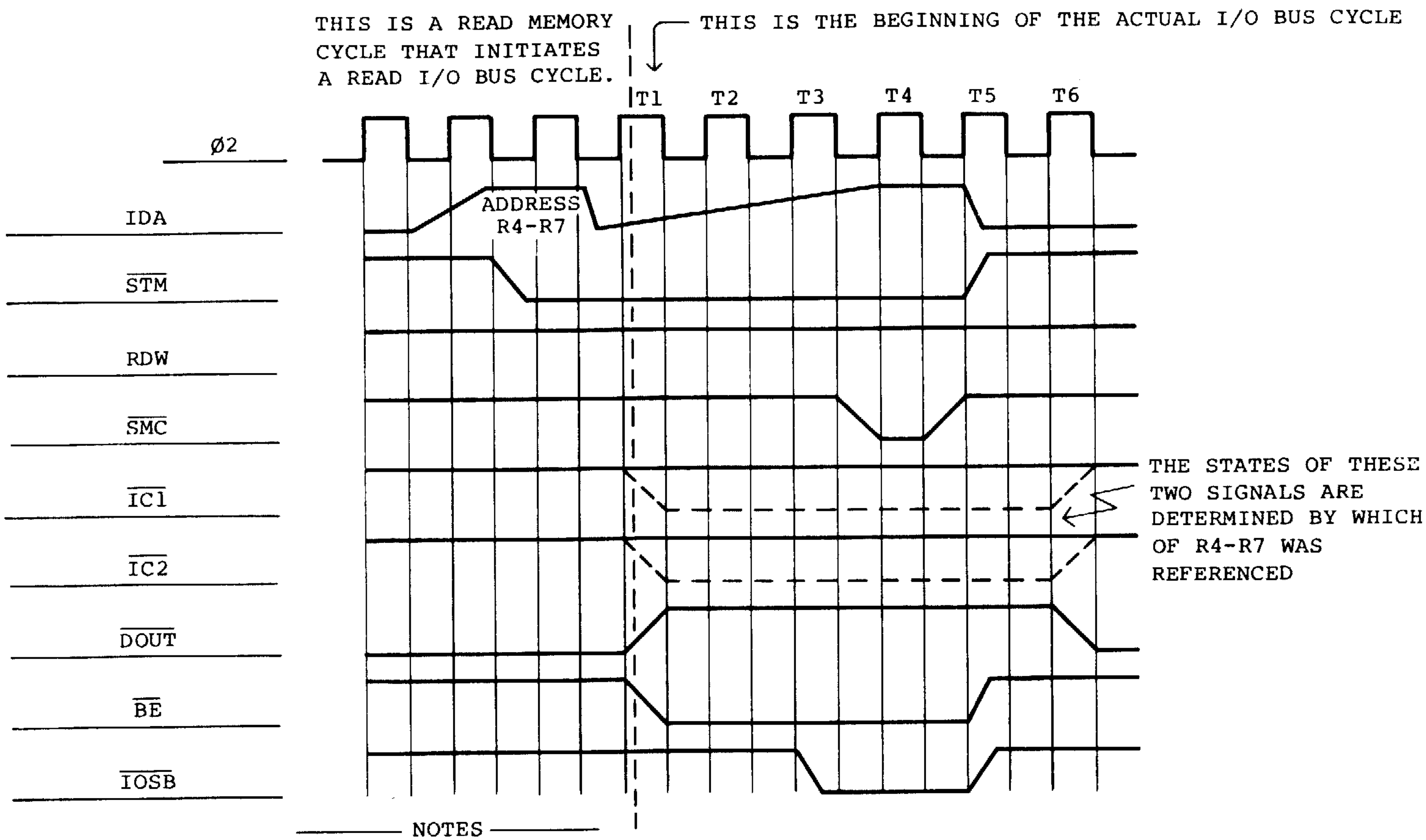

FIG. 122 is a waveform diagram illustrating a read I/O bus cycle.

Figure 123:
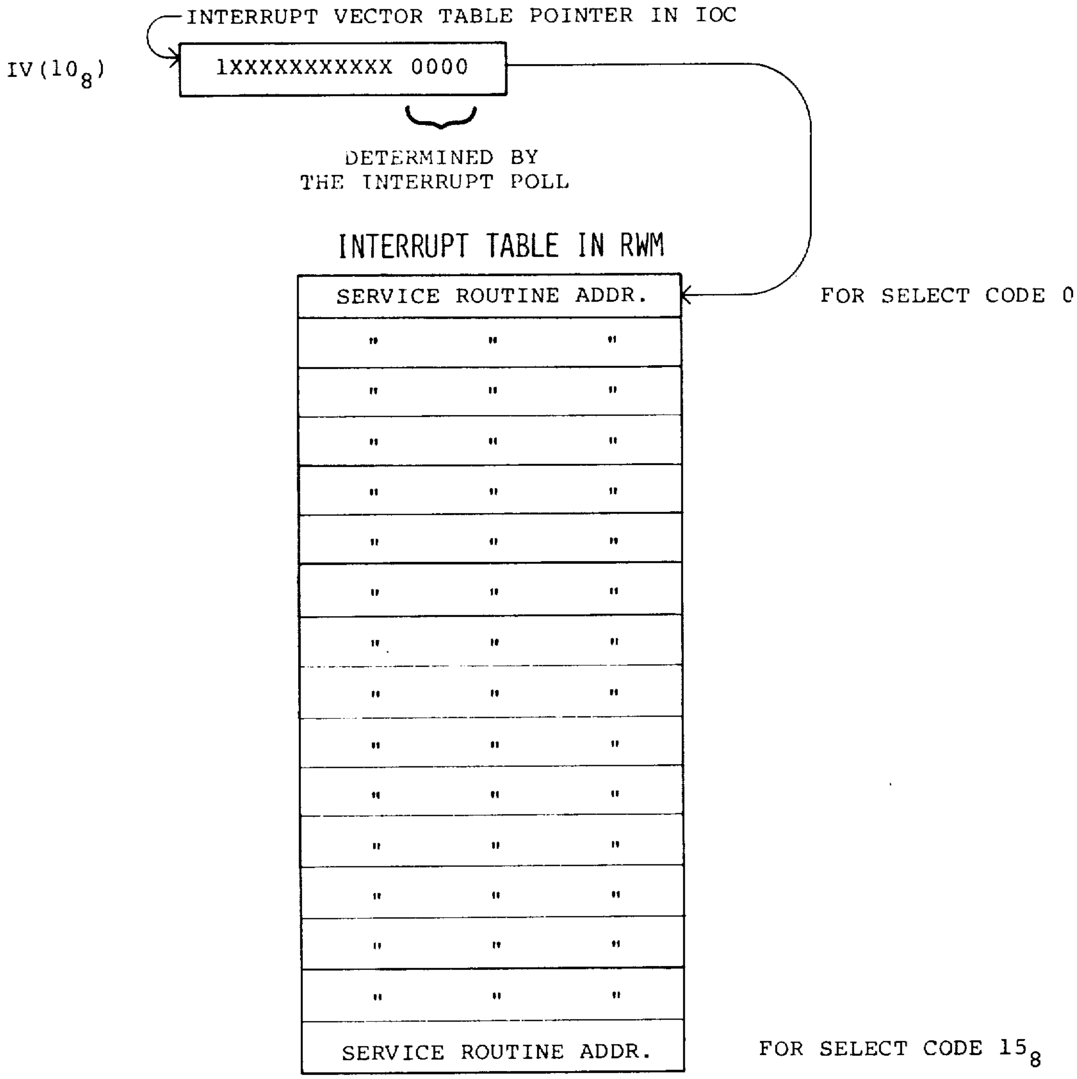

FIG. 123 is a diagram illustrating the indirect addressing sequence implemented by the BPC and IOC of FIG. 19 during an interrupt.

Figure 124:
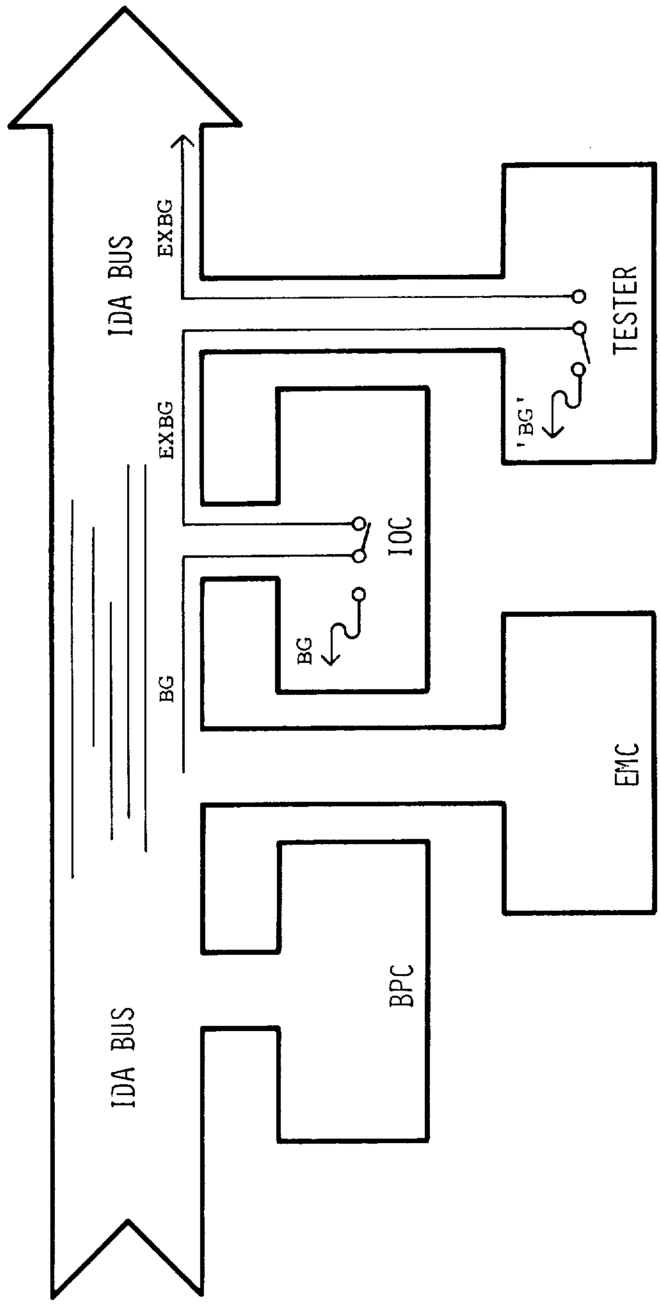

FIG. 124 is a pictorial representation of the use of the extended bus grant capability of the microprocessor of FIG. 19.

FIGS. 125A–C are a tabular illustration of the instruction set and corresponding bit patterns associated with the IOC of FIG. 19.

Figure 126A:
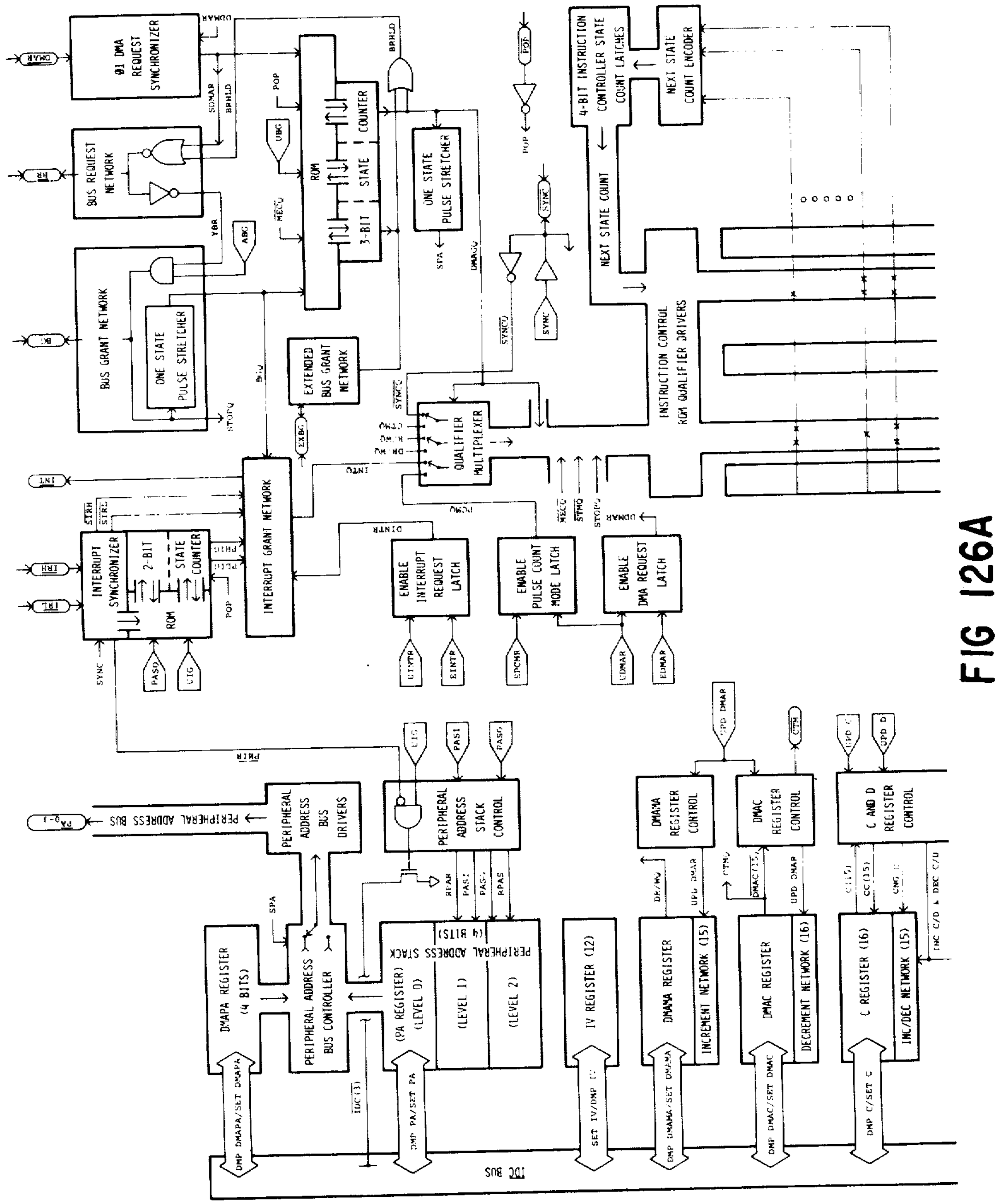
Figure 126B:
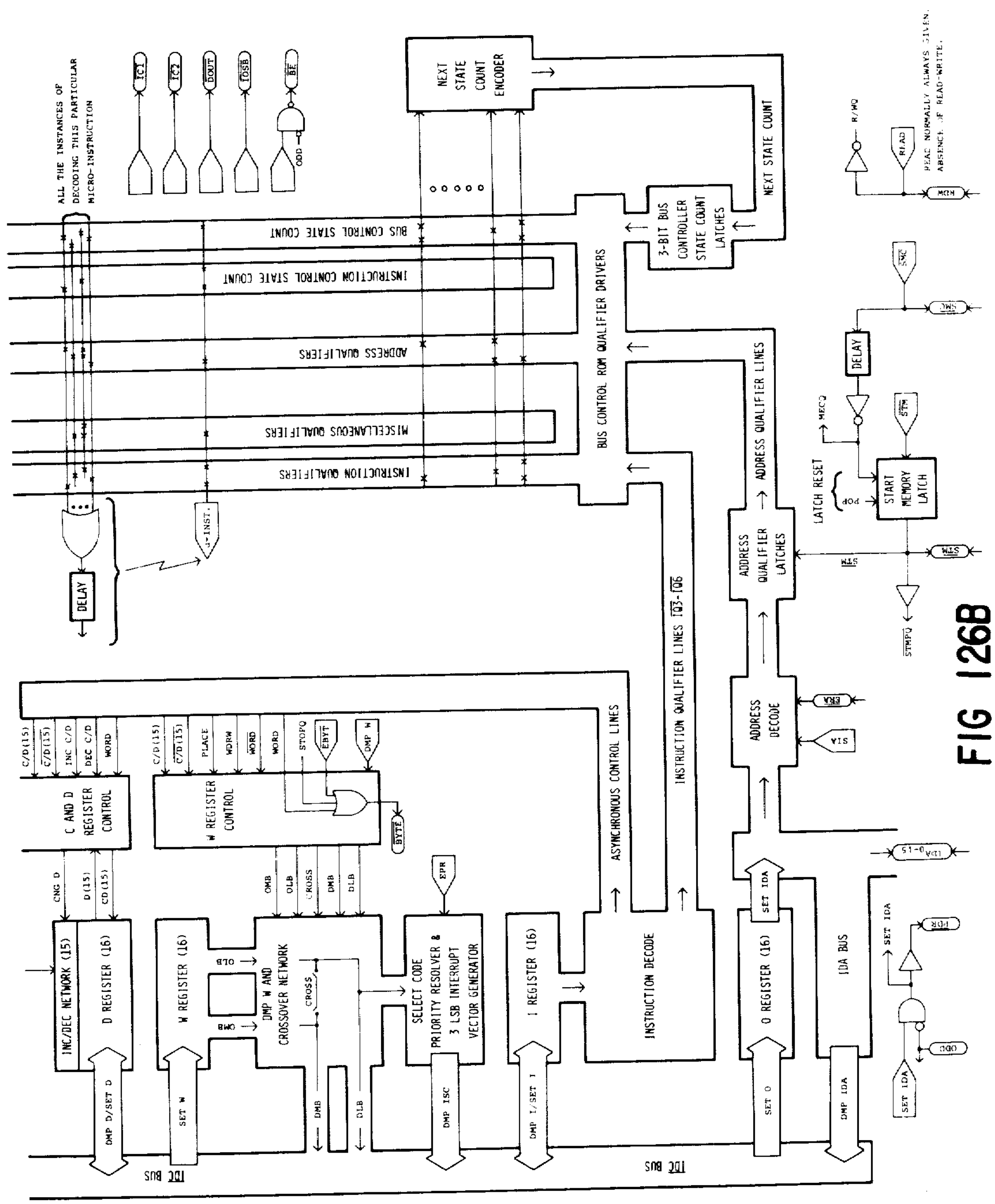

FIGS. 126A–C are a detailed block diagram of the IOC of FIG. 19.

FIG. 127 is a diagram illustrating the format in which 12-digit floating point binary-coded-decimal numbers are encoded for use by the EMC of FIG. 19.

FIGS. 128A–C are a tabular illustration of the instruction set and corresponding bit patterns associated with the EMC of FIG. 19.

Figure 129A:
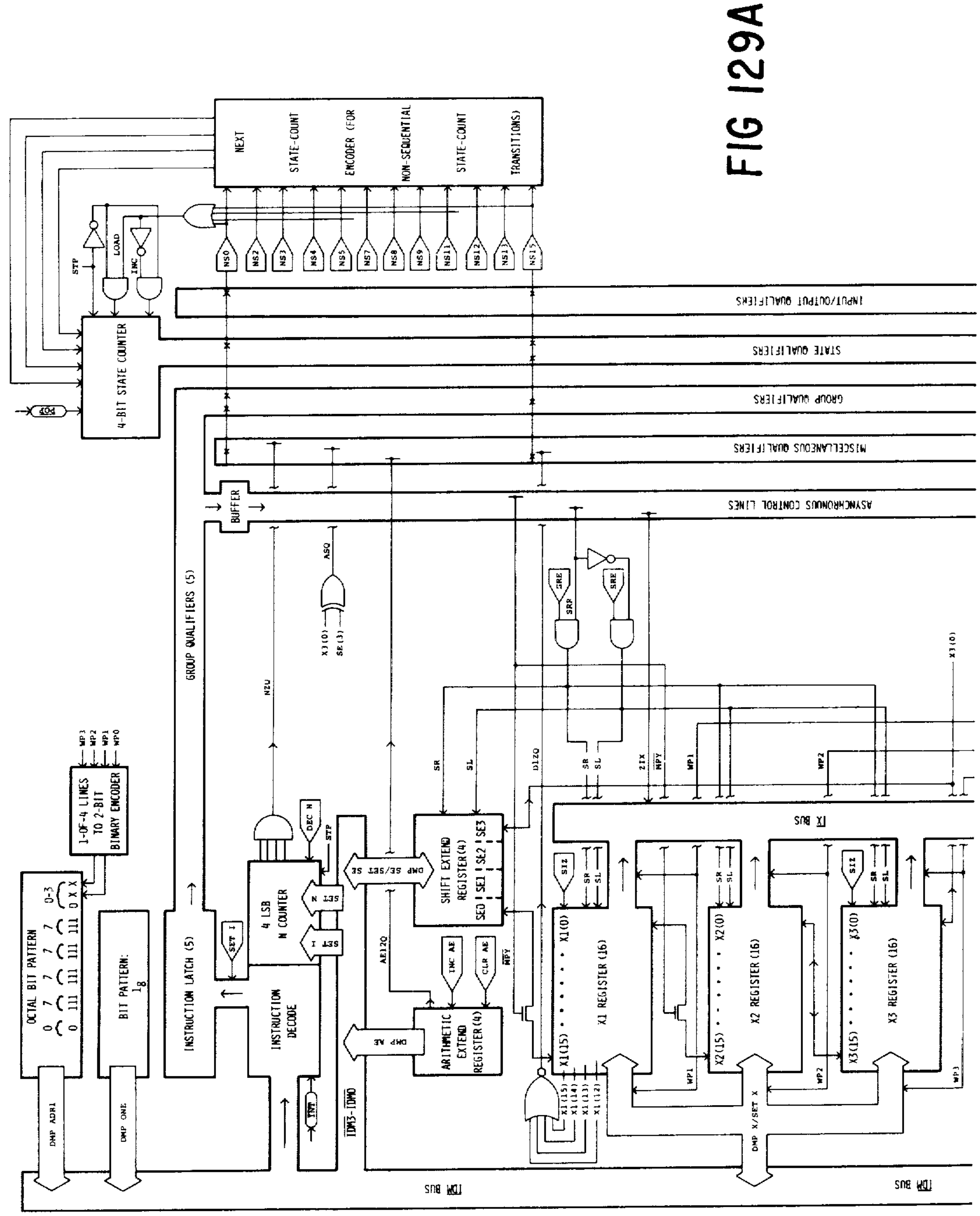
Figure 129B:
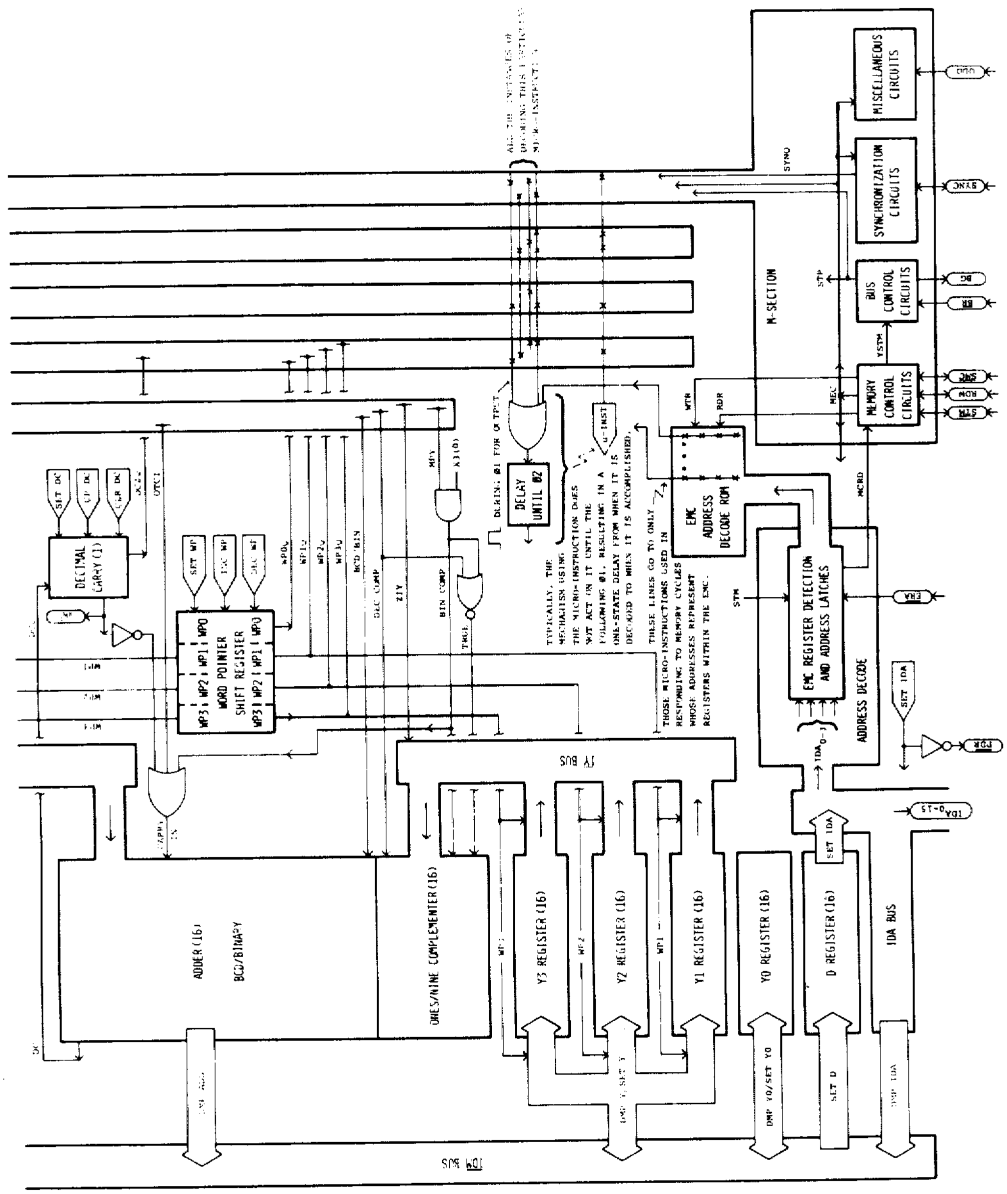

FIGS. 129A–C are a detailed block diagram of the EMC of FIG. 19.

Figure 16:
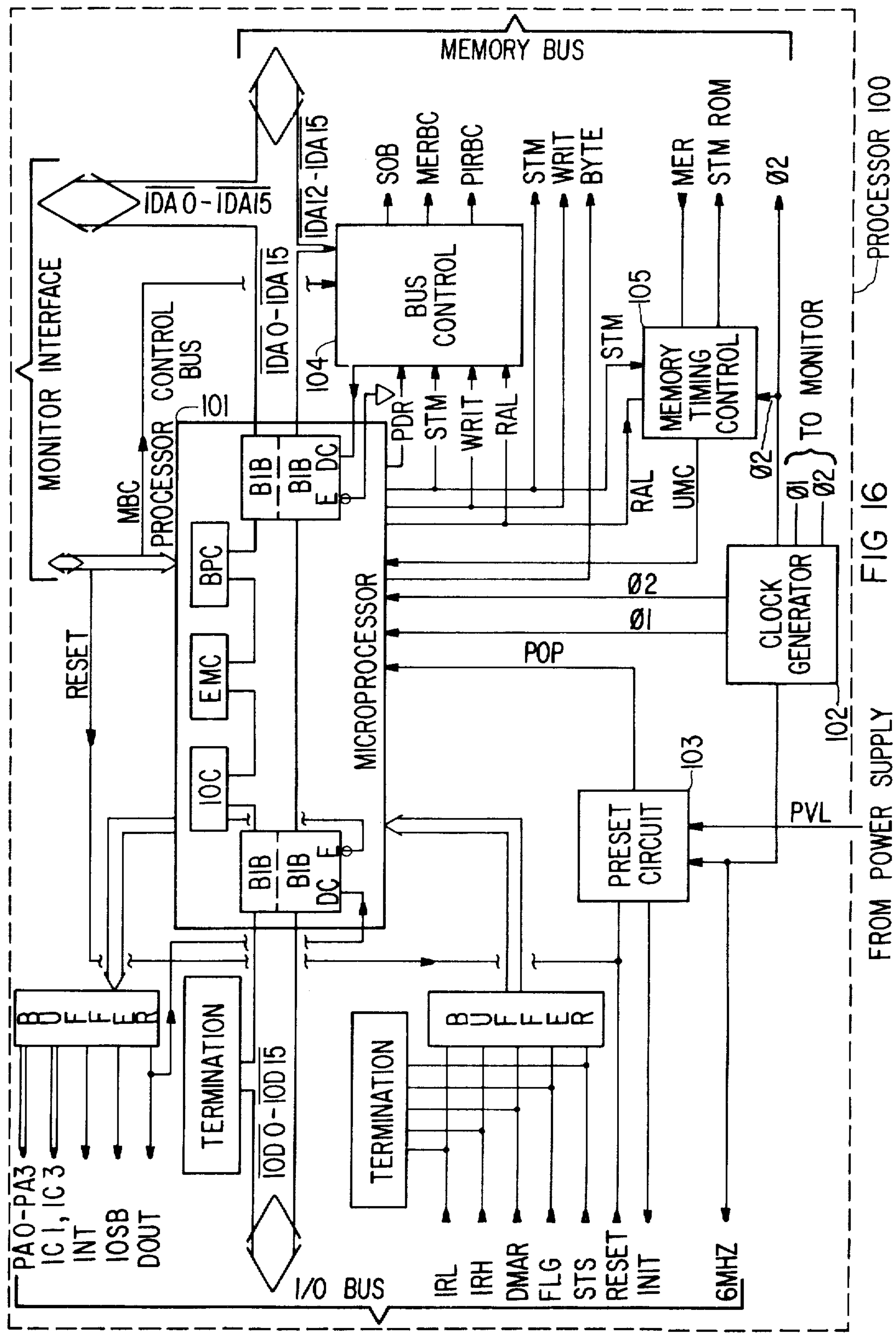
FIG. 16 is a detailed block diagram of the processor of FIG. 4.
Figure 130:
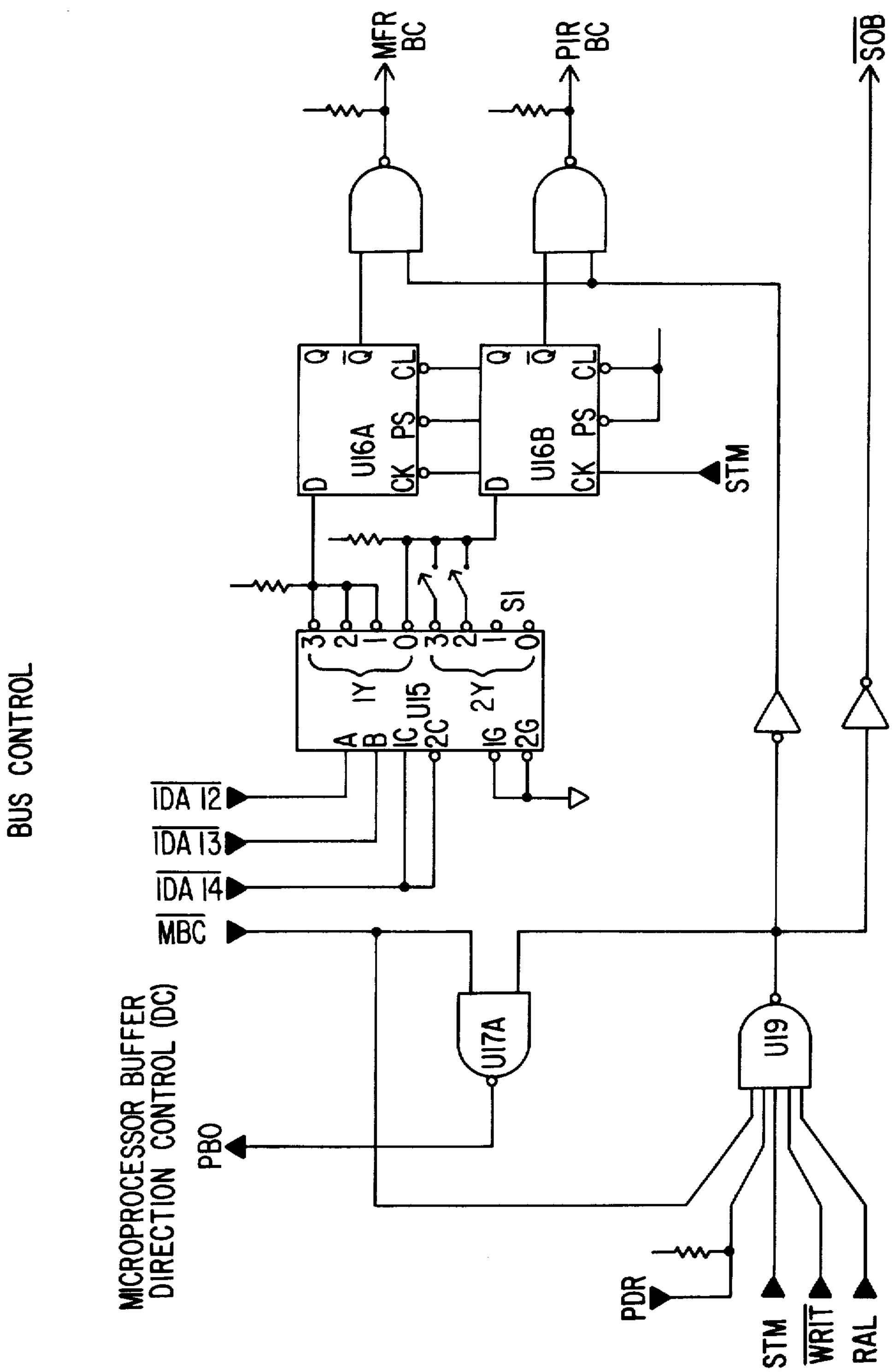

FIG. 130 is a detailed schematic diagram of the bus control block of FIG. 16.

Figure 131:
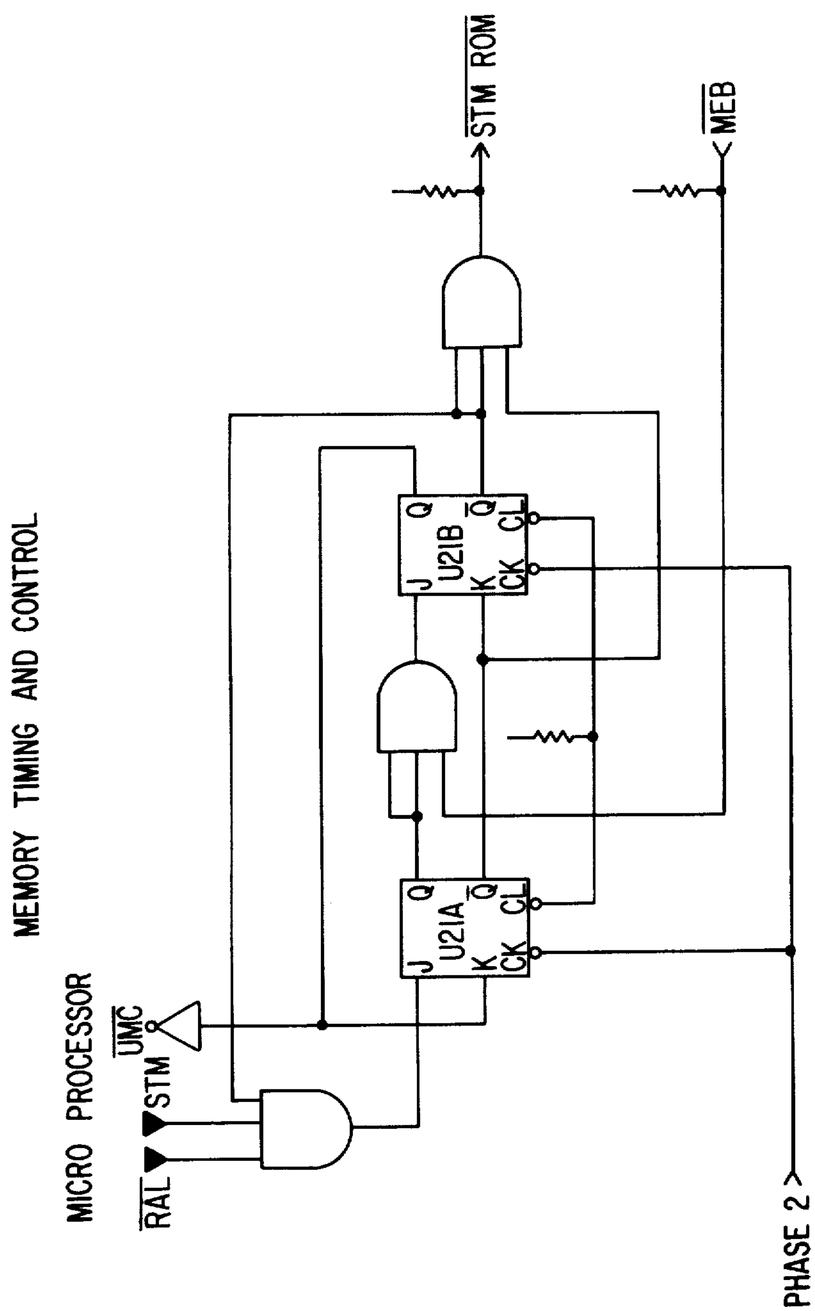

FIG. 131 is a detailed schematic diagram of the memory timing control block of FIG. 16.

Figure 4:
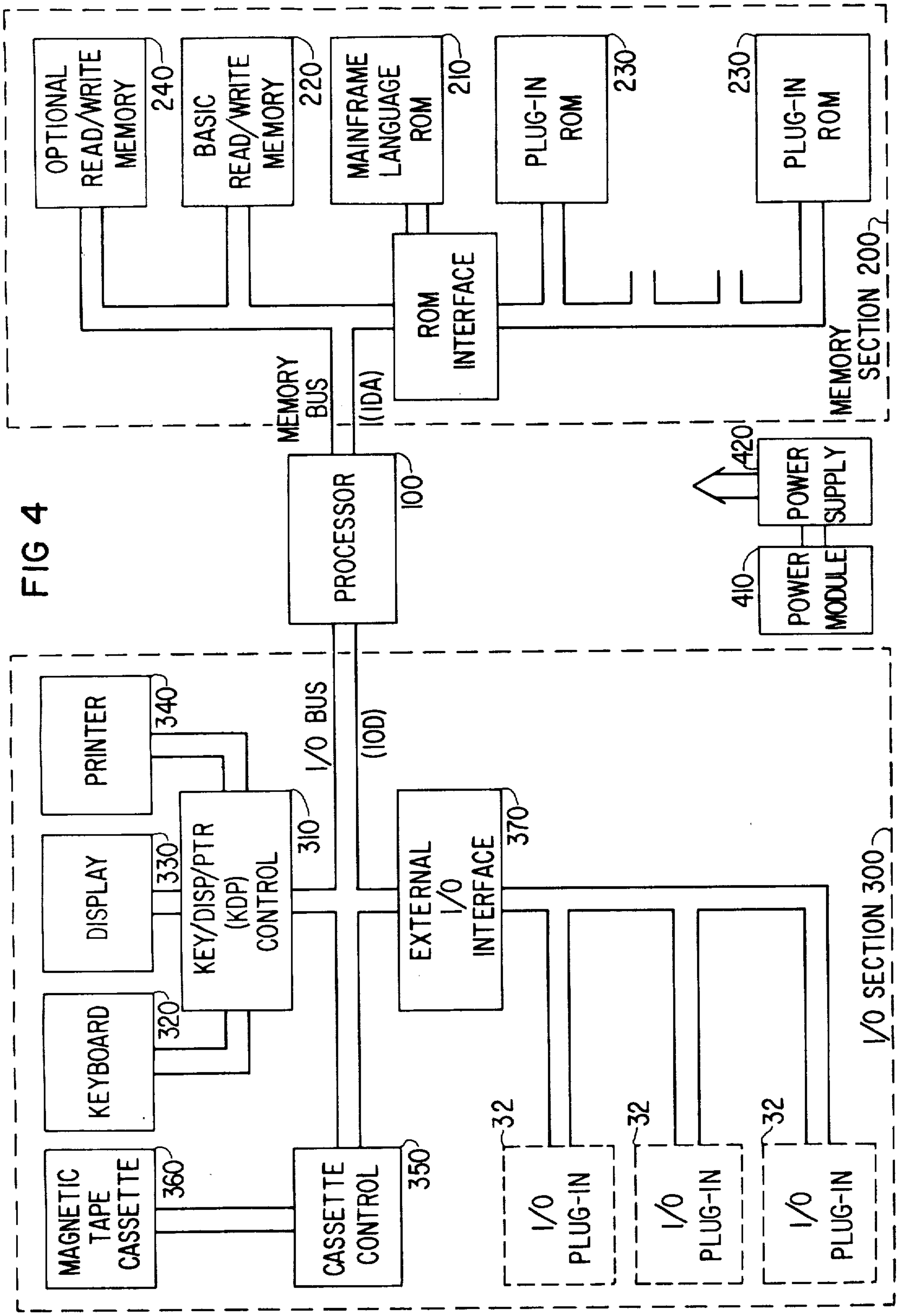
FIG. 4 is a simplified block diagram of the hardware associated with the calculator of FIG. 1.
Figure 132:
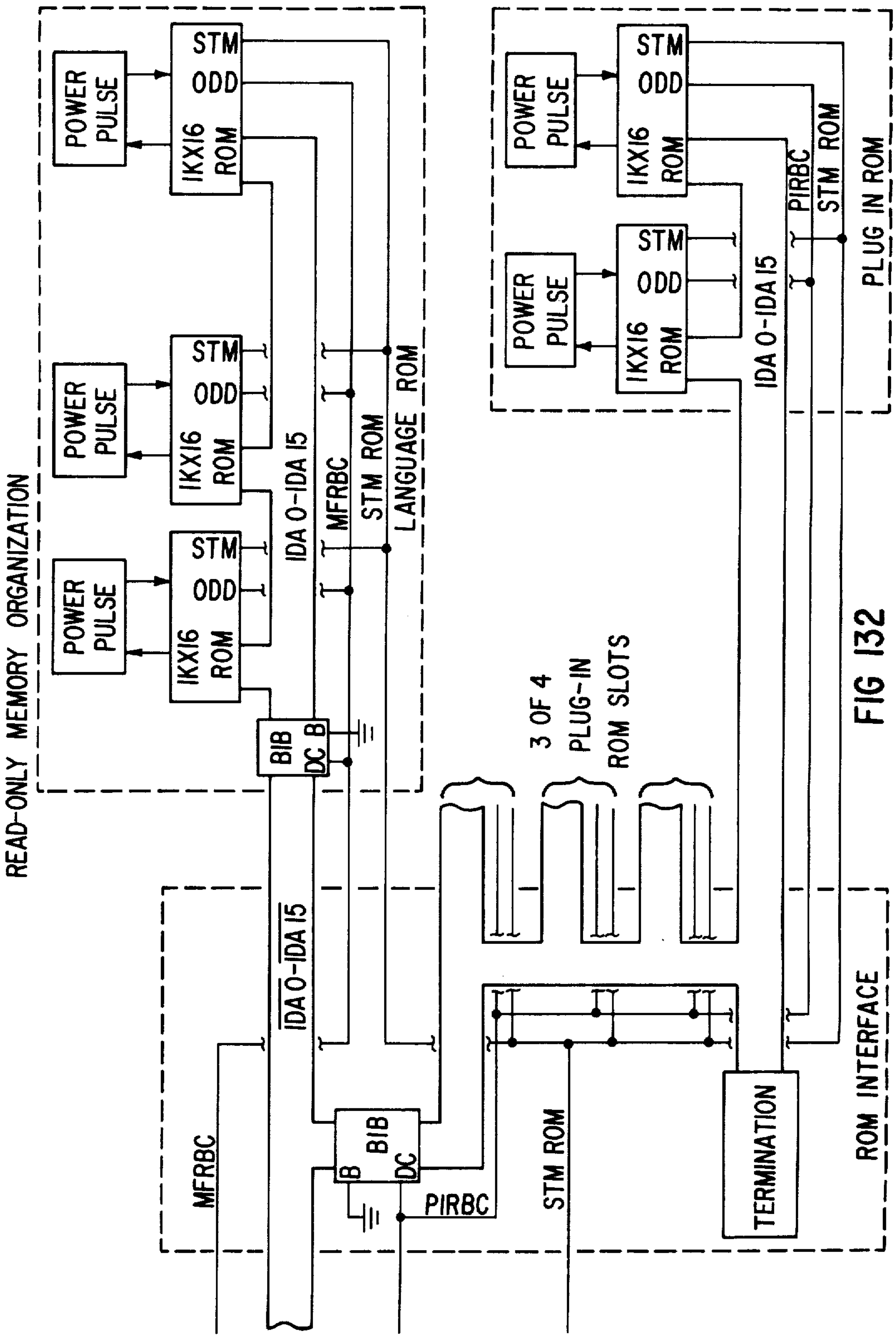

FIG. 132 is a detailed block diagram of the mainframe language ROM, ROM interface, and plug-in ROM of FIG. 4.

Figure 133:
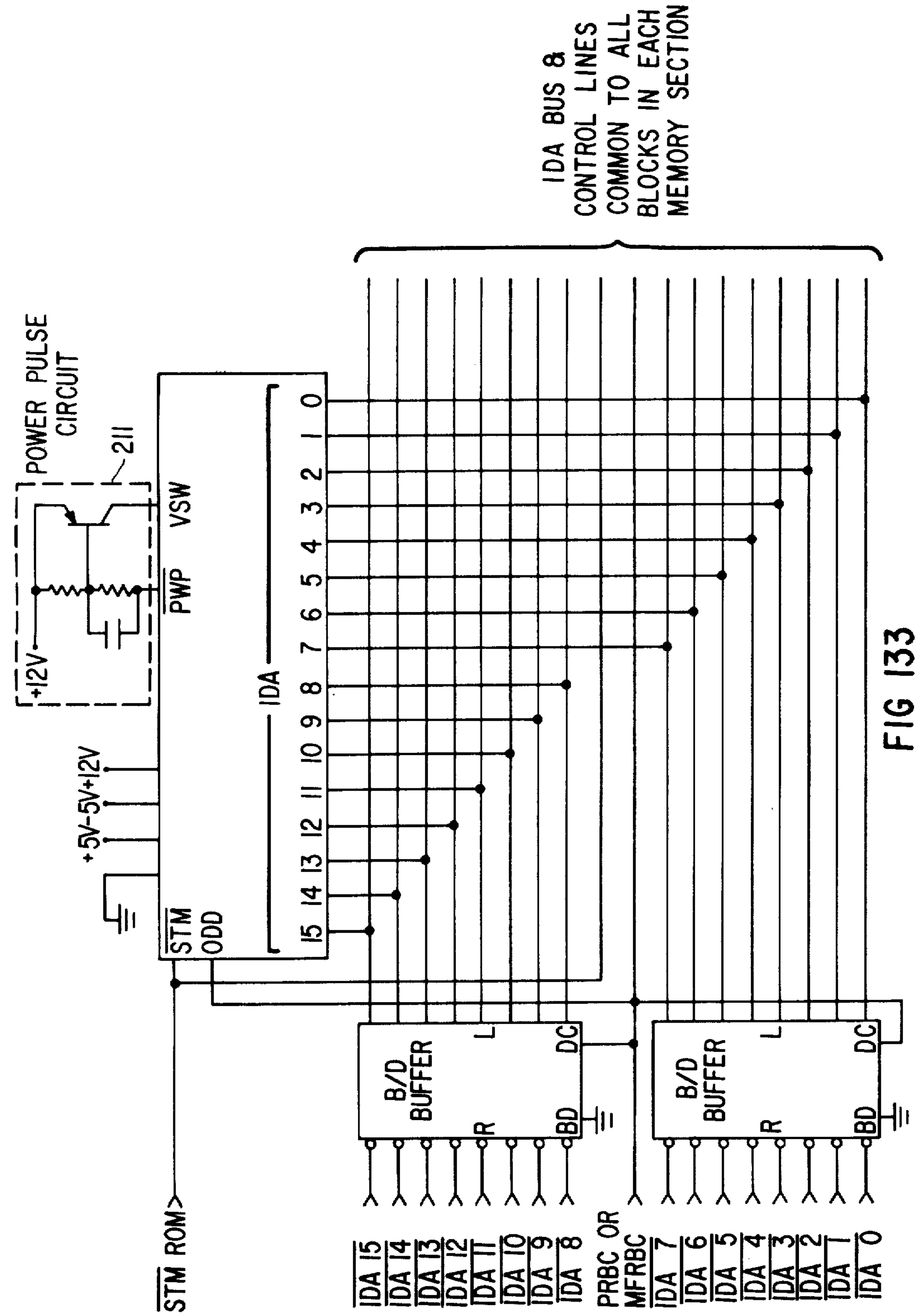

FIG. 133 is a detailed schematic diagram of one of the individual ROM chips employed in the mainframe language ROM, ROM interface, and plug-in ROM of FIGS. 4 and 132.

Figure 134:
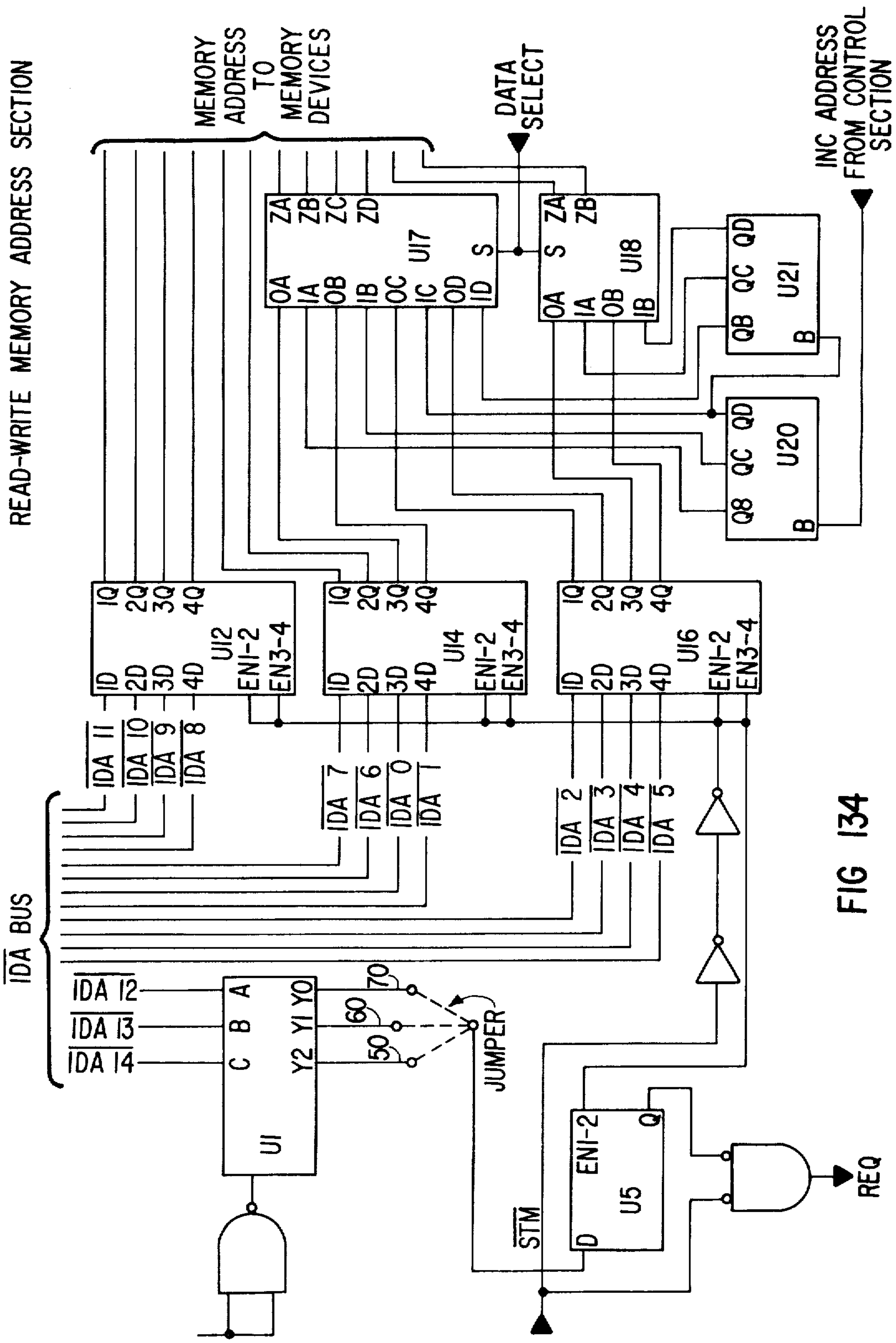

FIG. 134 is a detailed schematic diagram of an address section of the basic and optional read-write memories of FIG. 4.

Figure 135:
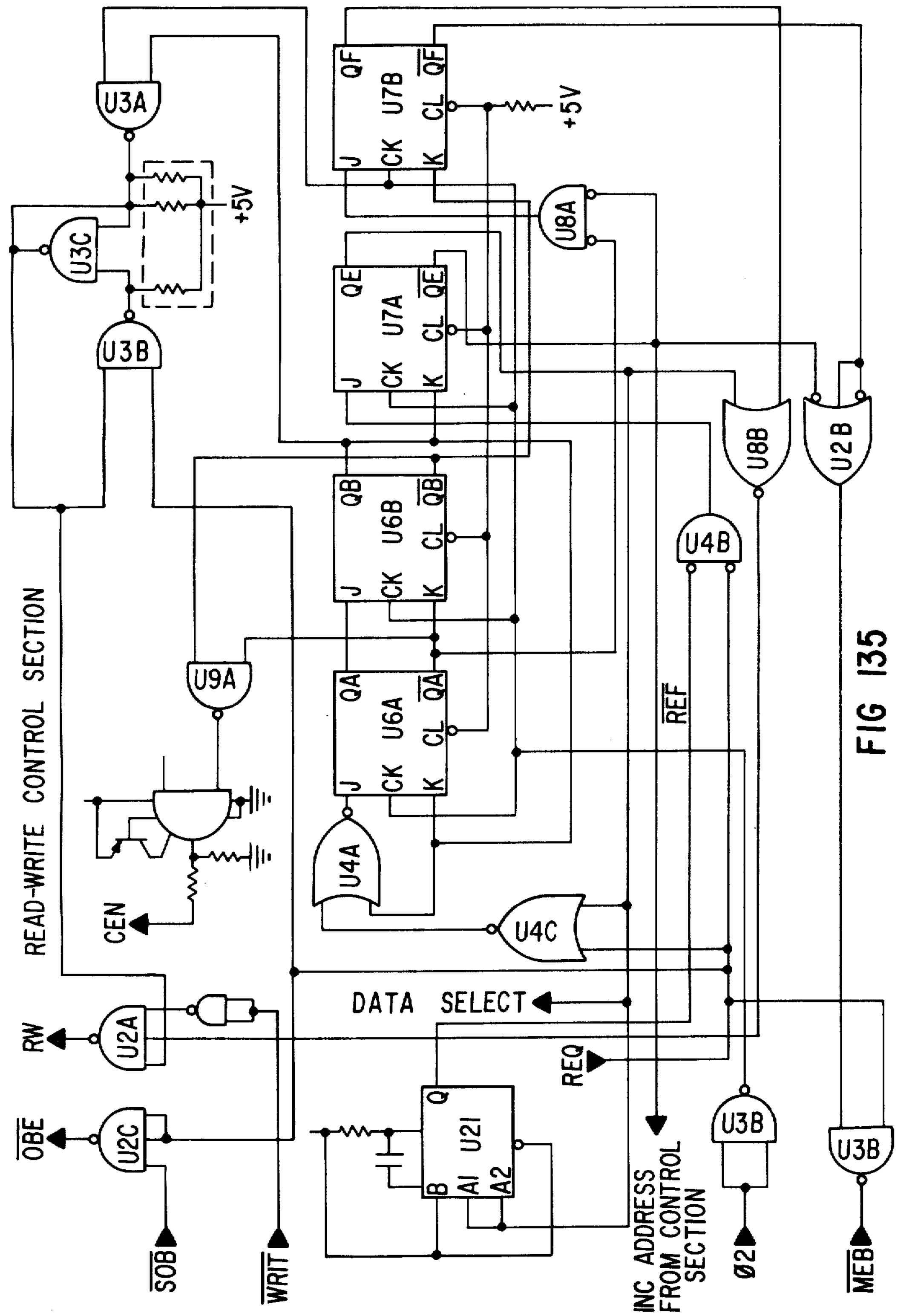

FIG. 135 is a detailed schematic diagram of a memory control section of the basic and optional read-write memories of FIG. 4.

Figure 136:
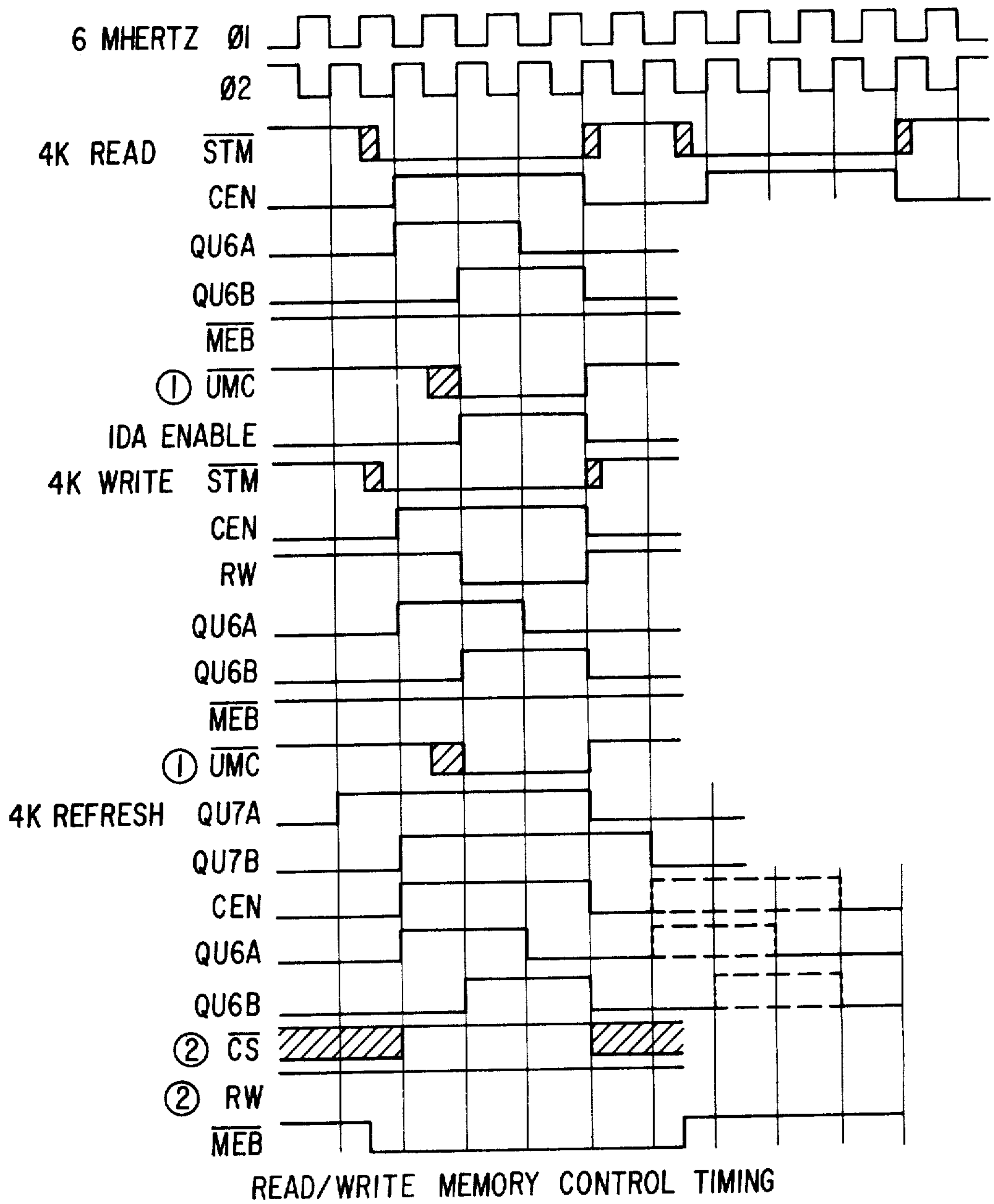

FIG. 136 is a waveform diagram illustrating the timing relationship between various signals involved in the read-write memory control section circuitry of FIG. 135.

Figure 137:
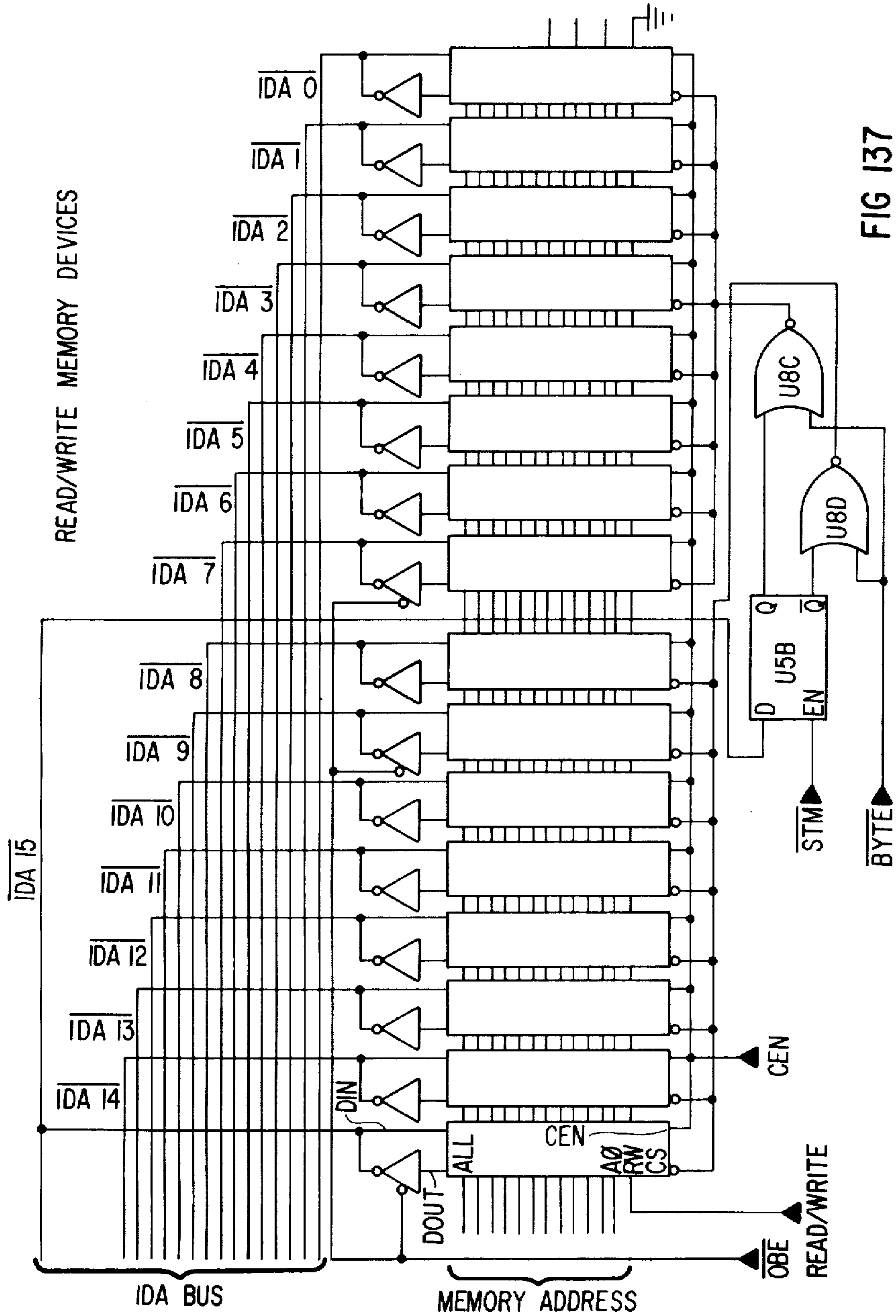

FIG. 137 is a detailed schematic diagram of a read-write memory devices section of the basic and optional read-write memories of FIG. 4.

Figure 138:
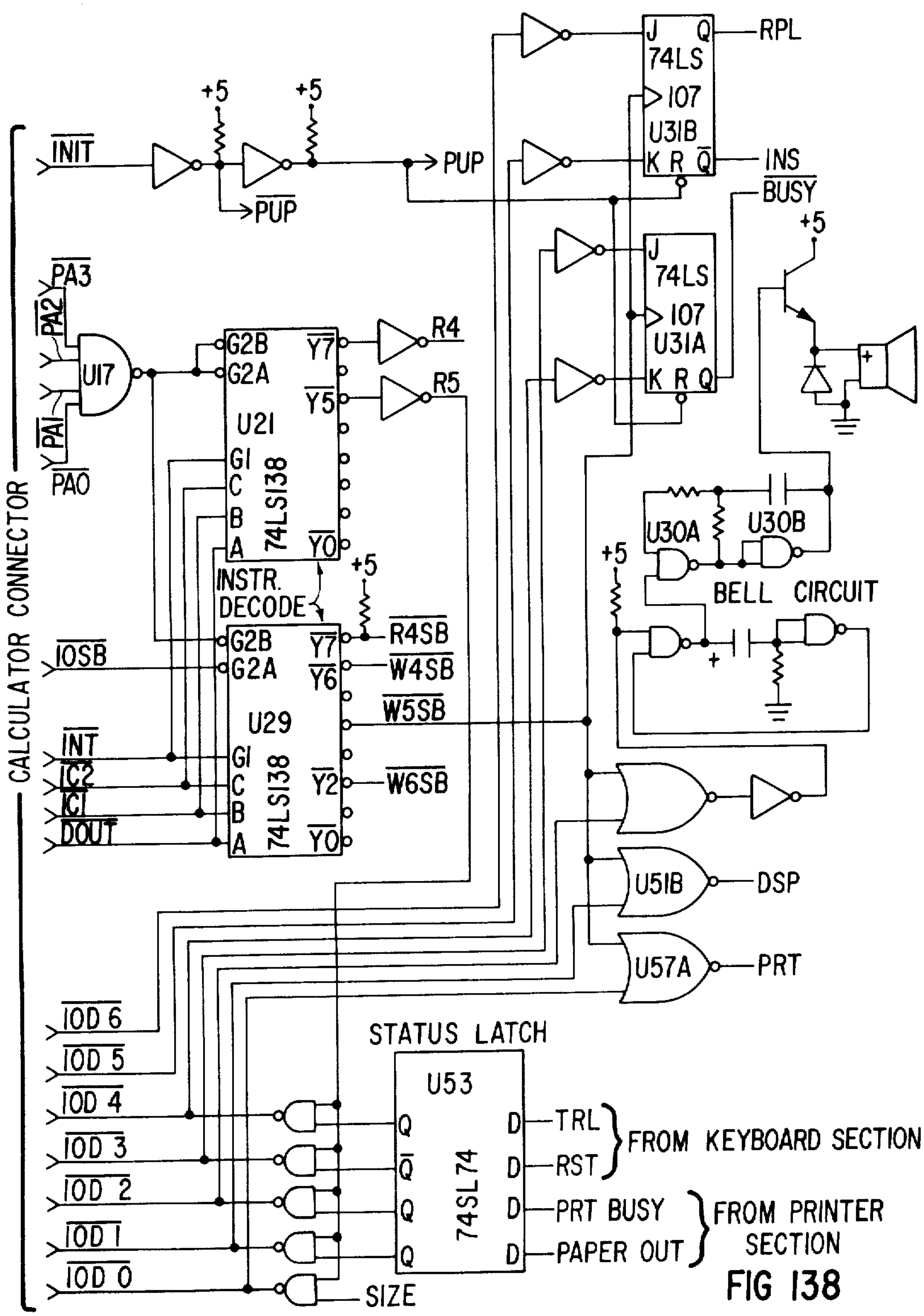

FIG. 138 is a detailed schematic diagram of an I/O interface section of the KDP control block of FIG. 4.

Figure 139:
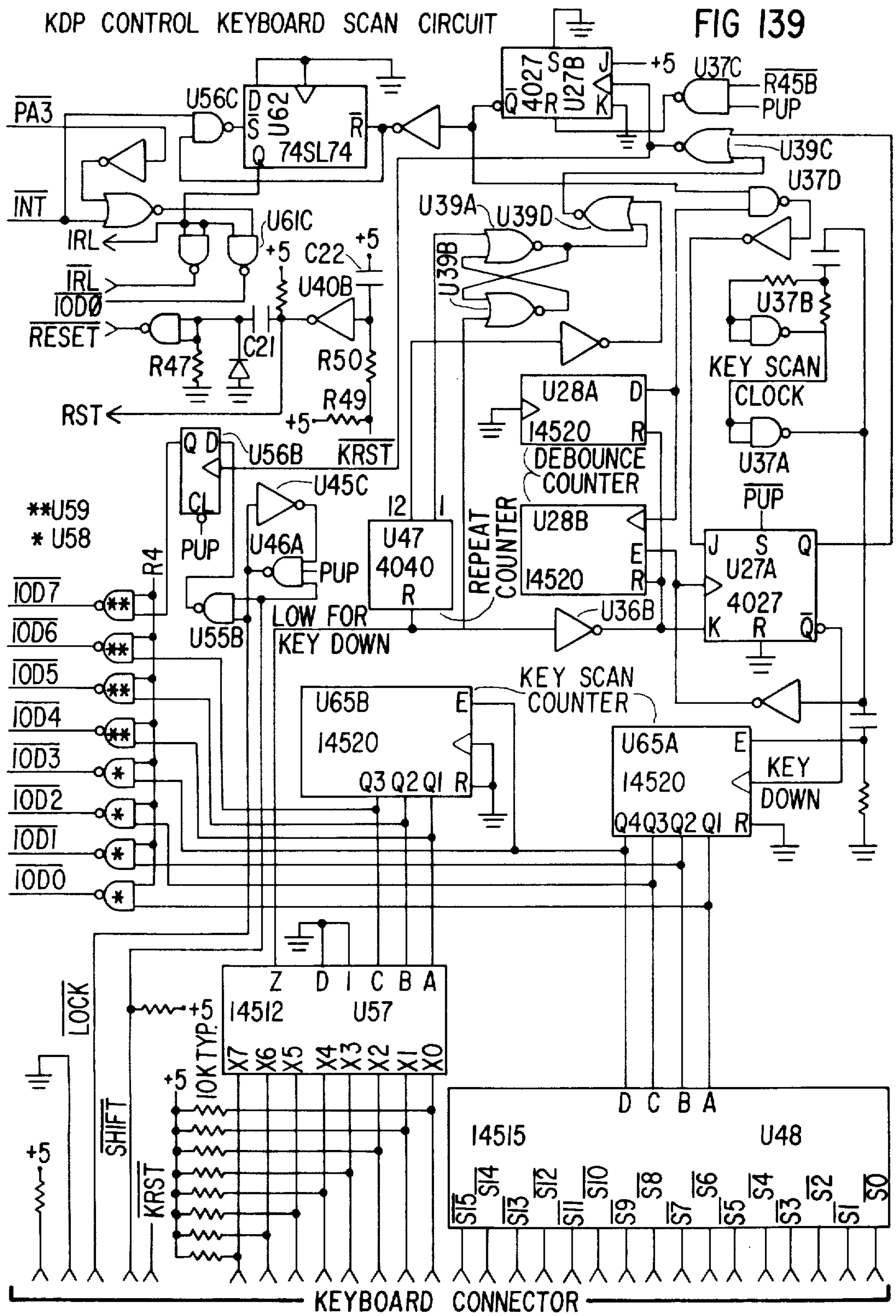

FIG. 139 is a detailed schematic diagram of a keyboard scan circuit section of the KDP control block of FIG. 4.

Figure 140:
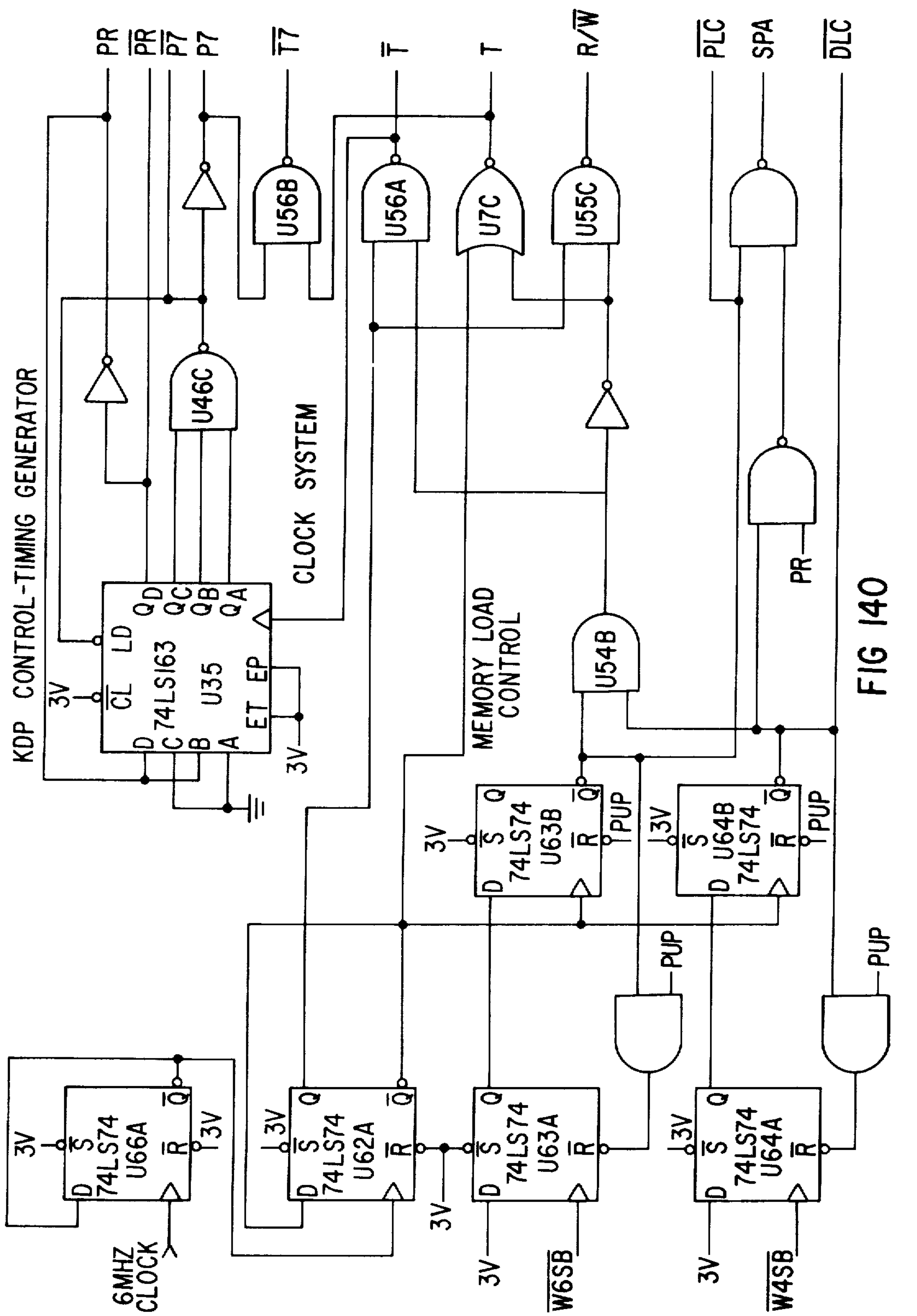

FIG. 140 is a detailed schematic diagram of a timing generator section of the KDP control block of FIG. 4.

Figure 141:
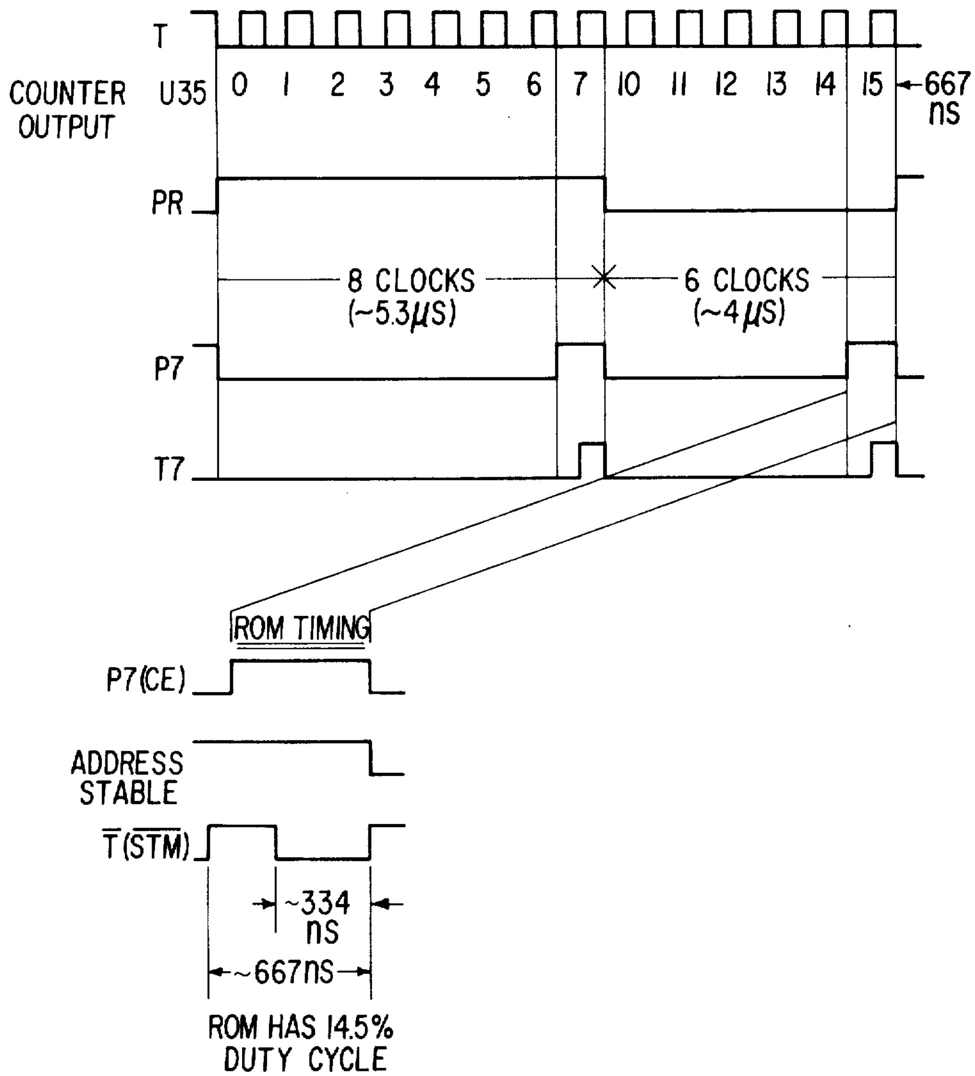

FIG. 141 is a waveform diagram illustrating the timing relationship between various signals involved in the timing generator section of FIG. 140.

Figure 142:
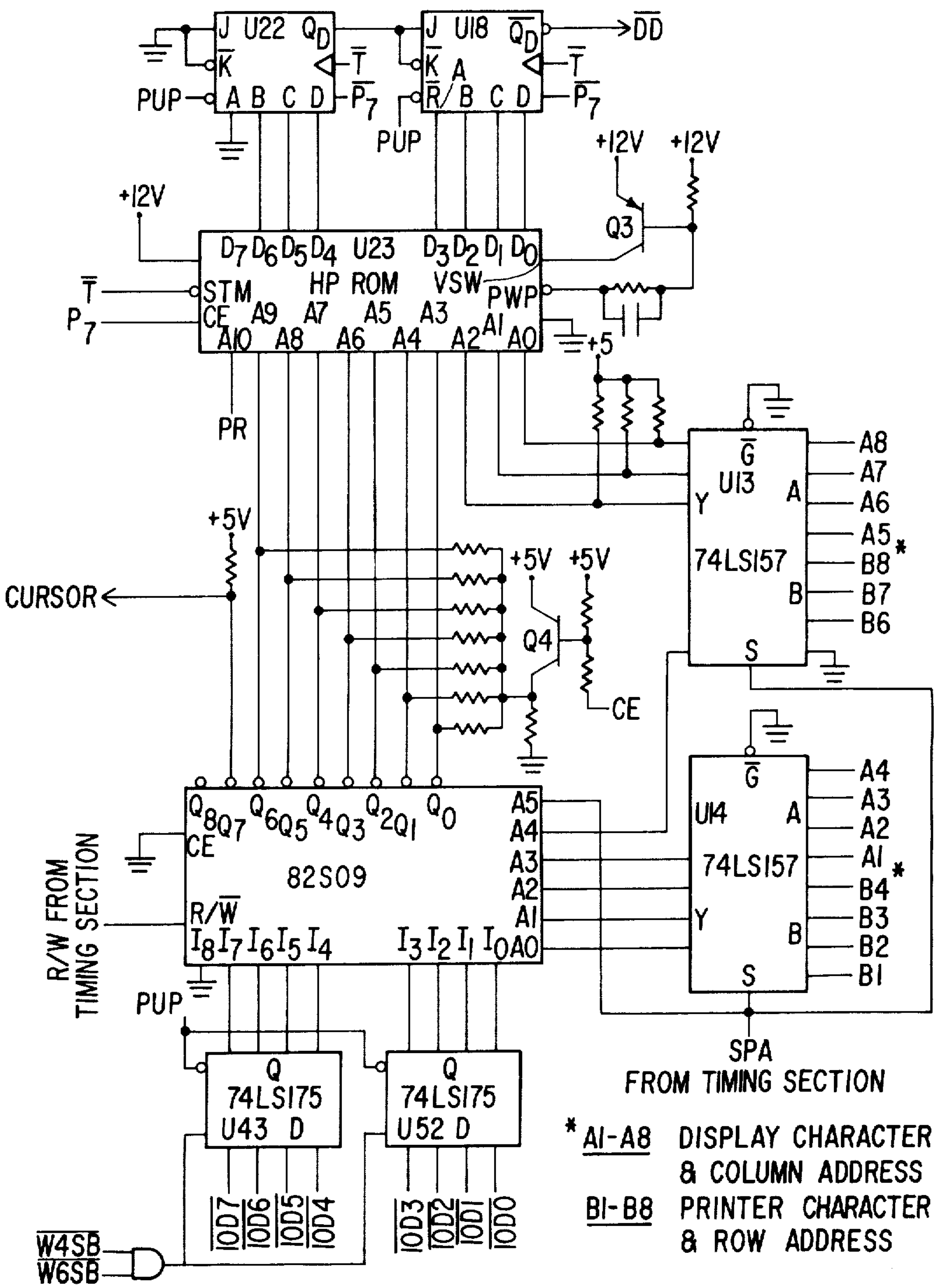

FIG. 142 is a detailed schematic diagram of a memory section of the KDP control block of FIG. 4.

Figure 143:
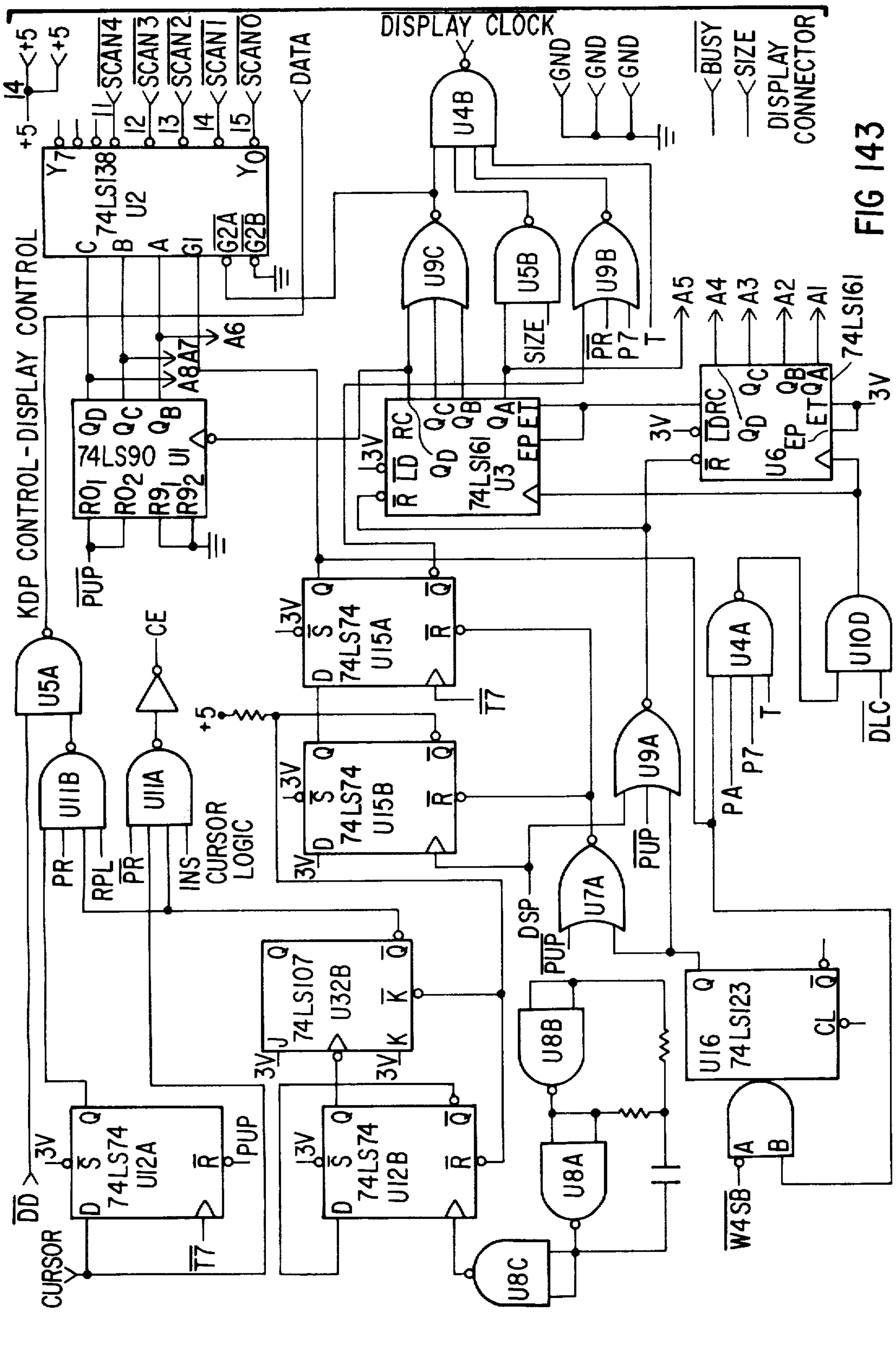

FIG. 143 is a detailed schematic diagram of a display control section of the KDP control block of FIG. 4.

Figure 144:
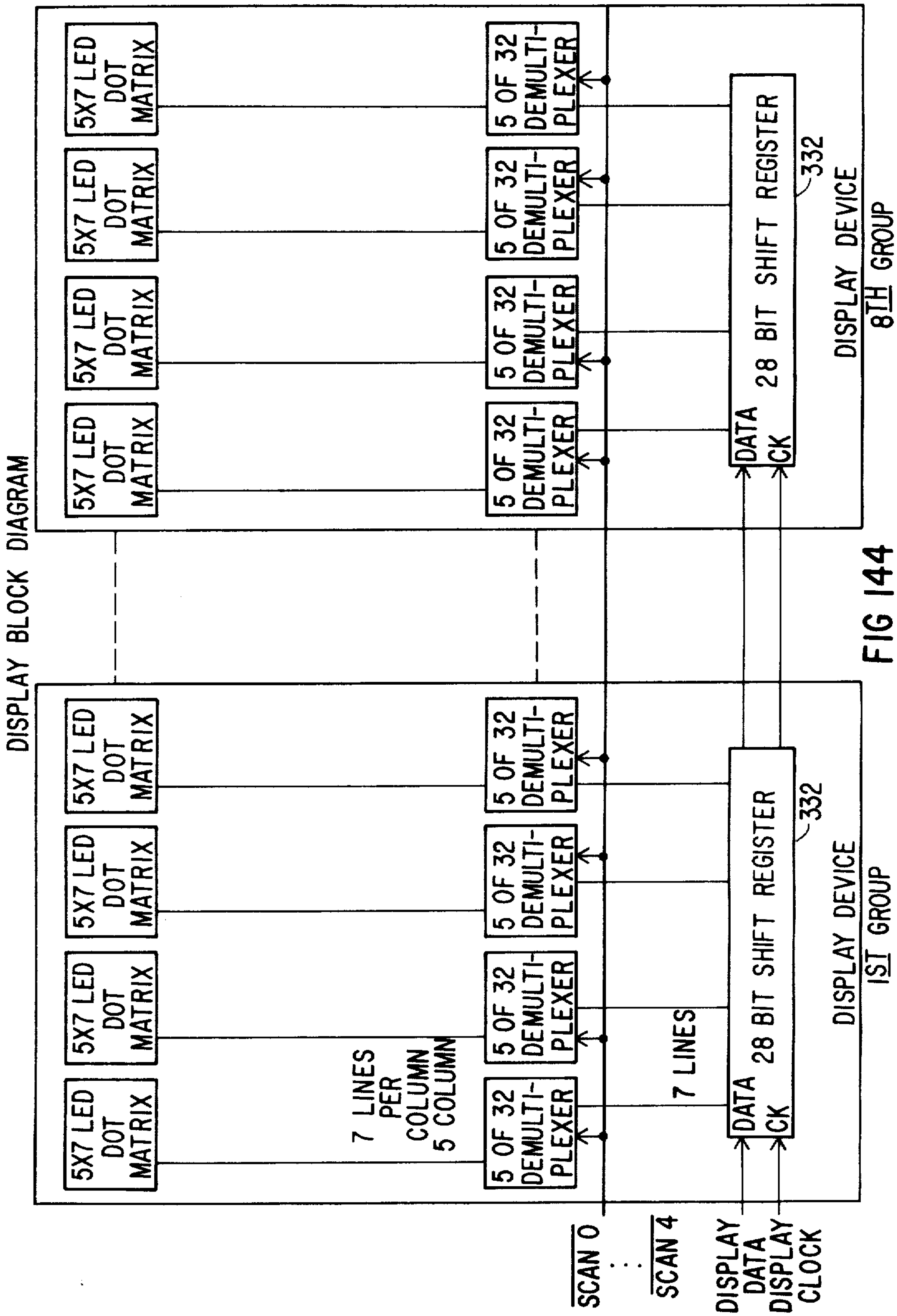

FIG. 144 is a detailed block diagram of the display of FIG. 4.

Figure 145:
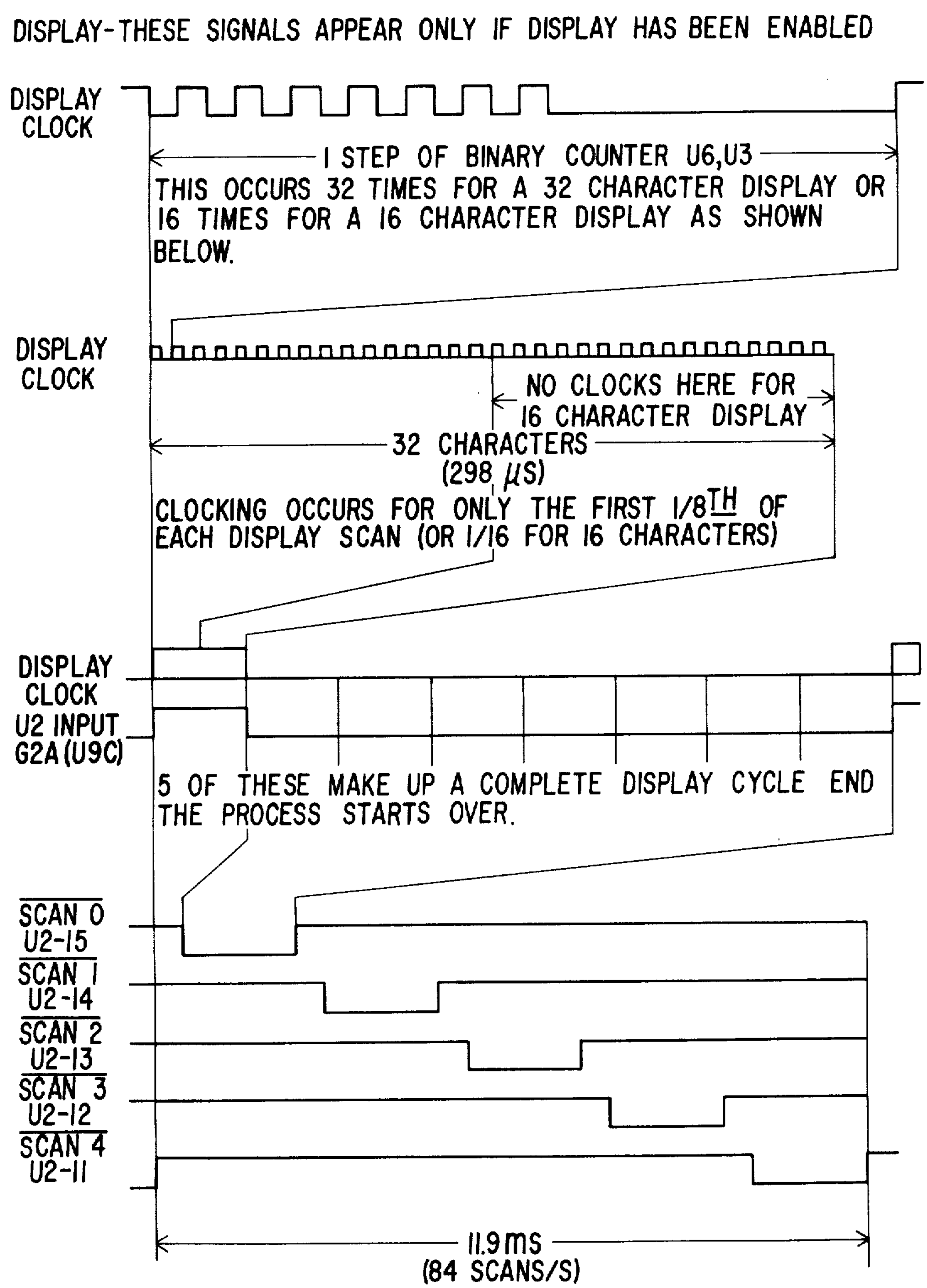

FIG. 145 is a waveform diagram illustrating the timing relationship between various signals involved in the display control section of FIG. 143.

Figure 146A:
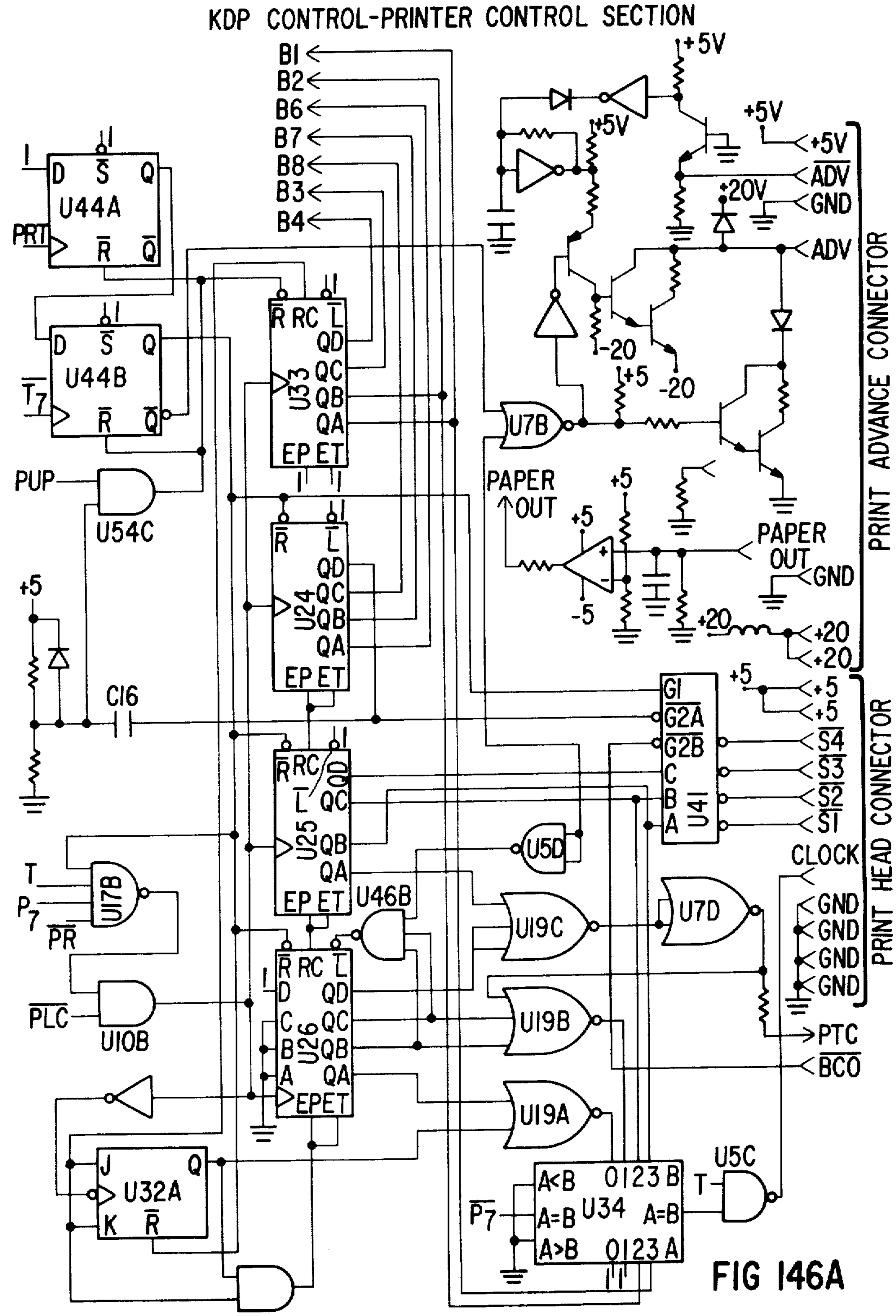
Figure 146B:
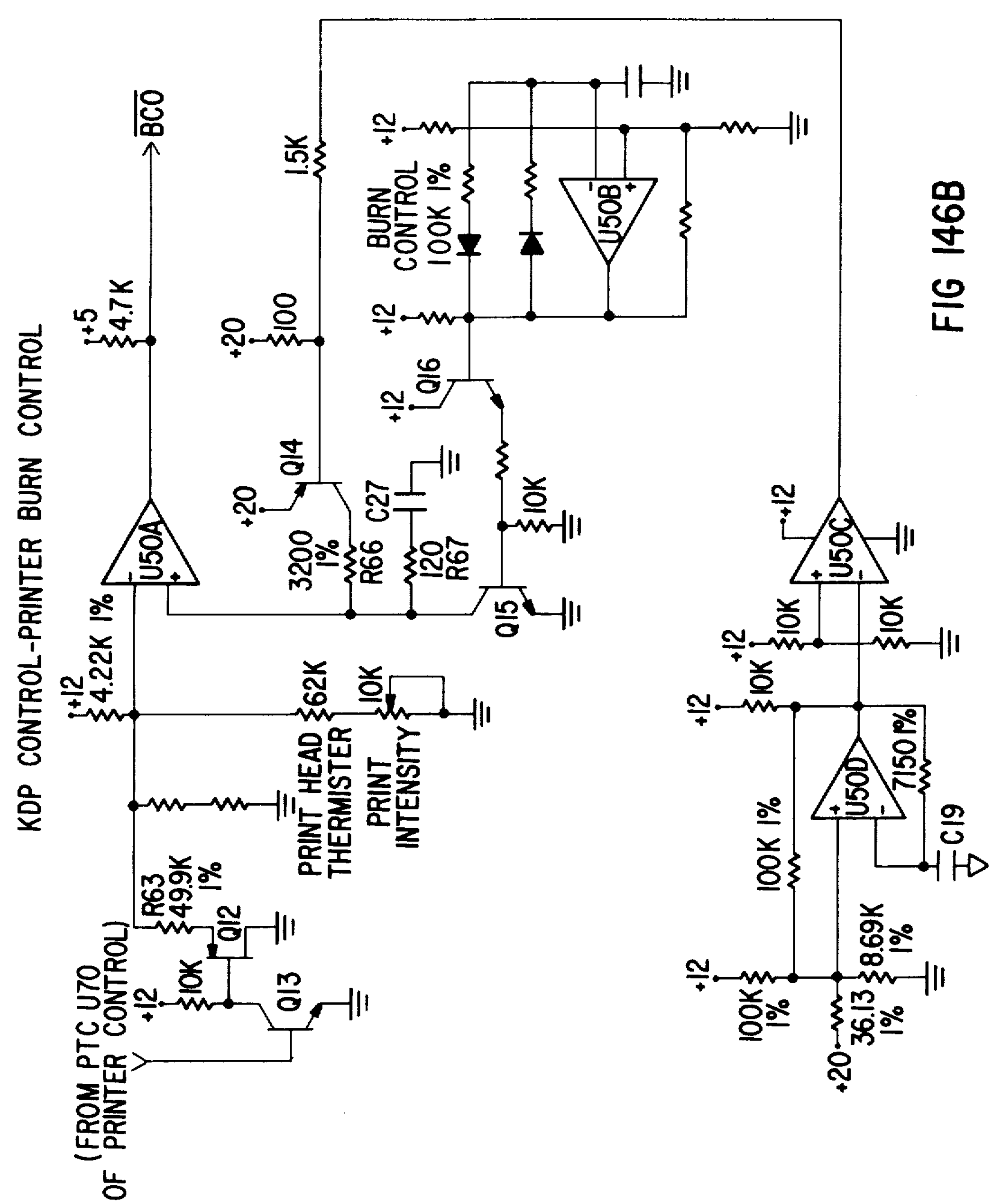

FIGS. 146A–B are a detailed schematic diagram of a printer control section of the KDP control block of FIG. 4.

Figure 147:
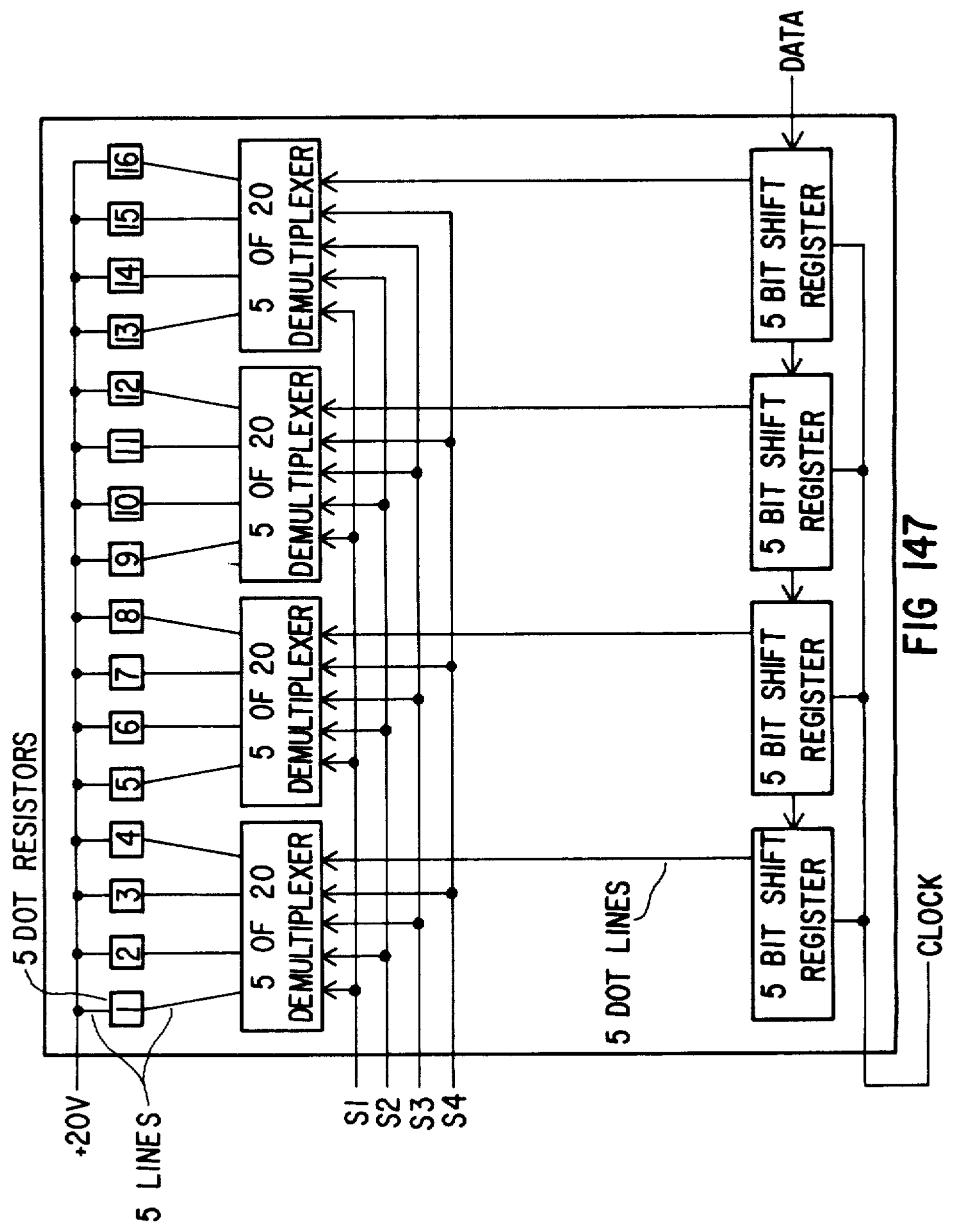

FIG. 147 is a detailed block diagram of the printer of FIG. 4.

Figure 148A:
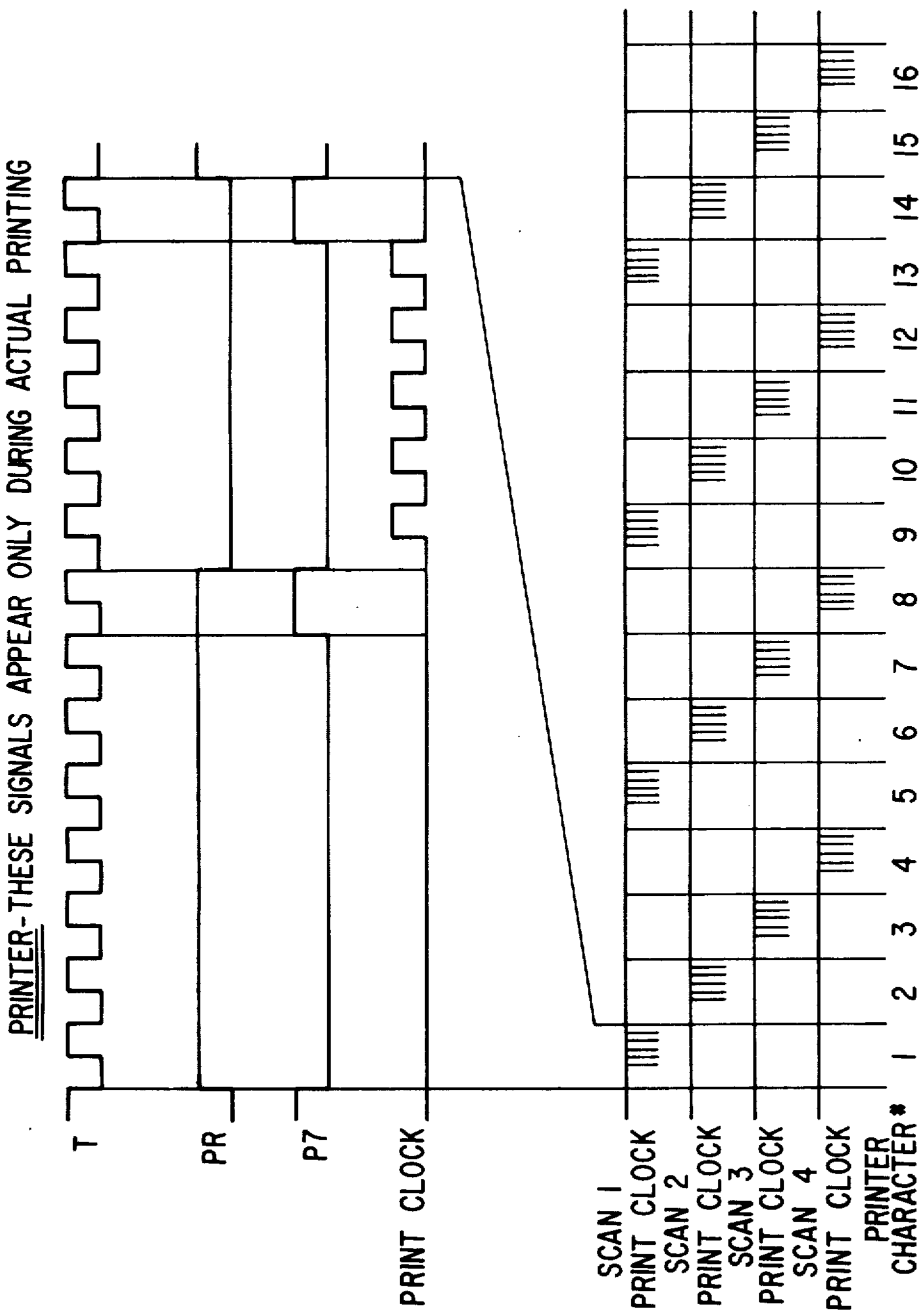
Figure 148B:
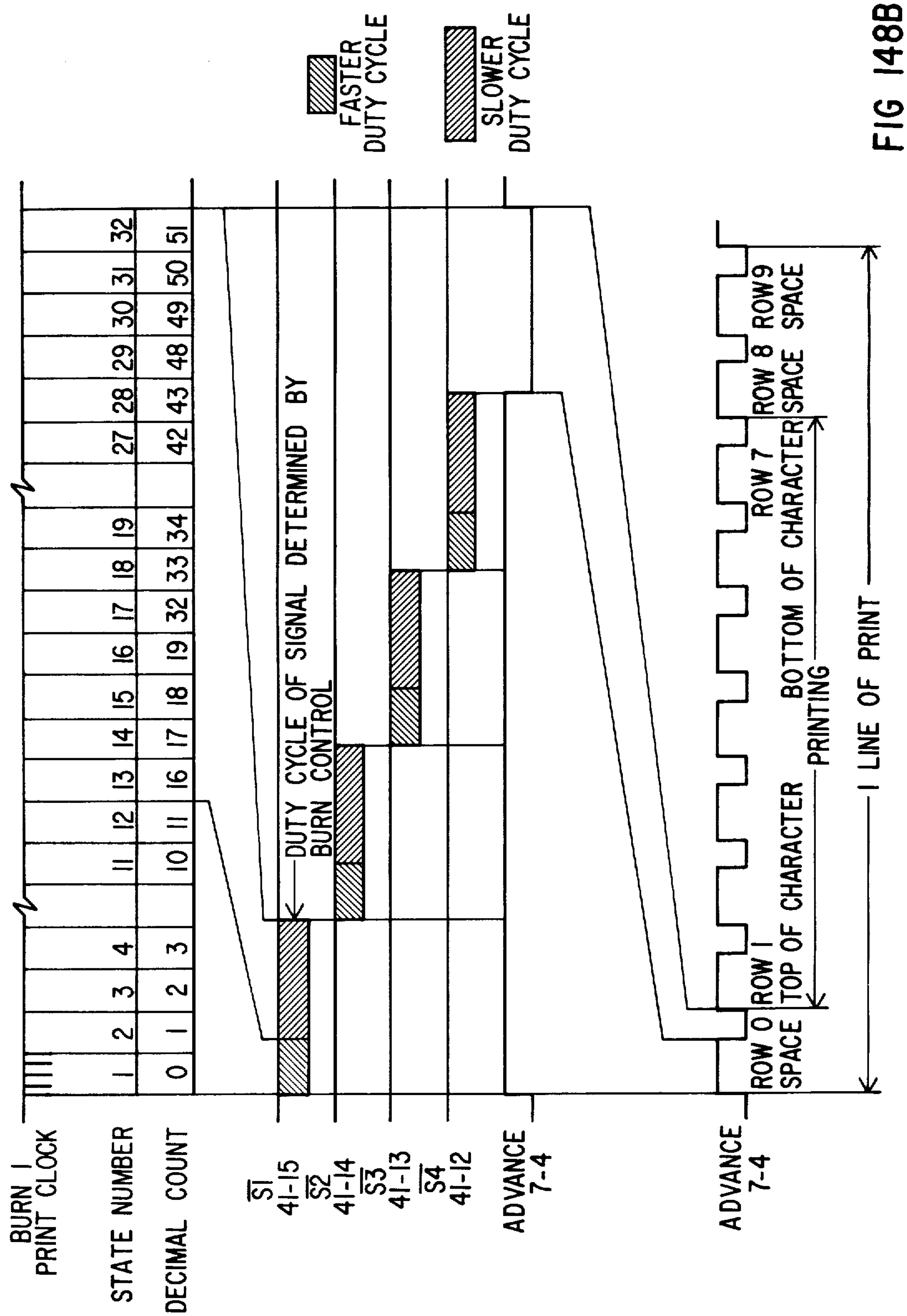

FIGS. 148A–B are a waveform diagram illustrating the timing relationship between various signals involved in the printer control section of FIGS. 146A–B.

Figure 149A:
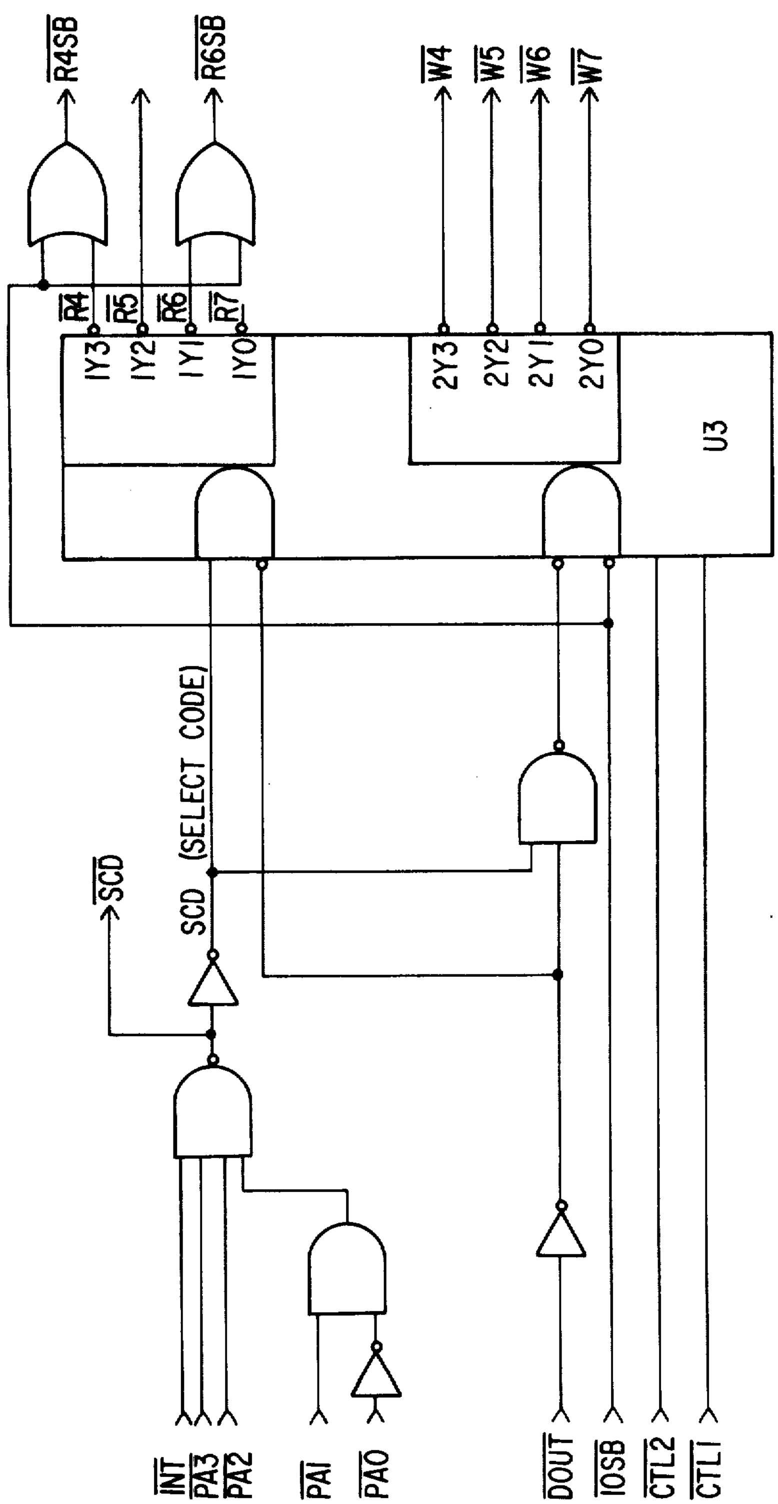
Figure 149B:
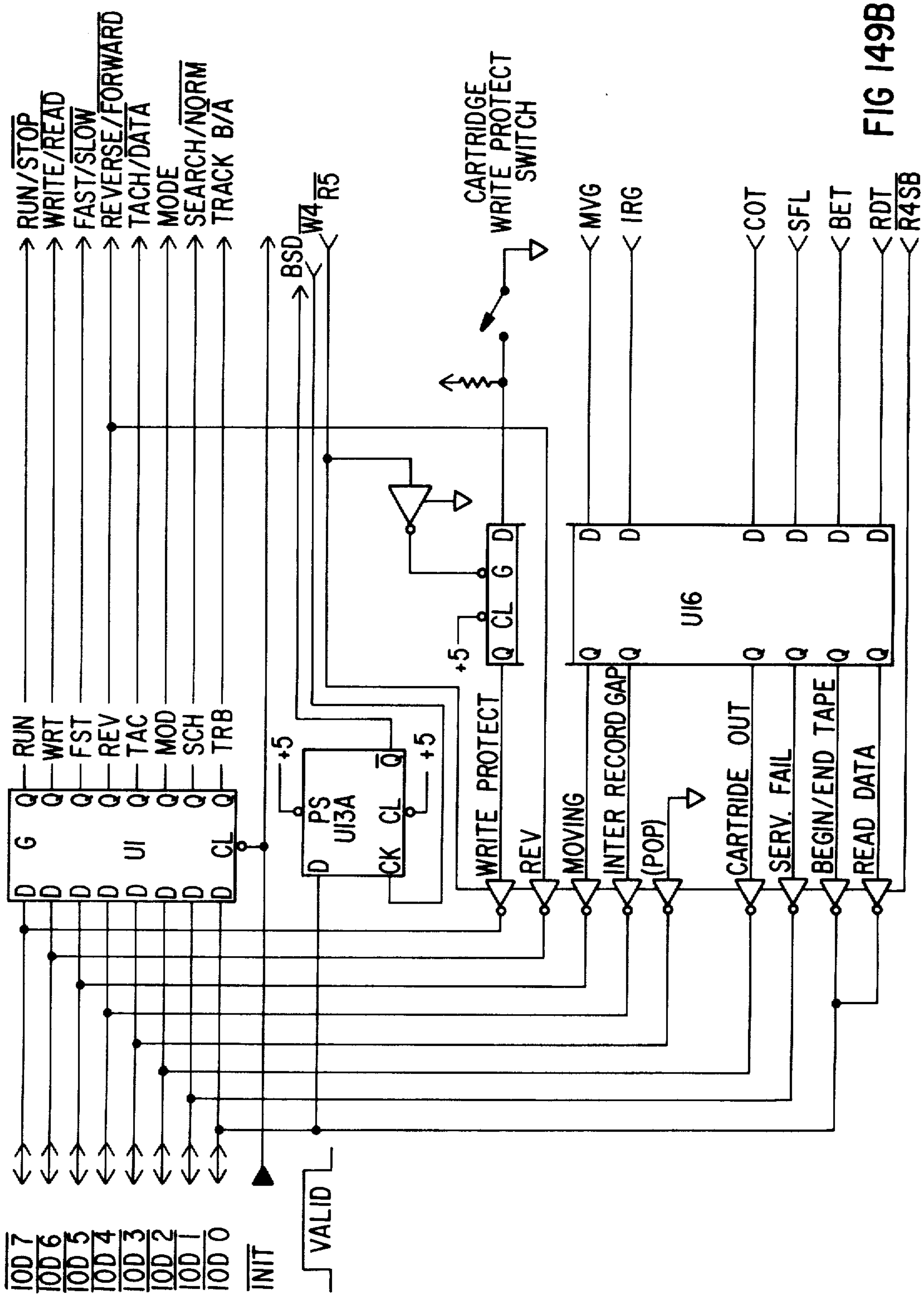
Figure 149C:
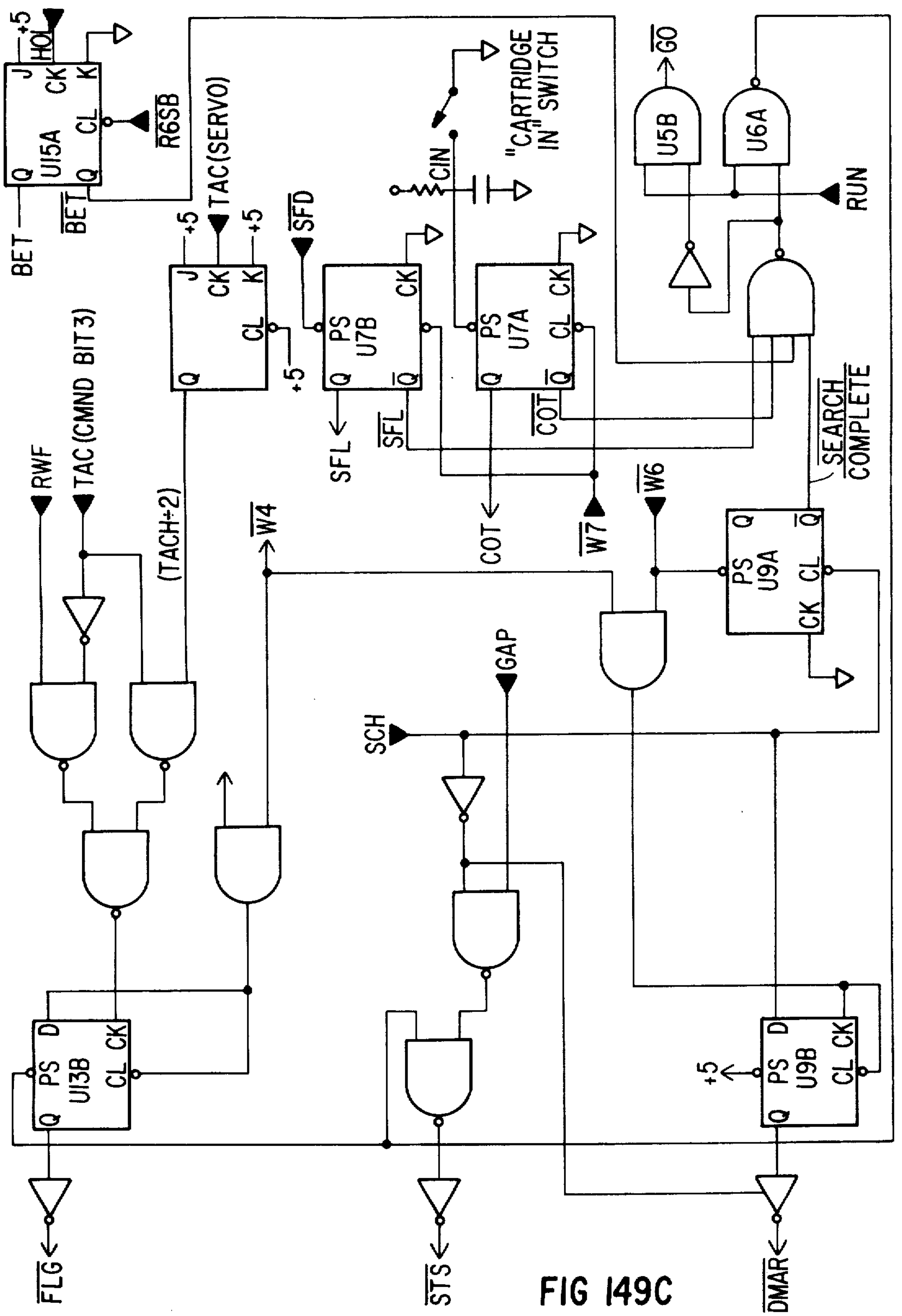

FIGS. 149A–C are a detailed schematic diagram of an I/O interface section of the cassette control block of FIG. 4.

Figure 150:
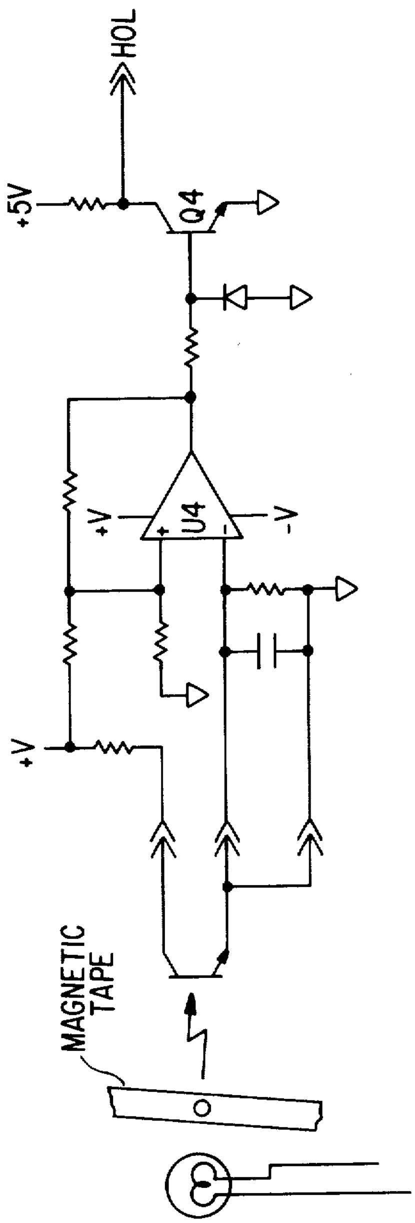

FIG. 150 is a detailed schematic diagram of a tape hole detection circuit section of the magnetic tape cassette unit of FIG. 4.

Figure 151A:
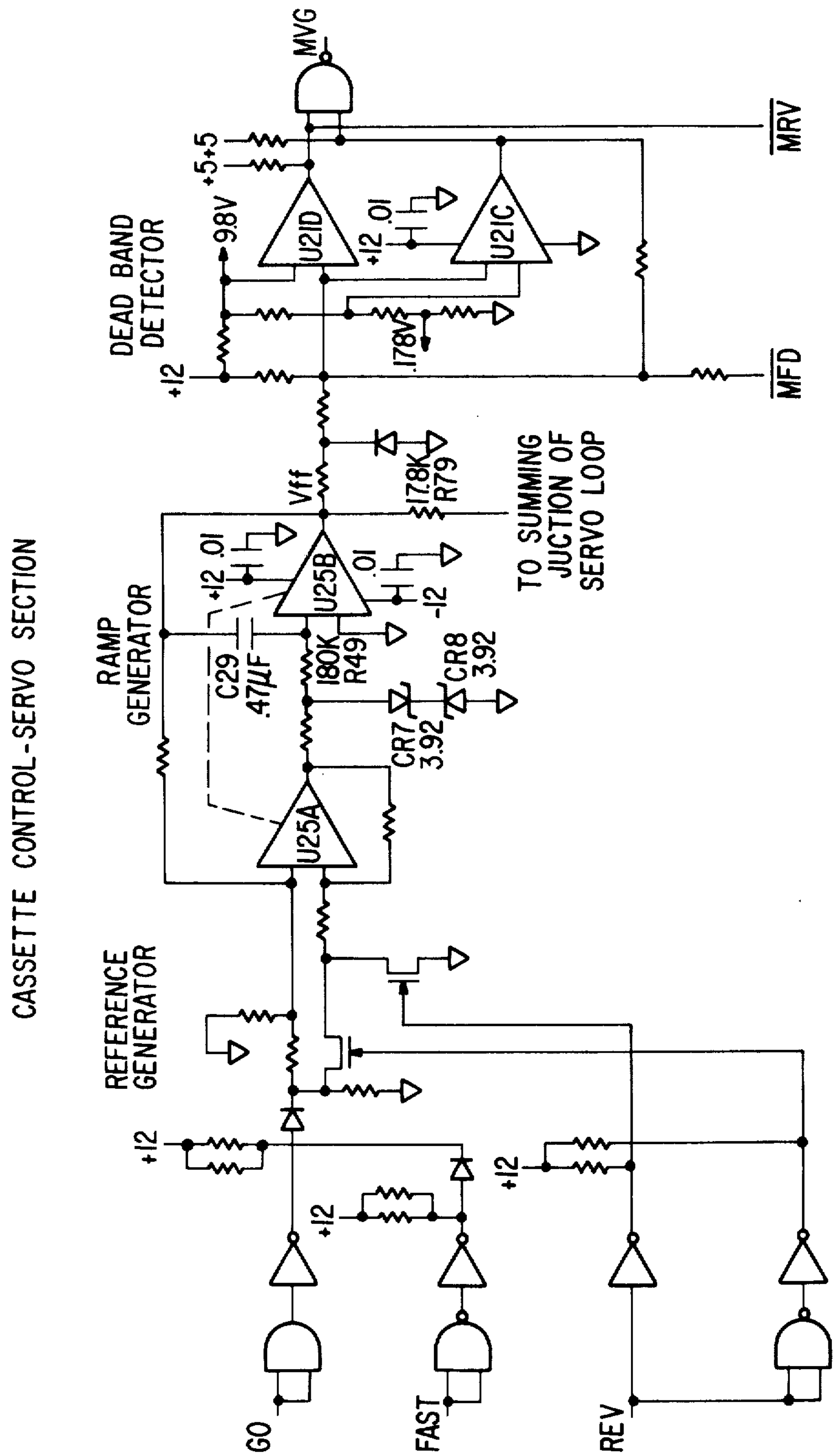
Figure 151B:
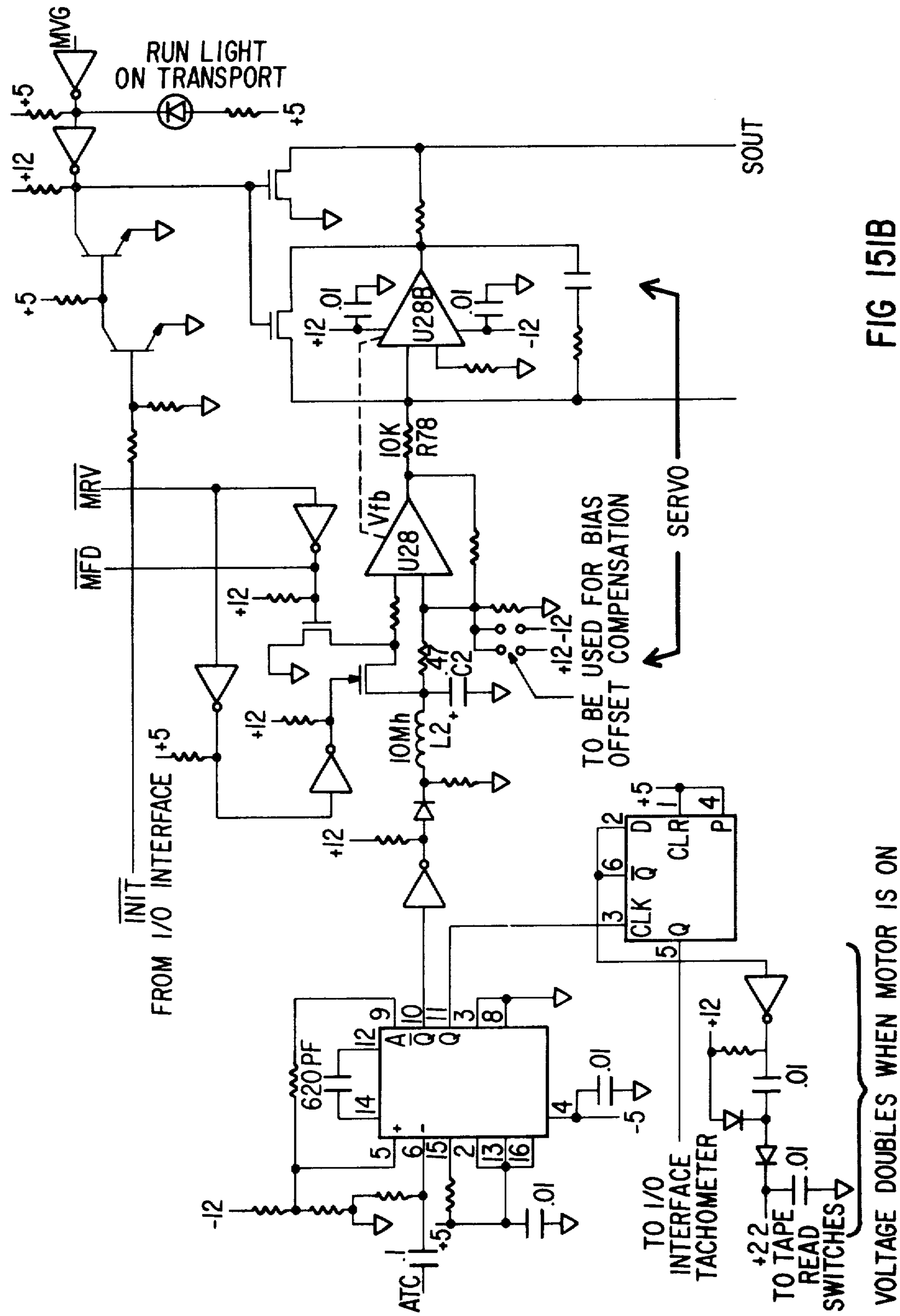
Figure 151C:
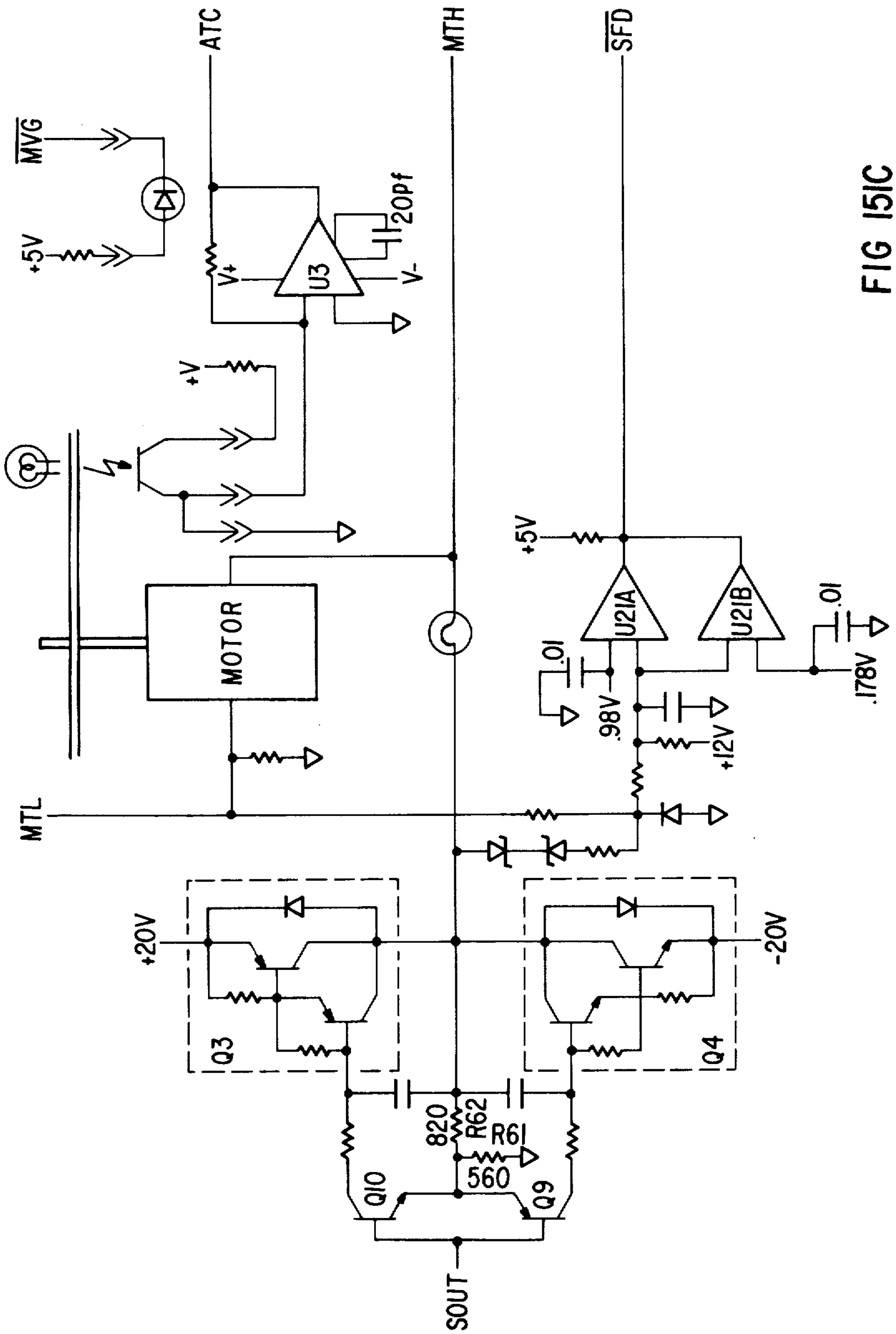

FIGS. 151A–C are a detailed schematic diagram of a servo section of the cassette control block of FIG. 4.

Figure 152:
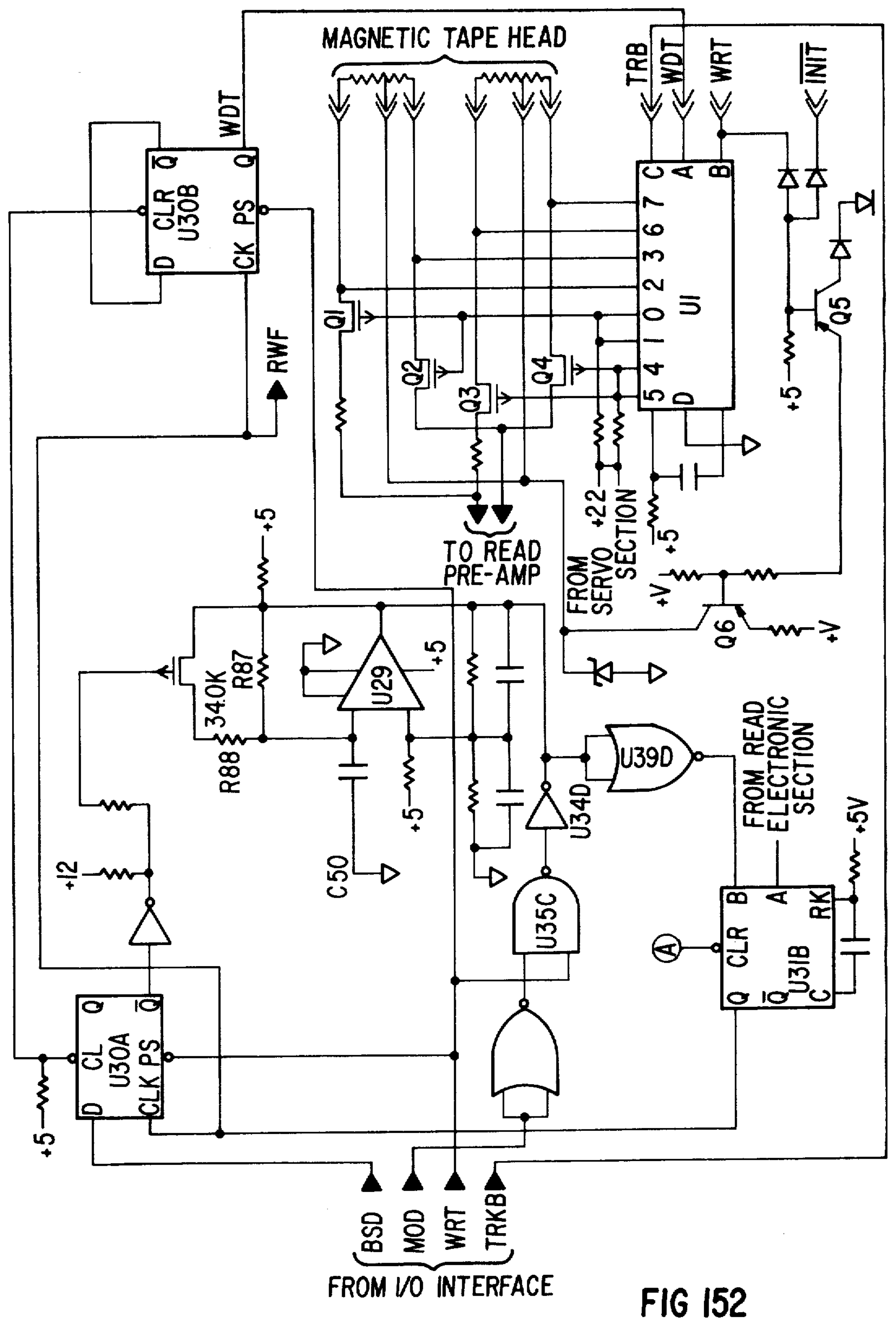

FIG. 152 is a detailed schematic diagram of a write electronics section of the cassette control block of FIG. 4.

Figure 153A:
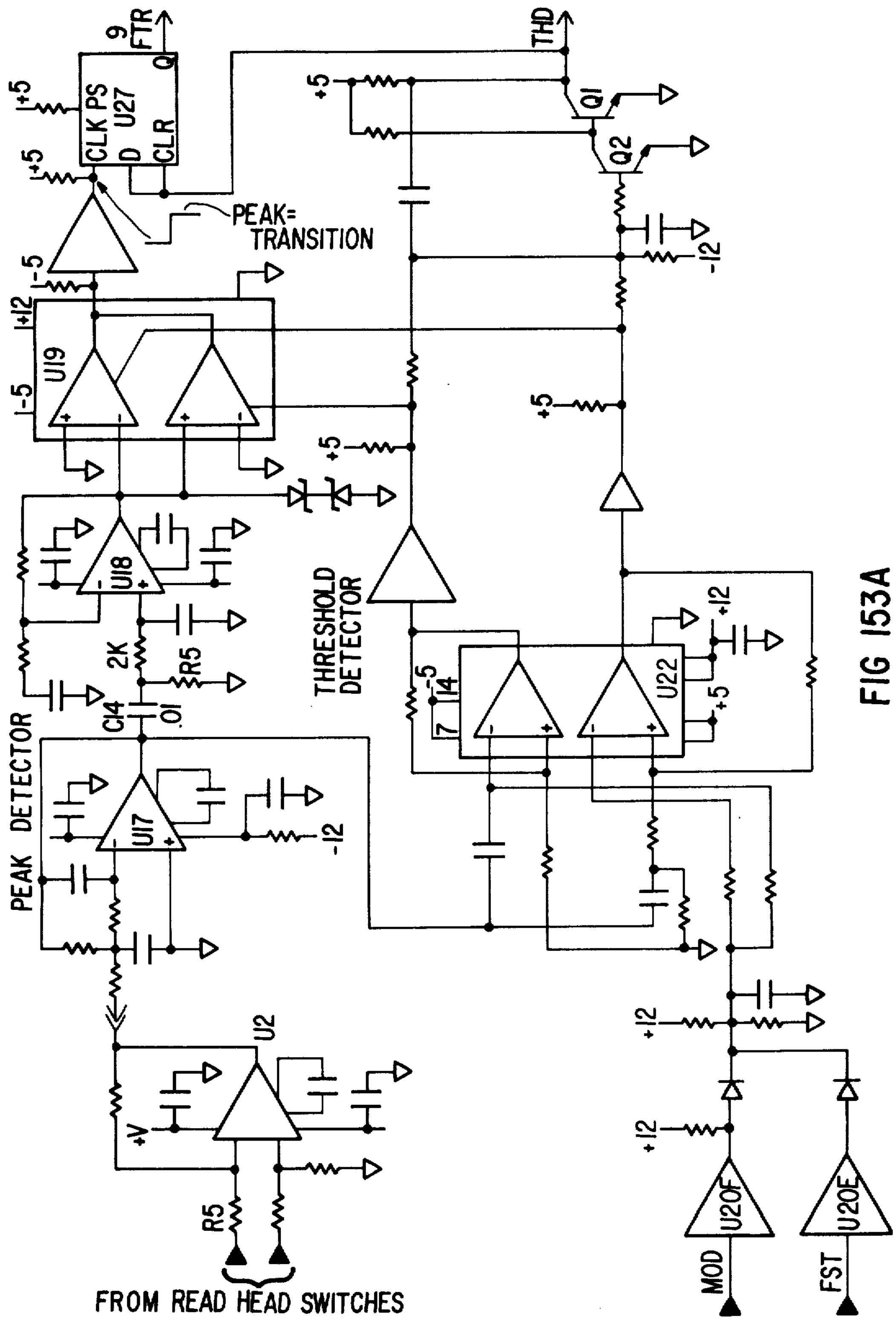
Figure 153B:
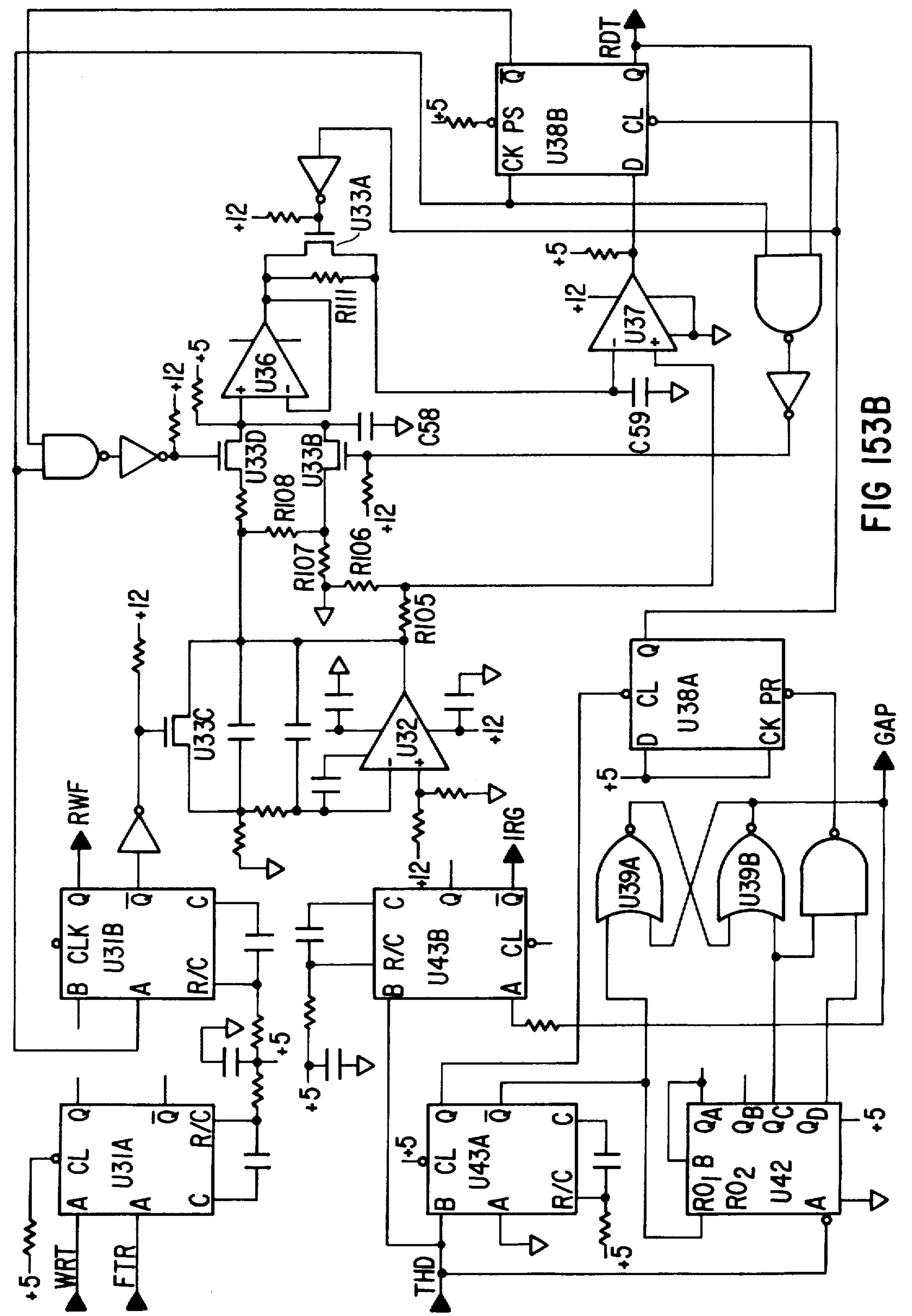

FIGS. 153A–B are a detailed schematic diagram of a read electronics section of the cassette control block of FIG. 4.

Figure 154A:
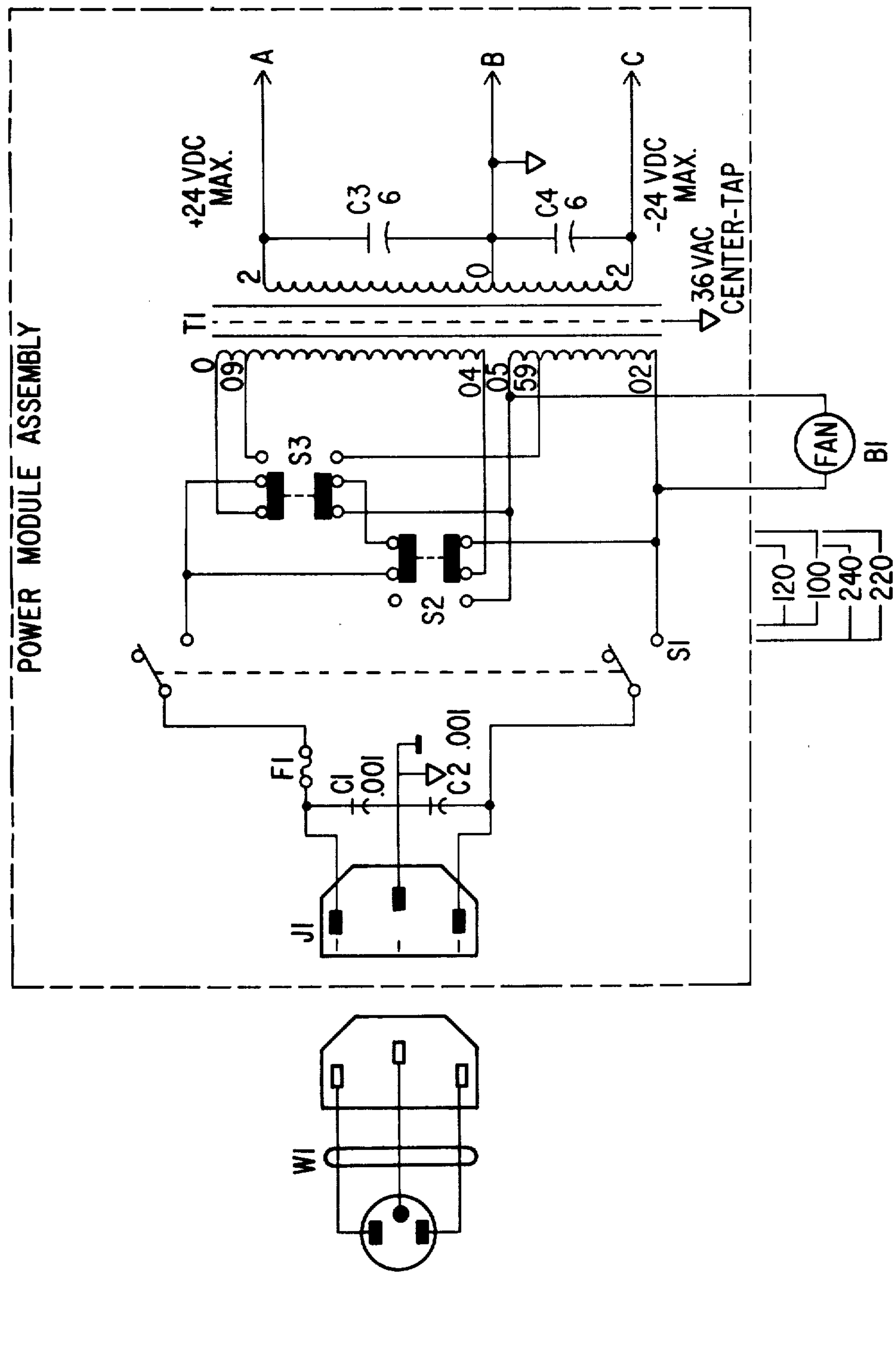
Figure 154B:
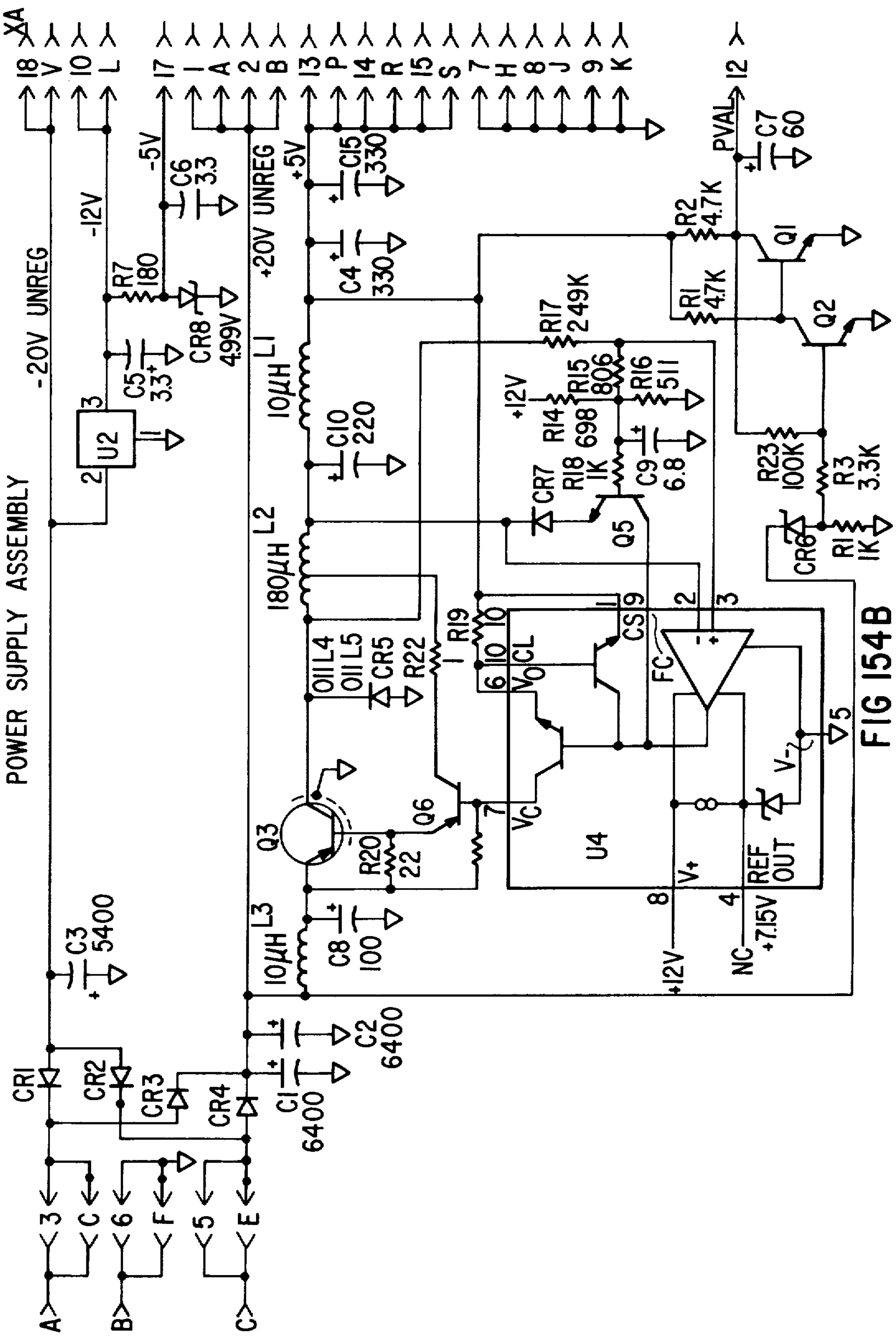
Figure 154C:
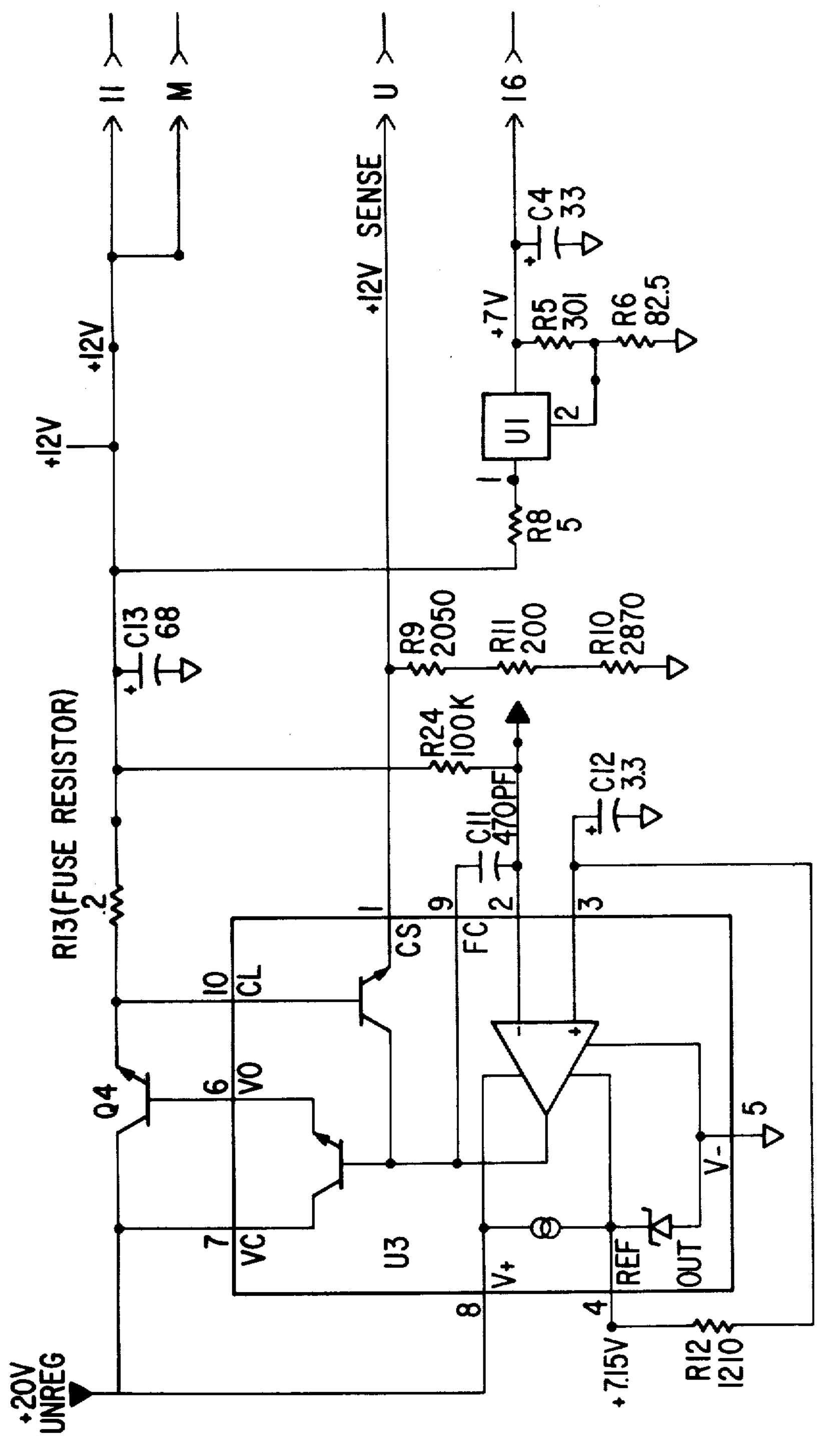

FIGS. 154A–C are a detailed schematic diagram of the power module and power supply blocks of FIG. 4.

Figure 7:
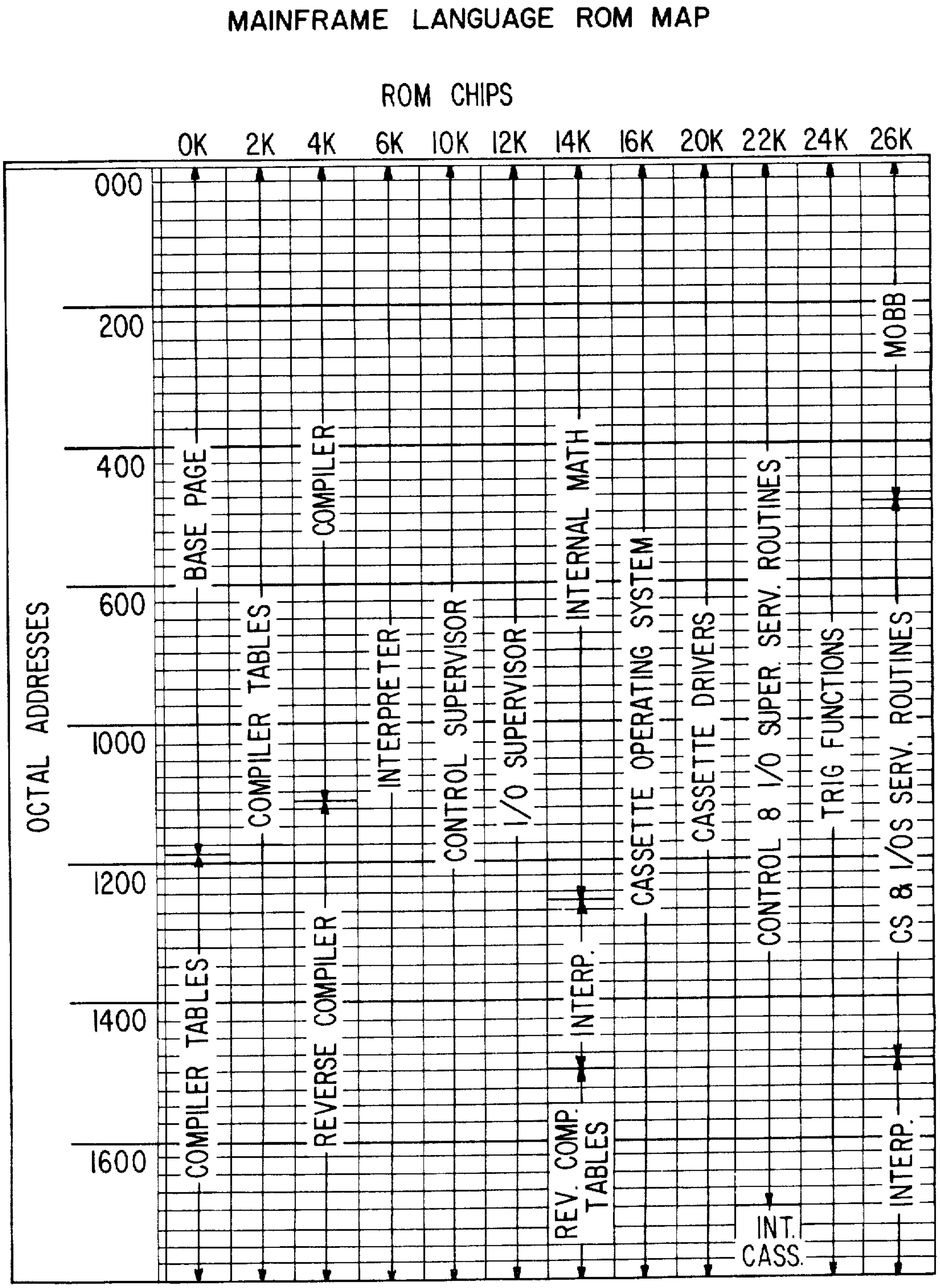
FIG. 7 is a memory map showing the format of each of the twelve individual read-only memory chips within the mainframe language ROM of FIG. 4.
Figure 8:
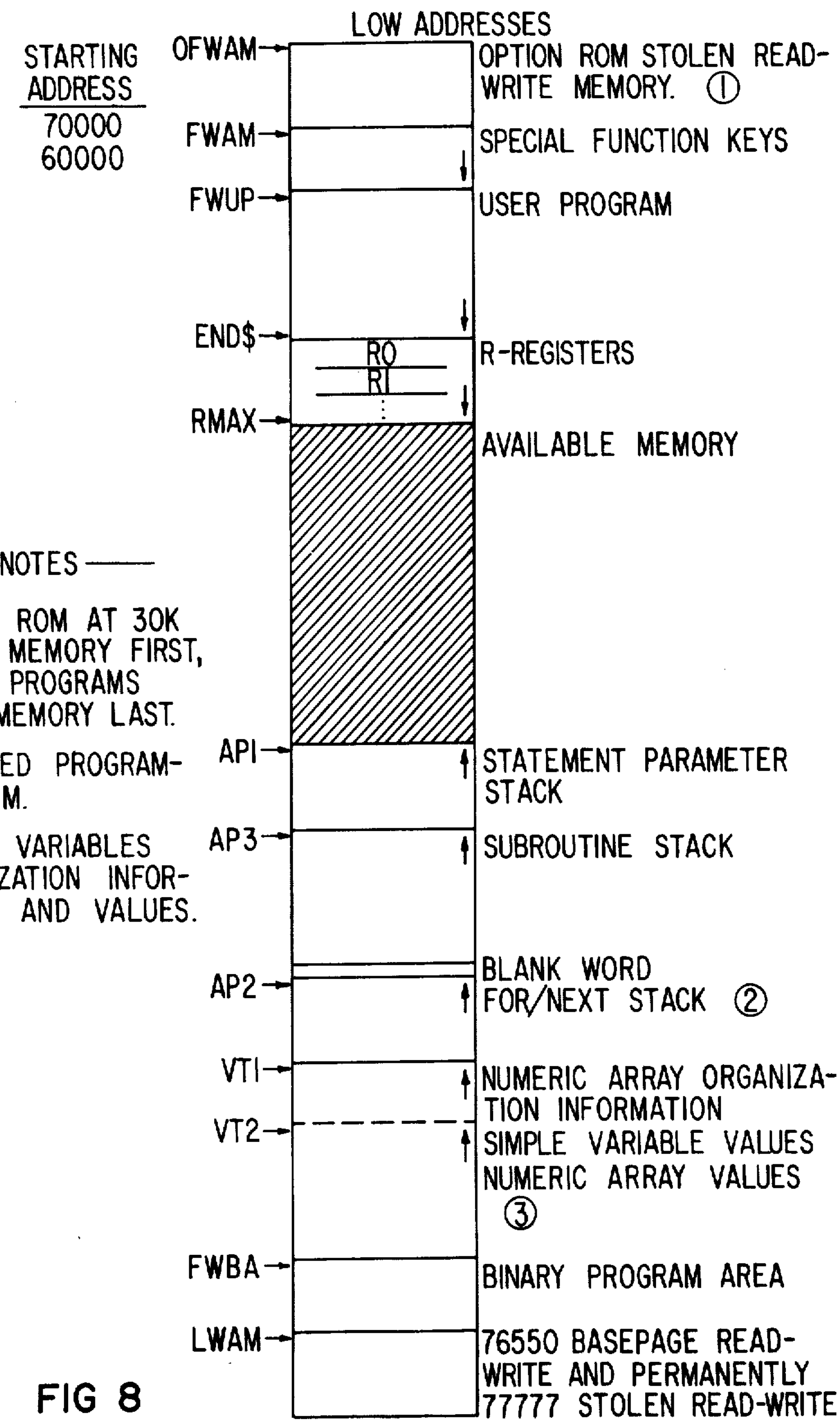
FIG. 8 is a memory map of the basic and optional read-write memories of FIGS. 4 and 6.
Figure 9:
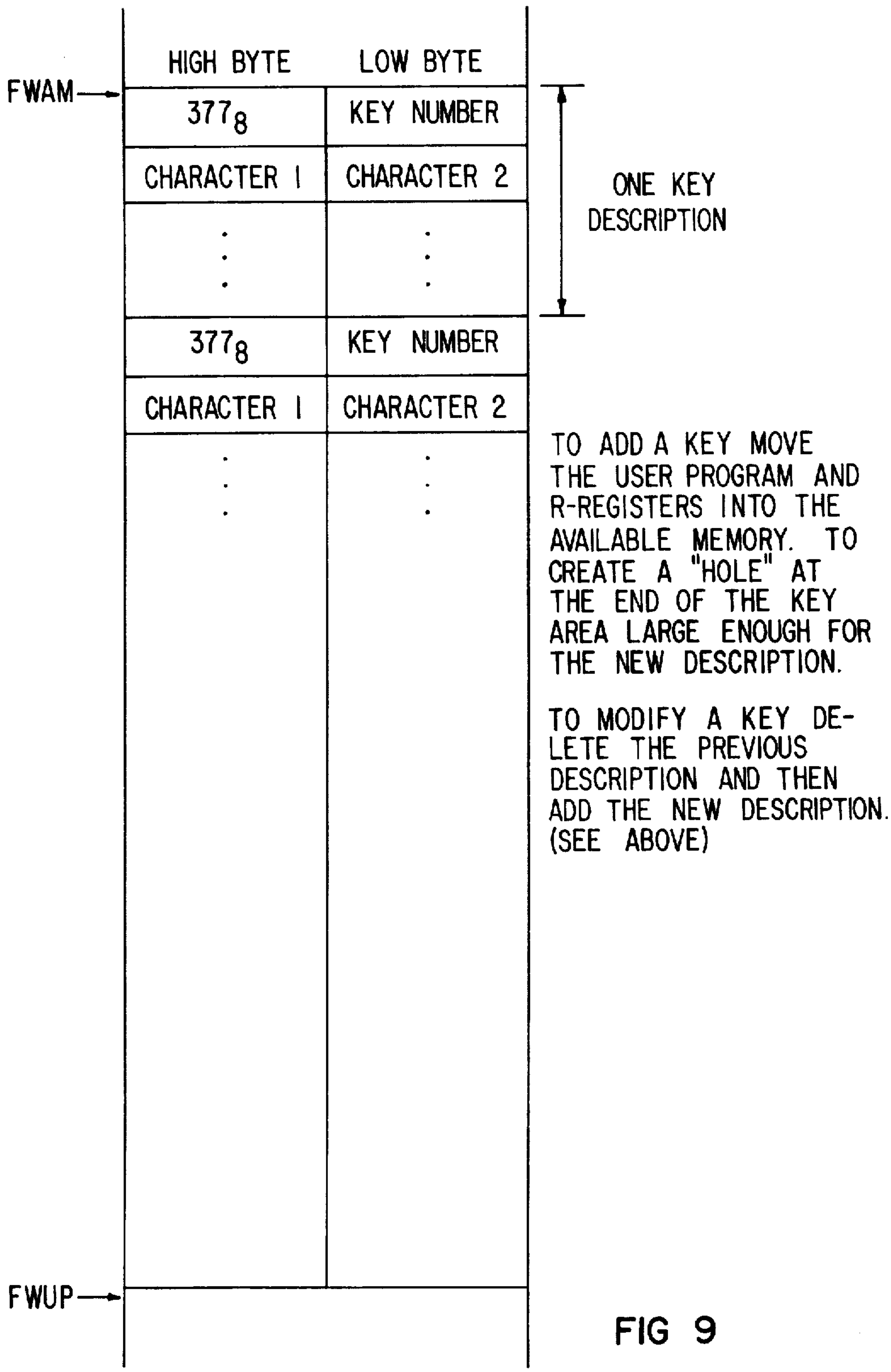
FIG. 9 is a detailed memory map of a portion of the read-write memory of FIG. 8 that is reserved for the special function keys.
Figure 10:
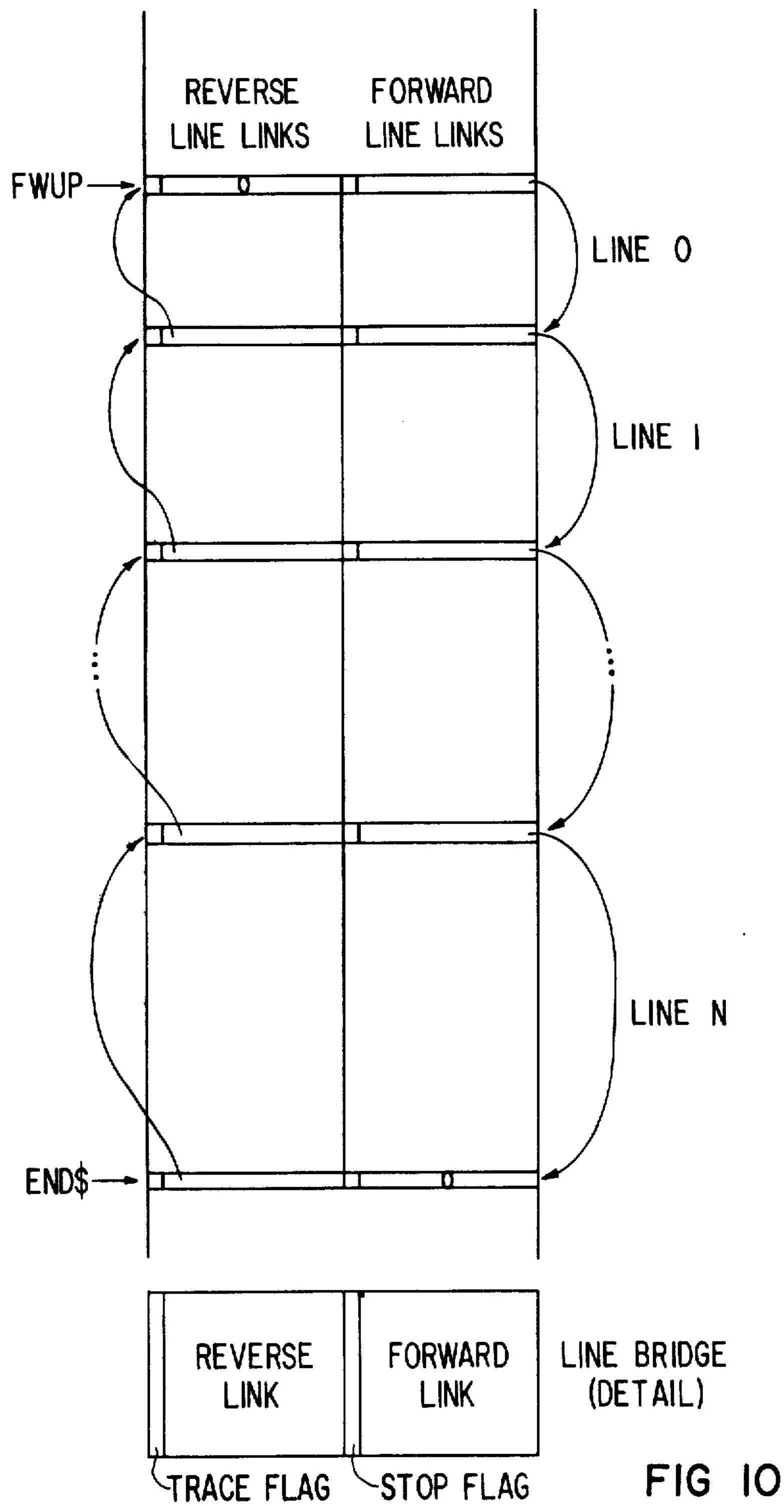
FIG. 10 is a detailed memory map of the portion of the read-write memory of FIG. 8 that is employed as a user program area.
Figure 11:
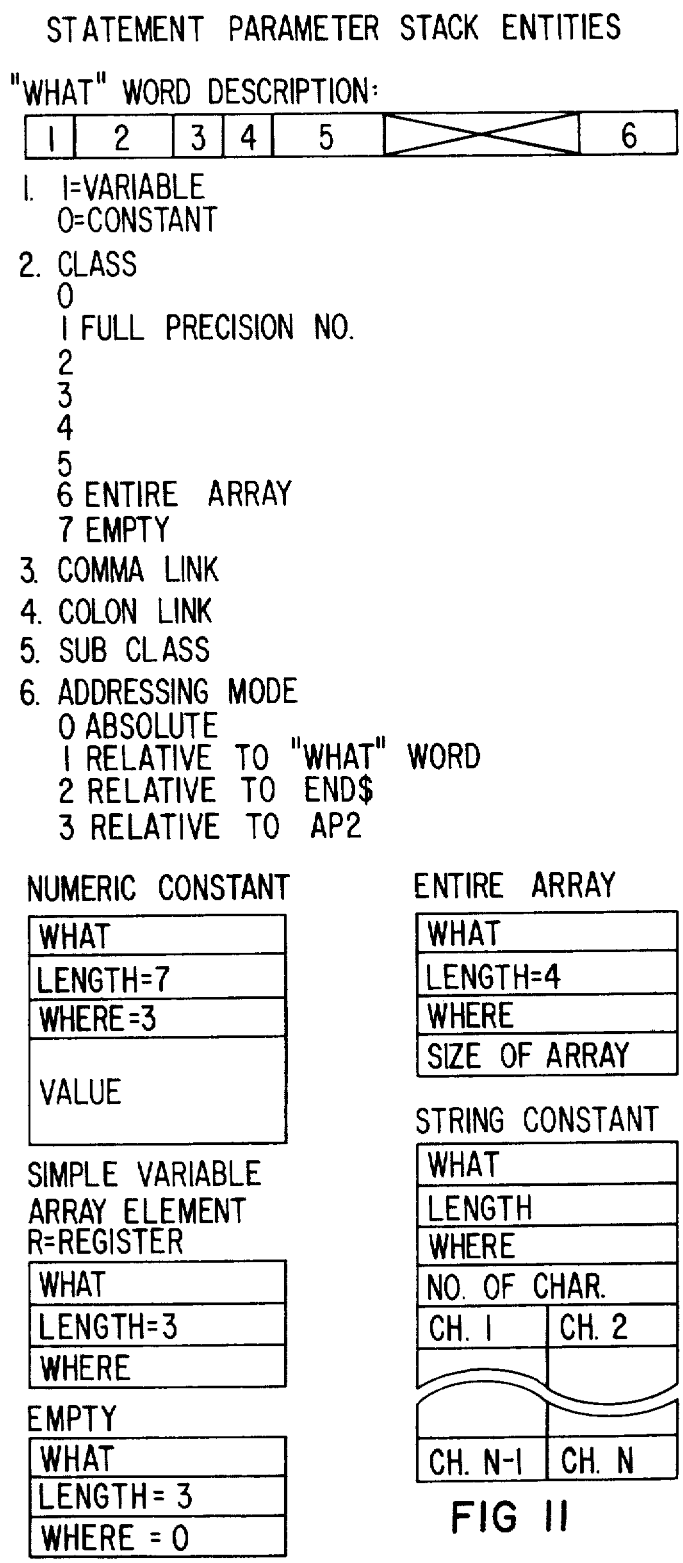
FIG. 11 is a detailed memory map of the portion of the read-write memory of FIG. 8 that is employed as a statement parameter stack.
Figure 12:
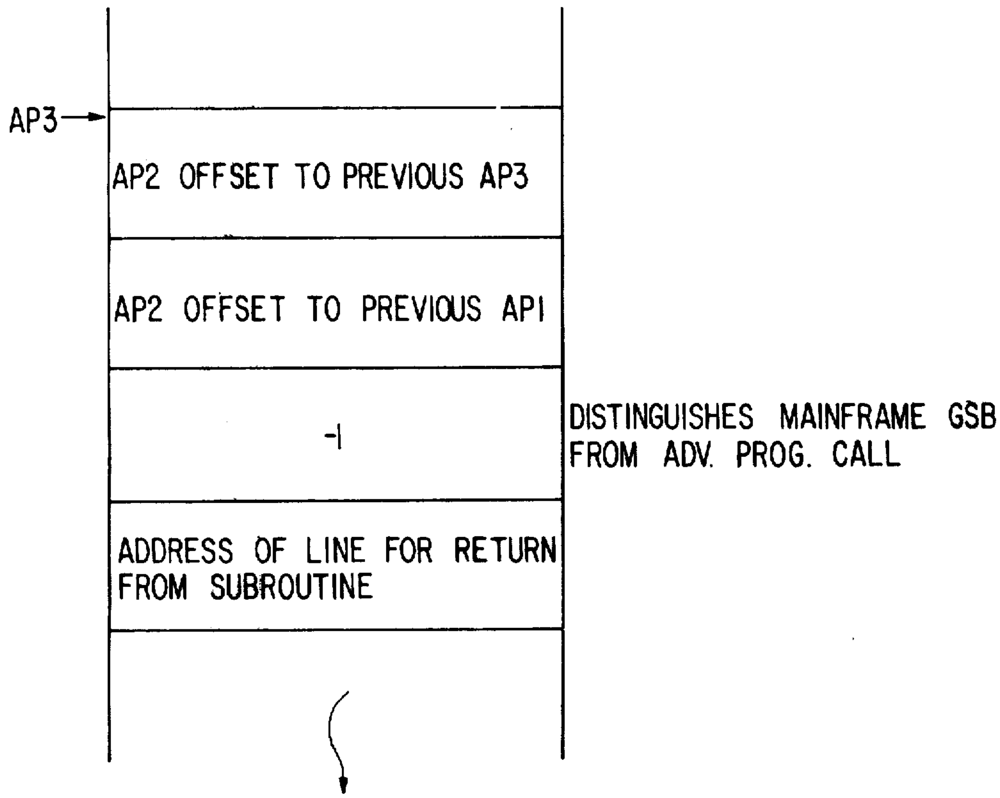
FIG. 12 is a detailed memory map of the portion of the read-write memory of FIG. 8 that is employed as a subroutine stack.
Figure 13:
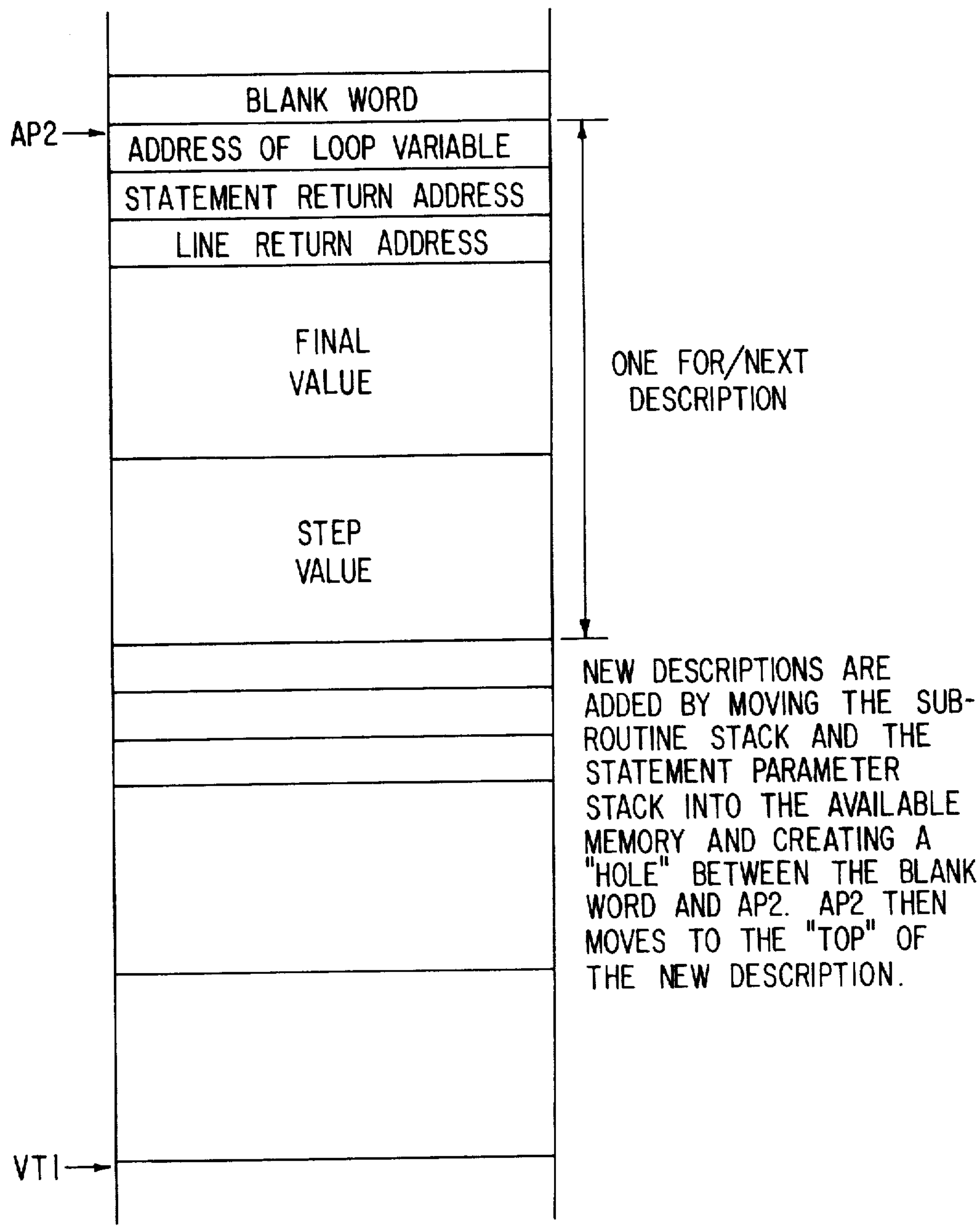
FIG. 13 is a detailed memory map of the portion of the read-write memory of FIG. 8 that is employed as a for/next stack.
Figure 14A:
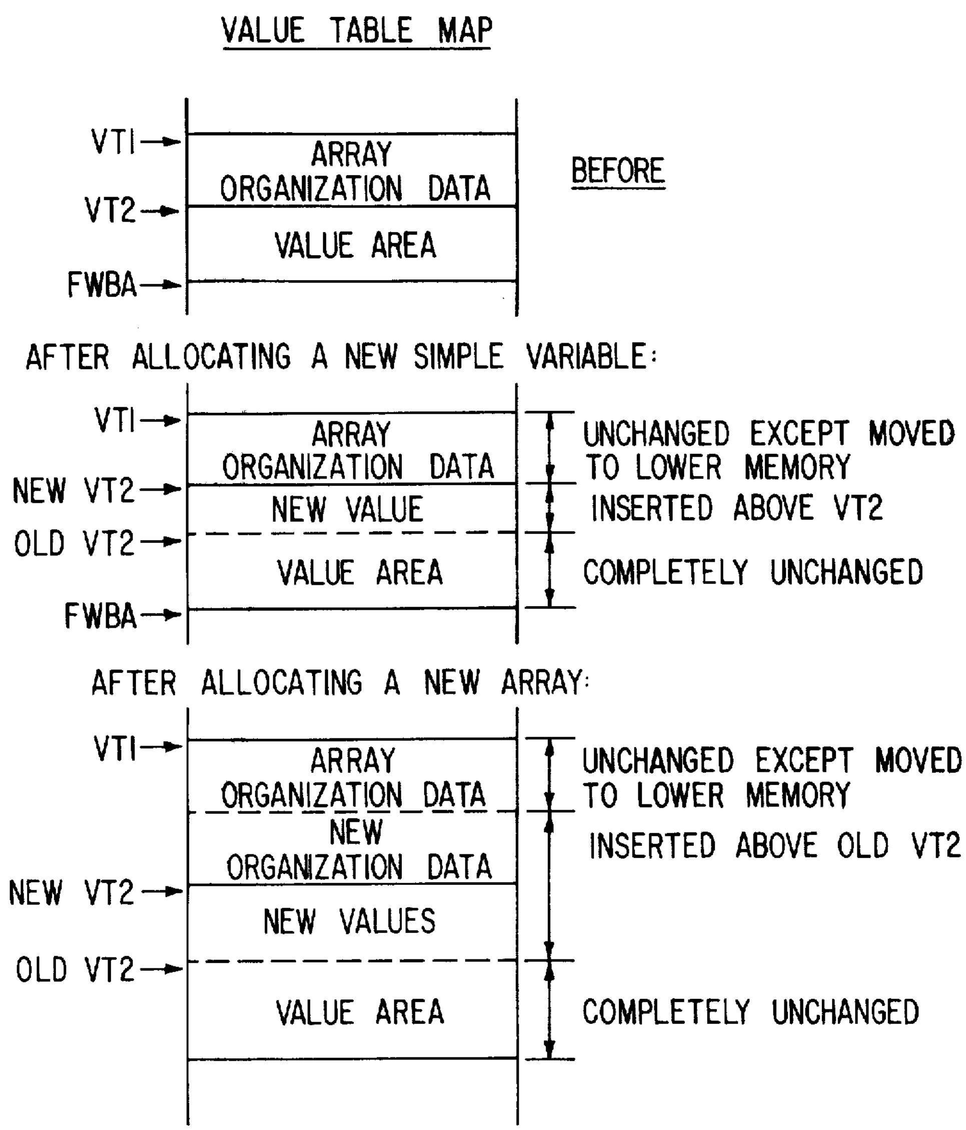
FIGS. 14A-B are a detailed memory map of the portion of the read-write memory of FIG. 8 that is employed as a value table.
Figure 14B:
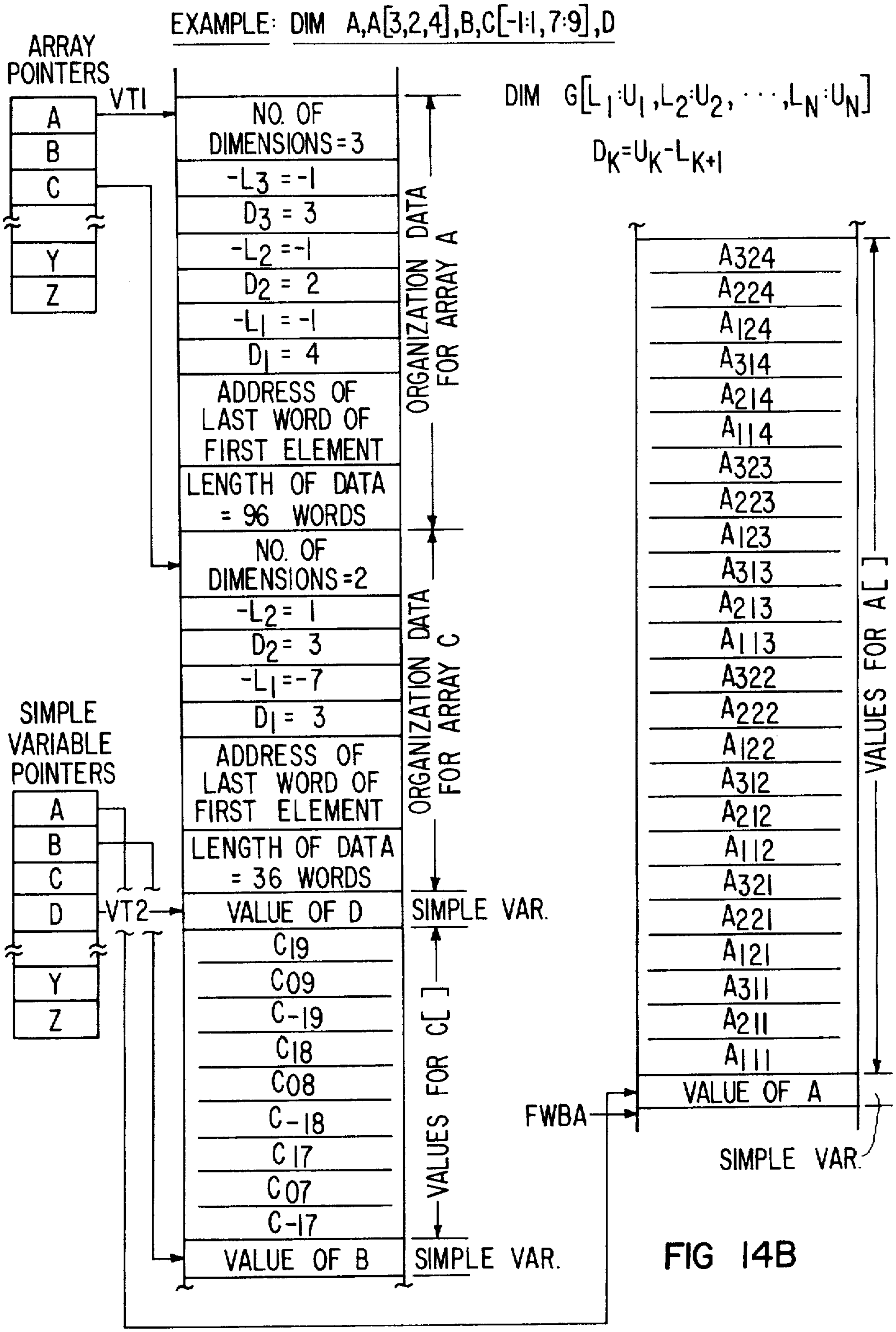
Figure 155:
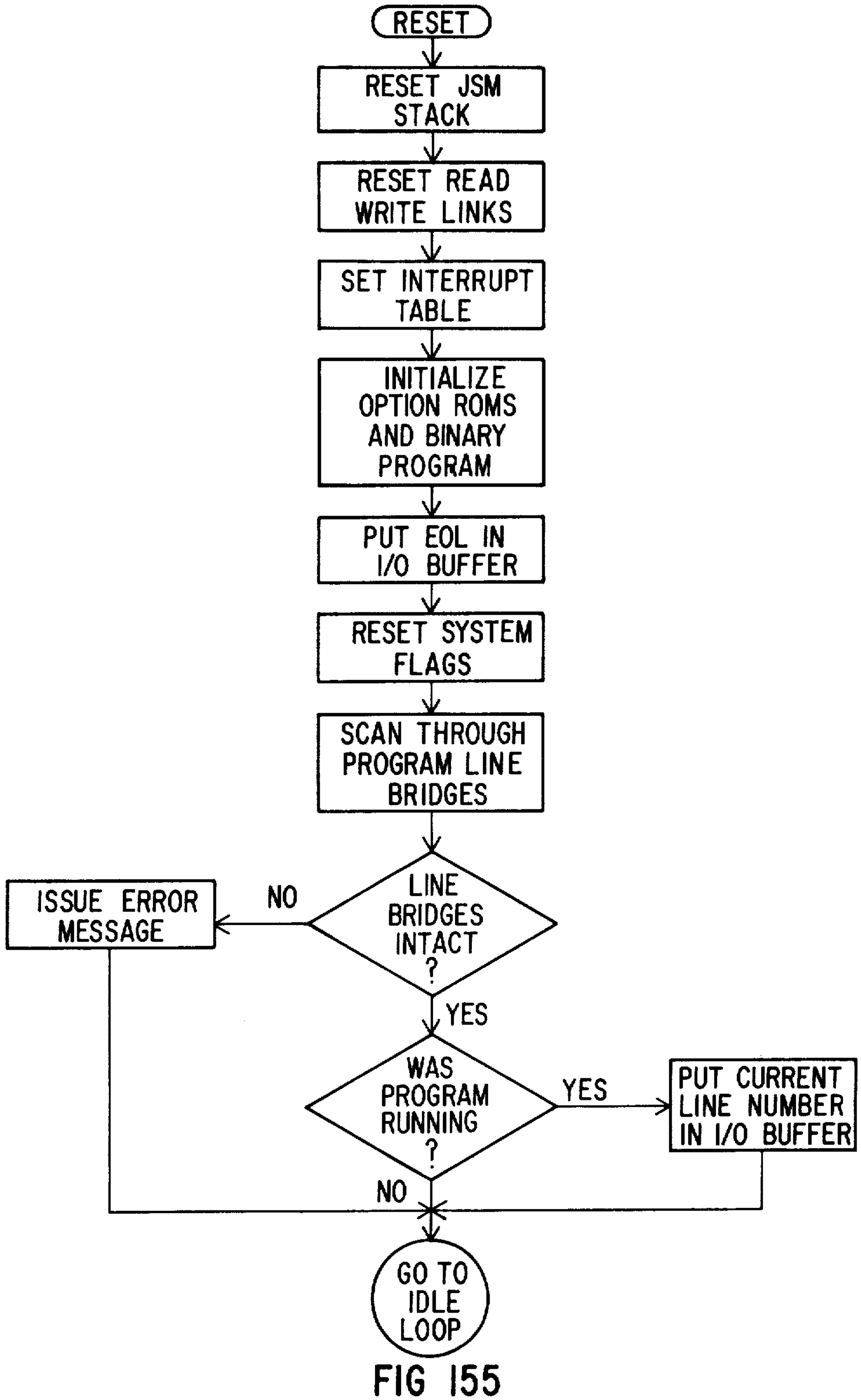

FIG. 155 is a flow chart of a reset subroutine stored in the mainframe language ROM of FIGS. 4 and 7.

Figure 156A:
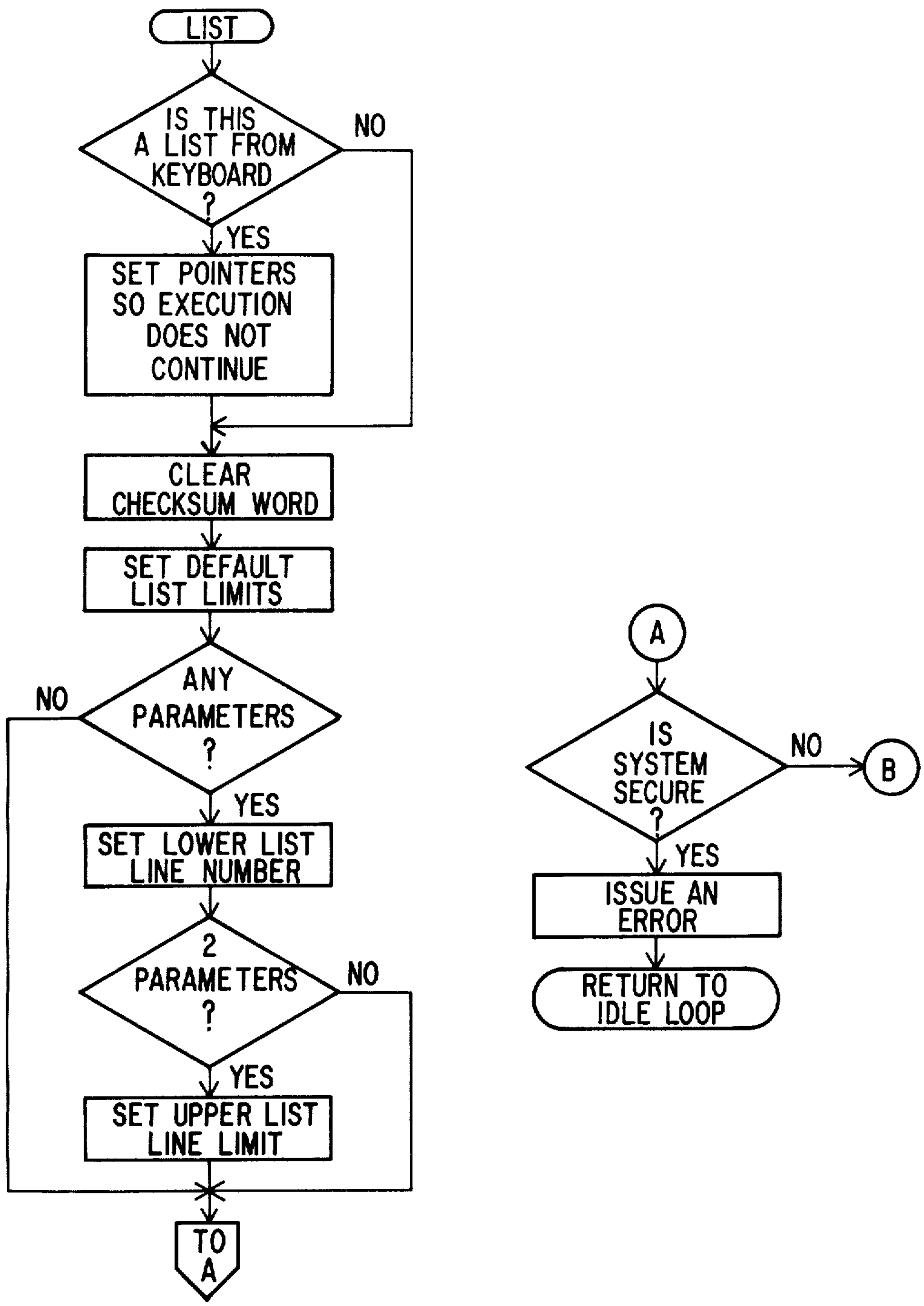
Figure 156B:
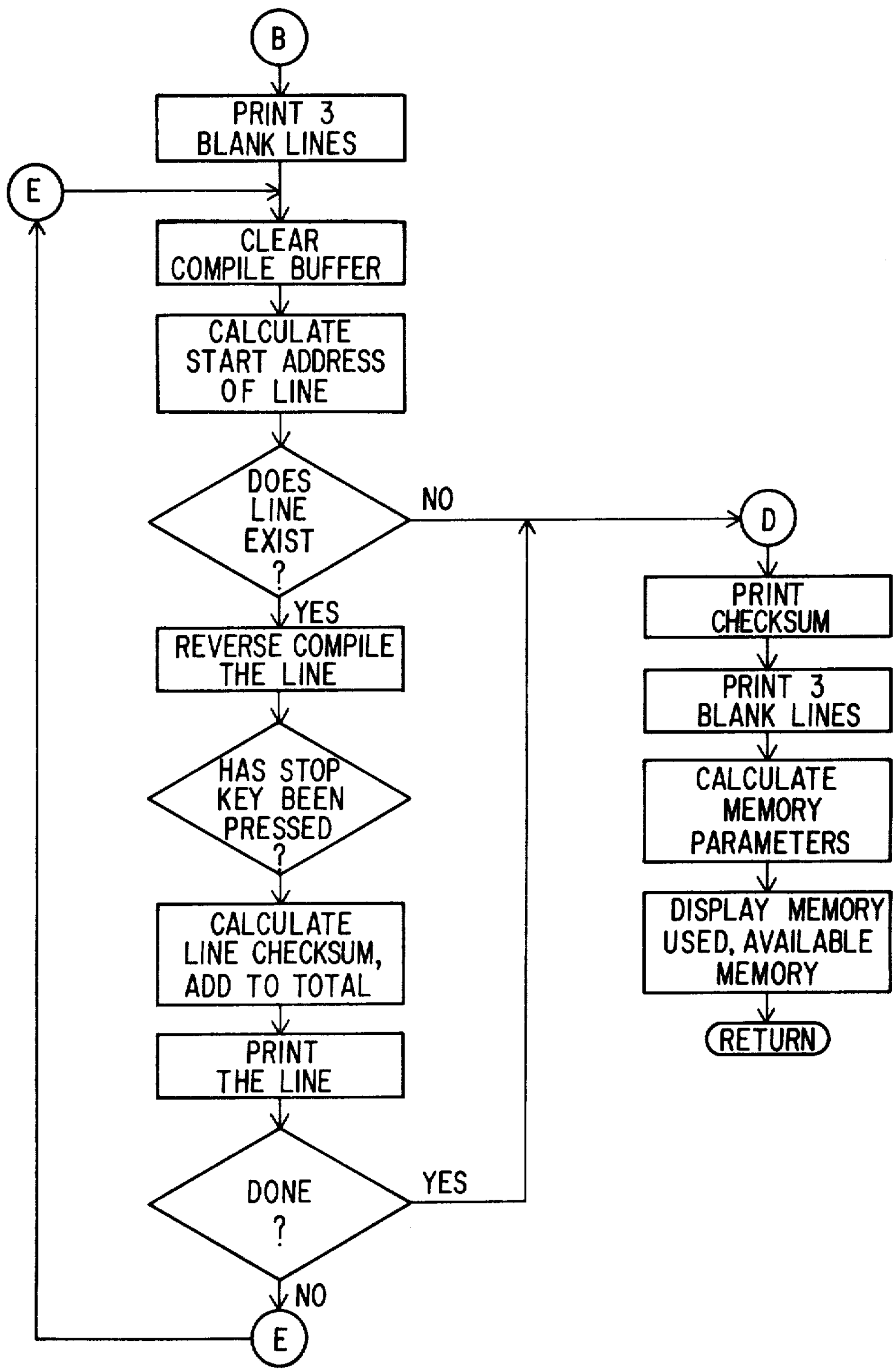

FIGS. 156A–B are a flow chart of a list subroutine stored in the mainframe language ROM of FIGS. 4 and 7.

Figure 157:
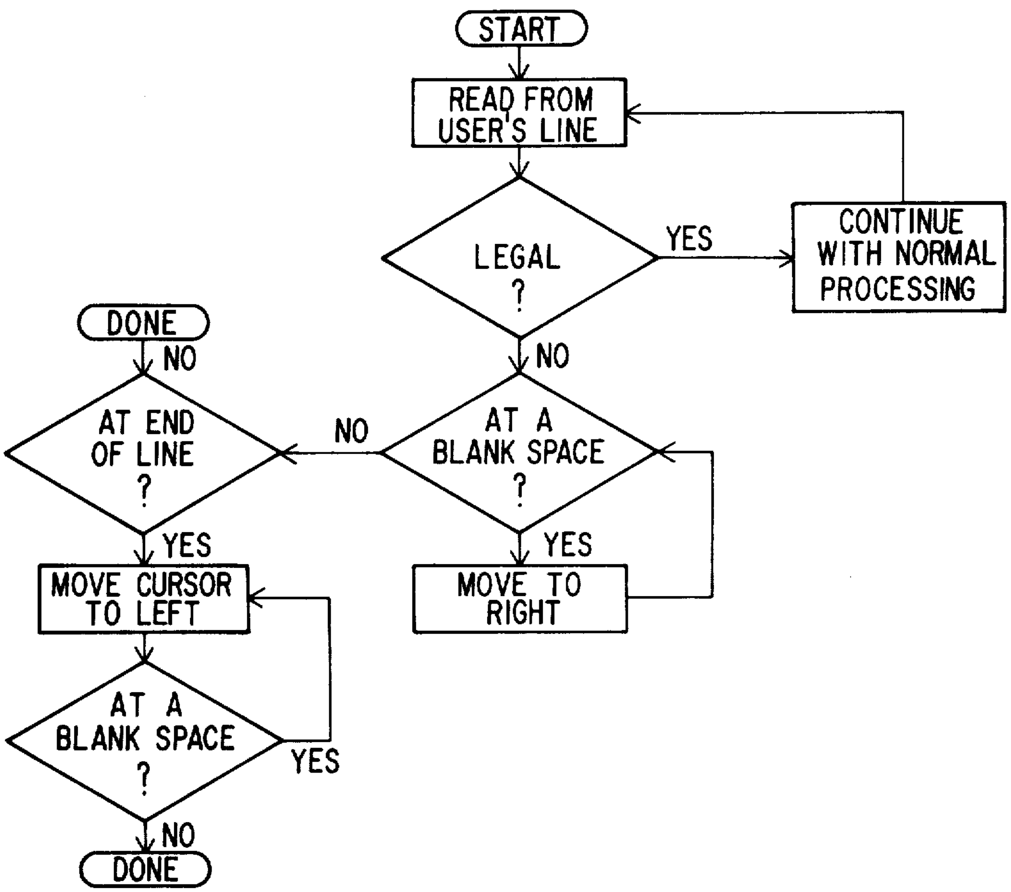

FIG. 157 is a flow chart of a flashing cursor subroutine stored in the mainframe language ROM of FIGS. 4 and 7.

Figure 1:
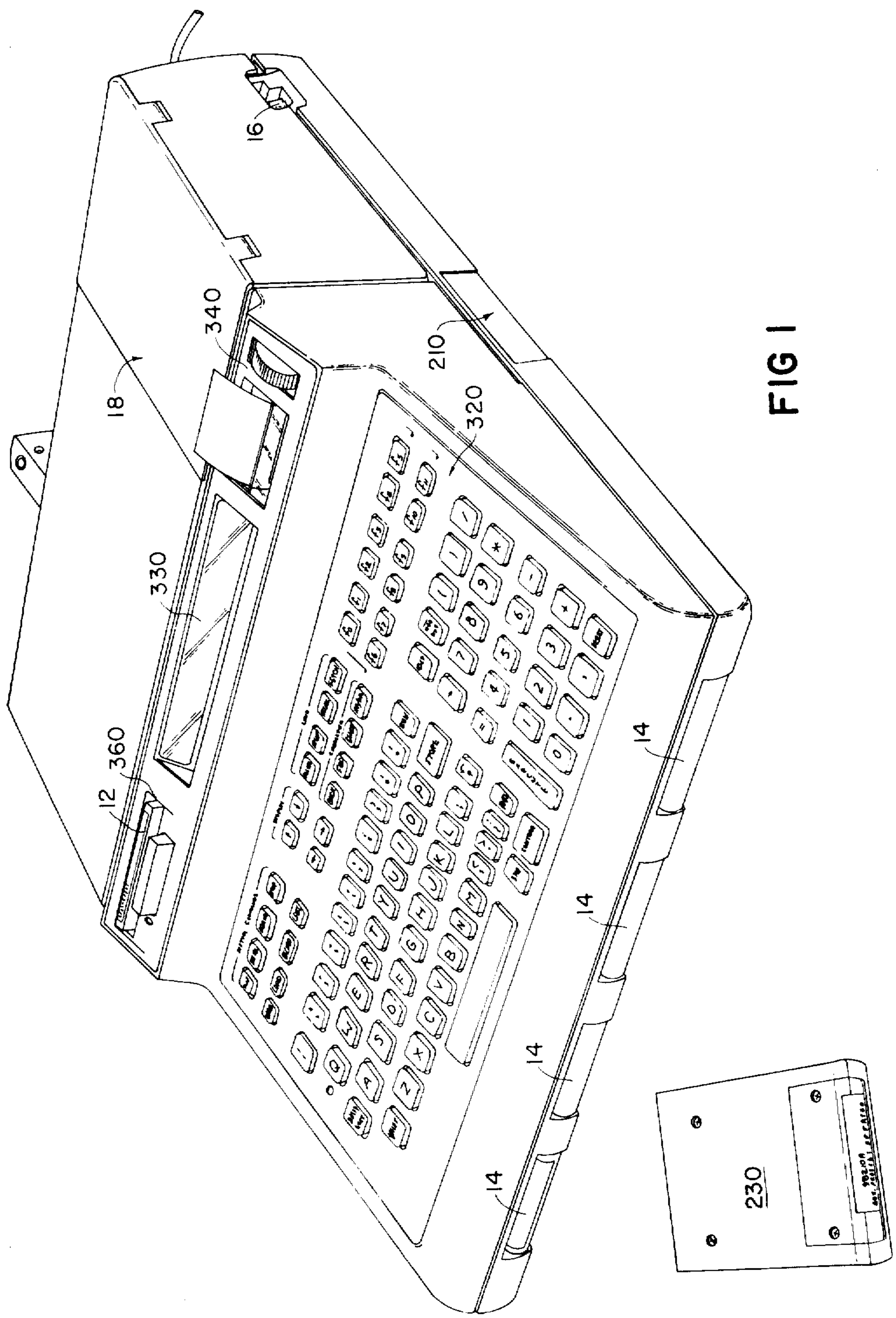
FIG. 1 is a front perspective view of a programmable calculator according to the preferred embodiment of this invention.
Figure 158A:
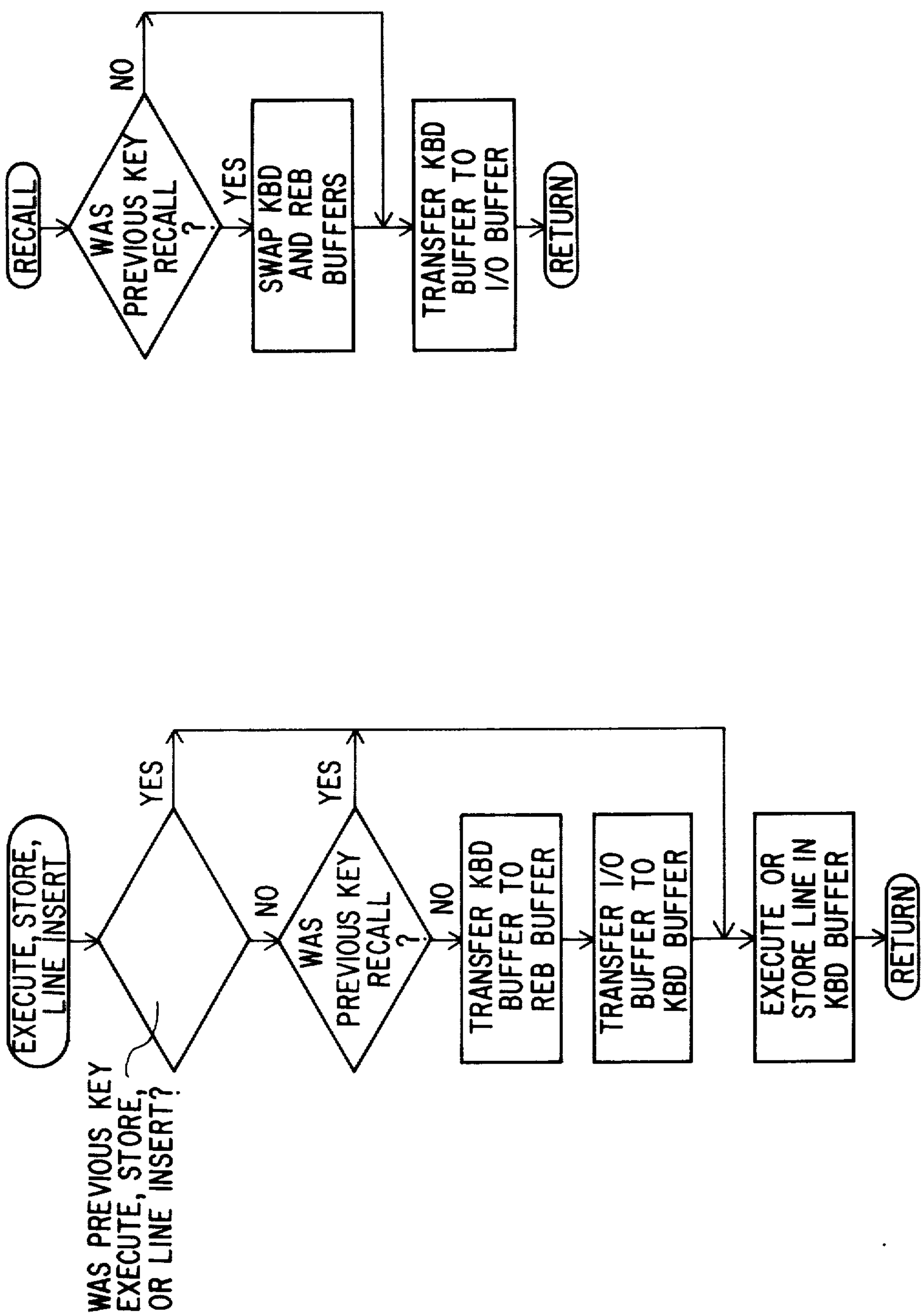
Figure 158B:
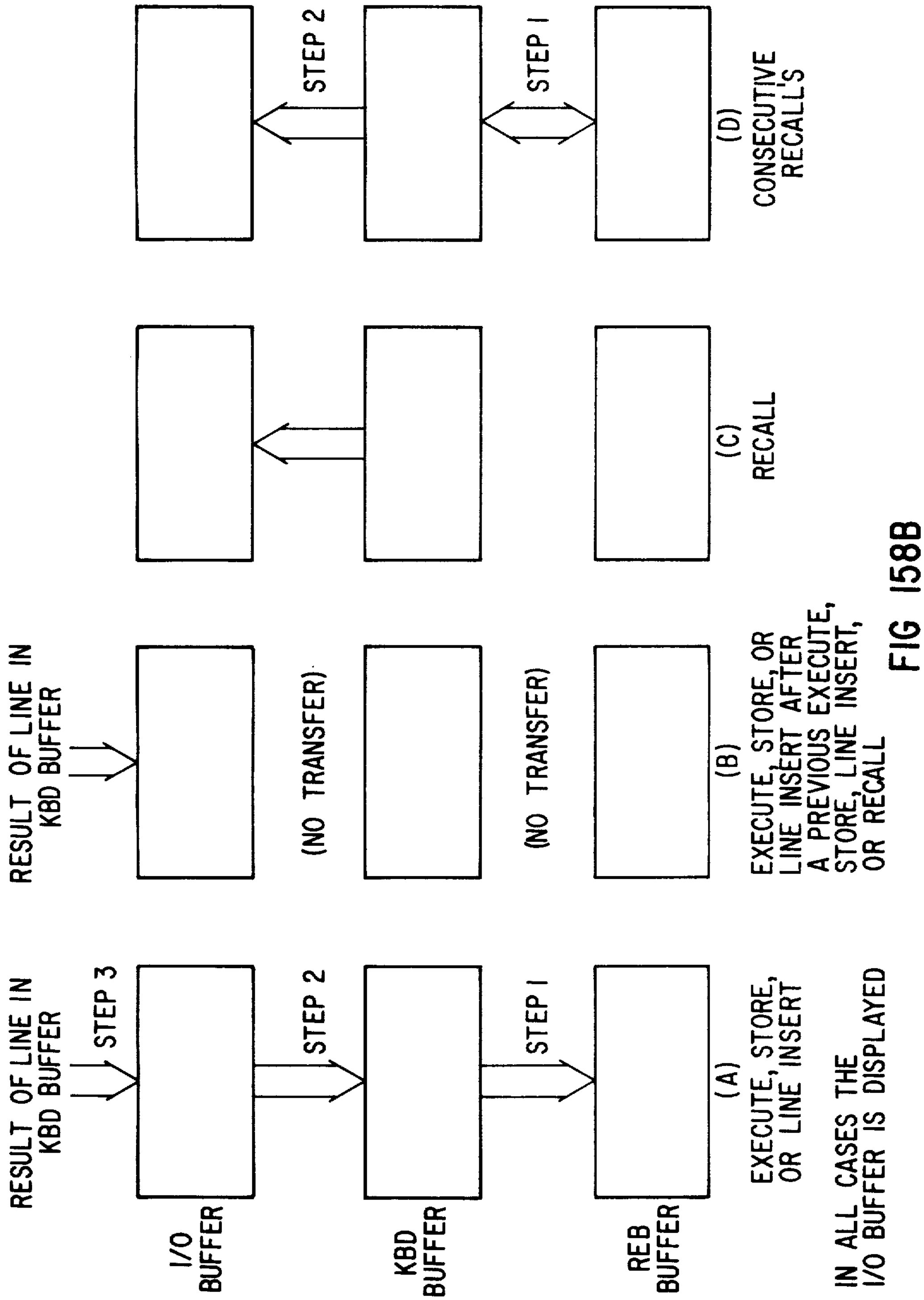

FIGS. 158A–B are a flow chart illustrating a double buffering feature of the calculator of FIG. 1.

FIGS. 159A–L are a flow chart of line editing subroutines stored in the mainframe language ROM of FIGS. 4 and 7.

FIGS. 160A–D are a flow chart of array allocation subroutines stored in the mainframe language ROM of FIGS. 4 and 7.

Figure 161:
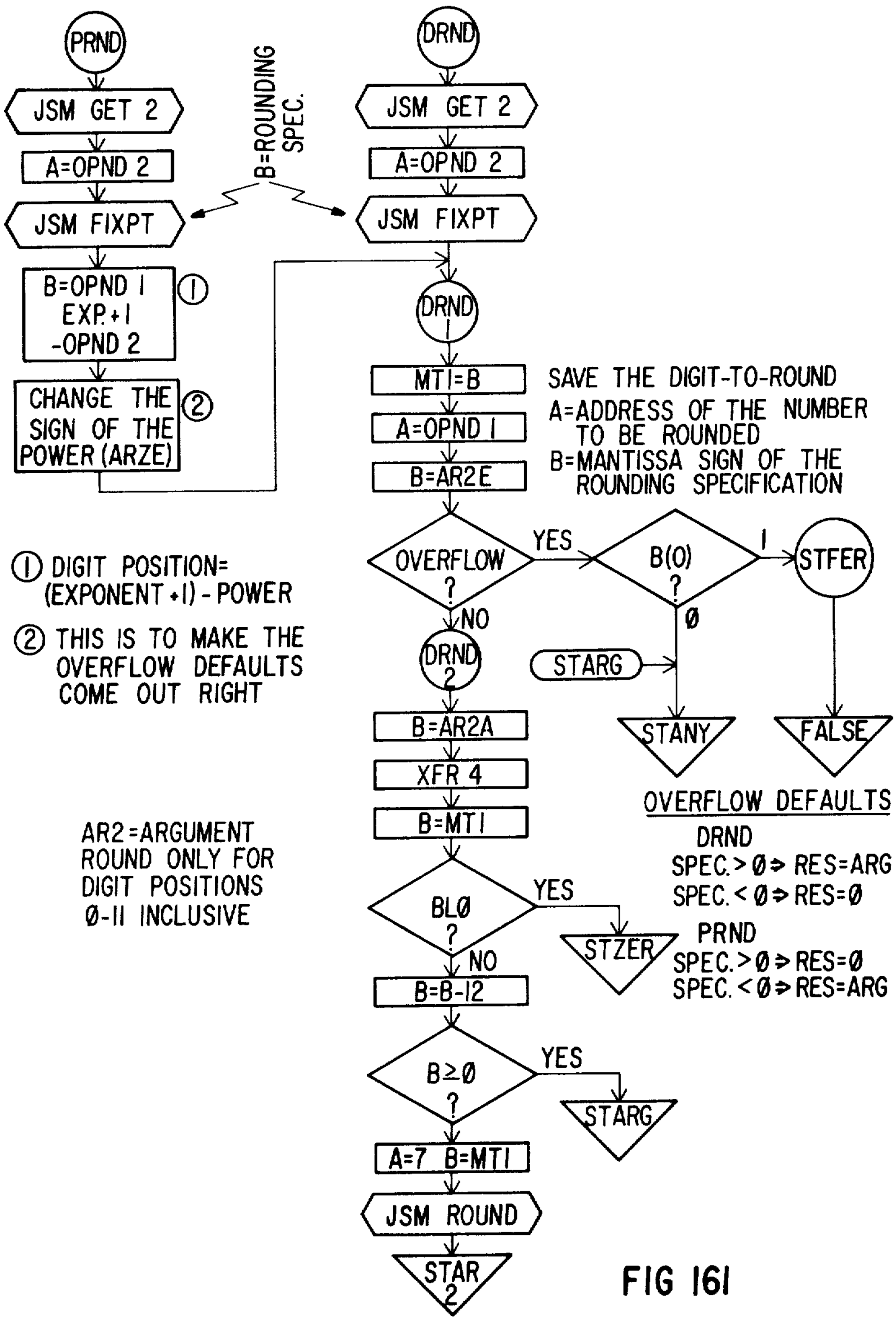

FIG. 161 is a flow chart of two rounding subroutines stored in the mainframe language ROM of FIGS. 4 and 7.

FIG. 172 is a flow chart of a quote recognition subroutine stored in the mainframe language ROM of FIGS. 4 and 7.

FIGS. 163A–F are a flow chart of enter statement subroutines stored in the mainframe language ROM of FIGS. 4 and 7.

Figure 164:
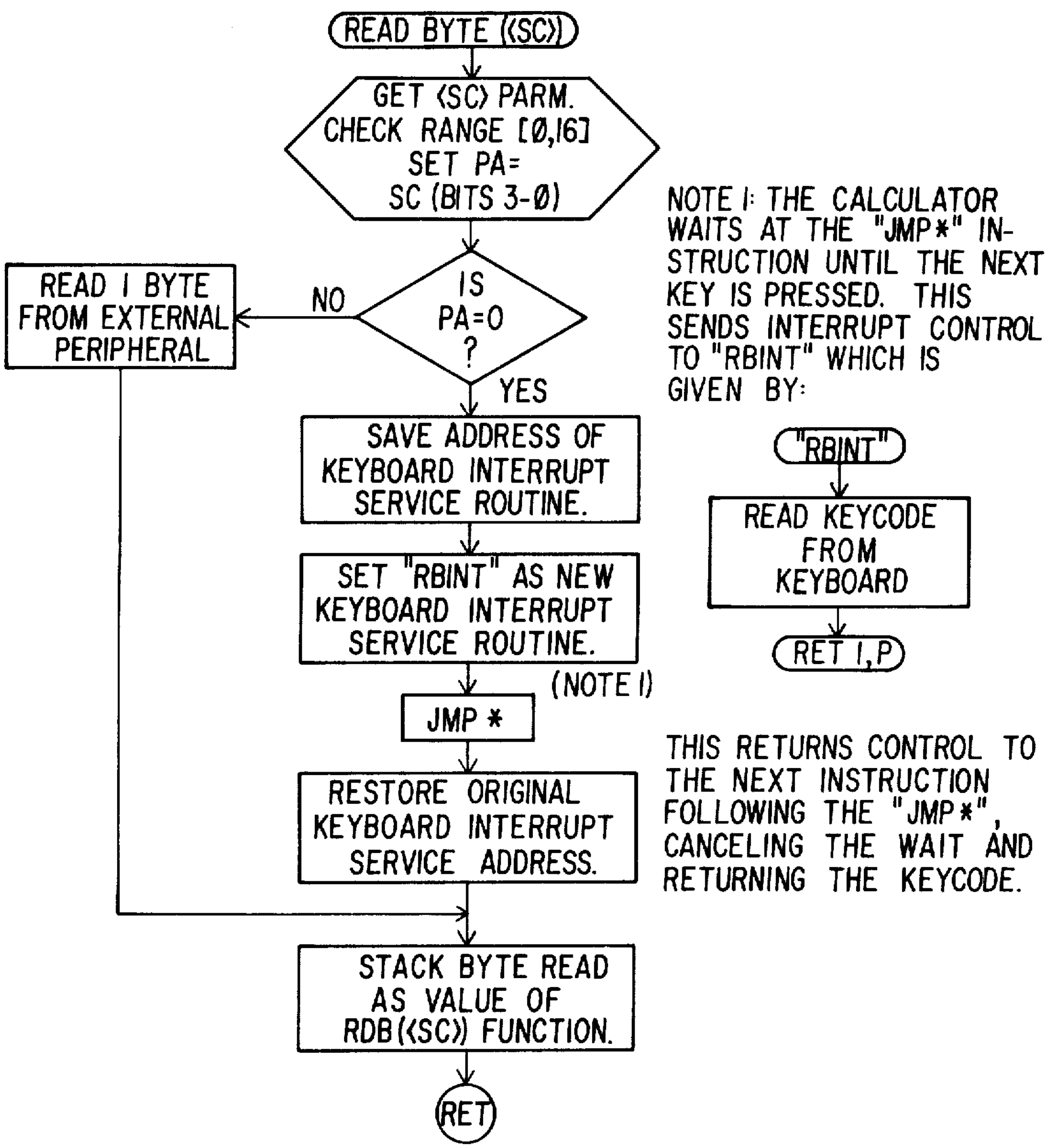

FIG. 164 is a flow chart of a read binary subroutine stored in the calculator read-only memory.

Figure 165:
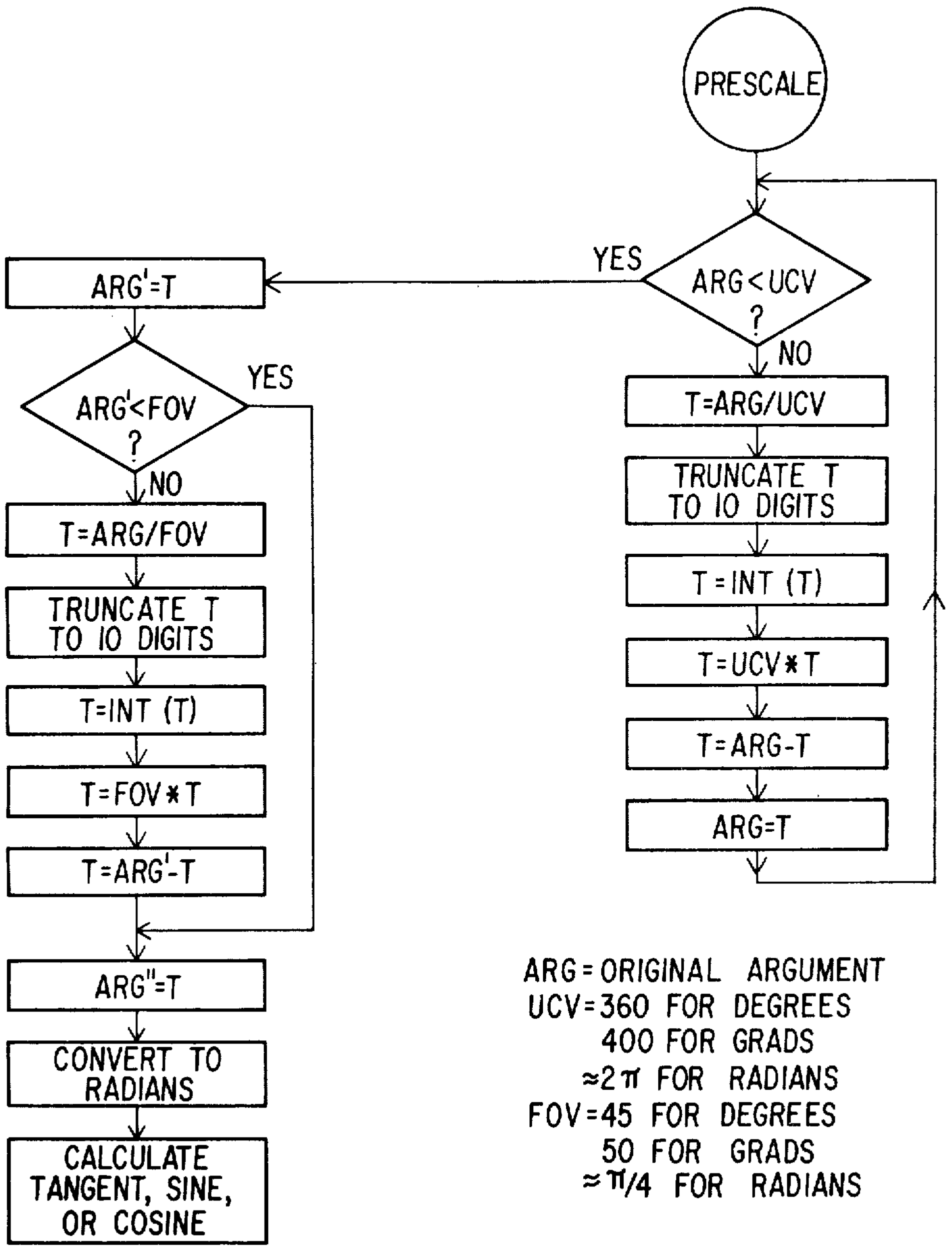

FIG. 165 is a flow chart of a prescale subroutine stored in the mainframe language ROM of FIGS. 4 and 7.

Figure 166:
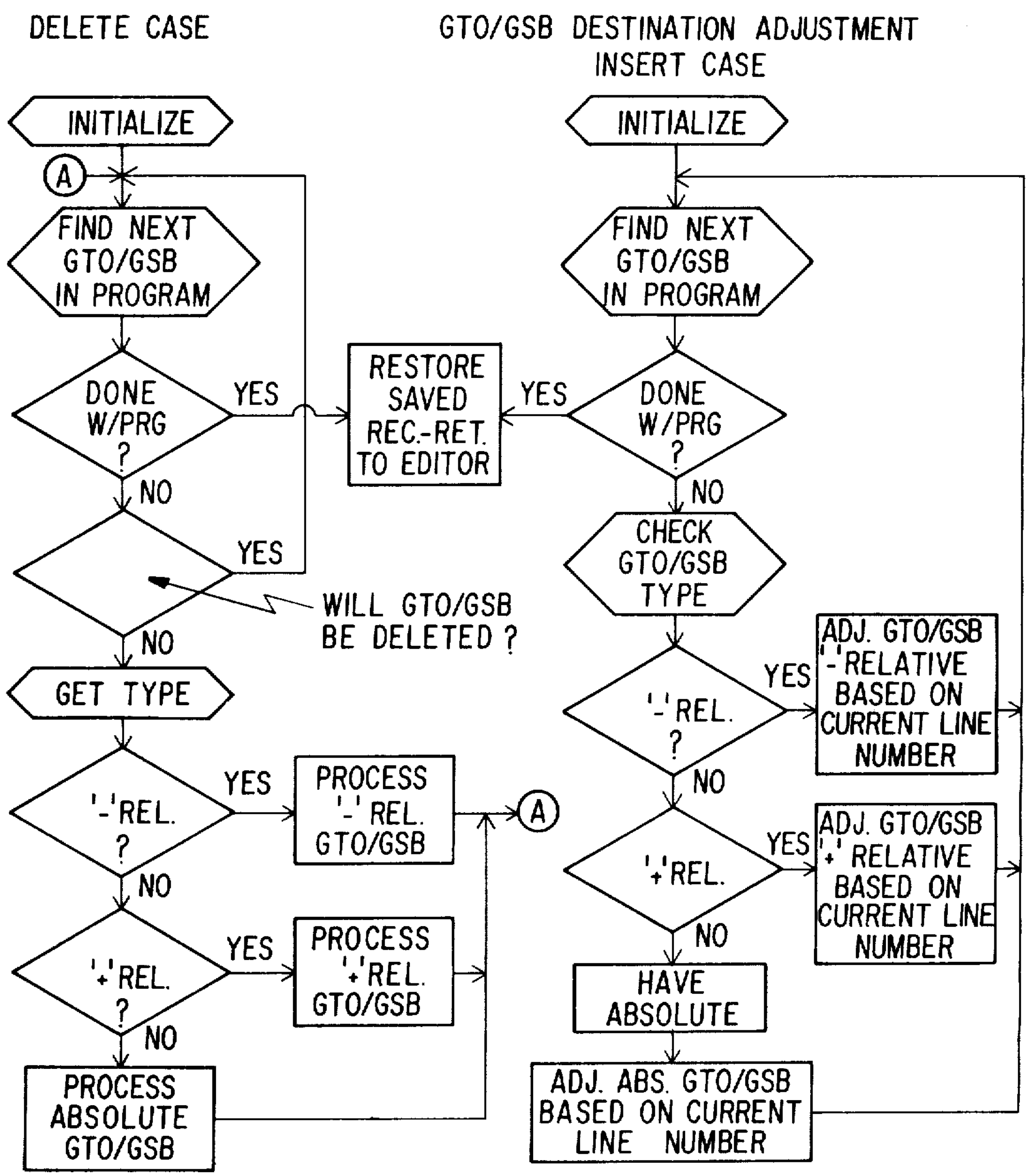

FIG. 166 is a flow chart of a GTO/GSB destinaton adjustment subroutine stored in the mainframe language ROM of FIGS. 4 and 7.

Figure 167A:
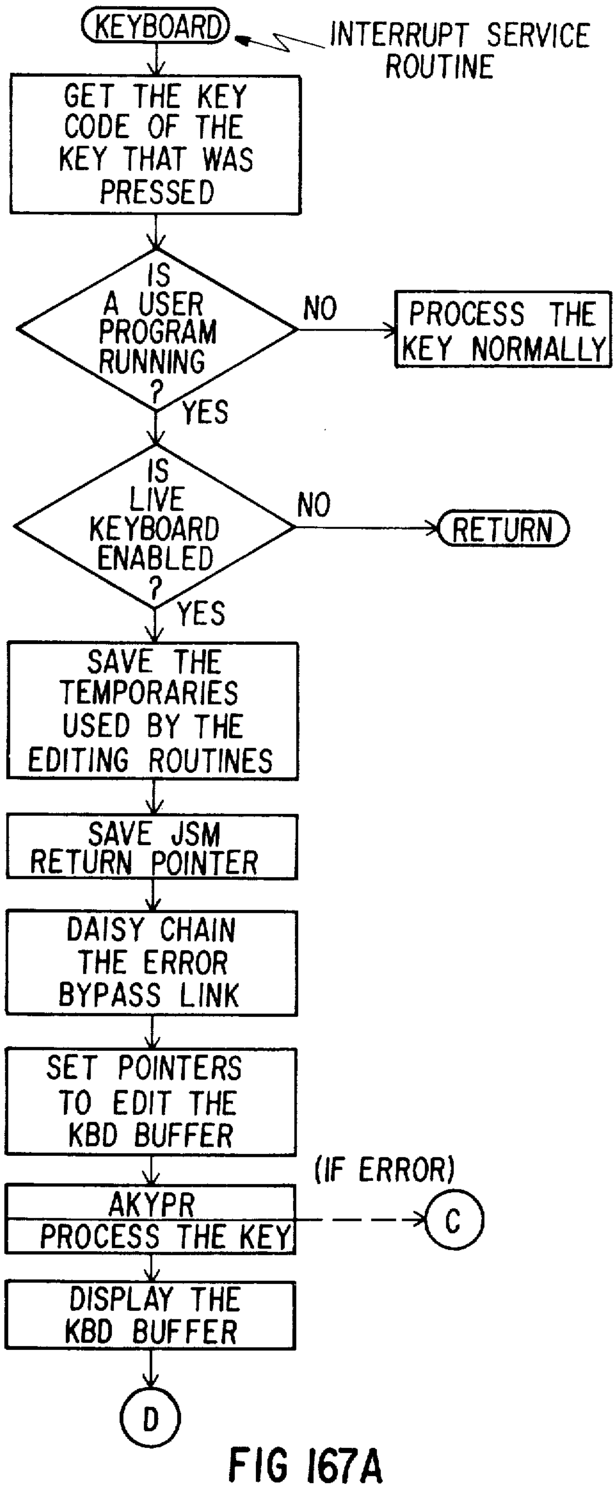
Figure 167B:
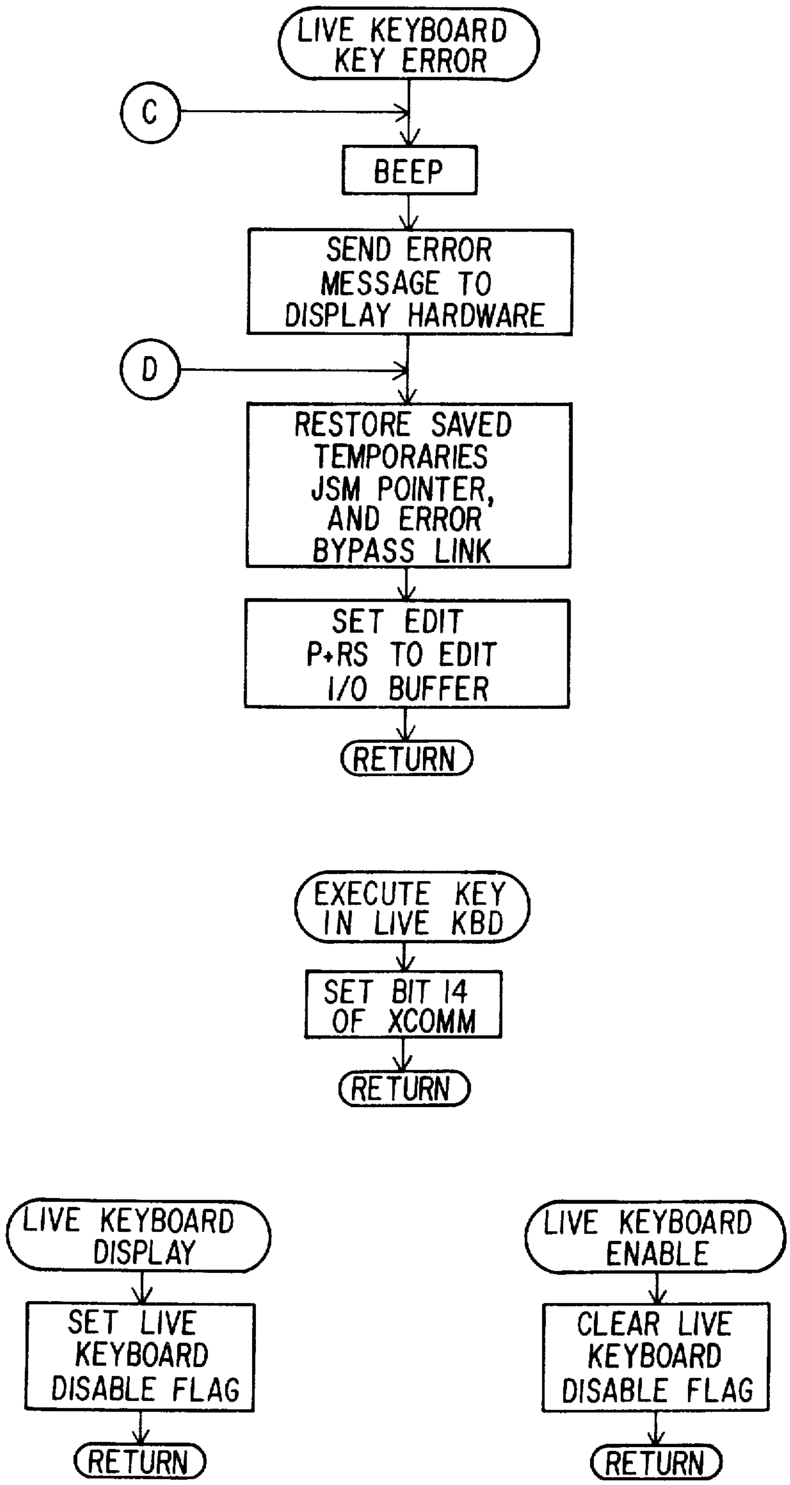

FIGS. 167A–B are a flow chart of live keyboard key processing subroutines stored in the mainframe language ROM of FIGS. 4 and 7.

Figure 168A:
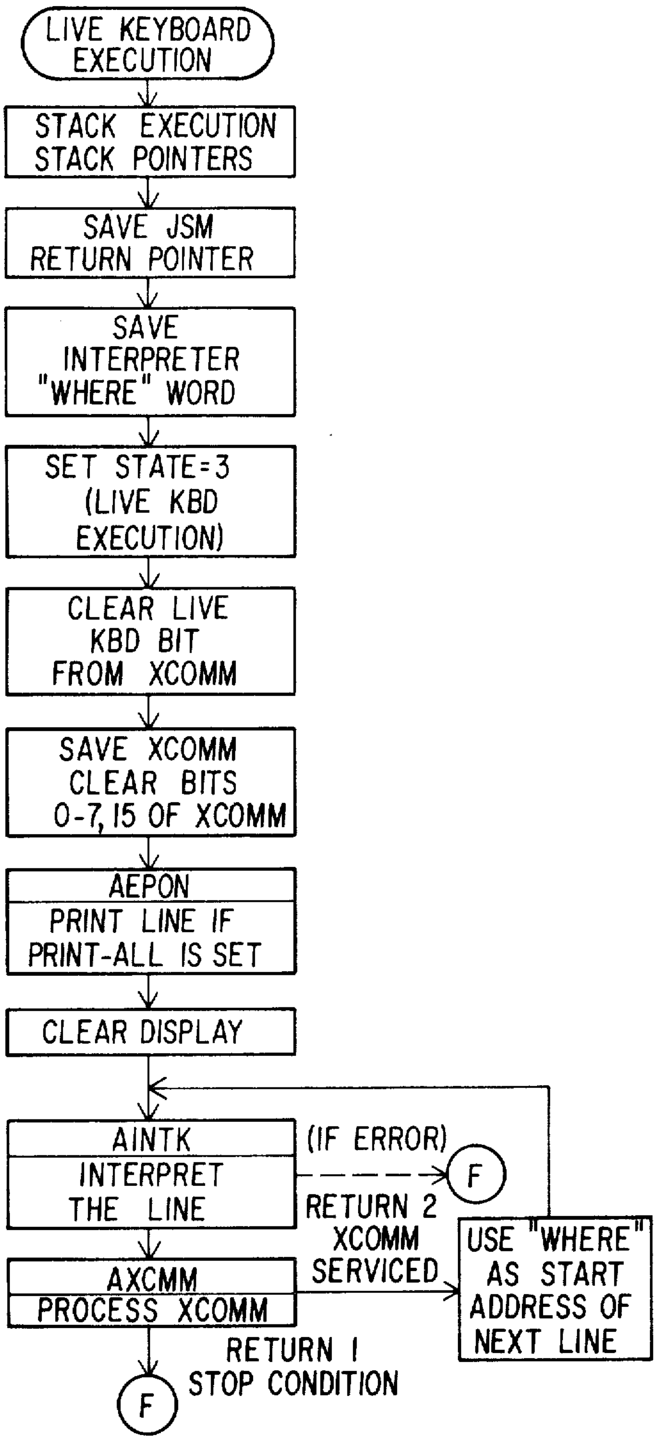
Figure 168B:
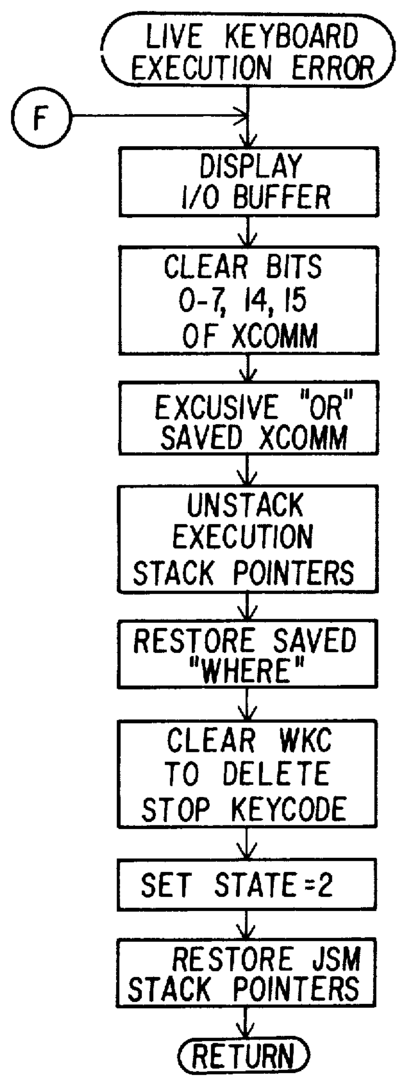

FIGS. 168A–B are a flow chart of live keyboard execution routines stored in the mainframe language ROM of FIGS. 4 and 7.

Figure 169A:
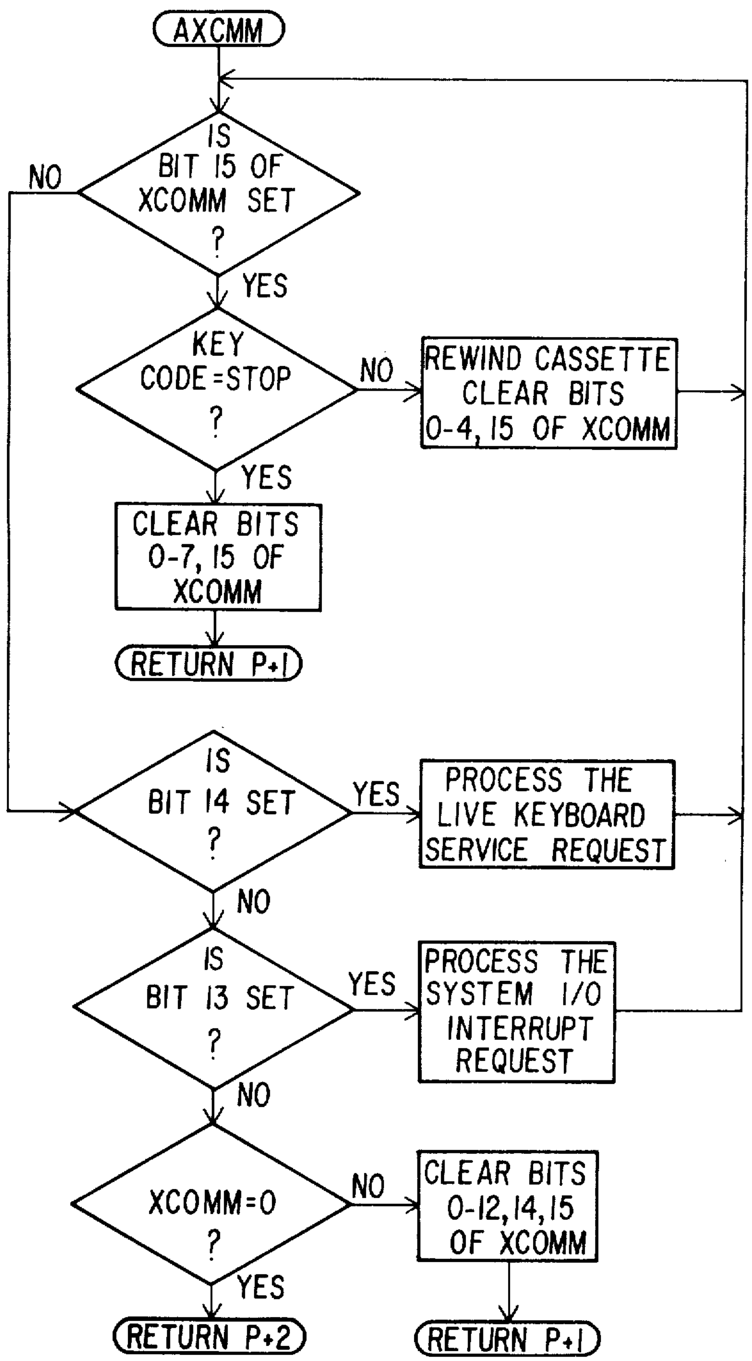
Figure 169B:
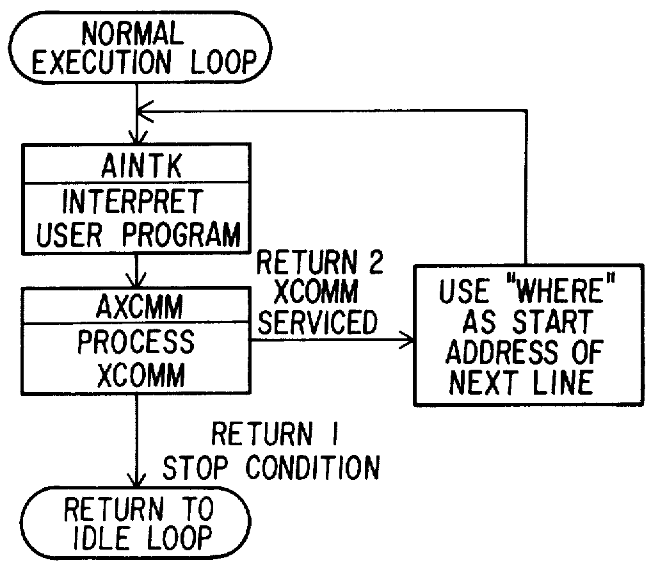

FIGS. 169A–B are a flow chart of live keyboard interpreter routines stored in the mainframe language ROM of FIGS. 4 and 7.

FIGS. 170A–D illustrate the information structure of a magnetic tape employed in the magnetic tape cassette reading and recording unit of the calculator.

Figure 171A:
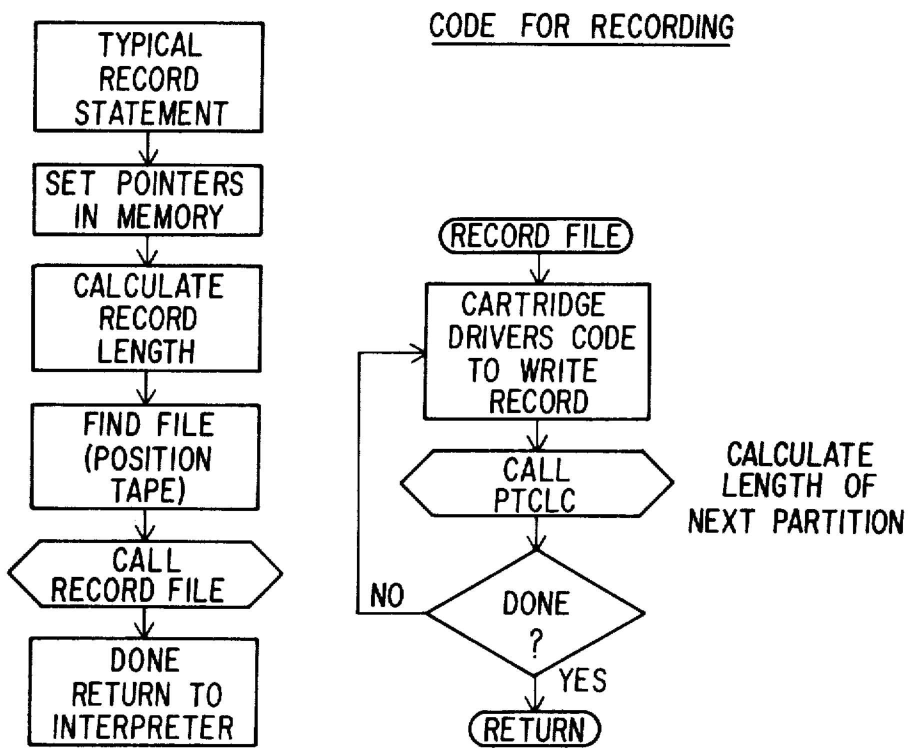
Figure 171B:
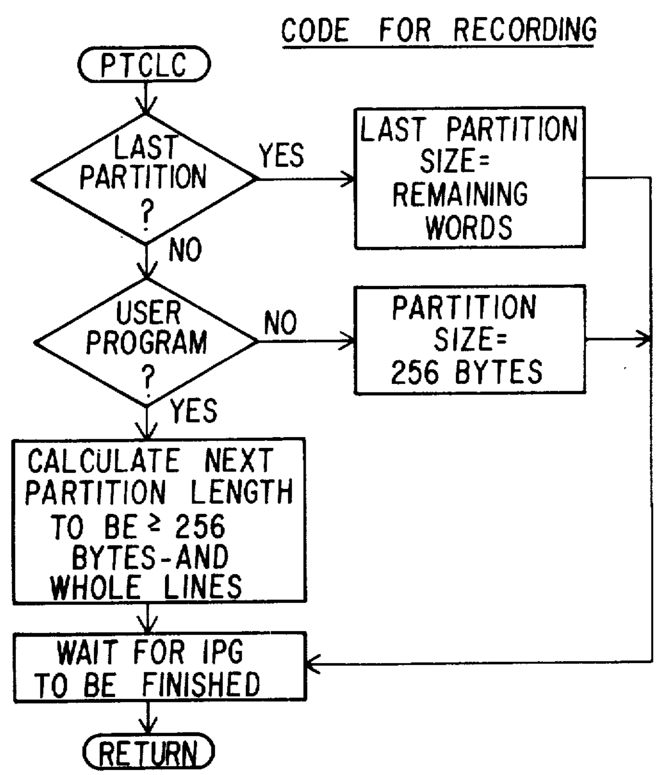

FIGS. 171A–B are a flow chart of a magnetic tape recording routine and subroutines stored in the mainframe language ROM of FIGS. 4 and 7.

Figure 172A:
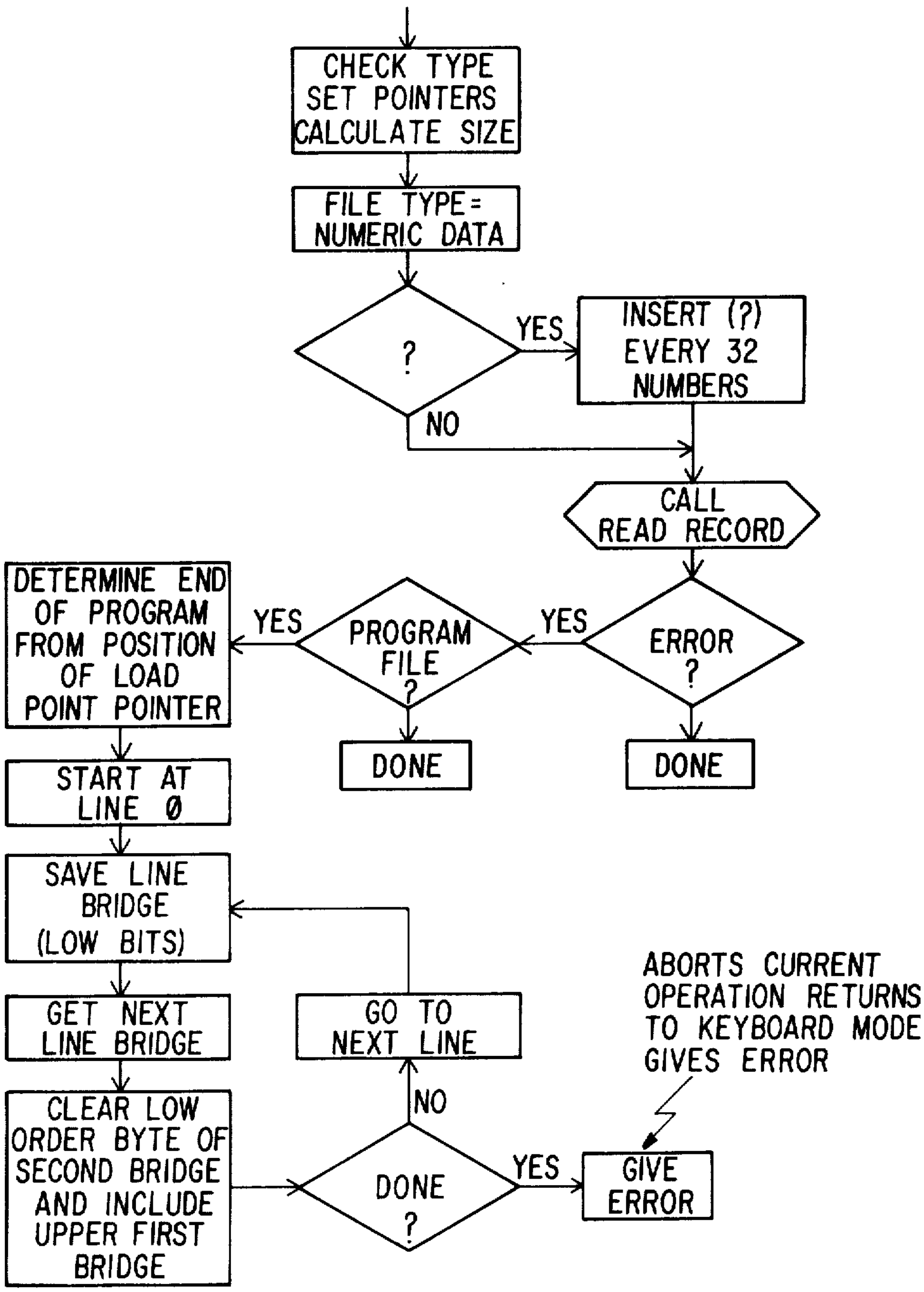
Figure 172B:
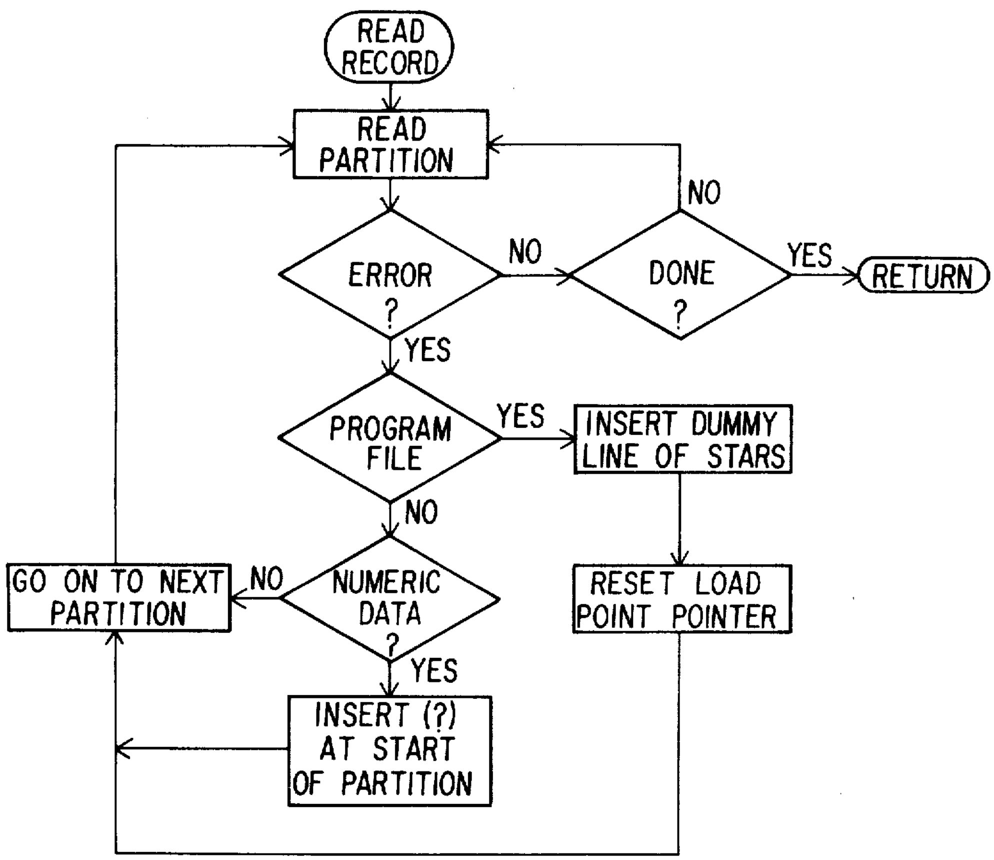

FIGS. 172A–B are a flow chart of a magnetic tape reading routine and subroutines stored in the mainframe language ROM of FIGS. 4 and 7.

Figure 173:
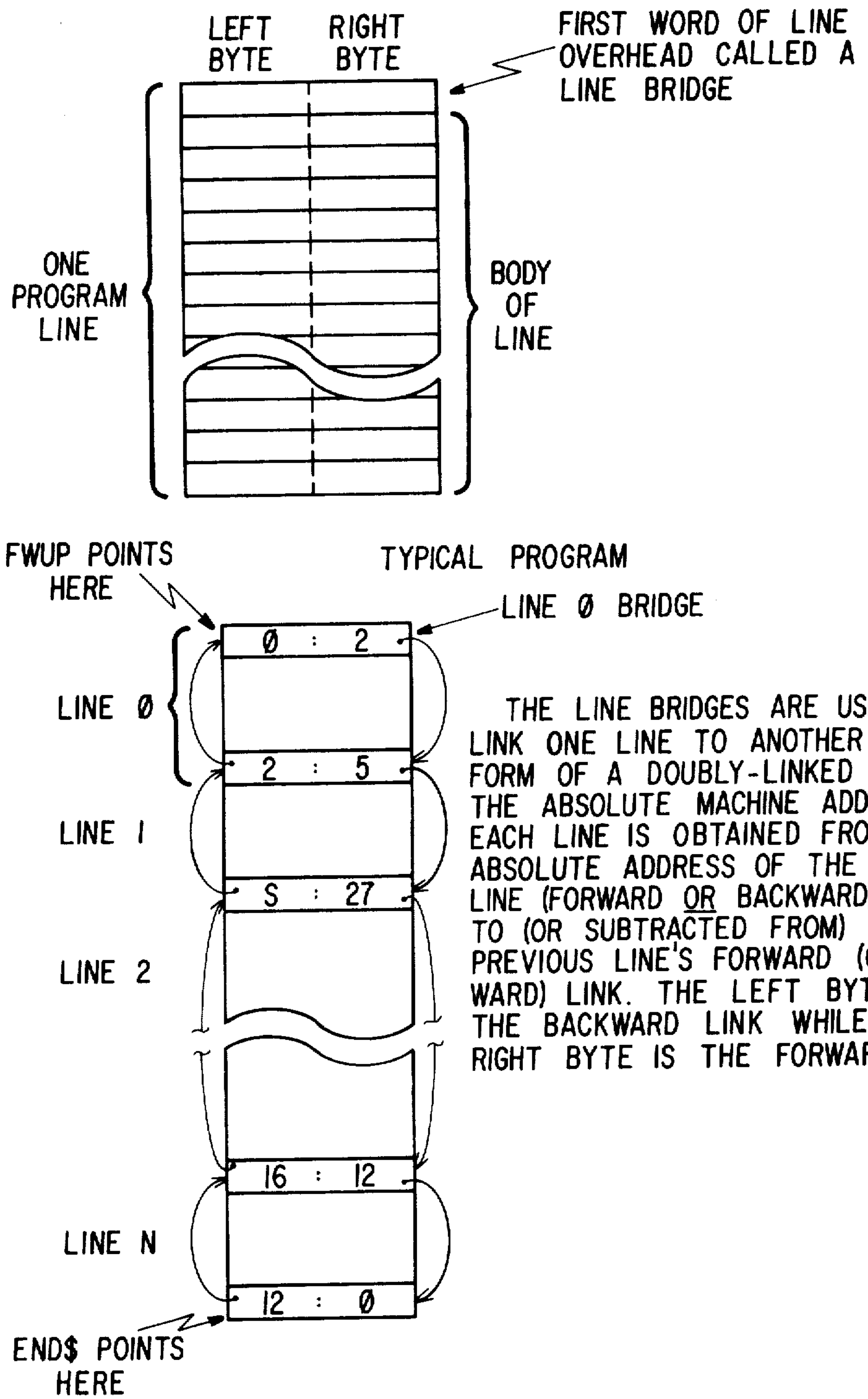

FIG. 173 is a diagram illustrating line bridging performed by the routine of FIGS. 172A–B.

Figure 174:
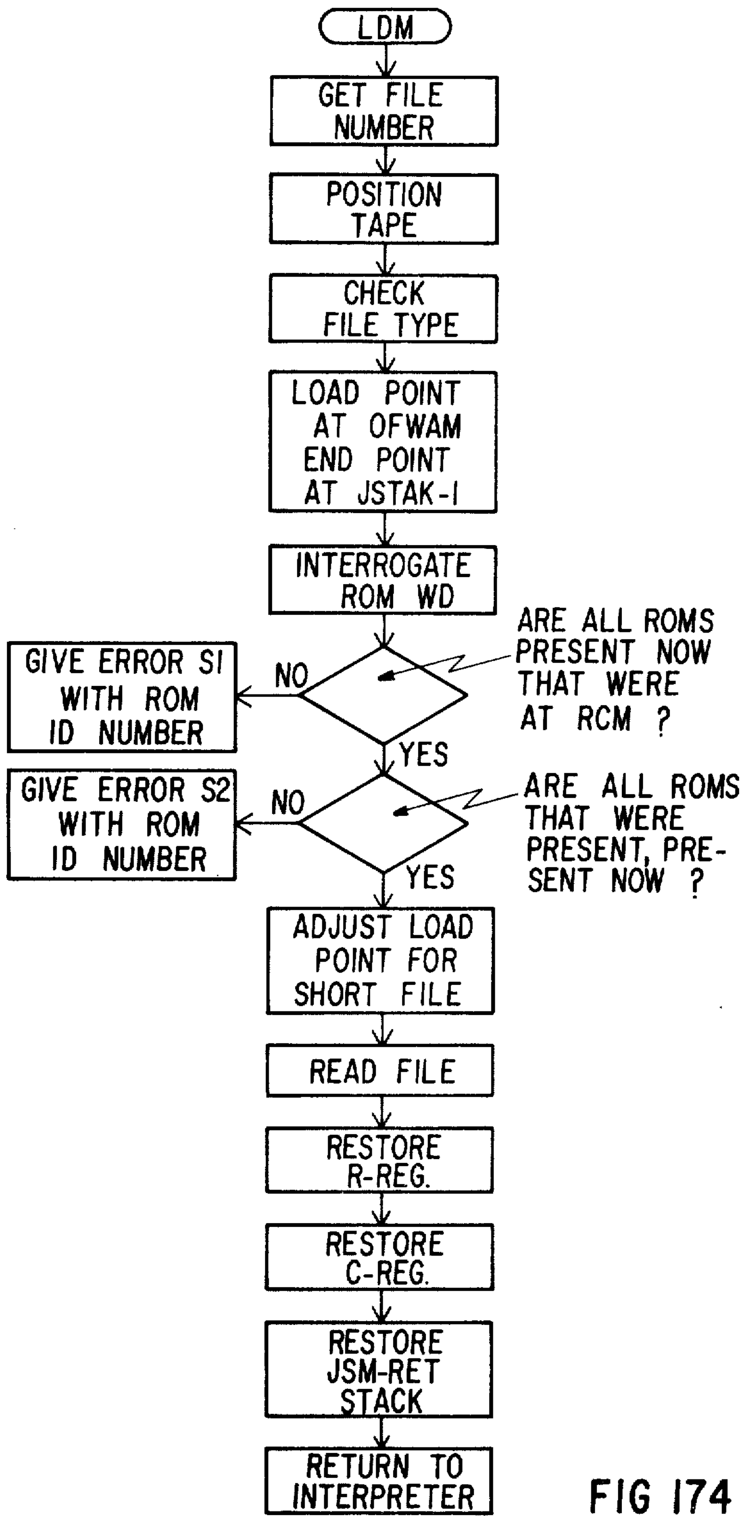

FIG. 174 is a flow chart of a load memory subroutine stored in the mainframe language ROM of FIGS. 4 and 7.

Figure 175:
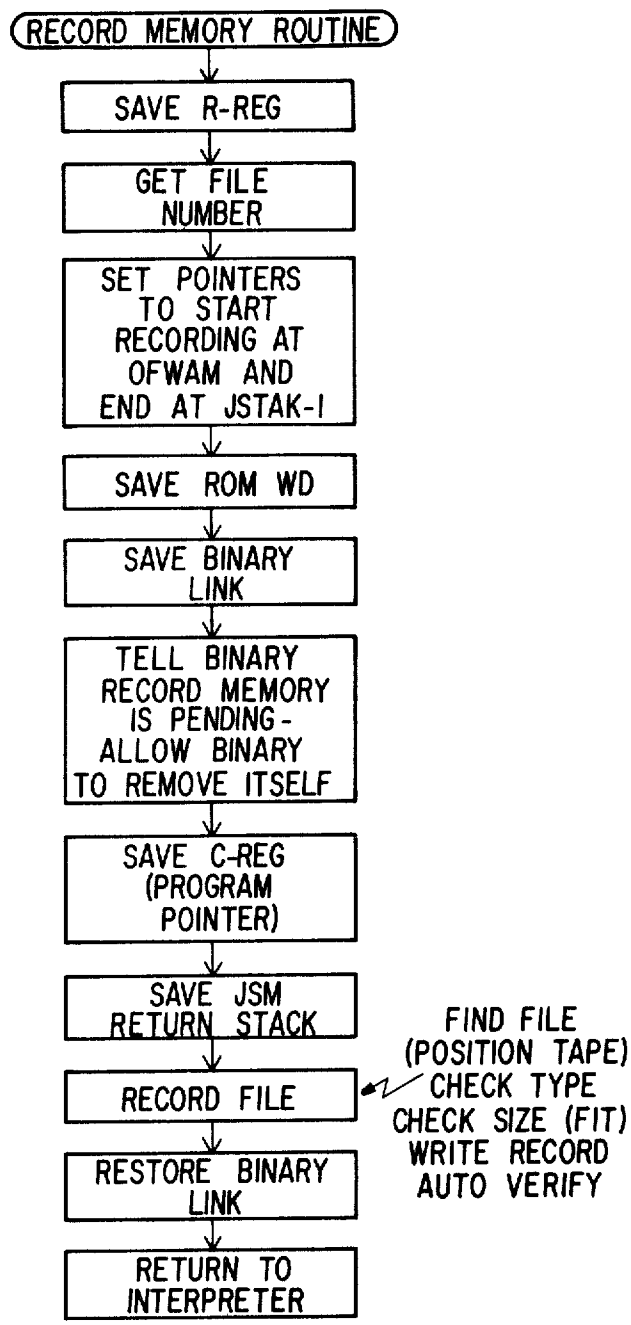

FIG. 175 is a flow chart of a record memory subroutine stored in the mainframe language ROM of FIGS. 4 and 7.

Figure 176:
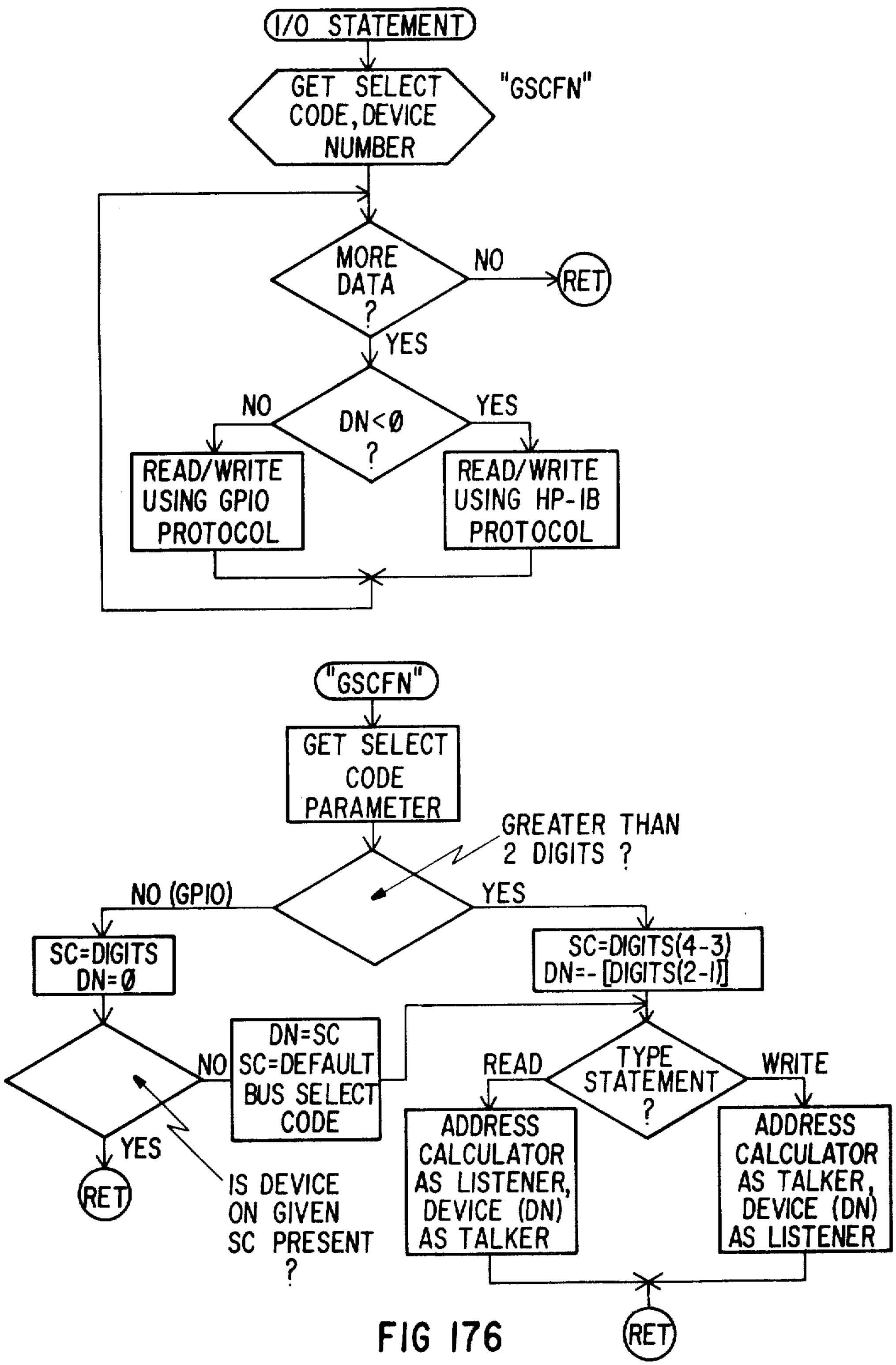

FIG. 176 is a flow chart of an HPIB transparency routine and subroutine stored in the calculator read-only memory.

Figure 177A:
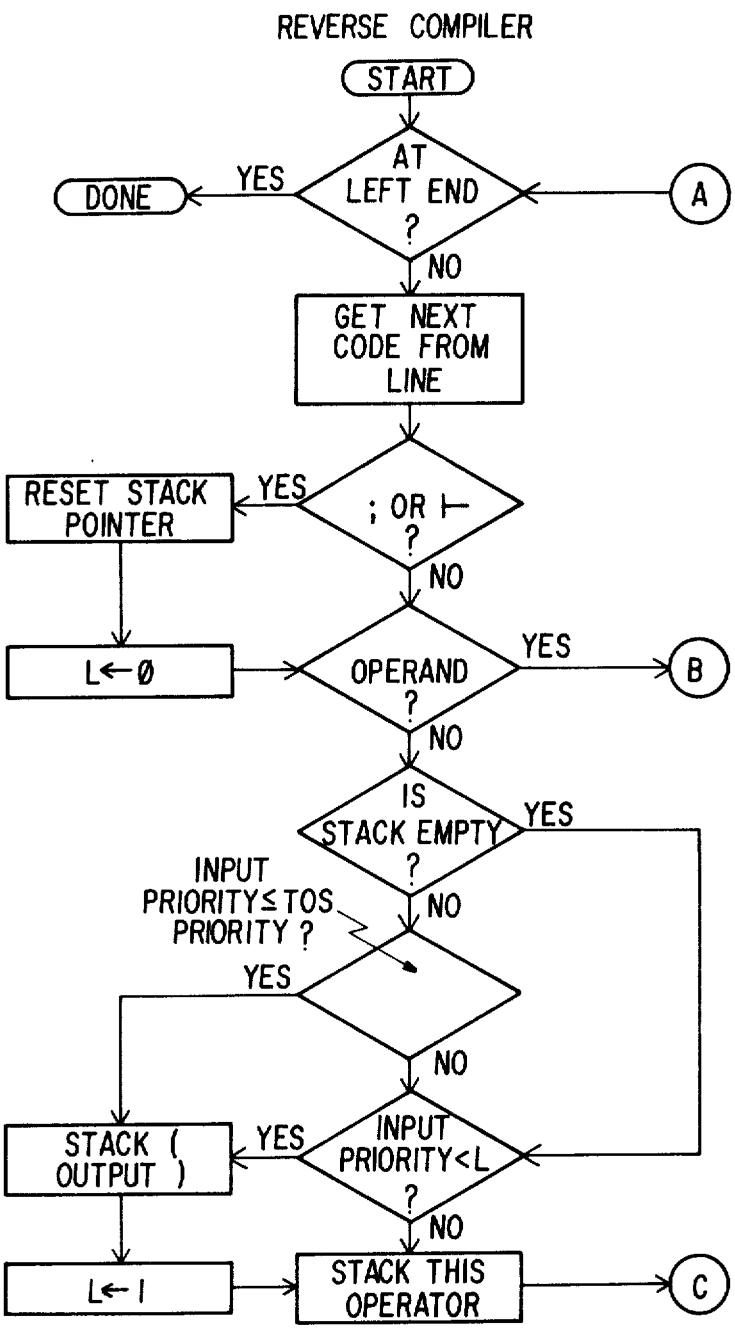
Figure 177B:
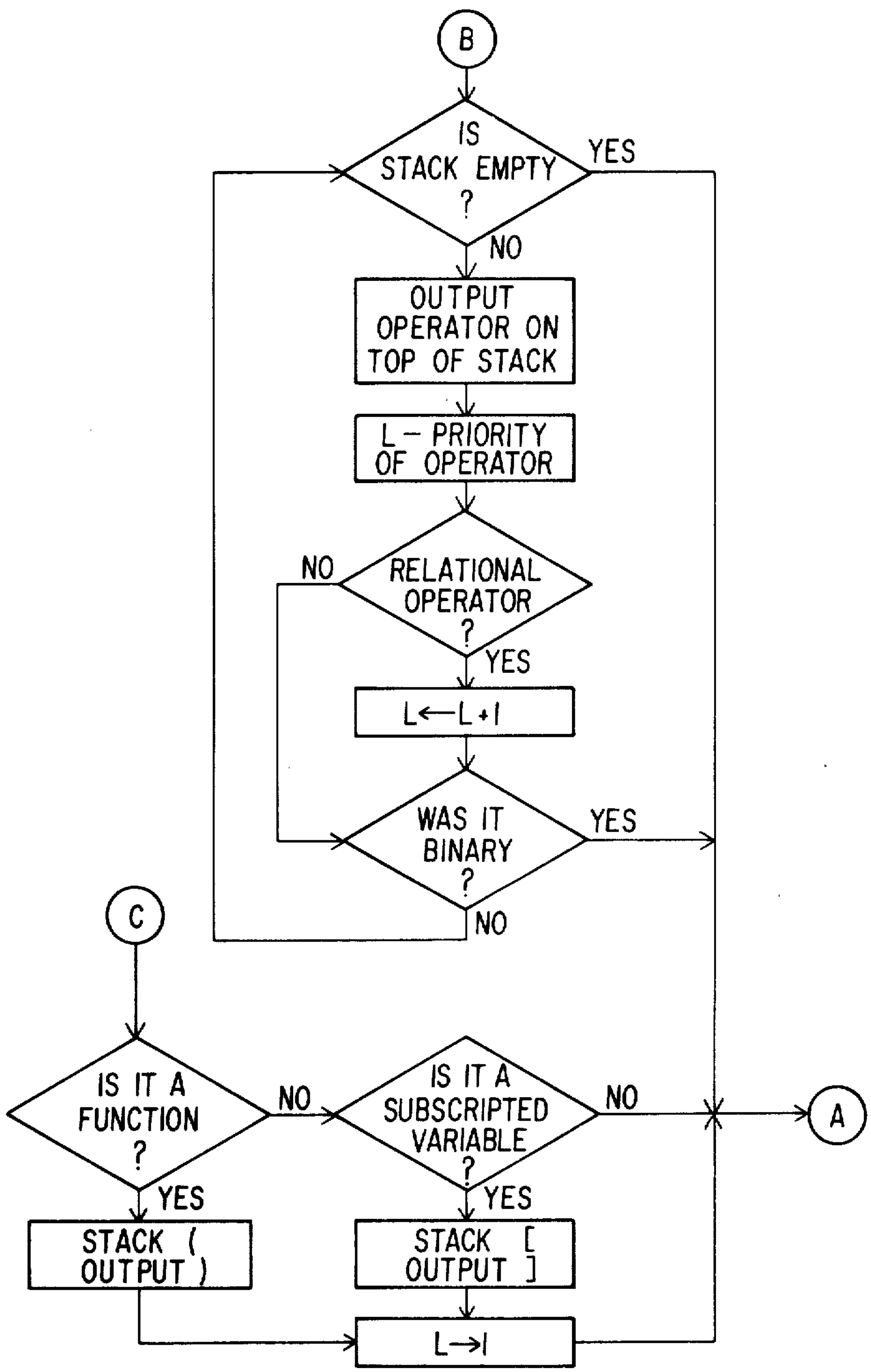

FIGS. 177A–B are a flow chart of a reverse compiler routine stored in the mainframe language ROM of FIGS. 4 and 7.

Figure 178A:
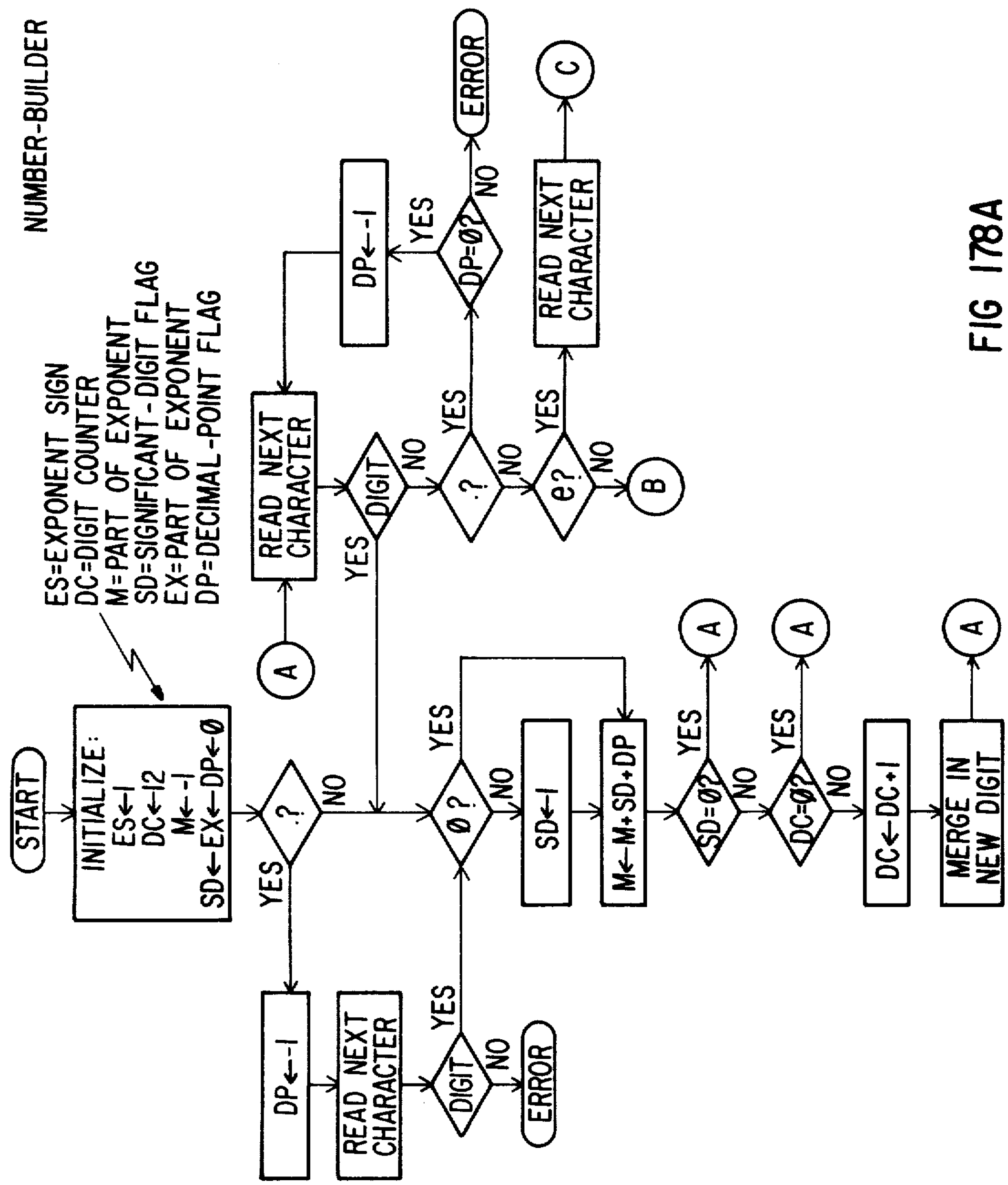
Figure 178B:
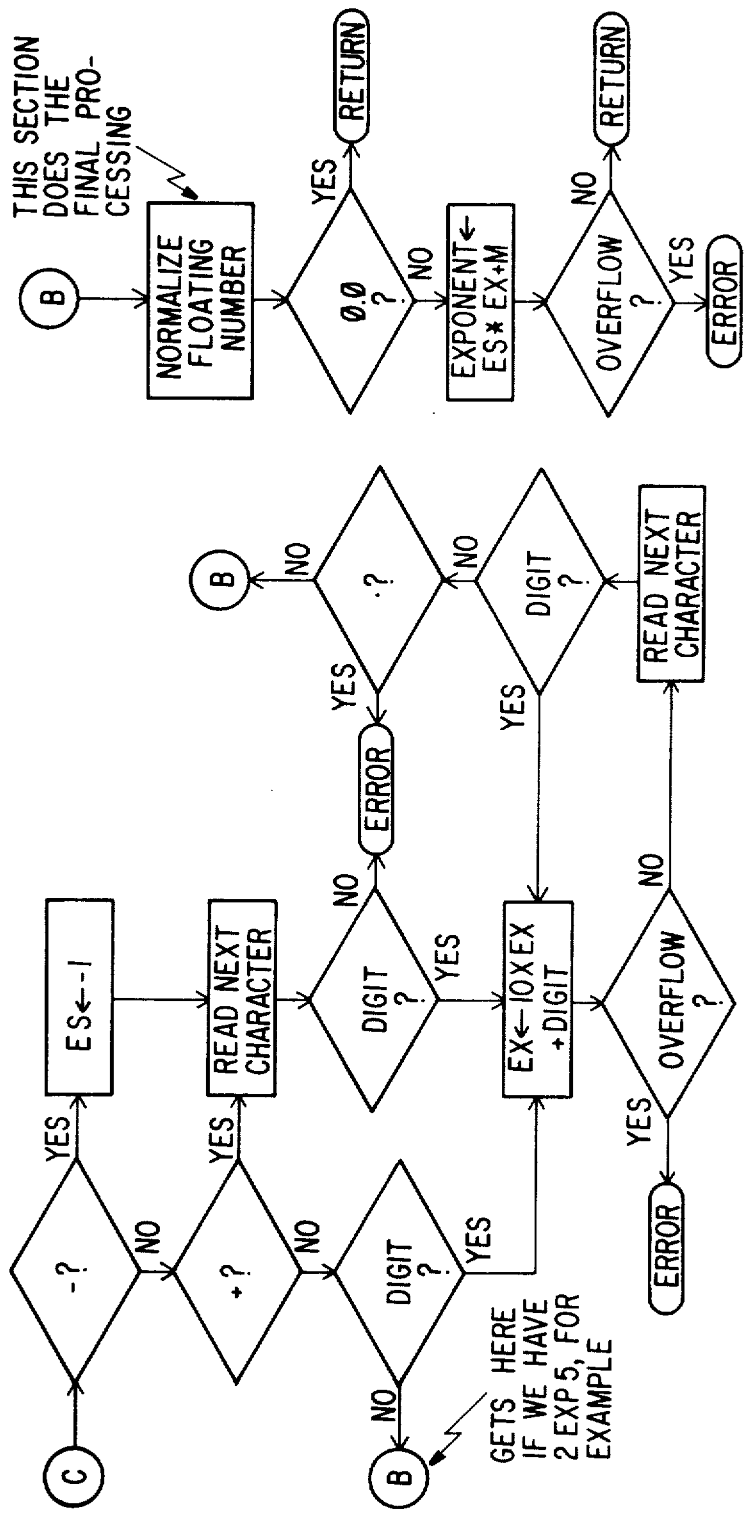

FIGS. 178A–B are a flow chart of a number builder routine stored in the mainframe language ROM of FIGS. 4 and 7.

Figure 179A:
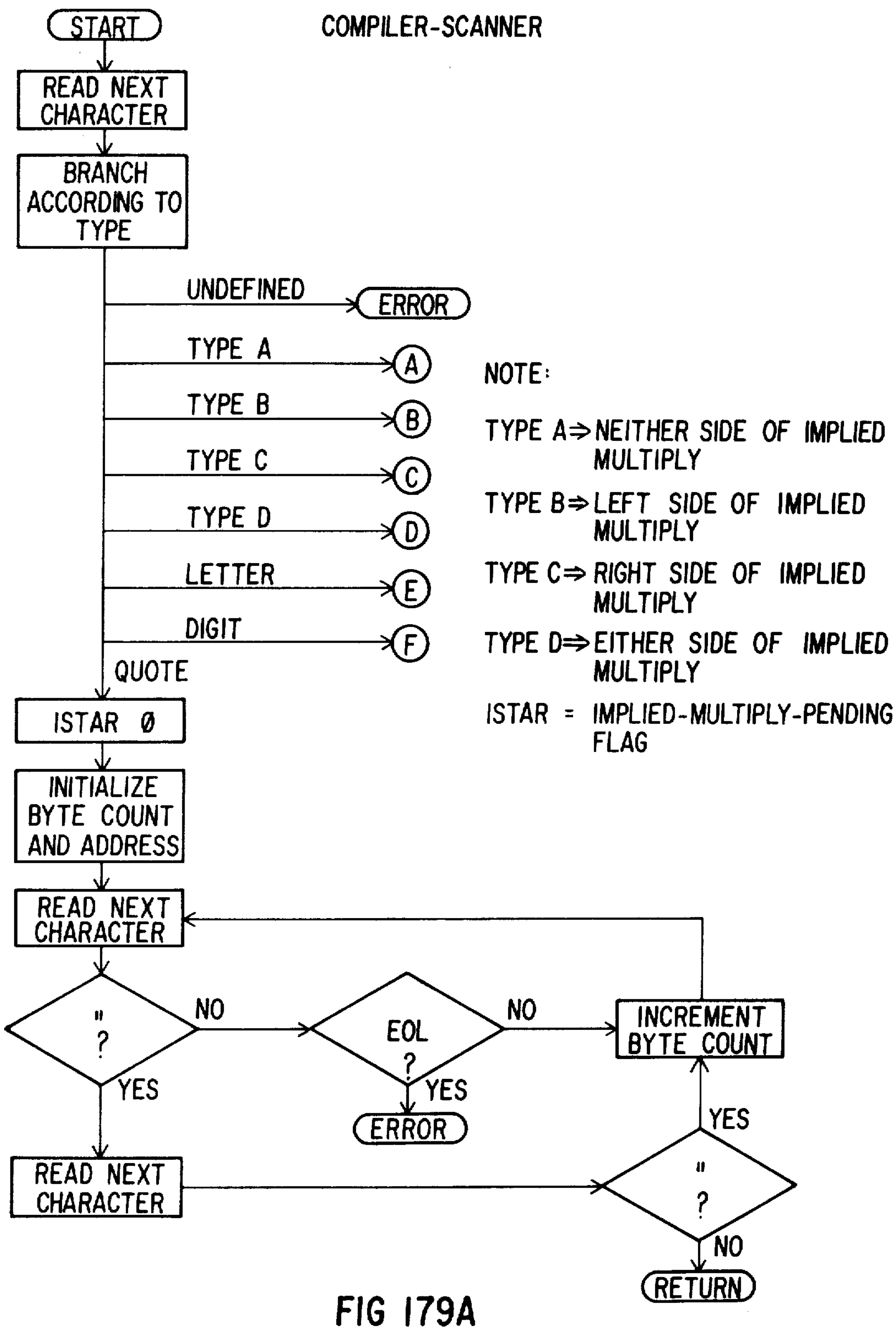
Figure 179B:
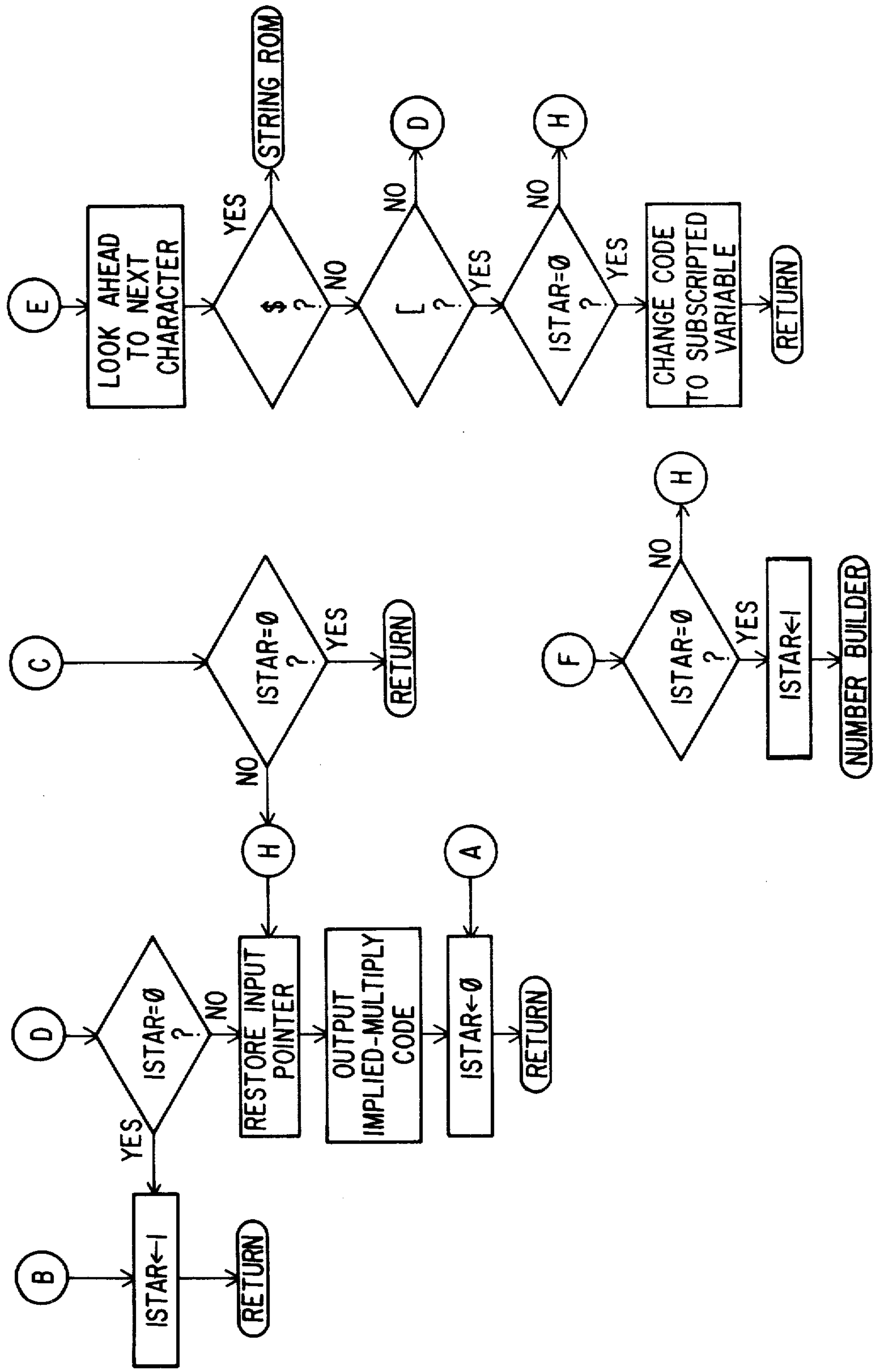

FIGS. 179A–B are a flow chart of a compiler-scanner routine stored in the mainframe language ROM of FIGS. 4 and 7.

Figure 180A:
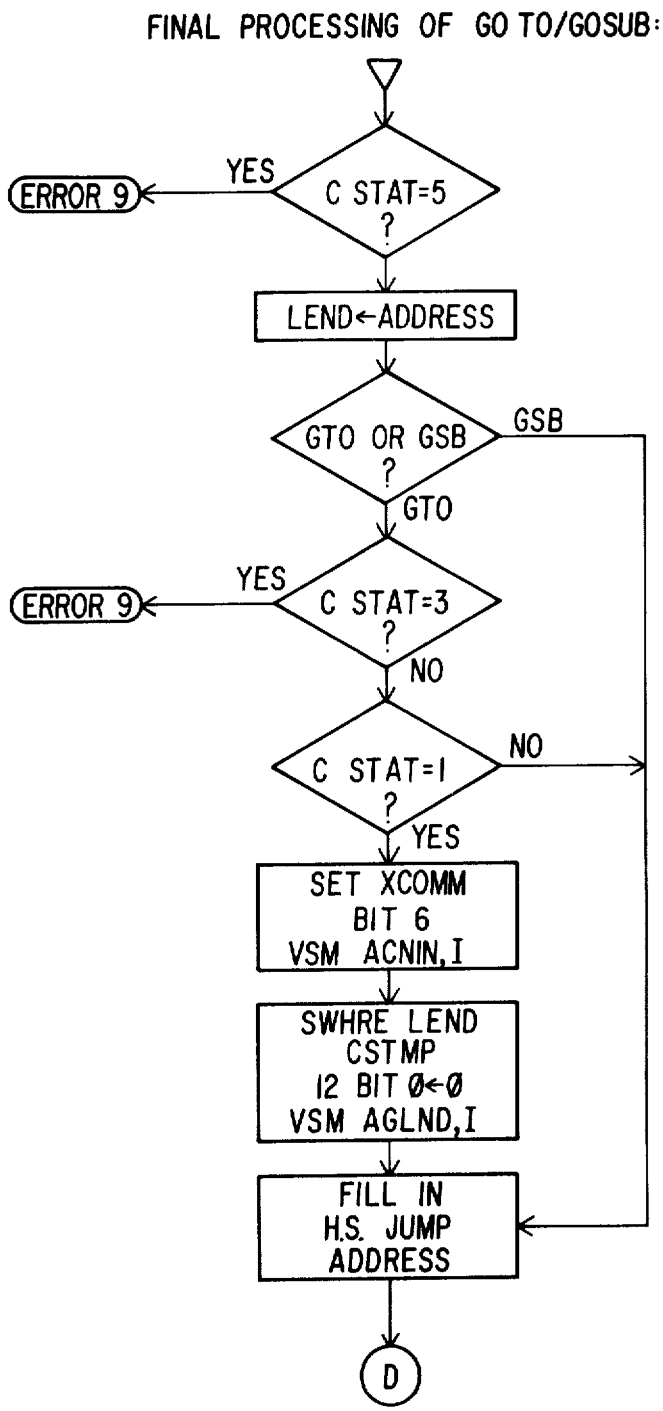
Figure 180B:
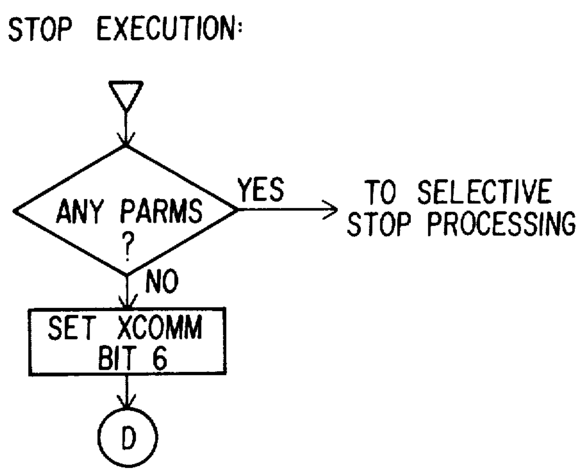
Figure 180C:
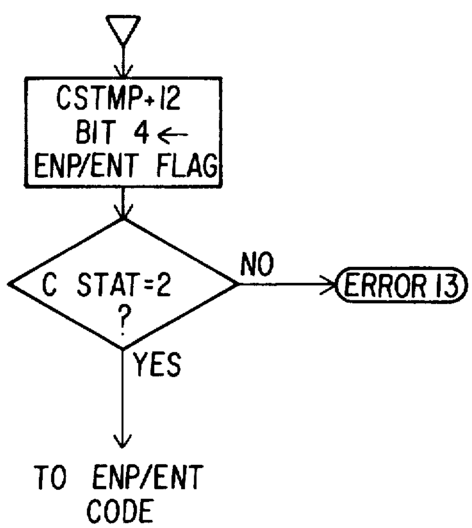
Figure 181A:
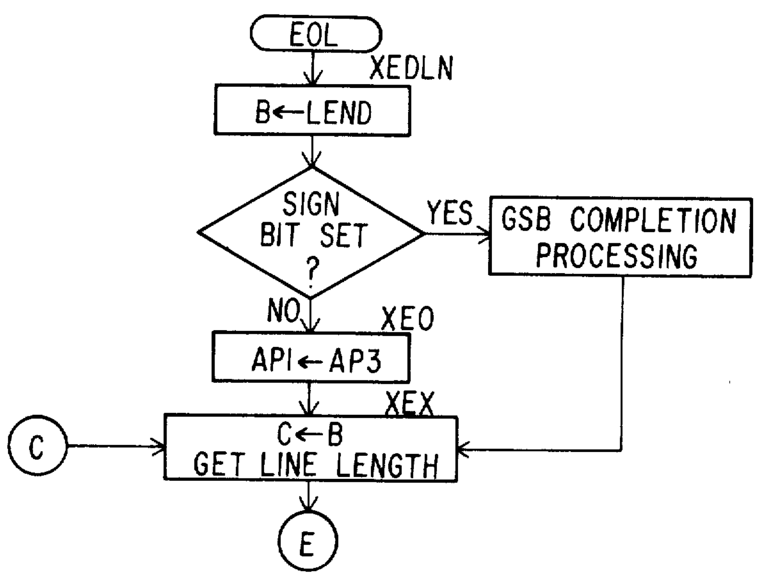
Figure 181B:
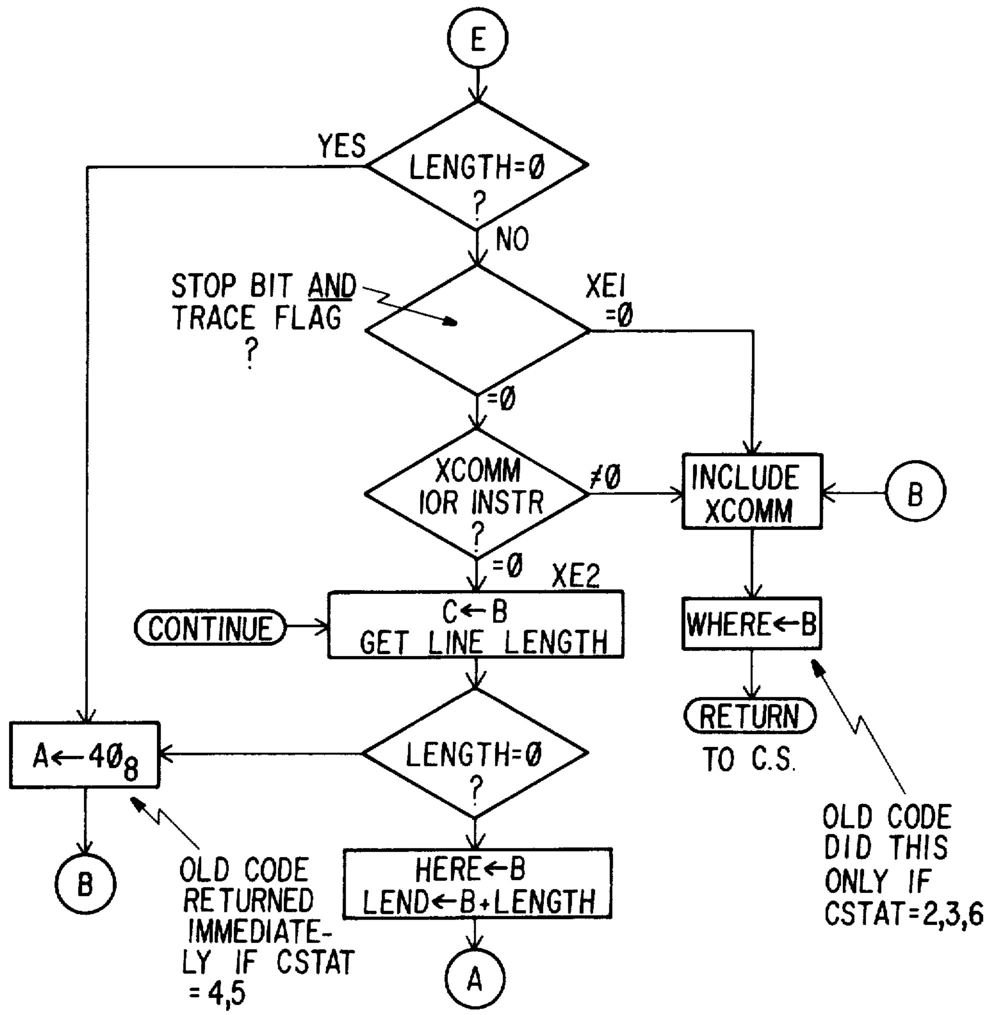
Figure 181C:
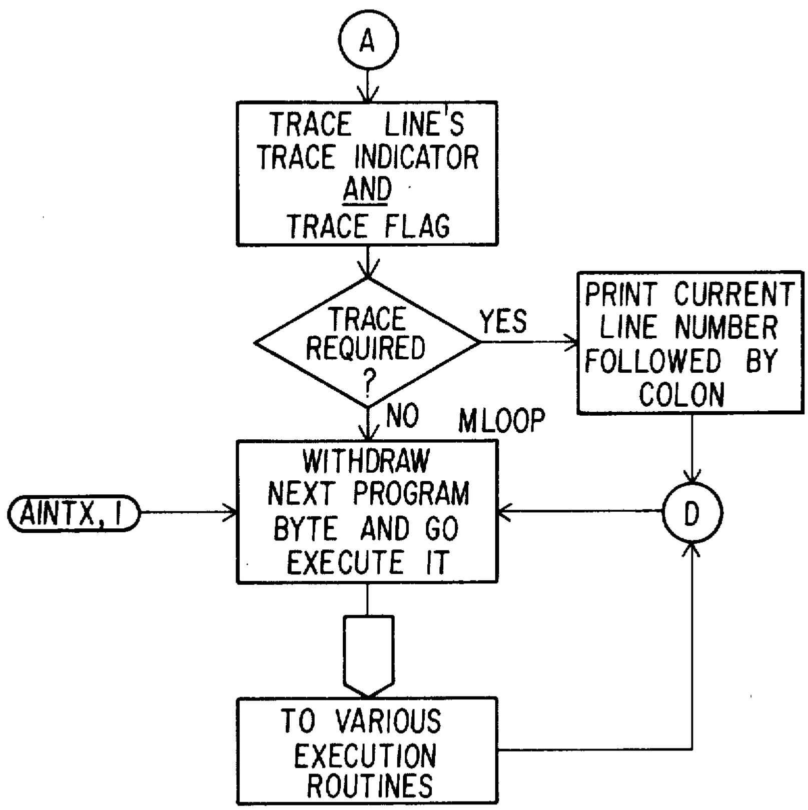
Figure 181D:
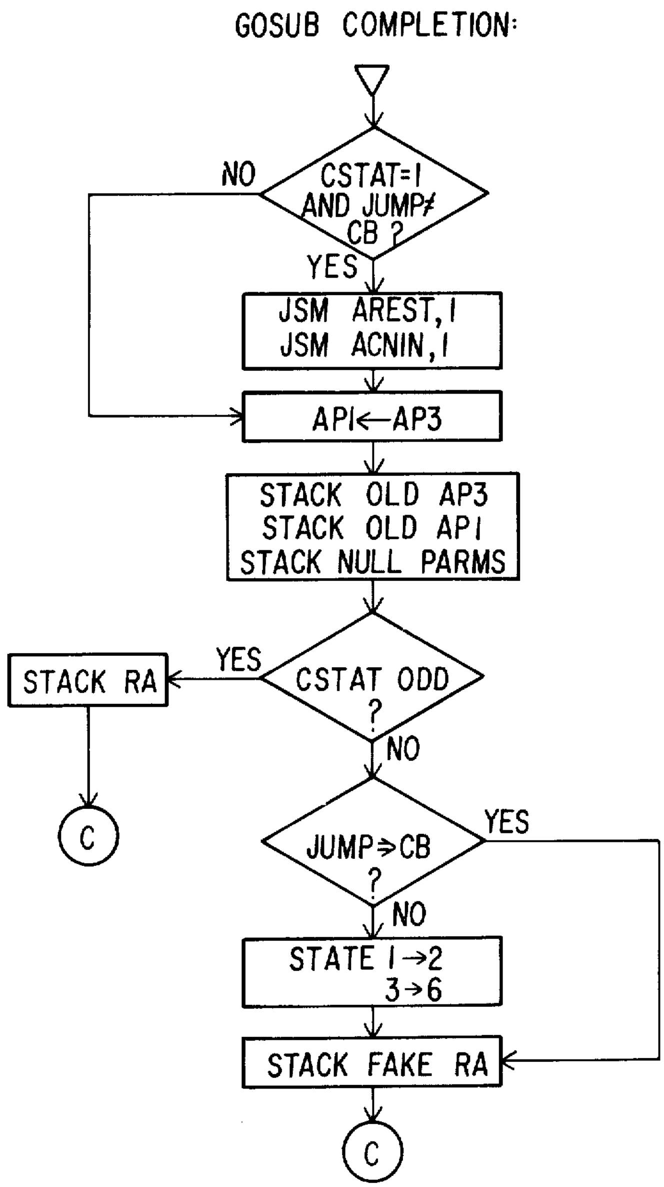

FIGS. 180A–C are a flow chart of GOTO/GOSUB processing subroutines stored in the mainframe language ROM of FIGS. 4 and 7.

FIGS. 181A–D are a flow chart of end-of-line execution routines astored in the mainframe language ROM of FIGS. 4 and 7.

Figure 182A:
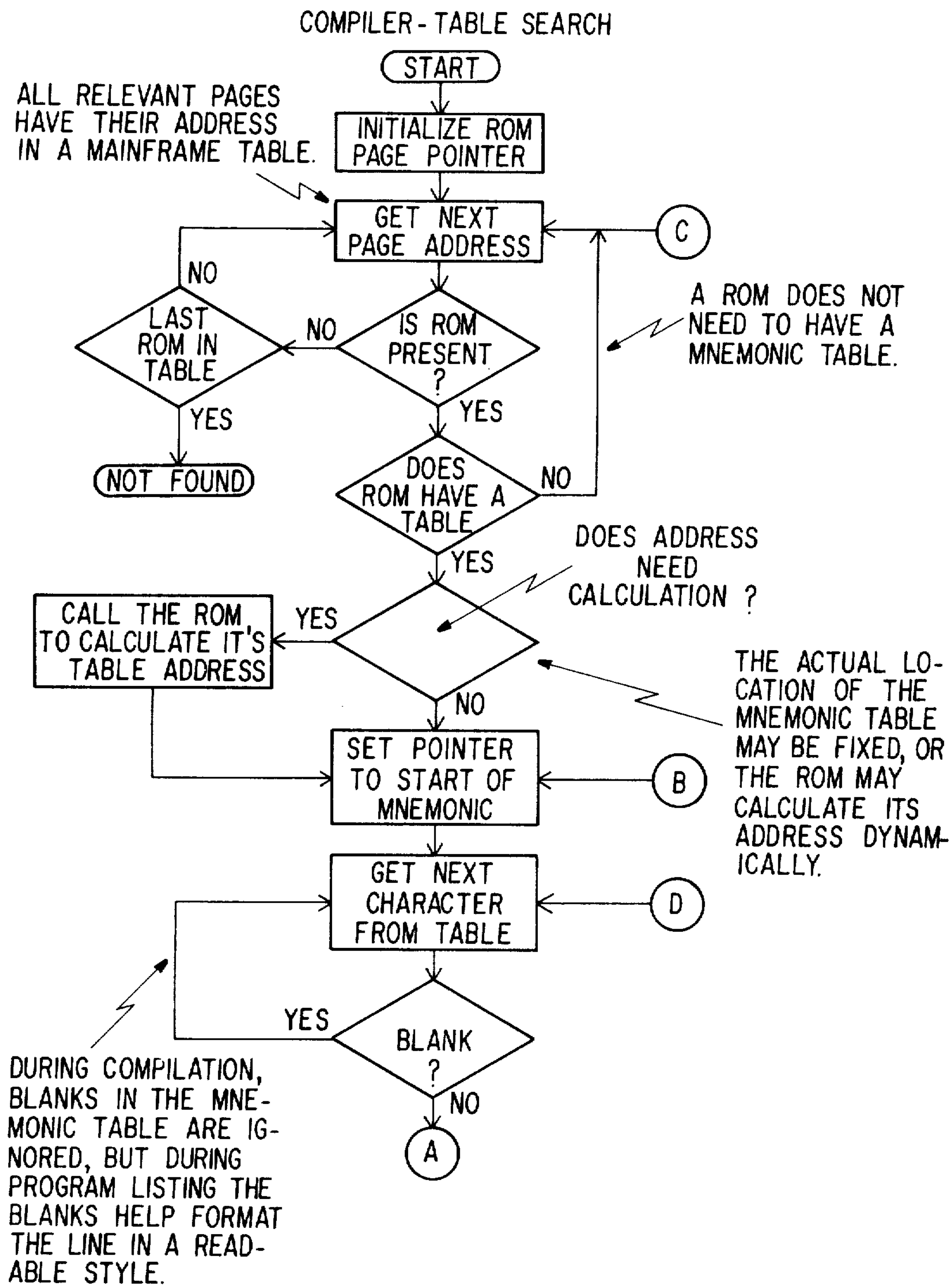
Figure 182B:
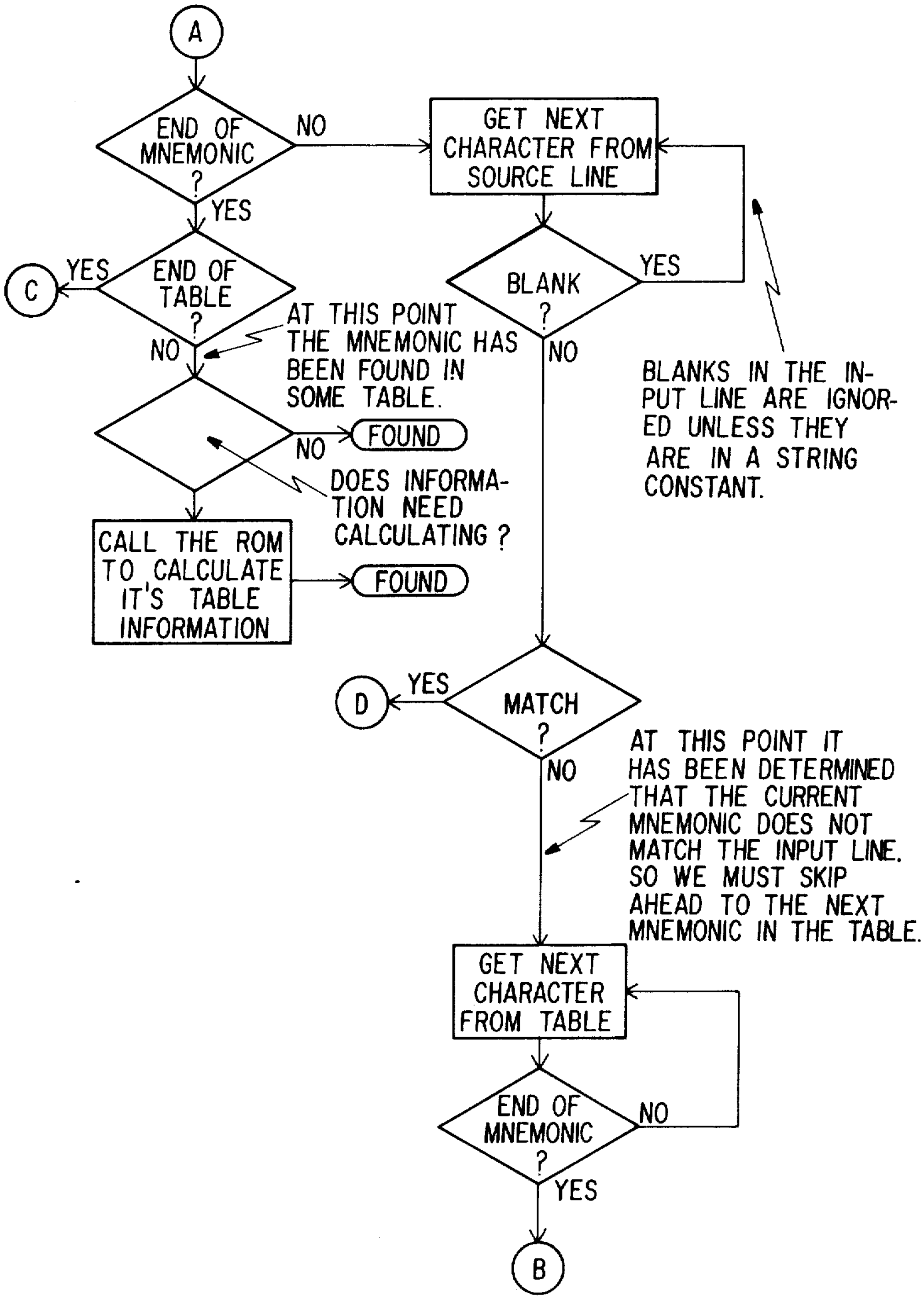

FIGS. 182A–B are a flow chart of a compiler-table search routine stored in the mainframe language ROM of FIGS. 4 and 7.

DESCRIPTION OF THE PREFERRED EMBODIMENT

GENERAL DESCRIPTION

Referring to FIG. 1, there is shown a programmable calculator including both a keyboard 320 for entering information into the calculator and for controlling the operation of the calculator and a magnetic tape cassette reading and recording unit 360 for recording information stored within the calculator onto one or more external tape cartridges 12 and for loading information stored on such tape cartridges back into the calculator. The calculator also includes a 32-character 5 × 7 dot matrix light-emitting diode (LED) display 330 for displaying alphanumeric statements entered into the calculator, results of statement execution, error conditions encountered during operation of the calculator, and messages and data prompts generated during program execution. The calculator further includes a 16-column alphanumeric thermal printer 340 for printing computation results, program listings, and messages generated by the calculator or the user. One or more plug-in read-only memories 230 for increasing the functional capability of the calculator may be plugged into a group of four ROM receptacles 14 provided in the front base of the calculator. A plug-in mainframe language ROM 210 that defines the operating language of the calculator resides in a slot provided on the right base of the calculator. By replacing the mainframe language ROM, the operating language of the calculator may be changed, for example, to either BASIC, FORTRAN, ALGOL or APL computer language.

Figure 2:
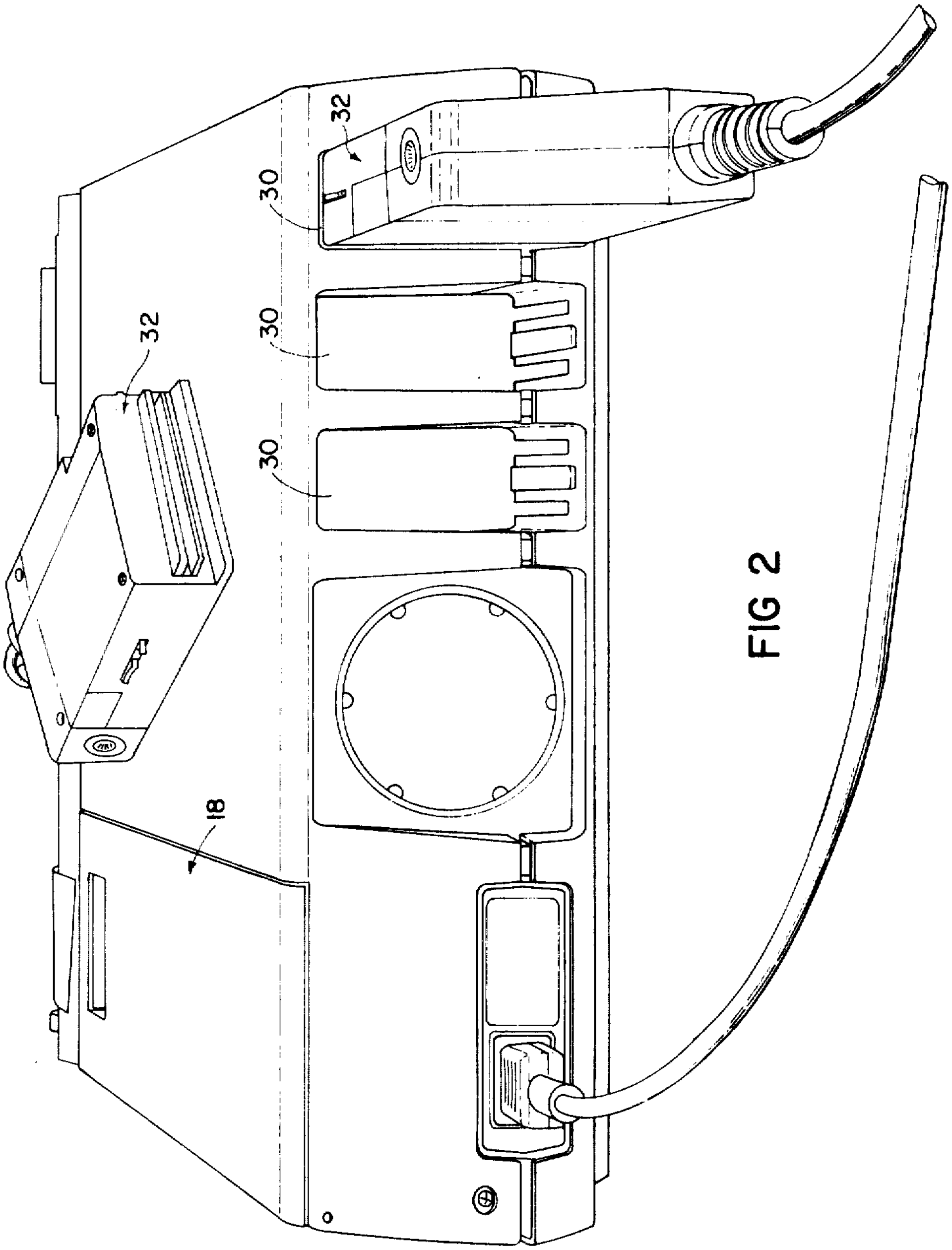
FIG. 2 is a rear perspective view of the programmable calculator of FIG. 1.

As shown in FIG. 2, the rear panel of the calculator includes three input/output (I/O) receptacles 30 for accepting I/O interface modules 32. These I/O interface modules serve to couple the calculator to various selected peripheral I/O units such as X-Y plotters, printers, typewriters, photoreaders, paper tape punches, digitizers, BCD-compatible data gathering instruments such as digital voltmeters, frequency synthesizers, and network analyzers, and a universal interface bus for interfacing to most bus-compatible instrumentation.

The overall operation of the calculator hardware may be understood with reference to the block diagram of FIG. 4. A central processing unit (CPU) 100 handles all data processing performed by the calculator and is arranged to cooperate with a memory section 200 and an I/O section 300. Memory section 200 comprises the mainframe language ROM 210, a basic read-write memory 220, the optional plug-in read-only memory modules 230, and an optional read-write memory 240. I/O section 300 includes a keyboard/display/printer (KDP) control circuit 310, the keyboard input unit 320, the display 330, the thermal printer 340, the magnetic tape cassette reading and recording unit 360, a magnetic tape control circuit 350, and an I/O interface circuit 370. A power module 410 includes a line transformer, a power switch 16 located on the right panel of the calculator, a group of line voltage selection switches, and a group of fuses. The fuses and line voltage selection switches are located within a printer paper supply compartment that is accessible through a hinged cover 18 on the top panel of the calculator.

CENTRAL PROCESSING UNIT

Referring now to FIG. 16, there is shown a more detailed block diagram of the central processing unit 100 of FIG. 4. The heart of the CPU 100 is a microprocessor 101. Microprocessor 101 is a hybrid combination of three NMOS integrated circuits and four schottky TTL bidirectional data buffers. Microprocessor 101 requires two-phase clocking that is generated by a clock generator circuit 102. A preset circuit 103 initializes the microprocessor 101 by means of a signal POP when the power is not valid, as indicated by a line PVL, or when a RESET key on keyboard input unit 320 is actuated, as indicated by a RESET line. A bus control circuit 104 determines the direction of data flow on the memory bus and further determines which memory section is allowed to place data on the memory bus. A memory timing and control circuit 105 provides the proper timing signals for interfacing the the microprocessor 101 to the various memory sections.

CLOCK GENERATOR

Figure 17:
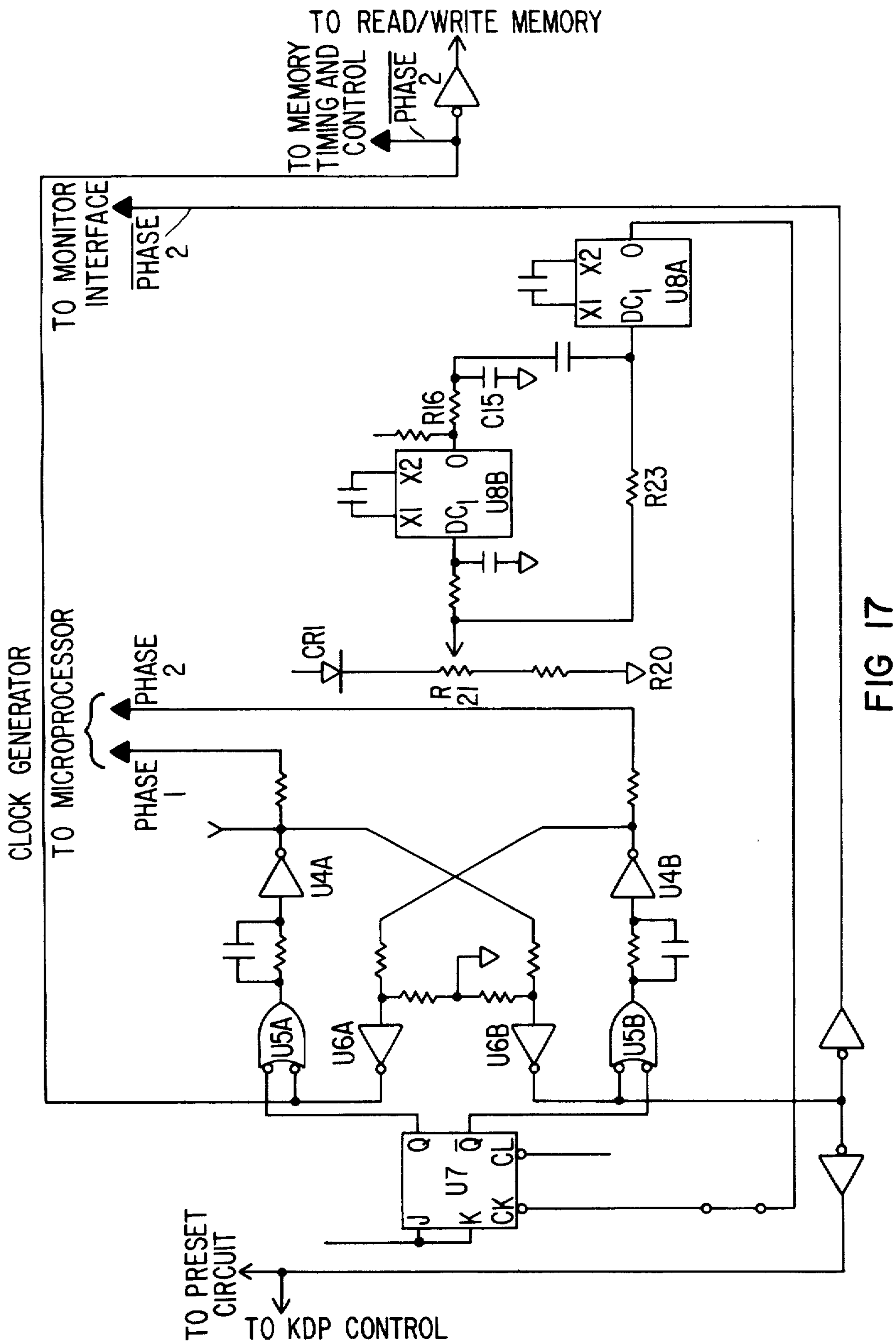
FIG. 17 is a detailed schematic diagram of the clock generator of FIG. 16.

Operation of the clock generator circuit 102 of FIG. 16 may be understood with reference to the detailed schematic diagram of FIG. 17 and with further reference to copending U.S. Pat. application Ser. No. 599,500 entitled TWO-PHASE CLOCK CIRCUIT, filed Jul. 28, 1975, by Loyd F. Nelson et al and assigned to the same assignee as the present application. A duel voltage controlled multivibrator U8 may comprise, for example, a Motorola MC4024 package. Section U8A of this package and its associated components are employed to generate a nominal frequency of 11.6 megahertz. Section U8A is biased at a nominal voltage of 4.0 volts via resistor R23 from a power supply and a divider network comprising diode CR1 and resistors R20 and R21. Section U8B, similarly biased, generates a signal having a nominal frequency of 10 kilohertz that is integrated by resistor R16 and capacitor C15 to produce a triangular waveform. The triangular waveform is then used to modulate the nominal 10-kilohertz frequency, thus spreading the energy associated with the basic frequency over a frequency spectrum of 11.2 megahertz to 12 megahertz and reducnbg both the conducted and radiated energy to an acceptable limit at any given frequency. The resulting frequency is divided by a flip-flop U7 to produce the clock frequency used in the calculator. Devices U4, U5, and U6 provide the two non-overlapping clock signals required by the microprocessor 101. Device U4, which may comprise, for example, a Motorola MMH0026, converts the TTL signal levels to MOS levels, as requied by microprocessor 101. A pair of inverters U6A and U6B feed back the clock signals to U5B and U5A to inhibit each clock signal from proceeding to the high logic state until the other clock signal has reached the low logic state. Schottky TTL devices are utilized for the gates of devices U5 and U6 to minimize the amount of time each clock signals resides in the low logic state while insuring that the two clock signals will not overlap. The feedback signals of both inverters U6A and U6B are also distributed to various circuits within the calculator requiring synchronization with the microprocessor. Exemplary of these circuits are the memory timing control circuit 105, the basic and optional read-write memories 220 and 240, a monitor interface circuit, and the preset circuit 103. An output of clock generator 102 is also provided for the KDP control circuit 310 of FIG. 4 for display and printer timing purposes

PRESET CIRCUIT

Figure 18:
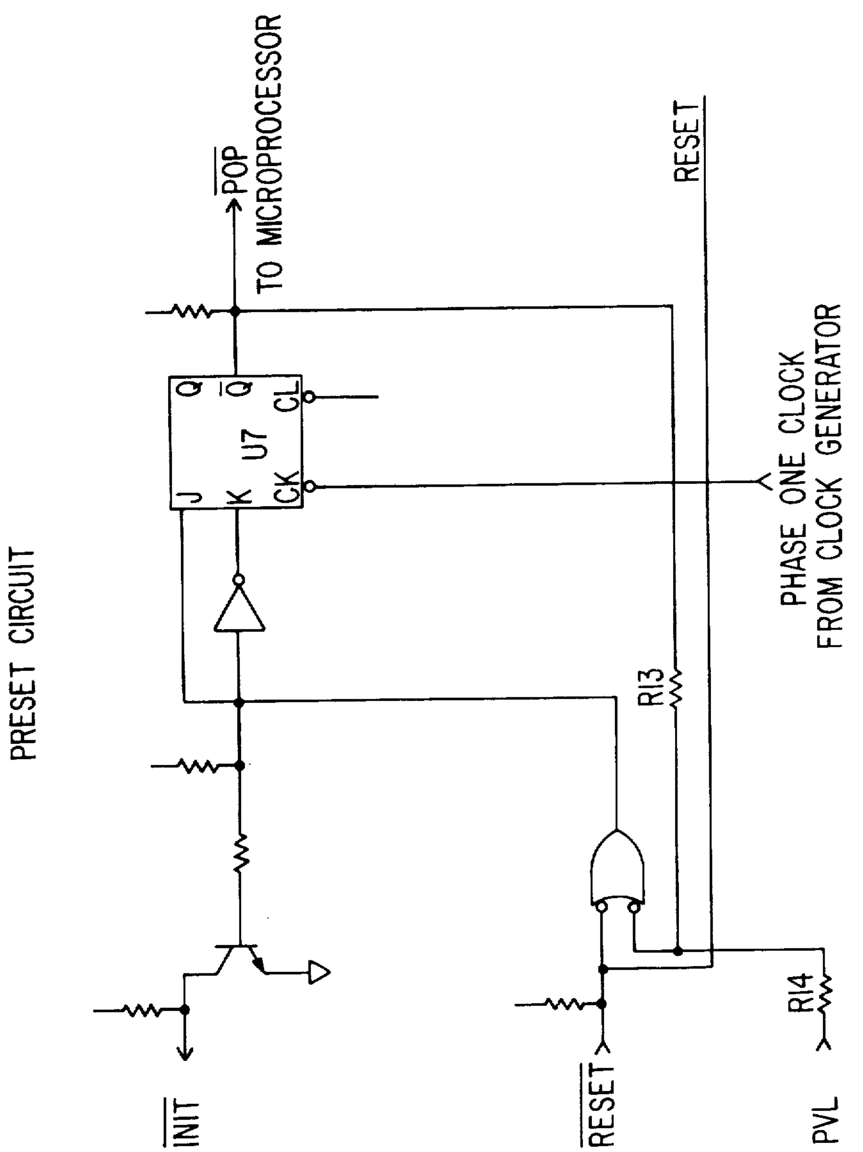
FIG. 18 is a detailed schematic diagram of the preset circuit of FIG. 16.

Operation of the preset circuit 103 of FIG. 16 may be understood with reference to the detailed schematic diagram of FIG. 18. The output of a flip-flop U7 is a power-on pulse POP that is employed to initialize microprocessor 101. Flip-flop U7 synchronizes a power valid line PVL and a reset key line RESET for the microprocessor 101. The PVL line indicates when the power supply voltages are valid. Since the signal on the PVL line transitions slowly, a pair of resistors R13 and R14 are employed to provide sufficient hysteresis to protect against false transitions. Preset circuit 103 also generates an initialization signal INIT that is coupled via the I/O bus of FIG. 16 to the various I/O control circuits 310, 350, and 370 of FIG. 4 to initialize I/O section 300 simultaneously with initialization of microprocessor 101.

MICROPROCESSOR

Figure 15:
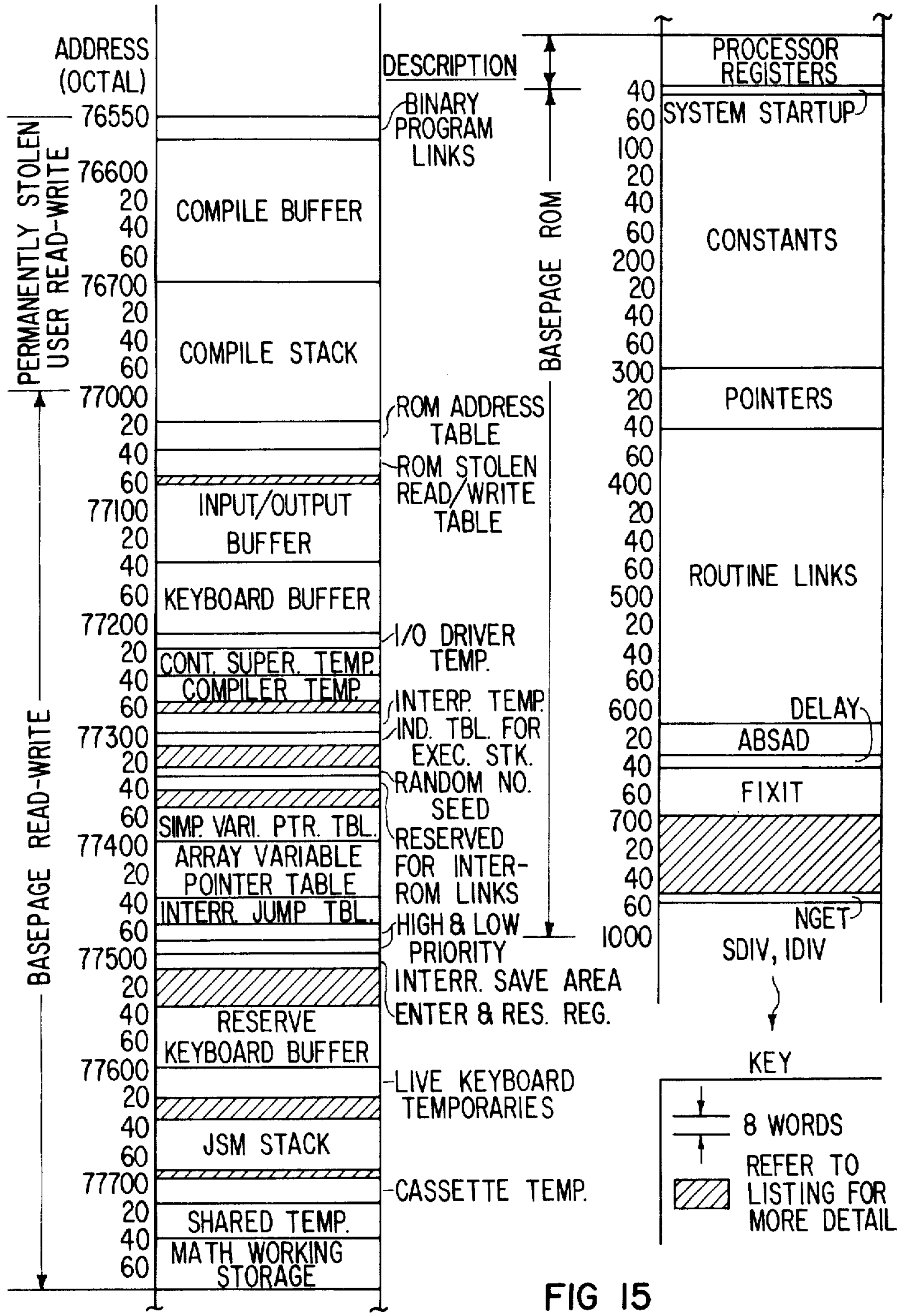
FIG. 15 is a detailed memory map of the base page portions of the language read-only memory of FIG. 7 and the read-write memory of FIG. 8.

Operation of the microprocessor 101 of FIG. 15 may be understood with reference to the detailed block and schematic diagrams of FIGS. 19–129C. Microprocessor 101 is employed to fetch and execute programmed machine language instructions stored in the memory and to provide a means of communication with various peripheral I/O units. Microprocessor 101 is a hybrid assembly whose active components are four 8-bit bidirectional interface buffers (BIB), a binary processor chip (BPC), an input/output controller (IOC), and an extended math chip (EMC), as shown in the detailed block diagram of FIG. 19. The BPC, IOC, and EMC are each NMOS LSI integrated circuits, while each BIB comprises bipolar devices exclusively,.

Figure 20:
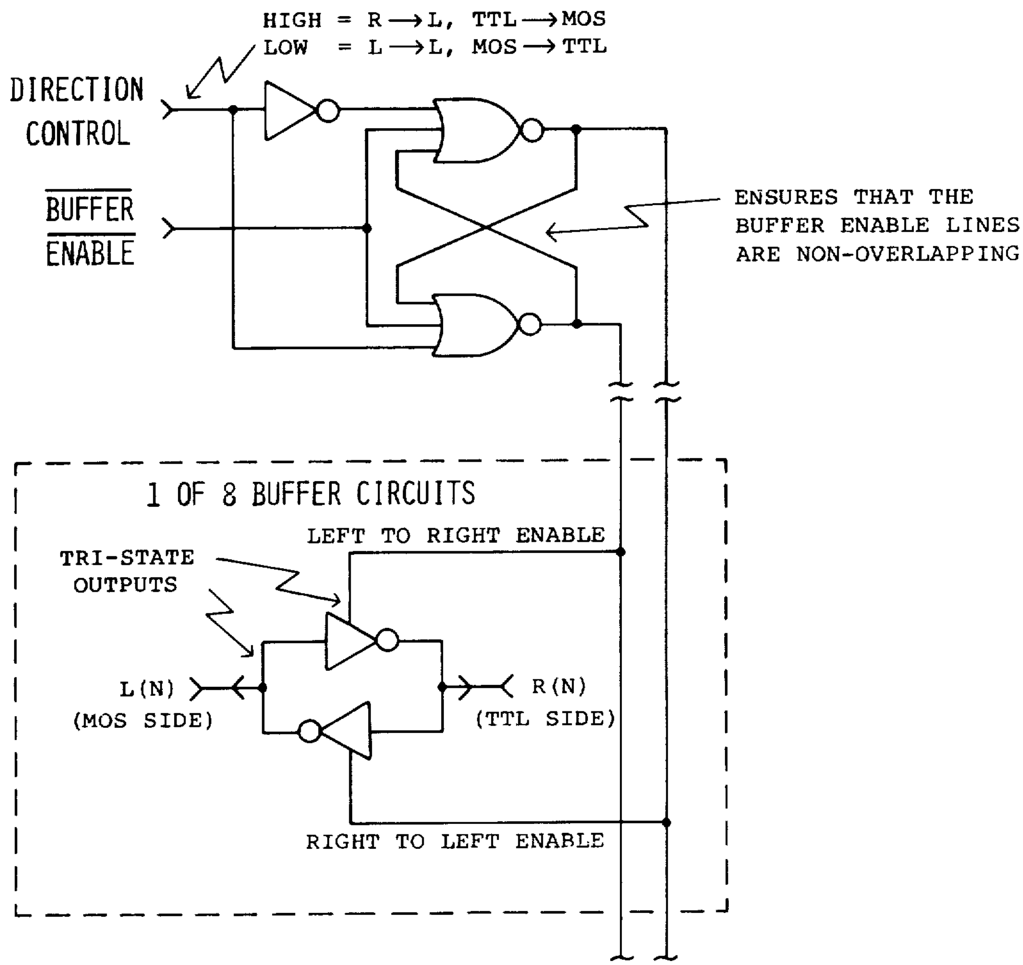
FIG. 20 is a detailed logic diagram of one of the BIBs of FIGS. 16 and 19.

Referring now to FIG. 20, there is shown a detailed diagram of the internal logic of each 8-bit BIB. Each bit is buffered in both directions by tri-state buffers controlled by non-overlapping buffer enable signals. A pair of 8-bit BIBs forms a 16-bit buffer between the three NMOS chips of the microprocessor and the calculator memory. Those BIBs are hereinafter referred to as the memory BIBs. The remaining pair of 8-bit BIBs forms a 16-bit buffer used for communication with peripheral input/output units and are hereinafter referred to as the peripheral BIBs.

The elements of the microprocessor are interconnected by an MOS-level instruction-data bus (IDA). Within the microprocessor 101, the IDA bus comprises sixteen lines labelled $IDA_O$-$IDA_{15}$ that are common to the memory and perpheral BIBs as well as the BPC, IOC, and EMC. Also included are a number of other MOS-level lines, some of which are common to all of the chips within microprocessor 101 and some of which form interconnections with only certain ones of the chips. The IDA bus is employed to transmit encoded information representing either machine language instructions, memory or register addresses, or memory or register data to and from various peripheral input/output units. The remaining lines comprise control lines, clock lines, power supply lines, etc.

The peripheral and memory BIBs selectively connect the MOS-level IDA bus within microprocessor 101 to the TTL-level circuitry outside the microprocessor. In the case of operations involving the microprocessor and portions of the calculator memory outside the microprocessor such as transmission of address, data, and instruction information, the memory BIBs are enabled in the direction determined by a bus control circuit 104. The peripheral BIBs are enabled in the appropriate direction by the IOC whenever a word of information is to be exchanged between a peripheral I/O unit and the microprocessor.

As referred to in the following detailed description of the microprocessor 101, the term "memory" means any addressable memory location of the calculator both within and without the microprocessor itself. The term "external memory" refers to the calculator memory section 200 of FIG. 4. The term "register" refers to the various storage locations within the microprocessor itself. These registers range in size from one bit to sixteen bits. The term "addressable register" refers to a register within one of the microprocessor chips that responds as memory when addressed. Most registers are not addressable. In most discussions that follow the context clarifies whether or not a register has addressability so that it is not deemed necessary to explicity differentiate between addressable registers and registers. Those registers that are addressable are included in the meaning of the term "memory". The term "memory cycle"]refers to a read or write operation involving a memory location.

The first 32 memory addresses do not refer to external memory. Instead, these addresses ($0$–$37_8$) are reserved to designate addressable registers within the microprocessor. Table 1 below lists the addressable registers within the microprocessor.

Table 1

| Register | Location | Octal Address | Description and # of Bits |
|---|---|---|---|
| A | BPC | 0 | Arithmetic Accumulator (16) |
| B | BPC | 1 | Arithmetic Accumulator (16) |
| P | BPC | 2 | Program Location Counter (least 15) |
| R | BPC | 3 | Return Stack Pointer (least 15) |
| R4 | IOC | 4 | Peripheral Activity Designator (-) |
| R5 | IOC | 5 | Peripheral Activity Designator (-) |
| R6 | IOC | 6 | Peripheral Activity Designator (-) |
| R7 | IOC | 7 | Peripheral Activity Designator (-) |
| SE | EMC | 24 | Shift Extend Register (least 4) |
| IV | IOC | 10 | Interrupt Vector (upper 12) |
| PA | IOC | 11 | Peripheral Address Register (least 4) |
| W | IOC | 12 | Working Register (16) |
| DMAPA | IOC | 13 | DMA Peripheral Address Register (least 4) |
| DMAC | IOC | 14 | DMA Count Register (16) |
| DMAMA | IOC | 15 | DMA Memory Address & Direction Register (16) |
| C | IOC | 16 | Stack Pointer (16) |
| D | IOC | 17 | Stack Pointer (16) |
| AR2 | EMC | 20 | BCD Arithmetic Accumulator (4×16) |

Among several service functions performed by the BOC for the IOC and EMC is the generation of a signal on a register access line RAL whenever an address on the IDA bus is within the range reserved for register designation. The signal on line RAL functions to prevent the external memory from responding to any memory cycle having such an address. Functional Description of the BPC The BPC has two main functions. The first is to fetch machine instructions from memory for itself, the IOC, and for the EMC. A fetched instruction may pertain to one or more of those elements. An element that is not associated with a fetched instruction simply ignores that instruction. The second main function of the BPC is to execute the 56 instructions in its repertoire. These instructions include general purpose register and memory reference instructions, branching instructions, bit manipulation instructions, and some binary arithmetic instructions. Most of the BOC's instructions evolve one of the two accumulator registers: A and B.

The four addressable registers within the BPC have the following functions: The A and B registers are used as accumulator registers for the arithmetic operations, and also as source and destination locations for most BPC machine-instructions referencing memory. The R register is an indirect pointer into an area of RWM designated to store return addresses associated with nests of subroutines encountered during program execution. The P register contains the program counter; its value is the address of the memory location from which the next machine-instruction will be fetched.

Upon the completion of each instruction the program counter (P register) has been incremented by one, except for the instructions JMP, JSM, RET, and SKIP instructions whose SKIP condition has been met. For those instructions the value of P will depend on the activity of the particular instruction.

Indirect Addressing

Memory addresses appear on the IDA Bus as 15-bit patterns during the address portion of a memory cycle. The BPC machine-instructions that reference memory are capable of multi-level indirect addressing. The initial indirect indicator is a particular bit in the machine-instruction itself (the most-significant, or left-most, bit: bit 15). The internal operation of the BPC is so arranged that if the memory content of that address also has a one in bit 15, the other bits of the contents are themselves taken as an indirect address. The process of accessing via an indirect address continues until a location is accessed which does not have a one in bit 15. At that time the content of that location is taken as the final address; that is, it is taken to be the address of the desired location and the memory cycle is completed when that location is accessed.

Page Addressing

Machine-instructions fetched from memory are 16-bit instructions. Some of those bits represent the particular type of instruction, and if it is an instruction that requires a memory cycle, other bits represent the address to be referenced. Only ten bits of a memory reference instruction are devoted to indicating that address. Those ten bits represent one of $1024_{10}$ locations on either the base page or the current page of memory. An additional bit in the machine-instruction indicates which. The base page is always a particular, non-changing, range of addresses, exactly $1024_{10}$ in number. A memory reference machine-instruction fetched from any location in memory (i.e., from any value of the program counter) may directly reference (that is, need not use indirect addressing) any location on the base page.

There are two types of current pages. Each type is also $1024_{10}$ consecutive words in length. A memory reference machine-instruction can directly reference only locations that are on the same page as it; that is, locations that are within the page containing the current value of the program counter (P). Thus the value of P determines the particular collection of addresses that are the current page at any given time. This is done in one of two distinct ways, and the particular way is determined by whether the signal called RELA is grounded or not. If RELA is ungrounded, the BPC is said to address memory in the "relative" mode. If RELA is grounded it is said to operate in the "absolute" mode.

Figure 21:
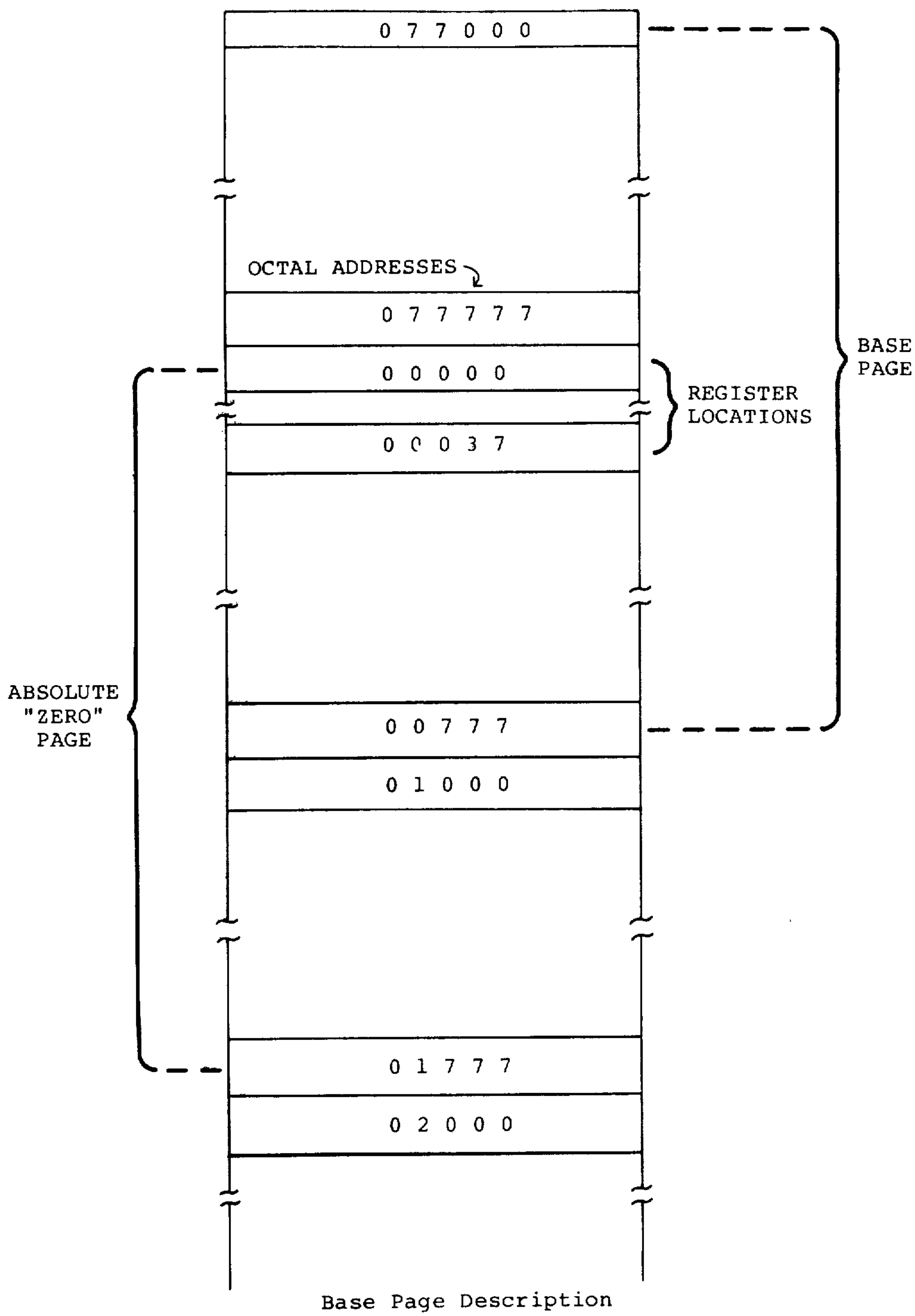
FIG. 21 is a diagram illustrating the memory addressing convention employed by the BPC of FIG. 19.

During its execution each memory reference machine-instruction causes the BPC to form a full 15-bit address based on the ten bits contained within the instruction. How the supplied ten bits are manipulated before becoming part of the address, and how the remaining five bits are supplied, depends upon whether the instruction calls for a base page reference or not, and upon whether the addressing mode is relative or absolute. The differences are determined primarily by the two different definitions of the current page; one for each mode of addressing. Base page addressing is the same in either mode. FIG. 21 depicts the base page.

Absolute Addressing

In the absolute mode of addressing the memory address space is divided into a base page and 32 possible current pages. The base page consists of addresses $77000$- $77777_8$ and $00000_8$ - $00777_8$. The possible current pages are the consecutive $1024_{10}$ word groups beginning with $00000_8$. The possible current pages can be numbered, 0 through $31_{10}$. Thus the "zero page" is addressed $00000_8$ - $17777_8$. Note that the base page is not the same as the zero page; the base page overlaps the zero page and page 31.

Relative Addressing

In relative addressing there are as many possible current pages as there are values of the program counter. In the relative addressing mode a current page is the $512_{10}$ consecutive locations prior (that is, having lower valued addresses) to the current location (value of P), and the $511_{10}$ consecutive locations following the current location.

Base Page Addressing

All memory reference instructions include a 10-bit field that specifies the location referenced by the instruction. What goes in this field is a displacement from some reference location; an actual complete address has too many bits in it to fit in the instruction. This 10-bit field is bit 0 through bit 9. Bit 10 tells whether the referenced location is on the base page, or someplace else. Bit 10 is called the $B/\overline{B}$ bit, as it alone is used to indicate the base page references. Bit 10 will be a zero if it is on the base page, and a one if otherwise. In addition, bit 15 indicates whether the reference is indirect, or not. (A one implies indirect.)

If bit 10 is a zero for a memory reference instruction (base page reference), the 10-bit field is sufficient to indicate completely which of the 1024 locations is to be referenced. There are two ways to described the rule that is the correspondence between bit patterns in the 10-bit field, and the locations that are the base page: (1) the least significant 10 bits of the "real address" (i.e., $77,000_8$ through $777_8$) are put into the 10-bit field, bit for bit. (2) Another way to describe this is as a displacement of $+777_8$ or $-1000_8$ about 0, with bit 9 being the sign.

The 32 register addresses are considered to be a part of the base page. Base page addressing is always done in the manner indicated above, regardless of whether relative or non-relative addressing is employed by the BPC.

Current Page Addressing

Current page addressing refers to memory reference instructions which reference a location which is not on the base page. The same 10-bit field of the machine-instruction is involved, but the $B/\overline{B}$ bit is a one ($\overline{B}$). Now, since there are more than 1024 locations that are not the base page, the 10-bit field by itself, is not enough to completely specify the exact location involved. An "assumption" has to be made about which page of the memory is involved.

The hardware inside the BPC handles 15 bits of address and thus can reference any address in a 32K address space. The "assumption" is that the most significant 5 bits correspond the page, and last 10 bits determine the location within that page.

The assumption for absolute addressing requires that there will be no page changes except by certain ways. This means that once the program counter is set to a particular location the top 5 bits need not be changed for any addressing on that (which ever it is) page. When the assembler assembles a memory reference instruction, it computes the least 10 bits and puts them in the instruction. When the BPC executes the instruction it concatenates its own top 5 bits of P with the address represented by the least 10 bits of the instruction; that produces the complete address for the location referenced by the instruction.

However, the least 10 bits produced by the assembler and placed in the machine-instruction do not correspond exactly to the "real" memory address that is referenced. Bit 9 (the 10th bit) is complmented before it is placed in the address field of the instruction. The other 9 bits are left unchanged. This induces a one-half page offset whose effect is to make current page addressing relative to the middle of the page. FIG. 22 depicts current page absolute addressing. This similarity between current page and base page addressing is deliberate, and results in simplified hardware in the BPC.

Page changes can be accomplished in two ways: incrementing or decrementing the program counter in the BPC, and through indirect addressing. An example of incrementing to a new page is a continuous block of code that spans two adjacent pages. A page change through an increment or decrement can occur in the same general way due to skip instructions.

Indirect addressing allows page changes because the object of an indirect reference is always taken as a full 15-bit address. Indirect addressing is the method used for an instruction on a given page to either reference a memory location on another page (LDA, STA, etc.), or, to jump (JMP or JSM) to a location on another page.

Instructions on any page can make references to any location on the base page without using indirect addressing. This is because the $B/\overline{B}$ bit designates whether the 10-bit field in the instruction refers to the base page or to the current page. If $B/\overline{B}$ is a zero (B), the BPC automatically assumes the upper 5 bits are all zeros, and thus the 10-bit field refers to the base page. If $B/\overline{B}$ is a one ($\overline{B}$), the top 5 bits are taken for what they are, and the current page is referenced (whichever it is).

It is the responsibility of the assembler to control the B/B bit at the time the machine-instruction is assembled. It does this easily enough by determining if the address of the operated (or its "value") of an instruction is in the range of $77{,}000_8$ or, 0 through $777_8$. If it is, then it's a base page reference and B/B is made a zero for that instruction.

Relative addressing does not require the concept of a fixed page, as in absolute addressing. The word "page" can still be used, but requires a new definition:

In relative addressing, a page is $1024_{10}$ consecutive locations, having $512_{10}$ locations prior to the current location, and $511_{10}$ locations following the current location.

As before, direct addressing is possible anywhere within the page. But off-page references (other than to the base page) require indirect addressing, which, once started, works as before — it is not relative, but produces a full 15-bit absolute address.

Figure 23:
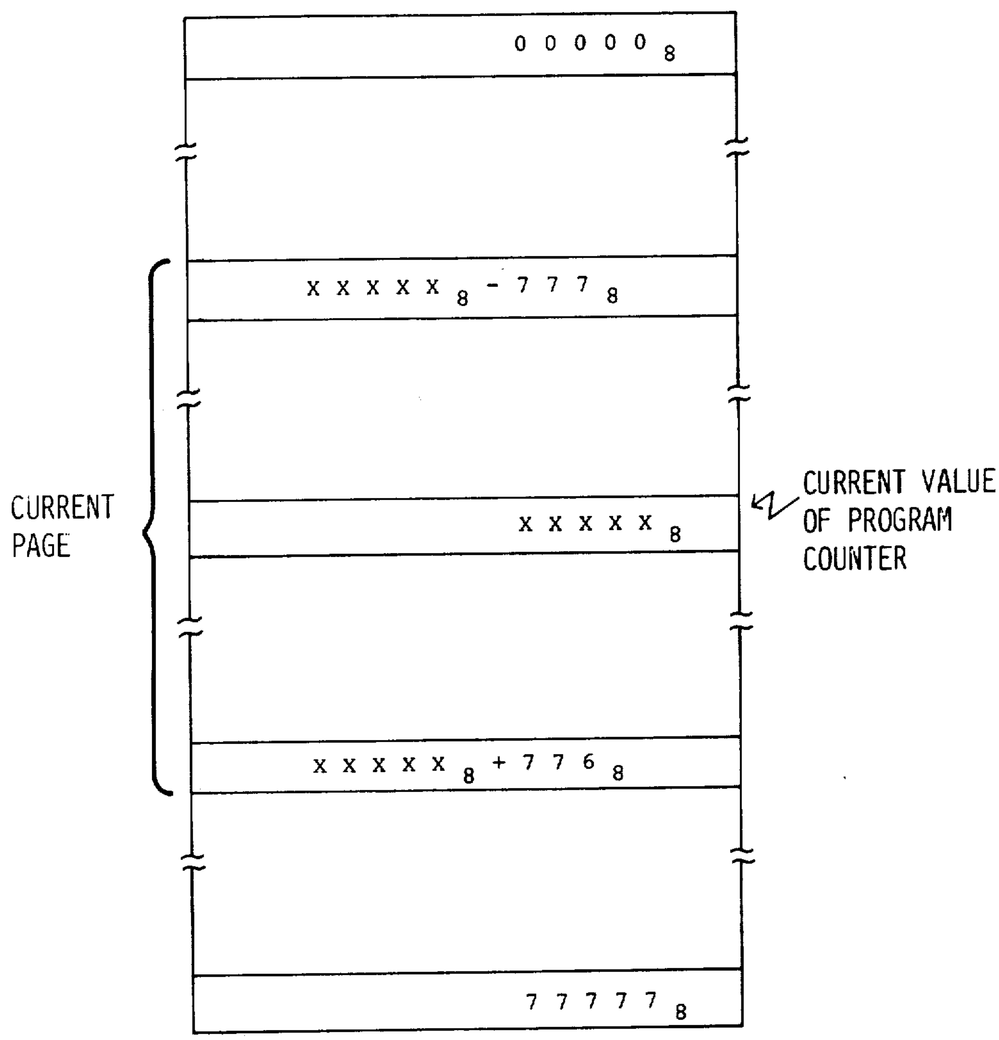
FIG. 23 is a diagram illustrating relative addressing employed by the BPC of FIG. 19.

FIG. 23 illustrates relative addressing. Relative current page addressing is done in such the same was as base page addressing. The 10-bit field in the memory reference instructions is encoded with a displacement relative to the current location.

Bit 9 (the 10th, and most significant bit of the 10) is a sign bit. If it is a zero, then the displacement is positive, and bits 0 – 8 are taken at face value. If bit 9 is a one, the displacement is negative. Bits 0 – 8 have been commplemented and then incremented (two's complement) before being placed in the field. To get the absolute value of the displacement, simply complement them again, and increment, ignoring bit 9.

BPC Machine Instructions

The Assembly language representation of the BPC machine instructions are three-letter mnemonics. Each machine instruction source statement corresponds to a machine operation in the object program produced by an assembler.

The symbolic notation used in representing the BPC machine instructions is explained in Table 2 below.

Table 2

| | |
|---|---|
| m | Memory location. |
| n | Numerical quantity. A numeric value that is not an address, but represents a shift or skip amount. |
| I | Indirect addressing indicator. |
| S,C,P | Instruction modifiers. These indicators have various meanings, depending upon the instruction. Each will be explained as it is encountered. |
| ,S/,C | The slash indicates that either item (but not both) may be used at this place in the source statement. |
| [ ] | Brackets indicate that the item contained within them is optional |

Memory Reference Group of Instructions

The 14 memory reference instructions listed below refer to specified address in memory determined by the 10-bit address field (*m*), by the B/B bit, and by the Direct/Indirect bit (1).

LDA *m* [, I ]

Load A from *m*. The A register is loaded with the contents of the addressed memory location.

LDB *m* [, I ]

Load B from *m*. The B register is loaded with the contents of the addressed memory location.

CPA *m* [, *I*]

Compare the contents of *m* with the contents of A; skip if unequal. The two 16-bit words are compared bit by bit. If they differ the next instruction is skipped, otherwise it is executed next.

CPB *m* [, I ]

Compare the contents of *m* with the contents of B; skip if unequal. The two 16-bit words are compared bit by bit. If they differ the next instruction is skipped, otherwise it is executed next.

ADA *m* [, I]

Add the contents of *m* to A. The contents of the addressed memory location are added to that of A. The binary sum remains in A, while the contents of *m* remain unchanged. If a carry occurs from bit 15 the E register is loaded with one, otherwise, E is left unchanged. If an overflow occurs the O register is loaded with one, otherwise the O register is left unchanged. The overflow condition occurs if there is a carry from either bits 14 or 15, but not both together. The E and O registers are one-bit registers within the BPC. They represent the extend (carry out from bit 15) and overflow conditions for binary arithmetic performed by the BPC.

ADB *m* [, I]

Add the contents of *m* to B. Otherwise identical to ADA.

STA *m* [, I]

Store the contents of A in *m*. The contents of the A register are stored into the addressed memory location, whose previous contents are lost.

STB *m* [, I]

Store the contents of B in *m*. The contents of the B register are stored into the addressed memory location, whose previous contents are lost.

JSM *m* [, I]

Jump to subroutine. JSM permits jumping to subroutines in either ROM or R/W memory. The contents of the return stack register (R) are incremented by one and the contents of P stored in R.I. Program execution resumes at *m*.

JMP *m* [, I]

Jump to *m*. Program execution continues at location *m*.

ISZ *m* [, I]

Increment *m*; skip if zero. ISZ adds one to the contents of the referenced location, and writes the sum into that location. If the sum is zero, the next instruction is skipped.

DSZ *m* [, I]

Decrement *m;* skip if zero. DSZ subtracts one from the contents of the referenced location, and writes the difference into that location. If the difference is zero, the next instruction is skipped.

AND *m* [, I]

Logical and of A and *m*. The contents of A and *m* are anded, bit by bit, and the result is left in A.

IOR *m* [, I]

Inclusive or of A and *m*. The contents of A and *m* are inclusive or'ed, bit by bit, and the result is left in A.

Shift-Rotate Group of Instructions

Each shift-rotate instruction listed below includes a four-bit field in which the shift or rotate amount is encoded. The number to be encoded in the field is represented by *n*, and may range from 1 to 16, inclusive. The four-bit field (bits 0 through 3) will contain the binary code for $n-1$.

AAR *n*

Arithmetic right shift of A. The A register is shifted right *n* places with the sign bit (bit 15) filling all vacated bit positions; the $n-1$ most significant bits become equal to the sign bit.

SAR *n*

Shift A right. The A register is shifted right *n* places with all vacated bit positions cleared; the *n* most significant bits become zeros.

SBR *n*

Shift B right. The B register is shifted right *n* places with all vacated bit positions cleared; the *n* most significant bits become zeros.

SAL *n*

Shift A left. The A register is shifted left *n* places; the *n* least significant cant bits become zeros.

SBL *n*

Shift B left. The B register is shifted left *n* places; the least significant bits become zeros.

RAR *n*

Rotate A right. The A register is rotated right *n* places, with bit 0 rotating into bit 15.

RBR *n*

Rotate B right. The B register is rotated right *n* places, with bit 0 rotating into bit 15.

Alter-Skip Group of Instructions

The alter-skip instructions each contain a six bit field which allows a relative branch to any of 64 locations. The distance of the branch is represented by a displacement, *n;* *n* may be within the range of $-32_{10}$ to $31_{10}$ inclusive.

Bits 0 through 5 are coded with the value of *n* as follows: if the value is positive or zero, bit 5 is zero, and bits 0 through 4 receive the straight binary code for the value of *n;* if the value is negative, bit 5 is a one, and bits 0 through 4 receive a complemented and incremented binary code. Table 3 below illustrates this convention.

Table 3

| For n= | bits 5-0 | meaning: (*denotes current value of P) |
|---|---|---|
| −32 | 100000 | if skip, next instruction is *−32 |
| − 7 | 111001 | if skip, next instruction is *−7 |
| − 1 | 111111 | if skip, next instruction is *−1 |
| 0 | 000000 | if skip, repeat this instruction |
| 1 | 000001 | do next instruction, regardless |
| 7 | 000111 | if skip, next instruction is *+15 |
| 31 | 011111 | if skip, next instruction is *+31 |

All instructions in the alter-skip group have the "skip" properties outlined above. Some of the instructions also have an optional "alter" property. This is where the general instruction form "skip if ... <some one bit condition>" is supplemented with the ability to alter the state of the bit mentioned in the condition. The alteration is to either set the bit, or clear it. If specified, the alteration is done after the condition is tested, never before.

To indicate in a source statement that an instruction includes the alter option, and to specify whether to clear or to set the tested bit, a C or S follows *n*. The C indicates clearing the bit, while an S indicates setting the bit.

The "alter" information is encoded into the 16-bit instruction word with 2 bits. Bit 7 is called the H/H (Hold/Don't Hold) bit, and bit 6 is the C/S (Clear/Set) bit, for such instructions. If bit 7 is a zero (specifying H) the "alter" option is not active; neither S nor C followed *n* in the source statement of the instruction, and the tested bit is left unchanged. If bit 7 is a one (specifying H), then "alter" option is active, and bit 6 specifies whether it is S or C. The alter-skip instructions are listed below.

SZA *n*

Skip if A is zero. If all 16 bits of the A register are zero, skip the amount indicated by *n*.

SZB *n*

Skip if B is zero. If all 16 bits of the B register are zero, skip the amount indicated by *n*.

RZA *n*

Skip if A is not zero. If any of the 16 bits of the A register are set, skip the amount indicated by *n*.

RZB *n*

Skip if B is not zero. If any of the 16 bits of the B register are set, skip the amount indicated by *n*.

SIA *n*

Skip if A is zero, and then increment A. The A register is tested, and then incremented by one. If all 16 bits of A were zero before the increment, skip the amount indicated by *n*.

SIB *n*

Skip if B is zero, and then increment B. The B register is tested, and then incremented by one. If all 16 bits of B were zero before the increment, skip the amount indicated by *n*.

RIA *n*

Skip if A is not zero, and then increment A. The A register is tested, and then incremented by one. If any bits of A were one before the increment, skip the amount indicated by *n*.

In connection with the next four instructions, Flag and Status are controlled by the peripheral interface addressed by the current select code. The select code is the number that is stored in the register named PA, located in the IOC. Both Status and Flag originate as negative true signals, so that when a missing interface is addressed Status and Flag will appear to be false, or not set.

SFS *n*

Skip if Flag line is set. If the Flag line is true, skip the amount indicated by *n*.

SFC *n*

Skip if Flag line is clear. If the flag line is false, skip the amount indicated by *n*.

SSS *n*

Skip if Status line set. If the status line is true, skip the amount indicated by *n*.

SSC *n*

Skip if Status line is clear. If the status line is false, skip the amount indicated by *n*.

SDS *n*

Skip if decimal carry set. Decimal carry (DC) is a one bit register in the EMC. It is controlled by the EMC, but connected to the decimal carry input of the BPC. If DC is set, skip the amount indicated by *n*.

SDC *n*

Skip if decimal carry clear. Decimal carry (DC) is a one bit register in the EMC. It is controlled by the EMC, but connected to the decimal carry input of the BPC. If DC is clear, skip the amount indicated by *n*.

SHS *n*

Skip if halt line set. If the halt line is rue, skip the amount indicated by *n*.

SHC *n*

Skip if halt line clear. If the halt line is false, skip the amount indicated by *n*.

SLA *n* [, S/,C ]

Skip if the least significant bit of A is zero. If the least significant bit (bit 0) of the A egister is a zero, skip the amount indicated by *n*. If either S or C is present, bit 0 of A is altered accordingly after the test.

SLB *n* [,S/,C]

Skip if the least significant bit of B is zero. If the least significant bit (bit 0) of the B register is a zero, skip the amount indicated by *n*. If either S or C is present, bit 0 of B is altered accordingly after the test.

RLA *n* [,S/,C]

Skip if the least significant bit of A is non-zero. If the least signifcant bit (bit 0) of the A register is a one, skip the amount indicated by *n*. If either S or C is present, bit 0 of A is altered accordingly after the test.

RLB *n* [,S/,C]

Skip if the least significant bit of B is non-zero. If the least significant bit (bit 0) of the A register is a one, skip the amount indicated by *n*. If either S or C is present, bit 0 of B is altered accordingly after the test.

SAP *n* [,S/,C]

Skip if A is positive. If the sign bit (bit 15) of the A register is a zero, skip the amount indicated by *n*. If either S or C is present, bit 15 of A is altered accordingly after the test.

SBP *n* [,S/,C]

Skip if B is positive. If the sign bit (bit 15) of the A register is a zero, skip the amount indicated by *n*. If either S or C is present, bit 15 of B is altered accordingly after the test.

SAM *n* [,S/,C]

Skip if A is minus. If the sign bit (bit 15) of the A register is a one, skip the amount indicated by *n*. If either S or C is present, bit 15 of A is altered accordingly after the test.

SBM *n* [,S/,C]

Skip if B is minus. If the sign bit (bit 15) of the B register is a one, skip the amount indicated by *n*. If either S or C is present, bit 15 of B is altered accordingly after the test.

SOS *n* [,S/,C]

Skip if Overflow is set. If the one-bit Overflow register (O) is set, skip the amount indicated by *n*. If either S or C is present, the O register is altered accordingly after the test.

SOC *n* [,S/,C]

Skip if Overflow is clear. If the one-bit register is clear, skip the amount indicated by *n*. If either S or C is present, the O register is altered accordingly after the test.

SES *n* [,S/,C]

Skip if Extend is set. If the Extend register (E) is set, skip the amount indicated by *n*. If either S or C is present, E is altered accordingly after the test.

SEC *n* [,S/,C]

Skip if Extend is clear. If the Extend register (E) is clear, skip the amount indicated by *n*. If either S or C is present, E is altered accordingly after the test.

Return Group of Instructions

Listed below is the return instruction for the BPC.

RET *n* [,P]

Return. The R register is a pointer into a stack of words containing the addresses of previous subroutine calls. A read R,I occurs. That produces the address (value of P) for the latest JSM that occurred. The BPC then jumps to address P+*n*. The value of *n* may range from −32 to 31, inclusive. The value of *n* is encoded into bits 0 through 5 of the instructions as a 6 bit, two's complement, binary number. The ordinary, non-interrupt-service routine return, is RET 1. If a P is present, it "pops" the interrupt system. Two things in the 10C occur when this happens: first, the peripheral address stack in the 10C is popped, and second, the interrupt grant network of the 10C is "decremented".

The peripheral address stack is a hardward stack in the 10C, 4 bits wide, and three levels deep. On the top of this stack is the current select code for I/O operations. Select codes are stacked as interrupts occur during I/O operations. A RET *n*, P at the end of an interrupt service routine puts the select code of the interrupted device back on the top of the stack.

The interrupt grant network in the 10C keeps track of which interrupt priority level is currently in use. From this it determines whether or not to grant an interrupt requiest. A RET *n*, P at the end of an interrupt service routine causes the interrupt grant network to change the current interrupt priority level to the next lower level (unless it is already at the lowest level).

Complement Group of Instructions

Listed below are the complement group machine-instructions of the BPC.

CMA

Complement A. The A register is replaced by its one's (bit by bit) complement.

CMB

Complement B. The B register is replaced by its one's (bit by bit) complement.

TCA

Two's complement A. The A register is replaced by its one's (bit by bit) complement, and then incremented by one.

TCB

Two's complement B. The B register is replaced by its one's (bit by bit) complement, and then incremented by one.

Execute Group of Instructions

Listed below is the execute machine-instruction for the BPC.

EXE $0 \leqq m \leqq 37_8$ [,I]

Execute register *m*. The contents of any addressable register can be treated as the current instruction, and executed in the normal manner. The register is left unchanged unless the fetched machine-instruction causes it to be altered. The next instruction executed will be the one following the EXE *m*, unless the instruction in *m* causes a branch.

Multi-level indirect addressing is allowed. An EXE *m*,I causes the contents of *m* to be taken as the address of the place in memory whose contents are to be executed; this can be anywhere in memory, and need not be another register. But regardless, only 15 bits are required to specify this location. If the 16th bit of *m* is set, the lower 15 bits are taken as the address of the address, instead of the address of the instruction. This continues until an address is encountered whose 16th bit is zero. Then that address is taken as the final address of the instruction. Using that address one more fetch is done, and the bit pattern found executed as an instruction, even if it has a one in the 16th bit. FIGS. 24A–G depict the bit patterns of the BPC machine-instructions.

Internal Description of the BPC

The details of the BPC may be understood with reference to the block diagram of FIGS. 25A–C. The majority of activity within the BPC is controlled by a ROM. This is a programmed logic array whose input qualifiers are a 4-bit state-count, group, miscellaneous, and input-output qualifiers. From the ROM are decoded micro-instructions. Each machine-instruction that the BPC executes, and the BPC's response to memory cycles directed at its addressable registers, is a complex series of micro-instructions. This activity is represented by the flow charts depicted in FIGS. 91A through 105.

Changes in the state-count correspond to the step-by-step sequence of activity shown in the flow charts. The State-Counter has a natural sequence that was chosen by computer simulation to reduce the complexity of the necessary number of non-sequential transitions. When a section of the flow chart requires a non-sequential transition it decodes a special microinstruction whose purpose is to override the natural sequence and produce the desired alteration in the state-count.

The Group Qualifiers are generated by Instruction Decode. The Group Qualifiers represent the instruction that has been fetched and that must now be executed.

The Input-Output Qualifiers are controlled by the M-Section. Those qualifiers are used in decoding micro-instructions, and in flow chart branching, that are dependent upon or have to do with input and output to the BPC.

The $\overline{\text{IDB}}$ Bus is the internal BPC representation of the IDA Bus. To conserve power, this bus is used dynamically; it is precharged on phase two, and is available for data transmission only during phase one. Data on the $\overline{\text{IDB}}$ Bus is transmitted in negative true form; a logical one is encoded on a given line of the bus by grounding that line.

The main means of inter-register communication with the BPC is via the $\overline{\text{IDB}}$ Bus and the various set and dump micro-instructions. For instance, a SET I loads the I Register with the contents of the $\overline{\text{IDB}}$ Bus. A DMP IDA places the contents of the IDA Bus onto the $\overline{\text{IDB}}$ Bus. A simultaneous DMP IDA and SET I loads the I Register with the word encoded on the IDA Bus. As a further instance, that very activity is part of what is decoded from the ROM at the conclusion of a memory cycle that is an instruction fetch. FIGS. 115A–C and 116 illustrate the waveforms associated with the start-up sequence and an instruction fetch.

Once the instruction is in the I Register, the bit pattern of the instruction is felt by Instruction Decode. Aside from the afore-mentioned Group Qualifiers, Instruction Decode generates two other groups of signals. One of these are control lines that go to the Flag Multiplexer to determine which, if any, of the external flag lines is involved in the execution of the current machine-instruction. The remaining group of signals are called the Asynchronous Control Lines. These are signals that, unlike micro-instructions, are steady-state signals present the entire time that the machine-instruction is in the I Register. The Asynchronous Control Lines are used to determine the various modes in which much of the remaining hardware will operate during the execution of the machine-instruction. For example, the S Register is capable of several types of shifting operations, and the micro-instruction that causes S to shift (SSE) means only that S should now shift one time. The exact nature of the particular type of shift to be done corresponds to the type of shift machine-instruction in the I Register. This in turn affects Instruction Decode and the Asynchronous Control Lines, which in turn affect the circuitry called S Register Shift Control. It is that circuitry that determines the particular type of shift operation that S will perform when an SSE is given.

In a similar way the Asynchronous Control Line affect the nature of the operation of the Arithmetic-Logic Unit (ALU), the Skip Matrix, and the A and B registers.

The least four bits of the I Register are a binary decrementer and CTQ Qualifier network. This circuitry is used in conjunction with machine-instructions that involve shift operations. Such machine-instructions have the number of shifts to be performed encoded in their least four bits. When such an instruction is in the I Register, the least four bits are decremented once for each shift that is performed. The CTQ Qualifier indicates when the last shift has been performed.

The A and B Registers are primarily involved in machine-instructions that; read to, or write from, memory; do binary arithmetic; shift; or, branch. Machine-instructions that simply read from, or, write to, memory, are relatively easily executed, as the main activity consists of dumping or setting the A or B Register. The arithmetic instructions involve the ALU.

The ALU has three inputs. One is the $\overline{\text{ZAB}}$ Bus. This bus can transmit either zero, the A Register, or the B Register. The choice is determined by the Asynchronous Control Lines. The input from the $\overline{\text{ZAB}}$ Bus can be understood in its true, or in its complemented form. The second input to the ALU is the S Register. The remaining input is a carry-in signal.

The ALU can perform three basic operations: logical and, logical inclusive or, and binary addition. The choice is determined by the Asynchronous Control Lines.

Whatever operation is performed is done between the complemented or uncomplemented contents of the $\overline{\text{ZAB}}$ Bus, and the contents of the S Register. The output of the ALU is available through the DMP ALU micro-instruction, as well as through lines representing the carry-out from the 14th and 15th bits of the result. These carry-outs are used to determine whether or not to set the one-bit Extend and Overflow Registers.

The R Register is the return stack pointer for the RET machine-instruction.

The P Register is the program counter. Associated with it are several other pieces of circuitry used for incrementing the program counter, as well as for forming complete 15-bit addreses for memory cycles needed in the execution of memory reference or skip machine-instructions. These other pieces of circuitry are the T Register, the P-Adder Input, P-Adder Control, and the P-Adder.

The P-Adder mechanism can operate in one of three modes. These modes are established by micro-instructions, not by the Asynchronous Control Lines. In the memory reference machine-instruction mode (established for the duration of the ADM micro-instruction) the T Register will contain a duplicate copy of the memory reference machine-instruction being executed. Thus the 10-bit address field of the machine-instruction and the base page bit (bit 10) as well as top 5 bits of all the program counter, are available to the adder mechanism. In accordance with the rules for either relative or absolute addressing (as determined by RELA) the P-Adder Input and P-Adder operate to produce the correct full 15-bit address needed for the associated memory cycle.

The ADS micro-instruction establishes a mode where only the least five bits of a skip machine-instruction are combined with the program counter to produce a new value for the program counter.

In the absence of either an ADM or ADS micro-instruction the P-Adder mechanism defaults to an increment-P mode. In this mode the value of P+1 is continuously being formed. This is the typical way in which the value of the program counter is changed at the end of non-branching machine-instructions.

The output of the P-Adder mechanism is available to the $\overline{IDB}$ Bus through the DMP PAD micro-instruction.

The D Register is used to drive the IDA Bus through the SET IDA micro-instruction. Because of limitations on transitor device sizes and the large capacitances possible on the IDA Bus, two consecutive SET IDA's are required to ensure that the IDA Bus properly represents the desired data.

The PBC has special circuitry to detect a machine-instruction that requires an indirect memory cycle. This circuitry generates a qualifier used in the ROM. The flow-charting that corresponds to a machine-instruction that can do indirect addressing has special activity to handle the occurrence of an indirect reference.

In the event of an interrupt request generated by the IOC, the BPC aborts the execution of the machine-instruction just fetched, and without incrementing the program counter, executes the following machine-instruction instead: JMP $10_8$,I. Register $10_8$ is the Interrupt Vector Register (IV) in the 10C. This is part of the means by which vectored interrupt is implemented. FIGS. 117A–B illustrate interrupt operation.

In the event that an addressable register within the BPC is the object of a memory cycle, whether the memory cycle is originated by the BPC itself, or by an agency external to the BPC, a BPC Register Detection and Address Latch circuit detects that fact (by the value of the address) and latches the address, and also latches whether the operation is a read or a write. The result of this action is two-fold: First, it supplies qualifier information to the ROM so that micro-instructions necessary to the completion of the memory cycle may be issued. Secondly, it initiates action within the M-Section that aids in the handling of the various memory cycle control signals.

FIGS. 106–114 are waveforms that illustrate the various memory cycles that can occur.

The BPC can interrupt the execution of a machine-instruction to allow some other agency to use the IDA Bus. The BPC will do this whenever Bus Request ($\overline{BR}$) is active, and the BPC is not in the middle of a memory cycle. When these conditions are met, the BPC issues a signal called Bus Grant (BG) to inform the requesting agency that the IDA Bus is available, and the BPC also generates an internal signal called Stop (STP) that halts the operation of the decrementer in the I Register, and halts the change of the ROM statecounter. In addition, STP inhibits the decoding from the ROM of all but those micro-instructions needed to respond to memory cycles under the control of the M-Section. STP and BG are given until the requesting agency signals that its use of the IDA Bus is over by releasing $\overline{BR}$. This capability is the basis of Direct Memory Access, as implemented by the IOC. FIGS. 118 and 119A–B illustrate the operation of Bus Request and Bus Grant. Communication Between the BPC and IOC.

Each major element in the microprocessor is connected to the IDA Bus and some related control lines. The IDA Bus allows elements of the system to both "send" and "receive" 16-bit words.

The term "chip" refers to any of the BPC, IOC, or EMC.

Consider this question: "Since there are some separate instructions for the IOC, and since the BPC is sort of the 'head processor' that does the fetching of instructions from memory, how is it that the IOC receives its instructions that the BPC Is not disturbed by fetching such an instruction?"

The answer is: All chips in the microprocessor are exposed to instructions via the IDA Bus as they are fetched. A chip will either execute an instruction, or idle until the next instruction fetch. An instruction can cause activity in more than one chip.

There is a signal called Sync, which is issued by common consent of all the chips in the microprocessor, and whose significance is that the next memory cycle is an instruction fetch. During that fetch, the instruction word appears on the IDA Bus. Each chip in the microprocessor looks at the word and puts it through an instruction decode process to determine if that chip needs to initiate some activity. If a chip recognizes a machine-instruction, it pulls Sync to ground and begins the activity.

More than one chip can recognize the same instruction, and this does happen (the RET *n*,P machine-instruction affects both the BPC and the IOC). While each chip is busy, it keeps Sync grounded, releasing it when its activity is completed. When all activity is complete, (i.e., Sync is allowed to go high by all chips), the BPC initiates the next instruction fetch. The other chips in the microprocessor can recognize this memory access as an instruction fetch because Sync has gone high.

If a chip is not affected by an instruction, it idles until either another Sync/instruction fetch, or, until some other mechanism causes the chip to respond. For instance, the IOC can be the object of a memory cycle required by the BPC's execution of a memory reference instruction (which the IOC had decoded as "not me").

Each element in the system decodes the addresses for which it contains addressable registers. To initiate a register memory cycle, an element of the microprocessor puts the address of the desired location on the IDA Bus, sets the Read/Write line high or low, and gives Start Memory. Then, elsewhere in the microprocessor the address is decoded and recognized, and an element of the microprocessor begins to function as memory. It is part of the system definition that whatever is on the IDA Bus when a Start Memory is given is an address of a memory (or register) location.

Here is a complete description of the entire process: An originator orginates a memory cycle by putting the address on the IDA Bus, setting the the Read/Write line, and giving a Start Memory. The respondent identifies itself as containing the object location of the memory cycle, and handles the data. If the originator is a sender (write) it puts and holds the data on the IDA Bus until the respondent acknowledges receipt by sending Memory Complete. If the originator is a receiver (read) the respondent obtains and puts the data onto the IDA Bus and then sends Memory Complete. The originator then has one clock time to capture the data; no additional acknowledgement is involved.

Description of the IOC

The IOC includes a register called the Peripheral Address Register (PA) which is used in establishing the select code currently in use. The bottom four bits of this register are brought out of the IOC as PA0 through PA3. Each Peripheral Interface decodes PA0–PA3 and thus determines if it is the addressed interface.

The peripheral address is established by storing the desired select code into PA with an ordinary memory reference instruction.

Flag, Status and Control

The peripheral interface is the source of the Flag and Status bits for the BPC instructions SFS, SFC, SSS, and SSC. Since there can be many interfaces, but only one each of Flag and Status, only the interface addresssed by the select code is allowed to ground these lines. Their logic is negative-true, and a result of this is that if the addressed peripheral is not present on the I/O Bus, Status and Flag are logically false.

$\overline{IC1}$ and $\overline{IC2}$ are two control lines that are sent to each peripheral interface by the IOC. The state of these two lines during the transfer of information can be decoded to mean something by the interface. Just what 'something' will be is subject to agreement between the firmware designer and the interface designer — it can be any thing they want, and might not be the same for different interfaces. These two lines act as a four position mode switch on the interface, controlled by the IOC during an I/O operation. I/O Bus Cycles.

An I/O Bus cycle is an exchange of a word between the IDA Bus and the IOD Bus. The information transfer between the processor and an interface is not of the handshake variety.

Timing diagrams for read and write I/O Bus cycles are shown in FIGS. 121 and 122. These cycles are initiated by standard (programmed) I/O instructions, interrupt, and by DMA.

For example, during a standard I/O instruction, an I/O Bus cycle is initiated by a reference to one of R4 through R7 in the IOC. One way that can be done is with a BPC memory reference instructions; for instance, STA R4 (for a write cycle), or LDA R4 (for a read cycle).

Consider a write I/O Bus cycle as illustrated in FIG. 121. This is initiated with a reference to one of R4–R7. The IOC sees this as an address between 4 and 7 on the IDA Bus while $\overline{STM}$ is low. The Read line is low to denote a write operation. The IOC enables the peripheral BIB's and specifies the direction. It also sets the control lines $\overline{IC1}$ and $\overline{IC2}$, according to which register was referenced. Meanwhile, the BPC has put the word that is to be written onto the IDA Bus. That word is felt at all peripheral interfaces. The interface that is addressed uses $\overline{DOUT}$ to understand it's to read something, and uses $\overline{IOSB}$ as a strobe for doing it. After $\overline{IOSB}$ is given, the IOC gives [Synchronized] Memory Complete ($\overline{SMC}$) and the process terminates. The BPC has written a word to the interface whose select code matched the number in the PA register.

A read I/O Bus cycle is similar, as shown in FIG. 122. Here the BPC expects to receive a word from the addressed peripheral interface. Read, $\overline{DOUT}$ and $\overline{BE}$ are different because the data is now moving in the other direction.

In either case, the critical control signals $\overline{SMC}$ and $\overline{IOSB}$ are given by the IOC, and their timing is fixed. There can be no delays due to something's not being ready, nor is there any handshake between the interface and the IOC.

It is the responsibility of the firmware not to initiate an I/O Bus cycle involving a device that is not ready. To do so will result in lost data, and there will be no warning that this has happened.

Place and Withdraw

The IOC includes some firmware-stack manipulation instructions. Two registers are provided as stack pointers: C and D. There are eight place and withdraw instructions for putting things into stacks and getting them out. Furthermore, the place and withdraw instructions can handle full 16-bit words, or pack 8-bit bytes in words of a stack. And last, there are provisions for automatic incrementing and decrementing of the stack pointer registers, C and D.

The mnemonics for the place and withdraw instructions are easy to decipher. All place instructions begin with P, and all withdraw instructions begin with W. The next character is a W or B, for word or byte, respectively. The next character is either a C or D, depending upon which stack pointer is to be used. There are eight combinations, and each is a legitimate instruction.

A PWD A,1 reads as follows: place the entire word of A into the stack pointed at by D, and increment the pointer before the operation. The instruction WWC B,D is read: Withdraw an entire word from the stack pointed at by C, put the word into B, and decrement the stack pointer D after the operation.

The place and withdraw instruction outwardly resembles the memory reference instructions of the BPC: a mnemonic followed by an operand that is understood as an address, followed by an optional 'behavior modifier'. The range of values that the operand may have is restricted, however. The value of the operand must be between 0 and 7, inclusive. Thus, the place and withdraw instructions can place from, or, withdraw into, the first eight registers. These are A, B, P, R, and R4 through R7. Therefore, the place and withdraw instructions can initiate I/O Bus cycles; they can do I/O.

The place and withdraw instructions automatically change the value of the stack pointer each time the stack is accessed. In the source text an increment or decrement is specified by including *a* ,I or *a* ,D respectively, after the operand.

Regardless of which of increments or decrement is specified, a place instruction will do the increment or decrement of the pointer prior to the actual place operation. Contrariwise, the withdraw instructions do the increment or decrement after actual withdraw operation. The reason for this is that it always leaves the stack with the pointer pointing at the new 'top-of-the-stack'.

Place and Withdraw for Bytes

The following explains how the place and withdraw instructions are used for placing and withdrawing bytes as opposed to complete words. First, the stack is always a stack composed of words. However, for byte operations bit 15 of the pointer register assumes added significance; it selects the left-half or right-half of the word on top of the stack. If bit 15 of the pointer register is a one, the left-half is selected. Also, only the right-half of the registers A, B, P, R, and R4–R7 are taken as the operands; the left halves are ignored.

Thus, the instructions place from, or, withdraw into, the right-half of the referenced register. The left-half of the destination register is cleared during a withdraw operation. The instructions place into, or withdraw from, the left or right half of the top of the stack, as determined by bit 15 of the pointer register. A place operation does not disturb the unreferenced half of the destination word in the stack, provided the memory entity properly utilizes the $\overline{\text{BYTE}}$ line. After each place or withdraw, bit 15 is automatically toggled, to provide a left-right-left-right-...sequence.

However, it is up to the firmware to see to it that bit 15 of the pointer register is properly set prior to beginning stack operations.

When incrementing the stack pointer, bit 15 automatically changes state each time. But, the address contained in the lower 15 bits increments only during the zero-to-one transition of bit 15. Similarly, when decrementing the transition of bit 15 from a one to a zero is accompanied by a decrement of the lower 15 bits.

The incrementing and decrementing schemes just described are only for increments and decrements brought about by *a*, I, or D following the operand of a Place or Withdraw instruction. Increments or decrements to the pointer register with ISZ or DSZ do not automatically toggle bit 15.

The place-byte instruction cannot be used to place bytes into the registers within the BPC, EMC, and IOC. The reason for this is that these chips do not utilize the $\overline{\text{BYTE}}$ line of the IDA Bus during references to their internal registers.

The $\overline{\text{BYTE}}$ line is a signal supplied by the IOC for use by an interested memory entity. The $\overline{\text{BYTE}}$ line indicates that whatever is being transferred to or from memory is a byte (8 bits) and that bit 15 of the address indicates righr or left half. It is up to the memory (if it is a 16-bit mechanism) to merge the byte in question with its companion byte in the addressed word.

In the case of a withdraw-byte the memory can supply the full 16-bit word (that is, ignore the BYTE line). The IOC will extract the proper byte from the full word and store it as the right-half of the referenced register; the left half of the referenced register is cleared. In the case of a place-byte, however, the IOC copies the entire referenced register into W, and outputs its right half as either the upper or lower byte (according to bit 15 of the address) in a full 16-bit word. The full word is transmitted to the memory, and the "other" byte is all zeros. Thus, in this case the memory must utilize the $\overline{\text{BYTE}}$ line.

The consequence of the above is that any byte-oriented stacks to be managed using the place instruction must not include registers in any of the BPC, EMC, or IOC; that is, C and D must not assume any value between 0 and $37_8$ inclusive for a place-byte instruction.

Standard I/O

Standard programmed I/O involves three activities:

(1) Setting the peripheral address
(2) Investigating the status of the peripheral
(3) Initiating an I/O Bus Cycle Addressing the Peripheral A peripheral is selected as the addressed peripheral by storing its octal select code into the register called PA (Peripheral Address — address $11_8$). Only the four least significant bits are used to represent the select code.

Checking Status

The addressed peripheral is allowed to control the Flag and Status lines. (That is, it is up to the interface to not ground Flag or Status unless it is the addressed interface). These lines have an electrically negative-true logic so that when floating they appear false (clear, or not set) for SFS, SFC, SSS, and SSC.

The basic idea (and it can be done in a variety of ways) is to use sufficient checks of Flag and Status before and amongst the I/O Bus Cycles such that there is no possibility of initiating an I/O Bus Cycle to a device that is not ready to handle it. One way to do this with standard I/O is to precede every Bus Cycle with the appropriate checks.

Initiating I/O Bus Cycles

An I/O Bus Cycle occurs once each time one of R4 - R7 ($4_8$ - $7_8$) is accessed as memory. An instruction that "puts" something into R4–R7 results in an output (write) I/O Bus Cycle. Conversely, an instruction that "gets" something from R4 - R7 results in an input (read) I/O Bus Cycle. However, there are no R4 through R7. The use of address 4–7 is just a device to get an I/O Bus Cycle started; they do not correspond to actual physical registers in the IOC.

The Interrupt System

The idea behind interrupt is that for certain kinds of peripheral activity, the calculator can go about other business once the I/O activity is initiated, leaving the bulk of the I/O activity to an interrupt service routine. When the peripheral is ready to handle another ration of data (it might be a single byte or a whole string of words) it requests an interrupt. When the micro-processor grants the interrupt, the firmware program currently being executed is automatically suspended, and there is an automatic JSM to an interrupt service routine that corresponds to the device that interrupted. The service routine used standard programmed I/O to accomplish its task. A RET O,P terminates the activity of the service routine and causes resumption of the suspended program.

Priority

The interrupt system allows even an interrupt service routine to be interrupted and is therefore a multi-level interrupt system, and it has a priority scheme to determine whether to grant or ignore an interrupt request.

The IOC allows two levels of interrupt, and has an accompanying two levels of priority. Priority is determined by select code; select codes O–$7_8$ are the lower level (priority level 1), and select codes $10_8$–$17_8$ are the higher level (priority level 2). Level 2 devices have priority over level 1 devices; that is, a disc driver operating at level 2 could interrupt a plotter operating at level 1, but not vice versa. Within a priority level all devices are of "equal" priority, and operation is of a first come-first served basis; a level 1 device cannot be interrupted by another level 1 device, but only by a level 2 device. Within a level priorities are not equal in the case of simultaneous requests by two or more devices within a level. In such an instance the device with the higher numbered select code has priority. With no interrupt service routine in progress, any interrupt will be granted.

Vectored Interrupts

Devices request an interrupt by pulling on one or two interrupt request lines ($\overline{IRL}$ and $\overline{IRH}$ — one for each priority level). The IOC determines the requesting select code by means of an interrupt poll, to be described in the next paragraph. If the IOC grants the interrupt it saves the existing select code located in PA, puts the interrupting select code in PA, and does a JSM-Indirect through an interrupt table to get to the interrupt service routine.

An interrupt poll is a special I/O Bus Cycle to determine which interface(s) is (are) requesting an interrupt. An interrupt poll is restricted to one level of priority at a time, and is done only when the IOC is prepared to grant an interrupt for that level.

The interfaces distinguish an Interrupt Poll Bus Cycle from an ordinary I/O Bus Cycle through the $\overline{INT}$ line being low. Also, during this Bus Cycle PA3 specifies which priority level the poll is for. An interface that is requesting an interrupt on the level being polled responds by grouding the *n*th I/O Data line of the I/O Bus, where *n* equals the device's select code modulo eight. If more than one device is requesting an interrupt, the one with the higher select code will have priority.

Automatic Peripheral Addressing

The IOC has a three-deep first-in last-out hardware stack. The top of the stack is the Peripheral Address register (PA-$11_8$). The stack is deep enough to hold the select code in use prior to any interrupts, plus the select codes for two levels of interrupt. When an interrupt is granted, the IOC automatically pushes the select code of the interrupting device (as determined by the interrupt poll) onto the stack. Thus the previous select code-in-use is saved, and the new select code-in-use becomes the one of the interrupting device.

Interrupt Table

It is the responsibility of the firmware to maintain an interrupt table of 16 consecutive words, starting at some RWM address whose four least significant bits are zeros. The firmward is also to see to it that the starting address of the table is stored in the IV register (Interrupt Vector register — $10_8$), and that bit 15 of IV is set. (IV is the first of two levels in an indirect chain. For an address in the interrupt table to be taken indirectly, the previous address (IV) must have had bit 15 set.)

The words in the interrupt table contain the addresses of the interrupt service routines for the 16 different select codes. FIG. 123 depicts the interrupt table.

After the interrupt poll is complete the select code of the interrupting device is made to be the four least significant bits of the IV register. Thus IV now points at the word in the Interrupt Table which has the address of the appropriate interrupt service routine.

All that is needed now is a JSM IV, I, and the interrupt service routine will be under way. This is accomplished by the BPC as explained below.

Interrupt Process Summary

The IOC inspects the interrupt requests $\overline{IRL}$ and $\overline{IRH}$ during the time sync is given. Based on the priority of the interrupt requests, and the priority of any interrupt in progress, the IOC decides whether or not to grant an interrupt. If it decides to allow an interrupt it immediately pulls $\overline{INT}$ to ground, and also begins an interrupt poll.

The grounding of $\overline{INT}$ serves three purposes: It allows the interfaces to identify the forthcoming I/O Bus Cycle as an interrupt poll; it causes all th chips in the system, except the BPC, to abort their instruction decode process (which by this time is in progress) and return to their idle states; and it causes the BPC to abort its instruction decode and execute a JSM $10_8$, I instead.

The IOC uses the results of the interrupt poll to form the interrupt vector, which is then used by the JSM $10_8$, I. It also pushes the new select code onto the peripheral address stack, and puts itself into a configuration where all interrupt requests except those of a higher priority will be ignored.

Interrupt Service Routines

The majority of the interrupt activity described so far is accomplished automatically by the hardware. All the firmware has been responsible for has been the IV register, the maintenance of the interrupt table, and (probably) the initiation of the particular peripheral operation involved (plotting a point, backspace, finding a file, etc.). Such operations (initiated through a command given by simple programmed I/O) may involve many subsequent I/O Bus Cycles, done at odd time-intervals, and requested by the peripheral through an interrupt. It is the responsibility of the interrupt service routine to handle the I/O activity required by the peripheral without upsetting the routine that was interrupted.

The last things done by an interrupt service routine are to: (if necessary) shut off the interrupt mode of the interface; restore any saved values; and to execute a RET O,P.

The RET O part acts to return to the routine that was interrupted, so that its execution will continue. The P acts to pop the peripheral address stack and adjust the IOC's internal indicator of what priority level of interrupt is in progress. By popping the peripheral address stack, PA is set back to whatever it was prior to the most recent interrupt.

Disabling the Interrupt System

The interrupt system can be "turned off" by a DIR instruction. After this instruction is given the IOC will refuse to grant any interrupts whatsoever, until the interrupt system is turned back on with the instruction EIR. While the IOC won't grant any interrupts, the RET O,P works as usual so that interrupt service routines may be safely terminated, even while the interrupt system is turned off.

Pop On Turn-On

There is a signal called $\overline{POP}$ generated by the power supply. Its purpose is to initialize all the chips in the calculator system during turnon. $\overline{POP}$ leaves the IOC with the DMA and Pulse Count Modes turned off, and with the interrupt system turned off. The contents of the internal registers are random.

Direct Memory Access

Direct Memory Access is a means to exchange entire blocks of data between memory and peripherals. A block is a series of consecutive memory locations. Once started, the process is mostly automatic; it is done under control of hardware in the IOC, and regulated by the interface.

The DMA process transfers a word at a time, on a cycle-steal basis. This means that to transfer a word the IOC requests control of the IDA Bus with $\overline{BR}$, halting all other system activity for the duration of IOC control over the Bus, which is one memory cycle. When granted the Bus the IOC uses it to accomplish the necessary memory activity.

A transfer of a word is initiated at the request of the interface. To request a DMA transfer a device grounds the DMA Request line ($\overline{DMAR}$). Since there is only one channel of DMA hardware, and one DMA Request line, only one peripheral at a time may use DMA. A situation where two or more devices compete for the DMA channel must be resolved by the firmware, and it is absolutely forbidden for two or more devices to ground $\overline{DMAR}$ at the same time. (A data request for DMA is not like an interrupt request; there is no priority scheme, and no means for the hardware to select, identify and notify an interface as the winner of a race for DMA service.) Furthermore, a device must not begin requesting DMA transfers on its own; it must wait until instructed to do so by the firmware.

During a DMA transfer of a block of data the IOC knows the next memory location involved, whether input or output, which select code (and possibly) whether or not the transfer of the entire block is complete. This information is in registers in the IOC, which are set up by the firmware before the peripheral is told to begin DMA activity.

The DMA process is altogether independent of the operation of standard I/O and of the interrupt system, and except for cycle-stealing, does not interfere with them in any way.

Enabling and Disabling the DMA Mode

DMA transfers as described above are referred to as the DMA Mode. The DMA Mode can be disabled two ways: by a DDR (Disable Data Request), or by a PCM (Pulse Count Mode — described later). A DDR causes the IOC to simply ignore $\overline{DMAR}$; no more, no less. The instruction DMA (DMA Mode) causes the IOC to resume DMA Mode operation; DMA cancels DDR, and vice versa. DMA also cancels PCM, and vice versa. Also, DDR cancels PCM, and vice versa.

Also, the IOC turns on as if it has just been given a DDR. DDR (along with DIR) is useful during system initialization (or possible error recovery) routines, where it is unsafe to allow any system activity to proceed until the system is properly initialized (or restarted).

Register Set-Up

There are three registers that must be set up prior to the onset of DMA activity. These are shown in Table 4 below.

Table 4

| Name | Address | Meaning |
|---|---|---|
| DMAPA | $(=13_8)$ | DMA Peripheral Address |
| DMAMA | $(=14_8)$ | DMA Memory Address (and direction) |
| DMAC | $(=15_8)$ | DMA Count |

The four least significant bits of DMAPA specify the select code that is the peripheral side of the DMA activity. During an I/O Bus Cycle given in response to a DMA data request, the four least significant bits of DMAPA will determine the states of the PA lines, not the PA register.

DMAC can, if desired, be set to $n$-1, where $n$ is the number of words to be transferred. During each transfer the count in DMAC is decremented. During the last transfer the IOC automatically generates signals which the interface can use to recognize the last transfer. In the case of a transfer of unknown size, DMAC should be set to a very large count, to thwart the automatic termination mechanism. In such cases it is up to the interface to identify the last transfer.

DMAMA is set to the address of the first word in the block to be transferred. This is the lowest numbered address; after each transfer DMAMA is automatically incremented by the IOC. Bit 15 of DMAMA specifies input or output (relative to the processor); a zero specifies input and a one specifies output.

DMA Initiation

Once the three registers are set up, a "start DMA" command is given to the interface through standard programmed I/O. The "start DMA" command is an output I/O Bus Cycle with a particular combination of $\overline{IC1}$, $\overline{IC2}$, (and perhaps) a particular bit pattern in the transmitted word. The patterns themselves are subject to agreement between the firmware designer and the interface designer. Sophisticated peripherals using DMA in both directions will have two start commands, one for input and one for output. It's also possible that other information could be encoded in the start command (block size, for instance).

Data Request and Transfer

The interface exerts $\overline{DMAR}$ low whenever it is ready to exchange a word of data. When $\overline{DMAR}$ goes low the IOC requests control of the IDA Bus. When granted the Bus, the IOC initiates an I/O Bus Cycle with the PA lines controlled by DMA Peripheral Address, and does a memory cycle. (The order of these two operations depends upon the direction of the transfer).

Next the IOC increments DMA Memory Address and decrements DMA Count.

DMA Termination

There are two automatic termination mechanisms, each usable only when the block size is known in advance, and each based on the count in DMAC going negative. Recall that at the start of the operation part of DMAC is set to $n-1$, where $n$ is the size of the transfer in words.

During the transfer of the $n$th word, the IOC will signal the interface by temporarily exerting $\overline{IC2}$ high during the I/O Bus Cycle for that exchange. The interface can detect this and cease DMA operations.

The other means of automatic termination is detection by the interface of a signal called Count Minus ($\overline{CTM}$). $\overline{CTM}$ is generated by the IOC; it means that the count in the least significant 15 bits of DMAC has gone negative. $\overline{CTM}$ is a steady-state signal, given as soon as, and as long as, the count in DMAC is negative. $\overline{CTM}$ is generated by the IOC but is not utilized in the configuration employed in the hybrid microprocessor. That is, $\overline{CTM}$ never leaves the IOC.

For DMA transfers of unknown block size, the interface determines when the transfer is complete, and flags or interrupts the processor.

The Pulse Count Mode

The Pulse Count Mode is a means of using the DMA hardware to acknowledge, but do nothing about, some number of leading DMA requests. The Pulse Count Mode is initiated by a PCM, and resembles the DMA Mode, but without the memory cycle. The activities of the three registers DMAPA, DMAC and DMAMA remain as described for DMA Mode operation. The only difference is that no data is exchanged with memory; no memory cycle is given. (The IOC even requests the IDA Bus, but when granted it, releases it without doing the memory cycle).

A dummy I/O Bus Cycle is given, and DMAC decremented. Also, the automatic termination mechanisms still function; in fact, they are the object of the entire operation. The Pulse Count Mode is intended for applications like the following: Suppose it were desired to move a tape cassette a known number of files. The firmware puts the appropriate number into DMAC, gives PCM, and instructs the cassette to begin moving.

The cassette would give a DMA Request each time it encounters a file header. In this way the DMA hardware and the automatic termination mechanism count the number of files for the cassette. PCM cancels DMA and DDR. Both DMA and DDR cancel PCM.

Extended Bus Grant

Two of the signals of the IDA Bus are Bus Request ($\overline{BR}$) and Bus Grant (BG). These two signals are used, for instance, during a DMA transfer. The IOC requests the IDA Bus (in order to do the necessary memory cycle) by grounding $\overline{BR}$. When BG is given the IOC then knows to proceed.

Other entities can also request the IDA Bus. All chips in the system listen to Bus Request, and Bus Grant cannot go high until all chips consent to it; a 'wired and' does that. If two chips request the IDA Bus at the same time, the winner of BG is specified, and the loser is kept waiting by a daisy-chain priority scheme for the routing of Bus Grant. This is depicted in FIG. 124.

As FIG. 124 shows, the IOC is the initial receiver of Bus Grant; if it's not who is requesting the Bus, then the tester gets Bus Grant next. If the tester is not requesting the Bus, then the next device in the chain has the chance to use Bus Grant. A device gives the next device its chance by passing along the signal EXBG (Extended Bus Grant). The requesting device understands EXBG as a Bus Grant, and refuses to send EXBG any further.

IOC Machine Instructions.

Assembly language machine instructions are three-letter mnemonics. Each machine instruction source statement corresponds to a machine operation in the object program produced by an assembler.

Notation used in requesting source statement is explained below:

| | |
|---|---|
| reg 0–7 | Register location. |
| reg 4–7 | Register location. |
| I | Increment indicator (for place and withdraw instructions); for BPC memory reference instructions it is an indirect addressing indicator. |
| D | Decrement indicator for place and withdraw instructions. |
| ,I/,D | The slash indicates that either item (but not both) may be used at this place in the source statement. |
| [] | Brackets indicate that the item contained within them is optional. |

Stack Group

The stack group manages first-in, last-out firmware stacks. The "place" instruction puts a word or a byte into a stack pointed at by C or D. The item that is placed is reg 0–7. The "withdraw" instructions remove a word or a byte from a stack pointed at by C or D. The removed item is written into reg 0–7.

After each place or withdraw instruction the stack pointer is either incremented or decremented, as specified in the source text by the optional I or D, respectively. In the absence of either an I or a D, the assembler defaults to I for place instructions, and D for withdraw instructions.

Place instructions increment or decrement the stack pointer prior to the placement, and withdraw instructions do it after the withdrawal. In this way the pointer is always left pointing at the top of the stack.

For byte operations bit 15 of the pointer register (C or D) indicates left or right half (one = left, zero = right). Stack instructions involving bytes toggle bit 15 at each increment or decrement; but the lower bits of the pointer increment or decrement only every other time.

The values of C and D for place-byte and withdraw-byte instructions must not be the address of any internal register for the BPC, EMC, or IOC. The place and withdraw instruction can also initiate I/O operations, so they are also listed under the I/O group. The stack group instructions are listed below.

PWC reg 0–7 [,I/,]

Place the entire word of reg into the stack pointed at by C.

PWD reg 0–7 [,I/,D]

Place the entire word of reg into the stack pointed at by D.

PBC reg 0–7 [,I/,D]

Place the right half of reg into the stack pointed at by C.

PBD reg 0–7 [,I/,D]

Place the right half of reg into the stack pointed at by D.

WWC reg 0–7 [,I/,D]

Withdraw an entire word from the stack pointed at by C, and put it into reg.

WWD reg 0–7 [,I/,D]

Withdraw an entire word from the stack pointed at by D, and put it into reg.

WBC reg 0–7 [,I/,D]

Withdraw a byte from the stack pointed at by C, and put it into the right half of reg.

WBD reg 0–7 [,I/,D]

Withdraw a byte from the stack pointed at by D, and put it into the right half of reg.

I/O Group

The states of $\overline{IC1}$ and $\overline{IC2}$ during the I/O Bus Cycles initiated by the instructions listed hereinafter depend upon which register is the operand of the instructions as shown in Table 5 below.

Table 5

| | $\overline{IC1}$ | $\overline{IC2}$ |
|---|---|---|
| R4 | 1 | 1 |
| R5 | 1 | 0 |
| R6 | 0 | 1 |
| R7 | 0 | 0 |

mem. ref. inst. reg 4–7 [,I]

Initiate an I/O Bus Cycle. Memory reference instructions 'reading' from reg cause intput I/O Bus Cycles; those 'writing' to reg cause output I/O Bus Cycles. In either case the exchange is between A or B and the interface addressed by the PA register (Peripheral Address Register - $11_8$); reg 4–7 do not really exist as physical registers within any chip on the IDA Bus.

stack inst. reg 4–7 [,I/,D]

Initiate an I/O Bus Cycle. Place instructions 'read' from reg, therefore they cause input I/O Bus Cycles. Withdraw instructions 'write' into reg, therefore they cause output I/O Bus Cycles. In either case the exchange is beween the addressed stack location and the interface addressed by PA.

Interrupt Group

The interrupt group instructions are listed below.

EIR

Enable the interrupt system. This instruction cancels DIR.

DIR

Disable the interrupt system. This instruction cancels EIR.

DMA Group

The DMA group instructions are listed below.

DMA

Enable the DMA mode. This instruction cancels PCM and DDR.

PCM

Enable and Pulse Count Mode. This instruction cancels DMA and DDR.

DDR

Disable Data Request. This instruction cancels the DMA Mode and the Pulse Count Mode.

IOC Machine-Instructon Bit Patterns

FIGS. 125A–C depict the bit patterns of the IOC machine-instructions.

Internal Description of the IOC

The IOC may be understood with reference to the detailed block diagram of FIGS. 126A–C. A DMP IDA micro-instruction provides communication from the IDA Bus to the internal $\overline{\text{IDC}}$ Bus in the IOC. A SET IDA micro-instruction provides communication from the IOC to the IDA Bus; SET IDA drives the IDA Bus according to the contents of the O Register, which in turn is set with a SET O micro-instruction.

As in the BPC, and Address Decode section and associated latches detect the appearance of an IOC-related register address. Such as event results in the address being latched and sent to the Bus Control ROM as qualifier information.

There are two main ROMs in the IOC. These are the Bus Control ROM and the Instruction Control ROM. The Bus Control ROM is responsible for generating and responding to activity between the IOC and the IDA and $\overline{\text{IOD}}$ busses. This class of activity consists of memory cycles, I/O Bus cycles, interrupt polls, interrupt requests, and requests for DMA. The instruction Control ROM is responsible for recognizing fetched IOC machine-instructions, and for implementing the algorithms that accomplish those instructions. Frequently, the Bus Control ROM will undertake activity on the behalf of the Instruction Control ROM. These two ROMs are physically merged, and share a common set of decodable micro-instructions.

However, each of the two ROMs has its own state-counter. For each ROM, the next state is explicitly decoded by each current state.

The I Register serves a function similar to that of the I Register of the BPC. It serves as a repository to hold the fetched machine-instruction and to supply that instruction to Instruction Decode. Instruction Decode generates Asynchronous Control Lines that are similar in function to those of the BPC. Instruction Decode also generates Instruction Qualifiers that represent the machine-instruction to the ROM mechanism.

The W Register is used primarily in conjunction with the execution of the place and withdraw machine-instructions. Each such instruction requires two memory cycles; one to get the data from the source, and one to transmit it to the destination. W serves as a place to hold the data in between those memory cycles.

The DMP W function is complex, and is implemented by a DMP W and Crossover Network. If the place or withdraw operation is for the entire word, the crossover function is not employed, and the pairs of signals OLB, DLB, and, OMB, DMB, work together to implement a standard 16-bit DMP W. However, a byte oriented place or withdraw instruction involves the dumping of only a single byte of W onto the $\overline{\text{IDC}}$ Bus. This is done in the following combinations: least-significant byte of W to most-significant half of the $\overline{\text{IDC}}$ Bus; least-significant byte of W to least-significant half of the $\overline{\text{IDC}}$ Bus; and, most-significant byte of W to least-significant half of the $\overline{\text{IDC}}$ Bus. The exact mode of operation during a DMP W is determined by W Register Control on the basis of the Asynchronous Control Lines from Instruction Decode.

Another use of W occurs during an interrupt. During an interrupt poll the response of the requesting peripheral(s) is loaded into the least-significant half of W. These eight bits represent the eight peripherals on the currently active (or enabled) level of interrupt. Each peripheral requesting interrupt service during the poll will have a one in its corresponding bit. This eight-bit pattern is fed to a Select Code Priority Resolver and 3 LSB Interrupt Vector Generator. That circuitry identifies the highest numbered select code requesting service (should there be more than one) and generates the three least-significant bits of binary code that correspond to that peripheral's select code. The next most-significant bit corresponds to the level at which the interrupt is being granted, and it is available from the interrupt circuitry in the form of the signal $\overline{\text{PHIR}}$.

The interrupt vector is made up of the three least-significant bits from W, as encoded by the priority resolver, the bit corresponding to $\overline{\text{PHIR}}$, and the 12 bits contained in the Interrupt Vector Register (IV). Thus, when an interrupt is granted the complete interrupt vector is placed on the $\overline{\text{IDC}}$ Bus by simultaneously giving the following micro-instructions: EPR, DMP, ISC, UIG, and DMP IV.

The C and D Registers are the pointer registers used for place and withdraw operations. Each of these registers is equipped with a 15-bit increment and decrement network for changing the value of the pointer. Whether to increment or decrement is controlled by the C and D Register Control circuit according to the Asynchronous Control Lines.

The DMA Memory Address (DMAMA) and DMA Count (DMAC) Registers are similar to the C and D Registers, except that DMAMA always increments, and that DMAC always decrements. In addition, the decrement for DMAC is a 16-bit decrement. These two registers are used in conjunction to identify the destination or source address in memory of each DMA transfer, and to keep a count of the number of such transfers so far.

Two separate mechanisms are provided for the storage of peripheral select codes. The DMAPA Register is a four-bit register used to contain the select code of any peripheral that is engaged in DMA.

The other mechanism is a three-level stack, also four bits wide, whose uppermost level is the Peripheral Address Register (PA). It is in this stack that peripheral select codes for both standard I/O and interrupt I/O are kept. The stack is managed by the interrupt circuitry.

The Peripheral Address Lines (PA Lines) reflect either the contents of DMAPA or PA, depending upon whether or not the associated I/O Bus cycles are for DMA or not, respectively. This selection is controlled by the DMA circuitry, and is implemented by the Peripheral Address Bus Controller.

Three latches control whether or not the Interrupt System is active or disabled, whether or not the DMA Mode is active or disabled, and, whether or not the Pulse Count Mode is active or disabled. Those latches are respectively controlled by these machine-instructions; EIR and DIR for the Interrupt System, and, DMA, PCM, and DDR for DMA-type operations.

The interrupt circuitry is controlled by a two-bit state-counter and ROM. The state-count is used to represent the level of interrupt currently in use. Requests for interrupt are made into qualifiers for the ROM of the interrupt controller. If the interrupt request can be granted it is represented by a change in state of that ROM, as well as by instructions decoded from that ROM and sent to the Interrupt Grant Network. This circuitry generates the $\overline{INT}$ signal used to cause an interrupt of the BPC, and, generates an INTQ qualifier that represents the occurrence of an interrupt to the main ROM mechanism in the IOC so that an interrupt poll can be initiated.

The DMA circuitry is similar in its method of control. It has a ROM controlled by a three-bit state-counter.

Description of the EMC

The Extended Math Chip (EMC) executes 15 macine-instructions. Eleven of these operate on BCD-Coded three-word mantissa data. Two operate on blocks of data of from 1 to 16 words. One is a binary multiply and one clears the Decimal Carry (DC) register.

Unless specified otherwise, the contents of the registers A, B, SE and DC are not changed by the execution of any of the EMC's instructions. The EMC communicates with other chips along the IDA Bus in a way similar to how the IOC communicates via the Bus.

Notation

A number of notational devices are employed in describing the operation of the EMC.

The symbols $<\ldots>$ denotes a reference to the actual contents of the named location.

$A_{0-3}$ and $B_{0-3}$ denote the four least significant bit-positions of the A and B registers, respectively. Similarly, $A_{4-15}$ denotes the 12 most-significant bit-positions of the A register. And by the previous convention, $<A_{0-3}>$ represents the bit pattern contained in the four least-significant bit-positions of A.

AR1 is the label of a four-word location in R/W memory: $77770_8$ through $77773_8$.

AR2 is the label of a four-word arithmetic accumulator register located within the EMC, and occupying register addresses $20_8$ through $23_8$.

SE is the label of the four-bit shift-extend register, located within the EMC. Although SE is addressable, and can be read from, and stored into, its primary use is as internal intermediate storage during those EMC instructions that read something from, or put something into, $A_{0-3}$. The address of SE is $24_8$.

DC is the mnemonic for the one-bit decimal-carry register located within the EMC. DC is set by the carry output of the decimal adders of the EMC. Sometimes, in the illustrations of what the EMC instructions do, DC is shown as being part of the actual computation, as well as being a repository for overflow. In such cases the initial value of DC affects the result. However, DC will usually be zero at the beginning of such an instruction. The firmware sees to that by various means.

DC does not have a register address. Instead, it is the object of the BPC instructions SDS and SDC (Skip if Decimal Carry Set and Skip if Decimal Carry Clear), and the EMC instruction CDC (Clear Decimal Carry).

Data Format

The EMC can perform operations on twelve-digit, BCD-encoded, floating point numbers. Such numbers occupy four words of memory, and the various parts of a number are put into specific portions of the four words. FIG. 127 depicts this format.

The twelve mantissa digits are denoted by $D_1$ through $D_{12}$. $D_1$ is the most-significant digit, and $D_{12}$ is the least-significant digit. It is assumed that there is a decimal point between $D_1$ and $D_2$. $E_s$ and $M_s$ each represent positive and negative (signs) by zero and one, respectively.

EMC Machine Instructions

Assembly language EMC machine-instructions are three-letter mnemonics. Each machine instruction source statement corresponds to a machine operation in the object program produced by an assembler.

Notation used in representing source statements is explained below:

N Constant whose value is restricted to the range: $1 \leqq N \leqq 20_8 = 16_{10}$ The Four-Word Group The four-word group instructions are listed below.

CLR N

Clear N words. This instruction clears N consecutive words, beginning with location $< A >$. Recall that: $1 \leqq N \leqq 16_{10}$.

$0 \rightarrow$ location $<A>$
$0 \rightarrow$ location $<A>+1$
•
•
•
$0 <$ location $<A> + N-1$

XFR N

Transfer N words. This instruction transfers the N consecutive words beginning at location $< A >$ to those beginning at $< B >$. Recall that: $1 \leqq N \geqq 16_{10}$.

location $<A> \rightarrow$ location $<B>$
location $<A> +1 \rightarrow$ location $<B>+1$
•
•
•
location $<A>+N-1 \rightarrow$ location $<B>+N-1$ The Mantissa Shift Group The mantissa shift group instructions are listed below.

MRX

Mantissa right shift of AR1 $r$ times, $r = < B_{0-3} >$, and $0 \leqq r \leqq 17_8 = 15_0$.

1st shift: $< A_{0-3} > \rightarrow D_1; \ldots < D_i > \rightarrow D_{i+1}; \ldots D_{12}$ is lost $j$th shift: $0 \rightarrow D_1; \ldots < D_i > \rightarrow D_{i+1}; \ldots D_{12}$ is lost $r$th shift: $0 \rightarrow D_1; \ldots < D_i > \rightarrow D_{i+1}; \ldots < D_{12} > \rightarrow A_{0-3}; 0 \rightarrow DC; 0 \rightarrow A_{4-15}$ Notice:

(1) The first shift does not necessarily shift in a zero; the first shift shifts in $< A_{0-3} >$.

(2) The last digit shifted out ends up as $< A_{0-3} >$.

(3) If only one digit-shift is done, (1) and (2) happen together.

(4) After (2), SE is the same as $< A_{0-3} >$.

(5) Any more than eleven shifts is wasteful.

MRY

Mantissa right shift of AR2 $< B_{0-3} >$ -times. Otherwise identical to MRX.

MLY

Mantissa left shift of AR2 one time.

$< A_{0-3} > \rightarrow D_{12}; \ldots < D_i > \rightarrow D_{i-1}; \ldots < D_1 > \rightarrow A_{0-3}; 0 \rightarrow DC; 0 \rightarrow A_{4-15}$ At the conclusion of the operation SE equals $< A_{0-3} >$.

DRS

Mantissa right shift of AR1 one time.

$0 \rightarrow D_1; \ldots \langle D_i \rangle \rightarrow D_{i+1}; \ldots \langle D_{12} \rangle \rightarrow A_{0\text{-}3}; 0 \rightarrow DC; 0 \rightarrow A_{4\text{-}15}$ At the conclusion of the operation SE equals $\langle A_{0\text{-}3} \rangle$.

NRM

Normalize AR2. The mantissa digits of AR2 are shifted left until $D_1 \neq 0$.

If the original $D_1$ is non-zero, no shifts occur. If twelve shifts occur, then AR2 equals zero, and no further shifts are done. The number of shifts is stored as a binary number in $B_{0\text{-}3}$.

i. $0 \rightarrow B_{4\text{-}15}$; # of shifts $\rightarrow B_{0\text{-}3}$
ii. For $0 \leqq \langle B_{0\text{-}3} \rangle \leqq 11$; $0 \rightarrow DC$
iii. If $\langle B_{0\text{-}3} \rangle = 12$; $1 \rightarrow DC$ The Arithmetic Group The arithmetic group instructions are listed below.

CMX

Ten's complements of AR1. The mantissa of AR1 is replaced with its ten's complement, and DC is set to zero.

CMY

Ten's complement of AR2. The mantissa of AR2 is replaced with its ten's complement, and DC is set to zero.

CDC

Clear Decimal Carry. Clears the DC register; $O \rightarrow DC$.

FXA

Fixed-point addition. The mantissas of AR1 and AR2 are added together, along with DC (as a $D_{12}$-digit), and the result is placed in AR2. If an overflow occurs, DC is set to one, otherwise, DC is set to zero at the completion of the addition.

During the addition the exponents are not considered, and are left strictly alone. The signs are also left completely alone.

---

$\langle AR1 \rangle = D_1\, D_2\, D_3 ---D_{12}$
$\langle AR2 \rangle = D_1\, D_2\, D_3 ---D_{12}$
$+ \qquad \langle DC \rangle \leftarrow$ initial value of DC
(overflow)$\rightarrow$ "$D_0$"$D_1\, D_2\, D_3 ---D_{12} \rightarrow$ AR2
DC (final value of DC)
MWA

---

Mantissa Word Add. $\langle B \rangle$ is taken as four BCD digits, and added, as $D_9$ through $D_{12}$, to AR2. DC is also added in as a $D_{12}$. The result is left in AR2. If an overflow occurs, DC is set to one, otherwise, DC is set to zero at the completion of the addition.

During the addition the exponents are not considered, and are left strictly alone, as are the signs. MWA is intended primarily for use in rounding routines.

---

$\langle B \rangle = ——— D_9\, D_{10}\, D_{11}\, D_{12}$
$\langle AR2 \rangle = D_1 --- D_9\, D_{10}\, D_{11}\, D_{12}$
$+ \qquad \langle DC \rangle \leftarrow$ initial value of DC
(overflow)$\rightarrow$ "$D_0$" $D_1 --- D_9\, D_{10}\, D_{11}\, D_{12} \rightarrow$ AR2
DC (final value of DC)

---

FMP

Fast multiply. The mantissas of AR1 and AR2 are added together (along with DC as $D_{12}$) $\langle B_{0\text{-}3} \rangle$ -times; the result accumulates in AR2.

The repeated additions are likely to cause some unknown number of overflows to occur. The number of overflows that occurs is returned in $A_{0\text{-}3}$.

FMP is used repeatedly to accumulate partial products during BCD multiplication. FMP operates strictly upon mantissa portions; signs and exponents are left strictly alone.

---

$\langle AR2 \rangle + ((\langle AR1 \rangle \cdot (\langle B_{0\text{-}3} \rangle)) + DC \rightarrow AR$

| | |
|---|---|
| DC doesn't enter into these repeated additions except for the first one as shown at right. $0 \rightarrow DC$ immediately after each overflow | Represents the initial value of DC. |

$0 \rightarrow DC$, $0 \rightarrow A_{4\text{-}15}$, # of overflows$\rightarrow A_{0\text{-}3}$
MPY

---

Binary Multiply Using Booth's Algorithm. The (binary) signed two's complement contents of the A and B registers are multiplied together. The thirty-two bit product is also assigned two's complement number, and is stored back into A and B. B receives the sign and most-significant bits, and A the least-significant bits.

$$\langle A \rangle \cdot \langle B \rangle \rightarrow \overbrace{\langle B \rangle \langle A \rangle}$$

FDV

Fast Divide. The mantissas of AR1 and AR2 are added together until the first decimal overflow occurs. The result of these additions accumulates into AR2. The number of additions without overflow ($n$) is placed into B.

$$\langle AR2 \rangle + \langle AR1 \rangle + \langle DC \rangle \rightarrow AR2$$
(repeatedly until overflow)

then $$0 \rightarrow DC,\ 0 \rightarrow B_{4\text{-}15},\ n \rightarrow B_{0\text{-}3}$$

FDV is used in floating-point division to find the quotient digits of a division. In general, more than one application of FDV is needed to find each digit of the quotient.

As with the other BCD instructions, the signs and exponents of AR1 and AR2 are left strictly alone. FIGS. 128A–C depict the bit patterns of the EMC machine-instructions.

Internal Description of the EMC

FIGS. 129A–C depict the internal block diagram of the EMC. The micro-instructions SET IDA and DMP IDA are the communication link between the external IDA bus and the internal $\overline{\text{IDM}}$ bus. An instruction is fetched by the BPC and placed on the IDA Bus. All chips connected to the bus decode it and act accordingly.

If the fetched instruction is not an EMC instruction, or if an interrupt request is made, the EMC ignores the instruction. Upon completion of the instruction by another chip or upon completion of the interrupt, the EMC examines the next instruction. If the instruction is an EMC instruction, it is executed and data effected by it are transferred via the IDA bus. At the appropriate point during the execution of the instruction, SYNC is given to indicate to other chips that it has finished using the IDA Bus and consequently to treat the next data that appears on IDA as an instruction.

The Word Pointer Shift Register points to the register to be effected by the DMPX/SETX or DMPY/SETY micro-instructions and the registers to be bussed to the Adder. It is also employed as a counter in some instructions.

Once data is on the $\overline{\text{IDM}}$ Bus, it can then be loaded into one of several registers by issuing the appropriate micro-instruction. The data paths between IDM and the X and Y registers can be controlled in two ways. One way is by issuing an explicit micro-instruction, e.g., SET Y2 would set the Y2 Register with the data on $\overline{\text{IDM}}$. Another way of accomplishing the same thing would be to issue a SET Y for a word pointer equal two.

The X Registers are used for all shifting operations, the direction being instruction dependent.

The Shift Extend Register is a four-bit addressable register used to hold a digit to be shifted into the X register or one that has been shifted out of X.

The Arithmetic Extend Register is a four-bit addressable (read-only) register used to accumulate a decimal digit for the FMP and FDV instructions and serves as a number-of-shifts accumulator in the NRM instruction.

The N Counter is used to indicate the number of words involved in the CLR and XFR instructions, the number of shifts in MRX, MRY, MLY and DRS, the multiplier digit in FMP, and a loop counter in MPY.

The Adder is capable of either binary or BCD addition with the complementer being capable of either one's or nine's complementation of the Y Register inputs. A carry-in signal is available from three sources for generating two's or ten's complement arithmetic.

The Decimal Carry Register is a one-bit register that can hold the carry-out of the Adder. ADR1 is the address of the AR1 operand; its two least significant bits are determined by the word pointer, e.g., WP0 => 00, WP1 => 01, etc.

The Address Decode ROM generates the control signals used for reading from or writing into a register in either the Extended Register Access (ERA) mode or the normal addressing mode of operation. Miscellaneous hardware has been added to enhance the execution of the two's complement binary multiply instruction (MPY).

BUS CONTROL

The direction of data flow on the IDA bus is controlled by the bus control circuit of FIGS. 16 and 130. Gate U19 provides the basic definition of the direction of data flow. The direction of data flow is normally from the microprocessor to the memory since address is the first data on the IDA bus when the memory cycle starts. This condition is controlled by the STM signal into gate U19 being logically false. Once the memory cycle starts, the Processor Driving (PDR) signal indicates that data flow is from processor to memory. In some instances, such as during direct memory access (DMA) operation, the PDR signal does not indicate the direction of data flow on the IDA bus. For this case, the Write (WRIT) signal is ANDed into U19 to decide bus direction. Also, since the first thirty-two memory addresses are actually registers within the microprocessor, the Register Access Line (RAL) is used to prevent bus conflict when accessing register information. Finally, the Monitor Buffer Control (MBC) signal is also ANDed in to define bus direction during testing. The resulting output of U19 is called the Stay Off Bus (SOB) signal since it indicates those times when the memory section is not allowed to be on the IDA bus. The bus control circuit also controls the direction of the bidirectional data buffer located within the hybrid microprocessor (processor buffer out, PBO, signal). Since the microprocessor buffer and the memory buffers normally operate in tandem (i.e., when the microprocessor buffer points out, the memory buffer points into memory, and when the memory buffer points out, the microprocessor buffer points into the microprocessor) the SOB signal is inverted by U17A and used to control the microprocessor's buffer.

Figure 6:
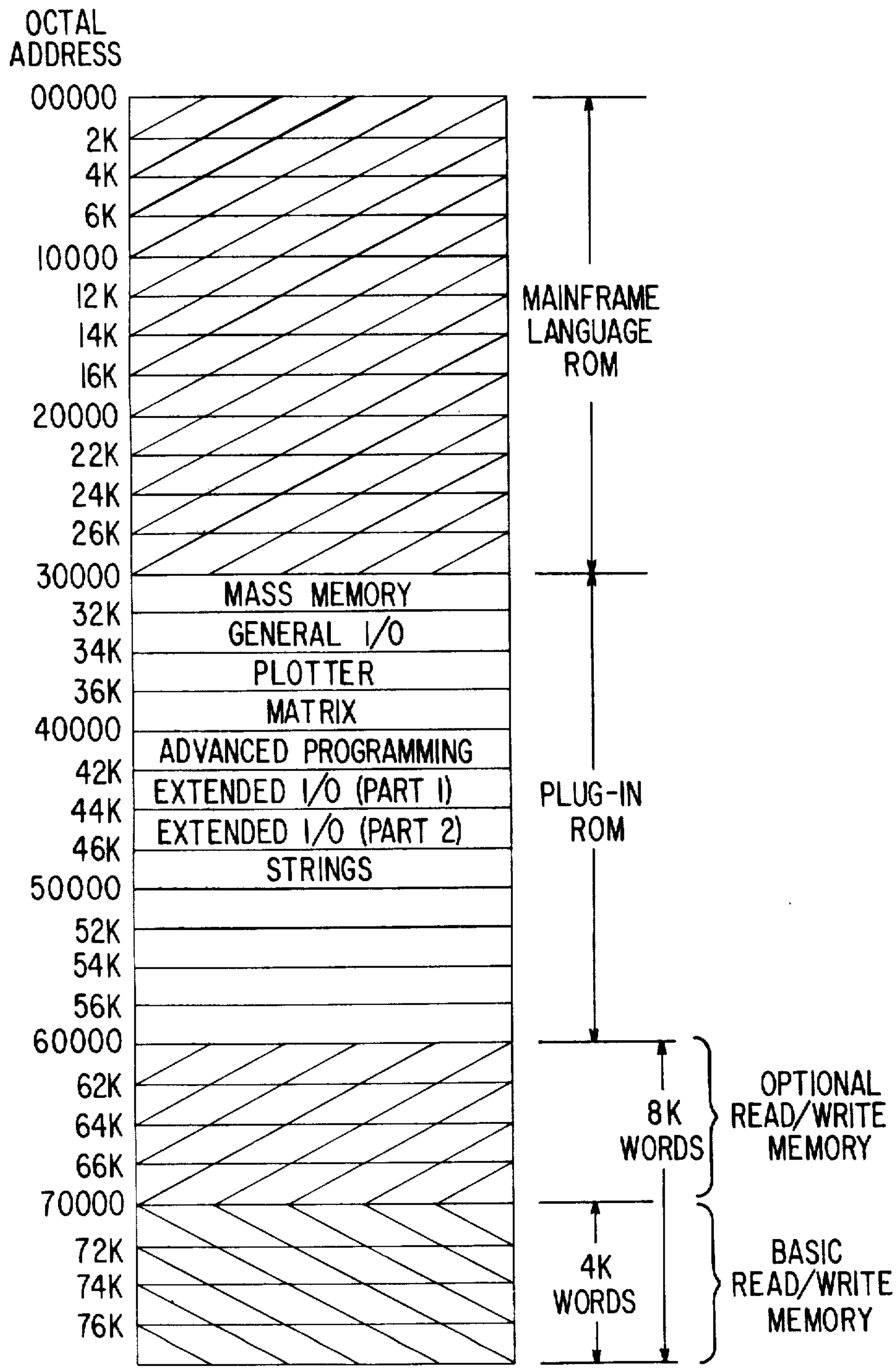
FIG. 6 is a memory map showing the format of the various read-write and read-only memories within the calculator memory section of FIG. 4.

The bus control circuit also decodes the upper three bits of the IDA bus (IDA12 through IDA14) using a dual open-collector output 2-line to 4-line decoder (Texas Instruments device SN74LS156 or equivalent) as a one-of-eight decoder. The memory space is thus broken into 4096-word divisions. The memory map of FIG. 6 shows allocation of read-only and read/write memory in the memory space. The first three outputs of the decoder are wire-ORed together to indicate that the mainframe language ROM memory section is being accessed. The next three outputs of the decoder are also wired-ORed together with the two-pole switch S1 determining whether or not the upper two outputs are to be included in the wire-ORing. The resulting output determines which portion of the memory space is taken by the optional plug-in ROM memory section. The balance of the address space is assumed to be read/write memory. The boundary between the plug-in ROM and the read/write memory is determined by switch S1 which is set according to the amount of optional read/write memory that the calculator contains. The STM (Start Memory) signal is used to latch the outputs of the decoder into the latches U16A and U16B for the balance of the memory cycle since address information is only present on the IDA bus at the beginning of the memory cycle. The output of the latches is gated with the Stay Off Bus (SOB) signal to prohibit the memory section from placing data onto the IDA bus until permitted to do so. If the data to be read is located in the mainframe language ROM memory section, the bus control circuit releases the mainframe ROM buffer control (MFRBC) signal to allow the ROM to place data on the IDA bus and point the bidirectional buffer associated with the ROM from the memory to the microprocessor. Likewise, if the data to be read is located in the plug-in ROM memory section, the bus control circuit releases the plug-in ROM buffer control (PIRBC) signal. If the data, instead, is to be read from the read/write memory sections, the bus control simply removes the Stay Off Bus signal to allow the read/write memory to place the data on the IDA bus at its discretion.

MEMORY TIMING AND CONTROL

Figure 109:
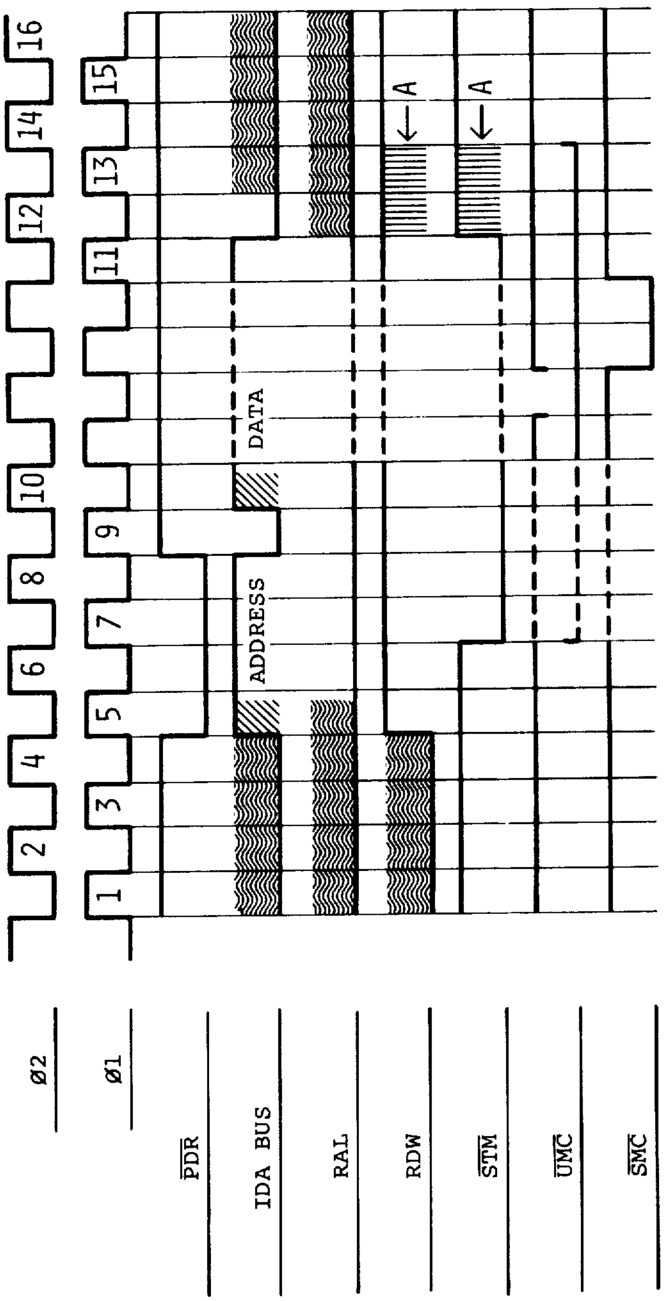
FIG. 109 is a waveform diagram illustrating a generalized BPC-originated read memory cycle.
Figure 110A:
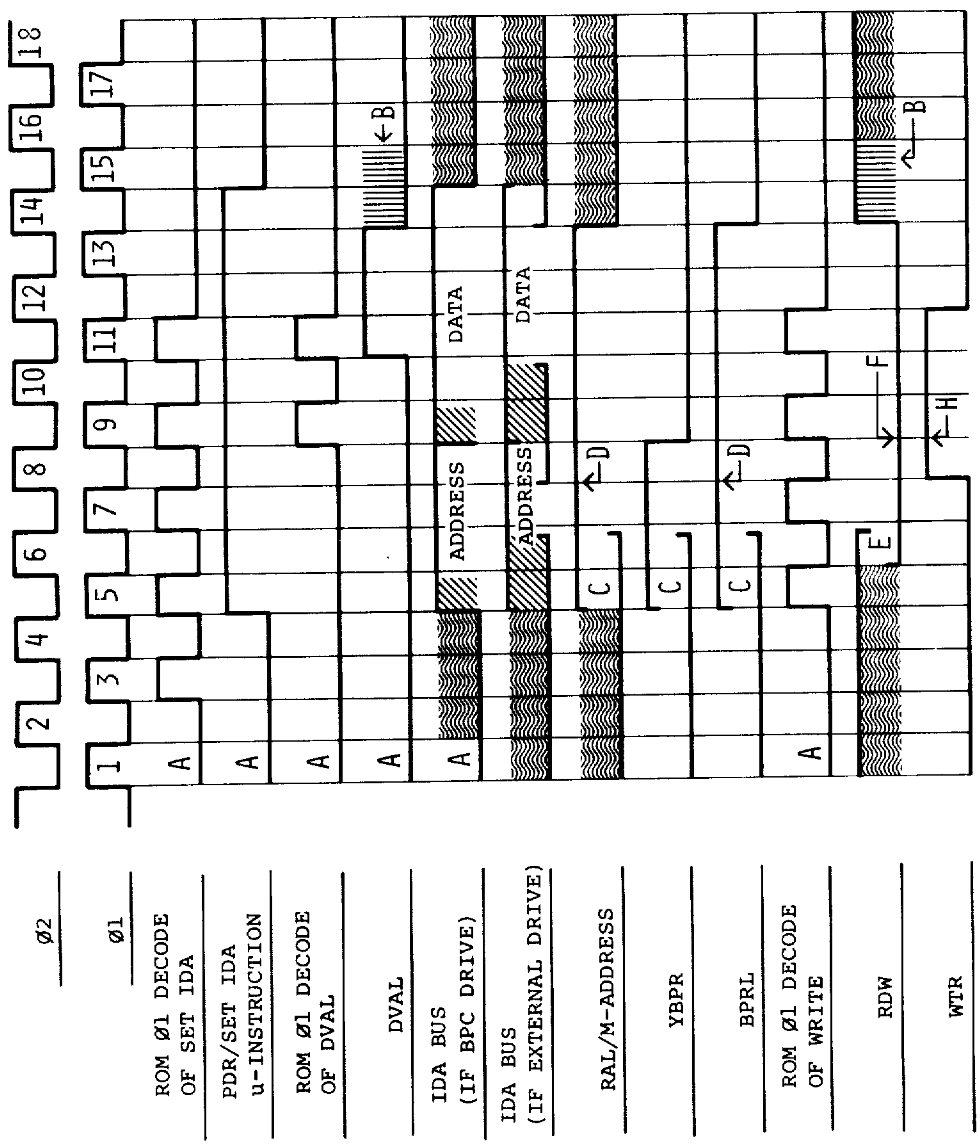
Figure 110B:
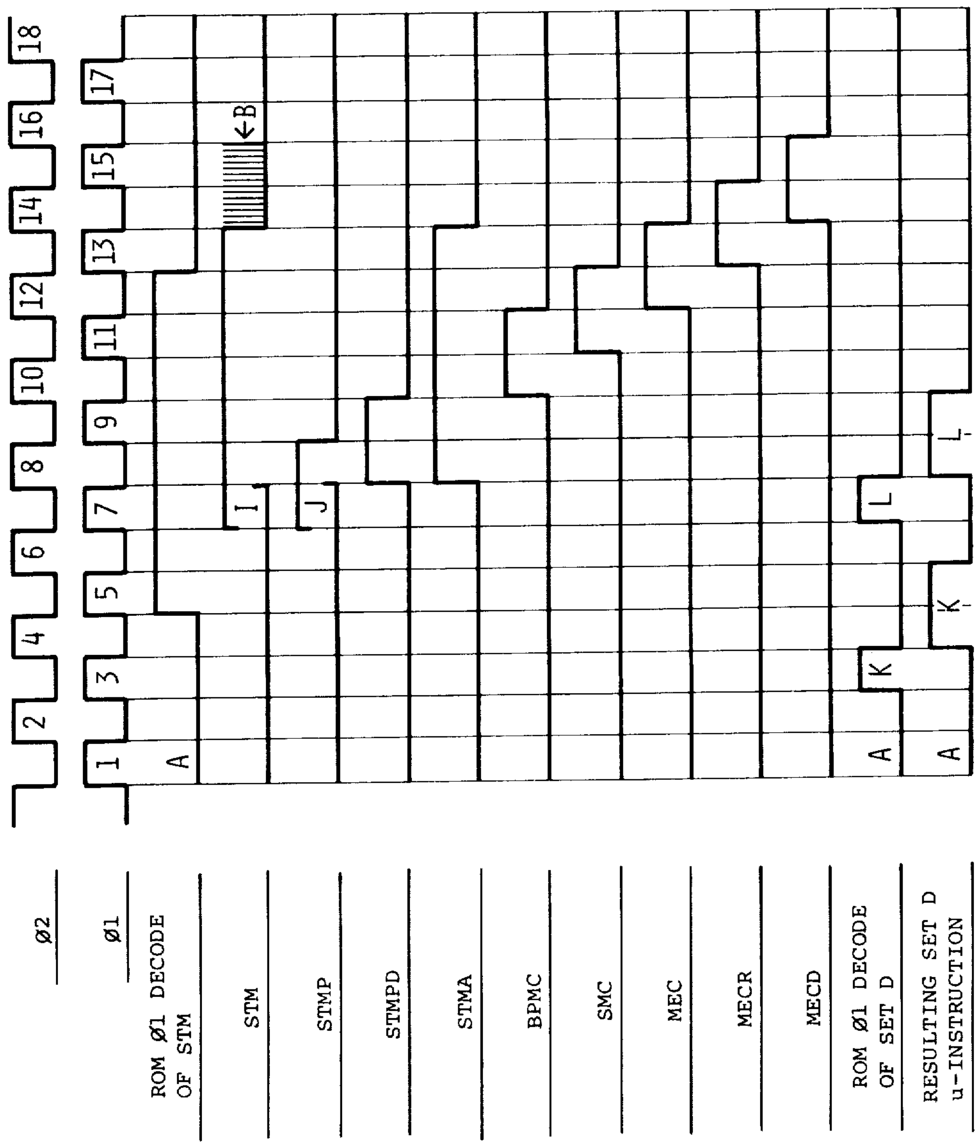
Figure 110C:
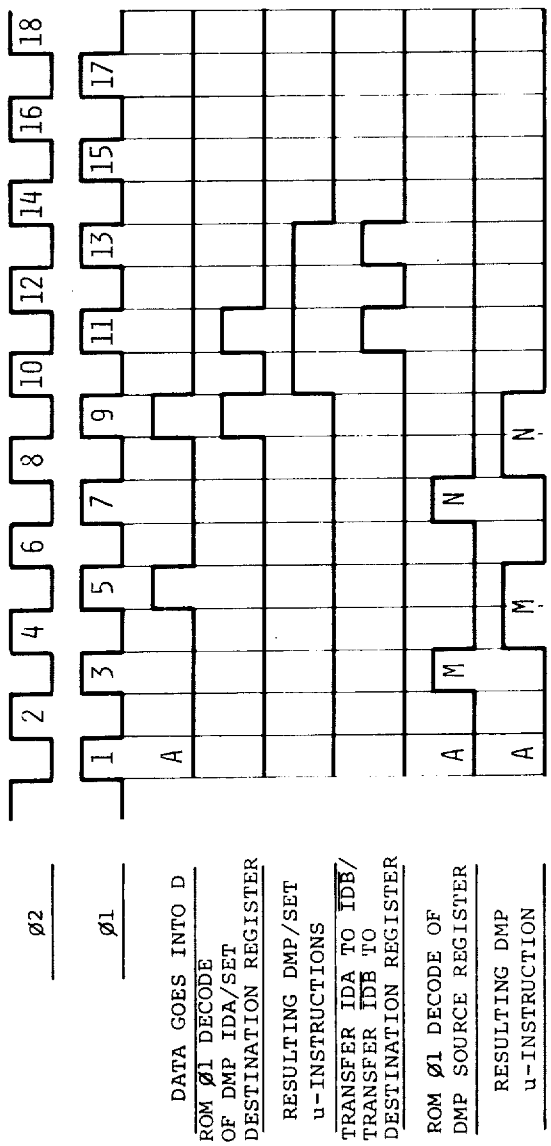
Figure 111A:
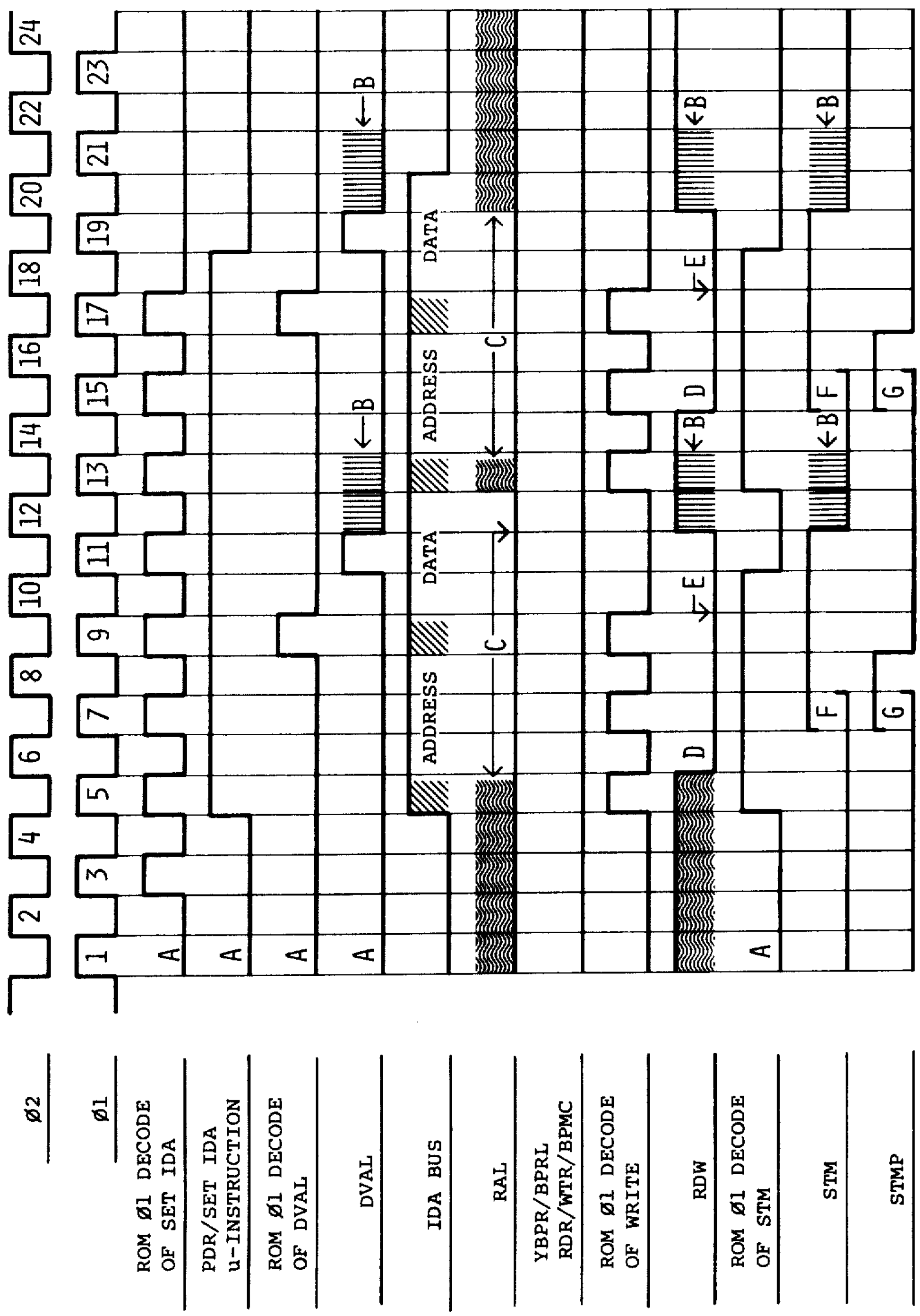
Figure 111B:
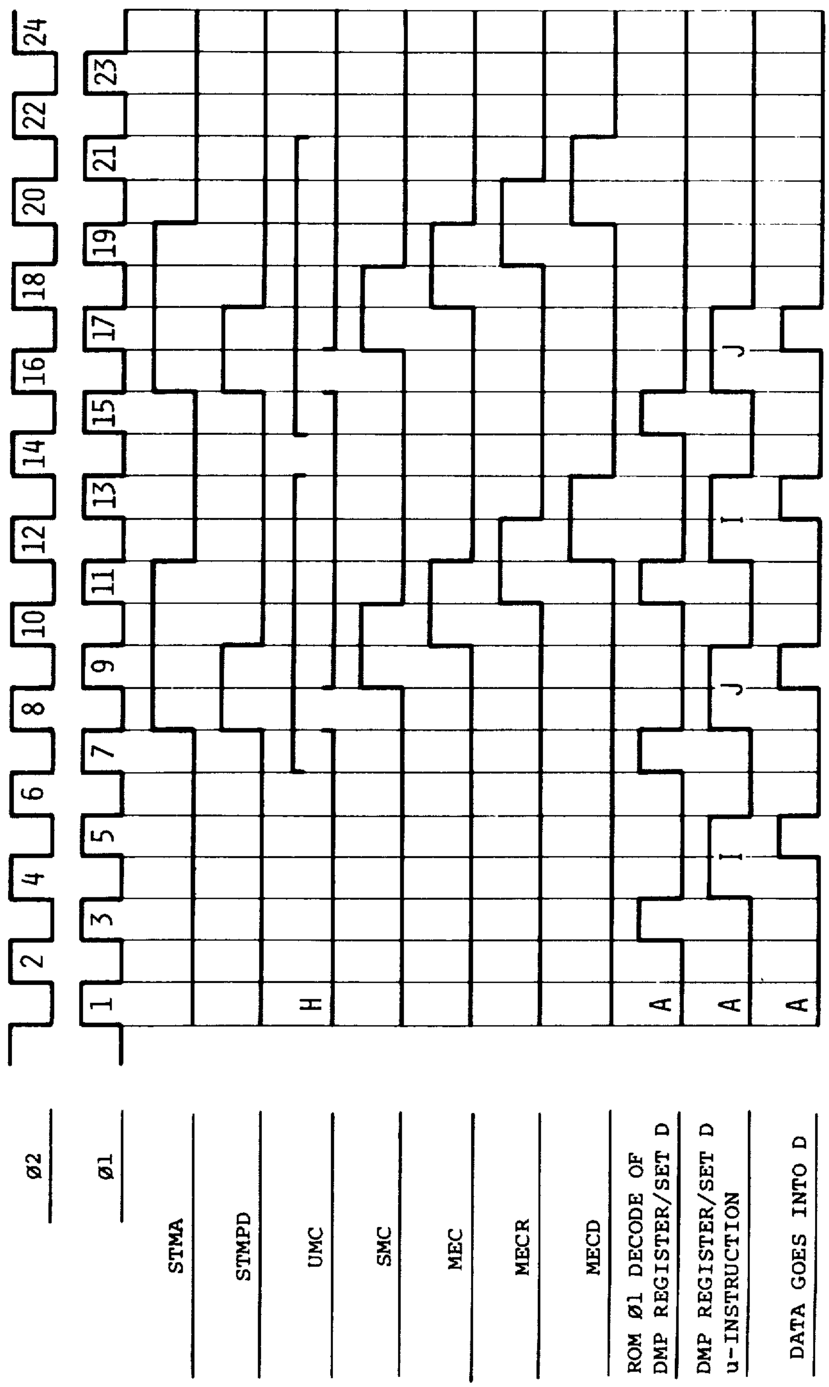
Figure 112:
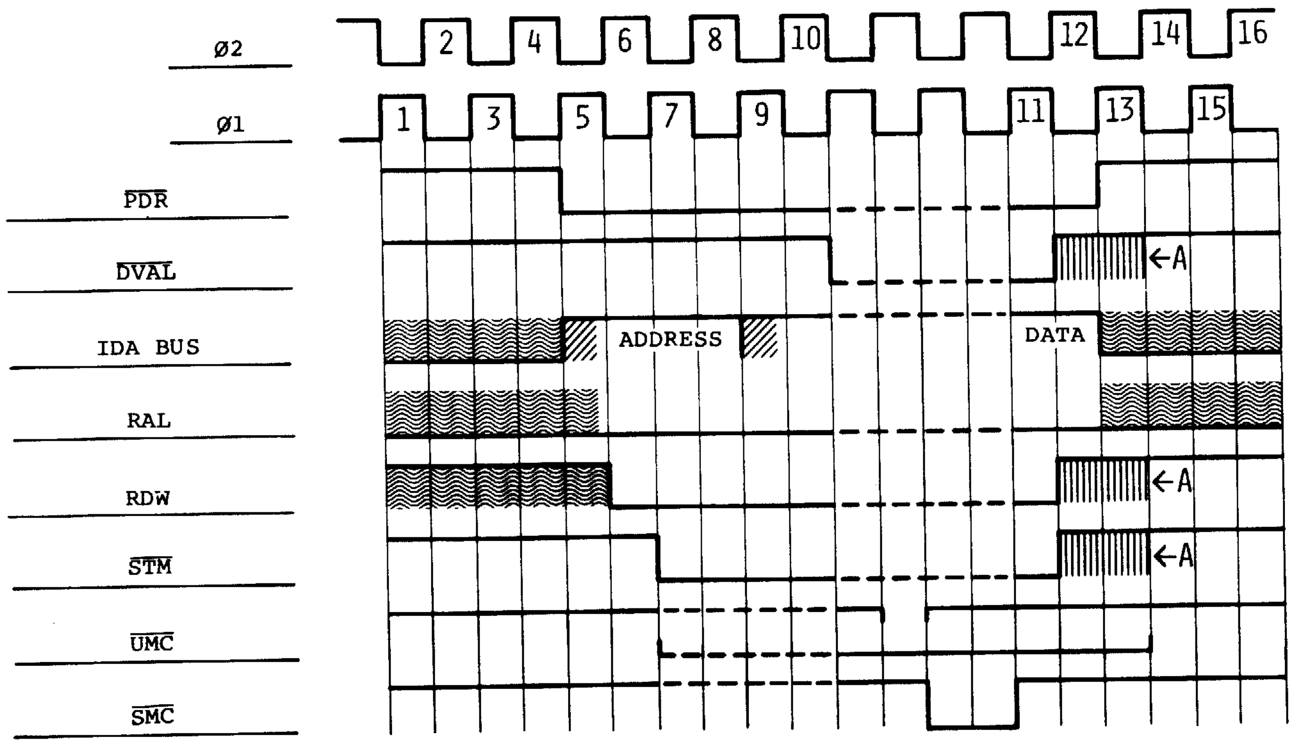
FIG. 112 is a waveform diagram illustrating a generalized BPC-originated write memory cycle not involving handshake.
Figure 113:
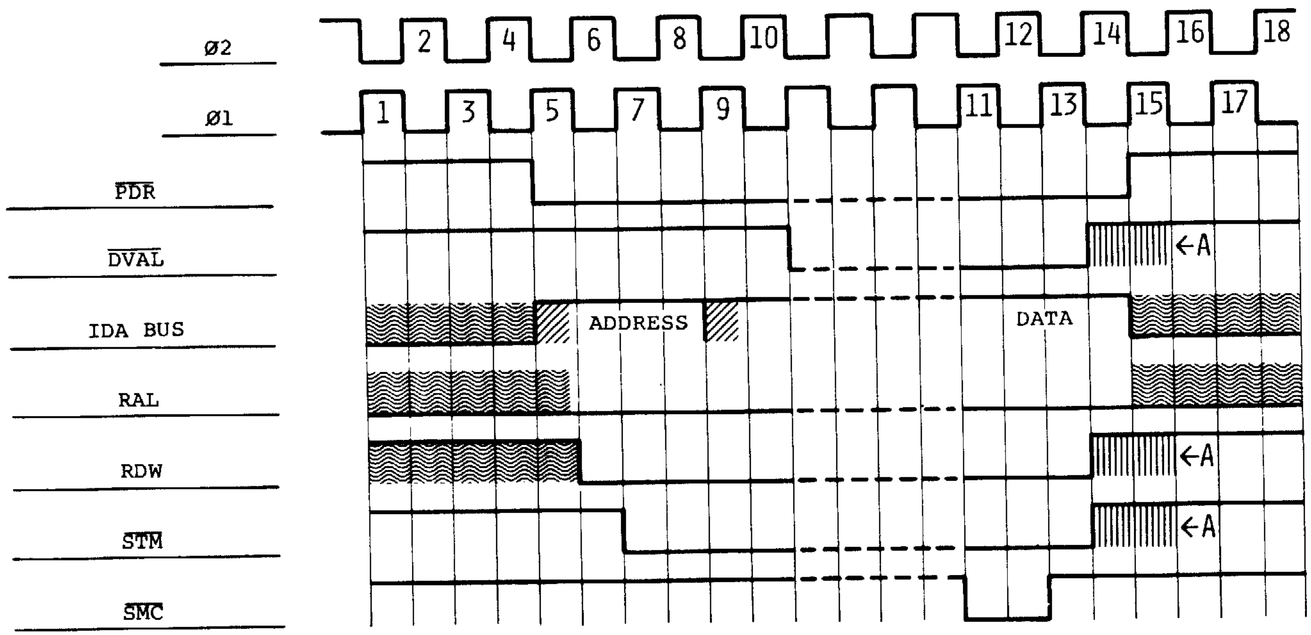
FIG. 113 is a waveform diagram illustrating a generalized 5-state BPC-originated write memory cycle with handshake.
Figure 114:
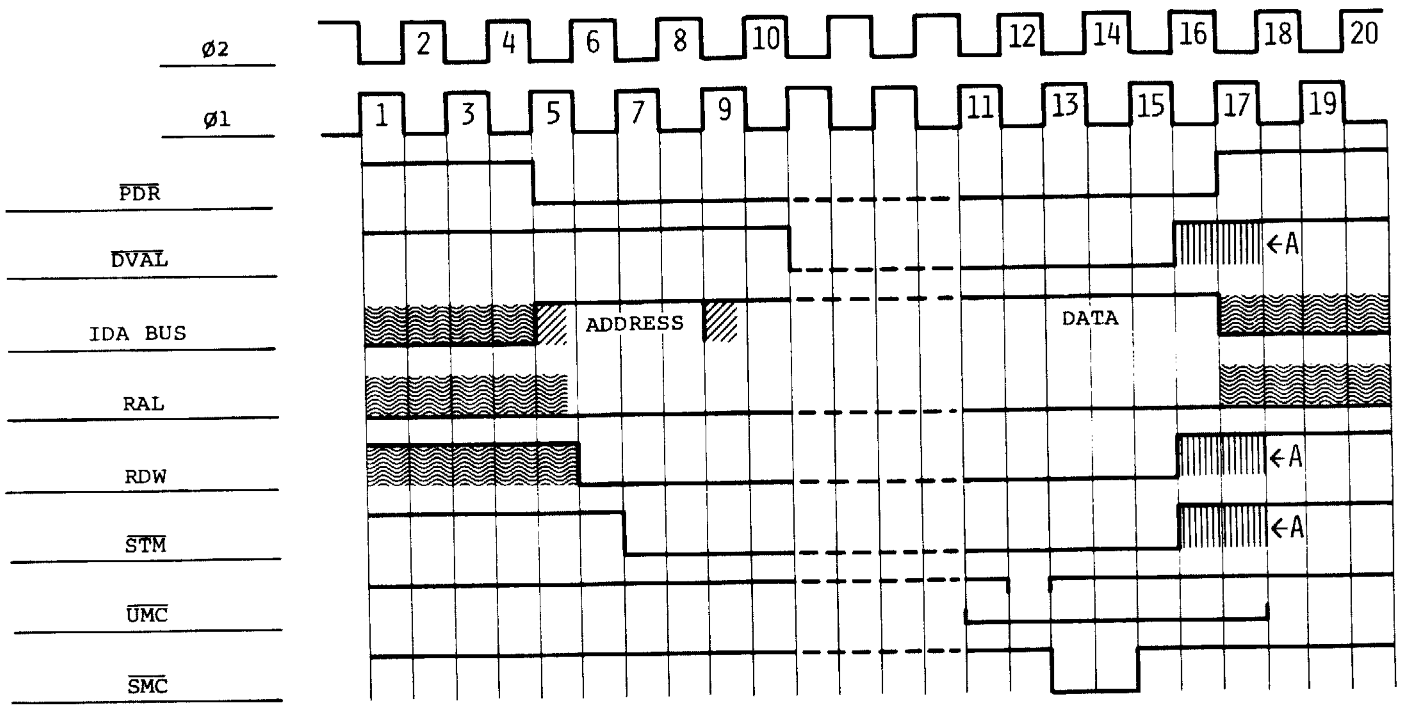
FIG. 114 is a waveform diagram illustrating a generalized 6-state BPC-originated write memory cycle with handshake.
Figure 115A:
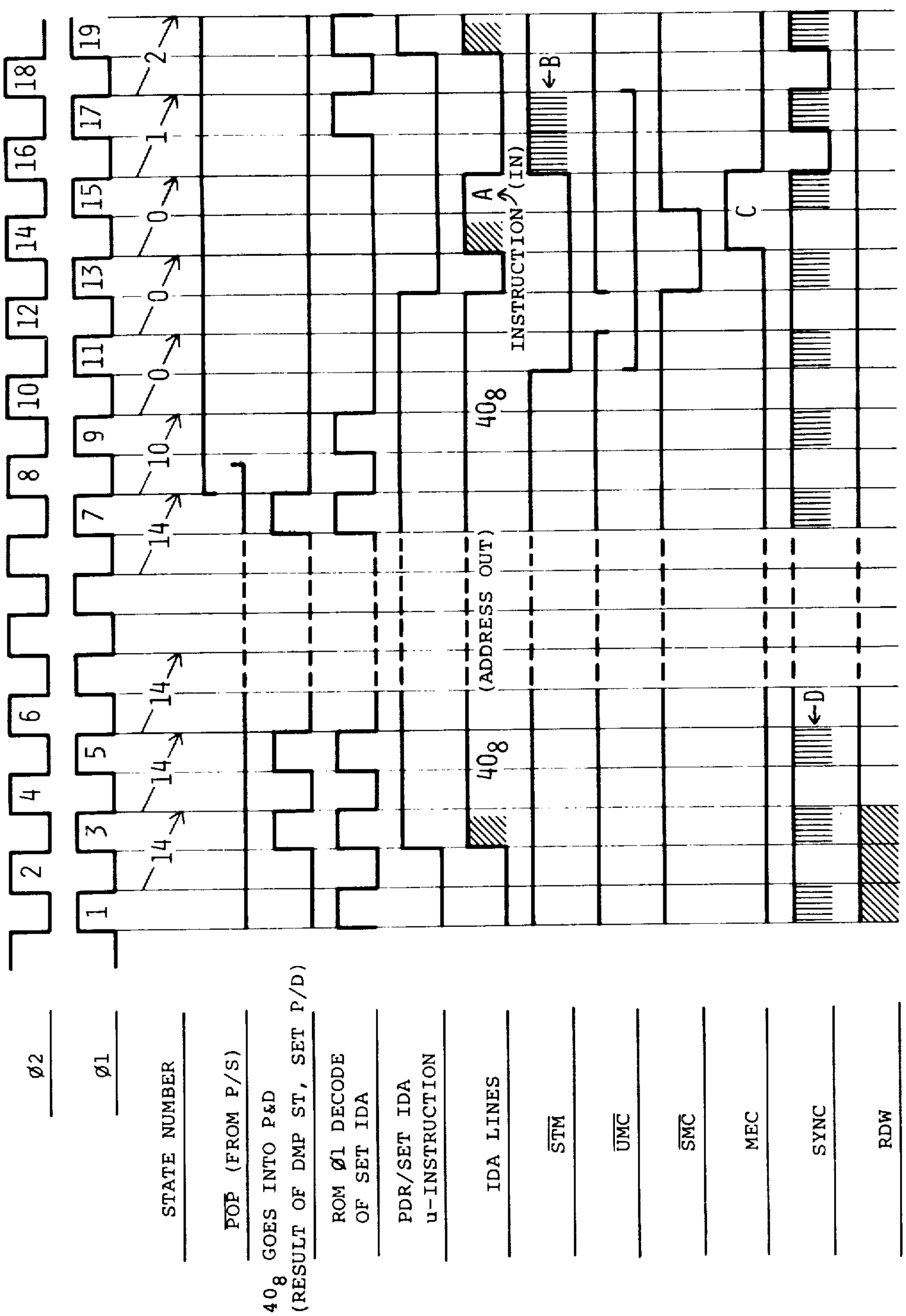
Figure 115B:
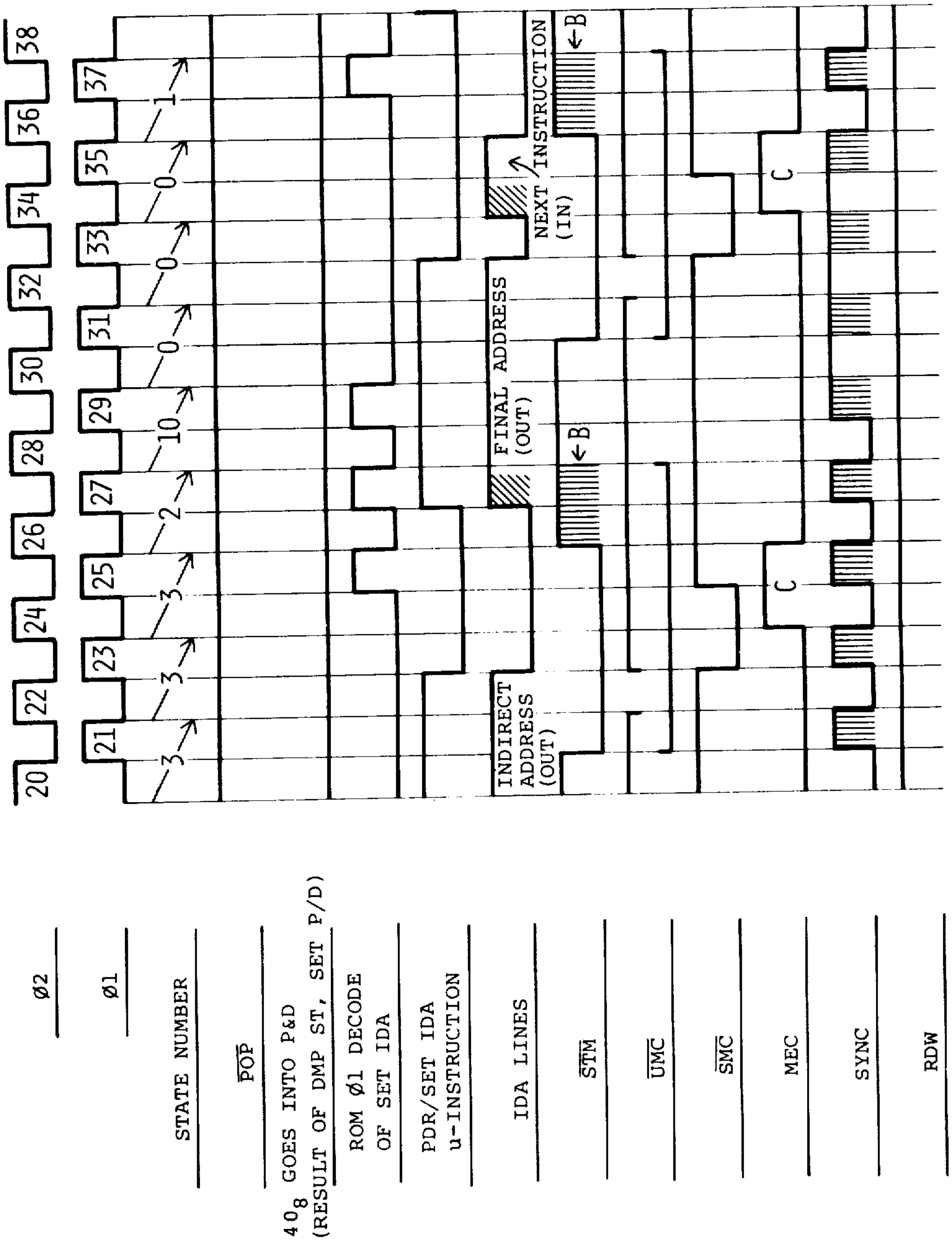

The Memory Timing and Control block of FIG. 16 may be understood with reference to the detailed schematic diagram of FIG. 131. This block comprises a small state counter, U21, which counts the number of states in the memory cycle. The counter initiates its sequence when the STM signal occurs if the memory cycle is referencing addresses located in the memory section (indicated by the RAL signal not being true). The counter is clocked on the rising edge of the phase two clock. On the first clock after the STM occurs, flip-flop U21A changes state and the STMROM signal is generated. Thus, the STM signal to the ROM is delayed by one-half of a state time to allow more address setup time as required by the ROM. On the next state time, the second flip-flop U21B is set provided that the Memory Busy (MEB) signal is not true. The Memory Busy signal is used to suspend the sequencing should the read/write memory be addressed and not be able to participate in the memory cycle immediately (such as being in a refresh cycle when the memory cycle starts). When the second flip-flop is set, the Unsynchronized Memory Complete (UMC) signal is generated to indicate to the microprocessor that the memory cycle is complete. FIG. 109 illustrates the timing associated with the memory cycle.

READ-ONLY MEMORY

Both the plug-in ROM memory section and the mainframe language ROM memory section shown in the block diagram of FIG. 4 are composed of a number of N-channel MOS sixteen-kilobit integrated circuits. These devices are organized as 1024 words of 16 bits and contain their own dynamic address latches and mask-programmable address decode circuits. The organization of the read-only memory section is shown in FIG. 132. The mainframe language ROM memory section contains twelve such devices. The plug-in ROM modules contain either two or four such devices depending on the features which the ROM module contains. An example of the ROM circuitry used in all the read-only memory sections is shown in FIG. 133. The 16-bit IDA bus input/outputs are used for receiving the address information from the microprocessor and for outputting the data accessed. When the STM input is not true, the ROM assumes that memory address information is on the IDA bus and continually inspects IDA bits 10 through 14 to determine if it has been addressed. The device is designed such that power consumption when not addressed is approximately one-tenth the consumption when addressed. Therefore, the power consumption in the calculator is reduced by applying the power to the device only when it is addressed. Consequently, each ROM device has an associated "power pulse" circuit 211 which is turned on by the ROM address decode circuit (powered separately from the +12 volts input) only when the ROM is addressed. If the ROM detects its address, it exerts the power pulse (PWP) output which switches on the transistor and applies +12 volts to the voltage switch (VSW) input that powers the balance of the ROM circuit. The ROM latches the address information and starts its data access when the STM signal (STMROM) is exerted. The accessed data is placed on the IDA bus as soon as it is accessed (approximately 300 ns) provided the output drivers are not disabled (Output Data Disable, ODD) by the bus control circuit.

READ/WRITE MEMORY

Both the basic read/write memory section and the optional read/write memory section shown in the block diagram of FIG. 4 are identical in structure. As shown in the detailed schematic diagram of FIG. 134, each section contains an address decoder U1 which examines the upper three bits of the address (IDA12 through IDA14) and generates one of three outputs depending on whether the address is 70K, 60K, or 50K octal. A jumper is used to select which address the memory section responds to thereby defining the memory section as the basic read/write section or the optional read/write section. The output of the address decoder is latched in U5 along with the balance of the address (U12, U14, U16) when the Start Memory (STM) signal occurs. The output of U5 is gated with the STM signal to generate the Request for service (REQ) signal which is sent to the read/write memory control circuit. The output of the address latches goes directly to the read/write memory devices with the exception of the lower six bits which first traverse a two-to-one data selector (U17 and U18). The other input of the data selector comes from the refresh address counter (U20 an U21). The lower six bits of the address are selected by a read/write memory control circuit (DATA SELECT) as determined by the read/write cycle being either a refresh cycle or a normal memory cycle. At the start of the refresh cycle, the read/write control circuit first increments the refresh address counter to advance it to the next memory address to be refreshed.

The read/write memory control circuit is shown in the detailed schematic diagram of FIG. 135. The state of the memory control is determined by the four flip-flops of devices U6 and U7. The flip-flops of U7 indicate that a refresh cycle is in progress. The waveforms associated with the control circuitry are shown in FIG. 136. The flip-flops are clocked on the positive-going edge of the phase two clock. When the STM signal occurs, flip-flop U6A will be set via U4A and U4B on the next clock provided neither flip-flop of U7 is set. The read/write memory devices are enabled (CEN) via U9A whenever either U6A or U6B are set. Whether the read/write memory devices perform a read or write operation is determined by gate U2A (RW). If the RW signal is a logical high, the read/write devices are in read mode. To generate the write mode, three conditions are necessary: the Write (WRIT) signal from the microprocessor must be logically true; a refresh cycle must not be in progress (U7A and U7B are not set); and the latch composed of gates U3C and U3D must be set (U3C output high). The latch is cleared by the Request (REQ) signal not being true. The latch is set at the beginning the next phase two clock following the setting of flip-flop U6B. If the memory cycle is a read cycle, the Output Buffer Enable (OBC) signal, which allows the output of the read/write memory devices to be placed on the IDA bus, is generated via U2C when the memory timing and control circuit removes the Stay Off Bus (SOB) signal.

The refresh cycle is initiated via gate U4B when the monostable U21 delay period has expired provided that the microprocessor is not requesting use of the memory. When the cycle is initiated, flip-flop U7A will be set which causes the read/write cycle by setting U6B via U4A and U4B on the next state time. Secondly, flip-flop U7A also generates the Memory Busy (MEB) signal via U2B and U3B to notify the memory timing and control circuit should the microprocessor start a memory cycle while the refresh cycle is in progress. Thirdly, flip-flop U7A also drives the RW signal, via U8B, to the read logic level as required by the read/write memory devices during the refresh cycle. The second flip-flop of the refresh cycle, U7B will be set the state time following the setting of flip-flop U6A to sustain the conditions required for the refresh cycle. When the read/write cycle has expired, indicated by flip-flop U6B resetting, the next state time flip-flop U7B resets thus terminating the refresh cycle.

The read/write memory devices, Texas Instruments devices TMS 4030 or equivalent, are shown in FIG. 137. The devices are organized as 4096 addresses of one bit. The read/write (RW) control signal determines if the operation is a read (RW high) or a write operation. If the cycle is a write cycle, the data written is accepted from the Data In (DIN) inputs. If the cycle is a read cycle, the data is presented at the Data Out (DOUT) outputs and will be placed onto the IDA bus when the Output Buffer Enable (OBE signal is generated by the read/write memory control. The read/write cycle is started when the Chip Enable (CEN) signal occurs provided that the devices have been selected by the Chip Select (CS) signal. The memory section is capable of byte operation as determined by flip-flop U5 and gates U8C and U8D. The memory bus control signal Byte (BYTE) from the microprocessor indicates if the memory operation is to be a byte operation. If the Byte signal does not occur, both bytes are enabled. If the byte signal does occur, the address bit IDA15, latched in U5B when STM occurs, will determine which byte is being referenced.

KDP CONTROL

Referring now to FIG. 138, there is shown a detailed schematic diagram of an I/O interface included within the KDP control block of FIG. 4. When the Initialize (INIT) signal on the I/O bus occurs, the power-up (PUP) signal is generated by the I/O interface and used throughout the KDP control circuitry to initialize the various flip-flops and counters. The I/O interface section contains the I/O operation decoder composed of the two three-to-eight decoders U21 and U29. The decoders are enabled whenever the KDP's peripheral address is detected by gate U17. Decoder U21 generates the read register 4 (R4) and read register 5 (R5) signals. The R4 signal is used to send the keycode information to the microprocessor. The R5 signal is used to send the KDP status information to the microprocessor. The status latch U53 as well as the gates to place the data on the I/O bus is located in the I/O interface section. Bit 0 indicates that the LED display unit contains 32 alphanumeric positions. Bit 1 indicates if the printer is out of paper. Bit 2 indicates that the printer is busy printing. Bit 3 indicates that the reset key on the keyboard has been depressed. Bit 4 indicates that the keyboard section is exerting the interrupt request signal (IRL).

The other decoder, U29, generates four register strobe signals, R4SB, W4SB, W5SB, and W6SB. The R4SB signal indicates to the keyboard scan control circuitry that the pending keycode has been accepted by the microprocessor. The W4SB signal loads the display character code from the microprocessor into the data register in the KDP memory section, causes the timing generator circuitry to generate the signals to store the character code in the read/write memory in the memory section, and causes the display control section to terminate displaying until all the new data has been received. The W6SB signal also loads the data register in the memory section with the printer character code, and causes the timing generator section to transfer the code to the read/write memory in the memory section. New printer data is not sent to the KDP control until the printer busy bit in the KDP status indicates to the microprocessor that the printer is no longer busy. The W5SB signal updates the "command register" of the KDP control. Bit 0 of the I/O command word generates the print (PRT) signal via gate U57A which sets the print command flip-flop located in the print control section. Bit 1 generates the display (DSP) signal via gate U51B which, similarly, set the display command flip-flop located in the display control section. Bit 2 is used to turn on an astable multivibrator (gates U30A and U30B) which produces the audio "beep" sound of the calculator. Bits 3 and 4 control the command register "run light" flip-flop U31A which turns on and off the "run light" located on the left side of the LED display unit. Since the flip-flop is JK type flip-flop, if both bits 3 and 4 are set, the run light will toggle to the opposite state. If bit 3 only is set, the run light will be turned off. If bit 4 only is set, the run light will be turned on. Similarly, bits 5 and 6 control the command register cursor flip-flop U31B which determines which type of cursor, insert or replace, symbol can be displayed in the LED display unit. If bit 5 only is set, the cursor will be the insert cursor. If bit 6 only is set, the cursor will be the replace cursor.

The switches on the calculator keyboard are single-pole, single-throw switches. The circuitry included within the KDP control block of FIG. 4 which scans for keyboard input and sends the information to the microprocessor via the I/O bus is shown in the detailed schematic diagram of FIG. 139. The keyboard scan counter U65A and U65B determines which key is being examined for closure. The counter is clocked at approximately a 2.5 KHz rate by an oscillator made of gates U37A and U37B and associated components. The lower four bits of the counter is decoded by U48 to select one of sixteen column select lines to the keyboard. The upper three bits of the counter are used by U57 to select one of eight row scan lines from the keyboard. Should the selected keyswitch be depressed, the column select output will be connected to the row select input and the output of the row selector (U57) will go to the logic low state indicating that a keyswitch closure has been detected.

When a key closure has been detected, flip-flop U27A will be set via inverter U36B. The complement output of flip-flop U27A inhibits the keyboard scan counter from counting further thereby saving the keycode for the key closure that was detected. The flip-flop also causes flip-flop U27B to become set via U39C. The output of flip-flop U27B then sets the latch U62 provided that an interrupt poll is not in progress (U56C). The output of the latch causes the low priority interrupt request (IRL) signal to the microprocessor to be set, thereby indicating that a key closure has been detected and that interrupt service is required. At the microprocessor's convenience the service routine is performed. The first operation of the service routine is to perform an interrupt poll to determine which I/O device is requesting service. The fact that the interrupt poll is taking place is indicated to the keyboard scan circuit by the Interrupt (INT) signal being exerted when peripheral address bit 3 (PA3) is logically false (poll of low level interrupt I/O devices). The keyboard scan circuit, since it has generated an interrupt request, responds by exerting the I/O bus data bit 0 (IOD0) which corresponds to its peripheral address via gate U61C. Upon determining that the keyboard scan circuit is interrupting, the microprocessor executes the keyboard service routine. During the service routine, an I/O cycle which reads R4 occurs. When the I/O cycle occurs, the keycode from the keyboard scan counter is placed on the I/O bus via the eight gates of U58 and U59. The I/O cycle also causes the Read Register 4 Strobe (R4SB) which U37C resets flip-flop U27B. The output of U27B will, in turn, set U27A, provided that the debounce counter U28 declares the key no longer closed, and thus allows the keyboard scanning to resume. The debounce counter is reset whenever a key closure occurs. As the key is released, the debounce counter will be reset each time a key bounce occurs until finally no further key bounce occurs and the debounce counter counts to the point that it enables gate U37D.

The keyboard scan circuit also has the automatic key repeat feature. The latch, composed of gates U39A and U39B is reset whenever no key closure is detected.

Likewise, the repeat counter U47 is held reset as long as no key closure is detected. When a key closure is detected, the repeat counter is allowed to start counting (but starts counting over again each time that a key bounce occurs as the key is closing). When the repeat counter's output pin 1 goes high, the latch composed of gates U39A and U39B is set and the repeat feature is enabled by enabling gate U39D. Thereafter each time U47 output pin 12 goes high, gate U39D will set flip-flop U27B thereby causing another interrupt request to occur. The delay time from the time the key is depressed to the time automatic repeating starts is determined by the time it takes after key closure, with no further bouncing, for U47 output pin 1 to go high followed by output pin 12 going high. The frequency of key repeat is determined by the frequency at which U47 output pin 12 toggles.

The keyboard also contains the Reset key which is handled separately from the keyboard scanning. When the Reset key is depressed, the KRST signal goes low and, after a time delay for key bounce caused by C22, R49, and R50, the input to inverter U40B goes low. The positive-going transition of inverter output U40B is differentiated by C21 and R47 to produce a pulse which becomes the I/O bus Reet (RESET) signal that reinitializes the microprocessor and I/O section. The output of the inverter, before the pulse formation, is sent to the KDP's status latch which the microprocessor can interrogate to determine if the initialization is a power-on initialization or a Reset key initialization.

The Shift and Shift Lock keys on the keyboard are handled separately from the scanning circuit. When either of the shift keys on the keyboard is depressed, the SHIFT signal resets the latch composed of gates U46A and U45C and sets flip-flop U56B which in turn will set I/O data bit 7 (IOD7) thereby indicating to the microprocessor that the shift key is depressed. If the shift lock key is depressed, the latch composed of gates U46A and U45C will be set to indicate that all further keycodes are shifted keycodes. The latch remains set until on the shift keys is depressed.

A KDP control timing generator included within the KDP control block of FIG. 4 is shown in the detailed schematic diagram of FIG. 140. The 6 MHz clock from the I/O bus is divided by four by flip-flops U66A and U62A to produce the KDP clock and the gated T clock generated at the output of gates U56A and U7C. The gated clock is disabled via gate U54B whenever either flip-flops U63B or U64B are set. Flip-flop U63B is set on the next KDP clock after a printer data word (indicated by W6SB) is sent to the KDP control. Similarly, flip-flop U64B is set on the next KDP clock after a display data word (indicated by W4SB) is sent the KDP control. The two flip-flops disable the T clock for only one state time since the output of each flip-flop clears flip-flops U63A and U63B, respectfully. During the state time that the T clock is disabled, the R/W signal (gate U55C) goes low during the second half of the state time and is used by the memory section to store the data just received into the KDP read/write memory. The three signals PLC (printer load clock), DLC (display load clock), and SPA (select printer address) is used by the printer control, display control, and memory sections to produce the correct address for storing the data just received into the KDP read/write memory. When new display or printer data is not being received, th PR (printer) signal is used to control the SPA signal so that either display or printer data can be read from the KDP memory.

The upper portion of FIG. 140 shows the circuitry which generates the basic timing signals used by the printer control, display control, and memory sections. The waveforms generated by this circuitry is shown in the waveform timing diagram of FIG. 141. Device U35 is a four-bit binary counter with a synchronous load control input (Texas Instruments device SN74LS163). The PR (printer) signal is present for eight state times and absent for six state times. The last state ime before each transition of PR, the P7 signal is generated by gate U46C for the full state time and the T7 signal is generated by gate U56B during the last half of the state time. Each time that P7 occurs, the binary counter will be loaded with the data on the A through D inputs on the next state time. If the PR signal is not true, the counter will be set to zero the next state time. If the PR signal is true, the counter will be set to a decimal ten on the next state. The use of these timing signals will be discussed in the following sections.

A read/write memory section of the KDP control block of FIG. 4 is shown in the detailed schematic diagram of FIG. 142. Central to the memory section is the KDP read/write memory which stores the display data. By designing the display control section to automatically refresh the display, the capability to inform the calculator user of what the calculator program is doing via display messages while the program is running is possible. More importantly, the design provides the basic requirement of live keyboard, i.e., displaying keyboard actions and results while a program is running. The read/write memory device U38 is Signetics device 82S09 which is capable of storing sixty-four 9-bit words. The memory is divided into two halfs by the select printer address (SPA) signal on the A5 input of the device. Thus the lower half of the memory stores the 32-character codes for the LED display unit and the upper 16 locations of the upper half stores the 16-character codes for the thermal printer unit. The data from the I/O data bus to be stored in the memory is first saved in the register composed of U43 and U52. The timing section then generates the R/W and SPA signals as necessary to transfer the data from the register into the proper location in the memory. When the KDP control is not receiving information from the I/O bus, the display and printer data in the read/write memory are alternately assessed to refresh the display. The printer data is only printed the one time after the print command is received by the I/O interface section. The address for the read/write memory is selected by the two-to-one data selector composed of U13 and U14. The two inputs to the data selector are the display character address and character column select and the printer character address and character row select. The character address information is used to address the read/write memory. The column and row select is used to address the dot pattern read-only memory U23. The read-only memory is comprised of devices that are organized as 2048 words of eight bits. The dot patterns for both the display and the printer are stored in the ROM. The most significant bit of the address (PR) is used to select whether the dot pattern is for the display or for the printer. The next seven bits of address select one of 128 possible symbols. The lowest three bits of address select the desired column or row of the symbol. Column data is needed for the display unit; row information is needed for the printer unit. The timing section is designed such that when a printer character is being processed by the printer control section, the address to the read/write memory is the next display character to be processed and vice versa. As shown in the timing diagram of FIG. 141, during the state times that the P7 signal occurs, the ROM is enabled (input CE of U23) and, as explained in the read-only memory section, the power pulse circuit composed of Q3 and associated components applies +12 volts to the main section of the ROM device. During the second half of the state time the T clock occurs and the ROM accesses the doat data addressed and presents it at the D outputs for use. At the end of the P7 state time the dot data is parallel loaded into the parallel-in/serial-out shift register composed of U22 and U18. During the following state times the dot data (DD) is shifted out of the shift register for use by the display or printer control sections. If the dot data is printer row data only five dot data bits are defined (five by seven printer matrix). For the display dot data, all seven bits are defined since the data is column information.

The most significant bit of the read/write memory is not used. The next most significant bit is used to inform the display control section that the cursor (CURSOR) is to be flashed in that character position. The outputs of the read/write memory are open-collector and require the external pull-up resistors to obtain the logic high state. This fact is used to advantage to generate the symbol for the insert cursor (character code zero). If the display symbol being accessed in the read/write memory is to have the cursor superimposed (read/write output bit 07 true), the display control section, if required, will cause the cursor enable (CE) signal to go high thereby switching off transistor Q4 and causing the output of the read/write memory to become the character code zero for the insert cursor.

A display control section of the KDP control block of FIG. 4 is shown in the detailed schematic diagram of FIG. 143. When the first data character of a new group of display data is sent to the KDP control, the W4SB associated with the transaction is used to trigger one-shot U16. The output of U16 via gate U9A clears binary counters U3 and U6 thereby initializing the counters to the first display character address of the read/write memory in the memory section. Also, via gate U7A, the output clears flip-flops U15B and U15A. In turn, the output of flip-flop U15A disables the column scan decoder U2 which blanks the display, disables gate U4A which enables gate U10D and allows the display load clock (DLC) from the timing section to increment the binary counter to the next display character address each time that a new display data character is received, and disables the one-shot U16 from being triggered again on the next data transfer. The display control section remains in the mode of receiving display data with the display blanked until the DSP signal is received.

When the DSP signal, part of the command word, is received from the I/0 interface section, the binary counters U3 and U6 are again cleared to start the display scan at the first display character address. Also, the DSP signal sets flip-flop U15B which clears flip-flops U12B and U32B thereby re-starting the flash cycle for the cursor and allows flip-flop U15A to be set on the next T7 clock. Once flip-flop U15A is set, the display control switches from the mode of receiving new data to the mode of displaying the data. Assume for the moment that the cursor is not displayed, in which case gate U5A is enabled to pass the serial display dot data (DD) through to the display connector and hence to the display. The LED display unit is composed of eight display devices that contain four display not matrices per device. A detailed block diagram of the display unit of FIG. 4 is shown in FIG. 144. The serial-in/parallel-out shift register (332) shifts in a new dot data bit each time that the clock signal occurs. When one column of dots for each character position has been received (244 bits), the scan line corresponding to the column data is enabled to cause the dots selected on those columns to light or not light according to the data in the shift register. The cycle is then repeated with each column in sequence. Counter U1 and decoder U2 determine which column is selected. The timing relationship between the waveforms that result from a display of all LED columns is shown in FIG. 145. Since binary counter U3 starts with a count of zero at the beginning of the display cycle, both gates U5B and U9C will enable gate U4B. Gate U9B allows the T clOck to become the series of display clocks shown in the first three lines of FIG. 145. The display size (SIZE) signal via gate U5B will disable the last sixteen series of display clocks (shown on line two) if the display is only a sixteen character display. The upper three bits of the binary counter U3 and decoding gate U9C further allow the display clocks only when the three bits are zeros. The balance of the time the column scan decoder U2 is allowed to operate. The divide-by-five column counter U1 determines which column is being scanned. It is not initialized as it makes no difference which column is scanned first since all columns will eventually be scanned. Each time that counter U3 "rolls over", the column counter U1 will be incremented to the next column.

The display cursor logic is shown at the upper left portion of FIG. 143. The cursor flash frequency is determined by the astable multivibrator composed of gates U8A, U8B, and U8C which is divided by four by flip-flops U12B and U32B. When the Q-not output of flip-flops U32B is a logical high, the cursor symbol is enabled for disabling. The command register in the I/O interface section enables either gate U11A or U11B depending on whether the insert (INS) or replace (RPL) cursor is selected. As discussed in the memory section above, the cursor (CURSOR) output from the read/write memory indicates when the particular character being accessed from the read/write memory is to also have the flashing cursor. If the insert cursor is selected, the cursor enable (CE) signal is generated which forces the output of the read/write memory to assume the insert cursor code. If the replace cursor is selected, the flip-flop U12A is used to save the cursor signal so that it will be available when the character dot pattern is sent to the display unit. The replace cursor lights all dots in each column of the character matrix which is achieved by gate U11B disabling U5A when the cursor is to be displayed thereby forcing the serial display data to the state that lights all dots on the column.

A printer control section of the KDP control block of FIG. 4 is shown in the detailed schematic diagram of FIG. 146A. Assume as an initial condition that flip-flops U44A and U44B and binary counter U33 have just been cleared by gate U54C. Since the output of flip-flop U44B is a low, decimal counters U24, U25, and U26 and flip-flop U32A wil be cleared, printer scan decoder U41 will be disabled, printer paper advance (ADV) solenoid will be de-energized via gate U7B, and gate U17B will be disabled thereby enabling gate U10B to pass the printer load clock (PLC). Hence, no printing action will occur and the printer control is in the data receiving mode. The binary counter U33 provides the printer character address to the read/write memory in the memory section. Each time that printer data is received by the KDP control, the timing section produces the printer load clock (PLC) to advance the binary counter U33 (via gate U10B) to the next printer character address so that the next address will be ready when the next printer character code is received. The PLC clock also clocks the other binary counters U26, U25, and U24 as well as flip-flop U32A but since the counters are connected in cascade (ripple carry output to enable inputs of next stage) none of the counters will change state because flip-flop U32A is clear. The printer control section will remain in the data receiving mode until the PRT command signal is received from the I/O interface section.

When the PRT signal is received, flip-flop U44A will be set and at the end of the next T7 clock flip-flop U44B will be set indicating that the printer control section is in the print mode. To understand the timing that the printer conrol section generates, it is first necessary to understand the requirements of the thermal printer unit. A block diagram of the thermal printer of FIG. 4 is shown in FIG. 147. The print head circuit comprises an off-the-shelf twenty-bit serial-in/parallel-out shift register whose inputs are DATA and CLOCK. The output of each group of five bits goes to a 5-of-20 demultiplexer. Each demultiplexer routes its five input bits to one of four print head positions. Each print head position contains five dot resistors which "burn" the paper to produce the printing. The four input scan signals (S1 through S4) determine which of the head positions the demultiplexer selects. The sequence of operation is for the printer control to send the dot information for the first, fifth, ninth, and thirteenth character positions and generate the first scan signal which "burns" the paper for the proper length of time. The procedure is then repeated for each of the other scan signals in sequence. When the four scans are completed, the paper advance solenoid which as been energized ("cocked") during the four scan operations is de-energized and a fifth time period is required to allow the paper to advance and settle.

Returning now to the printer control circuitry, FIGS. 148A–B show the timing relationship of various waveforms associated with the printer control circuitry of FIG. 146A. Binary counter U33 counts the sixteen character positions. Outputs QB and QC of decimal counter U25 determines which scan is taking place via scan decoder U41. Notice that the counter's output also goes to integrated circuit U34. Device U34 is a four-bit magnitude comparator which generates a positive-true output as output A=B whenever the four bits input at the A inputs is equal to the four bits input at the B inputs. The output is used to enable the T clocks to pass through gate U5C to become the printer clocks. Notice that inputs A0 and A1 are tied to a logic one. Consequently, inputs B0 and B1 can be used to shut off the clocks to the printer. The four gates U19A, U19B, U19C, and U7D combine logically with inputs B0 and B1 to form a disable function such that if any input to U19A, U19B, or U19C is a logic high, the clocks to the printer are disabled. Therefore, let each input to gates U19A, U19B, and U19C be taken to form a counter whose decimal count is shown in FIG. 148B. The state number associated with each count is shown immediately above the decimal count. The outputs which define the decimal count are the output from flip-flop U32A, the four outputs of U26, and the QA output of U25. Notice that the feedback generated by gates U5D and U46B causes the counting sequence to change from decimal count 11 to 16 during state numbers 12 and 13 and again from count 43 to 48 during state numbers 28 and 29. Note also that counter U26 is a decimal counter which causes the count to change from count 19 to 32 during state numbers 16 and 17 and again from count 43 to 48 during state numbers 28 and 29. Thus, the total number of states for one scan is 32.

Only during the first state (decimal count zero) are the T clocks allowed to pass through gate U5C to become the printer clocks. Binary counter U33 counts the sixteen character positions of the printer. For the first scan, input B2 and B3 of comparator U34 are both zero. Therefore, as the character counter U33 counts through the sixteen character positions, only the first, fifth, ninth, and thirteenth characters are sent to the printer. For the next scan, only the second, sixth, tenth, and fourteenth characters are sent to the printer. A similar pattern occurs for scans three and four. These waveforms for each scan are shown in FIG. 148A. After the character counter has counted through sixteen counts, flip-flop U32A will be set and via gate U19A further clocks to the printer will be disabled.

The scan signals are shown in FIG. 148B. The scan decoder U41 is enabled by flip-flop U44B, QD output of U24, and the burn control output (BCO). A printer burn control circuit within the KDP control block of FIG. 4 is shown in the detailed schematic diagram of FIG. 146B. Devices U50D, U50C, and associated components form an oscillator whose duty cycle depends on the unregulated +20 volts. The output of the oscillator turns switch Q4 on and off which in turn charges capacitor C27 through resistors R66 and R67. The higher the +20 volts, the slower that capacitor C27 will be charged. Devices U50B, Q15, Q16, and associated components form another oscillator which operates at a frequency of approximately one-tenth that of the U50D oscillator. The purpose of this oscillator is to discharge capacitor C27. The voltage across C27 is input through R67 to the non-inverting input of comparator U50A. The other input of the comparator is a reference voltage. The reference voltage can be modified by the print intensity adjustment, the print head thermister, and resistor R63 which is switched in when FET Q12 is turned-on. The output of the comparator U50A is the burn control output (BCO) signal which alternatively switches the printer scan signals on and off. The BCO signal is a negative-true signal whose duty cycle is inversely proportional to approximately the square of the unregulated +20 volts, thereby providing an almost constant power dissipation for the print head resistors. The print temperature control (PTC) signal from gate U7D of the printer control section modifies the duty cycle of the burn control to allow a fast rise time for the temperature of the print head resistors during state numbers 1 through 12 of the scan time followed by an approximately constant temperature for the print head resistors during the second portion of the scan period.

When the fourth scan is completed, the QD output of U25 will become set. The output disables the scan decoder U41, disables the current drive to the advance solenoid, and disables the counter feedback gate U46B. The paper then advances to the next line. The time allowed for the advance (40 state times) is longer than the scan time due to the disabling of the feedback gate U46B.

Decimal counter U24 is used to determine which row of the character is selected. For the first row, the dot information read out of the read/only memory section is all spaces. The next seven rows are the seven rows of the five-by-seven dot matrix. The last two rows are again all spaces to provide the separation between the characters on successive lines. For the last two rows, output QD of decimal counter U24 (counts eight and nine) will be a high thereby disabling the scan decoder during those two rows. At the end of the tenth row, the QD output will return to a logic low which via capacitor C16 clears flip-flops U44A and U44B ending the print mode.

CASSETTE CONTROL

The cassette control circuitry of FIG. 4 provides the interface between the microprocessor and the cassette transport hardware. The control circuitry can be divided into four sections. One section is the I/O interface section which provides the interface between the I/O bus and the rest of the cassette control circuitry. Another section is the tape section which provides the motor drive electronics that causes the movement of the magnetic tape. A third section is the read electronics section which detects flux transitions on the magnetic tape and decodes it into bit serial digital data which is sent to the microprocessor. The delta distance code is used to represent digital information on the magnetic tape. This code represents a zero on the magnetic tape by a short distance between flux transitions and a one by a long distance between flux transitions. The fourth section is the write electronics section which encodes bit serial digital data from the microprocessor into a seires of flux transitions on the magnetic tape.

The cassette control I/O interface section is shown in the detailed schematic diagram of FIGS. 149A-C. The I/O interface section contains an I/O operation decoder composed of a dual three-to-eight decoder U3 and associated gates. The decoder is enabled whenever the peripheral address lines indicate peripheral address one and an interrupt (INT) poll is not occurring. One section of the decoder decodes the I/O read operations; the other section decodes the I/O write operations. A write to memory address seven (W7) clears the servo-fail flip-flop U7B and the cartridge out flip-flop U7A as shown in FIG. 149C. The servo-fail flip-flop is set by the servo section. The cartridge out flip-flop is set when the cartridge-in microswitch opens due to the cartridge being removed from the transport assembly. A write to memory address six (W6), which occurs during the last I/O DMA operation, sets the search complete flip-flop U9A and clears the DMA request enable flip-flop U9B. A write to memory address five (W5) latches the primary command information from the microprocessor into the eight-bit command latch U1 shown in FIG. 149B. The command latch is also cleared to its initial state by the Initialize (INIT) signal when the calculator is turned on. The figure shows the information assigned to each bit. A write to memory address four (W4) causes the bit serial data to be written on the magnetic tape (sent on I/O bus line IOD0) to be latched into flip-flop U13A and clears the flag flip-flop U13B.

A read of R6 (R6SB) causes the beginning/end of tape flip-flop U15A to be cleared. The flip-flop is set whenever a hole is detected in the magnetic tape as shown in FIG. 150. A hole is detected by allowing light to pass through the hole to reach a phototransistor. The signal from the phototransistor is applied to an op-amp U4 which compares the signal to a level which is approximately 30% of the peak level. The transistor Q4 changes the op-amp output to voltage levels compatible with the input requirements of the beginning/end of tape flip-flop.

A read of R5 (R5) causes the cassette status data, held stable by latch U16 of FIG. 149B, to be sent to the micropressor. The data assigned to each bit is shown in the figure. A read of R4 (R4SB) causes the data decoded from the magnetic tape (RDT) to be sent to the microprocessor (gate U12F) and clears the flag flip-flop U13B shown in FIG. 149C. The flag flip-flop is used to indicate the presence of either servo tach information (output of flip-flop U15B) or the presence of read data (RWF) from the magnetic tape as selected by the command bit 3 (TAC) of the command latch U1. Similarly, the I/O status (STS) signal is used to indicate either the presence of a gap on the magnetic tape (when in the normal mode as indicated by search/normal bit of the command latch U1) or the fact that the search operation has ended when in the search mode. The search operation is terminated (indicated by gate U6A) by either having a servo-fail signal (flip-flop U7B) or a cartridge out signal (flip-flop U7A) or a beginning/end of tape encounter (flip-flop U15A) or a normal completion caused by an I/O write operation to R6 setting the search complete flip-flop U9A. Conversely, if none of the four conditions have occurred and the run command (command bit 7) is true, the GO signal is generated via gate U5B which informs the servo section that the motor is to run.

The cassette control servo section is shown in the detailed schematic diagram of FIGS. 151A-C. The servo system is designed to provide tape speeds of +/− 22 ips and +/− 90 ips at +/− 5%. The transition between these speeds is at a constant acceleration of +/− 1200 in/sec/sec which corresponds to approximately 18 ms to accelerate from 0 to 22 ips. In addition to speed control, the servo section provides the tape moving (MVG), a tachometer pulses (TAC), and servo-fail detect (SFD) signals as status information for the microprocessor. The input signals from the I/O interface section are the GO signal which indicates that tape movement is to occur, the Fast (FST) signal which indicates the higher speed is desired, and the REVerse signal which indicates the direction of tape movement.

Referring to FIG. 151A, the reference generator composed of the input circuitry associated with U25A converts the digital input signals GO, FST, and REV to analog voltages for input to the controlled-slew-rate amplifier composed of U25A and U25B. The slew rate is a function of the voltage of the zeners diodes CR7 and CR8, resistor R49, and capacitor C29. The slew rate is approximately 100 v/sec. The steady-state voltage gain of the amplifier is either +1.5 or −1.5 as determined by the digital input REV signal. The steady state output voltage is 0, +/−2, or +/−7 volts depending, respectively, on whether GO is logically flase, GO is true and FST is false, or G is true and FST is true. The output voltage will be referred to as the "forcing function (Vff)". It is applied via R79 to the summing junction of the servo loop which is at the inverting input of U28B. The forcing function is also applied to the dead-band detector circuit.

The dead-band detector circuit is composed of the two voltage comparators U21C and U21D and associated components. Since these comparators operate from 0 to 5 volts, the forcing function is first level-shifted to provide compatibility with the comparators. If the shifted level is above the reference of U21D, the moving reverse (MRV) signal is generated. If the shifted level is below the reference level of U21C, the moving forward (MFD) signal is generated. If either the MRV or MFD signals are generated, the moving (MVG) signal is also generated. This signal indicates that the forcing function is indicating a motor speed of greater than 2 ips. The moving signal is used to light the run LED on the transport assembly which indicates to the user that the motor is operating and is sent to the status latch in the I/O interface section for use by the microprocessor. Also, the absence of the moving signal is used to turn off the drive to the motor to prevent the motor from creeping due to small offset voltages in the sytem.

The feedback voltage Vfb from the tachometer associated with the motor is also applied via R78 to the servo loop summing junction, as shown in FIG. 151B. The feedback voltage is proportional to the angular velocity of the motor and is generated by an optical tachometer, as shown in FIG. 151C. The optical tachometer consists of a light source, a 1000 line disk and a phototransistor. A signal (23 KHz at 22 ips) is amplified by the op-amp U3 and applied to the bidirectional one-shop (Signetics device 8T20 or equivalent shown in FIG. 151B) which generates 2 us pulses. These pulses occur on both polarities of the waveform such that the repetition rate of the output pulses is twice the input frequency (46 KHz at 22 ips). The pulses are applied to a second-order low pass filter, composed of L2 and C42, which has a bandpass of 2.25 KHz. The output of the filter is a positive DC voltage which is proportional to the angular velocity of the motor. (The ripple of the DC voltage does not have an adverse effect upon the motor speed since its frequency components are much higher than the bandwidth of the system.) The output of the filter is amplified by U28A with a gain of either +3 or −3 in a circuit configuration similar to the configuration used to generate the forcing function. The polarity of the gain in this case is determined by the MRV (moving reverse) and MFD (moving forward) signals generated by the dead-band detector circuit.

The feedback from the summing junction op-amp U28B is also applied to the summing junction. The feedback provides most of the open loop gain and introduces a zero at 5 Hz that matches the mechanical pole of the motor. The closed loop gain of Vfb/Vff is 0.6 with a bandwidth of approximately 200 Hz. The motor driver amplifier, composed of transistors Q3, Q4, Q9, and Q10 and associated components (shown in FIG. 151C), provides a voltage gain of 2.46 as determined by the feedback resistors R62 and R61. As mentioned earlier, the moving (MVG) signal from the dead-band detect circuit is used to disable the drivers if the moving signal is logically false to prevent the motor from creeping due to small offset voltages in the system as well as to insure stability during the zero speed crossover region. Also, the INIT signal is used to disable the drivers to prevent spurious movement of the tape during calculator turn-on and turn-off. The maximum average power dissipated from either darlington driver is 13 watts. This assumes a worse case duty cycle of 80% and a maximum average supply voltage of 23 volts.

The servo-fail detect circuit, composed of U21 and associated components, senses both the voltage to and current through the motor. Both the voltage and current sense inputs are filtered such that an overload condition is not detected during acceleration. The output of the circuit sets the servo-fail flip-flop in the I/O interface section which in turn causes the GO input signal to be removed thereby protecting the motor from overload.

The write electronics section of the cassette control block of FIG. 4 is shown in the detailed schematic diagram of FIG. 152. The inputs to the section come from the I/O interface section and are the bit to be encoded (BSD), the write command (WRT), the track to written on (TRKB), and the mode command (MOD). Outputs from the section are the flux transitions on the magnetic tape, and the read/write flag (RWF) to I/O interface flag flip-flop which indicates that another bit of data may be sent.

The encoder portion of the write electronics section is composed of flip-flops U30A and U30B, astable multivibrator U29, and one-shot U31B with associated gates. The section is initialized whenever the WRT signal is false. Both the data bit flip-flop U30A and the write data flip-flop U30B are preset by the WRT signal. Also, via gate U35C and open-collector inverter U34D, the WRT signal discharges the timing capacitor C50 associated with the astable multivibrator U29. The one-shot U31B is shared between the encoder and the decoder. Its other input (input A) is forced to the enable state during write operations by the WRT signal. When the WRT signal becomes true and the MOD signal is false, the output of the astable multivibrator is allowed to oscillate. The period of the first oscillation of the multivibrator is determined by C50, R87, and R88. When the first oscillation is complete, the one-shop U31B wil be triggered which signals the end of a data bit time. The output of the one-shot causes a flux transition on the magnetic tape by toggling the write data flip-flop U30B, loads the next data bit on the BSD line into data bit flip-flop U30A, and sets the I/O interface section flag flip-flop to indicate that another bit may now be sent by the microprocessor. The output of data bit flip-flop U30A determines the time constant of the astable multivibrator by either switching in or switching out resistor R88. The period of the astable is short if the flip-flop contains a zero and long if the flip-flop contains a one.

The output of the write data flip-flop U30B is sent to the magnetic tape read/write circuitry. The read/write head provides for two tracks on the tape; track A and track B. A high-voltage open-collector output BCD-to-decimal decoder U1 (Texas Instruments device SN7445 or equivalent) is used as a one-of-eight decoder to select the track, whether a read or write operation is to occur, and, if a write operation is selected, which direction current flow through the head is to occur. Hence, the decoder inputs are TRB (track B), WRT (write), and WDT (write data). The TRB signal determines the track by enabling outputs 4, 5, 6, and 7 or outputs 0, 1, 2, and 3. The WRT signal selects the "write" outputs 2, 3, 6, and 7 rather than the read outputs 0, 1, 4, and 5. Since the "read" outputs are not enabled, the four FET switches Q1 through Q4 are turned off and the read circuitry is disconnected from the tape head. (The regulated turn off bias for the switches is generated by a voltage doubler circuit located in the servo section.) When the WRT signal goes high, transistor Q5 is turned on which, in turn, turns on the current source composed of Q6 and associated resistors. The direction of current flow through the head from the current source to the decoder output is determined by the write data (WDT) signal input to the decoder. Each time the WDT signal changes levels the direction of the flux on the magnetic tape is reversed due to the current flow through the head changing directions. The Initialize (INIT) signal is logically ORed with the WRT signal (via CR4) to turn off the current source and prevent spurious write currents through the head during a calculator turn-on or turn-off.

The read electronics section of the cassette control block of FIG. 4 is shown in the detailed schematic diagram of FIGS. 153A–B. The inputs to the read electronics is the TRB (track B) signal which determines which track is to be read, the WRT (write) signal which disables the write section and enables the read section, the analog signal from the magnetic tape head, and the FST (fast) and MOD (mode) signals which determine the threshold level associated with the analog head signal. The outputs are the bit serial read data (RDT) to the I/O interface and the read/write flag (RWT) to the I/O interface flag flip-flop.

When information on the tape is being read, the BCD-to-decimal decoder U1 of FIG. 152 selects outputs 0 or 1 or outputs 4 or 5 thereby turning on FET switches Q1 and Q2 or switches Q3 and Q4, respectively. The appropriate tape read head is then connected to the pre-amplifier U2. The preamp provides a nominal gain of −20. Since the output from the read head can vary as much as +/−25%, the gain is adjusted by selecting R5 such that the output of the preamp is 300 mV PP. The bandwidth of the preamp is at least 110 KHz. The read waveform from the magnetic head contains predominate frequencies of 10.6 KHz and 17.6 KHz when the tape speed is at 22 ips for one's and zero's, respectively. A significant amount of information is contained in the 3rd harmonics of these waveforms. The frequency is increased to 72 KHz when the tape speed is at 90 ips. However, at 90 ips, only gap information (the absence of flux transitions) is being searched for and no data is recovered at that speed. The signal from the preamp is applied to the input of an active second-order Butterworth low pass filter composed of U17 and associated components. The filter has a bandwidth of 55 KHz which limits the noise susceptibility but at the same time does not increase the peak shift excessively. The filter has a gain of 6.7 which produces a nominal output of 2 Vpp. The output of the filter is applied to a differentiator (C14 and R5) and a threshold detector composed of U22 and associated components. The differentiator attenuates the signal (10.6 KHz) by a factor of 9, while the following amplifier U18 provides a gain of 9 and a low impedance output. The output of U18 is applied to a dual comparator U10 which detects a zero crossing condition. The two comparators are only enabled during the appropriate +/− threshold to increase the noise immunity. The output from the zero crossing detector is applied to the clock input of a D-type flip-flop U27 while the clear and D inputs are connected to the threshold (THD) signal from the threshold detector. This configuration prevents a glitch (multiple transitions) from occurring on the output of the flip-flop since the only way possible for the output to go high is for the clock input to go high while the THD signal is high. The only way for the output to go low is for the clear and D inputs to go low. The positive-going transition of the output of the flip-flop U27 indicates that a flux transistion (FTR) has occurred.

The input to the threshold detector is the amplified and filtered signal from active Butterworth filter. The threshold detector produces an output when the absolute value of the waveform exceeds either 10%, 45% or 30% of the nominal peak signal. The 10% level is used for reading at 22 ips, the 45% level is used for write verification and gap detection, and the 30% level is used for high speed gap search. Which level is selected is determined by the FST and MOD inputs at inverters U20E abnd U20F, respectively. The two transistors Q1 and Q2 connected in cascade perform the function of filtering the output of the threshold detector and insuring that the THD signal remains high for at least 100 ns thereby preventing noise from causing false outputs on the flux transition (FTR) signal out of the flip-flop U27.

The output of the threshold detector (THD) is also used to retrigger one-shots U43A and U43B shown in FIG. 153B. The first one-shot, U43A, has a period of approximately 125 us. If no flux transitions are detected for 125 us, the one-shot expires and sets the latch composed of gates U39A and U39B. The output of the latch (GAP) indicates to the microprocessor, via the I/O status control signal, that a gap condition exists. The output of the latch also inhibits the InterRecord Gap (IRG) one-shot U43B from being retriggered. The period of the interrecord gap one-shot is approximately 2.5 ms. If the latch has not been reset or if a flux transition after the latch is reset has not occurred by 2.5 ms, the one-shot expires and an interrecord gap condition is declared. The gap one-shot U43A also clears the four-bit binary counter U42. To prevent the possibility of noise in the system erroneously ending the gap condition, the latch is not allowed to reset until four flux transitions have been detected and counted by the binary counter U42. The gap one-shot also clears flip-flop U38A whose output is used to initialize the read decode circuitry. The first twelve flux transitions after a gap occurs always correspond to a digital zero on the magnetic tape. Hence the flip-flop U38A is not set again until twelve flux transitions have been counted by the binary counter U42.

The decoder is required to reliably retrieve information stored in the form of delta distance code from a tape which exhibits speed variations. The input to the decoder is a stream of pulses corresponding to flux transitions detected on the magnetic tape (FTR). The time between the pulses indicates whether the distance between flux transitions was a "long" or a "short" distance. Decoding the time between pulses into ones and zeros could be accomplished on an absolute basis of one were willing to allow the ratio between zero and one to be large enough that a zero would always be less than a specified time and a one would always be greater than a specified time when all possible variations in the system have been accounted for. This approach would reduce the amount of information which could be stored on the tape and is not acceptable. Instead, the decoder eliminates dependence upon the absolute time required for the tape to move a long or short distance by "tracking" the average tape speed. The ratio of the "long" time to the "short" time, not the actual time, is used in decoding the information. The decoder uses the time between previous FTR pulses to develop a reference voltage which is used for decoding. The reference voltage is developed across C59.

To understand how the reference voltage is established, a description of the decoder circuit configuration is first necessary. When the GAP signal occurs, flip-flop U38A is cleared and its output, the decoder initializing signal, clears the read data flip-flop U38B and turns on FET switch U33A to short out resistor R111. The reference capacitor C59 is driven by U36 which is part of the sample and hold circuit formed by FET switches U33B and U33D and sample and hold capacitor C58. The input to the sample and hold circuit comes from the ramp generator circuit formed by U32 and associated components. Notice that the output of the ramp generator can be applied directly to the sample and hold capacitor C58 via FET switch U33D but is first attenuated by the resistor divider R108 and R107 before it can be applied to the sample and hold capacitor via FET switch U33B. Notice, further, that the read data output (RDT) of the read data flip-flop U38B enables the attenuated signal FET switch U33B to update the sample and hold capacitor when RDT is a one or, similarly, enables the direct signal FET switch U33D when RDT is a zero. The ramp generator (U32) output, which is the signal sampled, is reset to zero by switch U33C whenever one-shot U31B is triggered.

When the end of a gap occurs, the following initializing action is generated. The positive-going edge of the first flux transition pulse (FTR) triggers the one-shot U31A which has a pulse width of approximately one microsecond. The one-shot pulse and the fact that the read data flip-flop U38B is being held clear by the decoder initializing signal U38A causes FET switch U33D to turn on and charge the sample and hold capacitor C58 to the voltage of the ramp generator output. In turn, the reference capacitor C59 will also be charged to the voltage of the sample and hold capacitor via U36 since the FET switch U33A is turned on by the decoder initializing signal. For the first flux transition, the ramp generator will be at its maximum value due to the long time of the gap signal. On the trailing edge of the one-shot U31A pulse, the second one-shot U31B is triggered and generates a four microsecond pulse which turns on FET switch U33C and resets the ramp generator. After the pulse terminates, the output of the ramp generator proceeds to become a ramp. The next flux transition occurs after a "short" time (twelve "short" times always follow a gap) and again the sample and hold capacitor is updated with the voltage of the ramp generator. This time the voltage of the ramp generator correctly corresponds to the "short" time or a digital zero on the magnetic tape. After twelve flux transitions the reference capacitor C59 has been initialized and the decoder initializing signal is terminated.

The time between the flux transitions now varies according to whether digital ones or zeros ("longs" or "shorts") are recorded on the magnetic tape. When a flux transition occurs, one-shot U31A is triggered and its output clocks the read data flip-flop U38B. The read data flip-flop is updated with the results of the comparison of the reference voltage to the attenuated output of the ramp generator by comparator U37. The output of the ramp generator is attenuated by R105 and R106 to produce a "short" voltage less than the reference voltage and a "long" voltage greater than the reference voltage. The read data output is used to select which FET switch, U33B for a "long" or U33D for a "short", updates the sample and hold capacitor C58. The ramp generator output is attenuated for the "long" time to produce the same sample and hold voltage as for the "short" time. The reference capacitor C59 voltage is allowed to track only the low frequency changes caused by tape speed variations since resistor R111 and capacitor C59 now filter the short term changes in the voltage of the sample and hold capacitor. The read data output is sent to the I/O interface section to become the bit serial data to the microprocessor. Each time that one-shot U31B resets the ramp generator, it also generates the read/write flag which sets the I/O interface flag flip-flop to indicate to the microprocessor that the bit serial data is ready.

POWER SUPPLIES

The power supplies in the calculator consist of five regulated supplies, +12, +7, +5, −5, and −12 volts, and two unregulated supplies, +/−20 volts. These power supplies may be understood with reference to the block diagram of FIG. 4 and the detailed schematic diagrams of FIGS. 154A–C.

For the +12 volt supply of FIG. 154C, a reference voltage appears at pin 4 of U3 when a voltage of 10 to 40 volts is applied between pins 8 and 5. The reference voltage is also applied to the non-inverting input of the amplifier in U3. The output voltage from the supply is sensed by R9, R10, and R11 and applied to the inverting input of the amplifier in U3. Capacitor C11 is used to limit the frequency response of the U3 amplifier. The output of the U3 amplifier is further amplified by Q4. The output current of the supply is dropped across R13 and sensed by pins 10 and 1 of U3 to limit the output current to approximately 2.75 amps.

For the +7 volt supply, device U1 (National device LM309 or equivalent) is used. The device is designed to provide +5 volts between pins 3 and 2 when a voltage of +7 to +35 is applied between pins 1 and 2. By using a resistor divider R5 and R6, the terminal normally connected to ground is connected to a point which is at 2 volts, thus giving an output of +7 volts from the device. Resistor R8 is used to limit the power dissipation in U1.

The five volt supply of FIG. 154B is a switching regulator. The non-inverting input (pin 1) of the amplifier in U4 is connected via R15 to a +5 reference voltage developed from the +12 volt supply by resistors R14 and R16. The inverting input (pin 2) to the amplifier is connected to the supply output at L2. If the supply output voltage, as sensed at the inverting input of U4, falls below the reference voltage on the non-inverting input, the output of U4, amplified by Q6 and Q3, applies +20 volts to inductor L2. The tap on inductor L2 via R22 allows both Q3 and Q6 to saturate thereby increasing efficiency. When Q3 turns on, the reference voltage to the non-inverting input of U3 is raised by approximately 50 millivolts by resistor divider R17 and R15. When the output voltage at the inverting input of the U4 amplifier reaches the reference voltage at the non-inverting input, the amplifier turns off Q6 and Q3. Turning off Q3 causes the reference voltage on the non-inverting input of the amplifier to drop by about 20 millivolts. This hysterisis voltage introduces about 70 millivolts of ripple on the +5 volt supply which is filtered out by L1, C4, and C15. The current used to turn on Q6 and Q3 is limited by sensing the voltage across R19. If the +5 volt supply is suddenly pulled more than a diode and an emitter-base voltage drop below the reference voltage, transistor Q5 turns on and shuts off the drive transistor in U4. As long as there is any current flow out of the +5 volt supply, Q5 remains on and keeps the +5 volt supply shut down.

The −12 volt supply is developed by device U2 (National LM 320-12 or equivalent) in a manner similar to the +7 volt supply. The −5 volt supply is a zener regulated supply consisting of resistor R7 and zener CR8.

CALCULATOR FIRMWARE

Operation of the calculator firmware may be understood with reference to FIGS. 5–15, the calculator firmware listing of routines and subroutines stored within the calculator read-only memory, and the flow chart of these routines and subroutines illustrates in FIGS. 155–182B.

Figure 5:
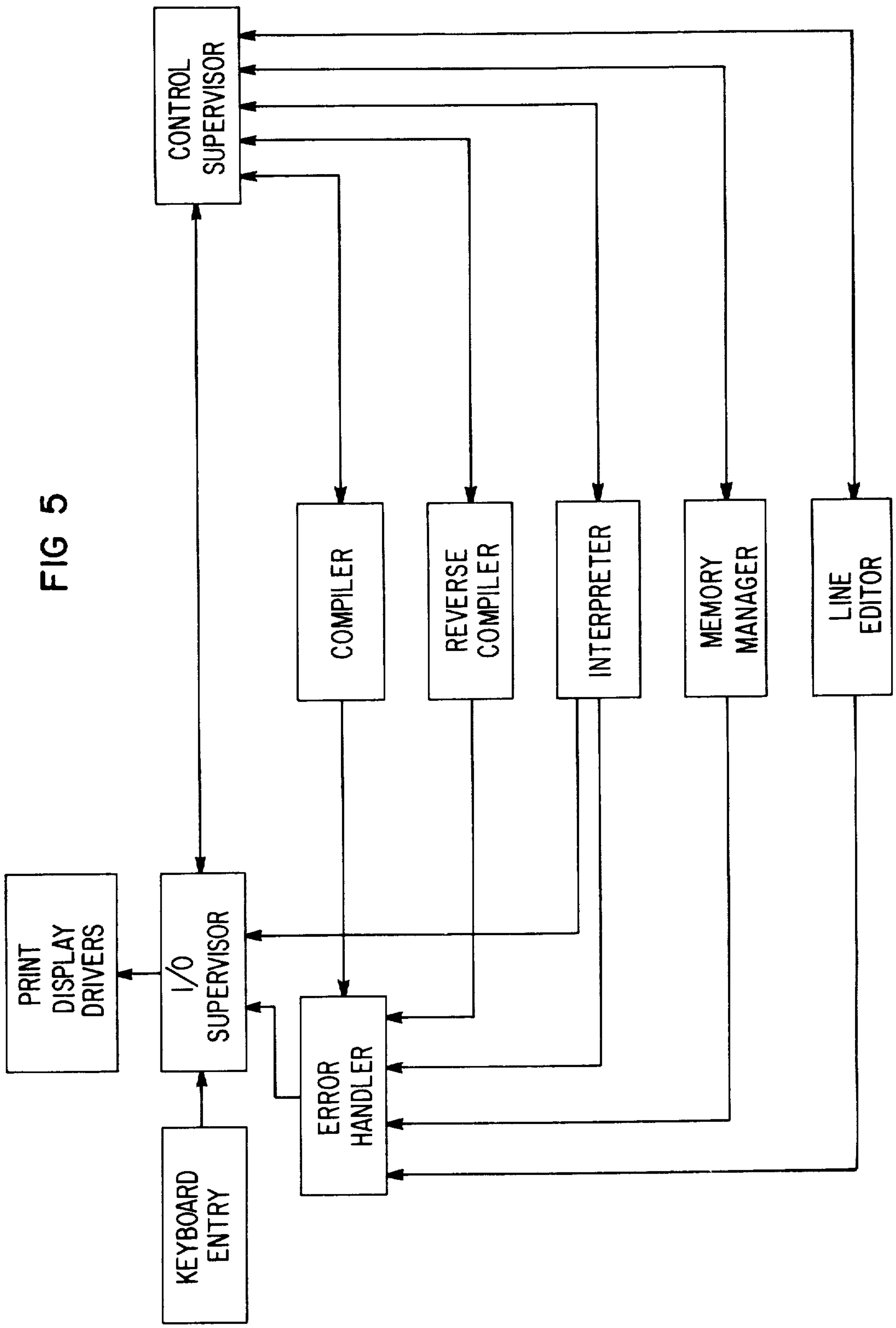
FIG. 5 is a simplified block diagram of the firmware associated with the calculator of FIG. 1.

Referring to FIG. 5, there is shown an overall block diagram of the portion of the calculator firmware residing in the mainframe language ROM 210 of FIG. 4. The address structure of the mainframe language ROM is depicted in FIG. 6 in relation to the remainder of the calculator memory. The location of each of the firmware components of FIG. 5 within the twelve individual ROM chips comprising the mainframe language ROM is shown in FIG. 7. The remaining portion of the calculator firmware resides in the various plug-in ROMs 230 of FIG. 4 that may be employed by the user for increasing the functional capability of the calculator.

A detailed listing of the routines and subroutines of instructions stored in the mainframe language ROM together with a listing of the routines and subroutines that may be stored in a general I/O plug-in ROM are provided hereinafter. In addition, as a preface to the listing of the routines and subroutines stored in read-only memory, a listing of the base page read-write memory is given. This listing of the base page read-write memory may be understood with reference to the memory map of FIG. 15. It will be seen that the base page portion of the read-write memory is employed for storing several words of information used by the calculator firmware. Included are all the working registers of the calculator, scratch pad locations used by the floating point math routines, locations for storing information regarding the current status of the magnetic tape cassette unit, and locations for storing information regarding the current position of the visual cursor associated with the output display unit.

DETAILED LISTING OF ROUTINES AND SUBROUTINES OF INSTRUCTIONS

A complete assembly language listing of all of the routines and subroutines of instructions employed by the calculator is given below. The listing covers the read-write memory base page, the entire mainframe language read-only memory, and a general I/O plug-in read-only memory. Each page within the listing is numbered in sequence at the upper left-hand corner, and its page number within the specification as a whole is indicated at the bottom of the page. Each line of each page is separately numbered in the first column from the left-hand side of the page. This line numbering and paginating arrangement facilitates reference to different portions of the listing. Descriptive headings are variously provided throughout the listing to identify routines, subroutines, groups of constants, and plug-in ROM routines. Each instruction of each routine or subroutine and each constant stored in the mainframe langauge ROM or the general I/O plug-in ROM is represented in octal form in the third column from the left-hand side of the page. Each of these instructions may be understood in detail by referring to the detailed description of the microprocessor hereinabove. The octal address of the ROM location in which each such instruction or constant is stored is given in the second column from the left-hand side of the page.

Mnemonic labels serving as symbolic addresses or names are given in the fourth column from the left-hand side of the page. An asterisk in the fourth column indicates that particular line of the listing is merely a comment. A mnemonic code corresponding to a particular instruction is given in the fifth column from the left-hand side of the page. Operands that may be either labels or literals associated with each of the instructions are located in the sixth column from the left-hand side of the page. Explanatory comments are given in the remaining right-hand portion of each page.

Page 1 BASE-PAGE READ-WRITE-MEMORY

```
76550        ORG 76550B
        *    UNL
             SUP
        *
        *
        *
76550   BINRY BSS 7          BINARY PROGRAM LINKS
        *
76557   CBUFF BSS 80         COMPILE BUFFER
76677   CSTAK BSS 80         COMPILE STACK
        *
77017   RMTBL BSS 19         ROM ADDRESS TABLE
77042   STEAL BSS 16         STOLEN RWM TABLE
77062   ROMWD BSS 1          ROM IN/OUT INFO
77063   NPROG BSS 1          NEW-PROGRAM FLAG
77064   IBUFF BSS 41         INPUT/OUTPUT BUFFER
77135   KBUFF BSS 41         KEYBOARD BUFFER
        *
77206   IOTMP BSS 8          I/O DRIVER TEMPORARIES
77216   CSTMP BSS 17         CONTROL SUPERVISOR TEMPORARIES
77237   CMTMP BSS 14         COMPILER TEMPORARIES
        *
77255   XCOMM BSS 1          INTERPRETER COMMUNICATIONS WORD
77256   MODE  BSS 1          CONTROL-SUPERVISOR MODE FLAG
77257   CSTAT BSS 1          CONTROL STATE
77260   ERRBP BSS 1          ERROR BYPASS LINK
        *
```

BASE-PAGE READ-WRITE-MEMORY

```
00030000 77261          EXTMP BSS 12         INTERPRETER TEMPORARIES
00031000                *
00032000 77275          IDXRW BSS 1          INDEXED RWM
00033000 77276          SAVEB BSS 1
00034000 77277          ENDS  BSS 1
00035000 77300          AP2   BSS 1
00036000 77301                BSS 4          RESERVED FOR INDEX TABLE
00037000                *
00038000 77305          OFWAM BSS 1          FIRST WORD ACTUAL RWM
00039000 77306          FWAM  BSS 1          FIRST WORD AVAILABLE RWM
00040000 77307          FWUP  BSS 1          FIRST WORD OF USER PROGRAM
00041000 77310          RMAX  BSS 1          MAXIMUM R-REGISTER ADDRESS
00042000 77311          VT1   BSS 1          FIRST WORD OF VALUE TABLE INFO
00043000 77312          VT2   BSS 1          FIRST WORD OF VALUE TABLE VALUES
00044000 77313          FWBA  BSS 1          FIRST WORD OF BINARY AREA
00045000 77314          TE    BSS 1          TRACE ON/OFF FLAG
00046000 77315          STYFG BSS 1          SECURE-PROGRAM FLAG
00047000 77316          CERR  BSS 1          COMPILE ERROR FLAG
00048000 77317          SWHRE BSS 1          SAVED WHERE
00049000                *
00050000 77320          ESV   BSS 1          ERASE STRING VARIABLE TABLE
00051000 77321          STCHK BSS 1          STRING COMPARISON LINK
00052000 77322          STENT BSS 1          STRING ENTER LINK
00053000 77323          STEAS BSS 1          STRING ENTER ASSIGNMENT LINK
00054000 77324          AKOUN BSS 1          LINK TO PROCESS A STRING
00055000 77325          STRES BSS 1          STRING ASSIGNMENT FOR READ STAT
00056000 77326          STEFL BSS 1          STRING ENTER FLAG
00057000 77327          SEED  BSS 4          SEED FOR RANDOM-NUMBER GENERATOR
00058000 77333                BSS 8          RESERVED FOR POST-RELEASE
00059000 77343          NOTRY BSS 1          MAXIMUM # OF TRIES AT READ OR SEARCH
00060000 77344          AVFLG BSS 1          CASSETTE AUTOVERIFY FLAG
00061000 77345          CSCF  BSS 1          SELECT CODE OF CASSETTE
00062000 77346          FTRGT BSS 1          TARGET RECORD FOR PARALLEL SEARCH
00063000 77347          INTSR BSS 1          INTERRUPT SERVICE FLAG
00064000                *
00065000 77350          AEBUF BSS 1          BUFFER EDIT POINTERS
00066000 77351          AEBFX BSS 1
00067000 77352          AEBFM BSS 1
00068000 77353          AEBFL BSS 1
00069000                *
00070000 77354          DVTAB BSS 26         DECLARED VARIABLE TABLE
00071000 77406          DATAB BSS 26         DECLARED ARRAY TABLE
00072000 77440          ITABL BSS 16         INTERRUPT JUMP TABLE
00073000 77460          HPIT  BSS 7          HI-PRIORITY INTERRUPT SAVE AREA
00074000 77467          LPIT  BSS 7          LO-PRIORITY INTERRUPT SAVE AREA
00075000                *
00076000 77476          ENR   BSS 4          ENTER REGISTER
00077000 77502          URES  BSS 4          USER RESULT REGISTER
00078000 77506          FLAGS BSS 1          FLAG REGISTER, 0-15 L-TO-R
00079000                *
00080000 77507          ELINK BSS 1          END-STMT EXECUTION LINK
00081000 77510          .IOSR BSS 1          I/O-ROM SERVICE ROUTINE LINK
00082000 77511          MLBPL BSS 1          "MAIN LOOP" BYPASS LINK
00083000 77512          DLEN  BSS 1          DISPLAY LENGTH
00084000 77513          DBP   BSS 1          DISPLAY BEGIN POINTER
00085000 77514          CSELC BSS 1          CASSETTE SELECT CODE
00086000 77515          BUSFG BSS 1          FOR JN
00087000 77516          IOINT BSS 1          FOR JN
00088000 77517          RGFLG BSS 1          REGISTER ASSIGNMENT INFORMATION
00089000                *
00090000 77520          PARG  BSS 1          P-ARGUMENT
00091000 77521          AP36  BSS 1          PRODUCTION 36 (FOR JO)
00092000 77522          AP37  BSS 1          PRODUCTION 37
00093000 77523          AP77  BSS 1          PRODUCTION 77
00094000 77524          AP78  BSS 1          PRODUCTION 78
00095000 77525          AP136 BSS 1          PRODUCTION 136
00096000 77526          APP#  BSS 1          P# EXECUTION
00097000 77527          APRET BSS 1          A.P. ROM'S PART OF 'RET' EXECUTION
00098000 77530          LOADL BSS 1          CASSETTE LDK OK LINK
00099000 77531          APRVC BSS 1          A.P. ROM'S CHECK FOR ()
00100000 77532          REFOR BSS 1          RESET FOR/NEXT BEFORE EXECUTE
00101000 77533          RLINK BSS 1          RUN-CMND EXECUTION LINK
00102000                *
00103000 77534          RBUFF BSS 41         RESERVE KEYBOARD BUFFER
00104000 77605          LKTMP BSS 14
00105000 77623          LKFLG BSS 1          LIVE KEYBOARD ENABLE/DISABLE FLAG
00106000                *
00107000 77624          ENSV  BSS 4          SAVE AREA FOR ENTER
00108000 77630          SVXCM BSS 1          SAVED XCOMM FOR ENTER
00109000                *
00110000 77631                BSS 2          FOR POST-RELEASE CHANGES
00111000                *
00112000 77633          JSTAK BSS 33         JSM STACK
00113000                *
00114000 77674                BSS 1          FOR POST-RELEASE CHANGES
```

BASE-PAGE READ-WRITE-MEMORY

```
00114100 77675          T26   BSS 1
00115000                *
00116000 77676          CATMP BSS 11          CASSETTE TEMPORARIES
00117000                *
00118000 77711          T1    BSS 1           SHARED TEMPORARIES
00119000 77712          T2    BSS 1
00120000 77713          T3    BSS 1
00121000 77714          T4    BSS 1
00122000 77715          T5    BSS 1
00123000 77716          T6    BSS 1
00124000 77717          T7    BSS 1
00125000 77720          T8    BSS 1
00126000 77721          T9    BSS 1
00127000 77722          T10   BSS 1
00128000 77723          T11   BSS 1
00129000 77724          T12   BSS 1
00130000 77725          T13   BSS 1
00131000 77726          T14   BSS 1
00132000 77727          T15   BSS 1
00133000 77730          T16   BSS 1
00134000 77731          T17   BSS 1
00135000 77732          T18   BSS 1
00136000 77733          T19   BSS 1
00137000 77734          T20   BSS 1
00138000 77735          T21   BSS 1
00139000 77736          T22   BSS 1
00140000 77737          T23   BSS 1
00141000 77740          T24   BSS 1
00142000 77741          T25   BSS 1
00143000                *
00144000 77742          OP1   BSS 4           FLOATING-POINT TEMPORARY
00145000 77746          OP2   BSS 4           FLOATING-POINT TEMPORARY
00146000 77752          RES   BSS 4           RESULT FOR ALL FLOATING-POINT
00147000 77756          MRW1  BSS 10          MATH READ-WRITE
00148000 77770                BSS 4           AR1
00149000 77774          MRW2  BSS 4           MATH READ-WRITE
00151000 00040                ORG 40B
00152000                *
00153000                * SYSTEM STARTUP
00154000                *
00155000 00040  164041  SYSS  JMP *+1,I
00156000 00041                BSS 1
00158000                *
00159000                * CONSTANTS
00160000                *
00161000 00042  000777  P511  DEC 511       JN JO
00162000        000042  B777  EQU P511
00163000 00043  000411  P265  DEC 265
00164000        000043  B411  EQU P265
00165000 00044  000400  P256  DEC 256     JB JN
00166000        000044  B400  EQU P256
00167000 00045  000377  P255  DEC 255     JB JN
00168000        000045  B377  EQU P255              MT
00169000 00046  000231  P153  DEC 153
00170000        000046  B231  EQU P153
00171000 00047  000230  P152  DEC 152
00172000        000047  B230  EQU P152
00173000 00050  000224  P148  DEC 148
00174000        000050  B224  EQU P148
00175000 00051  000202  P130  DEC 130
00176000        000051  B202  EQU P130
00177000 00052  000200  P128  DEC 128     JB        MT
00178000        000052  B200  EQU P128
00179000 00053  000177  P127  DEC 127     JB        MT
00180000        000053  B177  EQU P127              MT
00181000 00054  000176  P126  DEC 126     JB
00182000        000054  B176  EQU P126
00183000 00055  000175  P125  DEC 125     JB
00184000        000055  B175  EQU P125
00185000 00056  000174  P124  DEC 124     JB
00186000        000056  B174  EQU P124
00187000 00057  000173  P123  DEC 123     JB
00188000        000057  B173  EQU P123              MT
00189000 00060  000162  P114  DEC 114     JB
00190000        000060  B162  EQU P114
00191000 00061  000160  P112  DEC 112
00192000        000061  B160  EQU P112
00193000 00062  000153  P107  DEC 107     JB
00194000        000062  B153  EQU P107              MT
00195000 00063  000145  P101  DEC 101
00196000        000063  B145  EQU P101
```

BASE-PAGE READ-ONLY-MEMORY

```
00197000 00064  000143  P99   DEC 99            JO MT
00198000 00065  000141  P97   DEC 97
00199000        000065  B141  EQU P97
00200000 00066  000140  P96   DEC 96     JB
00201000        000066  B140  EQU P96
00202000 00067  000135  P93   DEC 93
00203000        000067  B135  EQU P93
00204000 00070  000133  P91   DEC 91
00205000        000070  B133  EQU P91
00206000 00071  000105  P69   DEC 69     JB
00207000 00072  000101  P65   DEC 65
00208000        000072  B101  EQU P65
00209000 00073  000100  P64   DEC 64     JB     JO MT
00210000        000073  B100  EQU P64
00211000 00074  000077  P63   DEC 63     JB
00212000        000074  B77   EQU P63
00213000 00075  000075  P61   DEC 61
00214000        000075  B75   EQU P61
00215000 00076  000073  P59   DEC 59     JB
00216000        000076  B73   EQU P59
00217000 00077  000072  P58   DEC 58     JB
00218000        000077  B72   EQU P58
00219000 00100  000064  P52   DEC 52     JB
00220000        000100  B64   EQU P52
00221000 00101  000063  P51   DEC 51     JB
00222000        000101  B63   EQU P51               MT
00223000 00102  000061  P49   DEC 49
00224000        000102  B61   EQU P49
00225000 00103  000060  P48   DEC 48     JB
00226000        000103  B60   EQU P48
00227000 00104  000057  P47   DEC 47     JB
00228000        000104  B57   EQU P47
00229000 00105  000056  P46   DEC 46     JB
00230000        000105  B56   EQU P46
00231000 00106  000055  P45   DEC 45     JB
00232000        000106  B55   EQU P45
00233000 00107  000054  P44   DEC 44     JB
00234000        000107  B54   EQU P44
00235000 00110  000053  P43   DEC 43     JB
00236000        000110  B53   EQU P43
00237000 00111  000052  P42   DEC 42     JB
00238000        000111  B52   EQU P42
00239000 00112  000051  P41   DEC 41     JB
00240000        000112  B51   EQU P41
00241000 00113  000050  P40   DEC 40
00242000        000113  B50   EQU P40
00243000 00114  000044  P36   DEC 36
00244000        000114  B44   EQU P36
00245000 00115  000043  P35   DEC 35
00246000        000115  B43   EQU P35
00247000 00116  000042  P34   DEC 34     JB JN
00248000        000116  B42   EQU P34
00249000 00117  000040  P32   DEC 32     JB JN     MT
00250000        000117  B40   EQU P32
00251000 00120  000037  P31   DEC 31   * JB
00252000        000120  B37   EQU P31
00253000 00121  000034  P28   DEC 28        JN     MT
00254000        000121  B34   EQU P28
00255000 00122  000032  P26   DEC 26     JB    JO
00256000 00123  000024  P20   DEC 20               MT
00257000 00124  000023  P19   DEC 19        JN     MT
00258000 00125  000022  P18   DEC 18
00259000 00126  000021  P17   DEC 17     JB JN
00260000 00127  000020  P16   DEC 16     JB JN JO MT
00261000        000127  B20   EQU P16
00262000 00130  000017  P15   DEC 15     JB JN     MT
00263000        000130  B17   EQU P15
00264000 00131  000016  P14   DEC 14     JB JN
00265000 00132  000015  P13   DEC 13     JB    JO
00266000 00133  000014  P12   DEC 12     JB JN JO MT
00267000 00134  000013  P11   DEC 11     JB    JO
00268000        000134  B13   EQU P11
00269000 00135  000012  P10   DEC 10     JB JN JO MT
00270000 00136  000011  P9    DEC 9
00271000 00137  000010  P8    DEC 8      JB JN JO MT
00272000        000137  B10   EQU P8
00273000 00140  000007  P7    DEC 7      JB JN JO MT
00274000 00141  000006  P6    DEC 6      JB    JO MT
00275000 00142  000005  P5    DEC 5      JB JN JO MT
00276000 00143  000004  P4    DEC 4      JB JN JO MT
00277000 00144  000003  P3    DEC 3      JB JN JO MT
00278000 00145  000002  P2    DEC 2      JB JN JO MT
00279000 00146  177776  M2    DEC -2     JB JN
00280000 00147  177775  M3    DEC -3     JB JN JO MT
```

BASE-PAGE READ-ONLY-MEMORY

```
00150  177774  M4     DEC -4       JB JN JO MT
00151  177773  M5     DEC -5       JB JN JO
00152  177772  M6     DEC -6
00153  177771  M7     DEC -7       JB
00154  177770  M8     DEC -8          JN    MT
00155  177765  M11    DEC -11            JO
00156  177763  M13    DEC -13            JO
00157  177761  M15    DEC -15               MT
00160  177760  M16    DEC -16      JB JN JO MT
00161  177757  M17    DEC -17      JB
00162  177740  M32    DEC -32      JB JN    MT
       000162  BM40   EQU M32
00163  177720  M48    DEC -48      JB
00164  177700  M64    DEC -64      JB    JO
       000164  BM100  EQU M64
00165  177660  M80    DEC -80      JB
00166  177637  M97    DEC -97
00167  177600  M128   DEC -128              MT
00170  177400  M256   DEC -256     JB    JO MT
00171  160000  M8192  DEC -8192    JB
              *
00172  000174  AONE   DEF *+2         JN JO    FLOATING-POINT ONE
00173  000177  APIE   DEF *+4            JO    FUDGED PI
00174  000000         OCT 000000
00175  010000  B10K   OCT 010000   JB    JO MT
00176  000000         OCT 000000
00177  000000  P0     OCT 000000   JB    JO
00200  030501         OCT 030501        3141
00201  054446         OCT 054446        5926
00202  051540         OCT 051540        5360
              *
00203  000204  PTCN   DEF *+1
00204  154360  M10K   DEC -10000   JB
00205  176030  M1000  DEC -1000
00206  177634  M100   DEC -100     JB
00207  177766  M10    DEC -10      JB    JO
00210  000210  ENDTC  DEF *
              *
00211  077740  BXCAA  OCT 77740    JB
00212  077700  EMAX   OCT 77700          JO
       000212  B777X  EQU EMAX     JB
00213  077577  TMASK  OCT 77577
00214  077440  EOLB   OCT 77440    JB
00215  077400  BXCMM  OCT 77400    JB
00216  076574  ZK2    OCT 76574
00217  076000  B76K   OCT 76000    JB
00220  071050  TRCC2  OCT 71050
00221  070000  B70K   OCT 70000          JO MT
00222  067000  B67K   OCT 67000             MT
00223  063000  B63K   OCT 63000    JB
00224  060000  B60K   OCT 60000    JB       MT
00225  052525  ALBPT  OCT 52525    JB
00226  037440  QMRKB  OCT 37440    JB
00227  020000  B20K   OCT 20000    JB
00230  010133  RK2    OCT 10133
00231  010050  RK1    OCT 10050
00232  007403  B7403  OCT 7403              MT
00233  004406  ZK3    OCT 4406
00234  004000  B4K    OCT 4000              MT
00235  003377  B3377  OCT 3377              MT
00236  002000  B2K    OCT 2000     JB       MT
00237  001000  B1K    OCT 1000              MT
              *
00240  177701  ZAP    OCT 177701         JO
       000167  BM200  EQU M128     JB    JO
00241  176000  BM2K   OCT -2000    JB
00242  170720  KF     OCT 170720
00243  170000  B170K  OCT 170000   JB
00244  137777  XMASK  OCT 137777   JB
00245  131400  IMCON  OCT 131400
00246  126273  AMSE   OCT 126273            MT
00247  101175  ZK1    OCT 101175
00250  100377  BM377  OCT 100377            MT
00251  100200  UMASK  OCT 100200
              *
00252  000254  NB1    DEF *+2            SPECIAL PATTERN FOR NUMBER BUILDER
00253  077772  NB2    DEF 77772B
00254  000001  P1     DEC 1        JB JN JO MT
00255  177764  M12    DEC -12      JB    JO
00256  000000         DEC 0
00257  177777  M1     DEC -1       JB    JO MT
00260  000000         DEC 0
00261  000000         DEC 0
              *
```

BASE-PAGE READ-ONLY-MEMORY

```
00365000 00262  020040  TOBLN OCT 020040      TWO ASCII BLANKS
00366000 00263  100000  FLAG  OCT 100000
00367000 00264  040001  STTMP OCT 040001      STRING CONSTANT IN STACK
00368000 00265  100004  STWHR OCT 100004
00369000        000171  ARRAY EQU M8192       ENTIRE ARRAY
00370000        000221  EMPTY EQU B70K        EMPTY
00371000 00266  011401  FPTMP OCT 011401      FULL-PRECISION CONSTANT IN STACK
00372000 00267  110000  FVRWM OCT 110000      FULL-PRECISION VARIABLE IN RWM
00373000 00270  110402  FVRRA OCT 110402      FULL-PRECISION VARIABLE IN R
00374000                *
00375000 00271  062562  LKERM OCT 62562       LOWER-CASE "ERROR"
00376000 00272  071157        OCT 71157
00377000 00273  071040        OCT 71040
00378000                *
00379000                * POINTERS
00380000                *
00381000 00274  000053  AAEOL DEF B177        ADDRESS OF EOL
00382000 00275  077440  AITAB DEF ITABL       ADDRESS OF INTERRUPT TABLE
00383000 00276  077354  ADVTB DEF DVTAB       ADDRESS OF DECLARED VARIABLE TABLE
00384000 00277  077406  ADATB DEF DATAB       ADDRESS OF DECLARED ARRAY TABLE
00385000 00300  077632  AJSTK DEF JSTAK-1     ADDRESS OF JSM STACK
00386000 00301  077633  AJSMS DEF JSTAK
00387000 00302  176557  ACBFX DEF CBUFF,I     COMPILE BUFFER 1ST CHAR ADDRESS
00388000 00303  076557  ACBF  DEF CBUFF       COMPILE BUFFER STARTING ADDRESS
00389000 00304  076556  ACBUF DEF CBUFF-1     ADDRESS OF COMPILE BUFFER
00390000 00305  076676  ACLMT DEF CBUFF+79    COMPILE BUFFER UPPER LIMIT
00391000 00306  077135  AKBUF DEF KBUFF       KEYBOARD BUFFER
00392000 00307  177135  AKBFX DEF KBUFF,I     KEYBOARD BUFFER 1ST CHAR ADDRESS
00393000 00310  077134  AKBFM DEF KBUFF-1     KEYBOARD BUFFER STARTING ADDRESS - 1
00394000 00311  077205  AKBFL DEF KBUFF+40    KEYBOARD BUFFER ENDING ADDRESS
00395000 00312  000306  AKBST DEF AKBUF       KEYBOARD BUFFER POINTERS START.
00396000 00313  077064  AIBUF DEF IBUFF       I/O BUFFER
00397000 00314  177064  AIBFX DEF IBUFF,I     I/O BUFFER 1ST CHAR ADDRESS
00398000 00315  077063  AIBFM DEF IBUFF-1     I/O BUFFER STARTINF ADDRESS - 1
00399000 00316  077134  AIBFL DEF IBUFF+40    I/O BUFFER ENDING ADDRESS
00400000 00317  077066  AIBSL DEF IBUFF+2     I/O BUFFER STARTING ADDRESS + 2
00401000 00320  077070  AIOLM DEF IBUFF+4     I/O BUFFER STARTING ADDRESS .
00402000 00321  000313  AIBST DEF AIBUF       EDIT POINTERS STARTING ADDRESS
00403000 00322  077534  ARBUF DEF RBUFF
00404000 00323  077533  ARBFM DEF RBUFF-1
00405000 00324  076677  ASTKI DEF CSTAK       COMPILE STACK STARTING ADDRESS
00406000 00325  176677  ACSTF DEF CSTAK,I
00407000        000305  ASTAK EQU ACLMT       ADDRESS OF COMPILE STACK - 1
00408000 00326  077016  ASLMT DEF CSTAK+79    COMPILE STACK UPPER LIMIT
00409000        000326  ATROM EQU ASLMT
00410000                *
00411000 00327  077017  AROMS DEF RMTBL       ADDRESS OF ROM ADDRESS TABLE
00412000 00330  076550  ABNRY DEF BINRY       ADDRESS OF BINARY HEADER
00413000 00331  000332  AMAIN DEF ARTBL       ADDRESS OF MAINFRAME HEADER
00414000 00332          ARTBL BSS 1           ADDRESS OF REVERSE COMPILE TABLE
00415000 00333          AMTBL BSS 1           ADDRESS OF MAINFRAME MNEMONIC TABLE
00416000                *
00417000 00334  000177  ADP0  DEF P0
00418000 00335  077711  ATMP  DEF T1          STARTING ADDRESS OF SHARED TEMP
00419000                *
00420000 00336  077742  AOP1  DEF OP1
00421000 00337  077746  AOP2  DEF OP2
00422000 00340  077752  ARES  DEF RES
00423000 00341  077476  AENR  DEF ENR
00424000 00342  077502  AURES DEF URES
00425000                *
00426000 00343  077414  SVRE  ABS DVTAB-101B+97
00427000        000326  STRK  EQU ASLMT
00428000                *
00429000 00344  077777  MAW   OCT 77777       MAXIMUM AVAILABLE WORD
00430000        000330  LWAM  EQU ABNRY       LAST WORD AVAILABLE RWM + 1
00431000                *
00432000 00345  077770  ADR1  DEF AR1
00433000        000127  ADR2  EQU P16

00435000                *
00436000                * USEFUL POINTERS AND EQUATES
00437000                *
00438000        077237  TKN   EQU CMTMP+0     TOKEN FOR PARSER
00439000        077240  RCD   EQU CMTMP+1     ASCII FOR PARSER
00440000        077241  OLDC  EQU CMTMP+2     USED BY SCANNER IN CASE OF ERROR
00441000        077242  ISTAR EQU CMTMP+3     IMPLIED-MULTIPLY FLAG
00442000                *
00443000        077254  STAKP EQU CMTMP+13    STACK POINTER
00444000                *
00445000        077237  GUIDE EQU CMTMP+0     PRIORITY/CLASS/CHARACTERS
00446000        077240  ASCII EQU CMTMP+1     CHARACTER ADDRESS
00447000                *
```

BASE-PAGE READ-ONLY-MEMORY

```
         077261  AP3   EQU EXTMP+0      RETURN LINK INFORMATION
         077263  AP1   EQU EXTMP+2      TOP OF EXECUTION STACK
         077264  LEND  EQU EXTMP+3      ADDRESS OF NEXT LINE TO BE EXECUTED
         077265  HERE  EQU EXTMP+4      ADDRESS OF LINE BEING EXECUTED
         077266  WHERE EQU EXTMP+5      ADDRESS FOR CS TO RESUME EXECUTION
         077267  TRACE EQU EXTMP+6      CURRENT LINE TRACE INFORMATION
         077270  SAVEC EQU EXTMP+7
         077271  BASE  EQU EXTMP+8      ADDRESS IN DVTAB OR DATAB
         077272  FAP1  EQU EXTMP+9
         077273  OPND1 EQU EXTMP+10
         077274  OPND2 EQU EXTMP+11
                 *
         077222  L     EQU CSTMP+4
         077610  KBFMT EQU LKTMP+3
                 *
         000141  STRID EQU P6           ID OF STRING ROM
                 *
                 * ROUTINE ADDRESSES
                 *
00346            ACPLR BSS 1            COMPILER
00347            AREAD BSS 1            COMPILER INPUT READER
00350            AAPLI BSS 1            APPLY-PRODUCTION RETURN TO COMPILER
00351            ASETC BSS 1            COMPILE ERROR
00352            ANUMB BSS 1            NUMBER-BUILDER
00353            ALBLN BSS 1            QUOTE SCANNER
00354            ALBCM BSS 1            QUOTE BUILDER
00355            AOUTS BSS 1            COMPILER BYTE WRITER
                 *
00356            ARCLR BSS 1            REVERSE COMPILER
00357            ADSRM BSS 1            DISPLAY ROM I.D. NUMBER
                 *
00360            ARSGT BSS 1            RESET HI-SPEED BRANCHES
00361            AINTI BSS 1            INTERPRETER 'RUN' ENTRY
00362            AFBAD BSS 1            FIND BYTE ADDRESS DIFFERENCE
00363            AINTT BSS 1            INTERPRETER 'CLL' ENTRY
00364            AINTK BSS 1            INTERPRETER 'CONTINUE' ENTRY
00365            AINTX BSS 1            INTERPRETER EXECUTION RETURN
00366            ARAP  BSS 1            FOR MATH ROUTINES
00367            ASTP  BSS 1            FOR END-STMT LINK
00370            ALLOC BSS 1            ALLOCATOR
00371            AOVTS BSS 1            EXECUTION STACK OVERFLOW TEST
00372            AASTR BSS 1            ASSIGNMENT TRACE
00373            ALNTR BSS 1            LINE NUMBER TRACE
00374            AFCI  BSS 1            FIND-BYTE INITIALIZATION ENTRY
00375            AFCC  BSS 1            FIND-BYTE CONTINUATION ENTRY
00376            ASFG  BSS 1            SET A FLAG
00377            AGNAM BSS 1            GET VARIABLE NAME
00400            ACLBL BSS 1            FIND LABEL LINE ADDRESS
00401            AADBA BSS 1            ADJUST BYTE ADDRESS ENTRY #1
00402            A.ADB BSS 1            ADJUST BYTE ADDRESS ENTRY #2
                 *
                 * 10K PAGE - CONTROL SUPERVISOR
                 *
00403            AMCLX BSS 1     *      MAIN LOOP ADDR+1
00404            AERR1 BSS 1            ERROR ROUTINE -- NO RETURN
00405            AERR2 BSS 1            ERROR ROUTINE -- RETURN P+2
00406            APEMI BSS 1            PLACE ERROR MESSAGE IN I/O BUFFER
00407            AEREX BSS 1            ERROR EXIT -- AFTER 'AERR2'
00410            AREJR BSS 1            INTERRUPT REJECT ROUTINE
00411            AXCMM BSS 1            XCOMM MANAGEMENT
00412            APLIR BSS 1            PLACE LINE NUMBER IN I/O BUFFER
00413            ACNDT BSS 1            COMMAND TABLE
00414            ACTFC BSS 1            CHECK TABLE FOR COMMAND
00415            ACONT BSS 1            IMMEDIATE EXECUTE CONTINUE
00416            AEXCK BSS 1            COMMAND EXECUTION
00417            AEXCL BSS 1            PLACE LINE BRIDGES ON COMPILED LINE
00420            AKYPR BSS 1            PROCESS A KEY
00421            AERCS BSS 1            CASSETTE RUN ENTRY
00422            AECIM BSS 1            IMMEDIATE CONTINUE
00423            ASCNU BSS 1            COMMAND TABLE ADDRESS
00424            ASYER BSS 1            SYSTEM ERROR
00425            ACNIN BSS 1            CONTINUE INITIALIZATION
00426            AERSA BSS 1            LINK FOR ERASE-ALL
00427            AISTR BSS 1            PLACE KEYBOARD CHARACTER IN I/O BUF
00430            AISTX BSS 1            PLACE CHARACTER IN I/O BUFFER
00431            AEXST BSS 1            STATEMENT EXECUTION
                 *
                 * 12K PAGE - I/O SUPERVISOR
                 *
00432            ADSPC BSS 1            DISPLAY EDIT BUFFER WITH CURSOR
00433            ALDSP BSS 1            DISPLAY I/O BUFFER
00434            AKBSR BSS 1            KEYBOARD SERVICE ROUTINE
00435            AIRBF BSS 1            TRANSFER I/O BUFFER TO KEYBOARD BUF
00436            AEPON BSS 1            PRINT-ALL ROUTINE
00437            AEPNX BSS 1            LINK TO PRINT-ALL FOR ENP
```

BASE-PAGE READ-ONLY-MEMORY

```
00534000 00440          ASVRG BSS 1             SAVE LOW PRIORITY A,B,E,O
00535000 00441          AKBR2 BSS 1             RESTORE LOW PRIORITY A,B,E,O
00536000 00442          ACPST BSS 1             CHECK PRINTER STATUS
00537000 00443          APRNT BSS 1             PRINT CHARACTERS ALREADY GIVEN
00538000 00444          A.PRN BSS 1             PRINT 16 CHARS FROM I/O BUFFER
00539000 00445          APNMR BSS 1             PRINT A NUMERIC VALUE
00540000 00446          AFBP  BSS 1             FIND DISPLAY BEGIN POINTER
00541000 00447          ASWIO BSS 1             SWAP POINTERS TO EDIT I/O BUFFER
00542000 00450          ACLBI BSS 1             CLEAR I/O BUFFER
00543000 00451          ACLEB BSS 1             CLEAR EDIT BUFFER
00544000 00452          AEOLB BSS 1             SET EOL IN EDIT BUFFER
00545000 00453          ACLCM BSS 1             CLEAR COMPILE BUFFER
00546000 00454          ARPRL BSS 1             ROM "POWER REDUCTION LOOP"
00547000 00455          ALKEX BSS 1             LINK TO LIVE-KEYBOARD-EXECUTION
00548000 00456          ALXER BSS 1             LINK TO LIVE-KEYBOARD EXECUTE ERROR
00549000 00457          ALXKY BSS 1             LINK TO LIVE-KEYBOARD EXECUTE KEY
00550000 00460          AKYTB BSS 1
00551000 00461          APRKB BSS 1             PRINT-ALL FROM KEYBOARD BUFFER
00552000 00462          APSTR BSS 1 (PSTRG)
00553000                *
00554000                * 22K PAGE
00555000                *
00556000 00463          AMUPH BSS 1             MOVE MAIN PROGRAM TO HIGHER MEMORY
00557000 00464          AMAMP BSS 1             MOVE MAIN PROGRAM TO LOWER MEMORY
00558000 00465          AMPUP BSS 1             MOVE PART OF MAIN PROGRAM HIGHER
00559000 00466          AMPML BSS 1             MOVE PART OF MAIN PROGRAM LOWER
00560000 00467          AMTHM BSS 1             MOVE RWM HIGHER
00561000 00470          AMTLM BSS 1             MOVE RWM LOWER
00562000 00471          AZRWM BSS 1             ZERO RWM
00563000 00472          AERAV BSS 1             ERASE ALL VARIABLES
00564000 00473          ALISK BSS 1             LIST A SPECIAL KEY
00565000 00474          AKEYN BSS 1             PUT SPECIAL KEY NUMBER IN I/O BUF
00566000 00475          AEDPT BSS 1             RESET EDIT POINTERS
00567000 00476          ATLNI BSS 1             PLACE LINE NUMBER IN I/O BUFFER
00568000 00477          ABTDA BSS 1             BINARY TO DECIMAL ASCII
00569000 00500          AEOLN BSS 1             FIND EOL IN I/O BUFFER
00570000 00501          AGNXT BSS 1             GET NEXT CHARACTER
00571000 00502          ATCHR BSS 1             TRANSFER CHARS
00572000 00503          ARNLO BSS 1             LINK TO TURN ON RUN LIGHT
00573000 00504          ARNLF BSS 1             LINK TO TURN OFF RUN LIGHT
00574000                *
00575000                * 26K PAGE
00576000                *
00577000 00505          APGET BSS 1 (PGET)      GET NEXT PARAMETER FOR "PRINT" LIST
00578000 00506          APNUM BSS 1 (PNUM)      PROCESS A NUMERIC ITEM
00579000 00507          AINTC BSS 1 (INTCK)     MAKE INTEGER FROM ASCII STRING
00580000 00510          AGLL  BSS 1 (GLENL)     GET LENGTH OF COMPILED LINE
00581000 00511          AGEOL BSS 1             FIND EOL IN COMPILE BUFFER
00582000 00512          AFLAD BSS 1 (FLADR)     FIND LINE ADDRESS
00583000 00513          AFLNA BSS 1             FIND LINE ADDR (TMP7)
00584000 00514          ASLLN BSS 1 (SLLN)      SET 'LNO' TO LAST LINE NUMBER OR -1
00585000 00515          ASTKI BSS 1             LINK TO LIVE-KEYBOARD INIT
00586000 00516          AREST BSS 1             LINK TO LIVE-KEYBOARD RESTORE
00587000 00517          ARENI BSS 1             INSERT LINE RENUMBER GTO/GSB
00588000 00520          AREND BSS 1             DELETE LINE RENUMBER GTO/GSB
00589000 00521          ASTKG BSS 1             STACK ROUTINE FOR GSB
00590000 00522          ADIGX BSS 1             GENERAL RANGE CHECK ROUTINE
00591000 00523          AGLNO BSS 1             GET LINE NUMBER OF CURRENT LINE
00592000                *
00593000 00524          AUNM  BSS 1             UNARY MINUS -- FILLED IN FROM 14K
00594000 00525          AADD  BSS 1             ADD
00595000 00526          ASUB  BSS 1             SUBTRACT
00596000 00527          AMUL  BSS 1             MULTIPLY
00597000 00530          ADIV  BSS 1             DIVIDE
00598000 00531          ASQR  BSS 1             SQRT
00599000 00532          AGE   BSS 1             >=
00600000 00533          AGT   BSS 1             >
00601000 00534          ALT   BSS 1             <
00602000 00535          ALE   BSS 1             <=
00603000 00536          AEQ   BSS 1             =
00604000 00537          ANE   BSS 1             #
00605000 00540          AAND  BSS 1             AND
00606000 00541          AOR   BSS 1             OR
00607000 00542          AXOR  BSS 1             XOR
00608000 00543          ANOT  BSS 1             NOT
00609000 00544          APRND BSS 1             P-ROUND
00610000 00545          ADRND BSS 1             D-ROUND
00611000 00546          ARERR BSS 1             RECOVERABLE MATH ERROR
00612000 00547          ARND  BSS 1             ROUND
00613000 00550          ATSUB BSS 1             USED BY RELATIONAL OPERATIONS
00614000 00551          AFLTC BSS 1             FULL-PRECISION EXPONENT RANGE CHECK
00615000 00552          AGET1 BSS 1             GET ONE MATH OPRND FROM STACK
00616000 00553          AGET2 BSS 1             GET TWO MATH OPNDS FROM STACK
00617000 00554          AADD1 BSS 1             ADD+1
00618000 00555          ASUB1 BSS 1             SUBTRACT+1
```

BASE-PAGE READ-ONLY-MEMORY

```
00619000 00556          AMUL1 BSS 1          MULTIPLY+1
00620000 00557          ADIV1 BSS 1          DIVIDE+1
00621000 00560          ADIV2 BSS 1          DIVIDE ENTRY FOR TRUNCATED QUOTIENT
00622000 00561          ASQR1 BSS 1          SQRT+1
00623000 00562          ATSU1 BSS 1          TSUB+1
00624000 00563          AFLTP BSS 1          CONVERT TO FLOATING-POINT
00625000                *
00626000 00564          ASTMA BSS 1          STMAX ENTRY -- FILLED IN FROM 24K-
00627000 00565          ASTM1 BSS 1          STMAX ENTRY
00628000                *
00629000 00566          ALST  BSS 1          LINK TO EXECUTE 'LIST'
00630000 00567          APRT  BSS 1          LINK TO EXECUTE 'PRT'
00631000 00570          ADSP  BSS 1          LINK TO EXECUTE 'DSP'
00632000 00571          ASPC  BSS 1          LINK TO EXECUTE 'SPC'
00633000 00572          ALSTK BSS 1          LINK TO EXECUTE 'LISTK'
00634000 00573          AKON  BSS 1          LINK TO EXECUTE 'KON'
00635000 00574          AKOF  BSS 1          LINK TO EXECUTE 'KOFF'
00636000 00575          AFXD  BSS 1          LINK TO EXECUTE 'FXD'
00637000 00576          AFLT  BSS 1          LINK TO EXECUTE 'FLT'
00638000 00577          AENT  BSS 1          LINK TO EXECUTE 'ENT'
00639000                *
00640000 00600          ACSTI BSS 1          CASSETTE INITIALIZATION
00641000 00601          ARFK  BSS 1          REWIND FROM KEYBOARD
00642000 00602          DMALO BSS 1          LINK TO DMA LOCKOUT ROUTINE
00643000 00603          ASTPA BSS 1          LINK TO SET CASSETTE P.A.
00644000 00604          AWTRR BSS 1          LINK TO WRITE RECORD
00645000 00605          ACHST BSS 1          LINK TO FIND RECORD
00646000 00606          ARDRC BSS 1          LINK TO READ RECORD
00647000                *
00648000 00607  001053  ABUMP DEF BUMP       BUMP PARAMETER POINTER (FAP1)
00649000 00610  001110  ACOUN DEF COUNT      COUNT PARAMETERS ON STACK
00650000 00611  001133  AGTAD DEF GETAD      GETAD SUBROUTINE
00651000 00612  001142  AGTIN DEF GETIN      GETIN SUBROUTINE
00652000                *
00653000 00613                BSS 2          FOR MORE LINKS IF NEEDED
```

BASE-PAGE SUBROUTINES

```
00655000                *
00656000                * UTILITIES
00657000                *

00659000                *
00660000                * SUBROUTINE TO GET OPERAND ABSOLUTE ADDRESS     W.F.C.
00661000                *
00662000                * ON EXIT:  A = UPDATED STACK POINTER
00663000                *           B = ABSOLUTE ADDRESS
00664000                *       SAVEB = OLD STACK POINTER
00665000                *
00666000 00615  005263  ABSAD LDB AP1        ENTER HERE TO USE AP1
00667000 00616  035276        STB SAVEB
00668000                *
00669000 00617  100001        LDA B,I
00670000 00620  050140        AND P7         GET INDEX NUMBER
00671000 00621  020632        ADA INDXP
00672000 00622  024145        ADB P2
00673000 00623  104001        LDB B,I        B = RELATIVE ADDRESS
00674000 00624  124000        ADB A,I        B = ABSOLUTE ADDRESS
00675000                *
00676000 00625  001276        LDA SAVEB
00677000 00626  020254        ADA P1
00678000 00627  100000        LDA A,I        A = LENGTH
00679000 00630  021276        ADA SAVEB      A = UPDATED POINTER
00680000 00631  170201        RET 1
00681000                *
00682000 00632  077275  INDXP DEF IDXRW      POINTER TO INDEXED RWM

00684000                *
00685000                * WAIT SUBROUTINE
00686000                *
00687000                * ON ENTRY: B = -DELAY IN MILLISECONDS
00688000                *
00689000 00633  000642  DELAY LDA TIME
00690000 00634  072100        HIA *
00691000 00635  001206        LDA IOTMP      TEST FOR STOP KEY
00692000 00636  010254        CPA P1
00693000 00637  170201        RET 1
00694000 00640  076173        RIB *-5
00695000 00641  170201        RET 1
00696000                *
00697000 00642  177130  TIME  OCT 177130
```

BASE-PAGE SUBROUTINES

```
                    *
                    * CONVERT FLOATING NUMBER TO INTEGER    W.F.C.
                    *
                    * ON ENTRY:
                    *
                    *   A POINTS TO FLOATING NUMBER
                    *
                    * ON EXIT:
                    *
                    *   B HAS INTEGER VALUE
                    *   O INDICATES OVERFLOW STATUS
                    *
                    *   AR2 HAS FRACTIONAL REMAINDER
                    *
                    * TEMPORARIES USED: T1,T2
                    *
00643  000001             LDA B           ALTERNATE ENTRY
                    *
00644  004127       FIXPT LDB ADR2        ADDRESS OF AR2
00645  071403             XFR 4           MOVE NUMBER TO AR2
00646  004177             LDB P0          INITIALIZE RESULT
00647  173201             SOC *+1,C
00650  000020             LDA AR2         LOOK AT EXPONENT
00651  170405             AAR 6
00652  020254             ADA P1
00653  072417             SZA FI3
00654  172426             SAM FI4
00655  031711             STA T1
00656  064664             JMP FI2
                    *
00657  024001       FI1   ADB B           2X
00660  035712             STB T2
00661  024001             ADB B           4X
00662  024001             ADB B           8X
00663  025712             ADB T2          10X
00664  000177       FI2   LDA P0
00665  075541             MLY             SHIFT AR2 LEFT
00666  170040             TCA             BUILD NEGATIVE NUMBER
00667  024000             ADB A           ADD IN NEXT DIGIT
00670  055711             DSZ T1
00671  064657             JMP FI1
                    *
00672  000021       FI3   LDA AR2+1
00673  170513             SAR 12
00674  020151             ADA M5
00675  172402             SAM *+2         ROUND
00676  024257             ADB M1
                    *
00677  000020             LDA AR2
00700  073402             RLA *+2         TEST MANTISSA SIGN
00701  174040             TCB             COMPLEMENT IF NECESSARY
00702  170201       FI4   RET 1
                    *
                    * BEEP SUBROUTINE
                    *
00703  000177       BEEP  LDA P0
00704  030011             STA PA
00705  000143             LDA P4
00706  030005             STA R5
00707  170201             RET 1

                    *
                    * CLEAR I/O BUFFER AND PUT 'LAZY-T' AT LEFT END
                    *
00710  140450       EOLIO JSM ACLBI,I
00711  000214             LDA EOLB
00712  130313             STA AIBUF,I
00713  170201             RET 1

                    *
                    * MISCELLANY FOR JB
                    *
00714  000721       ARET1 DEF RET1
                    *
00715  000177       CLMOD LDA P0          SET MODE=0
00716  064720             JMP STMOD
00717  000143       STELM LDA P4          SET MODE=4
00720  031256       STMOD STA MODE
00721  170201       RET1  RET 1
                    *
00722  140404       ERLNF JSM AERR1,I     LINE NOT FOUND
00723  031461             ASC 1,31
                    *
```

```
00724  005315  SECCK LDB STYFG
00725  076474        SZB RET1
00726  140404  ERSEC JSM AERR1,I
00727  030064        ASC 1,04

                     *
                     * SOME COMMON ERRORS
                     *
00730  000731  AREPN DEF *+1
00731  140404  E29   JSM AERR1,I     ERROR, ROM MISSING AT EXECUTION
00732  031071        ASC 1,29
                     *
00733  140404  E32   JSM AERR1,I     ERROR, ILLEGAL DATA TYPE
00734  031462        ASC 1,32
                     *
                     * SUBROUTINE TO DO AN EXE A
                     *
00735  070430  EXEXA DIR             PREVENT INTERRUPT INTERFERENCE
00736  070000        EXE A
00737  064747        JMP SXCMM+3
                     *
                     * SUBROUTINE TO CLEAR BITS IN XCOMM
                     *
                     * ON ENTRY:  B = MASK TO CLEAR BITS
                     *
00740  070430  CLXCM DIR             PREVENT INTERRUPT INTERFERENCE
00741  001255        LDA XCOMM
00742  050001        AND B
00743  064746        JMP SXCMM+2
                     *
                     * SUBROUTINE TO SET BITS IN XCOMM
                     *
                     * ON ENTRY:  A = BITS TO BE INCLUDED
                     *
00744  070430  SXCMM DIR             PREVENT INTERRUPT INTERFERENCE
00745  061255        IOR XCOMM
00746  031255        STA XCOMM
00747  070420        EIR
00750  170201        RET 1

                     *
                     * SUBROUTINE TO GET NUMERIC PARAMETER
                     *
                     * ON ENTRY: FAP1 POINTS TO PARAMETER
                     *
                     * ON EXIT TO P+1:  A = CLASS OF NON-NUMERIC ITEM ENCOUNT.
                     *
                     * ON EXIT TO P+2:  B POINTS TO VALUE
                     *
00751  101272  NGET  LDA FAP1,I      GET 'WHAT' WORD
00752  172201        SAP *+1,C
00753  170513        SAR 12          GET CLASS
00754  010254        CPA P1          NUMERIC?
00755  064757        JMP *+2         YES
00756  170201        RET 1           NO
                     *
00757  005272        LDB FAP1
00760  040616        JSM ABSAD+1
00761  170202        RET 2
                     *
                     * INTEGER DIVIDE        W.F.C.
                     *
                     * ON ENTRY:
                     *
                     *   BA HAS DIVIDEND
                     *
                     *   JSM IDIV
                     *   DEF DIVISOR
                     *
                     * ON EXIT:
                     *
                     *   A = QUOTIENT
                     *   B = REMAINDER
                     *   O = OVERFLOW STATUS
                     *
                     * TEMPORARIES USED: T1,T2,T3,T4,T5,T6
                     *
00762  004177  SDIV  LDB P0          ALTERNATE ENTRY
00763  035711  IDIV  STB T1          SAVE HI DIVIDEND
00764  004146        LDB M2
00765  035712        STB T2          INITIALIZE QUOTIENT SIGN
00766  035713        STB T3          INITIALIZE REMAINDER SIGN
00767  004160        LDB M16
```

```
00868000 00770  035714          STB T4          INITIALIZE LOOP COUNTER
00869000                 *
00870000 00771  144003          ISZ R,I
00871000 00772  104003          LDB R,I         ADDRESS OF DIVISOR ADDRESS
00872000 00773  104001          LDB B,I         ADDRESS OF DIVISOR
00873000 00774  104001          LDB B,I
00874000 00775  176003          SBP *+3         GET ABS OF DIVISOR
00875000 00776  045712          ISZ T2
00876000 00777  174040          TCB
00877000 01000  035715          STB T5          SAVE + DIVISOR
00878000 01001  174040          TCB
00879000 01002  035716          STB T6          SAVE - DIVISOR
00880000                 *
00881000 01003  005711          LDB T1          TEST DIVIDEND SIGN
00882000 01004  176010          SBP DIV0
00883000 01005  045712          ISZ T2          COMPLEMENT DIVIDEND
00884000 01006  066007          JMP *+1         (ALLOW FOR SKIP)
00885000 01007  170040          TCA
00886000 01010  174140          CMB
00887000 01011  072002          RZA *+2
00888000 01012  024254          ADB P1
00889000 01013  045713          ISZ T3          SET REMAINDER SIGN -
00890000 01014  025716   DIV0   ADB T6          ADD - DIVISOR
00891000 01015  176034          SBP OVFL        SKIP IF OVERFLOW
00893000                 *
00894000                 * MAIN DIVIDE LOOP
00895000                 *
00896000 01016  174600   DIV1   SBL 1           SHIFT LEFT
00897000 01017  172002          SAP *+2
00898000 01020  024254          ADB P1
00899000 01021  170600          SAL 1
00900000 01022  025715          ADB T5          ADD + DIVISOR
00901000 01023  066032          JMP DIV3
00902000 01024  073072   DIV2   SLA DIV1
00903000 01025  174600          SBL 1           SHIFT LEFT
00904000 01026  172002          SAP *+2
00905000 01027  024254          ADB P1
00906000 01030  170600          SAL 1
00907000 01031  025716          ADB T6          ADD - DIVISOR
00908000                 *
00909000 01032  176402   DIV3   SBM *+2
00910000 01033  060254          IOR P1
00911000 01034  045714          ISZ T4          INCREMENT LOOP COUNTER AND TEST
00912000 01035  066024          JMP DIV2
00913000                 *
00914000 01036  176002          SBP *+2         CORRECT NEGATIVE REMAINDER
00915000 01037  025715          ADB T5
00916000                 *
00917000 01040  045712          ISZ T2          CORRECT QUOTIENT SIGN
00918000 01041  066050          JMP DIV5
00919000 01042  170040          TCA
00920000 01043  173201   DIV4   SOC *+1,C       ALL OK
00921000                 *
00922000 01044  045713          ISZ T3
00923000 01045  170201          RET 1           RETURN POSITIVE REMAINDER
00924000 01046  174040          TCB
00925000 01047  170201          RET 1           RETURN NEGATIVE REMAINDER
00926000                 *
00927000 01050  172073   DIV5   SAP DIV4
00928000                 *
00929000 01051  173301   OVFL   SOC *+1,S       OVERFLOW, SET O-REGISTER
00930000 01052  170201          RET 1
00932000                 *
00933000                 * SUBROUTINE TO BUMP PARAMETER POINTER
00934000                 *
00935000                 * ON ENTRY: A = +- COUNT
00936000                 *
00937000                 * ON EXIT TO P+1:  NO MORE PARAMETERS
00938000                 *
00939000                 * ON EXIT TO P+2:  FAP1 = NEXT PARAMETER ADDRESS
00940000                 *
00941000                 * TEMPORARIES USED: T1,T2
00942000                 *
00943000 01053  072415   BUMP   SZA BU2         SKIP IF NOTHING TO DO
00944000 01054  031711          STA T1
00945000 01055  172014          SAP BU3         WHICH WAY?
00946000                 *
00947000 01056  005272          LDB FAP1        MOVE TO LEFT IF -
00948000 01057  100001   BU1    LDA B,I
00949000 01060  170603          SAL 4           LOOK AT PARAMETER LINK BIT
00950000 01061  172012          SAP BU4
00951000 01062  000001          LDA B
00952000 01063  020254          ADA P1
00953000 01064  124000          ADB A,I
00954000 01065  045711          ISZ T1
```

BASE-PAGE SUBROUTINES

```
01066 066057          JMP BU1          KEEP ON
                *
01067 035272          STB FAP1
01070 170202    BU2   RET 2            RETURN
                *
01071 005263    BU3   LDB AP1          MOVE TO RIGHT IF +
01072 015272          CPB FAP1
01073 170201    BU4   RET 1            RETURN
                *
01074 035712    BU5   STB T2           SAVE PREVIOUS LOCATION
01075 000001          LDA B
01076 020254          ADA P1
01077 124000          ADB A,I
01100 015272          CPB FAP1
01101 066103          JMP *+2
01102 066074          JMP BU5
                *
01103 005712          LDB T2
01104 035272          STB FAP1         MOVE FAP1 ONE POSITION
01105 055711          DSZ T1
01106 066071          JMP BU3          KEEP ON
                *
01107 170202          RET 2            RETURN
                *
                * SUBROUTINE TO COUNT PARAMETERS ON STACK
                *
                * ON EXIT:  A = # OF NUMERIC PARAMETERS
                *           B = # OF PARAMETERS
                *        FAP1 = LOCATION OF LEFTMOST PARAMETER
                *
                * TEMPORARIES USED: T1,T2
                *
01110 000177    COUNT LDA P0
01111 031711          STA T1           INITIALIZE A COUNT
01112 031712          STA T2           INITIALIZE B COUNT
01113 005263          LDB AP1
01114 100001    CO1   LDA B,I          GET "WHAT" WORD
01115 170600          SAL 1            LOOK AT CLASS
01116 172402          SAM *+2          SKIP IF NON-NUMERIC
01117 045711          ISZ T1
01120 045712          ISZ T2
01121 170602          SAL 3            LOOK AT PARAMETER LINK BIT
01122 172005          SAP CO2
01123 000001          LDA B
01124 020254          ADA P1
01125 124000          ADB A,I
01126 066114          JMP CO1          MORE PARAMETERS FOLLOW
                *
01127 035272    CO2   STB FAP1         INITIALIZE POINTER
01130 001711          LDA T1
01131 005712          LDB T2
01132 170201          RET 1            RETURN
                *
                * GET NUMERIC OPERAND ADDRESS
                *
                * ON EXIT:  B = OPERAND ADDRESS
                *         AP1 = UPDATED
                *
01133 040615    GETAD JSM ABSAD        GET OPERAND ABSOLUTE ADDRESS
01134 031263          STA AP1          UPDATE AP1
                *
01135 101276          LDA SAVEB,I      THE 'WHAT' WORD
01136 050221          AND B70K
01137 010175          CPA B10K
01140 170201          RET 1            RETURN IF NUMERIC
                *
01141 064733          JMP E32


                *
                * GET INTEGER PARAMETER
                *
                * ON EXIT:  B = INTEGER VALUE
                *
01142 042133    GETIN JSM GETAD        GET OPERAND ADDRESS
01143 040643          JSM FIXPT-1      CONVERT TO INTEGER
01144 173402          SOS *+2
01145 170201          RET 1
                *
01146 140404    E11   JSM AERR1,I      ERROR, INTEGER OUT OF RANGE
01147 030461          ASC 1,11

                *
                * WAIT EXECUTION
                *
```

BASE-PAGE SUBROUTINES

```
01041000 01150  042142  XWAIT JSM GETIN        GET INTEGER PARAMETER
01042000 01151  176003        SBP *+3
01043000 01152  140404  E17A  JSM AERR1        ERROR, ILLEGAL WAIT PARAMETER
01044000 01153  030467        ASC 1,17
01045000                *
01046000 01154  174040        TCB
01047000 01155  040633        JSM DELAY        GO DELAY
01048000 01156  164365        JMP AINTX,I

01050000 01157                BSS 1            *** RESERVED FOR OK-PAGE CHECKSUM
01051000                      LST
09999000                      END

END OF PASS 2 NO ERRORS DETECTED
```

BASE-PAGE READ-WRITE-MEMORY

```
00003000 76550                ORG 76550B
00004000                      UNL
```

TABLES

```
02001000 01170                ORG 1170B
02002000                      UNS
02003000                *
02004000                * CLASS TABLE FOR COMPILER
02005000                *
02006000                *  LEFT BYTE = CHARACTER CLASS FOR INPUT SCANNER
02007000                * RIGHT BYTE = TOKEN CLASS FOR PARSER
02008000                *
02009000 01170  000000  CTBL  NOP          000
02010000 01171  000000        NOP          001
02011000 01172  000000        NOP          002
02012000 01173  000000        NOP          003
02013000 01174  000000        NOP          004
02014000 01175  000000        NOP          005
02015000 01176  000000        NOP          006
02016000 01177  000000        NOP          007
02017000 01200  000000        NOP          010
02018000 01201  000000        NOP          011
02019000 01202  000000        NOP          012
02020000 01203  000000        NOP          013
02021000 01204  000000        NOP          014
02022000 01205  000000        NOP          015
02023000 01206  000000        NOP          016
02024000 01207  000000        NOP          017
02025000 01210  000000        NOP          020
02026000 01211  000000        NOP          021
02027000 01212  000000        NOP          022
02028000 01213  000000        NOP          023
02029000 01214  000000        NOP          024
02030000 01215  000000        NOP          025
02031000 01216  000000        NOP          026
02032000 01217  000000        NOP          027
02033000 01220  000000        NOP          030
02034000 01221  000000        NOP          031
02035000 01222  000000        NOP          032
02036000 01223  000000        NOP          033
02037000 01224  000000        NOP          034
02038000 01225  000000        NOP          035
02039000 01226  000000        NOP          036
02040000 01227  003020        OCT 3020     037   6  16  I*
02041000 01230  000000        NOP          040
02042000 01231  000000        NOP          041             !
02043000 01232  001465        OCT 1465     042   3  53  "
02044000 01233  000400        OCT 0400     043   1      #
02045000 01234  000000        NOP          044          $
02046000 01235  000400        OCT 0400     045   1      %
02047000 01236  000400        OCT 0400     046   1      &
02048000 01237  000400        OCT 0400     047   1      '
02049000 01240  004002        OCT 4002     050   8   2  (
02050000 01241  003407        OCT 3407     051   7   7  )
02051000 01242  003006        OCT 3006     052   6   6  *
02052000 01243  003003        OCT 3003     053   6   3  +
02053000 01244  003014        OCT 3014     054   6  12  ,
02054000 01245  003012        OCT 3012     055   6  10  -
02055000 01246  002462        OCT 2462     056   5  50  .
02056000 01247  003013        OCT 3013     057   6  11  /
```

TABLES

```
01250  002062     OCT 2062   060   4  50   0
01251  002062     OCT 2062   061   4  50   1
01252  002062     OCT 2062   062   4  50   2
01253  002062     OCT 2062   063   4  50   3
01254  002062     OCT 2062   064   4  50   4
01255  002062     OCT 2062   065   4  50   5
01256  002062     OCT 2062   066   4  50   6
01257  002062     OCT 2062   067   4  50   7
01260  002062     OCT 2062   070   4  50   8
01261  002062     OCT 2062   071   4  50   9
01262  003015     OCT 3015   072   6  13   :
01263  003010     OCT 3010   073   6   8   ;
01264  000400     OCT 0400   074   1       <
01265  000400     OCT 0400   075   1       =
01266  000400     OCT 0400   076   1       >
01267  000000     NOP        077           ?
01270  000000     NOP        100           @
01271  001066     OCT 1066   101   2  54   A
01272  001066     OCT 1066   102   2  54   B
01273  001066     OCT 1066   103   2  54   C
01274  001066     OCT 1066   104   2  54   D
01275  001066     OCT 1066   105   2  54   E
01276  001066     OCT 1066   106   2  54   F
01277  001066     OCT 1066   107   2  54   G
01300  001066     OCT 1066   110   2  54   H
01301  001066     OCT 1066   111   2  54   I
01302  001066     OCT 1066   112   2  54   J
01303  001066     OCT 1066   113   2  54   K
01304  001066     OCT 1066   114   2  54   L
01305  001066     OCT 1066   115   2  54   M
01306  001066     OCT 1066   116   2  54   N
01307  001066     OCT 1066   117   2  54   O
01310  001066     OCT 1066   120   2  54   P
01311  001066     OCT 1066   121   2  54   Q
01312  001066     OCT 1066   122   2  54   R
01313  001066     OCT 1066   123   2  54   S
01314  001066     OCT 1066   124   2  54   T
01315  001066     OCT 1066   125   2  54   U
01316  001066     OCT 1066   126   2  54   V
01317  001066     OCT 1066   127   2  54   W
01320  001066     OCT 1066   130   2  54   X
01321  001066     OCT 1066   131   2  54   Y
01322  001066     OCT 1066   132   2  54   Z
01323  003001     OCT 3001   133   6   1   [
01324  004053     OCT 4053   134   8  43   SQR
01325  003404     OCT 3404   135   7   4   ]
01326  000400     OCT 0400   136   1       ^
01327  000000     NOP        137           _
01330  000000     NOP        140
01331  000400     OCT 0400   141   1       L.C. A
01332  000400     OCT 0400   142   1       L.C. B
01333  000400     OCT 0400   143   1       L.C. C
01334  000400     OCT 0400   144   1       L.C. D
01335  000400     OCT 0400   145   1       L.C. E
01336  000400     OCT 0400   146   1       L.C. F
01337  000400     OCT 0400   147   1       L.C. G
01340  000400     OCT 0400   150   1       L.C. H
01341  000400     OCT 0400   151   1       L.C. I
01342  000400     OCT 0400   152   1       L.C. J
01343  000400     OCT 0400   153   1       L.C. K
01344  000400     OCT 0400   154   1       L.C. L
01345  000400     OCT 0400   155   1       L.C. M
01346  000400     OCT 0400   156   1       L.C. N
01347  000400     OCT 0400   157   1       L.C. O
01350  000400     OCT 0400   160   1       L.C. P
01351  000400     OCT 0400   161   1       L.C. Q
01352  000400     OCT 0400   162   1       L.C. R
01353  000400     OCT 0400   163   1       L.C. S
01354  000400     OCT 0400   164   1       L.C. T
01355  000400     OCT 0400   165   1       L.C. U
01356  000400     OCT 0400   166   1       L.C. V
01357  000400     OCT 0400   167   1       L.C. W
01360  000400     OCT 0400   170   1       L.C. X
01361  000400     OCT 0400   171   1       L.C. Y
01362  000400     OCT 0400   172   1       L.C. Z
01363  004422     OCT 4422   173   9  18   PI
01364  000000     NOP        174
01365  003016     OCT 3016   175   6  14   GAZINTA
01366  000400     OCT 0400   176   1       SIGMA
01367  003031     OCT 3031   177   6  25   EOL
                  *
                  * MNEMONIC TABLE
                  *
                  *   L.H. = CLASS     R.H. = TOKEN
                  *
```

TABLES

```
02143000 01370  004063         OCT    4063 LC. P  (65)
02144000 01371  003027         OCT    3027 TLIST (64)
02145000 01372  003027         OCT    3027 LISTK (63)
02146000 01373  004422         OCT    4422 RES  (62)
02147000 01374  003041         OCT    3041 LIST  (61)
02148000 01375  004063         OCT    4063 LC. R (60)
02149000 01376  003047         OCT    3047 =    (59)
02150000 01377  003047         OCT    3047 >    (58)
02151000 01400  003047         OCT    3047 <    (57)
02152000 01401  003047         OCT    3047 >=   (56)
02153000 01402  003047         OCT    3047 <=   (55)
02154000 01403  003047         OCT    3047 #    (54)
02155000 01404  003027         OCT    3027 LKE  (53)
02156000 01405  003027         OCT    3027 LKD  (52)
02157000 01406  003027         OCT    3027 AVE  (51)
02158000 01407  003027         OCT    3027 AVD  (50)
02159000 01410  003057         OCT    3057 VFY  (49)
02160000 01411  003035         OCT    3035 LDB  (48)
02161000 01412  003035         OCT    3035 LDK  (47)
02162000 01413  003035         OCT    3035 RCK  (46)
02163000 01414  003035         OCT    3035 LDM  (45)
02164000 01415  003035         OCT    3035 RCM  (44)
02165000 01416  003041         OCT    3041 LDP  (43)
02166000 01417  003030         OCT    3030 ENP  (42)
02167000 01420  003046         OCT    3046 LDF  (41)
02168000 01421  003046         OCT    3046 RCF  (40)
02169000 01422  003042         OCT    3042 MRK  (39)
02170000 01423  003054         OCT    3054 ERT  (38)
02171000 01424  003035         OCT    3035 FDF  (37)
02172000 01425  003054         OCT    3054 TRK  (36)
02173000 01426  003054         OCT    3054 SSC  (35)
02174000 01427  003036         OCT    3036 IDF  (34)
02175000 01430  003021         OCT    3021 XOR  (33)
02176000 01431  003027         OCT    3027 REW  (32)
02177000 01432  003027         OCT    3027 END  (31)
02178000 01433  003027         OCT    3027 BEEP (30)
02179000 01434  003054         OCT    3054 WAIT (29)
02180000 01435  003050         OCT    3050 RET  (28)
02181000 01436  003026         OCT    3026 DIM  (27)
02182000 01437  003060         OCT    3060 GSB  (26)
02183000 01440  003060         OCT    3060 GTO  (25)
02184000 01441  003060         OCT    3060 GSB+ (24)
02185000 01442  003060         OCT    3060 GSB- (23)
02186000 01443  003060         OCT    3060 GTO+ (22)
02187000 01444  003060         OCT    3060 GTO- (21)
02188000 01445  003030         OCT    3030 ENT  (20)
02189000 01446  004053         OCT    4053 FLG  (19)
02190000 01447  003055         OCT    3055 STP  (18)
02191000 01450  003055         OCT    3055 NOR  (17)
02192000 01451  003055         OCT    3055 TRC  (16)
02193000 01452  004051         OCT    4051 DRND (15)
02194000 01453  004051         OCT    4051 PRND (14)
02195000 01454  003052         OCT    3052 CMF  (13)
02196000 01455  003052         OCT    3052 CFG  (12)
02197000 01456  003052         OCT    3052 SFG  (11)
02198000 01457  003040         OCT    3040 JMP  (10)
02199000 01460  003035         OCT    3035 SPC  (09)
02200000 01461  003035         OCT    3035 FLT  (08)
02201000 01462  003035         OCT    3035 FXD  (07)
02202000 01463  003043         OCT    3043 NOT  (06)
02203000 01464  003024         OCT    3024 AND  (05)
02204000 01465  003021         OCT    3021 OR   (04)
02205000 01466  003045         OCT    3045 DSP  (03)
02206000 01467  003045         OCT    3045 PRT  (02)
02207000 01470  003054         OCT    3054 IF   (01)
02208000        001471  MNTBL  EQU *
02209000 01471  064546         DEC   26982  I    F
02210000 01472  020201         DEC   08321       (01)
02211000 01473  070162         DEC   28786  P    R
02212000 01474  072040         DEC   29728  T
02213000 01475  101144         DEC  -32156 (02)  D
02214000 01476  071560         DEC   29552  S    P
02215000 01477  020203         DEC   08323       (03)
02216000 01500  020157         DEC   08303       O
02217000 01501  071040         DEC   29216  R
02218000 01502  102040         DEC  -31712 (04)
02219000 01503  060556         DEC   24942  A    N
02220000 01504  062040         DEC   25632  D
02221000 01505  102556         DEC  -31378 (05)  N
02222000 01506  067564         DEC   28532  O    T
02223000 01507  020206         DEC   08326       (06)
02224000 01510  020170         OCT 020170        X
02225000 01511  067562         OCT 067562  O     R
02226000 01512  020241         OCT 020241        (33)
02227000 01513  063170         DEC   26232  F    X
```

TABLES

| | | | | | | |
|---|---|---|---|---|---|---|
| 02228000 | 01514 | 062040 | DEC | 25632 | D | |
| 02229000 | 01515 | 103546 | DEC | -30874 | (07) | F |
| 02230000 | 01516 | 066164 | DEC | 27764 | L | T |
| 02231000 | 01517 | 020210 | DEC | 0832[illegible] | | (08) |
| 02232000 | 01520 | 071560 | DEC | 29552 | S | P |
| 02233000 | 01521 | 061440 | DEC | 25376 | C | |
| 02234000 | 01522 | 104552 | DEC | -30358 | (09) | J |
| 02235000 | 01523 | 066560 | DEC | 28016 | M | P |
| 02236000 | 01524 | 020212 | DEC | 08330 | | (10) |
| 02237000 | 01525 | 071546 | DEC | 29542 | S | F |
| 02238000 | 01526 | 063440 | DEC | 26400 | G | |
| 02239000 | 01527 | 105543 | DEC | -29853 | (11) | C |
| 02240000 | 01530 | 063147 | DEC | 26215 | F | G |
| 02241000 | 01531 | 020214 | DEC | 08332 | | (12) |
| 02242000 | 01532 | 061555 | DEC | 25453 | C | M |
| 02243000 | 01533 | 063040 | DEC | 26144 | F | |
| 02244000 | 01534 | 106560 | DEC | -29328 | (13) | P |
| 02245000 | 01535 | 071156 | DEC | 29294 | R | N |
| 02246000 | 01536 | 062216 | DEC | 25742 | D | (14) |
| 02247000 | 01537 | 062162 | DEC | 25714 | D | R |
| 02248000 | 01540 | 067144 | DEC | 28260 | N | D |
| 02249000 | 01541 | 107564 | DEC | -28012 | (15) | T |
| 02250000 | 01542 | 071143 | DEC | 29283 | R | C |
| 02251000 | 01543 | 020220 | DEC | 08336 | | (16) |
| 02252000 | 01544 | 067157 | DEC | 28271 | N | O |
| 02253000 | 01545 | 071040 | DEC | 29216 | R | |
| 02254000 | 01546 | 110563 | DEC | -28301 | (17) | S |
| 02255000 | 01547 | 072160 | DEC | 29808 | T | P |
| 02256000 | 01550 | 020222 | DEC | 08338 | | (18) |
| 02257000 | 01551 | 063154 | DEC | 26220 | F | L |
| 02258000 | 01552 | 063623 | DEC | 26515 | G | (19) |
| 02259000 | 01553 | 062556 | DEC | 25966 | E | N |
| 02260000 | 01554 | 072040 | DEC | 29728 | T | |
| 02261000 | 01555 | 112147 | DEC | -27545 | (20) | G |
| 02262000 | 01556 | 072157 | DEC | 29807 | T | O |
| 02263000 | 01557 | 020055 | DEC | 08237 | | - |
| 02264000 | 01560 | 112547 | DEC | -27289 | (21) | G |
| 02265000 | 01561 | 072157 | DEC | 29807 | T | O |
| 02266000 | 01562 | 020053 | DEC | 08235 | | + |
| 02267000 | 01563 | 113147 | DEC | -27033 | (22) | G |
| 02268000 | 01564 | 071542 | DEC | 29538 | S | B |
| 02269000 | 01565 | 020055 | DEC | 08237 | | - |
| 02270000 | 01566 | 113547 | DEC | -26777 | (23) | G |
| 02271000 | 01567 | 071542 | DEC | 29538 | S | B |
| 02272000 | 01570 | 020053 | DEC | 08235 | | + |
| 02273000 | 01571 | 114147 | DEC | -26521 | (24) | G |
| 02274000 | 01572 | 072157 | DEC | 29807 | T | O |
| 02275000 | 01573 | 020231 | DEC | 08345 | | (25) |
| 02276000 | 01574 | 063563 | DEC | 26483 | G | S |
| 02277000 | 01575 | 061040 | DEC | 25120 | B | |
| 02278000 | 01576 | 115144 | DEC | -26012 | (26) | D |
| 02279000 | 01577 | 064555 | DEC | 26989 | I | M |
| 02280000 | 01600 | 020233 | DEC | 08347 | | (27) |
| 02281000 | 01601 | 073541 | DEC | 30561 | W | A |
| 02282000 | 01602 | 064564 | DEC | 26996 | I | T |
| 02283000 | 01603 | 020235 | DEC | 08349 | | (29) |
| 02284000 | 01604 | 061145 | DEC | 25169 | B | E |
| 02285000 | 01605 | 062560 | DEC | 25968 | E | P |
| 02286000 | 01606 | 117145 | DEC | -249[illegible] | (30) | E |
| 02287000 | 01607 | 067144 | DEC | 282[illegible] | N | D |
| 02288000 | 01610 | 117562 | DEC | -24718 | (31) | R |
| 02289000 | 01611 | 062567 | DEC | 25975 | E | W |
| 02290000 | 01612 | 120151 | OCT | 120151 | (32) | I |
| 02291000 | 01613 | 062146 | DEC | 25702 | D | F |
| 02292000 | 01614 | 020242 | DEC | 08354 | | (34) |
| 02293000 | 01615 | 071563 | DEC | 29555 | S | S |
| 02294000 | 01616 | 061440 | DEC | 25376 | C | |
| 02295000 | 01617 | 121564 | DEC | -23692 | (35) | T |
| 02296000 | 01620 | 071153 | DEC | 29291 | R | K |
| 02297000 | 01621 | 020244 | DEC | 08356 | | (36) |
| 02298000 | 01622 | 063144 | DEC | 26212 | F | D |
| 02299000 | 01623 | 063040 | DEC | 26144 | F | |
| 02300000 | 01624 | 122545 | DEC | -23195 | (37) | E |
| 02301000 | 01625 | 071164 | DEC | 29300 | R | T |
| 02302000 | 01626 | 020246 | DEC | 08358 | | (38) |
| 02303000 | 01627 | 066562 | DEC | 28018 | M | R |
| 02304000 | 01630 | 065440 | DEC | 27424 | K | |
| 02305000 | 01631 | 123562 | DEC | -22670 | (39) | R |
| 02306000 | 01632 | 061546 | DEC | 25446 | C | F |
| 02307000 | 01633 | 020250 | DEC | 08360 | | (40) |
| 02308000 | 01634 | 066144 | DEC | 27748 | L | D |
| 02309000 | 01635 | 063040 | DEC | 26144 | F | |
| 02310000 | 01636 | 124562 | DEC | -22158 | (41) | R |
| 02311000 | 01637 | 062564 | OCT | 062564 | E | T |
| 02312000 | 01640 | 020234 | OCT | 020234 | | (28) |

```
02313000 01641   066144          OCT 066144   L     D
02314000 01642   070040          OCT 070040   P
02315000 01643   125562          DEC -21646   (43)  R
02316000 01644   061555          DEC  25453   C     M
02317000 01645   020254          DEC  08364         (44)
02318000 01646   066144          DEC  27748   L     D
02319000 01647   066440          DEC  27936   M
02320000 01650   126562          DEC -21134   (45)  R
02321000 01651   061553          DEC  25451   C     K
02322000 01652   020256          DEC  08366         (46)
02323000 01653   066144          DEC  27748   L     D
02324000 01654   065440          DEC  27424   K
02325000 01655   127554          DEC -20628   (47)  L
02326000 01656   062142          DEC  25698   D     B
02327000 01657   020260          DEC  08368         (48)
02328000 01660   073146          DEC  30310   V     F
02329000 01661   074440          DEC  31008   Y
02330000 01662   130541          DEC -20127   (49)  A
02331000 01663   073144          DEC  30308   V     D
02332000 01664   131141          DEC -19871   (50)  A
02333000 01665   073145          DEC  30309   V     E
02334000 01666   131554          OCT 131554   (51)  L
02335000 01667   065544          OCT 065544   K     O
02336000 01670   020264          OCT 020264         (52)
02337000 01671   021666          OCT 021666   #     (54)
02338000 01672   036076          OCT 036076   <     >
02339000 01673   133076          OCT 133076   (54)  >
02340000 01674   036266          OCT 036266   <     (54)
02341000 01675   036075          OCT 036075   <     =
02342000 01676   133475          OCT 133475   (55)  =
02343000 01677   036267          OCT 036267   <     (55)
02344000 01700   037075          OCT 037075   >     =
02345000 01701   134075          OCT 134075   (56)  =
02346000 01702   037270          OCT 037270   >     (56)
02347000 01703   036271          OCT 036271   <     (57)
02348000 01704   037272          OCT 037272   >     (58)
02349000 01705   036673          OCT 036673   =     (59)
02350000 01706   066153          OCT 066153   L     K
02351000 01707   062440          OCT 062440   E
02352000 01710   132562          OCT 132562   (53)  R
02353000 01711   062563          OCT 062563   E     S
02354000 01712   137162          OCT 137162   (62)  R
02355000 01713   136154          OCT 136154   (60)  L
02356000 01714   064563          OCT 064563   I     S
02357000 01715   072040          OCT 072040   T
02358000 01716   065677          OCT 065677   K     (63)
02359000 01717   072154          OCT 072154   T     L
02360000 01720   064563          OCT 064563   I     S
02361000 01721   072300          OCT 072300   T     (64)
02362000 01722   070301          OCT 070301   P     (65)
02363000 01723   066151          OCT 066151   L     I
02364000 01724   071564          OCT 071564   S     I
02365000 01725   020275          OCT 020275         (61)
02366000 01726   062556          OCT 062556   E     N
02367000 01727   070040          OCT 070040   P
02368000 01730   125200          OCT 125200   (42)  \
02369000 01731   000000          NOP
```

TABLES FOR COMPILER -- PARSE TABLES

```
02371000                   *
02372000                   * EQUATES NEEDED BY PARSER
02373000                   *
02374000         000210 MAXR  EQU 136
02375000         000274 MAXL  EQU 188
02376000         000302 MAXP  EQU 194
02377000                      SUP

02379000 01732   002010 READX DEC  1032,1550,5141,9485,10799,11312,11985,12337
02380000 01742   031306       DEC  12998,13362,13875,14388,14989,15502,16439,17039
02381000 01752   042071       DEC  17465,17978,18491,19088,19601,20626,21057,21651
02382000 01762   053103       DEC  22083,22596,23188,23701,24215,24649,25162,25868
02383000 01772   063115       DEC  26189,26776,27290,27924,28900,1032,1550,3090
02384000 02002   012025       DEC  5141,9485,13362,14388,17978,21057,22083,23701
02385000 02012   061112       DEC  25162,25868,26189,26776,27422,27924,1032,1550
02386000 02022   006023       DEC  3091,5141,9485,13362,14388,17978,21057,22083
02387000 02032   056225       DEC  23701,25162,25868,26189,26776,27422,27924,1032
02388000 02042   003016       DEC  1550,5141,9485,13362,14388,17978,21057,22083
02389000 02052   056225       DEC  23701,25162,25868,26189,26776,27422,27924,1032
02390000 02062   022415       DEC  9485,13362,21057,22083,23701,25162,25868,26189
02391000 02072   066424       DEC  27924,1032,1550,5141,9485,13362,21057,22083
02392000 02102   056225       DEC  23701,25162,25868,26189,27924,14388,26776,27422
```

TABLES FOR COMPILER -- PARSE TABLES

```
02393000 02112 004502       DEC  2370,2371,25162,26189,26776,27441,27924,25162
02394000 02122 063115       DEC  26189,26776,27924,26776,23702,25163,26703,27942
02395000 02132 061112       DEC  25162,26189,26776,27440,27924,1161,27982,1162
02396000 02142 061112       DEC  25162,26189,27924,1032,1550,5141,9485,13362
02397000 02152 034064       DEC  14388,21057,22083,23701,25162,25868,26189,26776
02398000 02162 065436       DEC  27422,27924,1032,1550,5141,9485,13362,14388
02399000 02172 043072       DEC  17978,21057,22083,23701,25164,25868,26189,26777
02400000 02202 065436       DEC  27422,27924,1035,1036,1037,25816,27351,514
02401000 02212 001004       DEC  516,518,515,517,519,6853,7206,8748
02402000 02222 016047       DEC  7207,1032,1550,5141,9485,10799,11312,11985
02403000 02232 030061       DEC  12337,13362,13875,14388,14989,15502,16439,17039
02404000 02242 042071       DEC  17465,17978,18491,19088,19601,20626,21057,21651
02405000 02252 053103       DEC  22083,22596,23188,23701,24215,24649,25162,25868
02406000 02262 063115       DEC  26189, 6776,27422,27924,28900,2576,7208,20030
02407000 02272 005020       DEC  2576,  030,7209,1551,5142,20031,3089,5655
02408000 02302 004447       DEC  2343,6180,6283,6168,6169,6170,4301,12999
02409000 02312 017052       DEC  7722,9773,1032,1550,5141,9485,10799,11312
02410000 02322 027321       DEC  11985,12337,12998,13362,13875,14388,14989,15502
02411000 02332 040067       DEC  16439,17039,17465,17978,18491,19088,19601,20626
02412000 02342 051101       DEC  21057,21651,22083,22596,23188,23701,24215,24649
02413000 02352 061112       DEC  25162,25868,26189,26776,27422,27924,28900,6173
02414000 02362 014037       DEC  6175,13000,3854,6174,6177,6179,6693,3856
02415000 02372 014034       DEC  6172,3859,6172,2325,6172,2337,6172,3818
02416000 02402 014034       DEC  6172,2344,6172,3857,6284,3871,6284,8235
02417000 02412 014033       DEC  6171,10286,20301,4628
02419000 02416 007275 LOOKA DEC  3773,6333,9,3774,6334,10,4287,6335
02420000 02426 031277       DEC  12991,32,3776,6336,34,4313,13017,53
02421000 02436 010341       DEC  4321,13025,54,13037,56,4317,13021,60
02422000 02446 010322       DEC  4306,13010,61,12993,64,4315,13019,66
02423000 02456 010302       DEC  4290,12994,69,1094,274,1095,233,4319
02424000 02466 031337       DEC  13023,72,590,288,592,288,6737,286
02425000 02476 016123       DEC  7251,8787,206,7252,8788,239,7253,207
02426000 02506 016126       DEC  7254,240,4325,13029,88,2650,7258,20058
02427000 02516 000427       DEC  279,2651,251,2652,253,7261,230,7262
02428000 02526 000430       DEC  280,1631,5215,20063,249,1632,5216,252
02429000 02536 003141       DEC  1633,5217,250,3170,5730,254,3171,5731
02430000 02546 000377       DEC  255,3172,5732,256,6246,211,6247,212
02431000 02556 014150       DEC  6248,213,7787,329,6254,308,6255,222
02432000 02566 014163       DEC  6259,327,6773,299,6263,238,6264,220
02433000 02576 020200       DEC  8320,260,8321,261,8322,262,6275,226
02434000 02606 024204       DEC  10372,243,10373,244,4743,263,4744,264

02436000 02616 000000 APPLY DEC  0,109,-9532,195,106,112,87,-20790
02437000 02626 000311       DEC  201,-20788,203,4209,27354,28395,29298,31035
02438000 02636 075442       DEC  31522,-32448,-30512,-30031,4928,5440,5748,2226
02439000 02646 052512       DEC  21834,23371,-23220,14648,15670,16187,16704,17224
02440000 02656 042500       DEC  17728,18038,18610,19244,311,669,-9571,-20835
02441000 02666 000236       DEC  158,667,-9573,-20837,156,22714,185,23798
02442000 02676 000365       DEC  245,29944,247,31910,32423,165,7849,11434
02443000 02706 000250       DEC  168,8962,12035,257,7350,10935,181,22204
02444000 02716 000273       DEC  187,-30961,-25834,10506,265,25394,27972,-28448
02445000 02726 046361       DEC  19697,20210,13106,13618,14149,15157,267,31036
02446000 02736 037474       DEC  16188,321,675,-9565,-20829,164,671,30880
02447000 02746 100240       DEC  -32608,-9569,4768,5280,31905,32418,-20833,16032
02448000 02756 040240       DEC  16544,17568,89,8476,283,25395,20761,21274
02449000 02766 031463       DEC  13107,13619,285,171,172,12581,292,101
02450000 02776 044452       DEC  18730,297,173,105,13102,13615,301,214
02451000 03006 000257       DEC  175,26851,-31564,6265,1659,6780,2685,3707
02452000 03016 000172       DEC  122,176,16186,313,5247,126,-32532,16675
02453000 03026 042476       DEC  17726,317,184,227,231,174,108,82
02454000 03036 073350       DEC  30440,134
02456000 03040 000245 INDEX DEC  165,9232,9232,9232,9232,4881,7057,9232
02457000 03050 046620       DEC  19856,19856,9232,9232,9232,11274,12556,14083
02458000 03060 030414       DEC  12556,14465,14593,11274,11274,12556,12556,16131
02459000 03070 034605       DEC  14725,15364,17539,9232,17539,9232,9232,19856
02460000 03100 022020       DEC  9232,19856,9232,9232,9232,17539,17539,15873
02461000 03110 037001       DEC  15873,9232,11274,9232,9232,9232,16001,16131
02462000 03120 040205       DEC  16517,17153,17281,17409,9232,17539,9232,9232
02463000 03130 022020       DEC  9232,17935,17281,9232,9232,17935,17935,19856
02464000 03140 052601       DEC  21869,9232,11274,9232,9232,22017,22145,17539
02465000 03150 053402       DEC  22274,22529,22657,22785,11274,22913,23041,23169
02466000 03160 055401       DEC  23297,9232,23426,23426,23681,23681,23844,28419
02467000 03170 070202       DEC  28802,28419,28417,28417,29057,29057,29187,29186
02468000 03200 071002       DEC  29186,29570,29570,29570,29826,30081,30209,30337
02469000 03210 073401       DEC  30465,30594,30849,30977,31141,-29695,-29567,-29439
02470000 03220 106601       DEC  -29311,-29183,-29055,-28927,-28799,-28671,-28543,-28543
02471000 03230 110402       DEC  -28414,-28158,-27902,-27646,-27390,-27134,-26878,-26623
02472000 03240 114001       DEC  -26623,-26623,-26495,-26367,-26367,-26239,-26111,-26111
02473000 03250 000203       DEC  131,515,900,1411,1795,2179,2562,2819
02474000 03260 006203       DEC  3203,3586,3843,4227,4610,4866,5123,5506
02475000 03270 013202       DEC  5762,6018,6275,6659,7042,7298,7555,7940
02476000 03300 020+02       DEC  8450,8706,8962,9218,9476,9987,10371,10755
02477000 03310 025603       DEC  11139,11523,11906,12162,12418,12674,12930,13186
02478000 03320 032202       DEC  13442,13698,13954,14210,14466,14722,14978,15234
```

TABLES FOR COMPILER -- PARSE TABLES

```
02479000 03330 036202  DEC 15490,15746,16002,16258,-24695,-24694,-24672,-24670
02480000 03340 117700  DEC -24640,-23739,128,129,257,384,385,385
02481000 03350 001200  DEC 640,642,768,770,896,1024,1024,1025
02482000 03360 002000  DEC 1024,1024,1025,1025,1025,1025,1025,1025
02483000 03370 002000  DEC 1024,1025,1024,1025,1024,1025,1024,1025
02484000 03400 002000  DEC 1024,1025,1025,1024,1024,1024,1025,1025
02485000 03410 002001  DEC 1025,1028,1281,1281,1280,1281,1536,1536
02486000 03420 011402  DEC 4866,4866,5376,5378,5888,5890,6144,6145
02487000 03430 014400  DEC 6400,6402,6402,6402,6402,6656,6658,6658
02488000 03440 015600  DEC 7040,7042,7042,7424,7425,7425,7808,7810
02489000 03450 020000  DEC 8192,8194,8448,8448,8448,8450,8449,8453
02490000 03460 020403  DEC 8451,8448,8451,8960,8963,8961,10240,10240
02491000 03470 024502  DEC 10626,10626,11136,11138,12800,12800,12803,13056
02492000 03500 031403  DEC 13059,13824,13826,13952,13954,14080,14083,14083
02493000 03510 034000  DEC 14336,14338,[illegible]464,14466,14720,14722,14722,14848
02494000 03520 035002  DEC 14850,14976,[illegible]976,15360,15362,15490,15616,15618
02495000 03530 040400  DEC 16640,16642,16768,16768,17024,17026,17280,17280
02496000 03540 041600  DEC 17280,17283,17283,17792,17794,17920,17920,17922
02497000 03550 043200  DEC 18048,18050,18178,18306,18432,18560

02499000 03556         BSS 1        **** RESERVED FOR 2K-PAGE CHECKSUM ****

02501000 03557         BSS 5        RESERVED FOR TABLE EXPANSION
```

SYNTHESIZE JUMP TABLE

```
02503000                *
02504000                * SYNTHESIZE JUMP TABLE
02505000                *
02506000 03564 004543   SYNJP DEF APL1      1
02507000 03565 004543         DEF APL1      2
02508000 03566 004740         DEF OLABL     3
02509000 03567 004631         DEF OUT1      4
02510000 03570 004631         DEF OUT1      5
02511000 03571 004631         DEF OUT1      6
02512000 03572 004543         DEF APL1      7
02513000 03573 004543         DEF APL1      8
02514000 03574 004543         DEF APL1      9
02515000 03575 004543         DEF APL1     10
02516000 03576 004631         DEF OUT1     11
02517000 03577 004644         DEF IMSTZ    12
02518000 03600 004543         DEF APL1     13
02519000 03601 004627         DEF OUT2     14
02520000 03602 004631         DEF OUT1     15
02521000 03603 004672         DEF OEMTY    16
02522000 03604 004627         DEF OUT2     17
02523000 03605 004627         DEF OUT2     18
02524000 03606 004627         DEF OUT2     19
02525000 03607 004627         DEF OUT2     20
02526000 03610 005012         DEF BRSTR    21
02527000 03611 005021         DEF BRNUM    22
02528000 03612 004672         DEF OEMTY    23
02529000 03613 004627         DEF OUT2     24
02530000 03614 004672         DEF OEMTY    25
02531000 03615 004627         DEF OUT2     26
02532000 03616 004672         DEF OEMTY    27
02533000 03617 004627         DEF OUT2     28
02534000 03620 004672         DEF OEMTY    29
02535000 03621 004627         DEF OUT2     30
02536000 03622 004672         DEF OEMTY    31
02537000 03623 004627         DEF OUT2     32
02538000 03624 004627         DEF OUT2     33
02539000 03625 005041         DEF LITRL    34
02540000 03626 004663         DEF IMDSF    35
02541000 03627 004543         DEF APL1     36
02542000 03630 004627         DEF OUT2     37
02543000 03631 004627         DEF OUT2     38
02544000 03632 177521         DEF AP36,I   39   UDF CALL
02545000 03633 177522         DEF AP37,I   40   UDF CALL
02546000 03634 004627         DEF OUT2     41
02547000 03635 004627         DEF OUT2     42
02548000 03636 004672         DEF OEMTY    43
02549000 03637 004627         DEF OUT2     44
02550000 03640 004543         DEF APL1     45
02551000 03641 004543         DEF APL1     46
02552000 03642 004627         DEF OUT2     47
02553000 03643 004627         DEF OUT2     48
02554000 03644 004543         DEF APL1     49
02555000 03645 004627         DEF OUT2     50
02556000 03646 004543         DEF APL1     51
02557000 03647 004627         DEF OUT2     52
02558000 03650 004543         DEF APL1     53
```

SYNTHESIZE JUMP TABLE

```
02559000 03651   004627         DEF  OUT2       54
02560000 03652   004543         DEF  APL1       55
02561000 03653   004627         DEF  OUT2       56
02562000 03654   004627         DEF  OUT2       57
02563000 03655   004627         DEF  OUT2       58
02564000 03656   004627         DEF  OUT2       59
02565000 03657   004543         DEF  APL1       60
02566000 03660   004627         DEF  OUT2       61
02567000 03661   004627         DEF  OUT2       62
02568000 03662   004543         DEF  APL1       63
02569000 03663   004627         DEF  OUT2       64
02570000 03664   004627         DEF  OUT2       65
02571000 03665   004543         DEF  APL1       66
02572000 03666   004543         DEF  APL1       67
02573000 03667   004670         DEF  UNARY      68
02574000 03670   004543         DEF  APL1       69
02575000 03671   004627         DEF  OUT2       70
02576000 03672   004543         DEF  APL1       71
02577000 03673   004627         DEF  OUT2       72
02578000 03674   004543         DEF  APL1       73
02579000 03675   004703         DEF  UNUMB      74
02580000 03676   004631         DEF  OUT1       75
02581000 03677   004543         DEF  APL1       76
02582000 03700   004627         DEF  OUT2       77
02583000 03701   004675         DEF  UROUN      78
02584000 03702   004623         DEF  OUT4       79
02585000 03703   177523         DEF  AP77,I     80    UDF FCN
02586000 03704   177524         DEF  AP78,I     81    UDF FCN
02587000 03705   004631         DEF  OUT1       82
02588000 03706   004623         DEF  OUT4       83
02589000 03707   004627         DEF  OUT2       84
02590000 03710   004543         DEF  APL1       85
02591000 03711   004543         DEF  APL1       86
02592000 03712   005037         DEF  STRAS      87
02593000 03713   005037         DEF  STRAS      88
02594000 03714   004543         DEF  APL1       89
02595000 03715   004627         DEF  OUT2       90
02596000 03716   004543         DEF  APL1       91
02597000 03717   004744         DEF  OSTRG      92
02598000 03720   004623         DEF  OUT4       93
02599000 03721   004631         DEF  OUT1       94
02600000 03722   004623         DEF  OUT4       95
02601000 03723   004543         DEF  APL1       96
02602000 03724   004627         DEF  OUT2       97
02603000 03725   004543         DEF  APL1       98
02604000 03726   004627         DEF  OUT2       99
02605000 03727   004774         DEF  ODIME     100
02606000 03730   004777         DEF  ODIML     101
02607000 03731   004777         DEF  ODIML     102
02608000 03732   004543         DEF  APL1      103
02609000 03733   005077         DEF  OSCOM     104
02610000 03734   004543         DEF  APL1      105
02611000 03735   004627         DEF  OUT2      106
02612000 03736   004543         DEF  APL1      107
02613000 03737   004627         DEF  OUT2      108
02614000 03740   004627         DEF  OUT2      109
02615000 03741   004744         DEF  OSTRG     110
02616000 03742   004747         DEF  ESTRG     111
02617000 03743   004543         DEF  APL1      112
02618000 03744   004543         DEF  APL1      113
02619000 03745   004543         DEF  APL1      114
02620000 03746   004627         DEF  OUT2      115
02621000 03747   004627         DEF  OUT2      116
02622000 03750   004543         DEF  APL1      117
02623000 03751   004627         DEF  OUT2      118
02624000 03752   004543         DEF  APL1      119
02625000 03753   004627         DEF  OUT2      120
02626000 03754   004543         DEF  APL1      121
02627000 03755   004543         DEF  APL1      122
02628000 03756   004543         DEF  APL1      123
02629000 03757   004627         DEF  OUT2      124
02630000 03760   004631         DEF  OUT1      125
02631000 03761   004543         DEF  APL1      126
02632000 03762   004543         DEF  APL1      127
02633000 03763   004700         DEF  ARREF     128
02634000 03764   004700         DEF  ARREF     129
02635000 03765   004543         DEF  APL1      130
02636000 03766   004627         DEF  OUT2      131
02637000 03767   004631         DEF  OUT1      132
02638000 03770   004543         DEF  APL1      133
02639000 03771   004627         DEF  OUT2      134
02640000 03772   004543         DEF  APL1      135
02641000 03773   004627         DEF  OUT2      136
02642000 03774   004627         DEF  OUT2      137
02643000 03775   004627         DEF  OUT2      138
02644000 03776   177525         DEF  AP136,I   139    FOR =
02645000 03777   004631         DEF  OUT1      140
```

```
                   *
                   * COMPILER                W.F.C.
                   *
                   * ON ENTRY:
                   *
                   *   KEYBOARD BUFFER CONTAINS SOURCE LINE
                   *
                   * ON EXIT:
                   *
                   *   COMPILE BUFFER CONTAINS COMPILED LINE
                   *

                   *
                   * READER FOR SCANNER
                   *
                   * ON ENTRY:
                   *
                   *   C-REGISTER POINTS TO INPUT AREA
                   *
                   * ON EXIT:
                   *
                   *   A-REGISTER = CHARACTER
                   *   B-REGISTER = CLASS FROM CTBL
                   *
                   *   CTBL WORD SAVED IN CT2
                   *
                   * BLANKS ARE IGNORED
                   *
04000    074560    READ2 WBC A,I        GET NEXT CHARACTER
04001    050053          AND B177
04002    010117          CPA B40
04003    067000          JMP *-3        JUMP IF TO BE SKIPPED
                   *
04004    007012          LDB ACTBL      GET CTBL ORIGIN
04005    024000          ADB A
04006    104001          LDB B,I        GET CTBL WORD
04007    035244          STB CT2
04010    174507          SBR 8          GET LEFT BYTE = CLASS
04011    170201          RET 1
                   *
                   * POINTERS AND EQUATES
                   *
04012    001170    ACTBL DEF CTBL       ADDRESS OF CLASS TABLE
04013    003037    AINDX DEF INDEX-1    ADDRESS OF INDEX TABLE
04014    001731    AREED DEF READX-1    ADDRESS OF READ  TABLE
04015    002415    ALOOK DEF LOOKX-1    ADDRESS OF LOOK  TABLE
04016    002615    AAPLY DEF APPLY-1    ADDRESS OF APPLY TABLE
04017    103564    ASYJP DEF SYNJP,I    ADDRESS OF SYNTHESIZE JUMP TABLE
                   *
         077243    CT1   EQU CMTMP+4    TEMPORARY
         077244    CT2   EQU CMTMP+5    TEMPORARY
         077245    CT3   EQU CMTMP+6    TEMPORARY
         077246    CT4   EQU CMTMP+7    TEMPORARY
         077247    CT5   EQU CMTMP+8    TEMPORARY
         077250    NLOOK EQU CMTMP+9    NO-LOOK-AHEAD-DONE
         077251    STATE EQU CMTMP+10   PARSER STATE
         077252    IX1   EQU CMTMP+11   INDEX1
         077253    IX2   EQU CMTMP+12   INDEX2
                   *
         077772    ES    EQU 77772B     EXPONENT SIGN
         077773    DC    EQU ES+1       DIGIT COUNTER
         077774    SD    EQU ES+2       SIGNIFICANT-DIGITS FLAG
         077775    M     EQU ES+3       PART OF EXPONENT
         077776    EX    EQU ES+4       PART OF EXPONENT
         077777    DP    EQU ES+5       DECIMAL-POINT FLAG

                   *
                   * SET C-REGISTER FOR COMPILATION ERROR
                   *
04020    005241    SETCE LDB OLDC
04021    034016          STB C          RESTORE ANCIENT C
                   *
04022    004016    SE1   LDB C          TENTATIVE CURSOR POSITION
04023    035316          STB CERR
04024    074560          WBC A,I        TEST FOR BLANK OR EOL
04025    050053          AND B177
04026    010117          CPA B40
04027    067022          JMP SE1        BLANK, KEEP LOOKING
04030    010053          CPA B177
04031    067033          JMP SE2        EOL, GO THE OTHER WAY
04032    164404          JMP AERR1,I
                   *
04033    054016    SE2   DSZ C
```

COMPILER

```
04034  035316  SL3   STB CERR
04035  004016        LDB C
04036  074760        WBC A,D
04037  050053        AND B177
04040  010117        CPA B40         BLANK, KEEP LOOKING
04041  067034        JMP SF3
04042  164404        JMP AERR1,I
```

COMPILER -- SCANNER

```
                     *
                     * SCANNER
                     *
                     * ON EXIT:
                     *
                     *   TKN = TOKEN (FROM CTBL)
                     *   BCD = CHARACTER
                     *
04043  004016  SCAN  LDB C
04044  035241        STB OLDC
04045  043000        JSM READ2       READ FROM INPUT
04046  031240        STA BCD
04047  000016        LDA C
04050  031243        STA CT1         SAVE C+1
                     *
04051  001244  SC1   LDA CT2         RECALL CTBL INFORMATION
04052  050045        AND B377
04053  031237        STA TKN         SAVE TOKEN
                     *
04054  027056        ADB AJ1
04055  164001        JMP B,I         BRANCH VIA JMP TABLE
                     *
04056  104057  AJ1   DEF *+1,I       JUMP TABLE #1
                     *
04057  004522        DEF E7       0  UNDEFINED CODE
04060  004125        DEF SL2      1  SPECIAL MNEMONIC
04061  004100        DEF TYPEL    2  LETTER
04062  004251        DEF SQ1      3  QUOTE
04063  004071        DEF TYPEN    4  DIGIT
04064  004071        DEF TYPEN    5  DECIMAL POINT
04065  004122        DEF TYPEA    6  SPECIAL CHARACTER
04066  004110        DEF TYPEB    7  SPECIAL CHARACTER
04067  004112        DEF TYPEC    8  SPECIAL CHARACTER
04070  004106        DEF TYPED    9  SPECIAL CHARACTER
                     *
                     * NUMERIC
                     *
04071  001242  TYPEN LDA ISTAR       TEST I* FLAG
04072  072022        RZA TY1
04073  045242        ISZ ISTAR       SET IT
04074  043274        JSM SN1         CALL NUMBER BUILDER
04075  043020  E6    JSM SETCE       ERROR, SYNTAX ERROR IN NUMBER
04076  030066        ASC 1,06
04077  170201        RET 1

                     *
                     * LETTER
                     *
04100  043000  TYPEL JSM READ2       LOOK AHEAD
04101  010114        CPA B44
04102  067225        JMP STL         JUMP IF FOLLOWED BY $
04103  074761        WBC B,D
04104  010070        CPA B133
04105  067240        JMP SSL         JUMP IF FOLLOWED BY (
                     *
                     *               FALL THRU
                     *
                     * SPECIAL CHARACTER
                     *
04106  001242  TYPED LDA ISTAR       (EITHER SIDE OF I*)
04107  072005        RZA TY1
04110  045242  TYPEB ISZ ISTAR       (LEFT SIDE OF I*)
04111  170201        RET 1
                     *
04112  001242  TYPEC LDA ISTAR       (RIGHT SIDE OF I*)
04113  072411        SZA TY2
04114  001241  TY1   LDA OLDC
04115  030016        STA C           RESTORE C
04116  000127        LDA P16
04117  031237        STA TKN         TKN FOR I*
04120  000120        LDA P31
04121  031240        STA BCD         BCD FOR I*
```

```
02812000                        *
02813000 04122  000177  TYPEA LDA P0            (NEITHER SIDE OF I*)
02814000 04123  031242        STA ISTAR
02815000 04124  170201  TY2   RET 1
02817000                        *
02818000                        * TABLE SEARCH
02819000                        *
02820000 04125  004017  SL2   LDB D
02821000 04126  035244        STB CT2           SAVE D
02822000 04127  004327        LDB AROMS
02823000 04130  035245        STB CT3           INITIALIZE 'TABLES' POINTER
02824000                        *
02825000 04131  105245  TS1   LDB CT3,I         GET ADDRESS OF NEXT ROM
02826000 04132  045245        ISZ CT3
02827000 04133  076476        SZB TS1           JUMP IF ROM NOT PRESENT
02828000 04134  014257        CPB M1
02829000 04135  067223        JMP E3            JUMP IF END OF ALL TABLES
02830000 04136  024254        ADB P1
02831000 04137  104001        LDB B,I           PICK UP ROM TABLE ORIGIN ADDRESS
02832000 04140  014257        CPB M1
02833000 04141  067131        JMP TS1
02834000 04142  176202        SBP *+2,C
02835000 04143  140001        JSM B,I           OPTIONAL CALL ON ROM
02836000                        *
02837000 04144  035712        STB T2
02838000 04145  034017        STB D
02839000 04146  074770        WBD A,D           SET D = ROM TABLE ADDRESS
02840000                        *
02841000 04147  005243  TS2   LDB CT1
02842000 04150  034016        STB C
02843000 04151  074761        WBC B,D           SET C = START OF MNEMONIC
02844000 04152  074570  TS3   WBD A,I
02845000 04153  010117        CPA B40
02846000 04154  067152        JMP *-2           IGNORE BLANKS IN MNEMONIC TABLE
02847000 04155  031711        STA T1
02848000 04156  170607        SAL 8
02849000 04157  172612        SAM TS4,C         SKIP IF ENTRY CODE OR END-OF-TABLE
02850000 04160  074561        WBC B,I
02851000 04161  014117        CPB B40
02852000 04162  067160        JMP *-2           IGNORE BLANKS IN INPUT LINE
02853000 04163  015711        CPB T1
02854000 04164  067152        JMP TS3           JUMP IF CHARACTER MATCH
02855000                        *
02856000 04165  074570        WBD A,I           FIND END OF TABLE ENTRY
02857000 04166  170607        SAL 8
02858000 04167  172076        SAP *-2
02859000 04170  067147        JMP TS2
02860000                        *
02861000 04171  170507  TS4   SAR 8
02862000 04172  072002        RZA *+2
02863000 04173  067131        JMP TS1           JUMP IF END OF TABLE
02865000 04174  004000        LDB A
02866000 04175  174040        TCB
02867000 04176  025712        ADB T2            SUBTRACT OPCODE FROM TABLE ADDRESS
02868000 04177  104001        LDB B,I
02869000 04200  035237        STB TKN           TEMPORARILY SAVE CLASS/TOKEN VALUE
02870000                        *
02871000 04201  004327        LDB AROMS
02872000 04202  174040        TCB
02873000 04203  025245        ADB CT3           CALCULATE ROM ID
02874000 04204  014125        CPB P18
02875000 04205  067211        JMP SL5           JUMP IF MAINFRAME
02876000                        *
02877000 04206  170607        SAL 8             CORRECT BCD FOR OPTIONAL ROMS
02878000 04207  060001        IOR B
02879000 04210  067212        JMP *+2
02880000                        *
02881000 04211  020053  SL5   ADA B177          CORRECT MAINFRAME BCD
02882000 04212  031240        STA BCD
02883000                        *
02884000 04213  005244        LDB CT2
02885000 04214  034017        STB D             RESTORE D
02886000                        *
02887000 04215  005237        LDB TKN           RECALL CLASS/TOKEN INFO
02888000 04216  176202        SBP *+2,C
02889000 04217  140001        JSM B,I           OPTIONAL CALL ON ROM
02890000                        *
02891000 04220  035244        STB CT2
02892000 04221  174507        SBR 8
02893000 04222  067051        JMP SC1
02894000                        *
02895000 04223  043020  E3    JSM SETCE         ERROR, MYSTERIOUS MNEMONIC
02896000 04224  030063        ASC 1,03
```

```
                        *
                        * STRING LETTER
                        *
04225   000100   STL    LDA P52
04226   031237          STA TKN          TKN FOR STRING
                        *
04227   043000          JSM READ2        LOOK AHEAD
04230   074761          WBC B,D
04231   005240          LDB BCD
04232   010070          CPA B133         [?
04233   024117          ADB B40          YES, OFFSET BCD
04234   174607          SBL 9
04235   024141          ADB STRID        ID OF STRING ROM
04236   035240          STB BCD
                        *
04237   067122          JMP TYPEA

                        *
                        * SUBSCRIPTED LETTER
                        *
04240   001242   SSL    LDA ISTAR
04241   072402          SZA *+2
04242   067114          JMP TY1
                        *
04243   000102          LDA P49
04244   031237          STA TKN          TKN FOR SUBSCRIPTED
                        *
04245   005240          LDB BCD
04246   024117          ADB B40
04247   035240          STB BCD          OFFSET BCD
                        *
04250   170201          RET 1
                        *
                        * PROCESS QUOTE FIELD
                        *
                        * ON EXIT:
                        *
                        *    CT4 = BYTE COUNT
                        *    CT5 = START OF STRING
                        *
04251   000177   SQ1    LDA P0
04252   031242          STA ISTAR
04253   031246          STA CT4          INITIALIZE BYTE COUNT
04254   004016          LDB C
04255   035247          STB CT5          SAVE START OF STRING
                        *
04256   074561   SQ2    WBC B,I          READ NEXT CHARACTER
04257   014116          CPB B42          "?
04260   067267          JMP SQ4          YES
04261   014053          CPB B177         EOL?
04262   067265          JMP E2           YES
04263   045246   SQ3    ISZ CT4          INCREMENT BYTE COUNT
04264   067256          JMP SQ2
                        *
04265   043020   E2     JSM SETCE        ERROR, UNTERMINATED STRING
04266   030062          ASC 1,02
                        *
04267   074561   SQ4    WBC B,I          READ NEXT CHARACTER
04270   014116          CPB B42          "?
04271   067263          JMP SQ3          YES, CONTINUE
                        *
04272   074760          WBC A,D          BACK UP INPUT POINTER
04273   170201          RET 1
                        *
                        * NUMBER BUILDER
                        *
04274   000252   SN1    LDA NB1
04275   004253          LDB NB2
04276   071405          XFR 6            INITIALIZE
04277   000127          LDA ADR2
04300   071603          CLR 4            CLEAR AR2
                        *
04301   001240          LDA BCD
04302   004103          LDB B60
04303   035240          STB BCD
                        *
04304   010105          CPA B56          .?
04305   067353          JMP SN4          YES
04306   010103   SN2    CPA B60          0?
04307   067312          JMP *+3          YES
04310   004254          LDB P1           NO, SET SD
04311   035774          STB SD
                        *
04312   005777          LDB DP
```

COMPILER -- SCANNER

```
02984000 04313 025774          ADB SD
02985000 04314 025775          ADB M
02986000 04315 035775          STB M        UPDATE EXPONENT
02987000 04316 005774          LDB SD
02988000 04317 076406          SZB SN3      SKIP IF NO SIGNIFICANT DIGITS YET
02989000 04320 005773          LDB DC
02990000 04321 076504          SIB SN3      SKIP IF 12 SIGNIFICANT DIGITS NOW
02991000 04322 035773          STB DC
02992000 04323 050130          AND B17
02993000 04324 075541          MLY          MERGE IN NEW DIGIT
02994000                 *
02995000 04325 043000    SN3   JSM READ2    READ NEXT CHARACTER
02996000 04326 014143          CPB P4       DIGIT?
02997000 04327 067306          JMP SN2      YES
02998000 04330 010105          CPA B56      .?
02999000 04331 067360          JMP SN5      YES
03000000 04332 010063          CPA B145     EEX?
03001000 04333 067365          JMP SN7      YES
03002000 04334 001776    SNW   LDA EX       WRAP IT UP
03003000 04335 055772          DSZ ES
03004000 04336 170040          TCA
03005000 04337 021775          ADA M        FINAL EXPONENT
03006000 04340 071500          NRM
03007000 04341 072310          SDS *+8      SKIP IF FLOATING ZERO
03008000 04342 004000          LDB A
03009000 04343 176002          SAP *+2
03010000 04344 174040          TCB
03011000 04345 024206          ADB M100     OVERFLOW TEST
03012000 04346 176016          SAP E6A
03013000 04347 170605          SAL 6
03014000 04350 030026          STA AR2
03015000 04351 074761          WBC B,D      BACK UP C
03016000 04352 170203          RET 3        NORMAL RETURN
03017000 04353 055777    SN4   DSZ DP       SET DP FOR LEADING .
03018000 04354 043000          JSM READ2    READ NEXT CHARACTER
03020000 04355 014143          CPB P4       DIGIT?
03021000 04356 067306          JMP SN2      YES
03022000 04357 067364          JMP E6A      ERROR, ILLEGAL DECIMAL POINT
03023000                 *
03024000 04360 001777    SN5   LDA DP
03025000 04361 072076          RZA *-2
03026000 04362 055777          DSZ DP       SET DP
03027000 04363 067325          JMP SN3
03028000                 *
03029000 04364 170201    E6A   RET 1        ERROR RETURN
03030000                 *
03031000 04365 004016    SN7   LDB C
03032000 04366 035711          STB T1       SAVE C IN CASE OF MNEMONIC WITH E
03033000 04367 043000          JSM READ2    READ NEXT CHARACTER
03034000 04370 010106          CPA B55      -?
03035000 04371 067421          JMP SNM      YES
03036000 04372 010110          CPA B53      +?
03037000 04373 067423          JMP SN6      YES
03038000 04374 014143          CPB P4       DIGIT?
03039000 04375 067401          JMP SN9      YES
03040000 04376 005711          LDB T1       NO
03041000 04377 034016          STB C        FALSE ALARM, RESTORE C
03042000 04400 067334          JMP SNW
03043000                 *
03044000 04401 045240    SN9   ISZ BCD      SET E-FORMAT
03045000 04402 031711          STA T1       SAVE ASCII DIGIT
03046000 04403 001776          LDA EX
03047000 04404 004135          LDB P10      10*EX
03048000 04405 075617          MPY
03049000 04406 020163          ADA M48
03050000 04407 021711          ADA T1
03051000 04410 031776          STA EX       SAVE UPDATED EXPONENT SPEC
03052000 04411 020170          ADA M256     OVERFLOW TEST
03053000 04412 172052          SAP E6A
03054000 04413 043000          JSM READ2    READ NEXT CHARACTER
03055000 04414 014143          CPB P4       DIGIT?
03056000 04415 067402          JMP SN9+1    YES
03057000 04416 010105          CPA B56      .?
03058000 04417 067364          JMP E6A      YES, ERROR
03059000 04420 067334          JMP SNW
03060000                 *
03061000 04421 000257    SNM   LDA M1       - EXPONENT DETECTED
03062000 04422 031772          STA ES
03063000 04423 043000    SN6   JSM READ2    READ NEXT CHARACTER
03064000 04424 014143          CPB P4       DIGIT?
03065000 04425 067401          JMP SN9      YES
03066000 04426 067364          JMP E6A      NO
```

```
04427  177567  TCON1 ABS -MAXR-1
04430  177706  TCON2 ABS MAXR-MAXP
04431  000006  TCON3 ABS MAXP-MAXL

               *
               * STACKER
               *
04432  005254  CPSTK LDB STAKP
04433  014326        CPB ASLMT
04434  067440        JMP E8
               *
04435  045254        ISZ STAKP
04436  131254        STA STAKP,I
04437  170201        RET 1
               *
04440  043020  E8    JSM SETCE       ERROR, OVERFLOW
04441  030070        ASC 1,08

               *
               * INITIALIZATION
               *
04442  000257  CPLR  LDA M1
04443  031610        STA KBFMT       INDICATE COMPILE BUFFER IS OVERWRIT,
04444  001532        LDA REFOR
04445  072402        SZA *+2
04446  141532        JSM REFOR,I
04447  140453        JSM ACLCM,I     CLEAR COMPILE BUFFER
               *
04450  004307        LDB AKBFX
04451  034016        STB C           POINT C TO KEYBOARD BUFFER
04452  004304        LDB ACBUF
04453  034017        STB D           POINT D TO COMPILE BUFFER ORIGIN
04454  000177        LDA P0
04455  031242        STA ISTAR       IMPLIED MULTIPLY FLAG
04456  031316        STA CERR        COMPILE ERROR FLAG
04457  000254        LDA P1
04460  031251        STA STATE       PARSER START STATE
04461  000305        LDA ASTAK
04462  031254        STA STAKP       STACK POINTER
               *
04463  000257  LOOP1 LDA M1
04464  031250        STA NLOOK       SET NO-LOOK-AHEAD-DONE TRUE
04465  001251        LDA STATE
04466  023013  LOOP2 ADA AINDX       INDEX TABLE ORIGIN
04467  100000        LDA A,I         INDEX WORD
04470  004000        LDB A
04471  174306        SBR 7
04472  035252        STB IX1         B = INDEX1[STATE]
04473  050053        AND B177
04474  031253        STA IX2         A = INDEX2[STATE]
04475  001251        LDA STATE
04476  023427        ADA TCON1       (-MAXR-1)
04477  172033        SAP APPLT
               *
               * READ STATE
               *
04500  001251        LDA STATE
04501  043432        JSM CPSTK       STACK PRESENT STATE
               *
04502  045250        ISZ NLOOK       TEST NO-LOOK-AHEAD-DONE
04503  067505        JMP *+2
04504  043043        JSM SCAN        READ
               *
04505  005252        LDB IX1         RECALL INDEX1
04506  027014        ADB AREED       OFFSET BY READ TABLE ORIGIN
04507  001253        LDA IX2         RECALL INDEX2
04510  020001        ADA B
04511  020257        ADA M1
04512  031243        STA CTI         LIMIT ADDRESS FOR TOKEN SEARCH
               *
04513  100001  REA2  LDA B,I         GET COMPARISON TOKEN
04514  170510        SAR 9           A = READ1[J]
04515  011237        CPA TKN
04516  067524        JMP REA3        FOUND IT
04517  015243        CPB CTI         NO MATCH
04520  067522        JMP *+2         END OF TABLE, MUST BE ERROR
04521  076172        RIB REA2
               *
04522  043020  E7    JSM SETCE       SYNTAX ERROR
04523  030067        ASC 1,07
               *
04524  100001  REA3  LDA B,I
04525  050042        AND B777        A = READ2[J]
```

COMPILER -- MAIN SECTION

```
03152000 04526  031251          STA STATE
03153000                 *
03154000 04527  001240          LDA BCD
03155000 04530  043432          JSM CPSTK         STACK BCD
03156000 04531  067463          JMP LOOP1
03158000 04532  023430   APPLT  ADA TCON2         (MAXR-MAXP)
03159000 04533  172434          SAM PUSHT
03160000                 *
03161000                 * APPLY STATE
03162000                 *
03163000 04534  005253          LDB IX2           RECALL INDEX2
03164000 04535  174600          SBL 1
03165000 04536  174040          TCB
03166000 04537  025254          ADB STAKP         A = MP
03167000 04540  035243          STB CT1
03168000 04541  023017          ADA ASYJP
03169000 04542  164000          JMP A,I           BRANCH TO SYNTHESIZE
03170000                 *
03171000 04543  001243   APL1   LDA CT1
03172000 04544  031254          STA STAKP         UPDATE STACK POINTER
03173000 04545  020257          ADA M1
03174000 04546  100000          LDA A,I           A = PREVSTATE = J
03175000 04547  031243          STA CT1
03176000 04550  005252          LDB IX1           RECALL INDEX1
03177000 04551  027016          ADB AAPLY         APPLY TABLE ORIGIN
03178000                 *
03179000 04552  100001   APL2   LDA B,I           APPLY TABLE WORD
03180000 04553  170510          SAR 9             A = APPLY1[I] = TEMP
03181000 04554  072404          SZA APL3          =0?
03182000 04555  011243          CPA CT1           =J?
03183000 04556  067560          JMP APL3          YES
03184000 04557  076173          RIB APL2
03185000                 *
03186000 04560  100001   APL3   LDA B,I
03187000 04561  050042          AND B777          A = APPLY2[I]
03188000 04562  072003          RZA APL4
03189000 04563  000254          LDA P1            DONE WITH PARSE!
03190000 04564  170201          RET 1
03191000                 *
03192000 04565  031251   APL4   STA STATE
03193000 04566  067466          JMP LOOP2
03195000 04567  023431   PUSHT  ADA TCON3         (MAXP-MAXL)
03196000 04570  172020          SAP PUSH
03197000                 *
03198000                 * LOOK STATE
03199000                 *
03200000 04571  045250          ISZ NLOOK         TEST NO-LOOK-AHEAD-DONE
03201000 04572  067574          JMP *+2
03202000 04573  043043          JSM SCAN          READ
03203000                 *
03204000 04574  005252          LDB IX1           RECALL INDEX1
03205000 04575  027015          ADB ALOOK         LOOK TABLE ORIGIN
03206000                 *
03207000 04576  100001   LOO2   LDA B,I           LOOK TABLE WORD
03208000 04577  170510          SAR 9             B = LOOK1[I] = TEMP
03209000 04600  072404          SZA LOO3          =0?
03210000 04601  011237          CPA TKN           =TOKEN?
03211000 04602  067604          JMP LOO3          YES
03212000 04603  076173          RIB LOO2
03213000                 *
03214000 04604  100001   LOO3   LDA B,I
03215000 04605  050042          AND B777          A = LOOK2[I]
03216000 04606  031251          STA STATE
03217000 04607  067466          JMP LOOP2

03219000                 *
03220000                 * PUSH STATE
03221000                 *
03222000 04610  001253   PUSH   LDA IX2
03223000 04611  043432          JSM CPSTK         STACK INDEX2
03224000 04612  000054          LDA B176
03225000 04613  043432          JSM CPSTK         STACK 'EMPTY'
03226000                 *
03227000 04614  001252          LDA IX1           RECALL INDEX1
03228000 04615  031251          STA STATE
03229000 04616  067466          JMP LOOP2
```

COMPILER -- SYNTHESIZE PRELIMINARIES

```
03231000                 *
03232000                 * TOS OUTPUT
03233000                 *
03234000 04617  055254   OUT6   DSZ STAKP         TOS-5
```

COMPILER -- SYNTHESIZE

```
04620  055254          DSZ STAKP
04621  055254  OUT5    DSZ STAKP        TOS-4
04622  055254          DSZ STAKP
04623  055254  OUT4    DSZ STAKP        TOS-3
04624  055254          DSZ STAKP
04625  055254  OUT3    DSZ STAKP        TOS-2
04626  055254          DSZ STAKP
04627  055254  OUT2    DSZ STAKP        TOS-1
04630  055254          DSZ STAKP
               *
04631  101254  OUT1    LDA STAKP,I      TOS
               *
04632  043637  OUT0    JSM OUTST        NORMAL BCD OUTPUT
04633  170507          SAR 8
04634  072402          SZA *+2          SKIP IF MAINFRAME
04635  043637          JSM OUTST
04636  067543          JMP APL1         RETURN

               *
               * BYTE WRITER SUBROUTINE
               *
               * ON ENTRY:
               *
               *   A-REGISTER = BYTE
               *
04637  004017  OUTST   LDB D
04640  014305          CPB ACLMT
04641  067440          JMP E8
               *
04642  074550          PBD A,I
04643  170201          RET 1
               *
               * IMPLIED STORAGE
               *
04644  001257  IMSTZ   LDA CSTAT        CHECK CONTROLLER STATE
04645  010177          CPA P0
04646  067661          JMP E12          CANNOT STORE IT
04647  010142          CPA P5
04650  067655          JMP IM2          ENTER CONTINUATION
               *
04651  000074  IM1     LDA B77
04652  043637          JSM OUTST        OUTPUT 'RES'
04653  000247          LDA ZK1
04654  067632          JMP OUT0         OUTPUT 'GAZINTA DSP' PAIR
               *
04655  001517  IM2     LDA RGFLG
04656  072473          SZA IM1
04657  000216          LDA ZK2
04660  067632          JMP OUT0         OUTPUT 'ENR GAZINTA' PAIR
               *
04661  043020  E12     JSM SETCE        ERROR, LINE CANNOT BE STORED
04662  030462          ASC 1,12

               *
               * IMPLIED DISPLAY FOR STRINGS
               *
04663  001257  IMDSP   LDA CSTAT        CHECK CONTROLLER STATE
04664  010177          CPA P0
04665  067661          JMP E12          CANNOT STORE IT
04666  000051          LDA B202
04667  067632          JMP OUT0         OUTPUT 'DSP'

               *
               * UNARY -
               *
04670  000105  UNARY   LDA B56
04671  067632          JMP OUT0         OUTPUT 'U-'

               *
               * EMPTY PARAMETER
               *
04672  000054  UEMTY   LDA B176
04673  043637          JSM OUTST        OUTPUT 'EMPTY'
04674  067631          JMP OUT1

               *
               * 'ROUND' STATEMENTS
               *
04675  000107  ORUUN   LDA B54
04676  043637          JSM OUTST        OUTPUT ','
04677  067617          JMP OUT6
```

```
                  *
                  * ARRAY REFERENCE
                  *
04700  000066     ARREF LDA B140
04701  043637           JSM OUTST      OUTPUT 'ENTIRE ARRAY'
04702  067623           JMP OUT4

                  *
                  * REAL NUMBER
                  *
04703  101254     ONUMB LDA STAKP,I
04704  004020           LDB AR2        TEST AR2 EXPONENT
04705  076405           SZB ON1
04706  020145           ADA P2         CORRECT CODE FOR NON-ZERO EXPONENT
04707  043637           JSM OUTST
04710  000020           LDA AR2
04711  170405           AAR 6
04712  043637     ON1   JSM OUTST
                  *
04713  000127           LDA ADR2
04714  004345           LDB ADR1
04715  071403           XFR 4          COPY NUMBER TO AR1
04716  004155           LDB M11
04717  075441           DRS            SHIFT AR1 RIGHT ONCE
04720  072002           RZA *+2
04721  076176           RIB *-2
04722  024257           ADB M1
04723  174400           ABR 1          B = -# OF BYTES TO MOVE
04724  076412           SZB ON3
04725  035711           STB T1
                  *
04726  075541     ON2   MLY
04727  170603           SAL 4
04730  031712           STA T2
04731  075541           MLY
04732  061712           IOR T2
04733  043637           JSM OUTST      OUTPUT TWO PACKED DIGITS
04734  045711           ISZ T1
04735  067726           JMP ON2
                  *
04736  000121     ON3   LDA B34
04737  067632           JMP OUT0
                  *
                  * STRING
                  *
04740  000115     OLABL LDA B43        ENTRY FOR LABEL
04741  043752           JSM STRGF
04742  000075           LDA B75
04743  067632           JMP OUT0
                  *
04744  000116     OSTRG LDA B42        ENTRY FOR LITERAL
04745  043752           JSM STRGF
04746  067543           JMP APL1

                  *
                  * SPECIAL STRING FOR ENT
                  *
04747  000116     ESTRG LDA B42
04750  043752           JSM STRGF
04751  067627           JMP OUT2

04752  043637     STRGF JSM OUTST
04753  001246           LDA CT4
04754  043637           JSM OUTST      OUTPUT BYTE COUNT
04755  004016           LDB C
04756  035711           STB T1         SAVE C
04757  005247           LDB CT5
04760  034016           STB C          SET C TO BEGINNING OF STRING
                  *
04761  074560     SF2   WBC A,I        GET BYTE
04762  010116           CPA B42        "?
04763  067766           JMP SF4        YES
04764  043637     SF3   JSM OUTST      STASH IT
04765  067761           JMP SF2
                  *
04766  074560     SF4   WBC A,I        GET CHARACTER FOLLOWING "
04767  010116           CPA B42        "?
04770  067764           JMP SF3        YES
                  *
04771  005711           LDB T1
04772  034016           STB C          RESTORE C
04773  170201           RET 1
```

```
                        *
                        * OUTPUT DIM OPERATORS
                        *
04774   000070   ODIME  LDA B133
04775   043637          JSM OUTST        OUTPUT DIM OPERATOR
04776   067631          JMP OUT1         OUTPUT LETTER
                        *
04777   000070   ODIML  LDA B133
05000   043637          JSM OUTST        OUTPUT DIM OPERATOR
05001   067623          JMP OUT4         OUTPUT LETTER
                        *
                        * BRANCH OUTPUT SUBROUTINE
                        *
05002   005254   BRNCH  LDB STAKP
05003   024146          ADB M2
05004   100001          LDA B,I
05005   031711          STA T1
05006   043637          JSM OUTST        OUTPUT THE BRANCH COMMAND
05007   000177          LDA P0
05010   043637          JSM OUTST        LEAVE TWO BLANK BYTES .
05011   067637          JMP OUTST

                        *
                        * STRING BRANCH
                        *
05012   042002   BRSTR  JSM BRNCH        OUTPUT THE BRANCH COMMAND
05013   001711          LDA T1
05014   010047          CPA B230
05015   067744          JMP OSTRG        OUTPUT THE LABEL
05016   010046          CPA B231
05017   067744          JMP OSTRG        OUTPUT THE LABEL
                        *
05020   067522          JMP E7           ERROR, ILLEGAL BRANCH COMMAND

                        *
                        * NUMBER BRANCH
                        *
05021   042002   BRNUM  JSM BRNCH        OUTPUT THE BRANCH COMMAND
05022   001777          LDA DP
05023   072403          SZA *+3
05024   043020   E10    JSM SETCE        ERROR, ILLEGAL INTEGER
05025   030460          ASC 1,10
                        *
05026   000114          LDA B44          OUTPUT 'INTEGER FOLLOWS'
05027   043637          JSM OUTST
                        *
05030   040646          JSM FIXPT+2      OUTPUT THE INTEGER
05031   173473          SOS E10
05032   000001          LDA B
05033   170707          RAR 8
05034   043637          JSM OUTST
05035   170707          RAR 8
05036   067635          JMP OUT0+3

                        *
                        * STRING ASSIGNMENT
                        *
05037   000233   STRAS  LDA ZK3
05040   067632          JMP OUT0         OUTPUT 'GAZINTA STRING'
                        *
                        * LITERAL TRANSFER
                        *
05041   101254   LITRL  LDA STAKP,I
05042   043637          JSM OUTST        OUTPUT TOS
05043   170507          SAR 8
05044   072402          SZA *+2
05045   043637          JSM OUTST
05046   000121          LDA B34
05047   043637          JSM OUTST        OUTPUT 'COMMENT DELIMITER'
05050   074560   LI0    WBC A,I
05051   010076          CPA B73
05052   066062          JMP LI1          JUMP IF ;
05053   010053          CPA B177
05054   066062          JMP LI1          JUMP IF EOL
05055   010116          CPA B42
05056   066066          JMP LI2          JUMP IF "
05057   010117          CPA B40
05060   066050          JMP LI0
05061   066047          JMP LI0-1
                        *
05062   000121   LI1    LDA B34
05063   043637          JSM OUTST        OUTPUT 'COMMENT DELIMITER'
```

COMPILER -- SYNTHESIZE

```
03486000 05064  074760        WBC A,D
03487000 05065  067543        JMP APL1
03488000                *
03489000 05066  004016  L12   LDB C
03490000 05067  035241        STB OLDC
03491000 05070  043637        JSM OUTST
03492000 05071  074560        WBC A,I
03493000 05072  010116        CPA B42
03494000 05073  066047        JMP L10-1
03495000 05074  010053        CPA B177
03496000 05075  067265        JMP E2          ERROR, UNTERMINATED STRING
03497000 05076  066070        JMP L12+2
```

```
03499000                *
03500000                * OUTPUT SUBSCRIPT COMMA
03501000                *
03502000 05077  000100  USCOM LDA B64
03503000 05100  067632        JMP OUT0        OUTPUT ','
```

COMPILER -- FILL IN BASE-PAGE LINKS

```
03505000                *
03506000                * FILL IN BASE-PAGE LINKS
03507000                *
03508000 00346                ORG ACPLR
03509000 00346  004442        DEF CPLR
03510000 00347  004000        DEF READ2
03511000 00350  004543        DEF APL1
03512000 00351  004020        DEF SETCE
03513000 00352  004274        DEF SN1
03514000 00353  004251        DEF SO1
03515000 00354  004752        DEF STRGF
03516000 00355  004637        DEF OUTS1
03517000                *
03518000 00333                ORG AMTBL
03519000 00333  001471        DEF MNTBL
03520000                *
03521000                      END
END OF PASS 2 NO ERRORS DETECTED
```

BASE-PAGE READ-WRITE-MEMORY

```
00003000 76550                ORG 76550B
00004000                      UNL
```

REVERSE COMPILER TABLE

```
02001000 15477                ORG 15477B
02002000                *
02003000                * CLASS TABLE FOR REVERSE COMPILER
02004000                *
02005000                * FORMAT IS PPPP CCCC MMMMMMMM
02006000                *
02007000                *   P = PRIORITY
02008000                *   C = CLASS
02009000                *   M = MNEMONIC INFORMATION:
02010000                *
02011000                *
02012000                *
02013000                *
02014000                *
02015000                *
02016000 15477  000000  RTBL  NOP              000
02017000 15500  003400        OCT 003400       001  0  7  000  ROM
02018000 15501  003400        OCT 003400       002  0  7  000  ROM
02019000 15502  003400        OCT 003400       003  0  7  000  ROM
02020000 15503  003400        OCT 003400       004  0  7  000  ROM
02021000 15504  003400        OCT 003400       005  0  7  000  ROM
02022000 15505  003400        OCT 003400       006  0  7  000  ROM
02023000 15506  003400        OCT 003400       007  0  7  000  ROM
02024000 15507  003400        OCT 003400       010  0  7  000  ROM
02025000 15510  003400        OCT 003400       011  0  7  000  ROM
02026000 15511  003400        OCT 003400       012  0  7  000  ROM
02027000 15512  003400        OCT 003400       013  0  7  000  ROM
02028000 15513  003400        OCT 003400       014  0  7  000  ROM
02029000 15514  003400        OCT 003400       015  0  7  000  ROM
02030000 15515  003400        OCT 003400       016  0  7  000  ROM
```

REVERSE COMPILER TABLE

```
02031000 15516  003400          OCT 003400  017  0  7  000  ROM
02032000 15517  003400          OCT 003400  020  0  7  000  ROM
02033000 15520  003400          OCT 003400  021  0  7  000  ROM
02034000 15521  003400          OCT 003400  022  0  7  000  ROM
02035000 15522  000000          NOP         023
02036000 15523  000000          NOP         024
02037000 15524  000000          NOP         025
02038000 15525  000000          NOP         026
02039000 15526  000000          NOP         027
02040000 15527  000000          NOP         030
02041000 15530  000000          NOP         031
02042000 15531  000000          NOP         032
02043000 15532  000000          NOP         033
02044000 15533  002400          OCT 002400  034  0  5  000  LITERAL
02045000 15534  000000          NOP         035
02046000 15535  000000          NOP         036
02047000 15536  131400          OCT 131400  037 11  3  000  I*
02048000 15537  000000          NOP         040
02049000 15540  000000          NOP         041
02050000 15541  004000          OCT 004000  042  0  8  000  STRING FOLLOWS
02051000 15542  004000          OCT 004000  043  0  8  000  LABEL FOLLOWS
02052000 15543  005000          OCT 005000  044  0 10  000  INTEGER FOLLOWS
02053000 15544  000000          NOP         045
02054000 15545  000000          NOP         046                  &
02055000 15546  004000          OCT 004000  047  0  8  000  '
02056000 15547  000000          NOP         050
02057000 15550  000000          NOP         051
02058000 15551  111452          OCT 111452  052  9  3  052  *
02059000 15552  101453          OCT 101453  053  8  3  053  +
02060000 15553  021454          OCT 021454  054  2  3  054  ,1
02061000 15554  101455          OCT 101455  055  8  3  055  -
02062000 15555  121055          OCT 121055  056 10  2  055  U-
02063000 15556  111457          OCT 111457  057  9  3  057  /
02064000 15557  004400          OCT 004400  060  0  9  000  F NUMBER
02065000 15560  004400          OCT 004400  061  0  9  000  E NUMBER
02066000 15561  004400          OCT 004400  062  0  9  000  F NUMBER W/EXPONENT
02067000 15562  004400          OCT 004400  063  0  9  000  E NUMBER W/EXPONENT
02068000 15563  021454          OCT 021454  064  2  3  054  ,2
02069000 15564  000000          NOP         065
02070000 15565  000000          NOP         066
02071000 15566  000000          NOP         067
02072000 15567  000000          NOP         070
02073000 15570  000000          NOP         071
02074000 15571  031472          OCT 031472  072  3  3  072  ]
02075000 15572  002073          OCT 002073  073  0  4  073  ]
02076000 15573  000000          NOP         074
02077000 15574  002072          OCT 002072  075  0  4  072  ]
02078000 15575  000000          NOP         076
02079000 15576  000000          NOP         077
02080000 15577  000000          NOP         100
02081000 15600  000501          OCT 000501  101  0  1  101  A
02082000 15601  000502          OCT 000502  102  0  1  102  B
02083000 15602  000503          OCT 000503  103  0  1  103  C
02084000 15603  000504          OCT 000504  104  0  1  104  D
02085000 15604  000505          OCT 000505  105  0  1  105  E
02086000 15605  000506          OCT 000506  106  0  1  106  F
02087000 15606  000507          OCT 000507  107  0  1  107  G
02088000 15607  000510          OCT 000510  110  0  1  110  H
02089000 15610  000511          OCT 000511  111  0  1  111  I
02090000 15611  000512          OCT 000512  112  0  1  112  J
02091000 15612  000513          OCT 000513  113  0  1  113  K
02092000 15613  000514          OCT 000514  114  0  1  114  L
02093000 15614  000515          OCT 000515  115  0  1  115  M
02094000 15615  000516          OCT 000516  116  0  1  116  N
02095000 15616  000517          OCT 000517  117  0  1  117  O
02096000 15617  000520          OCT 000520  120  0  1  120  P
02097000 15620  000521          OCT 000521  121  0  1  121  Q
02098000 15621  000522          OCT 000522  122  0  1  122  R
02099000 15622  000523          OCT 000523  123  0  1  123  S
02100000 15623  000524          OCT 000524  124  0  1  124  T
02101000 15624  000525          OCT 000525  125  0  1  125  U
02102000 15625  000526          OCT 000526  126  0  1  126  V
02103000 15626  000527          OCT 000527  127  0  1  127  W
02104000 15627  000530          OCT 000530  130  0  1  130  X
02105000 15630  000531          OCT 000531  131  0  1  131  Y
02106000 15631  000532          OCT 000532  132  0  1  132  Z
02107000 15632  025400          OCT 025400  133  2 11       DIM OPERATOR
02108000 15633  151134          OCT 151134  134 13  2  134  SQR
02109000 15634  000000          NOP         135  0  0  000  END OF #
02110000 15635  000000          NOP         136
02111000 15636  000000          NOP         137
02112000 15637  000452          OCT 000452  140  0  1  052  ENTIRE ARRAY
```

REVERSE COMPILER TABLE

| | | | | | | | | | |
|---|---|---|---|---|---|---|---|---|---|
| 02113000 | 15640 | 171101 | OCT | 171101 | 141 | 15 | 2 | 101 | A( |
| 02114000 | 15641 | 171102 | OCT | 171102 | 142 | 15 | 2 | 102 | B( |
| 02115000 | 15642 | 171103 | OCT | 171103 | 143 | 15 | 2 | 103 | C( |
| 02116000 | 15643 | 171104 | OCT | 171104 | 144 | 15 | 2 | 104 | D( |
| 02117000 | 15644 | 171105 | OCT | 171105 | 145 | 15 | 2 | 105 | E( |
| 02118000 | 15645 | 171106 | OCT | 171106 | 146 | 15 | 2 | 106 | F( |
| 02119000 | 15646 | 171107 | OCT | 171107 | 147 | 15 | 2 | 107 | G( |
| 02120000 | 15647 | 171110 | OCT | 171110 | 150 | 15 | 2 | 110 | H( |
| 02121000 | 15650 | 171111 | OCT | 171111 | 151 | 15 | 2 | 111 | I( |
| 02122000 | 15651 | 171112 | OCT | 171112 | 152 | 15 | 2 | 112 | J( |
| 02123000 | 15652 | 171113 | OCT | 171113 | 153 | 15 | 2 | 113 | K( |
| 02124000 | 15653 | 171114 | OCT | 171114 | 154 | 15 | 2 | 114 | L( |
| 02125000 | 15654 | 171115 | OCT | 171115 | 155 | 15 | 2 | 115 | M( |
| 02126000 | 15655 | 171116 | OCT | 171116 | 156 | 15 | 2 | 116 | N( |
| 02127000 | 15656 | 171117 | OCT | 171117 | 157 | 15 | 2 | 117 | O( |
| 02128000 | 15657 | 171120 | OCT | 171120 | 160 | 15 | 2 | 120 | P( |
| 02129000 | 15660 | 171121 | OCT | 171121 | 161 | 15 | 2 | 121 | Q( |
| 02130000 | 15661 | 171122 | OCT | 171122 | 162 | 15 | 2 | 122 | R( |
| 02131000 | 15662 | 171123 | OCT | 171123 | 163 | 15 | 2 | 123 | S( |
| 02132000 | 15663 | 171124 | OCT | 171124 | 164 | 15 | 2 | 124 | T( |
| 02133000 | 15664 | 171125 | OCT | 171125 | 165 | 15 | 2 | 125 | U( |
| 02134000 | 15665 | 171126 | OCT | 171126 | 166 | 15 | 2 | 126 | V( |
| 02135000 | 15666 | 171127 | OCT | 171127 | 167 | 15 | 2 | 127 | W( |
| 02136000 | 15667 | 171130 | OCT | 171130 | 170 | 15 | 2 | 130 | X( |
| 02137000 | 15670 | 171131 | OCT | 171131 | 171 | 15 | 2 | 131 | Y( |
| 02138000 | 15671 | 171132 | OCT | 171132 | 172 | 15 | 2 | 132 | Z( |
| 02139000 | 15672 | 000573 | OCT | 000573 | 173 | 0 | 1 | 173 | PI |
| 02140000 | 15673 | 031575 | OCT | 031575 | 174 | 3 | 3 | 175 | GAZINTA STRING |
| 02141000 | 15674 | 031575 | OCT | 031575 | 175 | 3 | 3 | 175 | GAZINTA |
| 02142000 | 15675 | 000400 | OCT | 000400 | 176 | 0 | 1 | 000 | EMPTY |
| 02143000 | 15676 | 002177 | OCT | 002177 | 177 | 0 | 4 | 177 | EOL |
| 02144000 | 15677 | 011003 | OCT | 011003 | 200 | 1 | 2 | 3 | IF |
| 02145000 | 15700 | 011004 | OCT | 011004 | 201 | 1 | 2 | 4 | PRT |
| 02146000 | 15701 | 011004 | OCT | 011004 | 202 | 1 | 2 | 4 | DSP |
| 02147000 | 15702 | 041400 | OCT | 041400 | 203 | 4 | 3 | | OR |
| 02148000 | 15703 | 051400 | OCT | 051400 | 204 | 5 | 3 | | AND |
| 02149000 | 15704 | 061000 | OCT | 061000 | 205 | 6 | 2 | | NOT |
| 02150000 | 15705 | 011000 | OCT | 011000 | 206 | 1 | 2 | | FXD |
| 02151000 | 15706 | 011000 | OCT | 011000 | 207 | 1 | 2 | | FLT |
| 02152000 | 15707 | 011000 | OCT | 011000 | 210 | 1 | 2 | | SPC |
| 02153000 | 15710 | 011000 | OCT | 011000 | 211 | 1 | 2 | | JMP |
| 02154000 | 15711 | 011000 | OCT | 011000 | 212 | 1 | 2 | | SFG |
| 02155000 | 15712 | 011000 | OCT | 011000 | 213 | 1 | 2 | | CFG |
| 02156000 | 15713 | 011000 | OCT | 011000 | 214 | 1 | 2 | | CMF |
| 02157000 | 15714 | 161000 | OCT | 161000 | 215 | 14 | 2 | | PRND |
| 02158000 | 15715 | 161000 | OCT | 161000 | 216 | 14 | 2 | | DRND |
| 02159000 | 15716 | 011000 | OCT | 011000 | 217 | 1 | 2 | | TRC |
| 02160000 | 15717 | 011000 | OCT | 011000 | 220 | 1 | 2 | | NOR |
| 02161000 | 15720 | 011000 | OCT | 011000 | 221 | 1 | 2 | | STP |
| 02162000 | 15721 | 151000 | OCT | 151000 | 222 | 13 | 2 | | FLG |
| 02163000 | 15722 | 011000 | OCT | 011000 | 223 | 1 | 2 | | ENT |
| 02164000 | 15723 | 003000 | OCT | 003000 | 224 | 0 | 6 | | GTO- |
| 02165000 | 15724 | 003000 | OCT | 003000 | 225 | 0 | 6 | | GTO+ |
| 02166000 | 15725 | 003000 | OCT | 003000 | 226 | 0 | 6 | | GSB- |
| 02167000 | 15726 | 003000 | OCT | 003000 | 227 | 0 | 6 | | GSB+ |
| 02168000 | 15727 | 003000 | OCT | 003000 | 230 | 0 | 6 | | GTO |
| 02169000 | 15730 | 003000 | OCT | 003000 | 231 | 0 | 6 | | GSB |
| 02170000 | 15731 | 011000 | OCT | 011000 | 232 | 1 | 2 | | DIM |
| 02171000 | 15732 | 011000 | OCT | 011000 | 233 | 1 | 2 | | RET |
| 02172000 | 15733 | 011000 | OCT | 011000 | 234 | 1 | 2 | | WAIT |
| 02173000 | 15734 | 000400 | OCT | 000400 | 235 | 0 | 1 | | BEEP |
| 02174000 | 15735 | 000400 | OCT | 000400 | 236 | 0 | 1 | | END |
| 02175000 | 15736 | 000400 | OCT | 000400 | 237 | 0 | 1 | | REW |
| 02176000 | 15737 | 041400 | OCT | 041400 | 240 | 4 | 3 | | XOR |
| 02177000 | 15740 | 011000 | OCT | 011000 | 241 | 1 | 2 | | IDF |
| 02178000 | 15741 | 011000 | OCT | 011000 | 242 | 1 | 2 | | SSC |
| 02179000 | 15742 | 011000 | OCT | 011000 | 243 | 1 | 2 | | TRK |
| 02180000 | 15743 | 011000 | OCT | 011000 | 244 | 1 | 2 | | EOF |
| 02181000 | 15744 | 011000 | OCT | 011000 | 245 | 1 | 2 | | ERT |
| 02182000 | 15745 | 011000 | OCT | 011000 | 246 | 1 | 2 | | MRK |
| 02183000 | 15746 | 011000 | OCT | 011000 | 247 | 1 | 2 | | RCF |
| 02184000 | 15747 | 011000 | OCT | 011000 | 250 | 1 | 2 | | LDF |
| 02185000 | 15750 | 011000 | OCT | 011000 | 251 | 1 | 2 | | ENP |
| 02186000 | 15751 | 011000 | OCT | 011000 | 252 | 1 | 2 | | LDP |
| 02187000 | 15752 | 011000 | OCT | 011000 | 253 | 1 | 2 | | RCM |
| 02188000 | 15753 | 011000 | OCT | 011000 | 254 | 1 | 2 | | LDM |
| 02189000 | 15754 | 011000 | OCT | 011000 | 255 | 1 | 2 | | RCK |
| 02190000 | 15755 | 011000 | OCT | 011000 | 256 | 1 | 2 | | LDK |
| 02191000 | 15756 | 011000 | OCT | 011000 | 257 | 1 | 2 | | LDB |
| 02192000 | 15757 | 011000 | OCT | 011000 | 260 | 1 | 2 | | VFY |
| 02193000 | 15760 | 000400 | OCT | 000400 | 261 | 0 | 1 | | AVD |
| 02194000 | 15761 | 000400 | OCT | 000400 | 262 | 0 | 1 | | AVE |
| 02195000 | 15762 | 000400 | OCT | 000400 | 263 | 0 | 1 | | LKD |
| 02196000 | 15763 | 000400 | OCT | 000400 | 264 | 0 | 1 | | LKE |
| 02197000 | 15764 | 071400 | OCT | 071400 | 265 | 7 | 3 | | # |

REVERSE COMPILER TABLE

```
02198000 15765  071400        OCT 071400  266  7  3        <=
02199000 15766  071400        OCT 071400  267  7  3        >=
02200000 15767  071400        OCT 071400  270  7  3        <
02201000 15770  071400        OCT 071400  271  7  3        >
02202000 15771  071400        OCT 071400  272  7  3        =
02203000 15772  151000        OCT 151000  273 13  2        L.C. R
02204000 15773  011000        OCT 011000  274  1  2        LIST
02205000 15774  000400        OCT 0004    275  0  1        RES
02206000 15775  000400        OCT 00040   276  0  1        LIST K
02207000 15776  000400        OCT 000400  277  0  1        TLIST
02208000 15777  151000        OCT 151000  300 13  2        L.C. P
```

REVERSE COMPILER

```
02210000 05106                ORG 5106B
02211000                *
02212000                * REVERSE COMPILER
02213000                *

02215000                *
02216000                * POINTERS AND EQUATES
02217000                *
02218000        077241  LEFTE EQU CMTMP+2
02219000        077242  PRI   EQU CMTMP+3       INPUT PRIORITY
02220000        077243  LAST  EQU CMTMP+4       LATEST OUTPUT PRIORITY
02221000        077244  ARRBF EQU CMTMP+5       LEFT END OF BUFFER
02222000        077245  CODE  EQU CMTMP+6
02223000        077246  RT1   EQU CMTMP+7
02224000        077247  RT2   EQU CMTMP+8
02225000        077250  RT3   EQU CMTMP+9
02226000        077251  OFLAG EQU CMTMP+10      OUTPUT BUFFER OVERFLOW FLAG
02227000        077252  IMMFG EQU CMTMP+11      I* DUMP FLAG

02229000 05106                BSS 1             *** RESERVED FOR 4K-PAGE CHECKSUM
```

REVERSE COMPILER SUBROUTINES

```
02231000                *
02232000                * OUTPUT WRITER SUBROUTINE
02233000                *
02234000 05107  000177  RCPAR LDA P0            SPECIAL ENTRY FOR PARENTHESES
02235000 05110  042142        JSM RCSTK
02236000 05111  000231        LDA RK1           STACK '('
02237000 05112  042142        JSM RCSTK
02238000 05113  000112        LDA B51           OUTPUT ')'
02239000                *
02240000 05114  072422  RCOUT SZA RC02          SKIP IF NULL CHARACTER
02241000 05115  004016        LDB C
02242000 05116  035714        STB T4            SAVE C
02243000 05117  004316        LDB AIBFL
02244000 05120  034016        STB C             INITIALIZE DESTINATION
02245000 05121  024257        ADB M1
02246000 05122  034017        STB D             INITIALIZE SOURCE
02247000 05123  074771  RC01  WBD B,D
02248000 05124  074741        PBC B,D           MOVE A BYTE
02249000 05125  004017        LDB D
02250000 05126  015244        CPB ARRBF
02251000 05127  066131        JMP *+2
02252000 05130  066123        JMP RC01
02253000                *
02254000 05131  005714        LDB T4
02255000 05132  034016        STB C             RESTORE C
02256000                *
02257000 05133  074550        PBD A,I           INSERT NEW CHARACTER
02258000 05134  104316        LDB AIBFL,I
02259000 05135  014262        CPB TOBLN         OVERFLOW?
02260000 05136  170201  RC02  RET 1             NO
02261000 05137  004074        LDB B77           YES
02262000 05140  035251        STB OFLAG
02263000 05141  170201        RET 1
02265000                *
02266000                * STACKER SUBROUTINE
02267000                *
02268000 05142  005254  RCSTK LDB STAKP
02269000 05143  014326        CPB ASLMT
02270000 05144  164424        JMP ASYER,I       STACK OVERFLOW
02271000                *
02272000 05145  045254        ISZ STAKP
02273000 05146  131254        STA STAKP,I       STACK THE INFO
02274000 05147  170201        RET 1
```

REVERSE COMPILER SUBROUTINES

```
                      *
                      * MNEMONIC TABLE SCAN SUBROUTINE FOR REVERSE COMPILER
                      *
                      * ON ENTRY:
                      *
                      *    A-REGISTER = OPCODE
                      *    B-REGISTER = WORD ADDRESS OF TABLE
                      *
                      * ON EXIT:
                      *
                      *    GUIDE = CHARACTER COUNT INCLUDED
                      *    ASCII = CHARACTER POINTER TO RIGHT END OF MNEMONIC
                      *
                      *    A-REGISTER = GUIDE
                      *
05150   031711        TSCAN STA T1          SAVE OPCODE
05151   034017              STB D
05152   074770              WBD A,D         INITIALIZE CHARACTER POINTER
                      *
05153   000177        Y1    LDA P0
05154   031713              STA T3          INITIALIZE CHARACTER COUNT
05155   074570        Y2    WBD A,I
05156   170607              SAL 8
05157   172603              SAM *+3,C       SKIP IF OPCODE
05160   045713              ISZ T3
05161   066155              JMP Y2
                      *
05162   170507              SAR 8
05163   011711              CPA T1
05164   066166              JMP *+2         JUMP IF FOUND
05165   066153              JMP Y1
                      *
05166   001237              LDA GUIDE
05167   050170              AND M256
05170   061713              IOR T3
05171   031237              STA GUIDE       RECORD CHARACTER COUNT
                      *
05172   054017              DSZ D
05173   004017              LDB D
05174   035240              STB ASCII       RECORD CHARACTER POINTER
                      *
05175   170201              RET 1
                      *
                      * BACKWARD SCAN SUBROUTINE FOR REVERSE COMPILER
                      *
                      * ON RETURN TO P+1:  AT LH LIMIT
                      *
                      * ON RETURN TO P+2:  B-REGISTER HAS BYTE
                      *
05176   004304        RSCAN LDB ACBUF
05177   014016              CPB C
05200   170201              RET 1           AT LH LIMIT, DONE
                      *
05201   034017              STB D
05202   074571              WBD B,I         INITIALIZE FORWARD POINTER
                      *
05203   004017        RSCL  LDB D
05204   014016              CPB C
05205   066264              JMP RS2         JUMP IF C IS OK
05206   000017              LDA D
05207   074771              WBD B,D         BACK UP ONE SPACE
05210   004017              LDB D
05211   014016              CPB C
05212   066262              JMP RS1         JUMP IF C NOT OK
                      *
05213   031241              STA LEFTE       SAVE OLD D
05214   030017              STA D
05215   074570              WBD A,I         CONTINUE FORWARD SCAN
05216   031711              STA T1
05217   020332              ADA ARTBL
05220   100000              LDA A,I         GET RTBL WORD
05221   170507              SAR 8
05222   050130              AND B17         GET CLASS
05223   010142              CPA P5
05224   066253              JMP RS5         5 = LITERAL
05225   010141              CPA P6
05226   066257              JMP RS6         6 = GTO OR GSB
05227   010140              CPA P7
05230   066245              JMP RS3         7 = OPTIONAL ROM
05231   010137              CPA P8
05232   066240              JMP RS4         8 = CHARACTER STRING
05233   010136              CPA P9
05234   066253              JMP RS5         9 = REAL NUMBER
05235   010135              CPA P10
05236   066257              JMP RS6         10 = INTEGER NUMBER
                      *
05237   066203              JMP RSCL        NONE => ONE-BYTE CODE
```

REVERSE COMPILER SUBROUTINES

```
                    *
                    * CHARACTER STRING
                    *
05240  074571  RS4   WBD B,I        GET LENGTH OF STRING
05241  174040        TCB
05242  076541        SIB RSCL
05243  074570        WBD A,I        SKIP TO END OF STRING
05244  066242        JMP *-2
                    *
                    * OPTIONAL-ROM CODE
                    *
05245  074570  RS3   WBD A,I        SKIP SECOND CODE OF PAIR
05246  170607        SAL 8
05247  061711        IOR T1
05250  010043        CPA B411       IS IT API 'XXX' ?
05251  066240        JMP RS4        YES
05252  066203        JMP RSCL
                    *
                    * REAL NUMBER OR ENT LITERAL
                    *
05253  074570  RS5   WBD A,I        LOOK FOR END OF IT
05254  010121        CPA B34
05255  066203        JMP RSCL
05256  066253        JMP *-3
                    *
                    * GTO OR GSB
                    *
05257  074570  RS6   WBD A,I        SKIP R.S. BRANCH ADDRESS
05260  074570        WBD A,I
05261  066203        JMP RSCL

                    *
                    * NORMAL RETURNS
                    *
05262  005241  RS1   LDB LEFTE
05263  034016        STB C          CORRECT C
05264  074761  RS2   WBC B,D
05265  170202        RET 2          RETURN WITH BYTE
```

REVERSE COMPILER -- MAIN SECTION

```
                    *
                    * INITIALIZATION
                    *
                    * ON ENTRY:
                    *
                    *   B-REGISTER HAS LOCATION FOR LEFT END
                    *
05266  035244  RCLR  STB ARRBF      INITIALIZE LEFT-END POINTER
05267  000001        LDA B
05270  004450        LDB ACLBI
05271  024254        ADB P1         SPECIAL ENTRY INTO ACLBI,I
05272  140001        JSM B,I        TO CLEAR MOST OF I/O BUFFER
05273  000262        LDA TOBLN
05274  130316        STA AIBFL,I
05275  000117        LDA B40
05276  031251        STA OFLAG      INDICATE NO BUFFER OVERFLOW
                    *
05277  000257        LDA M1
05300  031610        STA KBFMT      INDICATE COMPILE BUFFER IS OVERWRIT.
05301  001532        LDA REFOR
05302  072402        SZA *+2
05303  141532        JSM REFOR,I
                    *
05304  140511        JSM AGEOL,I    LOOK FOR EOL
05305  066323        JMP RL1

                    *
                    * EXIT ROUTINE
                    *
05306  005244  RXIT  LDB ARRBF
05307  034017        STB D          INITIALIZE POINTER FOR OVERFLOW FLAG
05310  074570        WBD A,I
05311  001251        LDA OFLAG
05312  074750        PBD A,D        STORE OVERFLOW STATUS FLAG
05313  000214        LDA EOLB
05314  130316        STA AIBFL,I    FIX UP END OF I/O BUFFER
                    *
05315  005531        LDB APRVC      IS API ROM IN?
05316  076402        SZB *+2        NO
05317  164001        JMP B,I        YES
05320  170201        RET 1
```

```
                         *
                         * MAIN LOOP
                         *
05321   042176   RLOOP  JSM RSCAN        SCAN BACKWARDS
05322   066306          JMP RXIT         DONE
                         *
05323   035245   RL1    STB CODE         SAVE BYTE
05324   024332          ADB ARTBL
05325   100001          LDA B,I
05326   031237          STA GUIDE        SAVE RTBL WORD
05327   004177          LDB P0
05330   035240          STB ASCII        INITIALIZE 'ASCII' TO "NO MNEMONIC"
                         *
05331   005245          LDB CODE         RECALL CODE
05332   024167          ADB M128
05333   176405          SAM RL4          SKIP UNLESS MAINFRAME MNEMONIC
05334   000001          LDA B
05335   020254          ADA P1
05336   004333          LDB AMTBL
05337   042150          JSM TSCAN        GO GET MNEMONIC INFORMATION
                         *
05340   170507   RL4    SAR 8
05341   050130          AND B17          GET CLASS
05342   022344          ADA AJ2
05343   164000          JMP A,I          BRANCH VIA JMP TABLE
                         *
05344   105345   AJ2    DEF *+1,I        JUMP TABLE #2
                         *
05345   100424          DEF ASYER,I   0  UNEXPECTED CODE
05346   005433          DEF RC2       1  OPERAND
05347   005470          DEF RC4       2  UNARY OPERATOR
05350   005470          DEF RC4       3  BINARY OPERATOR
05351   005427          DEF RC1       4  EOL
05352   005575          DEF ELOUT     5  LITERAL
05353   005433          DEF RC2       6  GTO OR GSB
05354   005361          DEF OPROM     7  OPTIONAL-ROM
05355   005545          DEF STOUT     8  CHARACTER STRING
05356   005610          DEF REOUT     9  REAL NUMBER
05357   005737          DEF INTOT    10  INTEGER NUMBER
05360   005321          DEF RLOOP    11  IGNORE
                         *
                         * CALL OPTIONAL-ROM FOR REVERSE COMPILER
                         *
                         * ON EXIT:
                         *
                         *   'GUIDE' = 'GUIDE' INFORMATION
                         *   'ASCII' = CHARACTER POINTER TO RIGHT END OF MNEMONIC
                         *
05361   004326   OPROM  LDB ATROM
05362   025245          ADB CODE
05363   104001          LDB B,I          GET ROM PAGE ADDRESS
05364   076407          SZB E20A         SKIP IF ROM IS MISSING
05365   024254          ADB P1
05366   035246          STB RT1          COMPILE
05367   024254          ADB P1
05370   035247          STB RT2          REVERSE COMPILE
05371   104001          LDB B,I
05372   014257          CPB M1
05373   066772   E20A   JMP E20          ERROR, ROM MISSING
                         *
05374   044016          ISZ C
05375   074760          WBC A,D          GET ROM'S RELATIVE CODE
05376   031250          STA RT3
05377   074761          WBC B,D
                         *
05400   105247          LDB RT2,I
05401   176205          SBP *+5,C
05402   140001          JSM B,I          OPTIONAL CALL ON ROM
05403   066406          JMP *+3
05404   001237          LDA GUIDE        SPECIAL RETURN FOR STRING ROM
05405   066340          JMP RL4
                         *
05406   001250          LDA RT3
05407   020257          ADA M1
05410   170700          RAR 1
05411   024000          ADB A
05412   176204          SBP *+4,C        SKIP IF LEFT HALF
05413   100001          LDA B,I
05414   170607          SAL 8
05415   066420          JMP *+3
05416   100001          LDA B,I
05417   050170          AND M256
05420   031237          STA GUIDE        SAVE 'GUIDE' INFORMATION
                         *
```

```
05421  105246          LDB RT1,I
05422  176202          SBP *+2,C
05423  140001          JSM B,I         OPTIONAL CALL ON ROM
                *
05424  001250          LDA RT3
05425  042150          JSM TSCAN       GO GET MNEMONIC INFORMATION
05426  066340          JMP RL4
                *
                * EOL CODE
                *
05427  000305  RC1     LDA ASTAK
05430  031254          STA STAKP       RESET STACK POINTER
05431  000177          LDA P0
05432  031243          STA LAST        RESET 'LAST'
                *
                * OPERAND
                *
05433  001237  RC2     LDA GUIDE
05434  005240          LDB ASCII
05435  042754          JSM NMOUT       OUTPUT OPERAND
05436  000177  RC2A    LDA P0
05437  031252          STA IMMFG
                *
05440  004305  RC3     LDB ASTAK
05441  015254          CPB STAKP       STACK EMPTY?
05442  066321          JMP RLOOP       YES
                *
05443  101254          LDA STAKP,I     RECALL STACKED 'GUIDE'
05444  055254          DSZ STAKP
05445  031237          STA GUIDE
05446  105254          LDB STAKP,I     RECALL STACKED 'ASCII'
05447  055254          DSZ STAKP
05450  010245          CPA IMCON       =131400B
05451  066455          JMP RC3A        JUMP IF IMPLIED MULTIPLY
05452  042754          JSM NMOUT       OUTPUT TOS
05453  000177          LDA P0
05454  031252          STA IMMFG       NOT IMPLIED MULTIPLY
                *
05455  001237  RC3A    LDA GUIDE
05456  004000          LDB A
05457  170507          SAR 8
05460  050130          AND B17         A=CLASS
                *
05461  174513          SBR 12          B=PRIORITY
05462  014140          CPB P7
05463  004137          LDB P8          CHANGE 7 TO 8
05464  035243          STB LAST        SET 'LAST'
05465  010144          CPA P3          BINARY OPERATOR?
05466  066321          JMP RLOOP       YES
05467  066440          JMP RC3         NO
                *
                * OPERATOR
                *
05470  001237  RC4     LDA GUIDE
05471  170513          SAR 12          A=INPUT PRIORITY
05472  031242          STA PR1
05473  000305          LDA ASTAK
05474  011254          CPA STAKP       STACK EMPTY?
05475  066505          JMP RC5         YES
05476  101254          LDA STAKP,I
05477  170513          SAR 12          A=PR2
05500  010132          CPA P13
05501  000133          LDA P12         CHANGE 13 TO 12
05502  170140          CMA
05503  021242          ADA PR1         PR1-PR2-1
05504  172405          SAM RC6
05505  001242  RC5     LDA PR1
05506  170140          CMA
05507  021243          ADA LAST        LAST-PR1-1
05510  172406          SAM RC7
05511  042107  RC6     JSM RCPAR       STACK '(' AND OUTPUT ')'
05512  000177          LDA P0
05513  031252          STA IMMFG       COVERS CASE (2+3)4
05514  000254          LDA P1
05515  031243          STA LAST        SET 'LAST'
                *
05516  001240  RC7     LDA ASCII       STACK INPUT INFORMATION
05517  042142          JSM RCSTK
05520  001237          LDA GUIDE
05521  042142          JSM RCSTK
05522  001242          LDA PR1         RECALL INPUT PRIORITY
05523  010131          CPA P14
05524  066530          JMP RC8
05525  010130          CPA P15
05526  066532          JMP RC9
```

```
05527  066321               JMP RLOOP
                    *
05530  042107       RC8     JSM RCPAR         STACK '(' AND OUTPUT ')'
05531  066540               JMP RCOM
                    *
05532  000177       RC9     LDA P0
05533  042142               JSM RCSTK
05534  000230               LDA RK2           STACK '['
05535  042142               JSM RCSTK
05536  000067               LDA B135
05537  042114               JSM RCOUT         OUTPUT ']'
05540  000177       RCOM    LDA P0
05541  031252               STA IMMFG         COVERS CASE A[2]3
05542  000254               LDA P1
05543  031243               STA LAST          SET 'LAST'
05544  066321               JMP RLOOP
                    *
                    * SECTION TO OUTPUT A STRING IN LIST FORMAT
                    *
05545  000116       STOUT   LDA B42
05546  042114               JSM RCOUT         OUTPUT TRAILING QUOTE
05547  004016               LDB C
05550  035270               STB SAVEC         SAVE C
05551  044016               ISZ C
05552  074560               WBC A,I           GET LENGTH
05553  072415               SZA ST1
05554  031712               STA T2
05555  031713               STA T3
                    *
05556  074560               WBC A,I           FIND RIGHT-HAND END OF STRING
05557  055712               DSZ T2
05560  066556               JMP *-2
05561  074760               WBC A,D           POINT TO RIGHT-HAND END OF STRING
                    *
05562  074760               WBC A,D           READ A CHARACTER
05563  042114               JSM RCOUT         MOVE TO OUTPUT
05564  010116               CPA B42
05565  042114               JSM RCOUT         DUPLICATE IF "
05566  055713               DSZ T3
05567  066562               JMP *-5
                    *
05570  000116       ST1     LDA B42
05571  042114               JSM RCOUT         OUTPUT LEADING QUOTE
05572  005270               LDB SAVEC
05573  034016               STB C             RESTORE C
05574  066436               JMP RC2A

                    *
                    * SECTION TO OUTPUT LITERAL
                    *
05575  044016       ELOUT   ISZ C             SKIP PAST LEADING B34
                    *
05576  074560       EL1     WBC A,I           FIND RIGHT-HAND END OF LITERAL
05577  010121               CPA B34
05600  066602               JMP EL2
05601  066576               JMP EL1
05602  054016       EL2     DSZ C
                    *
05603  074760       EL3     WBC A,D           READ A CHARACTER
05604  010121               CPA B34
05605  066321               JMP RLOOP
05606  042114               JSM RCOUT         MOVE TO OUTPUT
05607  066603               JMP EL3
                    *
                    * SECTION TO OUTPUT A REAL NUMBER IN LIST FORMAT
                    *
05610  001252       REOUT   LDA IMMFG
05611  170140               CMA
05612  031252               STA IMMFG
05613  072002               RZA *+2
05614  042107               JSM RCPAR         DUMPING NUMBER WITH I* ACTIVE
05615  004016               LDB C
05616  035270               STB SAVEC         SAVE C
05617  000345               LDA ADR1
05620  030017               STA D
05621  071603               CLR 4             CLEAR AR1
05622  173201               SOC *+1,C
                    *
05623  074560               WBC A,I
05624  074560               WBC A,I           GET FORMAT INDICATOR
05625  010103               CPA B60
05626  173211               SOC RN2,C         JUMP IF F/NX
05627  010102               CPA B61
```

```
05630   173307          SOC RN2,S         JUMP IF E/NX
05631   010101          CPA B63
05632   173301          SOC *+1,S
                  *
05633   074560          WBC A,I
05634   170607          SAL 8
05635   170401          AAR 2
05636   031770          STA AR1           SET UP EXPONENT
                  *
05637   074560  RN2     WBC A,I           MOVE DIGITS TO AR1
05640   010121          CPA B34
05641   066644          JMP RN3A
05642   074550          PBD A,I
05643   066637          JMP RN2
                  *
05644   005270  RN3A    LDB SAVEC
05645   034016          STB C             RESTORE C
                  *
                  * ENTER HERE IF NUMBER ALREADY IN AR1
                  *
05646   001770          LDA AR1
05647   170405          AAR 6             LOOK AT EXPONENT
                  *
05650   173022          SOC ROUTF         SKIP IF F-FORMAT
                  *
05651   172002          SAP *+2           GET ABS OF EXPONENT
05652   170040          TCA
05653   040762  RN4     JSM SDIV          GET EXPONENT DIGIT
05654   000135          DEF P10
05655   024103          ADB B60           CONVERT TO ASCII
05656   031711          STA T1
05657   000001          LDA B
05660   042114          JSM RCOUT         MOVE TO OUTPUT
05661   001711          LDA T1
05662   072071          RZA RN4
05663   001770          LDA AR1
05664   172003          SAP *+3           TEST EXPONENT SIGN
05665   000106          LDA B55
05666   042114          JSM RCOUT         OUTPUT '-'
05667   000063          LDA B145
05670   042114          JSM RCOUT         OUTPUT 'EEX'
                  *
05671   000177          LDA P0            FALL THROUGH TO F-SECTION
                  *
05672   170140  ROUTF   CMA
05673   031711          STA T1            SAVE K = 1'S COMPLEMENT OF EXP
05674   020133          ADA P12
05675   172010          SAP RF2
05676   031712          STA T2
05677   000103          LDA B60
05700   042114          JSM RCOUT         OUTPUT '0' TO LEFT OF DECIMAL
05701   045711          ISZ T1
05702   045712          ISZ T2
05703   066700          JMP *-3
05704   066727          JMP RF4
                  *
05705   170040  RF2     TCA
05706   172021          SAP RF4
05707   004103          LDB B60
05710   035712          STB T2            SET INSIGNIFICANT-ZERO FLAG
05711   031713          STA T3            DIGIT COUNTER
05712   075441  RF3     DRS               SHIFT AR1 RIGHT
05713   060103          IOR B60           CONVERT TO ASCII
05714   011712          CPA T2
05715   066721          JMP *+4           DON'T OUTPUT INSIGNIFICANT ZEROS
05716   042114          JSM RCOUT
05717   000177          LDA P0
05720   031712          STA T2            RESET INSIGNIFICANT-ZERO FLAG
05721   045713          ISZ T3
05722   066712          JMP RF3
                  *
05723   001712          LDA T2
05724   072003          RZA *+3
05725   000105          LDA B56
05726   042114          JSM RCOUT         OUTPUT '.'
                  *
05727   001711  RF4     LDA T1            RECALL K
05730   172006          SAP RF6           DONE
05731   075441  RF5     DRS               SHIFT AR1 RIGHT
05732   060103          IOR B60           CONVERT TO ASCII
05733   042114          JSM RCOUT
05734   045711          ISZ T1            TEST FOR FINAL MSD
05735   066731          JMP RF5
                  *
05736   066440  RF6     JMP RC3
```

```
                                *
                                * SECTION TO OUTPUT AN INTEGER
                                *
05737   004016   INTOT LDB C
05740   035270         STB SAVEC       SAVE C
05741   044016         ISZ C
05742   074560         WBC A,I         GET THE INTEGER
05743   170607         SAL 8
05744   074561         WBC B,I
05745   024000         ADB A
05746   140563         JSM AFLTP,I     CONVERT TO FLOATING
05747   000127         LDA ADR2
05750   004345         LDB ADR1
05751   071403         XFR 4           MOVE TO AR1
05752   173201         SOC *+1,C
05753   066644         JMP RN3A
                                *
                                * SUBROUTINE TO OUTPUT NORMAL CODES
                                *
                                * ON ENTRY:
                                *
                                *   A-REGISTER = 'GUIDE' INFORMATION
                                *   B-REGISTER = 'ASCII' INFORMATION
                                *
05754   050045   NMOUT AND B377
05755   076002         RZB NM1         SKIP IF MNEMONIC
05756   066114         JMP RCOUT       OUTPUT DIRECT CODE
                                *
05757   031711   NM1   STA T1          INITIALIZE CHARACTER COUNTER
05760   000016         LDA C
05761   031270         STA SAVEC       SAVE C
05762   034016         STB C
05763   074760   NM2   WBC A,D         MOVE A CHARACTER
05764   042114         JSM RCOUT
05765   055711         DSZ T1
05766   066763         JMP NM2
                                *
05767   005270         LDB SAVEC
05770   034016         STB C           RESTORE C
05771   170201         RET 1

                                *
                                * MISSING ROM
                                *
05772   140405   E20   JSM AERR2,I     ERROR, MISSING ROM
05773   031060         ASC 1,20
05774   001245         LDA CODE
05775   004320   USRMI LDB AIOLM
05776   140477         JSM ABTDA,I     INCLUDE ROM'S ID
05777   164407         JMP AEREX,I

                                *
                                * FILL IN BASE-PAGE LINKS
                                *
00356                  ORG ARCLR
00356   005266         DEF RCLR
00357   005775         DEF USRMI
                                *
00332                  ORG ARTBL
00332   015477         DEF RTBL
                                *
                               END
```

END OF PASS 2 NO ERRORS DETECTED

BASE-PAGE READ-WRITE-MEMORY

```
76550                  ORG 76550B
                       UNL
```

INTERPRETER

```
                                *
                                * INTERPRETER
                                *
06012                  ORG 6012B
                                *
06012   140404   E9    JSM AERR1,I     ERROR, WRONG CONTROL STATE
06013   030071         ASC 1,09
06014   177737   M33   DEC -33
```

```
02010000                      *
02011000                      * SUBROUTINE TO SKIP N LINES
02012000                      *
02013000                      * ON ENTRY: A = +- SKIP DISTANCE
02014000                      *           B = STARTING ADDRESS
02015000                      *
02016000                      * ON EXIT:  B = ADDRESS OF TARGET LINE
02017000                      *
02018000                      * TEMPORARIES USED: T2
02019000                      *
02020000 06015  072413  RELGO SZA XIT          SKIP IF NOTHING TO DO
02021000 06016  031712        STA T2
02022000 06017  172012        SAP FSKIP        WHICH WAY?
02023000                      *
02024000 06020  100001  BSKIP LDA B,I          BACKWARD IF -
02025000 06021  170507        SAR 8            BACKWARD LINK
02026000 06022  050053        AND B177
02027000 06023  170040        TCA
02028000 06024  072414        SZA E31          ERROR IF ZERO
02029000 06025  024000        ADB A
02030000 06026  045712        ISZ T2
02031000 06027  067020        JMP BSKIP
02032000                      *
02033000 06030  170201  XIT   RET 1            DONE
02034000                      *
02035000 06031  100001  FSKIP LDA B,I          FORWARD IF +
02036000 06032  050053        AND B177         FORWARD LINK
02037000 06033  072405        SZA E31
02038000 06034  024000        ADB A
02039000 06035  055712        DSZ T2
02040000 06036  067031        JMP FSKIP
02041000                      *
02042000 06037  170201        RET 1            DONE
02043000                      *
02044000 06040  064722  E31   JMP ERLNF        ERROR, NONEXISTENT LINE

02046000                      *
02047000                      * SUBROUTINE TO DETERMINE WHETHER B IS IN COMPILE BUFFER
02048000                      *
02049000 06041  000001  FINDB LDA B
02050000 06042  170140        CMA
02051000 06043  020330        ADA ABNRY        ABNRY-B-1
02052000 06044  172002        SAP *+2
02053000 06045  170201        RET 1            YES
02054000 06046  170202        RET 2            NO
02056000                      *
02057000                      * EXECUTION STACK OVERFLOW TEST
02058000                      *
02059000                      * ON ENTRY: A = # OF WORDS NEEDED
02060000                      *           B = 'WHAT'
02061000                      *
02062000                      * ON EXIT:  AP1 = UPDATED
02063000                      *           B = D = POINTS TO 'LENGTH'
02064000                      *
02065000                      * TEMPORARIES USED: T1,T2
02066000                      *
02067000 06047  000144  PHVAR LDA P3           SPECIAL ENTRY TO STACK VARIABLE
02068000 06050  004267        LDB FVRWM
02069000 06051  067054        JMP *+3
02070000                      *
02071000 06052  000140  PHCON LDA P7           SPECIAL ENTRY TO STACK CONSTANT
02072000 06053  004266        LDB FPTMP
02073000                      *
02074000 06054  031711  OVTST STA T1
02075000 06055  035712        STB T2
02076000 06056  170040        TCA
02077000 06057  005310        LDB RMAX
02078000 06060  174140        CMB
02079000 06061  021263        ADA AP1
02080000 06062  024000        ADB A            AP1-(RMAX+1)
02081000 06063  176003        SBP *+3
02082000 06064  140404  E40   JSM AERR1,I      ERROR, STACK OVERFLOW
02083000 06065  032060        ASC 1,40
02084000                      *
02085000 06066  031263        STA AP1
02086000 06067  020257        ADA M1
02087000 06070  030017        STA D
02088000                      *
02089000 06071  005712        LDB T2
02090000 06072  070551        PWD B,I          FILL IN 'WHAT'
02091000 06073  005711        LDB T1
02092000 06074  070551        PWD B,I          FILL IN 'LENGTH'
02093000                      *
02094000 06075  004017        LDB D
02095000 06076  170201        RET 1
```

```
                       *
                       * ASSIGNMENT TRACE
                       *
                       * ON ENTRY: A-REGISTER = SOURCE ADDRESS
                       *           B-REGISTER = DESTINATION ADDRESS
                       *
                       * TEMPORARIES USED: T1,T2,T3,T4,T5,T6,T7,T8,T9,T11,T12
                       * PLUS THOSE USED BY ACLBI,ABTDA,ATCHR,APSTR,APNUM,APNMR
                       *
06077   071403         ASTRC XFR 4              TRANSFER THE NUMBER
06100   140551               JSM AFLTC,I        CHECK IF IN USER RANGE
06101   001267               LDA TRACE          TEST TRACE FLAG
06102   172031               SAP AS1            SKIP IF NO TRACING REQUIRED
06103   000016               LDA C
06104   031270               STA SAVEC          SAVE C
                       *
06105   005762               LDB MRW1+4         (WAS SAVED BY AFLTC,I)
06106   140377               JSM AGNAM,I        GET VARIABLE NAME
06107   000075               LDA B75
06110   074550               PBD A,I            OUTPUT =
06111   000315               LDA AIBFM
06112   004017               LDB D
06113   140362               JSM AFBAD,I        GET CHARACTER COUNT
06114   004000               LDB A
06115   000314               LDA AIBFX
06116   030017               STA D
06117   000305               LDA ASTAK
06120   140502               JSM ATCHR,I
06121   000325               LDA ACSTF
06122   030017               STA D
06123   000315               LDA AIBFM
06124   031727               STA T15
06125   140462               JSM APSTR,I
06126   005723               LDB T11
06127   140506               JSM APNUM,I
06130   000000               NOP
06131   140445               JSM APNMR,I        PRINT THE VALUE ASSIGNED
06132   066444               JMP FTR2+1
                       *
06133   170201         AS1   RET 1
                       *
                       * IF EXECUTION
                       *
06134   140611         XIF   JSM AGTAD,I        GET OPERAND ADDRESS
06135   024254               ADB P1
06136   100001               LDA B,I            LOOK AT MANTISSA
06137   072037               RZA MLOOP          'TRUE'

                       *
                       * EOL EXECUTION
                       *
06140   005264         XEOLN LDB LEND
06141   176202               SBP *+2,C
06142   067220               JMP XCGSB          GO COMPLETE GOSUB
                       *
06143   001261         XE0   LDA AP3
06144   031263               STA AP1
                       *
06145   034016         XEX   STB C
06146   074560               WBC A,I
06147   050053               AND B177           GET WLENGTH
06150   072431               SZA XE3
06151   100001               LDA B,I
06152   051314               AND TE
06153   050052               AND B200           GET STOPBIT
06154   072026               RZA XE4
06155   001255               LDA XCOMM
06156   061347               IOR INTSR
06157   072023               RZA XE4
                       *
06160   034016         XE2   STB C              "CONTINUE" ENTERS HERE
06161   074560               WBC A,I
06162   050053               AND B177           GET WLENGTH OF LINE
06163   072416               SZA XE3
                       *
06164   035265               STB HERE           SET CURRENT LINE
06165   020001               ADA B
06166   031264               STA LEND           SET NEXT LINE
                       *
06167   101265         LNTRC LDA HERE,I
06170   051314               AND TE
06171   031267               STA TRACE          SAVE CURRENT LINE TRACE INFORMATION
06172   172004               SAP MLOOP
06173   067207               JMP XE6            GO TRACE LINE #
```

```
                          *
                          * ; EXECUTION
                          *
06174   001261    XSEMI LDA AP3
06175   031263          STA AP1          CLEAR TOS
                          *
                          * MAIN LOOP
                          *
06176   074560    MLOOP WBC A,I          GET BYTE
06177   022475          ADA ABTBL        ADD JUMP TABLE ORIGIN
06200   164000          JMP A,I

                          *
                          * RETURN TO CALLER
                          *
06201   000117    XE3   LDA B40
06202   040744    XE4   JSM SXCMM        GO SET BITS IN XCOMM
06203   014334          CPB ADP0
06204   005317          LDB SWHRE
06205   035266          STB WHERE
06206   170201          RET 1

                          *
                          * LINE NUMBER TRACE
                          *
06207   000016    XE6   LDA C
06210   031270          STA SAVEC        SAVE C
                          *
06211   005265          LDB HERE
06212   140523          JSM AGLNO,I      GET LINE # OF CURRENT LINE
06213   140476          JSM ATLNI,I      PUT LINE # INTO I/O BUFFER
06214   000077          LDA B72
06215   074550          PBD A,I          FOLLOWED BY ":"
06216   042443          JSM FTR2         GO PRINT I/O BUFFER
06217   067176          JMP MLOOP
                          *
                          * COMPLETE GOSUB
                          *
06220   035716    XCGSB STB T6           SAVE JUMP ADDRESS
                          *
06221   001257          LDA CSTAT
06222   010254          CPA P1
06223   043041          JSM FINDB        IN COMPILE BUFFER?
06224   067227          JMP XCG0         YES
06225   140516          JSM AREST,I      UNSTACK
06226   140425          JSM ACNIN,I      INITIALIZE FOR CONTINUE
                          *
06227   005261    XCG0  LDB AP3
06230   035263          STB AP1
                          *
06231   000150          LDA M4           NEED 4 WORDS
06232   140521          JSM ASTKG,I      GO STACK OLD AP3,AP1
06233   031470    E38   ASC 1,38         ERROR, GOSUBS NESTED TOO DEEP
                          *
06234   004257          LDB M1
06235   070551          PWD B,I          SAVE NULL PARM LIST ON TOS-2
06236   001257          LDA CSTAT
06237   073014          SLA XCG1         SKIP IF EXECUTING FROM USER PROGRAM
06240   005716          LDB T6
06241   043041          JSM FINDB        IN COMPILE BUFFER?
06242   067251          JMP *+7          YES
06243   001257          LDA CSTAT
06244   010254          CPA P1
06245   000145          LDA P2
06246   010144          CPA P3
06247   000141          LDA P6
06250   031257          STA CSTAT        UPDATE CSTAT IF NECESSARY
06251   004334          LDB ADP0
06252   067257          JMP XCG2         FAKE RETURN ADDRESS
                          *
06253   005265    XCG1  LDB HERE
06254   100001          LDA B,I
06255   050053          AND B177
06256   024000          ADB A
06257   070551    XCG2  PWD B,I          SAVE RETURN ADDRESS ON TOS-3
                          *
06260   005716          LDB T6           RECALL JUMP ADDRESS
06261   067145          JMP XEX
                          *
                          * RET EXECUTION
                          *
06262   005263    XRETN LDB AP1
06263   024254          ADB P1
```

```
02268000 06264  035711         STB T1          SAVE POINTER
02269000                      *
02270000 06265  005261         LDB AP3
02271000 06266  034017         STB D
02272000 06267  070571         WWD B,I         RETRIEVE AP3 LINK
02273000 06270  014257         CPB M1
02274000 06271  067310         JMP E28         ERROR, NO MATCHING GSB
02275000                      *
02276000 06272  025300         ADB AP2
02277000 06273  035261         STB AP3         RESTORE OLD AP3
02278000 06274  070571         WWD B,I
02279000 06275  101711         LDA T1,I        GET LENGTH OF RETURN PARAMETER
02280000 06276  170040         TCA
02281000 06277  031712         STA T2
02282000 06300  024000         ADB A
02283000 06301  025300         ADB AP2
02284000 06302  035263         STB AP1         UPDATED AP1
02285000                      *
02286000 06303  070570         WWD A,I         UDF CALL?
02287000 06304  172402         SAM *+2         NO
02288000 06305  165527         JMP APRET,I     YES, LINK TO UDF ROM
02289000                      *
02290000 06306  070571         WWD B,I         GET RETURN ADDRESS
02291000 06307  067143         JMP XE0
02292000                      *
02293000 06310  140404  E28    JSM AERR1,I     ERROR, RET WITH NO MATCHING GSB
02294000 06311  031070         ASC 1,28
02296000                      *
02297000                      * STACK NUMBER
02298000                      *
02299000 06312  074560  NWEXP  WBC A,I         NUMBER WITH EXPONENT
02300000 06313  170607         SAL 8
02301000 06314  170401         AAR 2
02302000 06315  067317         JMP *+2
02303000 06316  000177  NNEXP  LDA P0          NUMBER WITHOUT EXPONENT
02304000 06317  031713         STA T3
02305000 06320  043052         JSM PHCON
02306000 06321  004144         LDB P3
02307000 06322  070551         PWD B,I         WHERE = RELATIVE 3
02308000 06323  020143         ADA P4
02309000 06324  071603         CLR 4
02310000 06325  001713         LDA T3
02311000 06326  070550         PWD A,I         SET EXPONENT
02312000 06327  074560  ;NN1   WBC A,I         GET DIGIT PAIR
02313000 06330  010121         CPA B34
02314000 06331  067176         JMP MLOOP
02315000 06332  074550         PBD A,I         STORE IN VALUE
02316000 06333  067327         JMP NN1

02318000                      *
02319000                      * STACK PI
02320000                      *
02321000 06334  043052  XPIE   JSM PHCON
02322000 06335  000144         LDA P3
02323000 06336  070550         PWD A,I         WHERE = RELATIVE 3
02324000 06337  024145         ADB P2
02325000 06340  000173         LDA APIE
02326000 06341  071403         XFR 4           TRANSFER 'PI' TO STACK
02327000 06342  067176         JMP MLOOP

02329000                      *
02330000                      * STACK ENR
02331000                      *
02332000 06343  043047  XENR   JSM PHVAR
02333000 06344  004341         LDB AENR
02334000 06345  070551         PWD B,I         WHERE = IN ENTER REGISTER
02335000 06346  067176         JMP MLOOP
02337000                      *
02338000                      * STACK USER RESULT ADDRESS
02339000                      *
02340000 06347  043047  XARES  JSM PHVAR
02341000 06350  004342         LDB AURES
02342000 06351  070551         PWD B,I         WHERE = IN USER RESULT REGISTER
02343000 06352  067176         JMP MLOOP

02345000                      *
02346000                      * STACK USER RESULT VALUE
02347000                      *
02348000 06353  043052  XVRES  JSM PHCON
02349000 06354  000144         LDA P3
02350000 06355  070550         PWD A,I         WHERE = RELATIVE 3
02351000 06356  024145         ADB P2
```

```
06357 000342          LDA AURES
06360 071403          XFR 4                TRANSFER VALUE TO STACK
06361 067176          JMP MLOOP

                *
                * STACK STRING
                *
06362 074560    XSTRG WBC A,I              GET CHARACTER COUNT
06363 031713          STA T3
06364 020254          ADA P1
06365 170500          SAR 1
06366 020143          ADA P4               LENGTH
06367 004264          LDB STTMP            WHAT = STRING/CONSTANT
06370 043054          JSM OVTST
06371 004265          LDB STWHR
06372 070551          PWD B,I              WHERE = RELATIVE 4 (CHARACTER)
06373 005713          LDB T3
06374 070551          PWD B,I              BYTE COUNT
06375 174040          TCB
06376 067401          JMP XSTR2
                *
06377 074560    XSTR1 WBC A,I              MOVE BYTES
06400 074550          PBD A,I
06401 076176    XSTR2 RIB XSTR1
06402 067176          JMP MLOOP
                *
                * STACK SUBSCRIPTED VARIABLE
                *
06403 023465    XSSVR ADA SSRK             CALCULATE INDEX INTO DATAB
06404 100000          LDA A,I
06405 072003          RZA *+3
06406 140404    E27   JSM AERR1,I          ERROR, UNDEFINED ARRAY
06407 031067          ASC 1,27
                *
06410 105263          LDB AP1,I            LOOK AT FIRST OPERAND
06411 014171          CPB ARRAY
06412 067470          JMP XS1              JUMP IF 'ENTIRE ARRAY'
                *
06413 104000          LDB A,I
06414 035714          STB T4               SAVE #DIMS
06415 020254          ADA P1
06416 031271          STA BASE             SAVE INDEX INTO DOPE VECTOR
06417 140610          JSM ACOUN,I
06420 010001          CPA B
06421 067423          JMP *+2
06422 064733          JMP E32
06423 011714          CPA T4               # OF NUMERIC PARAMETERS
06424 067427          JMP *+3
06425 140404    E25   JSM AERR1,I          ERROR, DIMENSIONS DISAGREE
06426 031065          ASC 1,25
                *
06427 000177          LDA P0
06430 031715    NEXTI STA T5               VARPART
06431 140612          JSM AGTIN,I          GET SUBSCRIPT
06432 125271          ADB BASE,I           ADD U(I)
06433 045271          ISZ BASE
06434 176432          SBM E26              SKIP IF OUT OF BOUNDS
06435 035716          STB T6               SAVE Q
06436 101271          LDA BASE,I           GET D(I)
06437 045271          ISZ BASE
06440 174140          CMB
06441 024000          ADB A                D(I)-Q-1
06442 176424          SBM E26
                *
06443 005715          LDB T5               RECALL VARPART
06444 075617          MPY
06445 021716          ADA T6               VARPART*D(I)+Q
06446 173420          SOS E26
06447 055714          DSZ T4               ANY MORE PLANES?
06450 067430          JMP NEXTI            YES
06451 170601          SAL 2                4 WDS/REGISTER
06452 170040          TCA
06453 121271          ADA BASE,I           ADD CONSPART
06454 055263          DSZ AP1
06455 131263          STA AP1,I            WHERE = IN VALUE TABLE
06456 000144          LDA P3
06457 055263          DSZ AP1
06460 131263          STA AP1,I            LENGTH = 3
06461 000267          LDA FVRWM
06462 055263          DSZ AP1
06463 131263          STA AP1,I            WHAT = FULL/VARIABLE
06464 067176          JMP MLOOP
                *
```

```
02437000 06465  167547  SSRK  ABS DATAB-141B+100000B-IBTBL
02438000                *
02439000 06466  140404  E26   JSM AERR1,I      ERROR, OUT OF BOUNDS
02440000 06467  031066        ASC 1,26

02442000 06470  104000  XS1   LDB A,I          IT WAS 'ENTIRE ARRAY'
02443000 06471  174600        SBL 1
02444000 06472  020254        ADA P1
02445000 06473  020001        ADA B            A = LOCATION OF ORGANIZATION DATA
02446000 06474  005263        LDB AP1
02447000 06475  024145        ADB P2
02448000 06476  104001        LDB B,I
02449000 06477  076402        SZB *+2
02450000 06500  064733        JMP E32
02451000                *
02452000 06501  005263        LDB AP1
02453000 06502  024145        ADB P2
02454000 06503  071401        XFR 2            TRANSFER 'ENTIRE ARRAY' INFORMATION
02455000 06504  100001        LDA B,I
02456000 06505  020144        ADA P3
02457000 06506  130001        STA B,I          POINT TO END OF AREA
02458000 06507  067176        JMP MLOOP

02460000                *
02461000                * STACK SIMPLE VARIABLE
02462000                *
02463000 06510  023521  XSVAR ADA SVRK         CALCULATE INDEX INTO DVTAB
02464000 06511  031271        STA BASE
02465000 06512  105271        LDB BASE,I       RECALL DVTAB ENTRY
02466000 06513  014177        CPB P0
02467000 06514  042033        JSM ALLO4        CALL ALLOCATOR IF UNALLOCATED
02468000 06515  043047        JSM PHVAR
02469000 06516  105271        LDB BASE,I
02470000 06517  070551        PWD B,I          WHERE = IN VALUE TABLE
02471000 06520  067176        JMP MLOOP
02472000                *
02473000 06521  167555  SVRK  ABS DVTAB-101B+100000B-IBTBL
02475000                *
02476000                * UNARY OPERATORS
02477000                *
02478000 06522  140524  XUNM  JSM AUNM,I
02479000 06523  067565        JMP RAPUP        WRAP UP
02480000                *
02481000 06524  140531  XSQR  JSM ASQR,I
02482000 06525  067565        JMP RAPUP        WRAP UP
02483000                *
02484000 06526  140543  XNOT  JSM ANOT,I
02485000 06527  067565        JMP RAPUP        WRAP UP

02487000                *
02488000                * BINARY OPERATORS
02489000                *
02490000 06530  140544  XPRND JSM APRND,I
02491000 06531  067565        JMP RAPUP        WRAP UP
02492000                *
02493000 06532  140545  XDRND JSM ADRND,I
02494000 06533  067565        JMP RAPUP        WRAP UP
02495000                *
02496000 06534  140540  XAND  JSM AAND,I
02497000 06535  067565        JMP RAPUP        WRAP UP
02498000                *
02499000 06536  140541  XLOR  JSM AOR,I
02500000 06537  067565        JMP RAPUP        WRAP UP
02501000                *
02502000 06540  140542  XXOR  JSM AXOR,I
02503000 06541  067565        JMP RAPUP        WRAP UP
02504000                *
02505000 06542  140533  XGTN  JSM AGT,I
02506000 06543  067565        JMP RAPUP        WRAP UP
02507000                *
02508000 06544  140536  XEQL  JSM AEQ,I
02509000 06545  067565        JMP RAPUP        WRAP UP
02510000                *
02511000 06546  140534  XLTN  JSM ALT,I
02512000 06547  067565        JMP RAPUP        WRAP UP
02513000                *
02514000 06550  140532  XGEQ  JSM AGE,I
02515000 06551  067565        JMP RAPUP        WRAP UP
02516000                *
02517000 06552  140535  XLEQ  JSM ALE,I
02518000 06553  067565        JMP RAPUP        WRAP UP
02519000                *
```

```
06554  140537  XNEQ   JSM ANE,I
06555  067565         JMP RAPUP        WRAP UP
                *
06556  140530  XDIV   JSM ADIV,I
06557  067565         JMP RAPUP        WRAP UP
                *
06560  140526  XSUB   JSM ASUB,I
06561  067565         JMP RAPUP        WRAP UP
                *
06562  140527  XMPY   JSM AMUL,I
06563  067565         JMP RAPUP        WRAP UP
                *
06564  140525  XADD   JSM AADD,I
                *
                *                      FALL THRU TO WRAP UP
                *
                * WRAP UP MATH OPERATIONS
                *
06565  043052  RAPUP  JSM PHCON
06566  000144         LDA P3
06567  070550         PWD A,I          WHERE = RELATIVE 3
                *
06570  001752         LDA RES
06571  050164         AND M64
06572  010263         CPA FLAG         TEST FOR EXPONENT = -512
06573  143601         JSM E77,I
06574  004017         LDB D
06575  024254         ADB P1
06576  000340         LDA ARES
06577  071403         XFR 4
06600  067176         JMP MLOOP
                *
06601  014000  E77    DEF 140008

                *
                * NUMERIC ASSIGNMENT
                *
06602  040615  XASN   JSM ABSAD
06603  031263         STA AP1          UPDATE AP1
06604  035712         STB T2           "TO" ADDRESS
06605  101276         LDA SAVEB,I
06606  170513         SAR 12
06607  010136         CPA P9
06610  067613         JMP *+3
06611  140404  E33    JSM AERR1,I      ERROR, STORE INTO ILLEGAL OPERAND
06612  031463         ASC 1,33
                *
06613  101263         LDA AP1,I        LOOK AT "FROM" TYPE
06614  050221         AND B70K
06615  010175         CPA B10K
06616  067620         JMP *+2
06617  067611         JMP E33          ERROR, ILLEGAL DATA TYPE
                *
06620  040615         JSM ABSAD        GET "FROM" ADDRESS
06621  000001         LDA B
06622  005712         LDB T2
06623  043077         JSM ASTRC        GO TRACE ASSIGNMENT
06624  067176         JMP MLOOP
                *
                * EXECUTE DIM OPERATOR
                *
06625  074560  DIMOP  WBC A,I          READ NEXT BYTE
06626  010141         CPA STRID
06627  067765         JMP DMSTR        GO DIM STRING
                *
06630  020166         ADA M97
06631  172011         SAP D11          SKIP IF ARRAY VARIABLE
                *
                * SECTION FOR SIMPLE VARIABLE
                *
06632  020343         ADA SVRE         CALCULATE INDEX INTO DVTAB
06633  031271         STA BASE
06634  105271         LDB BASE,I       RECALL DVTAB ENTRY
06635  076403         SZB *+3
06636  140404  E23    JSM AERR1,I      ERROR, SIMPLE VARIABLE
06637  031063         ASC 1,23
                *
06640  042033         JSM ALLO4        CALL ALLOCATOR IF UNALLOCATED
06641  067760         JMP CLNUP
                *
                * SECTION FOR ARRAY VARIABLE
                *
06642  020277  D11    ADA ADATB        CALCULATE INDEX INTO DATAB
06643  031271         STA BASE
```

```
06644  105271          LDB BASE,I     RECALL DATAB ENTRY
06645  076403          SZB *+3
06646  140404   E24    JSM AERR1,I    ERROR, ARRAY ALREADY DIMENSIONED
06647  031064          ASC 1,24
                *
06650  000254          LDA P1
06651  031715          STA T5         S
06652  031716          STA T6         #DIMS
06653  004305          LDB ASTAK      INDEX INTO CSTAK (WORK AREA)
06654  034017          STB D
                *
06655  101263   DI2    LDA AP1,I      LINK BIT INFORMATION
06656  031717          STA T7
06657  140612          JSM AGTIN,I    GET SUBSCRIPT
06660  035720          STB T8         U
06661  001717          LDA T7         RECALL LINK BIT INFORMATION
06662  170604          SAL 5
06663  172403          SAM *+3        SKIP IF LOWER BOUND SUPPLIED
06664  004257          LDB M1         ELSE USE DEFAULT
06665  067670          JMP *+3
06666  140612          JSM AGTIN,I    GET SUBSCRIPT
06667  174040          TCB            -L
06670  070551          PWD B,I        SAVE U[I]
06671  025720          ADB T8
06672  024254          ADB P1         U-L+1
06673  070551          PWD B,I        SAVE D[I]
06674  035720          STB T8         D
06675  001720          LDA T8         RECALL D
06676  020257          ADA M1         U-L
06677  173402          SOS *+2
06700  172002          SAP *+2
06701  067773   E22A   JMP E22        ERROR, ILLEGAL DIM SPEC
                *
06702  001715          LDA T5         RECALL S
06703  075617          MPY
06704  031715          STA T5         S = S*D
06705  172421          SAM E39B
06706  076020          RZB E39B
                *
06707  001717          LDA T7         RECALL LINK BIT INFORMATION
06710  170603          SAL 4
06711  172003          SAP *+3        SKIP IF END OF SPECS
06712  045716          ISZ T6         INCREMENT #DIMS
06713  067655          JMP DI2
                *
06714  001716          LDA T6
06715  170600          SAL 1
06716  020144          ADA P3         2*#DIMS+3
06717  031717          STA T7         SIZE OF DOPE VECTOR
                *
06720  001715          LDA T5
06721  004143          LDB P4
06722  075617          MPY
06723  031715          STA T5         SIZE OF VALUE AREA
06724  172402          SAM *+2
06725  076403          SZB *+3
06726  140404   E39B   JSM AERR1,I    ERROR, INSUFFICIENT MEMORY
06727  031471          ASC 1,39
                *
06730  021717          ADA T7
06731  170040          TCA
06732  140370          JSM ALLOC,I    REQUEST THE SPACE
06733  030017          STA D          SAVE START OF AREA
06734  131271          STA BASE,I     SET DATAB ENTRY
06735  005716          LDB T6         #DIMS
06736  134000          STB A,I
06737  021717          ADA T7
06740  031717          STA T7         START OF VALUE AREA
06741  031312          STA VT2        UPDATE VT2
06742  174600          SBL 1
06743  174040          TCB
06744  035714          STB T4         COUNTER FOR TRANSFER
06745  004324          LDB ASTK1      RECALL ADDRESS OF WORK AREA
06746  100001   DI3    LDA B,I        MOVE A U-D PAIR
06747  070550          PWD A,I
06750  045714          ISZ T4
06751  076175          RIB DI3
                *
06752  001717          LDA T7         CONSPART
06753  021715          ADA T5
06754  020150          ADA M4
06755  070550          PWD A,I
06756  001715          LDA T5         SIZE OF VALUE AREA
```

```
06757  070550         PWD A,I
                *
06760  074560  CLNUP  WBC A,I          LOOK AT NEXT BYTE
06761  010107         CPA B54
06762  067764         JMP *+2          IGNORE ,1
06763  074760         WBC A,D
06764  067174         JMP XSEMI        CLEAR TOS AND CONTINUE

                *
                * LINK TO DIM STRING
                *
06765  020326  DMSTR  ADA STRK
06766  104000         LDB A,I
06767  076404         SZB E22          ERROR, ROM MISSING
06770  000056         LDA B174
06771  104001         LDB B,I
06772  164001         JMP B,I
                *
06773  140404  E22    JSM AERR1,I      ERROR, NO STRING ROM
06774  031062         ASC 1,22
                *
                * JMP
                *
06775  007014  XJMP   LDB M33
06776  040740         JSM CLXCM        CLEAR XCOMM BIT 5
06777  140612         JSM AGTIN,I      GET INTEGER PARAMETER
07000  000001         LDA B
07001  005265         LDB HERE
07002  043015         JSM RELGO        EXECUTE SKIP
07003  001264         LDA LEND
07004  172402         SAM *+2          TEST FOR IMMEDIATELY PREVIOUS GSB
07005  067143         JMP XEQ
07006  067220         JMP XCGSB

                *
                * FLAG
                *
07007  140612  XFLG   JSM AGTIN,I      GET INTEGER PARAMETER
07010  176413         SBM E35          SKIP IF #<0
07011  024160         ADB M16
07012  176011         SBP E35          SKIP IF #>15
07013  000340         LDA ARES
07014  071603         CLR 4            CLEAR 'RES'
07015  042405         JSM EXEB
07016  051506         AND FLAGS        TEST THE DESIGNATED FLAG
07017  072403         SZA *+3
07020  000175         LDA B10K
07021  031753         STA RES+1        RES = 0 OR 1
07022  067565         JMP RAPUP
                *
07023  140404  E35    JSM AERR1,I      ERROR, ILLEGAL FLAG REFERENCE
07024  031465         ASC 1,35

                *
                * SKIP LABEL
                *
07025  074561  XLABL  WBC B,I          GET LENGTH OF STRING
07026  174040         TCB
07027  066031         JMP XL1
                *
07030  074560         WBC A,I          SKIP BYTES OF STRING
07031  076177  XL1    RIB *-1
07032  067176         JMP MLOOP

                *
                * ALLOCATE SIMPLE VARIABLE, FULL PRECISION
                *
07033  000150  ALLO4  LDA M4
07034  140370         JSM ALLOC,I      MOVE MEMORY UP
07035  131271         STA BASE,I       UPDATE DVTAB
07036  170201         RET 1
                *
                * GTO AND GSB EXECUTION
                *
07037  000263  XAGSB  LDA FLAG         ABSOLUTE GSB
07040  066042         JMP *+2
07041  000177  XAGTO  LDA P0           ABSOLUTE GTO
07042  031715         STA T5
07043  000257         LDA M1           INDICATE FORWARD
07044  031716         STA T6
```

```
07045  005307        LDB FWUP      INDICATE ABSOLUTE
07046  066063        JMP XFER
                *
07047  000263  XPGSB LDA FLAG      + GSB
07050  066052        JMP *+2
07051  000177  XPGTO LDA P0        + GTO
07052  031715        STA T5
07053  000257        LDA M1        INDICATE FORWARD
07054  066061        JMP XM1
                *
07055  000263  XMGSB LDA FLAG      - GSB
07056  066060        JMP *+2
07057  000177  XMGTO LDA P0        - GTO
07060  031715        STA T5
07061  031716  XM1   STA T6
07062  005265        LDB HERE      INDICATE RELATIVE
                *
07063  035717  XFER  STB T7
07064  074560        WBC A,I       GET HI-SPEED WORD
07065  170607        SAL 8
07066  074561        WBC B,I
07067  024000        ADB A
07070  076410        SZB LOWSP     SKIP IF SEARCH NEEDED
                *
                * THIS SECTION DOES A HI-SPEED BRANCH
                *
07071  035264        STB LEND      SET GTO/GSB FLAG
07072  074560        WBC A,I
07073  010116        CPA B42       ALPHA?
07074  066025        JMP XLABL     YES
07075  074560        WBC A,I       NO, SKIP PAST INTEGER
07076  074560        WBC A,I
07077  067176        JMP MLOOP
                *
                * THIS SECTION DOES A LOW-SPEED BRANCH
                *
07100  007014  LOWSP LDB M33
07101  040740        JSM CLXCM     CLEAR XCOMM BIT 5
07102  000016        LDA C         SAVE C FOR LATER FILL-IN
07103  031720        STA T8        OF HI-SPEED BRANCH ADDRESS
07104  074560        WBC A,I
07105  010114        CPA B44       NUMERIC?
07106  066112        JMP FINDN     YES
                *
07107  074560        WBC A,I       GET BYTE COUNT
07110  042164        JSM FINDL     FIND LABELED LINE
07111  066122        JMP CN1
                *
                * SCAN FOR A LINE NUMBER
                *
07112  074560  FINDN WBC A,I       GET INTEGER
07113  170607        SAL 8
07114  074561        WBC B,I
07115  060001        IOR B
07116  045716        ISZ T6        TEST DIRECTION OF SEARCH
07117  170040        TCA
07120  005717        LDB T7
07121  043015        JSM RELGO
                *
                * FINAL PROCESSING
                *
07122  001257  CN1   LDA CSTAT
07123  010142        CPA P5
07124  067012        JMP E9        ERROR, WRONG CONTROL STATE
                *
07125  025715        ADB T5        INCLUDE GTO/GSB FLAG
07126  035264        STB LEND
07127  176425        SBM CN2       SKIP IF GSB
07130  010144        CPA P3
07131  067012        JMP E9        ERROR, WRONG CONTROL STATE
07132  010254        CPA P1
07133  043041        JSM FINDB     IN COMPILE BUFFER?
07134  066154        JMP CN2       YES
07135  000117        LDA B40       SET STOP BIT
07136  040744        JSM SXCMM
07137  001232        LDA CSTMP+12
07140  170501        SAR 2         TEST RUN-DONE BIT
07141  073405        RLA *+5
07142  140425        JSM ACNIN,I   CONTINUE INITIALIZATION
07143  004303        LDB ACBF
07144  035265        STB HERE
07145  140515        JSM ASTKI,I   DUMMY STACK FOR C.S.
07146  005264        LDB LEND
07147  035317        STB SWHRE
07150  001232        LDA CSTMP+12
```

INTERPRETER

```
07151  050207         AND M10          CLEAR BITS 0 AND 3 OF JB'S CFLAG
07152  031232         STA CSTMP+12     (FETCH AND STEP BITS)
07153  140523         JSM AGLNO,I
07154  001257  CN2    LDA CSTAT
07155  073406         RLA *+6          DON'T FILL IN H.S. ADDRESS
07156  001720         LDA T8           RECALL PROGRAM LOCATION
07157  030017         STA D
07160  074751         PBD B,D          FILL IN HI-SPEED ADDRESS
07161  174407         ARR 8
07162  074751         PBD B,D
07163  067176         JMP MLOOP
                *
                * SUBROUTINE TO SCAN FOR AN ALPHAMERIC LABEL
                *
                * ON ENTRY: A = BYTE COUNT
                *           C = POINTER TO FIRST BYTE
                *
                * TEMPORARIES USED: T1,T2,T3,T4,T9
                *
07164  031711  FINDL  STA T1           SAVE BYTE COUNT
07165  000016         LDA C
07166  031721         STA T9           SAVE START OF REAL CHARACTERS
07167  005307         LDB FWUP         NOW SCAN PROGRAM
07170  035712  FN2    STB T2
07171  034017         STB D
07172  074570         WBD A,I
07173  050053         AND B177
07174  072002         RZA *+2
07175  067040         JMP E31          ERROR, END OF PROGRAM
07176  031713         STA T3           SAVE LENGTH OF THIS LINE
07177  074570         WBD A,I
07200  010115         CPA B43          DOES LABEL FOLLOW?
07201  066203         JMP *+2          YES
07202  066223         JMP FN5          NO
07203  074570         WBD A,I          GET BYTE COUNT
07204  011711         CPA T1           SAME LENGTH?
07205  066207         JMP *+2          YES
07206  066223         JMP FN5          NO
07207  010177         CPA P0           BOTH LABELS NULL?
07210  066221         JMP FN4          YES
07211  031714         STA T4           NO, INITIALIZE COMPARE-COUNTER
07212  074560  FN3    WBC A,I          REAL BYTE
07213  074571         WBD B,I          TEST BYTE
07214  010001         CPA B            MATCH?
07215  066217         JMP *+2          YES
07216  066223         JMP FN5          NO
07217  055714         DSZ T4           DECREMENT COMPARISON COUNTER
07220  066212         JMP FN3
                *
07221  005712  FN4    LDB T2           FOUND IT
07222  170201         RET 1
                *
07223  005712  FN5    LDB T2           NOT FOUND YET
07224  025713         ADB T3
07225  001721         LDA T9
07226  030016         STA C            RESTORE REAL BYTE POINTER
07227  066170         JMP FN2
                *
                * SUBROUTINE TO CHANGE STOP AND/OR TRACE INDICATOR BITS
                *
07230  000257         LDA M1
07231  031716  XSNT   STA T6
07232  035717         STB T7
07233  101263         LDA AP1,I
07234  031714         STA T4           SAVE LINK INFORMATION
07235  140612         JSM AGTIN,I      GET INTEGER PARAMETER
07236  176434         SBM E19
07237  035715         STB T5           SAVE FIRST PARAMETER
07240  001714         LDA T4           RECALL LINK INFORMATION
07241  170603         SAL 4
07242  172004         SAP GE1          SKIP IF DEFAULT SECOND PARAMETER
07243  140612         JSM AGTIN,I      GET INTEGER PARAMETER
07244  176426         SBM E19
07245  066247         JMP *+2
07246  005715  GE1    LDB T5
07247  001715         LDA T5
07250  170140         CMA
07251  020001         ADA B
07252  172020         SAP E19
07253  031715         STA T5           -# OF LINES
07254  000001         LDA B
07255  005307         LDB FWUP
07256  043015         JSM RELGO        GO FIND THE LINE
                *
```

```
07257  100001  XSNT1 LDA B,I
07260  051716        AND T6
07261  061717        IOR T7
07262  130001        STA B,I
07263  045715        ISZ T5        ANY MORE LINES TO BE DONE?
07264  066266        JMP *+2       YES
07265  067176        JMP MLOOP     NO
                *
07266  050053        AND B177      GET WLENGTH
07267  072476        SZA *-2       END OF PROGRAM
07270  024000        ADB A
07271  066257        JMP XSNT1
                *
07272  140404  E19   JSM AERR1,I   ERROR, BAD LINE NUMBER
07273  030471        ASC 1,19
                *
                * NOR EXECUTION
                *
07274  105263  XNOR  LDB AP1,I     LOOK AT TOS
07275  014221        CPB EMPTY
07276  066302        JMP XNO2      JUMP IF NO PARAMETERS
                *
07277  000213        LDA TMASK
07300  004177        LDB P0
07301  066231        JMP XSNT      GO CHANGE BITS
                *
07302  000177  XNO2  LDA P0
07303  031267        STA TRACE
07304  031314        STA TE        DISABLE TRACING
07305  067176        JMP MLOOP

                *
                * STP EXECUTION
                *
07306  105263  XSTP  LDB AP1,I     LOOK AT TOS
07307  014221        CPB EMPTY
07310  066316        JMP XST2      JUMP IF NO PARAMETERS
                *
07311  040724        JSM SECCK     CHECK FOR SECURE PROGRAM
07312  000251        LDA UMASK
07313  031314        STA TE        ENABLE TRACING
07314  004052        LDB B200
07315  066230        JMP XSNT-1    GO CHANGE BITS
                *
07316  000073  XST2  LDA B100
07317  040744        JSM SXCMM
07320  067176        JMP MLOOP

                *
                * TRC EXECUTION
                *
07321  000251  XTRC  LDA UMASK
07322  031314        STA TE        ENABLE TRACING
07323  105263        LDB AP1,I     LOOK AT TOS
07324  014221        CPB EMPTY
07325  067176        JMP MLOOP     JUMP IF NO PARAMETERS
                *
07326  040724        JSM SECCK     CHECK FOR SECURE PROGRAM
07327  004263        LDB FLAG
07330  066230        JMP XSNT-1    GO CHANGE BITS
07331  007460  FK1   DEF MFLAG
07332  007467  FK2   DEF SFLAG
07333  007471  FK3   DEF CFLAG

                *
                * COMPLEMENT FLAG
                *
07334  001506  XCMF  LDA FLAGS
07335  105263        LDB AP1,I
07336  014221        CPB EMPTY
07337  066356        JMP ALLF1     JUMP IF ALL FLAGS
                *
07340  006331        LDB FK1
07341  066362        JMP ALTER

                *
                * SET FLAG
                *
07342  000257  XSFG  LDA M1
07343  105263        LDB AP1,I
07344  014221        CPB EMPTY
```

```
07345  066357        JMP ALLF2       JUMP IF ALL FLAGS
                     *
07346  006332        LDB FK2
07347  066362        JMP ALTER

                     *
                     * CLEAR FLAG
                     *
07350  000177  XCFG  LDA P0
07351  105263        LDB AP1,I
07352  014221        CPB EMPTY
07353  066357        JMP ALLF2       JUMP IF ALL FLAGS
                     *
07354  006333        LDB FK3
07355  066362        JMP ALTER
                     *
07356  170140  ALLF1 CMA
07357  031506  ALLF2 STA FLAGS
07360  042415        JSM FCHEK       GO CHECK FOR FLAG TRACING
07361  067176        JMP MLOOP
07362  035714  ALTER STB T4          SAVE SUBROUTINE ADDRESS
07363  000177        LDA P0
07364  031715        STA T5          INITIALIZE FLAG MASK
                     *
07365  101263  NEXTF LDA AP1,I
07366  031716        STA T6          SAVE LINK INFORMATION
07367  140612        JSM AGTIN,I     GET INTEGER PARAMETER
07370  176414        SBM E35A        SKIP IF #<0
07371  024160        ADB M16
07372  176012        SBP E35A        SKIP IF #>15
07373  042405        JSM EXEB        POSITION MASK BIT
07374  061715        IOR T5
07375  031715        STA T5
07376  005716        LDB T6          RECALL LINK INFORMATION
07377  174603        SBL 4
07400  176465        SBM NEXTF       SKIP IF MORE PARAMETERS
07401  141714        JSM T4,I        GO CHANGE FLAGS
07402  042415        JSM FCHEK       GO CHECK FOR FLAG TRACING
07403  067176        JMP MLOOP
                     *
07404  066023  E35A  JMP E35         ERROR, ILLEGAL FLAG MODIFIER REF

                     *
                     * SUBROUTINE TO FORM ROTATE INSTRUCTION AND EXECUTE IT
                     *
07405  024242  EXEB  ADB KF
07406  000254        LDA P1
07407  070430        DIR             PREVENT INTERRUPT INTERFERENCE
07410  070001        EXE B
07411  070420        EIR
07412  170201        RET 1
                     *
                     * SUBROUTINE TO CHECK FOR FLAG TRACING
                     *
07413  042405  SYSFL JSM EXEB        SPECIAL ENTRY TO SET A SYSTEM FLAG
07414  042467        JSM SFLAG
                     *
07415  001267  FCHEK LDA TRACE       TRACING ENABLED?
07416  172031        SAP FTR3        NO
                     *
07417  000016        LDA C
07420  031270        STA SAVEC
07421  140450        JSM ACLBI,I     CLEAR I/O BUFFER
07422  002450        LDA FMSG
07423  004313        LDB AIBUF
07424  071406        XFR 7           "FLAGS:" MESSAGE
07425  140444        JSM A.PRN,I     GO PRINT IT
07426  140450        JSM ACLBI,I     CLEAR I/O BUFFER
07427  000160        LDA M16
07430  031713        STA T3          INITIALIZE COUNTER
07431  004315        LDB AIBFM
07432  034017        STB D           INITIALIZE BUFFER POINTER
07433  001506        LDA FLAGS
07434  004103  FTR1  LDB B60         ASSUME FLAG IS 'ZERO'
07435  172002        SAP *+2
07436  004102        LDB B61         NOPE, FLAG IS 'ONE'
07437  074551        PBD B,I
07440  170716        RAR 15
07441  045713        ISZ T3          TEST LOOP COUNTER
07442  066434        JMP FTR1
                     *
07443  140444  FTR2  JSM A.PRN,I     GO PRINT FLAG CONFIGURATION
07444  040710        JSM EOLIO
```

```
03111000 07445  001270              LDA SAVEC
03112000 07446  030016              STA C
03113000 07447  170201  FTR3        RET 1           DONE!
03114000                *
03115000 07450  007451  FMSG        DEF *+1
03116000 07451  043114              ASC 7,FLAGS!  (0-15)
03118000                *
03119000                * SUBROUTINE TO COMPLEMENT DESIGNATED FLAG
03120000                *
03121000                * ON ENTRY!  A-REGISTER HAS FLAG MASK
03122000                *
03123000 07460  061506  MFLAG IOR FLAGS
03124000 07461  004000        LDB A
03125000 07462  001506        LDA FLAGS
03126000 07463  051715        AND T5
03127000 07464  170140        CMA
03128000 07465  050001        AND B
03129000 07466  066473        JMP C1

03131000                *
03132000                * SUBROUTINE TO SET DESIGNATED FLAG
03133000                *
03134000                * ON ENTRY!  A-REGISTER HAS FLAG MASK
03135000                *
03136000 07467  061506  SFLAG IOR FLAGS
03137000 07470  066473        JMP C1

03139000                *
03140000                * SUBROUTINE TO CLEAR DESIGNATED FLAG
03141000                *
03142000                * ON ENTRY!  A-REGISTER HAS FLAG MASK
03143000                *
03144000 07471  170140  CFLAG CMA
03145000 07472  051506        AND FLAGS
03146000 07473  031506  C1    STA FLAGS
03147000 07474  170201        RET 1
03149000 07475  107476  ABTBL DEF IBTBL,I      ADDRESS OF JUMP TABLE
03150000                *
03151000 07476  100424  IBTBL DEF ASYER,I 000
03152000 07477  027755        DEF CALLM   001 ROM #1
03153000 07500  027755        DEF CALLM   002 ROM #2
03154000 07501  027755        DEF CALLM   003 ROM #3
03155000 07502  027755        DEF CALLM   004 ROM #4
03156000 07503  027755        DEF CALLM   005 ROM #5
03157000 07504  027755        DEF CALLM   006 ROM #6
03158000 07505  027755        DEF CALLM   007 ROM #7
03159000 07506  027755        DEF CALLM   010 ROM #8
03160000 07507  027755        DEF CALLM   011 ROM #9
03161000 07510  027755        DEF CALLM   012 ROM #10
03162000 07511  027755        DEF CALLM   013 ROM #11
03163000 07512  027755        DEF CALLM   014 ROM #12
03164000 07513  027755        DEF CALLM   015 ROM #13
03165000 07514  027755        DEF CALLM   016 ROM #14
03166000 07515  027755        DEF CALLM   017 ROM #15
03167000 07516  027755        DEF CALLM   020 ROM #16
03168000 07517  027755        DEF CALLM   021 ROM #17
03169000 07520  027755        DEF CALLM   022 ROM #18
03170000 07521  100424        DEF ASYER,I 023
03171000 07522  100424        DEF ASYER,I 024
03172000 07523  100424        DEF ASYER,I 025
03173000 07524  100424        DEF ASYER,I 026
03174000 07525  100424        DEF ASYER,I 027
03175000 07526  100424        DEF ASYER,I 030
03176000 07527  100424        DEF ASYER,I 031
03177000 07530  100424        DEF ASYER,I 032
03178000 07531  100424        DEF ASYER,I 033
03179000 07532  100424        DEF ASYER,I 034 END OF #
03180000 07533  100424        DEF ASYER,I 035
03181000 07534  100424        DEF ASYER,I 036
03182000 07535  006562        DEF XMPY    037 I*
03183000 07536  100424        DEF ASYER,I 040
03184000 07537  100424        DEF ASYER,I 041
03185000 07540  006362        DEF XSTR    042 STRING FOLLOWS
03186000 07541  007025        DEF XLA     043 LABEL FOLLOWS
03187000 07542  100424        DEF ASYER,I 044
03188000 07543  100424        DEF ASYER,I 045
03189000 07544  100424        DEF ASYER,I 046
03190000 07545  100424        DEF ASYER,I 047
03191000 07546  100424        DEF ASYER,I 050
03192000 07547  100424        DEF ASYER,I 051
03193000 07550  006562        DEF XMPY    052 *
03194000 07551  006564        DEF XADD    053 +
03195000 07552  015446        DEF XCOMA   054 ,1
```

```
07553  006560   DEF XSUB     055 -
07554  006522   DEF XUNM     056 U-
07555  006556   DEF XDIV     057 /
07556  006316   DEF NNEXP    060 F-NUMBER
07557  006316   DEF NNEXP    061 E-NUMBER
07560  006312   DEF NWEXP    062 F-NUMBER W/EXP
07561  006312   DEF NWEXP    063 E-NUMBER W/EXP
07562  015446   DEF XCOMA    064 ,2
07563  100424   DEF ASYER,I  065
07564  100424   DEF ASYER,I  066
07565  100424   DEF ASYER,I  067
07566  100424   DEF ASYER,I  070
07567  100424   DEF ASYER,I  071
07570  015444   DEF XCOLN    072 :
07571  006174   DEF XSEMI    073 ;
07572  100424   DEF ASYER,I  074
07573  006174   DEF XSEMI    075 LABEL :
07574  100424   DEF ASYER,I  076
07575  006347   DEF XARES    077 RES (ADDRESS)
07576  100424   DEF ASYER,I  100 LITERAL
07577  006510   DEF XSVAR    101 A
07600  006510   DEF XSVAR    102 B
07601  006510   DEF XSVAR    103 C
07602  006510   DEF XSVAR    104 D
07603  006510   DEF XSVAR    105 E
07604  006510   DEF XSVAR    106 F
07605  006510   DEF XSVAR    107 G
07606  006510   DEF XSVAR    110 H
07607  006510   DEF XSVAR    111 I
07610  006510   DEF XSVAR    112 J
07611  006510   DEF XSVAR    113 K
07612  006510   DEF XSVAR    114 L
07613  006510   DEF XSVAR    115 M
07614  006510   DEF XSVAR    116 N
07615  006510   DEF XSVAR    117 O
07616  006510   DEF XSVAR    120 P
07617  006510   DEF XSVAR    121 Q
07620  006510   DEF XSVAR    122 R
07621  006510   DEF XSVAR    123 S
07622  006510   DEF XSVAR    124 T
07623  006510   DEF XSVAR    125 U
07624  006510   DEF XSVAR    126 V
07625  006510   DEF XSVAR    127 W
07626  006510   DEF XSVAR    130 X
07627  006510   DEF XSVAR    131 Y
07630  006510   DEF XSVAR    132 Z
07631  006625   DEF DIMOP    133 DIM OPERATOR
07632  006524   DEF XSQR     134 SQR
07633  100424   DEF ASYER,I  135
07634  100424   DEF ASYER,I  136
07635  100424   DEF ASYER,I  137
07636  027766   DEF XARRY    140 ENTIRE ARRAY
07637  006403   DEF XSSVR    141 A[
07640  006403   DEF XSSVR    142 B[
07641  006403   DEF XSSVR    143 C[
07642  006403   DEF XSSVR    144 D[
07643  006403   DEF XSSVR    145 E[
07644  006403   DEF XSSVR    146 F[
07645  006403   DEF XSSVR    147 G[
07646  006403   DEF XSSVR    150 H[
07647  006403   DEF XSSVR    151 I[
07650  006403   DEF XSSVR    152 J[
07651  006403   DEF XSSVR    153 K[
07652  006403   DEF XSSVR    154 L[
07653  006403   DEF XSSVR    155 M[
07654  006403   DEF XSSVR    156 N[
07655  006403   DEF XSSVR    157 O[
07656  006403   DEF XSSVR    160 P[
07657  006403   DEF XSSVR    161 Q[
07660  006403   DEF XSSVR    162 R[
07661  006403   DEF XSSVR    163 S[
07662  006403   DEF XSSVR    164 T[
07663  006403   DEF XSSVR    165 U[
07664  006403   DEF XSSVR    166 V[
07665  006403   DEF XSSVR    167 W[
07666  006403   DEF XSSVR    170 X[
07667  006403   DEF XSSVR    171 Y[
07670  006403   DEF XSSVR    172 Z[
07671  006334   DEF XPIE     173 PI
07672  006343   DEF XENR     174 ENR
07673  006602   DEF XASN     175 GAZINTA
07674  027771   DEF XEMTY    176 EMPTY
07675  006140   DEF XEOLN    177 EOL
07676  006134   DEF XIF      200 IF
07677  100567   DEF APRT,I   201 PRT
```

```
07700 100570   DEF ADSP,I  202 DSP
07701 006536   DEF XLOR    203 OR
07702 006534   DEF XAND    204 AND
07703 006526   DEF XNOT    205 NOT
07704 100575   DEF AFXD,I  206 FXD
07705 100576   DEF AFLT,I  207 FLT
07706 027734   DEF XSPAC   210 SPC
07707 006775   DEF XJMP    211 JMP
07710 007342   DEF XSFG    212 SFG
07711 007350   DEF XCFG    213 CFG
07712 007334   DEF XCMF    214 CMF
07713 006530   DEF XPRND   215 PRND
07714 006532   DEF XDRND   216 DRND
07715 007321   DEF XTRC    217 TRC
07716 007274   DEF XNOR    220 NOR
07717 007306   DEF XSTP    221 STP
07720 007007   DEF XFLG    222 FLG
07721 023706   DEF XENT    223 ENT
07722 007057   DEF XMGTO   224 GTO-
07723 007051   DEF XPGTO   225 GTO+
07724 007055   DEF XMGSB   226 GSB-
07725 007047   DEF XPGSB   227 GSB+
07726 007041   DEF XAGTO   230 GTO
07727 007037   DEF XAGSB   231 GSB
07730 006176   DEF MLOOP   232 DIM
07731 006262   DEF XRETN   233 RET
07732 001150   DEF XWAIT   234 WAIT
07733 015475   DEF XBEEP   235 BEEP
07734 015452   DEF XEND    236 END
07735          BSS 1       237 REW
07736 006540   DEF XXOR    240 XOR
07737          BSS 1       241 IDF
07740          BSS 1       242 SSC
07741          BSS 1       243 TRK
07742          BSS 1       244 FDF
07743          BSS 1       245 ERT
07744          BSS 1       246 MRK
07745          BSS 1       247 RCF
07746          BSS 1       250 LDF
07747 023704   DEF XENP    251 ENL
07750          BSS 1       252 LDP
07751          BSS 1       253 RCM
07752          BSS 1       254 LDM
07753          BSS 1       255 RCK
07754          BSS 1       256 LDK
07755          BSS 1       257 LDB
07756          BSS 1       260 VFY
07757          BSS 1       261 AVD
07760          BSS 1       262 AVE
07761 100574   DEF AKOF,I  263 LKD
07762 100573   DEF AKON,I  264 LKE
07763 006554   DEF XNEQ    265 #
07764 006552   DEF XLEQ    266 <=
07765 006550   DEF XGEQ    267 >=
07766 006546   DEF XLTN    270 <
07767 006542   DEF XGTN    271 >
07770 006544   DEF XEQL    272 =
07771 015401   DEF XLCR    273 L.C. R
07772 100566   DEF ALST,I  274 LIST
07773 006353   DEF XVRES   275 RES (VALUE)
07774 100572   DEF ALSTK,I 276 LISTK
07775          BSS 1       277 TLIST
07776 177526   DEF APP#,I  300 L.C. P


07777          BSS 1           *** RESERVED FOR 6K-PAGE CHECKSUM

                *
                * FILL IN BASE-PAGE LINKS
                *
00360          ORG ARSGT
00360 015261   DEF RESTB
00361 015246   DEF INTI
00362 015370   DEF FBAD
00363 006145   DEF XEX
00364 006160   DEF XE2
00365 006176   DEF MLOOP
00366 006565   DEF RAPUP
00367 007316   DEF XST2
00370 015272   DEF MOVEM
00371 006054   DEF OVTST
00372 006077   DEF ASTRC
```

INTERPRETER

```
00373  006167          DEF LNTRC
00374  027614          DEF FCI
00375  027626          DEF FCC
00376  007413          DEF SYSFL
00377  027466          DEF GNAME
00400  007164          DEF FINDL
00401  015360          DEF ADBA
00402  015362          DEF .ADB
```

LEFTOVERS

```
15246                  ORG 15246B

                *
                * INTERPRETER INITIALIZATION
                *
15246  005311   INIT   LDB VT1
15247  035300          STB AP2
15250  024146          ADB M2          ONE BLANK WORD BETWEEN AP2 AND BOT.
15251  035263          STB AP1
15252  035261          STB AP3         SET UP EXECUTION STACK POINTERS
                *
15253  000257          LDA M1
15254  131261          STA AP3,I       MARK BOTTOM OF STACK
                *
15255  005307          LDB FWUP
15256  035265          STB HERE
15257  035266          STB WHERE
                *
15260  170201          RET 1

                *
                * SECTION TO RESET HI-SPEED BRANCH ADDRESSES
                *
15261  000050   RESTB  LDA B224
15262  004152          LDB M6
15263  140374          JSM AFCI,I      INITIALIZE TEST BYTE
15264  140375   REST2  JSM AFCC,I
15265  170201          RET 1           END-OF-PROGRAM
15266  000177          LDA P0
15267  074550          PBD A,I
15270  074550          PBD A,I
15271  066264          JMP REST2
                *
                * MOVE MEMORY UP
                *
                * ON ENTRY: A = -# OF WORDS TO MOVE
                *
                * ON EXIT:  A = NEW VT2 = START OF NEW SPACE
                *
                * TEMPORARIES USED: T1,T2,T3,T4
                *
15272  005263   MOVEM  LDB AP1
15273  035711          STB T1
15274  024000          ADB A
15275  035712          STB T2
15276  031713          STA T3          SAVE -# OF WORDS TO MOVE
15277  000001          LDA B
15300  170040          TCA
15301  021310          ADA RMAX        RMAX-AP1
15302  172403          SAM *+3
15303  140404   E39    JSM AERR1,I     ERROR, ALLOCATION OVERFLOW
15304  031471          ASC 1,39
                *
15305  035263          STB AP1         UPDATE AP1
15306  005300          LDB AP2
15307  025713          ADB T3
15310  035300          STB AP2         UPDATE AP2
15311  005261          LDB AP3
15312  025713          ADB T3
15313  035261          STB AP3         UPDATE AP3
15314  005311          LDB VT1
15315  025713          ADB T3
15316  035311          STB VT1         UPDATE VT1
15317  005272          LDB FAP1
15320  025713          ADB T3
15321  035272          STB FAP1        UPDATE FAP1
15322  005625          LDB ENSV+1
15323  025713          ADB T3
15324  035625          STB ENSV+1      UPDATE STORED FAP1
                *
```

LEFTOVERS

```
15325  000122            LDA P26
15326  031714            STA T4
15327  004277            LDB ADATB          UPDATE DATAB
15330  100001    M01     LDA B,I
15331  072403            SZA *+3            IGNORE IF UNALLOCATED
15332  021713            ADA T3
15333  130001            STA B,I            STORE UPDATED ENTRY
15334  055714            DSZ T4
15335  076173            RIB M01
                 *
15336  005711            LDB T1             RECALL OLD AP1
15337  015312    M02     CPB VT2
15340  066346            JMP M03            JUMP IF DONE
                 *
15341  100001            LDA B,I            MOVE ORGANIZATION DATA AND STACK
15342  024254            ADB P1
15343  131712            STA T2,I
15344  045712            ISZ T2
15345  066337            JMP M02
                 *
15346  001712    M03     LDA T2
15347  035712            STB T2
15350  031312            STA VT2            UPDATE VT2
                 *
15351  004177            LDB P0             ZERO THE NEW AREA
15352  011712    M04     CPA T2
15353  066356            JMP M05
15354  134000            STB A,I
15355  072175            RIA M04
                 *
15356  001312    M05     LDA VT2
15357  170201            RET 1

                 *
                 * ADJUST BYTE ADDRESS
                 *
                 * ON ENTRY: A-REGISTER = BYTE ADDRESS
                 *           B-REGISTER = COUNT
                 *
                 * ON EXIT:  A-REGISTER = NEW BYTE ADDRESS
                 *           B-REGISTER = UNALTERED
                 *
15360  172302    ADBA    SAP *+2,S          COMPLEMENT SIGN BIT
15361  172201            SAP *+1,C
15362  170716    .ADB    RAR 15             ADJUST ADDRESS
15363  020001            ADA B              ADD CHANGE
15364  170700            RAR 1              RESET ADDRESS
15365  172302            SAP *+2,S          COMPLEMENT SIGN BIT
15366  172201            SAP *+1,C
15367  170201            RET 1

                 *
                 * FIND BYTE ADDRESS DIFFERENCE
                 *
                 * ON ENTRY: A-REGISTER = LOWER BYTE ADDRESS
                 *           B-REGISTER = UPPER BYTE ADDRESS FOR POSITIVE
                 *
                 * ON EXIT:  A-REGISTER = CHARACTER COUNT
                 *
15370  172302    FBAD    SAP *+2,S
15371  172201            SAP *+1,C          COMPLEMENT THE SIGN BIT
15372  170716            RAR 15
15373  176302            SBP *+2,S
15374  176201            SBP *+1,C          COMPLEMENT THE SIGN BIT
15375  174716            RBR 15
15376  170040            TCA                MAKE NEG.
15377  020001            ADA B              A = BYTE DIFF
15400  170201            RET 1
                 *
                 * L.C. R EXECUTION
                 *
15401  140612    XLCR    JSM AGTIN,I        GET SUBSCRIPT
15402  176003            SBP *+3
15403  140404    E26A    JSM AERR1,I        ERROR, NEGATIVE R SUBSCRIPT
15404  031066            ASC 1,26
15405  000001            LDA B
15406  050224            AND B60K
15407  072034            RZA E39A
                 *
15410  174601            SBL 2
15411  024254            ADB P1
15412  001277            LDA ENDS
15413  020001            ADA B              A = ABSOLUTE ADDRESS
```

LEFTOVERS

```
15414   170140              CMA
15415   021263              ADA AP1
15416   020152              ADA M6            A = AP1-(L+7)
15417   172424              SAM E39A
15420   055263              DSZ AP1
15421   135263              STB AP1,I         WHERE = RELATIVE R-REGISTER
15422   055263              DSZ AP1
15423   000144              LDA P3            LENGTH = 3
15424   131263              STA AP1,I
15425   000270              LDA FVRRA
15426   055263              DSZ AP1
15427   131263              STA AP1,I         WHAT = FULL/VARIABLE
15430   024144              ADB P3
15431   025277              ADB END$
15432   000001              LDA B
15433   170040              TCA
15434   021310              ADA RMAX          RMAX-(L+3)
15435   172005              SAP *+5
15436   001310              LDA RMAX
15437   020254              ADA P1
15440   035310              STB RMAX          UPDATE RMAX IF NECESSARY
15441   140471              JSM AZRWM,I       ZERO THE NEW AREA
15442   164365              JMP AINTX,I
                    *
15443   066303      E39A    JMP E39           ERROR, OUT-OF-BOUNDS

                    *
                    * SET LINK BITS IN STACK
                    *
15444   000236      XCOLN   LDA B2K           ' : => 2000B => BIT 10
15445   066447              JMP *+2
                    *
15446   000234      XCOMA   LDA B4K           , => 4000B => BIT 11
15447   161263              IOR AP1,I
15450   131263              STA AP1,I
15451   164365              JMP AINTX,I
                    *
                    * END     (EVENTUALLY ARRIVES AT XST2)
                    *
15452   001257      XEND    LDA CSTAT
15453   010254              CPA P1
15454   066461              JMP XEN1
15455   010145              CPA P2
15456   066461              JMP XEN1
15457   140404      E9A     JSM AERR1,I       ERROR, WRONG CONTROL STATE
15460   030071              ASC 1,09
                    *
15461   042246      XEN1    JSM INTI          DELETE EXECUTION STACK
15462   035264              STB LEND          IMPLIED GTO 0
15463   035317              STB SWHRE
15464   001257              LDA CSTAT
15465   010254              CPA P1
15466   140515              JSM ASTKI,I       DUMMY STACK FOR C.S. IF REQUIRED
                    *
15467   000177              LDA P0
15470   031226              STA CSTMP+8       LNO=0
15471   001232              LDA CSTMP+12
15472   050207              AND M10           CLEAR BITS 0 AND 3 OF JB'S CFLAG
15473   031232              STA CSTMP+12      (FETCH AND STEP BITS)
                    *
15474   165507              JMP ELINK,I       LINK TO WAIT FOR I/O COMPLETION

                    *
                    * BEEP EXECUTION
                    *
15475   040703      XBEEP   JSM BEEP
15476   164365              JMP AINTX,I
27466                       ORG 27466B

                    *
                    * SUBROUTINE TO GET VARIABLE NAME INTO I/O BUFFER
                    *
27466   035723      GNAME   STB T11
27467   174040              TCB
27470   035724              STB T12
27471   140450              JSM ACLBI,I       CLEAR I/O BUFFER
27472   004315              LDB AIBFM
27473   034017              STB D             INITIALIZE BUFFER POINTER
                    *
27474   001311              LDA VT1
27475   170040              TCA
27476   021723              ADA T11           "TO"-VT1
```

LEFTOVERS

```
27477  172020          SAP AST1        SKIP UNLESS R-REGISTER OR P-NUMBER
27500  001310          LDA RMAX
27501  170040          TCA
27502  021723          ADA T11         "TO"-RMAX
27503  172404          SAM GNA1        SKIP IF R-REGISTER
27504  000061          LDA B160        L.C. P
27505  074550          PBD A,I
27506  170201          RET 1
                *
27507  000060  GNA1    LDA B162        L.C. R
27510  074550          PBD A,I
27511  001277          LDA ENDS
27512  170140          CMA
27513  021723          ADA T11
27514  170501          SAR 2           R# = ("TO"-ENDS-1)/4
27515  004017          LDB D
27516  164477          JMP ABTDA,I     OUTPUT SUBSCRIPT VALUE
                *
27517  004276  AST1    LDB ADVTB
27520  035712          STB T2          INITIALIZE TABLE POINTER
27521  000122          LDA P26
27522  031713          STA T3          INITIALIZE COUNT
27523  000072          LDA B101
27524  005723          LDB T11         RECALL ACTUAL ADDRESS
27525  115712  AST2    CPB T2,I
27526  066612          JMP AST9+1      JUMP IF SIMPLE VARIABLE FOUND
27527  045712          ISZ T2
27530  055713          DSZ T3
27531  072174          RIA AST2
                *
                *                      FALL THRU IF ARRAY VARIABLE
                *
27532  000072  AST4    LDA B101        INITIALIZE ASCII CHARACTER
27533  031712          STA T2
27534  004277          LDB ADATB
27535  035714          STB T4
27536  105714  AST5    LDB T4,I        GET DATAB ENTRY
27537  076417          SZB AST6        IGNORE IF ZERO
27540  035717          STB T7          T7 => #DIMS
27541  100001          LDA B,I
27542  170600          SAL 1           2*#DIMS
27543  024254          ADB P1
27544  024000          ADB A           B => LOCATION OF FIRST ELEMENT
27545  100001          LDA B,I
27546  021724          ADA T12         FIRST ELEMENT ADDRESS - ACTUAL ADD.
27547  172407          SAM AST6
27550  024254          ADB P1
27551  035721          STB T9          T9 => #WORDS
27552  104001          LDB B,I
27553  174040          TCB
27554  024000          ADB A           RELATIVE WORD - #WORDS
27555  176404          SBM AST7        SKIP IF IDENTIFIED
                *
27556  045712  AST6    ISZ T2          IT ISN'T THE ONE
27557  045714          ISZ T4
27560  066536          JMP AST5
                *
27561  170501  AST7    SAR 2           RELATIVE ELEMENT
27562  005712          LDB T2
27563  074551          PBD B,I         OUTPUT THE LETTER
27564  004070          LDB B133
27565  074551          PBD B,I         OUTPUT (
27566  055721          DSZ T9
27567  055721          DSZ T9
27570  040762  AST8    JSM SDIV
27571  177721          DEF T9,I        RELATIVE/D(J)
27572  055721          DSZ T9
27573  031720          STA T8
27574  101721          LDA T9,I
27575  055721          DSZ T9
27576  170040          TCA
27577  020001          ADA B           REMAINDER+L(J)
27600  004017          LDB D
27601  140477          JSM ABTDA,I     OUTPUT SUBSCRIPT VALUE
27602  005717          LDB T7
27603  015721          CPB T9          DONE?
27604  066611          JMP AST9
27605  000107          LDA B54         OUTPUT ,
27606  074550          PBD A,I
27607  001720          LDA T8
27610  066570          JMP AST8
                *
27611  000067  AST9    LDA B135        OUTPUT )
27612  074550          PBD A,I
27613  170201          RET 1
```

LEFTOVERS

```
                        *
                        * SUBROUTINE TO FIND A DESIGNATED BYTE IN THE PROGRAM
                        *
                        * INITIALIZATION: LDA (DESIRED BYTE)     (EXCEPT EOL)
                        *                 LDB -# OF CONSECUTIVE BYTES
                        *                 JSM FCI
                        *
                        * CONTINUATION:   JSM FCC
                        *
                        *   ON RETURN TO P+1: END-OF-PROGRAM
                        *                P+2: B-REGISTER = D-REGISTER
                        *
                        * TEMPORARIES USED: T1,T2,T3,T4,T26
                        *
27614  170040   FCI     TCA
27615  031711           STA T1          SAVE DESIRED BYTE
27616  035675           STB T26
27617  005307           LDB FWUP
27620  035712           STB T2          INITIALIZE WORD ADDRESS
27621  034017   FCI3    STB D
27622  074570           WBD A,I         SKIP OVER WLENGTH
27623  004017           LDB D
27624  035713           STB T3          INITIAL D-REGISTER SETTING
27625  170201           RET 1

27626  101712   FCC     LDA T2,I
27627  050053           AND B177
27630  072475           SZA *-3         END-OF-PROGRAM
                        *
27631  005713           LDB T3          RECALL LOCATION OF NEXT BYTE
27632  034017           STB D
27633  074570   RE0     WBD A,I         GET NEXT BYTE
27634  010053           CPA B177
27635  066667           JMP RE2         EOL FOUND
                        *
27636  031714           STA T4          SAVE CURRENT BYTE
27637  020332           ADA ARTBL
27640  100000           LDA A,I         GET RTBL WORD
27641  170507           SAR 8
27642  050130           AND B17         GET CLASS
                        *
27643  010142           CPA P5
27644  066712           JMP RE5         5 = LITERAL SYNTAX
27645  010141           CPA P6
27646  066702           JMP RE6         6 = GTO/GSB
27647  010140           CPA P7
27650  066724           JMP RE7         7 = OPTIONAL ROM
27651  010137           CPA P8
27652  066716           JMP RE8         8 = CHARACTER STRING
27653  010136           CPA P9
27654  066712           JMP RE5         9 = NUMBER
                        *
27655  005713   RE1     LDB T3          CURRENT POSITION
27656  000017           LDA D
27657  031713           STA T3          UPDATE POSITION
27660  034017           STB D
                        *
27661  001711           LDA T1          DESIRED BYTE?
27662  021714           ADA T4
27663  172450           SAM RE0         NO
27664  021675           ADA T26
27665  172046           SAP RE0         NO
27666  170202           RET 2           YES
                        *
27667  005712   RE2     LDB T2          RECALL WORD ADDRESS OF LINE
27670  100001           LDA B,I
27671  050053           AND B177        GET WLENGTH OF LINE
27672  024000           ADB A
27673  035712           STB T2
27674  101712           LDA T2,I
27675  050053           AND B177
27676  010177           CPA P0
27677  170201           RET 1           END-OF-PROGRAM
                        *
27700  042621           JSM FCI3
27701  066633           JMP RE0
                        *
27702  074570   RE6     WBD A,I         GTO/GSB
27703  074570           WBD A,I
27704  074570           WBD A,I         GET TYPE OF BRANCH
27705  010116           CPA B42
27706  066716           JMP RE8
27707  074570           WBD A,I
```

LEFTOVERS

```
27710  074570        WBD A,I
27711  066655        JMP RE1
                *
27712  074570  RE5   WBD A,I         NUMBER OR LITERAL SYNTAX
27713  010121        CPA B34
27714  066655        JMP RE1
27715  066712        JMP *-3
                *
27716  074571  RE8   WBD B,I         CHARACTER STRING, GET LENGTH
27717  174040        TCB
27720  076503        SIB *+3
27721  074570        WBD A,I
27722  066720        JMP *-2
27723  066655        JMP RE1
                *
27724  074571  RE7   WBD B,I         OPTIONAL-ROM, GET SECOND CODE
27725  001714        LDA T4
27726  010136        CPA P9          IS IT THE UDF ROM?
27727  066731        JMP *+2         YES
27730  066655        JMP RE1         NO
                *
27731  014254        CPB P1          IS IT A UDF NAME?
27732  066716        JMP RE8         YES
27733  066655        JMP RE1         NO
                *
                * SPACE EXECUTION
                *
27734  101263  XSPAC LDA AP1,I       LOOK AT DATA TYPE
27735  010221        CPA EMPTY
27736  066744        JMP XSP1        JUMP IF NO PARAMETER
                *
27737  140612        JSM AGTIN,I     GET INTEGER PARAMETER
27740  076413        SZB XSP2
27741  176004        SRP *+4
27742  140404  E17   JSM AERR1,I     ERROR, ILLEGAL SPACE COUNT
27743  030467        ASC 1,17
                *
27744  004254  XSP1  LDB P1          DEFAULT
27745  035711        STB T1
27746  000254        LDA P1
27747  140571        JSM ASPC,I      GO SPACE ONCE
27750  001206        LDA IOTMP       GET KEYCODE
27751  055711        DSZ T1          COUNT EXHAUSTED?
27752  010254        CPA P1          STOP KEY?
27753  164365  XSP2  JMP AINTX,I     DONE!
27754  066746        JMP XSP1+2      KEEP SPACING

                *
                * CALL OPTIONAL-ROM FOR EXECUTION
                *
27755  022765  CALLM ADA ROMK
27756  104000        LDB A,I         B = RMTBL ENTRY
27757  076403        SZB E29A        ERROR, ROM MISSING
                *
27760  104001        LDB B,I
27761  014257        CPB M1
27762  064731  E29A  JMP E29         ERROR, ROM MISSING
27763  074560        WBC A,I         GET OPCODE
27764  164001        JMP B,I         CALL OPTIONAL-ROM
                *
27765  167320  ROMK  DEF RMTBL-IBTBL-1,I
                *
                * STACK 'ENTIRE ARRAY'
                *
27766  000143  XARRY LDA P4
27767  004171        LDB ARRAY       WHAT = ENTIRE ARRAY
27770  066773        JMP XEMTY+2

                *
                * STACK 'EMPTY'
                *
27771  000144  XEMTY LDA P3
27772  004221        LDB EMPTY       WHAT = EMPTY
27773  140371        JSM AOVTS,I
27774  004177        LDB P0
27775  070551        PWD B,I         WHERE = ABSOLUTE 0
27776  164365        JMP AINTX,I

27777                BSS 1           *** RESERVED FOR 26K-PAGE CHECKSUM
```

LFFTOVERS

```
03862000 23704              ORG 23704B

03864000                    *
03865000                    * PROLOGUE TO ENT EXECUTION
03866000                    *
03867000 23704  004127 XENP  LDB B20        SET PRINT FLAG
03868000 23705  066707       JMP *+2
03869000 23706  004177 XENT  LDB P0         CLEAR PRINT FLAG
03870000 23707  001232       LDA CSTMP+12   GET CONTROL SUPERVISOR FLAG (CFLAG)
03871000 23710  050161       AND M17
03872000 23711  060001       IOR B          SET BIT ACCORDING TO ENTER ENTRY.
03873000 23712  031232       STA CSTMP+12   UPDATE THE CONTROL SUPERVISOR FLAG
03874000 23713  001257       LDA CSTAT      MAKE SURE PROPER MODE
03875000 23714  010145       CPA P2
03876000 23715  066720       JMP *+3
03877000 23716  140404 E13   JSM AERR1,I    ERROR, ILLEGAL MODE
03878000 23717  030463       ASC 1,13
03879000                    *
03880000 23720  000016       LDA C
03881000 23721  031624       STA ENSV       SAVE C
03882000 23722  140610       JSM ACOUN,I    SET UP FAP1
03883000 23723  164577       JMP AENT,I
03884000                    *
03885000                     END

END OF PASS 2 NO ERRORS DETECTED
```

BASE-PAGE READ-WRITE-MEMORY

```
00003000 76550               ORG 76550B
00004000                     UNL
02000000                     LST
02001000                    *

02003000                    *
02004000                    *       BASE PAGE LINKS
02005000                    *
02006000 00041               ORG SYSS+1
02007000 00041  010000       DEF .INT       INTERRUPT LINK
02008000                    *
02009000 00403               ORG AMCLX
02010000 00403  010063       DEF MCLX       MAIN LOOP ADDR+1
02011000 00404  011000       DEF ERR1       ERROR ROUTINE - NO RETURN
02012000 00405  011067       DEF ERR2       ERROR ROUTINE - RETURN P+2
02013000 00406  011072       DEF PEMIO      PLACE ERROR MESSAGE IN I/O BUFFER
02014000 00407  011002       DEF EREXT      ERROR EXIT - AFTER 'AERR2'
02015000 00410  010776       DEF REJR       INTERRUPT REJECT ROUTINE
02016000 00411  011406       DEF ERUN7      XCOMM MANAGEMENT
02017000 00412  010722       DEF PLIRC      PLACE LINE NO. IN I/O BUFF
02018000 00413  110657       DEF CNDT,I     COMMAND TABLE (ADDR)
02019000 00414  010605       DEF CTFCB      CHECK TABLE FOR COMMAND
02020000 00415  011177       DEF CONEN      IMMEDIATE EXECUTE CONTINUE
02021000 00416  010437       DEF EXCK       COMMAND EXECUTION
02022000 00417  010551       DEF EXCSB      COMPILE A LINE
02023000 00420  010242       DEF KYPRC      PROCESS A KEY
02024000 00421  011400       DEF RUNSB      RUN INIT CALLED BY LDP
02025000 00422  011312       DEF ECIM       IMMEDIATE CONTINUE
02026000 00423  010654       DEF SCNDT      COMMAND TABLE TABLE START ADDR
02027000 00424  011065       DEF SYSER      SYSTEM ERROR
02028000 00425  010372       DEF CNINT      CONTINUE INITIALIZATION
02029000 00426  010013       DEF ERASA      ERASE ALL LINK
02030000 00427  011452       DEF ISTOR      PLACE KEYBOARD CHAR IN I/O BUFFER
02031000 00430  011453       DEF ISTOX      PLACE CHARACTER IN I/O BUFFER
02032000 00431  010477       DEF EXCST      STMT EXECUTION
02033000                    *
02034000 00577               ORG AENT
02035000 00577  011105       DEF XENO       LINK TO EXECUTE 'ENT'
02036000                    *
```

CONTROL SUPERVISOR

```
02039000                    *
02040000                    *
02041000                    **********************************
02042000                    *                                *
02043000                    *       CONTROL SUPERVISOR
02044000                    *
02045000                    *
02046000                    *
```

```
                *
                *                                *
                **********************************
                *
                *
                *          CNSP
                *
                *
                *
                *
                *
10000                  ORG 10000B
                *  POWER ON ROUTINES: CHECK RESET BIT
                *  FINDS THE AMOUNT OF R/W MEM IN SYSTEM; ZEROES ALL R/W
                *  MEMORY;  WAITS .5 SEC FOR THE CASSETTE
                *  MAX ADDR OF R/W MEM= MAW = 77777B
                *
                *
                *
                *
                *
                *
                *
10000  000177   .INT   LDA KPA      KEYB. SELECT CODE
10001  030017          STA D        SET FLAG FOR AUTO START ROUTINES
10002  030011          STA PA       SET PERIPHERAL ADDR
10003  000005          LDA R5       READ SYSTEM STATUS
10004  170502          SAR 3        POSITION POWER-ON BIT
10005  073402          RLA *+2      SKIP IF POWER ON
                *
10006  067073          JMP RESET    RESET KEY WAS PRESSED
                *
10007  004154          LDB M8       WAIT .5 SECONDS
10010  000263          LDA FLAG
10011  072100          RIA *
10012  076176          RIB *-2
                *
                ************************
                *
                *  ERASE ALL ENTRY
                *
                *        FIND AMOUNT OF MEMORY AVAILABLE
10013  000225   ERASA  LDA ALBPI    ALTERNATE BIT PATTERN
10014  004217          LDB B76K     ASSUME AT LEAST 2K OF MEMORY
10015  034016   .INTL  STB C        SAVE ADDRESS
10016  024241          ADB BM2K     CHECK NEXT LOWER 2K
10017  130001          STA B,I      WRITE ALTERNATE 1'S AND 0'S
10020  110001          CPA B,I      SEE IF WRITTEN
10021  067015          JMP .INTL    YES, SO KEEP LOOKING
                *
                *         CLEAR R/W MEMORY
10022  000177          LDA P0
10023  004016          LDB C        GET ADDR TO START CLEARING
10024  130001          STA B,I      ZERO MEMORY
10025  014344          CPB MAW      DONE?
10026  067030          JMP *+2      YES; GET OUT OF LOOP
10027  076175          RIB *-3      NO; LOOP
10030  004016          LDB C        GET C REG.
10031  035305          STB OFWAM    FIRST WORD OF ACTUAL R/W
10032  035306          STB FWAM     FIRST WORD OF AVAILABLE MEMORY (R/W)
                *
                *
                *      RESET "JSM STACK" POINTER
                *
                *      SET DISPLAY LENGTH
                *
                *
10033  000300          LDA AJSTK    JSM STACK S/A-1
10034  030003          STA R        SET RET STACK POINTER
                *
10035  004117          LDB P32
10036  000005          LDA R5       READ SYSTEM STATUS
10037  073002          SLA *+2      SKIP ON 32 CHAR DISP
10040  004127          LDB P16
10041  035512          STB DLEN     SET DISP LENGTH
                *
                *
10042  043137          JSM SRWLK    SET R/W LINKS,INIT OPTION ROMS
10043  140435          JSM ATRBF,I  TRANSFER I/O TO KBD BUFF
10044  040715          JSM CLMOD    SET MODE = 0 FOR ATRBF
10045  140435          JSM ATRBF,I  TRANS EOL TO RESERVE BUFF ALSO
                *
                *
                *
```

CONTROL SUPERVISOR

```
                        *        SET MEMORYPOINTERS
                        *
10046  004330  SETMP LDB LWAM     LAST WORD OF AVAILABLE MEM.
10047  035311        STB VT1      SET VALUE TABLE POINTR
10050  035312        STB VT2      SET VALUE TABLE POINTR
10051  035313        STB FWBA     SET FIRST WORD OF BIN. AREA
10052  005306        LDB FWAM     FIRST WORD OF AVAILABLE R/W MEM.
10053  035307        STB FWUP     SET FIRST WORD OF USER PROGRAM
10054  035277        STB ENDS     NULL PROGRAM
10055  035310        STB RMAX     NO R-REGISTERS ALLOCATED
10056  042400        JSM RUNSB    INITIALIZE SO THAT A CONT IS LEGAL
10057  140514        JSM ASLLN,I  SET LNO TO LAST LINE NO. OR -1
                *
                *
                *     TURN-ON DISPLAY,ENABLE INTERRUPT
                *
10060  140433  SETM1 JSM ALDSP,I  DISPLAY INFO
10061  070420        EIR          ENABLE INTERRUPT
                *
                *****************************************************
                *
                *        MAIN CONTROL LOOP
                *
                *
10062  165511  MCL   JMP MLBPL,I  GO THRU MAIN LOOP BYPASS LINK
10063  140504  MCLX  JSM ARNLF,I  TURN OFF RUN LIGHT
10064  140454  MLCK  JSM ARPRL,I  GET NEW KEY FLAG,DISTRIBUTE POWER
10065  172277        SAP MLCK,C   KEEP LOOKING IF FLAG IS NOT SET
10066  031207  MLK   STA .WMOD    RESET NEW KEY FLAG
10067  001206        LDA .WKC     GET KEY CODE
10070  043242        JSM KYPRC    PROCESS THE KEY
10071  140432  MCLI  JSM ADSPC,I  DISPLAY THE NEW KEY
10072  067062        JMP MCL      LOOP
                *
                ***************************************************************
                *
                ***************************************************************
                *
                *        SYSTEM RESET
                *
                *      AFTER SYSTEMRESET SYSTEM IS READY
                
                *  RESETS JSM STACK! RESETS STOLEN MEM PTR
                *  STRIPS EXECUTIONSTACK! CLEARS SYSTEM FLAGS
                *  CHECKS LINE BRIDGES OF PROGRAM!DISPLAYS LINE # .
                *  BEING EXECUTED
                *
                *
10073  000300  RESET LDA AJSTK    JSM STACK S/A-1
10074  030003        STA R        SET RET STACK POINTR
10075  001305        LDA OFWAM    FIRST WORD OF ACTUAL R/W
10076  031306        STA FWAM     RESET AVAILABLE MEM PTR
10077  001265        LDA HERE
10100  030017        STA D        SET FLAG FOR AUTO START ROUTINES
10101  140361        JSM AINTI,I  RESET EXECUTION STACK
10102  043137        JSM SRWLK    SET R/W LINKS,INIT OPTION ROMS
10103  001257        LDA CSTAT    SAVE CONTROL STATE
10104  031234        STA TMP4
10105  042040        JSM CLRST    CLEAR CSTAT, LEAVE A P0 IN "A"
10106  031232        STA CFLAG    RESET CONTROL FLAG
10107  031613        STA RENFG    CLEAR RENUMBER,REWIND FLAG
10110  031255        STA XCOMM    CLEAR ANY PENDING INTERRUPTS
10111  031623        STA LKFLG    ENABLE LIVE KBD
10112  031314        STA TE       CLEAR MASTER TRACE FLAG
10113  040717        JSM STELM    SET EOL MODE
10114  004344        LDB MAW      SEE IF PROGRAM STRUCTURE STILL INTACT
10115  140523        JSM AGLNO,I  SEARCH THROUGH LINE BRIDGES
10116  140514        JSM ASLLN,I  RESET LINE NO.
                *
10117  001234        LDA TMP4     PUT CORRECT LINE NUMBER IN DISPLAY
10120  072416        SZA NOLNN    SKIP IF STATE = 0
10121  005626        LDB ENSV+2   GET ENTER SAVED HERE
10122  010143        CPA P4       WAITING FOR ENTER
10123  067133        JMP RLINN    YES, PUT LINE # IN I/O BUFFER
10124  010142        CPA P5       EXECUTION IN ENTER?
10125  067133        JMP RLINN    YES
10126  005607        LDB LKTMP+2  GET SAVED WHERE FOR LIVE KBD
10127  010144        CPA P3       EXECUTION IN LIVE KBD?
10130  067133        JMP RLINN    YES, PUT LINE # IN I/O BUFFER
10131  073405        RLA NOLNN    SKIP IF STATE = 1
10132  004017        LDB D        STATE MUST BE 2 OR 6 SO USE HERE
10133  043421  RLINN JSM STEP4    PLACE LINE # IN I/O BUFFER
10134  000177        LDA P0       RESET CONTROL FLAG
10135  031232        STA CFLAG
```

```
                        *
10136   067060  NOLNN   JMP SETMI    COMPLETE RESET INIT
                        ***********************************************************************
                        *
                        *
                        ********************************************************************
                        *
                        *   SET R/W LINKS,SET INTERRUPT TABLE, INIT OPTION ROMS
                        *
                        *       ROUTINES SHARED BY POWER-ON AND RESET
                        *
10137   000367  SRWLK LDA ASTP       GET ADDR OF STOP ROUT.
10140   031507        STA ELINK      INIT. END-STMT LINK
10141   000406        LDA APEMI      ADDR OF COMMON ERROR SUBR.
10142   031260        STA ERRBP      SET LINK FOR NORMAL ERROR ROUT.
10143   000403        LDA AMCLX      MAIN LOOP ADDR+1
10144   031511        STA MLBPL      SET MAIN LOOP BYPASS LINK
10145   000714        LDA ARETI      TERMINATE RUN LINK WITH A RETURN
10146   031533        STA RLINK      SET RUN LINK FOR OPTION ROMS
10147   000112        LDA B51        SET FOR FIXED 2, FLOAT 9
10150   031217        STA .WPRT
10151   000730        LDA AREPN      SET ERROR ADDR FOR P# EXECUTION
10152   031526        STA APP#
                        *
                        *     SET INTERRUP  TABLE ON TURN-ON:
                        *
                        *     KEYBOARD LINKAND REJECT LINKS
                        *
                        *
10153   000275  SETIT LDA AITAB      GET INTERRUPT TABLE ADDR
10154   172701        SAM *+1,S      SET BIT 15 FOR INDIRECT
10155   030010        STA IV         SET INTERRUPT VECTOR POINTER
10156   000275        LDA AITAB      GET INTERRUPT TABLE ADDR
10157   004434        LDB AKBSR      KEYBOARD SERVICE ROUTINE ADDR
10160   134000        STB A,I        IN INTRPT TABLE
10161   004410        LDB AREJR      REJECT ROUTINE ADDR
10162   072101  SET1  RIA *+1        INCRM TABLE ADDR
10163   134000        STB A,I        FILL REST OF TABLE WITH REJECT ADDRESS
10164   012567        CPA LITAD      LAST INTERPT TABLE ADDR?
10165   067167        JMP STEDT      YES, DONE
10166   067162        JMP SET1       NO: SET ADDITIONAL ADDRS
                        *
                        ***************
                        *
10167   140447  STEDT JSM ASWIO,I   SET POINTERS TO EDIT I/O BUFFER
10170   140452        JSM AEOLB,I   PUT EOL IN BUFFER, RESET EDIT POINTERS
                        *
                        *
                        ***********************************************************
                        *
                        *  SORFI  SET OPTION ROM TABLE
                        *
                        *********************
                        *
10171   140600  SORFI JSM ACSTI,I   CASSETTE INITIALIZATION
                        *
                        *             RESETOPTION ROM TABLE
                        *
10172   000327        LDA AROMS     S/A OF TABLE
10173   020254        ADA P1        SKIP OVER BINARY PROG LINK
10174   071617        CLR 16        CLEAR TABLE
10175   020127        ADA P16       SET MAIN SYSTEM ADDRESS
10176   004331        LDB AMAIN
10177   134000        STB A,I
10200   020254        ADA P1
10201   004257        LDB M1        SET END OF TABLE
10202   134000        STB A,I
                        *
                        *     INITIALIZE OPTION ROM TABLE
                        *
10203   006576        LDB ASYSM     START SEARCH AT SYSTEM ROM ADDR
10204   000001  RINT  LDA B         GET CURRENT ADDR
10205   020236        ADA B2K       LOOK AT NEXT HIGHER 1K
10206   011305        CPA OFWAM     START OF R/W:END OF ROM ADDR SPACE?
10207   067225        JMP ROMIN     INITIALIZE ROMS IF SO
10210   010224        CPA B60K      END OF ROM ADDRESSES?
10211   067225        JMP ROMIN     TABLE FILLED IF SO
10212   030001        STA B         SAVE POSSIBLE ROM S/A
10213   020143        ADA P4        GET ROM INIT ADDR
10214   100000        LDA A,I
10215   010257        CPA M1        ROM PRESENT?
10216   067204        JMP RINT      NO, CHECK NEXT ROM
10217   000001        LDA B         GET ROM S/A AGAIN
10220   020142        ADA P5        POINT TO ROM ID
```

```
10221  100000        LDA A,I       GET ROM ID
10222  020326        ADA ATROM     CALCULATE ADDR TO PUT ROM S/A
10223  134000        STB A,I       STORE ROM ADDR FOR THIS ID
10224  067204        JMP RINT      CHECK FOR ANOTHER ROM
                     *
                     *   INITIALIZE THE OPTION ROMS
                     *
10225  000327  ROMIN LDA AROMS     S/A OF OPTION ROM ADDR TABLE
10226  020127        ADA P16       START WITH THE HIGHEST ID ROM
10227  031227        STA TMP1      SAVE ROM TABLE PTR
10230  101227  RMIN1 LDA TMP1,I    GET ROM ADDR
10231  072404        SZA RMIN2     SKIP IF ROM NOT PRESENT
10232  020143        ADA P4        ROM INIT ADDR
10233  100000        LDA A,I       GET ADDRESS
10234  140000        JSM A,I       INIT THE ROM
10235  001227  RMIN2 LDA TMP1      DONE WITH ALL THE OPTION ROMS?
10236  010327        CPA AROMS
10237  170201        RET 1         YES
10240  055227        DSZ TMP1      NO, POINT TO NEXT ROM ADDR
10241  067230        JMP RMIN1
                     *
                     ********************************************************************
                     *
                     *
                     ****************************************************************
                     *
                     *     THE CONTROL SUPERVISOR DIRECTS ALL KEYCODES
                     *
                     *     LOADED BY THE KEYBOARD INTERRUPT ROUTINE TO THE
                     *
                     *     PROPER HANDLING ROUTINE.
                     *
                     *          ENTRY: A = KEY CODE
                     *
                     *
                     *    TABLE ADDR = BASE + MODE + 5(CN)
                     *     THE CONTENTS OF THE ADDR POINTS TO THE PROCESSING
                     *     ROUTINE.  THIS TABLE OF ADDRESSES CAN BE CONSID
                     *    AS A MATRIX OF SIZE (5,21) WHERE EACH
                     *     ELEMENT IS FOUND BY (MODE,CN).
                     *     MODE IS THE CONTROL SUPERVISOR CONTROLLING FLAG.
                     *     CN IS THE CONTROL NUMBER FOUND IN MTABLE
                     *
                     ****************************************************************
                     *
                     *  KEY PROCESSING TABLE   ENTRY   KYPRC:  A CONTAINS KEY
                     *
                     *
                     *     IF STATE = 2 OR 4 THEN ENTRY 3 IN THE TABLE IS USED
                     *     IF THIS ADDR IS ZERO THEN THE MODE ENTRY IS USED
                     *     THE MODE ENTRY IS ALLWAYS USED IF THE STATE IS ZERO
                     *     MODE IS 0,1,2,OR 4
                     *
                     **************************************
                     *
10242  031235  KYPRC STA SKEY      SAVE NEW CODE
10243  020167        ADA BM200
10244  172002        SAP *+2       SPECIAL KEY?
10245  067250        JMP KYCN2     NO
10246  004126        LDB P17       SPECIAL KEY CN = B21
10247  067251        JMP PRG1
10250  043300  KYCN2 JSM SKCD      GET CONTROL # FROM MTABLE
                     *
10251  014135  PRG1  CPB P10       SEE IF RECALL KEY
10252  067261        JMP KYREC     YES
10253  001232        LDA CFLAG     NO,CLEAR BIT 5 OF CFLAG, AND MODIFY
10254  170705        RAR 6         IF BIT 5 IS SET LEAVE BIT 6 = 1
10255  172602        SAM LASRC,C   CLEAR BIT 5 IN ALL CASES
10256  073201        SLA LASRC,C   BIT 5 = 0 SO CLEAR BIT 6
10257  170711  LASRC RAR 10        REPOSITION FLAG
10260  031232        STA CFLAG     RESTORE FLAG
10261  001257  KYREC LDA CSTAT     IF STATE = 0 USE MODE ENTRY
10262  072404        SZA PRG2      INTO TABLE
10263  000144        LDA P3        STATE MUST BE 2 OR 4 SO USE ENTRY 3
10264  067267        JMP PRG4
10265  005227  PRG3  LDB TMP1      RESTORE B BEFORE RECALCULATE
10266  001256  PRG2  LDA MODE      USE MODE ENTRY
10267  035227  PRG4  STB TMP1      CALCULATE TABLE ADDR
10270  174601        SBL 2         MPY BY 4
10271  025227        ADB TMP1      B=5(CN)
10272  024000        ADB A         B=ENTRY# + 5(CN)
10273  026613        ADB .ATBL     B=ADDR,I  OF PROCESSING ROUTINE
10274  000177        LDA P0        IF ADDR = 0
10275  110001        CPA B,I
```

CONTROL SUPERVISOR

```
10276  067265        JMP PRG3     THEN USE MODE ENTRY
10277  164001        JMP B,I      #0 SO GO TO THE PROCESSING ROUTINE
               *
               *
               ***************************************************************
               *
               *
               *
               *     GET MTABLE CODE
               *
               *          ENTRY:    ASCII CODE IN "SKEY"
               *
               *          EXIT:    CONTROL NUMBER IN B-REG.
               *
               *
10300  001235  SKCD  LDA SKEY     GET KEY CODE
10301  004460  SMTBL LDB AKYTB    GET TABLE ADDR
10302  034016        STB C        SET C-REG
10303  074561  SMTB1 WBC B,I      GET UPPER HALF BYTE
10304  014045        CPB B377     END-OF-TABLE?
10305  067315        JMP SKCD1    YES
               *
10306  010001        CPA B        CODE FOUND?
10307  067312        JMP SMTB2    YES
10310  074561        WBC B,I      NO, BYPASS RIGHT-HALF
10311  067303        JMP SMTB1    CONTINUE
10312  074561  SMTB2 WBC B,I      GET MCODE
10313  174502        SBR 3        GET CONTROL NUMBER
10314  170201        RET 1
               *
10315  004134  SKCD1 LDB B13      MUST BE PROGRAMMING KEY
10316  170201        RET 1        CN = 13
               *
               *
10317  140404  ERILO JSM AERR1,I  ILLEGAL OPERATION
10320  030065        ASC 1,05
               *
               *
               ***************************************************************
               *
               *
               *      NEW KEY AFTER "EOL" MODE IS SET
               *
               *
10321  140451  PEOL  JSM ACLEB,I   CLEAR EDIT BUFFER
10322  040715        JSM CLMOD    RESET TO KBD MODE
               *
               *      ALPHANUMERIC KEYS
               *
10323  140427  P02   JSM AISTR,I  STORE CODE IN INPUT BUFF
10324  067325        JMP *+1      INPUT BUFF FULL! CHAR NOT STORED
10325  164446        JMP AFBP,I   FIND DISP BEGIN POINTR AND
               *
               *
               *      PRINT-ALL KEY
               *
               *
10326  140451  PALL  JSM ACLEB,I  CLEAR EDIT BUFFER
10327  001232        LDA CFLAG    GET CONTROL FLAG
10330  172705        SAM PALL1,S  PRINT ALL SET ?
10331  031232        STA CFLAG    NO; SET IT; UPDATE CONTROL FLAG
10332  003351        LDA ONMSG    GET "ON" MESSAGE
10333  131350        STA AEBUF,I  PLACE LINE NO. IN I/O BUFFER
10334  067342        JMP STPLL    DISPLAY ON/OFF MESSAGE
               *
10335  172601  PALL1 SAM *+1,C    CLEAR PRINT ALL
10336  031232        STA CFLAG    UPDATE CONTROL FLAG
10337  003346        LDA AOFF     ADDR OF "OFF" MESSAGE
10340  005350        LDB AEBUF    DESTINATION ADDR
10341  071401        XFR 2        TRANSFER "OFF" IN I/O BUFF
10342  040715  STPLL JSM CLMOD    SET MODE = 0
10343  140432        JSM ADSPC,I  DISPLAY ON/OFF MESSAGE
10344  140452        JSM AEOLB,I  CLR EDIT BUFFER
10345  170202        RET 2        LEAVE MESSAGE IN DISPLAY
               *
               *
               *
10346  010347  AOFF  DEF *+1
10347  067546        OCT 67546    OF
10350  063040        OCT 63040    F BLANK
10351  067556  ONMSG OCT 67556    ON
               *
               *
               *     RESULT KEY
```

```
                     *
                     *
10352  000060  RESK  LDA P114      GET LOWER CASE "R"
10353  043357        JSM RESSB     PLACE CODE IN I/O BUFF
10354  000063        LDA B145      GET LOWER CASE "E"
10355  043357        JSM RESSB     PLACE CODE IN I/O BUFF
10356  002571        LDA B163      GET LOWER CASE "S"
                     *
                     *
                     *
10357  031235  RESSB STA SKEY      SAVE CODE
10360  067323        JMP P02       STORE CODE IN I/O BUFF + RETURN P+1
                     *
                     *
                     *      RESULT KEY - EOL MODE
                     *
                     *
10361  140451  REOL  JSM ACLEB,I   CLEAR EDIT BUFFER
10362  040715        JSM CLMOD     SET KBD MODE
10363  067352        JMP RESK
                     *
                     *****************************************************
                     *
                     *  CNINT  CONTINUE INITIALIZATION
                     *
                     *  CNINS  PRE CONTINUE INIT
                     *
                     *
                     *
                     *
                     *
                     *
                     *
                     *********************
                     *
10364  040717  CNINS JSM STELM     SET MODE = 4
10365  140452        JSM AEOLB,I   CLR DISPLAY
10366  140433        JSM ALDSP,I
10367  000145        LDA P2        SET RUN STATE
10370  031257        STA CSTAT
10371  140503  CNINN JSM ARNLO,I   TURN ON RUN LIGHT
                     *
10372  001232  CNINT LDA CFLAG     SEE IF RUN ALREADY DONE
10373  170702        RAR 3         POSITION RUN BIT 2
10374  172406        SAM CRUND     SKIP IF DONE
10375  140361        JSM AINTI,I   NOT DONE, STRIP EXEC STACK,
10376  140360        JSM ARSGT,I   RESET HI SPEED GTO/GSB'S
10377  000254        LDA P1        AND RESET HERE,WHERE
10400  031063        STA NPROG     SET FLAG FOR RLINK-CONTINUE INIT
10401  141533        JSM RLINK,I   ALLOW ROMS TO INIT
                     *
10402  001232  CRUND LDA CFLAG
10403  050160        AND M16       CLEAR BITS 0-3 OF CFLAG
10404  060143        IOR P4        SET RUN DONE BIT 2
10405  031232        STA CFLAG     RESTORE FLAGS
10406  170201        RET 1
                     *
                     *****************************************************
                     *
                     *
                     *      STEP KEY EXECUTION
                     *  IF RUN DONE BIT IS CLEARED, DOES A CONTINUE INIT ,
                     *                AND DISPLAYS LINE # 0
                     *  IF RUN HAS BEEN DONE, CHECKS STEP DONE BIT OF CFLAG
                     *  EXECUTES LINE INDICATED BY WHERE (SETS A BIT IN XCOMM
                     *  SO IT WILL STOP AT THE END OF THE LINE) ; IF BIT NOT
                     *  SET DISPLAYS LINE # INDICATED BY WHERE
                     *
                     *
                     *
                     *
10407  001232  STEPK LDA CFLAG     GET CONTROL FLAG
10410  170702        RAR 3         POSITION RUN FLAG (BIT 2)
10411  172022        SAP STEP1     "RUN" DONE ?
10412  073006        SLA STEP3     YES; STEP DONE BEFORE ?
10413  000052        LDA B200      YES; SET A STOP CONDITION
10414  031255        STA XCOMM     IN XCOMM
10415  043364        JSM CNINS     CONTINUE INIT
10416  005266        LDB WHERE     S/A OF LINE TO START EXECUTION
10417  067516        JMP EXCS2     START RUNNING THE PROGRAM
                     *
10420  005266  STEP3 LDB WHERE     GET ADDR OF NEXT LINE
10421  140523  STEP4 JSM AGLNO,I   AND FIND ITS LINE NO.
10422  140476  STEP2 JSM ATLNI,I   PLACE ITS NO. IN I/O BUFFER
```

CONTROL SUPERVISOR

```
10423  140475        JSM AEOPT,I   RESET EDIT PTRS
10424  000077        LDA COLLN     GET COLLON
10425  074550        PBD A,I       INCREM AND PLACE IN I/O BUFF
10426  140436        JSM AEPON,I   GO THRU PRINT ALL
10427  043402        JSM CRUND     SET CFLAG
10430  060133        IOR P12       SET STEP AND RUN FLAGS
10431  031232        STA CFLAG     UPDATE CONTROL FLAG
10432  064717        JMP STELM     SET EOL MODE AND RETURN P+1
                *
10433  043371  STEP1 JSM CNINN     CONTINUE INIT WITH RUN LIGHT ON
10434  004177        LDB P0
10435  035226        STB LNO       SET FOR LINE 0
10436  067422        JMP STEP2     DISP NEXT LINE NO. AND EXIT
                *
                *************************************************************************
                *
                *
                *      COMMAND EXECUTION
                *
                *      JUMP TO THE PROPER COMMAND ROUTINE IF
                *
                *      A COMMAND IS FOUND; OTHERWISE GO TO THE INTERPRETER
                *
                *
                *
10437  140435  EXCK JSM ATRBF,I   TRANSFER BUFFERS
10440  000177        LDA P0
10441  031316        STA CERR      CLEAR COMPILE ERROR FLAG
10442  031255        STA XCOMM     CLEAR XCOMM
10443  140503        JSM ARNLO,I   TURN ON RUN LIGHT
10444  140461        JSM APRKB,I   GO THROUGH PRINT=ALL,KBD BUFFER
10445  000327        LDA AROMS     ADDR OF OPTION ROM TABLE
10446  031712        STA T2        AND SAVE THE ADDR
10447  101712  EXCK3 LDA T2,I      GET ROM ADDR
10450  072417        SZA EXCK2     SKIP IF THE ROM IS NOT PRESENT
10451  010331        CPA AMAIN     END OF TABLE?
10452  067471        JMP EXCK4     EXIT LOOP IF SO
10453  020144        ADA P3        POINT TO COMMAND ENTRY
10454  100000        LDA A,I       GET ROM WORD
10455  010257        CPA M1        ENTRY PRESENT?
10456  067467        JMP EXCK2     NO; GO TO NEXT ROM
10457  031714        STA T4        SAVE S/A OF COMMAND TABLE
10460  172701        SAM *+1,S     POINT TO UPPER HALF
10461  043604        JSM CTFC      CHECK TABLE FOR COMMAND
10462  067467        JMP EXCK2     NOT FOUND
10463  174040        TCB           MAKE OPCODE NEGATIVE
10464  025714        ADB T4        B = EXECUTION ROUTINE ADDR POINTR
10465  176701        SBM *+1,S     SET INDIRECT
10466  164001        JMP B,I       GO TO THE ROUTINE
                *
10467  045712  EXCK2 ISZ T2        INC TABLE ADDR
10470  067447        JMP EXCK3     KEEP LOOKING
10471  000413  EXCK4 LDA ACNDT     ADDR OF MAIN FRAME COMMAND TABLE
10472  043604        JSM CTFC      CHECK TABLE FOR COMMAND
10473  067504        JMP EXCS1     NOT FOUND
                *
10474  174040        TCB           FOUND; MAKE OPCODE NEGATIVE
10475  026570        ADB ASCDI     B= EXECUTION ROUTINE ADDR POINTER
10476  164001        JMP B,I       GO TO THE ROUTINE
                *
                *       STATEMENT EXECUTION
                *
10477  001257  EXCST LDA CSTAT     GET STATE VARIABLE
                *
10500  010145        CPA P2        LIVE KBD EXECUTE?
10501  164457        JMP ALXKY,I   YES, USE LIVE KBD ROUTINES
                *
10502  140435        JSM ATRBF,I   TRANSFER LINE TO KBD BUFFER
10503  140461        JSM APRKB,I   YES, SO GO THROUGH PRINTALL,KBD BUF
                *
10504  140515  EXCS1 JSM ASTKI,I   STACK SYSTEM INFO
10505  001257        LDA CSTAT
10506  020254        ADA P1        STATES 0,2,4 BECOME
10507  031257        STA CSTAT     STATES 1,3,5
10510  000177        LDA P0        ALLOW IMPLIED STORAGE INTO RES REG
10511  031517        STA RGFLG
10512  043542        JSM EXCSS     COMPILE LINE, SET BRIDGES
10513  140503        JSM ARNLO,I   TURN ON RUN LIGHT
10514  001266        LDA WHERE     SAVE WHERE
10515  031317        STA SWHRE
10516  140364  EXCS2 JSM AINTK,I   GO TO INTERPRETER
10517  001257  EXCS4 LDA CSTAT     GET STATE VARIABLE
                *
10520  010143        CPA P4        DONE WITH PRE ENTER?
```

```
10521  170201             RET 1         YES, RETURN TO IDLE LOOP
                     *
                     *
10522  140411             JSM AXCMM,I   GO AND WORK ON XCOMM
10523  067526             JMP ERSTP     JCB COMPLETE OR STOP
10524  005266             LDB WHERE     XCOMM CLEAR; GET S/A OF NEXT OP
10525  067516             JMP EXCS2     RESUME INTERPRETER ACTION
                     *
10526  001257      ERSTP  LDA CSTAT     DON'T UNSTACK IF STATE # 2
10527  010145             CPA P2
10530  067534             JMP ERSS      STATE = 2 SO MUST BE A STOP CONDITION
10531  001317             LDA SWHRE     STATE #2 SO UNSTACK, RESTORE WHERE
10532  031266             STA WHERE
10533  066032             JMP EREX2     STATE #2 SO UNSTACK
                     *
10534  077003      ERSS   SLB STPPR     SKIP IF STP STMT OR END STMT
10535  043420             JSM STEP3     PUT LINE # IN DISPLAY
10536  066032             JMP EREX2     CHANGE STATE
                     *
10537  005266      STPPR  LDB WHERE     GET ADDR OF NEXT LINE
10540  140523             JSM AGLNO,I   FIND LINE NO.
10541  066032             JMP EREX2     CHANGE STATE
                     *
                     *
                     ************************************************************
                     *
                     *       COMPILE LINEAND CREATE LINE STRUCTURE
                     *
                     *    REDISPLAYS EDITBUFFER IF CURSOR IS SET
                     *            EXIT: B=COMPILE BUFF S/A
                     *
                     *
10542  001214      EXCSS  LDA CRSP      SEE IF CURSOR SET
10543  072406             SZA EXCSB     DON'T REDISPLAY IF NOT
10544  000177             LDA P0        STRIP CURSOR FROM DISPLAY
10545  031214             STA CRSP
10546  140432             JSM ADSPC,I   DISPLAY LINE WITHOUT CURSOR
10547  004155             LDB M11       WAIT 11MS FOR DISPLAY
10550  040633             JSM DELAY
                     *
10551  140452      EXCSB  JSM AEOLB,I   PUT EOL IN I/O BUFFER
10552  000214             LDA EOLB      GET EOL AND BLANK
10553  130311             STA AKBFL,I   STORE IN LAST WORD OF KEYBOARD BUFFER
10554  140346             JSM ACPLR,I   GO TO COMPILER
10555  140510             JSM AGLL,I    GET LENGTH OF LINE
10556  020254             ADA P1        INCLUDE END LINK
10557  020165             ADA M80       COMPILE BUFF = 80 W
10560  172404             SAM EXCK7     LENGTH < 80 W?
10561  072403             SZA EXCK7     NO; LENGTH = 80 W?
10562  140404      ERLLN  JSM AERR1,I   NO; LINE TOO LONG
10563  030070             ASC 1,08
                     *
10564  044016      EXCK7  ISZ C         ADJUST POINTER
10565  004016             LDB C         GET C-REG
10566  176002             SBP *+2       POINTR = NEW WORD ?
10567  074760             WBC A,D       YES; POINT TO PREVIOUS WORD
10570  001234             LDA TMP4      GET LINE LENGT
10571  170607             SAL 8         POSITION IN UPPER HALF
10572  070540             PWC A,I       INCRM AND STORE END LINK
10573  004016             LDB C         GET C-REG
10574  024254             ADB P1        POINT TO NEXT WORD
10575  034017             STB D         SET START DESTIN. ADDR
10576  004303             LDB ACBF      END SOURCE ADDR
10577  140467             JSM ANTHM,I   SHIFT INFO HIGHER  ONE WORD
10600  001234             LDA TMP4      GET LENGTH OF LINE
10601  130303             STA ACBF,I    CREATE FRONT LINK
10602  004303             LDB ACBF      COMPILE BUFF S/A
10603  170201             RET 1
                     *
                     ***********************************************************
                     *      CHECK TABLE FOR COMMAND
                     *
                     *      ENTRY: A=TABLE POINTER
                     *    ACTFC ENTRY-- B= BUFF S/A
                     *
                     *      EXIT:   RET P+1 NOT FOUND
                     *
                     *              RET P+2 FOUND
                     *
                     *              B=OPCODE
                     *
                     *
10604  004307      CTFC   LDB AKBFX     ADDR OF KBD BUFFER
10605  030017      CTFCB  STA D         SET TABLE PTR
```

```
10606  035227         STB TMP1     SET BUFFER START ADDR
10607  005227  CTFC7  LDB TMP1     GET BUFFER START ADDR
10610  035222         STB L        FOR "GNEXT"
10611  140501  CTFC6  JSM AGNXT,I  GET CHAR FROM I/O BUFF
10612  074571         WBD B,I      GET CHAR FROM TABLE
10613  174706         RBR 7        POSITION END OF ENTRY BIT
10614  077015         SLB CTFC2    END OF ENTRY?
10615  001713         LDA T3       YES; GET COMPARE FLAG
10616  072411         SZA CTFC1    COMMAND FOUND?
10617  174601         SBL 2       YES; DROP TWO FLAG BITS
10620  174512         SBR 11       DROP END OF ENTRY BIT
10621  001222         LDA L       GET "L", GNEXT, POINTR
10622  030016         STA C
10623  074760         WBC A,D      DUMMY WITHDRAW AND DECRM
10624  000016         LDA C        GET POINTR
10625  031222         STA L        UPDATE "L" POINTR
10626  170202         RET 2
               *
10627  176060  CTFC1  SBP CTFC7    END OF TABLE ?
10630  170201         RET 1        YES
               *
10631  174710  CTFC2  RBR 9       REPOSITION CHAR IN LOWER HALF
10632  010001         CPA B        CHARS COMPARE ?
10633  067644         JMP CTFC5    YES
10634  000177         LDA P0       NO
10635  031713         STA T3       CLEAR COMPARE FLAG
10636  074571  CTFC3  WBD B,I      GET NEXT CHAR
10637  174706         RBR 7        POSITION END OF ENTRY BIT
10640  077076         SLB CTFC3    IS THIS THE OPCODE?
10641  176402         SBM CTFC4    YES; END OF TABLE?
10642  067607         JMP CTFC7    NO; CONT SEARCH
10643  170201  CTFC4  RET 1
               *
10644  000254  CTFC5  LDA P1
10645  031713         STA T3       SET COMPARE FLAG
10646  067611         JMP CTFC6    CONT WITH SAME ENTRY
               *
               *
               *      MAIN FRAME COMMAND ADDRESSES
               *
               *
10647  023775         DEF 23775B   DEL LINE
10650  011321         DEF ECONT    CONTINUE
10651  023776         DEF 23776B   ERASE
10652  010674         DEF FETCH    FETCH LINE
10653  011337         DEF ERUX     RUN
               *
               *      MAIN FRAME COMMAND TABLE
               *
10654  000154  SCNDT  OCT 154      0L
10655  064563         OCT 64563    IS
10656  072206         OCT 72206    T OPCODE 6   LIST
               *
10657  063145  CNDT   DEC 26213    FE
10660  072143         DEC 29795    TC
10661  064202         DEC 26754    H OPCODE 2 - FETCH
10662  062562         DEC 25970    ER
10663  060563         DEC 24947    AS
10664  062603         DEC 25987    E OPCODE 3 - ERASE
10665  062145         DEC 25701    DE
10666  066205         DEC 27781    L OPCODE 5 - DEL
10667  071165         DEC 29301    RU
10670  067201         DEC 28289    N OPCODE 1 - RUN
10671  061557         DEC 25455    CO
10672  067164         DEC 28276    NT
10673  142000         OCT 142000   OPCODE 4 - CONT  (EOT)
               *
               ************************************************************
               *      FETCH ONE LINE OF PROGRAM
               *
               *
10674  043761  FETCH  JSM FLIN     FETCH LINE INITIALIZATION
10675  140501         JSM AGNXT,I  GET NEXT CHAR FROM I/O BUFF
10676  010053         CPA EOL      LINE NO. GIVEN ?
10677  067720         JMP FETC4    NO
10700  140507         JSM AINTC,I  GET INTEGER
10701  035226  FETC5  STB LNO      SET LINE NO.
10702  001232  FETC3  LDA CFLAG    CLR FETCH, SPECIAL KEY BITS FROM CFLAG
10703  050150         AND M4       BITS 0,1
10704  031232         STA CFLAG
10705  140512         JSM AFLAD,I  FIND LINE ADDR
10706  067715         JMP FETC2    LINE NOT FOUND
10707  004254  FTCHX  LDB P1
10710  035256         STB MODE     SET FETCH MODE
```

```
10711  005232          LDB CFLAG
10712  077301          SLB *+1,S      SET FETCH BIT OF CFLAG
10713  035232          STB CFLAG
10714  067722          JMP PLIRC      PLACE LINE NO. IN I/O BUFF
                *
10715  040717   FETC2  JSM STELM      SET MODE = A
10716  140514          JSM ASLLN,I    RESET LNO
10717  164452          JMP AEOLB,I    PUT EOL IN BUFFER
                *
10720  004177   FETC4  LDB P0         DEFAULT = LNO 0
10721  067701          JMP FETC5
                *
                ***********************************************************************
                *
                *     PLACE LINE NO.IN I/O BUFF AND REV. COMPILE
                *
                *          ENTRY: A = ADDR OF LINE
                *
                *          EXIT: REV. COMPILED LINE IN I/O BUFF
                *
                *
10722  104000   PLIRC  LDB A,I        GET LINE BRIDGE
10723  174610          SBL 9
10724  174510          SBR 9          GET LINE LENGTH
10725  072101          RIA *+1        POINT TO SECOND WORD OF LINE
10726  030016          STA C          SET C-REG
10727  024000          ADB A
10730  024146          ADB M2         B = END SOURCE ADDR
10731  000303          LDA ACBF       COMPILE BUFF S/A
10732  030017          STA D          SET D-REG
10733  140470          JSM AMTLM,I    MOVE THE LINE INTO COMPILE BUFF
10734  140476          JSM ATLNI,I    TRANSFER LINE NO. TO I/O BUFF
10735  000077          LDA COLLN      GET COLLON
10736  074550          PBD A,I        INCRM AND PLACE IN I/O BUFF
10737  000117          LDA B40        GET BLANK
10740  074550          PBD A,I        INCRM AND PLACE IN I/O BUFF
10741  004017          LDB D          GET CHAR POINTR AND PASS TO REV. COMP.
10742  164356          JMP ARCLR,I    REVERSE COMPILE AND RETURN P+1
                *
                ***********************************************************************
                *      UP-ARROW
                *
                *      DECREMENT THECURRENT "LNO" AND
                *
                *      FETCH THE CORRESPONDING LINE
                *
                *
10743  043761   UPAR   JSM FLIN       FETCH LINE INIT
10744  005226          LDB LNO        GET CURRENT LINE NO.
10745  001232          LDA CFLAG      SEE IF FETCH BIT SET
10746  073002          SLA FRSAR      SKIP IF FIRST UP ARROW
10747  024257          ADB M1         DECREMENT LNO
10750  176450   FRSAR  SBM FETC4      SET LNO = 0 IF = -1
10751  035226          STB LNO        SET LINE COUNTER
10752  140512          JSM AFLAD,I    FIND S/A OF LINE
10753  140514          JSM ASLLN,I    LINE NOT FOUND SET LNO TO LAST LINE#
10754  067702          JMP FETC3      FETCH LINE
                *
                *
                *      DOWN-ARROW
                *
                *      INCREMENT THECURRENT "LNO" AND
                *
                *      FETCH THE CORRESPONDING LINE
                *
                *
10755  043761   DNAR   JSM FLIN       FETCH LINE INIT
10756  045226          ISZ LNO        INCREM LINE NO.
10757  067760          JMP *+1
10760  067702          JMP FETC3      FETCH LINE
                *
                *
                *       FETCH LINE INITIALIZATION
                *
                *          EXIT :   A=FWUP POINTER
                *
                *
10761  040724   FLIN   JSM SECCK      SEE IF PROGRAM IS SECURE
10762  140453          JSM ACLCM,I    CLEAR COMPILE BUFFER
10763  164475          JMP AEDPT,I    RESET EDIT POINTERS
                *
                *
                ***********************************************************************
                *  STOP, REW IN ENTER OR LIVE KBD
```

CONTROL SUPERVISOR

```
                       *
                       *
10764  001235  PINEN LDA SKEY       GET KEYCODE
10765  010145        CPA P2         REWIND ?
10766  164601        JMP ARFK,I     YES, REWIND AND RETURN
                       *
10767  172701        SAM *+1,S      SET BIT 15 (INTERRUPTING KEY)
10770  040744        JSM SXCMM      IOR TO PRESENT XCOMM
10771  004132        LDB P13        SET FLAG 13
10772  140376        JSM ASFG,I
10773  140452        JSM AEOLB,I    CLR I/O BUFF, PUT EOL IN BUFF
10774  140503        JSM ARNLO,I    TURN ON RUN LIGHT
10775  066262        JMP XEN5       ABORT ENTER STMT
                       *
                       *
                       *     REJECTION ROUTINE FOR INTERRUPT THAT
                       *
                       *         DOES NOTHAVE A CORRECT INTRP. TABLE ENTRY
                       *
                       *
10776  140404  REJR  JSM AERR1,I  ILLEGAL INTERRUPT
10777  030061        ASC 1,01
                       *
                       *
                       *     ERROR MESSAGEGENERATOR WITHOUT RETURN
                       *
                       *     CALL SEQUENCE:  JSM AERR1,I
                       *
                       *                     ASC 1,XX WHERE XX=ERROR CODE
                       *
                       *     EXIT:           "ERROR XX" IN DISP BUFFER
                       *
                       *                     "JSM" STACK IS RESET
                       *
                       *
                       *
11000  070420  ERR1  EIR            ENABLE ALL INTERRUPTS
11001  141260        JSM ERRBP,I    GO THRU ERROR BYPASS LINK
11002  040717  EREXT JSM STELM      SET EOL MODE
11003  040703        JSM BEEP       GIVE ERROR BEEP
11004  042043        JSM EREX3      PUT LINE NO. IN DISPLAY   MAYBE
11005  000177  EREXX LDA P0         CLEAR RENUMBER FLAG,REWIND KEY FLAG
11006  031613        STA RENFG
11007  001067        LDA IBUFF+3    GET ERROR "XX"
11010  012566        CPA PRPRB      NO PRINTER OR NO PAPER ?
11011  066013        JMP EREX1      YES! BYPASS PRINT-ALL
11012  140436        JSM AEPON,I    GO THRU PRINT ALL
11013  001257  EREX1 LDA CSTAT      GET STATE VARIABLE
11014  010144        CPA P3         GO TO LIVE KBD ERROR PROCESSING IF
11015  164456        JMP ALXER,I    STATE = 3 OR 6
11016  010141        CPA P6
11017  164456        JMP ALXER,I
11020  042032        JSM EREX2        CHANGE STATE
                       *
11021  001257  EREX4 LDA CSTAT      GET CONTROL STATE
11022  010143        CPA P4         IF STATE = 4 THEN DON'T STRIP EXEC
11023  066026        JMP ERNOS
11024  001261        LDA AP3        SET AP1 BACK TO AP3
11025  031263  ERENT STA AP1
                       *
11026  000300  ERNOS LDA AJSTK      JSM STACK S/A-1
11027  030003        STA R          RESET JSM STACK PTR
11030  140433        JSM ALDSP,I    DISP ERROR MESSAGE
11031  165511        JMP MLBPL,I    GO TO IDLE(THRU MAIN BYPASS LINK)
                       *************************************************************
                       *
                       * EREX2  UNSTACKS AP1,AP3,  AND CHANGES STATE
                       *        1,3,5 TO 0,2,4   !     2  TO 0
                       *                DOES NOT UNSTACK IF STATE = 0,2,4
                       *
                       *************************
                       *
11032  001257  EREX2 LDA CSTAT      GET STATE VARIABLE
11033  073004        SLA EREX5      DO NOT UNSTACK IF = 0,2, OR 4
11034  020257        ADA M1         MAKE 1,3,5 = 0,2,4
11035  031257        STA CSTAT      RESTORE NEW STATE
11036  164516        JMP AREST,I    UNSTACK
                       *
11037  010145  EREX5 CPA P2         STATE = 2?
11040  000177  CLRST LDA P0         MAKE STATE = 0
11041  031257        STA CSTAT
11042  170201  ERNON RET 1
                       *
                       *************************************************************
```

CONTROL SUPERVISOR

```
                        *
                        * EREX3  PUTS "IN LINE #" IN I/O BUFFER IF STATE = 2 OR 6
                        *        OR IF THE RENUMBER GTO/GSB FLAG IS SET
                        *
                        ************************
11043  001257  EREX3 LDA CSTAT    GET STATE VARIABLE
11044  010145        CPA P2       RUNNING PROGRAM?
11045  066052        JMP ELNO     YES, DSP LINE #
11046  010141        CPA P6       RUN PROG FROM LIVE KBD?
11047  066052        JMP ELNO     YES, DSP LINE #
11050  001613        LDA RENFG    RENUMBERING GTO'S AND GSB'S?
11051  073071        SLA ERNON    SKIP IF NOT
                        *
11052  002574  ELNO  LDA AELN1    GET "IN" MEAASGE
11053  031070        STA IBUFF+4
11054  002575        LDA AELN2    PUT IN I/O BUFFER
11055  031071        STA IBUFF+5
11056  005265        LDB HERE     GET CURRENT LINE ADDR
11057  140523        JSM AGLNO,I
11060  001307        LDA FWUP     SET S/A OF NEXT LINE TO BE THE FIRST LINE
11061  031266        STA WHERE    SET FOR CONTINUE ROUTINES
11062  006572        LDB AINLM    PTR FOR LINE NUMBER
11063  001226        LDA LNO      SET FOR ABTDA
11064  164477        JMP ABTDA,I  PLACE LINE NO. IN I/O BUFF
                        *
                        ********************************************************
                        *
                        *  SYSTEM ERROR
                        *
                        ******************
                        *
11065  042000  SYSER JSM ERR1
11066  030060        ASC 1,00
                        *
                        ************************************************************
                        *       ERROR MESSAGEGENERATOR WITH RETURN
                        *
                        *       CALL SEQUENCE:  JSM AERR2,I
                        *
                        *                            ASC 1,XX WHERE XX=ERROR CODE
                        *
                        *       EXIT:           "ERROR XX" IN DISP BUFFR
                        *
                        *                       RET P+2
                        *
                        *
11067  070420  ERR2  EIR          ENABLE INTERRUPTS
11070  141260        JSM ERRBP,I  PUT ERROR # IN I/O BUFFER
11071  170201        RET 1        RET 2
                        *
                        *
                        *        PLACE ERROR MESSAGE IN I/O BUFF
                        *
                        *
11072  140451  PEMIO JSM ACLEB,I  CLEAR I/ BUFFER
11073  002573        LDA AERMS    GET "ERROR" ADDR
11074  004313        LDB AIBUF    I/O BUFF S/A
11075  071403        XFR 4        TRANSFER "ERROR" TO I/O BUFF
11076  000003        LDA R        GET R-STACK-POINTR
11077  020257        ADA M1       POINT TO "JSM AERRX" ENTRY IN STACK
11100  144000        ISZ A,I      POINT TO MESSAGE "XX" ADDR
11101  100000        LDA A,I      GET MESSAGE ADDR
11102  100000        LDA A,I      GET MESSAGE "XX" AND
11103  031067        STA IBUFF+3  STORE IN I/O BUFF
11104  170201        RET 1
                        *
                        *
                        *
                        *        ENTER STATEMENT EXECUTION
                        *
                        *                 PRE-ENTER
                        *
                        *
11105  000143  XEN0  LDA P4       SET ENTER STATE
11106  031257        STA CSTAT
11107  004244        LDB XMASK    CLEAR LIVE KBD BIT FROM XCOMM
11110  040740        JSM CLXCM
11111  031630        STA SVXCM
11112  000177        LDA P0       START WITH A CLEAR XCOMM
11113  031255        STA XCOMM
                        *
11114  040717  XENN  JSM STELM    SET EOL MODE
11115  140475        JSM AEDPT,I  RESET EDIT POINTERS
                        *
```

CONTROL SUPERVISOR

```
11116  001272        LDA FAP1
11117  104000        LDB A,I       LOOK AT NEXT PARAMETER
11120  174514        SBR 13
11121  014145        CPB P2        IS IT A STRING CONSTANT ?
11122  066133        JMP XEN1      YES
11123  014141        CPB P6        IS IT A STRING VARIABLE ?
11124  066173        JMP XEN9
                *
11125  005272        LDB FAP1      IT MUST BE NUMERIC
11126  040616        JSM ABSAD+1
11127  140377        JSM AGNAM,I   GET THE NAME
11130  000074  XEN8  LDA B77
11131  074550        PBD A,I       OUTPUT "?"
11132  066156        JMP XEN2
                *
11133  020144  XEN1  ADA P3
11134  104000        LDB A,I       GET LENGTH OF STRING CONSTANT
11135  076412        SZB XEN6      SKIP IF NULL STRING
11136  140451        JSM ACLEB,I   CLEAR I/O BUFFER
11137  001272        LDA FAP1
11140  020144        ADA P3
11141  104000        LDB A,I       B = LENGTH
11142  020254        ADA P1        A = SOURCE PTR
11143  172301        SAP *+1,S
11144  030017        STA D
11145  000315        LDA AIBFM     GET DESTINATION POINTR
11146  140502        JSM ATCHR,I   TRANSFER TO I/O BUFFER
11147  000254  XEN6  LDA P1
11150  140607        JSM ABUMP,I   SKIP PAST STRING CONSTANT
11151  000000        NOP
11152  105272        LDB FAP1,I    SEE IF NEXT PARAM IS A STRING VAR
11153  174514        SBR 13
11154  014141        CPB P6
11155  066174        JMP XEN15     YES, SO SET STRING ENTER FLAG
                *
11156  000177  XEN2  LDA P0        CLEAR STRING ENTER FLAG
11157  031326        STA STEFL
11160  001272  XEN3  LDA FAP1      SAVE FAP1,HERE
11161  031625        STA ENSV+1
11162  001265        LDA HERE
11163  031626        STA ENSV+2
11164  001267        LDA TRACE     SAVE TRACE FLAG
11165  031627        STA ENSV+3
11166  001232  XENPP LDA CFLAG     GET CONTROL FLAG
11167  170704        RAR 5         POSITION ENTER/PRINT FLAG BIT 4
11170  172002        SAP *+2       ENTER/PRINT?
11171  164437        JMP AEPNX,I   YES, PRINT PROMPT, RETURN P+1
11172  164436        JMP AEPON,I   NO, GO THROUGH PRINT-ALL
                *
11173  141322  XEN9  JSM STENT,I   GO TO STRING BLOCK FOR PROMPT
11174  000254  XEN15 LDA P1        SET STRING ENTER FLAG
11175  031326        STA STEFL
11176  066160        JMP XEN3
                *
                *           POST-ENTER
                *
                *
11177  001257  CONEN LDA CSTAT     IGNORE KEY IF LIVE KBD
11200  010145        CPA P2
11201  066552        JMP BBEEP     LIVE KBD SO BEEP AND IGNORE
11202  001506        LDA FLAGS     CLEAR FLAG 13
11203  050151        AND M5
11204  031506        STA FLAGS
11205  005256        LDB MODE      SEE IF NOTHING ENTERED
11206  035233        STB TMP7      SAVE MODE
11207  014143        CPB P4        NOTHING IF MODE = 4
11210  140451        JSM ACLEB,I   CLEAR I/O BUFFER
11211  040715        JSM CLMOD     SET MODE = 0 SO I/O BUFFER IS COMP
11212  140503        JSM ARNLO,I   TURN ON RUN LIGHT
11213  140435        JSM ATRBF,I   TRANSFER LINE TO KBD BUFFER
11214  042166        JSM XENPP     SEE IF ENTER-PRINT
11215  001326        LDA STEFL     GET STRING ENTER FLAG
11216  010254        CPA P1        STRING ENTER?
11217  066274        JMP XEN10     YES
                *
11220  000257        LDA M1        FLAG THE ENTER REGISTER
11221  031476        STA ENR
11222  031517        STA RGFLG     DISABLE IMPLIED STORAGE INTO RES
11223  140515        JSM ASTKI,I   STACK SYSTEM INFO
11224  000142        LDA P5        SET STATE = 5
11225  031257        STA CSTAT
11226  043542        JSM EXCSS     COMPILE LINE, SET LINE BRIDGES
11227  140364  XENLP JSM AINTK,I   GO TO INTERPRETER
11230  140411        JSM AXCMM,I   SERVICE XCOMM
```

CONTROL SUPERVISOR

```
11231  066234        JMP *+3      RET1 STOP CONDITION
11232  005266        LDB WHERE    RET2 XCOMM SERVICED, CONTINUE EXEC
11233  066227        JMP XENLP
11234  140516        JSM AREST,I  UNSTACK SYSTEM INFO
11235  000143        LDA P4       SET STATE BACK TO 4
11236  031257        STA CSTAT
11237  042303        JSM RESPN    RESTORE FAP1
11240  005476        LDB ENR      CHECK ENR REGISTER
11241  014257        CPB M1
11242  066255        JMP XEN4     JUMP IF NOTHING ENTERED
               *
11243  005272        LDB FAP1     "TO" ADDRESS
11244  040616        JSM ABSAD+1
11245  000341        LDA AENR     "FROM" ADDRESS
11246  140372        JSM AASTR,I  GO TRACE ASSIGNMENT
11247  042303  XEN11 JSM RESPN    RESTORE FAP1,HERE
11250  000254        LDA P1
11251  140607        JSM ABUMP,I  ADVANCE TO NEXT PARAMETER
11252  066260        JMP XEN55    END OF LIST
11253  066114        JMP XENN
               *
11254  140452  XEN19 JSM AEOLB,I  PUT EOL IN I/O BUFFER
11255  004132  XEN4  LDB P13      SET FLAG 13
11256  140376        JSM ASFG,I
11257  066247        JMP XEN11
               *
11260  000177  XEN55 LDA P0       CLEAR STOP KEY CODE
11261  031206        STA .WKC
11262  001630  XEN5  LDA SVXCM    RESTORE XCOMM
11263  040744        JSM SXCMM    IOR NEW XCOMM TO OLD XCOMM
11264  140433        JSM ALDSP,I  DISPLAY I/O BUFFER
11265  001624        LDA ENSV
11266  030016        STA C        RESTORE C
11267  042303        JSM RESPN    RESTORE HERE
11270  000145        LDA P2       SET RUN STATE
11271  031257        STA CSTAT
11272  140365        JSM AINTX,I  BACK TO INTERPRETER
11273  067517        JMP EXCS4    BACK TO NORMAL INTERPRETER CALLING LOOP
               *
11274  001233  XEN10 LDA TMP7     GET OLD MODE
11275  010143        CPA P4       NOTHING ENTERED?
11276  066254        JMP XEN19    SET FLAG 13 IF SO
11277  042303        JSM RESPN    RESTORE FAP1
11300  141323        JSM STEAS,I  GO TO STRING ROM FOR ASSIGNMENT
11301  140452        JSM AEOLB,I  PUT EOL IN I/O BUFFER
11302  066247        JMP XEN11    ADVANCE TO NEXT PARAMETER
               *
               *
               *       RESTORE POINTERS
               *
               *
11303  001626  RESPN LDA ENSV+2
11304  031265        STA HERE     RESTORE HERE
11305  001625        LDA ENSV+1
11306  031272        STA FAP1     RESTORE FAP1
11307  001627        LDA ENSV+3
11310  031267        STA TRACE
11311  170201        RET 1
               *
               ***************************************************************
               *       EXECUTION OF CONTINUE
               *
               *
               *
               *       "ECIM" IS THEIMMEDIATE EXECUTE ENTRY
               *
11312  043364  ECIM  JSM CNINS    CONTINUE INIT
11313  005266        LDB WHERE    GET S/A OF NEXT LINE
11314  035227        STB TMP1     AND SAVE IT
               *
11315  000177  ECON3 LDA P0       CLEAR XCOMM
11316  031255        STA XCOMM
11317  005227        LDB TMP1     RECALL S/A OF LINE
11320  067516        JMP EXCS2    GO TO MAIN RUN LOOP
               *
               *  CONTINUE COMMAND(FROM A SPECIFIED LINE)
               *
11321  042344  ECONT JSM ERN.X    CHECK FOR LINE NO. GIVEN
11322  066312        JMP ECIM     NO LINE # GIVEN
11323  043364        JSM CNINS    CONTINUE INIT
11324  066315        JMP ECON3
               *
               *
               *      EXECUTION OFRUN COMMAND
```

```
                       *
                       *
                       *
                       *    "ERUN" IS THE IMMEDIATE EXECUTE ENTRY
                       *
11325  005307  ERUN   LDB FWUP      GET S/A OF USER PROG
11326  035227         STB TMP1      AND SAVE IT
11327  140503  ERUN1  JSM ARNLO,I   TURN ON RUN LIGHT
11330  040717         JSM STELM     SET MODE =4
11331  140452         JSM AEOLB,I   CLR DISPLAY
11332  140433         JSM ALDSP,I
11333  000145         LDA P2        SET RUN STATE
11334  031257         STA CSTAT
11335  042400         JSM RUNSB     RUN INIT
11336  066315         JMP ECON3
                       *
                       *  RUN COMMAND (FROM A SPECIFIED LINE)
                       *
11337  005307  ERUX   LDB FWUP      GET FIRST WORD OF USER PROGRAM
11340  035227         STB TMP1      AND SAVE IT
11341  042344         JSM ERN,X     CHECK FOR LINE NO. GIVEN
11342  066327         JMP ERUN1
11343  066327         JMP ERUN1     RET 2  LINE # GIVEN
                       *
                       *
                       *
                       *      GET LINE NO. (IF GIVEN) AND S/A OF LINE
                       *
                       *  EXIT  :  RET 1  LINE # OR LABEL NOT GIVEN
                       *           RET 2  S/A OF LINE IN TMP1
                       *
                       *
11344  140501  ERN,X  JSM AGNXT,I   GET NEXT CHARACTER FROM I/O BUFFER
11345  010053         CPA EOL       START LINE GIVEN ?
11346  170201         RET 1         NO
11347  010116         CPA B42       QUOTE?
11350  066357         JMP ERLBL     LABEL IF SO
                       *
11351  140507  ERUX1  JSM AINTC,I   BUILD A BINARY NUMBER
11352  035233         STB TMP7      AND SAVE IT
11353  140513         JSM AFLNA,I   FIND S/A OF LINE GIVEN
11354  064722         JMP ERLNF     LINE NOT FOUND
11355  031227  ERADR  STA TMP1      SAVE S/A OF LINE
11356  170202         RET 2
                       *
11357  000214  ERLBL  LDA EOLB      PUT EOL IN I/O BUFFER
11360  130311         STA AKBFL,I
11361  074760         WBC A,D       DUMMY WITHDRAW TO DEC C
11362  000016         LDA C         SET PTR IN CASE OF AN ERROR
11363  031241         STA OLDC
11364  074560         WBC A,I       SET C BACK TO FIRST CHAR
11365  140353         JSM ALBLN,I   FIND LABEL LENGTH
11366  000303         LDA ACBF      COMPILE LABEL IN COMPILE BUFFER
11367  030017         STA D         SET PTR
11370  140354         JSM ALBCM,I   COMPILE LABEL
11371  000303         LDA ACBF
11372  020254         ADA P1        PT TO START OF COMPILED LABEL
11373  030016         STA C         SET PTR
11374  074560         WBC A,I       GET LENGTH OF LABEL
11375  140400         JSM ACLBL,I   GET S/A OF LINE IN B
11376  035227         STB TMP1      SET START ADDRESS
11377  170202         RET 2
                       *
                       *
                       *      RUN COMMAND SUBR.
                       *
                       *
                       *
11400  140472  RUNSB  JSM AERAV,I   ERASE VARIABLES,RESET EXECUTION STACK
11401  140360         JSM ARSGT,I   RESET HISPEED GTO/GSB'S
11402  043402         JSM CRUND     SET CFLAG
11403  000177         LDA P0
11404  031063         STA NPROG     SET FOR RLINK  RUN INIT
11405  165533         JMP RLINK,I   GO THRU LINK FOR OPTION BLOCKS
                       *
                       ****************************************************
                       *
                       *
                       *      "XCOMM" MANAGEMENT
                       *
                       *         PROCESS INTERRUPTING KEYS
                       *
                       *         DIRECT OPTION BLOCK INTERRUPTS AND
                       *
```

```
                        *         LIVE KEYBORAD ACTIVITY
                        *
                        *             EXIT: RET P+1     STOP STATEMENT
                        *
                        *                       RET P+2     XCOMM ALL CLEAR
                        *
                        *
11406  001255  ERUN7 LDA XCOMM    GET INTERPRETER FLAG
11407  172402        SAM *+2      INTERRUPTING KEY ?
11410  066432        JMP ERUN6    NO
11411  170500        SAR 1        POSITION REW BIT
11412  073010        SLA ERUN2    IF CLEAR THEN MUST BE STOP KEY
11413  140601        JSM ARFK,I   REWIND THE TAPE
11414  070430        DIR          DISABLE INTERRUPTS
11415  001255        LDA XCOMM    SEE IF STOP KEY ALSO
11416  073404        RLA ERUN2    SKIP IF BIT 0 SET, STOP KEY CODE
11417  004211        LDB BXCAA    SAVE BITS 5 TO 14
11420  040740        JSM CLXCM
11421  066406        JMP ERUN7    CHECK XCOMM AGAIN
                        *
11422  004254  ERUN2 LDB P1       SET STOP KEY INDICATOR
11423  070430  ERNX1 DIR
11424  001255        LDA XCOMM    SAVE ONLY BIT 13 OF XCOMM
11425  050227        AND B20K
11426  031255        STA XCOMM
11427  070420        EIR
11430  140475        JSM AEDPT,I  RESET EDIT PTRS
11431  064717        JMP STELM    SET MODE = 4 AND RETURN
                        *
11432  170600  ERUN6 SAL 1        POSITION BIT 14
11433  172003        SAP ERUN8    SKIP IF NOT LIVE KEYBOARD
11434  140455        JSM ALKEX,I  LIVE KEYBOARD EXECUTION
11435  066406        JMP ERUN7    CHECK XCOMM AGAIN
                        *
11436  170600  ERUN8 SAL 1        POSITION BIT 13
11437  172003        SAP ERUN9    SKIP IF NOT INTERRUPT SERV. ROUTINE
11440  141510        JSM .IOSR,I  GIVE CONTROL TO SYSTEM I/O ROM
11441  066406        JMP ERUN7    CHECK XCOMM AGAIN
                        *
11442  072002  ERUN9 RZA *+2      SKIP IF XCOMM NOT CLEAR
11443  170202        RET 2
                        *
11444  001255        LDA XCOMM    SEE IF NEW HIGHER ORDER BITS WERE SET
11445  170507        SAR 8        GET BITS 8-15
11446  072040        RZA ERUN7    BITS SET, SERVICE THEM
                        *
11447  005255        LDB XCOMM    POSITION BIT 7 FOR RETURN
11450  174706        RBR 7
11451  066423        JMP ERNX1
                        *
                        *
                        ****************************************************************
                        *
                        *      ROUTINE TO REPLACE - STORE KEYCODES
                        *
                        *    IN THE EDIT BUFF AREA
                        *
                        *           ENTRY: COD   N "SKEY"
                        *
                        *         EXIT:
                        *
                        *                  B=I/O CURRENT POINTR
                        *
                        *                    RET P+1 EDIT BUFF FULL: CHAR NOT STORED
                        *
                        *                  RET P+2   CHAR STORED
                        *
                        *                              AND "IOCP" POINTER INCREMENTED
                        *
                        *
11452  001235  ISTOR LDA SKEY     GET CODE
11453  031715  ISTOX STA T5       SAVE CODE
11454  005213        LDB OLCP     GET OLD CURRENT POINTR
11455  014257        CPB M1       FORWARD CURSOR PASS MADE ?
11456  045213        ISZ OLCP     YES: SET OLCP = 0
11457  066460        JMP *+1
11460  005215        LDB IOCP     GET I/O BUFF CURRENT PTR
11461  042535        JSM CKFUL    SEE IF BUFFER IS FULL
11462  064703        JMP BEEP     BEEP AND RETURN IF BUFF IS FULL
11463  005214  IST02 LDB CRSP     GET CURSOR POINTR
11464  176421        SRM IST05    SKIP IF INSERT CURSOR SET
11465  005215  IST06 LDB IOCP     NO: GET I/O BUFF CURRENT POINTR
11466  034016        STB C        SET C-REG
11467  074540        PRC A,I      INCRM POINTR AND STORE CODE
11470  004016        LDB C
```

CONTROL SUPERVISOR

```
11471  035215        STB IOCP     UPDATE POINTR
11472  015213        CPB OLCP     "IOCP" = PREVIOUS CURRENT POINTR?
11473  066531        JMP IST04    YES
11474  005214        LDB CRSP     GET CURSOR POINTR
11475  001214        LDA CRSP     GET CURSOR POINTR
11476  072403        SZA IST03    SKIP IF CURSOR NOT SET
11477  050074        AND B77      SAVE CURSOR COUNT
11500  011512        CPA DLEN     CURSOR AT LAST DISP POSITION ?
11501  170202  IST03 RET 2        YES! DO NOT INCRM
               *
11502  076101        RIB *+1      MOVE CURSOR TO NEXT CHAR
11503  035214        STB CRSP     UPDATE CURSOR POINTR
11504  170202        RET 2
               *
11505  005213  IST05 LDB OLCP     GET OLD CURRENT POINTER
11506  042535        JSM CKFUL    SEE IF BUFFER IS FULL
11507  064703        JMP BEEP     RETURN AND BEEP IF BUFFER IS FULL
11510  015215        CPB IOCP     OLCP = IOCP ?
11511  066526        JMP IST08    YES
11512  034016        STB C        SET SOURCE POINTR
11513  034017        STB D        SET DESTINATION POINTR
11514  074571        WBD B,I
11515  004017        LDB D        GET OLCP+1
11516  035213        STB OLCP     UPDATE OLD CURRENT POINTR
11517  074571        WBD B,I      D = OLCP + 2
11520  074761  IST07 WBC B,D      GET BYTE AND DECRM
11521  074751        PBD B,D      DECRM AND PLACE BYTE
11522  004016        LDB C        GET SOURCE POINTR
11523  015215        CPB IOCP     ALL CHARS BETWEEN IOCP AND
11524  066465        JMP IST06    OLCP SHIFTED RIGHT ONCE ?
11525  066520        JMP IST07    NO! CONT TRANSFER
               *
11526  042531  IST08 JSM IST04    RESET "CRSP" AND "OLCP"
11527  066530        JMP *+1
11530  066465        JMP IST06    STORE CHAR IN I/O BUFF
               *
11531  004177  IST04 LDB P0
11532  035214        STB CRSP     CLEAR CURSOR POINTR
11533  035213        STB OLCP     CLEAR PREVIOUS CURRENT POINTR
11534  170202        RET 2
               *
               ******************
               *
               *  CKFUL  SERVICE ROUTINE THAT CHECKS THE EDIT BUFFER
               *         TO SEE IF THIS CHAR IS THE BEEP CHAR
               *         OR IF THE BUFFER IS FULL   RET 1 IF FULL
               *         BEEPS IF THIS IS THE BEEP CHAR
               *        IF BUFF IS NOT FULL RET2 WITH T5 IN A
               *        DOES NOT DESTROY B
               *
               ***************
               *
11535  035236  CKFUL STB TMP8     SAVE ADDRESS
11536  001353        LDA AEBFL
11537  020257        ADA M1       LAST ALLOWED CHAR ADDRESS
11540  140362        JSM AFBAD,I  SEE IF BUFFER FULL
11541  172010        SAP ISRET    FULL IF RESULT IS POSITIVE
11542  001353        LDA AEBFL    GET BEEP CHAR ADDR
11543  020154        ADA M8
11544  005236        LDB TMP8     GET CHAR ADDR AGAIN
11545  014000        CPB A
11546  040703        JSM BEEP     YES
11547  001715        LDA T5       NO
11550  170202        RET 2        TAKE BUFF NOT FULL RETURN
11551  170201  ISRET RET 1
               *
               ******************
               *
11552  040703  BBEEP JSM BEEP     IGNORE THIS KEY
11553  170202  BACEL RET 2        DON'T DISPLAY I/O BUFFER
               *
               *
               *
               ************************************************************
               *
               *  UP OR DOWN ARROWIN LIVE KBD
11554  000143  WTLKB LDA P4
11555  011257        CPA CSTAT    BEEP IF ENTER
11556  066552        JMP BBEEP    ENTER SO BEEP AND RETURN
11557  011256        CPA MODE
11560  170202        RET 2
11561  140432        JSM ADSPC,I  DUMMY DISPLAY
11562  140432        JSM ADSPC,I  DISPLAY BUFFER
11563  006577        LDB M800     WAIT 800 MS
```

```
11564  040633        JSM DELAY
11565  170202        RET 2
                *
                ****************************************************************
                *
                *   CONSTANTS
                *
11566  030465  PRPRB OCT 30465     ASCII 15
11567  077457  LITAD DEF ITABL+15 LAST ENTRY IN INTERRUPT TABLE
11570  110654  ASCOI DEF SCNDT+1  COMMAND TABLE ADDR
11571  000163  P115  DEC 115
11572  077071  AINLM DEF IBUFF+5  START ADDR FOR LINE NUMBER OF ERROR
11573  000271  AERMS DEF LKERM    PTR TO LOWER CASE "ERROR"
11574  020151  AELN1 OCT 20151    BLANK I
11575  067040  AELN2 OCT 67040    N BLANK
11576  022000  ASYSM DEF 22000B   STOP ADDR OF ROM SEARCH
11577  176340  M800  DEC -800
                *
                ****************************************************************
                *
                *     THIS TABLE CONTAINS THE ADDRESS OF THE
                *
                *     PROCESSING ROUTINES
                *
                *            MODE = 0 KEYBOARD ENTRY
                *
                *                  1 FETCH
                *
                *                  2 EDIT
                *
                *               3   NEVER
                *
                *                  4 END OF LINE
                *
                *
                *    BSS 'S TO BE FILLED IN BY THE 12K AND 22K PAGES
                *
                *
11613                 ORG 11613B
11613  111607  .ATBL DEF .TB3-5+I       TABLE BASE - 5  (FIRST CN = 1)
                *
                *         EXECUTE (1)
                *
11614  010437  .TB3  DEF EXCK
11615  010317        DEF ERILO
11616  010437        DEF EXCK
11617  010477        DEF EXCST
11620  010437        DEF EXCK
                *
                *         STORE    (2)
                *
11621                BSS 1
11622  010317        DEF ERILO
11623                BSS 1
11624  011552        DEF BBEEP
11625                BSS 1
                *
                *      INSERT/REPLACE CHAR (3)
                *
11626                BSS 3
11631  000000        DEF 0
11632  011553        DEF BACEL
                *
                *         CLEAR    (4)
                *
11633                BSS 5
                *
                *       DELETE CHAR (5)
                *
11640                BSS 3
11643  000000        DEF 0
11644  011553        DEF BACEL
                *
                *         STEP    (6)
                *
11645  010407        DEF STEPK
11646  010407        DEF STEPK
11647  010407        DEF STEPK
11650  011552        DEF BBEEP
11651  010407        DEF STEPK
                *
                *          RIGHT ARROW (7)
                *
11652                BSS 3
```

CONTROL SUPERVISOR

```
11655   000000          DEF 0
11656                   BSS 1
                *
                *          LEFT ARROW (10)
                *
11657                   BSS 3
11662   000000          DEF 0
11663                   BSS 1
                *
                *       DOWN-ARROW  (11)
                *
11664   010755          DEF DNAR
11665   010755          DEF DNAR
11666   010755          DEF DNAR
11667   011554          DEF WTLKB
11670   010755          DEF DNAR
                *
                *          RECALL ( 12 )
                *
11671                   BSS 3
11674   000000          DEF 0        SHOLUD BE BSS 1!!!!!!!!!!!!!!!!!!!
11675                   BSS 1
                *
                *          PROGRAMMABLE (13)
                *
11676   010323          DEF P02
11677   010321          DEF PEOL
11700   010323          DEF P02
11701   000000          DEF 0
11702   010321          DEF PEOL
                *
                *       UP-ARROW (14)
                *
11703   010743          DEF UPAR
11704   010743          DEF UPAR
11705   010743          DEF UPAR
11706   011554          DEF WTLKB
11707   010743          DEF UPAR
                *
                *       BACK  (15)
                *
11710                   BSS 3
11713   000000          DEF 0
11714   011553          DEF BACEL
                *
                *       FORWARD  (16)
                *
11715                   BSS 3
11720   000000          DEF 0
11721   011553          DEF BACEL
                *
                *       PROG. INTERRUPTING KEYS (17)
                *
11722                   BSS 3
11725   010764          DEF PINEN
11726                   BSS 1
                *
                *         TYPING-AIDS  (20)
                *
11727                   BSS 5
                *
                *       SPECIAL KEYS  (21)
                *
11734                   BSS 5
                *
                *         PRINT ALL  (22)
                *
11741   010326          DEF PALL
11742   010326          DEF PALL
11743   010326          DEF PALL
11744   000000          DEF 0
11745   010326          DEF PALL
                *
                *       LINE INSERT  (23)
                *
11746                   BSS 1
11747   010317          DEF ERILO
11750                   BSS 1
11751   011552          DEF BBEEP
11752                   BSS 1
                *
                *         RUN  (24)
                *
11753   011325          DEF ERUN
11754   011325          DEF ERUN
```

CONTROL SUPERVISOR

```
03646000 11755  011325         DEF ERUN
03647000 11756  011552         DEF BBEEP
03648000 11757  011325         DEF ERUN
03649000                *
03650000                *      CONTINUE (25)
03651000                *
03652000 11760  011312         DEF ECIM
03653000 11761  011312         DEF ECIM
03654000 11762  011312         DEF ECIM
03655000 11763  011177         DEF CONEN
03656000 11764  011312         DEF ECIM
03657000                *
03658000                *       LINE DELETE  (26)
03659000                *
03660000 11765  011552         DEF BBEEP
03661000 11766                 BSS 1
03662000 11767  011552         DEF BBEEP
03663000 11770  011552         DEF BBEEP
03664000 11771  011552         DEF BBEEP
03665000                *
03666000                *       RESULT (27)
03667000                *
03668000 11772  010352         DEF RESK
03669000 11773  010361         DEF REOL
03670000 11774  010352         DEF RESK
03671000 11775  000000         DEF 0
03672000 11776  010361         DEF REOL
03673000                *
03674000                ***************************************************************
03675000                *
03676000 11777                 BSS 1          CHECK SUM !!!!!!!!!!!!!!!!!!!!!!!!!!!!!!!!
03677000                *
03678000                ********************
03679000                *
03680000                *      DEFINITIONS
03681000                *
03682000                *
03683000        000263  MAXLN EQU FLAG
03684000        011571  B163  EQU P115
03685000        000170  BUMM  EQU M256
03686000        000122  B32   EQU P26
03687000        000052  STPMS EQU B200
03688000        000263  TRCMS EQU FLAG
03689000        000077  COLLN EQU B72
03690000        000053  EOL   EQU D177
03691000        000177  KPA   EQU P0
03692000        000116  QUOTE EQU B42
03693000        077467  LPSVA EQU LPIT
03694000        077470  LPSVB EQU LPIT+1
03695000        077471  LPSVC EQU LPIT+2
03696000        077473  LPSVE EQU LPIT+4
03697000        077474  LPSVO EQU LPIT+5
03698000        000045  DCMND EQU B377
03699000        000236  CTCNT EQU B2K
03700000        077216  CST   EQU CSTMP
03701000        077216  SIOCP EQU CST
03702000        077217  .WPRT EQU CST+1
03703000        077220  M     EQU CST+2
03704000        077221  PLADD EQU CST+3
03705000        077223  TMP6  EQU CST+5
03706000        077224  K     EQU CST+6
03707000        077225  TMP2  EQU CST+7
03708000        077226  LNO   EQU CST+8
03709000        077227  TMP1  EQU CST+9
03710000        077230  TMP5  EQU CST+10
03711000        077231  TMP3  EQU CST+11
03712000        077232  CFLAG EQU CST+12
03713000        077233  TMP7  EQU CST+13
03714000        077234  TMP4  EQU CST+14
03715000        077235  SKEY  EQU CST+15
03716000        077236  TMP8  EQU CST+16
03717000        077206  .WKC  EQU IOTMP
03718000        077207  .WMOD EQU IOTMP+1
03719000        077210  DTMP1 EQU IOTMP+2
03720000        077211  DTMP2 EQU IOTMP+3
03721000        077212  SPKN  EQU IOTMP+4
03722000        077213  OLCP  EQU IOTMP+5
03723000        077214  CRSP  EQU IOTMP+6
03724000        077215  IOCP  EQU IOTMP+7
03725000        077613  RENFG EQU LKTMP+6
03726000        000433  DISP  EQU ALDSP
03727000                *
03728000                *
03729000                *
03730000                      END

END OF PASS 2 NO ERRORS DETECTED
```

```
00003000 76550                ORG 76550B
00004000                      UNL
02000000                      LST
02001000                *
02003000                *
02004000                *     BASE PAGE LINKS
02005000                *
02006000 00432                ORG ADSPC
02007000 00432  012140        DEF DISPC     DISP INFO WITH CURSOR
02008000 00433  012135        DEF DISP      DISPLAY ROUTINE - NO RESET JSM STACK
02009000 00434  012000        DEF KBSRV     KEYBOARD SERVICE ROUTINE
02010000 00435  013430        DEF TRBUF     TRANSFER I/O TO KEYBOARD BUFFER
02011000 00436  013123        DEF EPON      PRINT-ALL ROUTINE
02012000 00437  013126        DEF EPNX      PRINT-ALL LINK FOR ENTER PRINT
02013000 00440  012044        DEF SVRG      SAVE LOW PRIORITY A,B,E,O
02014000 00441  012012        DEF KBSR2     RESTORE LOW PRIORITY A,B,E,O
02015000 00442  012503        DEF CPST      CHECK PRINTER STATUS
02016000 00443  012524        DEF PRNT      PRINT CHARS ALREADY GIVEN TO HARDW.
02017000 00444  012514        DEF .PRNT     PRINT 16 CHARS FROM I/O BUFF
02018000 00445  012606        DEF PNUMR     PRINT A NUMERIC VALUE
02019000 00446  013010        DEF FBP       FIND DISP BEGIN POINTER
02020000 00447  013716        DEF SWIOP     SWAP PARAM TO EDIT I/O BUFFER
02021000 00450  013506        DEF CLBIO     CLEAR I/O BUFFER
02022000 00451  013465        DEF CLEBF     CLEAR EDIT BUFFER
02023000 00452  013511        DEF EOLEB     SET EOL IN EDIT BUFFER
02024000 00453  013515        DEF CLCMB     CLEAR COMPILE BUFFER
02025000 00454  013165        DEF RPRL      ROM POWER REDUCTION LOOP
02026000 00455  013575        DEF LKBEX     LIVE KBD EXECUTION
02027000 00456  013622        DEF LEXER     LIVE KBD EXEC ERROR ROUTINES
02028000 00457  013570        DEF LEXKY     LIVE KBD EXECUTE KEY PROCESSING ROUT
02029000 00460  113722        DEF K1,I      KEY CONTROL CODE TABLE
02030000 00461  013117        DEF EPKBD     PRINT-ALL FROM KBD BUFFER
02031000 00462  012672        DEF PSTRG     PRINT A STRING
02032000                *
02033000 00566                ORG ALST
02034000 00566  012174        DEF LIST      LINK TO EXECUTE 'LIST'
02035000 00567  012554        DEF EPRT      LINK TO EXECUTE 'PRT'
02036000 00570  012742        DEF EDIS      LINK TO EXECUTE 'DSP'
02037000 00571  012540        DEF PLDX      LINK TO EXECUTE 'SPC'
02038000 00572  012333        DEF LISTK     LINK TO EXECUTE "LISTK"
02039000 00573  013526        DEF ELKE      LIVE KBD ENABLE
02040000 00574  013531        DEF ELKD      LIVE KBD DISABLE
02044000                *
02045000 11614                ORG 11614B
02046000                *
02047000 11614                BSS 5         EXECUTE
02048000 11621                BSS 5         STORE
02049000 11626                BSS 5         INSERT/REPLACE
02050000                *
02051000 11633  013345        DEF CLEAR     CLEAR KEY
02052000 11634  013345        DEF CLEAR
02053000 11635  013345        DEF CLEAR
02054000 11636  013353        DEF CLEEN
02055000 11637  013345        DEF CLEAR
02056000                *
02057000 11640  013363        DEF DLCH      DELETE CHARACTER
02058000 11641  013363        DEF DLCH
02059000 11642  013363        DEF DLCH
02060000 11643                BSS 2
02061000                *
02062000 11645                BSS 5         STEP
02063000 11652                BSS 5         RIGHT ARROW
02064000 11657                BSS 5         LEFT ARROW
02065000 11664                BSS 5         DOWN ARROW
02066000                *
02067000 11671  013241        DEF RECL      RECALL
02068000 11672  013241        DEF RECL
02069000 11673  013241        DEF RECL
02070000 11674  013241        DEF RECL
02071000 11675  013241        DEF RECL
02072000                *
02073000 11676                BSS 5         PROG KEYS  ALPHA NUMERIC
02074000 11703                BSS 5         UP ARROW
02075000 11710                BSS 5         BACK
02076000 11715                BSS 5         FORWARD
02077000 11722                BSS 5         STOP,REW
02078000                *
02079000 11727  013043        DEF LTID      TYPING AIDS
02080000 11730  013043        DEF LTID
02081000 11731  013043        DEF LTID
02082000 11732  013043        DEF LTID
02083000 11733  013043        DEF LTID
02084000                *
02085000 11734                BSS 5         SPECIAL KEYS
02086000 11741                BSS 5         PRINT-ALL
02087000 11746                BSS 5         LINE INSERT
```

CONTROL SUPERVISOR LINKS

```
02088000 11753              BSS 5        RUN
02089000 11760              BSS 5        CONTINUE
02090000 11765              BSS 5        LINE DELETE
02091000 11772              BSS 5        RESULT KEY
02092000             *
```

I/O SUPERVISOR

```
02095000             *
02096000             *
02097000             ************************
02098000             *                      *
02099000             *   I/O SUPERVISOR
02100000             *
02101000             *
02102000             *
02103000             *                      *
02104000             ************************
02105000             *
02106000             *
02107000             *         IOSP
02108000             *
02109000             *
02110000             *
02111000             *
02112000             *
02113000 12000              ORG 12000B
02114000             *
02115000             *
02116000             *
02117000             *
02118000             *
02119000             *
02120000             *
02121000             *
02122000             *
02123000             *
02124000             *
02125000             *
02126000             *
02127000 12000 043044 KBSRV JSM SVRG      SAVE REGISTERS
02128000 12001 000004       LDA R4        GET KEY CODE
02129000 12002 031207       STA .WMOD     SAVE KEYBOARD CODE
02130000 12003 043061       JSM KCASC     KEYCODE CONVERSION TO ASCII
02131000 12004 031206       STA .WKC      SAVE CODE
02132000 12005 005257       LDB CSTAT     GET STATE
02133000 12006 076022       RZB KBSR5     SKIP IF NOT IDLE STATE
02134000 12007 001207 KBSR6 LDA .WMOD
02135000 12010 172701       SAM *+1,S     SET NEW KEY FLAG
02136000 12011 031207       STA .WMOD
02137000 12012 001472 KBSR2 LDA LPSVD     RESTORE C,D
02138000 12013 030017       STA D
02139000 12014 001471       LDA LPSVC
02140000 12015 030016       STA C
02141000 12016 001473       LDA LPSVE     GET E REG. INFO
02142000 12017 177201       SEC *+1,C     CLEAR E REG.
02143000 12020 073002       SLA *+2       SKIP IF LSB =0
02144000 12021 177301       SEC *+1,S
02145000 12022 173201       SOC *+1,C     CLEAR O REG.
02146000 12023 172002       SAP *+2
02147000 12024 173301       SOC *+1,S
02148000 12025 005470       LDB LPSVB     RESTORE B REGISTER
02149000 12026 001467       LDA LPSVA     RESTORE A REGISTER
02150000 12027 170300 KBSR3 RET 0,P       RETURN AND TURN-ON INTERRUPT
02151000             *
02152000 12030 014143 KBSR5 CPB P4        ENTER STATE 7
02153000 12031 067007       JMP KBSR6     YES
02154000             *
02155000 12032 020147 KBSR1 ADA M3
02156000 12033 172005       SAP KBSR4     SKIP IF NOT AN INTERRUPTING KEY
02157000 12034 001206       LDA .WKC      IOR KEYCODE INTO XCOMM
02158000 12035 172701       SAM *+1,S     SET BIT 15 ALSO
02159000 12036 040744       JSM SXCMM
02160000             *
02161000 12037 067012       JMP KBSR2     RESTORE REGISTERS
02162000             *
02163000 12040 001623 KBSR4 LDA LKFLG     GET LIVE KEYB. FLAG
02164000 12041 073451       RLA KBSR2     SKIP IF LIVE KBD NOT ENABLED
02165000             *
02166000 12042 042533       JSM LKPRC     GO TO THE LIVE KBD PROC ROUTINES
02167000             *
02168000 12043 067012       JMP KBSR2     RESTORE REGISTERS
```

I/O SUPERVISOR

```
                     *
                     *
                     *        SAVE REGISTERS SUBR.
                     *
                     *               LOW PRIORITY: A,B,E,O
                     *
                     *
12044   031467  SVRG  STA LPSVA    LOW PRIORITY SAVE "A" TEMPORARY
12045   035470        STB LPSVB    LOW PRIORITY SAVE "B" TEMPR.
12046   000177        LDA P0
12047   177002        SEC *+2      SKIP IF CLEAR
12050   000254        LDA P1
12051   173002        SOC *+2      SKIP IF CLEAR
12052   172301        SAP *+1,S
12053   031473        STA LPSVE    SAVE O,E REGISTERS
12054   000016        LDA C
12055   031471        STA LPSVC    SAVE C-REG.
12056   000017        LDA D
12057   031472        STA LPSVD    SAVE D-REG.
12060   170201        RET 1
                     *
                     *
                     *        KEYCODE CONVERSION TO ASCII
                     *
                     *          ENTRY:     A-REG = KEYCODE
                     *
                     *          EXIT:      A-REG = ASCII CODE
                     *
                     *   SEE CONVERSION TABLES CONTAINED IN THE DOCUMENTATION FOR
                     *   THE I/O SUPERVISOR
                     *
                     *
12061   170607  KCASC SAL 8        KEYCODE IN UPPER HALF
12062   172002        SAP *+2      SKIP IF UNSHIFTED
12063   067112        JMP KCAS3    SHIFTED
12064   170507        SAR 8        KEYCODE IN LOWER HALF
                     *
                     *        UNSHIFTED KEY CONVERSION
                     *
12065   004000        LDB A        NO: SAVE KEYCODE
12066   174040        TCB          MAKE NEG
12067   024073        ADB B100
12070   176015        SBP KCAS6    SKIP IF KEYCODE <101:NO CONVERSION
12071   026760        ADB B31
12072   176413        SBM KCAS6    SKIP IF KEYCODE > 131
12073   006223        LDB KTBL1    GET TABLE ADDR (UNSHIFTED)
12074   020164        ADA BM100    GET CODE 1 - 31B
12075   177301  KCAS4 SEC *+1,S    SET E-REG.
12076   073002        SLA *+2
12077   177201        SEC *+1,C    CLEAR E-REG. IF L.S.BIT OF A=1
12100   170500        SAR 1        BECAUSE OF TWO CODES PER WORD
12101   024000        ADB A        B = ADDR OF CODES
12102   100001        LDA B,I      GET CODES
12103   177005        SEC KCAS1    SKIP FOR LOWER HALF
12104   170507        SAR 8        A = CODE
12105   010066  KCAS6 CPA B140     IS THIS THE ENTER EXPONENT KEY?
12106   000063        LDA B145     YES, MAKE IT A SMALL E
12107   170201        RET 1        NO, LEAVE ALONE
                     *
12110   050045  KCAS1 AND B377     A = CODE
12111   170201        RET 1
                     *
                     *        SHIFTED KEY CONVERSION
                     *
12112   170507  KCAS3 SAR 8        KEYCODE IN LOWER HALF
12113   050053        AND B177     DROP BIT 7
12114   010055        CPA B175     GAZINTA?
12115   170201        RET 1        YES
                     *
12116   010057        CPA B173     PI ?
12117   067133        JMP KCAS2    YES
12120   004000        LDB A        GET KEYCODE
12121   174040        TCB          MAKE NEG.
12122   024110        ADB B53
12123   176062        SBP KCAS6    SKIP IF KEYCODE < 54
                     *
12124   026761        ADB B65
12125   176404        SBM KCAS7    SKIP IF KEYCODE > 140
12126   006167        LDB KTBL2    GET TABLE ADDR (SHIFTED)
12127   022756        ADA BM54     GET CODE 0 - 64B
12130   067075        JMP KCAS4    GET UPPER CASE CODE
12131   020162  KCAS7 ADA BM40     GET UPPER CASE ALPHA
12132   170201        RET 1
                     *
```

```
12133  000056  KCAS2 LDA B174      GET VERTICAL BAR
12134  170201        RET 1
                *
                ************************************************************
                *
                * DISP  DISPLAY INFO WITHOUT CURSOR
                * DISPLAYS CONTENTS OF I/O BUFFER REGARDLESS OF POSITION
                * OF EDIT BUFFER POINTERS
                *
                *
                ********************
                *
12135  004150  DISP  LDB M4        SET FOR ENTRY WITHOUT CURSOR
12136  000314        LDA AIBFX     DISPLAY I/O BUFFER
12137  067144        JMP NOCUR     DISPLAY WITH OUT CURSOR
                *
                ************************************************************
                *
                * DISPC  DISPLAY WITH CURSOR  USES T1 DISPLAYS STARTING AT
                * CHARACTER INDICATED BY DBP  SETS THE CURSOR IF CRSP#0
                * BIT 15 OF CRSP ISSET IF INSERT CURSOR, BITS 0-14
                * CONTAIN A CHARACTER OFFSET FROM DBP-1 TO SET THE CURSOR
                *
                **************************
                *
12140  001214  DISPC LDA CRSP      GET CURSOR POINTER
12141  050074        AND B77       SAVE ONLY OFFSET COUNT
                *
12142  004000        LDB A         SET CURSOR OFFSET
12143  001513        LDA DBP       GET START OF DISPLAY ADDR
12144  030016  NOCUR STA C         SAVE IT FOR THE TRANSFER
12145  140401        JSM AADBA,I   ADJUST BYTE ADDRESS
12146  030001        STA B         SET CURSOR ADDRESS
12147  000177        LDA DPA       GET DISPLAY SELECT CODE
12150  030011        STA PA        SET PERPHERAL ADDRESS
12151  001512        LDA DLEN      GET LENGTH OF DISPLAY
12152  031711        STA T1        SAVE LOOP COUNTER
                *                  B CONTAINS THE ADDR OF THE CHAR
12153  074560  LDH   WBC A,I       GET BYTE AND INC PTR
12154  014016        CPB C         CURSOR POSITION?
12155  067157        JMP *+2       YES
12156  067166        JMP NOPOS     NO
                *
12157  005214        LDB CRSP      GET CURSOR
12160  176403        SBM INCUR     TO SEE WHICH TYPE OF CURSOR
12161  004073        LDB B100      REPLACE CURSOR
12162  067164        JMP *+2
12163  004117  INCUR LDB B40      INSERT CURSOR
12164  034005        STB R5        SET CURSOR INDICATOR
12165  060052        IOR B200      SET CURSOR BIT ON BYTE TO DISPLAY
                *
12166  030004  NOPOS STA R4        SEND CHAR TO DISPLAY
12167  055711        DSZ T1        DONE?
12170  067153        JMP LDH       NO, CONTINUE
12171  000145        LDA P2        TRIGGER THE DISPLAY
12172  030005        STA R5
12173  170201        RET 1         YES SO RETURN
                *
                *
                *
                *     LIST MAIN PROGRAM
                *  PERIPHERAL LIST ENTRY IS LISTP.  PLADD MUST BE SET TO
                *  ADDRESS OF A RETURN FOR A MAINFRAME LIST, OTHERWISE IT
                *  CONTAINS THE ADDRESS OF THE PERIPHERAL LIST ROUTINE,
                *  ROUTINE MUST DO A RET2 WHEN IT IS DONE.  OTHERWISE THE
                *  PROGRAM WILL ALSO LIST TO THE INTERNAL PRINTER
                *
                *
                *
                *
                *
                *
                *
                *
                *
                *
                *
                *
                *
                *
                *
                *
12174  140610  LIST  JSM ACOUN,I   COUNT PARAMETERS ON STACK
12175  004714        LDB ARET1     SET FOR A RETURN
```

I/O SUPERVISOR

```
12176  035221  LISTP STB PLADD     SET FOR MAIN FRAME LIST
12177  005257        LDB CSTAT     SEE IF STATE 1,3, OR 5
12200  077005        SLB NOCOM     IF SO THEN SET C TO POINT
12201  004274        LDB AAEOL     EOL AND SET LEND TO POINT TO ZERO
12202  034016        STB C
12203  004334        LDB ADP0
12204  035264        STB LEND
12205  043603  NOCOM JSM INTIO     INIT FOR LIST OUTPUT
12206  004177        LDB P0        SET LINE # = LOWER LIMIT
12207  035216        STB SIOCP     CLEAR CHECKSUM WORD
12210  035233        STB TMP7
12211  004263        LDB MAXLN     MAX LINE NO.
12212  035223        STB TMP6      SET DEFAULT UPPER LIMIT
12213  072412        SZA LIST3     PARAMETERS GIVEN?
12214  043327        JSM LGINM     GET LINE NUMBER
12215  173411        SOS LSSSS     LINE CANNOT EXIST IF OVERFLOW
12216  035233        STB TMP7      SET BEGIN OF LIST
12217  000254        LDA P1
12220  140607        JSM ABU[illegible],I  ADVANCE TO NEXT PARAMETER
12221  067225        JMP LIST3     END OF PARAMETER LIST
12222  043327        JSM LGINM
12223  173402        SOS LIST3     LIST TO END OF PROG IF OVERFLOW
12224  035223        STB TMP6      SET UPPER LIMIT
12225  140513  LIST3 JSM AFLNA,I   FIND LINE ADDR
12226  067302  LSSSS JMP LIST5     LINE NOT FOUND
12227  040724        JSM SECCK     SEE IF PROG IS SECURE
12230  043533        JSM PLEAD     GIVE PAPER LEADER
12231  140453  LIST1 JSM ACLCM,I   CLEAR COMPILE BUFF
12232  140513        JSM AFLNA,I   FIND LINE ADDRESS
12233  067270        JMP LIST2     NOT FOUND, MUST BE DONE
12234  005233        LDB TMP7      SET LNO FOR ATLNO ROUTINE
12235  035226        STB LNO
12236  140412        JSM APLIR,I   PLACE LINE NO. IN I/O BUFF
12237  001206        LDA .WKC      GET KEY CODE
12240  010254        CPA P1        IS IT HTE STOP KEY?
12241  067270        JMP LIST2     YES, ABORT OPERATION
               *
12242  000314        LDA AIBFX     I/O BUFF S/A
12243  030016        STA C         SET PTR
12244  000165        LDA M80       SET 80 CHAR COUNTER
12245  031711        STA T1
12246  074560  LLOOP WBC A,I       GET CHARACTER
12247  005711        LDB T1        GET CHAR COUNT
12250  075617        MPY           MPY CHAR * CHAR COUNT
12251  005233        LDB TMP7      GET LINE #
12252  024254        ADB P1        ACCOUNT FOR LINE ZERO
12253  075617        MPY           MPY LINE # * CHAR * CHAR COUNT
12254  021216        ADA SIOCP     ADD SUM SO FAR
12255  031216        STA SIOCP     SET NEW SUM
12256  045711        ISZ T1        INC COUNTER
12257  067246        JMP LLOOP     NOT DONE SO KEEP GOING
               *
12260  000177        LDA P0        SET INDICATOR FOR PERIPHERAL ROUTINE
12261  141221        JSM PLADD,I   GIVE PERIPHERAL CONTROL
12262  043353        JSM PIOB      PRINT ONE LINE
12263  001233        LDA TMP7      GET LAST PRINTED LINE NO.
12264  011223        CPA TMP6      LISTING COMPLETE ?
12265  067270        JMP LIST2     YES
12266  045233        ISZ TMP7      INCRM LINE NO.
12267  067231        JMP LIST1     CONT
               *
12270  140450  LIST2 JSM ACLBI,I   CLEAR I/O BUFFER
12271  002763        LDA BLAST     GET A BLANK, ASTERIK
12272  130313        STA AIBUF,I   PUT IN I/O BUFFER
12273  004314        LDB AIBFX     PUT # IN I/O BUFFER
12274  001216        LDA SIOCP     GET CHECKSUM
12275  050344        AND MAW       MAKE POSITIVE
12276  140477        JSM ABTDA,I   PUT IN I/O BUFFER
12277  141221        JSM PLADD,I   GIVE PERIPHERAL CONTROL
12300  043514        JSM .PRNT     PRINT CHECKSUM
12301  043533        JSM PLEAD     GIVE PAPER LEADER
12302  140450  LIST5 JSM ACLBI,I   CLEAR I/O BUFF
               *
12303  001307        LDA FWUP      CALCULATE MEMORY USED BY PROGRAM
12304  170040        TCA
12305  021277        ADA ENDS      MEMORY BETWEEN ENDS AND FWUP
12306  072403        SZA LNULP     SKIP IF A NULL PROGRAM
12307  020254        ADA P1        ADD 1 WORD FOR BRIDGES
12310  170600        SAL 1         MAKE BYTES
12311  004315  LNULP LDB AIBFM     S/A TO PUT NUMBER
12312  140477        JSM ABTDA,I   CONVERT TO ASCII
               *
12313  001310        LDA RMAX      CALCULATE AVAILABLE MEMORY
12314  020254        ADA P1        ADJUST ADDR
12315  170040        TCA
```

```
12316  021263         ADA AP1       B= AVAILABLE WORDS
12317  170600         SAL 1         MAKE BYTES
12320  004320         LDB AIOLM     S/A TO PUT NUMBER
12321  140477         JSM ABTDA,I   MAKE ASCII AND PLACE IN I/O BUFF
12322  140436         JSM AEPON,I   GO THROUGH PRINTALL
                *
12323  043135         JSM DISP      DISPLAY # OF REGISTERS LEFT
12324  067600         JMP RESIO     RESTORE AFTER LIST
                *
12325  140404   ERLNW JSM AERR1,I   LINE NO. WRONG
12326  030471         ASC 1,19
                *
12327  040751   LGTNM JSM NGET      GET NEXT PARAMETER
12330  067325         JMP ERLNW     WRONG TYPE
12331  000001         LDA B         A= POINTER
12332  064644         JMP FIXPT     FLOAT TO FIXED
                *
                *
                ****************
                *
                * LISTK:  SYSTEM COMMAND TO LIST ALL DEFINED KEYS IN NUMERICAL ORDER
                *
                ****************
                *
12333  000177   LISTK LDA P0        START WITH F0
12334  031212         STA SPKN
12335  043603         JSM INTIO     INIT FOR LISTING
12336  001206   LSTK1 LDA .WKC      CHECK FOR STOP KEY
12337  010254         CPA P1        STOP KEY IF = 1
12340  067347         JMP LSTK2     =1 SO ABORT OPERATION
12341  140473         JSM ALISK,I   LIST KEY <SPKN> IF IT IS DEFINED
12342  045212         ISZ SPKN      BUMP THE KEY NUMBER
12343  004122         LDB P26
12344  015212         CPB SPKN      IF  F26 IS THE NEXT KEY THEN ALL KEYS HAVE BEEN
12345  067347         JMP LSTK2     LISTED, SO PUT EOL IN THE DISP AND RETURN
12346  067336         JMP LSTK1     OTHERWISE KEEP LISTING UNTIL ALL KEYS ARE DONE.
12347  000144   LSTK2 LDA P3
12350  140571         JSM ASPC,I    GIVE 3 PAPER LINE FEEDS
12351  040710         JSM EOLIO     CLEAR I/O BUFFER, PLACE EOL IN 1ST CHAR.
12352  067600         JMP RESIO     RESTORE AFTER LISTING AND RETURN TO INTERPRETER
                *
                *
                *
                *
                *       PRINT CONTENTS OF I/O BUFFER
                *   *H
                *   12 CHARACTERS ARE SEND TO THE PRINTER HARDWARE, THEN THE NEXT 4
                *   CHARACTERS ARE SEARCHED FROM RIGHT TO LEFT FOR A +  -  *  /
                *   ;  ,  OR SPACE AND THE LINE IS BROKEN AT THIS SPOT IF ANY ARE
                *   FOUND.  OTHERWISE 16 CHARACTERS ARE PRINTED.  THIS CONTINUES
                *   UNTIL THE LAST NON BLANK CHARACTER IS PRINTED
                *
                *
12353  000314   PIO8  LDA AIBFX     GET I/O BUFF ADDR
12354  030017         STA D         SET SOURCE POINTER
12355  000133         LDA P12       12 CHARS
12356  031227   PIO89 STA TMP1      SET COUNTER
12357  043463         JSM PCOUT     OUTPUT CHARS
12360  001210         LDA DTMP1     GET "EOL" FLAG
12361  072404         SZA PIO82     END OF LINE FOUND ?
12362  000143         LDA P4        YES
12363  031227         STA TMP1      SET COUNT FOR 4 BLANKS
12364  067456         JMP SHLP      FILL BUFF, PRINT LINE AND RETURN P+1
                *
12365  000017   PIO82 LDA D         GET I/O BUFF POINTR
12366  031225         STA TMP2      AND SAVE IT
12367  000142         LDA P5        LOOK AT NEXT 5 CHARACTERS
12370  031231         STA TMP3      SET COUNTER
12371  074570   PIO81 WBD A,I       GET CHAR AND INCRM
12372  010053         CPA EOL       END-OF-LINE?
12373  067453         JMP PIO88     YES
12374  055231         DSZ TMP3      DONE?
12375  067371         JMP PIO81     NO
                *
12376  074770         WBD A,D       DUMMY WITHDRAW,DEC
12377  000017         LDA D         GET I/O BUFF POINTR
12400  030016         STA C         SET C-REG
12401  074760         WBC A,D       DUMMY WITHDRAW AND DECREM
12402  000143         LDA P4        MAX OF 4 CHARS
12403  031231         STA TMP3      SET COUNTER
12404  074760   PIO83 WBC A,D       GET CHAR AND DECREM
12405  010110         CPA B53       +?
12406  067441         JMP PIO84     YES
12407  010106         CPA B55       -?
12410  067441         JMP PIO84     YES
```

I/O SUPERVISOR

```
12411  010111         CPA B52      *?
12412  067441         JMP PIOB4    YES
12413  010104         CPA B57      /?
12414  067441         JMP PIOB4    YES
12415  010117         CPA B40      BLANK?
12416  067441         JMP PIOB4    YES
12417  010076         CPA B73      ;?
12420  067441         JMP PIOB4    YES
12421  010107         CPA B54      ,?
12422  067441         JMP PIOB4    YES
12423  055231         DSZ TMP3     DONE?
12424  067404         JMP PIOB3    NO
12425  000143  PIOB6  LDA P4       NO BREAK POINT FOUND
12426  043527         JSM SPIB     SET COUNT AND OUTPUT CHARS
12427  043524  PIOX2  JSM PRNT     PRINT LINE
12430  043503  PIOX3  JSM CPST     CHECK PRINTER STATUS
12431  074570         WBD A,I      GET NEXT CHAR
12432  010053         CPA EOL      END OF LINE MARK ?
12433  170201         RET 1        YES ; DONE WITH THIS LINE
                *
12434  074770         WBD A,D      NO; READJUST SOURCE POINTR
12435  000117         LDA B40      GET BLANK
12436  030006         STA R6       INDENT THE LINE
12437  000134         LDA P11      GET READY FOR 11 MORE CHARS
12440  067356         JMP PIOB9    OUTPUT MORE LINES
                *
12441  001231  PIOB4  LDA TMP3     NO. OF ADDITIONAL CHARS
12442  043527         JSM SPIB     SET COUNT AND OUTPUT CHARS
12443  001231         LDA TMP3     A = NO. OF CHARS OUTPUT ABOVE 12
12444  010143         CPA P4       A = 4, LINE COMPLETE
12445  067427         JMP PIOX2    PRINT LINE
12446  170040         TCA          MAKE NEGATIVE
12447  020143         ADA P4       A = NO. OF CHARS TO REACH 16
12450  031227         STA TMP1     SET CHAR COUNTR
12451  043456         JSM SBLP     FILL BUFF AND PRINT LINE
12452  067430         JMP PIOX3    OUTPUT MORE LINES
                *
12453  000143  PIOB8  LDA P4       GET ALL REMAINING CHARS
12454  043527         JSM SPIB     SET COUNT,RESET SOURCE POINTR,OUTPUT CHARACTERS
12455  067524         JMP PRNT     PRINT LINE + RETURN P+1
                *
                *
                *****************************************************************
                *
                *    PRINT UTILITY ROUTINES
                *
                *********************************
                *
                *      SEND BLANKS AND PRINT 16 CHARS
                *
                *        ENTRY: "TMP1" = NO. OF BLANKS
                *
                *
12456  000117  SBLP   LDA B40      GET BLANK
12457  030006  SBLP1  STA R6       TO PRINTER HARDWARE
12460  055227         DSZ TMP1     DONE ?
12461  067457         JMP SBLP1    NO
12462  067524         JMP PRNT     PRINT LINE + RETURN P+1
                *
                *
                *      PRINTER CHARACTER OUTPUT
                *
                *      ENTRY:  TMP1 = NO. OF CHARS
                *
                *
12463  043503  PCOUT  JSM CPST     CHECK PRINTER STATUS
12464  000177  PCOU1  LDA P0
12465  031210         STA DTMP1    CLEAR "EOL" FLAG
12466  074570  PCOU2  WBD A,I      GET CHAR AND INCREM.
12467  010053         CPA EOL      END OF LINE ?
12470  067475         JMP PCOU3    YES; DO NOT COUNT THE EOL CHAR
12471  030006         STA R6       TO PRINTER HARDWARE
12472  055227         DSZ TMP1     DONE?
12473  067466         JMP PCOU2    NO
12474  170201         RET 1        YES
                *
12475  045210  PCOU3  ISZ DTMP1    SET "EOL" FLAG
12476  000117         LDA B40      GET BLANK
12477  030006  PCOU4  STA R6       TO PRINTER HARDWARE
12500  055227         DSZ TMP1     DONE ?
12501  067477         JMP PCOU4    NO; LOOP
12502  170201  PCOUX  RET 1
                *
                *
```

```
                 *      CHECK PRINTERSTATUS
                 *
                 *
12503   000177   CPST  LDA PPA      GET PRINTER SEL. CODE
12504   030011         STA PA       SET PERIPHERAL ADDR
12505   000005   CPST1 LDA R5       GET PRINTER STATUS
12506   050141         AND P6       SAVE PRINTER BUSY AND OUT OF PAPER BITS
12507   072473         SZA PCOUX    OK! PROCEED
12510   170501         SAR 2        POSITION BUSY BIT
12511   073474         RLA CPST1    IF BUSY SKIP AND CHECK AGAIN
12512   140404   ERPRT JSM AERR1,I  NO PRINTER OR NO PAPER
12513   030465         ASC 1,15
                 *
                 *
                 *        OUTPUT 16 CHARS FROM I/O BUFF TO PRINTER
                 *
                 *            ENTRY: I/O BUFF SET
                 *
                 *
12514   004314   .PRNT LDB AIBFX    I/O BUFF S/A
12515   034016         STB C        SET C-REG
12516   043503         JSM CPST     CHECK PRINTER STATUS
12517   000127         LDA P16      CHAR COUNT
12520   031211         STA DTMP2    SET COUNTER
12521   074566   .PRN1 WBC R6,I     SEND BYTE TO HARDWARE, INC PTR
12522   055211         DSZ DTMP2    ALL CHARS OUT ?
12523   067521         JMP .PRN1    NO! LOOP
                 *
                 *
                 *      PRINT ONE LINE
                 *
                 *      ENTRY: HARDWARE LOADED WITH 16 CHARS
                 *
                 *
12524   000254   PRNT  LDA P1       PRINT COMMAND
12525   030005         STA R5       PRINT LINE
12526   170201         RET 1
                 *
                 *
                 *       SET CHAR COUNT AND OUTPUT CHARS
                 *
                 *           ENTRY: A= CHAR COUNT
                 *
                 *
12527   031227   SPIB  STA TMP1     SET CHAR COUNT
12530   001225         LDA TMP2     RECALL I/O BUFF POINTR
12531   030017         STA D        RESET SOURCE POINTER
12532   067464         JMP PCOU1    OUTPUT CHARS  + RETURN P+1
                 *
                 ***************************************************************************
                 *
                 *
                 *       GIVE PAPER LINE FEEDS
                 *
                 *           ENTRY "PLDX": A = NO. OF LINE FEEDS
                 *     PLEAD ENTRY ASSUMES PLADD IS SET TO THE ADDRESS OF A RETURN
                 *     OR THE ADDRESS OF THE PERIPHERAL LIST ROUTINE
                 *     A WILL CONTAIN A -3 SO THAT THE PERIPHERAL LIST ROUTINE
                 *     WILL KNOW HOW MANY LINE FEEDS TO ISSUE
                 *
                 *
                 *
12533   000147   PLEAD LDA M3       SET INDICATOR FOR PERIPHERAL ROUTINES
12534   141221         JSM PLADD,I  ALLOW PERIP CHANCE TO SPACE, RET2 IF PRESENT
12535   067537         JMP *+2      NOT THERE SO SPACE PRINTER
12536   170201         RET 1        PERIP SPACED, RETURN
12537   000144         LDA P3
12540   031211   PLDX  STA DTMP2    LINE FEED COUNT
12541   004127   PLEA2 LDB P16
12542   035210         STB DTMP1    SET CHAR COUNTR
12543   043503         JSM CPST     CHECK PRINTER STATUS
12544   000117         LDA B40      GET BLANK
12545   030006   PLEA1 STA R6       TO PRINTER HARDWARE
12546   055210         DSZ DTMP1    DONE ?
12547   067545         JMP PLEA1    NO! CONT
12550   043524         JSM PRNT     PRINT ONE LINE
12551   055211         DSZ DTMP2    DONE ?
12552   067541         JMP PLEA2    NO; PRINT ANOTHER LINE
12553   170201   PLEA3 RET 1
                 *
                 ***************************************************************************
                 *
                 *
                 *      PRINT STATEMENT EXECUTION
```

```
                        *
                        *
12554  043603  EPRT   JSM INTIO     INIT FOR OUTPUT
12555  043634         JSM PCLIO     CLR I/O BUFFER,RESET STRING FLAG
12556  000263         LDA FLAG      FOR "PGET"
12557  140505         JSM APGET,I   GET FIRST PARAMETER
12560  067577         JMP EPRT4     NO PARAMETERS
12561  176002  EPRT2  SAP *+2       SKIP IF OK
12562  067754         JMP ERUND     UNDEFINED OR WRONG CLASS
12563  072403         SZA EPRT1     SKIP ON NUMERIC
12564  043672         JSM PSTRG     PRINT STRING
12565  067567         JMP EPRT3
12566  043606  EPRT1  JSM PNUMR     PRINT NUMERIC
12567  000254  EPRT3  LDA P1        FOR "PGET"
12570  140505         JSM APGET,I   GET NEXT PARAMETER
12571  067573         JMP *+2       LIST EXHAUSTED
12572  067561         JMP EPRT2     CONTINUE
12573  001727         LDA T15       GET STRING FLAG
12574  010315         CPA AIBFM     STRING PENDING?
12575  067577         JMP *+2       NO
12576  043514         JSM .PRNT     PRINT STRING
12577  040710  EPRT4  JSM EOLIO     CLEAR I/O BUFF AND SET EOL IN I/O BUFF
                        *
12600  001234  RESIO  LDA TMP4      RESTORE C REGISTER
12601  030016         STA C
12602  164365         JMP AINTX,I   BACK TO INTERPRETER
                        *
                        *
                        ***********************************************************
                        *
                        *  IOINT    INIT ROUTINE FOR ANY ROUTINE THAT USES THE I/O BUFFER
                        *           FOR I/O  LIST PROG,LIST KEYS, DISP STMT, PRT STMT
                        *           PLIST
                        *
                        ***********************
                        *
12603  004016  INTIO  LDB C         SAVE C
12604  035234         STB TMP4
12605  170201         RET 1
                        *
                        *
                        *      PRINT NUMERIC
                        *
                        *      ENTRY: B = CHAR COUNT
                        *
                        *             D = BYTE ADDR OF FIRST CHAR
                        *
                        *  USES T15 AS A FLAG  IF IT IS NOT SET TO AIBFM THEN IT ASSUMES
                        *  THAT A STRING IS PENDING SO THE ROUTINE WILL TRY TO
                        *  PUT THE NUMERIC ON THE SAME LINE. ASSUMES THAT THE STRING LENGTH
                        *  IS IN OTMP1.
                        *
                        *  USES .WPRT TO DECIDE WHAT THE FIX/FLT SETTING OF THE NUMBER IS
                        *  IF THE NUMBER HAS REVERTED TO FLOAT 10 OR 11 THEN IT WILL
                        *  USE THE LENGTH OF THE NUMBER TO DETECT THIS - LENGTH OF 17 =
                        *  FLOAT 10,  LENGTH OF 18 = FLOAT 11 .
                        *
12606  035712  PNUMR  STB T2        SAVE NO. OF CHARS
12607  001727         LDA T15       GET STRING FLAG
12610  010315         CPA AIBFM     STRING ON SAME LINE?
12611  067613         JMP *+2       NO
12612  067644         JMP PNUM2     YES
12613  024161         ADB M17
12614  176424         SBM PNUM3     NO. OF CHAR < = 16?
12615  001217  PNUM9  LDA .WPRT     NO: GET FXD/FLT SPEC.
12616  050130         AND B17       GET FLT SPEC.
12617  020144         ADA P3        ACCOUNT FOR SIGN, DIGIT, DEC. POINT
12620  031713         STA T3        SAVE CHAR COUNT OF FIRST NUM. PART
12621  004000         LDB A         GET NO. OF CHARS
12622  043736         JSM RJNM      RIGHT JUSTIFY NUM.
12623  005713         LDB T3        GET CHAR COUNT
12624  140502         JSM ATCHR,I   TRANSFER CHARACTERS
12625  043514         JSM .PRNT     PRINT ONE LINE
12626  140450         JSM ACLBI,I   CLEAR I/O BUFF
12627  000313         LDA AIBUF     I/O BUFF S/A
12630  020142         ADA P5        A = START POINTR FOR EXPONENT PART
12631  004143         LDB P4        EXPONENT INFO OF 4 CHARS
12632  140502  PNUM4  JSM ATCHR,I   TRANSFER CHARACTERS
12633  043514  PCLI1  JSM .PRNT     PRINT ONE LINE
12634  140450  PCLIO  JSM ACLBI,I   CLEAR I/O BUFFER
12635  000315         LDA AIBFM     A/S OF I/O BUFF
12636  031727         STA T15       RESET STRING FLAG
12637  170201         RET 1
                        *
```

```
12640  005712  PNUM3 LDB T2        GET NO. OF CHARS
12641  043736        JSM RJNM      RIGHT JUSTIFY NUM.
12642  005712  PNUM5 LDB T2        GET NO. OF NUM. CHARS
12643  067632        JMP PNUM4
                     *
12644  001210  PNUM2 LDA DTMP1     GET NO. OF STRING CHARS
12645  021712        ADA T2        ADD NO. OF NUM. CHARS
12646  020161        ADA M17
12647  172471        SAM PNUM3     SKIP IF SUM <=16 CHARS
                     *
12650  001712        LDA T2        GET LENGTH OF NUMBER
12651  010126        CPA P17       IS IT FLOAT 10?
12652  067660        JMP PNUM7     YES
12653  010125        CPA P18       IS IT FLOAT 11?
12654  067660        JMP PNUM7     YES
12655  043514  PNUM6 JSM .PRNT     PRINT STRING LINE
12656  140450        JSM ACLBI,I   CLEAR I/O BUFF
12657  067640        JMP PNUM3     TRANSFER AND PRINT NUM.
                     *
                     **********************
                     *
                     *  ORIGINALLY IT WAS INTENDED TO PUT THE MANTISSA ON THE SAME LINE
                     *  AS THE STRING IF IT WOULD FIT AND THE CHARACTERISTIC ON THE
                     *  NEXT LINE IF THE NUMBER WAS FLOAT 10 OR 11
                     *  TO MAKE THIS WORK PROPERLY CHANGE THE ADA P3 AND ADA M17
                     *  INSTRUCTIONS TO ADA M10, ADA M11
                     *
12660  021210  PNUM7 ADA DTMP1     ADD NO. OF STRING CHAR TO FLOAT SPEC
12661  020144        ADA P3        ACCOUNT FOR SIGN, DIGIT, DEC. POINT
12662  020161        ADA M17
12663  172002        SAP *+2       SKIP IF SUM > 16 CHARS
12664  067615        JMP PNUM9     SUM <= 16 CHARS
12665  043514        JSM .PRNT     PRINT STRING LINE
12666  140450        JSM ACLBI,I   CLEAR I/O BUFF
12667  067615        JMP PNUM9     TRANSFER AND PRINT NUM.
                     *
                     **************************
                     *
12670                BSS 2         POST RELEASE CORECTIONS
                     *
                     **************************
                     *
                     *
                     *     PRINT STRING
                     *
                     *     ENTRY: B = CHAR COUNT
                     *
                     *            D = BYTE ADDR OF FIRST CHAR
                     *
                     *                IF T15 # AIBFM  OLD STRING IS STILL PENDING
                     *
                     *     EXIT:   IF STRING LENGTH MOD 16 WAS NOT 0 THEN
                     *     T15 WILL NOT BE SET TO AIBFM, AND THE LAST PART OF THE
                     *     STRING WILL NOT BE PRINTED.  DTMP1 WILL CONTAIN THE LENGTH
                     *     OF THE REMAINING STRING THAT WAS LEFT IN THE I/O BUFFER
                     *
                     *     IN ORDER TO PRINT A STRING BY ITSELF THE FOLLOWING SEQUENCE
                     *     SHOULD BE USED
                     *     LDA AIBFM
                     *     STA T15
                     *     JSM APSTR,I
                     *     JSM A.PRN,I  PRINT THE REST OF THE STRING
                     *
                     *
                     *
                     *
12672  035210  PSTRG STB DTMP1     SAVE NO. OF CHARS
12673  001727        LDA T15       GET STRING FLAG
12674  010315        CPA AIBFM     OLD STRING PENDING ?
12675  067677        JMP PSTR4     NO
12676  043633        JSM PCLII     PRINT STRING,CLR I/O BUFFER,RESET STRING FLAG
12677  005210  PSTR4 LDB DTMP1     GET NO. OF CHARS (NEW STRING)
12700  076406        SZB PSTR2     SKIP ON A NULL STRING
12701  024160        ADB M16
12702  176007        SBP PSTR6     SKIP IF NO. OF CHARS >= 16
12703  000315        LDA AIBFM     I/O BUFF S/A
12704  005210        LDB DTMP1     GET CHAR COUNT
12705  140502        JSM ATCHR,I   TRANSFER CHARS
12706  000016  PSTR2 LDA C         GET DESTINATION POINTR
12707  031727        STA T15       SET STRING INCOMPLETE FLAG
12710  170201        RET 1         NUM. MAY FOLLOW
                     *
12711  140450  PSTR6 JSM ACLBI,I   CLEAR I/O BUFF
12712  000177        LDA P0
```

```
12713  031714        STA T4       INIT. LINE CHAR COUNTER
12714  000315        LDA AIBFM    I/O BUFF S/A
12715  030016        STA C
12716  001210  PSTR5 LDA DTMP1    STRING CHAR COUNT
12717  072004        RZA PSTR3    DONE?
12720  001714        LDA T4       YES! ALL STRING OUT
12721  031210        STA DTMP1    SAVE REMAINDER COUNT
12722  067706        JMP PSTR2    SAVE STRING POINTR
12723  074570  PSTR3 WBD A,I     GET ONE CHAR AND INCRM
12724  074540        PBC A,I      INCRM AND STORE CHAR
12725  055210        DSZ DTMP1    DECRM STRING COUNT
12726  067727        JMP *+1
12727  045714        ISZ T4       INCRM LINE CHAR COUNT
12730  001714        LDA T4       GET ITS VALUE
12731  010127        CPA P16      16 CHARS OUT?
12732  067734        JMP *+2      YES
12733  067716        JMP PSTR5    NO
12734  043514        JSM .PRNT    PRINT 16 CHARS
12735  067711        JMP PSTR6
                *
                *
                *
                *     RIGHT JUSTIFYNUMERIC
                *
                *     ENTRY: B = NO. OF CHARS IN NUM.
                *
                *       EXIT: A = DESTINATION POINTER
                *
                *
12736  024160  RJNM  ADB M16      B= ADJUST COUNT
12737  174040        TCB          MAKE NEGATIVE
12740  000315        LDA AIBFM    I/O BUFF S/A
12741  164401        JMP AADBA,I  ADJUST ADDR
                *
                *
                *
                *     DISP STATEMENT EXECUTION
                *   A BLANK IS PLACED BETWEEN EACH FIELD IN THE DISPLAY STMT
                *   AN ERROR IS ISSUED IF THE DISPLAY FIELD WILL NOT FIT IN 80 CHA
                *
                *
12742  043603  EDIS  JSM INTIO    INIT FOR I/O
12743  140450        JSM ACLBI,I  CLEAR I/O BUFFER
12744  000315        LDA AIBFM
12745  030016        STA C        SET DESTINATION REG.
12746  000165        LDA M80
12747  031227        STA TMP1     SET 80 CHAR MAX COUNT
12750  000263        LDA FLAG     FOR FIRST ACESS OF "PGET"
12751  140505  EDIS2 JSM APGET,I  GET ONE PARAMETER
12752  066005        JMP EDIS5    LIST EXHAUSTED
12753  176003        SBP *+3      SKIP IF OK
12754  140404  ERUND JSM AERR1,I  UNDEFINED OR WRONG CLASS
12755  030470        ASC 1,18
                *
12756  076425        SZB EDIS6    SKIP IF COUNT IS ZERO
12757  035225        STB TMP2     SAVE PARAMETER CHAR COUNT
12760  005227        LDB TMP1     GET COUNT
12761  000016        LDA C        GET CURRENT BUFFER POINTR
12762  010315        CPA AIBFM    IS THIS THE FIRST PARAMETER ?
12763  067765        JMP EDIS1    YES
12764  024254        ADB P1       COUNT FOR ONE BLANK
12765  025225  EDIS1 ADB TMP2     ADD PARAMETER CHAR COUNT
12766  035227        STB TMP1     UPDATE COUNT
12767  076404        SZB EDIS3    BUFF EXACT FIT?
12770  176403        SBM *+3      NO! BUFF OVERFILL?
12771  140404  ERBOV JSM AERR1,I  YES! ERROR
12772  031467        ASC 1,37
                *
12773  004016  EDIS3 LDB C        GET CURRENT BUFF POINTR
12774  014315        CPB AIBFM    IS THIS THE FIRST PARAMETER?
12775  067777        JMP EDIS4    YES
12776  074560        WBC A,I      DUMMY INC
12777  074570  EDIS4 WBD A,I      GET CHAR AND INCRM
13000  074540        PBC A,I      INCRM AND PLACE IN I/O BUFF
13001  055225        DSZ TMP2     ALL CHARS TRANSFERRED?
13002  067777        JMP EDIS4    NO! CONT
13003  000254  EDIS6 LDA P1       FOR NEXT ACCESS OF "PGET"
13004  067751        JMP EDIS2    LOOK FOR NEXT PARAMETER
13005  043135  EDIS5 JSM DISP     DISP INFO
13006  140436        JSM AEPON,I  GO THRU PRINT ALL
13007  067600        JMP RESIO    RESTORE AFTER I/O
                *
                *     FIND DBP ( DISP BEGIN POINTR )
                *
```

```
                      *        EXIT:      RET P+1   DISP BEGIN POINTR SET
                      *
                      *
13010  001215   FBP    LDA IOCP     GET CURRENT I/O BUFF POINTR
13011  005512          LDB DLEN     GET DISP LENGTH
13012  035711          STB T1       SET COUNTER
13013  030016          STA C        SET C-REG
13014  001214          LDA CRSP     GET CURSOR POINTR
13015  072406          SZA FBP1     SKIP IF CURSOR NOT SET
13016  050074          AND B77      GET CURSOR POSITION
13017  011512          CPA DLEN     CURSOR AT END OF DISP ?
13020  066022          JMP *+2      YES: FIND DISP BEGIN POINTR
13021  170201          RET 1        NO: DO NOT CHANGE DBP
                      *
13022  055711          DSZ T1    IF CORSOR IS ON DLEN, REPLACE THAT CHAR AND SHIFT
13023  004016   FBP1   LDB C        GET C-REG
13024  015352          CPB AEBFM    BEGIN OF EDIT BUFFER ADDR -1
13025  066037          JMP FBP2     YES
13026  015513          CPB DBP      PTR = DISPLAY BEGIN BUFFER?
13027  170201          RET 1        YES, DON'T MOVE DBP BACKWARD
13030  074760          WBC A,D      WITHDRAW ONE BYTE AND DECREM.
13031  055711          DSZ T1       DECRM COUNTER: DONE?
13032  066023          JMP FBP1     NO: CONTINUE
13033  074560   FBP3   WBC A,I      YES: INCRM POINTER
13034  004016          LDB C        GET C-REG
13035  035513          STB DBP      SET DISP BEGIN POINTR
13036  170201          RET 1
                      *
13037  005512   FBP2   LDB DLEN     GET DISP LENGTH
13040  015711          CPB T1       COUNTER CHANGED?
13041  066511          JMP EOLEB    NO: CLEAR EDIT BUFFER,GIVE EOL AND RETURN
13042  066033          JMP FBP3     ADJUST POINTR
                      *
                      *
                      *        LOAD TYPE-AIDIN DISPLAY
                      *
                      *        ENTRY:  CODE IN "SKEY"
                      *
                      *        EXIT:  ASCII CHARS OF TYPE-AID IN EDIT BUFFER
                      *        EDIT BUFFER IS CLEARED AND MODE SET TO ZERO BEFORE
                      *        TYPE AID IS PUT IN THE FIRST PART OF EDIT BUFFER
                      *
                      *                "DBP"POINTS TO FIRST CHAR
                      *
                      *
13043  140451   LTID   JSM ACLEB,I  CLEAR EDIT BUFFER
13044  040715          JSM CLMOD    SET KBD MODE
13045  042057          JSM STTM     SEARCH TABLE FOR MNEMONIC
13046  074570   LTID1  WBD A,I      GET ONE CHAR
13047  140430          JSM AISTX,I  STORE IN I/O BUFF
13050  066051          JMP *+1      "ISTO2" RETURNS ON P+2
13051  045227          ISZ TMP1     DONE?
13052  066046          JMP LTID1    NO: CONT
13053  000117          LDA B40      GET SPACE
13054  140430          JSM AISTX,I  STORE IN I/O BUFF
13055  066056          JMP *+1       "ISTO2" RETURNS ON P+2
13056  170201          RET 1        YES
                      *
                      *
                      *        SEARCH TABLE OF TYPE-AID MNEMONICS
                      *
                      *        ENTRY:  CODE IN "SKEY"
                      *
                      *              EXIT: D = FIRST CHAR PTR
                      *
                      *               TMP1=NEG. LENGTH
                      *
                      *
13057  002076   STTM   LDA TTM      S/A OF TABLE
13060  030017          STA D        SET D REG
13061  005235          LDB SKEY     GET ASCII CODE
13062  074570   STTM2  WBD A,I      GET BYTE AND INC
13063  060170          IOR M256     CONFIGURE COMPLETE NEG. LENGTH
13064  031227          STA TMP1     AND SAVE IT
13065  074570          WBD A,I      GET ASCII CODE AND INC
13066  014000          CPB A        CODE FOUND?
13067  170201          RET 1        YES
                      *
13070  010045          CPA B377     NO: END OF TABLE ?
13071  140424          JSM ASYER,I  YES,ERROR
13072  074570   STTM1  WBD A,I      NO: BYPASS THIS ENTRY
13073  045227          ISZ TMP1     DONE?
13074  066072          JMP STTM1    NO: CONT
13075  066062          JMP STTM2    NEXT ENTRY
```

```
                       *
                       *
                       *     TABLE OF TYPE-AID MNEMONICS
                       *
                       *     EACH ENTRY ISCOMPOSED OF:
                       *
                       *     -LENGTH (OF MNEMONIC)
                       *
                       *     KEY ASCII CODE
                       *
                       *     MNEMONIC ASCII CHARACTERS
                       *
                       *
13076  113077  TTM     DEF *+1,I
13077  176033          OCT 176033     -4,33
13100  066151          DEC 27753      LI
13101  071564          DEC 29556      ST
13102  175435          OCT 175435     -5,35
13103  062562          DEC 25970      ER
13104  060563          DEC 24947      AS
13105  062775          OCT 62775      E,-3
13106  017162          OCT 17162      36,R
13107  061546          OCT 61546      CF
13110  176437          OCT 176437     -3,37
13111  066144          OCT 66144      LD
13112  063373          OCT 63373      F,-5
13113  016146          OCT 16146      34,F
13114  062564          DEC 25972      ET
13115  061550          DEC 25448      CH
13116  177777          DEC -1         END-OF-TABLE
                       *
                       *
                       *     PRINT ALL EXECUTION
                       *
                       *  EPKBD ENTRY:  PRINT KEYBOARD BUFFER(KBUFF) IF PRINT-ALL IS
                       *  SET (BIT 15 OF CFLAG)
                       *
                       *  EPON ENTRY:  PRINT I/O BUFFER(IBUFF) IF PRINT-ALL IS SET
                       *
                       *  EPNX ENTRY: PRINT I/O BUFFER REGARDLESS OF PRINT-ALL BIT
                       *
                       *  IN ALL CASES THE RESPECTIVE BUFFERS ARE PRINTED 16 CHAR AT A
                       *  TIME UNTIL NO NON BLANK (OTHER THAN EOL)  CHARACTERS REMAIN
                       *  IN THE BUFFER
                       *
                       *
13117  000307  EPKBD   LDA AKBFX      SET KBD BUFF S/A
13120  005232          LDB CFLAG
13121  176406          SBM EPPP       SKIP IF PRINT-ALL SET
13122  170201          RET 1
                       *
13123  001232  EPON    LDA CFLAG      GET CONTROL FLAG
13124  172402          SAM EPNX       PRINT-ALL?
13125  170201          RET 1          NO
                       *
13126  000314  EPNX    LDA AIBFX      I/O BUFFER S/A
13127  031222  EPPP    STA L          SET "GNEXT" POINTR
13130  030017          STA D          SET D-REG
13131  140442  EPON1   JSM ACPST,I    CHECK PRINTER STATUS
13132  004127          LDB P16
13133  035735          STB T21        SET 16 CHAR COUNTR
13134  140501  EPON3   JSM AGNXT,I    GET NEXT CHAR (BLANKS IGNORED)
13135  010053          CPA EOL        END OF INFO ?
13136  066150          JMP EPON4      YES: COMPLETE WITH BLANKS
13137  074576          WBD R6,I       SEND CHAR TO HARDWARE
13140  055735          DSZ T21        16 CHARS OUT ?
13141  066145          JMP EPON2      NO
13142  140443          JSM APRNT,I    YES: PRINT ONE LINE
13143  000017          LDA D          RESTORE L POINTER
13144  066127          JMP EPPP       PRINT MORE LINES
13145  004017  EPON2   LDB D          GET CURRENT SOURCE POINTR
13146  035222          STB L          UPDATE "GNEXT" POINTR
13147  066134          JMP EPON3      LOOP
                       *
13150  000017  EPON4   LDA D          SEE IF BUFFER WAS EMPTY
13151  010314          CPA AIBFX
13152  066160          JMP EPON6      I/O BUFFER WAS EMPTY
13153  010307          CPA AKBFX
13154  066160          JMP EPON6      KBD BUFFER WAS EMPTY
13155  000127          LDA P16        SEE IF LINE TO PRINT IS NULL
13156  011735          CPA T21
13157  170201          RET 1          YES, DONE
13160  000117  EPON6   LDA B40        GET A BLANK
13161  030006  EPON5   STA R6         SEND A BLANK TO PRINTER HARDWARE
```

```
13162  055735        DSZ T21       DONE?
13163  066161        JMP EPONS     NO
13164  164443        JMP APRNT,I   PRINT ONE LINE
                *
                *
                *     ROM POWER REDUCTION LOOP
                *
                *        EXIT: RET P+1 CURSOR SET
                *
                *
                *
13165  001207   RPRL  LDA .WMOD    GET NEW KEY FLAG
13166  170201         RET 1
                *
                *
                ***************************************************************
                *
                *  KEYCODE CONVERSION TABLES
                *
                *        EOL (LAZY T): 177
                *
                *
                *         KEYCODES      54 - 140 (SHIFTED)
                *
13167  013170   KTBL2 DEF *+1
13170  036055         OCT 36055      , - : < =
13171  037057         OCT 37057      . / : > /
13172  023441         OCT 23441      0 1 : ' !
13173  021043         OCT 21043      2 3 : " #
13174  022045         OCT 22045      4 5 : $ %
13175  023100         OCT 23100      6 7 : & @
13176  055535         OCT 55535      8 9 : [ ]
13177  000073         OCT 73          NULL ; : NULL ;
13200  000075         OCT 75         NULL = : NULL =
13201  000072         OCT 72         NULL ? : NULL :
13202  000214         OCT 214        NULL SK0 : NULL SK12
13203  106616         OCT 106616     SK1 SK2 : SK13 SK14
13204  107620         OCT 107620     SK3 SK4 : SK15 SK16
13205  110622         OCT 110622     SK5 SK6 : SK17 SK18
13206  111624         OCT 111624     SK7 SK8 : SK19 SK20
13207  112626         OCT 112626     SK9 SK10 : SK21 SK22
13210  113400         OCT 113400     SK11 NULL : SK23 NULL
13211  030061         OCT 30061      P0 P1 : P0 P1
13212  031063         OCT 31063      P2 P3 : P2 P3
13213  032065         OCT 32065      P4 P5 : P4 P5
13214  033067         OCT 33067      P6 P7 : P6 P7
13215  034071         OCT 34071      P8 P9 : P8 P9
13216  027054         OCT 27054      . , : . ,
13217  000000         OCT 0          NULL NULL : NULL NULL
13220  000000         OCT 0          NULL NULL : NULL NULL
13221  056000         OCT 56000      ^ NULL : SQR NULL
13222  057400         OCT 57400      ENTER EXP. NULL : UNDERSCORE NULL
                *
                *        KEYCODES       101 - 131 (UNSHIFTED)
                *
13223  013224   KTBL1 DEF *+1
13224  000200         OCT 200        NULL SK0
13225  100602         OCT 100602     SK1 SK2
13226  101604         OCT 101604     SK3 SK4
13227  102606         OCT 102606     SK5 SK6
13230  103610         OCT 103610     SK7 SK8
13231  104612         OCT 104612     SK9 SK10
13232  105400         OCT 105400     SK11 NULL
13233  030061         OCT 30061      P0 P1
13234  031063         OCT 31063      P2 P3
13235  032065         OCT 32065      P4 P5
13236  033067         OCT 33067      P6 P7
13237  034071         OCT 34071      P8 P9
13240  027054         OCT 27054      . ,
                *
                ***************************************************************
                *
                *
                *     RECALL KEY
                *
                *  SETS MODE = 0, SETS DBP TO START OF EDIT BUFFER, CLEARS CURSOR
                *  IF LAST KEY WAS RECALL(BIT 5 OF CFLAG) THEN KBUFF AND RBUFF
                *  ARE SWAPPED
                *  SETS BITS 5,6 OF CFLAG(RECALL BITS)
                *
                *  THE KBD BUFFER IS TRANSFERRED TO THE I/O  BUFFER UNLESS
                *  STATE = 2 (LIVE KBD)
                *
                *  IOCP AND OLCP ARE SET TO THE CHAR AFTER THE LAST NON-BLANK
```

```
                    *  CHAR IN THE RECALLED LINE
                    *
                    *  IF THE COMPILE ERROR FLAG (CERR) IS SET THEN IOCP, DBP, AND
                    *  CRSP ARE SET SO THE CURSOR WILL BE DISPLAYED ON THE PROPER
                    *  CHAR IN THE EDIT BUFFER
                    *  CERR SHOULD ALWAYS POINT INTO THE KBD(KBUFF) BUFFER
                    *  AN OFFSET IS CALCULATED FROM THE START OF THIS BUFFER
                    *  USING THE ABSOLUTE ADDR IN CERR.  IOCP, DBP ARE THEN
                    *  THEN SET TO THEIR CORRECT ADDRESSES IN THE EDIT BUFFER
                    *  USING THIS OFFSET.  NOTE IF IN LIVE KBD THEN THE EDIT BUFFER
                    *  IS THE KBD BUFFER, OTHERWISE IT IS THE I/O BUFFER
                    *  AN ADDITIONAL TEST IS MADE TO INSURE THE THE CURSOR IS NOT
                    *  ON THE 81ST CHAR. IF SO IT IS PUT ON THE 80TH CHAR
                    *
                    *
13241  040715  RECL  JSM CLMOD     SET KBD MODE
13242  001351        LDA AEBFX     SET DISPLAY BEGIN PTR
13243  031513        STA DBP
13244  000177        LDA P0        C[illegible] CURSOR POINTER
13245  031214        STA CRSP
13246  001232        LDA CFLAG
13247  170704        RAR 5         SEE IF PREVIOUS KEY = RECALL
13250  073017        SLA RNORE     DON'T SWAP BUFFERS IF NOT
                    *
13251  000306        LDA AKBUF     S/A OF KBD BUFFER
13252  030016        STA C         SET POINTER
13253  000322        LDA ARBUF     S/A OF RESERVE BUFFER
13254  030017        STA D
13255  000112        LDA P41       41 WORDS TO TRANSFER
13256  031711        STA T1        SET COUNTER
13257  070760  RLOOP WWC A,D       GET A WORD FROM KBD BUFFER
13260  070771        WWD B,D       GET A WORD FROM RESERVE BUFFER
13261  070541        PWC B,I       PUT WORD IN KBD BUFFER
13262  070550        PWD A,I       PUT WORD IN RESERVE BUFFER
13263  044016        ISZ C         BUMP BUFFER POINTERS
13264  044017        ISZ D
13265  055711        DSZ T1        SEE IF DONE
13266  066257        JMP RLOOP     CONTINUE IF NOT
                    *
13267  001232  RNORE LDA CFLAG     GET CONTROL FLAG AGAIN
13270  060066        IOR B140      SET BIT 5,6
13271  031232        STA CFLAG     RESTORE CONTROL FLAG
13272  001257        LDA CSTAT     SEE IF LIVE KBD KEY
13273  010145        CPA P2
13274  066300        JMP RELKB     YES, DO NOT TRANSFER KBD TO I/O BUFFER
13275  000306        LDA AKBUF     TRANSFER KBD TO I/O BUFFER
13276  004315        LDB AIBFM
13277  042447        JSM TRBX
                    *
13300  140500  RELKB JSM AEOLN,I   GET ADDR OF LAST CHARACTER
13301  031213  RELLL STA OLCP      SET PTRS
13302  031215        STA IOCP
                    *
13303  005316        LDB CERR      GET COMPILE ERROR FLAG
13304  076432        SZB RECEX     SKIP IF NOT SET
                    *
13305  000310        LDA AKBFM     KBD BUFF S/A
13306  140362        JSM AFBAD,I   FIND BYTE OFFSET OF ERROR POSITION
13307  031214        STA CRSP      SET CURSOR OFFSET
13310  004177        LDB P0        CLEAR COMPILE ERROR FLAG
13311  035316        STB CERR
13312  001352        LDA AEBFM     GET EDIT BUFF S/A
13313  005214        LDB CRSP      ERROR BYTE OFFSET
13314  024257        ADB M1        MAKE RELATIVE TO BUFF S/A
13315  140401        JSM AADBA,I   FIND ABSOLUTE ADDR OF ERROR
                    *
13316  031215  REC10 STA IOCP      SET PTR TO ERROR POSITION
13317  005353        LDB AEBFL     SEE IF CURSOR PAST LAST POSSIBLE CHAR
13320  024257        ADB M1
13321  015215        CPB IOCP
13322  066342        JMP REC11     YES, SET TO LAST POSSIBLE CHAR
13323  005213        LDB OLCP      SEE IF CURSOR >= OLCP
13324  140362        JSM AFBAD,I
13325  020257        ADA M1
13326  172004        SAP RELCR     O[illegible] NOT
13327  001215        LDA IOCP      SE[illegible] OLCP = 1 CHAR PAST IOCP
13330  004254        LDB P1
13331  042415        JSM DLCH4     SET OLCP
                    *
13332  005214  RELCR LDB CRSP      SEE IF ERROR OFFSET > OLEN
13333  174040        TCB
13334  025512        ADB OLEN
13335  176402        SRM RECL3     B= OLEN - ERROR OFFSET
13336  170201  RECEX RET 1
                    *
```

```
13337  001512  RECL3 LDA OLEN      SET CURSOR TO LAST DISPLAY POSITION
13340  031214        STA CRSP
13341  164446        JMP AFBP,I    FIND DISPLAY BEGIN PTR AND RETURN P+1
                *
13342  176301  REC11 SAP *+1,S     ADDR OF LAST POSSIBLE CHAR
13343  000001        LDA B
13344  066316        JMP REC10     SET OLCP,IOCP
                *
                *
                ******************************************************************
                *
                *
                *  CLEAR KEY  MODE = 0,1,2
                *  SETS MODE =0; CLEARS EDIT BUFFER, RESETS EDIT PTRS
                *  IF FETCH BIT OF CFLAG(BIT 1) IS SET THE SPECIAL
                *  KEY NUMBER IS DISPLAYED
                *
                *
                *
                *
                *
13345  140452  CLEAR JSM AEOLB,I  PUT EOL IN DISPLAY
13346  040715        JSM CLMOD     SET MODE = 0
13347  001232        LDA CFLAG     GET CONTROL FLAG
13350  170500        SAR 1         POSITION SPECIAL KEY FLAG - BIT 1
13351  073006        SLA CLMMD     CLEAR MODE IF SPECIAL NOT TO BE DEFINED
13352  164474        JMP AKEYN,I   DISPLAY KEY #,PUT EOL IN I/O BUFFER, RET 2-NO DISP
                *
                *
                ********************
                *
                * CLEAR KEY IN ENTER (STATE=4), OR LIVE KBD (STATE=2)
                * IF ENTER A QUESTION MARK IS PUT IN THE I/O BUFFER
                * AND THE MODE IS SET TO 4
                *
                *
13353  140452  CLEEN JSM AEOLB,I  PUT EOL IN EDIT BUFFER
13354  040715        JSM CLMOD     SET MODE = 0
13355  001257        LDA CSTAT     RETURN IF LIVE KBD
13356  010145        CPA P2
13357  170201  CLMMD RET 1         STATE = 2 SO MUST BE LIVE KBD
13360  000226        LDA QMRKB     GET "?" AND BLANK
13361  130313        STA AIBUF,I   AND PLACE IN I/O BUFFER
13362  064717        JMP STELM     SET MODE = 4, RETURN
                *
                *
                *
                *      DELETE CHARACTER EXECUTION
                *
                *      ENTRY: INFO IN I/O BUFF
                *
                *
13363  001214  DLCH  LDA CRSP      GET CURSOR POINTR
13364  072002        RZA *+2       SET ?
13365  170201        RET 1         NO
                *
13366  001215        LDA IOCP      GET I/O BUFF CURRENT POINTR
13367  011213        CPA OLCP      SEE IF AT LAST CHARACTER
13370  066420        JMP DLCH2     YES
13371  004254        LDB P1
13372  140401        JSM AADBA,I   GET IOCP + 1 ADDR
13373  011213        CPA OLCP      CURSOR ON LAST ENTERED CHAR?
13374  066420        JMP DLCH2     YES
13375  005353        LDB AEBFL     GET END OF BUFFER ADDR
13376  176301        SAP *+1,S     PT TO FIRST BYTE
13377  001215        LDA IOCP      GET IOCP AGAIN
13400  030017        STA D         SET DESTIN. POINTR
13401  030016        STA C         SET SOURCE POINTR
13402  074560        WBC A,I       DUMMY WITHDRAW; ADJUST POINTR
13403  074560        WBC A,I       POINT TO "DELETE CHAR" +1
13404  074560  DLCH1 WBC A,I       GET FIRST CHAR AND INCRM
13405  074550        PBD A,I       INCRM AND STORE CHAR
13406  014016        CPB C         LAST CHAR TAKEN?
13407  066411        JMP *+2       YES
13410  066404        JMP DLCH1     NO; TRANSFER NEXT CHAR LEFT
13411  000117        LDA B40       SET LAST CHAR = BLANK
13412  074740        PBC A,D
13413  001213        LDA OLCP      GET OLD CURRENT POINTER
13414  004257        LDB M1
13415  140401  DLCH4 JSM AADBA,I   UPDATE OLD CURRENT POINTER
13416  031213  DLCH3 STA OLCP      UPDATE OLD CURRENT POINTR
13417  170201        RET 1
                *
13420  000117  DLCH2 LDA B40       GET BLANK
```

```
13421   005215          LDB IOCP     GET I/O BUFF CURRENT POINTR
13422   034016          STB C        SET C-REG
13423   074540          PBC A,I      INCRM AND DELETE CURSOR CHAR
13424   000177          LDA P0
13425   031214          STA CRSP      CLEAR CURSOR POINTR
13426   000257          LDA M1       SET FORWARD PASS FLAG
13427   066416          JMP DLCH3    CLEAR DLCP POINTR
                  *
                  *************************************************************
                  *
                  *  ATRBF TRANSFER BUFFERS
                  *
                  *  CLEARS COMPILE ERROR FLAG
                  *  IF MODE = 4  LEAVES BUFFERS ALONE
                  *  SETS MODE = 4, RETURNS IF LIVE KBD
                  *  ALSO LEAVES BUFFERS ALONE IF LAST KEY WAS RECALL
                  *
                  *  TRANSFERS KBD BUF ,  TO RBUFF(RESERVE BUFFER)
                  *  AND THEN TRANSFER. /O BUFFER TO KBD BUFFER
                  *
                  *
                  *
13430   000177    TRBUF LDA P0       CLEAR COMPILE ERROR FLAG
13431   031316          STA CERR
13432   001256          LDA MODE     LEAVE BUFFERS ALONE IF MODE = 4
13433   010143          CPA P4
13434   170201          RET 1
13435   040717          JSM STELM    SET MODE = 4
13436   001257          LDA CSTAT    DON'T TRANS FER TO LIVE KBD IF STATE = 2
13437   010145          CPA P2
13440   170201    TREC  RET 1
13441   001232          LDA CFLAG    DON'T TRANSFER IF LAST KEY = RECALL
13442   170705          RAR 6
13443   073475          RLA TREC     RETURN IF BIT IS SET
13444   042462          JSM KBREB    TRANSFER KBD BUFF TO RESERVE BUFF
13445   000313    TRB2  LDA AIBUF    I/O BUFF S/A
13446   004310          LDB AKBFM    KBD BUFF S/A
13447   030016    TRBX  STA C        SET SOURCE ADDR
13450   034017          STB D        SET DESTINATION ADDR
13451   000112          LDA P41      BUFF LENGTH
13452   031230          STA TMP5     SET COUNTR
13453   070560    TRB3  WWC A,I      GET WORD AND INCRM
13454   070550          PWD A,I      PLACE WORD AND INCRM
13455   055230          DSZ TMP5     DONE ?
13456   066453          JMP TRB3     NO
13457   170201          RET 1
                  *
                  ******************
                  *
                  *  KBREB   TRANSFER KDB BUFFER(KBUFF=LIVE KBD BUFFER) TO
                  *  RESERVE BUFFER
                  *
                  ******************
                  *
13460   000177    KBTRB LDA P0       CLR ERROR CURSOR FLAG
13461   031316          STA CERR     USED BY LIVE KBD
                  *
13462   000306    KBREB LDA AKBUF    KBD BUFF S/A
13463   004323          LDB ARBFM    RESERVE BUFF S/A
13464   066447          JMP TRBX     TRANSFER AND RETURN
                  *************************************************************
                  *
                  *
                  * CLEBF- ACLEB   CLEAR EDIT BUFFER TO BLANKS, RESET EDIT PTRS IOCP
                  *   OLCP, DBP, CRSP
                  *
                  *  IF MODE = 4 AND IN LIVE KBD , KBD BUFFER IS TRANSFERED TO RESERVE
                  *  TO RESERVE BUFFER.  TEST FOR LIVE KBD DONE BY COMPARING
                  *  ERROR BYPASS LINK (ERRBP) TO LIVE KBD ERROR ROUTINE
                  *  MIGHT BE BETTER TO CHECK FOR STATE = 2
                  *
                  *
                  *  CLBF1 ENTRY A= START ADDR-1
                  *              B= LAST ADDR
                  *  MEMORY BETWEEN A-1 AND B INCLUSIVELY IS CLEARED TO BLANKS
                  *
                  *
                  *
13465   001256    CLEBF LDA MODE     IF MODE = 4 AND THIS IS A LIVE
13466   010143          CPA P4       KBD KEY THEN TRANSFER LIVE KBD
13467   066471          JMP *+2      BUFFER TO RESERVE BUFFER BEFORE
13470   066474          JMP CLBF3    THE LIVE KBD BUFFER IS CLEARED
13471   001260          LDA ERRBP    LIVE KBD KEY IF BYPASS LINK IS SET
13472   012520          CPA ALKER
```

I/O SUPERVISOR

```
13473   042460         JSM KBTRB     CONDITIONS MET SO TRANSFER
                *
13474   140475  CLBF3  JSM AEDPT,I   RESET EDIT POINTERS
13475   005353         LDB AEBFL     LAST EDIT BUFF ADDR
13476   030016  CLBF1  STA C         SET C REG
13477   000262  CLBF2  LDA TOBLN     TWO BLANKS
13500   070540         PWC A,I       CLEAR 1 WORD
13501   000016         LDA C         GET WORD POINTER
13502   172601         SAM *+1,C     CLEAR BIT 15
13503   010001         CPA B         DONE ?
13504   170201         RET 1         YES
                *
13505   066477         JMP CLBF2     NO! CONT
                *
                ***************************************************************
                *
                *
                *    CLEAR I/O BUFFER LEAVE EDIT PTRS ALONE
                *
13506   000315  CLBIO  LDA AIBFM     START ADDR
13507   004316         LDB AIBFL     STOP ADDR
13510   066476         JMP CLBF1     CLEAR BUFF AND RETURN
                *
                *
                ***************************************************************
                *
                * AEOLB-EOLEB  SAMEAS ACLEB-CLEBF EXCEPT THAT IT SETS AN EOL
                * AS THE FIRST CHAR OF THE EDIT BUFFER
                *
                *
13511   042465  EOLEB  JSM CLEBF
13512   000214  EOLBB  LDA EOLB      CLEAR I/O BUFF, SET PTRS, PUT EOL IN EDIT BUFF
13513   131350         STA AEBUF,I
13514   170201         RET 1
                *
                ***************************************************************
                *
                * CLCMB  CLEAR COMPILE BUFFER
                *
                ******************
                *
13515   000304  CLCMB  LDA ACBUF     COMPILE BUFF S/A -1
13516   004305         LDB ACLMT     STOP ADDR
13517   066476         JMP CLBF1
                *
                *
```

LIVE KEYBOARD ROUTINES

```
                *******************************************************
                *
                *
                *    LIVE KEYBOARD
                *
                *
                *******************************************************
                *
                *
                * EQUATES
                *
                *
        077605  LKR    EQU LKTMP+0   DEDICATED WORD TO SAVE R
        077606  BPLNK  EQU LKTMP+1   DEDICATED WORD TO SAVE ERROR BYPASS LINK
        077607  LWHER  EQU LKTMP+2   DEDICATED WORD TO SAVE WHERE
                *
        077611  LXCMM  EQU LKTMP+4   DEDICATED WORD TO SAVE XCOMM
        077613  RENFL  EQU LKTMP+6   RENUMBER OF GTO AND GSB FLAG
                *      LKTMP+7 TO +13    SAVE TEMPORARIES USED BY LIVE KBD KEY PROC
                *
                *
                * ADDRESSES
                *
                *
13520   013646  ALKER  DEF LKERR     LIVE KEYBOARD ERROR TRAPPING ROUTINE ADDRESS
13521   100271  ALKEM  DEF LKERM,I   ADDRESS OF THE FIRST CHARACTER OF THE ERROR MESSAGE
13522   077614  ASVLK  DEF LKTMP+7   START ADDR TO SAVE TEMPS
13523   077227  ACST9  DEF CSTMP+9   START ADDR OF CONTROL SUP TEMPS TO SAVE
13524   077350  AEBST  DEF AEBUF     START ADDR OF R/W EDIT PTRS
                *
                *
                * CONSTANTS
                *
```

```
                        *
13525   040000  XBIT  OCT 040000   SET ONLY BIT 14 OF XCOMM
                        *
                        ****************
                        *
                        * LKE:  LIVE KEYBOARD ENABLE.
                        *
                        ****************
                        *
13526   000177  ELKE  LDA P0       CLEAR LIVE KBD DISABLE FLAG
13527   031623  ELK1  STA LKFLG
13530   164365        JMP AINTX,I  RETURN TO INTERPRETER
                        *
                        ****************
                        *
                        * LKD:  LIVE KEYBOARD DISABLE
                        *
                        ****************
                        *
13531   000254  ELKD  LDA P1       DISABLE LIVE KBD
13532   066527        JMP ELK1
                        *
                        ****************
                        *
                        *  LKPRC: PROCESS A KEY, EXTENSION OF KDB INT SERV ROUTINE
                        *          ROUTINE IN "IOSP".
                        *  ALLOWS LIVE KBD ONLY IF STATE = 2
                        *  BEEPS OTHERWISE
                        *
                        *  SAVES TEMPS T1-T5, TMP1,TMP5: ALSO USES TMP8 BUT
                        *  DOESN'T SAVE IT
                        *
                        *  USES ERRBP TO TRAP KEY ERRORS, SAVES R IN CASE OF AN ERROR
                        *  AND SETS EDIT POINTERS TO EDIT KDB(KBUFF) BUFFER
                        *
                        ****************
                        *
13533   001257  LKPRC LDA CSTAT    IGNORE KEY IF STATE #2
13534   010145        CPA P2       =2?
13535   066537        JMP *+2      YES
13536   064703        JMP BEEP     IGNORE KEY,BEEP, AND RETURN
                        *
13537   000335        LDA ATMP     SAVE T1-T5 IN LKTMP+7,13
13540   006522        LDB ASVLK
13541   071404        XFR 5
13542   002523        LDA ACST9    SAVE TMP1,TMP5
13543   024142        ADB P5
13544   071401        XFR 2        TMP8 ALSO USED BUT NOT SAVED/RESTORED
                        *
13545   000003        LDA R        SAVE RETURN PTR IN CASE OF AN ERROR
13546   031605        STA LKR
13547   001260        LDA ERRBP    SAVE ERROR BYPASS LINK  FOR DAISY CHAIN
13550   031606        STA BPLNK
13551   002520        LDA ALKER    SET ERROR LINK FOR LIVE KBD PROCESSING
13552   031260        STA ERRBP
                        *
13553   000312        LDA AKBST    SWAP LIVE KBD POINTERS
13554   006524        LDB AEBST    INTO EDIT POINTERS
13555   071403        XFR 4
                        *
13556   001206        LDA .WKC     PUT KEYCODE IN A
13557   140420  LKNRL JSM AKYPR,I   PROCESS THE KEY
                        *
13560   042562        JSM LKDSP    RET1  DISPLAY BUFFER WITH DELAYS
13561   066704        JMP KREST    RET 2  DON'T DISPLAY ANYTHING
                        *
13562   004155  LKDSP LDB M11      WAIT 11 MILLISECONDS
13563   040633        JSM DELAY
13564   140432        JSM ADSPC,I  COMPLETE PREVIOUS DISPLAY
13565   140432        JSM ADSPC,I  DISPLAY EDIT BUFFER
13566   004156        LDB M13      WAIT ANOTHER 13 MILLISECONDS
13567   064633        JMP DELAY
                        *
                        ************************************************************
                        *
                        *
                        *  EXECUTE IN LIVE KBD. SET BIT 14 IN XCOMM
                        *
                        *
13570   000214  LEXKY LDA EOLB     SET FOR ECECUTION OF THE LINE
13571   130311        STA AKBFL,I
13572   002525        LDA XBIT     SET XCOMM FOR EXECUTION
13573   040744        JSM SXCMM
13574   170202        RET 2        DON'T DISPLAY ANYTHING
```

```
                        *
                        ****************
                        *
                        * LKBEX:  EXECUTE THE LIVE KEYBOARD BUFFER CONTENTS
                        *         (ACCESSED BY A JSM FROM THE XCOMM SERVICE ROUTINE.)
                        *  STACKS (PUTS A FAKE BOTTOM OF STACK ON THE EXECUTION STACK)
                        *  CHANGES THE STATE TO 3, SAVES R AND WHERE(NEEDED FOR RESUMING
                        *  FROM XCOMM SERVICE ROUTINE; CLEARS BIT 14 FROM XCOMM, SAVES
                        *  THIS XCOMM, CLEARS DISPLAY, EXECUTES LIVE KBD LINE
                        *
                        *  AN ERROR MESSAGE WILL BE LEFT IN THE DISPLAY FOR .5 SEC
                        *  SO IT CAN BE VIEWED
                        *
                        *
                        ****************
                        *
13575  140515  LKBEX JSM ASTKI,I   STACK
13576  000144        LDA P3        SET LIVE KBD EXEC STATE
13577  031257        STA CSTAT
13600  000003        LDA R         SAVE RETURN PTR IN CASE OF AN ERROR
13601  031605        STA LKR
13602  001266        LDA WHERE     SAVE WHERE WORD ALSO
13603  031607        STA LWHER
                        *
13604  004244        LDB XMASK     CLEAR LIVE KBD BIT IN XCOMM
13605  040740        JSM CLXCM
13606  031611        STA LXCMM
13607  000177        LDA P0        CLEAR XCOMM BEFORE STARTING
13610  031255        STA XCOMM
                        *
13611  042117        JSM EPKBD     GO THROUGH PRINTALL
13612  042465        JSM CLEBF     CLEAR I/O BUFFER, RESET PTRS
13613  043135        JSM DISP      CLEAR DISPLAY
13614  140417        JSM AEXCL,I   C' , ILE LINE
                        *
13615  140364  LKBE2 JSM AINTK,I   INTERPRET THE LINE
                        *
13616  140411        JSM AXCMM,I   WANTS TO BE SERVICED SO GO SERVICE XCOMM.
13617  066626        JMP LEXRR     P+1: STOP CONDITION, ABORT EXECUTION
13620  005266        LDB WHERE     P+2: XCOMM HAS BEEN SERVICED,CONTINUE
13621  066615        JMP LKBE2
                        *
13622  042641  LEXER JSM LKRES     DISPLAY ERROR MESSAGE,RES XCOMM,CLR .WKC
13623  006762        LDB M512      WAIT 512 MS FOR DISPLAY
13624  040633        JSM DELAY
13625  066627        JMP LXERR
                        *
13626  042641  LEXRR JSM LKRES     DISPLAY ERROR MESSAGE, RES XCOMM, CLR .WKC
13627  001607  LXERR LDA LWHER     REPLACE WHERE WORD
13630  031266        STA WHERE
13631  001605        LDA LKR       RESTORE JSM STACK_PTR
13632  030003        STA R
13633  140516        JSM AREST,I   RESTORE AFTER EXECUTION
13634  004155        LDB M11       WAIT FOR DISPLAY
13635  040633        JSM DELAY
13636  000145        LDA P2        SET STATE BACK TO 2
13637  031257        STA CSTAT
13640  170201        RET 1
                        *
                        *
13641  001611  LKRES LDA LXCMM     RESTORE XCOMM
13642  031255        STA XCOMM
13643  000177        LDA P0        CLEAR KEY CODE FOR WAIT ROUTINE
13644  031206        STA .WKC
13645  164433        JMP ALDSP,I   DISPLAY ERROR MESSAGE OR RESULT
                        *
                        *
                        *
                        ****************
                        *
                        * LKERR:  ERROR HANDLING ROUTINE FOR LIVE KEYBOARD EXECUTION.
                        *
                        ****************
                        *
13646  040717  LKERR JSM STELM     SET EOL MODE.
13647  040703  LKER1 JSM BEEP
13650  000177        LDA P0        SET PERIP ADDR TO THE PRINTER/DSP
13651  030011        STA PA
13652  002521        LDA ALKEM     POINT C TO THE FIRST CHARACTER OF THE ERROR MESSAGE.
13653  030016        STA C
13654  004141        LDB P6
13655  074560  LKER2 WBC A,I       SEND "ERROR " TO THE DISPLAY
13656  030004        STA R4
13657  054001        DSZ B
```

```
13660  066655         JMP LKER2
13661  000003         LDA R        GET JSM STACK PTR
13662  020257         ADA M1       PT TO JSM AERR1 ENTRY ON STACK
13663  144000         ISZ A,I
13664  100000         LDA A,I      PT TO MESSAGE XX ON STACK
13665  100000         LDA A,I      GET MESSAGE XX
13666  170707         RAR 8
13667  030004         STA R4       SEND THE FIRST CHARACTER OF THE ERROR NUMBER
13670  170707         RAR 8
13671  030004         STA R4       SEND THE SECOND CHARACTER OF THE ERROR NUMBER.
13672  000117         LDA B40      FILL OUT THE REST OF THE DISPLAY WITH BLANKS.
13673  005512         LDB DLEN
13674  024154         ADB M8
13675  030004   LKER3 STA R4
13676  054001         DSZ B
13677  066675         JMP LKER3
13700  000145         LDA P2       TRIGGER THE DISPLAY
13701  030005         STA R5
13702  001605         LDA LKR      RESTORE STACK POINTER
13703  030003         STA R
                *
13704  001606   KREST LDA BPLNK    RESTORE ERROR BYPASS LINK
13705  031260         STA ERRBP
13706  042716         JSM SWIOP    RESTORE EDIT PTRS SO PT TO I/O BUFFER
13707  002522         LDA ASVLK    RESTORE TEMPS T1-T5
13710  004335         LDB ATMP
13711  071404         XFR 5
13712  020142         ADA P5       RESTORE TMP1,TMP5
13713  006523         LDB ACST9
13714  071401         XFR 2
13715  170201         RET 1
                *
                *************************************************************
                *
                *  SWIOP  SWAPS THE ROM PTRS FOR THE I/O BUFFER INTO THE
                *         READ-WRITE EDIT POINTER LOCATIONS
                *         AND SETS THE ERROR BYPASS LINK FOR  NORMAL PROCESSING
                *
                *********************
                *
13716  000321   SWIOP LDA AIBST    TRANSFER EDIT PTRS FOR I/O BUFFER
13717  006524         LDB AEBST
13720  071403         XFR 4
13721  170201         RET 1
                *
                *
                *
                *
                *     MTABLE
                *
                *     CONSTRUCTED BY CODE CLASS AND CONTROL NUMBER
                *
                *     CLASS: BITS 0-2
                *
                *     CONTROL NUMBER (CN) BITS 3-7
                *
                *     ASCII CODE: BITS 8-15
                *
                *
                *
13722  000572   K1    OCT 572      STOP: 1,17,2
13723  001172   K2    OCT 1172     REWIND: 2,17,2
13724  003673   K7    OCT 3673     RESULT: 7,27,3
13725  004233   K10   OCT 4233     LINE INSERT: 10,23,3
13726  004663   K11   OCT 4663     LINE DELETE: 11,26,3
13727  005013   K12   OCT 5013     EXECUTE: 12,1,3
13730  005523   K13   OCT 5523     RECALL: 13,12,3
13731  006243   K14   OCT 6243     RUN: 14,24,3
13732  006423   K15   OCT 6423     STORE: 15,2,3
13733  007103   K16   OCT 7103     L.ARROW: 16,10,3
13734  007473   K17   OCT 7473    R.ARROW: 17,7,3
13735  010113   K20   OCT 10113    D.ARROW: 20,11,3
13736  010543   K21   OCT 10543    U.ARROW: 21,14,3
13737  011043   K22   OCT 11043    CLEAR: 22,4,3
13740  011623   K23   OCT 11623    PRINT ALL: 23,22,3
13741  012153   K24   OCT 12153    BACK: 24,15,3
13742  012563   K25   OCT 12563    FORWARD: 25,16,3
13743  013033   K26   OCT 13033    INSERT: 26,3,3
13744  013453   K27   OCT 13453    DELETE: 27,5,3
13745  014063   K30   OCT 14063    STEP: 30,6,3
13746  014653   K31   OCT 14653    CONTINUE: 31,25,3
13747  015604   K33   OCT 15604   LIST: 33,20,4
13750  016204   K34   OCT 16204   FETCH: 34,20,4
13751  016604   K35   OCT 16604   ERASE: 35,20,4
```

```
13752  017204  K36   OCT 17204     RECORD: 36,20,4
13753  017604  K37   OCT 17604     LOAD: 37,20,4
13754  177777        OCT -1        END-OF-TABLE
                *
                *
                ******************************************************************
                *
                *  CONSTANTS
                *
13755  000131  P89   DEC 89
13756  177724  M44   DEC -44
13757  054501  LMT1  OCT 54501
13760  000031  B31   OCT 31
13761  000065  B65   OCT 65
13762  177000  M512  DEC -512
13763  025040  BLAST OCT 25040       ASCII ASTERIK, BLANK
                *
                *
                *
                *
                ******************************************************************
                *
                *     DEFINITIONS
                *
                *
       013755  B131  EQU P89
       013756  BM54  EQU M44
       000263  MAXLN EQU FLAG
       000077  COLLN EQU B72
       000053  EOL   EQU B177
       000177  DPA   EQU P0
       000177  PPA   EQU P0
       000116  QUOTE EQU B42
       077467  LPSVA EQU LPIT
       077470  LPSVB EQU LPIT+1
       077471  LPSVC EQU LPIT+2
       077472  LPSVD EQU LPIT+3
       077473  LPSVE EQU LPIT+4
       077216  CST   EQU CSTMP
       077216  SIOCP EQU CST
       077217  .WPRT EQU CST+1
       077220  M     EQU CST+2
       077221  PLADD EQU CST+3
       077223  TMP6  EQU CST+5
       077224  K     EQU CST+6
       077225  TMP2  EQU CST+7
       077226  LNO   EQU CST+8
       077227  TMP1  EQU CST+9     TMP1,TMP5 MUST BE IN THIS ORDER
       077230  TMP5  EQU CST+10
       077231  TMP3  EQU CST+11
       077232  CFLAG EQU CST+12
       077233  TMP7  EQU CST+13
       077234  TMP4  EQU CST+14
       077235  SKEY  EQU CST+15
       077206  .WKC  EQU IOTMP
       077207  .WMOO EQU IOTMP+1
       077210  DTMP1 EQU IOTMP+2
       077211  DTMP2 EQU IOTMP+3
       077212  SPKN  EQU IOTMP+4
       077213  OLCP  EQU IOTMP+5
       077214  CHSP  EQU IOTMP+6
       077215  IOCP  EQU IOTMP+7
                *
                *
                ******************************************************************
                *
13777                ORG 13777B
13777                BSS 1         CHECKSUM!!!!!!!!!!!!!!!!!!!!!!!!!!!!!!
                *
                ********************
                *
                     END
END OF PASS 2 NO ERRORS DETECTED
```

INTERNAL FULL PRECISION MATH ROUTINES

```
*
* FULL PRECISION NUMBER:  INTERNAL FORMAT
*
*
*   EEEE EEEE EEXX XXXS    10 BIT 2'S COMPL. EXP., 5 DON'T CARE BITS
*                          MANTISSA SIGN (0=+ 1=-)
*                          EXP. RANGE = -511 TO +511
```

```
                        *     D1 . D2   D3    D4      BCD DIGITS 1-4
                        *
                        *
                        *     D5   D6   D7    D8      BCD DIGITS 5-8
                        *
                        *
                        *     D9   D10  D11   D12     BCD DIGITS 9-12
                        *
                        ****************
                        *

                        *
                        * EQUATES
                        *
              077752    RESE  EQU RES        FULL PRECISION RESULT REGISTER
              077753    RESM1 EQU RES+1
              077754    RESM2 EQU RES+2
              077755    RESM3 EQU RES+3
              077756    ZE    EQU MRW1       FULL PRECISION MATH TEMPORARY
              077757    ZM1   EQU MRW1+1
              077760    ZM2   EQU MRW1+2
              077761    ZM3   EQU MRW1+3
              077762    MT1   EQU MRW1+4
              077763    MT2   EQU MRW1+5
              077764    MT3   EQU MRW1+6
              077765    MT4   EQU MRW1+7
              077766    MT5   EQU MRW1+8
              077767    MT6   EQU MRW1+9
              000345    AR1A  EQU ADR1        ADDRESS OF AR1
              077770    AR1E  EQU AR1         EXPONENT WORD OF AR1
              077771    AR1M1 EQU AR1E+1      1ST MANTISSA WORD OF AR1
              077772    AR1M2 EQU AR1E+2      2ND MANTISSA WORD OF AR1
              077773    AR1M3 EQU AR1E+3      3RD MANTISSA WORD OF AR1
              077774    RNDT2 EQU MRW2        NORMALIZE COUNT FOR COMPARISON IN ROUND
              077775    RNDT1 EQU MRW2+1      SHIFT COUNTER FOR ROUND
              077776    NRMFL EQU MRW2+2      NORMALIZATION FLAG FOR ROUND
              077777    STBIT EQU MRW2+3      "STICKY BIT" FOR ROUND
              000127    AR2A  EQU ADR2        ADDRESS OF AR2
              000020    AR2E  EQU AR2         EXPONENT WORD OF AR2
              000021    AR2M1 EQU AR2E+1      1ST MANTISSA WORD OF AR2
              000022    AR2M2 EQU AR2E+2      2ND MANTISSA WORD OF AR2
              000023    AR2M3 EQU AR2E+3      3RD MANTISSA WORD OF AR2
              000175    BCD1  EQU B10K        BCD 1000
        14000                 ORG 14000B
                        *
        14000 066070    E77L  JMP E77         ERROR 77 LINK:  MUST BE AT 14000B.
        14001 014301    E99M  OCT 014301      E99 -  (USED BY ERROR 73)
        14002 106030    ADIFF ABS AR2E-AR1E SQUARE ROOT USES THIS
        14003 002400    BCD.5 OCT 02400       BCD 0500
        14004 077756    ZA    DEF ZE          ADDRESS OF FULL PREC. MATH TEMPORARY -- Z
        14005 077774    WPTR2 DEF AR1E+4      ADDRESS OF THE WORD BELOW AR1 (D9-D12) -- RNDT2

        14006           CHKSM BSS 1           CHECKSUM WORD FOR ADDRESSES:  14000-15777.

                        *
                        ****************
                        *
                        * INTERNAL MATH GENERAL ENTRY CONDITIONS:
                        *
                        *
                        *    DESCRIPTIONS OF THE OPERANDS ARE ON THE TOP OF THE EXECUTION
                        *    STACK.  EACH BINARY IMATH ROUTINE USES "GET2" TO POINT OPND2
                        *    TO THE OPERAND ON THE TOP OF THE STACK AND OPND1 TO THE SECOND
                        *    OPERAND ON THE TOP OF THE STACK.  EACH UNARY IMATH ROUTINE
                        *    USES "GET1" TO POINT OPND1 TO THE OPERAND ON THE TOP OF THE STACK.
                        *    AP1 IS RESET BY GET1 AND GET2 TO ELIMINATE THE OPERANDS
                        *    FROM THE EXECUTION STACK.
                        *
                        *    DON'T USE AR1, AR2, OR Z(MRW1+0 THRU MRW1+3)
                        *    TO STORE OPERANDS IN WHEN CALLING THESE IMATH ROUTINES.
                        *

                        *
                        ****************
                        *
                        * INTERNAL MATH GENERAL EXIT CONDITIONS:
```

INTERNAL FULL PRECISION MATH ROUTINES

```
                  *
                  *
                  *   THE RESULT OF EACH [MATH ROUTINE IS PLACED IN THE BASEPAGE
                  *   RESULT LOCATION "RES" AS A FULL PRECISION NUMBER.  THERE IS NO
                  *   GUARANTY THAT THE EXPONENT IS IN THE USER'S RANGE OF -99 TO +99
                  *   USE "FLTCK" TO VERIFY THIS CONDITION BEFORE MAKING THE RESULT
                  *   AVAILABLE TO THE USER.
                  *
                  *
                  ****************
                  *
                  * GET1:  ROUTINE TO UNSTACK ONE OPERAND FOR UNARY OPERATORS
                  * GET2:  ROUTINE TO UNSTACK TWO OPERANDS FOR BINARY OPERATORS
                  *
                  * ENTRY CONDITIONS:
                  *   THE "WHAT/WHERE" INFORMATION FOR THE OPERANDS MUST BE ON THE
                  *   TOP OF THE EXECUTION STACK, POINTED TO BY AP1.
                  *
                  * EXIT CONDITIONS:
                  *   OPND1 WILL CONTAIN THE VALUE ADDRESS OF THE FULL PRECISION
                  *   OPERAND 1.
                  *   OPND2 WILL CONTAIN THE VALUE ADDRESS OF THE FULL PRECISION
                  *   OPERAND 2.
                  *
                  * TEMPORARIES:  SAVEB
                  *
                  ****************
                  *
14007  043011    GET2  JSM GET1      UNSTACK THE SECOND OPERAND FROM THE TOP OF STACK.
14010  035274          STB OPND2     SAVE THE ADDRESS OF THE SECOND OPERAND IN OPND2.
14011  140611    GET1  JSM AGTAD,I   DEMAND A NUMERIC ON TOP OF STACK OR GIVE ERROR 32.
14012  000001          LDA B         RETURN THE ADDRESS IN BOTH A & B.
14013  035273          STB OPND1
14014  170201    GRET1 RET 1

                  *
                  ****************
                  *
                  * ZAR2:  TEST THE MANTISSA OF AR2 FOR ZERO/NON-ZERO
                  *
                  * ENTRY CONDITIONS:
                  *   AR2 CONTAINS THE NUMBER TO BE CHECKED
                  *
                  * EXIT CONDITIONS:
                  *   RET 1 IF AR2 = 0
                  *   RET 2 IF AR2 # 0
                  *
                  ****************
                  *
14015  000021    ZAR2  LDA AR2M1
14016  060022          IOR AR2M2
14017  060023          IOR AR2M3
14020  072474          SZA GRET1
14021  170202          RET 2
                  *
                  ****************
                  *
                  * FUNM:  FULL PRECISION UNARY MINUS
                  *
                  *   RES = - <OPND1>
                  *
                  * SPECIAL EXIT CONDITIONS:
                  *   OPND2 POINTS TO Z WHICH CONTAINS -(ARGUMENT)
                  *
                  * TEMPORARIES:  Z
                  *
                  ****************
                  *
14022  043011    FUNM  JSM GET1      COPY THE ARGUMENT INTO Z.  CHANGE
14023  043026          JSM CHS       THE SIGN OF Z.  LOAD A WITH THE ADDRESS
14024  003004          LDA ZA        OF Z.  JUMP TO THE ROUTINE THAT
14025  066050          JMP STANY     WILL CHECK FOR ZERO AND STORE THE RESULT.
                  *
                  ****************
                  *
                  * CHS:  FULL PRECISION CHANGE SIGN
                  *
                  *   OPND2 = - <A>
                  *
                  * ENTRY CONDITIONS:
```

INTERNAL FULL PRECISION MATH ROUTINES

```
                      *    A CONTAINS THE ADDRESS OF THE ARGUMENT
                      *
                      * EXIT CONDITIONS:
                      *    OPND2 CONTAINS THE ADDRESS OF Z WHICH CONTAINS -(<A>)
                      *
                      * TEMPORARIES:  Z
                      *
                      ****************
                      *
14026   007004        CHS    LDB ZA       B CONTAINS THE ADDRESS OF THE RESULT LOC.
14027   035274               STB OPND2    POINT OPND2 TO THE RESULT
14030   071403               XFR 4        COPY THE ARGUMENT INTO Z
14031   001756               LDA ZE       GET THE MANTISSA SIGN OF Z AND
14032   073302               SLA *+2,S    MAKE IT NEGATIVE.  LEAVE IT IF IT WAS POSITIVE
14033   073201               SLA *+1,C    OTHERWISE MAKE THE MANTISSA SIGN POSITIVE
14034   031756               STA ZE       THEN STORE IT
14035   170201               RET 1        AND RETURN
                      *
                      ****************
                      *
                      * FSUB:  FULL PRECISION SUBTRACTION
                      *
                      *    RES = <OPND1> + (-<OPND2>)
                      *
                      * SPECIAL EXIT CONDITIONS:
                      *    OPND2 CONTAINS THE ADDRESS OF Z WHICH CONTAINS -(SUBTRAHEND)
                      *
                      * TEMPORARIES:  Z, MT1
                      *
                      ****************
                      *
14036   043007        FSUB   JSM GET2
14037   001274               LDA OPND2
14040   043026               JSM CHS      CHANGE THE SIGN OF THE SUBTRAHEND.
14041   067043               JMP FADD+1   AND ENTER THE FULL PRECISION ADDITION ROUTINE.


                      *
                      ****************
                      *
                      * FADD:  FULL PRECISION ADDITION
                      *
                      *    RES = <OPND1> + <OPND2>
                      *
                      * TEMPORARIES:  MT1
                      *    OPND1 & OPND2 CANNOT POINT TO AR1 & AR2.
                      *
                      ****************
                      *
14042   043007        FADD   JSM GET2     GET 2 OPERANDS OFF OF THE STACK
14043   101273               LDA OPND1,I  CALCULATE THE EXPONENT OFFSET, AND SAVE IT
14044   170405               AAR 6        FOR LATER USE
14045   105274               LDB OPND2,I
14046   174405               ABR 6
14047   174040               TCB
14050   020001               ADA B
14051   031762               STA MT1      SAVE THE OFFSET IN A MATH TEMPORARY.
14052   004345               LDB AR1A     IF THE EXPONENT OFFSET IS NEGATIVE THEN OPND2
14053   172405               SAM *+5      IS LARGER THAN OPND1
14054   001273               LDA OPND1    TRANSFER THE LARGER OPERAND TO AR1 AND
14055   071403               XFR 4        THE SMALLER OPERAND TO AR2
14056   001274               LDA OPND2    NOTE:
14057   067063               JMP *+4      LARGE AND SMALL REFER ONLY TO EXPONENT SIZE
14060   001274               LDA OPND2    AND DO NOT IMPLY ANYTHING ABOUT MANTISSA
14061   071403               XFR 4        SIZE OR SIGN.
14062   001273               LDA OPND1
14063   004127               LDB AR2A
14064   071403               XFR 4
14065   000021               LDA AR2M1    IF THE SMALLER OPERAND IS ZERO
14066   072411               SZA STAR1    STORE THE LARGER (AR1) AS THE RESULT
14067   001771               LDA AR1M1    IF THE LARGER OPERAND IS ZERO THEN
14070   072424               SZA STSMA    STORE THE SMALLER (AR2) AS THE RESULT.
14071   001762               LDA MT1      RECALL THE EXPONENT OFFSET
14072   172002               SAP *+2      MAKE THE OFFSET
14073   170040               TCA          POSITIVE
14074   004000               LDB A        SET B UP FOR A RIGHT SHIFT OF AR2.
14075   020156               ADA M13      IF THE OFFSET IS 12 OR LESS
14076   172403               SAM *+3      THEN CONTINUE AND PREPARE AR2.
14077   004345        STAR1  LDA AR1A     OTHERWISE STORE THE LARGER
14100   066050               JMP STANY
14101   076403               SZB *+3      IF B = 0 DON'T ROUND
14102   000177               LDA P0       SHIFT IN A ZERO
14103   043137               JSM FRND     USE THE FAST, NON-STICKY BIT ROUND.
14104   071700               CDC
```

INTERNAL FULL PRECISION MATH ROUTINES

```
02392000 14105  001770         LDA AR1E      ADD THE SIGNS OF THE TWO MANTISSAS TOGETHER
02393000 14106  020020         ADA AR2E      IF THEY ARE DIFFERENT, SUBTRACT
02394000 14107  073413         RLA .SUB      OTHERWISE, ADD THE MANTISSAS.
02395000                *
02396000 14110  071200  .ADD   FXA           ADD THE TWO MANTISSAS
02397000 14111  072304         SDS *+4
02398000 14112  001770         LDA AR1E      IF NO CARRY IS GENERATED THEN THE AR1
02399000 14113  030020         STA AR2E      EXPONENT IS THE RESULT EXPONENT
02400000 14114  066047  STSMA  JMP STAR2     STORE AR2 AS THE RESULT
02401000                *
02402000 14115  000254         LDA P1        IF A DECIMAL CARRY OCCURS SHIFT A ONE INTO
02403000 14116  004254         LDB P1        AR2 AND SET B TO INCREMENT THE AR1 EXPONENT.
02404000 14117  043137         JSM FRND      CALL THE FAST, NON-SHITTY BIT ROUNDING ROUTINE.
02405000 14120  004073         LDB P64
02406000 14121  066041         JMP UAR2E     JUMP TO THE UPDATE AR2 EXPONENT ROUTINE
02407000                *
02408000 14122  043015  .SUB   JSM ZAR2      IF AR2 IS ZERO AFTER ALIGNING
02409000 14123  067077         JMP STAR1     THEN STORE AR1 AS THE RESULT.
02410000 14124  071040         CMY           OTHERWISE, COMPLEMENT AR2 AND
02411000 14125  071200         FXA           ADD THE MANTISSAS
02412000 14126  072303         SDS *+3       IF THERE WAS A CARRY, AR2 IS THE RESULT.  IF THERE
02413000 14127  071040         CMY           WAS NO CARRY, AR2 IS THE 10'S COMP. OF THE RESULT
02414000 14130  045770         ISZ AR1E      AND THE SIGN OF AR1 IS OPPOSITE OF THE RESULT SIGN.
02415000 14131  071500         NRM           NORMALIZE AND MAKE THE NO. OF SHIFTS
02416000 14132  014133         CPB P12       BUG SHEET #1700:  CHECK FOR ZERO (B=12) BEFORE
02417000 14133  004177         LDB P0        TRYING TO UPDATE THE EXPONENT IN UAR2E.
02418000 14134  174040         TCB           NEGATIVE THEN ALIGN IT WITH THE
02419000 14135  174605         SBL 6         EXPONENT OF AR1 AND
02420000 14136  066041         JMP UAR2E     JMP TO UPDATE THE AR2 EXPONENT

02422000                *
02423000                * FRND:  FAST, NON-STICKY BIT ROUNDING ROUTINE FOR FADD.
02424000                *
02425000                * A = DIGIT TO SHIFT IN.
02426000                * B = NO. OF DIGITS TO SHIFT OUT.  B CANNOT BE ZERO.
02427000                *
02428000 14137  075500  FRND   MPY           SHIFT AR2 RIGHT <B> PLACES.
02429000 14140  020151         ADA M5
02430000 14141  172404         SAM *+4       ROUND UP ?
02431000 14142  004254         LDB P1        YES.
02432000 14143  071700         CDC
02433000 14144  071000         MWA
02434000 14145  170201         RET 1
02436000                *
02437000                ****************
02438000                *
02439000                * FMPY:  FULL PRECISION MULTIPLICATION
02440000                *
02441000                *   RES = <OPND1> * <OPND2>
02442000                *
02443000                * TEMPORARIES:  MT1, MT2, MT3, MT4, MT5, "ROUND"
02444000                *   OPND1 CANNOT POINT TO AR1 OR AR2.
02445000                *
02446000                ****************
02447000                *
02448000                * MPMPY:  MULTIPLE PRECISION MULTIPLICATION
02449000                *
02450000                *   RES =  <OPND1>   *   <OPND2>
02451000                *         (N DIGITS)    (12 DIGITS)
02452000                *
02453000                *   NOTE:  N MUST BE AN EVEN MULTIPLE OF 4.
02454000                *
02455000                * ENTRY CONDITIONS:  (MPMPY)
02456000                *   1. OPND1 CONTAINS THE ADDRESS OF THE MULTIPLIER
02457000                *   2. OPND2 CONTAINS THE ADDRESS OF THE MULTIPLICAND
02458000                *   3. A = -(N-2)
02459000                *   4. B = (N/4) + 1
02460000                *
02461000                * NO SPECIAL EXIT CONDITIONS
02462000                *
02463000                * TEMPORARIES:  SAME AS FOR FMPY.
02464000                *
02465000                ****************
02466000                *
02467000 14146  043007  FMPY   JSM GET2      GET 2 OPERANDS OFF OF THE STACK
02468000 14147  000207         LDA M10       A: LOOP DIGIT COUNTER FOR FULL PRECISION MULTIPLIER.
02469000 14150  004143         LDB P4        B: LENGTH OF A FULL PRECISION MULTIPLIER (4 WORDS)
02470000 14151  025273  MPMPY  ADB OPND1
02471000 14152  031763         STA MT2       INITIALIZE THE LOOP DIGIT COUNTER
02472000 14153  035762         STB MT1       INITIALIZE THE WORD POINTER
02473000 14154  001274         LDA OPND2     TRANSFER THE MULTIPLICAND TO AR1
02474000 14155  004345         LDB AR1A
02475000 14156  071403         XFR 4
```

INTERNAL FULL PRECISION MATH ROUTINES

```
14157  000177         LDA P0
14160  031777         STA STBIT     CLEAR THE "STICKY BIT".
14161  031774         STA RNDT2     CLEAR THE NO. OF DIGITS TO SHIFT OUT FOR ROUND LATER.
14162  005273         LDB OPND1     NOTE:  THE MULTIPLIER MUST BE CHECKED FOR ZERO UNLES
14163  024254         ADB P1        CPB M2 JMP FALSE, IS INSERTED AFTER STB MT2 IN MNXTW
14164  110001         CPA B,I       IF THE MULTIPLIER IS ZERO
14165  066032         JMP FALSE        THEN ZERO IS THE RESULT.
14166  011771         CPA AR1M1     IF THE MULTIPLICAND IS ZERO
14167  066032         JMP FALSE        THEN ZERO IS THE RESULT.
14170  000127         LDA AR2A      CLEAR THE ACCUMULATOR (AR2)
14171  071603         CLR 4
14172  055762  MNXTW  DSZ MT1       DECREMENT THE WORD POINTER
14173  105762         LDB MT1,I     GET THE NEXT 4 MULTIPLIER DIGITS
14174  076012         RZB MNXT.     ARE THEY ALL ZERO ?
14175  000023         LDA AR2M3     YES, UPDATE THE "STICKY BIT" WITH THE
14176  061777         IOR STBIT     LAST FOUR DIGITS IN AR2.
14177  031777         STA STBIT
14200  000177         LDA P0
14201  004143         LDB P4        THEN SHIFT OUT THE LAST FOUR DIGITS.
14202  075500         MRY
14203  025763         ADB MT2       AND INCREMENT THE LOOP DIGIT COUNTER BY 4
14204  035763         STB MT2
14205  067172         JMP MNXTW     NOW CHECK THE NEXT 4 DIGITS.
14206  000143  MNXT.  LDA P4        SET THE WORD DIGIT COUNT TO 4.
14207  031764         STA MT3
14210  071700  MNXTD  CDC
14211  075000         FMP           ACCUMULATE:  AR2 = AR2 + B<0-3> * AR1 + DC
14212  035765         STB MT4       SAVE MULTIPLIER DIGITS IN TEMPORARY WHILE
14213  004254         LDB P1        AR2 IS SHIFTED RIGHT ONE DIGIT.
14214  075500         MRY
14215  061777         IOR STBIT     UPDATE THE "STICKY BIT" WITH THE
14216  031777         STA STBIT     DIGIT SHIFTED OUT OF AR2 INTO A.
14217  005765         LDB MT4       THEN RESTORE THE MULTIPLIER DIGITS
14220  174503         SBR 4         AND SHIFT THE NEXT ONE INTO B<0-3>.
14221  045763         TSZ MT2       INCREMENT THE LOOP DIGIT COUNTER.
14222  067224         JMP *+2       AFTER (N-2) DIGITS HAVE BEEN PROCESSED, EXIT
14223  067227         JMP LSTWO     THE LOOP TO FINISH THE LAST TWO DIGITS.
14224  055764         DSZ MT3       DECREMENT THE DIGIT COUNT AND LOOP IF NOT ZERO
14225  067210         JMP MNXTD
14226  067172         JMP MNXTW
14227  071700  LSTWO  CDC
14230  075000         FMP           PROCESS THE (N-1)TH DIGIT (D2).
14231  004254         LDB P1
14232  075500         MRY           SHIFT AR2 RIGHT ONE DIGIT.
14233  031766         STA MT5       SAVE SHIFTED OUT DIGIT WHILE PROCESSING MULTIPLIER DI
14234  105762         LDB MT1,I     GET THE NTH DIGIT (D1) READY AND
14235  174513         SBR 12        MULTIPLY BY IT
14236  071700         CDC
14237  075000         FMP           (A = DECIMAL CARRY, IF ANY)
14240  004254         LDB P1        SET UP B FOR RIGHT SHIFT OR ROUNDING
14241  035776         STB NRMFL     SET THE "NRM" FLAG FOR ROUNDING
14242  072005         RZA D1#0      IF NO OVERFLOW, CONTINUE, OTHERWISE GO TO D1#0
14243  001766  D1=0   LDA MT5       LOAD A WITH THE JUST SHIFTED OUT DIGIT
14244  043611         JSM DECID+1   ENTER THE ROUNDING ROUTINE MIDWAY.
14245  004177         LDB P0        SET UP B FOR AR2 EXP. UPDATE
14246  067255         JMP MEXIT     AND JUMP TO THE ROUTINE THAT DOES IT.
14247  075500  D1#0   MRY           RIGHT SHIFT AR2 TO RECOVER THE HIGH ORDER DIGIT IN A
14250  001766         LDA MT5       RECALL THE PREVIOUSLY SHIFTED OUT DIGIT AND
14251  061777         IOR STBIT     ADD IT TO THE "STICKY BIT" AND THEN
14252  031777         STA STBIT     PUT IT BACK IN THE STICKY BIT
14253  043610         JSM DECID     ENTER THE ROUNDING ROUTINE MID-WAY.
14254  004073         LDB P64       INCREMENT THE MULTIPLIER EXPONENT.
14255  173201  MEXIT  SOC *+1,C     CLEAR THE OVERFLOW INDICATOR.
14256  024020         ADB AR2E      DON'T FORGET THE POSSIBLE EXPONENT INCREMENT IN DECI
14257  125273         ADB OPND1,I   B=THE EXP. MODIFIER FOR THE EXPONENT UPDATE IN UAR2E
14260  173003         SOC *+3       IF OVERFLOW OCCURRED PUT THE CORRECT
14261  125274         ADB OPND2,I   MANTISSA SIGN IN B<0> AND GO TO
14262  066065         JMP E76       THE INTERMEDIATE RESULT OVERFLOW ERROR.
14263  066041         JMP UAR2E     NOW UPDATE THE AR2 EXPONENT WITH AR1E & B.
                *
                ****************
                *
                * FDVD:  FULL PRECISION DIVISION
                *
                *   RES = <OPND1> / <OPND2>
                *
                * DVDNR:  ALTERNATE ENTRY POINT TO TRUNCATE THE QUOTIENT INSTEAD
                * (A=0)   OF ROUNDING IT.  USE BASEPAGE LINK ADIV2.
                *
                * SPECIAL EXIT CONDITIONS:
                *   RES = +/- 9.99999999999 E 511 IF DIVISOR=0 & FLAG 14=1.
                *
                * TEMPORARIES:  D, Z, MT1, MT2, MT3, MT4, MT5
                *   OPND1 CANNOT POINT TO AR1.
                *   OPND2 CANNOT POINT TO AR2.
```

```
                    *    DIVIDEND EXPONENT MAY NOT BE -512 OR THE RESULT EXPONENT
                    *    WILL BE WRONG IF THE (LDB M64) AT READY-1 IS EXECUTED.
                    *
                    ****************
                    *
14264 043007 FDVD  JSM GET2
14265 003441       LDA JSM.R     PUT THE INSTRUCTION, JSM .ROUN, IN D IF THE
14266 030017 DVDNR STA D         QUOTIENT IS TO BE ROUNDED.  D=0 FOR TRUNCATION.
14267 001273       LDA OPND1     COPY THE DIVIDEND INTO AR2
14270 004127       LDB AR2A
14271 071403       XFR 4
14272 001274       LDA OPND2     COPY THE DIVISOR INTO AR1
14273 004345       LDB AR1A
14274 071403       XFR 4
14275 003004       LDA ZA        INITIALIZE THE QUOTIENT WORD POINTER
14276 031763       STA MT2       AND CLEAR THE QUOTIENT TEMPORARY (WHICH
14277 071604       CLR 5         INCLUDES MT1)
14300 000177       LDA P0        CLEAR A FOR COMPARISONS TO FOLLOW
14301 004020       LDB AR2E      LOAD THE EXPONENT WORD OF AR2 FOR ITS SIGN
14302 011771       CPA AR1M1     IF THE DIVISOR IS ZERO
14303 067405       JMP E66       CHECK FLAG 14 FOR ERROR 66 -- DIVISION BY ZERO
14304 010021       CPA AR2M1     IF THE DIVIDEND IS ZERO
14305 066032       JMP FALSE     THEN STORE ZERO AS THE QUOTIENT
14306 071040       CMY           COMPLEMENT THE DIVIDEND
14307 000257       LDA M1        INITIALIZE THE FDV COUNT TO -1
14310 004127       LDB P16       INITIALIZE THE TOTAL DIGIT COUNT TO 16
14311 035764       STB MT3
14312 045763 DNXTW ISZ MT2       BUMP THE QUOTIENT WORD POINTER
14313 004143       LDB P4        SET THE WORD DIGIT COUNTER TO 4
14314 035765       STB MT4
14315 174603 DNXTD SBL 4         CLEAR LOCATION FOR NEXT CALCULATED DIGIT
14316 135763       STB MT2,I     SAVE THE QUOTIENT DIGITS
14317 031766       STA MT5       STORE THE FDV COUNT
14320 071700 FDVLP CDC
14321 075041       FDV
14322 125763       ADB MT2,I     UPDATE THE NEW QUOTIENT DIGIT
14323 024254       ADB P1        INCREMENT THE NEW QUOTIENT DIGIT
14324 135763       STB MT2,I     SAVE THE QUOTIENT DIGITS
14325 045766       ISZ MT5       INCREMENT THE FDV COUNT AND LOOP IF NON-ZERO
14326 067320       JMP FDVLP
14327 043015       JSM ZAR2      JUMP OUT OF THE MAIN LOOP IF AN EXACT
14330 067351       JMP PFQUO     QUOTIENT HAS BEEN FOUND (DIVIDEND=0)
14331 071040       CMY           OTHERWISE RESTORE THE DIVIDEND
14332 071200       FXA           TO ITS LAST POSITIVE VALUE.
14333 105763       LDB MT2,I     DECREMENT AND SAVE THE LAST CALCULATED DIGIT
14334 024257       ADB M1        NOTE:  THIS MUST BE DONE IN B ( NOT DSZ )
14335 135763       STB MT2,I           BECAUSE OF POSSIBLE JUMP TO "DONE".
14336 071040       CMY           COMPLEMENT THE DIVIDEND AGAIN
14337 000177       LDA P0
14340 075541       MLY           SHIFT THE DIVIDEND LEFT ONE DIGIT
14341 020207       ADA M10       COMPUTE THE NEXT FDV COUNT
14342 055764       DSZ MT3       DECREMENT THE TOTAL DIGIT COUNT
14343 172402       SAM *+2       THIS SHOULD ALWAYS JUMP *+2
14344 067353       JMP DONE      DECREMENT THE WORD DIGIT COUNTER
14345 055765       DSZ MT4
14346 067315       JMP DNXTD     JUMP BACK TO DIGIT LOOP IF NON-ZERO
14347 067312       JMP DNXTW     JUMP BACK TO THE WORD LOOP
                    *
14350 174603       SBL 4
14351 055765 PFQUO DSZ MT4       ALIGN THE DIGITS OF THE LAST WORD
14352 067350       JMP *-2
                    *
14353 135763 DONE  STB MT2,I     STORE THE LAST DIGITS NOW THAT THEY ARE ALIGNED.
14354 003004       LDA ZA
14355 004127       LDB AR2A      PREPARE TO ROUND THE QUOTIENT
14356 071403       XFR 4
14357 071500       NRM           BUT FIRST CHECK FOR A ZERO IN THE FIRST QUOTIENT
14360 001762       LDA MT1       DIGIT.  IF ONE EXISTS, LEFT SHIFT THE ENTIRE QUOTIENT
14361 076407       SZB READY     (A = D13 D14 D15 D16)
14362 170513       SAR 12        AND USE D13 AS D12
14363 060023       IOR AR2M3
14364 030023       STA AR2M3
14365 001762       LDA MT1       A = D13 D14 D15 D16
14366 170603       SAL 4         A = D14 D15 D16 0
14367 004164       LDB M64       B = EXPONENT OF -1
                    *
14370 125273 READY ADB OPND1,I
14371 034020       STB AR2E      AR2E = EXPONENT OF DIVIDEND (WITH NORMALIZATION
14372 170713       RAR 12        OFFSET IF NECESSARY)
14373 030024       STA SE        SE = D13 OF QUOTIENT
14374 050160       AND M16       A<4-15> = UNUSED DIGITS (STICKY BIT)
14375 004177       LDB P0        A<0-2> = UNBIASED, UN-NORM, B=DIGITS TO SHIFT=0
14376 070017       EXE 0         ROUND OR NOT BASED ON ENTRY POINT.
14377 004020       LDB AR2E
```

INTERNAL FULL PRECISION MATH ROUTINES

```
14400  001770             LDA AR1E      COMPLEMENT THE EXPONENT OF THE DIVISOR
14401  170040             TCA
14402  020145             ADA P2
14403  031770             STA AR1E
14404  066041             JMP UAR2E     JUMP TO THE UPDATE AR2E ROUTINE.
                   *
                   * ERROR 66 -- DIVISION BY ZERO
                   *
14405  140564      E66    JSM ASTMA,I   STORE +/-9.99999999999 E 511 AS THE RESULT.
14406  042073             JSM ERROR
14407  033066             ASC 1,66
                   *
                   ****************
                   *
                   * FSQR:  FULL PRECISION SQUARE ROOT
                   *
                   *    RES = SQR <OPND1>
                   *
                   * SPECIAL EXIT CONDITIONS:
                   *    RES = SQR(ABS(RADICAND))  IF RADICAND<0 & FLAG 14=1
                   *
                   * TEMPORARIES:  MT1, MT2, MT3, MT4, MT5, MT6, "ROUND"
                   *
                   ****************
                   *
14410  043011      FSQR   JSM GET1
14411  001273             LDA OPND1     COPY THE RADICAND INTO AR1
14412  004345             LDB AR1A
14413  071403             XFR 4
14414  000127             LDA AR2A      CLEAR AR2
14415  071603             CLR 4
14416  001771             LDA AR1M1
14417  072002             RZA *+2       IF THE RADICAND IS ZERO
14420  066032             JMP FALSE     THEN STORE ZERO AS THE RESULT
14421  004142             LDB P5        AR2 = 5 * AR1
14422  071700             CDC           THIS IS NECESSARY SINCE DC COULD BE SET.
14423  075000             FMP
14424  004254             LDB P1        SHIFT AR2 RIGHT ONCE TO PICK UP THE HIGH ORDER
14425  075500             MRY           DIGIT FROM THE FMP.  DIVIDE BY 2 IS THE SAME AS
14426  031777             STA STBIT       (SAVE THE SHIFTED OUT DIGIT IN THE "STICKY BIT")
14427  000177             LDA P0        MULTIPLY BY 5 AND DIVIDE BY 10.
14430  005770             LDB AR1E      IF THE EXPONENT IS EVEN THEN RIGHT SHIFT AR2
14431  174610             SBL 9         ONE MORE DIGIT.
14432  176405             SBM FSQR1
14433  000177             LDA P0        THEN SHIFT AR2 RIGHT ONCE
14434  004254             LDB P1
14435  075500             MRY           AND PUT THE NEW SHIFTED OUT DIGIT IN SE FOR ROUNDING
14436  001777             LDA STBIT
14437  170602      FSQR1  SAL 3         A<3-15> = STICKY BIT, A<0-2> IS THE SPECIFICATION
14440  004177             LDB P0
14441  043564      JSM.R  JSM .ROUN     RO[illegible] AR2 BASED ON SE AND THE "STICKY BIT"
14442  000345             LDA AR1A      INITIALIZE THE RESULT WORD POINTERS 1 & 2
14443  020254             ADA P1        TO THE SECOND WORD OF THE WORKING REGISTER (AR1)
14444  031763             STA MT2           RESULT WORD POINTER 1
14445  031764             STA MT3           RESULT WORD POINTER 2
14446  071603             CLR 4         CLEAR 4 WORDS STARTING AT AR1M1 INCLUDING RNOT2
14447  001770             LDA AR1E      DIVIDE THE AR1 EXPONENT BY 2 & CLEAR THE SIGN
14450  031765             STA MT4          (SAVE THE SIGN FOR ERROR 67 TEST LATER)
14451  170400             AAR 1         & STORE IN THE AR1 EXPONENT WORD.
14452  050240             AND ZAP
14453  031770             STA AR1E
14454  003003             LDA BCD.5     INITIALIZE THE "FIVE" WORD TO BCD 0500
14455  031766             STA MT5
14456  000175             LDA BCD1      INITIALIZE THE "N" WORD TO BCD 1000
14457  031767             STA MT6
14460  001767      BLOOP  LDA MT6       IF THE LOW ORDER BCD DIGIT OF THE "N"
14461  073002             SLA *+2       WORD IS 1
14462  045764             ISZ MT3       THEN INCREMENT THE RESULT WORD POINTER # 2
14463  170703             RAR 4         ROTATE THE "N" WORD RIGHT 1 BCD DIGIT.
14464  031767             STA MT6       AND STORE.
14465  001766             LDA MT5       MASK OUT THE LAST
14466  170140             CMA           FIVE FROM THE WORKING
14467  151763             AND MT2,I     REGISTER
14470  131763             STA MT2,I     AND STORE IT.
14471  001766             LDA MT5       IF THE LOW ORDER BCD DIGIT OF THE
14472  073002             SLA *+2       "FIVE" WORD IS A FIVE
14473  045763             ISZ MT2       THEN INCREMENT THE RESULT WORD POINTER # 1
14474  170703             RAR 4         ROTATE THE "FIVE" WORD RIGHT 1 BCD DIGIT.
14475  031766             STA MT5       AND STORE.
14476  121763             ADA MT2,I     PLACE THE NEXT FIVE IN THE WORKING REGISTER
14477  131763             STA MT2,I     POINTED TO BY WORD POINTER # 1
14500  105764             LDB MT3,I     LOAD THE WORD POINTED TO BY RESULT POINTER # 2
14501  071040             CMY           COMPLEMENT AR2
14502  000135             LDA P10       INITIALIZE THE INCREMENT COUNTER TO 10
14503  031762             STA MT1
```

```
14504   135764   SLOOP STB MT3,I     UPDATE THE RESULT WORD POINTED TO BY # 2
14505   071700         CDC
14506   071200         FXA           AR2 = AR2 + AR1 (RESULT REG.)
14507   025767         ADB MT6       INCREMENT THE PROPER DIGIT OF B WITH THE "N" WORD
14510   055762         DSZ MT1       DECREMENT THE COUNTER AND EXIT LOOP IF ZERO
14511   072773         SOC SLOOP     LOOP IF NO OVERFLOW, OTHERWISE EXIT LOOP
14512   071040         CMY           COMPLEMENT AR2 (NOW IN ORIGINAL FORM)
14513   043015         JSM ZAR2      EXIT THE BIG LOOP (BLOOP) IF A PERFECT SQUARE ROOT
14514   067524         JMP PFSQR     HAS BEEN FOUND, OTHERWISE CONTINUE IN LOOP.
14515   071200         FXA           RESTORE AR2 AND
14516   000177         LDA P0
14517   075541         MLY           LEFT SHIFT IT ONE BCD DIGIT
14520   001764         LDA MT3       IF 12 DIGITS HAVE BEEN CALCULATED,
14521   013005         CPA WPTR2     THEN EXIT
14522   067545         JMP LSTLP     FROM THE BIG LOOP,
14523   067460         JMP BLOOP     OTHERWISE, CONTINUE TO LOOP.
14524   005763   PFSQR LDB MT2       A PERFECT SQUARE ROOT HAS BEEN FOUND
14525   027002         ADB ADIFF     SO INCREMENT THE LEAST SIGNIFICANT
14526   001766         LDA MT5       DIGIT, A FIVE, OF AR2 BY FIVE
14527   130001         STA B,I       AND THEN LEFT
14530   071700         CDC
14531   071200         FXA           SHIFT AR2 ONCE.
14532   000177         LDA P0        SHIFT IN A ZERO.
14533   075541         MLY
14534   072406         SZA FSQR2     IF A DIGIT WAS SHIFTED OUT OF AR2 INTO A,
14535   004254         LDB P1
14536   075500         MRY           THEN SHIFT IT BACK IN
14537   004073         LDB P64       AND
14540   042041         JSM UAR2E     INCREMENT THE EXPONENT USING UAR2E.
14541   067554         JMP E67       AND THEN CHECK FOR ERROR 67 BEFORE RETURNING
14542   173201   FSQR2 SOC *+1,C     OTHERWISE, STORE THE RESULT (AR2) AND
14543   042043         JSM UAR2E+2
14544   067554         JMP E67       CHECK FOR ERROR 67 BEFORE RETURNING.
14545   000345   LSTLP LDA AR1A      TRANSFER AR1 TO AR2 SO A LEFT SHIFT CAN BE DONE
14546   004127         LDB AR2A
14547   071403         XFR 4
14550   101764         LDA MT3,I     POSITION THE LAST DIGIT IN A<0-3>
14551   170513         SAR 12
14552   075541         MLY           SHIFT AR2 LEFT ONCE.
14553   042047         JSM STAR2     STORE AR2 AS THE RESULT.
                 *
                 * ERROR 67 -- SQUARE ROOT OF A NEGATIVE NUMBER
                 *
14554   001765   E67   LDA MT4       RECALL THE ORIGINAL EXPONENT WORD
14555   073003         SLA *+3       IF THE MANTISSA WAS POSITIVE THEN RETURN
14556   042073         JSM ERROR     ELSE, CHECK FLAG 14 FOR ERROR 67
14557   033067         ASC 1,67
14560   170201         RET 1         USED BY *-3 ONLY.  NOT USED BY E67.
                 *
                 ****************
                 *
                 * ROUND:  GENERALIZED ROUNDING ROUTINE
                 *
                 * ENTRY CONDITIONS:  (ALSO SEE TABLE BELOW)
                 *    THE NUMBER TO BE ROUNDED MUST BE IN AR2
                 *    B CONTAINS EITHER:
                 *       1.)  THE NUMBER OF THE DIGIT TO BE ROUNDED (0-12)   OR
                 *       2.)  THE NUMBER OF DIGITS TO BE SHIFTED OUT (12-0)
                 *    A<0> = 1 IF B CONTAINS THE NUMBER OF THE DIGIT TO BE ROUNDED
                 *           0 IF B CONTAINS THE NUMBER OF DIGITS TO BE SHIFTED OUT
                 *    A<1> = 1 IF AR2 IS TO BE NORMALIZED BEFORE RETURNING
                 *           0 IF AR2 IS NOT TO BE NORMALIZED BEFORE RETURNING
                 *    A<2> = 1 IF A 4-5 ROUND IS DESIRED (BIASED)
                 *           0 IF AN UNBIASED ROUND IS DESIRED
                 *    A<3-15> = 0
                 *
                 * EXIT CONDITIONS:
                 *    AR2 CONTAINS THE ROUNDED RESULT
                 *
                 * TEMPORARIES:  "ROUND" -- (STBIT, NRMFL, RNDT1, RNDT2)
                 *
                 ***********************************************
                 *   *          *           *                 *
                 * 0 * UNBIASED * UN-NORM.  * B=DIGITS TO SHIFT *
                 *   *          *           *                 *
                 ***********************************************
                 *   *          *           *                 *
                 * 1 * UNBIASED * UN-NORM.  * B=DIGIT TO ROUND  *
                 *   *          *           *                 *
                 ***********************************************
                 *   *          *           *                 *
                 * 2 * UNBIASED *    NORM.  * B=DIGITS TO SHIFT *
                 *   *          *           *                 *
                 ***********************************************
```

```
                     *   *             *            *                  *
                     * 3 * UNBIASED *     NORM. * B=DIGIT TO ROUND   *
                     *   *             *            *                  *
                     ***************************************************
                     *   *             *            *                  *
                     * 4 *    4-5     * UN-NORM. * B=DIGITS TO SHIFT *
                     *   *             *            *                  *
                     ***************************************************
                     *   *             *            *                  *
                     * 5 *    4-5     * UN-NORM. * B=DIGIT TO ROUND   *
                     *   *             *            *                  *
                     ***************************************************
                     *   *             *            *                  *
                     * 6 *    4-5     *     NORM. * B=DIGITS TO SHIFT *
                     *   *             *            *                  *
                     ***************************************************
                     *   *             *            *                  *
                     * 7 *    4-5     *     NORM. * B=DIGIT TO ROUND   *
                     *   *             *            *                  *
                     ***************************************************
14561  170603  ROUND SAL 4          ENTRY POINT TO CLEAR <SE> BEFORE STARTING TO ROUND.
14562  030024        STA SE         CLEAR THE 4 BIT SHIFT EXTEND REGISTER
14563  170503        SAR 4
14564  073003  .ROUN SLA *+3       ENTRY POINT FOR FSQR TO ROUND ON <SE>.
14565  174040        TCB            COMPUTE THE NUMBER OF DIGITS TO BE SHIFTED OUT
14566  024133        ADB P12        SAVE IT
14567  035775        STB RNDT1
14570  174040        TCB            MAKE THE NUMBER OF DIGITS TO BE SHIFTED OUT
14571  035774        STB RNDT2      NEGATIVE AND SAVE FOR COMPARISON WITH NRM RESULTS
14572  170500        SAR 1          SAVE THE NRM/DON'T NRM FLAG FOR LATER
14573  031776        STA NRMFL
14574  170500        SAR 1          SETUP THE "STICKY BIT".  ZERO IMPLIES
14575  031777        STA STBIT      UNBIASED ROUND.  NON-ZERO IMPLIES 4-5 ROUND.
14576  076512        STB DECID      IF NO. DIGITS TO SHIFT = 0, BASE THE ROUND ON SE
14577  004254        LDB P1         SET UP B FOR 1 DIGIT RIGHT SHIFT ON AR2
14600  170603 SHIFT  SAL 4          SHIFT AR2 RIGHT 1 DIGIT AND BRING IN A ZERO
14601  075500        MRY
14602  055775        DSZ RNDT1      WHEN THE PROPER NO. OF DIGITS HAVE BEEN SHIFTED
14603  067605        JMP *+2        GET OUT OF THE LOOP AND ROUND ON SE AND THE
14604  067610        JMP DECID      "STICKY BIT".
14605  021777        ADA STBIT      UPDATE THE "STICKY BIT"
14606  031777        STA STBIT
14607  067600        JMP SHIFT
14610  000024  DECID LDA SE         IF THE LAST DIGIT SHIFTED OUT IS 0,1,2,3,4
14611  020151        ADA M5         THEN DON'T ROUND UP.  IF THE LAST DIGIT IS
14612  172424        SAM NORM?      6,7,8,9 THEN ALWAYS ROUND UP.
14613  072007        RZA RNDUP
14614  001777        LDA STBIT      IF THE LAST DIGIT IS 5 AND THE "STICKY BIT"
14615  072005        RZA RNDUP      IS NON-ZERO THEN ROUND UP. IF THE "STICKY
14616  000023        LDA AR2M3      BIT" IS ZERO THEN MAKE THE CURRENT D12 OF
14617  073301        SLA *+1,S      AR2 ODD (SINCE ODD DOESN'T PROPAGATE A CARRY).
14620  030023        STA AR2M3      AND SEE IF AR2 IS TO BE NORMALIZED
14621  067636        JMP NORM?
14622  071700  RNDUP CDC            GET READY TO ADD 1 TO AR2 ON THE D12 LEVEL AND
14623  071000        MWA            WATCH FOR AN OVERFLOW CONDITION.
14624  072712        SDC NORM?      IF NO CARRY THEN CHECK FOR NORMALIZATION.
14625  000001        LDA B          B HAS BEEN 1 SINCE (SHIFT-1)
14626  075500        MRY            MAKE THE AR2 MANTISSA A FULL PRECISION ONE.
14627  173201  INCEX SOC *+1,C      NOW GET READY TO CHECK FOR EXPONENT OVERFLOW
14630  000020        LDA AR2E       ADD 1 TO THE EXPONENT AND IF OVERFLOW DOES
14631  020073        ADA P64        NOT OCCUR THEN CHECK FOR NORMALIZATION.
14632  030020        STA AR2E
14633  173003        SOC NORM?
14634  004020        LDB AR2E       GET THE SIGN OF THE AR2 MANTISSA AND
14635  066065        JMP E76        CHECK FLAG 14 FOR ERROR 76 -- INTERM. RES. OVERFLOW
14636  001776  NORM? LDA NRMFL      RECALL THE NORMALIZATION FLAG AND OBEY IT.
14637  073207        SLA RTN,C      IN THE PROCESS, CLEAR IT TO PREVENT INFINITE
14640  031776        STA NRMFL      LOOPING IF A NEW HIGH ORDER DIGIT WAS CREATED.
14641  071500        NRM
14642  014133        CPB P12        IF AR2=0 THEN DON'T INCREMENT THE EXPONENT
14643  170201        RET 1          BUT RATHER, RETURN
14644  025774        ADB RNDT2      CHECK TO SEE IF A NEW HIGH ORDER DIGIT WAS
14645  076062        RZB INCEX      CREATED.  IF SO, INCREMENT THE EXPONENT.
14646  170201  RTN   RET 1
               *
               ****************
               *
               * TSUB:  COMPARISON ROUTINE FOR THE RELATIONAL OPERATORS.
               *
               * SPECIAL EXIT CONDITIONS:
               *
               *   <B> = 0 IF (OPND1) = (OPND2)
               *   <B> = 1 IF (OPND1) > (OPND2)
               *   <B> = 3 IF (OPND1) < (OPND2)
               *
```

INTERNAL FULL PRECISION MATH ROUTINES

```
                              * TEMPORARIES:  MT1, MT2
                              *    (TEMPORARIES FOR STCHK ARE NOT INCLUDED HERE)
                              *
                              ****************
                              *
14647   101263   TSUB   LDA AP1,I
14650   050221          AND B70K
14651   004000          LDB A          B = CLASS OF OPERAND 2
14652   001263          LDA AP1        READ DOWN THE STACK TO THE WHAT WORD FOR
14653   020254          ADA P1         OPERAND 1.
14654   100000          LDA A,I
14655   021263          ADA AP1
14656   100000          LDA A,I
14657   050221          AND B70K       A = CLASS OF OPERAND 1
14660   010175          CPA B10K       IF OPERAND 1 IS NON-NUMERIC CALL THE STRINGS ROM.
14661   067663          JMP *+2        OTHERWISE CHECK OPERAND 2.
14662   067665          JMP TSUB$
14663   014175          CPB B10K       IF OPERAND 2 IS NON-NUMERIC CALL THE STRINGS ROM.
14664   067674          JMP TSUB#      OTHERWISE BOTH ARE NUMERIC SO GO TO TSUB#.
                              *
14665   001321   TSUB$  LDA STCHK      IF STCHK = 0 OR STCHK,I = -1 THE STRINGS ROM IS
14666   072404          SZA E16        NOT PRESENT SO GIVE ERROR 16.
14667   105321          LDB STCHK,I    OTHERWISE BRANCH TO THE STRINGS ROM FOR THE
14670   044001          ISZ B          COMPARISON.
14671   165321          JMP STCHK,I
                              *
                              * ERROR 16:  STRINGS ROM MISSING FOR STRING RELATIONAL COMPARISON OR
                              *            ILLEGAL ARGUMENT(S) FOR RELATIONAL COMPARISON.
                              *
14672   140404   E16    JSM AERR1,I    NON-RECOVERABLE ERROR.
14673   030466          ASC 1,16


14674   043007   TSUB#  JSM GET2       FETCH THE TWO NUMERIC OPERANDS.
14675   000016          LDA C
14676   031763          STA MT2        SAVE C IN MT2.
14677   101273          LDA OPND1,I    IF THE MANTISSA SIGNS ARE THE SAME MORE
14700   121274          ADA OPND2,I    TESTING IS NEEDED TO DETERMINE THE RELATION.
14701   073007          SLA TSUB1
14702   101273          LDA OPND1,I    THE SIGNS ARE DIFFERENT SO THE NEGATIVE OPERAND
14703   073403          RLA B=3        IS SMALLER.
14704   004254   B=1    LDB P1         (OPND1) > (OPND2)
14705   067762          JMP RESTC
14706   004144   B=3    LDB P3         (OPND1) < (OPND2)
14707   067762          JMP RESTC
14710   001273   TSUB1  LDA OPND1      MANTISSA SIGNS ARE ALIKE, CHECK FOR ZEROS.
14711   030016          STA C
14712   020254          ADA P1
14713   100000          LDA A,I        A = 1ST MANTISSA WORD OF (OPND1)
14714   005274          LDB OPND2
14715   034017          STB D
14716   024254          ADB P1
14717   104001          LDB B,I        B = 1ST MANTISSA WORD OF (OPND2)
14720   072003          RZA TSUB2
14721   076065          RZB B=3        A=0, B#0  (OPND1) < (OPND2)
14722   067761          JMP B=0        A & B ARE ZERO.  (OPND1) = (OPND2) = 0
14723   076461   TSUB2  SZB B=1        A#0, B=0  (OPND1) > (OPND2)
14724   101273          LDA OPND1,I    A & B ARE NOT ZERO.  NOW WE MUST CHECK THE
14725   170405          AAR 6          EXPONENTS.
14726   105274          LDB OPND2,I    (THE ARITHMETIC SHIFTS ARE NEEDED TO PREVENT
14727   174405          ABR 6          OVERFLOW IN THE FOLLOWING ADDITION.)
14730   174040          TCB
14731   020001          ADA B          A = (OPND1E) - (OPND2E)
14732   172007          SAP TSUB4
14733   004144   B=3?   LDB P3         ABS(OPND1) < ABS(OPND2)
14734   101273   TSUB3  LDA OPND1,I    NOW CHECK THE MANTISSA SIGN OF EITHER ONE
14735   073025          SLA RESTC      (THEY'RE THE SAME).  IF THEY ARE NEGATIVE
14736   024150          ADB M4         THEN THE RELATION IS REVERSED.
14737   174040          TCB
14740   067762          JMP RESTC
14741   072403   TSUB4  SZA TSUB5      THE EXPONENTS ARE EQUAL, CHECK THE MANTISSAS.
14742   004254   B=1?   LDB P1         ABS(OPND1) > ABS(OPND2)
14743   067734          JMP TSUB3
14744   074560   TSUB5  WBC A,I        DUMMY WITHDRAWS TO POINT TO (D1,D2) BYTES.
14745   074570          WBD A,I
14746   000141          LDA P6         THERE ARE SIX PAIRS OF DIGITS TO CHECK.
14747   031762          STA MT1
14750   074561   TSUB6  WBC B,I
14751   074570          WBD A,I
14752   174040          TCB
14753   020001          ADA B          A = (OPND2 DIGIT PAIR) - (OPND1 DIGIT PAIR)
14754   072403          SZA TSUB7      IF THEY ARE EQUAL, KEEP CHECKING.
14755   172056          SAP B=3?       ABS(OPND1) < ABS(OPND2)
14756   172464          SAM B=1?       ABS(OPND1) > ABS(OPND2)
```

INTERNAL FULL PRECISION MATH ROUTINES

```
14757   055762   TSUB7 DSZ MT1         HAVE ALL 6 DIGIT PAIRS BEEN TESTED ?
14760   067750         JMP TSUB6       NO, KEEP CHECKING.
14761   064177   B=0   LDB P0          YES, THE NUMBERS ARE EQUAL.
14762   061763   RESTC LDA MT2
14763   030016         STA C           RESTORE C FROM MT2.
14764   170201         RET 1
                 *
                 ****************
                 *
                 * FULL PRECISION LOGICAL OPERATORS:  AND, OR, XOR, NOT
                 *
                 * SPECIAL EXIT CONDITIONS:
                 *    RES = 1 FOR TRUE
                 *    RES = 0 FOR FALSE
                 *
                 ****************
                 *
14765   043007   XOR   JSM GET2
14766   045273         ISZ OPND1
14767   045274         ISZ OPND2
14770   101273         LDA OPND1,I
14771   105274         LDB OPND2,I
14772   072410         SZA AND2        A = FALSE
14773   066031         JMP FEQ+1       A = TRUE

14774   043007   AND   JSM GET2
14775   045273         ISZ OPND1       IF OPERAND 1 IS TRUE AND OPERAND 2 IS TRUE
14776   105273         LDB OPND1,I     THEN RESULT = TRUE
14777   076433         SZB FALSE       B = FALSE
15000   045274   AND1  ISZ OPND2       B = TRUE
15001   105274         LDB OPND2,I
15002   066036   AND2  JMP FNEQ+1

15003   043007   OR    JSM GET2
15004   045273         ISZ OPND1       IF OPERAND 1 IS TRUE THEN DON'T BOTHER WITH OPERAND 2
15005   105273         LDB OPND1,I     RESULT = TRUE.  BUT IF OPERAND 1 IS FALSE, OPERAND 2
15006   076031         RZB TRUE        MUST BE TRUE TO MAKE RESLT = TRUE.
15007   066000         JMP AND1        B = FALSE

15010   043011   NOT   JSM GET1
15011   045273         ISZ OPND1       IF OPERAND 1 IS TRUE, RES = FALSE
15012   105273         LDB OPND1,I     IF OPERAND 1 IS FALSE, RES = TRUE
15013   066031         JMP FEQ+1
                 *
                 ****************
                 *
                 * FULL PRECISION RELATIONAL OPERATORS:  =, #, <, <=, >, >=
                 *
                 * SPECIAL EXIT CONDITIONS:
                 *    RES = 1 FOR TRUE
                 *    RES = 0 FOR FALSE
                 *
                 * TEMPORARIES:  MT1, MT2
                 *
                 ****************
                 *
15014   043647   FLT   JSM TSUB        PERFORM COMPARISON
15015   024147         ADB M3          CHECK B<0 FOR "LESS THAN"
15016   066031         JMP FEQ+1

15017   043647   FLTE  JSM TSUB        PERFORM COMPARISON
15020   076417         SZB TRUE        CHECK B=0 FOR "OR EQUAL"
15021   066015         JMP FLT+1       JUMP TO CHECK "LESS THAN"

15022   043647   FGT   JSM TSUB        PERFORM COMPARISON
15023   024257         ADB M1          CHECK B>0 FOR "GREATER THAN"
15024   066031         JMP FEQ+1

15025   043647   FGTE  JSM TSUB        PERFORM COMPARISON
15026   076411         SZB TRUE        CHECK B=0 FOR "OR EQUAL"
15027   066023         JMP FGT+1       JUMP TO CHECK "GREATER THAN"

15030   043647   FEQ   JSM TSUB        PERFORM COMPARISON
15031   076406         SZB TRUE        CHECK B=0 FOR "EQUAL"
```

INTERNAL FULL PRECISION MATH ROUTINES

```
15032  000340  FALSE LDA ARES      CLEAR THE RESULT REGISTER.
15033  071603        CLR 4
15034  170201        RET 1

15035  043647  FNEQ  JSM TSUB      PERFORM COMPARISION
15036  076474        SZB FALSE     CHECK B#0 FOR "NOT EQUAL"

15037  000172  TRUE  LDA AONE      STORE 1 AS THE RESULT
15040  066050        JMP STANY
                *
                ****************
                *
                * FULL PRECISION RESULT VERIFICATION AND STORING ROUTINES
                *
                * ENTRY CONDITIONS:  (TO "UAR2E")
                *     B CONTAINS IN THE EXPONENT POSITION THE CORRECTION TO BE MADE
                *     TO AR1E BEFORE STORING IN AR2E
                *
                * EXIT CONDITIONS:
                *    IF <B> + AR1E IS IN RANGE (-511 TO 511) THEN STORE IN AR2E AND
                *    TRANSFER AR2 TO RES
                *
                *    IF OVERFLOW OCCURS:  STORE +/- 9.99999999999 E 511 AS THE RESULT
                *    IF UNDERFLOW OCCURS: STORE 0 AS THE RESULT
                *
                * TEMPORARIES:  NONE
                ****************
                *
15041  173201  UAR2E SOC *+1,C     CLEAR THE OVERFLOW BIT, THEN
15042  000001        LDA B         ADD AR1E TO <B> AND CLEAR
15043  021770        ADA AR1E      OUT BITS 1-5 AND STORE IN AR2E
15044  050240        AND ZAP
15045  030020        STA AR2E
15046  173407        SOS OV/UN     IF OVER/UNDERFLOW DID OCCUR THEN GIVE AN ERROR.
15047  000127  STAR2 LDA AR2A
15050  004340  STANY LDB ARES
15051  071403        XFR 4
15052  005753        LDB RESH1
15053  076457        SZB FALSE
15054  170201        RET 1         THIS IS THE NORMAL RET TO THE INTERPRETER FROM IMATH
                *
                *
                * EXPONENT OVERFLOW OR UNDERFLOW HAS OCCURRED.
                *
15055  174401  OV/UN ABR 2         OFFSET AR1E AND B, THEN RECOMPUTE TO DETERMINE
15056  001770        LDA AR1E      WHETHER OVERFLOW OR UNDERFLOW TOOK PLACE.
15057  170401        AAR 2
15060  024000        ADB A
15061  176407        SBM E77       IF B<0 THEN UNDERFLOW OCCURRED.
15062  000020        LDA AR2E
15063  073002        SLA *+2       B>0:  OVERFLOW.  SET B<0> IF AR2 MANTISSA IS
15064  077301        SLB *+1,S     NEGATIVE.
                *
                * ERROR 76 -- INTERMEDIATE RESULT OVERFLOW
                *
15065  140564  E76   JSM ASTMA,I   STORE +/-9.99999999999 E 511 AS THE RESULT
15066  042073        JSM ERROR
15067  033466        ASC 1,76
                *
                * ERROR 77 -- INTERMEDIATE RESULT UNDERFLOW
                *
15070  042032  E77   JSM FALSE     STORE ZERO AS THE RESULT
15071  042073        JSM ERROR
15072  033467        ASC 1,77
                *
                ****************
                *
                * RECOVERABLE ERROR ROUTINE FOR INTERNAL MATH
                *
                * ENTRY CONDITIONS:
                *    RES MUST CONTAIN THE DEFAULT VALUE.
                *
                * CALLING SEQUENCE:
                *    JSM ERROR
                *    ASC 1,??
                *
                * EXIT CONDITIONS:
                *    FLAG 15 IS SET, AND TRACED IF TRACING IS ENABLED.
                *    IF FLG 14 = 1:  BUMP JSM STACK AND RETURN TO PREVIOUS CALL
                *    IF FLG 14 = 0:  JMP AERR1,I -- GIVE THE DESIGNATED ERROR MESSAGE.
                *
                * TEMPORARIES:  NONE
```

```
                      *
                      ****************
                      *
15073   004130  ERROR LDB P15         CALL A SUBROUTINE TO SET FLAG 15 AND
15074   140376        JSM ASFG,I      TRACE THE SETTING IF TRACING IS ENABLED.
15075   001506        LDA FLAGS
15076   170500        SAR 1           TEST FLAG 14.
15077   073402        RLA SET
15100   164404  CLR   JMP AERR1,I     FLG 14 = 0:  GIVE DESIGNATED ERROR MESSAGE.
15101   054003  SET   ISZ R           FLG 14 = 1:  BUMP THE JSM STACK
15102   170201  RETN1 RET 1           AND RETURN TO THE PREVIOUS JSM.
                      *
                      ****************
                      *
                      * FLTCK:  FULL PRECISION EXPONENT USER RANGE CHECK.
                      *
                      * ENTRY CONDITIONS:
                      *   B CONTAINS THE ADDRESS OF THE FULL PRECISION NUMBER TO BE CHECKED.
                      *
                      * EXIT CONDITIONS:
                      *   EXPONENT IN RANGE (-99,99):  RET 1
                      *
                      *   EXPONENT > 99 AND FLG 14 = 1:  +/- 9.99999999999 E 99
                      *   EXPONENT > 99 AND FLG 14 = 0:  ERROR 74 -- OVERFLOW
                      *
                      *   EXPONENT < -99 AND FLG 14 = 1:  0
                      *   EXPONENT < -99 AND FLG 14 = 0:  ERROR 75 -- UNDERFLOW
                      *
                      * TEMPORARIES:  MT1
                      *
                      *   WARNING !!!     ASSIGNMENT TRACING DEPENDS ON HAVING <B>
                      *                   SAVED IN MT1 BY THIS ROUTINE.
                      *
                      ****************
                      *
15103   035762  FLTCK STB MT1         SAVE THE ADDRESS OF THE FULL PRECISION NUMBER
15104   100001        LDA B,I         LOAD THE EXPONENT WORD OF THE NUMBER BEING CHECKED
15105   004000        LDB A           CHECK THE EXPONENT TO INSURE THAT IT IS WITHIN
15106   170405        AAR 6           THE RANGE (-99,99)
15107   172402        SAM *+2
15110   170040        TCA             MAKE THE EXPONENT NEGATIVE
15111   020064        ADA P99
15112   172070        SAP RETN1       IF THE EXP. IS IN RANGE, B SHOULD BE >= 0
15113   176412        SBM E75
                      *
                      * ERROR 74 -- FULL PRECISION OVERFLOW
                      *
15114   140564  E74   JSM ASTMA,I     STORE +/-9.99999999999 E 99 AS THE RESULT
15115   001752        LDA RESE
15116   053001        AND E99M
15117   031752        STA RESE
15120   000340        LDA ARES
15121   005762        LDB MT1
15122   071403        XFR 4
15123   042073        JSM ERROR
15124   033464        ASC 1,74
                      *
                      * ERROR 75 -- FULL PRECISION UNDERFLOW
                      *
15125   001762  E75   LDA MT1         CLEAR THE FULL PRECISION NUMBER TO ZERO.
15126   071603        CLR 4
15127   042073        JSM ERROR
15130   033465        ASC 1,75
                      *
                      ****************
                      *
                      * PRND: POWER-OF-TEN ROUNDING FUNCTION
                      *
                      * DRND: DIGIT POSITION ROUNDING FUNCTION
                      *
                      *   4/5 ROUNDING IS USED.  (LIKE IN THE DISPLAY)
                      *
                      * ENTRY CONDITIONS:
                      *   OPERAND 1 IS THE NUMBER TO BE ROUNDED
                      *   OPERAND 2 IS THE ROUNDING SPECIFICATION
                      *
                      * TEMPORARIES: MT1, "ROUND"
                      *
                      ****************
                      *
15131   043007  PRND  JSM GET2
15132   001274        LDA OPND2
15133   040644        JSM FIXPT       B = POWER OF TEN ROUNDING SPEC.
15134   101273        LDA OPND1,I     CONVERT IT TO DIGIT-TO-ROUND SPEC.
15135   170405        AAR 6
```

INTERNAL FULL PRECISION MATH ROUTINES

```
15136  020254         ADA P1
15137  174040         TCB
15140  024000         ADB A        B = DIGIT-TO-ROUND SPEC.
15141  044020         ISZ AR2E     CHANGE THE SIGN OF THE ROUNDING SPEC.
15142  000000         NOP          NEEDED IN CASE OF (E-1 -) WITH 5 DON'T CARE BITS=1
15143  066147         JMP DRND1    JUMP INTO THE DRND ROUTINE.

15144  043007  DRND   JSM GET2
15145  061274         LDA OPND2
15146  040644         JSM FIXPT    B = DIGIT-TO-ROUND.

15147  035762  DRND1  STB MT1      SAVE THE DIGIT-TO-ROUND INFO.
15150  061273         LDA OPND1    A = ADDRESS OF NO. TO BE ROUNDED.
15151  064020         LDB AR2E     B = SIGN OF ROUNDING SPEC.
15152  173004         SOC DRND2    INTEGER OVERFLOW ?
15153  077402         RLB STZER    YES, CHOOSE THE PROPER DEFAULT VALUE BASED ON
15154  066050  STARG  JMP STANY         THE SIGN OF THE ROUNDING SPEC.
15155  066032  STZER  JMP FALSE

15156  064127  DRND2  LDB AR2A     TRANSFER THE NO. TO BE ROUNDED TO AR2.
15157  071403         XFR 4
15160  065762         LDB MT1      B = DIGIT-TO-ROUND SPEC.
15161  176474         SBM STZER    IF B<0, STORE ZERO AS THE RESULT.
15162  024255         ADB M12
15163  176071         SBP STARG    IF B>=0, STORE THE ARGUMENT AS THE RESULT.
15164  060140         LDA P7
15165  065762         LDB MT1
15166  043561         JSM ROUND    ROUND THE ARGUMENT
15167  066047         JMP STAR2    STORE THE ROUNDED ARGUMENT.
```

UTILITY ROUTINES ACCESSED BY BASE PAGE LINKS

```
                      *
                      ****************
                      *
                      * FLTPT:  CONVERT B TO FLOATING POINT FORMAT IN AR2
                      *
                      * ON ENTRY: B-REGISTER = INTEGER
                      *
                      * ON EXIT:  AR2 CONTAINS FLOATING NUMBER
                      *
                      * TEMPORARIES USED: T1
                      *
                      ****************
                      *
15170  060127  FLTPT  LDA AR2A     CLEAR AR2 REGISTER
15171  071603         CLR 4
15172  076432         SZB FLRET    IF B=0, GET OUT
15173  176003         SBP *+3      IF B<0,
15174  174040         TCB          MAKE B>0
15175  044020         ISZ AR2E     AND RECORD MANTISSA SIGN
15176  000203         LDA PTCN
15177  031711         STA T1       T1 = START OF POWERS OF TEN TABLE
15200  000257  FLTP1  LDA M1       A = INITIAL COUNT, -1
15201  020254         ADA P1       INCREMENT COUNT
15202  125711         ADB T1,I     B = B-10**N
15203  176076         SBP *-2      IF B STILL >0, KEEP LOOPING
15204  075541         MLY          B<0, SO SAVE COUNT AS NEXT DIGIT
15205  101711         LDA T1,I     GET LAST POWER OF TEN
15206  170040         TCA          MAKE IT POSITIVE
15207  024000         ADB A        AND RESTORE B TO LAST POS. VALUE
15210  010135         CPA P10      IS A=10?
15211  066214         JMP *+3         YES, DONE; B HAS UNITS COUNT
15212  045711         ISZ T1       NO, MOVE TO NEXT POWER OF TEN
15213  066200         JMP FLTP1    AND GO AGAIN
15214  000001         LDA B        PUT UNITS IN A
15215  075541         MLY          AND INCLUDE IT
15216  071500         NRM
15217  174040         TCB
15220  024134         ADB P11      EXPONENT = 11 - B
15221  174605         SBL 6           POSITION EXPONENT
15222  024020         ADB AR2E        INCLUDE SIGN
15223  034020         STB AR2E        STORE FINAL EXPONENT WORD
15224  170201  FLRET  RET 1
```

FILL IN BASE PAGE BSS'S

```
03308000 00524                      ORG AUNM
03309000                   *
03310000 00524  014022              DEF FUNM
03311000 00525  014042              DEF FADD
03312000 00526  014036              DEF FSUB
03313000 00527  014146              DEF FMPY
03314000 00530  014264              DEF FDVD
03315000 00531  014410              DEF FSQR
03316000 00532  015025              DEF FGTE
03317000 00533  015022              DEF FGT
03318000 00534  015014              DEF FLT
03319000 00535  015017              DEF FLTE
03320000 00536  015030              DEF FEQ
03321000 00537  015035              DEF FNEQ
03322000 00540  014774              DEF AND
03323000 00541  015003              DEF OR
03324000 00542  014765              DEF XOR
03325000 00543  015010              DEF NOT
03326000 00544  015131              DEF PRND
03327000 00545  015144              DEF DRND
03328000 00546  015073              DEF ERROR
03329000 00547  014561              DEF ROUND
03330000 00550  014647              DEF TSUB
03331000 00551  015103              DEF FLTCK
03332000 00552  014011              DEF GET1
03333000 00553  014007              DEF GET2
03334000 00554  014043              DEF FADD+1
03335000 00555  014037              DEF FSUB+1
03336000 00556  014147              DEF FMPY+1
03337000 00557  014265              DEF FDVD+1
03338000 00560  014266              DEF DVDNR
03339000 00561  014411              DEF FSQR+1
03340000 00562  014675              DEF TSUB#+1
03341000 00563  015170              DEF FLTPT
03343000                            END
END OF PASS 2 NO ERRORS DETECTED
```

---- CASSETTE OPERATING SYSTEM ----

```
02002000                   *
02003000                   *
02004000                   *
02005000                   *
02006000 07775                      ORG 7775B        LINK TO EXECUTE "TLIST"
02007000 07775  016236              DEF ETLIS
02008000                   *
02009000                   *
02010000                   *
02011000 00601                      ORG ARFK
02012000 00601  016336              DEF RWFKB       REWIND FROM KEYBOARD
02013000 07735                      ORG 7735B
02014000 07735  016334              DEF EREW        LINK TO EXECUTE 'REW'
02015000 07737                      ORG 7737B
02016000 07737  016037              DEF IDF         LINK TO EXECUTE 'IDF'
02017000 07742                      ORG 7742B
02018000 07742  016100              DEF FDF         LINK TO EXECUTE "FDF"
02019000 07743  016327              DEF ERSTP       LINK TO EXECUTE 'ERT'
02020000 07744  016000              DEF EMARK       LINK TO EXECUTE 'MRK'
02021000 07745  016633              DEF RCF         LINK TO EXECUTE 'RCF'
02022000 07746  017051              DEF LDF         LINK TO EXECUTE 'LDF'
02023000 07750                      ORG 7750B
02024000 07750  017042              DEF LDP1        LINK TO EXECUTE 'LDP'
02025000 07751  016432              DEF RCMEM       LINK TO EXECUTE 'RCM'
02026000 07752  016470              DEF LDMEM       LINK TO EXECUTE 'LDM'
02027000 07753  016117              DEF RCK         LINK TO EXECUTE 'RCK'
02028000 07754  016132              DEF LDK         LINK TO EXECUTE 'LDK'
02029000 07755  016543              DEF LDB         LINK TO EXECUTE 'LDB'
02030000 07756  016206              DEF VFY         LINK TO EXECUTE 'VFY'
02031000 00603                      ORG ASTPA
02032000 00603  017605              DEF CFD
02033000 00604  017460              DEF WTRR
02034000 00606                      ORG ARDRC
02035000 00606  017635              DEF RDREC
02036000                   *
02037000                   *
02038000                   *
02039000 21770                      ORG 21770B
02040000 21770  016347              DEF ERDS0
02041000 21771  017566              DEF GTPR2       LINK TO GTPR2
02042000 21772  017665              DEF STPRA
02043000                   *
02044000                   *
02045000 00600                      ORG ACSTI
02046000 00600  023750              DEF CSTIN       LINK TO CASSETTE INITIALIZATION ROUTINE
```

```
*
*
*
*
****************************************
*
*          CASSETTE
*          OPERATING
*          SYSTEM
*
*
****************************************
*
*
*
*
*
*
*     INSTRUCTIONS FOR RECORDING OR LOADING CASSETTE FILES
*
*
*    TO WRITE A RECORD :
*
*        1). JSM ASTPA,I   -   SET PERIPHERAL ADDRESS
*                        AND COMPLETE ANY PENDING FINDS
*        2). T13 (RECNO) = FILE NUMBER
*        3). CATMP+8 (MBPTR) = STARTING ADDRESS (LOWEST MEMORY ADDRESS
*    TO BE RECORDED)
*        4). OP1+1 (LWMD) = ENDING ADDRESS ( HIGHEST MEMORY ADDRESS
*    TO BE RECORDED)
*        5). MRW1+1 (RELTH) = RECORD LENGTH ( LWMD - MBPTR + 1 )
*
*        FILE TYPES :
*        NULL                      => 0
*        BINARY                    => 1
*        NUMERIC DATE              => 2
*        MIXED STRING AND NUMERIC  => 3
*        MEMORY                    => 4
*        KEYS                      => 5
*        USER PROGRAMS             => 6
*
*
*        6). MRW1+3 ( RECTP ) = TYPE
*        7). JSM AWTRR,I   -   WRITE THE RECORD
*        8). ENABLE THE INTERRUPT
*        NOTE: THE C REGISTER IS SAVED IN T21. IF ALTERED.
*               THE C REGISTER SHOULD BE RESTORED FROM T21 AT THIS
*               POINT.
*
*    TO READ A RECORD :
*
*        1). JSM ASTPA,I   -   SET THE PERIPHERIAL ADDRESS
*        2). RECNO = FILE NUMBER
*        3). JSM ACHST,I   -   POSITION THE TAPE AT FILE
*        4). MBPTR = STARTING ADDRESS
*        5). JSM ARDRC,I   -   READ THE RECORD
*        6). ENABLE INTERRUPT
*        NOTE: THE C REGISTER IS SAVED IN T21. IF ALTERED.
*               THE C REGISTER SHOULD BE RESTORED FROM T21 AT THIS
*               POINT.
*
*    NOTE : NO CHECK IS MADE BY THE TAPE OPERATING SYSTEM FOR ADEQUATE
*        ROOM IN MEMORY OR FOR PROPER FILE TYPE.  THE FILE
*        HEAD INFORMATION
*        IS VALID AFTER THE CALL TO ACHST.  THREE ATTEMPTS
*        ARE MADE
*        AT READING A FILE IF ERRORS ARE ENCOUNTERED.
*        WITH A FOURTH READ FOR RECOVERY.
*
*
*
*
*
*        THE CASSETTE OPERATING SYSTEM IS BASICALLY SELF CONTAINED
*        IT CALLS THE FOLLOWING ROUTINES EXTERNAL TO ITS PAGES:
*                  (16K, 20K)
*        ABUMP, FIXPT-1, ACOUN, NGET, AERR1,AERR2, AFLNA, AFLIP
*        AMPUP, AMAMP, ARSGT, ACLBI, A.PRN, EOLIO, ABTDA, AASTR
*        DMALO, ADSRM, ALDSP, ALLOC, ACNIN, AERCS, ASSLN, AERAV
*        AMPUP, AMPML, AZRWM, ABSAD+1, ASPC
*
*        THE FOLLOWING TEMPORARIES ARE USED AT SOME POINT IN THE
*        CASSETTE SYSTEM :
*        T1 THROUGH T23, MRW1 THROUGH MRW1+9, OP1 THROUGH OP1 + 2
**********************************************************************
```

```
                       *          NOTE : THE C REGISTER IS SAVED IN TEMPORARY T21 ON ENTRY
                       *                 TO ANY STATEMENT EXECUTION VIA THE INTERPRETURE
                       *                 AND IS RESTORED ON EXIT
                       *
                       ****************************************************************
                       *
                       *
                       *      STANDARD PROCEEDURE #1
                       *      THIS PROCEEDURE IS USED BY MOST ROUTINES TO GET THE FIRST
                       *      ENTERED PARAMETER FROM THE STACK ( THE FILE NUMBER ).
                       *
                       *      THE FILE NUMBER IS GOTTEN FROM THE RUN TIME EXECUTION STACK
                       *      IT RESIDES AS EITHER A 7 WORD ENTRY IF NUMERIC OR A THREE WORD
                       *      ENTRY IF A SIMPLE VARIABLE OR ARRAY ELEMENT.
                       *      THIS PARAMETER CAN BE OBTAINED BY THE FOLLOWING CODE:
                       *
                       *      JSM ACOUN,I        THIS SETS FAP1 (FLOATING POINTER IN
                       *                          STACK)
                       *      JSM NGET           THIS WILL ATTEMPT TO GET A NUMERIC PARAMETER
                       *                         IT WILL RETURN P+1 IF A NONNUMERIC IS EN-
                       *                         COUNTERED AT FAP1. IT WILL RETURN P+2 IF
                       *                         THE PARAMETER AT FAP1 IS NUMERIC
                       *      JMP ERR55
                       *      JSM FIXPT-1        FIXPT WILL RETURN THE ENTERED FLOATING POINT
                       *                         NUMBER AS A BINARY NUMBER IN REGISTER B
                       *
                       *
                       *       THE FILE NUMBER NEED NOT BE SUPPLIED, THE DEFAULT IS ZERO
                       *       HOWEVER IF ANYTHING OTHER THAN A NUMERIC PARAMETER IS ENTERED
                       *       ERROR 55 IS GIVEN.
                       *
                       *       SUCCESIVE PARAMETERS AFTER THE FIRST ARE OBTAINED BY CALLING
                       *       BMP1 TO MOVE THE EXECUTION STACK POINTER (FAP1) BY ONE ENTRY
                       *       THEN CALLING NGET TO OBTAIN THE PARAMETER
                       *
                       *
                       *      EMARK IS THE CASSETTE MARK COMMAND
                       *
                       *
                       *
                       *      TEMPORARIES USED :  NOREC (T10), MSIZE (T11), FLAGA
                       *
                       *
                       *      ROUTINES CALLED : GTPAR, LDXI, MRKA, ERDS0, BMP1, NGET, FIXPT
                       *                        ASYER, AERR1
                       *
                       *
                       *
                       *
                       *         ON EXIT :  MARK COMPLETE
                       *
                       *
                       *
16000                          ORG 16000B
16000  042565   EMARK  JSM GTPAR         GET THE FIRST PARAMETER
16001  035722          STB NOREC         ON RETURN B HAS THE NUMBER OF FILES
16002  042732          JSM BMP1          MOVE THE EXECUTION STACK POINTER BY ONE
16003  140424          JSM ASYER,I       MISSING PARAMETER
16004  040751          JSM NGET          GET THE NUMERIC PARAMETER ON STACK
16005  067726          JMP ERR55         NON-NUMERIC ENTRY ENCOUNTERED
16006  040643          JSM FIXPT-1       CONVERT PARAMETER TO FIXED POINT NUMBER
16007  173427          SOS MARK8         IF OVERFLOW - ERROR
16010  176423          SBM MKER1         IF NEG ERROR
16011  024254          ADB P1            ROUND THE BYTE COUNT UP
16012  173424          SOS MARK8         SEE IF OVERFLOW
16013  174500          SBR 1             MAKE BYTE COUNT A WORD COUNT
16014  076414          SZB MRK12         IF SIZE IS ZERO - CHECK FOR REQ. TO REWRITE
                       *                 HEAD
16015  001722          LDA NOREC         WE KNOW MSIZE#0 SO IF NOREC#0, ERROR
16016  072414          SZA MRK13
16017  035720   MRK11  STB MSIZE         B CONTAINS MAX SIZE
16020  142771   MARK7  JSM MRKA,I        MARK THE TAPE
16021  043347          JSM ERDS0         CHECK FOR ERORS
                       *                 IF MRK ERRORS, THE LOADING OF THE RETURN
                       *                 VARIABLE INFO. IS DONE IN ERDS0, WHICH THEN
                       *                 DOES A RETURN 5
16022  001676   MARK9  LDA CRECN         SET THE RETURN VARIABLE FOR A SUCCESSFUL MARK
16023  020257          ADA M1
16024  031756   MRK10  STA FLAGA
16025  042655          JSM LDXI          LOAD THE (X)
16026  067464          JMP INTN1
16027  067464          JMP INTN1
16030  001722   MRK12  LDA NOREC         SEE IF BOTH PARAMETERTS ARE ZERO
```

```
16031  072466        SZA MRK11          IF BOTH ZERO REWRITE HEAD
16032  067726  MRK13 JMP ERR55          IF NOT GIVE ERROR
16033  066603  MKER1 JMP ERR53          INVALID PARAMETER ON CASSETTE COMMAND
16034  140404  ERR48 JSM AERR1,I       MARK FAILED
16035  032070        ASC 1,48
16036  066535  MARK8 JMP ERR11          ERROR 11 = OVERFLOW ERROR
               *
               *
               *
               *     IDENTIFY FILE STATEMENT RETURNS FILE NUMBER, FILE TYPE,
               *     FILE CURRENT SIZE (IN BYTES), FILE CAPACITY (IN BYTES)
               *     AND TRACK (0 OR 1)
               *     THIS COMMAND NORMALLY RESULTS IN LITTLE OR NO TAPE MOTION ON
               *     EXECUTION. THE TAPE IS ALWAYS POSITIONED IN THE INTER FILE
               *     GAP IMMEDIATELY PRECEEDING THE FILE WHOSE HEADER WAS JUST READ.
               *
               *     IF THE TAPE POSITION IS UNKNOWN TO THE SYSTEM,
               *     (AS AT TURN-ON OR RESET, OR ON INSERTION OF A DIFFERENT CART.)
               *     THE COMMAND MUST HAVE AT LEAST ONE PARAMETER, THE TAPE WILL
               *     SEARCH IN REVERSE FOR A FILE HEADER
               *
               *     TEMPORARIES USED : NONE
               *
               *
               *     ROUTINES CALLED : CFD, CNULL, IDRA, ERDSO,  LDXI, LDX2
               *                       LDX3, AERR1, ASYER
               *
               *
               *
               *
16037  042605  IDF   JSM CFD            COMPLETE ANY FINDS
16040  001705        LDA TPOS           GET THE CURRENT TAPE POSITION
16041  010127        CPA P16            ARE WE LOST
16042  067075        JMP IDF2           YES LOST
16043  000005        LDA R5             CHECK TO SEE IF THE CARTRIDGE IS PULLED
16044  170501        SAR 2              AND CHECK IF TAPE IS LOST
16045  073002        SLA *+2
16046  067075        JMP IDF2           LOST, SEE IF AT LEAST ONE PARAMETER IS ENTERED
16047  142777  IDF7  JSM IDRA,I         IDENTIFY THIS RECORD
16050  043347        JSM ERDSO          CHECK FOR ERRORS
16051  042611  IDF5  JSM CNULL          CHECK FOR ANY PARAMETERS
16052  067464        JMP INTN1          ENABLE GHE INTERRUPT AND EXIT
16053  005676        LDB CRECN          GET THE VALUE FOR THE FIRST PARAMEYER
16054  042660        JSM LDX2           AT LEAST ONE PARAMETER
16055  140424        JSM ASYER,I        IF HERE SOMETHING WENT WRONG !!
16056  005701        LDB RTYPE
16057  042654        JSM LDX3           TRANSFER RTYPE TO (,X)
16060  067464        JMP INTN1          ENABLE THE INTERRUPT AND EXIT
16061  005700        LDB CSIZE
16062  174600        SBL 1              MAKE WORD COUNT A BYTE COUNT
16063  042654        JSM LDX3           TRANSFER CSIZE TO NEXT (,X)
16064  067464        JMP INTN1          ENABLE THE INTERRUPT AND EXIT
16065  005677        LDB ASIZE
16066  174600        SBL 1              MAKE WORD COUNT A BYTE COUNT
16067  042654        JSM LDX3           TRANSFER ASIZE TO NEXT (,X)
16070  067464        JMP INTN1          ENABLE THE INTERRUPT AND EXIT
16071  001707        LDA FLG1           GET THE COMPLEMENT OF THE TRACK
16072  170140        CMA                COMPLEMEMT
16073  050254        AND P1             CLEAR ALL BUT THE TRACK BIT
16074  067024        JMP MRK10          LOAD THE RETURN VARIABLE
16075  042611  IDF2  JSM CNULL          CHECK FOR THE NULL PARAMETER
16076  067404        JMP ERR45          NO PARAMETERS ENTERED SO ERROR
16077  067047        JMP IDF7           AT LEAST ONE NUMERIC PEARAMETER - CONTINUE
               *
               *
               *
               *     FDF IS THE CASSETTE FIND FILE COMMAND
               *
               *
               *
               *     TEMPORARIES USED : MRW1+6(FLG2)
               *
               *     ROUTINES CALLED : GTPR2, ACHST, STPRA, DMALO, STOPC
               *
               *
               *
16100  042665  FDF   JSM STPRA          SET THE PERIPHERIAL ADDRESS
16101  142766        JSM STOPC,I        STOP THE CASSETTE
16102  042566        JSM GTPR2          GET THE FILE NUMBER
16103  005514  FDF1  LDB CSELC          PREPARE TO CALL DMA LOCKOUT
16104  140602        JSM DMALO,I
16105  067103        JMP FDF1           DMA REFUSED TRY AGAIN
16106  070430        DIR                WE HAVE DMA , CONTINUE
16107  034011        STB PA             SET THE PA
16110  000177        LDA P0
```

---- CASSETTE OPERATING SYSTEM ----

```
16111  030013        STA DMAPA          CLEAR DMAPA ( THE DMA FLAG) IN CASE DRIVERS
                *                       HAVE ERROR
16112  031345        STA CSCF           FORGET ANY PREVIOUS FINDS
16113  000254        LDA P1             SET UP THE HARDWARE FIND
16114  031764        STA FLG2
16115  140605        JSM ACHST,I        DO THE FIND
16116  067466        JMP INTEN
                *
                *
                *
                *
                *
                *
                *
                *      RCK IS THE CASSETTE RECORD KEYS COMMAND
                *
                *
                *      TEMPORARIES USED : MRW1+3(RECTP), OP1+1(LWMD)
                *
                *      ROUTINES CALLED : GTPAR, CALTH , WTRR
                *
                *
                *
16117  042565   RCK  JSM GTPAR          GET THE FILE NUMBER
16120  000142        LDA P5             KEYS ARE TYPE FIVE
16121  031761        STA RECTP
16122  001306        LDA FWAM           THIS IS THE START OF THE RECORD
16123  031706        STA MBPTR
16124  005307        LDB FWUP
16125  024257        ADB M1             THIS IS THE END OF THE RECORD
16126  035743        STB LWMD
16127  042626        JSM CALTH          CALCULATE THE LENGTH
16130  042460        JSM WTRR           WRITE THE RECORD
16131  067464        JMP INTN1          ENABLE THE INTERRUPT AND EXIT
                *
                *
                *      LDK IS THE CASSETTE  LOAD KEYS COMMAND
                *            LOADING BEGINS AT THE FWAM AND OVERLAYS ANY KEYS ALREADY
                *            DEFINED.
                *
                *
                *      TEMPORARIES USED : OP1+1 (LWMD), FLAGA (MRW1)
                *                               TVAR1 ( OP1+2)
                *
                *      ROUTINES CALLED : PCALL, STVFY, NEWSZ, AMAMP, AMUPH, RDREC
                *                                    CKKBE, ARSGT, SSCHK
                *
                *
16132  042427   LDK  JSM STVFY          MUST SEE IF THE STATE IS LEGAL
16133  000142        LDA P5             KEYS ARE TYPE FIVE
16134  042710        JSM PCALL          PRELIMINARY CALL FOR LOADS
16135  001307        LDA FWUP
16136  031756        STA FLAGA          REMEMBER STARTING POINT TO UPDATE REG C,
                *                       HERE, LEND
16137  001306        LDA FWAM           THIS IS THE START OF THE LOAD
16140  031706        STA MBPTR
16141  042646        JSM NEWSZ          CALCULATE MBPTR + CSIZE TO B -1 TO A
16142  034017        STB D              SET POINTERS TO MOVE MEMORY
16143  174040        TCB
16144  025307        ADB FWUP           WHICH DIRECTION AND HOW FAR ?
16145  176010        SBP LDK1           SKIP IF MUST MOVE LOWER
16146  001307        LDA FWUP
16147  170040        TCA                SET POINTERS TO MOVE PROGRAMMING
16150  021310        ADA RMAX
16151  020017        ADA D
16152  030017        STA D
16153  140463        JSM AMUPH,I        MOVE PROGRAM TO HIGHER MEMORY
16154  067156        JMP LDK7
16155  140464   LDK1 JSM AMAMP,I        MOVE MEMORY LOWER
16156  042736   LDK7 JSM CKKBE          SEE IF THERE IS A PROGRAM RUNNING
16157  067161        JMP LDK3           YES A PROGRAM IS RUNNING
16160  067204        JMP LDK2           NO PROGRAM RUNNING
16161  001756   LDK3 LDA FLAGA          INITIAL POSITION OF THE START OF THE PROGRAM
16162  170040        TCA
16163  021307        ADA FWUP           THIS IS THE OFFSET TO THE C REG BECAUSE OF
                *                       THE MOVING OF THE MEMORY
16164  031744        STA TVAR1          REMEMBER THE OFFSET
16165  005735        LDB SVC            MUST RESET REG C, 'HERE', AND 'LEND'(SVC=C)
16166  024000        ADB A
16167  035735        STB SVC
16170  005265        LDB HERE
16171  024000        ADB A
16172  035265        STB HERE
```

```
16173  005264        LDB LEND
16174  024000        ADB A
16175  035264        STB LEND
16176  000177        LDA P0              SET THE FLAG FOR ADJUSTMENT OF GSB RETURNS
16177  031063        STA NPROG
16200  042376        JSM SSCHK           THIE ROUTINE WILL ADJUST THE GSB RETURNS
16201  140360        JSM ARSGT,I         RESET THE HS GTO ADDRESSES
16202  042635        JSM RDREC           READ THE RECORD
16203  067464        JMP INTN1           ENABLE THE INTERRUPT AND EXIT
16204  042635  LDK2  JSM RDREC           READ THE RECORD
16205  066257        JMP LDF18           NO PROGRAM SO CLEAR RUN BIT, EXIT
               *
               *
               *
               *     VFY IS THE CASSETTE VERIFY COMMAND, IT MUST BE THE FIRST
               *     CASSETTE STATEMENT AFTER A RECORD OR LOAD STATEMENT
               *          OR ITS PARAMETERS MAY BE DESTROYED
               *
               *
               *     ON ENTRY : THE INFORMATION FOR THE TAPE TO BE VERIFIED AGAINST
               *              IT'S COUNTERPART IN MEMORY
               *
               *     ON EXIT : VERIFY COMPLETE UNLESS ERROR 44 OCCURES - VERIFY FAILED
               *
               *
               *
               *
               *     TEMPORARIES USED : RECNO
               *
               *     ROUTINES CALLED : CFD, ACOUN, VREC, CNULL, LDX2, ASYER
               *
               *
16206  042605  VFY   JSM CFD             COMPLETE ANY PENDING FINDS
16207  001676        LDA CRECN           MUST DO THIS IN CASE
16210  020257        ADA M1              RECNO IS CHANGED , TPOS = 2 ON ENTRY
16211  031725        STA RECNO           RESTORE THE TARGET RECORD NUMBER
16212  140610        JSM ACOUN,I         SET FAP1
16213  043227        JSM VREC            VERIFY THE RECORD
16214  067223        JMP VFY1            NO  ERROR RETURN
16215  042611  VFY2  JSM CNULL           CHECK FOR THE NULL PARAMETER
16216  066511        JMP ERR44           NO NUMERIC PARAMETER SO GIVE ERROR
16217  004254        LDB P1              ERROR - VERIFY HAS FAILED
16220  042660  VFY3  JSM LDX2            LOAD NEXT XI
16221  140424        JSM ASYER,I         BAD NEWS IF GET HERE
16222  067464        JMP INTN1           ENABLE THE INTERRUPT AND EXIT
16223  042611  VFY1  JSM CNULL           SEE IF WE HAVE A RETURN VARIABLE
16224  067464        JMP INTN1           NO NUMERIC RETURN VARIABLE SO DONE
16225  004177        LDB P0
16226  067220        JMP VFY3            LOAD THE RETURN VARIABLE
               *
               *
               *
               *     VREC DOES A VERIFY ON THE CURRENT FILE NUMBER
               *
               *
               *     TEMPORARIES USED : INSTR (T11)
               *
               *     ROUTINES CALLED : ACHST, RBDYA, ERDS0
               *
               *
               *
16227  140605  VREC  JSM ACHST,I         REPOSITION THE TAPE
16230  002744        LDA CPBCD           CPB PTR,I COMMAND FOR VERIFY
16231  031723        STA INSTR
16232  142775        JSM RBDYA,I         DO THE VERIFY
16233  043347        JSM ERDS0           CHECK FOR ERRORS
16234  170201        RET 1
16235  170202        RET 2               CONTINUE RETURN FROM ERDS0
               *
               *
               ****************
               *
               * TLIST:  STATEMENT TO LIST FILE DESCRIPTIONS
               *
               ****************
               *
               *     ROUTINES CALLED : CFD, IDRA, ERDS0, ACLBI, A,RRN, ACHST
               *                       ASPC, EOLIO, ABTOA
               *
               *     TEMPORARIES USED : RECNO
               *
               *
16236  042605  ETLIS JSM CFD            COMPLETE ANY PENDING FINDS
16237  142777        JSM IDRA,I          IDENTIFY CURRENT TAPE POSITION
16240  043347        JSM ERDS0           CHECK FOR ERRORS
```

```
16241  140450         JSM ACLBI,I        CLEAR THE I/O BUFFER
16242  003320         LDA HEAD1          TRANSFER THE TRACK NO. HEADING TO THE BUFFER
16243  004313         LDB AIBUF
16244  071401         XFR 2
16245  001707         LDA FLG1           GET THE CURRENT TRACK NUMBER
16246  170140         CMA
16247  050254         AND P1
16250  063323         IOR BZ
16251  130317         STA TLPTR,I        AND FILL IN THE TRACK NO.
16252  140444         JSM A.PRN,I        THEN PRINT THE LINE.
                *
                * START OF MAIN TLIST LOOP
                *
16253  001676         LDA CRECN          SET UP THE TARGET RECORD NUMBER
16254  031725         STA RECNO
16255  070420  TLIS1  EIR                TURN ON INTERRUPT FOR STOP FLAG
16256  001206         LDA .WKC           CHECK THE "STOP FLAG" BEFORE EACH NEW IDF.
16257  010254         CPA P1
16260  067312         JMP TLIS3          AND GET OUT IF IT IS SET.
16261  070430         DIR                TURN OFF INTERRUPTS
                *
16262  001514         LDA CSELC          SET THE PERIPHERAL ADDRESS OF THE CASSETTE.
16263  030011         STA PA
16264  140605         JSM ACHST,I        FIND THE NEXT FILE AND READ THE HEADER.
                *
16265  140450  TLIS6  JSM ACLBI,I        CLEAR THE I/O BUFFER FOR THE NEXT LINE.
16266  003326         LDA BNOBK          GET THE # SIGN FOR FILE NUMBER
16267  130313         STA AIBUF,I        PUT AT START OF LINE
16270  001676         LDA CRECN
16271  004314         LDB AIBFX
16272  043317         JSM DMPNO
                *
16273  140444         JSM A.PRN,I        PRINT THE FILE NUMBER LINE
16274  140450         JSM ACLBI,I        CLEAR THE I/O BUFFER
16275  001701         LDA RTYPE          GET THE RECORD TYPE
16276  004314         LDB AIBFX
16277  043317         JSM DMPNO
                *
16300  001700         LDA CSIZE
16301  007324         LDB CS
16302  043316         JSM DMPNO-1
                *
16303  001677         LDA ASIZE
16304  007325         LDB AS
16305  043316         JSM DMPNO-1
                *
16306  140444         JSM A.PRN,I        PRINT THE LINE IN THE I/O BUFFER
                *
16307  045725         ISZ RECNO          GET READY TO FIND THE NEXT FILE.
16310  001677         LDA ASIZE          IF THE NULL F.NOT BEEN REACHED, KEEP TLISTING.
16311  072044         RZA TLIS1
                *
16312  000144  TLIS3  LDA P3             PRINT THREE BLANK LINES
16313  140571         JSM ASPC,I         PRINT THE BLANK LINES.
16314  040710         JSM EOLIO
16315  067464         JMP INTN1          ENABLE THE INTERRUPT AND EXIT
                *
                * SUBROUTINES FOR TLIST
                *
16316  170600         SAL 1
16317  164477  DMPNO  JMP ABTDA,I        BUILD THE NO. IN <A> IN THE I/O BUFFER STARTING
                *                        AT CHARACTER ADDRESS <B> + 1
                *
                *
                * TLIST CONSTANTS AND EQUATES.
                *
                *
16320  016321  HEAD1  DEF *+1
16321  072162         DEC 29810          T   R
16322  065440         DEC 27424          K  BLANK
16323  020060  BZ     OCT 020060         ASCII:  BLANK, ZERO
       000317  TLPTR  EQU AIBSL          POINTER FOR TRACK DIGIT
16324  177066  CS     DEF IBUFF+2,I
16325  177071  AS     DEF IBUFF+5,I
       077206  .WKC   EQU IOTMP
16326  021440  BNOBK  OCT 21440
                *
                *
                *      ERST IS THE CASSETTE ERASE COMMAND
                *
                *
                *
                *      TEMPORARIES USED : NONE
```

```
                   *
                   *      ROUTINES CALLED : GTPAR, ERSA, ERDSO
                   *
                   *
                   *
                   *
16327  042565  ERSTP JSM GTPAR          GET THE FILE NUMBER
16330  140605        JSM ACHST,I        POSITION THE TAPE
16331  142776        JSM ERSA,I         DO THE ERASE
16332  043347        JSM ERDSO          CHECK FOR ERRORS
16333  067464        JMP INTN1          ENABLE THE INTERRUPT AND EXIT
                   *
                   *
                   *
                   *      THE REWIND COMMAND SETS THE HARDWARE IN REVERSE , HS MODE
                   *      AND SEARCHES FOR THE BEGINNING OF TAPE.  ONCE INITIATED, THE
                   *      REWIND OPERATION TERMINATES BY ITSELF
                   *
                   *
                   *
                   *      TEMPORARIES USED : NONE
                   *
                   *      ROUTINES CALLED BY THIS ROUTINE : STPRA, REWA, ERDSO
                   *
                   *
                   *
                   *
16334  043340  EREW  JSM EREW1
16335  067464        JMP INTN1          EXECUTION HERE IF NOT AN IMMEDIATE EXECUTE KEY
16336  000263  RWEKB LDA FLAG           SET FLAG THAT THIS IS A HARDWARE SIM. REWIND
16337  031613        STA LKTMP+6
                   *
                   *
                   *
                   *
16340  042665  EREW1 JSM STPRA          SET THE PA
16341  142772        JSM REWA,I         REWIND TAPE
16342  043347        JSM ERDSO          CHECK FOR HARDWARE ERRORS
16343  070420  ERO21 EIR
16344  000177        LDA P0             CLEAR THE HARDWARE SIM. REWIND FLAG
16345  031613        STA LKTMP+6
16346  170201        RET 1
                   *
                   *
                   *
                   *
                   *          ERDSO IS CALLED WHEN THE CASSETTE DRIVERS SOFTWARE ENCOUNTERS
                   *       AN ERROR.  THIS ERROR IS LOGGED AS A ONE (SET BIT ) AT THE PROPE-
                   *      BIT LOCATION IN ERRWD.  ERDSO DECODES THE WORD ( BIT 15, BIT 14,
                   *      ETC. TO BIT 5 ) AND THE PROPER ERROR IS DISPLAYED OR SOME OTHER
                   *      ACTION IS TAKEN.
                   *
                   *      NOTE: IF THIS ROUTINE IS CALLED WITH BITS 0-4 SET OR ERRWD
                   *      =0, THE SYSTEM WILL HANG UP OR FAIL
                   *
                   *
                   *      ON ENTRY : ERRWD HAS BIT(S) SET CORRESPONDING TO THE ERROR(S)
                   *                 WHICH OCCURED
                   *
                   *
                   *      ON EXIT : RETURNS IF FURTHER ACTION MUST BE TAKEN, AS LOADING
                   *                AN OPTIONAL PARAMETER
                   *                OTHERWISE THE RETURN IS TO CONTROL SUPERVISOR VIA AERR1
                   *
                   *
                   *
                   *      TEMPORARIES USED : ERRWD (MRW1+5), LDTRS (MR1W+4)
                   *                FLAGA (MRW1)
                   *
                   *
                   *      ROUTINES CALLED : AERR1, PTBRA, LDXI
                   *
                   *
                   *
                   *
                   *
                   *
16347  004135  ERDSO LDB P10
16350  001763        LDA ERRWD          GET ERROR WORD
16351  172404  ERD1  SAM ERD2           SKIP IF BIT 15 SET
16352  024257        ADB M1             COUNT IF NO ERROR BIT SET
16353  170600        SAL 1              MOVE NEXT BIT TO MSB
16354  067351        JMP ERD1           CONTINUE
16355  003360  ERD2  LDA ERADD          GET THE JMP TABLE ADDRESS
16356  020001        ADA B              CALCULATE THE OFFSET
16357  164000        JMP A,I            JUMP THROUGH THE JMP TABLE
```

```
02638000 16360  016361  ERADO DEF *+1
02639000                *
02640000 16361  067404        JMP ERR45
02641000 16362  067417        JMP ERD11
02642000 16363  067415        JMP ERR47
02643000 16364  067406        JMP ERDS9
02644000 16365  067403        JMP ERD14
02645000 16366  067430        JMP ERR65
02646000 16367  067401        JMP ERR42
02647000 16370  067373        JMP ERR43
02648000 16371  067373        JMP ERR43
02649000 16372  067375        JMP ERR41
02650000 16373  140404  ERR43 JSM AERR1,I       POWER DOWN, SERVO FAILED, UNEXPECTED BOT OR EC
                                                BITS 15,13,12
02651000                *
02652000 16374  032063        ASC 1,43
02653000 16375  061613  ERR41 LDA LKTMP+6       IF THIS IS SET WE GIVE NO ERROR
02654000 16376  172445        SAM ERD21         RETURN 1
02655000 16377  140404        JSM AERR1,I       CARTRIDGE OUT
02656000                *                       BIT 14
02657000 16400  032061        ASC 1,41
02658000 16401  140404  ERR42 JSM AERR1,I       CARTRIDGE PROTECTED
02659000                *                       BIT 11
02660000 16402  032062        ASC 1,42
02661000                *                       BIT 9 IS VERIFY ERROR
02662000 16403  170202  ERD14 RET 2             ERROR - VERIFY HAS FAILED LOAD (,X)
02663000 16404  140404  ERR45 JSM AERR1,I       EXECUTION OF IDF WITHOUT PARAMETERS OR MRK
02664000                *                       WHILE THE TAPE IS LOST
02665000                *                       BIT 5
02666000 16405  032065        ASC 1,45
02667000 16406  055762  ERDS9 USZ LDTRS         COUNT THIS TRY AT LOADING, SEE IF DONE
02668000 16407  170202        RET 2             TRY AGAIN
02669000 16410  001701  ERD20 LDA RTYPE         IF TYPE IS PROGRAM MUST PATCH BRIDGS
02670000 16411  010141        CPA P6
02671000 16412  166770        JMP PTBRA,I       PATCH UP LINE BRIDGES AND DO RETURN
02672000 16413  140404  ERR46 JSM AERR1,I       PARTITION ERROR - RECOVERY CYCLE IS COMPLETE
02673000 16414  032066        ASC 1,46          PARTITION ERROR, BIT 8 OF ERRWD
02674000                *
02675000                *
02676000 16415  140404  ERR47 JSM AERR1,I       HEAD READ ERROR
02677000                *                       BIT 7
02678000 16416  032067        ASC 1,47
02679000 16417  005676  ERD11 LDB CRECN         MARK WAS UNSUCCESSFUL , LOAD (,X)   BIT 6
02680000                *
02681000 16420  024257        ADB M1            THE (,X)
02682000 16421  174040        TCB
02683000 16422  035756        STB FLAGA
02684000 16423  042655        JSM LDXI          LOAD THE (,X) PARAMETER
02685000 16424  067034        JMP ERR48         NO (,X) PRESENT SO GIVE ERROR
02686000 16425  170205        RET 5             ENABLE THE INTERRUPT AND EXIT
02687000 16426  140404  ERR49 JSM AERR1,I       FILE TOO SMALL
02688000 16427  032071        ASC 1,49
02689000                *
02690000 16430  140404  ERR65 JSM AERR1,I       FILE NOT FOUND, BIT 10
02691000 16431  033065        ASC 1,65
02692000                *
02693000                *
02694000                *
02695000                *
02696000                *
02697000                *       RCMEM  RECORDS ON THE CASSETTE THE ENTIRE READ/WRITE
02698000                *              MEMORY INCLUDING SELECTED REGISTERS
02699000                *
02700000                *             SYNTAX : L.C. RCM (FILE #)
02701000                *
02702000                *       ON ENTRY : CONTROL IS HERE IF RCM IS ENCOUNTEWRED BY
02703000                *                  THE INTERPRETURE, THE FILE NUMBER IS
02704000                *                  OPTIONAL BUT IF PRESENT IT IS ON THE RUN-
02705000                *                  TIME EXECUTION STACK AND IS GOTTEN BY THE
02706000                *                  "STANDARD PROCEDURE 1 "
02707000                *
02708000                *
02709000                *
02710000                *
02711000                *       ON EXIT: DUMP COMPLETE UNLESS ERRORS ARE ENCOUNTERED
02712000                *
02713000                *
02714000                *
02715000                *       TEMPORARIES USED : RECTP (MRW1+3), SEFLG (MRW1+2)
02716000                *                          TVAR3, SVC, T22, T23
02717000                *
02718000                *
02719000                *       ROUTINES CALLED : GTPAR, STPRL, WTRR, BINUI
```

```
                       *
                       *
                       *
16432   000003   RCMEM LDA R          SAVE THE RETURN STACK POINTER
16433   130324         STA ASTK1,I    STORE ON COMPILE STACK
16434   042565         JSM GTPAR      GET THE FILE NUMBER
16435   042622         JSM STPRL      SET UP MEMORY RECORD ADDRESSES
16436   000143         LDA P4
16437   031761         STA RECTP
16440   001062         LDA ROMWD      GET THE 'ROMS PRESENT ON SYSTEM' WORD
16441   031742         STA TVAR3      PREPARE TO PUT IT IN THE HEADER
16442   000254         LDA P1
16443   031736         STA T22        SET FLAG FOR BINARY
16444   100327         LDA AROMS,I    SAVE THE BINARY "PRESENT" LINK
16445   031737         STA T23
16446   043607         JSM BINUI      UNINITIALIZE THE BINARY PROGRAM
                       *
16447   004324   RCM3  LDB ASTK1      THESE GO INTO THE COMPILE STACK
16450   034016         STB C          SET THE POINTER
16451   001735         LDA SVC        SAVE REG C (SVC=C)
16452   070540         PWC A,I        SAVE THE OLD C REGISTER ( STILL IN A )
16453   000301         LDA AJSMS      33 WORDS , STARTING HERE MUST BE SAVED
16454   030017         STA D          SET UP THE POINTER
16455   004162         LDB M32        SET THIS COUNTER TO ONE LESS THAN THE
                       *              ABS. VALUE OF THE NUMBER OF WORDS TO BE
                       *              TRANSFERED
16456   070570   RCM2  WWD A,I
16457   070540         PWC A,I
16460   076176         RIB RCM2
16461   042460         JSM WTRR       WRITE THE RECORD
16462   001737         LDA T23        RESTORE THE BINARY LINK
16463   130327         STA AROMS,I
                       *
                       *
                       *
                       *       THIS ROUTINE ENABLES THE INTERRUPT BEFORE THE CASOS RETURNS CONTRO
                       *       THIS ROUTINE IS THE LAST ROUTINE EXECUTED BY ANY STATEMENT SERVICE
                       *       ROUTINE
                       *
                       *
                       *       ON ENTRY : ENTRY AT INTN1 IF MUST RESTORE THE C REGISTER AT
                       *                  COMPLETION
                       *                  ENTRY AT INTEN IF NEED ONLY ENABLE INTERRUPT AND
                       *                  RETURN TO INTERPRETURE
                       *
                       *
                       *
16464   001735   INTN1 LDA SVC        RESTORE THE C REGISTER
16465   030016   INTN2 STA C
16466   070420   INTEN EIR
16467   164365         JMP AINTX,I
                       *
                       *
                       *
                       *
                       *       LDMEM  LOADS THE ENTIRE USER ACCESSABLE READ/WRITE MEMORY
                       *              SPACE
                       *
                       *       SYNTAX : L.C. LDM (<FILE NUMBER>)
                       *
                       *
                       *
                       *       ON ENTRY : CONTROL HERE IF LDM IS RECOGNIZED BY THE INTERPRETURE
                       *                  THE FILE NUMBER IS GOTTEN FROM THE RUN-TIME EXECUTION
                       *                  STACK BY "STANDARD PROCEDURE #1" DETAILED AT THE
                       *                  START OF THE LISTING
                       *
                       *
                       *       TEMPORARIES USED : T1, SVC
                       *
                       *       ROUTINES CALLED : PCALL, STPRL, CHSIZ, RDREC
                       *                         AERR2, ADSRM, ALDSP
                       *
                       *
                       *
                       *
16470   000143   LDMEM LDA P4         MEMORY IS TYPE 4
16471   042710         JSM PCALL      PRELIMINARY CALL FOR LOADS
16472   042622         JSM STPRL      SET UP MEMORY LOAD (START AND END ADDRESS)
16473   000126         LDA P17        SET COUNTER FOR ROM ID
16474   031711         STA T1
16475   001704         LDA EX2        GET THE OLD ROM WORD
16476   005062         LDB ROMWD      GET THE NEW ROM WORD
16477   073007   LDM7  SLA LDM5       SKIP LSB A = 0 = ROM GONE
16500   077014         SLB ERR52      SKIP IF B=0= ROM GONE
```

```
16501   170500   LDM8   SAR 1            LOOK AT THE NEXT BIT
16502   174500          SBR 1
16503   055711          DSZ T1           SEE IF DONE WITH ROMWD. THERE ARE ALWAYS
16504   067477          JMP LDM7         2 EXTRA PASSES TO ZERO THE COUNTER BUT THEY
                 *                       ARE ZERO
16505   067517          JMP LDM10
16506   077073   LDM5   SLB LDM8         SKIP LSB = 0 = ROM ABSENT
16507   140405   ERR51  JSM AERR2,I      ERROR - ROM #T1 IS PRESENT BUT WAS NOT
16510   032461          ASC 1,51         PRESENT AT RCM
16511   001711   LDM9   LDA T1           ROM ID TO REGISTER A
16512   070420          EIR
16513   164357          JMP ADSRM,I      DISPLAY ROM ID CODE
16514   140405   ERR52  JSM AERR2,I      ERROR = ROM #T1 IS NOT PRESENT BUT SHOULD BE !!
16515   032462          ASC 1,52
16516   067511          JMP LDM9
16517   042724   LDM10  JSM CHSIZ        SEE IF IT WILL FIT
16520   001700          LDA CSIZE        MUST CALC. AJSMS-CSIZE AS START OF LOAD
16521   170040          TCA              IN CASE MEMORY IS LARGER THAN FILE
16522   020301          ADA AJSMS
16523   031706          STA MBPTR
16524   042635          JSM RDREC        READ THE RECORD
16525   140433          JSM ALDSP,I      DISPLAY I/O BUFFER
16526   000324          LDA ASTK1
16527   030017          STA D
16530   070571          WWD B,I          GET REGISTER R FROM THE COMPILE STACK
16531   034003          STB R
16532   070570          WWD A,I
16533   031735          STA SVC          GET THE C REGISTER AND SAVE IT (SVC=C)
16534   004300          LDB AJSTK        THE REST OF THE WORDS GO HERE AND HIGHER
16535   034016          STB C
16536   004162          LDB M32          SET THIS COUNTER TO ONE LESS THAN THE
                 *                       ABS. VALUE OF THE NUMBER OF WORDS TO BE
                 *                       TRANSFERED
16537   070570   LDM1   WWD A,I
16540   070540          PWC A,I          RESTORE THE JSM RETURN SYACK
16541   076176          RIB LDM1
16542   067464          JMP INTN1        ENABLE THEINTERRUPT AND EXIT
                 *
                 *
                 *
                 *
                 *
                 *      LDB IS THE CASSETTE LOAD BINARY PTOGRAMS COMMAND
                 *
                 *      SYNTAX L.C. LDB [<FILE NUMBER>]
                 *
                 *
                 *      ON ENTRY : CONTROL HERE IF INTERPRETURE RECOGNIZES LDB
                 *                 STATEMENT. THE FILE NUMBER IS ON THE RUN-TIME
                 *                 EXECUTION STACK AND CAN BE GOTTEN BY "STANDARD
                 *                 PROCEEDURE #1".
                 *
                 *
                 *
                 *      TEMPORARIES USED : T22
                 *
                 *      ROUTINES CALLED : PCALL, BINSZ, RDREC, AERR1, BINUI, ALLOC
                 *
                 *
                 *
                 *
16543   000254   LDB    LDA P1           BINARY PROGRAMS ARE TYPE 1
16544   042710          JSM PCALL        PRELIMINARY CALL FOR OADS
                 *                       PCALL WILL GET THE FILE NUMBER, POSITION
                 *                       THE TAPE, CHECK FOR TYPE =1 (BINARY)
16545   043602          JSM BINSZ        LWAM = CSIZE + 5 TO A
16546   005313          LDB FWBA         THIS IS THE FIRST WORD OF THE BINARY AREA
16547   174040          TCB
16550   020001          ADA B
16551   172415          SAM LDB1         BINARY PROGRAM WILL NOT FIT IN MEMORY
16552   043602   LVBN2  JSM BINSZ
16553   031706          STA MBPTR
16554   000177          LDA P0
16555   031736          STA T22          CLEAR THIS FLAG FOR BINARY
16556   043607          JSM BINUI        UNINITILIZE THE BINARY PROGRAM
16557   042635          JSM RDREC        READ THE RECORD
16560   000330          LDA LWAM         GET THE ADDRESS OF THE BINARY PROGRAM LINKS
16561   130327          STA AROMS,I      ADD THE BINARY'S ADDRESS TO THE TABLE
16562   020143          ADA P4           POINT AT THE INITIALIZATION ENTRY
16563   100000          LDA A,I          GET THE ADDRESS OF THE INITIALIZATION ROUTINE
16564   140000          JSM A,I          RUN THE INITIALIZATION ROUTINE
16565   067464          JMP INTN1        ENABLE THE INTERRUPT AND EXIT
16566   001313   LDB1   LDA FWBA         SEE IF THE VALUE TABLE IS EMPTY
```

---- CASSETTE OPERATING SYSTEM ----

```
16567  011311        CPA VT1            IF EMPTY, WE CAN TRY TO ALOCATE SPACE
16570  067573        JMP LDB2           IT IS EMPTY
16571  140404  ERR54 JSM AERR1,I        BINARY PROGRAM WILL NOT FIT
16572  032464        ASC 1,54
16573  021700  LDB2  ADA CSIZE          CALCULATE THE AMOUNT OF MEMORY REQUIRED
16574  170040        TCA
16575  020140        ADA P7             ALLOW FOR 7 WORD ID TABLE
16576  020330        ADA LWAM
16577  140370        JSM ALLOC,I        MOVE THE EXECUTION STACK
16600  031313        STA FWBA           A RETURNS WITH THE FIRST WORD AVAIL.
16601  067552        JMP LVBN2
               *
               *
               *     BINSZ CALCULATES LWAM - CSIZE TO REGISTER A
               *
               *
               *     TEMPORARIES USED : NONE
               *
               *     ROUTINES CALLED : NONE
               *
               *
               *
16602  001700  BINSZ LDA CSIZE
16603  170040        TCA
16604  020330        ADA LWAM
16605  020140        ADA P7
16606  170201  BNSZ1 RET 1
               *
               *
               *
               *     BINUI IS A ROUTINE TO ALLOW THE BINARY PROGRAM TO
               *     "CLEAN UP" AFTER ITSELF WHEN IT IS REMOVED FROM THE SYSTEM
               *     AS ON AN RCM OR LDB STATEMENT
               *
               *
               *
16607  100327  BINUI LDA AROMS,I        SEE IF BINARY PRESENT
16610  072476        SZA BNSZ1
16611  020141        ADA P6
16612  100000        LDA A,I            GET THE ADDRESS
16613  164000        JMP A,I            DO THE UNINITIALIZATION AND RETURN
               *
               *
               *
               *
               *
               *     THIS IS THE RECORD PROG. AND DATA STATEMENT.
               *
               *
               *     TEMPORARIES USED : RELTH, FLAGA, LWMD
               *                        RECTP, SEFLG, TVAR3
               *
               *     ROUTINES CALLED : GTPAR, BMP1, GWTWH, CHNP2, NGET
               *                       CALTH, CHNTP
               *                       CHSEC, ASYER, REGCK, RCFB, AERR1
               *
16614  043715  RCFZ  JSM REGCK          IS THIS AN R - REGISTER ?
16615  067631        JMP RCP11          NOT AN R - REGISTER
16616  067620        JMP RCF4           DONE ONLY ONE R - REGISTER
16617  067625        JMP RCFK           LEGAL SET OF TWO R - REGISTERS
16620  001277  RCF4  LDA END$           ONLY ONE R - REG ENTERED
16621  020254        ADA P1
16622  031706        STA MBPTR
16623  001756        LDA FLAGA
16624  020144        ADA P3
16625  031743  RCFK  STA LWMD
               *
16626  000145        LDA P2             DATA IS TYPE 2
16627  031761        STA RECTP
16630  067704        JMP RCP10
16631  043741  RCP11 JSM RCFB           SIMPLE VARIABLE , ARRAY OR STRING
16632  067704        JMP RCP10          DONE
               *
               *
               *
               *     THIS IS THE ENTRY TO THE CODE FOR THE RCF STATEMENT
               *
               *
16633  042565  RCF   JSM GTPAR          GET THE FILE NUMBER
16634  000257        LDA M1             SET FIRST FLAG
16635  031757        STA RELTH
16636  000177        LDA P0
16637  031742        STA TVAR3          CLEAR THIS VARIABLE FOR EX2 (STRING COUNT)
16640  042732        JSM BMP1           MOVE THE STACK POINTER BY ONE
16641  067672        JMP RCP1           NO MORE PARAMETERS - MUST BR PROGRAM RECORD
```

```
16642  042703          JSM GWTWH         GET THE WHAT AND WHERE WORD
16643  035756          STB FLAGA         SAVE THE 'WHERE' WORD
16644  035706          STB MBPTR
16645  172447          SAM RCFZ          SKIP IF THE PARAMETER IS A VARIABLE
16646  042517          JSM CHNP2         CHECK OUT THIS PARAMETER
              *                          IF HERE WE DO NOT HAVE A VARIABLE SO
              *                          RECORD THE USER PROGRAM
16647  140424          JSM ASYER,I       NO MORE PARAMETERS - MAY NEVER HAPPEN
16650  067707          JMP RCP2          NON-NUMERIC RETURN
16651  064722          JMP ERLNF         COULD NOT FIND LINE ADDRESS
16652  031706   RCFJ   STA MBPTR         THIS IS THE START OF THE RECORD
16653  042515          JSM CHNTP
16654  067674          JMP RCP4          NO MORE PARAMETERS
16655  067711          JMP RCP5          A NON-NUMERIC PARAMETER AS 'SE'
16656  067663          JMP RCP6          LINE ADDRESS COULD NOT BE FOUND, ADDRESS SET
              *                          TO ENDS
16657  004000          LDB A             B IS THE ADDRESS OF LN2
16660  100001          LDA B,I           GET THE LINE BRIDGE
16661  050053          AND B177          CLEAR THE HIGH ORDER BITS
16662  020001          ADA B             MAKE ADDRESS OF NEXT LINE BRIDGE
16663  031743   RCP6   STA LWMD          THIS IS THE LAST ADDRESS TO BE RECORDED
16664  042732   RCP9   JSM BMP1          MOVE FAP1
16665  067676          JMP RCP7          NO MORE PARAMETERS - DONE
16666  040751          JSM NGET          SEE IF IT IS A NUMBER, IT SHOULD NOT BE
16667  067713          JMP RCP8          OK COULD BE "SE" OR "DB"
16670  140404   ERR58  JSM AERR1,I       INVALID OR MISSING 'SE'
16671  032470          ASC 1,58
16672  001307   RCP1   LDA FWUP
16673  031706          STA MBPTR         THIS IS THE STARTING ADDRESS OF THE RECORD
16674  001277   RCP4   LDA ENDS          SET UP END ADDRESS
16675  031743          STA LWMD
16676  000141   RCP7   LDA P6            USER'S PROGRAM IS TYPE 6
16677  031761          STA RECTP
16700  001760          LDA SEFLG         SEE IF CALCULATOR ALREADY SECURE
16701  072003          RZA RCP10         IF NOT ZERO, DO NOT USE SYSTEM SECURE FLAG
16702  001315          LDA STYFG         IF "SE" NOT REQUESTED USE THIS AS THE SECURITY
16703  031760          STA SEFLG
16704  042626   RCP10  JSM CALTH         CALCULATE RECORD LENGTH
16705  042460          JSM WIRR          WRITE THE RECORD
16706  067464          JMP INTN1         ENABL ETHE INTERRUPT AND EXIT
16707  042541   RCP2   JSM CHSEC         CHECK FOR SECURITY REQUEST
16710  067672          JMP RCP1
16711  042541   RCP5   JSM CHSEC         CHECK TO SEE IF SECURE REQUEST
16712  067674          JMP RCP4
16713  042541   RCP8   JSM CHSEC         CHECK SECURITY REQUEST
16714  067676          JMP RCP7
              *
              *
              *     THIS ROUTINE CHECKS TO SEE IF THE PARAMETER ENTERED WAS AN
              *             R - REGISTER
              *
              *        ON EXIT : RET 1 =PARAMETER WAS NOT AN R - REGISTER
              *                  RET 2 =NO MORE PARAMETERS
              *                  RET 3 =ANOTHER R-REGISTER
              *                  A=ADDRESS OF THE LAST WORD OF THIS R-REGISTER
              *
              *     TEMPORARIES USED : FLAGA (MRW1)
              *
              *     ROUTINES CALLED : REG., BMP1, GWTWH
              *
              *
              *
16715  043735   REGCK  JSM REG.          IS THIS AN R - REGISTER ?
16716  170201          RET 1             NOT AN R - REGISTER
16717  042732          JSM BMP1          MOVE THE STACK POINTER BY ONE
16720  170202          RET 2             NO MORE PARAMETERS
16721  042703          JSM GWTWH         GET THE WHAT AND WHERE WORDS
16722  001756          LDA FLAGA
16723  170040          TCA
16724  020001          ADA B             IS B < FLAGA ?
16725  172003          SAP RCF5          SKIP IF B< FLAGA
16726  140404   ERR55  JSM AERR1,I       ILLEGAL PARAMETER
16727  032465          ASC 1,55
16730  043735   RCF5   JSM REG.          IS THIS AN R - REGISTER ?
16731  067726          JMP ERR55         NOT AN R - REFISTER
16732  000001          LDA B             YES AN R - REGISTER
16733  020144          ADA P3
16734  170203          RET 3
              *
              *
              *
              *     REG. CHECKS FOR THIS ENTRY BEING AN R - REGISTER
```

```
                         *
                         *
16735  042703  REG.  JSM GWTWH          GET THE WHAT WORD AND ABSOLUTE ADDRESS
16736  010270        CPA FVRHA          IS IT AN R-REGISTER?
16737  170202        RET 2              YES
16740  170201        RET 1              NO
                         *
                         *
                         *
                         *
                         *     THIS ROUTINE CHECKS FOR S. VAR, ARRAYS, OR STRINGS ENTERED IN
                         *          A RCF OR LDF STATEMENT.
                         *
                         *
                         *
                         *     ON ENTRY : ONLY SIMPLE VARIABLES, ARRAY ELEMENTS, ENTIRE
                         *                ARRAYS  OR ENTIRE STRINGS ARE ALLOWED IF ANYTHING
                         *                ELSE ERROR 55 IS GIVEN
                         *
                         *
                         *     ON EXIT : THE NECESSARY CHECKS HAVE BEEN MADE AND THE DRIVER
                         *          PARAMETERS ARE SET UP TO LOAD
                         *
                         *     TEMPORARIES USED : RELTH (MRW1+1), FLAGA (MRW1), LWMD(  (OP1+1)
                         *             TVAR1, TVAR3, RECTP
                         *
                         *
                         *     ROUTINES CALLED : BMP1, GWTWH, AERR1, CTYPE
                         *
                         *
                         *
                         *
16741  000305  RCFB  LDA ASTAK          SET THE POINTER TO THE COMPILE STACK
16742  031744        STA TVAR1
16743  000145        LDA P2
16744  031761        STA RECTP          DATA IS TYPE 2
16745  101272  RCFB9 LDA FAP1,I         MUST CHECK FOR VARIABLE
16746  172402        SAM RCF6
16747  067726        JMP ERR55          INVALID DATA LIST ON RCF OR LDF
16750  052750  RCF6  AND SATMP          CLEAR OUT THE LINK BITS
16751  010267        CPA FVRWM          IS THIS A S. VAR. OR ARRAY ELEMENT?
16752  066020        JMP RCFD           HERE IF SIMPLE VARIABLE OR ARRAY ELEMENT
                         *
                         *     THIS CODE IS FOR ARRAYS AND STRINGS
                         *
16753  042452        JSM CTYPE          CHECK THE TYPE OF THIS ENTRY
16754  067775        JMP RCF3           THIS ENTRY NOT A STRING
16755  045742        ISZ TVAR3          THIS IS A STRING SO COUNT IT
16756  004144        LDB P3
16757  035761        STB RECTP          SET TYPE TO 'MIXED DATA' IF STRING ENCOUNTERED
16760  001272        LDA FAP1           GET THE "WHAT" WORD
16761  020142        ADA P5             POINT AT THE STRING ADDRESS WORD
16762  100000        LDA A,I
16763  005744        LDB TVAR1          GET THE POINTER TO THE COMPILE STACK
16764  071402        XFR 3              TRANSFER THE FIRST THREE WORDS OF THE STRING'S
                         *              ORGANIZATION DATA
16765  024144        ADB P3             UPDATE THE POINTER
16766  035744        STB TVAR1
16767  104000        LDB A,I            GET THE STRING LENGTH
16770  024000        ADB A              CALCULATE THE LAST ADDRESS + 1
16771  045757        ISZ RELTH          IS THIS THE FIRST ENTRY ?
16772  066013        JMP RCF10          NO , NOT THE FIRST ENTRY.
16773  024257        ADB M1             YES THE FIRST ENTRY
16774  066010        JMP RCF11          CONTINUE
16775  010171  RCF3  CPA ARRAY          IF HERE WE MUST HAVE AN ARRAY
16776  066000        JMP RCF8
16777  067726        JMP ERR55          UNKNOWN JUNK ENTERED
17000  001272  RCF8  LDA FAP1           MUST CALCULATE THE LAST ADDRESS TO BE LOADED
17001  020144        ADA P3             POINT A AT THE NO. OF WORDS TO BE RECORDED
17002  100000        LDA A,I            GET THE NO. OF WORDS TO BE RECORDED
17003  170040        TCA
17004  020254        ADA P1             B HAS THE ENDING ADDRESS
17005  020001        ADA B              CALCULATE THE ADDRESS OF THE START OF THE RECO
17006  045757        ISZ RELTH          IS THIS THE FIRST ONTRY
17007  066012        JMP RCF1           NO
17010  035743  RCF11 STB LWMD           THIS IS THE LAST WORD TO BE RECORDED
17011  066016        JMP RCFH
17012  024254  RCF1  ADB P1             SEE IF CONTIGUOUS
17013  015706  RCF10 CPB MBPTR
17014  066016        JMP RCFH
17015  066036        JMP ERR56          NOT CONTIGUOUS ERROR
17016  031706  RCFH  STA MBPTR
17017  066025        JMP RCFA
17020  045757  RCFD  ISZ RELTH          IS THIS THE FIRST ENTRY ?
17021  066032        JMP RCF2           NOT THE FIRST ENTRY
```

---- CASSETTE OPERATING SYSTEM ----

```
17022  001756         LDA FLAGA        YES - FIRST ENTRY
17023  020144         ADA P3
17024  031743         STA LWMD
17025  042732  RCFA   JSM BMP1         MOVE THE STACK POINTER BY ONE
17026  170201         RET 1            NO MORE PARAMETERS
17027  042703         JSM GWTWH        GET THE WHAT AND WHERE WORDS
17030  035756         STB FLAGA        SAVE THIS ADDRESS
17031  067745         JMP RCFBB
17032  001756  RCF2   LDA FLAGA        HERE IF NOT THE FIRST S. VARIABLE ENTRY
17033  020143         ADA P4
17034  011706         CPA MBPTR        CHECK FOR CONTIGUITY
17035  066040         JMP RCF7
17036  140404  ERR56  JSM AERR1,I      NOT CONTIGUOUS ERROR
17037  032466         ASC 1,56
17040  020150  RCF7   ADA M4           UPDATE MBPTR
17041  066016         JMP RCFH
                *
                *
                *
                *     LDP IS THE CASSETTE LOAD PROGRAMS STATEMENT, IT WILL
                *     CAUSE THE LOADED PROGRAM TO RUN AFTER LOADING
                *
                *
                *     TEMPORARIES USED : SEE LDF STATEMENT
                *
                *     ROUTINES CALLED : SEE LDF STATEMENT
                *
                *
                *
17042  000254  LDP1   LDA P1
17043  031761         STA RECTP        SET FLAG TO INDICATE THAT THE
17044  042565         JSM GTPAR        COMMAND IS A LOAD NOT A LINK
17045  140605         JSM ACHST,I      FIND THE FILE
17046  000141         LDA P6           FILE TYPE MUST BE A PROGRAM
17047  042714         JSM CHTP1
17050  066206         JMP LDP          IT IS PROGRAM
                *
                *
                *
                *     LDF IS THE CASSETTE LOAD FILE STATEMENT, FOR PROGRAMS AND DATA.
                *
                *     TEMPORARIES USED : RELTH, FLAGA, LWMD
                *
                *     ROUTINES CALLED : GTPAR, ACHST, CHTP1, BMP1, GWTWH, REGCK, RRMAX
                *                       NEWSZ, CALTH, RDREC, PRGLD, CHSIZ, AERR1, CTYPE
                *                       CKKBE, CHNT3, ACOUN
                *
                *
                *     FIRST CHECK FILE TYPE -- MUST BE :  6 = USER'S PROGRAM
                *                                         2 = NUMERIC DATA
                *                                         3 = MIXED STRING AND NUMERIC
                *
                *
                *
17051  042565  LDF    JSM GTPAR        GET THE FILE NUMBER
17052  000257         LDA M1           THIS MARKS THE FACT THAT
17053  031757         STA RELTH        WE HAVE ENTERED THIS ROUTINE
17054  140605         JSM ACHST,I
17055  001701         LDA RTYPE        SEE WHICH TYPE RECORD THIS IS
17056  010141         CPA P6           A PROGRAM FILE ?
17057  066202         JMP LDPX         YES A PRO GRAM FILE
17060  010145         CPA P2           IS THIS A NUMERIC DATA FILE ?
17061  066064         JMP LDF7         YES A NUMERIC DATA FILE
17062  000144         LDA P3           IS THIS A MIXED DATA FILE ?
17063  042714         JSM CHTP1        CHECK THE TYPE
                *
                *     LOAD DATA BEGINS HERE
                *
17064  042732  LDF7   JSM BMP1         MOVE THE STACK POINTER BY ONE
17065  066120         JMP LDF4         NO VARIABLES ENTERED - LOAD R0 ON
17066  042703         JSM GWTWH        GET THE WHAT ANT WHERE WORDS
17067  035756         STB FLAGA        SAVE THE ADDRESS
17070  035706         STB MBPTR
17071  043715         JSM REGCK        SEE IF THIS IS AN R - REG
17072  066100         JMP LDF27        NOT AN R-REGISTER
17073  066075         JMP LDF6         NO MORE PARAMETERS-ONLY ONE R-REG ENTERED
17074  066131         JMP LDF5         LOAD THIS
17075  042436  LDF6   JSM RRMAX        RESET THE RMAX POINTER , ONLY ONE R-REG.
                *                       ENTERED , LOAD FROM HERE ON
17076  042646         JSM NEWSZ
17077  066131         JMP LDF5
17100  043741  LDF27  JSM RCFB         TAKE CARE OR S. VARIABLES, ARRAYS AND STRINGS
17101  042626         JSM CALTH        CALCULATE THE LENGTH OF THE RECORD
```

---- CASSETTE OPERATING SYSTEM ----

```
03224000 17102  042724        JSM CHSIZ       CHECK TO SEE IF THE RECORD WILL FIT
03225000 17103  005701        LDB RTYPE
03226000 17104  014144        CPB P3          IF THE FILE TYPE IS MIXED DATA , THE CSIZE MUST
03227000 17105  066114        JMP LDF8        MUST EQUAL THE ROOM IN MEMORY
03228000 17106  001700        LDA CSIZE
03229000 17107  170040        TCA
03230000 17110  021743        ADA LWMD        THIS IS BEING DONE TO FORCE A SHORT DATA FILE
03231000 17111  020254        ADA P1          TO BE LOADED INTO A LARGER ARRAY , WITH THE
03232000 17112  031706        STA MBPTR       FIRST ELEMENTS ALIGNING PROPERLY
03233000 17113  066134        JMP LDF2
03234000 17114  010177  LDF8  CPA P0          IF A=0 WE HAVE AN EXACT FIT
03235000 17115  066146        JMP LDF9        OK , CONTINUE
03236000 17116  140404  ERRSA JSM AERR1,I     ILLEGAL SET OF STRINGS IN DATA LIST
03237000 17117  051460        ASC 1,S0
03238000 17120  001701  LDF4  LDA RTYPE       MUST BE SURE THE DATA TO BE LOADED INTO
03239000 17121  020146        ADA M2          R-REGISTERS IS NUMERIC
03240000 17122  072074        RZA ERRSA       NOT NUMERIC IF SKIP - STRING
03241000 17123  001277        LDA ENDS        ONLY ONE REG PARAMETER OR NO PARAMETERS ON
03242000 17124  020254        ADA P1          LOAD COMMAND SO LOAD AT R0 ON
03243000 17125  031706        STA MBPTR
03244000 17126  042436        JSM RRMAX       RESET THE RMAX POINTER
03245000 17127  001263        LDA AP1         GET THE TOP OF THE EXECUTION STACK
03246000 17130  020257        ADA M1
03247000 17131  031743  LDF5  STA LWMD
03248000 17132  042626        JSM CALTH       CALCULATE THE EXPECTED LENGTH
03249000 17133  042724        JSM CHSIZ       SEE IF THE MEMORY SPACR IS LARGE ENOUGH
03250000 17134  042646  LDF2  JSM NEWSZ       MUST SET LWMD SO THAT ONLY CSIZE SECTION
03251000 17135  031743        STA LWMD        OF ARRAY HAS "???????" INSERTED
03252000                *
03253000                *
03254000 17136  005706  QUMRK LDB MBPTR       GET THE LOAD POINT
03255000 17137  002751  QSTM1 LDA QMRKS       GET THE ADDRESS OF THE QUESTION MARKS
03256000 17140  071403        XFR 4           WRITE THEM IN
03257000 17141  024052        ADB P128        ADJUST TO NEXT PARTITION
03258000 17142  001743        LDA LWMD        SEE IF WE ARE DONE
03259000 17143  170040        TCA
03260000 17144  020001        ADA B
03261000 17145  172472        SAM QSTM1       SKIP IF WE KEEP GOING
03262000 17146  042635  LDF9  JSM RDREC       READ THE RECORD
03263000 17147  000305        LDA ASTAK       GET THE ADDRESS OF THE TOP OF THE COMPILE STACK
03264000 17150  031744        STA TVAR1
03265000 17151  140610        JSM ACOUN,I     RESET FAP1 IN THE EXECUTION STACK
03266000                *                     POINT AT FILE NUMBER (IF ANY)
03267000 17152  042732  LDP31 JSM BMP1        GET THE NEXT ENTRY
03268000 17153  066176        JMP LDF30       DONE - NO MORE ENTRIES
03269000 17154  042452        JSM CTYPE       WHAT TYPE IS THIS ENTRY ?
03270000 17155  066152        JMP LDP31       TYPE # STRING
03271000 17156  055704        DSZ EX2         TYPE = STRING , COUNT IT
03272000 17157  066160        JMP *+1         ALLOW FOR SKIP
03273000 17160  001272        LDA FAP1        GET THE "WHAT" WORD ADDRESS
03274000 17161  020142        ADA P5          POINT AT ADDRESS OF STRING
03275000 17162  100000        LDA A,I         GET ADDRESS
03276000 17163  004144        LDB P3          SET UP COUNTER
03277000 17164  035711        STB T1
03278000 17165  104000  LDP32 LDB A,I         GET ONE STRING ID WORD
03279000 17166  020254        ADA P1
03280000 17167  115744        CPB TVAR1,I     DOES THIS NEW O.D. WORD COMP WITH THAT EXPECTE
03281000 17170  066172        JMP *+2         YES
03282000 17171  066116        JMP ERRSA       NO - ERROR , THIS FILE CONTAINS AN IMPRIPER
03283000                *                     STRING
03284000 17172  045744        ISZ TVAR1
03285000 17173  055711        DSZ T1
03286000 17174  066165        JMP LDP32       NOT DONE YET
03287000 17175  066152        JMP LDP31       DONE WITH THIS STRING
03288000 17176  001704  LDF30 LDA EX2         ARE ALL STRINGS DONE ON THIS FILE ?
03289000 17177  010177        CPA P0
03290000 17200  067464        JMP INTN1       YES, DONE
03291000 17201  066116        JMP ERRSA       ERROR - THIS FILE CONTAINS AN IMPROPER STRING
03292000                *
03293000                *     LOAD DATA ENDS HERE
03294000                *
03295000                *
03296000                *     LOAD PROGRAMMING BEGINS HERE
03297000                *
03298000                *     ROUTINES CALLED ONLY BY PROG. LOAD CODE :
03299000                *             AFLNA, ARSGT, CLRDB, CHNTP, ACNIN, AERCS, ASSLN
03300000                *
03301000                *     TEMPORARIES USED : RECTP, TVAR2
03302000                *
03303000                *
03304000                *
03305000                *
03306000 17202  004177  LDPX  LDB P0          SEE IF AN LDF FROM KEYBOARD
03307000 17203  042736        JSM CKKBE
```

```
17204  004263         LDB FLAG          YES A RUNNING PROGRAM , SET FLAG
17205  035761         STB RECTP         THIS FLAG DIST. LDP/LDF(PROG)/LDF(KEYBRD)
                *
17206  042427  LDP    JSM STVFY         MUST CHECK IF THE STATE IS LEGAL
17207  042515  LDP18  JSM CHNTP         CHECK THE NEXT PARAMETER
17210  066246         JMP LDP10         NO MORE PARAMETERS
17211  067726         JMP ERR55         NON-NUMERIC PARQMETER ENCOUNTERED
17212  066242         JMP LDP51         LINE ADDRESS NOT FOUND
17213  031706  LDP19  STA MBPTR         START LOADING HERE
17214  031766         STA TVAR2         EXECUTE FROM HERE POSSIBLY
17215  042515         JSM CHNTP         GET THE STARTING LINE NUMBER
17216  066251         JMP LDP11         NO STARTING LINE NUMBER
17217  067726         JMP ERR55         NON-NUMERIC PARAMETER
17220  066221         JMP *+1           COULD NOT FIND LINE'S ADDRESS
17221  042270         JSM PRGLD         LOAD THE PROGRAM
17222  140513         JSM AFLNA,I       FIND THE LINE'S ADDRESS OF LINE IN TMP7
17223  066262         JMP ERR61         ERROR LINE NOT FOUND
17224  031766         STA TVAR2         SAVE THIS ADDRESS FROR THE RUN
17225  001761         LDA RECTP         SEE IF AN LDF FROM PROGRAM
17226  072411         SZA LDF16         SKIP IF AN LDF FROM KEYBOARD
17227  073426         RLA LDP41         LDP IF SKIP-DO A RUN OPERATION
17230  140360  LDF14  JSM ARSGT,I       RESET THE HS GTO ADDRESSES
17231  000145  LDF15  LDA P2            SET THE STATE TO "RUNNING PROGRAM"
17232  031257         STA CSTAT
17233  005766         LDB TVAR2         THIS IS THE "RUN" POINT
17234  035264         STB LEND          SET THE CONTINUE POINT FOR INTERP.
17235  000274         LDA AAEOL         SET ADDRESS OF EOL FOR INTERPRETURE
17236  067465         JMP INTN2         THIS WILL LOAD A INTO C
17237  042264  LDF16  JSM CLRDB         CLEAR THE RUN BIT OF CFLAG
17240  140425         JSM ACNIN,I       DO CONTINUE INITIALIZATION
17241  066231         JMP LDF15         DO A CONTINUE
17242  024254  LDP51  ADB P1            B HAS LAST LINE NUMBER OF PROGREAM
17243  015233         CPB TMP7          IS B WITHIN ONE OF LINE NUMBER IN TMP7?
17244  066213         JMP LDP19         YES SO CONTINUE
17245  064722         JMP ERLNF         BAD LINE NUMBER
17246  001307  LDP10  LDA FWUP
17247  031706         STA MBPTR         THIS IS THE LOAD POINT
17250  031766         STA TVAR2         THIS IS THE EXECUTION POINT
17251  042270  LDP11  JSM PRGLD         LOAD THE PROGRAM
17252  001761         LDA RECTP         DO WE HAVE AN LDF FROM KEYBOARD
17253  072404         SZA LDF18         SKIP IF YES
17254  172454  LDF13  SAM LDF14         IF THIS IS AN LDP OR AN LDF FROM
                *                       KEYBOARD, SKIP IFLDF FROM KEYBOARD
17255  140421  LDP41  JSM AERCS,I       IMITIALIZE THE RUN
17256  066231         JMP LDF15
17257  042264  LDF18  JSM CLRDB         CLEAR THE "RUN" BIT OF CFLAG
17260  140514         JSM ASLLN,I       RESET LNO
17261  067464         JMP INTN1         DONE, RETURN
17262  140404  ERR61  JSM AERR1,I       LINE NOT FOUND-IGNORE LINE NUMBER IN DISPLAY
17263  033061         ASC 1,61
                *
                *
                *
                *
                *      CLRDB CLEARS THE "RUN" BIT OF CFLAG
                *
                *
                *
17264  001232  CLRDB  LDA CFLAG
17265  050151         AND M5            THE BIT IN QUESTION IS BIT 2
17266  031232         STA CFLAG
17267  170201         RET 1
                *
                *
                *
                *      PRGLD LOADS USER'S PROGRAMMING
                *
                *      ON ENTRY : MBPTR SET UP; TAPE POSITIONED
                *
                *      ON EXIT : USER'S PROGRAMMING IS LOADED IF NO ERRORS OCCURED
                *
                *
                *      TEMPORARIES USED : FLAGA, RECTP, TVAR1
                *
                *
                *      ROUTINES CALLED : RDREC, AZRWM, AMPHL, SSCHK, AERR1, AERAV, NEWSZ
                *                    AMPUP, ASSLN
                *
                *
                *
17270  001761  PRGLD  LDA RECTP         IS THIS  AN LDF FROM PROGRAM
17271  172004         SAP PRG17         SKIP IF NOT LDF FROM PROGRAM
17272  000254         LDA P1            SET THIS FOR JUMP THROUGH LOADL
17273  031063         STA NPROG         TO ALERT ROMS
```

```
17274  042376         JSM SSCHK      CHECK FOR GSB OVERLAYS AND JMP LOADL
17275  074560  PRG17  WBC A,I        MUST NOT ALLOW ANY STATEMENTS AFTER  LDF
17276  010053         CPA B177       SINCE THEY WILL NOT BE EXECUTED
17277  066302         JMP PRGL7
17300  140404  ERR50  JSM AERR1,I
17301  032460         ASC 1,50
               *
17302  101706  PRGL7  LDA MBPTR,I    GET THE BRIDGE THAT NEEDS TO BE CHANGED LATER
17303  050215         AND BXCMM      CLEAR LOW ORDER BITS, TRACE BIT AND STOP BIT
17304  031756         STA FLAGA      SAVE THE BRIDGE HALF
17305  001761         LDA RECTP      IF LDP DO ERASE VARIABLES
17306  073002         SLA PRG13
17307  140472         JSM AERAV,I    ERASE THE VARIABLES
17310  042646  PRG13  JSM NEWSZ      CALCULATE MBPTR + CSIZE -1
17311  170040         TCA            SEE IF WE NEED TO MOVE THE R-REGISTERS
17312  021277         ADA ENDS       BY CHECKING IF MBPTR+CSIZE-1>ENDS
17313  172012         SAP PRG11      SKIP IF WE MOVE THE R-REGISTERS LOWER
17314  042646         JSM NEWSZ      CALC. MBPTR+CSIZE-1 -> A
17315  005277         LDB ENDS       CALC. (MBPTR+CSIZE-1)+(RMAX-ENDS) AS NEW RMAX
17316  174040         TCB
17317  025310         ADB RMAX
17320  020001         ADA B
17321  030017         STA D
17322  005277         LDB ENDS       AND ENDS AS THE LAST WORD TO BE MOVED
17323  140465         JSM AMPUP,I    MOVE THE R-REGISTERS HIGHER, RESET ENDS, RMAX
17324  066333         JMP PRG15
17325  001277  PRG11  LDA ENDS       MUST MOVE R-REG LOWER
17326  020254         ADA P1
17327  030016         STA C
17330  042646         JSM NEWSZ
17331  034017         STB D
17332  140466         JSM AMPML,I    MOVE R-REG LOWER, RESET ENDS, RMAX
17333  005277  PRG15  LDB ENDS       THIS IS THE END OF THE LOAD
17334  001706         LDA MBPTR      SET START AND END ADDRESSES
17335  140471         JSM AZRWM,I    ZERO THIS AREA
17336  000177         LDA P0         SET THIS TO DETECT PARTITION ERROR
17337  031744         STA TVAR1
17340  001706         LDA MBPTR      SEE IF THE SECURITY FLAG NEEDS UPDATING
17341  011307         CPA FWUP
17342  066345         JMP PRGL3      UPDATE SECURITY FLAG
17343  001315         LDA STYFG      IS SECURE ?
17344  072003         RZA PRGL4      SKIP IF CALCULATOR IS SECURE ALREADY
17345  001703  PRGL3  LDA EXISF      UPDATE THE SECURITY FLAG
17346  031315         STA STYFG
17347  042635  PRGL4  JSM RDREC      READ THE RECORD
17350  101277  PRG16  LDA ENDS,I     MAKE SURE THE LAST LINE BRIDGE IS SET RIGHT
17351  050167         AND M128       CLEAR LOW ORDER BITS (NO PROG. BELOW)
               *                     AND SAVE THE STOP BIT
17352  131277         STA ENDS,I     RESTORE THE LINE BRIDGE
17353  101706         LDA MBPTR,I    GET NEW LINE BRIDGE
17354  050250         AND BM377      CLEAR HIGH ORDER BITS
17355  061756         IOR FLAGA      COMBINE THE BRIDGE SECTIONS
17356  131706         STA MBPTR,I    RESTORE THE CORRECTED LINE BRIDGE
               *
               *      THIS CODE IS TO CLEAR OUT THE TRACE AND STOP BITS
               *
17357  005704         LDB EX2        GET THE CLEAR - SAVE DEBUG BITS FLAG
17360  077412         RLB PRGL5      IF THE BIT IS SET KEEP THE DEBUG BITS
17361  005706         LDB MBPTR      START HERE TO CLEAR OUT THE DEBUG BITS
17362  100001  PRGL6  LDA B,I        GET THE LINE BRIDGE
17363  050213         AND TMASK      MASK OFF THE TRACE AND STOP BITS
17364  130001         STA B,I        RESTORE THE LINE BRIDGE
17365  015277         CPB ENDS       ARE WE DONE WITH PROGRAM?
17366  066372         JMP PRGL5      YES DONE
17367  050053         AND B177       GET THE BRIDGE'S LINK DOWN TO CALC.
17370  024000         ADB A          THE NEXT LINE'S ADDRESS
17371  066362         JMP PRGL6      CONTINUE
17372  055744  PRGL5  DSZ TVAR1      IF TVAR1=1 AT THIS POINT, A PARTITION ERROR
               *                     HAS OCCURED
17373  170201  PRG10  RET 1
17374  140514         JSM ASLLN,I    RESET LNO
17375  067413         JMP ERR46      PARTITION ERROR IN USER'S PROGRAM - RECOVERY
               *
               *
               *
               *
               *      SSCHK CHECKS THROUGH THE GSB STACK FOR THE RETURNS
               *
               *      IS NPROG=1 IT IS TO CHECK FOR GSB RETURN OVERLAYS IF THE
               *      PRESENT FILE IS LOADED OVER THE CURRENT PROGRAM
               *      IF AN OVERLAY CONDITION IS ENCOUNTERED, ERROR 63 IS GIVEN
               *
               *      IF NPROG=0 IS TO ADJUST THE RETURNS ON THE GSB STACK BY THE
               *      OFFSET IN TVAR1
               *
```

---- CASSETTE OPERATING SYSTEM ----

```
                    *       TEMPORARIES USED : TVAR1
                    *
                    *       ROUTINES CALLED : LNKSB
                    *
                    *
                    *
17376  001261  SSCHK LDA AP3          GET THE TOP OF THE STACK
17377  104000  SSCH3 LDB A,I          GET THE OLD AP2
17400  014257        CPB M1           IF THIS ENTRY IS A M1, WE ARE DONE
17401  066764        JMP LNKSB        IF DONE JUMP THROUGH LOAD-LINK
17402  020144        ADA P3           LOOK AT THE RETURN ADDRESS
17403  104000        LDB A,I
17404  014334        CPB ADR0         SEE IF WE HAVE A GSB FROM KEYBOARD
17405  066423        JMP SSCH1        BYPASS TEST IF TRUE
17406  055063        DSZ NPROG        IF NPROG=1 WE HAVE AN OVERLAY TEST CONDITION
17407  066417        JMP SSCH2        DO THE NECESSARY ADJUSTMENT
17410  045063        ISZ NPROG        RESET THE FLAG
17411  176601        SRM *+1,C        CLEAR THIS ADDRESS FOR THE API ROM
17412  174040        TCB
17413  025706        ADB MBPTR
17414  176007        SBP SSCH1
17415  140404  ERR63 JSM AERR1,I
17416  033063        ASC 1,63
17417  045063  SSCH2 ISZ NPROG        RESET THE FLAG
17420  066421        JMP *+1
17421  025744        ADB TVAR1
17422  134000        STB A,I
17423  020147  SSCH1 ADA M3           MUST RETURN TO OLD AP3 AND CONTINUE
17424  100000        LDA A,I
17425  021300        ADA AP2          ADD IN OFFSET TO ADJUST FOR RELATIVE ADDRESS
17426  066377        JMP SSCH3
                    *
                    *
                    *
                    *
                    *
                    *       STVFY  CHECKS WHETHER THE STATE IS RIGHT FOR THE
                    *       CASSETTE OPERATION IN QUESTION
                    *
                    *
17427  001257  STVFY LDA CSTAT        GET THE "STATE" INDICATOR
17430  010254        CPA P1           STATE=1 IS LEGAL
17431  170201        RET 1
17432  010145        CPA P2           STATE=2 IS LEGAL
17433  170201        RET 1
17434  140404  ERR64 JSM AERR1,I       ANY OTHER STATE IS ILLEGAL
17435  033064        ASC 1,64
                    *
                    *
                    *
                    *       RRMAX RESETS THE RMAX POINTER AFTER R - REGISTERS HAVE BEEN LOADE[D]
                    *
                    *
                    *       ON ENTRY : MBPTR SET, CSIZE SET, REGISTERS NOT LOADED YET
                    *
                    *
                    *       ON EXIT : RMAX UPDATED IF MBPTR + CSIZE - 1 > RMAX
                    *                 ELSE RMAX LEFT AS WAS
                    *
                    *
                    *       TEMPORARIES USED : NONE
                    *
                    *       ROUTINES CALLED : NEWSZ
                    *
                    *
                    *
17436  042646  RRMAX JSM NEWSZ
17437  004000        LDB A
17440  170040        TCA
17441  021310        ADA RMAX
17442  172006        SAP RMX1
17443  001263        LDA AP1          GET TOP OF STACK POINTER
17444  170040        TCA
17445  020001        ADA B            SEE IF WE HAVE MEMORY OVERFLOW
17446  172003        SAP RMX2         SKIP IF OVERFLOW
17447  035310        STB RMAX
17450  170201  RMX1  RET 1
17451  066730  RMX2  JMP ERR62        MEMORY OVERFLOW ERROR
                    *
                    *
                    *       CTYPE CHECKS THE TYPE OF THE ENTRY IN THE EXECUTION STACK
                    *             AND SPECIFIES STRING OR NON-STRING ON EXIT
                    *
```

```
                          *
                          *     ON ENTRY : FAP1 POINTS TO THE ENTRY IN QUESTION
                          *
                          *     ON EXIT : RET 1 = NON-STRING ENTRY AT FAP1
                          *               RET 2 = STRING ENTRY AT FAP1
                          *
                          *
                          *     TEMPORARIES USED : NONE
                          *
                          *     ROUTINES CALLED : GWTWH
                          *
                          *
                          *
17452  042703   CTYPE JSM GWTWH          GET THE WHAT WORD
17453  012747         CPA B151K          CHECK FOR A STRING
17454  170202         RET 2
17455  012746-        CPA B150K          CHECK FOR A STRING
17456  170202         RET 2
17457  170201         RET 1              NON-STRING
                          *
                          *
                          *     WTRR WRITE A RECORD ON THE CASSETTE.
                          *
                          *     ON ENTRY* STARTING MEMORY ADDRESS IN 'MBPTR'
                          *               FILE NUMBER IN "RECNO=T13"
                          *               LENGTH OF RECORD IN WORDS IN 'RELTH'
                          *               FINAL SECURITY STATUS IN 'SEFLG'
                          *               FINAL RECORD TYPE IN     'RECTP'
                          *        ON EXIT : RECORD IS WRITTEN IF NO ERRORS AND TAPE
                          *               POSITION IS IN BODY OF CURRENT RECORD
                          *               THIS COMMAND IS ENTIRELY UNDER BPC CONTROL
                          *
                          *
                          *     TEMPORARIES USED : RELTH (MRW1*1), RECTP (MRW1*3), TVAR3 (OP1)
                          *                        SEFLG (MRW1*2)
                          *     ROUTINES CALLED : CPTP, ERDS0, ACHST, WTRA, VREC ,AERR1, ERDS0
                          *
                          *
                          *
                          *
17460  142773   WTRR  JSM CRTP,I         IS THE CARTRIDGE PROTECTED?
17461  043347         JSM ERDS0          YES, GENERATE ERROR AND TERMINATE
17462  001757         LDA RELTH
17463  020146         ADA M2             MUST CHECK FOR NOTHING TO LOAD FOR KEYS AND
17464  172427         SAM ERR59          PROGRAM
17465  140605         JSM ACHST,I
17466  001757         LDA RELTH
17467  170040         TCA
17470  021677         ADA ASIZE          IF THE RESULT IS POSITIVE, FILE WILL FIT
17471  172002         SAP WTRR2
17472  067426         JMP ERR49          FILE WILL NOT FIT ERROR
17473  001757   WTRR2 LDA RELTH          SET UP THE RECORD LENGTH
17474  031700         STA CSIZE
17475  001761         LDA RECTP          SETUP THE RECORD TYPE
17476  031701         STA RTYPE
17477  001742         LDA TVAR3          MUST REMEMBER THIS FOR RCF,LDF AND ROMWD
17500  031704         STA EX2
17501  001760         LDA SEFLG          UPDATE SECURITY FLAG
17502  031703         STA EXISF
                          *              AUTO - VERIFY
17503  142774         JSM WTRA,I         WRITE THE RECORD
17504  043347         JSM ERDS0          CHECK FOR ERRORS
17505  001344         LDA AVFLG          IS AUTOVERIFY ON -> -1 = NO, ZERO = YES
17506  172402         SAM WTRR1
17507  043227         JSM VREC           VERIFY THE RECORD
17510  170201   WTRR1 RET 1
17511  140404   ERR44 JSM AERR1,I        VERIFY FAILED
17512  032064         ASC 1,44
17513  140404   ERR59 JSM AERR1,I        NOTHING TO RECORD
17514  032471         ASC 1,59
                          *
                          *
                          *
                          *
                          *
                          *
                          *
                          *
                          *     CHNTP BUMPS THE EXECUTION STACK POINTER, FAP1,CHECKS FOR
                          *           ANOTHER PARAMETER ON THE STACK. IF A PARAMETER, GET IT,
                          *           IF THE PARAMETER IS NUMERIC, EVALUATE IT (MAKE IT FIXPT)
                          *           IF NON-NUMERIC, RET 2
                          *           THEN FIND THE LINE ADDRESS CORRESPONDING TO THE NUMERIC
                          *           PARAMETER.
                          *
```

```
                     *
                     *     ON ENTRY : EXEC. STACK POINTER POINTS AT THE PREVIOUS PARAMETER
                     *                ENTRY
                     *     ON EXIT:   RET 1 IF NO MORE PARAMETERS.
                     *                RET 2 IF THE PARAMETER ON THE STACK WAS NON-NUMERIC
                     *                RET 3 : IF THE LINE ADDRESS COULD NOT BE FOUND, A=ENDS
                     *                RET 4 : IF THE LINE ADDRESS COULD BE FOUND, THEN REG A
                     *                CONTAINS THE ADDRESS OF THE LINE'S BRIDGE
                     *
                     *
                     *
                     *
                     *     TEMPORARIES USED : NONE
                     *
                     *     ROUTINES CALLED : BMP1, NGET, FIXPT-1, AFLNA, AERR1
                     *
                     *
                     *
17515  042732  CHNTP JSM BMP1             RETURN IF NO MORE PARAMETERS ON STACK
17516  170201        RET 1                GET THE PARAMETER
17517  040751  CHNP2 JSM NGET             NON-NUMERIC PARAMETER ON STACK
17520  170202        RET 2
17521  040643        JSM FIXPT-1          CONVERT THE NUMBER TO A FIXED POINT NUMBER
17522  173413        SOS ERR11            OVERFLOW ERROR
17523  176414        SAM ERR19            IF LINE NUMBER IS NEGATIVE - ERROR
17524  035233        STB TMP7
17525  076404        SZB CHNP3            IF ZERO START AT FWUP ALWAYS
17526  140513        JSM AFLNA,I          FIND THE LINE ADDRESS
17527  066533        JMP CHNP4            LINE ADDRESS COULD NOT BE FOUND
17530  170204        RET 4                RESTORE A AND RETURN
17531  001307  CHNP3 LDA FWUP             START HERE
17532  170204        RET 4
17533  001277  CHNP4 LDA ENDS             LINE ADDRESS NOT FOUND SO SET A TO ENDS
17534  170203        RET 3
17535  140404  ERR11 JSM AERR1,I          FIXED POINT OVERFLOW ERROR
17536  030461        ASC 1,11
17537  140404  ERR19 JSM AERR1,I          BAD LINE NUMBER
17540  030471        ASC 1,19
                     *
                     *
                     *     CHSEC GETS THE 'SE' OR 'DB' STRING FROM THE EXECUTION STACK, AND
                     *          CHECKS FOR VALIDITY. IF VALID THEN SEFLG IS SET TO -1
                     *          OR TVAR3=1, OTHERWISE THEY ARE LEFT UNCHANGED
                     *          THIS ROUTINE IS CALLED BY THE RCF ROUTINE
                     *
                     *
                     *     ON ENTRY : FAP1 POINTS TO SUSPECTED ENTRY IN EXECUTION STACK
                     *
                     *     ON EXIT : SEFLG OR TVAR3 IS SET IF NO ERRORS OCCURED.
                     *               THEY ARE NOT ALTERED IF ERRORS OCCURED
                     *
                     *
                     *     TEMPORARIES USED : NONE
                     *
                     *     ROUTINES CALLED : GWTWH
                     *
                     *
                     *
                     *
17541  042703  CHSEC JSM GWTWH            GET THE WHAT AND WHERE
17542  170513        SAR 12               LOOK AT THE CLASS
17543  010143        CPA P4               IF A=4 WE ARE OK
17544  066546        JMP CHSE1
17545  067670  SEDBE JMP ERR58            INVALID "SE" OR "DB" PARAMETER
17546  034017  CHSE1 STB D                B POINTS TO STRING
17547  074570        WBD A,I              GET THE FIRST CHARACTER
17550  170607        SAL 8
17551  074571        WBD B,I              GET THE SECOND CHARACTER
17552  060001        IOR B                MAKE COMPOSITE WORD
17553  020246        ADA AMSE             ADD IN -"SE"
17554  072004        RZA CHSEE            SKIP IF INVALID "SE"
17555  000257        LDA M1               SET SECURE
17556  031760        STA SEFLG
17557  170201        RET 1
17560  020232  CHSEE ADA B7403            DO WE HAVE A "DB" REQUEST
17561  072064        RZA SEDBE            SKIP IF ERROR
17562  000254        LDA P1               A "DB" REQUEST SO MARK IT
17563  031742        STA TVAR3
17564  170201        RET 1
                     *
                     *     GTPAR GETS THE FIRST PARAMETER ON THE EXECUTION STACK
                     *
                     *     ON EXIT :  B AND RECNO CONTAIN THE FIRST PARAMETER
                     *                IF THERE IS NO PARAMETER ENTERED, ZERO IS ASSUMED
                     *
                     *
```

```
                        *
                        *
                        *       TEMPORARIES USED : RECNO, SEFLG
                        *
                        *       ROUTINES CALLED : NGET, FIXPT-1, CFD, CNULL, AERR1
                        *
                        *
17565  042605  GTPAR JSM CFD             COMPLETE ANY PENDING FINDS
17566  042611  GTPR2 JSM CNULL           CHECK FOR THE NULL PARAMETER AND CALL COUNT
17567  066601        JMP GTPR5           WE HAVE A NULL SO LOAD OR RECORD AT  FILE 0
17570  040751  GTPR1 JSM NGET            GET THE FIRST PARAMETER
17571  067726  GTPR4 JMP ERR55           IF WE GET HERE - BAD ERROR !!!!
17572  040643  GTPR3 JSM FIXPT-1         CONVERT FROM FLOAT TO FIXED
17573  173442        SOS ERR11           OVERFLOW ERROR
17574  176407        SBM ERR53           IF MINUS - ERROR
17575  035725  GTPR6 STB RECNO
17576  000177        LDA P0              CLEAR THE SECURITY FLAG TEMPORARY
17577  031760        STA SEFLG
17600  170201  BMP2  RET 1
17601  004177  GTPR5 LDB P0              WE HAVE A NULL SO SET FILE TO 0
17602  066575        JMP GTPR6           CONTINUE
17603  140404  ERR53 JSM AERR1,I         CASSETTE PARAMETER IS NEGATIVE
17604  032463        ASC 1,53
                        *
                        *
                        *
                        *       THIS ROUTINE WILL SET THE PA FOR THE CASSETTE AND
                        *       COMPLETE ANY PENDING FINDS ON THE SELECT CODE=
                        *       CSELC
                        *
                        *
                        *
17605  042665  CFD      JSM STPRA
17606  142767           JSM CFDA,I
17607  043347           JSM ERDS0
17610  170201           RET 1
                        *
                        *
                        *
                        *       CNULL CHECKS THE ENTERED PARAMETER FOR THE NULL , IF NULL
                        *       THEN - RET 1
                        *       ELSE - RET 2
                        *
                        *
                        *       TEMPORARIES USED : NONE
                        *
                        *       ROUTINES CALLED : ACOUN
                        *
                        *
                        *
17611  140610  CNULL JSM ACOUN,I         SET FAP1 AND COUNT THE PARAMETERS ENTERED
17612  010177        CPA P0              IF A=0 WE HAVE NO NUMERIC PARAMETERS
17613  064615        JMP CNLL1           IF NO NUMERIC WE MUST SEE IF NULL
17614  170202        RET 2
17615  101272  CNLL1 LDA FAP1,I          GET "WHAT"
17616  170513        SAR 12              LOOK AT CLASS
17617  010140        CPA P7              SEE IF NULL
17620  170201        RET 1               NULL PARAMETER OK
17621  067726        JMP ERR55           NOT NUMERIC AND NOT NULL SO ERROR
                        *
                        *
                        *
                        *       STPRL SETS UP POINTERS FOR RECORD AND LOAD MEMORY STATEMENTS
                        *
                        *       ON EXIT : STARTING ADDRESS IS SET UP
                        *                 ENDING ADDRESS IS SET UP
                        *
                        *
                        *
                        *       TEMPORARIES USED : LWMD (OP1+1)
                        *
                        *       ROUTINES CALLED : NONE
                        *
                        *
                        *
17622  000300  STPRL LDA AJSTK           THIS IS THE END OF MEMORY DUMP (JSM STACK+1)
17623  031743        STA LWMD
17624  001305        LDA OFWAM           THIS IS THE PERMANENT START OF USER'S MEMORY SP
17625  031706        STA MBPTR
                        *
                        *
                        *       CALTH  CALCULATES THE LEGTH IN WORDS OF A SECTION OF MEMORY
                        *              (LWMD - MBPTR + 1)
                        *
```

```
                      *       ON ENTRY: MBPTR CONTAINS THE STARTING ADDRESS
                      *                 LWMD CONTAINS THE ENDING ADDRESS
                      *
                      *       ON EXIT:  LENGTH IN RELTH
                      *
                      *
                      *       TEMPORARIES USED : LWMD (OP1+1), RELTH (MRW1+1)
                      *
                      *       ROUTINES CALLED : NONE
                      *
                      *
                      *
17626   001743  CALTH LDA LWMD
17627   005706        LDB MBPTR          CALCULATE THE RECORD LENGTH AS:
17630   174040        TCB
17631   020001        ADA B              LWMD - MBPTR + 1
17632   020254        ADA P1
17633   031757        STA RELTH          STORE RESULT IN RELTH
17634   170201        RET 1
                      *
                      *
                      *
                      *
                      *
                      *       RDREC SETS THE NUMBER  OF TRIES AT READING, WITH RECOVERY IF
                      *       ERRORS ARE ENCOUNTERED.
                      *
                      *
                      *       ON ENTRY : ALL POINTERS ARE SET UP FOR READING A RECORD
                      *                  AND THE TAPE IS POSITIONED PROPERLY
                      *
                      *
                      *       ON EXIT : THE RECORD IS READ
                      *                 IF ERRORS OCCURED, RECOVERY HAS BEEN ATTEMPTED
                      *
                      *
                      *       TEMPORARIES USED : LDTRS (MRW1+4), INSTR (T11)
                      *
                      *       ROUTINES CALLED : ACHST, RBDYA, ERDS0
                      *
                      *
                      *
                      *
17635   001343  RDREC LDA NOTRY          SET THE NUMBER OF READ TRIES
17636   031762        STA LDTRS
17637   002745        LDA STBCD          STB PTR,I COMMAND FOR LOADING
17640   031723        STA INSTR
17641   140605  RDRC1 JSM ACHST,I        REPOSITION THE TAPE
17642   142775        JSM RBDYA,I        READ THE RECORD
17643   043347        JSM ERDS0          CHECK FOR ERRORS
17644   170201        RET 1              SUCCESSFUL READ
17645   066641        JMP RDRC1          READ ERROR - DO AGAIN
                      *
                      *
                      *       NEWSZ CALCULATES (MBPTR+CSIZE TO B) -1 TO A
                      *
                      *
                      *       ON ENTRY : MBPTR AND CSIZE ARE SET UP
                      *
                      *       ON EXIT : CALCULATION IS DONE
                      *
                      *       TEMPORARIES USED : NONE
                      *
                      *       ROUTINES CALLED : NONE
                      *
                      *
                      *
17646   005706  NEWSZ LDB MBPTR
17647   001700  NWSZ1 LDA CSIZE
17650   020001        ADA B
17651   004000        LDB A
17652   020257        ADA M1
17653   170201        RET 1
                      *
                      *
                      *
                      *
                      *       LDXI CHECKS FOR (,X) PARAMETER, CONVERTS FLAGA TO FLOAT, AND
                      *            TRANSFERS THE FLOATING POINT NUMBER TO (,X)
                      *
                      *
                      *
                      *       ON ENTRY : FAP1 POINTS AT PREVIOUS 'WHAT' WORD
                      *                  FLAGA CONTAINS THE FIXED POINT NUMBER TO BE CONVERTED.
                      *
```

```
                     *
                     *     ON EXIT :   RET 1 - NO MORE PARAMETERS
                     *                 RET 2 - TRANSFER COMPLETE
                     *
                     *
                     *     TEMPORARIES USED : FLAGA (MRW1)
                     *
                     *     ROUTINES CALLED : BMP1, AFLTP, GWTWH, AASTR
                     *
                     *
                     *
17654   035756  LDX3  STB FLAGA
17655   042732  LDXI  JSM BMP1            MOVE THE STACK POINTER
17656   170201        RET 1               RETURN IF NO MORE PARAMETERS
17657   005756        LDB FLAGA           GET THE NUMBER
17660   140563  LDX2  JSM AFLTP,I         CONVERT TO FLOATING POINT NUMBER
17661   042703        JSM GWTWH           GET THE WHAT AND WHERE WORD
17662   000127        LDA ADR2            SOURCE ADDRESS
17663   140372        JSM AASTR,I         TRACE THE ASSIGNMENT
17664   170202        RET 2               DONE - FULL PRECISION TRANSFER
                     *
                     *
                     *     STPRA SETS THE PERIPHERIAL ADDRESS FOR THE CASSETTE
                     *     AND DISABLES THE INTERRUPT SYSTEM
                     *
                     *
                     *     ON ENTRY : CSELC CONTAINS THE CURRENT SELECT CODE FOR CASSETTES
                     *
                     *     ON EXIT : PA = CSELC
                     *               INTERRUPT IS DISABLED
                     *
                     *
                     *     TEMPORARIES USED : SVC, FLG2
                     *
                     *     ROUTINES CALLED : NONE
                     *
                     *
17665   070430  STPRA DIR                 MUST CHECK TO SEE IF DMA IS NOT USED
17666   000013        LDA DMAPA           IF DMAPA IS ZERO WE CAN PROCEED
17667   072405        SZA STPA1           IF THE DMAPA IS ZERO THEN DMA IS AVAILABLE
17670   011345        CPA CSCF            IF DMA IS BUSY BUT A CASSETTE IS USING IT, WE
17671   066674        JMP STPA1           CAN PROCEED
17672   070420        EIR                 WE MUST WAIT FOR DMA TO COMPLETE
17673   066665        JMP STPRA
17674   001514  STPA1 LDA CSELC           GET THE CASSETTE'S SELECT CODE
17675   030011        STA PA
17676   000016        LDA C               SAVE THE C REGISTER
17677   031735        STA SVC
17700   000177        LDA P0
17701   031764        STA FLG2            CLEAR THE FIND SELECT FLAG
17702   170201        RET 1
                     *
                     *
                     *     GWTWH GETS THE "WHAT" AND THE "WHERE" WORDS FROM THE EXEC. STACK
                     *
                     *     ON ENTRY : FAP1 IS POINTING AT THE "WHAT " WORD DESIRED
                     *
                     *     ON EXIT : REGISTER A CONTAINS THE "WHAT " WORD
                     *               REGISTER B CONTAINS THE "WHERE" WORD
                     *
                     *
                     *     TEMPORARIES USED : ABSAD
                     *
                     *     ROUTINES CALLED : NONE
                     *
                     *
                     *
17703   005272  GWTWH LDB FAP1            SET B TO POINT AT PROPER ENTRY
17704   040616        JSM ABSAD+1         GET THE ABSOLUTE ADDRESS OF THE ENTRY
17705   101272        LDA FAP1,I          GET THE WHAT WORD
17706   052750        AND SATMP           CLEAR OUT THE LINK BITS
17707   170201        RET 1
                     *
                     *
                     *     PCALL IS A ROUTINE OF COMMON CODE USED BY SEVERAL LOAD ROUTINES
                     *
                     *
                     *     ON ENTRY : REGISTER A CONTAINS THE DESIRED RECORD TYPE
                     *
                     *     ON EXIT : 1). PA IS SET TO CSELC
                     *               2). DESIRED RECORD NUMBER IS IN RECNO
                     *               3). RECORD DESIRED IS FOUND IF NO ERRORS
                     *               4). CHECKS FOR A PROGRAM ON THE TAPE AT RECNO
                     *               5). VERIFIES THAT TYPE MATCHES
                     *
```

---- CASSETTE OPERATING SYSTEM ----

```
                      *
                      *     TEMPORARIES USED : RECTP (MRW1+3)
                      *
                      *     ROUTINES CALLED : GTPAR, CHST, AERR1
                      *
                      *
                      *
17710  031761  PCALL STA RECTP            REG A HAS THE DESIRED RECORD TYPE ON ENTRY
17711  042565        JSM GTPAR            GET THE LFILE NUMBER
17712  140605        JSM ACHST,I          DO A BPC FIND
17713  001761  CHTYP LDA RECTP            MUST CHECK TO SEE IF TYPE IS RIGHT
17714  011701  CHTP1 CPA RTYPE
17715  170201  PCLL1 RET 1                TYPE OK
17716  001701        LDA RTYPE            SEE IF THERE IS ANYTHING TO LOAD
17717  072403        SZA ERR60            IF TYPE IS ZERO THEN CSIZE=0 TOO
17720  140404  ERR57 JSM AERR1,I          FILE TYPE MISMATH ERROR
17721  032467        ASC 1,57
17722  140404  ERR60 JSM AERR1,I          NOTHING TO LOAD ERROR
17723  033060        ASC 1,60
                      *
                      *
                      *
                      *
                      *     CHSIZ WILL CHECK THE SIZE OF THE RECORD TO BE READ IN TO SEE
                      *          IF THERE IS ROOM IN MEMORY
                      *          IF THERE IS NO ROOM, ERROR 62 IS GIVEN
                      *
                      *
                      *     ON ENTRY : RECORD HAS BEEN FOUND SO HEAD VARIABLES ARE SET.
                      *                RELTH OF RECORD TO LOAD HAS BEEN CALCULATED
                      *
                      *
                      *     ON EXIT : RETURN TO CALLING ROUTINE, IF CSIZE <=RELTH
                      *               GIVES ERROR 62 IF CSIZE > RELTH AND TERMINATES LOAD
                      *
                      *
                      *
                      *     TEMPORARIES USED : RELTH (MRW1+1)
                      *
                      *     ROUTINES CALLED : AERR1
                      *
                      *
                      *
                      *
                      *
17724  001700  CHSIZ LDA CSIZE            GET FILE SIZE FROM HEAD
17725  170040        TCA
17726  021757        ADA RELTH            SUBTRACT CSIZE FROM ROOM IN MEMORY
17727  172066        SAP PCLL1
                      *                   IF THE RESULT IS POSITIVE
17730  140404  ERR62 JSM AERR1,I          FILE WILL NOT FIT - MEMORY OVERFLOW
17731  033062        ASC 1,62             NO ROOM IN MEMORY
                      *
                      *
                      *     BMP1 MOVES THE EXECUTION STACK POINTER BY ONE ENTRY
                      *
                      *     ON ENTRY : A CALL TO SUBROUTINE 'COUNT' MUST PROCEED A CALL TO
                      *                BMP1
                      *
                      *
                      *     ON EXIT : THE POINTER ( FAP1 ) IS MOVED
                      *                ONE PARAMETER TO THE RIGHT
                      *          IF RET 2, IF RET 1, NO MORE PARAMETERS ON THE STACK
                      *
                      *
                      *     TEMPORARIES USED : NONE
                      *
                      *     ROUTINES CALLED : ABUMP
                      *
                      *
                      *
                      *
                      *
                      *
17732  000254  BMP1  LDA P1
17733  140607        JSM ABUMP,I
17734  170201        RET 1                NO MORE PARAMETERS
17735  170202        RET 2                FAP1 IS MOVED
                      *
                      *
                      *
                      *     CKKBE CHECKS THE SYSTEM TO SEE IF THIS COMMAND WAS A KEYBOARD
                      *          ENTRY OR A PROGRAM STATEMENT
                      *
                      *     CSTAT = 1 => KEYBOARD EXECUTION
```

```
                    *              = 2 => RUNNING PROGRAM
                    *
                    *     ON ENTRY : CSTAT CONTAINS SYSTEM STATE
                    *
                    *     THIS ROUTINE IS ONLY CALLED BY LDK AND LDF/LDPOF
                    *     PROGRAM FILES. THESE CALLING ROUTINES CALL STVFY
                    *     WHICH GUARANTEES THAT CSTAT = 1 OR 2
                    *     ON EXIT : RET 1 = PROGRAM LINE IS EXECUTING
                    *               RET 2 = KEYBOARD EXECUTION
                    *
                    *
                    *
                    *     TEMPORARIES USED : NONE
                    *
                    *     ROUTINES CALLED : NONE
                    *
                    *
                    *
                    *
                    *
17736   001257  CKKBE LDA CSTAT         GET THE STATE
17737   010145        CPA P2            IS IT A KEYBOARD EXECUTION
17740   170201        RET 1             THIS IS PROGRAM EXECUTION
17741   000334        LDA ADP0          KEYBOARD EXECUTION
17742   031264        STA LEND          MUST CANCEL ALL PENDING GTO/GSB'S
17743   170202        RET 2
                *
                *
                *
                *            DEFINITIONS
                *
                *
        077756  FLAGA EQU MRW1          TEMPORARY STORAGE
        077757  RELTH EQU MRW1+1
        077760  SEFLG EQU MRW1+2
        077761  RECTP EQU MRW1+3
        077742  TVAR3 EQU OP1           CARRIES THE END OF THE MEMORY SECTION
        077765  TVAR4 EQU MRW1+7
        077743  LWMD  EQU OP1+1
        077744  TVAR1 EQU OP1+2         TEMPORARY STORAGE
        077735  SVC   EQU T21           DEDECATED TO SAVING THE C REGISTER
        077766  TVAR2 EQU MRW1+8        TEMPORARY STORAGE
        077226  LNO   EQU CSTMP+8       FOR CALLING AFLNA
        077762  LDTRS EQU MRW1+4        NUMBER OF TRIES AT NORMAL LOAD
        077232  CFLAG EQU CSTMP+12      CFLAG IS FOR CONTROL SUPERVISOR
        077233  TMP7  EQU CSTMP+13
17744   115733  CPBCD CPB T19,I         COMPARE INSTRUCTION FOR RBODY
17745   135733  STBCD STB T19,I         STORE COMMAND FOR RBODY
17746   150000  B150K OCT 150000
17747   151000  B151K OCT 151000
17750   171777  SATMP OCT 171777
17751   021774  QMRKS OCT 21774
                *
                *
                *
                *
                *     ROUTINE LINKS
                *
                *
                *
17763                 ORG 17763B
17763                 BSS 1             THIS IS THE CHECKSUM WORD
17764   165530  LNKSB JMP LOADL,I       THIS IS A READ/WRITE LINK FOR THE CHAIN
17765   170201  LKSBR RET 1             RETURN USED BY ALL USERS OF THIS LINK
17766           STOPC BSS 1             LINK TO STOP CASSETTE
17767           CFDA  BSS 1             LINK TO COMPLETE FIND ROUTINE
17770           PTBRA BSS 1
17771           MRKA  BSS 1             LINK TO EXECUTE 'MRK'
17772           REWA  BSS 1             LINK TO EXECUTE 'REW'
17773           CRTP  BSS 1             LINK TO EXECUTE 'CARTP'
17774           WTRA  BSS 1             LINK TO EXECUTE 'WTR'
17775           RBDYA BSS 1             LINK TO EXECUTE 'RBODY'
17776           ERSA  BSS 1             LINK TO EXECUTE 'ERS'
17777           IDRA  BSS 1             LINK TO EXECUTE 'IDR'
                *
                *
                *

                      *****RAM WORDS*****

                *
                *-----CASSETTE DEDICATED RAM
                *
        077676  CRECN EQU CATMP         RECORD NUMBER (PART OF HEAD)
```

***RAM WORDS***

```
         077677  ASIZE EQU CATMP+1       ABSOLUTE SIZE
         077700  CSIZE EQU CATMP+2       CURRENT SIZE
         077701  RTYPE EQU CATMP+3       RECORD TYPE
         077702  RRWNO EQU CATMP+4       RECORD REWRITE NUMBER
         077703  EXISF EQU CATMP+5       SECURITY FLAG #0=SECURE 0=UNSECURE
         077704  EX2   EQU CATMP+6       USED FOR FWUP IN RKM
         077705  TPOS  EQU CATMP+7       TAPE POSITION INDICATOR
         077706  MBPTR EQU CATMP+8       POINTS TO BODY SECTION
         077763  ERRWD EQU MRW1+5        LOGS ERRORS
         077764  FLG2  EQU MRW1+6        BITS 1-15 ARE ALWAYS ZERO
                 *                       BIT ZERO SET= HARDWARE FIND
                 *                       BIT ZERO CLR = BPC FIND
                 *
                 *     SHARED TEMPORARIES
                 *
                 *-----------------------
                 *
                 *-----  PARTITION HEAD
                 *
         077767  PRCTR EQU MRW1+9        PARTITION COUNTER
         077714  PARNO EQU T4            PARTITION NUMBER
         077715  PARLN EQU T5            PARTITION LENGTH
         077716  PRWNO EQU T6            PARTITION REWRITE NUMBER
         077717  TEMP1 EQU T7            USED IN WAIT AND NCODE
         077720  MSIZE EQU T8            HOLDS THE ABSOLUTE SIZE OF THE RECORDS TO MARK
         077721  CHSUM EQU T9            USED FOR ALL CHECKSUM CALCULATIONS
         077721  TDIST EQU CHSUM         TARGET-STARTING RECORD NUMBER
         077722  NOREC EQU T10           NUMBER OF RECORDS TO MARK
         077723  INSTR EQU T11           HOLDS AN INSTRUCTION (STR,COMPR)
         077724  FPASS EQU T12           COUNTS NUMBER OF ATTEMPTS TO FIND
         077725  RECNO EQU T13           TARGET RECORD NUMBER
         077726  MRKSZ EQU T14           NUMBER OF WORDS NCODE WRITES ON MARK
                 *
                 *
                 *           FLG1 : BITS 1 - 14  ARE ALWAYS ZERO
                 *                  BIT  0     SET MEANS TRACK A
                 *                             CLEAR MEANS TRACK B
                 *
                 *
         077707  FLG1  EQU CATMP+9       MARK SETS THIS BEFORE ENTERING IDR, ANDTHIS
                 *                       REMEMBERS THE TRACK
                 *
                 *
                 *           COUNTERS
                 *
                 *
         077730  RHCTR EQU T16           USED IN REWRITE OF RECORD HEAD
         077730  PHCTR EQU T16           PARTITION HEAD COUNTER
         077731  WCTR  EQU T17           WORD COUNTER USED IN PARTITION BODY
         077732  RWCTR EQU T18           COUNTS WORDS IN S RECORD
                 *
                 *           POINTERS

         077733  PTR   EQU T19           GENERA  PURPOSE MOVING POINTER
         077734  BDPTR EQU T20           MOVING BODY POINTER
                 *
                 *

            ***** CASSETTE INITIALIZATION ****

                 *
                 *
                 *
                 *
   23750                 ORG 23750B
   23750 000254  CSTIN LDA P1
   23750 031514          STA CSELC       SET CAST. SELECT CODE
   23752 030011          STA PA          SET CAST. PERIPHERAL ADDR
   23753 000127          LDA P16
   23754 031705          STA CATMP+7     SET CAST. TO "LOST"
   23755 000006          LDA R6          CLEAR "BEGIN/END" OF TAPE
   23756 030007          STA R7          CLEAR "SERVO FAILED, CARTRIDGE OUT"
   23757 000045          LDA P255
   23760 030005          STA R5          OUTPUT STOP COMMAND
   23761 000254          LDA P1
   23762 031707          STA CATMP+9     SET TRACK 0
   23763 000143          LDA P4
   23764 031343          STA NOTRY       SET NO. OF READ AND SEARCH TRIES
   23765 000177          LDA P0
   23766 031345          STA CSCF
   23767 031344          STA AVFLG       ENABLE AUTO VERIFY
   23770 030013          STA DMAPA       DMA AVAILABLE
   23771 002774          LDA LKSRA       SET UP THE LINK ADDRESS FOR THE OPTION
   23772 031530          STA LOADL       ROMS
   23773 170201          RET 1
   23774 017765  LKSRA ABS LKSBR         ADDRESS OF THE LINK RETURN
                         END

END OF PASS 2 NO ERRORS DETECTED
```

BASE-PAGE READ-WRITE-MEMORY

```
00003000 76550              ORG 76550B
00004000                    UNL
02000000 00602              ORG DMALO
02001000 00602  023724      DEF DMAL.
02002000 00605              ORG ACHST
02003000 00605  021712      DEF CHST
02004000               *
02005000               *
02006000               *      LINKS TO INTERPRETURE
02007000               *
02008000 07740              ORG 7740B
02009000 07740  021653      DEF SSC          LINK TO EXECUTE "SSC"
02010000 07741  021667      DEF TRKCH        LINK TO EXECUTE "TRK"
02013000 07757              ORG 7757B
02014000 07757  021717      DEF AVD          LINK TO EXECUTE "AVD"
02015000 07760  021715      DEF AVE          LINK TO EXECUTE "AVE"
02016000               *
02017000               *
02018000               *
02019000               *
02020000               *
02021000               *
02022000 17766              ORG 17766B
02023000               *
02024000               *
02025000               *    ROUTINE LINKS TO CASOS
02026000               *
02027000               *
02028000               *
02029000 17766  021701      DEF STOPC        LINK TO STOPC
02029100 17767  021352      DEF CFD          LINK TO CFD
02030000 17770  021607      DEF PTBRG        LINK TO EXECUTE THE BRIDGE PATCH ROUTINE
02031000 17771  020736      DEF MRK          LINK TO MRK
02032000 17772  021414      DEF REW          LINK TO REW
02033000 17773  020465      DEF CARTP        LINK TO CART. PROTECT
02034000 17774  021227      DEF WTR          LINK TO WRITE
02035000 17775  020034      DEF RBODY        LINK TO READ
02036000 17776  021450      DEF ERS          LINK TO ERASE
02037000 17777  021131      DEF IDR          LINK TO IDENTIFY
02038000               *
02039000               *

                     ******** TITLE PAGE *********

02041000               *
02042000               ***************************************************************
02043000               *
02044000               *        9825 TAPE CARTRIDGE DRIVERS
02045000               *
02046000               *        VERSION  FURVU
02047000               *
02048000               *
02049000               *
02050000               ***************************************************************
02051000               *
02052000               *
02055000               *
02056000               *
02057000               *
02058000               *-----------LIST OF ABBREVIATIONS
02059000               *
02060000               *
02061000               *  BET  -- BEGINNING OR END OF TAPE (HRDW STATUS BIT 0).
02062000               *  BOT  -- BEGINNING OF TAPE.
02063000               *  COT  -- CARTRIDGE OUT (HRDW STATUS BIT 2).
02064000               *  DIR  -- TAPE DIRECTION.
02065000               *  EOT  -- END OF TAPE.
02066000               *  EVTM -- END OF VALID TAPE MARK (6" OF GAP).
02067000               *  EWA  -- ENABLE WRITE AMPLIFIER.
02068000               *  HS   -- HIGH SPEED (90 INCHES/SEC).
02069000               *  IPG  -- INTER-PARTITION GAP (APPROX. .018").
02070000               *  IRG  -- INTER-RECORD GAP (1") ALSO HRDW STATUS BIT 4.
02071000               *  LS   -- LOW SPEED (22 INCHES/SEC)
02072000               *  MVG  -- MOVING LINE (HRDW STATUS BIT 5).
02073000               *  PHEAD-- PARTITION HEAD(3 WORDS + CHSUM).
02074000               *  POF  -- POWER OFF (HRDW STATUS BIT 3).
02075000               *  RBODY-- RECORD BODY.
02076000               *  RHEAD-- RECORD HEAD.
02077000               *  SCH  -- SEARCH (HRDW CMD BIT 1).
02078000               *  SFL  -- SERVO FAILURE (HRDW STATUS BIT 1).
02079000               *  THI  -- HIGH READ THRESHOLD.
02080000               *  THOLD-- READ THRESHOLD.
02081000               *  TLO  -- LOW READ THRESHOLD.
02082000               *  TOS  -- TAPE OPERATING SYSTEM
02083000               *  WPR  -- WRITE PROTECTED (HRDW STATUS BIT 7).
```

***RDHED***

```
20000                ORG 20000B
                *------SUBROUTINE  RDHED
                *
                *     THIS ROUTINE READS A RECORD HEAD(LENGTH
                * DEFND BY "HDLN") AND STORES IT INTO MEMORY( RHPTR
                * DEFINES WHERE IN MEMORY).
                *
20000   115733  CPINS CPB PTR,I
20001   001343  RDHED LDA NOTRY      SET NOTRY
20002   031731        STA WCTR       ATTEMPTS TO READ THE HEAD
20003   000057  ERDHD LDA RLFDH      READ DATA CMD AT HI THRESHOLD
20004   043715        JSM CMDW       START GOING!WAIT TIL UP TO SPEED
20005   002736        LDA RHPTR      SET PTR TO THE FIRST
20006   031733        STA PTR        WORD OF THE RECORD HEAD
20007   043271        JSM INGAP      FIND REC GAP! COULD BE IN DATA
20010   043261        JSM INDTA      FIND PREAMBLE
20011   043720        JSM RSTHD      SETS DATA MODE & PROPER THOLD
20012   043234        JSM PAMBL      GET SYNC'D WITH THE TAPE
                *
                ****READ RECORD HEAD
                *
20013   000177  .DC10 LDA ZERO       INITIALIZE THE CHECKSUM
20014   031721        STA CHSUM      FOR READING THE REC HEAD
20015   000137        LDA HDLN       INITIALIZE THE
20016   031730        STA RHCTR      RECORD HEAD COUNTER
20017   043242  .DC13 JSM GETWD      GET NEW WORD
20020   067204        JMP .DC6
20021   055730        DSZ RHCTR      DONE WITH HEAD?
20022   067024        JMP *+2        NO
20023   067031        JMP .DC1       YES
20024   135733  STINS STB PTR,I
20025   025721        ADB CHSUM
20026   035721        STB CHSUM      UPDATE HEAD CHECKSUM
20027   045733        ISZ PTR        MOVE HEAD PTR
20030   067017        JMP .DC13
20031   015721  .DC1  CPB CHSUM      READ HEAD CORRECTLY?
20032   170202        RET 2          YES! EXIT WITH TAPE STILL MOVING
20033   067204        JMP .DC6       HEAD CHSUM ERROR
```

***RBODY***

```
                *
                *------SUBROUTINE RBODY
                *
                *    THIS ROUTINE READS THE BODY OF A RECORD.SET
                *    INSTR= STB PTR,I INSTR TO STORE BODY INTO MEMORY
                *    INSTR= CPB PTR,I INSTR TO COMPARE BODY WITH MEMORY
                *
20034   043001  RBODY JSM RDHED      READ THE RECORD HEAD
20035   170201        RET 1          HEAD READ ERROR
20036   001706        LDA MBPTR      GET MASTER BODY PTR (POINTS TO
                *                    1ST WORD IN MEMORY FOR THE BODY)
20037   031734        STA BDPTR      AND INIT THE REF POINTER.
20040   021700        ADA CSIZE      FORM MAX ADDR ALLOWED
20041   170040        TCA            AND STORE ITS NEG FOR USE IN
20042   031732        STA RWCTR      DETERMINING WHEN TO STOP READING
20043   001725        LDA RECNO      GET TARGET RECORD NUMBER.
20044   011676        CPA CRECN      IS IT THE SAME AS THIS RECORD?
20045   067047        JMP *+2        YES
20046   067222        JMP .DC99      NO!WE HAVE THE WRONG RECORD!
20047   000177        LDA ZERO
20050   031767        STA PRCTR      SET PARTION CTR=0! 1ST PART IS 0
                      IFZ
20051   031727        STA DLFLG      CLEAR THE DUMMY LINE FLAG.
                      XIF
                *
                *------NOW INIT. ITEMS NEC TO READ EACH PARTITION
                *
20052   000150  .DC4  LDA M4         -4=NO. OF WORDS IN PHEAD
20053   031730        STA PHCTR      COUNTING THE PHEAD CHSUM
20054   002737        LDA PHPTR      PHPTR POINTS TO STORAGE AREA
20055   031733        STA PTR        FOR THE PHEAD
20056   043724        JSM SHTHD      PUT HROW IN READ,DATA,THI MODE
                *                    THI IS IMPT FOR IPG DETECTION!
                *
                *------MUST GET BY THE POSTAMBLE INTO THE PGAP
                *
20057   000177        LDA ZERO
20060   031721        STA CHSUM      INIT. CHECK SUM REGISTER
20061   076600        SSC *          STAY HERE UNTIL FIND IPG
20062   076605  .DC18 SSC *+5        SKIP WHEN IN DATA
20063   000005        LDA R5         GET STATUS
20064   170503        SAR 4          GET THE IRG BIT
```

***RBODY***

```
20065  073075          SLA *-3       SKIP IF STILL PARTITION GAP
20066  067224          JMP .DC89     HIT AN IRG
                *
                *----- JUST LEFT AN IPG
                *
20067  043720          JSM RSTHD     SETS DATA MODE & PROPER THOLD
20070  043234          JSM PAMBL     GET BY PREAMBLE
20071  043242   .DC40  JSM GETWD     GET REST OF PARTITION
20072  067215          JMP .DC17     HIT IPG
20073  045730          ISZ PHCTR     HAVE I READ LAST WD IN PHEAD?
20074  067076          JMP *+2       NO! THEN STORE IT
20075  067103          JMP .DC2      ALL DONE WITH P HEAD
20076  135733          STB PTR,I     STORE 1 WORD OF PHEAD
20077  025721          ADB CHSUM     ADD IN CHSUM
20100  035721          STB CHSUM     SAVE CHSUM
20101  045733          ISZ PTR       MOVE PTR FOR NEXT STORE
20102  067071          JMP .DC40     GET NEXT WD OF PHEAD
                *
                *-----FINISHED READING PHEAD! CHECK FOR ERRORS
                *
20103  015721   .DC2   CPB CHSUM     B REG HAS TAPE-READ CHSUM
20104  067106          JMP *+2
20105  067215          JMP .DC17     PHEAD CHSUM ERROR
                *
                *-----CHECK PARTITION RE-WRITE NUMBER. IT MUST AGREE
                *     WITH THE ONE IN THE RECORD HEAD. IF IT DOESN'T
                *     THEN WE HAVE AN OLD PARTITION
                *
20106  001702          LDA RRWNO
20107  011716          CPA PRWNO
20110  067112          JMP *+2
20111  067224          JMP .DC89     HIT AN OLD PARTITION
                *
                *-----CHECK TO SEE IF WE SKIPPED ANY PARTITIONS
                *
                       IFZ
20112  001714   .DC11  LDA PARNO     GET CURRENT PARTITION NUMBER
20113  011767          CPA PRCTR     SAME AS EXPECTED PART NUMBER?
20114  067121          JMP .DC12     YES--NO ERROR
20115  001723          LDA INSTR     CAN'T ALTER MEMORY IF THIS IS
20116  013000          CPA CPINS     A VERIFY. SKIP IF NOT VERIFY!
20117  067231          JMP VFYER      VERIFY--EXIT NOW!
20120  042463          JSM ERLN      IF PRGM. THIS INSERTS A DUMMY
                *                    LINE OF *'S,AND LOGS A READ BODY ERROR.
20121  001714   .DC12  LDA PARNO     CURRENT PARTITION NUMBER
20122  020254          ADA ONE       PLUS 1 EQUALS
20123  031767          STA PRCTR     NEW EXPECTED PARTITION NUMBER.
                       XIF
                *
                *-----MUST COMPUTE THE STARTING ADDR FOR STORING THE
                *     COMING PARTITION BODY. BDPTR IS THE REFERENCE
                *     PTR FOR PROGRAM STORAGE. PTR IS THE MOVING PTR
                *     IF IT IS A DATA RECORD, A RELATIVE ADDR IS
                *     COMPUTED USING THE PARTITION NO. (PARNO) AND
                *     THE PARTITION LENGTH (128 WDS FOR DATA).
                *
20124  001734          LDA BDPTR     GET REF PTR VALUE
20125  031733          STA PTR       INIT. MOVING PTR
20126  005715          LDB PARLN     INITIALIZE THE WORD COUNTER FOR
20127  035731          STB WCTR      READING THE PARTITION BODY.
20130  020001          ADA B         FORM MAX ADDR USED FOR BODY
20131  021732          ADA RWCTR     STORE AND DET IF IT EXCEEDS LMT.
20132  172002          SAP *+2       0=LAST PARTITION! >0=ERROR
20133  067137          JMP *+4       OK TO READ
20134  031732          STA RWCTR     SAVE FACT THAT THIS COULD BE
20135  072402          SZA *+2       THE LAST PARTITION. SKIP IF SO!
20136  067224          JMP .DC89     ERROR--EXCEED ALLOWED MEM SPACE
                *
                *-----NOW CHECK TO SEE IF THIS IS A DATA RECORD
                *
20137  001701          LDA RTYPE     GET REC TYPE
20140  010141          CPA PRGM      IS THIS A PROGRAM RECORD?
20141  067146          JMP *+5       IT IS PROGRAM! NO ADDR COMPUTE.
20142  001714          LDA PARNO     GET PARTITION NO.
20143  170606          SAL 7         MULT BY PAR. SIZE (128)
20144  021706          ADA MBPTR     ADD IN BODY SECTION BASE ADDR
20145  031733          STA PTR
                *
                *****READ THE PARTITION BODY
                *
20146  000177          LDA ZERO      GET A 0
20147  031721          STA CHSUM     INIT THE CHSUM WORD
20150  072600          SFC *         GUAR THAT I IGNORE 1 FLAG WHICH
20151  000004          LDA R4        COULD BE THE EXTRA BIT OF CHSUM
20152  043234          JSM PAMBL     GET IN SYNC AGAIN WE ARE
```

```
                    *****RBODY*****

                       *                    GETTING BY THE PROCESSING PREAMBLE
20153   043242   .DC3  JSM GETWD            READ 1 WD OF THE PARTITION BODY
20154   067215         JMP .DC17            HIT GAP
20155   001723         LDA INSTR            GET THE INSTRUCTION (EITHER A
                       *                    STORE,I FOR LOAD CMDS; OR A
                       *                    COMPARE,I FOR VERIFY CMDS)
20156   070000         EXE A                EXECUTE THE A REG AS AN INSTRUCTION
20157   067161         JMP *+2              IF STORE WAS EXECUTED,ALWAYS
                       *                    HIT THIS INSTR. BUT IF CPB, ONLY
                       *                    IF COMPARE WAS CORRECT.
20160   067231         JMP VFYER            COMPARE ERROR
20161   025721         ADB CHSUM            ADD IN CHSUM
20162   035721         STB CHSUM            SAVE CHSUM
20163   045733         ISZ PTR              MOVE PTR; READY FOR NEXT WORD
20164   055731         DSZ WCTR             COUNT WORD; ALL DONE WITH BODY?
20165   067153         JMP .DC3             NO; GET ANOTHER WORD
                       *
                       *-----DONE READING THE PARTITION BODY!
                       *
                       *-----NOW LET'S CHECK FOR A READ ERROR
                       *
                       *
20166   043242   .DC30 JSM GETWD            GET PARTITION BODY CHECKSUM
20167   067215         JMP .DC17            FOUND GAP
20170   015721         CPB CHSUM            COMPUTED CHECKSUM (CHSUM)=
                       *                    TAPE-READ CHECKSUM (IN B REG) ?
20171   067173         JMP *+2              NO ERROR; KEEP GOING
20172   067215         JMP .DC17            BODY CHSUM ERROR
                       *
                       *-----TAPE IS IN POSTAMBLE NOW; NEXT WE MUST SEE IF
                       *     THERE IS MORE TO READ.
                       *
20173   001733         LDA PTR              IT'S AT 1 POS. BEYOND LAST WD
                       *                    STORED. THUS NEXT PART. BODY
                       *                    WORD GOES THERE.
20174   031734         STA BDPTR            UPDATE PROG. REF. PTR
20175   001732         LDA RWCTR            GET CTR TO SEE IF DONE WITH REC
20176   072402         SZA .DC35            A 0 MEANS ALL DONE
20177   067052         JMP .DC4             MORE TO READ
                       *
                       *-----DONE READING THIS RECORD
                       *
20200   045676   .DC35 ISZ CRECN            NEXT REC IS PRESENT + 1
20201   000145         LDA TWO              SET TPOS TO "WE KNOW
20202   031705   .DC36 STA TPOS             THE NO. OF THE NEXT REC"
                       *                    STSAF WILL STOP THE TAPE
20203   067705         JMP STSAF            THIS WILL COMBINE HRDW AND SFTW
                       *                    STATUS AND DO A RET 1 IF AN
                       *                    ERROR WAS FOUND; RET 2 IF OK.
                    *****READ ERROR SECTION*****

                       *
                       *****ERROR RECOVERY SECTION AND ERROR LOGGING
                       *
                       *
                       *----INSTR :  DEFINES OPERATION OF RBODY
                       *
                       *     1.) INSTR=STINS----MEANS READ MODE
                       *     2.) INSTR=CPINS----MEANS VERIFY MODE
                       *
                       *-----GET TO .DC6 FOR
                       *          1.)REC HEAD CHSUM ERROR
                       *          2.)GAP DETECTED DURING REC HEAD READ
                       *
20204   043450   .DC6  JSM BCKUP            GET READY FOR ANOTHER TRY OR
20205   043456         JSM STPED            GET LEFT OF ERROR; STOP TAPE
20206   055731         DSZ WCTR             ANOTHER TRY?
20207   067003         JMP ERDHD            YES--READ HEAD;DON'T RESET WCTR!
20210   000052         LDA RHERR            READ ERROR IN RECORD HEAD
20211   031763         STA ERRWD            REMEMBER THE ERROR
20212   000127         LDA D16              SET TAPE POSITION
20213   031705         STA TPOS             TO "LOST".
20214   067705         JMP STSAF            COMBINE ERRORS AND EXIT
                       *
                       *-----NOTICE THAT REC HEAD ERRORS ARE FATAL
                       *-----NO RECOVERY IS ATTEMPTED
                       *
                       *-----GET TO .DC17 FOR
                       *          1.)UNEXPECTED GAP (IN PHEAD OR PBODY)
                       *          2.)CHSUM ERROR    (IN PHEAD OR PBODY)
                       *
20215   001723   .DC17 LDA INSTR            CHECK THE MODE
20216   013000         CPA CPINS            OF RBODY
20217   067231         JMP VFYER            VERIFY!
```

```
                  *****READ ERROR SECTION*****
                  *-----ERLN WILL LOG A READ BODY ERROR IN ERRWD!
20220  042463           JSM ERLN      RECOVERY--INSERT A DUMMY LINE
20221  067052           JMP .DC4      GET THE NEXT PARTITION
                  *
                  *-----WE HAVE THE WRONG RECORD
                  *
20222  000236     .DC99 LDA NRERR     WRONG RECORD
20223  067232           JMP LOGER     LOG ERROR & POSITION TAPE.
                  *
                  *----GET TO .DC89 FOR
                  *
                  *          1.)HITTING AN OLD PARTITION (FATAL ERROR)
                  *          2.)DETECTION OF AN IRG (FATAL ERROR)
                  *          3.)EXCEED MEMORY LIMIT (FATAL ERROR)
                  *
20224  000044     .DC89 LDA RBERR     LOG ERROR
20225  031763           STA ERRWD     = READ BODY
20226  001723           LDA INSTR     FIND OUT WHICH
20227  013024           CPA STINS     MODE RBODY IS IN
20230  067200           JMP .DC35     READ! STOP TAPE AND EXIT
20231  000237     VFYER LDA VYERR     VERIFY! LOG A VERIFY
20232  031763     LOGER STA ERRWD     ERROR
20233  067200           JMP .DC35     STOP TAPE AND EXIT

                  *****PREAMBLE*****

                  *
                  *-----SUBROUTINE PAMBL
                  *
                  *
                  *-----THIS ROUTINE IS USED TO GET SYNC'D WITH THE
                  *  TAPE. IT RECEIVES SERIAL DATA BITS FROM THE
                  *  HROW DECODER. IT ASSUMES THE PREAMBLE ON THE TAPE
                  *  IS A STRING OF ZEROS ENDING IN A ONE. PAMBL WAITS
                  *  FOR A ONE TO MEAN END OF PREAMBLE.  THIS ROUTINE
                  *  WILL NOT GET STUCK IN GAP.
                  *
20234  076602     PAMBL SSC *+2       CHECK FOR GAP FIRST
20235  170201           RET 1         GAP DETECTED--ERROR
20236  072676           SFC *-2       SKIP IF DECODER NOT READY
20237  000004           LDA R4        GET DATA BIT AND CLR FLG
20240  073074           SLA PAMBL     SKIP IF DATA BIT IS A ZERO
20241  170201           RET 1         FOUND A 1--END OF PREAMBLE

                  *
                  *-----SUBROUTINE  GETWD (FORMS 16 BIT WORDS)
                  *
                  *
                  *-----THIS ROUTINE FORMS 16 BIT WORDS FROM THE BIT
                  *  SERIAL DECODER. THE BITS ENTER AT 0 BIT AND ARE
                  *  MOVED UP TO THE SIGN BIT. THIS ROUTINE IGNORES
                  *  ONE BIT BEFORE FORMING WORDS.
                  *
                  *        NORMAL EXIT: WORD DONE  (P+2)
                  *        ERROR  EXIT: HIT IPG    (P+1)
                  *
20242  072600     GETWD SFC *         IGNORE 1 BIT
20243  000004           LDA R4        CLR FLAG! DON'T WANT TO SEE IT TWICE
20244  004254           LDB ONE       WHEN THIS MOVES TO SIGN BIT,
                  *                   THE WORD IS DONE!
20245  072203     NBIT  SFS *+3       NEXT BIT READY?
20246  076677           SSC *-1       NO--ARE WE IN GAP?
20247  170201           RET 1         YES--ERROR
20250  000004           LDA R4        GET THE BIT AND CLR THE FLG.
20251  050254           AND ONE       MASK ALL BITS EXCEPT B0
20252  176404           SRM ENDWD     END OF WORD?
20253  174600           SRL 1         NO
20254  024000           ADB A         STORE BIT
20255  067245           JMP NBIT      GET ANOTHER BIT
20256  174600     ENDWD SRL 1
20257  024000           ADB A         STORE FINAL BIT
20260  170202           RET 2         NORMAL RETURN

                  ******INDTA******

                  *
                  *-----SUBROUTINE INDTA (FIND A DATA REGION)
                  *
                  *-----THIS ROUTINE LOOKS FOR A DATA REGION. BIT 4 OF
                  *  THE STATUS REG (R5) IS THE IRG BIT! 0=DATA! 1=GAP
                  *  THIS ROUTINE MUST ALSO WATCH FOR ERRORS WHICH CAN
```

```
                         ******INDTA******
                         *  STOP THE SYSTEM BECAUSE DATA DETECTION REQUIRES
                         *  THE TAPE TO BE MOVING.
                         *
20261  000005  INDTA LDA R5           GET STATUS
20262  050130        AND ERMSK        ALLOWS COT,SFL & BET TO BE TESTD
20263  072402        SZA *+2          IS POF=COT=SFL=BET=0?(NO ERRORS)
20264  170201        RET 1            NO! WE HAVE A HRDW ERROR
20265  000005        LDA R5           YES!HRDW OK! GET STATUS AGAIN
20266  170503        SAR 4            GET BIT 4.
20267  073472        RLA INDTA        SKIP IF STILL IN AN IRG
20270  170201        RET 1

                         *
                         *-----SUBROUTINE  INGAP (FINDS IRG)
                         *
                         *-----INGAP LOOKS FOR INTER-RECORD GAPS. IT USES
                         *  THE IRG BIT (BIT 4) OF THE STATUS WORD!
                         *  IRG=1 MEANS INTER-REC. GAP! IRG=0 MEANS DATA.
                         *
20271  000005  INGAP LDA R5           GET STATUS
20272  170503        SAR 4            GET BIT 4
20273  073076        SLA INGAP        SKIP IF STILL IN DATA
20274  170201        RET 1            NORMAL RETURN

                         ****ENCODER*****

                         *
                         *-----SUBROUTINE NCODE
                         *
                         *-----THIS ROUTINE WILL WRITE A RECORD HEAD AND
                         * BODY FOR AN EXISTING RECORD.(HRK CREATES RECORDS)
                         * IT WILL WRITE THE RECORD IN "PARTITION" FORM.
                         *
                         *
                         *****WRITE RECORD HEAD
                         *
20275  000057  NCODE LDA RLFDH        TELL HRDW TO READ,LS,FWD
                         *            THOLD=HI FOR GAP DETECTION
20276  043715        JSM CMDW         START GOING!WAIT TIL UP TO SPEED
20277  043271        JSM INGAP        COULD START IN DATA BEFORE GAP!
20300  043261        JSM INDTA        FIND THE RECORD PREAMBLE.
                         *
                         *----- DELAY TURN-ON OF WRITE AMP
                         *
20301  000177  NCEP1 LDA ZERO
20302  031714        STA PARNO        1ST PARTITION IS NO. 0
20303  030004        STA R4           DEF DATA LINE BEFORE WRITE DATA
20304  031721        STA CHSUM        INIT. CHECKSUM
20305  000074        LDA WLFDD        GIVE THE HRDW A
20306  043730        JSM OUTCM        WRITE CMD.(33 MICROS SFTW DELAY)
                         *
                         *-----INIT. FOR WRITING THE RECORD
                         *
20307  001702        LDA RRWNO
20310  031716        STA PRWNO        SET PART RE-WR # = REC RE-WR #
20311  005706        LDB MBPTR
20312  035734        STB BDPTR        SET BDPTR TO LOC TO BE WRITTEN
20313  002736        LDA RHPTR        SET PTR TO POINT AT THE
20314  031733        STA PTR          FIRST WORD OF THE RECORD HEAD.
20315  000137        LDA HDLN         SET RECORD HEAD CTR TO HDLN-1
20316  020257        ADA M1           BECAUSE LOOP AT .NC10 DOES NOT
20317  031730        STA RHCTR        INCLUDE WRITING RHEAD CHSUM.
20320  004254        LDB ONE          MAKE TEMP1 POSITVE BEC THAT
20321  035717        STB TEMP1        MEANS MORE REC TO WRITE.
                         *
                         *-----NOW WRITE THE RECORD HEAD.
                         *
20322  043421        JSM PUTWD        B REG=1! WRITE PREAMBLE.
20323  105733  .NC10 LDB PTR,I        GET HEAD WORD
20324  043421        JSM PUTWD        WRITE THE WORD ON TAPE
20325  025721        ADB CHSUM        UPDATE THE
20326  035721        STB CHSUM        CHSUM
20327  045733        ISZ PTR          ADVANCE THE PTR TO NEXT RHEAD WD
20330  055730        DSZ RHCTR        COUNT WORD JUST WRITTEN! DONE?
20331  067323        JMP .NC10        NOT YET! GET NEXT WORD
20332  002737  .NC3  LDA PHPTR        DONE WITH RHEAD! NOW INITIALIZE
20333  031733        STA PTR          PTR FOR PHEAD
20334  043421        JSM PUTWD        B REG HAS CHSUM! PUT IT ON TAPE!
20335  004254        LDB ONE          SET B=1
20336  043421        JSM PUTWD        WRITE POSTAMBLE
20337  001701        LDA RTYPE
20340  072002        RZA *+2
```

***ENCODER***

```
02507000 20341  067414           JMP MARKO      RTYPE=0: DO MARK
02508000 20342  001717           LDA TEMP1      DONE YET?
02509000 20343  172002           SAP *+2        SKIP IF NOT DONE WRITING
02510000 20344  067407           JMP .NC11      HAVE FINISHED THIS RECORD
02511000                 *
02512000                 *-----WRITE AN IPG
02513000                 *
02514000 20345  000101   .NC1    LDA WLFTG      WRITE GAP--FOR IPG
02515000 20346  043730           JSM OUTCM      COULD DESTROY EAST BIT OF POSTAM
02516000 20347  000177           LDA ZERO
02517000 20350  031721           STA CHSUM
02518000 20351  000147           LDA M3
02519000 20352  031730           STA PHCTR      UPDATE PARTITION HEAD CTR
02520000                 *
02521000                 *-----FOR NOW, DATA AND PROG PARLN ARE TREATED THE SAME
02522000                 *
02523000 20353  042523           JSM PTCLC      WRITE AN IPG & COMPUTE PART LENGTH
02524000 20354  000177           LDA ZERO
02525000 20355  030004           STA R4         WANT DATA LINE TO BE 0 WHEN EWA
02526000 20356  000074           LDA WLFDD      GET READY TO WRITE DATA AGAIN
02527000 20357  043730           JSM OUTCM
02528000 20360  004254           LDB ONE
02529000 20361  043421           JSM PUTWD      WRITE PREAMBLE
02530000                 *
02531000                 *----- WRITE PARTITION HEAD
02532000                 *
02533000 20362  105733   .NC13   LDB PTR,I
02534000 20363  043421           JSM PUTWD      WRITE PARTITION HEAD
02535000 20364  025721           ADB CHSUM      UPDATE THE
02536000 20365  035721           STB CHSUM      CHSUM
02537000 20366  045733           ISZ PTR
02538000 20367  045730           ISZ PHCTR
02539000 20370  067362           JMP .NC13      STILL PART. HEAD TO ENCODE
02540000 20371  043421           JSM PUTWD      WRITE HEAD CHECKSUM
02541000                 *
02542000                 *****NOW HANDLE PARTITION BODY
02543000                 *
02544000 20372  004254           LDB ONE
02545000 20373  043421           JSM PUTWD      WRITE PROC. PREAMBLE
02546000 20374  000177           LDA ZERO
02547000 20375  031721           STA CHSUM      RESET CHECKSUM
02549000 20376  105734   .NC14   LDB BOPTR,I    GET BODY WORD
02554000 20377  043421           JSM PUTWD      WRITE PARTITION BODY
02555000 20400  025721           ADB CHSUM      UPDATE THE
02556000 20401  035721           STB CHSUM      CHSUM
02557000 20402  045734           ISZ BOPTR
02558000 20403  055731           DSZ WCTR
02559000 20404  067376           JMP .NC14      MORE TO WRITE
02560000 20405  045714           ISZ PARNO      INC PARNO FOR NEXT PAR. WRITE
02561000 20406  067332           JMP .NC3       CHECK FOR ADDIT PARTITIONS
02562000 20407  043726   .NC11   JSM STPCA      OUTPUT A STOP CMD TO THE HRDW.
02563000 20410  000145           LDA TWO        SET TAPE POS INDICATOR TO "WE
02564000 20411  031705           STA TPOS       KNOW THE # OF NEXT REC":
02565000 20412  045676           ISZ CRECN      INCR TO NEXT REC.
02566000 20413  170201           RET 1          NORMAL RETURN
02567000                 *
02568000                 *----- IT IS A MARK COMMAND
02569000                 *
02570000 20414  004257   MARKO   LDB M1         GET ALL ONES WORD FOR TAPE
02571000 20415  043421           JSM PUTWD
02572000 20416  055731           DSZ WCTR
02573000 20417  067414           JMP MARKO
02574000 20420  170201           RET 1          NORMAL RETURN
02576000                 *
02577000                 *-----SUBROUTINE  PUTWD  (WRITES 16 BIT WORD)
02578000                 *
02579000                 *       WRITES THE B-REG ONTO TAPE SIGN BIT FIRST
02580000                 *       ASSUMES BIT  0 GOES TO BIT SERIAL ENCODER
02581000                 *       IT ALWAYS WRITES AN EXTRA 1 ON THE TAPE TO
02582000                 *       ALLOW EXTRA PROCESSING TIME AT THE END OF A
02583000                 *       WORD.
02584000                 *
02585000 20421  000157   PUTWD   LDA M15        SET BIT CTR
02586000 20422  072600   .NC30   SFC *          WAIT TIL ENCODER IS READY
02587000 20423  174716           RBR 15         GET B15 INTO B0
02588000 20424  034004           STB R4         GIVE HRDW ENC B0
02589000 20425  072175           RIA .NC30      SKIP IF NOT DONE WITH THE WORD
02590000                 *---RIA INSTR WILL LEAVE A=1 WHEN DONE!
02591000 20426  072600           SFC *          WAIT FOR ENCODER
02592000 20427  030004          STA R4         OUTPUT EXTRA BIT=1
02593000 20430  170201           RET 1
02594000                 *
02595000                 *----ON EXIT,B REG HAS WORD WRITTEN ON THE TAPE
02596000                 *
```

*****WGAP****

```
                     *
                     *------WGAP (WRITES GAP;ASSUMES B HAS NO. OF TACH PULSES)
                     *
20431   000101       WGAP  LDA WLFTG      PUT HRDW INTO WRITE,LS.
20432   043730             JSM OUTCM      FWD,TAC,GAP MODE
20433   072600       .WGP1 SFC *          LOW SPEED; TACH PULSE?
20434   000004             LDA R4         CLR TAC
20435   076502             SIB *+2        YES;ARE WE DONE?
20436   067433             JMP .WGP1      NO; KEEP COUNTING
20437   170201             RET 1          NORMAL RETURN
```

```
                     *
                     *------SUBROUTINE WGAPH (WRITE GAP AT HS)
                     *
20440   000124       WGAPH LDA WHFTG      PUT HRDW INTO WRITE,HS.
20441   043730             JSM OUTCM      FWD,TAC,GAP MODE
20442   000005             LDA R5         GET HRDW STATUS
20443   050130             AND ERMSK      CHECK FOR HRDW ERRORS
20444   072476             SZA *-2        SKIP IF NONE
20445   010254             CPA ONE        IS HRDW ERROR=BET?
20446   067545             JMP HOLE       YES--DETERMINE POSITION.
20447   067705             JMP STSAF      NO--ERROR
```

***BCKUP***

```
                     *
                     *------SUBROUTINE BCKUP
                     *
                     *     THIS ROUTINE WILL TURN THE TAPE AROUND AND
                     *  POSITION THE TAPE IN   THE FIRST GAP IT SEES.
                     *  IT IS DESIGNED PRIMARILY FOR GETTING BACK IN
                     *  FRONT OF A RECORD AFTER READING ITS HEAD.
                     *
20450   043475       BCKUP JSM TURN       THIS TURNS THE TAPE
20451   043261       BUP1  JSM INDTA      ALLOWS TURN TO HAVE 1 GAP +
                     *                    1 DATA SECTION UNCERTAINTY.
20452   043271             JSM INGAP      FIND AN INTER-RECORD GAP
20453   002734             LDA SETLN      THIS WILL WAIT A SETTLING
20454   043525             JSM WAIT       DISTANCE.
20455   067726             JMP STPCA      STOP CASSETTE & EXIT
```

```
                     *
                     *------SUBROUTINE STPED
                     *
                     *     THIS ROUTINE WILL WAIT UNTIL THE CASSETTE
                     *  COMES TO A DEAD STOP.
                     *
20456   043726       STPED JSM STPCA      OUTPUT A STOP CMD TO THE HRDW
20457   000005       STPW  LDA R5         GET HRDW STATUS
20460   170504             SAR 5          PUT MVG BIT INTO LSB
20461   073476             RLA *-2        SKIP IF STILL MOVING
20462   002727             LDA COAST      WAIT UNTIL IT'S DONE
20463   072100             RIA *          COASTING (ABOUT 1.5 MSEC)
20464   170201             RET 1          EXIT
```

***CARTP***

```
                     *
                     *------SUBROUTINE CARTP
                     *
                     *     THIS CHECKS TO SEE IF A CARTRIDGE IS WRITE
                     *  PROTECTED. ONLY CALL THIS ROUTINE WHEN YOU WISH
                     *  TO WRITE ON THE TAPE BECAUSE IT GENERATES AN
                     *  ERROR IF THE CARTRIDGE IS WRITE PROTECTED.
                     *
20465   043635       CARTP JSM STSBF      CHECK HRDW STATUS
20466   170201             RET 1          ERROR
20467   000005             LDA R5         LOAD HRDW STATUS REG.
20470   170506             SAR 7          MOVE WPR BIT INTO LSB
                     *                    IF WPR=0, START WITH NO ERRORS
20471   073003             SLA .C         SKIP IF IT IS OK TO WRITE
20472   004234             LDB WPERR      ERROR--WRITE NOT ALLOWED
20473   035763             STB ERRWD      LOG ERROR=WRITE NOT ALLOWED!
20474   067705       .C    JMP STSAF      COMBINE ERRORS & EXIT
```

*****TURN***

```
                     *
                     *-----TURN(REVERSES TAPE DIR! POS=.1-.3" FROM ENTRY)
                     *
                     *  ENTRY POINTS: 1.) TURN--IF FINAL SPEED=LS
                     *                2.) .T7--IF FINAL SPEED=ENTRY SPEED=HS
                     *
20475   000117  TURN  LDA 032       SPEED BIT(5)=1 (LS)
20476   061710        IOR CUCMD     NOW HAVE LS
20477   050057        AND RLFDH     SET THOLD=HI (BIT 2 = 0 IN SFTW)
20500   043730        JSM OUTCM
20501   002730  .T7   LDA TACLS     THIS GIVES A
20502   043525        JSM WAIT      BUFFER ZONE=.22" BEFORE TURNING
20503   001710        LDA CUCMD     GET PRESENT HRDW CMD
20504   170703  .T1   RAR 4         GET DIR BIT
20505   073302        SLA *+2,S     THESE 2 INSTRUCTIONS
20506   073201        SLA *+1,C     REVERSE BUT 0 OF A REG
20507   170713        RAR 12        GET CORRECT ORIENT.
20510   043730        JSM OUTCM     TURN THIS THING AROUND
20511   004177        LDB ZERO      TAC CTR INIT.
                     *
                     *-----NOW COUNT TAC PULSES (IN B) WHILE DECELERATING
                     *
20512   072603  .T2   SFC *+3       TAC PULSE?
20513   076501        SIB *+1       YES! COUNT IT
20514   000004        LDA R4        CLR FLG
20515   000005        LDA R5        NO TAC PULSE! GET HRDW STATUS
20516   170504        SAR 5         GET 10% OF SPD BIT
20517   073473        RLA .T2       SKIP IF STILL MOVING
20520   174040        TCB
                     *
                     *-----NOW COUNT TAC PULSES WHILE ACCELERATING (COUNT
                     *     SAME NUMBER NOW AS WHEN DECELERATING
                     *
20521   072600  .T5   SFC *         WAIT HERE FOR TAC PULSE
20522   000004        LDA R4        CLR FLAG
20523   076176        RIB .T5       COUNT DOWN !! SKIP IF MORE TAC
                     *              PULSES TO COUNT.
20524   170201        RET 1         ALL DONE
```

*****WAIT***

```
                     *
                     *-----WAIT(NUMBER IN A REG-NEGATIVE-GIVES AMT OF
                     *        TAC PULSES WAITED)
                     *
                     *        483 TAC PULSES (TO SFTW) = 1 INCH OF TAPE
                     *
20525   031717  WAIT  STA TEMP1     SAVE LENGTH OF THIS WAIT
20526   001710        LDA CUCMD     GET CURRENT HRDW CMD
20527   052742        AND TACMD     NOW PUT THE HRDW INTO TAC
20530   043730        JSM OUTCM     MODE! MUST COUNT TAC PULSES.
20531   072600        SFC *         WAIT FOR TAC PULSE
20532   030004        STA R4        CLR FLG
20533   045717        ISZ TEMP1     COUNT TAC PULSE! DONE?
20534   067531        JMP *-3       NOT YET! KEEP COUNTING
20535   170201        RET 1         ALL DONE
                     *
                     *-----MSBET(MEASURE A DISTANCE OR DETECT BET)
                     *
                     *  ENTRY:  DISTANCE IN B REG (NEGATIVE NO.)
                     *
                     *  EXIT :  RET 1--BET OCCURRED-B REG HAS PARTIAL CNT
                     *          RET 2--THE DISTANCE WAS MEASURED
                     *
20536   000005  MSBET LDA R5        GET HRDW STATUS
20537   073405        RLA .BETM     SKIP IF BET OCCURRED
20540   072600        SFC *         WAIT FOR TAC PULSE
20541   000004        LDA R4        CLR FLG
20542   076174        RIB MSBET     SKIP IF NOT DONE
20543   170202        RET 2         DIST. HAS BEEN MEASURED
20544   170201  .BETM RET 1         BET OCCURRED
```

*****HOLE***

```
                     *
                     *-----HOLE(DETERMINES TAPE POSITION WHEN HIT HOLE)
                     *
20545   000005  HOLE  LDA R5        GET HRDW STATUS! MOVE STATUS DIR
20546   170501        SAR 2         TO SAME POSITION AS CMD DIR BIT.
20547   050127        AND D16       ISOLATE DIRECTION BIT
```

****HOLE***

```
02744000 20550  062744         IOR RHRTL     PUTS HRDW INTO TAC MODE,HS AND
02745000 20551  043730         JSM OUTCM     OPPOSITE DIRECTION.
02746000               * THE DIR IS OPPOSITE BEC CMD & STATUS ARE OP SENSE
02747000 20552  004006         LDB R6        CLR BET
02748000 20553  006723         LDB .M30I     GO FOR 30 INCHES OF TAPE OR A
02749000 20554  043536         JSM MSBET     BET, WHICH EVER COMES FIRST
02750000 20555  067557         JMP .MDL      HIT BET--GET TO MAIN DECODE LOOP
02751000 20556  067630         JMP .EHOL     CAN'T FIND "ENTRY" HOLE
02752000 20557  000006   .MDL  LDA R6        CLR BET
02753000 20560  006723         LDB .M30I     GO 30 INCHES OF TAPE OR UNTIL
02754000 20561  043536         JSM MSBET     BET OCCURS.
02755000 20562  067607         JMP .DDIS     HIT BET--DECODE THE DIST TRVLED!
02756000 20563  043501         JSM .T7       WENT 30 IN.--IN VALID TAPE! TURN
02757000 20564  006724         LDB .M24I     GO FOR 24 IN. WATCH
02758000 20565  043536         JSM MSBET     FOR HOLES!
02759000 20566  067630         JMP .EHOL     ERROR--HIT UNEXPECTED HOLE
02760000 20567  006725         LDB .M12I     GO FOR 12 IN. I EXPECT TO HIT A
02761000 20570  043536         JSM MSBET     HOLE BEFORE THEN!
02762000 20571  067573         JMP *+2       FOUND HOLE! CONTINUE RECOVERY
02763000 20572  067630         JMP .EHOL     ERROR--MISSED A HOLE
02764000 20573  000006         LDA R6        CLR BET
02765000 20574  043475         JSM TURN      TURN AROUND--EXIT AT LOW SPEED
02766000 20575  002733         LDA DLYA      GUAR I GET BY THE HOLE I JUST
02767000 20576  043525         JSM WAIT      SENSED! (IN VALID DATA NOW)
02768000 20577  043726         JSM STPCA     OUTPUT A STOP CMD TO THE HRDW.
02769000 20600  004006         LDB R6        CLR BET
02770000 20601  004137         LDB D8        SET B TO REWIND POSITION. SET
02771000 20602  170503         SAR 4         TPOS BASED ON DIR BIT
02772000 20603  073402         RLA *+2       SKIP IF DIR=FWD=REWIND
02773000 20604  004127         LDB D16       AT EOT!
02774000 20605  035705         STB TPOS      SAVE THE TAPE POSITION
02775000 20606  170202         RET 2
02776000               *
02777000               *-----DECODE THE DISTANCE BETWEEN HOLES
02778000               *
02779000 20607  026722   .DDIS ADB .P30I     FORM POS # = DIST TRAVELED
02780000 20610  000001         LDA B         PUT A COPY IN A
02781000 20611  026726         ADB .MQTI     DID WE GO 1/4 INCH?
02782000 20612  176004         SBP .DD1      SKIP IF NO!
02783000 20613  002745   .BOT  LDA RHFTL     AT BOT
02784000 20614  043730         JSM OUTCM     THUS GO FWD TO
02785000 20615  067557         JMP .MDL      GO TO MAIN DECODING LOOP.
02786000 20616  022725   .DD1  ADA .M12I     DID WE GO 12 INCHES?
02787000 20617  172402         SAM *+2       SKIP IF YES
02788000 20620  067557         JMP .MDL      NEED MORE DECODING
02789000 20621  004006         LDB R6        CLR BET! WE WENT 1 FOOT
02790000 20622  006726         LDB .MQTI     GO AT LEAST 1/4 INCH OR
02791000 20623  043536         JSM MSBET     UNTIL BET
02792000 20624  067613         JMP .BOT      HIT BET--THUS 2 HOLES 1/4"!ATBOT
02793000 20625  002744   .EOT  LDA RHRTL     AT EOT! GO REVERSE TO FIND
02794000 20626  043730         JSM OUTCM     VALID TAPE.
02795000 20627  067557         JMP .MDL      DO MORE DECODING!
02796000               *
02797000               *-----ERRORS DETECTED BY HOLE
02798000               *
02799000 20630  000175   .EHOL LDA HOERR     HIT EXTRA HOLE OR MISSED ONE!
02800000 20631  031763         STA ERRWD     LOG ERROR
02801000 20632  000127         LDA D16       SET POSITION
02802000 20633  031705         STA TPOS      TO LOST!
02803000 20634  067705         JMP STSAF     COMBINE ERRORS AND EXIT
02804000               *                     STSAF WILL STOP THE TAPE
```

****STSBF****

```
02806000               *
02807000               *-----STSBF(HRDW STATUS CHECK BEFORE EXEC)
02808000               *
02809000 20635  000177   STSBF LDA ZERO
02810000 20636  031763         STA ERRWD     NEW INSTR.  START WITH NO ERRORS
02811000 20637  000005   STSNI LDA R5        GET HRDW STATUS
02812000 20640  170504         SAR 5         PUT MVG BIT INTO LSB
02813000 20641  073476         RLA *-2       SKIP IF SPEED > 2 INCHES/SEC
02814000 20642  043456   STSNP JSM STPED      GET CASSETTE DEAD STOPPED
02815000 20643  000005   STSBH LDA R5        GET HRDW STATUS
02816000 20644  170701         RAR 2         GET COT INTO LSB
02817000 20645  073011         SLA .BF1      SKIP IF CART. WASN'T PULLED
02818000 20646  030007         STA R7        CART WAS REMOVED! CLR COT
02819000 20647  000006         LDA R6        CLR BET
02820000 20650  000127         LDA D16       SET TAPE POSITION
02821000 20651  031705         STA TPOS      TO LOST
02822000 20652  000005         LDA R5        GET HRDW STATUS
02823000 20653  170701         RAR 2         PUT COT INTO LSB
02824000 20654  073002         SLA *+2       SKIP IF WE HAVE A NEW CART
02825000 20655  067705         JMP STSAF     NO CART IN MACHINE
```

****STSAF****

```
02826000 20656  170716  .BF1  RAR 15        GET SFL INTO LSB
02827000 20657  073014        SLA .BF2      SERVO OK? (SFL=0 FOR YES)
02828000 20660  000127        LDA D16       SET TAPE POSITION INDICATOR
02829000 20661  031705        STA TPOS      TO LOST.
02830000                *-------------THE SERVO FAIL COULD BE LEFT FROM PREV USER CMD
02831000 20662  000146        LDA M2        NOW  WAIT
02832000 20663  004254        LDB ONE       FOR .4 SECONDS
02833000 20664  076100        RIB *         BEFORE CLEARING
02834000 20665  072176        RIA *-2       SFL BIT.
02835000 20666  030007        STA R7        TRY CLEARING SFL
02836000 20667  000005        LDA R5        GET HRDW STATUS
02837000 20670  170700        RAR 1         GET SFL BIT INTO LSB
02838000 20671  073002        SLA *+2       SERVO STILL BAD?
02839000 20672  067705        JMP STSAF     YES: COMBINE ERRORS
02840000 20673  170701  .BF2  RAR 2         GET POF BIT INTO LSB
02841000 20674  073004        SLA .BF3      IS POWER ON? (SKIP IF YES)
02842000 20675  000127        LDA D16       SET TAPE POSITION
02843000 20676  031705        STA TPOS      TO LOST
02844000 20677  067705        JMP STSAF     COMBINE ERRORS AND EXIT
02845000 20700  170714  .BF3  RAR 13        GET BET INTO LSB.
02846000 20701  073003        SLA *+3       BET? (SKIP IF NO)
02847000 20702  043545        JSM HOLE      YES: HOLE WILL FIX THAT
02848000 20703  067705        JMP STSAF     COMBINE ERRORS & EXIT
02849000 20704  170202        RET 2         HRDW OK: EXIT
02851000                *
02852000                *-----SUBROUTINE STSAF
02853000                *
02854000                *     THIS ROUTINE COMBINES SOFTWARE ERRORS AND
02855000                *  HARDWARE ERRORS INTO A SINGLE ERROR WORD CALLED
02856000                *     ERRWD: THIS WORD CAN BE EXAMINED FROM MSB TO
02857000                *  LSB AND THE MOST SEVERE ERROR WILL BE DETECTED
02858000                *  FIRST.
02859000                *
02860000 20705  043726  STSAF JSM STPCA     STOP THE TAPE.
02861000 20706  000005        LDA R5        GET THE HRDW STATUS
02862000 20707  170613        SAL 12        MOVE 4 HRDW ERROR BITS TO MSB.
02863000 20710  061763        IOR ERRWD     INCLUDE SOFTWARE ERRORS
02864000 20711  031763        STA ERRWD     SAVE FOR POSSIBLE FUTURE USE
02865000 20712  072402        SZA *+2       AND ERRORS? (0=NO ERRORS)
02866000 20713  170201        RET 1         YES:
02867000 20714  170202        RET 2         NO:
```

***CHDW***

```
02869000                *
02870000                *-----SUBROUTINE CMDW
02871000                *
02872000                *     THIS ROUTINE OUTPUTS THE A REG TO THE HRDW
02873000                * AS A CMD. THEN IT COUNTS ENOUGH TAC PULSES TO
02874000                * GUARANTEE THAT THE TAPE REACHES LOW SPEED: ONLY
02875000                * THE A REG IS USED.
02876000                *
02877000 20715  043730  CMDW  JSM OUTCM     OUTPUT CMD
02878000 20716  002730  CMDW1 LDA TACLS     COUNT ENUF TACS TO REACH LS
02879000 20717  067525        JMP WAIT      COUNT DISTANCE & EXIT

02881000                *
02882000                *-----SUBROUTINE OUTCM (GIVES HRDW A CMD).
02883000                *
02884000                *     ENTRY POINTS:
02885000                *
02886000                *  1). RSTHD-- SET READ THOLD HI(VFY) OR LO(LOAD).
02887000                *  2). SHTHD-- SET READ THOLD HI(ACCUR. GAP DETECT).
02888000                *  3). STPCA-- OUTPUT A STOP CMD TO THE HRDW.
02889000                *  4). OUTCM-- OUTPUT THE A REG AS A HRDW CMD.
02890000                *
02891000                *
02892000 20720  000053  RSTHD LDA RLFDL     GET CMD FOR A NORMAL READ
02893000 20721  005723        LDB INSTR     CHECK TO SEE IF CMD IS A
02894000 20722  017024        CPB STINS     READ OR A VERIFY:
02895000 20723  067730        JMP OUTCM     IT IS A READ
02896000 20724  000057  SHTHD LDA RLFDH     IT IS VERIFY: SET THOLD TO HI
02897000 20725  067730        JMP OUTCM     AND OUTPUT THE CMD.
02898000 20726  002746  STPCA LDA STOP      GET THE STOP CMD & INCLUDE THE
02899000 20727  061710        IOR CUCMD     DIRECTION OF PREV CMD.
02900000 20730  073201  OUTCM SLA *+1,C     CLR THE TRACK BIT
02901000 20731  061707        IOR FLG1      INCLUDE CURRENT TRACK
02902000 20732  050045        AND KPMSK     B0-7 UNCHNG'D;B8=0
02903000 20733  031710        STA CUCMD     SAVE THE CMD.
02904000 20734  030005        STA R5        TELL HRDW
02905000 20735  170201        RET 1         ALL DONE
```

****MARK***

```
                 *
                 *-----MARK  SUBROUTINE
                 *
                 *      INPUTS:  NOREC=NUMBER OF RECORDS
                 *                MSIZE=ABSOLUTE SIZE IF EACH RECORD
                 *
20736  043465    MRK   JSM CARTP     CHECK TO SEE IF CART. IS PROT'ED.
20737  170201          RET 1         ERROR--THIS CART IS PROTECTED!
20740  001705          LDA TPOS      CHECK TO SEE IF WE MUST
20741  170500          SAR 1         READ A RECORD HEAD TO
20742  073003          SLA *+3       DETERMINE POSITION. (SKIP = NO)
20743  042210          JSM IDR1      YES--TPOS=21 GO FWD & FIND A REC
20744  170201          RET 1         ERROR WHEN I TRIED TO READ RHEAD
                 *
                 *-----AT THIS POINT, TPOS SHOULD BE 1, 8, OR 16
                 *
                 *
                 *-----INITIALIZATION
                 *
20745  000177          LDA ZERO
20746  031701          STA RTYPE     RECORD TYPE=0 FOR EMPTY RECORD
20747  031700          STA CSIZE     CURRENT SIZE=0 WHEN MARKED
20750  031702          STA RRWNO     RE-WRITE NUMBER STARTS AT 0
                 *
                 *-----COMPUTE ACTUAL MARKING LENGTH
                 *
20751  001720          LDA MSIZE     GET BUFFERED ABS SIZE
20752  031677          STA ASIZE     DEF PART OF REC HEAD
20753  170506          SAR 7         DIVIDE BY 128
20754  030001          STA B         NO. OF FULL PARTITIONS
20755  001677          LDA ASIZE
20756  050053          AND MSKL7     MASK OFF LOW 7 BITS
20757  072402          SZA *+2
20760  076501          SIB *+1       ADD 1 FOR PARTIAL PARTITION
20761  000001          LDA B         GET NP=NUMBER OF PARTITIONS
20762  170602          SAL 3         NP*8
20763  174600          SBL 1         NP*2
20764  020001          ADA B         A REG=NP*10=POH (PAR OVERHEAD)
20765  021677          ADA ASIZE     FORM TOTWD
20766  004000          LDB A         SAVE IN B
20767  174502          SBR 3         FORM VARSL=TOTWD*12.5%
20770  020001          ADA B         A REG =1.125*TOTWD
20771  020140          ADA SLKRH     MARKING SIZE = 1.125*TOTWD +
                 *                   RECORD HEAD SLACK!
20772  031726          STA MRKSZ     SAVE THIS FOR NCODE
20773  031731          STA WCTR      SET UP THE WORD COUNTER
20774  005722          LDB NOREC     GET # OF REC TO BE MARKED.
                 *
                 *----DETERMINE WHERE TO START MARKING THE TAPE
                 *
20775  001705    .MRK6 LDA TPOS      GET PRESENT TAPE POSITION
20776  010137          CPA D8        ARE WE AT REWIND?
20777  066023          JMP .MRK8     YES
21000  010254          CPA ONE       DO WE KNOW WHERE WE ARE?
21001  066034          JMP .MRK2     YES--START MARKING FROM THAT REC
21002  000117          LDA MPERR     NO--ERROR--CAN'T MARK WHEN
21003  031763          STA ERRWD     POSITION IS UNKNOWN
21004  067705          JMP STSAF     COMBINE ERRORS AND EXIT
                 *
                 *-----SPECIAL CASE:  RE-MARK A RECORD HEAD.
                 *
                 *    THIS OPTION SHOULD ONLY BE USED WHEN YOU CAN'T
                 *  READ A RECORD HEAD. THE MRK MODULE RECOGNIZES
                 *  THIS CASE BY NOREC=0. MSIZE MUST ALSO BE 0, BUT THE
                 *  TOS DOES THIS CHECK. THE HEAD IS REWRITTEN WITH AN
                 *  ABSOLUTE SIZE OF 1 WORD.
                 *
                 *    SUPPOSE YOU WISH TO REMARK THE HEAD OF
                 *  RECORD X:
                 *          1)IF X=0, THEN DO A REWIND. OTHERWISE DO
                 *  A FIND X.
                 *          2)NOW DO A MARK CMD WITH "NUMBER OF
                 *  RECORDS" PARAMETER = 0 AND "RECORD SIZE" PARAMETER = 0!
                 *
21005  004257    .MRK5 LDB M1        NEEDED IN CASE AT REWIND.
21006  000137          LDA D8        WRITE 8WDS OF "BODY" AFTER RE-
21007  031731          STA WCTR      MARKING THE HEAD.(MIN. AT ORGNAL
21010  011705          CPA TPOS      MARK IS 18WDS). AT REWIND?
21011  035676          STB CRECN     YES; THIS -1 GOES TO 0--NXT INST
21012  045676          ISZ CRECN     RE-MARKING NEXT REC IN FWD DIR!
21013  066014          JMP *+1       SLACK SINCE CRECN=-1 IS POSSIBLE
                       IFZ
21014  000254          LDA ONE       FORCE NEW ABSOLUTE
21015  031677          STA ASIZE     SIZE TO BE 1 WORD.
```

***MARK***

```
                       XIF
                 *
                 *----WE ARE IN THE IRG OF THE RECORD PRECEDING THE
                 * RECORD THAT MUST BE RE-MARKED.
                 *
21016  000057          LDA RLFDH     GO LS,,FWD. WE MUST GET OUT OF
21017  043715          JSM CMDW      THIS IRG SINCE INCODE KEYS OFF OF
21020  043261          JSM INDTA     THE IRG.
21021  043275          JSM NCODE     RE-MARK THE REC HEAD(RTYPR=0!)
21022  067200          JMP .DC35     STOP!SET TPOS! EXIT!
                 *
                 ********** MARK FROM REWIND **********
                 *
                 *
                 *-----WRITE 'DEAD ZONE' AT BOT
                 *
21023  076462    .MRK8 SZB .MRK5     B=NOREC! NOREC=0 IS SPECIAL!
21024  000074          LDA WLFOD     WRITE,LS,FWD,DATA,DATA AND
21025  043715          JSM CMDW      START GOING!WAIT TIL UP TO SPEED
21026  000177          LDA ZERO
21027  031676          STA CRECN     1ST REC IS 0
21030  002735          LDA DEADZ     SET WCTR TO THE NUMBER OF ALL
21031  031731          STA WCTR      ONES WORDS IN THE "DEADZONE".
                 *
                 * NOTE: HRDW IN WRT, TAC, DATA! SHOULD BE IN
                 *       WRT, DATA, DATA. RESULT IS A
                 *       LONGER DEAD ZONE.
                 *
21032  043414          JSM MARKO     WRITE THE DEAD ZONE
21033  066042          JMP .MRK3     GET INTO MAIN MARK LOOP
                 *
                 *----IN IRG OF INITIAL MARKING RECORD
                 *
21034  076451    .MRK2 SZB .MRK5     B=NOREC! NOREC=0 IS SPECIAL!
21035  043275          JSM NCODE     RE-WRITE HEAD&BODY OF 1ST REC.
21036  045676    .MRK7 ISZ CRECN
21037  055722          DSZ NOREC     ANY MORE RECORDS TO MARK?
21040  066042          JMP *+2       YES
21041  066052          JMP .MRK1     NO-DONE
21042  001726    .MRK3 LDA MRKSZ     SET WCTR TO NUMBER OF ALL ONES
21043  031731          STA WCTR      WORDS IN THE RECORD BODY.
21044  006733          LDB IRGLN
21045  043431          JSM WGAP      WRITE AN IRG
21046  000005          LDA R5        GET HRDW STATUS
21047  073431          RLA .MRK4     SKIP IF BET OCCURRED
21050  043301          JSM NCEP1     AN ENTRY POINT OF NCODE!PREAMBLE
21051  066036          JMP .MRK7     MUST CHECK FOR MORE RECORDS
                 *
                 *-----NOW MARK THE EXTRA RECORD (ASIZE=0)
                 *
21052  000177    .MRK1 LDA ZERO
21053  031677          STA ASIZE     SET ABSOLUTE SIZE=0
21054  000123          LDA P20       WRITE 20WDS OF BODY! THIS HELPS
21055  031731          STA WCTR      BACKING UP IF RUN INTO EOT!
21056  006733          LDB IRGLN
21057  043431          JSM WGAP      WRITE IRG
21060  043301          JSM NCEP1     WRITE THE EXTRA RECORD
21061  006731          LDB EVTLN
21062  043431          JSM WGAP      WRITE END OF VALID TAPE
                 *
                 *-----GET BACK TO EXTRA RECORD
                 *
21063  000057          LDA RLFDH     NOW PUT HRDW INTO READ
21064  043730          JSM OUTCM     MODE.(THOLD=HI FOR GAP DETECT)
21065  043475          JSM TURN      TURN AROUND
21066  000005          LDA R5        LOAD HRDW STATUS.
21067  073411          RLA .MRK4     SKIP IF WE HIT A HOLE.
21070  002733    .MRK9 LDA IRGLN     NOW WAIT 1" TO MAKE
21071  043525          JSM WAIT      SURE I'M IN THE EVTM!
21072  043451          JSM BUP1      THIS GETS ME INTO THE GAP OF
                 *                   THE 1ST REC BEFORE THE EVTM
21073  043705          JSM STSAF     COMBINE HRDW & SFTW ERRORS
21074  170201          RET 1         AN ERROR WAS FOUND! EXIT
21075  000145          LDA TWO       INDICATE WE KNOW THE REC
21076  031705          STA TPOS      NUMBER OF OUR CURRENT POSITION.
21077  170202          RET 2         YES
                 *
                 *-----HIT BET BEFORE DONE! FIND LAST RECORD BUT
                 *-----LEAVE AN EVTLN FROM EOT
                 *
21100  043545    .MRK4 JSM HOLE      GET BACK INTO VALID DATA.
21101  170201          RET 1         HOLE HAD ERROR
21102  014137          CPB D8        TPOS IN B! AT BOT?
21103  067630          JMP .EHOL     YES--LOG A BET ERROR & EXIT.
```

```
                       ******MARK*****

                         *
                         *----AT EOT: LEAVE BUFFER AREA
                         *
21104   002743                 LDA RHRDL      GO HS,REV READY
21105   043730                 JSM OUTCM      FOR GAP DETECTION.
21106   002731                 LDA EVTLN
21107   043525                 JSM WAIT       GET EVT DIST FROM EOT
21110   042177                 JSM IDR6       FIND THE LAST GOOD RECORD
21111   170201                 RET 1          IDR HAD TROUBLE--ERROR EXIT
                         *
                         *----MAKE SURE NEW EXTRA REC IS AN EMPTY REC!
                         *
21112   001701           .MRKB LDA RTYPE      GET REC TYPE
21113   072407                 SZA .MRKA      SKIP IF EMPTY REC
21114   001676                 LDA CRECN      IT'S NOT EMPTY! MUST HAVE
21115   020254                 ADA ONE        BACKED UP TOO FAR. FIND
21116   031725                 STA RECNO      THE NEXT RECORD
21117   042244                 JSM .DF1       IN THE FWD DIRECTION
21120   170201                 RET 1          FIND ROUTINE HAD AN ERROR
21121   066112                 JMP .MRKB      CHECK THIS RECORD
                         *
                         *----REWRITE THIS REC HEAD AS THE EXTRA (NULL) REC.
                         *  THEN WRITE GAP UNTIL EOT. THEN GET BACK TO THE
                         *  EXTRA RECORD, READ ITS HEAD, BACKUP TO ITS GAP
                         *  AND EXIT
                         *
21122   001676           .MRKA LDA CRECN      MUST SET RECNO = NULL RECORD
21123   031725                 STA RECNO      SO THAT AFTER ERASING THE REST
21124   042452                 JSM .ERS1      OF THE TRK, WE GET BACK TO IT!
21125   170201                 RET 1          HAD ERROR
21126   000073                 LDA MKERR      LOG ERROR =
21127   031763                 STA ERRWD      MARK DIDN'T FIT
21130   067705                 JMP STSAF      COMBINE ERRORS AND EXIT!

                       ******IDR*****

                         *
                         *     IDR(DETERMINE PRESENT TAPE POSITION)
                         *
21131   043635           IDR   JSM STSBF      CHECK HRDW
21132   170201                 RET 1          SOMETHING IS WRONG
21133   001705                 LDA TPOS
21134   010254                 CPA ONE        WAS PREVIOUS INSTRUCT A FIND?
21135   170202                 RET 2          YES: ALL DONE THEN
21136   010145                 CPA TWO        DO WE KNOW REC NO.?
21137   066210                 JMP IDR1       YES--GO FWD AND READ THE RHEAD.
21140   010137                 CPA D8         AT REWIND?
21141   066143                 JMP IDR10      YES
21142   066175                 JMP IDR4       NO--I'M LOST
                         *
                         *------AT REWIND, IS THE TRACK BLANK?
                         *
21143   000057           IDR10 LDA RLFDH      TELL HRDW TO READ,LS,FWD,DATA,
21144   043730                 JSM OUTCM      THOLD=HI; WAIT 2.5"
21145   002732                 LDA INDED      FROM LP TO GUARANTEE I REACH
21146   043525                 JSM WAIT       THE "DEADZONE" (IF PRESENT).
21147   000005                 LDA R5         GET STATUS
21150   170503                 SAR 4          GET IRG BIT INTO LSB
21151   073002                 SLA *+2
21152   066220                 JMP IDR5       HIT GAP--MUST BE VIRGIN TAPE
21153   006725                 LDB .M12I      12" IS ENUF TO HIT REC 0!
21154   072600           IDR20 SFC *
21155   000004                 LDA R4         CLR TAC
21156   076102                 RIB *+2        LOOKED FAR ENOUGH?
21157   066220                 JMP IDR5       YES: NO GAP YET! BLANK TAPE
21160   000005                 LDA R5         NO: HAVE WE HIT GAP?
21161   170503                 SAR 4          GET IRG BIT INTO LSB
21162   073072                 SLA IDR20      NO GAP: KEEP GOING
21163   003024           IDR8  LDA STINS      SET UP ENTRY SO
21164   031723                 STA INSTR      THAT "RDHED" READS THE
21165   043001                 JSM RDHED      RHEAD AT LOW THRESHOLD
21166   170201                 RET 1          TROUBLE READING THE REC HEAD
21167   043450           IDR7  JSM BCKUP      GET BACK TO GAP OF REC IDR'D
21170   043705                 JSM STSAF      COMBINES HRDW & SFTW ERRORS
21171   170201                 RET 1          AN ERROR OCCURRED--EXIT
21172   000254                 LDA ONE        SET TAPE POSITION INDICATOR MEAN
21173   031705                 STA TPOS       "WE KNOW ALL ABOUT THIS RECORD"
21174   170202                 RET 2          EXIT
                         *
                         *-----LOST--TAPE POSITION UNKNOWN
                         *
21175   002743           IDR4  LDA RHRDL      GO HS,REV LOOKING
21176   043715                 JSM CMDW       FOR A REC; GUAR. I HIT 22IPS.
21177   043261           IDR6  JSM INDTA      FIND A DATA REGION.
```

****IDR***

```
21200  043271        JSM INGAP     FIND GAP (RECORD)
21201  000005        LDA R5        CHECK FOR HOLE BEFORE
21202  073411        RLA IDR9      "JSM TURN" CHANGES TAPE DIR. (HOLE=JMP IDR9)
21203  043475        JSM TURN      MUST TURN TO BE ABLE TO READ HED
21204  043271        JSM INGAP     GIVES TURN 1 REC UNCERTAINTY.
21205  000005        LDA R5        GET HRDW STATUS
21206  073405        RLA IDR9      SKIP IF WE HIT A HOLE
21207  066163        JMP IDR8      DIDN'T HIT BET; THUS WE HAVE
                *                  FOUND A RECORD!
                *
                *-----TPOS=2; GO HS FWD TO GET THE REC HEAD
                *
21210  001676   IDR1 LDA CRECN     SET THE TARGET REC = CURRENT
21211  031725        STA RECNO     REC (SPECIAL FOR TPOS=2); FIND
21212  066244        JMP .DF1      THE REC AND EXIT!
                *
                *    HIT A HOLE
                *
21213  043545   IDR9 JSM HOLE
21214  170201        RET 1         HOLE HAD ERROR
21215  014137        CPB D8        TPOS IN B; AT BOT?
21216  066143        JMP IDR10     YES
21217  066175        JMP IDR4      AT EOT; STILL LOOK FOR A REC
                *
                *    BLANK TRACK
                *
21220  000236   IDR5 LDA NRERR     ERROR--NO RECORD FOUND
21221  031763        STA ERRWD     LOG "BLANK TRACK" ERROR
21222  000127        LDA D16       SET TAPE POSITION
21223  031705        STA TPOS      TO "LOST"
                *                  STSAF WILL STOP THE TAPE
21224  067705        JMP STSAF     COMBINE ERRORS AND EXIT
```

***WTR***

```
                *
                ******WTR(WRITE A RECORD)
                *
                *
                **********HOW TO USE WTR**********
                *
                *    JSM CARTP     IS CART PROTECTED?
                *    JMP CASER     YES-WRITING IS AN ERROR!
                *    JSM DFND      FINDS THE RECORD STORED IN RECNO
                *    JMP CASER     CASSETTE ERROR
                *
                *--BLOCK OF SYSTEM CODE WHICH:
                *       1. CHECKS SIZE,TYPE AND REC "SECUREDNESS"
                *       2. MODIFY REC HEAD (NEW CSIZE,TYPE,ETC)
                *    JSM WTR       WRITES THE RECORD
                *    JMP CASER     CASSETTE ERROR
                *    JMP NXTCM     GET NEXT COMMAND
                *
                *----IN DATA REGION BEFORE THIS RECORD OR IN ITS GAP
                *
                *
                *-----ENTRY POINT "WTRC" IS FOR CLEARING A FILE.
                * IT ASSUMES RTYPE IS SET TO ZERO. THEN IT WILL
                * REWRITE THE REC HEAD AND ONLY 1 WORD OF JUNK BODY!
                *
21225  000254   WTRC LDA ONE       MUST DEFINE WCTR=NO. OF WORDS
21226  031731        STA WCTR      OF BODY IF RTYPE = 0.
21227  045702   WTR  ISZ RRWNO     INCREMENT THE RECORD RE-WRITE #
21230  043275        JSM NCODE     WRITE THE RECORD
                *                  STSAF WILL STOP THE TAPE
21231  067705        JMP STSAF     COMBINE ERRORS & EXIT
```

***RDR***

```
                *
                *-----RDR(READ A RECORD)
                *
                *
                **********HOW TO READ A RECORD**********
                *
                *--PUT THE RECORD NO. INTO "RECNO".
                *
                *    JSM DFND      FINDS THE RECORD
                *    JMP CASER     CASSETTE ERROR!
                *
```

```
                    *****RDR*****
*--BLOCK OF SYSTEM CODE WHICH:
*
*          1. CHECKS RECORD'S SIZE (FIT INTO MEMORY?)
*          2. CHECKS RECORD'S TYPE
*          3. IS THIS RECORD SECURED
*          4. DOES MEMORY NEED TO BE MOVED
*          5. SET MBPTR TO LOC FOR 1ST WORD OF BODY
*          6. SET INSTR = "STINS" (STORE INTO MEMORY INSTRUCTION).
*
*      JSM RBODY     READ THE REC BODY INTO MEMORY.
*      JMP CASER     CASSETTE ERROR!
*
*-----RECORD LOADED!
*

*
*-----VFY(VERIFY A RECORD AGAINST MEMORY)
*
*
**********HOW TO VERIFY A RECORD**********
*
*--THE CALLING SEQUENCE IS THE SAME AS FOR READING
*  A RECORD EXCEPT REPLACE
*
*          6. SET INSTR = "STINS" (STORE INTO MEMORY INSTRUCTION).
*
*  WITH
*
*          6. SET INSTR = "CPINS" (COMPARE MEMORY INSTRUCTION).

                    *****FIND*****

                    *
                    *****SUBROUTINE DFND(DUAL FIND:BPC CONTROL OR HRDW)
                    *
                    *    INPUTS:  1.)RECNO : TARGET RECORD NUMBER
                    *             2.)FLG3  : SET = HRDW FIND
                    *                        CLR = BPC FIND
                    *
                    *    RETURN:   RET 1     ERROR
                    *              RET 2     NORMAL
                    *
21232   043635  DFND  JSM STSBF     CHECK HARDWARE
21233   170201        RET 1         ERROR
21234   001705        LDA TPOS      CHECK PRESENT
21235   010145        CPA TWO       TAPE POSITION
21236   066244        JMP .DF1      OK--KNOW WHERE WE ARE
21237   042131        JSM IDR       FIND OUR PRESENT POSITION
21240   170201        RET 1         ERROR
21241   001676        LDA CRECN     GET CURRENT REC NO.
21242   011725        CPA RECNO     IS IT SAME AS TARGET?
21243   170202        RET 2         YES--ALL DONE
21244   001343  .DF1  LDA NOTRY
21245   031724        STA FPASS     ALLOW NOTRY CHANCES TO FIND REC
                    *-----------COMPUTE DIST TO TARGET
21246   005676  .FND6 LDB CRECN     COMPUTE TARGET REC NO. (RECNO)-
21247   174040        TCB           CURRENT REC NO.(CRECN) IN B. B
21250   025725        ADB RECNO     HAS # GAPS TO TARGET.(NOT
                    *               COUNTING GAP OF CRECN)
21251   176407        SBM .SCHR     B NEGATIVE = SEARCH REVERSE
21252   002745        LDA RHFTL     SRCH FWD AT
21253   043715        JSM CMDW      START GOING:WAIT TIL UP TO SPEED
21254   043271        JSM INGAP     MUST OVERCOME UNCERTAINTY IN
21255   043261        JSM INDTA     POSITION DUE TO TPOS=2.
21256   076006        RZB .DF2      SKIP IF NOT AT TARGET. DIST TO
                    *               TARGET CAN BE 0 RECORDS IF
                    *               TPOS=2,YET NOT REALLY AT TARGET!
21257   066327        JMP .DF3      AT TARGET--FINISH OFF THE ACCESS
                    *               THE JSM INDTA (LOC=*-2) IS NEC
                    *               TO FINISH OFF THIS ACCESS!
21260   174040  .SCHR TCB           MAKE TARGET DIST POSITIVE
21261   002744        LDA RHRTL     SEARCH REVERSE
21262   043715        JSM CMDW      START GOING:WAIT TIL UP TO SPEED
21263   043261        JSM INDTA     COULD WAKE UP IN IRG:NO COUNT IT
                    *
                    *-----IS FND BPC OR HRDW CONTROLLED?
                    *
21264   001764  .DF2  LDA FLG2      DETERMINE WHO CONTROLS THE SRCH?
21265   073023        SLA .FND9     SKIP IF BPC CONTROLLED SEARCH
                    *
```

```
                      *-----PARALLEL SEARCH
                      *
21266   001514              LDA CSELC     GET CASSETTE SELECT-CODE
21267   031345              STA CSCF      SAVE SC OF CASSETTE DOING A FIND
21270   030013              STA DMAPA     ALSO SET DMA PER. ADDR.
21271   000247              LDA M30K      MUST SET DMA MEMORY ADDR REG
                            IFZ
21272   030014              STA DMAMA     TO "OUTPUT" VALUE.
                            XIF
21273   024257              ADB M1        DMA HRDW NEED DISTANCE TO TARGET
21274   034015              STB DMAC      REC-1; STORE THAT IN DMA CTR.
21275   070440              DMA           ENABLE DMA HRDW TO COUNT IRGS
21276   001710              LDA CUCMD     GET THE CURRENT HRDW CMD
21277   050147              AND M3        ENABLE SCH BIT
21300   043730              JSM OUTCM     GIVE HRDW PAR. SEARCH CMD (FIND)
21301   000127              LDA D16       SET TAPE POSITION
21302   031705              STA TPOS      TO LOST!
21303   001707              LDA FLG1      GET CURRENT TRK
21304   170616              SAL 15        SO WE CAN
21305   061725              IOR RECNO     SAVE TRK AND TARGET REC NUMBER
21306   031346              STA FTRGT     FOR THIS FIND.
21307   170202              RET 2
                      *
                      *-----BPC CONTROL (MUST BE PART OF RDR OR WTR)
                      *
                      *
                      *-----B REG IS NUMBER OF RECS TO TARGET
                      *
21310   002732        .FND9 LDA EVTDT     INIT WCTR TO # OF TAC PULES IT
21311   031731              STA WCTR      TAKES TO RECOG AN EVTM!
21312   043271              JSM INGAP     FIND A REGION OF GAP
21313   000005        .FND7 LDA R5        GET HRDW STATUS
21314   170503              SAR 4         MOVE IRG BIT INTO LSB
21315   073010              SLA .FND8     SKIP IF INTO DATA
21316   072600              SFC *         WAIT FOR TAC (IN TAC REC FND4+1)
21317   030004              STA R4        CLR FLG
21320   045731              ISZ WCTR      HAVE WE DETECTED AN EVTM?
21321   066313              JMP .FND7     NOT YET
21322   000127              LDA D16       SET TAPE POSITION INDICATOR
21323   031705              STA TPOS      TO LOST!
21324   066347              JMP .FND0
21325   054001        .FND8 DSZ B         COUNT GAP; SKIP IF AT TARGET
21326   066310              JMP .FND9     NOW GET READY FOR NEXT GAP.
                      *
                      *----GOING HS & IN A DATA REGION. IT IS BEFORE THE
                      * GAP IF SEARCH DIR=REV; AFTER IF SEARCH DIR=FWD!
                      *
21327   043475        .DF3  JSM TURN      TURNAROUND & GO LS
21330   043261              JSM INDTA     GIVES TURN A GAP + DATA UNCERT.
21331   001710              LDA CUCMD
21332   170612              SAL 11        WANT TO DETERMINE CUR DIR
21333   172404              SAM .FND5     DON'T TURN IF DIR=FWD!
21334   043271              JSM INGAP     GET INTO TARGET RECORD'S IRG.
21335   043716              JSM CHDW1     GO INTO THE GAP ABOUT .22", THEN
21336   043475              JSM TURN
                      *
                      *----VERIFY ACCESS NOW!
                      *
21337   042163        .FND5 JSM IDRB      NOW READ THE HEAD
21340   170201              RET 1         IDR HAD A PROBLEM
21341   043456        .FND2 JSM STPED     GET CASSETTE TO A DEAD STOP
21342   001676              LDA CRECN     YES; FIND RIGHT RECORD?
21343   011725              CPA RECNO
21344   170202              RET 2         FOUND RIGHT RECORD
21345   055724              DSZ FPASS     NO; ALL FIND PASSES DONE?
21346   066246              JMP .FND6     NO; TRY AGAIN
21347   000236        .FND0 LDA NRERR     LOG ERROR =
21350   031763              STA ERRWD     RECORD CAN'T BE FOUND
21351   067705              JMP STSAF     COMBINE ERRORS AND EXIT
                      *                   STSAF WILL STOP THE TAPE
                      *
                      *-----THIS ROUTINE COMPLETES A FIND COMMAND SINCE
                      * THE HRDW ONLY GETS YOU WITHIN 4", THIS ROUTINE
                      * WILL ONLY COMPLETE A FIND IF THE CURRENT TRK AND
                      * SC ARE THE SAME AS WHEN THE FIND WAS STARTED.
                      *
21352   001514        CFD   LDA CSELC     GET CURRENT SC
21353   011345              CPA CSCF      SAME AS FIND SC?
21354   066356              JMP *+2       YES
21355   170202              RET 2         NO--DONHT COMPLETE THE FIND.
21356   000005              LDA R5        WAIT FOR THE TAPE TO
21357   170504              SAR 5         STOP MOVING BEFORE
21360   073476              RLA *-2       CLEARING DMAPA!
21361   000177              LDA ZERO      SET CSCF TO ZERO MEANING THE
21362   031345              STA CSCF      FIND WILL BE COMPLETED!
```

```
                              *****FIND*****

03395000 21363  030013          STA DMAPA     MAKE THE DMA HRDW AVAIL.
03396000 21364  001346          LDA FTRGT     GET TARGET ADDR: TRK & REC NUM.
03397000 21365  005707          LDB FLG1      GET CURRENT TRK
03398000 21366  077403          RLB .CTKA     SKIP IF CURRENTLY ON TRK "A"
03399000 21367  172003          SAP .CFD      CURRENT TRK="B"!SKIP=FIND ON "B"
03400000 21370  170202          RET 2         FIND TRK # CURRENT TRK! EXIT
03401000 21371  172277   .CTKA  SAP *-1,C     CURRENT TRK="A"!SKIP=FIND IS NOT
03402000 21372  031725   .CFD   STA RECNO     SAVE TARGET REC #! MSB=0!
03403000 21373  000005          LDA R5        NOW CHECK TO
03404000 21374  170501          SAR 2         SEE IF CART WAS PULLED OUT.
03405000 21375  073002          SLA *+2       SKIP IF SAME CART IN MACHINE
03406000 21376  067635          JMP STSBF     NEW CART--CHECK STATUS & EXIT
03407000 21377  043635          JSM STSBF     CLR ERRWD! CHECK STATUS
03408000                 *                    ALSO WAIT FOR HRDW TO STOP.
03409000 21400  170201          RET 1         HRDW STATUS ERROR
03410000 21401  000005          LDA R5        CHECK THE DIRECTION
03411000 21402  170505          SAR 6         WE SEARCHED ON THE FIND
03412000 21403  073406          RLA .CFD1     SKIP IF SRCH'D REV
03413000 21404  000064          LDA RLRTH     FWD! WE'RE ON WRONG SIDE OF REC
03414000 21405  043730          JSM OUTCM     TELL HRDW TO
03415000 21406  002740          LDA CFDF      BACK UP CFDF NUMBER OF TAC
03416000 21407  043525          JSM WAIT      PULSES. THIS PUTS ME IN FRONT OF
03417000 21410  043475          JSM TURN      THE DESIRED REC. NOW TURNAROUND
03418000                 *                    BEC WE MUST GO FWD TO READ HEAD
03419000 21411  042163   .CFD1  JSM IDR8      GO READ THE RECORD HEAD
03420000 21412  066413          JMP *+1       ERROR--GIVE DFND A CHANCE
03421000                 *                                  IT CAN RECOVER FROM HOLES!
03422000 21413  066232          JMP DFND      CLEAR OUT ANY ERRORS IDR8 HAD.
03423000                 *                    THEN FINISH THE FIND AND EXIT!

                              *****REWIND*****

03425000                 *
03426000                 *----SUBROUTINE REW
03427000                 *
03428000                 *-----THIS ROUTINE WILL REWIND THE TAPE TO
03429000                 *  BEG. OF TAPE. IT IS AN UNATTENDED REWIND.
03430000                 *
03431000 21414  042701   REW    JSM STOPC     STOP THE CASSETTE
03432000 21415  043635          JSM STSBF     CHECK THE HRDW STATUS
03433000 21416  170201          RET 1         ERROR--BAD HRDW STATUS
03434000 21417  002744   REW1   LDA RHRTL     GO HS,REV TO
03435000 21420  043730          JSM OUTCM     REACH BEG. OF TAPE
03436000 21421  006723          LDB .M301     WAIT 30 IN.(> MAX. DIST BETW
03437000 21422  043536          JSM MSHET     HOLES) OR WAIT FOR A HOLE
03438000 21423  066427          JMP .REW1     HIT A HOLE--ANALYZE IT
03439000 21424  000137   .REW2  LDA D8        THIS VALUE OF TPOS ALLOWS IDF
03440000 21425  031705          STA TPOS      (KPF CMD) TO BE EXECUTED NEXT!
03441000                 *                    ALSO IMPT FOR TRK CMD!
03442000 21426  170202          RET 2         REWIND HAS BEEN DONE
03443000 21427  043545   .REW1  JSM HOLE      FIND OUR POSITION
03444000 21430  170201          RET 1         HOLE FOUND TROUBLE
03445000 21431  014137          CPB D8        TPOS IN B! AT BOT?
03446000 21432  067705          JMP STSAF     YES--EXIT
03447000 21433  066417          JMP REW1      AT EOT. GO HS, REV TO BOT.

03449000                 *
03450000                 *-----SUBROUTINE TRK
03451000                 *
03452000                 *-----THIS ROUTINE WILL SWITCH TRACKS. IT WILL SET
03453000                 *  TPOS TO LOST IF NEW TRK IS DIFFERENT FROM THE
03454000                 *  OLD TRACK. IT ASSUMES THAT THE A REGISTER HAS:
03455000                 *      0 FOR TRACK 0 = TRACK A  (CMD BIT TRB=1)
03456000                 *      1 FOR TRACK 1 = TRACK B  (CMB BIT TRB=0)
03457000                 *
03458000                 *              NOTE:
03459000                 *                           TRK DOES NOT CLEAR ERRWD SINCE NO
03460000                 *                           ERRORS ARE POSSIBLE WHEN SWITCHING
03461000                 *                           TRACKS. THUS ERRWD IS NOT VALID.
03462000                 *
03463000 21434  005707   TRK    LDB FLG1      GET CURRENT TRACK.
03464000 21435  073003          SLA TRK0      SKIP IF NEW TRK=A
03465000 21436  077211   TRK1   SLB TRKE,C    NEW TRK=B!SKIP IF PRESENT TRK=B
03466000 21437  066441          JMP *+2       PRESENT TRK=A ! LSB OF B WAS
03467000                 *                    CLR'ED SO IT IS SET FOR TRK B
03468000 21440  077707   TRK0   RLB TRKE,S    NEW TRK=A!SKIP IF PRESENT TRK=A
03469000 21441  035707          STB FLG1      PRESENT TRK=B! LSB OF B IS SET
03470000 21442  001705          LDA TPOS      GET CURRENT TAPE POSITION
03471000 21443  010137          CPA D8        ARE WE AT REWIND?
03472000 21444  066447          JMP TRKE      YES! DON'T CHANGE TPOS
03473000 21445  000127          LDA D16       SET TAPE POSITION INDICATOR TO
03474000 21446  031705          STA TPOS      LOST SINCE WE SWITCHED TRACKS!
03475000 21447  170201   TRKE   RET 1         TRACK SWITCH COMPLETED.
```

***ERASE***

```
                   *
                   *-----SUBROUTINE ERS (TOS POSITIONS THE TAPE)
                   *
                   *
                   *-----THIS ROUTINE WILL ERASE AN ENTIRE TRACK OF THE
                   * TAPE. IT ASSUMES THE TOS HAS POSITIONED THE TAPE
                   * IN THE IRG OF THE STARTING RECORD. THAT RECORD HEAD
                   * WILL BE REWRITTEN TURNING IT INTO THE "NULL" RECORD
                   * AND ALL HIGHER RECORD NUMBERS ON THAT TRACK WILL BE
                   * ERASED.
                   *
21450   043465     ERS   JSM CARTP       IS THIS CARTRIDGE PROTECTED?
21451   170201           RET 1           YES--CAN'T ERASE THEN--ERROR
21452   000177     .ERS1 LDA ZERO        SET THESE ITEMS TO ZERO:
21453   031700           STA CSIZE       CURRENT SIZE
21454   031701           STA RTYPE       RECORD TYPE
21455   031677           STA ASIZE       ABSOLUTE SIZE
21456   042225           JSM WTRC        RE-WRITE THE RECORD HEAD
21457   170201           RET 1           ERROR
21460   043440           JSM WGAPH       WRITE GAP UNTIL EOT
21461   170201           RET 1           ERROR
21462   066232           JMP DFND        THIS GUAR. THAT WE GET BACK TO
                   *                     THE NEWLY CREATED NULL FILE!
```

******* ERLN *******

```
                   *
                   *
                   *
                   *     ERLN IS THE ROUTINE THAT PLACES A DUMMY LINE IN THE USER'S
                   *          PROGRAM WHEN A PARTITION HAS BEEN DELETED BECAUSE OF ERROR
                   *
                   *
                   *     ON ENTRY : BDPTR POINTS AT THE FIRST LINE BRIDGE OF THE
                   *                BAD PARTITION
                   *
                   *
                   *     TEMPORARIES USED : ERRWD, RTYPE, BDPTR, DLFLG
                   *
                   *     ROUTINES CALLED : NONE
                   *
                   *
21463   000044     ERLN  LDA RBERR            READ BODY ERROR
21464   031763           STA ERRWD
21465   001701           LDA RTYPE            SEE IF USER'S PROGRAM
21466   010141           CPA P6               ONLY CONCERNED WITH IT
21467   066477           JMP ERLN1
21470   010145           CPA P2               SEE IF IT IS A DATA (NUMERIC) FILE
21471   066473           JMP *+2              YES, NUMERIC DATA SO INSERT ???????
21472   170201           RET 1
21473   005734           LDB BDPTR            GET THE POINT TO INSERT THE QUESTION MARK
21474   002773           LDA QMRKS            GET ADDRESS OF THE QUESTION MARKS
21475   071403           XFR 4                TRANSFER THEM TO THE DATEM
21476   170201     ERLN2 RET 1
21477   001727     ERLN1 LDA DLFLG            MUST CHECK TO SEE IF THIS PARTITION HAS
21500   073776           RLA ERLN2,S          EVEN HAD STARS
21501   031727           STA DLFLG            NO IT HASN'T SO PUT IN DUMMY LINE
21502   000141           LDA P6               SET THE LOWER LINE BRIDGE OF THE DUMMY LINE
21503   131734           STA BDPTR,I
21504   045734           ISZ BDPTR            SET THIS POINTER TO THE DUMMY LINE'S LOCATION
21505   005734           LDB BDPTR
21506   002515           LDA QUSTA            GET ADDRESS OF THE DUMMY LINE
21507   071404           XFR 5                TRANSFER THE DUMMY LINE
21510   024142           ADB P5
21511   000235           LDA B3377            SET UP THE UPPER DUMMY LINE'S BRIDGE
21512   130001           STA B,I
21513   035734           STB BDPTR            RESET BDPTR
21514   170201           RET 1
                   *
                   *
                   *     THIS WILL BE THE LOCATION OF THE DUMMY LINE TEMPLATE
                   *
                   *
                   *
21515   021516     QUSTA DEF QUST             ADDRESS OF THE DUMMY LINE
21516   021007     QUST  OCT 21007            QUOTE - 'COUNT'
21517   025052     STST1 OCT 25052            STAR - STAR
21520   025052     STST2 OCT 25052            STAR - STAR
21521   025052     STST3 OCT 25052            STAR - STAR
21522   025177     STEOL OCT 25177            STAR - EOL
```

*** PTCLC ********

```
                         *
                         *
                         *
                         *     PTCLC IS THE ROUTINE THAT CALCULATES THE PARTITIONS LENGTHS
                         *          IF THE FILE BEING RECORDED IS ANYTHING OTHER THAN A
                         *          USER'S PROGRAM FILE THE PARTITIONS ARE ALWAYS 128 WORDS
                         *          LONG. IF THE FILE BEING RECORDED IS A USER'S PROGRAM
                         *          FILE THE PARTITION IS AS CLOSE TO 128 WORDS IN LENGTH
                         *          AS POSSIBLE WITH A WHOLE NUMBER OF LINES BEING INCLUDED
                         *
                         *     ON ENTRY : LWMD CONTAINS THE LAST ADDRESS TO BE RECORDED OF THIS
                         *          FILE
                         *          BOPTR POINTS AT THE LOCATION IN MEMORY WHERE THE NEXT
                         *          PARTITION WILL START RECORDING
                         *
                         *     ON EXIT : PARLN IS SET WITH THE LENGTH OF THE NEXT PARTITION
                         *          WCTR IS SET WITH THE LENGTH OF THE NEXT PARTITION
                         *          TEMP1 IS SET TO -1 IF THIS NEXT PARTITION IS THE LAST
                         *          PARTITION IN THE CURRENT FILE
                         *
                         *     TEMPORARIES USED BY THIS ROUTINE : T1, T2, A, B, C, D,
                         *
                         *     ROUTINES CALLED BY THIS ROUTINE : NONE
                         *
                         *
21523   001743     PTCLC LDA LWMD        GET THE ENDING ADDRESS
21524   005734           LDB BOPTR       GET THE CURRENT RECORDING POSITION
21525   174040           TCB
21526   020001           ADA B           THIS IS THE LENGTH OF THE NEXT PATTITION IF IT IS TH
21527   031712           STA T2          LAST SO SAVE IT
21530   004052           LDB P128        SEE IF TI IS THE LAST PARTITION
21531   174040           TCB
21532   020001           ADA B
21533   172402           SAM *+2         IF THE RESULT IS MINUS THIS IS THE LAST PARTITION
21534   066542           JMP PTCL2       NOTH THE LAST PARTITION SO CHECK FILE TYPE
21535   045712           ISZ T2          YES TH LAST PARTITION SO CORRECT THE LENGTH
21536   000257           LDA M1
21537   031717           STA TEMP1       SET TH 'LAST' FLAG
21540   001712           LDA T2          THIS IS THE LENGTH OF THE LAST PARTITION
21541   066571           JMP PTCL9
21542   001701     PTCL2 LDA RTYPE       SEE IF IT IS A USER'S TYPE PROGRAM
21543   010141           CPA P6
21544   066547           JMP PTCL3       YES A USER'S TYPE PROGRAM SO DO LONG PARTITION
                         *               LENGTH CALCULATION
21545   000052           LDA P128        NOT USER'S TYPE PROGRAM SO PARTITION LENGTH IS 128 W
21546   066571           JMP PTCL9
21547   000177     PTCL3 LDA P0
21550   030016           STA C           THIS IS THE NEXT PARTITIONS LENGTH
21551   000157           LDA M15         AT 20 US. PER LINE IT WILL TAKE ABOUT 15 LINES TO
                         *               ACCUMULATE 300 US. FOR THE IPG LENGTH
21552   030017           STA D           THIS IS THE LINE COUNTER
21553   001734           LDA BOPTR       GET THE CURRENT RECORD POSITIN
21554   004000           LDB A
21555   100000     PTCL6 LDA A,I         GET THAT LINE BRIDGE
21556   050053           AND B177        CLEAR HIGH ORDER BITS
21557   020016           ADA C           ADD THE RIGHT HALF OF THE LINE BRIDGE IN TO GET TO T
                         *               NEXT LINE BRIDGE
21560   030016           STA C
21561   020167           ADA M128        SEE IF DONE WITH THIS PARTITION
21562   172402           SAM *+2         IF MINUS THEN THE PARTITION IS NOT LONG ENOUGH YET
21563   066574           JMP PTCL7       DONE WITH PARTITION LENGTH CALCULATION
21564   000016           LDA C           GET THE PARTITION LENGTH
21565   020001           ADA B           ADD IT THO THE BOPTR
21566   044017           ISZ D           COUNT THIS LINE IF IT GOES POSITIVE WE DON'T HAVE TO
                         *               WAIT FOR ANY TAC PULSES AFTER THE CALCUL
21567   066555           JMP PTCL6
21570   066555           JMP PTCL6       ALLOW FOR SKIP
21571   004257     PTCL9 LDB M1          WE MUST WAIT FOR 300 US. BEFORE EXITING
21572   034017           STB D
21573   066575           JMP PTCL8       SO SET THE ILNE COUNTER NEGATINE
21574   000016     PTCL7 LDA C           GET THE PARTITION LENGTH
21575   031731     PTCL8 STA WCTR        THE NEXT PARTITION'S LENGTH IS IN A
21576   031715           STA PARLN
21577   000017           LDA D           GET THE LINE COUNT
21600   172006           SAP PTC10       IF LINE COUNT OS POSITIVE WE NEED COUNT NO TAC PULSE
21601   000146           LDA M2          MUST WAIT 300 US. BETWEEN PARTITIONS
21602   004004           LDB R4          CLEAR TAC LINE
21603   072600           SFC *
21604   072176           RIA *-2
21605   000004           LDA R4          CLEAR TAC LINE
21606   170201     PTC10 RFT 1
                         *
```

*** BRIDGE PATCH ***

```
                     *
                     *
                     *
                     *     THIS CODE IS EXECUTED AFTER LOADING A USER'S PROGRAM TO PATCH UP
                     *          DANGLING LINE BRIDGES IN CASE OF AN ERROR
                     *     THIS ROUTINE IS INVOKED AFTER A RECOVERY CYCLE IS COMPLETED
                     *     FOR A USER'S PROGRAM.   THIS CALL ONLY OCCURES IF ERLN HAS
                     *     BEEN EXECUTED BY THE DRIVERS AND AT LEAST ONE DUMMY LINE HAS
                     *     BEEN INSERTED INTO THE USER'S PROGRAM (BECAUSE A PARTITION IS DELE
                     *
                     *     THE SEARCH BEGINS AT FWUP AND PATCHES ALL BRIDGES IN THE
                     *     PROGRAM FROM FWUP TO ENDS
                     *
                     *     NOTE : THE FIRST WORD TO BE RECORDED ON A PARTITION IS THE LINE
                     *            BRIDGE OF THE FOLLOWING LINE. IE. THE LAST WORD OF A
                     *            PARTITION IS NOT A LINE BRIDGE EXCEPT IN THE CASE OF THE
                     *            LAST PARTITION IN THE PROGRAM
                     *
                     *
                     *
21607  005307  PTBRG LDB FWUP          GET THE START OF THE PROGRAM
21610  015734  PTBR2 CPB BDPTR         SEE IF THIS IS WHERE BDPTR POINTS
21611  066624        JMP PTBR3         YES IT POINTS HERE
21612  024254        ADB P1            NOT HERE SO ADJUST GUESS
21613  015734        CPB BDPTR         DOES IT POINT HERE ?
21614  066622        JMP PTBR5         YES IT POINTS HERE
21615  024257        ADB M1            RESET 'GUESS'
21616  100001        LDA B,I           GET LINE BRIDGE
21617  050053        AND B177          CLEAR HIGH ORDER BITS
21620  024000        ADB A
21621  066610        JMP PTBR2
21622  024257  PTBR5 ADB M1            RESET FOR ENDS
21623  066627        JMP PTBR4
21624  100001  PTBR3 LDA B,I
21625  072102        RIA *+2           IF ZERO DO NOT SKIP
21626  042463        JSM ERLN          PUT IN ERROR LINE OF STARS
21627  001277  PTBR4 LDA ENDS          MOVE THE R-REGISTERS LOWER
21630  020254        ADA P1
21631  030016        STA C
21632  024254        ADB P1
21633  034017        STB D
21634  140466        JSM AMPML,I       MOVE R-REGISTERS LOWER, RESET ENDS, RMAX
21635  045744        ISZ TVAR1         SET FLAG FOR ERROR 46
21636  005307        LDB FWUP          START AT THE TOP OF THE PROGRAM SINCE THE
                     *                 BRIDGES LINKING UP ARE NOT CUT OF
                     *                 ORDER
21637  100001        LDA B,I           GET THIS FIRST LINE BRIDGE
21640  050053  PTBR1 AND B177          GET ITS LINK DOWN
21641  024000        ADB A             CALCULATE THE NEXT BRIDGES ADDRESS
21642  170607        SAL 8             MOVE TO LEFT HALF OF BRIDGE
21643  031756        STA FLAGA         SAVE THIS BRIDGE LINK
21644  100001        LDA B,I           GET THE NEXT INE BRIDGE
21645  050053        AND B177          CLEAR THE HIGH ORDER BITS
21646  061756        IOR FLAGA         INCLUDE THE SAVED BRIDGE HALF
21647  130001        STA B,I           RESTORE THIS LINE'S BRIDGE
21650  015277        CPB ENDS          ARE WE DONE YET ?
21651  170201        RET 1             YES DONE
21652  066640        JMP PTBR1         NOT DONE CONTINUE
                     *
       077756  FLAGA EQU MRW1
       077744  TVAR1 EQU OP1+2
                     *
                     *     END OF BRIDGE PATCH ROUTINE
                     *
```

```
                     *
                     *
                     *     SSC IS THE CASSETTE SET SELECT CODE COMMAND
                     *
                     *
                     *
                     *     TEMPORARIES USED : T1 (NTRK)
                     *
                     *     ROUTINES CALLED : GTPAR, TRKA, ERDSO
                     *
21653  142771  SSC   JSM GTPR2,I       GET THE DESIRED SELECT CODE
21654  000001        LDA B
21655  020257        ADA M1
21656  172415        SAM ERR17         IF X IS LESS THAN ONE - ERROR
21657  020157        ADA M15           SUBTRACT 16 FROM A
```

```
                              ***** BRIDGE PATCH *****
715000 21660  172013        SAP ERR17          IF THE RESULT IS ZERO OR POSITIVE - ERROR
716000 21661  015514        CPB CSELC
717000 21662  066677        JMP SSC3
718000 21663  000127        LDA P16            SELECT CODE CHANGE
719000 21664  031705        STA TPOS           SO SET 'LOST' CONDITION
720000 21665  035514        STB CSELC          IF X WITHIN RANGE - ALTER SELECT CODE
721000 21666  066677        JMP SSC3
725000                *
726000                *
727000                *     TRK1 IS THE CASSETTE TRACK CHANGE COMMAND
728000                *
729000                *
730000                *
731000                *
732000                *     TEMPORARIES USED : T1 (NTRK)
733000                *
734000                *     ROUTINES CALLED : GTPAR, ERR1, TRKA, ERDS0
735000                *
736000                *
737000                *
738000                *
739000 21667  142771  TRKCH JSM GTPR2,I        GET THE DESIRED TRACK
740000 21670  076405        SZB TRCK1          IF THE TRACK IS ZERO - CHANGE
741000 21671  014254        CPB P1             IS IT TAACK ONE ?
742000 21672  066675        JMP TRCK1          YES CHANGE
743000 21673  140404  ERR17 JSM AERR1,I        BOUNDRY ERROR
744000 21674  030467        ASC 1,17
745000 21675  000001  TRCK1 LDA B
746000 21676  042434        JSM TRK            CHANGE THE TRACKS
746100 21677  070420  SSC3  EIR                ENABLE THE INTERRUPT AND EXIT
746200 21700  164365        JMP AINTX,I

                              ----- STOPC AND CHST -----

3748000               *
3749000               *
3750000               *
3751000               *     THIS ROUTINE WILL STOP THE CASSETTE ON THE CURRENT
3752000               *     SELECT CODE  IT THEN CLEARS DMAPA AND CSCF SO THE FIND IS
3753000               *     FORGOTTEN, IT THEN FALLS THROUGH TO SET THE PA
3754000               *
3755000               *
3756000               *
3757000 21701  001514  STOPC LDA CSELC       SEE IF THE FIND IS ON THIS SC
3758000 21702  011345        CPA CSCF
3759000 21703  066705        JMP *+2           YES A FIND HERE SO STOP IT
3760000 21704  170201        RET 1             NO FIND ON THIS SC
3761000 21705  043726        JSM STPCA         STOP THE CASSETTE AND REMOVE FROM SEARCH
3762000 21706  000177        LDA P0            MODE THEN FORGET THE FIND
3763000 21707  030013        STA DMAPA
3764000 21710  031345        STA CSCF
3765000 21711  170201        RET 1
3796000               *
3797000               *
3798000               *
3799000               *
3800000               *     CHST EXECUTES A BPC FIND OR INITIATES A HARDWARE FIND OPERATOPN
3801000               *
3802000               *     ON ENTRY : ENTRY AT CHST : RECNO CONTAINS THE TARGET RECORD NUMBER
3803000               *                                A BPC FIND IS ECECUTED
3804000               *                ENTRY AT CHST1 : RECNO CONTAINS THE TARGET RECORD NUMBE
3805000               *                                 IF FLG2 = 1, A HARDWARE FIND IS INITIA
3806000               *                IF NO ERRORS OCCURED
3807000               *
3808000               *
3809000               *     ON EXIT : IF A BPC FIND WAS INITIATED, THE TAPE IS POSITIONED
3810000               *               IN THE RECORD GAP PRECEEDING THE HEAD OF THE FILE NUMBER
3811000               *               IN RECNO, TPOS = 1
3812000               *               IF A HARDWARE FIND WAS INITIATED, THE TAPE IS MOVING IN
3813000               *               THE PROPER DIRECTION AT HIGH SPEED UNDER DMA PULSE COUNT
3814000               *               CONTROL, TPOS = 2
3815000               *
3816000               *
3817000               *     TEMPORARIES USED : FLG2 (MRW1+6)
3818000               *
3819000               *     ROUTINES CALLED : STPRA, DUFND, ERDS0
3820000               *
3821000               *
3822000               *
3823000               *
3824000 21712  042232  CHST  JSM DFND          DO THE FIND
3825000 21713  142770        JSM ERDS0,I       CHECK FOR ERRORS
3826000 21714  170201        RET 1
```

*** AVE AND AVD ***

```
                *
                *
                *
                *
                *
                *     AVE IS THE CASSETTE AUTOVERIFY ENABLE COMMAND
                *
                *
                *     TEMPORARIES USED : NONE
                *
                *     ROUTINES CALLED : NONE
                *
                *
21715   000177  AVE   LDA P0
21716   066720        JMP AVD1
                *
                *
                *     AVD IS THE CASSETTE AUTOVERIFY DISABLE COMMAND
                *
                *
                *     TEMPORARIES USED : NONE
                *
                *     ROUTINES CALLED : NONE
                *
                *
                *
                *
                *
21717   000257  AVD   LDA M1
21720   031344  AVD1  STA AVFLG
21721   164365        JMP AINTX,I
```

***ROM CON ***

```
                *
                *-------- ROM CONSTANTS
                *
                *
        000177  ZERO  EQU P0
        000254  ONE   EQU P1
        000145  TWO   EQU P2
        000144  THREE EQU P3
        000143  D4    EQU P4
        000137  D8    EQU P8
        000133  D12   EQU P12
        000127  D16   EQU P16
        000117  D32   EQU P32
        000052  D128  EQU P128
        000247  M30K  EQU ZK1         USED IN FIND1 GIVES BUFFER DMAMA
21722   034232  .P30I DEC 14490       USED IN HOLE TO CALC DIST TRVLED
21723   143546  .M30I DEC -14490      30" OF TAPE
21724   152152  .M24I DEC -11158      USED TO GET BACK TO LP & EW
21725   161663  .M12I DEC -7245       DIST THOLD IN HOLE
21726   177416  .MWTI DEC -242        DIST THOLD IN HOLE
21727   176422  COAST DEC -750
21730   177626  TACLS DEC -106        REACH 22 IPS
21731   171611  EVTLN DEC -3191       WRITE AN EVTM
21732   175507  EVTDT DEC -1209       DETECT AN EVTM
21733   177035  IRGLN DEC -483        WRITE IRG
21734   177620  SETLN DEC -112        10 MSEC OF SETTLING
21735   000325  DEADZ DEC 213         6" BUFFER BETW LP & IRG 0 (WROS)
        000130  ERMSK EQU P15         ERROR MASK
        000141  PRGM  EQU P6
                *                     TO DISTUISH DATA FROM PROGRAMS
        021732  INDED EQU EVTDT
21736   077676  RHPTR DEF CRECN       POINTS TO RECORD HEAD
21737   077714  PHPTR DEF PARNO       POINTS TO PARTITION HEAD
21740   174373  CFDF  DEC -1797       RECOVERY DISTANCE FOR FIND IF SEARCH IN FWD
21741   175412  CFDR  DEC -1270       RECOVERY DISTANCE IF FIND SEARCHES IN REVERSE
        000053  RLFDL EQU B177        READ,LS,FWD,DATA,TLO
        000137  HDLN  EQU P8          DEFINE HEAD LENGTH TO BE SEVEN WORDS + 1 (CHSUM)
        021733  DLYA  EQU IRGLN       USED IN HOLE TO GET VALID PE
        000140  SLKRH EQU P7          MRK SLACK FOR REC HEAD
        000053  MSKL7 EQU RLFDL       ALLOWS ME TO LOOK AT LOW 7 BITS
        000045  KPMSK EQU B377        GUAR B8 OF HARWARE COMMANDS IS ZERP
21742   000167  RLFTL OCT 167         READ,LS,FWD,TAC,TLO
        021742  TACMD EQU RLFTL
21743   000117  RHRDL OCT 117         READ,HS,REV,DATA,TLO
21744   000107  RHRTL OCT 107         READ,HS,REV,TAC,TLO
21745   000127  RHFTL OCT 127         READ,HS,FORWARD,TAC,TLO
        000074  WLFDD EQU B77         WHT,LS,FWD,DATA,DATA
        000101  WLFTG EQU B63         WHT,LS,FND,TAC,GAP
```

```
                      *****ROM CON *****

        000124  WHFTG EQU P19        WRT,HS,FWD,TAC,GAP
        000057  RLFDH EQU B173       READ,LS,FWD,DATA,THI
        000057  RLFTH EQU RLFDH      READ,LS,FWD,TAC,THI
        000062  RLRDH EQU B153       READ,LS,REV,DATA,THI
        000064  RLRTH EQU P99        READ ,LS,REV,TAC,THI
21746   000303  STOP  OCT 303        STOP,READ,FST,REV,TAC,NOI,,WRONG--TLO,TRB
                *                    TLO,TRB
        000117  MPERR EQU P32        ERROR -- MRK POSITION UNKNOWN
        000073  MKERR EQU P64        ERROR--MARK DOES NOT FIT
        000052  RHERR EQU P128       ERROR--RECORDING HEAD
        000044  RBERR EQU B400       ERROR--READING BODY
        000236  NRERR EQU B2K        ERROR--RECORD NOT FOUND OR NO RECORD
        000234  WPERR EQU B4K        ERROR--ILLEGAL WRT! CART. PROT'D
        000237  VYERR EQU B1K        ERROR--VERIFY FAILED
        000175  HOERR EQU B10K       ERROR - HOLE PATTERN UNKNOWN
21770                 ORG 21770B
21770           ERDSU BSS 1
21771           GTPR2 BSS 1
21772           STPRA BSS 1

                      ----- QUESTION MARKS!! -----

                *
                *
                *    THESE CONSTANTS REPRESENT A FLOATING POINT QUESTION MARK
                *
                *
21773                ORG 21773B
21773   021774  QMRKS DEF *+1
21774   000000       DEC 0
21775   177777       DEC -1
21776   177777       DEC -1
21777   177777       DEC -1

                      ******** DMALO **********

                *
                *
                *    ALL DEVICES USING DMA MUST CALL THIS ROUTINE. UPON RELEASE OF
                *    DMA, THE CALLING DEVICE MUST CLEAR ( SET TO ZERO ) THE DMA
                *    LOCKOUT FLAG.( DMA LOCKOUT FLAG = DMAPA )
                *
                *
                *    TYPICAL CODE SEQUENCE FOR THE INTERRUPT ROUTINE OF THE DEVICE
                *    DESIRING DMA :
                *
                *
                *    SERVICE ROUTINE
                *
                *(SAVE REGISTERS, ETC.)
                *      LDB P7          PERIPHERIAL ADDRESS OF DEVICE = 7
                *      JSM DMALO       REQUEST DMA HARDWARE
                *      JMP *-2         REQUEST REFUSED - TRY AGAIN
                *(SET DMAMA)           SET THE DMA REGISTERS
                *(SET DMAC)
                *      DMA             ENABLE DMA (OR PCM)
                *(RESTORE REGISTERS, ETC.)
                *      RET 0,P         DONE
                *
                *
                *    A PART OF THIS ROUTINE MUST ALSO BE EXECUTED TO RELEASE THE
                *    DMA HARDWARE WHEN THE DMA OPERATION IS FINISHED BY THE DEVICE
                *
                *
                *    EXAMPLE :
                *
                *(PRELIMINARY CODE)
                *      LDA P0          CLEAR DMA LOCKOUT FLAG
                *      STA DMAPA
                *      RET 0,P
                *
                *
                *    ON ENTRY : REGISTER B CONTAINS THE PERIPHERIAL ADDRESS OF THE
                *               DEVICE REQUESTING  DMA
                *
                *
                *    ON EXIT : 1). RET 1 = DMA BUSY MUST WAIT
                *              2). RET 2 = DMA GRANTED AND DMAPA = CONTENTS OF REGISTER
                *
                *
                *    TEMPORARIES USED : NONE
```

****** DMALO ********

```
                *
                *      ROUTINES CALLED : NONE
                *
                *
                *
      23724            ORG 23724B
      23724  070430  DMAL, DIR
      23725  000013        LDA DMAPA         SEE IF THE DMA IS FREE
      23726  072416        SZA DMAL2         SKIP IF DMA IS FREE
      23727  011345        CPA CSCF          IF DMA NOT = ZERO IS A CASSETTE DOING A FIND ?
      23730  066733        JMP *+3           YES A CASSETTE IS DOING A FIND
      23731  070420  DMAL1 EIR
      23732  170201        RET 1
      23733  001345        LDA CSCE          SEE IF THE CASSETTE IS DONE
      23734  030011        STA PA
      23735  000005        LDA R5            DO THIS BY CHECKING THE 'MOVING' BIT
      23736  170504        SAR 5
      23737  073472        RLA DMAL1         SKIP IF BUSY
      23740  170602        SAL 3             MUST CLEAR "SEARCH" BIT IN
      23741  170140        CMA               CASSETTE TO PREVENT ANY
      23742  062747        IOR STOP1         FURTHER DMA REQUESTS
      23743  030005        STA R5
      23744  034013  DMAL2 STB DMAPA         DMA IS FREE SO SET UP THE DMAPA
      23745  070420        EIR
      23746  170202        RET 2
      23747  000357  STOP1 OCT 357           STOP CASSETTE AND CLEAR SEARCH BIT
                *
                *
                *
                *
                *
```

***RAM WORDS***

```
                *
                *-----CASSETTE DEDICATED RAM
                *
         077676  CRECN EQU CATMP          RECORD NUMBER (PART OF HEAD)
         077677  ASIZE EQU CATMP+1        ABSOLUTE SIZE
         077700  CSIZE EQU CATMP+2        CURRENT SIZE
         077701  RTYPE EQU CATMP+3        RECORD TYPE
         077702  RRWNO EQU CATMP+4        RECORD REWRITE NUMBER
         077703  EXISF EQU CATMP+5        SECURITY FLAG #0=SECURE 0=UNSECURE
         077704  EX2   EQU CATMP+6        USED FOR FWUP IN RKM
         077705  TPOS  EQU CATMP+7        TAPE POSITION INDICATOR
                *
                *
                *      TPOS TAKES ON THE FOLLOWING VALUES:
                *
                *      TPOS=1  -> IN GAP PROCEEDING RECORD CRECN
                *      TPOS=2  -> IN RECORD BODY OF CRECN-1
                *      TPOS=8  -> AT REWIND
                *      TPOS=16 -> LOST, HEAD INFO INVALID
                *
                *
         077706  MBPTR EQU CATMP+8        POINTS TO BODY SECTION
         077710  CUCMD EQU CATMP+10       CURRENT HARDOWARE COMMAND
         077763  ERRWD EQU MRW1+5         LOGS ERRORS
         077764  FLG2  EQU MRW1+6         BITS 1-15 ARE ALWAYS ZERO
                *                         BIT ZERO SET= HARDWARE FIND
                *                         BIT ZERO CLR = BPC FIND
                *
                *    SHARED TEMPORARIES
                *
                *-----------------------
                *
         077743  LWMD  EQU OP1+1
         077735  SVC   EQU T21            DEDECATED TO SAVING THE C REGISTER
                *-----  PARTITION HEAD
                *
         077767  PRCTR EQU MRW1+9
         077727  DLFLG EQU T15
         077714  PARNO EQU T4             PARTITION NUMBER
         077715  PARLN EQU T5             PARTITION LENGTH
         077716  PRWNO EQU T6             PARTITION REWRITE NUMBER
         077717  TEMP1 EQU T7             USED IN WAIT AND NCODE
         077720  MSIZE EQU T8             HOLDS ABSOLUTE SIZE OF RECORDS TO MARK
         077721  CHSUM EQU T9             USED FOR ALL CHECKSUM CALCULATIONS
         077721  TDIST EQU CHSUM          TARGET-STARTING RECORD NUMBER
         077722  NOREC EQU T10            NUMBER OF RECORDS TO MARK
         077723  INSTR EQU T11            HOLDS AN INSTRUCTION (STR,COMPR)
         077724  FPASS EQU T12            COUNTS NUMBER OF ATTEMPTS TO FIND
         077725  RECNO EQU T13            TARGET RECORD NUMBER
```

```
                 *****RAM WORDS*****
         077726  MRKSZ EQU T14             NUMBER OF WORDS NCODE WRITES ON MARK
                 *
                 *
                 *       FLG1 : BITS 1 - 15  ARE ALWAYS ZERO
                 *                BIT   0    SET MEANS TRACK A
                 *                           CLEAR MEANS TRACK B
                 *
                 *
         077707  FLG1  EQU CATMP+9         MARK SETS THIS BEFORE ENTERING IDR, ANDTHIS
                 *                         REMEMBERS THE TRACK
                 *
                 *
                 *         COUNTERS
                 *
                 *
         077730  RHCTR EQU T16
         077730  PHCTR EQU T16             PARTITION HEAD COUNTER
         077731  WCTR  EQU T17             WORD COUNTER USED IN PARTITION BODY
         077732  RWCTR EQU T18             COUNTS WORDS IN S RECORD
                 *
                 *          POINTERS
                 *
         077733  PTR   EQU T19             GENERAL PURPOSE MOVING POINTER
         077734  BDPTR EQU T20             MOVING BODY POINTER
                 *
                 *
                 *
                 *
                       END
END OF PASS 2 NO ERRORS DETECTED


                       BASE-PAGE READ-WRITE-MEMORY

76550                  ORG 76550B
                       UNL
                       LST
                 *

                 *
                 *     BASE PAGE LINKS
                 *
00463                  ORG AMUPH
00463  022641          DEF MUPHI     MOVE MAIN PROGRAM TO HIGHER MEM.
00464  022662          DEF MAMPL     MOVE MAIN PROGRAM TO LOWER MEMORY
00465  022646          DEF MPUPH     MOVE PART OF MAIN PROG. HIGHER
00466  022665          DEF MPMLM     MOVE PART OF MAIN PROG. LOWER
00467  022627          DEF MTHIM     MOVE RWM HIGHER
00470  022700          DEF MTLOM     MOVE RWM LOWER
00471  022716          DEF ZRWM      ZERO RWM
00472  022761          DEF ERAS4     ERASE ALL VARIABLES
00473  022460          DEF LSTS1     LIST A SPECIALKEY
00474  022431          DEF FETS3     PUT SPECIAL KEY NUMBER IN I/O BUFFER
00475  023506          DEF EDPTR     RESET EDIT POINTERS
00476  023514          DEF TLNIO     PUT LINE NUMBER IN I/O BUFFER
00477  023517          DEF TLNX      CONVERT FROM BINARY TO DECIMAL ASCII
00500  023561          DEF EOLNN     FIND END OF LINE IN I/O BUFFER
00501  023601          DEF GNEXT     GET NEXT CHARACTER
00502  023630          DEF TCHR      TRANSFER CHARACTERS
00503  023617          DEF RNLON     TURN ON RUN LIGHT
00504  023623          DEF RNLOF     TURN OFF RUN LIGHT

                       CONTROL SUPERVISOR LINKS
                 *
11614                  ORG 11614B
                 *
11614                  BSS 5         EXECUTE
                 *
11621  022000          DEF STOR      STORE
11622                  BSS 1
11623  022051          DEF STEDT
11624                  BSS 1
11625  022000          DEF STOR
                 *
11626  023477          DEF INRE      INSERT/REPLACE CHAR
11627  023477          DEF INRE
11630  023477          DEF INRE
11631                  BSS 2
                 *
11633                  BSS 5         CLEAR KEY
11640                  BSS 5         DELETE CHAR
11645                  BSS 5         STEP
                 *
11652  023333          DEF RHAR      RIGHT ARROW
```

CONTROL SUPERVISOR LINKS

```
11653  023340         DEF RHAR7
11654  023333         DEF RHAR
11655                 BSS 1
11656  023332         DEF RHRM4
               *
11657  023364         DEF LAKE       LEFT ARROW
11660  023427         DEF LFAR
11661  023364         DEF LAKE
11662                 BSS 1
11663  023363         DEF LFRM4
               *
11664                 BSS 5          DOWN ARROW
11671                 BSS 5          RECALL
11676                 BSS 5          PROG KEYS
11703                 BSS 5          UP ARROW
               *
11710  023122         DEF BACK       BACK
11711  023147         DEF BACK2
11712  023122         DEF BACK
11713                 BSS 2
               *
11715  023174         DEF FORW       FORWARD
11716  023234         DEF FORW2
11717  023174         DEF FORW
11720                 BSS 2
               *
11722  023637         DEF PINK       STOP, REW
11723  023637         DEF PINK
11724  023637         DEF PINK
11725                 BSS 1
11726  023637         DEF PINK
               *
11727                 BSS 5          TYPING AIDS
               *
11734  022273         DEF SPKM0      SPECIAL KEYS
11735  022315         DEF EXESK
11736  022315         DEF EXESK
11737  022315         DEF EXESK
11740  022315         DEF EXESK
               *
11741                 BSS 5          PRINT-ALL
               *
11746  022164         DEF INLK       INSERT LINE
11747                 BSS 1
11750  022164         DEF INLK
11751                 BSS 1
11752  022164         DEF INLK
               *
11753                 BSS 5          RUN
11760                 BSS 5          CONTINUE
               *
11765                 BSS 1          LINE DELETE
11766  023113         DEF LDELF
11767                 BSS 3
               *
11772                 BSS 5          RESULT
               *
```

CONTROL AND I/O SUPERVISOR SERVICE ROUTINES

```
               *
               *
               ***********************************************
               *
               *    CONTROL AND I/O SUPERVISOR ROUTINES
               *
               *
               *
               ***********************************************
               *
               *
               *      EDMM
               *
               *
               *
               *
22000                 ORG 22000B
               *
               *
               *      STORE (KEYBOARD MODE)
               *
               *
22000  043233  STOR   JSM EDIN       EDIT INITIALIZATION (RET P+1; A=CFLAG)
```

CONTROL AND I/O SUPERVISOR SERVICE ROUTINES

```
22001  170700          RAR 1        POSITION STORE-KEY AND FETCH-LINE BITS
22002  073002          SLA *+2      KEY TO BE DEFINED ?
22003  067526          JMP STKEY    YES
22004  172002          SAP STOR6    REPLACE OLD LINE ?
22005  067052          JMP STD1     YES
22006  043151   STOR6  JSM ISSBR    NULL PROGRAM OR REFERENCE TO LAST LINE ?
22007  067054          JMP STEDX    NO
                *
22010  043245   STOR7  JSM CRCL     COMPILE, REV. COMPILE, GET LINE LENGTH
22011  043255          JSM COVF     CHECK FOR OVERFLOW
22012  101277          LDA ENDS,I   GET LAST BRIDGE
22013  050215          AND BXCMM    SAVE ONLY REVERSE LINK
22014  061234   STOR4  IOR TMP4     INCLUDE LENGTH OF PRESENT LINE
22015  131277   STOR2  STA ENDS,I   LINE BRIDGE CREATED
22016  005277          LDB ENDS     GET END OF USER PROGRAM POINTR
22017  015310          CPB RMAX     R-REGS GIVEN ?
22020  024257          ADB M1       NO; B = ENDS-1
22021  024254          ADB P1       B = OLD FIRST WORD OF R-REGS (B=ENDS IF NO R-REGS GIV
22022  001310          LDA RMAX     MAX R-REG USED
22023  030016          STA C        SET START SOURCE ADDR
22024  021234          ADA TMP4     A = NEW RMAX VALUE
22025  030017          STA D        SET START DESTINATION ADDR
22026  031310          STA RMAX     UPDATE MAX R-REG POINTR
22027  140467          JSM AMTHM,I  MOVE R-REGS TO HIGHER MEMORY
22030  001277   STOX1  LDA ENDS     GET DESTINATION ADDR
22031  072101          RIA *+1      POINT TO SECOND WORD OF LINE
22032  043265          JSM TLCM     TRANSFER LINE TO MEMORY
22033  001277          LDA ENDS     GET E/A OF PROG
22034  021234          ADA TMP4     ADD LENGTH OF NEW LINE
22035  031277          STA ENDS     UPDATE POINTR
22036  001234          LDA TMP4     GET LENGTH OF LINE
22037  170607          SAL 8        PLACE IN UPPER HALF
22040  131277          STA ENDS,I   LAST BRIDGE CREATED
22041  045226   STOR5  ISZ LNO      INCRM LINE NO.
22042  067043          JMP *+1      NEEDED FOR FIRST LINE NO.
22043  140476   STOR3  JSM ATLNI,I  TRANSFER LINE NO. TO I/O BUFFER
22044  140475          JSM AEDPT,I  RESET I/O PTRS
22045  000053          LDA EOL      END OF LINE MARKER
22046  074550          PBD A,I      INCRM AND PLACE IN I/O BUFF
22047  000146          LDA M2       CLR FETCH BIT 0
22050  067242          JMP STCFG    SET CFLAG
                *
                *
                *
                *
                *
                *
                *      STORE (EDIT MODE)
                *
                *
22051  043233   STEDT  JSM EDIN     EDIT INITIALIZATION
22052  043056   STD1   JSM STED     STORE NEW LINE
22053  067043          JMP STOR3    GIVE LINE NO.
                *
22054  043060   STEDX  JSM STED5    STORE NEW LINE
22055  067041          JMP STOR5    INCRM LINE NO. AND DISP IT
                *
22056  140512   STED   JSM AFLAD,I  FIND LINE ADDR
22057  140424          JSM ASYER,I  LINE SHOULD EXIST
22060  031225   STED5  STA TMP2     SAVE S/A OF LINE
22061  100000          LDA A,I      GET LINE BRIDGE
22062  050053          AND B177     GET OLD LINE LENGTH
22063  031227          STA TMP1     AND SAVE IT
22064  101225          LDA TMP2,I   GET LINE BRIDGE AGAIN
22065  050052          AND STPMS    PRESERVE STOP BIT
22066  031730          STA T16      AND SAVE IT
22067  043245          JSM CRCL     COMPILE, REV. COMPILE, GET LINE LENGTH
22070  001234          LDA TMP4     GET LENGTH
22071  170040          TCA          MAKE NEG.
22072  021227          ADA TMP1     A=OLD LENGTH-NEW LENGTH
22073  072403          SZA STED2    SKIP IF OLD = NEW
22074  172003          SAP STED1    NEW > OLD ?
22075  067111          JMP STED4    YES
                *
                *      REPLACE OLD LINE BY NEW; OLD = NEW
                *
22076  067127   STED2  JMP STED6
                *
                *      REPLACE OLD LINE BY NEW; OLD > NEW
                *
22077  043133   STED1  JSM STDIN    SET STOP BIT IN LINE BRIDGE
22100  043127          JSM STED6    TRANSFER LINE TO MEMORY
22101  005225          LDB TMP2     S/A OF OLD/NEW LINE
22102  025227          ADB TMP1     B = S/A OF NEXT LINE
22103  045234          ISZ TMP4     INC TMP4 DUE TO STED6
22104  043141          JSM STREL    SET REVERSE LINK IN BRIDGE
                *
                *      CLOSE-UP GAP
                *
```

```
22105  070570        WWD A,I      DUMMY; POINT TO START DESTIN. ADDR
22106  005227        LDB TMP1     GET ADDR OF NEXT LINE
22107  034016        STB C        SET START SOURCE ADDR
22110  164466        JMP AMPML,I  MOVE PART OF PROG. TO LOWER MEM. + RET P+1
                *
                *    REPLACE OLD LINE BY NEW; OLD < NEW
                *
22111  170040  STED4 TCA         MAKE DIFF. NEG.
22112  031715        STA TS       SAVE DIFFERENVE
22113  101225        LDA TMP2,I   GET LINE BRIDGE
22114  050053        AND B177     GET OLD LINE LENGTH
22115  021225        ADA TMP2     FIND S/A OF NEXT LINE
22116  004000        LDB A        B=END SOURCE ADDR
22117  001310        LDA RMAX     MAX. R-REG. POINTR
22120  021715        ADA TS       POINT TO NEW ADDR
22121  030017        STA D        SET START DESTINATION ADDR
22122  140465        JSM AMPUP,I  MOVE PART OF MAIN PROG. TO HIGHER MEM.
22123  043133        JSM STDIN    SET STOP BIT IN LINE BRIDGE
22124  005225        LDB TMP2     S/A OF LINE
22125  025234        ADB TMP4     POINT TO S/A OF NEXT LINE
22126  043141        JSM STREL    SET REVERSE LINK IN BRIDGE
22127  001225  STED6 LDA TMP2     S/A OF NEW LINE
22130  072101        RIA *+1      POINT TO SECOND WORD
22131  055234        DSZ TMP4     DISCOUNT NEW LINE BRIDGE
22132  067265        JMP TLCM     TRANSFER LINE TO MEM. AND RET P+1
                *
                *
22133  101225  STDIN LDA TMP2,I   GET LINE BRIDGE
22134  050170        AND BUHM     SAVE UPPER HALF
22135  061234        IOR TMP4     INCLUDE LENGTH OF LINE
22136  061730        IOR T16      INCLUDE STOP BIT
22137  131225        STA TMP2,I   NEW LINE BRIDGE
22140  170201        RET 1
                *
                *
                * STREL   SETS REVERSE LINK IN LINE BRIDGE
                *         BRIDGE ADDR IN B
                *         LINE LENGTH IN TMP4
                *
                *       USES TMP1
                *
22141  035227  STREL STB TMP1     SAVE BRIDGE ADDR
22142  100001        LDA B,I      GET BRIDGE
22143  050250        AND BM377    SAVE TRACE,STOP BITS  , FORWARD LINK
22144  005234        LDB TMP4     GET LENGTH OF LINE
22145  174607        SBL 8        POSITION IN UPPER BYTE
22146  060001        IOR B        SET BITS IN A
22147  131227        STA TMP1,I   SET NEW BRIDGE
22150  170201        RET 1
                *
                *
                *
                *
                *    CHECK FOR NULL PROGRAM OR REFERENCE TO LAST LINE
                *
                *        EXIT: RETP+1    NOT FOUND
                *
                *              RETP+2    FOUND
                *
                *
22151  140512  ISSBR JSM AFLAD,I  FIND LINE ADDR
22152  067162        JMP ISSB1    LINE NOT FOUND
22153  104000        LDB A,I      GET LINE BRIDGE
22154  174610        SBL 9
22155  174510        SBR 9        GET LINE LENGTH
22156  020001        ADA B        POINT TO S/A OF NEXT LINE
22157  011277        CPA END$     LAST LINE ?
22160  170202        RET 2        YES
                *
22161  170201        RET 1
                *
22162  140514  ISSB1 JSM ASLLN,I  SET LNO TO LAST LINE
22163  170202        RET 2        RET 2  LAST LINE OR NULL PROGRAM
                *
                *
                *      INSERT LINE- KEYBOARD MODE
                *
                *
22164  043233  INLK  JSM EDIN     EDIT INITIALIZATION
22165  073412        RLA INLK2    SKIP IF FETCH BIT IS SET
22166  001307        LDA FWUP     NULL PROGRAM?
22167  011277        CPA END$
22170  067010        JMP STOR7    YES, TREAT AS A STORE
22171  001226        LDA LNO      IS LNO = -1?
22172  010257        CPA M1
```

CONTROL AND I/O SUPERVISOR SERVICE ROUTINES

```
22173  067226          JMP INLK1     YES, NOT REFERENCE TO LAST LINE
22174  043151          JSM ISSBR     NULL PROG. OR REFERENCE TO LAST LINE ?
22175  067226          JMP INLK1     NO
22176  067010          JMP STOR7     YES: TREAT IT AS A STORE
22177  043245  INLK2   JSM CRCL      COMPILE, REV. COMPILE, GET LINE LENGTH
22200  043255          JSM COVF      CHECK FOR OVERFLOW
22201  140512  INLK3   JSM AFLAD,I   FIND LINE ADDR
22202  140424          JSM ASYER,I   LINE SHOULD EXIST
22203  031225          STA TMP2      SAVE S/A OF REFERENCE LINE
22204  004000          LDB A         SET BRIGE ADDR FOR STREL
22205  101225          LDA TMP2,I    GET LINE BRIDGE
22206  031715          STA T5        SAVE OLD BRIDGE
22207  043141          JSM STREL     SET REVERSE LINK IN LINE BRIDGE
22210  001310          LDA RMAX      MAX. R-REG. POINTR
22211  021234          ADA TMP4      A = START DESTINATION ADDR
22212  030017          STA D         SET D-REG
22213  005225          LDB TMP2      END SOURCE ADDR
22214  140465          JSM AMPUP,I   MOVE PART OF USER PROG. TO HIGHR MEM.
22215  001715          LDA T5        GET REF. LINE BRIDGE AGAIN
22216  050215          AND BXCMM     SAVE ONLY REVERSE LINK
22217  061234          IOR TMP4      INCLUDE LENGTH OF NEW LINE
22220  131225          STA TMP2,I    BRIDGE OF NEW LINE
22221  043127          JSM STED6     TRANSFER LINE TO MEMORY
22222  001226          LDA LNO       GET LINE NUMBER
22223  031721          STA T9        SET FOR RENUMBER ROUTINES
22224  140517          JSM ARENI,I   ADJUST GTO'S AND GSB'S
22225  067043          JMP STOR3     GIVE LINE NO.
                *
22226  043245  INLK1   JSM CRCL      COMPILE REV COMPILE, GET LINE LENGTH
22227  043255          JSM COVF      CHECK FOR OVERFLOW
22230  045226          ISZ LNO       ADJUST LINE NO.
22231  067232          JMP *+1
22232  067201          JMP INLK3     INSERT LINE
                *
                *
                *      EDIT INITIALIZATION
                *
                *        EXIT: RET P+1     A = CFLAG
                *
                *
22233  140435  EDIN    JSM ATRBF,I   TRANSFER INFO FROM I/O TO KEYB. BUFF
22234  140461          JSM APRKB,I   GO THROUGH PRINTALL
22235  000214          LDA EOLB      GET EOL AND BLANK
22236  130311          STA AKBFL,I   STORE IN LAST WORD OF KBD BUFFER
22237  000254          LDA P1
22240  031517          STA RGFLG     ASSIGNMENT TO RES. REG. NOT ALLOWED
22241  000151          LDA M5        CLR RUN DONE BIT 2
                *
22242  051232  STCFG   AND CFLAG
22243  031232          STA CFLAG
22244  170201  COV1    RET 1
                *
                *
                *     COMPILE, REV. COMPILE, GET LINE LENGTH SUBR.
                *
                *
22245  140346  CRCL    JSM ACPLR,I   GO TO COMPILER, COMPILE KBD BUFFER
22246  004317          LDB AIBSL     I/O BUFF START OF LINE (ALLOW FOR LINE NO. AND COLL
22247  140356          JSM ARCLR,I   REVERSE COMPILE TO CHECK LINE LENGTH
22250  001251          LDA OFLAG     GET REV COMPILE OVERFLOW FLAG
22251  010117          CPA B40       IS IT A BLANK?
22252  164510          JMP AGLL,I    YES, NO OVERFLOW,GET LINE LENGTH,RETURN
                *
22253  140404          JSM AERR1,I   LINE TOO LONG
22254  031061          ASC 1,21
                *
                *
                *      CHECK FOR OVER-FLOW
                *
                *              ENTRY: TMP4 = LENGTH NEEDED
                *
                *           "COVX" ENTRY: A = POSSIBLE ADDR OF RMAX
                *
                *
22255  001234  COVF    LDA TMP4      GET LENGTH
22256  021310          ADA RMAX      A=NEW MAX R-REG ADDR
22257  170040  COVX    TCA           MAKE NEGATIVE
22260  021263          ADA AP1       TOP OF EXECUTION STACK
22261  072402          SZA ERMOV     GIVE AN ERROR IF NO MEM AVAILABLE
22262  172062          SAP COV1      NO OVERFLOW IF RESULT IS POSITIVE
22263  140404  ERMOV   JSM AERR1,I   MEMORY OVERFLOW
22264  032060          ASC 1,40
                *
```

```
                     *
                     *     TRANSFER LINEFROM COMPILE BUFF TO MEMORY
                     *
                     *               ENTRY: A=DESTINATION ADDR
                     *
                     *                      TMP4=LINE LENGTH
                     *
                     *
22265  004303  TLCM  LDB ACBF     ADDR OF COMPILE BUFF
22266  034016        STB C        SET C-REG
22267  030017        STA D        SET D-REG
22270  025234        ADB TMP4     B = ACBF + LINE LENGTH
22271  024257        ADB M1       B = LAST SOURCE ADDR
22272  164470        JMP AMTLM,I  TRANSFER LINE INTO MEM. AND RETURN P+1
                     *
                     *
                     * SPECIAL KEYS SOFTWARE
                     *
                     *
                     *
                     *
                     *
                     *
                     *

                     ****************
                     *
                     * SPKM0:  MODE 0 ENTRY POINT FOR SPECIAL KEYS
                     *
                     ****************
                     *
22273  043307  SPKM0 JSM SVKEY    SAVE KEY NUMBER
22274  000423        LDA ASCND    SEARCH THE I/O BUFFER FOR MAINFRAME COMMANDS
22275  004314        LDB AIBFX    GET COMMAND FROM I/O BUFFER
22276  140414        JSM ACTFC,I  INCLUDING THE NON-COMMAND "LIST".
22277  067316        JMP EXEKK    P+1:NO COMMAND FOUND,MUST BE KEY EXECUTION
22300  014145        CPB P2       P+2:  COMMAND FOUND, B = OP CODE
22301  067407        JMP FETSK    OP CODE 2:  FETCH
22302  014144        CPB P3
22303  067436        JMP .ERSK    OP CODE 3: ERASE
22304  014141        CPB P6       OP CODE 6: LIST
22305  067457        JMP LSTSK
22306  067316        JMP EXEKK
                     *
                     * COMMAND FOUND BUTNOT ONE THAT THE SPECIAL KEYS SOFTWARE HANDLES.
                     * SO DEFAULT TO KEYEXECUTION.
                     *
                     *****************
                     *
22307  001212  SVKEY LDA SPKN     SAVE THE CURRENT KEY NUMBER
22310  031714        STA T4
22311  001235        LDA SKEY     REPLACE IT WITH THE NUMBER OF THE KEY TO BE EXECUTED
22312  020167        ADA BM200
22313  031212        STA SPKN
22314  170201        RET 1
                     *
                     *
                     *
                     ****************
                     *
                     * EXESK:  KEY EXECUTION
                     *
                     ****************
                     *
22315  043307  EXESK JSM SVKEY    SET KEY NUMBER
                     *
22316  000166  EXEKK LDA M97      CLR RECALL BITS 5,6
22317  043242        JSM STCFG
22320  043571        JSM FINDK    HAS THE KEY BEEN DEFINED?
22321  067401        JMP E30      P+1: KEY IS NOT DEFINED, GIVE ERROR 30
22322  172701        SAM *+1,S    P+2:  KEY FOUND, LET T3 = CHAR ADDR OF
22323  031713        STA T3       KEY DEFINITION,  SAVE ADDR
22324  001256        LDA MODE     IF "EOL" OR "FETCH"
22325  010254        CPA P1       MODE, THEN CLEAR
22326  140451        JSM ACLEB,I  THE EDIT BUFFER BEFORE
22327  010143        CPA P4       TRANSFERRING
22330  140451        JSM ACLEB,I  THE KEY DEFINITION
22331  001713        LDA T3       GET KEY ADDR
22332  030017        STA D        SET POINTER
22333  043615        JSM PLUCK    WITHDRAW THE FIRST CHARACTER
22334  000000        NOP          (THERE IS ALWAYS A FIRST CHARACTER)
22335  031713        STA T3       SAVE THE FIRST CHAR AS THE IEX/CONT FLAG
```

CONTROL AND I/O SUPERVISOR SERVICE ROUTINES

```
22336   010111         CPA B52        FIRST CHARACTER IS "*" , DON'T TRANSFER IT
22337   067351         JMP EXES2
22340   010104         CPA B57
22341   067351         JMP EXES2      FIRST CHARACTER IS "/", DON'T TRANSFER IT.
                 *
22342   004017   EXES1 LDB D
22343   035712         STB T2         SAVE OLD PTR
22344   140430         JSM AISTX,I    TRANSFER THE FIRST CHAR TO THE I/O BUFF
22345   067377         JMP E34    P+1: I/O BUFFER FULL, CHAR NOT TRANSFERED
22346   140446         JSM AFBP,I     UPDATE THE DISP POINTER
22347   005712         LDB T2
22350   034017         STB D          RESTORE CHAR POINTR
22351   043615   EXES2 JSM PLUCK      GET THE NEXT CHAR
22352   067354         JMP EXES3      P+1:  END OF KEY DEFINITION REACHED
22353   067342         JMP EXES1      P+2:  GOT ANOTHER CHARACTER, TRANSFER IT TO I/O BUF
                 *
22354   001714   EXES3 LDA T4         RESTORE THE CURRENT KEY NUMBER
22355   031212         STA SPKN
                 *
22356   040715         JSM CLMOD      SET KEY ENTRY MODE
22357   005257         LDB CSTAT      B = CONTROL STATE.
22360   001713         LDA T3         RECALL THE IEX/CONT FLAG
22361   010111         CPA B52        "*" ?
22362   067366         JMP EXES4      IMMEDIATE EXECUTE KEY
22363   010104         CPA B57        "/" ?
22364   067371         JMP EXES5      IMMEDIATE CONTINUE KEY.
                 *
22365   170201         RET 1          EXIT FOR TYPING AIDS
                 *
22366   014177   EXES4 CPB P0         EXIT FOR IEX KEYS
22367   164416         JMP AEXCK,I    COMMAND EXECUTION
22370   164431         JMP AEXST,I    STATEMENT EXECUTION FOR STATE = 2,4
                 *
22371   014177   EXES5 CPB P0         EXIT FOR ICONT KEYS.
22372   164422         JMP AECIM,I    CSTAT=0:  NORMAL CONTINUE
22373   014145         CPB P2         IF LIVE KBD DISPLAY BUFFER
22374   140415         JSM ACONT,I    BEEP, RETURN P+2
22375   164415         JMP ACONT,I    CSTAT#0:  "ENTER" CONTINUE.
22376   170201         RET 1
                 *
22377   043403   E34   JSM SKERR      SPECIAL KEY ERROR
22400   031464         ASC 1,34       ERROR 34, DISPLAY BUFFER OVERFLOW
                 *
22401   043403   E30   JSM SKERR      SPECIAL KEY NOT DEFINED, ERROR 30
22402   031460         ASC 1,30
                 *
22403   140435   SKERR JSM ATRBF,I    TRANSFER I/O BUFF TO KBD BUFF
22404   001714         LDA T4         RESTORE CURRENT KEY NUMBER
22405   031212         STA SPKN
22406   164404         JMP AERR1,I    GO TO ERROR ROUTINE
                 *
                 ****************
                 *
                 * FETSK:  FETCH A SPECIAL KEY
                 *
                 ****************
                 *
22407   001232   FETSK LDA CFLAG      SET BIT ONE OF CFLAG TO INDICATE "KEY TO BE STORED"
22410   060145         IOR P2
22411   031232         STA CFLAG
                 *
22412   140451         JSM ACLEB,I    CLEAR I/O BUFF T BLANKS AND RESET PTRS
                 *
22413   043571         JSM FINDK      HAS THE KEY BEEN DEFINED ?
22414   067431         JMP FETS3      P+1: NO,DISPLAY LOWER CASE "F#"
22415   172701         SAM *+1,S      P+2:  YES, DISPLAY THE KEY DEFINITION
22416   030017         STA D          D = ADDRESS OF FIRST DEFINITION CHARACTER
22417   043615   FETS1 JSM PLUCK      GET A CHARACTER FROM THE KEY DEFINITION
22420   164436         JMP AEPON,I    P+1: END OF DEFINITION REACHED
22421   140430         JSM AISTX,I    P+2:  TRANSFER THE CHARACTER TO THE I/O BUFFER
22422   164436         JMP AEPON,I    P+1: I/O BUFFER FULL SHOULD NEVER OCCUR
22423   067417         JMP FETS1      GET NEXT CHAR
                 *
                 * ROUTINE TO PUT LOWER CASE "F#" IN THE I/O BUFFER
                 *   (I/O BUFFER MUST BE CLEARED TO BLANKS ON ENTRY)
                 *
22424   004223   FETS2 LDB B63K       STORE A LOWER CASE"F" AS THE FIRST CHARACTER
22425   134313         STB AIBUF,I
22426   001212         LDA SPKN       GET KEY NUMBER FOR ABTDA
22427   004314         LDB AIBFX      THE ASCII KEY NUMBER TO THE MESSAGE
22430   164477         JMP ABTDA,I
                 *
22431   043424   FETS3 JSM FETS2      PUT F# IN DISPLAY
22432   140436         JSM AEPON,I    GO THROUGH PRINT-ALL
22433   140433         JSM ALDSP,I    DISPLAY F#
22434   140452         JSM AEOLB,I    PUT EOL IN EDIT BUFFER
```

```
22435   170202          RET 2          SKIP OVER DISPLAY OF I/O BUFFER IN EOLE LOOP
                  *
                  ****************
                  *
                  * ERASK:  ERASE A SPECIAL KEY
                  *
                  ****************
                  *
22436   043750    .ERSK JSM ERS10      CLR BITS 0-3 OF CFLAG, PUT EOL IN EDIT BUFF
                  *
22437   043571    .ERS1 JSM FINDK      PUT "EOL" IN THE 1ST CHAR.  IS THE KEY DEFINED ?
22440   170201          RET 1          P+1:  NO, CANT VERY WELL STORE IT !!
22441   035741          STB T25        P+2:  YES, NOW  FIND WHERE IT ENDS.
22442   030017          STA D          D = ADDRESS OF SECOND CHARACTER IN DEFINITION
                  *
22443   043615    .ERS2 JSM PLUCK      GET ANOTHER CHAR
22444   067446          JMP .ERS3      P+1: FOUND THE END OF THE KEY DEFINITION
22445   067443          JMP .ERS2      P+2: KEEP GETTING CHARS UNTIL THE END IS FOUND
                  *
22446   004017    .ERS3 LDB D
22447   176601          SBM *+1,C
22450   034016          STB C          C IS THE WORD ADDRESS OF THE FIRST
22451   005741          LDB T25        WORD FOLLOWING THE KEY DEFINITION.
22452   034017          STB D          D IS THE WORD ADDRESS OF THE BEGINNING OF THE KEY
22453   010045          CPA B377       IF B377 OR 80 WAS THE NEXT CHARACTER,
22454   067656    .ERS4 JMP MPKML      MOVE PART OF KEYS AND ALL MAINLINE TO
22455   072477          SZA .ERS4      LOWER MEMORY AND RETURN P+1
22456   164464          JMP AMAMP,I    ELSE MOVE ONLY MAINLINE TO LOWER MEM. & RET P+1.
                  *
                  ****************
                  *
                  * LSTSK:  LIST A SPECIAL KEY
                  *
                  ****************
                  *
22457   140475    LSTSK JSM AEDPT,I    RESET I/O PTRS
                  *
22460   000147    LSTS1 LDA M3         CLR BIT 1 OF CFLAG TO GET OUT OF KEY MODE
22461   043242          JSM STCFG
                  *
22462   043571          JSM FINDK      HAS THE KEY BEEN DEFINED ?
22463   064710          JMP EOLIO      P+1: NO, DISPLAY EOL AND RETURN
22464   172701          SAM *+1,S      P+2:  YES, SAVE STARTING CHARACTER ADDRESS
22465   031737          STA T23
                  *
22466   140450          JSM ACLBI,I    CLR I/O BUFFER
22467   140444          JSM A.PRN,I    PRINT A BLANK LINE
22470   043424          JSM FETS2      PUT "F#" IN THE I/O BUFFER
                  *
22471   004017          LDB D          GET CHAR ADDR OF LAST DIGIT OF KEY #
22472   034016          STB C          SET PTR
22473   000134          LDA P11        COMPUTE THE NUMBER OF CHARACTERS LEFT IN THE
22474   176402          SBM *+2        FIRST LINE AFTER "F#":
22475   020254          ADA P1
22476   031711          STA T1
                  *
22477   004077          LDB P58
22500   074541          PBC B,I        PUSH ":"
22501   004117          LDB B40
22502   074541          PBC B,I        PUSH " "
22503   001737          LDA T23        SET UP THE BYTE POINTR FOR THE KEY DEFIN.
22504   030017          STA D
                  *
22505   043615    LSTS2 JSM PLUCK      GET THE NEXT KEY DEFINITION CHARACTER
22506   067521          JMP LSTS3      P+1:  END OF DEFINITION REACHED
22507   074540          PBC A,I        P+2:  NOW PUT IT IN THE I/O BUFFER
22510   055711          DSZ T1         HAS THE PRINT LINE BEEN FILLED ?
22511   067505          JMP LSTS2      NO, GET ANOTHER CHARACTER.
                  *
22512   140444          JSM A.PRN,I    YES, PRINT THE LINE
22513   140450          JSM ACLBI,I    CLR I/O BUFFER TO BLANKS
22514   000130          LDA P15
22515   031711          STA T1         PREPARE TO BUILD THE NEXT LINE, ONE BLANK
22516   000314          LDA AIBFX      FOLLOWED BY 15 CHARACTERS.
22517   030016          STA C
22520   067505          JMP LSTS2
                  *
22521   001711    LSTS3 LDA T1         HAVE ANY CHARACTERS BEEN STORED IN THE NEXT LINE
22522   010130          CPA P15        TO BE PRINTED ?
22523   067525          JMP *+2        NO, DON'T PRINT THE I/O BUFFER FULL OF BLANKS
22524   140444          JSM A.PRN,I    YES, PRINT THE LAST LINE
22525   064710    CIOEL JMP EOLIO      CLEAR I/O BUFF, SET EOL IN I/O BUFF AND RETURN P+1
                  *
                  ****************
                  *
                  * STKEY:  STORE A SPECIAL KEY
```

CONTROL AND I/O SUPERVISOR SERVICE ROUTINES

```
                      *
                      ****************
                      *
22526   043437  STKEY JSM .ERS1       ERASE OLD KEY FIRST
22527   001215        LDA IOCP        GET CURRENT BUFFER PTR
22530   005214        LDB CRSP        USE OLCP IF CURSOR IS SET
22531   076402        SZB *+2         SKIP IF NOT SET
22532   001213        LDA OLCP        CURSOR IS SET, USE OLCP
22533   010315        CPA AIBFM       THE I/O BUFFER WITH THE FIRST CHARACTER ADDRESS.
22534   067570        JMP STKE4       THE BUFF IS EMPTY, NOTHING TO STORE; RETURN
                      *
22535   031215        STA IOCP        I/O BUFFER.  IF AN ODD NUMBER
22536   172004        SAP STKE2       OF CHARACTERS ARE PRESENT, PUSH A B0 ONTO THE
22537   000177        LDA P0          END OF THE DEFINITION.
22540   140430        JSM AISTX,I
22541   000000        NOP             (THERE WILL ALWAYS BE ROOM FOR THE B0)
                      *
22542   000315  STKE2 LDA AIBFM       LENGTH OF KEY DEFINITION (WORDS) = (IOCP - AIBFM + 1)
22543   170040        TCA
22544   021215        ADA IOCP
22545   020254        ADA P1
22546   031734        STA T20         SAVE THE LENGTH FOR LATER USE.
                      *
22547   021310        ADA RMAX        SET UP THE DESTINATION ADDRESS FOR MAINLINE
22550   030017        STA D           PROGRAM AREA.
22551   140463        JSM AMUPH,I     MOVE ALL OF USER MAIN PROGRAM TO HIGHER MEMORY.
                      *
22552   005734        LDB T20         CALCULATE THE STARTING ADDRESS OF THE NEWLY
22553   174040        TCB             CREATED KEY AREA.
22554   025307        ADB FWUP
22555   000170        LDA M256        BUILD THE KEY HEADER (B377, KEY NO.) IN A
22556   061212        IOR SPKN        AND STORE IT AS THE FIRST WORD OF THE KEY DEFINITION
22557   130001        STA B,I
                      *
22560   000313        LDA AIBUF       USE D AS A WORD POINTER INTO THE I/O BUFFER AND
22561   030017        STA D           TRANSFER THE REST OF THE KEY DEFINITION TO ITS
22562   055734        DSZ T20         NEW HOME.
                      *
22563   044001  STKE3 ISZ B           BUMP THE KEY AREA WORD POINTER
22564   070570        WWD A,I         GET THEN NEXT WORD OUT OF THE I/O BUFFER
22565   130001        STA B,I         AND TRANSFER IT TO THE KEY AREA.
22566   055734        DSZ T20         ALL WORDS TRANSFERRED ?
22567   067563        JMP STKE3       NO, KEEP GOING.
                      *
22570   067750  STKE4 JMP ERS10       CLR BITS 0-3 OF CFLAG,PUT EOL IN EDIT BUFFER
                      *
                      ****************
                      *
                      * FINDK:  DETERMINEWHETHER KEY F<SPKN> IS DEFINED.
                      *   P+1:  KEY F<SPKN> IS NOT DEFINED.
                      *   P+2:  KEY F<SPKN> IS DEFINED, AND
                      *         A = WORD STARTING ADDRESS OF THE KEY DEFINITION
                      *         B = WORD STARTING ADDRESS OF THE KEY HEADER (B377, KEY NO.)
                      *
                      ****************
                      *
22571   001306  FINDK LDA FWAM        IF FWAM = FWUP THEN NO KEYS ARE DEFINED.
22572   011307        CPA FWUP
22573   170201        RET 1
                      *
22574   030017        STA D           ASSUME THAT THE LEFT BYTE OF FWAM,I MUST BE B377.
22575   005307        LDB FWUP        THE NEXT BYTE WITHDRAWN WILL BE THE KEY NO. OF
22576   176301        SBP *+1,S       THE FIRST KEY.  B = CHAR. ADDRESS OF FWUP'S LEFT BYTE
                      *
22577   074570  FIND1 WBD A,I         CHECK TO SEE IF THE KEY JUST FOUND IS THE ONE
22600   011212        CPA SPKN        BEING SEARCHED FOR.
22601   067610        JMP FIND3       YES, SET UP A & B AND RETURN P+2.
                      *
22602   014017  FIND2 CPB D           HAS THE BEGINNING OF MAINLINE PROGRAMMING BEEN FOUND
22603   170201        RET 1           YES, THE KEY F<SPKN> IS NOT DEFINED.
22604   074570        WBD A,I         KEEP LOOKING FOR THE START OF THE NEXT KEY.
22605   010045        CPA B377
22606   067577        JMP FIND1       FOUND THE START OF THE NEXT KEY, CHECK KEY NO.
22607   067602        JMP FIND2       CHECK FOR THE END OF THE KEY AREA.
                      *
22610   000017  FIND3 LDA D           A = ADDRESS OF DEFINITION
22611   172601        SAM *+1,C
22612   004000        LDB A
22613   024257        ADB M1          B = ADDRESS OF HEADER
22614   170202        RET 2
                      *
                      ****************
                      *
                      * PLUCK:  WITHDRAW (WBD A,I) THE NEXT CHARACTER FROM THE KEY DEFINITION.
                      *   P+1:  END OF DEFINITION REACHED (A = B377, B0, OR THE FIRST
                      *         BYTE OF THE MAINLINE PROGRAM AREA)
```

CONTROL AND I/O SUPERVISOR SERVICE ROUTINES

```
                       *    P+2:  A = NEXT DEFINITION BYTE
                       *
                       ****************
                       *
22615  074570  PLUCK  WBD A,I       WITHDRAW THE NEXT BYTE
22616  010045         CPA B377      IF IT IS THE START OF A NEW KEY THEN WE'RE DONE.
22617  170201  PLUC1  RET 1
22620  005307         LDB FWUP      IF WE JUST WITHDREW THE FIRST BYTE OF THE MAINLINE
22621  014017         CPB D         PROGRAM AREA, WE'RE DONE.
22622  067625         JMP *+3
22623  072474         SZA PLUC1     MUST TEST 0 AFTER 1ST BYTE OF FWUP BECAUSE IT WILL
22624  170202         RET 2
22625  000257         LDA M1        ALWAYS BE ZERO AS THE LINK OF LINE ZERO.
22626  170201         RET 1
                       *      MOVE A BLOCK OF INFO TO HIGHER MEMORY
                       *
                       *              ENTRY: C=START SOURCE ADDR
                       *
                       *                     D=START DESTINATION ADDR
                       *
                       *                     B=END SOURCE ADDR
                       *
                       *
22627  070570  MTHIM  WWD A,I       DUMMY: INCRM DESTIN. POINTR
22630  024257         ADB M1        ADJUST END ADDR
22631  000016  MTHM1  LDA C         GET WORD POINTR
22632  172601         SAM *+1,C     CLEAR BIT 15
22633  030016         STA C         AND UPDATE C-REG.
22634  010001         CPA B         CURRENT = END ADDR ?
22635  067712         JMP MTLM2     YES: CLEAR BIT 15 OF D-REG. AND RETURN P+1
                       *
22636  070760         WWC A,D       FETCH ONE WORD AND DECRM
22637  070750         PWD A,D       DECRM. AND PLACE ONE WORD
22640  067631         JMP MTHM1     LOOP
                       *
                       *
                       *      MOVE ALL OF USER MAIN PROGRAM TO HIGHER MEMORY
                       *
                       *
                       *
                       *              ENTRY: D=START DESTINATION ADDR
                       *
                       *              CHECK FOR MEMORY OVERFLOW
                       *
                       *
22641  005307  MUPHI  LDB FWUP      FIRST WORD OF USER PROGRAM ADDR
22642  043646         JSM MPUPH     MOVE TO HIGHER MEMORY
22643  000017  MSTFW  LDA D         LAST DESTINATION ADDR
22644  031307         STA FWUP      UPDATE START OF USER PROGRAM POINTR
22645  170201         RET 1
                       *
                       *
                       *      MOVE PART OF USER MAIN PROGRAM TO HIGHER MEMORY
                       *
                       *              ENTRY: D=START DESTINATION ADDR
                       *
                       *                     B=END SOURCE ADDR
                       *
                       *              CHECK FOR MEMORY OVERFLOW
                       *
                       *
22646  001310  MPUPH  LDA RMAX      ADDR OF MAX R-REG USED
22647  030016         STA C         SET START SOURCE ADDR
22650  000017         LDA D         START DESTINATION ADDR
22651  031712         STA T2        SAVE POINTR
22652  043257         JSM COVX      CHECK FOR MEMORY OVERFLOW
22653  043627         JSM MTHIM     MOVE TO HIGHER MEMORY
22654  001712         LDA T2
22655  067670         JMP MSTPT     SET ENDS,RMAX
                       *
                       *      MOVE PART OF KEYS AND MAIN PROGRAM LOWER
                       *
                       *              ENTRY: C=START SOURCE ADDR
                       *
                       *                     D=START DESTINATION ADDR
                       *
                       *
22656  005307  MPKML  LDB FWUP      START OF MAIN PROGRAM
22657  024257         ADB M1        POINT TO END OF KEYS
22660  043700         JSM MTLOM     MOVE PART OF KEYS LOWER
                       *
                       *      D=NEW FWUP-1
                       *
22661  044017         ISZ D         POINT TO NEW FWUP AND PROCEED TO "MAMPL"
                       *
```

```
                     *
                     *     MOVE ALL MAINPROGRAM TO LOWER MEMORY
                     *
                     *             ENTRY: D=START DESTINATION ADDR
                     *
                     *
22662   001307   MAMPL LDA FWUP      GET START SOURCE ADDR
22663   030016         STA C         GET C-REG
22664   043643         JSM MSTFW     UPDATE START OF PROG PTR
                     *
                     *
                     *     MOVE PART OF USER MAIN PROGRAM TO LOWER MEMORY
                     *
                     *             ENTRY: C=START SOURCE ADDR
                     *
                     *                    D=START DESTINATION ADDR
                     *
                     *
22665   005310   MPMLM LDB RMAX      MAX. R-REG USED
22666   043700         JSM MTLOM     MOVE TO LOWER MEMORY
22667   000017         LDA D         SET PTR
22670   005310   MSTPT LDB RMAX      OLD MAX R-REG
22671   174040         TCB           MAKE NEG.
22672   024000         ADB A         B + - PTR CHANGE
22673   025277         ADB ENDS      FIND NEW END OF PROG. ADDR
22674   035277         STB ENDS      UPDATE THE POINTR
22675   004000         LDB A         GET LAST DESTINATION ADDR
22676   035310         STB RMAX      UPDATE MAX. R-REG USED
22677   170201         RET 1
                     *
                     *
                     *     MOVE A BLOCK OF INFO TO LOWER MEMORY
                     *
                     *             ENTRY: C=START SOURCE ADDR
                     *
                     *                    D=START DESTINATION ADDR
                     *
                     *                    B=END SOURCE ADDR
                     *
                     *             EXIT: D=LAST DESTINATION ADDR
                     *
                     *
22700   070770   MTLOM WWD A,D       DUMMY: DECRM DESTIN. POINTR
22701   024254         ADB P1        ADJUST END ADDR
22702   000016   MTLM1 LDA C         GET WORD POINTR
22703   172601         SAM *+1,C     CLEAR BIT 15
22704   030016         STA C         AND UPDATE C-REG.
22705   010001         CPA B         CURRENT = END ADDR ?
22706   067712         JMP MTLM2     YES
                     *
22707   070560         WWC A,I       FETCH ONE WORD AND INCRM
22710   070550         PWD A,I       INCRM AND PLACE ONE WORD
22711   067702         JMP MTLM1     LOOP
22712   000017   MTLM2 LDA D         GET D-REG.
22713   172601         SAM *+1,C     CLEAR BIT 15
22714   030017         STA D         AND UPDATE D-REG.
22715   170201         RET 1
                     *
                     *
                     *     ZERO R/W MEMORY SEGMENT
                     *
                     *     ENTRY: A = START ADDR
                     *
                     *            B = END ADDR
                     *     EXIT: B=P0, A= END ADR
                     *
                     *
22716   035711   ZRWM  STB T1        SAVE END ADDR
22717   004177         LDB P0        CLEAR B-REG
22720   134000   ZRWM1 STB A,I       ZERO ONE WORD
22721   011711         CPA T1        DONE?
22722   170201         RET 1         YES
                     *
22723   072175         RIA ZRWM1     NO: CONT
                     *
                     *
                     *
                     *
                     *     ERASE MAIN PROGRAM
                     *
                     *
22724   140501   ERAS  JSM AGNXT,I   GET NEXT CHAR.
22725   030017         STA D         SET FLAG FOR AUTO START ROUTINES
22726   010053         CPA EOL       EOL MARK?
22727   067740         JMP ERAS2     YES: ERASE MAIN PROG.
22730   010065         CPA B141      A ?
```

```
22731  164426        JMP AERSA,I  YES, GO THROUGH PARTIAL SYSTEM START-UP
22732  010062        CPA B153     K ?
22733  067753        JMP ERAS3    YES! ERASE KEYS
22734  012652        CPA B166     V ?
22735  067746        JMP ERAS5    YES,ERASE VARIABLES
22736  140404  ERCNR JSM AERR1,I  COMMAND NOT RECOGNIZED
22737  030470        ASC 1,18
               *
               *     ERASE
               *
22740  001307  ERAS2 LDA FWUP     FIRST WORD OF USER PROG POINTER
22741  031277        STA END$     SET FOR NULL PROGRAM
22742  031310        STA RMAX     AND NO R-REGISTERS
22743  000177        LDA P0       CLEAR SECURE FLAG
22744  031315        STA STYFG
22745  131277        STA END$,I   CLEAR FIRST LINE BRIDGE
               *
               *     ERASE VARIABLES
               *
22746  043761  ERAS5 JSM ERAS4    ERASE VARIABLES
               *
22747  140514  ERAS9 JSM ASLLN,I  SET LNO = -1 OR LAST LINE #
22750  140452  ERS10 JSM AEOLB,I  PUT EOL IN I/O BUFFER, RESET EDIT PTRS
22751  000160        LDA M16      CLR BITS 0-3 OF CFLAG
22752  067242        JMP STCFG    SET CFLAG
               *
               *      ERASE KEYS
               *
22753  001306  ERAS3 LDA FWAM     GET S/A OF KEYS
22754  011307        CPA FWUP     NULL KEYS?
22755  067747        JMP ERAS9    YES, DONE
22756  030017        STA D        SET D TO START OF KEYS
22757  043662        JSM MAMPL    MOVE ALL MAIN PROG LOWER, MOVE FWUP
22760  067747        JMP ERAS9
               *
               *
               *
               *  ERASE V SUBROUTINE
               *
22761  001277  ERAS4 LDA END$     END OF USER PROG. POINTR
22762  031310        STA RMAX     RESET R-REGS
22763  005313        LDB FWBA     FIRST WORD OF BIN PROG AREA
22764  035311        STB VT1      RESET VALUE TABLE AREA
22765  035312        STB VT2      RESET VALUE TABLE AREA
22766  000276        LDA ADVTB    S/A OF VARIABLE TABLE
22767  004276        LDB ADVTB    S/A OF VAIABLE TABLE
22770  024101        ADB P51      POINT TO E/A OF VARIABLE TABLE
22771  043716        JSM ZRWM     ZERO VARIABLE TABLE AREA
22772  035506        STB FLAGS    CLEAR USER FLAGS
22773  140361        JSM AINTI,I  RESET AP1,AP2,AP3 POINTERS
22774  001320  ERSX1 LDA ESV      GET LINK TO STRING BLOCK
22775  072402        SZA *+2      SKIP IF NOT DEFINED
22776  141320        JSM ESV,I    ERASE STRING VARIABLE TABLE
22777  170201        RET 1
               *
               *
               *
               *****************************************************************
               *
               *  DELETE   COMMAND
               *
               *     DEL #1, (#2),(*)         DELETES LINES #1 THROUGH #2 INCLUSIVELY
               *     IF THE * IS PRESENT, NO PRESCAN IS DONE BY THE RENUMBERING
               *     ROUTINES
               *      T9=LN1; T7=LN2; T20= S/A OF LN1; T2= S/A OF LN2
               *      T19 = S/A OFLN2 +1
               *      ENTRY:  L MUST POINT TO FIRST CHAR AFTER "DEL" IN I/O OR
               *              KBD BUFFER
               *      EXIT: LNO = #1 - 1
               *
               ********************
               *
23000  000254  DELL  LDA P1       SET FOR PRESCAN BY DEFAULT
23001  031731        STA T17
23002  140501        JSM AGNXT,I  GET NEXT CHAR FROM BUFFER
23003  140507        JSM AINTC,I  BUILD A BINARY NUMBER
23004  035721        STB T9       LOWER LINE NO.
23005  035717        STB T7       HIGHER LINE NO.
23006  010107        CPA B54      IS NEXT CHAR A COMMA?
23007  066073        JMP DELL2    YES,GET NEXT NUMBER
               *
23010  010053  DELL1 CPA EOL      END OF BUFFER?
23011  066014        JMP DEL10    CONTINUE IF SO
23012  140404  ERLNB JSM AERR1,I  TOO MANY PARAMETERS- ERROR
```

```
23013  030471          ASC 1,19      BAD LINE NUMBERS
                *
23014  001721   DEL10  LDA T9        SEE IF LN1>LN2
23015  031233          STA TMP7      SET FOR AFLNA
23016  170040          TCA
23017  021717          ADA T7        A = LN2 - LN1
23020  172472          SAM ERLNB     ERROR IF MINUS
23021  140513          JSM AFLNA,I   FIND ADDR OF FIRST LINE, LINE # IN TMP7
23022  064722          JMP ERLNF     ERROR IF LINE NOT FOUND
23023  031734          STA T20       SET ADDR OF FIRST LINE
23024  001717          LDA T7        GET LN2
23025  031233          STA TMP7      SET FOR AFLNA
23026  140513          JSM AFLNA,I   FIND ADDR OF LAST LINE
23027  066065          JMP DELL3     NOT FOUND, DELETE REST OF PROGRAM
23030  031712   DELL4  STA T2        SET S/A OF LN2
23031  100000          LDA A,I       GET BRIDGE LENGTH
23032  050053          AND B177
23033  021712          ADA T2        ADD ADDR OF BRIDGE
23034  031733   DELL5  STA T19       SET S/A OF LN2+1
23035  001721          LDA T9        SET LNO TO FIRST LINE # -1
23036  020257          ADA M1
23037  031226          STA LNO
                *
23040  001731          LDA T17       WAS * A PARAMETER?
23041  072404          SZA DELL6     SKIP PRESCAN IF SO
23042  000254          LDA P1        SET FOR PRESCAN
23043  031613          STA RENFG
23044  140520          JSM AREND,I   PRESCAN FOR DELETED DESTINATIONS
23045  000177   DELL6  LDA P0        SET FOR ACTUAL RENUMBERING
23046  031613          STA RENFG
23047  140520          JSM AREND,I   RENUMBER GTO/GSB'S
                *
23050  101734          LDA T20,I     GET BRIDGE OF LN1
23051  050215          AND BXCMM     SAVE ONLY REVERSE BRIDGE LENGTH
23052  031731          STA T17       SAVE IT
23053  101733          LDA T19,I     GET FIRST BRIDGE OF LN2+1
23054  050250          AND BM377     SAVE ONLY TRACE,STOP BITS AND FORWARD BRIDGE LENGTH
23055  061731          IOR T17       SET BACKWARD LENGTH OF LN1-1
23056  131733          STA T19,I     SET NEW BRIDGE
                *
23057  001734          LDA T20       SHIFT USER'S PROGRAM TO THIS LOCATION
23060  030017          STA D
23061  001733          LDA T19       S/A TO SHIFT FROM
23062  030016          STA C
23063  043665          JSM MPMLM     MOVE MEMORY
                *
23064  067750          JMP ERS10     CLR BITS 0-3 OF CFLAG, PUT EOL IN I/O BUFF,RET1
                *
23065  140514   DELL3  JSM ASLLN,I   SET LNO TO LAST LINE
23066  001226          LDA LNO       SET FOR RENUMBER ROUTINES
23067  031717          STA T7
23070  001277          LDA END$      SET ADDR OF LN2+1
23071  071600          CLR 1         CLR LAST LINE BRIDGE
23072  066034          JMP DELL5
                *
23073  140501   DELL2  JSM AGNXT,I   GET NEXT PARAMETER
23074  010111          CPA B52       IS IT A *?
23075  066107          JMP DEL90     YES
23076  140507          JSM AINTC,I   BUILD THE LINE NUMBER
23077  035717          STB T7        SET LINE #
23100  010107          CPA B54       NEXT PARAMETER A COMMA?
23101  066103          JMP DEL91     YES
23102  066010          JMP DELL1     NO
                *
23103  140501   DEL91  JSM AGNXT,I   GET NEXT PARAMETER
23104  010111          CPA B52       IS IT A *?
23105  066107          JMP DEL90     YES, NO PRESCAN
23106  066012          JMP ERLNB     NO, ILLEGAL PARAMETER
23107  000177   DEL90  LDA P0        ASTERIK FOUND, NO PRESCAN
23110  031731          STA T17
23111  140501          JSM AGNXT,I   MAKE SURE NO MORE PARAMETERS
23112  066010          JMP DELL1
                *
                ***************************************************************
                *
                *  LINE DELETE KEY
                *
                ****************************
                *
23113  040717   LDELF  JSM STELM     SET MODE = 4
23114  000254          LDA P1        SET FOR PRESCAN
23115  031731          STA T17
23116  001226          LDA LNO       SET LN1,LN2
23117  031721          STA T9
```

CONTROL AND I/O SUPERVISOR SERVICE ROUTINES

```
23120  031717          STA T7
23121  066014          JMP DEL10
                 *
                 *
                 *
                 *     BACK KEY EXECUTION
                 *
                 *     MOVE CURSOR TO THE LEFT ONCE
                 *
                 *
                 *
23122  001214    BACK  LDA CRSP     GET CURSOR POINTR
23123  072015          RZA BACK1    IS CURSOR SET ?
23124  001215          LDA IOCP     NO! I/O BUFF CURRENT POINTR
23125  031213          STA OLCP     SET  CURSOR DROP POSITION
23126  042254          JSM CCTR     COUNT NO. OF CHARS FROM DBP TO IOCP
23127  066131          JMP BACX2
23130  170201          RET 1        BUFF EMPTY
                 *
23131  042264    BACX2 JSM BCSR     POSITION OF LAST CHAR >= TO DISP LENGTH ?
23132  066134          JMP *+2      NO
23133  066155          JMP BACX4    YES
23134  001711          LDA T1       CHAR COUNT FROM "CCTR" SUBR.
23135  072010          RZA BACX5    SET CRSP IF NOT 0
23136  042241          JSM FORW8    SET CRSP = 1
23137  066167          JMP BACX9    DEC IOCP,DEC DBP, RETURN
                 *
23140  050074    BACK1 AND B77      SAVE CURSOR COUNT
23141  010254          CPA P1       CURSOR ON FIRST POSITION?
23142  066164          JMP BACK7    YES
                 *
23143  001214          LDA CRSP     GET CURSOR POINTR AGAIN
23144  020257          ADA M1       BACK-UP CURSOR ONCE
23145  031214    BACX5 STA CRSP     UPDATE CURSOR POINTR
23146  066330          JMP DIOCP    DECRM I/O BUFF CURRENT POINTR + RETURN P+1
                 *
23147  042273    BACK2 JSM FMSE     FIND EOL AND SET EDIT MODE
23150  042254          JSM CCTR     COUNT NO. OF CHARS FROM DBP TO IOCP
23151  066153          JMP BACK3    BUFF NOT EMPTY
23152  066241          JMP FORW8    SET CRSP TO FIRST POSITION
                 *
23153  042264    BACK3 JSM BCSR     POSITION OF LAST CHAR >= DISP LENGTH ?
23154  066161          JMP BACK4    NO
23155  035214    BACX4 STB CRSP     YES! SET CURSOR POINTR ON LAST DISP CHAR
23156  024146          ADB M2       B = DLEN-2
23157  001513          LDA DBP      DISP BEGIN POINTER
23160  066360          JMP DKCPX    UPDATE IOCP POINTR AND RETURN P+1
                 *
23161  045711    BACK4 ISZ T1       CURSOR ON LAST CHAR+1
23162  001711          LDA T1       GET CURSOR POSITION
23163  066503          JMP INRE2    SET CRSP
                 *
23164  001513    BACK7 LDA DBP      GET DISP BEGIN POINTR
23165  011351          CPA AEBFX    EQUAL TO S/A OF EDIT BUFF?
23166  170201          RET 1        YES
                 *
23167  042330    BACX9 JSM DIOCP    DEC IOCP POINTER
23170  004257          LDB M1
23171  001513    BACK9 LDA DBP      GET DISPLAY BEGIN POINTER
23172  140401          JSM AADBA,I  DECRM DBP POINTR
23173  066466          JMP RHAR8    SET DBP POINTER
                 *
                 *
                 *     FORWARD KEY EXECUTION
                 *
                 *     MOVE CURSOR TO THE RIGHT ONCE
                 *
                 *
23174  000262    FORW  LDA TOBLN    CLR EOL FROM END OF LINE
23175  131353          STA AEBFL,I
23176  001213          LDA OLCP     GET FLAG FOR FORW CURSOR PASS
23177  010257          CPA M1       SET ?
23200  170201          RET 1        YES! DO NOT RESTART CURSOR
                 *
23201  001214          LDA CRSP     GET CURSOR POINTR
23202  072417          SZA FORW1    SKIP IF CURSOR NOT SET
23203  050074          AND B77      SAVE CURSOR COUNT
23204  011512          CPA DLEN     CURSOR ON LAST POSITION?
23205  066243          JMP FORW4    YES
                 *
23206  005214          LDB CRSP     GET CURSOR POINTR
23207  176601          SBM *+1,C    CLEAR INSERT CURSOR BIT
23210  024257          ADB M1       ADJUST CURSOR COUNT FOR ADDR CALCULATION
23211  001513          LDA DBP      GET DISP BEGIN POINTR
```

```
23212  140401         JSM AADBA,I  FIND BYTE ADDR OF CURSOR POSITION
23213  011213         CPA OLCP     IS IT ON THE LAST CHAR ENTERED?
23214  066226         JMP FORW5    YES
                 *
23215  001214         LDA CRSP     GET CURSOR POINTR AGAIN
23216  020254         ADA P1       FORWAR CURSOR ONCE
23217  031214         STA CRSP     UPDATE CURSOR POINTR
23220  066326         JMP INCP     INCRM I/O BUFF CURRENT POINTR +RETURN P+1
                 *
23221  001215   FORW1 LDA IOCP     GET I/O BUFF CURRENT POINTR
23222  011352         CPA AEBFM    BUFF EMPTY?
23223  170201         RET 1        YES
                 *
23224  031213         STA OLCP     SET OLD CURRENT POINTR
23225  066235         JMP FOR10    SET IOCP
                 *
23226  042326   FORW5 JSM INCP     INC I/O BUFF CURRENT POINTER
23227  000177   FORW9 LDA P0
23230  031214         STA CRSP     DROP CURSOR (LAST ENTERED CHAR + 1)
23231  000257         LDA M1
23232  031213         STA OLCP     SET FLAG FOR FORW CURSOR PASS
23233  170201         RET 1
                 *
23234  042273   FORW2 JSM FMSE     FIND EOL AND SET EDIT MODE
23235  004257   FOR10 LDB M1
23236  001513         LDA DBP      GET DISP BEGIN POINTR
23237  140401         JSM AADBA,I  FIND IOCP POINTR (DBP-1)
23240  031215   FORW3 STA IOCP     SET I/O BUFF CURRENT POINTR
                 *
23241  000254   FORW8 LDA P1       [illegible]T CURSOR ON FIRST CHAR
23242  066503         JMP INRE2    [illegible]T CRSP, CURSOR POINTER
                 *
23243  001513   FORW4 LDA DBP      GET DISP BEGIN POINTR
23244  005512         LDB DLEN     GET DISP LENGTH
23245  024257         ADB M1       ADJUST "B" FOR ADDR CALCULATION
23246  140401         JSM AADBA,I  FIND BYTE ADDR OF CURSOR CHAR
23247  011213         CPA OLCP     IS IT THE LAST CHAR ENTERED?
23250  042227         JSM FORW9    RESET OLCP,CRSP
23251  042326         JSM INCP     INC CURRENT I/O BUFF PTR
23252  004254         LDB P1       INC DBP AND RETURN
23253  066171         JMP BACK9
                 *
                 *
                 *
                 *
                 *       CHAR COUNTER
                 *          FIND NO. OF CHARS FROM DBP TO IOCP
                 *
                 *       EXIT: RET P+1 T1=CHAR COUNT
                 *
                 *             RET P+2 I/O BUFF EMPTY
                 *
                 *
23254  005215   CCTR  LDB IOCP     I/O BUFF CURRENT POINTR
23255  015352         CPB AEBFM    EDIT BUFF EMPTY?
23256  170202         RET 2        YES
                 *
23257  001513         LDA DBP      DISP BEGIN POINTR
23260  140362         JSM AFBAD,I  FIND BYTE ADDR DIFF
23261  020254         ADA P1       ADJUST CHAR COUNT
23262  031711         STA T1       AND SAVE IT
23263  170201   CCTRX RET 1
                 *
                 *
                 *      FIND POSITIONOF LAST CHAR IN I/O BUFF
                 *
                 *          ENTRY: T1=CHAR COUNT
                 *
                 *          EXIT: RET P+1  POSITION OF LAST CHAR < DLEN
                 *
                 *                 RET P+2 POSITION OF LAST CHAR >= DLEN; B=DLEN
                 *
                 *
23264  005711   BCSR  LDB T1       GET CHAR COUNT
23265  174040         TCB          MAKE NEG.
23266  025512         ADB DLEN     ADD DISP LENGTH
23267  176402         SBM *+2      IOCP OFF DISP LENGTH ?
23270  076073         RZB CCTRX    N[illegible]KIP IF IOCP < DLEN
23271  005512         LDB DLEN     IO[illegible] = DLEN
23272  170202         RET 2
                 *
                 *
                 *     FIND LINE NO. AND COLLON AND REPLACE THEM WITH BLANKS
                 *
```

```
                        *     FIND EOL MARKAND REPLACE IT WITH BLANK
                        *
                        *     SET EDIT MODE
                        *
                        *         SET "OLCP" POINTER
                        *
                        *             ENTRY: LINE IN I/O BUFF (FETCH MODE)
                        *
                        *
23273   001351   FMSE   LDA AEBFX    EDIT BUFF S/A
23274   030016          STA C        SET C-REG
23275   074560   FMSE2  WBC A,I      GET CHAR AND INCRM
23276   010077          CPA COLLN    COLLON ?
23277   066301          JMP FMSE9    YES
23300   066275          JMP FMSE2    NO
23301   074560   FMSE9  WBC A,I      DUMMY WITHDRAW TO DELETE "?"
23302   000262   FMSE3  LDA TOBLN    GET BLANKS
23303   074740          PBC A,D      DECRM. AND PLACE BLANK IN I/O BUFF
23304   004016          LDB C
23305   015351          CPB AEBFX    EDIT BUFF FRONT END FILLED WITH BLANKS?
23306   066310          JMP FMSE5    YES
23307   066302          JMP FMSE3    NO: LOOP
23310   074561   FMSE5  WBC B,I      GET BYTE AND INCRM
23311   014053          CPB EOL      EOL MARKER FOUND ?
23312   066314          JMP FMSE6    YES
23313   066310          JMP FMSE5    CONT
23314   074761   FMSE6  WBC B,D      DUMMY WITHDRAW AND DECRM.
23315   074761          WBC B,D        "       "      "    "
23316   004016          LDB C        GET BYTE ADDR   OF LAST CHAR
23317   035215          STB IOCP     SET I/O BUFF CURRENT POINTR
23320   074540          PBC A,I      REPLACE EOL WITH BLANK
23321   130316          STA AIBFL,I  REPLACE EOL AT END OF LINE WITH A BLANK
23322   000016          LDA C
23323   031213          STA OLCP     SAVE CURSOR DROP POSITION
23324   000145          LDA P2
23325   064720          JMP STMOD    SET MODE AND RETURN
                        *
                        *
                        *        INCREMENT I/O BUFFER CURRENT POINTER
                        *
                        *
23326   004254   INCP   LDB P1
23327   066357          JMP RHAXX
                        *
                        *
                        *         DECREMENTI/O BUFFER CURRENT POINTER
                        *
                        *
23330   004257   DIOCP  LDB M1
23331   066357          JMP RHAXX
                        *
                        *
                        *     RIGHT ARROW EXECUTION
                        *
                        *     ENTRY: LINE OF CODE IN EDIT BUFFER
                        *
                        *
23332   042453   RHRM4  JSM LFRHI    INIT FOR ARROWS WHEN MODE =4
23333   001214   RHAR   LDA CRSP     GET CURSOR POINTER
23334   072004          RZA RHAR7    CURSOR SET ?
23335   001215          LDA IOCP     NO: GET I/O BUFF CURRENT POINTR
23336   011352          CPA AEBFM    EDIT BUFFER EMPTY?
23337   170201          RET 1        YES
                        *
23340   042474   RHAR7  JSM GFDL     GET 1/4 OF DISP LENGTH
23341   042447          JSM LRASX    INITL. SUBR. FOR LEFT/RIGHT ARROW
23342   000016   RHAR2  LDA C        BEGGINNING OF BUFFER?
23343   011351          CPA AEBFX
23344   066350          JMP RHAR1    YES,EXIT LOOP
23345   074760          WBC A,D      NO,KEEP MOVING TO THE LEFT
23346   055227          DSZ TMP1     HAVE WE SHIFTED LEFT DLEN/4 CHARACTERS?
23347   066342          JMP RHAR2    NO, KEEP GOING
23350   000016   RHAR1  LDA C        SET DISPLAY BEGIN POINTER
23351   031513          STA DBP
23352   001214   RHAR6  LDA CRSP     IS THE CURSOR SET?
23353   072407          SZA RHSXX    NO,RETURN
23354   042474   RHAR4  JSM GFDL     GET 1/4 OF DISP LENGTH
23355   174040          TCB          MAKE NEG.
23356   025227          ADB TMP1     B = COUNTER VALUE - DLEN/4
23357   001215   RHAXX  LDA IOCP     GETBYTE ADDR I/O CURRENT POINTR
23360   140401   DKCPX  JSM AADBA,I  ADJUST BYTE ADDR
23361   031215   RHSET  STA IOCP     UPDATE I/O CURRENT POINTER
23362   170201   RHSXX  RET 1
                        *
```

```
                         *
                         *     LEFT ARROW EXECUTION (KEYB./EDIT MODE)
                         *
                         *     ENTRY: LINE OF CODE IN EDIT BUFFER
                         *
                         *
23363   042453   LFRM4 JSM LFRHI      INIT FOR ARROWS WHEN MODE = 4
23364   001214   LAKE  LDA CRSP       GET CURSOR POINTER
23365   072004         RZA LAKE7      CURSOR SET ?
23366   001215         LDA IOCP       NO: GET I/O BUFF CURRENT POINTR
23367   011352         CPA AEBFM      EDIT BUFF EMPTY?
23370   170201   LAKXX RET 1          YES
                 *
23371   042445   LAKE7 JSM LRASR      INITL. SUBR. FOR LEFT/RIGHT ARROW
23372   001214         LDA CRSP       CURSOR POINTR
23373   072003         RZA LAKE1      SET ?
23374   001215         LDA IOCP       NO: GET I/O BUFF CURRENT POINTR
23375   066377         JMP LAKE9
23376   001213   LAKE1 LDA OLCP       GET OLD I/O BUFF CURRENT POINTR
23377   031230   LAKE9 STA TMP5       SET PTR
23400   055227   LAKE2 DSZ TMP1       DONE?
23401   066413         JMP LAKE3      NO
23402   042470         JSM AJDBP      YES: ADJUST DISP BEGIN POINTR
23403   001214   LAKE5 LDA CRSP       GET CURSOR POINTR
23404   072002         RZA *+2        SET ?
23405   170201         RET 1          NO
                 *
23406   001227         LDA TMP1       GET COUNTR VALUE
23407   170040         TCA            MAKE NEG.
23410   042474         JSM GFDL       GET 1/4 OF DISP LENGTH
23411   024000         ADB A          B = DLEN/4 - COUNTER VALUE
23412   066357         JMP RHAXX      UPDATE I/O CURRENT POINTR AND RETURN P+1
                 *
23413   074560   LAKE3 WBC A,I        INC C
23414   000016         LDA C
23415   005230         LDB TMP5       STOP IF C>= IOCP OR OLCP+1
23416   140362         JSM AFBAD,I
23417   172061         SAP LAKE2      SKIP IF CONDITION NOT MET
                 *
23420   042474   LAKE4 JSM GFDL       GET 1/4 OF DISPLAY LENGTH
23421   174040         TCB            MAKE NEG
23422   025227         ADB TMP1       B= COUNTER VALUE - DLEN/4
23423   176027         SBP LRSXX      SKIP IF EOL WITHIN DLEN
23424   174040         TCB            B = POSITION CHANGE OF DISP BEGIN POINTR
23425   042471         JSM AJDBX      ADJUST DISP BEGIN POINTR
23426   066403         JMP LAKE5      NO: ADJUST IOCP IF NEEDED
                 *
                 *
                 *     LEFT ARROW EXECUTION (FETCH MODE)
                 *
                 *     ENTRY: LINE OF CODE IN EDIT BUFFER
                 *
                 *
23427   042445   LFAR  JSM LRASR      INITL. SUBR. FOR LEFT/RIGHT ARROW
23430   074560   LFAR2 WBC A,I        GET BYTE AND INCRM
23431   055227         DSZ TMP1       DONE?
23432   066434         JMP LFAR1      NO
23433   066470         JMP AJDBP      YES: ADJUST DISP BEGIN POINTR AND RETURN P+1
                 *
23434   010053   LFAR1 CPA EOL        END OF LINE MARKER?
23435   066437         JMP *+2        YES
23436   066430         JMP LFAR2      NO: CONT
23437   042474   LFR4  JSM GFDL       GET 1/4 OF DISP LENGTH
23440   174040         TCB            MAKE NEG.
23441   025227         ADB TMP1       B = COUNTER VALUE-DLEN/4
23442   176010         SBP LRSXX      SKIP IF EOL WITHIN DLEN
                 *
23443   174040         TCB            B = POSITION CHANGE OF DBP POINTR
23444   066471         JMP AJDBX      ADJUST DISP BEGIN POINTR AND RETURN P+1
                 *
                 *
                 *     LEFT/RIGHT ARROW SERVICE SUBR
                 *
                 *        SET TMP1 = DLEN + DLEN/4: C = DBP
                 *
                 *
23445   042474   LRASR JSM GFDL       GET 1/4 OF DISP LENGTH
23446   025512         ADB DLEN       B = DLEN + DLEN/4
23447   035227   LRASX STB TMP1       SET CHAR COUNTER
23450   001513         LDA DBP        GET DISP BEGIN POINTR
23451   030016         STA C          SET C REG
23452   170201   LRSXX RET 1
                 *
```

CONTROL AND I/O SUPERVISOR SERVICE ROUTINES

```
                  ******************
                  *
                  * LFRHI  INIT FOR LEFT-RIGHT ARROWS
                  *
                  **********
                  *
23453  140447     LFRHI JSM ASWIO,I  SET EDIT POINTERS FOR I/O BUFFER
23454  140500           JSM AEOLN,I  SET BUFFER POINTERS
23455  031213           STA OLCP
23456  031215           STA IOCP
                  *
23457  005512           LDB DLEN     SEE IF DBP>IOCP-DLEN
23460  174500           SBR 1        MAKE A WORD COUNT
23461  025513           ADB DBP
23462  024257           ADB M1
23463  140362           JSM AFBAD,I  FIND BYTE DIFFERENCE
23464  172466           SAM LRSXX    IF <0 THEN OK
23465  001351     RHAR9 LDA AEBFX    SET DISPLAY BEGIN POINTER
23466  031513     RHAR8 STA DBP
23467  170201           RET 1
                  *
                  *
                  *
                  *     ADJUST DISP BEGIN POINTR
                  *
                  *          TO THE RIGHT BY DLEN/4 POSITIONS
                  *
                  *
23470  042474     AJDBP JSM GFDL     GET 1/4 OF DISP LENGTH
23471  001513     AJDBX LDA DBP      GET DISP BEGIN POINTR
23472  140401           JSM AADBA,I  ADJUST BYTE ADDR (DBP POINTR)
23473  066466           JMP RHAR8    UPDATE DISP BEGIN POINTR AND RETURN P+1
                  *
                  *
                  *        GET 1/4 OF DISP LENGTH
                  *
                  *           EXIT: B = DLEN/4
                  *
                  *
23474  005512     GFDL  LDB DLEN     GET DISP LENGTH
23475  174501           SBR 2        B = DLEN/4
23476  170201           RET 1
                  *
                  *
                  *************************************************************
                  *
                  *INRE  INSERT/REPLACE CURSOR KEY
                  *
                  *********************
                  *
23477  001214     INRE  LDA CRSP     GET CURSOR PTR
23500  072002           RZA *+2      SE
23501  170201           RET 1        NO
                  *
23502  172203           SAP INRE1,C  SKIP IF NOT SET,CLR INS. CURSOR
23503  031214     INRE2 STA CRSP     UPDATE CURSOR PTR
23504  170201           RET 1
                  *
23505  172376     INRE1 SAP INRE2,S  SET INSERT CURSOR
                  *
                  *************************************************************
                  *
                  *************************************************************
                  *
                  *  EDPTR   RESET EDIT POINTERS
                  *
                  ****************************
                  *
23506  000177     EDPTR LDA P0       RESET OLD CURRENT PTR.,CURSOR PTR
23507  031213           STA OLCP
23510  031214           STA CRSP
23511  042465           JSM RHAR9    RESET DISPLAY BEGIN POINTER,DBP
23512  001352           LDA AEBFM    SET CURRENT PTR
23513  066361           JMP RHSET    SET IOCP, I/O BUFF CURRENT POINTER
                  *
                  *
                  *************************************************************
                  *
                  *  CONVERT BINARY TO DECIMAL AND
                  *
                  *      TRANSFER LINE NO. TO I/O BUFF
                  *
                  *         TLNIO ENTRY:  LINE NO. IN LNO
                  *
```

```
                        *       ABTDA OR "TLNX" ENTRY  BIN NO. IN A
                        *
                        *                              B = DESTINATION CHAR POINTR-1
                        *
                        *            EXIT: D=LAST CHAR OF LINE NO. IN I/O BUFF
                        *
                        *
23514  140450  TLNIO JSM ACLBI,I    CLR I/O BUFF, LEAVE PTRS ALONE
23515  001226        LDA LNO        GET LINE NO.
23516  004315        LDB AIBFM      I/O BUFF ADDR-1
23517  034017  TLNX  STB D          SET D-REG
23520  172004        SAP TLNT2      SKIP IF NO. IS POSITIVE
23521  004106        LDB B55        GET MINUS SIGN
23522  074551        PBD B,I        INCRM AND PLACE IN DISP BUFF
23523  170040        TCA            MAKE NO. POSITIVE
23524  031220  TLNT2 STA M          SAVE BINARY INFO.
23525  000203        LDA PTCN       ADDR OF POWERS OF 10 CONSTANTS
23526  031713        STA T3
23527  000177        LDA P0         USED TO SUPRESS LEADING ZEROS
23530  031222        STA L          COUNT OF LINE NO. CHARS
23531  042545        JSM CBA2       GET FIRST DEC. ASCII DIGIT
23532  074550  TLNT1 PBD A,I        INCRM AND PLACE DIGIT IN DISP BUFF
23533  001713        LDA T3         T[illegible] POINTR
23534  010210        CPA ENDTC      CONVERSION FINISHED?
23535  170201        RET 1          YES
                        *
23536  042540        JSM CBA        NO: CONTINUE
23537  066532        JMP TLNT1
                        *
                        *    SERVICE SUBR.
                        *
                        *    CONVERT BINARY TO ASCII DECIMAL
                                        ENTRY: M=BINARY INFO
                        *
                        *                     T3=POWERS OF TEN TABLE ADDR
                        *
                        *               EXIT: ONE ASCII DIGIT
                        *
                        *
23540  000103  CBA   LDA B60
23541  045713  CBA4  ISZ T3              INCRM TABLE POINTR
23542  005713        LDB T3              GET ADDR
23543  014210        CPB ENDTC           COMPUTING LAST DIGIT?
23544  066557        JMP CBA5                YES
23545  005220  CBA2  LDB M               GET BINARY NO.
23546  125713  CBA1  ADB T3,I            SUBTRACT NUMBER OF CURRENT TENS POSITION DIGIT
23547  176404        SBM CBA3            IF MINUS OVERFLOW: END DIVIDE
23550  035220        STB M               NO OVERFLOW: SAVE DIGIT
23551  020254        ADA P1
23552  066546        JMP CBA1            LOOP
23553  072466  CBA3  SZA CBA4            OVERFLOW: IF ZERO, NO NON-ZERO DIGIT FOUND
23554  060103  CBA6  IOR B60             MAKE ASCII
23555  045222        ISZ L               INCRM CHAR COUNT
23556  170201        RET 1
                        *
23557  001220  CBA5  LDA M               LAST DIGIT: THUS M=BCD DIGIT
23560  066554        JMP CBA6
                        *
                        *
                        *
                        ***************************************************************
                        *
                        *  EOLNN  FIND ADDR OF LAST CHARACTER IN EDIT BUFFER
                        *            ADDRESS RETURNED IN A
                        *
                        *****************
                        *
23561  001353  EOLNN LDA AEBFL      END OF BUFFER
23562  020257        ADA M1         START AT LAST CHARACTER
23563  030016        STA C          SET PTR
23564  005352        LDB AEBFM      BEGIN OF BUFF PTR
23565  074760  REND  WBC A,D        GET A CHARACTER
23566  010117        CPA B40        IS IT A BLANK
23567  066571        JMP *+2        YES: SEE IF BEGGINNING OF BUFF
23570  066574        JMP RSTPP      NO, SEE IF EOL CHAR
23571  014016        CPB C          IS THIS THE BEGGINING OF BUFFER?
23572  066577        JMP RSTT       YES, SO EXIT
23573  066565        JMP REND       NO, KEEP LOOKING
23574  010053  RSTPP CPA EOL        SEE IF EOL
23575  066577        JMP *+2        YES SO DON'T MOVE PTR
23576  074561  RSTP  WBC B,I        DUMMY WITHDRAW TO INC C
23577  000016  RSTT  LDA C          GET NON BLANK CHAR ADDR
23600  170201        RET 1
                        *
                        *
```

```
                    *
                    *
                    *     GET NEXT CHARACTER FROM BUFFER
                    *
                    *         SPACES ARE IGNORED
                    *
                    *     ENTRY:  L = POINTER TO NEXT CHAR
                    *
                    *     EXIT:   A = ASCII CHAR; IF FOUND
                    *
                    *             A = EOL; IF END OF BUFF FOUND
                    *     END OF BUFF = END OF I/O BUFF OR END OF KDB BUFFER
                    *
                    *             L = L+1
                    *
                    *
23601  005222  GNEXT LDB L         GET CHAR POINTER
23602  034016        STB C         SET C-REG
23603  074560  GNE1  WBC A,I       GET CHAR
23604  004016        LDB C         GET POINTER
23605  014316        CPB AIBFL     END OF I/O BUFFER?
23606  066615        JMP GNOPR     YES
23607  014311        CPB AKBFL     END OF KBD BUFFER
23610  066615        JMP GNOPR     YES
                    *
23611  010117        CPA B40       SPACE?
23612  066603        JMP GNE1      YES, KEEP LOOKING
                    *
23613  035222  GNE3  STB L         SET POINTER
23614  170201        RET 1
                    *
23615  000053  GNOPR LDA EOL       SET EOL IN SINCE END OF BUFFER
23616  066613        JMP GNE3      RETURN WITH L SET
                    *
                    ****************************************************************
                    *
                    *  RNLON   TURN ON RUN LIGHT
                    *
                    ***********************
                    *
23617  000177  RNLON LDA P0        SET PERIPHERAL ADDR TO ZERO
23620  030011        STA PA
23621  000137        LDA B10       TURN ON RUN LIGHT
23622  066626        JMP RSETL
                    *
                    ****************************************************************
                    *
                    *  RNLOF  TURN OFF RUN LIGHT
                    *
                    *******************
                    *
23623  000177  RNLOF LDA P0        SET PERIPHERAL ADDR
23624  030011        STA PA
23625  000127        LDA B20       TURN OFF RUN LIGHT
23626  030005  RSETL STA R5
23627  170201        RET 1
                    *
                    ****************************************************************
                    *
                    * TCHR  TRANSFER CHARACTERS
                    *
                    *
                    *    ENTRY:  D  =  SOURCE CHAR PTR
                    *            A  =  DESTINATION CHAR PTR -1
                    *            B  =  CHARACTER COUNT
                    *
                    ***********************
                    *
23630  035711  TCHR  STB T1        SET CHAR COUNT
23631  030016        STA C         SET DESTINATION ADDR
23632  074570  TCHR1 WBD A,I       GET CHAR AND INC
23633  074540        PBC A,I       INC AND STORE CHAR
23634  055711        DSZ T1        DONE?
23635  066632        JMP TCHR1     NO
23636  170201        RET 1         YES
                    *
                    *
                    *
                    *
                    *     STOP, REW KEYS
                    *
                    *
23637  005235  PINK  LDB SKEY      GET KEY CODE
23640  014145        CPB P2        REW KEY?
```

CONTROL AND I/O SUPERVISOR SERVICE ROUTINES

```
23641  164601        JMP AREK,I     YES, REWIND AND RETURN
                *
23642  001232        LDA CFLAG      NO, MUST BE STOP KEY
23643  170701        RAR 2          POSITION SPECIAL KEY BIT
23644  172602        SAM *+2,C      KEY TO BE DEFINED?
23645  170201        RET 1          NO
                *
23646  170715        RAR 14         REPOSITION CLEARED SPECIAL KEY BIT
23647  031232        STA CFLAG      REPLACE IT
23650  040715        JSM CLMOD      SET MODE = 0
23651  164452        JMP AEOLB,I    PUT EOL IN I/O BUFFER, RETURN
                *
                *
                *
                *
                *  CONSTANTS
                *
23652  000166  P118  DEC 118
                *
                *
                *
                *     DEFINITIONS
                *
                *
       023652  B166  EQU P118
       000263  MAXLN EQU FLAG
       000170  BUHM  EQU M256
       000122  B32   EQU P26
       000052  STPMS EQU B200
       000263  TRCMS EQU FLAG
       000077  COLLN EQU B72
       000053  EOL   EQU B177
       000177  KPA   EQU P0
       000116  QUOTE EQU B42
       077467  LPSVA EQU LPIT
       077470  LPSVB EQU LPIT+1
       077471  LPSVC EQU LPIT+2
       077473  LPSVE EQU LPIT+4
       077474  LPSVO EQU LPIT+5
       000236  CTCNT EQU B2K
       077216  CST   EQU CSTMP
       077216  SIOCP EQU CST
       077217  .WPRT EQU CST+1
       077220  M     EQU CST+2
       077221  PLADD EQU CST+3
       077223  TMP6  EQU CST+5
       077224  K     EQU CST+6
       077225  TMP2  EQU CST+7
       077226  LNO   EQU CST+8
       077227  TMP1  EQU CST+9
       077230  TMP5  EQU CST+10
       077231  TMP3  EQU CST+11
       077232  CFLAG EQU CST+12
       077233  TMP7  EQU CST+13
       077234  TMP4  EQU CST+14
       077235  SKEY  EQU CST+15
       077206  .WKC  EQU IOTMP
       077207  .WMOD EQU IOTMP+1
       077210  DTMP1 EQU IOTMP+2
       077211  DTMP2 EQU IOTMP+3
       077212  SPKN  EQU IOTMP+4
       077213  OLCP  EQU IOTMP+5
       077214  CRSP  EQU IOTMP+6
       077215  IOCP  EQU IOTMP+7
       077613  RENFG EQU LKTMP+6
       000433  DISP  EQU ALDSP
       077251  OFLAG EQU CMTMP+10
                *
                *
                *        ROUTINE LINKS
                *
                *
23775                     ORG 23775B
23775  066000             JMP DELL       DELETE COMMAND
23776  067724             JMP ERAS       ERASE COMMAND
                *
                ****************************************************************
                *
23777                     BSS 1          CHECKSUM
                *
                ****************
                *
                          END

END OF PASS 2 NO ERRORS DETECTED
```

```
76550          ORG 76550B
               SUP
        *
        *
        *
76550   BINRY BSS 7      BINARY PROGRAM LINKS
        *
76557   CBUFF BSS 80     COMPILE BUFFER
76677   CSTAK BSS 80     COMPILE STACK          MUST BE AFTER CBUFF
        *
77017   RMTBL BSS 19     ROM ADDRESS TABLE      MUST BE AFTER CSTAK
77042   STEAL BSS 16     STOLEN RWM TABLE
77062   ROMWD BSS 1      ROM IN/OUT INFO
77063   NPROG BSS 1      NEW-PROGRAM FLAG
77064   IBUFF BSS 41     INPUT/OUTPUT BUFFER
77135   KBUFF BSS 41     KEYBOARD BUFFER
        *
77206   IOTMP BSS 8      I/O DRIVER TEMPORARIES
77216   CSTMP BSS 17     CONTROL SUPERVISOR TEMPORARIES
77237   CMTMP BSS 14     COMPILER TEMPORARIES
        *
77255   XCOMM BSS 1      INTERPRETER COMMUNICATIONS WORD
77256   MODE  BSS 1      CONTROL-SUPERVISOR MODE FLAG
77257   CSTAT BSS 1      CONTROL STATE
77260   ERRBP BSS 1      ERROR BYPASS LINK
        *
77261   EXTMP BSS 12     INTERPRETER TEMPORARIES
        *
77275   IDXRW BSS 1      INDEXED RWM
77276   SAVEB BSS 1
77277   ENDS  BSS 1
77300   AP2   BSS 1
77301         BSS 4      RESERVED FOR INDEX TABLE
        *
77305   OFWAM BSS 1      FIRST WORD ACTUAL RWM
77306   FWAM  BSS 1      FIRST WORD AVAILABLE RWM
77307   FWUP  BSS 1      FIRST WORD OF USER PROGRAM
77310   RMAX  BSS 1      MAXIMUM R-REGISTER ADDRESS
77311   VT1   BSS 1      FIRST WORD OF VALUE TABLE INFORMATION
77312   VT2   BSS 1      FIRST WORD OF VALUE TABLE VALUES
77313   FWBA  BSS 1      FIRST WORD OF BINARY AREA
77314   TE    BSS 1      TRACE ON/OFF FLAG
77315   STYFG BSS 1      SECURE-PROGRAM FLAG
77316   CERR  BSS 1      COMPILE ERROR FLAG
77317   SWHRE BSS 1      SAVED WHERE
        *
77320   ESV   BSS 1      ERASE STRING VARIABLE TABLE
77321   STCHK BSS 1      STRING COMPARISON LINK
77322   STENT BSS 1      STRING ENTER LINK
77323   STEAS BSS 1      STRING ENTER ASSIGNMENT LINK
77324   AKUUN BSS 1      LINK TO PROCESS A STRING
77325   STRES BSS 1      STRING ASSIGNMENT FOR READ STATEMENT
77326   STEFL BSS 1      STRING ENTER FLAG
77327   SEED  BSS 4      SEED FOR RANDOM-NUMBER GENERATOR
77333         BSS 8      RESERVED FOR POST-RELEASE INTER-ROM LINKS
77343   NOTRY BSS 1      MAXIMUM # OF TRIES AT READ OR SEARCH
77344   AVFLG BSS 1      CASSETTE AUTOVERIFY FLAG
77345   CSCF  BSS 1      SELECT CODE OF CASSETTE IN PARALLEL SEARCH
77346   FTRGT BSS 1      TARGET RECORD FOR PARALLEL SEARCH
77347   INTSR BSS 1      INTERRUPT SERVICE FLAG
        *
77350   AEBUF BSS 1      BUFFER EDIT POINTERS
77351   AEBFX BSS 1
77352   AEBFM BSS 1
77353   AEBFL BSS 1
        *
77354   DVTAB BSS 26     DECLARED VARIABLE TABLE
77406   DATAB BSS 26     DECLARED ARRAY TABLE
77440   ITABL BSS 16     INTERRUPT JUMP TABLE -- ADDRESS MUST END IN 0000
77460   HPIT  BSS 7      HI-PRIORITY INTERRUPT SAVE AREA
77467   LPIT  BSS 7      LO-PRIORITY INTERRUPT SAVE AREA
        *
77476   ENR   BSS 4      ENTER REGISTER
77502   URES  BSS 4      USER RESULT REGISTER
77506   FLAGS BSS 1      FLAG REGISTER, 0-15 L-TO-R
        *
77507   ELINK BSS 1      END-STMT EXECUTION LINK
77510   .IUSR BSS 1      I/O-ROM SERVICE ROUTINE LINK
77511   MLBPL BSS 1      "MAIN LOOP" BYPASS LINK
77512   DLEN  BSS 1      DISPLAY LENGTH
77513   DBP   BSS 1      DISPLAY BEGIN POINTER
77514   CSELC BSS 1      CASSETTE SELECT CODE
77515   BUSFG BSS 1      FOR JN
77516   IOINT BSS 1      FOR JN
77517   RGFLG BSS 1      REGISTER ASSIGNMENT INFORMATION
```

BASE-PAGE READ-WRITE-MEMORY

```
00088000                    *
00089000 77520              PARG  BSS 1           P-ARGUMENT
00090000 77521              AP36  BSS 1           PRODUCTION 36 (FOR JO)
00091000 77522              AP37  BSS 1           PRODUCTION 37
00092000 77523              AP77  BSS 1           PRODUCTION 77
00093000 77524              AP78  BSS 1           PRODUCTION 78
00094000 77525              AP136 BSS 1           PRODUCTION 136
00095000 77526              APP#  BSS 1           P# EXECUTION
00096000 77527              APRET BSS 1           A.P. ROM'S PART OF 'RET' EXECUTION
00097000 77530              LOADL BSS 1           CASSETTE LDK OK LINK
00098000 77531              APRVC BSS 1           A.P. ROM'S CHECK FOR ()
00099000 77532              REFOR BSS 1           RESET FOR/NEXT BEFORE EXECUTE
00100000 77533              RLINK BSS 1           RUN-CMND EXECUTION LINK
00101000                    *
00102000 77534              RBUFF BSS 41          RESERVE KEYBOARD BUFFER
00103000 77605              LKTMP BSS 14
00104000 77623              LKFLG BSS 1           LIVE KEYBOARD ENABLE/DISABLE FLAG
00105000                    *
00106000 77624              ENSV  BSS 4           SAVE AREA FOR ENTER
00107000 77630              SVXCM BSS 1           SAVED XCOMM FOR ENTER
00108000                    *
00109000 77631                    BSS 2           FOR POST-RELEASE CHANGES  (ARE SAVED WITH RCM)
00110000                    *
00111000 77633              JSTAK BSS 33          JSM STACK
00112000                    *
00113000 77674                    BSS 1           FOR POST-RELEASE CHANGES  (NOT SAVED WITH RCM)
00114000 77675              T26   BSS 1
00115000                    *
00116000 77676              CATMP BSS 11          CASSETTE TEMPORARIES
00117000                    *
00118000 77711              T1    BSS 1           SHARED TEMPORARIES
00119000 77712              T2    BSS 1
00120000 77713              T3    BSS 1
00121000 77714              T4    BSS 1
00122000 77715              T5    BSS 1
00123000 77716              T6    BSS 1
00124000 77717              T7    BSS 1
00125000 77720              T8    BSS 1
00126000 77721              T9    BSS 1
00127000 77722              T10   BSS 1
00128000 77723              T11   BSS 1
00129000 77724              T12   BSS 1
00130000 77725              T13   BSS 1
00131000 77726              T14   BSS 1
00132000 77727              T15   BSS 1
00133000 77730              T16   BSS 1
00134000 77731              T17   BSS 1
00135000 77732              T18   BSS 1
00136000 77733              T19   BSS 1
00137000 77734              T20   BSS 1
00138000 77735              T21   BSS 1
00139000 77736              T22   BSS 1
00140000 77737              T23   BSS 1
00141000 77740              T24   BSS 1
00142000 77741              T25   BSS 1
00143000                    *
00144000 77742              OP1   BSS 4           FLOATING-POINT TEMPORARY
00145000 77746              OP2   BSS 4           FLOATING-POINT TEMPORARY
00146000 77752              RES   BSS 4           RESULT FOR ALL FLOATING-POINT OPERATIONS
00147000 77756              MRW1  BSS 10          MATH READ-WRITE
00148000 77770                    BSS 4           AR1
00149000 77774              MRW2  BSS 4           MATH READ-WRITE

00151000 00040                    ORG 40B
00152000                    *
00153000                    * SYSTEM STARTUP      *
00154000                    *
00155000 00040   164041     SYSS  JMP *+1,I
00156000 00041                    BSS 1
00158000                    *
00159000                    * CONSTANTS
00160000                    *
00161000 00042   000777     P511  DEC 511         JN JO
00162000         000042     B777  EQU P511
00163000 00043   000411     P265  DEC 265
00164000         000043     B411  EQU P265
00165000 00044   000400     P256  DEC 256     JB JN
00166000         000044     B400  EQU P256
00167000 00045   000377     P255  DEC 255     JB JN
00168000         000045     B377  EQU P255           MT
00169000 00046   000231     P153  DEC 153
00170000         000046     B231  EQU P153
00171000 00047   000230     P152  DEC 152
00172000         000047     B230  EQU P152
```

| | | | | | | | | |
|---|---|---|---|---|---|---|---|---|
| 00173000 | 00050 | 000224 | P148 | DEC 148 | | | | |
| 00174000 | | 000050 | B224 | EQU P148 | | | | |
| 00175000 | 00051 | 000202 | P130 | DEC 130 | | | | |
| 00176000 | | 000051 | B202 | EQU P130 | | | | |
| 00177000 | 00052 | 000200 | P128 | DEC 128 | JB | | | MT |
| 00178000 | | 000052 | B200 | EQU P128 | | | | |
| 00179000 | 00053 | 000177 | P127 | DEC 127 | JB | | | MT |
| 00180000 | | 000053 | B177 | EQU P127 | | | | MT |
| 00181000 | 00054 | 000176 | P126 | DEC 126 | JB | | | |
| 00182000 | | 000054 | B176 | EQU P126 | | | | |
| 00183000 | 00055 | 000175 | P125 | DEC 125 | JB | | | |
| 00184000 | | 000055 | B175 | EQU P125 | | | | |
| 00185000 | 00056 | 000174 | P124 | DEC 124 | JB | | | |
| 00186000 | | 000056 | B174 | EQU P124 | | | | |
| 00187000 | 00057 | 000173 | P123 | DEC 123 | JB | | | |
| 00188000 | | 000057 | B173 | EQU P123 | | | | MT |
| 00189000 | 00060 | 000162 | P114 | DEC 114 | JB | | | |
| 00190000 | | 000060 | B162 | EQU P114 | | | | |
| 00191000 | 00061 | 000160 | P112 | DEC 112 | | | | |
| 00192000 | | 000061 | B160 | EQU P112 | | | | |
| 00193000 | 00062 | 000153 | P107 | DEC 107 | JB | | | |
| 00194000 | | 000062 | B153 | EQU P107 | | | | MT |
| 00195000 | 00063 | 000145 | P101 | DEC 101 | | | | |
| 00196000 | | 000063 | B145 | EQU P101 | | | | |
| 00197000 | 00064 | 000143 | P99 | DEC 99 | | | JO | MT |
| 00198000 | 00065 | 000141 | P97 | DEC 97 | | | | |
| 00199000 | | 000065 | B141 | EQU P97 | | | | |
| 00200000 | 00066 | 000140 | P96 | DEC 96 | JB | | | |
| 00201000 | | 000066 | B140 | EQU P96 | | | | |
| 00202000 | 00067 | 000135 | P93 | DEC 93 | | | | |
| 00203000 | | 000067 | B135 | EQU P93 | | | | |
| 00204000 | 00070 | 000133 | P91 | DEC 91 | | | | |
| 00205000 | | 000070 | B133 | EQU P91 | | | | |
| 00206000 | 00071 | 000105 | P69 | DEC 69 | JB | | | |
| 00207000 | 00072 | 000101 | P65 | DEC 65 | | | | |
| 00208000 | | 000072 | B101 | EQU P65 | | | | |
| 00209000 | 00073 | 000100 | P64 | DEC 64 | JB | | JO | MT |
| 00210000 | | 000073 | B100 | EQU P64 | | | | |
| 00211000 | 00074 | 000077 | P63 | DEC 63 | JB | | | |
| 00212000 | | 000074 | B77 | EQU P63 | | | | |
| 00213000 | 00075 | 000075 | P61 | DEC 61 | | | | |
| 00214000 | | 000075 | B75 | EQU P61 | | | | |
| 00215000 | 00076 | 000073 | P59 | DEC 59 | JB | | | |
| 00216000 | | 000076 | B73 | EQU P59 | | | | |
| 00217000 | 00077 | 000072 | P58 | DEC 58 | JB | | | |
| 00218000 | | 000077 | B72 | EQU P58 | | | | |
| 00219000 | 00100 | 000064 | P52 | DEC 52 | JB | | | |
| 00220000 | | 000100 | B64 | EQU P52 | | | | |
| 00221000 | 00101 | 000063 | P51 | DEC 51 | JB | | | |
| 00222000 | | 000101 | B63 | EQU P51 | | | | MT |
| 00223000 | 00102 | 000061 | P49 | DEC 49 | | | | |
| 00224000 | | 000102 | B61 | EQU P49 | | | | |
| 00225000 | 00103 | 000060 | P48 | DEC 48 | JB | | | |
| 00226000 | | 000103 | B60 | EQU P48 | | | | |
| 00227000 | 00104 | 000057 | P47 | DEC 47 | JB | | | |
| 00228000 | | 000104 | B57 | EQU P47 | | | | |
| 00229000 | 00105 | 000056 | P46 | DEC 46 | JB | | | |
| 00230000 | | 000105 | B56 | EQU P46 | | | | |
| 00231000 | 00106 | 000055 | P45 | DEC 45 | JB | | | |
| 00232000 | | 000106 | B55 | EQU P45 | | | | |
| 00233000 | 00107 | 000054 | P44 | DEC 44 | JB | | | |
| 00234000 | | 000107 | B54 | EQU P44 | | | | |
| 00235000 | 00110 | 000053 | P43 | DEC 43 | JB | | | |
| 00236000 | | 000110 | B53 | EQU P43 | | | | |
| 00237000 | 00111 | 000052 | P42 | DEC 42 | JB | | | |
| 00238000 | | 000111 | B52 | EQU P42 | | | | |
| 00239000 | 00112 | 000051 | P41 | DEC 41 | JB | | | |
| 00240000 | | 000112 | B51 | EQU P41 | | | | |
| 00241000 | 00113 | 000050 | P40 | DEC 40 | | | | |
| 00242000 | | 000113 | B50 | EQU P40 | | | | |
| 00243000 | 00114 | 000044 | P36 | DEC 36 | | | | |
| 00244000 | | 000114 | B44 | EQU P36 | | | | |
| 00245000 | 00115 | 000043 | P35 | DEC 35 | | | | |
| 00246000 | | 000115 | B43 | EQU P35 | | | | |
| 00247000 | 00116 | 000042 | P34 | DEC 34 | JB | JN | | |
| 00248000 | | 000116 | B42 | EQU P34 | | | | |
| 00249000 | 00117 | 000040 | P32 | DEC 32 | JB | JN | | MT |
| 00250000 | | 000117 | B40 | EQU P32 | | | | |
| 00251000 | 00120 | 000037 | P31 | DEC 31 | JB | | | |
| 00252000 | | 000120 | B37 | EQU P31 | | | | |
| 00253000 | 00121 | 000034 | P28 | DEC 28 | | JN | | MT |
| 00254000 | | 000121 | B34 | EQU P28 | | | | |
| 00255000 | 00122 | 000032 | P26 | DEC 26 | JB | | JO | |
| 00256000 | 00123 | 000024 | P20 | DEC 20 | | | | MT |
| 00257000 | 00124 | 000023 | P19 | DEC 19 | | JN | | MT |

```
00258000 00125 000022 P18   DEC 18
00259000 00126 000021 P17   DEC 17      JB JN
00260000 00127 000020 P16   DEC 16      JB JN JO MT
00261000       000127 B20   EQU P16
00262000 00130 000017 P15   DEC 15      JB JN    MT
00263000       000130 B17   EQU P15
00264000 00131 000016 P14   DEC 14      JB JN
00265000 00132 000015 P13   DEC 13      JB    JO
00266000 00133 000014 P12   DEC 12      JB JN JO MT
00267000 00134 000013 P11   DEC 11      JB    JO
00268000       000134 B13   EQU P11
00269000 00135 000012 P10   DEC 10      JB JN JO MT
00270000 00136 000011 P9    DEC 9
00271000 00137 000010 P8    DEC 8       JB JN JO MT
00272000       000137 B10   EQU P8
00273000 00140 000007 P7    DEC 7       JB JN JO MT
00274000 00141 000006 P6    DEC 6       JB    JO MT
00275000 00142 000005 P5    DEC 5       JB JN JO MT
00276000 00143 000004 P4    DEC 4       JB JN JO MT
00277000 00144 000003 P3    DEC 3       JB JN JO MT
00278000 00145 000002 P2    DEC 2       JB JN JO MT
00279000 00146 177776 M2    DEC -2      JB JN
00280000 00147 177775 M3    DEC -3      JB JN JO MT
00281000 00150 177774 M4    DEC -4      JB JN JO MT
00282000 00151 177773 M5    DEC -5      JB JN JO
00283000 00152 177772 M6    DEC -6
00284000 00153 177771 M7    DEC -7      JB
00285000 00154 177770 M8    DEC -8         JN    MT
00286000 00155 177765 M11   DEC -11           JO
00287000 00156 177763 M13   DEC -13           JO
00288000 00157 177761 M15   DEC -15              MT
00289000 00160 177760 M16   DEC -16     JB JN JO MT
00290000 00161 177757 M17   DEC -17     JB
00291000 00162 177740 M32   DEC -32     JB JN    MT
00292000       000162 BM40  EQU M32
00293000 00163 177720 M48   DEC -48     JB
00294000 00164 177700 M64   DEC -64     JB    JO
00295000       000164 BM100 EQU M64
00296000 00165 177660 M80   DEC -80     JB
00297000 00166 177637 M97   DEC -97
00298000 00167 177600 M128  DEC -128             MT
00299000 00170 177400 M256  DEC -256    JB    JO MT
00300000 00171 160000 M8192 DEC -8192   JB
00301000              *
00302000 00172 000174 AONE  DEF *+2        JN JO     FLOATING-POINT ONE
00303000 00173 000177 APIE  DEF *+4           JO     FUDGED PI
00304000 00174 000000       OCT 000000
00305000 00175 010000 B10K  OCT 010000  JB    JO MT
00306000 00176 000000       OCT 000000
00307000 00177 000000 P0    OCT 000000  JB    JO
00308000 00200 030501       OCT 030501        3141
00309000 00201 054446       OCT 054446        5926
00310000 00202 051540       OCT 051540        5360
00311000              *
00312000 00203 000204 PTCN  DEF *+1
00313000 00204 154360 M10K  DEC -10000  JB
00314000 00205 176030 M1000 DEC -1000
00315000 00206 177634 M100  DEC -100    JB
00316000 00207 177766 M10   DEC -10     JB    JO
00317000 00210 000210 ENDTC DEF *
00318000              *
00319000 00211 077740 BXCAA OCT 77740   JB
00320000 00212 077700 EMAX  OCT 77700         JO
00321000       000212 B777X EQU EMAX    JB
00322000 00213 077577 TMASK OCT 77577
00323000 00214 077440 EOLB  OCT 77440   JB
00324000 00215 077400 BXCMM OCT 77400   JB
00325000 00216 076574 ZK2   OCT 76574
00326000 00217 076000 B76K  OCT 76000   JB
00327000 00220 071050 TRCC2 OCT 71050
00328000 00221 070000 B70K  OCT 70000         JO MT
00329000 00222 067000 B67K  OCT 67000            MT
00330000 00223 063000 B63K  OCT 63000   JB
00331000 00224 060000 B60K  OCT 60000   JB       MT
00332000 00225 052525 ALBPT OCT 52525   JB
00333000 00226 037440 QMRKB OCT 37440   JB
00334000 00227 020000 B20K  OCT 20000   JB
00335000 00230 010133 RK2   OCT 10133
00336000 00231 010050 RK1   OCT 10050
00337000 00232 007403 B7403 OCT 7403             MT
00338000 00233 004406 ZK3   OCT 4406
00339000 00234 004000 B4K   OCT 4000             MT
00340000 00235 003377 B3377 OCT 3377             MT
00341000 00236 002000 B2K   OCT 2000    JB       MT
00342000 00237 001000 B1K   OCT 1000             MT
```

```
00343000                  *
00344000 00240  177701    ZAP   OCT 177701        JO
00345000        000167    BM200 EQU M128    JB    JO
00346000 00241  176000    BM2K  OCT -2000   JB
00347000 00242  170720    KF    OCT 170720
00348000 00243  170000    B170K OCT 170000  JB
00349000 00244  137777    XMASK OCT 137777  JB
00350000 00245  131400    IMCON OCT 131400
00351000 00246  126273    AMSE  OCT 126273        MT
00352000 00247  101175    ZKI   OCT 101175
00353000 00250  100377    BM377 OCT 100377        MT
00354000 00251  100200    UMASK OCT 100200
00355000                  *
00356000 00252  000254    NB1   DEF *+2          SPECIAL PATTERN FOR NUMBER BUILDER
00357000 00253  077772    NB2   DEF 77772B
00358000 00254  000001    P1    DEC 1       JB JN JO MT
00359000 00255  177764    M12   DEC -12     JB    JO
00360000 00256  000000          DEC 0
00361000 00257  177777    M1    DEC -1      JB    JO MT
00362000 00260  000000          DEC 0
00363000 00261  000000          DEC 0
00364000                  *
00365000 00262  020040    TOBLN OCT 020040       TWO ASCII BLANKS
00366000 00263  100000    FLAG  OCT 100000
00367000 00264  040001    STTMP OCT 040001       STRING CONSTANT IN STACK
00368000 00265  100004    STWHR OCT 100004
00369000        000171    ARRAY EQU M8192        ENTIRE ARRAY
00370000        000221    EMPTY EQU B70K         EMPTY
00371000 00266  011401    FPTMP OCT 011401       FULL-PRECISION CONSTANT IN STACK
00372000 00267  110000    FVRWM OCT 110000       FULL-PRECISION VARIABLE IN RWM
00373000 00270  110402    FVRRA OCT 110402       FULL-PRECISION VARIABLE IN R-REGISTER AREA
00374000                  *
00375000 00271  062562    LKERM OCT 62562        LOWER-CASE "ERROR"
00376000 00272  071157          OCT 71157
00377000 00273  071040          OCT 71040
00378000                  *
00379000                  * POINTERS
00380000                  *
00381000 00274  000053    AAEOL DEF B177         ADDRESS OF EOL
00382000 00275  077440    AITAB DEF ITABL        ADDRESS OF INTERRUPT TABLE
00383000 00276  077354    ADVTB DEF DVTAB        ADDRESS OF DECLARED VARIABLE TABLE
00384000 00277  077406    ADATB DEF DATAB        ADDRESS OF DECLARED ARRAY TABLE
00385000 00300  077632    AJSTK DEF JSTAK-1      ADDRESS OF JSM STACK
00386000 00301  077633    AJSMS DEF JSTAK
00387000 00302  176557    ACBFX DEF CBUFF,I      COMPILE BUFFER 1ST CHAR ADDRESS
00388000 00303  076557    ACBF  DEF CBUFF        COMPILE BUFFER STARTING ADDRESS
00389000 00304  076556    ACBUF DEF CBUFF-1      ADDRESS OF COMPILE BUFFER
00390000 00305  076676    ACLMT DEF CBUFF+79     COMPILE BUFFER UPPER LIMIT
00391000 00306  077135    AKBUF DEF KBUFF        KEYBOARD BUFFER
00392000 00307  177135    AKBFX DEF KBUFF,I      KEYBOARD BUFFER 1ST CHAR ADDRESS
00393000 00310  077134    AKBFM DEF KBUFF-1      KEYBOARD BUFFER STARTING ADDRESS - 1
00394000 00311  077205    AKBFL DEF KBUFF+40     KEYBOARD BUFFER ENDING ADDRESS
00395000 00312  000306    AKBST DEF AKBUF        KEYBOARD BUFFER POINTERS STARTING ADDRESS
00396000 00313  077064    AIBUF DEF IBUFF        I/O BUFFER
00397000 00314  177064    AIBFX DEF IBUFF,I      I/O BUFFER 1ST CHAR ADDRESS
00398000 00315  077063    AIBFM DEF IBUFF-1      I/O BUFFER STARTINF ADDRESS - 1
00399000 00316  077134    AIBFL DEF IBUFF+40     I/O BUFFER ENDING ADDRESS
00400000 00317  077066    AIBSL DEF IBUFF+2      I/O BUFFER STARTING ADDRESS + 2
00401000 00320  077070    AIOLM DEF IBUFF+4      I/O BUFFER STARTING ADDRESS FOR "LINE" MESSAGE
00402000 00321  000313    AIBSI DEF AIBUF        EDIT POINTERS STARTING ADDRESS
00403000 00322  077534    ARBUF DEF RBUFF
00404000 00323  077533    ARBFM DEF RBUFF-1
00405000 00324  076677    ASTK1 DEF CSTAK        COMPILE STACK STARTING ADDRESS
00406000 00325  176677    ACSTF DEF CSTAK,I
00407000        000305    ASTAK EQU ACLMT        ADDRESS OF COMPILE STACK - 1
00408000 00326  077016    ASLMT DEF CSTAK+79     COMPILE STACK UPPER LIMIT
00409000        000326    ATHOM EQU ASLMT
00410000                  *
00411000 00327  077017    AROMS DEF RMTBL        ADDRESS OF ROM ADDRESS TABLE
00412000 00330  076550    ABNRY DEF BINRY        ADDRESS OF BINARY HEADER
00413000 00331  000332    AMAIN DEF ARTBL        ADDRESS OF MAINFRAME HEADER
00414000 00332            ARTBL BSS 1            ADDRESS OF REVERSE COMPILE TABLE
00415000 00333            AMTBL BSS 1            ADDRESS OF MAINFRAME MNEMONIC TABLE
00416000                  *
00417000 00334  000177    ADP0  DEF P0
00418000 00335  077711    ATMP  DEF T1           STARTING ADDRESS OF SHARED TEMPORARIES
00419000                  *
00420000 00336  077742    AOP1  DEF OP1
00421000 00337  077746    AOP2  DEF OP2
00422000 00340  077752    ARES  DEF RES
00423000 00341  077476    AENR  DEF ENR
00424000 00342  077502    AURES DEF URES
00425000                  *
00426000 00343  077414    SYRE  ABS DVTAB-101B+97
```

BASE-PAGE READ-ONLY-MEMORY

```
00427000       000326  STRK  EQU ASLMT
00428000               *
00429000 00344 077777  MAW   OCT 77777      MAXIMUM AVAILABLE WORD
00430000       000330  LWAM  EQU ABNRY      LAST WORD AVAILABLE RWM + 1
00431000               *
00432000 00345 077770  ADR1  DEF AR1
00433000       000127  ADR2  EQU P16

00435000               *
00436000               * USEFUL POINTERS AND EQUATES
00437000               *
00438000       077237  TKN   EQU CMTMP+0    TOKEN FOR PARSER
00439000       077240  BCU   EQU CMTMP+1    ASCII FOR PARSER
00440000       077241  OLDC  EQU CMTMP+2    USED BY SCANNER IN CASE OF ERROR
00441000       077242  ISTAR EQU CMTMP+3    IMPLIED-MULTIPLY FLAG
00442000               *
00443000       077254  STAKP EQU CMTMP+13   STACK POINTER
00444000               *
00445000       077237  GUIDE EQU CMTMP+0    PRIORITY/CLASS/CHARACTERS
00446000       077240  ASCII EQU CMTMP+1    CHARACTER ADDRESS
00447000               *
00448000       077261  AP3   EQU EXTMP+0    RETURN LINK INFORMATION
00449000       077263  AP1   EQU EXTMP+2    TOP OF EXECUTION STACK
00450000       077264  LEND  EQU EXTMP+3    ADDRESS OF NEXT LINE TO BE EXECUTED
00451000       077265  HERE  EQU EXTMP+4    ADDRESS OF LINE BEING EXECUTED
00452000       077266  WHERE EQU EXTMP+5    ADDRESS FOR CS TO RESUME EXECUTION
00453000       077267  TRACE EQU EXTMP+6    CURRENT LINE TRACE INFORMATION
00454000       077270  SAVEC EQU EXTMP+7
00455000       077271  BASE  EQU EXTMP+8    ADDRESS IN DVTAB OR DATAB
00456000       077272  FAP1  EQU EXTMP+9
00457000       077273  OPND1 EQU EXTMP+10
00458000       077274  OPND2 EQU EXTMP+11
00459000               *
00460000       077222  L     EQU CSTMP+4
00461000       077610  KBFMT EQU LKTMP+3
00462000               *
00463000       000141  STRID EQU P6         ID OF STRING ROM
00465000               *
00466000               * ROUTINE ADDRESSES
00467000               *
00468000 00346         ACPLR BSS 1          COMPILER
00469000 00347         AREAD BSS 1          COMPILER INPUT READER
00470000 00350         AAPL1 BSS 1          APPLY-PRODUCTION RETURN TO COMPILER
00471000 00351         ASETC BSS 1          COMPILE ERROR
00472000 00352         ANUMB BSS 1          NUMBER-BUILDER
00473000 00353         ALBLN BSS 1          QUOTE SCANNER
00474000 00354         ALBCM BSS 1          QUOTE BUILDER
00475000 00355         AOUTS BSS 1          COMPILER BYTE WRITER
00476000               *
00477000 00356         ARCLR BSS 1          REVERSE COMPILER
00478000 00357         ADSRM BSS 1          DISPLAY ROM I.D. NUMBER
00479000               *
00480000 00360         ARSGT BSS 1          RESET HI-SPEED BRANCHES
00481000 00361         AINTI BSS 1          INTERPRETER 'RUN' ENTRY
00482000 00362         AFBAD BSS 1          FIND BYTE ADDRESS DIFFERENCE
00483000 00363         AINTT BSS 1          INTERPRETER 'CLL' ENTRY
00484000 00364         AINTK BSS 1          INTERPRETER 'CONTINUE' ENTRY
00485000 00365         AINTX BSS 1          INTERPRETER EXECUTION RETURN
00486000 00366         ARAP  BSS 1          FOR MATH ROUTINES
00487000 00367         ASTP  BSS 1          FOR END-STMT LINK
00488000 00370         ALLOC BSS 1          ALLOCATOR
00489000 00371         AOVTS BSS 1          EXECUTION STACK OVERFLOW TEST
00490000 00372         AASTR BSS 1          ASSIGNMENT TRACE
00491000 00373         ALNTR BSS 1          LINE NUMBER TRACE
00492000 00374         AFCI  BSS 1          FIND-BYTE INITIALIZATION ENTRY
00493000 00375         AFCC  BSS 1          FIND-BYTE CONTINUATION ENTRY
00494000 00376         ASFG  BSS 1          SET A FLAG
00495000 00377         AGNAM BSS 1          GET VARIABLE NAME
00496000 00400         ACLBL BSS 1          FIND LABEL LINE ADDRESS
00497000 00401         AADBA BSS 1          ADJUST BYTE ADDRESS ENTRY #1
00498000 00402         A.ADB BSS 1          ADJUST BYTE ADDRESS ENTRY #2
00499000               *
00500000               * 10K PAGE - CONTROL SUPERVISOR
00501000               *
00502000 00403         AMCLX BSS 1          MAIN LOOP ADDR+1
00503000 00404         AERR1 BSS 1          ERROR ROUTINE -- NO RETURN
00504000 00405         AERR2 BSS 1          ERROR ROUTINE -- RETURN P+2
00505000 00406         APEMI BSS 1          PLACE ERROR MESSAGE IN I/O BUFFER
00506000 00407         AEREX BSS 1          ERROR EXIT -- AFTER 'AERR2'
00507000 00410         AREJR BSS 1          INTERRUPT REJECT ROUTINE
00508000 00411         AXCMM BSS 1          XCOMM MANAGEMENT
00509000 00412         APLIR BSS 1          PLACE LINE NUMBER IN I/O BUFFER AND REVCOMP
00510000 00413         ACNDT BSS 1          COMMAND TABLE
```

```
00511000 00414    ACTFC BSS 1            CHECK TABLE FOR COMMAND
00512000 00415    ACONT BSS 1            IMMEDIATE EXECUTE CONTINUE
00513000 00416    AEXCK BSS 1            COMMAND EXECUTION
00514000 00417    AEXCL BSS 1            PLACE LINE BRIDGES ON COMPILED LINE
00515000 00420    AKYPR BSS 1            PROCESS A KEY
00516000 00421    AERCS BSS 1            CASSETTE RUN ENTRY
00517000 00422    AECIM BSS 1            IMMEDIATE CONTINUE
00518000 00423    ASCND BSS 1            COMMAND TABLE ADDRESS
00519000 00424    ASYER BSS 1            SYSTEM ERROR
00520000 00425    ACNIN BSS 1            CONTINUE INITIALIZATION
00521000 00426    AERSA BSS 1            LINK FOR ERASE-ALL
00522000 00427    AISTR BSS 1            PLACE KEYBOARD CHARACTER IN I/O BUFFER
00523000 00430    AISTX BSS 1            PLACE CHARACTER IN I/O BUFFER
00524000 00431    AEXST BSS 1            STATEMENT EXECUTION
00525000          *
00526000          * 12K PAGE - I/O SUPERVISOR
00527000          *
00528000 00432    ADSPC BSS 1            DISPLAY EDIT BUFFER WITH CURSOR
00529000 00433    ALDSP BSS 1            DISPLAY I/O BUFFER
00530000 00434    AKBSR BSS 1            KEYBOARD SERVICE ROUTINE
00531000 00435    ATRBF BSS 1            TRANSFER I/O BUFFER TO KEYBOARD BUFFER
00532000 00436    AEPON BSS 1            PRINT-ALL ROUTINE
00533000 00437    AEPNX BSS 1            LINK TO PRINT-ALL FOR ENP
00534000 00440    ASVRG BSS 1            SAVE LOW PRIORITY A,B,E,O
00535000 00441    AKBR2 BSS 1            RESTORE LOW PRIORITY A,B,E,O
00536000 00442    ACPST BSS 1            CHECK PRINTER STATUS
00537000 00443    APRNT BSS 1            PRINT CHARACTERS ALREADY GIVEN TO HARDWARE
00538000 00444    A,PRN BSS 1            PRINT 16 CHARS FROM I/O BUFFER
00539000 00445    APNMR BSS 1            PRINT A NUMERIC VALUE
00540000 00446    AFBP  BSS 1            FIND DISPLAY BEGIN POINTER
00541000 00447    ASWIO BSS 1            SWAP POINTERS TO EDIT I/O BUFFER
00542000 00450    ACLBI BSS 1            CLEAR I/O BUFFER
00543000 00451    ACLEB BSS 1            CLEAR EDIT BUFFER
00544000 00452    AEOLB BSS 1            SET EOL IN EDIT BUFFER
00545000 00453    ACLCM BSS 1            CLEAR COMPILE BUFFER
00546000 00454    ARPRL BSS 1            ROM "POWER REDUCTION LOOP"
00547000 00455    ALKEX BSS 1            LINK TO LIVE-KEYBOARD EXECUTION
00548000 00456    ALXER BSS 1            LINK TO LIVE-KEYBOARD EXECUTE ERROR ROUTINE
00549000 00457    ALXKY BSS 1            LINK TO LIVE-KEYBOARD EXECUTE KEY PROCESSING
00550000 00460    AKYTB BSS 1
00551000 00461    APRKB BSS 1            PRINT-ALL FROM KEYBOARD BUFFER
00552000 00462    APSTR BSS 1 (PSTRG)
00553000          *
00554000          * 22K PAGE
00555000          *
00556000 00463    AMUPH BSS 1            MOVE MAIN PROGRAM TO HIGHER MEMORY
00557000 00464    AMAMP BSS 1            MOVE MAIN PROGRAM TO LOWER MEMORY
00558000 00465    AMPUP BSS 1            MOVE PART OF MAIN PROGRAM HIGHER
00559000 00466    AMPML BSS 1            MOVE PART OF MAIN PROGRAM LOWER
00560000 00467    AMTHM BSS 1            MOVE RWM HIGHER
00561000 00470    AMTLM BSS 1            MOVE RWM LOWER
00562000 00471    AZRWM BSS 1            ZERO RWM
00563000 00472    AERAV BSS 1            ERASE ALL VARIABLES
00564000 00473    ALISK BSS 1            LIST A SPECIAL KEY
00565000 00474    AKEYN BSS 1            PUT SPECIAL KEY NUMBER IN I/O BUFFER
00566000 00475    AEDPT BSS 1            RESET EDIT POINTERS
00567000 00476    ATLNI BSS 1            PLACE LINE NUMBER IN I/O BUFFER
00568000 00477    ABTDA BSS 1            BINARY TO DECIMAL ASCII
00569000 00500    AEOLN BSS 1            FIND EOL IN I/O BUFFER
00570000 00501    AGNXT BSS 1            GET NEXT CHARACTER
00571000 00502    ATCHR BSS 1            TRANSFER CHARS
00572000 00503    ARNLO BSS 1            LINK TO TURN ON RUN LIGHT
00573000 00504    ARNLF BSS 1            LINK TO TURN OFF RUN LIGHT
00574000          *
00575000          * 26K PAGE
00576000          *
00577000 00505    APGET BSS 1 (PGET)     GET NEXT PARAMETER FOR "PRINT" LIST
00578000 00506    APNUM BSS 1 (PNUM)     PROCESS A NUMERIC ITEM
00579000 00507    AINTC BSS 1 (INTCK)    MAKE INTEGER FROM ASCII STRING
00580000 00510    AGLL  BSS 1 (GLENL)    GET LENGTH OF COMPILED LINE
00581000 00511    AGEOL BSS 1            FIND EOL IN COMPILE BUFFER
00582000 00512    AFLAD BSS 1 (FLADR)    FIND LINE ADDRESS
00583000 00513    AFLNA BSS 1            FIND LINE ADDR (TMP7)
00584000 00514    ASLLN BSS 1 (SLLN)     SET 'LNO' TO LAST LINE NUMBER OR -1
00585000 00515    ASTKI BSS 1            LINK TO LIVE-KEYBOARD INITIALIZATION
00586000 00516    AREST BSS 1            LINK TO LIVE-KEYBOARD RESTORE
00587000 00517    ARENI BSS 1            INSERT LINE RENUMBER GTO/GSB
00588000 00520    AREND BSS 1            DELETE LINE RENUMBER GTO/GSB
00589000 00521    ASTKG BSS 1            STACK ROUTINE FOR GSB
00590000 00522    ADIGX BSS 1            GENERAL RANGE CHECK ROUTINE
00591000 00523    AGLNO BSS 1            GET LINE NUMBER OF CURRENT LINE
00592000          *
00593000 00524    AUNM  BSS 1            UNARY MINUS -- FILLED IN FROM 14K-PAGE (IMATH)
00594000 00525    AADD  BSS 1            ADD
```

BASE-PAGE READ-ONLY-MEMORY

```
00595000 00526          ASUB  BSS 1          SUBTRACT
00596000 00527          AMUL  BSS 1          MULTIPLY
00597000 00530          ADIV  BSS 1          DIVIDE
00598000 00531          ASQR  BSS 1          SQRT
00599000 00532          AGE   BSS 1          >=
00600000 00533          AGT   BSS 1          >
00601000 00534          ALT   BSS 1          <
00602000 00535          ALE   BSS 1          <=
00603000 00536          AEQ   BSS 1          =
00604000 00537          ANE   BSS 1          #
00605000 00540          AAND  BSS 1          AND
00606000 00541          AOR   BSS 1          OR
00607000 00542          AXOR  BSS 1          XOR
00608000 00543          ANOT  BSS 1          NOT
00609000 00544          APRND BSS 1          P-ROUND
00610000 00545          ADRND BSS 1          D-ROUND
00611000 00546          ARERR BSS 1          RECOVERABLE MATH ERROR
00612000 00547          ARND  BSS 1          ROUND
00613000 00550          ATSUB BSS 1          USED BY RELATIONAL OPERATIONS
00614000 00551          AFLTC BSS 1          FULL-PRECISION EXPONENT RANGE CHECK
00615000 00552          AGET1 BSS 1          GET ONE MATH OPRND FROM STACK
00616000 00553          AGET2 BSS 1          GET TWO MATH OPNDS FROM STACK
00617000 00554          AADD1 BSS 1          ADD+1
00618000 00555          ASUB1 BSS 1          SUBTRACT+1
00619000 00556          AMUL1 BSS 1          MULTIPLY+1
00620000 00557          ADIV1 BSS 1          DIVIDE+1
00621000 00560          ADIV2 BSS 1          DIVIDE ENTRY FOR TRUNCATED QUOTIENT
00622000 00561          ASQR1 BSS 1          SQRT+1
00623000 00562          ATSU1 BSS 1          TSUB+1
00624000 00563          AFLTP BSS 1          CONVERT TO FLOATING-POINT
00625000                *
00626000 00564          ASTMA BSS 1          STMAX ENTRY -- FILLED IN FROM 24K-PAGE (MOBA)
00627000 00565          ASTM1 BSS 1          STMAX ENTRY
00628000                *
00629000 00566          ALST  BSS 1          LINK TO EXECUTE 'LIST'
00630000 00567          APRT  BSS 1          LINK TO EXECUTE 'PRT'
00631000 00570          ADSP  BSS 1          LINK TO EXECUTE 'DSP'
00632000 00571          ASPC  BSS 1          LINK TO EXECUTE 'SPC'
00633000 00572          ALSTK BSS 1          LINK TO EXECUTE 'LISTK'
00634000 00573          AKON  BSS 1          LINK TO EXECUTE 'KON'
00635000 00574          AKOF  BSS 1          LINK TO EXECUTE 'KOFF'
00636000 00575          AFXD  BSS 1          LINK TO EXECUTE 'FXD'
00637000 00576          AFLT  BSS 1          LINK TO EXECUTE 'FLT'
00638000 00577          AENT  BSS 1          LINK TO EXECUTE 'ENT'
00639000                *
00640000 00600          ACSTI BSS 1          CASSETTE INITIALIZATION
00641000 00601          ARFK  BSS 1          REWIND FROM KEYBOARD
00642000 00602          DMALO BSS 1          LINK TO DMA LOCKOUT ROUTINE
00643000 00603          ASTPA BSS 1          LINK TO SET CASSETTE P.A.
00644000 00604          AWTRR BSS 1          LINK TO WRITE RECORD
00645000 00605          ACHST BSS 1          LINK TO FIND RECORD
00646000 00606          ARDRC BSS 1          LINK TO READ RECORD
00647000                *
00648000 00607  001053  ABUMP DEF BUMP       BUMP PARAMETER POINTER (FAP1)
00649000 00610  001110  ACOUN DEF COUNT      COUNT PARAMETERS ON STACK
00650000 00611  001133  AGTAD DEF GETAD      GETAD SUBROUTINE
00651000 00612  001142  AGTIN DEF GETIN      GETIN SUBROUTINE
00652000                *
00653000 00613                BSS 2          FOR MORE LINKS IF NEEDED
```

BASE-PAGE SUBROUTINES

```
00655000                *
00656000                * UTILITIES
00657000                *
00659000                *
00660000                * SUBROUTINE TO GET OPERAND ABSOLUTE ADDRESS    W.F.C.
00661000                *
00662000                * ON EXIT: A = UPDATED STACK POINTER
00663000                *          B = ABSOLUTE ADDRESS
00664000                *      SAVEB = OLD STACK POINTER
00665000                *
00666000 00615  005263  ABSAD LDB AP1        ENTER HERE TO USE AP1
00667000 00616  035276        STB SAVEB
00668000                *
00669000 00617  100001        LDA B,I
00670000 00620  050140        AND P7         GET INDEX NUMBER
00671000 00621  020632        ADA INDXP
00672000 00622  024145        ADB P2
00673000 00623  104001        LDB B,I        B = RELATIVE ADDRESS
00674000 00624  124000        ADB A,I        B = ABSOLUTE ADDRESS
```

```
                      *
00625  001276               LDA SAVEB
00626  020254               ADA P1
00627  100000               LDA A,I          A = LENGTH
00630  021276               ADA SAVEB        A = UPDATED POINTER
00631  170201               RET 1
                      *
00632  077275         INDXP DEF IDXRW       POINTER TO INDEXED RWM

                      *
                      * WAIT SUBROUTINE
                      *
                      * ON ENTRY: B = -DELAY IN MILLISECONDS
                      *
00633  000642         DELAY LDA TIME
00634  072100               RIA *
00635  001206               LDA IOTMP        TEST FOR STOP KEY
00636  010254               CPA P1
00637  170201               RET 1
00640  076173               RIB *-5
00641  170201               RET 1
                      *
00642  177130         TIME  OCT 177130
                      *
                      * CONVERT FLOATING NUMBER TO INTEGER    W.F.C.
                      *
                      * ON ENTRY:
                      *
                      *   A POINTS TO FLOATING NUMBER
                      *
                      * ON EXIT:
                      *
                      *   B HAS INTEGER VALUE
                      *   O INDICATES OVERFLOW STATUS
                      *
                      *   AR2 HAS FRACTIONAL REMAINDER
                      *
                      * TEMPORARIES USED: T1,T2
                      *
00643  000001               LDA B            ALTERNATE ENTRY
                      *
00644  004127         FIXPT LDB ADR2        ADDRESS OF AR2
00645  071403               XFR 4            MOVE NUMBER TO AR2
00646  004177               LDB P0           INITIALIZE RESULT
00647  173201               SOC *+1,C
00650  000020               LDA AR2          LOOK AT EXPONENT
00651  170405               AAR 6
00652  020254               ADA P1
00653  072417               SZA FI3
00654  172426               SAM FI4
00655  031711               STA T1
00656  064664               JMP FI2
                      *
00657  024001         FI1   ADB B            2X
00660  035712               STB T2
00661  024001               ADB B            4X
00662  024001               ADB B            8X
00663  025712               ADB T2           10X
00664  000177         FI2   LDA P0
00665  075541               MLY              SHIFT AR2 LEFT
00666  170040               TCA              BUILD NEGATIVE NUMBER
00667  024000               ADB A            ADD IN NEXT DIGIT
00670  055711               DSZ T1
00671  064657               JMP FI1
                      *
00672  000021         FI3   LDA AR2+1
00673  170513               SAR 12
00674  020151               ADA M5
00675  172402               SAM *+2          ROUND
00676  024257               ADB M1
                      *
00677  000020               LDA AR2
00700  073402               RLA *+2          TEST MANTISSA SIGN
00701  174040               TCB              COMPLEMENT IF NECESSARY
00702  170201         FI4   RET 1
                      *
                      * BEEP SUBROUTINE
                      *
00703  000177         BEEP  LDA P0
00704  030011               STA PA
00705  000143               LDA P4
00706  030005               STA R5
00707  170201               RET 1
```

BASE-PAGE SUBROUTINES

```
                    *
                    * CLEAR I/O BUFFER AND PUT 'LAZY-T' AT LEFT END
                    *
00710  140450  EOLIO JSM ACLBI,I
00711  000214        LDA EOLB
00712  130313        STA AIBUF,I
00713  170201        RET 1

                    *
                    * MISCELLANY FOR JB
                    *
00714  000721  ARET1 DEF RET1
                    *
00715  000177  CLMOD LDA P0           SET MODE=0
00716  064720        JMP STMOD
00717  000143  STELM LDA P4           SET MODE=4
00720  031256  STMOD STA MODE
00721  170201  RET1  RET 1
                    *
00722  140404  ERLNF JSM AERR1,I      LINE NOT FOUND
00723  031461        ASC 1,31
                    *
00724  005315  SECCK LDB STYFG
00725  076474        SZB RET1
00726  140404  ERSEC JSM AERR1,I
00727  030064        ASC 1,04

                    *
                    * SOME COMMON ERRORS
                    *
00730  000731  AREPN DEF *+1
00731  140404  E29   JSM AERR1,I      ERROR, ROM MISSING AT EXECUTION TIME
00732  031071        ASC 1,29
                    *
00733  140404  E32   JSM AERR1,I      ERROR, ILLEGAL DATA TYPE
00734  031462        ASC 1,32
                    *
                    * SUBROUTINE TO DO AN EXE A
                    *
00735  070430  EXEXA DIR              PREVENT INTERRUPT INTERFERENCE
00736  070000        EXE A
00737  064747        JMP SXCMM+3
                    *
                    * SUBROUTINE TO CLEAR BITS IN XCOMM
                    *
                    * ON ENTRY:  B = MASK TO CLEAR BITS
                    *
00740  070430  CLXCM DIR              PREVENT INTERRUPT INTERFERENCE
00741  001255        LDA XCOMM
00742  050001        AND B
00743  064746        JMP SXCMM+2
                    *
                    * SUBROUTINE TO SET BITS IN XCOMM
                    *
                    * ON ENTRY:  A = BITS TO BE INCLUDED
                    *
00744  070430  SXCMM DIR              PREVENT INTERRUPT INTERFERENCE
00745  061255        IOR XCOMM
00746  031255        STA XCOMM
00747  070420        EIR
00750  170201        RET 1

                    *
                    * SUBROUTINE TO GET NUMERIC PARAMETER
                    *
                    * ON ENTRY: FAP1 POINTS TO PARAMETER
                    *
                    * ON EXIT TO P+1:  A = CLASS OF NON-NUMERIC ITEM ENCOUNTERED
                    *
                    * ON EXIT TO P+2:  B POINTS TO VALUE
                    *
00751  101272  NGET  LDA FAP1,I       GET 'WHAT' WORD
00752  172201        SAP *+1,C
00753  170513        SAR 12           GET CLASS
00754  010254        CPA P1           NUMERIC?
00755  064757        JMP *+2          YES
00756  170201        RET 1            NO
                    *
00757  005272        LDB FAP1
00760  040616        JSM ABSAD+1
00761  170202        RET 2
```

```
                        *
                        * INTEGER DIVIDE        W.F.C.
                        *
                        * ON ENTRY:
                        *
                        *   BA HAS DIVIDEND
                        *
                        *   JSM IDIV
                        *   DEF DIVISOR
                        *
                        * ON EXIT:
                        *
                        *   A = QUOTIENT
                        *   B = REMAINDER
                        *   O = OVERFLOW STATUS
                        *
                        * TEMPORARIES USED: T1,T2,T3,T4,T5,T6
                        *
00762  004177   SDIV  LDB P0       ALTERNATE ENTRY FOR POSITIVE SINGLE-PRECISION
00763  035711   IDIV  STB T1       SAVE HI DIVIDEND
00764  004146         LDB M2
00765  035712         STB T2       INITIALIZE QUOTIENT SIGN
00766  035713         STB T3       INITIALIZE REMAINDER SIGN
00767  004160         LDB M16
00770  035714         STB T4       INITIALIZE LOOP COUNTER
                        *
00771  144003         ISZ R,I
00772  104003         LDB R,I      ADDRESS OF DIVISOR ADDRESS
00773  104001         LDB B,I      ADDRESS OF DIVISOR
00774  104001         LDB B,I
00775  176003         SBP *+3      GET ABS OF DIVISOR
00776  045712         ISZ T2
00777  174040         TCB
01000  035715         STB T5       SAVE + DIVISOR
01001  174040         TCB
01002  035716         STB T6       SAVE - DIVISOR
                        *
01003  005711         LDB T1       TEST DIVIDEND SIGN
01004  176010         SBP DIV0
01005  045712         ISZ T2       COMPLEMENT DIVIDEND
01006  066007         JMP *+1      (ALLOW FOR SKIP)
01007  170040         TCA
01010  174140         CMB
01011  072002         RZA *+2
01012  024254         ADB P1
01013  045713         ISZ T3       SET REMAINDER SIGN -
01014  025716   DIV0  ADB T6       ADD - DIVISOR
01015  176034         SBP OVFL     SKIP IF OVERFLOW
                        *
                        * MAIN DIVIDE LOOP
                        *
01016  174600   DIV1  SBL 1        SHIFT LEFT
01017  172002         SAP *+2
01020  024254         ADB P1
01021  170600         SAL 1
01022  025715         ADB T5       ADD + DIVISOR
01023  066032         JMP DIV3
01024  073072   DIV2  SLA DIV1
01025  174600         SBL 1        SHIFT LEFT
01026  172002         SAP *+2
01027  024254         ADB P1
01030  170600         SAL 1
01031  025716         ADB T6       ADD - DIVISOR
                        *
01032  176402   DIV3  SBM *+2
01033  060254         IOR P1
01034  045714         ISZ T4       INCREMENT LOOP COUNTER AND TEST
01035  066024         JMP DIV2
                        *
01036  176002         SBP *+2      CORRECT NEGATIVE REMAINDER
01037  025715         ADB T5
                        *
01040  045712         ISZ T2       CORRECT QUOTIENT SIGN
01041  066050         JMP DIV5
01042  170040         TCA
01043  173201   DIV4  SOC *+1,C    ALL OK
                        *
01044  045713         ISZ T3
01045  170201         RET 1        RETURN POSITIVE REMAINDER
01046  174040         TCB
01047  170201         RET 1        RETURN NEGATIVE REMAINDER
                        *
01050  172073   DIV5  SAP DIV4
                        *
01051  173301   OVFL  SOC *+1,S    OVERFLOW, SET O-REGISTER
01052  170201         RET 1
```

```
                    *
                    * SUBROUTINE TO BUMP PARAMETER POINTER
                    *
                    * ON ENTRY: A = +- COUNT
                    *
                    * ON EXIT TO P+1:  NO MORE PARAMETERS
                    *
                    * ON EXIT TO P+2:  FAP1 = NEXT PARAMETER ADDRESS
                    *
                    * TEMPORARIES USED: T1,T2
                    *
01053  072415  BUMP  SZA BU2        SKIP IF NOTHING TO DO
01054  031711        STA T1
01055  172014        SAP BU3        WHICH WAY?
                    *
01056  005272        LDB FAP1       MOVE TO LEFT IF -
01057  100001  BU1   LDA B,I
01060  170603        SAL 4          LOOK AT PARAMETER LINK BIT
01061  172012        SAP BU4
01062  000001        LDA B
01063  020254        ADA P1
01064  124000        ADB A,I
01065  045711        ISZ T1
01066  066057        JMP BU1        KEEP ON
                    *
01067  035272        STB FAP1
01070  170202  BU2   RET 2          RETURN
                    *
01071  005263  BU3   LDB AP1        MOVE TO RIGHT IF +
01072  015272        CPB FAP1
01073  170201  BU4   RET 1          RETURN
                    *
01074  035712  BU5   STB T2         SAVE PREVIOUS LOCATION
01075  000001        LDA B
01076  020254        ADA P1
01077  124000        ADB A,I
01100  015272        CPB FAP1
01101  066103        JMP *+2
01102  066074        JMP BU5
                    *
01103  005712        LDB T2
01104  035272        STB FAP1       MOVE FAP1 ONE POSITION
01105  055711        DSZ T1
01106  066071        JMP BU3        KEEP ON
                    *
01107  170202        RET 2          RETURN
                    *
                    * SUBROUTINE TO COUNT PARAMETERS ON STACK
                    *
                    * ON EXIT:  A = # OF NUMERIC PARAMETERS
                    *           B = # OF PARAMETERS
                    *        FAP1 = LOCATION OF LEFTMOST PARAMETER
                    *
                    * TEMPORARIES USED: T1,T2
                    *
01110  000177  COUNT LDA P0
01111  031711        STA T1         INITIALIZE A COUNT
01112  031712        STA T2         INITIALIZE B COUNT
01113  005263        LDB AP1
01114  100001  CO1   LDA B,I        GET "WHAT" WORD
01115  170600        SAL 1          LOOK AT CLASS
01116  172402        SAM *+2        SKIP IF NON-NUMERIC
01117  045711        ISZ T1
01120  045712        ISZ T2
01121  170602        SAL 3          LOOK AT PARAMETER LINK BIT
01122  172005        SAP CO2
01123  000001        LDA B
01124  020254        ADA P1
01125  124000        ADB A,I
01126  066114        JMP CO1        MORE PARAMETERS FOLLOW
                    *
01127  035272  CO2   STB FAP1       INITIALIZE POINTER
01130  001711        LDA T1
01131  005712        LDB T2
01132  170201        RET 1          RETURN
                    *
                    * GET NUMERIC OPERAND ADDRESS
                    *
                    * ON EXIT:  B = OPERAND ADDRESS
                    *         AP1 = UPDATED
                    *
01133  040615  GETAD JSM ABSAD      GET OPERAND ABSOLUTE ADDRESS
01134  031263        STA AP1        UPDATE AP1
                    *
01135  101276        LDA SAVEB,I    THE 'WHAT' WORD
```

```
01136  050221        AND B70K
01137  010175        CPA B10K
01140  170201        RET 1            RETURN IF NUMERIC
                *
01141  064733        JMP E32

                *
                * GET INTEGER PARAMETER
                *
                * ON EXIT:  B = INTEGER VALUE
                *
01142  042133  GETIN JSM GETAD       GET OPERAND ADDRESS
01143  040643        JSM FIXPT-1     CONVERT TO INTEGER
01144  173402        SOS *+2
01145  170201        RET 1
                *
01146  140404  E11   JSM AERR1,I     ERROR, INTEGER OUT OF RANGE
01147  030461        ASC 1,11

                *
                * WAIT EXECUTION
                *
01150  042142  XWAIT JSM GETIN       GET INTEGER PARAMETER
01151  176003        SBP *+3
01152  140404  E17A  JSM AERR1,I     ERROR, ILLEGAL WAIT PARAMETER
01153  030467        ASC 1,17
                *
01154  174040        TCB
01155  040633        JSM DELAY       GO DELAY
01156  164365        JMP AINTX,I

01157                BSS 1           *** RESERVED FOR 0K-PAGE CHECKSUM ***
                     LST
```

MATH OPTION BLOCK - A: OVERHEAD

```
                *
                * FULL PRECISION NUMBER:  INTERNAL FORMAT
                *
                *
                *   EEEE EEEE EEXX XXXS   10 BIT 2'S COMP. EXP., 5 DON'T CARE BITS
                *                         MANTISSA SIGN (0=+ 1=-)
                *                         EXP. RANGE = -511 TO +511
                *    D1 . D2   D3   D4    BCD DIGITS 1-4
                *
                *
                *    D5   D6   D7   D8    BCD DIGITS 5-8
                *
                *
                *    D9   D10  D11  D12   BCD DIGITS 9-12
                *
                ****************
                *
                *
                * EQUATES
                *
                *
       077742  OP1E  EQU OP1
       077743  OP1M1 EQU OP1+1
       077747  OP2M1 EQU OP2+1
       077752  RESE  EQU RES         FULL PRECISION RESULT REGISTER
       077753  RESM1 EQU RES+1
       077755  RESM3 EQU RES+3
       000345  AR1A  EQU ADR1        ADDRESS OF AR1
       077770  AR1E  EQU AR1         EXPONENT WORD OF AR1
       000127  AR2A  EQU ADR2        ADDRESS OF AR2
       000020  AR2E  EQU AR2         EXPONENT WORD OF AR2
       000021  AR2M1 EQU AR2E+1      1ST MANTISSA WORD OF AR2
       000022  AR2M2 EQU AR2E+2      2ND MANTISSA WORD OF AR2
       000023  AR2M3 EQU AR2E+3      3RD MANTISSA WORD OF AR2
       000175  BCD1  EQU B10K        BCD 1000
       077762  MT1   EQU MRW1+4      OPMPY
                *
                * T1 THRU T13 ARE USED EXCLUSIVELY FOR THE CORDIC DIGIT STACK
                *
       000335  ADSTK EQU ATMP        ADDRESS OF THE TOP OF THE DIGIT STACK (T1) - Q(J)'S
       077726  DIGIT EQU T14         POINTER TO THE CORDIC DIGIT STACK
       077727  CTEMP EQU T15         TEMP. USED ONLY TO PRESERVE C DURING STMT. EXECUTION
       077730  UFLAG EQU T16         TEMP. USED ONLY TO PRESERVE THE USER'S FLAG WORD
```

```
         077731  SHIFT EQU T17       SHIFT FACTOR FOR Y IN PH2 AND PH4
         077732  DJ    EQU T18       INCREMENT/DECREMENT FOR SHIFT
         077733  PTR   EQU T19       POINTS TO ALFAS, BETAS, CONVERSION CONSTANTS, (CSV)
         077734  EXP&1 EQU T20       USED TO HOLD THE EXPONENT VALUE OF THE ARGUMENT
         077735  SIGN  EQU T21       USED TO HOLD THE MANTISSA SIGN OF THE ARGUMENT
         077736  OCTNT EQU T22       USED TO SPECIFY THE OCTANT OF THE TANGENT ARGUMENTS.
         077737  CNTR1 EQU T23       GENERAL PURPOSE COUNTER
         077740  LOOP# EQU T24       COUNTER USED MAINLY FOR LOOPING
         077741  FLAGS EQU T25       GENERAL TEMPORARY FOR SECONDARY FUNCTIONS
         077042  UNITS EQU STEAL     STOLEN RWM WORD DEDICATED TO MOB(A) AT 24K
                 *
                 ****************
                 *
                 * MAINFRAME - OPTION BLOCK INTERFACE
                 *
                 ****************
                 *
24000                  ORG 24000B
                 *
24000    024237        DEF EXECA     ADDRESS OF THE EXECUTION ROUTINE
24001    024176        DEF COMPA     ADDRESS OF THE COMPILE TABLE
24002    024247        DEF RCOMA     ADDRESS OF THE REVERSE COMPILE TABLE
24003    177777        DEC -1        NO COMMAND TABLE IN THIS BLOCK
24004    025304        DEF INITA     ADDRESS OF THE INITIALIZATION ROUTINE (EDEG)
24005    000017        DEC 15        MATH OPTION BLOCK - A  ROM ID=15
                 *
24006            CHKSM BSS 1         CHECKSUM FOR ADDRESSES: 24000-25777


                 *
                 *
                 * CONSTANTS, LINKAGES
                 *
                 *
                 *
24007    024122  ABETA DEF BETAS
24010    024116  ALFAA DEF ALFA.
24011    024146  BETAA DEF BETA.
24012    024152  ALN10 DEF LN10
24013    042427  JADD  JSM ADD       JADD IS USED BY "PYTHA"
24014    024066  API/2 DEF CPI/2
24015    024016  DEG   DEF *+1       DEGREE CONVERSION CONSTANTS
24016    062145        OCT 062145    LOWER CASE "DEG "
24017    063440        OCT 063440
24020    000200  C360  OCT 000200    E2 +
24021    033000        OCT 033000    3600
24022    000000        OCT 000000    0000
24023    000000        OCT 000000    0000
24024    000100  C45   OCT 000100    E1 +
24025    042400        OCT 042400    4500
24026    000000        OCT 000000    0000
24027    000000        OCT 000000    0000
24030    177600  CR/D  OCT 177600    E-2+   PI/180  9820 USED 180/PI = 5.729 5779 5128
24031    013505        OCT 013505    1745   FUDGED TO WORK WELL FOR ATN.
24032    031222        OCT 031222    3292
24033    051000        OCT 051000    5200
                 *
                 * CR/D IS USED BY THE RANDOM NO. GENERATOR AS A SEED.
                 * DO NOT MOVE IT WITHOUT CHANGING ITS ADDRESS ON THE 26K PAGE.
                 *

24034    024035  GRAD  DEF *+1       GRADIAN CONVERSION CONSTANTS
24035    063562        OCT 063562    LOWER CASE "GRAD"
24036    060544        OCT 060544
24037    000200  C400  OCT 000200    E2 +
24040    040000        OCT 040000    4000
24041    000000        OCT 000000    0000
24042    000000        OCT 000000    0000
24043    000100  C50   OCT 000100    E1 +
24044    050000        OCT 050000    5000
24045    000000        OCT 000000    0000
24046    000000        OCT 000000    0000
24047    177600  CR/G  OCT 177600    E-2+   PI/200  9820 USED 200/PI = 6.366 1977 2365
24050    012560        OCT 012560    1570   FUDGED TO WORK WELL FOR ATN.
24051    074543        OCT 074543    7963
24052    023200        OCT 023200    2680
```

```
01359000 24053  024054  RAD    DEF *+1      RADIAN CONVERSION CONSTANTS
01360000 24054  071141         OCT 071141   LOWER CASE "RAD "
01361000 24055  062040         OCT 062040
01362000 24056  000000  C2PI   OCT 000000   E0 +
01363000 24057  061203         OCT 061203   6283
01364000 24060  014123         OCT 014123   1853
01365000 24061  003440         OCT 003440   0720    CORRECT VALUE IS 0718 (OCT 003430)
01366000 24062  177700  CPI/4  OCT 177700   E-1+
01367000 24063  074123         OCT 074123   7853
01368000 24064  114026         OCT 114026   9816
01369000 24065  032000         OCT 032000   3400    CORRECT VALUE IS 3397 (OCT 031627)
01370000 24066  000000  CPI/2  OCT 000000   E0 +    THIS VALUE IS BASED ON THE FUDGED PI(60)
01371000 24067  012560         OCT 012560   1570
01372000 24070  074543         OCT 074543   7963
01373000 24071  023200         OCT 023200   2680    CORRECT VALUE IS 2679 (OCT 023171)
01375000                *
01376000                *
01377000                * ATN CONSTANTS
01378000                *
01379000                *
01380000 24072  000000  ALFAS  OCT 000000   E0 +   ATN 1
01381000 24073  003605         OCT 003605   0785
01382000 24074  034601         OCT 034601   3981
01383000 24075  061500         OCT 061500   6340
01384000                *
01385000 24076  000000         OCT 000000   E0 +   ATN .1
01386000 24077  004626         OCT 004626   0996
01387000 24100  064145         OCT 064145   6865
01388000 24101  022221         OCT 022221   2491
01389000                *
01390000 24102  000000         OCT 000000   E0 +   ATN .01
01391000 24103  004631         OCT 004631   0999
01392000 24104  113146         OCT 113146   9666
01393000 24105  064147         OCT 064147   6867
01394000                *
01395000 24106  000000         OCT 000000   E0 +   ATN .001
01396000 24107  004631         OCT 004631   0999
01397000 24110  114626         OCT 114626   9996
01398000 24111  063147         OCT 063147   6667
01399000                *
01400000 24112  000000         OCT 000000   E0 +   ATN .0001
01401000 24113  004631         OCT 004631   0999
01402000 24114  114631         OCT 114631   9999
01403000 24115  113147         OCT 113147   9667
01404000                *
01405000 24116  000000  ALFA.  OCT 000000   E0 +   ATN .00001
01406000 24117  004631         OCT 004631   0999
01407000 24120  114631         OCT 114631   9999
01408000 24121  114627         OCT 114627   9997
01410000                *
01411000                *
01412000                * NATURAL LOG CONSTANTS
01413000                *
01414000                *
01415000 24122  000000  BETAS  OCT 000000   E0 +   LN 2
01416000 24123  003223         OCT 003223   0693
01417000 24124  012161         OCT 012161   1471
01418000 24125  100126         OCT 100126   8056
01419000                *
01420000 24126  000000         OCT 000000   E0 +   LN 1.1
01421000 24127  004523         OCT 004523   0953
01422000 24130  010027         OCT 010027   1017
01423000 24131  114004         OCT 114004   9804
01424000                *
01425000 24132  000000         OCT 000000   E0 +   LN 1.01
01426000 24133  004625         OCT 004625   0995
01427000 24134  001460         OCT 001460   0330
01428000 24135  102462         OCT 102462   8532
01429000                *
01430000 24136  000000         OCT 000000   E0 +   LN 1.001
01431000 24137  004631         OCT 004631   0999
01432000 24140  050003         OCT 050003   5003
01433000 24141  031410         OCT 031410   3308
01434000                *
01435000 24142  000000         OCT 000000   E0 +   LN 1.0001
01436000 24143  004631         OCT 004631   0999
01437000 24144  112400         OCT 112400   9500
01438000 24145  001463         OCT 001463   0333
01439000                *
01440000 24146  000000  BETA.  OCT 000000   E0 +   LN 1.00001
01441000 24147  004631         OCT 004631   0999
01442000 24150  114520         OCT 114520   9950
01443000 24151  000003         OCT 000003   0003
01444000                *
01445000 24152  000000  LN10   OCT 000000   E0 +   LN 10
```

MATH OPTION BLOCK - A1 OVERHEAD

```
24153  021402         OCT 0214[illegible]  2302
24154  054120         OCT 0541[illegible]  5850
24155  111231         OCT 111231   9299   9820 USED 9300 (OCT 111400)
                *
                ****************
                *
                * COMPILE TABLE
                *
                ****************
                *                    I* TKN  MNEMONIC
24156  003027         OCT 003027     6 23   GRAD      (END)
24157  003027         OCT 003027     6 23   RAD       (END)
24160  003027         OCT 003027     6 23   DEG       (END)
24161  003027         OCT 003027     6 23   UNITS     (END)
24162  003027         OCT 003027     6 23   CSV       (END)
24163  003011         OCT 003011     6  9   ^         (^)
24164  004053         OCT 004053     8 43   LOG       (SQR)
24165  004053         OCT 004053     8 43   TNA       (SQR)
24166  004053         OCT 004053     8 43   ACS       (SQR)
24167  004053         OCT 004053     8 43   ASN       (SQR)
24170  004053         OCT 004053     8 43   COS       (SQR)
24171  004053         OCT 004053     8 43   SIN       (SQR)
24172  004053         OCT 004053     8 43   LN        (SQR)
24173  004053         OCT 004053     8 43   EXP       (SQR)
24174  004053         OCT 004053     8 43   ATN       (SQR)
24175  004053         OCT 004053     8 43   TAN       (SQR)
24176  072141   COMPA DEC 29793     T  A
24177  067201         DEC 28289     N (1)
24200  060564         DEC 24948     A  T
24201  067202         DEC 28290     N (2)
24202  062570         DEC 25976     E  X
24203  070203         DEC 28803     P (3)
24204  066156         DEC 27758     L  N
24205  102163         DEC -31629  (4)  S
24206  064556         DEC 26990     I  N
24207  102543         DEC -31389  (5)  C
24210  067563         DEC 28531     O  S
24211  103141         DEC -31135  (6)  A
24212  071556         DEC 295[illegible]     S  N
24213  103541         DEC -30[illegible]   (7)  A
24214  061563         DEC 2545[illegible]     C  S
24215  104164         DEC -30604  (8)  T
24216  067136         OCT 67136     N  ^
24217  104554         DEC -30356  (9)  L
24220  067547         DEC 28519     O  G
24221  105136         OCT 105136 (10)  ^
24222  105543         OCT 105543 (11)  C
24223  071566         OCT 071566    S  V
24224  106165         OCT 106165 (12)  U
24225  067151         OCT 067151    N  I
24226  072163         OCT 072163    T  S
24227  106544         OCT 106544 (13)  D
24230  062547         OCT 062547    E  G
24231  107162         OCT 107162 (14)  R
24232  060544         OCT 060544    A  D
24233  107547         OCT 107547 (15)  G
24234  071141         OCT 071141    R  A
24235  062220         OCT 062220    D (16)
24236  100000         OCT 100000   EOT
                *
                ****************
                *
                * MAIN EXECUTION ROUTINE
                *
                * ON ENTRY:  <A> CONTAINS THE ROM'S INTERNAL CODE
                *
                ****************
                *
24237  022757   EXECA ADA EXTBL     ADD THE EXECUTION JUMP TABLE ADDRESS
24240  100000         LDA A,I       A = ADDRESS OF THE STATEMENT'S EXECUTION ROUTINE.
24241  004016         LDB C         SAVE C IN A TEMPORARY DEDICATED TO ITS USE.
24242  035727         STB CTEMP
24243  140000         JSM A,I       PERFORM THE STATEMENT EXECUTION
24244  001727         LDA CTEMP     RESTORE C
24245  030016         STA C
24246  164366         JMP ARAP,I    STACK RES ON THE EXEC. STACK & RETURN TO INTERPRETER
                *
                ****************
                *
                * REVERSE COMPILE TABLE
                *
                *   MNEMONIC (OPERATOR PRIORITY, CLASS)
                *
                ****************
                *
```

MATH OPTION BLOCK - A: OVERHEAD

```
24247  161342  RCOMA OCT 161342   TAN (14,2)   ATN (14,2)
24250  161342        OCT 161342   EX  (14,2)   LN  (14,2)
24251  161342        OCT 161342   SI  (14,2)   COS (14,2)
24252  161342        OCT 161342   ASN (14,2)   ACS (14,2)
24253  151342        OCT 151342   TNA (13,2)   LOG (14,2)
24254  141401        OCT 141401   ^   (12,3)   CSV ( 0,1)
24255  000401        OCT 000401  UNITS( 0,1)   DEG ( 0,1)
24256  000401        OCT 000401   RAD ( 0,1)   GRAD( 0,1)
```

MATH OPTION BLOCK - A: EXECUTION

```
                      *
                      ****************
                      *
                      * TAN EXECUTION
                      *
                      ****************
                      *
24257  000177  ETAN  LDA P0
24260  031741  TAN1  STA FLAGS     SIN(FLAGS=AOP1), COS(FLAGS=AONE), TAN(FLAGS=0)
24261  000177        LDA P0
24262  031734        STA EXP&1
24263  031735        STA SIGN
24264  042313        JSM GET1A     OP1 = ARG
24265  001742        LDA OP1E      SAVE THE ORIGINAL MANTISSA SIGN IN (SIGN)
24266  073202        SLA *+2,C     AND MAKE THE ARGUMENT POSITIVE
24267  045735        ISZ SIGN
24270  031742        STA OP1E
                      *
                      * PRE-SCALE THE ARGUMENT IN THE USER'S UNITS.
                      *
24271  000145        LDA P2        SET UP CNTR1 FOR TWO PASSES THROUGH THE LOOP
24272  031737        STA CNTR1     TO REDUCE THE ARGUMENT TO THE FIRST OCTANT
24273  005042        LDB UNITS
24274  024145        ADB P2        DETERMINE WHICH SET OF REDUCTION CONSTANTS TO USE.
24275  035733  TAN2  STB PTR       SAVE THE REDUCTION CONSTANT ADDRESS.
24276  000177        LDA P0
24277  031736        STA OCTNT     CLEAR OCTNT BEFORE REDUCING TO FIRST OCTANT.
24300  035274  TAN2A STB OPND2
24301  000336        LDA AOP1
24302  031273        STA OPND1
24303  042367        JSM XFRRS     FIX FOR BUG SHEET #349.
24304  140562        JSM ATSU1,I   COMPARE OP1 (ARGUMENT) WITH THE REDUCTION CONSTANT
24305  014144        CPB P3
24306  067332        JMP TAN2B
24307  000336        LDA AOP1      OP1 >= REDUCTION CONSTANT, KEEP REDUCING.
24310  005733        LDB PTR
24311  031273        STA OPND1
24312  035274        STB OPND2
24313  000177        LDA P0
24314  140560        JSM ADIV2,I
24315  001755        LDA RESM3     FIRST PASS REDUCTION TO FULL CIRCLE:
24316  050170        AND M256        ARG' = ARG - UCV * INT (ARG/UCV)
24317  031755        STA RESM3
24320  042350        JSM INRES     SECOND PASS REDUCTION TO FIRST OCTANT:
24321  001753        LDA RESM1       ARG'' = ARG' - FOV * INT (ARG'/FOV)
24322  170513        SAR 12
24323  031736        STA OCTNT
24324  001733        LDA PTR
24325  042437        JSM AXRES
24326  042432        JSM O1MRS
24327  042472        JSM RS.01     OP1 = ARG' OR ARG''
24330  005733        LDB PTR
24331  067300        JMP TAN2A     GO BACK & COMPARE OP1 WITH REDUCTION CONSTANT AGAIN.
24332  005733  TAN2B LDB PTR       OP1 < REDUCTION CONSTANT, DON'T NEED TO REDUCE.
24333  024143        ADB P4
24334  055737        DSZ CNTR1
24335  067275        JMP TAN2      LOOP AGAIN IF THIS IS THE FIRST PASS.
                      *
                      * CHECK FOR A PI/4 MULTIPLE INSIDE THE UNIT CIRCLE.
                      *
24336  035733        STB PTR
24337  001736        LDA OCTNT
24340  005743        LDB OP1M1     IS THE PRE-SCALED ARGUMENT ZERO ?
24341  076010        RZB TAN3      NO, CONTINUE
24342  050144  TAN2C AND P3        YES, NOW DETERMINE THE CORRECT RESULT.
24343  010177        CPA P0
24344  066355        JMP CLRES     OCTANT = 0 OR 4:  RESULT = 0
24345  010145        CPA P2
24346  067471        JMP E68?      OCTANT = 2 OR 6:  TRY TO GIVE ERROR 68
24347  043635        JSM RES=1     OCTANT = 1,3,5,7:  RESULT = +/-1
24350  067457        JMP TAN14     FIND OUT AT TAN14 WHETHER IT SHOULD BE + OR - 1.0
```

```
                         *
                         * FINALIZE THE ARGUMENT
                         *
24351   073006   TAN3    SLA TAN4       IF OCTANT IS EVEN THEN USE THE ARGUMENT
24352   001733           LDA PTR        WHICH IS IN THE FIRST OCTANT
24353   020150           ADA M4
24354   004336           LDB AOP1
24355   042434           JSM SUB        OTHERWISE USE PI/4 - ARGUMENT
24356   042472           JSM RS.01
                         *
                         * CONVERT ARGUMENT TO RADIANS
                         *
24357   001733   TAN4    LDA PTR
24360   013014           CPA API/2      IF CURRENT UNITS = RADIANS, NO CONVERSION NEEDED.
24361   067372           JMP TAN5       SO SKIP THE CONVERSION.
24362   042457           JSM SFG14      BUG SHEET #1788.
24363   001733           LDA PTR
24364   004336           LDB AOP1
24365   042440           JSM MPY        CONVERT TO RADIANS
24366   042455           JSM RSTFL
24367   001736           LDA OCTNT      *BUG SHEET #1528! THIS CHECKS FOR ZERO AS A
24370   005753           LDB RESM1      *RESULT OF UNDERFLOW ON CONVERSION TO DEG &
24371   076451           SZB TAN2C      *GRADS TO RADIANS.
                         *
                         * START OF ACTUAL TANGENT COMPUTATION.
                         *
24372   042470   TAN5    JSM RS.A2      AR2 = RES
24373   000020           LDA AR2E
24374   072004           RZA TAN7       IS THE EXPONENT = 0 ?
24375   000164   TAN6    LDA M64        YES, SET THE EXPONENT TO -1
24376   030020           STA AR2E
24377   067403           JMP TAN8
24400   042404   TAN7    JSM RAR21      RIGHT SHIFT AR2 ONE DIGIT
24401   000020           LDA AR2E
24402   072473           SZA TAN6       IF THE SHIFT ROUNDED AR2 TO ONE, SET THE EXP. TO -1
24403   020073   TAN8    ADA P64        SAVE (EXP + 1)
24404   004000           LDB A
24405   170405           AAR 6
24406   020141           ADA P6
24407   072402           SZA TAN9
24410   172004           SAP TAN10
24411   042474   TAN9    JSM RS.02
24412   042512           JSM OP1=1
24413   067442           JMP TAN11
24414   035734   TAN10   STB EXP&1
24415   031737           STA CNTR1      SAVE THE COUNT FOR "PHASE I"
24416   031740           STA LOOP#      SAVE THE COUNT FOR "PHASE II"
24417   170601           SAL 2
24420   170040           TCA            COMPUTE THE ADDRESS OF THE FIRST TRIG CONSTANT TO USE
24421   023007           ADA ABETA
24422   031733           STA PTR
24423   042514           JSM PH1        CALL "PHASE I"
24424   002722           LDA CDC
24425   030016           STA C
24426   002521           LDA CMY
24427   030017           STA D
24430   000135           LDA P10
24431   004146           LDB M2
24432   055726           DSZ DIGIT
24433   042543           JSM PH2        CALL "PHASE II"
24434   042466           JSM O2.A2      AR2 = OP2
24435   042700           JSM PH3.E      GET EXPONENT FOR Z
24436   042507           JSM A2.O2      OP2 = AR2
24437   042464           JSM O1.A2      AR2 = OP1
24440   042700           JSM PH3.E
24441   042504           JSM A2.O1      OP1 = AR2
24442   001736   TAN11   LDA OCTNT      OCTNT<0> = OCTNT<1> IMPLIES OCTANTS 0, 3, 4, OR 7.
24443   170500           SAR 1
24444   021736           ADA OCTNT
24445   073007           SLA TAN12
24446   001734           LDA EXP&1      TAN = X/Y
24447   170040           TCA
24450   031734           STA EXP&1
24451   000336           LDA AOP1
24452   004337           LDB AOP2
24453   067456           JMP TAN13
24454   000337   TAN12   LDA AOP2       TAN = Y/X
24455   004336           LDB AOP1
24456   042443   TAN13   JSM DVD
24457   001736   TAN14   LDA OCTNT      OCTNT<1> = 1 IMPLIES QUADRANTS II OR IV.
24460   170500           SAR 1
24461   073002           SLA TAN15
24462   045735           ISZ SIGN
24463   001735   TAN15   LDA SIGN
24464   050254           AND P1
```

MATH OPTION BLOCK - A: EXECUTION

```
24465 061734        IOR EXP&1
24466 021752        ADA RESE
24467 031752 TAN16  STA RESE
24470 170201        RET 1
                    *
                    * SIN, COS, OR TAN ARGUMENT LIES ON THE Y-AXIS.
                    *
24471 005741 E687   LDB FLAGS
24472 076412        SZB E68       TAN BEING CALCULATED ?
24473 054003        DSZ R         NO.  SIN OR COS.  RETURN TO EXECA, NOT SIN1.
24474 014172        CPB AONE      COS BEING CALCULATED ?
24475 066355 RES=0  JMP CLRES     YES.  COS(90) = COS(270) = 0
24476 043635        JSM RES=1     NO, SIN.
24477 001736        LDA OCTNT
24500 170501        SAR 2
24501 021735        ADA SIGN      CALCULATE THE CORRECT SIGN FOR SIN.
24502 050254        AND P1
24503 067467        JMP TAN16
                    *
                    * ERROR 68: TAN (N*PI/2), N ODD.  DEG, RAD, OR GRAD.
                    *
24504 005735 E68    LDB SIGN
24505 042373        JSM STMAX     RES = +/-9,99999999999 E 511
24506 140546        JSM ARERR,I
24507 033070        ASC 1,68
                    *
                    ****************
                    *
                    * ATN EXECUTION
                    *
                    ****************
                    *
24510 043512 EATN   JSM ATN0      CALCULATE ATN IN RADIANS, LEAVE ANSWER IN RES
24511 066315        JMP CTOCU     CONVERT TO CURRENT UNITS


24512 140552 ATN0   JSM AGET1,I   GET THE ARGUMENT IN FULL PRECISION
24513 024254        ADB P1        IS THE ARGUMENT 0 ?
24514 100001        LDA B,I
24515 072460        SZA RES=0     YES, ATN 0 = 0.
24516 101273 ATN1   LDA OPND1,I   SAVE THE EXPONENT WORD
24517 031735        STA SIGN
24520 172431        SAM ATN2.     IF THE EXPONENT IS POSITIVE
24521 005273        LDB OPND1     LET ARG = 1 / ARG
24522 042226        JSM ONE/B
24523 000340        LDA ARES
24524 031273        STA OPND1     UPDATE THE OPND1 ADDRESS
24525 101273 ATN2   LDA OPND1,I   SAVE THE EXPONENT
24526 172423        SAM ATN2.
24527 001042        LDA UNITS     ARGUMENT = +1 OR -1 EXACTLY.  (1/1 = 1)
24530 020141        ADA P6
24531 054003        DSZ R         CANCEL RETURN FROM CALL TO ATN0.
24532 043630        JSM ATN7
24533 001735        LDA SIGN
24534 073007        SLA ATNRT
24535 001727        LDA CTEMP
24536 030016        STA C
24537 074760        WBC A,D
24540 074760        WBC A,D
24541 010137        CPA P8        ACS ?
24542 067544        JMP *+2       YES.
24543 170201 ATNRT  RET 1
24544 004147        LDB M3
24545 140563        JSM AFLTP,I
24546 042504        JSM A2.01
24547 000340        LDA ARES
24550 066440        JMP MPY
24551 170405 ATN2.  AAR 6
24552 031734        STA EXP&1
24553 020142        ADA P5        IF THE EXPONENT IS LESS THAN -5, GO TO ATN4.
24554 172007        SAP ATN3
24555 001273        LDA OPND1
24556 042505        JSM XFR01
24557 001742        LDA OP1E      FIX FOR BUG SHEET # 572
24560 050146        AND M2
24561 031742        STA OP1E      OP1 = ABS(ARGUMENT)
24562 067616        JMP ATN4
24563 000335 ATN3   LDA ADSTK     CLEAR THE DIGIT STACK (Q0-Q12) TO ZERO
24564 171614        CLR 13
24565 020133        ADA P12       INITIALIZE THE DIGIT STACK POINTER
```

MATH OPTION BLOCK - A: EXECUTION

```
24566   031726         STA DIGIT
24567   004132         LDB P13
24570   035740         STB LOOP#
24571   001273         LDA OPND1
24572   042510         JSM XFRO2    SET Y0 = ARGUMENT
24573   002521         LDA CMY
24574   030016         STA C
24575   002722         LDA CDC
24576   030017         STA D
24577   001734         LDA EXP&1    A = -2*EXP&1
24600   170600         SAL 1
24601   170040         TCA
24602   004145         LDB P2       B = 2
24603   042543         JSM PH2      CALL "PHASE II"
24604   001734         LDA EXP&1
24605   170040         TCA
24606   020140         ADA P7
24607   007010         LDB ALFAA
24610   042635         JSM PH3      CALL "PHASE III"
24611   001734         LDA EXP&1
24612   170605         SAL 6
24613   020020         ADA AR2E
24614   030020         STA AR2E
24615   042504         JSM A2.01    OP1 = AR2
24616   001735   ATN4  LDA SIGN
24617   172410         SAM ATN6
24620   003014         LDA API/2
24621   042434   JSUB  JSM SUB
24622   001735   ATN5  LDA SIGN
24623   050254         AND P1
24624   061752         IOR RESE
24625   031752         STA RESE
24626   170201         RET 1
24627   000336   ATN6  LDA AOP1     RES = OP1
24630   042367   ATN7  JSM XFRRS
24631   067622         JMP ATN5
                 *
                 ****************
                 *
                 * EXP EXECUTION
                 *
                 ****************
                 *
24632   042313   FEXP  JSM GET1A    OP1 = ARG
24633   001743   EXP0  LDA OP1M1    IS THE ARGUMENT ZERO ?
24634   072003         RZA EXP2
24635   000172   EXP1  LDA AONE     YES, EXP(0) = 1
24636   066367         JMP XFRRS
                 *
                 * EXP1 AND EXP1+1 ARE ALSO USED AS "RES=1".
                 *
24637   001742   EXP2  LDA OP1E     SAVE EXPONENT AND MANTISSA SIGN
24640   031735         STA SIGN
24641   073201         SLA *+1,C    CLEAR THE MANTISSA SIGN AND RESTORE IT.
24642   031742         STA OP1E
24643   004177         LDB P0       CLEAR THE EXPONENT STORAGE WORD
24644   035734         STB EXP&1
24645   170405         AAR 6        MAKE THE EXPONENT AN INTEGER WORD
24646   172007         SAP EXP3     IS THE EXPONENT NEGATIVE ?
24647   170040         TCA          YES
24650   004000         LDB A
24651   024255         ADB M12
24652   176063         SBP EXP1     IF ABS(ARG) < 1E-11, RETURN 1 AS THE RESULT
24653   042464         JSM O1.A2    AR2 = OP1
24654   067710         JMP EXP6
24655   020150   EXP3  ADA M4       IS THE ARGUMENT >= 10,000 ?
24656   172411         SAM EXP5     NO, CONTINUE.
24657   001735         LDA SIGN     YES, OVERFLOW OR UNDERFLOW HAS OCCURRED.
24660   073404   EXP4  RLA E77      GIVE THE PROPER DEFAULT VALUE.
24661   042372   E76   JSM STMAX-1  OVERFLOW!  RES=9.99999999999 E511
24662   140546         JSM ARERR,I
24663   033466         ASC 1,76
24664   042355   E77   JSM CLRES    UNDERFLOW! RES=0
24665   140546         JSM ARERR,I
24666   033467         ASC 1,77
                 *
                 * PRESCALE ARGUMENT TO THE RANGE [1, LN 10)
                 *
24667   000336   EXP5  LDA AOP1
24670   042145         JSM LOG2     RES = ARG / LN10
24671   042350         JSM INRES    RES = INT (ARG / LN10)
24672   000340         LDA ARES
24673   040644         JSM FIXPT    CONVERT TO AN INTEGER FOR THE EXPONENT OF THE RESULT.
24674   043750         JSM EXSUB    MAKE SURE IT IS A VALID EXPONENT.
24675   067657         JMP EXP4-1     P+1: EXPONENT OUT OF RANGE.
```

```
24676  035734         STB EXP&1      P+2: IN RANGE, USE LATER AS EXPONENT OF RESULT.
24677  003012         LDA ALN10
24700  042437         JSM AXRES      RES = LN10 * INT(ARG/LN10)
24701  000336         LDA AOP1
24702  042433         JSM AMRES      RES = ARG - LN10 * INT(ARG/LN10)
24703  042470         JSM RS.A2      AR2 = RES
24704  042422         JSM ZAR2       IF THE FRACTIONAL PART OF THE POWER IS ZERO
24705  067710         JMP EXP6       THEN SET RES=1 AND CONTINUE AT EXP9.
24706  043635         JSM RES=1
24707  067741         JMP EXP9
                *
                * COMPUTE EXP (1, LN 10)
                *
24710  004020  EXP6   LDB AR2E
24711  176004         SAP EXP7       IF EXPONENT = 0, DON'T SHIFT
24712  174405         ABR 6
24713  174040         TCB            IF EXPONENT < 0, RIGHT SHIFT -EXPONENT DIGITS
24714  042405         JSM RAR2H      AND ROUND
24715  003007  EXP7   LDA ABETA
24716  031733         STA PTR
24717  000141         LDA P6
24720  031737         STA CNTR1
24721  042514         JSM PH1        CALL "PHASE I"
24722  000140         LDA P7         TRANSFER D1-D7 OF AR2 TO Q6-Q12
24723  031737         STA CNTR1
24724  004254         LDB P1
24725  075541  EXP8   MLY            SHIFT OUT A DIGIT
24726  131726         STA DIGIT,I    STORE IT IN THE NEXT QJ
24727  045726         ISZ DIGIT      BUMP THE QJ POINTER
24730  055737         DSZ CNTR1      MORE TO TRANSFER ?
24731  067725         JMP EXP8       YES.
24732  000172         LDA AONE       NO, CONTINUE TO PREPARE FOR "PHASE IV"
24733  042477         JSM XFRA2      AR2 = 1
24734  000133         LDA P12        TWOJ INITIAL VALUE
24735  004257         LDB M1         DJ INITIAL VALUE
24736  055726         DSZ DIGIT
24737  042705         JSM PH4        CALL "PHASE IV"
24740  042366         JSM A2.RS      RES = AR2
24741  001734  EXP9   LDA EXP&1
24742  031752         STA RESE       PUT THE PROPER EXPONENT ON IT
24743  001735         LDA SIGN
24744  073003         SLA EXP10
24745  004340         LDB ARES       RES = 1 / RES
24746  042226         JSM ONE/B
24747  170201  EXP10  RET 1


                *
                ****************
                *
                * EXSUB: SUBROUTINE USED BY EXP AND TN^
                *
                ****************
                *
24750  000001  EXSUB  LDA B
24751  172402         SAM *+2
24752  170040         TCA
24753  020042         ADA P511       ABS(B) > 511 ?
24754  172473         SAM EXP10      INVALID EXPONENT, RETURN P+1.
24755  174605         SBL 6          VALID EXPONENT RANGE, POSITION B AS AN EXPONENT.
24756  170202         RET 2
                *
                ****************
                *
                * LN EXECUTION
                *
                ****************
                *
24757  140552  ELN    JSM AGET1,I    FETCH THE ARGUMENT
24760  001273  LNV    LDA OPND1
24761  042477         JSM XFRA2      AR2 = ARGUMENT
24762  000020         LDA AR2E       IF THE ARGUMENT < 0, GIVE ERROR 69
24763  073203         SLA LN1,C
24764  042022         JSM E69        TRY TO GIVE ERROR 69, DEFAULT VALUE IS LN(ABS(ARG))
24765  000020         LDA AR2E
24766  031734  LN1    STA EXP&1      SAVE THE EXPONENT WORD IN EXP&1
24767  000021         LDA AR2M1      IF THE ARGUMENT = 0, GIVE ERROR 70
24770  072005         RZA LN2
                *
                * ERROR 70: LN(0) OR LOG(0)
                *
24771  004254  E70    LDB P1         LN(0) OR LOG(0) = - 9.99999999999 E 511
24772  042373         JSM STMAX
```

```
24773  140546        JSM ARERR,I  ERROR 70: LN(0) OR LOG(0)
24774  033460        ASC 1,70
24775  000335  LN2   LDA ADSTK    CLEAR THE DIGIT STACK AND INITIALIZE THE
24776  071614        CLR 13       DIGIT STACK POINTER
24777  020133        ADA P12
25000  031726        STA DIGIT
25001  000177        LDA P0
25002  004254        LDB P1
25003  042705        JSM PH4      CALL "PHASE IV"
25004  000140        LDA P7
25005  007011        LDB BETAA
25006  042635        JSM PH3      CALL "PHASE III"
25007  042504        JSM A2.01    OP1 = AR2 = LN(ARGUMENT MANTISSA)
25010  005734        LDB EXP&1
25011  174405        ABR 6
25012  024254        ADB P1
25013  140563        JSM AFLTP,I  AR2 = FLOATING POINT EQUIVALENT OF (EXP&1 + 1)
25014  003012        LDA ALN10
25015  004127        LDB AR2A
25016  042440        JSM MPY      RES = (EXP&1 + 1) * LN10
25017  000340        LDA ARES
25020  004336        LDB AOP1
25021  066434        JMP SUB      RES = ((EXP&1 + 1)*LN(10)) - LN(ARGUMENT MANTISSA)
                *
                * ERROR 69: LN OR LOG OF A NEGATIVE NUMBER
                *
25022  030020  E69   STA AR2E     SET UP THE DEFAULT RESULT AS LN(ABS(ARG))
25023  140546        JSM ARERR,I
25024  033071        ASC 1,69
                *
                ****************
                *
                * COS EXECUTION
                *
                ****************
                *
25025  000172  ECOS  LDA AONE     SET UP A FOR CALCULATION OF COSINE.
25026  066030        JMP SIN1     ENTER THE SINE ROUTINE


                *
                ****************
                *
                * SIN EXECUTION
                *
                ****************
                *
25027  000336  ESIN  LDA AOP1     SET UP A FOR CALCULATION OF SINE.
25030  043260  SIN1  JSM TAN1     SAVE A IN A TEMPORARY FLAG AND CALCULATE THE TANGENT
25031  042457        JSM SFG14    SAVE THE USER'S FLAGS AND SET FLAG 14
25032  001741        LDA FLAGS    SIN = TAN / SQR(1 + TAN*TAN)
25033  007013        LDB JADD     COS =  1  / SQR(1 + TAN*TAN)
25034  042323        JSM PYTHA
25035  001752        LDA RESE
25036  170405        AAR 6        FIXED IN MOBA #1191
25037  010177        CPA P0       EXPONENT=0?  (IMPLIES RES=1 OR RES=0)
25040  031755        STA RESM3    YES, FORCE THE LAST 4 DIGITS TO BE ZERO.
25041  042455        JSM RSTFL    RESTORE THE USER'S FLAGS.
25042  001753        LDA RESM1
25043  072413        SZA SIN2
25044  001736        LDA OCTNT    GET THE QUADRANT FROM THE OCTANT INFORMATION.
25045  170500        SAR 1
25046  010177        CPA P0
25047  170201        RET 1        IF THE ARGUMENT WAS IN QUADRANT I, RETURN
25050  010144        CPA P3
25051  170201        RET 1        IF THE ARGUMENT WAS IN QUADRANT IV, RETURN
25052  001752        LDA RESE     OTHERWISE THE ARGUMENT WAS IN QUADRANTS II OR III
25053  073302        SLA *+2,S    AND THE SIGN OF THE RESULT NEEDS TO BE CHANGED.
25054  073201        SLA *+1,C
25055  031752        STA RESE
25056  170201  SIN2  RET 1
                *
                ****************
                *
                * ACS EXECUTION
                *
                ****************
                *
25057  042065  EACS  JSM ASN1     CALCULATE RES = ASN (ARG)
25060  003014        LDA API/2    ACS = PI/2 - ASN (ARG)
25061  042433        JSM AMRES
25062  066315        JMP CTOCU    CONVERT THE RESULT TO CURRENT UNITS
```

```
                         *
                         ****************
                         *
                         * ASN EXECUTION
                         *
                         ****************
                         *
25063  042065  EASN  JSM ASN1     CALCULATE RES = ASN (ARG) = ATN (ARG/SQR(1-ARG*ARG))
25064  066315        JMP CTOCU    CONVERT THE RESULT TO CURRENT UNITS
                         *
25065  042313  ASN1  JSM GET1A    FETCH THE ARGUMENT
25066  042367        JSM XFRRS    RES = ARG
25067  042457        JSM SFG14    SET FLAG 14 FOR POSSIBLE 1/0 IN PYTHA
25070  000336        LDA AOP1
25071  007621        LDB JSUB
25072  042323        JSM PYTHA    RES = ARG/SQR(1-ARG*ARG)
25073  042455        JSM RSTFL    RESTORE THE USER'S FLAGS
25074  042472        JSM RS.01    OP1 = RES
25075  035273        STB OPND1    SET OPND1 TO NEW ARGUMENT ADDRESS
25076  067513        JMP ATN0+1   ENTER ATN ROUTINE JUST AFTER THE ARG HAS BEEN FETCHE
                         *
                         ****************
                         *
                         * TN^ EXECUTION
                         *
                         ****************
                         *
25077  043635  ETN^  JSM RES=1    ASSUME THAT THE POWER IS AN INTEGER (SAVES WORDS)
25100  042313        JSM GET1A    OP1 = ARG.  CONVERT THE ARG TO INTEGER FORMAT IN B.
25101  040644        JSM FIXPT    ON RETURN:  AR2 = FRACTIONAL PART OF ARG.
25102  042422        JSM ZAR2     WAS THERE A FRACTIONAL PART ?
25103  066113        JMP TN^4     YES, COMPUTE TN^(ARG) = EXP(ARG*LN10)
                         *
                         * COMPUTE   TN^(INTEGER)       OR  1E-511 < ABS(ARG) < 1E11
                         *
25104  173003        SOC TN^2     CHECK FOR OVERFLOW ON CONVERSION TO INTEGER.
25105  101273  TN^1  LDA OPND1,I  A = MANTISSA SIGN OF POWER.
25106  067660        JMP EXP4     GIVE APPROPRIATE RESULT.
25107  043750  TN^2  JSM EXSUB    CHECK B FOR BEING A VALID EXPONENT.
25110  066105        JMP TN^1       P+1:  OUT OF RANGE, GIVE PROPER DEFAULT.
25111  035752        STB RESE       P+2:  EXPONENT IN RANGE.  PUT IT ON A MANTISSA OF 1
25112  170201  TN^3  RET 1
                         *
                         * COMPUTE   EXP(ARG*LN10)            1E-511 < ABS(ARG) < 1E11
                         *
25113  001273  TN^4  LDA OPND1
25114  007012        LDB ALN10
25115  042440        JSM MPY      RES = ARG * LN10
25116  042472  TN^5  JSM RS.01    USE OP1 AS THE ARGUMENT FOR EXP.
25117  067633        JMP EXP0     LET EXP0 FINISH THE TASK.
                         *
                         ****************
                         *
                         * LOG EXECUTION
                         *
                         ****************
                         *
25120  140552  ELOG  JSM AGET1,I  FETCH THE ARGUMENT
25121  024254        ADB P1
25122  100001        LDA B,I
25123  010177        CPA P0       IF THE ARGUMENT IS ZERO, GIVE ERROR 70.
25124  067771        JMP E70      BUG SHEET #1787 (LOG(0)=-4.34E511)
25125  170040        TCA
25126  020175        ADA BCD1
25127  024254        ADB P1
25130  160001        IOR B,I
25131  024254        ADB P1
25132  160001        IOR B,I
25133  072010        RZA LOG1     IS THE MANTISSA EXACTLY 1 ?
25134  105273        LDB OPND1,I  YES, RETURN THE ARGUMENT'S EXPONENT AS THE RESULT
25135  174405        ABR 6
25136  140563        JSM AFLTP,I  CONVERT THE EXP. TO A FLOATING POINT NUMBER IN AR2
25137  042366        JSM A2.RS    RES = AR2
25140  101273        LDA OPND1,I  WAS THE ARGUMENT < 0 ?
25141  073051        SLA TN^3
25142  066022        JMP E69      YES, TRY TO GIVE AN ERROR 69
25143  043760  LOG1  JSM LN0      CALCULATE LN(ARG)
25144  000340        LDA ARES     LOG(ARG) = LN(ARG) / LN(10)
25145  007012  LOG2  LDB ALN10
25146  066443        JMP DVD      LET DVD FINISH THE TASK.
                         *
                         ****************
                         *
                         * ^ EXECUTION
                         *
```

```
                     *        THE BASIC STANDARD (DOC.NO. X3J2/74) HAS RESOLVED:  0^0 = 1
                     *        THE 9820/21 RETURNS 0
                     *        THE 9830 GIVES ERROR 53
                     *  THIS ROUTINE RETURNS 1 AS ITS DEFAULT VALUE
                     *  AFTER TRYING TO GIVE ERROR 73.
                     *
                     ****************
                     *
25147   000177  E^      LDA P0
25150   031741          STA FLAGS    CLEAR THE RESULT MANTISSA SIGN TEMPORARY.
25151   140553          JSM AGET2,I  FETCH THE BASE AND POWER
25152   001274          LDA OPND2
25153   031736          STA OCTNT    SAVE OPND2 DURING LN0
25154   001273          LDA OPND1
25155   042505          JSM XFR01    OP1 = BASE
25156   035273          STB OPND1    OPND1 = AOP1
25157   001743          LDA OP1M1    IS THE BASE ZERO ?
25160   072010          RZA ^2       NO, CONTINUE
25161   105274          LDB OPND2,I  YES, CHECK THE MANTISSA SIGN OF THE POWER.
25162   077002          SLB ^1
25163   067661          JMP E76      POWER < 0,  ERROR 76: DEFAULT = +9.99999999999 E511
25164   045274  ^1      ISZ OPND2
25165   111274          CPA OPND2,I
25166   066750          JMP E73      POWER=0, 0^0 IS AN ERROR AS OF 7/28/75, CHECK FLG 14.
25167   066355          JMP CLRES    POWER > 0: RETURN 0
                     *
25170   000172  ^2      LDA AONE     OP2=1,  OP1=BASE (FROM ABOVE)
25171   042510          JSM XFR02
25172   001274          LDA OPND2
25173   040644          JSM FIXPT    B = POWER
25174   173402          SOS *+2      INTEGER OVERFLOW, USE EXP(POWER*LN(BASE))
25175   042422          JSM ZAR2     IS THE POWER AN INTEGER NUMBER ?
25176   066234          JMP ^6       NO, THERE IS A FRAC. PART, USE EXP(POWER*LN(BASE))
25177   035741          STB FLAGS    YES, IT IS AN INTEGER.  SAVE IT IN FLAGS UNTIL LATER
25200   176002          SBP *+2      (THIS PIECE HAS BEEN TESTED FOR POWER = -32768)
25201   174040          TCB          [.999^(-32768) = 1/((.999^16384)^2)]
25202   035736          STB OCTNT    OCTNT = ABS(POWER)
25203   077005  ^3      SLB ^4       IF BIT N IS ONE MULTIPLY THE ACCUMULATOR (OP2)
25204   000336          LDA AOP1     BY BASE^(2^N).
25205   004337          LDB AOP2
25206   042440          JSM MPY
25207   042474          JSM RS.02
25210   001736  ^4      LDA OCTNT    SHIFT THE POWER RIGHT TO THE NEXT BIT POSITION
25211   170500          SAR 1        AND EXIT THE LOOP IF NO BITS REMAIN SET.
25212   031736          STA OCTNT
25213   072407          SZA ^5       OTHERWISE,
25214   000336          LDA AOP1     UPDATE THE BASE REGISTER.
25215   004336          LDB AOP1     OP1 = OP1 * OP1
25216   042440          JSM MPY
25217   042472          JSM RS.01
25220   005736          LDB OCTNT    RECALL THE POWER AND KEEP LOOPING.
25221   066203          JMP ^3
25222   000337  ^5      LDA AOP2
25223   042367          JSM XFRRS    RES = OP2
25224   001741          LDA FLAGS    IF THE ORIGINAL POWER WAS POSITIVE, RES CONTAINS THE
25225   172033          SAP ^RET     CORRECT ANSWER.  OTHERWISE RETURN 1/RES AS THE RESULT
25226   100001  ONE/B   LDA B,I      IF THE DIVISOR HAS AN EXPONENT OF -512 IT WOULD
25227   050164          AND M64      UNDERFLOW TO ZERO, SO 1/0 GENERATES ERROR 76
25230   010263          CPA FLAG     WITH A DEFAULT OF +9.99999999999 E511.
25231   067661          JMP E76
25232   000172          LDA AONE     IF NOT, RES = 1/<B>
25233   066443          JMP DVD
                     *
                     * CALCULATE   EXP(POWER*LN(BASE))
                     *
25234   005742  ^6      LDB OP1E
25235   077211          SLB ^7,C     IS THE BASE POSITIVE ?
25236   035742          STB OP1E     NO, MAKE THE BASE POSITIVE
25237   001274          LDA OPND2    AND MAKE SURE THE POWER IS AN INTEGER
25240   040644          JSM FIXPT    B=INT(POWER), PARITY ONLY, AR2=FRAC(POWER)
25241   000001          LDA B        IF THE POWER WAS ODD, THE FINAL RESULT WILL BE
25242   050254          AND P1       NEGATIVE (IF ERROR 72 DOESN'T OCCUR).  FLAGS
25243   031741          STA FLAGS    CONTAINS THE PROPER MANTISSA SIGN FOR THE RESULT.
25244   042422          JSM ZAR2     IS AR2 = 0 ?
25245   042753          JSM E72      NO, ISSUE AN ERROR MESSAGE IF FLAG 14 = 0
25246   043760  ^7      JSM LN0      YES,(RET 2 FROM ZAR2), BASE > 0, RES = LN(BASE)
                     *
                     * BUG SHEET #1758:  (TN^(-200))^(TN^510) GIVES ERROR 76, OVERFLOW,
                     * BECAUSE POWER*LN10 OVERFLOWS HERE.  COULD USE SFG14 & RSTFL
                     * AROUND THE <LDA OCTNT, JSM AXRES> TO IGNORE THE OVERFLOW BUT WE
                     * DECIDED NOT TO FIX IT SO CLOSE TO RELEASE.
                     *
25247   001736          LDA OCTNT    RECALL OPND2.
25250   042437          JSM AXRES    RES = POWER * LN(BASE)
25251   042116          JSM TN^5
```

MATH OPTION BLOCK - A: EXECUTION

```
25252  001753         LDA RESM1    IF THE MANTISSA IS ZERO DON'T MAKE IT NEGATIVE.
25253  010177         CPA P0       BUG SHEET #1775
25254  066355         JMP CLRES    RES = 0
25255  001752         LDA RESE
25256  061741         IOR FLAGS    PUT THE PROPER SIGN ON THE RESULT.
25257  031752         STA RESE
25260  170201  AHET   RET 1

                      REP 2
25261  000000         OCT 0        WORD RESERVED FOR POST-RELEASE CORRECTIONS.
25262  000000         OCT 0        WORD RESERVED FOR POST-RELEASE CORRECTIONS.
               *
               ****************
               *
               * CSV EXECUTION - CLEAR ALL ALLOCATED SIMPLE VARIABLES
               *
               ****************
               *
25263  000276  ECSV   LDA ADVTB
25264  031733         STA PTR      PTR = ADDRESS OF THE SIMPLE VARIABLE TABLE
25265  000122         LDA P26
25266  031737         STA CNTR1    CNTR1 = 26 (LENGTH OF THE SIMPLE VARIABLE TABLE)
25267  101733  CSV1   LDA PTR,I    A = ADDRESS OF THE NEXT SIMPLE VARIABLE
25270  072402         SZA CSV2     IF A = 0: THE VARIABLE IS NOT ALLOCATED
25271  071603         CLR 4        IT IS ALLOCATED SO CLEAR IT.
25272  045733  CSV2   ISZ PTR      BUMP THE SIMPLE VARIABLE TABLE POINTER
25273  055737         DSZ CNTR1    ANOTHER VARIABLE TO BE PROCESSED ?
25274  066267         JMP CSV1     YES
25275  170201         RET 1        NO, RETURN

               *
               ****************
               *
               * UNITS EXECUTION
               *
               ****************
               *
25276  140450  EUNIT  JSM ACLBI,I  CLEAR THE I/O BUFFER TO BLANKS
25277  001042         LDA UNITS    TRANSFER THE CURRENT UNITS MESSAGE TO THE I/O BUFFER
25300  004313         LDB AIBUF
25301  071401         XFR 2
25302  140433         JSM ALDSP,I  DISPLAY THE I/O BUFFER.
25303  164436         JMP AEPON,I  CHECK FOR PRINT-ALL.  IMPLIED RETURN.

               *
               ****************
               *
               * DEG, RAD, GRAD EXECUTION
               *
               ****************
               *
25304  003015  EDEG   LDA DEG      SET DEGREES (ALSO USED FOR INITIALIZATION)
25305  066311         JMP GRAD1
25306  003053  ERAD   LDA RAD      SET RADIANS
25307  066311         JMP GRAD1
25310  003034  EGRAD  LDA GRAD     SET GRADS
25311  031042  GRAD1  STA UNITS    AS THE CURRENT UNITS AND
25312  170201         RET 1        RETURN WITHOUT DISPLAYING CURRENT UNITS.
```

MATH OPTION BLOCK - A: UTILITY ROUTINES

```
               *
               ****************
               *
               * GET1A:  THIS SUBROUTINE SAVES 4-6 WORDS
               *
               * EXIT CONDITIONS:
               *    OP1 = ARGUMENT
               *    A   = OPND1
               *    B   = AOP1
               *
               ****************
               *
25313  140552  GET1A  JSM AGET1,I  FETCH THE ARGUMENT
25314  066505         JMP XFR01    OP1 = ARGUMENT
```

```
                      *
                      ***************
                      *
                      * CTOCU - CONVERT RES TO CURRENT UNITS
                      *
                      * ENTRY: RES IS IN RADIANS
                      * EXIT : RES IS IN CURRENT UNITS
                      *
                      * THIS IS A THIRD LEVEL SUBROUTINE
                      * EXTERNALS: DVD
                      *
                      ****************
                      *
25315   005042  CTOCU LDB UNITS
25316   017053        CPB RAD      IF CURRENT UNITS = RADIANS, NO CONVERSION NEEDED
25317   170201        RET 1        SO SKIP THE CONVERSION
25320   000340        LDA ARES
25321   024135        ADB P10
25322   066443        JMP DVD
                      *
                      ****************
                      *
                      * PYTHA -  RES = ((RES) OR (1)) / SQR(1 +/- RES*RES)
                      *
                      * ENTRY:  RES = ARGUMENT
                      *
                      * SIN:  A=AOP1  B=JADD
                      * COS:  A=AONE  B=JADD
                      * ASN:  A=AOP1  B=JSUB
                      * ACS:  A=AOP1  B=JSUB
                      *
                      * THIS IS A THIRD LEVEL SUBROUTINE
                      * TEMPORARIES: C, D
                      * EXTERNALS: MPY, ADD, SUB, SQR, DVD
                      *
                      * EXTERNALS FOR EM4: RSTFL, STMAX, ARERR(I)
                      *
                      ****************
                      *
25323   030016  PYTHA STA C
25324   034017        STB D        SAVE A AND B FOR LATER USE
25325   042472        JSM RS.01    OP1 = RES
25326   042440        JSM MPY      RES = RES * RES
25327   000172        LDA AONE
25330   004340        LDB ARES
25331   070017        EXE D        RES = 1 +/- RES * RES
25332   001752        LDA RESE     CHECK THE RESULT EXPONENT FOR ASN, ACS
25333   073410        RLA E71
25334   000340        LDA ARES     RES = SQR(1 +/- RES * RES)
25335   042453        JSM SQR
25336   000016        LDA C
25337   004340        LDB ARES
25340   042443        JSM DVD      RES = ((RES) OR (1)) / SQR(1 +/- RES * RES)
25341   004340        LDB ARES
25342   170201        RET 1
                      *
                      * ERROR 71:  ACS OR ASN OF ARGUMENT <-1 OR >1
                      *
25343   042455  E71   JSM RSTFL    RESET THE USERS FLAGS  AND THEN TEST THE REAL FLG 14.
25344   005742        LDB OP1E     IF FLAG 14 IS SET THE DEFAULT RESULT IS ASN OR
25345   042373        JSM STMAX    ACS OF (SGN(ARG)*1)
25346   140546        JSM ARERR,I  ERROR 71:  ACS OR ASN ARG > 1 OR < -1.
25347   033461        ASC 1,71
                      *
                      ****************
                      *
                      * INRES - RES = INT(RES)
                      *
                      * THIS IS A SECOND LEVEL SUBROUTINE
                      * IT USES ONLY AR2.
                      *
                      ****************
                      *
25350   042470  INRES JSM RS.A2    AR2 = RES
25351   001752        LDA RESE     IF THE EXPONENT IS NEGATIVE, RETURN ZERO
25352   170405        AAR 6
25353   004000        LDB A
25354   176004        SBP *+4
25355   000340  CLRES LDA ARES
25356   071603        CLR 4
25357   170201        RET 1
25360   024155        ADB M11      IF THE EXPONENT IS >= 11, RETURN THE ARGUMENT
25361   176076        SBP *-2
25362   174040        TCB          B = NO. OF DIGITS TO RIGHT SHIFT OUT OF AR2
25363   000177        LDA P0
```

```
25364  075500        MRY           PERFORM THE RIGHT SHIFT
25365  071500        NRM           NORMALIZE THE RESULT
                     *
25366  000127  A2.RS LDA AR2A
25367  004340  XFRRS LDB ARES
25370  071403  XFRET XFR 4
25371  170201        RET 1

                     *
                     ****************
                     *
                     * STMAX:  RES = +/- 9.99999999999 E 511
                     *
                     * ENTRY POINT STMAX-1: STORE + 9.99999999999 E 511 IN RES.
                     *
                     * ENTRY POINT STMAX:   STORE + 9.99999999999 E 511 IN RES IF B<0>=0
                     * ENTRY POINT STMAX:   STORE - 9.99999999999 E 511 IN RES IF B<0>=1
                     *
                     ****************
                     *
25372  004177        LDB P0
25373  000127  STMAX LDA AR2A
25374  071603        CLR 4
25375  044023        ISZ AR2M3
25376  071040        CMY
25377  000212        LDA EMAX
25400  030020        STA AR2E
25401  077002        SLB *+2
25402  044020        ISZ AR2E
25403  066366        JMP A2.RS
                     *
                     ****************
                     *
                     * RAR2 - ROUND AR2
                     *
                     * THIS IS A SECOND LEVEL SUBROUTINE
                     * SEE THE MAINFRAME ROUNDING ROUTINE FOR TEMPORARIES
                     *
                     ****************
                     *
25404  004254  RAR21 LDB P1        ENTRY POINT FOR 1 DIGIT SHIFT AND ROUND.
25405  000177  RAR2B LDA P0        ENTRY POINT FOR <B> DIGIT SHIFT AND ROUND.
25406  164547        JMP ARND,I    USE THE RET 1 FROM ARND,I TO RETURN.
                     *
                     ****************
                     *
                     * ROUND:  FASTER SHIFT & ROUND THAN RAR2B
                     *         B = NO. OF DIGITS TO RIGHT SHIFT
                     *
                     ****************
                     *
25407  000001  ROUND LDA B
25410  050160        AND M16
25411  072402        SZA *+2
25412  004132        LDB P13
25413  000177        LDA P0
25414  075500  FRND  MRY
25415  020151        ADA M5
25416  172403        SAM *+3
25417  004254        LDB P1
25420  071000        MWA
25421  170201  RETN1 RET 1
                     *
                     ****************
                     *
                     * ZAR2 - CHECK FOR AR2 = 0
                     *
                     *   RET 2 IF AR2 = 0
                     *   RET 1 IF AR2 # 0
                     *
                     * THIS IS A FIRST LEVEL SUBROUTINE
                     * IT USES NO TEMPORARIES
                     *
                     ****************
                     *
25422  000021  ZAR2  LDA AR2M1
25423  060022        IOR AR2M2
25424  060023        IOR AR2M3
25425  072074        RZA RETN1
25426  170202        RET 2
```

```
                      *
                      ****************
                      *
                      * CALLS TO +-*/ ROUTINES
                      *
                      * ENTRY CONDITIONS:
                      *   CALL WITH JSM XXX
                      *   A = OPND1
                      *   B = OPND2
                      *
                      * EXIT CONDITIONS:
                      *   RETURNS TO CALLING ROUTINE USING THE RETURN FROM THE IMATH ROUTINE
                      *
                      * THESE ARE SECOND LEVEL SUBROUTINES
                      * SEE THE MAINFRAME MATH ROUTINES FOR TEMPORARIES USED.
                      *
                      ****************
                      *
25427   031273  ADD   STA OPND1
25430   035274        STB OPND2
25431   164554        JMP AADD1,I
                      *
25432   000336  O1MRS LDA AOP1      ENTRY POINT FOR RES=OP1-RES
25433   004340  AMRES LDB ARES      ENTRY POINT FOR RES=<A>-RES
25434   031273  SUB   STA OPND1
25435   035274        STB OPND2
25436   164555        JMP ASUB1,I
                      *
25437   004340  AXRES LDB ARES      ENTRY POINT FOR RES=<A>*RES
25440   031273  MPY   STA OPND1
25441   035274        STB OPND2
25442   164556        JMP AMUL1,I
                      *
25443   031273  DVD   STA OPND1
25444   035274        STB OPND2
25445   024254        ADB P1
25446   100001        LDA B,I
25447   072003        RZA DVD1
25450   105273        LDB OPND1,I  DIVISOR = 0:  RES = +/-9.99999999999 E511
25451   066373        JMP STMAX
25452   164557  DVD1  JMP ADIV1,I
                      *
25453   031273  SQR   STA OPND1     (COULD BE MOVED INTO PYTHA)
25454   164561        JMP ASQR1,I
                      *
25455   001730  RSTFL LDA UFLAG     RESTORE THE USER'S FLAGS
25456   066462        JMP CAF1
                      *
                      * SFG14 USES UFLAG
                      *
25457   001506  SFG14 LDA FLAGS     SAVE THE USER'S FLAGS AND SET FLAG 14
25460   031730        STA UFLAG
25461   060145        IOR P2
25462   031506  CAF1  STA FLAGS
25463   170201        RET 1
                      *
                      ****************
                      *
                      * TRANSFER SUBROUTINES FOR OP1, OP2, RES, AR1, AR2
                      *
                      * GENERAL FORM OF LABEL:  FF.TT,  WHERE FF=FROM AND TT=TO
                      *
                      ****************
                      *
25464   000336  O1.A2 LDA AOP1
25465   066477        JMP XFRA2
                      *
25466   000337  O2.A2 LDA AOP2
25467   066477        JMP XFRA2
                      *
25470   000340  RS.A2 LDA ARES
25471   066477        JMP XFRA2
                      *
25472   000340  RS.O1 LDA ARES
25473   066505        JMP XFRO1
                      *
25474   000340  RS.O2 LDA ARES
25475   066510        JMP XFRO2
                      *
25476   000345  A1.A2 LDA AR1A
25477   004127  XFRA2 LDB AR2A
25500   066370        JMP XFRET
                      *
25501   000127  A2.A1 LDA AR2A
25502   004345  XFRA1 LDB AR1A
```

MATH OPTION BLOCK - A: UTILITY ROUTINES

```
25503  066370        JMP XFRET
                *
25504  000127  A2.01 LDA AR2A
25505  004336  XFR01 LDB AOP1
25506  066370        JMP XFRET
                *
25507  000127  A2.02 LDA AR2A
25510  004337  XFR02 LDB AOP2
25511  066370        JMP XFRET
                *
25512  000172  OP1=1 LDA AONE
25513  066505        JMP XFR01
```

MATH OPTION BLOCK - A: "CORDIC" SUBROUTINES

```
                *
                ********************
                *
                * PH1 - "PHASE I": CORDIC SUBROUTINE USED BY TAN & EXP
                *
                * TAN: SUMMATION EQUATION
                *
                * EXP: SUMMATION EQUATION
                *
                ****************
                *
                * INITIAL VALUES
                *
                *        TAN              EXP
                *
                * PTR     ABETA-4*CNTR1   ABETA
                * CNTR1   1-6              6
                *
                ****************
                *
25514  000335  PH1   LDA ADSTK     SET UP THE DIGIT STACK
25515  031726        STA DIGIT
25516  071605        CLR 6         CLEAR Q0 - Q5 TO ZERO
                *
25517  001733  PH1.A LDA PTR       MOVE NEXT CONSTANT TO AR1
25520  042502        JSM XFRA1
                *
25521  071040  CMY   CMY           DETERMINE THE NEXT QJ
25522  075041        FDV
25523  135726        STB DIGIT,I   SAVE QJ
                *
25524  071040        CMY           RESTORE THE REMAINDER
25525  071200        FXA
25526  000177        LDA P0
25527  075541        MLY           LEFT SHIFT THE REMAINDER 1 DIGIT
                *
25530  042422        JSM ZAR2      IS AR2 = 0 ?
25531  066534        JMP PH1.B     NO
                *
25532  145726        ISZ DIGIT,I   YES, INCREMENT THE LAST QJ
25533  170201        RET 1
                *
25534  045726  PH1.B ISZ DIGIT     BUMP THE QJ POINTER
25535  001733        LDA PTR
25536  020143        ADA P4
25537  031733        STA PTR       BUMP THE CONSTANT ADDRESS
25540  055737        DSZ CNTR1     MORE CONSTANTS ?
25541  066517        JMP PH1.A
25542  170201        RET 1         NO
                *
                ****************
                *
                * PH2 - "PHASE II": CORDIC SUBROUTINE USED BY TAN & ATN
                *
                * TAN: Y = Y + X
                *        X = X - 10^(-2J) * Y
                *
                * ATN: Y = Y - X
                *        X = X + 10^(-2J) * Y
                *
                ****************
                *
                * INITIAL VALUES
                *
                *        TAN   ATN
                *
                * SHIFT  10    -2*EXP&1  USED FOR SHIFTING Y IN THE 2ND EQUATION
                * DJ     -2     2        INCREMENT/DECREMENT FOR SHIFT
```

```
                         * C       CDC   CMY
                         * D       CMY   CDC
                         * LOOP#   1-6    13
                         *
                         ****************
                         *
25543   031731   PH2     STA SHIFT     SHIFT = SHIFT FACTOR FOR Y
25544   035732           STB DJ        DJ = INCREMENT/DECREMENT FOR TWOJ
                         *
25545   042512           JSM OP1=1     SET X0 = 1
                         *
25546   001732           LDA DJ
25547   010146           CPA M2        TAN ?
25550   066603           JMP PH2.D     YES
                         *
25551   042466   PH2.A   JSM O2.A2     NO, AR2 = OP2
25552   070016           EXE C         CDC FOR TAN, CMY FOR ATN
25553   000336           LDA AOP1      AR1 = OP1
25554   042502           JSM XFRA1
25555   071200           FXA           Y = Y +/- X
25556   001732           LDA DJ
25557   010146           CPA M2        TAN ?
25560   066566           JMP PH2.B     YES
25561   072705           SDC PH2.B     OVERFLOW ?
                         *
25562   042422           JSM ZAR2      YES, IS AR2 = 0 ?
25563   066607           JMP PH2.E     NO
                         *
25564   155726           DSZ DIGIT,I   YES
25565   170201           RET 1
                         *
25566   070016   PH2.B   EXE C         CDC FOR TAN; CMY FOR ATN
25567   042366           JSM A2.RS     NO OVERFLOW, RES = AR2
25570   042466           JSM O2.A2     AR2 = OP2
                         *
25571   005731           LDB SHIFT     RIGHT SHIFT AR2 "SHIFT" PLACES AND ROUND
25572   042407           JSM ROUND     LEAVE IN UNNORMALIZED FORM IN AR2.
                         *
25573   070017           EXE D         CMY FOR TAN, CDC FOR ATN
25574   071200           FXA           X = X -/+ 10^(-2J) * Y
25575   042504           JSM A2.01     OP1 = AR2
25576   042474           JSM RS.02     OP2 = RES
                         *
25577   155726           DSZ DIGIT,I   QJ = QJ -1; QJ = 0 ?
25600   066551           JMP PH2.A     NO
25601   066607           JMP PH2.E     YES; QJ IS NEVER ZERO FOR ATN.
                         *
25602   042466   PH2.C   JSM O2.A2     AR2 = OP2
                         *
25603   042404   PH2.D   JSM RAR21     RIGHT SHIFT AR2 ONE PLACE AND ROUND.
                         *
25604   042507           JSM A2.02     OP2 = AR2
                         *
25605   101726           LDA DIGIT,I   QJ = 0 ?
25606   072043           RZA PH2.A     NO
                         *
25607   001731   PH2.E   LDA SHIFT     YES, QJ=0
25610   021732           ADA DJ
25611   031731           STA SHIFT     SHIFT = SHIFT + DJ
                         *
25612   055740           DSZ LOOP#     LOOP# = LOOP# -1; LOOP# = 0 ?
25613   066615           JMP PH2.F     NO
25614   170201           RET 1         YES
                         *
25615   055726   PH2.F   DSZ DIGIT     DIGIT = DIGIT - 1
                         *
25616   001732           LDA DJ
25617   010146           CPA M2        TAN ?
25620   066602           JMP PH2.C     YES
                         *
25621   001747           LDA OP2M1     NO, D1 OF OP2 = 0 ?
25622   170513           SAR 12
25623   072405           SZA PH2.G     YES
                         *
25624   042464           JSM O1.A2     AR2 = OP1
25625   042404           JSM RAR21     RIGHT SHIFT AR2 ONE PLACE AND ROUND.
25626   042504           JSM A2.01     OP1 = AR2
25627   066551           JMP PH2.A
                         *
25630   042466   PH2.G   JSM O2.A2     AR2 = OP2
25631   000177           LDA P0
25632   075541           MLY           LEFT SHIFT AR2 ONE PLACE.
25633   042507           JSM A2.02     OP2 = AR2
25634   066551           JMP PH2.A
```

```
                     *
                     ****************
                     *
                     * PH3 - "PHASE III":  CORDIC SUBROUTINE USED BY ATN & LN
                     *
                     *    ATN:  SUMMATION EQUATION
                     *
                     *    LN :  SUMMATION EQUATION
                     *
                     ****************
                     *
                     * INITIAL VALUES
                     *
                     *        ATN     LN
                     *
                     * LOOP# 7-12     7
                     * PTR   ALFAA  BETAA
                     *
                     ****************
                     *
25635  031740  PH3   STA LOOP#
25636  170040        TCA
25637  020132        ADA P13
25640  031737        STA CNTR1
25641  035733        STB PTR
                     *
25642  000127        LDA AR2A
25643  071603        CLR 4
                     *
25644  000335        LDA ADSTK
25645  031726        STA DIGIT
25646  004254        LDB P1
                     *
25647  101726  PH3.A LDA DIGIT,I  TRANSFER LOW ORDER DIGITS TO AR2
25650  170040        TCA
25651  075500        MRY
25652  045726        ISZ DIGIT
25653  055740        DSZ LOOP#
25654  066647        JMP PH3.A
                     *
25655  000177        LDA P0
25656  075500        MRY
                     *
25657  001733        LDA PTR
                     *
25660  031733  PH3.B STA PTR
25661  042502        JSM XFRA1
                     *
25662  105726        LDB DIGIT,I
25663  174040        TCB
25664  075000        FMP
25665  045726        ISZ DIGIT
                     *
25666  004254        LDB P1
25667  055737        DSZ CNTR1
25670  066672        JMP *+2
25671  066676        JMP PH3.D
                     *
25672  042414        JSM FRND
25673  001733  PH3.C LDA PTR
25674  020150        ADA M4
25675  066660        JMP PH3.B
                     *
25676  072402  PH3.D SZA PH3.E
25677  042414        JSM FRND
25700  071500  PH3.E NRM          NOTE: THIS SUBROUTINE IS CALLED FROM "TAN10" TWICE.
25701  174040        TCB
25702  174605        SBL 6
25703  034020        STB AR2E
25704  170201        RET 1
                     *
                     ****************
                     *
                     * PH4 - "PHASE IV":  CORDIC SUBROUTINE USED BY EXP & LN
                     *
                     * RECURRENCE EQUATION:  Y = Y + 10^(-J) * Y
                     *
                     * EXP:  Y0 = 1
                     * LN:   Y0 = ARGUMENT
                     *
                     ****************
                     *
                     * INITIAL VALUES
                     *
                     *        EXP    LN
```

MATH OPTION BLOCK - A: "CORDIC" SUBROUTINES

```
                        * DIGIT  ADSTK + 12
                        * SHIFT   12     0
                        * DJ      -1     1
                        * AR2      1    ARG
                        *
                        ****************
                        *
25705  031731  PH4     STA SHIFT     SAVE THE SHIFT FACTOR (J, NOT 2J)
25706  035732          STB DJ        SAVE THE SHIFT FACTOR INCREMENT/DECREMENT
25707  000132          LDA P13
25710  031740          STA LOOP#     LOOP IN PH4 13 TIMES
25711  042501          JSM A2.A1     AR1 = AR2
25712  001732  PH4.A   LDA DJ
25713  010254          CPA P1        LN ?
25714  066717          JMP PH4.C     YES
25715  101726  PH4.B   LDA DIGIT,I   NO, EXP:  IS QJ = 0 ?
25716  072410          SZA PH4.E
25717  005731  PH4.C   LDB SHIFT     NO, QJ # 0
25720  076402          SZB PH4.D     IF TWOJ=0, DON'T RIGHT SHIFT AND ROUND
25721  042407          JSM ROUND     RIGHT SHIFT AR2 "SHIFT" PLACES AND ROUND
25722  071700  PH4.D   CDC
25723  071200          FXA           AR2 = Y + 10^(-J) * Y
25724  072711          SDC PH4.F     OVERFLOW ?
25725  042476          JSM A1.A2     YES, AR2 = AR1 (RESTORE TO PREVIOUS VALUE)
25726  001731  PH4.E   LDA SHIFT     INCREMENT/DECREMENT THE SHIFT FACTOR
25727  021732          ADA DJ
25730  031731          STA SHIFT
25731  055726          DSZ DIGIT
25732  055740          DSZ LOOP#     DECREMENT THE LOOP COUNTER
25733  066712          JMP PH4.A
25734  170201          RET 1
25735  155726  PH4.F   DSZ DIGIT,I   NO OVERFLOW, DECREMENT QJ
25736  000000          NOP           DON'T TEST FOR QJ=0 NOW (ITS DONE AT PH4.B)
25737  042501          JSM A2.A1     AR1 = AR2
25740  066715          JMP PH4.B
                       UNS
                       REP 7
25741  000000          OCT 0         WORD RESERVED FOR POST-RELEASE CORRECTIONS.
25742  000000          OCT 0         WORD RESERVED FOR POST-RELEASE CORRECTIONS.
25743  000000          OCT 0         WORD RESERVED FOR POST-RELEASE CORRECTIONS.
25744  000000          OCT 0         WORD RESERVED FOR POST-RELEASE CORRECTIONS.
25745  000000          OCT 0         WORD RESERVED FOR POST-RELEASE CORRECTIONS.
25746  000000          OCT 0         WORD RESERVED FOR POST-RELEASE CORRECTIONS.
25747  000000          OCT 0         WORD RESERVED FOR POST-RELEASE CORRECTIONS.


                        *
                        * ERROR 73:  0^0
                        *
25750  043635  E73     JSM RES=1     DEFAULT VALUE IS 1
25751  140546          JSM ARERR,I
25752  033463          ASC 1,73


                        *
                        * ERROR 72:  NEGATIVE BASE TO A NON-INTEGER POWER
                        *
25753  000177  E72     LDA P0        IF FLAG 14 = 1, RETURN TO E^.2 TO CALCULATE
25754  031741          STA FLAGS     (ABS(BASE))^POWER
25755  140546          JSM ARERR,I   ERROR 72:  NEGATIVE BASE TO A NON-INTEGER POWER
25756  033462          ASC 1,72
```

MATH OPTION BLOCK - A: MISC.

```
                        *
                        *
                        * EXECUTION JUMP TABLE
                        *
                        *
25757  025757  EXTBL   DEF *
25760  024257          DEF ETAN
25761  024510          DEF EATN
25762  024632          DEF EEXP
25763  024757          DEF ELN
25764  025027          DEF ESIN
25765  025025          DEF ECOS
25766  025063          DEF EASN
25767  025057          DEF EACS
25770  025077          DEF ETN^
25771  025120          DEF ELOG
```

MATH OPTION BLOCK - A: MISC.

```
02858000 25772  025147        DEF EA
02859000 25773  025263        DEF ECSV
02860000 25774  025276        DEF EUNIT
02861000 25775  025304        DEF EDEG
02862000 25776  025306        DEF ERAD
02863000 25777  025310        DEF EGRAD

02865000        024635  RES=1 EQU EXP1
02866000        025722  CDC   EQU PH4.D    CONSTANT USED BY PH2.
02867000        025304  INITA EQU EDEG

02869000                * FILL IN BASEPAGE LINKS TO STMAX.

02871000 00564                ORG ASTMA
02872000 00564  025373        DEF STMAX
02873000 00565  025372        DEF STMAX-1

02875000                      END
```

END OF PASS 2 NO ERRORS DETECTED

MATH OPTION BLOCK B (MB16) -.

```
02058000                * FULL PRECISION NUMBER:  INTERNAL FORMAT

02060000                *   EEEE EEEE EEXX XXXS   10 BIT 2'S COMP. EXP., 5 UNUSED BITS.
02061000                *                         MANTISSA SIGN (0=+ 1=-)
02062000                *                         EXP. RANGE = -511 TO +511
02063000                *    D1 . D2   D3   D4    BCD DIGITS 1-4

02065000                *    D5   D6   D7   D8    BCD DIGITS 5-8

02067000                *    D9   D10  D11  D12   BCD DIGITS 9-12
02069000                *
02070000                ****************
02071000                *
02072000                * READ/WRITE AREAS

02074000        077042  UNITS EQU STEAL    DEDICATED WORD FOR MOBA
02075000        077043  SEEDL EQU STEAL+1     DEDICATED WORD FOR MOBB IS USED TO STORE RUN LINK
02076000        077752  RESE  EQU RES      FULL PRECISION RESULT REGISTER
02077000        077753  RESM1 EQU RES+1
02078000        077754  RESM2 EQU RES+2
02079000        077755  RESM3 EQU RES+3
02080000                *
02081000        077756  ZE    EQU MRW1     FULL PRECISION MATH TEMPORARY
02082000        077757  ZM1   EQU MRW1+1
02083000        077760  ZM2   EQU MRW1+2
02084000        077761  ZM3   EQU MRW1+3
02085000                *
02086000        077762  MT1   EQU MRW1+4
02087000        077763  MT2   EQU MRW1+5
02088000        077764  MT3   EQU MRW1+6
02089000        077765  MT4   EQU MRW1+7
02090000        077766  MT5   EQU MRW1+8
02091000        077767  MT6   EQU MRW1+9
02092000                *
02093000        000345  AR1A  EQU ADR1     ADDRESS OF AR1
02094000        077770  AR1E  EQU AR1      EXPONENT WORD OF AR1
02095000        077771  AR1M1 EQU AR1E+1   1ST MANTISSA WORD OF AR1
02096000        077772  AR1M2 EQU AR1E+2   2ND MANTISSA WORD OF AR1
02097000        077773  AR1M3 EQU AR1E+3   3RD MANTISSA WORD OF AR1
02098000                *
02099000        077774  RNDT2 EQU MRW2     NORMALIZE COUNT FOR COMPARISON IN ROUND
02100000        077775  RNDT1 EQU MRW2+1   SHIFT COUNTER FOR ROUND
02101000        077776  NRMFL EQU MRW2+2   NORMALIZATION FLAG FOR ROUND
02102000        077777  STBIT EQU MRW2+3   "STICKY BIT" FOR ROUND
02103000                *
02104000        000127  AR2A  EQU ADR2     ADDRESS OF AR2
02105000        000020  AR2E  EQU AR2      EXPONENT WORD OF AR2
02106000        000021  AR2M1 EQU AR2E+1   1ST MANTISSA WORD OF AR2
```

MATH OPTION BLOCK B (MB16) ·

```
            000022  AR2M2 EQU AR2E+2    2ND MANTISSA WORD OF AR2
            000023  AR2M3 EQU AR2E+3    3RD MANTISSA WORD OF AR2
                    *
                    *
            000175  BCD1  EQU B10K      BCD 1000
                    *
                    *  EQU'S FOR SUBROUTINE TO FIN D LOCATION OF FIRST ELEMENT
                    *  OF AN ARRAY, NUMBER OF ELEMENTS IN H THE ARRAY , AND
                    *  IT'S PRECISSION
            077734  VAL   EQU T20     LOCATION OF FIRST ELEMENT OF AN ARRAY
            077733  VALN  EQU T19     NUMBER OF ELEMENTS OF THE ARRAY
                    *
                    ****************
                    *
                    * EQUATES

                    *

                    *
                    ****************
                    *
                    * MAINFRAME - OPTION BLOCK INTERFACE

      26000 026053        DEF EXECB     ADDRESS OF THE EXECUTION ROUTINE
      26001 026032        DEF COMPB     ADDRESS OF THE COMPILE TABLE
      26002 026016        DEF RCTBL     ADDRESS OF TH E REVERS E COMPILE TABLE
      26003 177777        DEC -1      NO COMMAND TABLES
      26004 026007        DEF INITB     ADDRESS OF THE INITIALIZATION ROUTINE
      26005 000016        DEC 14      MOHB ROM ID
                    *
                    ****************
                    *
                    * CONSTANTS, LINKAGES

                    *
      26006 077327  ASEED DEF SEED      ADDRESS OF SEED

                    *
                    ****************
                    *
                    * INITIALIZATION
                    *
                    * ACCESSED BY JSM

                    *
                    *    STEAL 5 R/W WORDS POINT AT FIRST ONE BY SEED
                    *   RESERVE 4 WORDS OF R/W MEMORY AS A SEED FOR RANDOM
                    *   NUMBERS GENERATION
                    *    THE LAST STOLEN WORD WILL CONTAIN RLINK CONTENTS FOR RESETTING
                    *    SEED OF RANDOM GENERATOR ON RUN
                    *
      26007 000133  INITB LDA P12
      26010 061062        IOR ROMWD     ROMWD BITS FOR MOBA,MOBB
      26011 031062        STA ROMWD
                    *
                    *
      26012 003075  INTO  LDA ACR/D
      26013 007006  INTN  LDB ASEED
      26014 071403        XFR 4       STORE PI/2 AS A DEFAULT SEED(INITIAL SEED)
      26015 170201  IEND  RET 1

                    *
                    ****************
                    *
                    * COMMAND TABLE
                    *
                    * ACCESSED BY LOOK-UP
```

```
                        *
                        * COMMAND EXECUTION ROUTINES ACCESSED BY JSM

                        *
                        ****************
                        *
                        * REVERSE COMPILE
                        *
                        * ACCESSED BY JSM
                        *   A = ROM'S INTERNAL CODE
                        *   B = ROM'S ID CODE
                        *
                        * MUST RETURN:
                        *   ASCII = CHARACTER POINTER TO RIGHT HAND END OF MNEMONIC.
                        *   GUIDE = AAAA BBBB AAAA BBBB
                        *           AAAA = OPERATOR PRIORITY
                        *           BBBB = CLASS:
                        *                  1 : OPERAND
                        *                  2 : UNARY OPERATOR
                        *                  3 : BINARY OPERATOR

                        *
                        ****************
                        *
                        * REVERSE COMPILE TABLE

                        *                                                  CC PP  CC PP
                        *
26016  161342  RCTBL OCT 161342    ABS  , SGN    14  2 , 14  2
26017  161342        OCT 161342    INT  , FRC    14  2 , 14  2
26020  161223        OCT 161223    RND  , MOD    14  2 ,  9  3
26021  161342        OCT 161342    MAX  , MIN    14  2 , 14  2
                        *
                        ****************
                        *
                        * COMPILE TABLE

                        *                                       CLASS  TOKEN
26022  004032        OCT 004032       8        26       MIN
26023  004032        OCT 004032       8        26       MAX
26024  003013        OCT 003013       6        11       MOD
26025  004053        OCT 004053       8        43       RND
26026  004053        OCT 004053       8        43       FRC
26027  004053        OCT 004053       8        43       INT
26030  004053        OCT 004053       8        43       SGN
26031  004053        OCT 004053       8        43       ABS
                        *
                        *  THE FOLLOWING IS A LOWER CASE MNEMONIC TABLE
                        *
26032  060542  COMPB DEC   24930      A    B
26033  071601        DEC   29569      S    (1)
26034  071547        DEC   29543      S    G
26035  067202        DEC   28290      N    (2)
26036  064556        DEC   26990      I    N
26037  072203        DEC   29827      T    (3)
26040  063162        DEC   26226      F    R
26041  061604        DEC   25476      C    (4)
26042  071156        DEC   29294      R    N
26043  062205        DEC   25733      D    (5)
26044  066557        DEC   28015      M    O
26045  062206        DEC   25734      D    (6)
26046  066541        DEC   28001      M    A
26047  074207        DEC   30855      X    (7)
26050  066551        DEC   28009      M    I
26051  067210        DEC   28296      N    (8)
26052  100000        OCT 100000      END OF TABLE
                        *
                        ****************
                        *
                        * MAIN EXECUTION ROUTINE
                        *
                        * ACCESSED BY JMP
                        *
                        * EXIT BY JMP AINTX,I FROM "EXIT"
```

MATH OPTION BLOCK 8 (MB16)

```
26053  023057  EXECB ADA ETBL
26054  100000        LDA A,I
26055  140000        JSM A,I       EXECUTE THE STATEMENT
26056  164366        JMP ARAP,I    GO TO RAP UP ROUTINE

                     *
                     * EXECUTION JUMP TABLE
                     *
26057  026057  ETBL  DEF *
26060  026402        DEF EABS
26061  026367        DEF ESGN
26062  026431        DEF EINT
26063  026315        DEF EFRAC
26064  026210        DEF ERND
26065  026244        DEF EMOD
26066  026104        DEF EMAX0
26067  026102        DEF EMIN

                     *
                     *
                     * CONSTANTS DEFINITIC', TABLE
                     *
                     *
26070  026071  A29   DEF *+1
26071  000100        OCT 000100    29. IS USED AS A MULTIPLIER FOR RANDOM NUMBER
26072  024400        OCT 024400
26073  000000        OCT 000000
26074  000000        OCT 000000
26075  026030  ACR/D OCT 24030     ADRESS OF PIE/180 ON JO PAGE AS OF 9/10/75
26076  177767  M9    DEC -9
                     *
                     *
26077  077711  FT1A  DEF T1        ADDRESS OF T1
26100  077715  FT5A  DEF T5        ADDRESS OF T5
26101  077721  FT9A  DEF T9
                     *
                     *
                     *******                    *******
                     *
                     *  SHARED TEMPORARIES BLOCK ADDRESSES*
                     *                                  *.
                     *******                    *******
                     *
                     *
                     *
                     *
                     *  EQU'S AND CONSTANTS FOR FFM
                     *
       077217        .WPRT EQU CSTMP+1
                     *
                     *
                     *   THIS ROUTINE IS THE MAIN ] MAX/MIN EXECUTION
                     *   FOR EACH ELEMENT IN THE LIST OF PARAMETERS; IT FIiiDS THE
                     *    VALUE OF VAL AND VALN FOR THAT ELEMENT
                     *   WHEN LIST EXHAUSTED IT RETURNS THE VALUE OF MAX/MIN IN <RES>
                     *
                     *
                     *
26102  000257  EMIN  LDA M1
26103  067105        JMP *+2
26104  000254  EMAX0 LDA P1
26105  031716        STA T6     INDICATOR OF A MAX OR MIN IS T6 BEING +1 OR -1
26106  000254        LDA P1
26107  031717        STA T7     T7 INDICATES THE NUMBER OF TIMES WE ENTER MAXX
                     *
26110  140610        JSM ACOUN,I    COUNT PARAMETERS; FAP1 POINTS TO FIRST
26111  001272        LDA FAP1
26112  031722        STA T10     SAVE FAP1
                     *
26113  040751  EMAX1 JSM NGET     GET THE FIRST PPARAMETER IF SIMPLE VARIABLE
26114  067125        JMP EMAX3    FIND THE ARRAYS LOCATION AND NUMBER OF VARIABLES
                     *
                     *
                     *  WE HAVE A SINGLE ELEMENT ONLY IF NGET RETURNS TO NEXT LOCATION
                     *  (P+2); B POINTS TO THE EQUIVALENT FULL PRECISSION VALUE
                     *
                     *  WE SHOUL STORE THE FOLLOWING VALUES
```

```
                  *      VAL = B
                  *      VALN=  1
                  *
26115  035734            STB VAL
26116  000254            LDA P1
26117  031733            STA VALN
                  *
26120  043137     EMAX2  JSM MAXX     FIND THE MAX/MIN OF THE ARRAY
26121  000254            LDA P1      TO BUMP ONE PARAMETER AT A TIME
26122  140607            JSM ABUMP,I     BUMP ONE PARAMETER; IF NO MORE RET P+1
26123  067127            JMP MEXIT        *
                  * IF ANY AT ALL RET P+2 ; GO BACK TO NGET
26124  067113            JMP EMAX1
                  *
                  *
26125  043171     EMAX3  JSM VMAX     FIND VAL; VALN; AND VALP
26126  067120            JMP EMAX2
                  *
26127  001274     MEXIT  LDA OPND2
26130  004340            LDB ARES
26131  071403            XFR 4      TRANSFER <T1,..,T4> WHICH CONTAINS ANSWER FOUND
                  *THROUGH  USING MAXX ROUTINE TO <RES>
26132  001722            LDA T10
26133  031263            STA AP1        AP1 POINTS TO FIRST ELEMENT ON STACK
26134  040615            JSM ABSAD      TO UPDATE AP1(UNSTACK)
26135  031263            STA AP1        A CONTAINS AP1 AFTER UNSTACKING ALLL & TRANSFER TO A.
                  *
26136  170201            RET 1
                  *
                  *
                  ********************************
                  *
                  *  MAX/MIN SUBROUTINE     ********
                  *
                  ***********          ***********
                  *
                  *  ASSUME THAT VAL CONTAINS THE ADDR. OF FIRST ELEMENT OF THE ARRAY
                  *             VALN ''       THE NUMBER OF ELEMENTS OF THE ARRAY
                  *
                  *  <T1,.. T4 > CONTAINS THE FIRST ELEMENT OF THE ARRAY ON
                  *  ENTRING MAXX; LATER ON IT WILL CONTAIN THE MAX/MIN AFTER
                  *  EACH STEP OF COMPARISON DURING LOOKING FOR MAX/MIN
                  *
                  *  PROCEDURE:  SIMPLE LINEAR SEARCH ALGORITHM IS USED
                  *              AT  START WE ASSUME THAT THE FIRST ELEMENT OF THE
                  *             ARRAY IS THE MAX/MIN ELEMENT.
                  *            WE COMPARE THAT ELEMENT WITH EACH ELEMENT OF THE
                  *          ARRAY; IF WE FIND A LARGER/SMALLER ELEMENT E; WE REPALCE
                  *         THE MAX/MIN BY THAT ELEMENT;PROCEED TILL YOU EXHAUST
                  *     ALL THE ELEMENTS IN THE ARRAY.
                  *
26137  055717     MAXX   DSZ T7    IF T7 WAS 1 MEANS THAT THIS IS THE FIRST TIME WE ENTER
26140  067151            JMP MAX4   WE ASSUME A MAX/MIN ALREADY IN OPND2
                  *
26141  001734            LDA VAL      POINT TO FIRST ELEMENT TO BE CHECKED
26142  031274            STA OPND2     POINT TO ELEMENT AS MAX/MIN
                  *  PRECISSION
                  *  THIS <T1,..,T4> IS ASSUMED TO BE MAX/MIN UNLESS THE MAXX SUB
                  *  ROUTINE CONTINUES
                  *MAX1 IS WHERE WE SHOULD START IF WE ARE ENTRING THE SUBROUTINE
                  *  AFTER THE FIRST TIME
                  *
26143  055733     MAX1   DSZ VALN IF VALN IS 0 ; LIST IS ALREADY EXHAUSTED
26144  067146            JMP *+2
26145  067170            JMP MOUT   FOUND THE MAX/MIN; CONTINUE AT MOUT
                  *
26146  005734            LDB VAL
26147  024150            ADB M4     DECREMENT POINTER TO GET NEXT FLT. NUMBER
26150  035734            STB VAL
26151  005734     MAX4   LDB VAL
26152  035273            STB OPND1     POINT TO CURRENT ELEMENT AS OPND1
                  *
26153  140562            JSM ATSU1,I   COMPARE NEW ELEMENT WITH ASSUMED MAX/MIN
                  *
                  *
                  *  IF NEW = OLD      B=0
                  *  IF NEW>  OLD      B=1
                  *  IF NEW < OLD      B=3
                  *
26154  076467            SZB MAX1        OLD = NEW KEEP OLD
26155  001716            LDA T6
26156  010257            CPA M1
26157  067165            JMP MIN1       T6 INDICATES THAT WE ARE HANDLING A MIN
                  *  AT MIN1
```

```
                     *
                     *  OTHERWISE WE ARE HANDLING A MAX NEXT
                     *
26160   014144            CPB P3
26161   067143            JMP MAX1    NEW < OLD KEEP OLD
                     *
                     *
26162   001273       MAX2 LDA OPND1
26163   031274            STA OPND2   NEW > OLD  SAVE AS NEW MAX
                     *
26164   067143            JMP MAX1        CONSIDER NEXT ELEMENT
                     *
                     *  THE CASE OF HANDLING A MIN
                     *
26165   014254       MIN1 CPB P1
26166   067143            JMP MAX1     NEW > OLD ; SAVE OLD
26167   067162            JMP MAX2
                     *
26170   170201       MOUT RET 1

                     *
                     *
                     *  VMAX IS A SUBROUTINE TO FIND STARTING ADDRESS AND NUMBER OF
                     *   WORDS ( 4 TIMES THE NUMBER OF ELEMENTS OF AN ARRAY)
                     *
26171   001272       VMAX LDA FAP1
26172   104000            LDB A,I
26173   174513            SBR 12      GET TYPE
26174   014131            CPB P14     ENTIRE ARRAY?
26175   067177            JMP *+2
26176   064733            JMP E32       EXPECTING NUMERIC DATA
                     *
26177   020145            ADA P2
26200   104000            LDB A,I    B CONTAINS A POINTER TO STARTING ADDRESS
26201   024147            ADB M3
26202   035734            STB VAL
26203   020254            ADA P1
26204   104000            LDB A,I
26205   174501            SBR 2   DIVIDE BY 4
26206   035733            STB VALN     IS THE NUMBER OF ELEMENTS IN THE ARRAY
26207   170201            RET 1
                     *
                     *
                     ***************************************
                     *
                     *  RANDOM VALUE FUNCTION    ***********
                     *
                     ***************************************
                     *
                     * ERND IS THE NAME; RND IS KEY  MNEMONIC
                     *
                     *  ENTRY : RND X
                     *
                     *  EXIT  : A RANDOM NUMBER BETWEEN 0 AND 1
                     *
                     *  PROCEDURE: 1. IF RND  THE FRACTIONAL PART OF 29*SEED IS
                     *                              MULTIPLIED BY 29; THEN IT'S FRACTIONAL
                     *                              PART IS TAKEN TO BE THE NEW SEED AND
                     *                              THE RANDOM NUBER.
                     *                 2. IF RND(X)   THE ARG. X IS TAKEN AS SEED AND CONTINUE
                     *                              AS IN 1.
                     *  REMARK:
                     *           DUE TO THE POSSIBLITY OF D11,D12 OF THE RANDOM NUMBER
                     *           BEING ZERO DUE TO FRACTIONAL SEPARATION D5,D6 ARE
                     *           PACKED IN PLACE OF D11,D12 OF THE NUMBER
                     *
26210   140552       ERND JSM AGET1,I       GET THE OPERAND
26211   101273            LDA OPND1,I       EXPONENT WORD
26212   073005            SLA HERO     IS ARG.>=0
                     *
26213   001273            LDA OPND1
26214   007006            LDB ASEED
26215   071403            XFR 4          <OPND1> TO <SEED>
26216   157006            DSZ ASEED,I    REMOVE MANTISSA SIGN
                     *
26217   007006       HERO LDB ASEED      ADDRESS OF SEED
26220   043234            JSM ERND1      ERND1 ROUTINE FINDS THE FRAC OF SEED * 29
                     *
26221   005754            LDB RESM2
26222   174507            SBR 8
```

MATH OPTION BLOCK B (MB16)

```
26223  035727        STB T15      TO REPLACE THE LAST TWO DIGITS ORF RANDOM NUMBER
                   *
26224  004340        LDB ARES
26225  043234        JSM ERND1     "      "      "     "   "   2  AR2     "  "
                   *
                   * NOW WE HAVE A RANDOM NUMBER AND A NEW SEED WITH THE
                   *  POSSIBLITY OF 10 DIGIT MANTISSA INSTEAD OF 12
                   *  TO FIX THAT WE WILL REPLACE D11D12 BY D6D7
                   *
26226  001755        LDA RESM3
26227  050170        AND M256     MAKE SURE THAT D11,D12 ARE 0
26230  021727        ADA T15
26231  031755        STA RESM3
26232  000340        LDA ARES
26233  067013        JMP ININ         STOR NEW SEED
                   *
                   *
                   *  SUBROUTINE ERND1
                   *   TO MULTIPLY NUMBER SPECIFIED (POINTED TO) BY A
                   *   BY 29. AND FIND THE FRACTIONAL PART I OF THE PRODUCT
                   *   <RES> CONTAINS THE ANSWER
                   *
26234  035273  ERND1 STB OPND1
26235  003070        LDA A29
26236  031274        STA OPND2      TO MULTIPLY BY 29.
26237  140556        JSM AMUL1,I
26240  000340        LDA ARES
26241  031273        STA OPND1
26242  043333        JSM IFREE     FIND FRACTIONAL PART IN <AR2>
26243  067326        JMP EFRA1     PUT FRACTION IN <RES>
                   *
                   *
                   ****************************
                   *
                   *  MODULO VALUE FUNCTION
                   *
                   ************          *********
                   *
                   *  EMOD IS THE NAME ; MOD IS THE KEYB MNEMONIC
                   *
                   *  ENTRY : X MOD Y ; WHERE X, AND Y ARE INTEGERS; Y IS CALLED
                   *                     THE BASE
                   *
                   *  EXIT  : THE RISIDUE OF DIVIDING X BY Y ; DEFINED AS:
                   *              X MOD Y = X- INT(X/Y)*Y
                   *
                   *
                   *  GET X AND Y AS <OPND1> AND <OPND2> RESPECTIVLY
                   *
26244  140553  EMOD  JSM AGET2,I
26245  001273        LDA OPND1
26246  007077        LDB FT1A
26247  071403        XFR 4        TRANFER X TO <T1...T4>
                   *
26250  001274        LDA OPND2
26251  007100        LDB FT5A
26252  071403        XFR 4        TRANSFER Y TO <T5...T9>
                   *
                   *
                   *
                   *
                   *  START THE MODULO SEARCH ROUTINE
                   *  DIFFERENTIATE BETWEEN TWO TYPES OF VALUES FOR X
                   *
                   *      1. X WITH EXP.<9
                   *      2. X WITH EXP.>9
                   *
                   *  IN THE FIRST CASE X MOD Y= X- INT(X/Y)*Y
                   *
                   *  IN THE SECOND CASE ; THE DEFINITION IF APPLIED WITHOUT SCALING
                   *  WILL CAUSE ERROR DUE TO THE LIMITED NUMBER OF DIGITS IN THE
                   *  MANTISSA. FOR THIS SITUATION WE ARE GOING TO FIND X/Y
                   *  AND IF THE QUOTIENT HAS EXP.>8; WE WILL REDUCE THE LAST THREE
                   *  DIGITS OF THAT QUOTIENT TO ZEROS AND REDUCE THE EXPONENT TO 8
                   *  MULTIPLY THE BASE Y BY THAT AMOUNT (SCALED QUOTIENT).
                   *  SUBTRACT THE RESULT FROM THE ORIGNAL X AND REPLACE X BY
                   *  THAT VALUE ; CONTINUE THIS SCALING TILL YOU REACH A SAFE VALUE
                   *  FOR X TO APPLY THE DEFINITION OF MOD ON.
                   *
                   *
26253  140557  MSTA  JSM ADIV1,I    X/Y
26254  005716        LDB T6
26255  076411        SZB MZERO      IF Y=0;RETURN ZERO
26256  001752        LDA RESE
26257  170405        AAR 6
26260  005715        LDB T5
```

MATH OPTION BLOCK B (MB16)

```
26261  176003         SBP MSTA.
26262  010042         CPA B777      IS EXP(X)-EXP(Y)>=511
26263  067266         JMP MZERO     RETURN ZERO! OTHERWISE MACHINE WILL TAKE FOREVER TO
                *
26264  023076  MSTA.  ADA M9
26265  172410         SAM MCONT     EXP DIFF<9!SAFE TO USE X-INT(X/Y)Y
                *
                *  GIVE A ZERO FOR ANSEWER
                *
                *
                *
26266  000340  MZERO  LDA ARES
26267  071603         CLR 4         RETURN A ZERO
26270  170201         RET 1
                *
26271  001273  MODT   LDA OPND1
26272  004340         LDB ARES
26273  071403         XFR 4         RETURN X=XMODY
26274  170201         RET 1
                * COUNT THE MODULO ACCORDING THE GOLDEN RULE
                *  X MOD Y = X- INT(X/Y)*Y
                *
26275  000340  MCONT  LDA ARES
26276  007101         LDB FT9A
26277  071403         XFR 4
26300  035273         STB OPND1
26301  043432         JSM EINT.     FIND INTEGER PART
                *
26302  000340         LDA ARES
26303  031273         STA OPND1
26304  003100         LDA FT5A
26305  031274         STA OPND2
26306  140556  MCON1  JSM AMUL1,I
26307  000340         LDA ARES
26310  031274         STA OPND2
26311  003077         LDA FT1A
26312  031273         STA OPND1
26313  140555         JSM ASUB1,I
26314  170201         RET 1
                *
                *
                *
                *  FRACTION VALUE FUNCTION
                *  EFRAC IS THE NAME ! KEYB MNEMONIC IS FRAC
                *
                *  ENTRY IS A SINGLE ARG.
                *  EXIT IS THE FRACTIONAL PART IN THE MATHEMATICAL,(NOT ARITHMETIC)
                *  SENSE
                *
                *  THIS FUNCTION USES SUBROUTINE FREEK TO ACCOMPLISH FRACTION
                *  SEPARATION OF ABSOLUTE VALUE
                *
                *
26315  043332  EFRAC  JSM FREEK     GO TO FRACTION SEPARATION ROUTINE
26316  000020  EEFR   LDA AR2E
26317  073007         SLA EFRA1     IF MANTISSA IS>= 0 ! GO TO EFRAC ROUTINE
                *
                *  ADD TO FRACTION 1.
                *
26320  000172         LDA AONE
26321  031273         STA OPND1
26322  000127         LDA AR2A
26323  031274         STA OPND2
26324  140554         JSM AADD1,I
26325  170201         RET 1
26326  000127  EFRA1  LDA AR2A
26327  004340         LDB ARES
26330  071403         XFR 4
26331  170201         RET 1
                * SUBROUTINE FREEK
                *
                *
                *  FOR FRACTIONAL VALUE SEPARARTION
                *
                *
                * ENTRY : ARG. ON TOP OF EXECUTION STACK
                * EXIT  : FRACTIONAL VALUE
                *
                *
                *
26332  140552  FREEK  JSM AGET1,I
26333  001273  IFREE  LDA OPND1
26334  004127         LDB AR2A
26335  071403         XFR  4        TRANSFER ARG. TO <AR2>
```

MATH OPTION BLOCK B (MB16)

```
02673000 26336  004020          LDB AR2E
02674000 26337  176424          SBM NOACT    ARG. IS ALREADY A FRACTION ; NO INTEGER
02675000                 *                   PART TO REMOVE
02676000 26340  174505          SBR  6
02677000                 *
02678000 26341  000255          LDA M12
02679000 26342  020001          ADA B        EXP-12
02680000 26343  172021          SAP NOFRC    IF EP-12>=0  THER IS NO FRACTION PART
02681000 26344  024254          ADB  P1
02682000 26345  000177   LEFT   LDA P0
02683000 26346  075541          MLY       SHIFT MANTISSA LEFT TO REMOVE ONE DIGIT OF
02684000                 *                   INTEGER PART
02685000 26347  024257          ADB  M1
02686000 26350  076075          RZB LEFT     CONTINUE IN THE LOOP OF SHIFTING LEFT
02687000 26351  071500          NRM
02688000 26352  014133          CPB P12       A CASE OF ALL ZEROS MANTISSA
02689000 26353  067364          JMP NOFRC      RETURN A ZERO
02690000 26354  174040          TCB
02691000 26355  024257          ADB M1
02692000 26356  174605          SBL 6
02693000 26357  000020          LDA AR2E
02694000 26360  050254          AND P1     TO SAVE THE MANTISSA SIGN
02695000 26361  060001          IOR B    TO INCLUDE THE SIGN OF THE MANTISS WITH FRACTION
02696000 26362  030020          STA AR2E     NEW EXPONENT WORD
02697000 26363  170201   NOACT  RET 1
02698000                 *
02699000 26364  000127   NOFRC  LDA AR2A
02700000 26365  071603          CLR 4        ANSWER IS 0.
02701000 26366  170201          RET 1
02704000                 *
02705000                 *
02706000                 *
02707000                 * RETURN SIGN FUNCTION
02708000                 * ESGN IS THE NAME ; SGN IS KEYB NEUMONIC
02709000                 *      ENTRY: ARGUMENT ON TOP OF EXECUTION STACK
02710000                 *      EXIT : +1: IF ARG WAS FOUND POSITIVE
02711000                 *             0.0  IF ARG WAS FOUND TO BE ZERO
02712000                 *             -1  : IF ARG WAS FOUND TO BE NEGATIVE
02713000                 *
02714000                 *
02715000                 *
02716000 26367  140552   ESGN JSM AGET1,I     GET ONE OPERAND
02717000 26370  000172        LDA AONE
02718000 26371  004340        LDB ARES
02719000 26372  071403        XFR 4       STORE 1. IN <RES>
02720000                 *
02721000 26373  101273        LDA OPND1,I     LOAD EXPONENT WORD
02722000 26374  050254        AND P1          GET MANTISS SIGN
02723000 26375  031752        STA RESE        IT IS THE SIGN OF <RES> TTOO
02724000                 *
02725000 26376  045273        ISZ OPND1
02726000 26377  101273        LDA OPND1,I      THE FIRST WORD OF MANTISS A IN A
02727000 26400  072007        RZA EABSE     IF IT WAS NOT A ZERO RETURN
02728000                 *
02729000 26401  067266        JMP MZERO        CLEAR <RES>
02731000                 *
02732000                 *
02733000                 *
02734000                 * ABSOLUTE VALUE FUNCTION
02735000                 *
02736000                 * EABS IS THE NAME ; ABS IS THE KEYB NEUMONIC
02737000                 *****
02738000                 **
02739000                 * ENTER*: ARG. ON TOP OF EXECUTIO STACK
02740000                 * EXIT   : ABSOLUTE VALUE
02741000                 *
02742000                 *
02743000                 *
02744000 26402  140552   EABS  JSM AGET1,I
02745000 26403  043271         JSM MODT      OPND1 INT O RES
02746000                 *
02747000 26404  001752         LDA RESE    GET THE EXPONENT
02748000 26405  050146         AND M2      REMOVE THE MANTISSA SIGN
02749000 26406  031752         STA RESE
02750000 26407  170201   EABSE RET 1


02752000                 *
02753000                 ****************
02754000                 *
02755000                 *  INTEGER EXECUTION VALUE FUNCTION
02756000                 *
02757000                 *  EDINT IS THE NAME ; DINT IS THE KEYB MNEMONIC
```

MATH OPTION BLOCK 8 (MB16)

```
                 *
                 *
                 *  ENTRY 1 IS THE SINGLE ARG.
                 *  EXIT  :  THE INTEGER PART OF THE EQUIVALENT ABSOLUTE VALUE
                 *
                 *
                 *
                 *
26410   105273   IDINT  LDB OPND1,I
26411   174405   DINT1  ABR  6
26412   176002          SAP *+2
26413   067266   DINT2  JMP MZERO       CLEAR <RES>
26414   024155          ADB M11      IF THE EXPONENT IS >= 11, RETURN THE ARGUMENT.
26415   176402          SAM *+2
26416   067271   DINT3  JMP MODT        OPND1 INTO <RES>
26417   174040          TCB          B = NO. OF DIGITS TO RIGHT SHIFT OUT OF AR2.
26420   035762          STB MT1
26421   001273          LDA OPND1
26422   004127          LDB AR2A     TRANSFER THE ARGUMENT TO AR2
26423   071403          XFR 4
26424   005762          LDB MT1
26425   000177          LDA P0
26426   075500          MRY          PERFORM THE RIGHT SHIFT.
26427   071500   DINT4  NRM
26430   067326          JMP EFRA1     <AR2> INTO <RES>
                 *
                 *
                 *
                 *  INTEGER VALUE FUNCTION
                 *  THIS IS THE INTEGER VALUE ACCORDING TO THE MATHEMATICAL
                 *  DEFINITION AS (THE FLOOR ACCORDING TO APL NOTATION)
                 *
                 *
                 *  ENTRY : A SINGLE ARG.
                 *  EXIT  : THE LARGES  INTEGER SMALLER OR EQUAL TO ARG.
                 *
                 *
26431   140552   EINT   JSM AGET1,I     GET ARG.
26432   043410   EINT.  JSM IDINT        GO TO DECIMAL SEPARATION ROUTINE
26433   001273          LDA OPND1
26434   031274          STA OPND2     POINT TO ARG. AS OPND2
26435   000340          LDA ARES
26436   031273          STA OPND1    POINT TO DINT AS OPND1
                 *  IF THE ARG WAS POSITIVE DINT=INT I GO TO INT1
                 *
                 *   IF THE INTEGER IS ZRO WE SHOULD CHECK IF THE ARG. WAS A ZERO
                 *   OR IT WAS A FRACTION WITH ABS. VALUE <1
26437   140562          JSM ATSU1,I     FIND DINT-ARG
26440   076406          SZB INT1     IF ARG WAS INTEGER INT=DINT
26441   014144          CPB P3
26442   067446          JMP INT1
26443   000172          LDA AONE     POINT TO FL 1.
26444   031274          STA OPND2
26445   140555          JSM ASUB1,I   ADD -1. TO DINT TO GET INT
26446   170201   INT1   RET 1
                        END

END OF PASS 2 NO ERRORS DETECTED
```

BASE-PAGE READ-WRITE-MEMORY

```
76550                   ORG 76550B
                        UNL
                        LST
                 *
00505                   ORG APGET
00505   026476          DEF PGET
00506   026571          DEF PNUM
00507   027034          DEF INTCK
00510   026755          DEF GLENL
00511   026765          DEF GLEOL
00512   026773          DEF FLADR
00513   026775          DEF FLINA
00514   027025          DEF SLLN
00515   027101          DEF STKEX
00516   027116          DEF UNSTK
00517   027216          DEF AJINS
00520   027262          DEF AJDEL
00521   027132          DEF STKPT
00522   027062          DEF DIGXX    DIGIT CHECK ROUTINE
00523   027170          DEF GLNUM    GET LINE NUMBER
                 *
00575                   ORG AFXD
00575   026714          DEF EFIX
00576   026717          DEF EFLT
```

```
                       ***************************************************************
      26476                 ORG 26476B
                       *
                       *** GET NEXT PARAMETER FROM PRINT LIST ***
                       *
                       *    ENTRY: LDA FLAG
                       *           JSM PGET     TO GET FIRST PARAMETER
                       *
                       *           LDA N    N=# PLACES TO BUMP FAP1 (N=1 FOR NEXT
                       *                    PARAMETER), N>=0
                       *           JSM PGET     TO GET SUBSEQUENT PARAMETERS
                       *
                       *    EXIT:  RETURN P+1 : PARAMETER LIST EXHAUSTED
                       *           RETURN P+2 : NEXT PARAMETER FETCHED
                       *             A= 0:NUMERIC, 1:STRING
                       *             B= CHARACTER COUNT
                       *             D= BYTE ADDRESS OF FIRST CHARACTER
                       *
                       *               IF B=-1, BUILDING OUTPUT STRING WAS NOT POSSIBLE
                       *                   A=PARAMETER CLASS
                       *
      26476  005217    PGET  LDB .WPRT      SET FIX/FLT INDICATOR
      26477  035216          STB SIOCP
      26500  172003          SAP PGETN
      26501  140610          JSM ACOUN,I
      26502  067505          JMP PGETO
      26503  140607    PGETN JSM ABUMP,I
      26504  170201          RET 1        RETURN 1 IF LIST EXHAUSTED
      26505  040751    PGETO JSM NGET     GET NEXT NUMBER
      26506  067645          JMP PGETC    IT WASN'T NUMERIC, SO CHECK IT FOR STRING
                       *
                       *** THIS SECTION PROCESSES A NUMERIC ITEM
                       *
                       *
                       *
      26507  000001    PNNUM LDA B
      26510  004336          LDB AOP1     PUT THE VALUE IN OP1
      26511  071403          XFR 4
      26512  035273          STB OPND1    SAVE ADDRESS FOR ROUND ROUTINE
      26513  000254          LDA P1
      26514  031713          STA T3       SET INITIAL COUNT TO 1
      26515  140551          JSM AFLTC,I  CHECK FOR RANGE E+/-99
      26516  000305          LDA ASTAK    GET ADDRESS-1 OF COMPILE STACK
      26517  030017          STA D        AND INITIALIZE BUFFER POINTER
      26520  105273          LDB OPND1,I  GET EXPONENT WORD
      26521  043671          JSM PSIGN    AND DUMP THE +/- CHARACTER
      26522  001216          LDA SIOCP     GET THE FIXED/FLOAT FLAG
      26523  172002          SAP *+2      IS IT FIXED?
      26524  067574          JMP PFLT     NO, PROCESS FLT FORMAT
      26525  174405          ABR 6        B=EXPONENT
      26526  035712          STB T2
      26527  170503          SAR 4        A=N(FIXED)
      26530  050130          AND P15
      26531  031711          STA T1
      26532  020001          ADA B        A = N+E
      26533  022464          ADA M14      CHECK FOR COUNT >= 15
      26534  172405          SAM PFIX      NO, DO A FIXPT OUTPUT
      26535  005216          LDB SIOCP     YES, CHECK IF FLT REVERSION IS OK
      26536  174600          SBL 1         POSITION BIT14 FOR CHECK
      26537  001216          LDA SIOCP     GET FIX/FLT WORD JUST IN CASE
      26540  176034          SBP PFLT      IF OK, REVERT TO FLOAT
                       *
                       *** THIS SECTION BUILDS A FIXED POINT NUMBER
                       *
      26541  005711    PFIX  LDB T1       B=N
      26542  174040          TCB          SET B=-N FOR PROUND ROUTINE
      26543  173201          SOC *+1,C    CLEAR OVF FOR ROUND ROUTINE
      26544  000544          LDA APRND
      26545  020144          ADA P3
      26546  140000          JSM A,I      JUMP IN AT PRND+3
      26547  000340          LDA ARES
      26550  004127          LDB AOR2
      26551  071403          XFR 4        PUT ROUNDED RESULT IN AR2
      26552  104001          LDB B,I      GET EXPONENT WORD
      26553  174405          ABR 6        B=EXPONENT
      26554  176011          SBP PFIX1    IF B POS, ALL OK
      26555  174040          TCB          OTHERWISE, SHIFT E+1 ZEROS
      26556  000001          LDA B        INTO AR2
      26557  170503          SAR 4
      26560  072402          SZA *+2      IF B>15
      26561  004133          LDB P12      USE 12
      26562  000177          LDA P0       SET UP A FOR MRY
      26563  075500          MRY          AND SHIFT IN B ZEROS
      26564  004177          LDB P0       SET B=0 FOR NO CHARACTERS BEFORE DP
      26565  024254    PFIX1 ADB P1       SET ONE MORE LEADING DIGIT
```

```
26566  043676        JSM POUMP    OUTPUT THE NUMBER TO BUFFER
26567  005713        LDB T3       GET CHARACTER COUNT
26570  067641        JMP POUT     AND GET OUT
                *
                *
                *     ROUTINE TO PROCESS A NUMERIC ITEM
                *
26571  001217  PNUM  LDA .WPRT     SET FIX/FLT INDICATOR
26572  031216        STA SIOCP
26573  067507        JMP PNNUM
                *
                *
                *** THIS SECTION BUILDS A FLOATING POINT NUMBER
                *
                *
26574  050130  PFLT  AND P15      SAVE N(FLOAT)
26575  031711        STA T1
26576  001273        LDA OPND1
26577  004127        LDB ADR2
26600  071403        XFR 4        PUT THE NUMBER IN AR2 FOR ROUNDING
26601  000140        LDA P7       SET FOR ROUND TYPE
26602  005711        LDB T1
26603  024254        ADB P1       SET FOR ROUND ON DIGIT N+1
26604  140547        JSM ARND,I   AND DO IT.
26605  100127        LDA ADR2,I   GET EXPONENT WORD
26606  170405        AAR 6        A=EXPONENT
26607  020206        ADA M100     CHECK FOR ROUND OVERFLOW
26610  172404        SAM *+4      IF A<0, THEN E<100 AND ALL IS OK
26611  000336        LDA AOP1
26612  004127        LDB ADR2
26613  071403        XFR 4        IF A=0, USE ORIGINAL NUMBER
26614  004254        LDB P1       SET FOR 1 CHAR. BEFORE DP
26615  043676        JSM POUMP    OUTPUT MANTISSA TO BUFFER
26616  000063        LDA B145      B145= ASCII LOWER CASE E  FOR EXPONENT
26617  074550        PBD A,I      OUTPUT THE "E"
26620  104127        LDB ADR2,I       GET EXPON. WORD
26621  174716        RBR 15        POSITION EXP. SIGN BIT FOR TEST
26622  043671        JSM PSIGN    OUTPUT A +/-
26623  000257        LDA M1       SET A FOR EXPONENT COUNT
26624  174700        RBR 1
26625  174405        ABR 6
26626  176002        SBP *+2
26627  174040        TCB
26630  024207        ADB M10      SUBTRACT 10
26631  020254        ADA P1       AND INCREMENT COUNT
26632  176076        SBP *-2      UNTIL B GOES NEGATIVE
26633  020103        ADA P48      MAKE COUNT IN A AN ASCII NUMBER
26634  074550        PBD A,I      AND SEND 10'S DIGIT
26635  024077        ADB P58      RESTORE LAST 10, AND MAKE ASCII
26636  074551        PBD B,I      AND SEND UNITS DIGIT
26637  004143        LDB P4       SET COUNT TO 4 FOR "E+XX"
26640  025713        ADB T3       ADD IN PREVIOUS COUNT
26641  000325  POUT  LDA ACSTF    SET D TO FIRST BYTE
26642  030017        STA D        OF COMPILER STACK BUFFER
26643  000177        LDA P0       SET FOR NUMERIC RESULT
26644  170202        RET 2        AND GET OUT!!!
                *
                *** THIS SECTION CHECKS A NON-NUMERIC FOR A STRING
                *
26645  101272  PGETC LDA FAP1,I   GET ORIGINAL WHAT WORD
26646  010221        CPA NWWD     SEE IF NUMERIC
26647  170201        RET 1        EMPTY LIST IF SO
26650  004000        LDB A        AND COPY INTO B
26651  174601        SBL 2        CHECK BIT 13
26652  176003        SBP PSTR     IF ZERO, THIS IS A STRING
26653  004257        LDB M1       SET B=-1 FOR "SOMETHING ROTTEN IN DENMARK"
26654  170202        RET 2        AND GIVE IT UP
                *
                *** THIS PROCESSES A STRING
                *
26655  172005  PSTR SAP PSTRC     IF A POS,STRING CONSTANT
26656  141324        JSM AKOUN,I  IF A NEG,CALL ON STRING ROM FOR WHERE,COUNT
                *                   ADDRESS OF KOUNT IN SROM
26657  030017  PSTRE STA D        SET BYTE ADDR OF START OF STRING
26660  000254        LDA P1       SET A FOR STRING RESULT
26661  170202        RET 2
                *
26662  001272  PSTRC LDA FAP1
26663  020144        ADA P3       POINT TO LENGTH
26664  104000        LDB A,I      B = COUNT OF CHARACTERS
26665  020257        ADA M1         PT TO WHERE WORD
26666  100000        LDA A,I        GET WHERE WORD
26667  021272        ADA FAP1       FIND ADDR OF FIRST CHAR
```

```
26670  067657         JMP PSTRE
                *
                *** SUBROUTINES
                *
26671  000117   PSIGN LDA P32      A=ASCII BLANK
26672  077002         SLB *+2      IF MANTISSA POSITIVE, KEEP BLANK
26673  000106         LDA P45      OTHERWISE, USE MINUS
26674  074550         PBD A,I      OUTPUT IT
26675  170201         RET 1
                *
26676  043704   PDUMP JSM PDUMB    DUMP B LEADING DIGITS
26677  005711         LDB T1       GET N
26700  076413         SZB PRETI    IF N=0, NO DECIMAL OR DIGITS FOLLOW
26701  000105         LDA P46      IF N>0, SEND DECIMAL POINT
26702  074550         PBD A,I
26703  045713         ISZ T3       AND BUMP COUNT
26704  000177   PDUMB LDA P0         SET FOR MLY TO SHIFT IN ZEROS
26705  075541         MLY            SHIFT OUT NEXT DIGIT
26706  020103         ADA P48      MAKE IT ASCII
26707  074550         PBD A,I      SEND IT
26710  045713         ISZ T3       AND BUMP COUNT
26711  054001         DSZ B        LOOP UNTIL B=0
26712  067704         JMP PDUMB
26713  170201   PRETI RET 1
                *
                *
                *      FIXED AND FLOAT EXECUTION
                *
                *
26714  001217   EFIX  LDA .WPRT      GET CURRENT .WPRT
26715  172201         SAP *+1,C      SET FIXED
26716  067721         JMP EFIX1
26717  001217   EFLT  LDA .WPRT      GET CURRENT .WPRT
26720  172301         SAP *+1,S      SET FOR FLOAT
26721  031217   EFIX1 STA .WPRT      PUT IT BACK FOR NOW
26722  140610         JSM ACOUN,I    HOW MANY PARAMETERS
26723  040751         JSM NGET       ONE: FIND IT
26724  067751         JMP NONUM      NOT NUMERIC,GIVE AN ERROR IF NOT NULL
26725  000001         LDA B          OK, MOVE IT TO A
26726  040644         JSM FIXPT      AND MAKE AN INTEGER
26727  173405         SOS ERFFL      OUT OF RANGE: GIVE ERROR
26730  176404         SBM ERFFL      OUT OF RANGE
26731  000001         LDA B
26732  020255         ADA M12        TEST FOR > 11
26733  172403         SAM *+3      OK ,  CONT.
26734  140404   ERFFL JSM AERR1,I    GIVE ERROR 17
26735  030467         ASC 1,17
                *
26736  001217         LDA .WPRT
26737  172004         SAP EFL3       FIX/FLT ?
26740  050160         AND M16        PUT B INTO
26741  060001         IOR B          FLOAT POSITION
26742  067747         JMP EFL2       AND CLEAN UP
26743  170703   EFL3  RAR 4
26744  050160         AND M16      PUT B INTO
26745  060001         IOR B        FIXED POSITION
26746  170713         RAR 12
26747  031217   EFL2  STA .WPRT     PUT FINAL VALUE BACK
26750  164365   EFOUT JMP AINTX,I   BACK TO INTERPRETER
                *
26751  010140   NONUM CPA P7        IS IT THE NULL PARAMETER?
26752  164365         JMP AINTX,I   YES, RETURN TO INTERPRETER
26753  140404   ERUND JSM AERR1,I   NON-NUMERIC PARAMETER
26754  030470         ASC 1,18
                *
                *
                *     GET LENGTH OFLINE
                *
                *             ENTRY: INFO IN COMPILE BUFF
                *
                *      EXIT: TMP4 =LINE LENGTH+1  =A
                *
                *
26755  043765   GLENL JSM GLEOL     FIND EOL ADDRESS
26756  004016   GLEN2 LDB C         GET HIGH CHAR POINTR
26757  000302         LDA ACBFX
26760  140362         JSM AFBAD,I   FIND BYTE ADDR DIFF
26761  020142         ADA P5        ROUND UP, ADD 2 WORDS
26762  170500         SAR 1         MAKE WORDS
26763  031234         STA TMP4      SAVE LINE LENGTH
26764  170201         RET 1
                *
                ******************************************************
                *
```

CONTROL AND I/O SUPERVISOR ROUTINES

```
                      * GLEOL   GET EOL ADDR IN COMPILE BUFF
                      *         EXIT  B CONTAINS 177B, C POINTS TO BYTE BEFORE EOL
                      *
                      *********************
                      *
26765   000305  GLEOL LDA ACLMT      END ADDR OF COMPILER
26766   030016        STA C          SET POINTER
26767   074761  GLEN1 WBC B,D        GET A BYTE
26770   014053        CPB EOL        END OF LINE?
26771   170201        RET 1          YES, RETURN
26772   067767        JMP GLEN1      NO, CONTINUE
                      *
                      ******************************************************************
                      *
                      * FLADR,FLINA  FINDLINE ADDRESS
                      *              FLADR ENTRY   LINE NO. IN LNO
                      *              FLINA ENTRY   LINE NO. IN TMP7
                      *
                      *              EXITLNO CHANGED TO -1 IF A NULL PROGRAM
                      *                     RET P+2    A= S/A OF LINE
                      *
                      *                     RET P+1    LINE NOT FOUND OR NULL PROGRAM
                      *                     B CONTAINS LAST LINE NO. OR -1
                      *                                K ALSO CONTAINS LNIE # IF NOT A NULL PROG
                      *
                      *********************
                      *
26773   005226  FLADR LDB LNO        GET LINE NO.
26774   035233        STB TMP7       SAVE IT
26775   001307  FLINA LDA FWUP       FIRST WORD OF USER PROGRAM
26776   011277        CPA ENDS       NULL PROGRAM?
26777   066023        JMP SLLN1      SET LNO = -1 IF A NULL PROG
27000   004177        LDB P0
27001   035224        STB K          INITIALIZE LINE COUNT
27002   104000  FLAD1 LDB A,I        GET LINE BRIDGE
27003   174610        SBL 9
27004   174510        SBR 9          GET LENGTH OF LINE
27005   035722        STB T10        AND SAVE IT
27006   024000        ADB A          B = S/A OF NEXT LINE
27007   015277        CPB ENDS       END OF PROGRAM?
27010   066017        JMP FLAD2      YES
27011   005224        LDB K          GET LINE NO.
27012   015233        CPB TMP7       LINE FOUND?
27013   170202        RET 2          YES
                      *
27014   045224        ISZ K          INCREM LINE COUNT
27015   021722        ADA T10        A = S/A OF NEXT LINE
27016   066002        JMP FLAD1      CONT
27017   005224  FLAD2 LDB K          GET LINE NO.
27020   015233        CPB TMP7       LINE FOUND?
27021   170202        RET 2          YES
27022   170201        RET 1
                      *
27023   004257  SLLN1 LDB M1
27024   066032        JMP SLLN2      SET LNO TO -1
                      *
                      *
                      *     SET "LNO" TO VALUE OF LAST LINE NO.
                      *
                      *     IF NULL PROG:SET "LNO" = -1
                      *
                      *
27025   000263  SLLN  LDA MAXLN      MAX LINE NO.
27026   031226        STA LNO
27027   043773        JSM FLADR      SET LNO TO -1 OR LAST LINE NO.
27030   066032        JMP SLLN2      LINE SHOULD NOT BE FOUND
27031   140424        JSM ASYER,I    ERROR IF FOUND
27032   035226  SLLN2 STB LNO        SET LNO
27033   170201        RET 1
                      *
                      *
                      *     BUILD AN INTEGER AND CHECK THE MAX. VALUE
                      *
                      *     ENTRY:  A = FIRST CHAR
                      *
                      *
                      *     EXIT:   B = INTEGER
                      *
                      *             "L" GNEXT POINTR HAS BEEN ADVANCED
                      *
                      *
27034   004177  INTCK LDB P0
27035   035224        STB K          INITIALIZE PARTIAL RESULT
27036   042061        JSM DIGCK      FIRST CHAR A DIGIT?
```

```
27037  066047        JMP ERINT     NO
27040  042061  INTC1 JSM DIGCK     IS IT A DIGIT?
27041  066057        JMP INTC2     NO
27042  001224        LDA K         GET PARTIAL RESULT
27043  035224        STB K         SAVE LATEST DIGIT
27044  004135        LDB P10       MULTIPLY PARTIAL RESULT
27045  075617        MPY           BY 10
27046  076403        SZB *+3       INTEGER WITHIN "A" ?
27047  140404  ERINT JSM AERR1,I   NO: ERROR
27050  030461        ASC 1,11
               *
27051  172476        SAM ERINT     SKIP ON "A" TOO LARGE
27052  021224        ADA K         ADD LATEST DIGIT
27053  172474        SAM ERINT     SKIP ON OVERFLOW
27054  031224        STA K         SAVE PARTIAL RESULT
27055  140501        JSM AGNXT,I   GET NEXT CHARACTER
27056  066040        JMP INTC1     CONT
27057  005224  INTC2 LDB K         GET INTEGER
27060  170201        RET 1
               *
               *
               *     CHECK FOR A DIGIT
               *
               *      DIGCK ENTRY - A= CHARACTER
               *      DIGXX ENTRY B = LOW LIMIT(LOWER HALF) AND HIGH LIMIT
               *                   (UPPER HALF) WITH A= CHARACTER
               *
               *     EXIT:   RET P+1 NOT FOUND
               *
               *             RET P+2 FOUND: ASCII IN A: DIGIT IN B
               *
               *
27061  006465  DIGCK LDB DLIMT       GET DIGIT LIMITS
27062  035221  DIGXX STB PLADD       SAVE LIMITS
27063  174507        SBR 8           GET UPPER LIMIT
27064  174140        CMB             ONES COMPLEMENT
27065  024000        ADB A           ADD ASCII CODE
27066  176012        SBP DIG1        SKIP IF CODE EXCEEDS UPPER LIMIT
27067  005221        LDB PLADD       GET LIMITS
27070  174707        RBR 8
27071  174507        SBR 8           GET LOWER LIMITS
27072  174040        TCB             MAKE NEG.
27073  024000        ADB A           ADD ASCII CODE
27074  176404        SBM DIG1        SKIP IF CODE LESS THAN LOWER LIMIT
27075  004000        LDB A           CODE WITHIN LIMITS
27076  024163        ADB M48         GET BINARY DIGIT
27077  170202        RET 2
               *
27100  170201  DIG1  RET 1
               *
               *
               ****************************************************************
               *
               * STKEX   STACK INFO BEFORE EXECUTION
               *
               ******************
               *
27101  000147  STKEX LDA M3        PUT RELATIVE AP3,AP1
27102  042132        JSM STKPT     ON THE EXECUTION STACK
27103  032060        ASC 1,40      STACK OVERFLOW ERROR #
27104  001264        LDA LEND      PUT LEND ON THE STACK ALSO
27105  070550        PWD A,I
27106  000017        LDA D         GET STACK PTR
27107  050344        AND MAW       CLEAR BIT 15
27110  020147        ADA M3        PT TO LOCATION TO PUT -1 ON STACK
27111  004257        LDB M1
27112  134000        STB A,I       PUT -1 ON STACK  NEW BOTTOM OF STACK
27113  031261        STA AP3       SET NEW STACK POINTERS
27114  031263        STA AP1
27115  170201        RET 1
               *
               ****************************************************************
               *
               * UNSTK    UNSTACK INFO AFTER EXECUTION
               *
               *******************
               *
27116  101261  UNSTK LDA AP3,I     STRIP OFF GOSUBS
27117  010257        CPA M1        BY LOOKING FOR -1
27120  066124        JMP UNST1
27121  021300        ADA AP2       MAKE AN ABSOLUTE ADDRESS
27122  031261        STA AP3       #-1 SO KEEP LOOKING
27123  066116        JMP UNSTK
27124  001261  UNST1 LDA AP3       GET PTR
27125  020254        ADA P1        BUMP PAST THE -1
```

```
27126  042160         JSM UNSPT     UNSTACK RELATIVE AP3,AP1
27127  070770         WWD A         GET LEND FROM THE STACK
27130  031264         STA LEND
27131  170201         RET 1
                *
                ************************************************************
                *
                *  STKPT   ROUTINE THAT PUTS AP3, AP1 ON THE EXECUTION
                *          STACK.   CALLED BY
                *                                  LDA M#
                *                                  JSM ASTKG,I
                *                                     ASC 1,ERROR #
                *
                *          WHERE M# IS THE NEG OFFSET FROM AP1 TO PUT THE
                *          RELATIVE AP3.   IF STACK OVERFLOW OCCURS
                *          JMP AERR1,I IS EXECUTED.  ON RETURN D POINTS
                *         TO WHERE AP1 IS LOCATED ON THE STACK.  AP3,
                *          AP1 POINTS TO THE AP3 ON THE STACK (NEW TOP
                *          OF THE STACK)
                *
                ************************
                *
27132  021263   STKPT ADA AP1       A NOW POINTS TO LOCATION TO PUT AP3
27133  020257         ADA M1        ALLOW AN EXTRA WORD AND SET FOR TRANSFER
27134  005310         LDB RMAX      SEE IF MEM OVERFLOW
27135  174140         CMB           -STACK LIMIT
27136  024000         ADB A
27137  176002         SBP STK1      NO OVERFLOW IF RESULT POSITIVE
                *
27140  164404         JMP AERR1,I   OVERFLOW ERROR
                *
27141  030017   STK1  STA D         SET TRANSFER POINTER
27142  001300         LDA AP2       POINTERS SHOULD BE RELATIVE TO AP2
27143  170040         TCA           SO SUBTRACT AP2
                *
27144  005261         LDB AP3       TRANSFER AP3
27145  024000         ADB A
27146  070551         PWD B,I
                *
27147  005263         LDB AP1       TRANSFER AP1
27150  024000         ADB A
27151  070551         PWD B,I
                *
27152  000017         LDA D         A NOW POINTS TO AP1 ON STACK
27153  050344         AND MAW       CLEAR BIT 15 OF A
27154  020257         ADA M1        POINT TO AP3 ON STACK
27155  031261         STA AP3       SET PTRS TO NEW TOP OF STACK
27156  031263         STA AP1
27157  170202         RET 2         NO OVER FLOW SO RETURN P+2
                *
                ************************************************************
                *
                *  UNSPT   ROUTINE TO RESTORE AP3,AP1 FROM STACK
                *          WHEN CALLED A POINTS TO AP3 ON STACK.  AFTERWARDS,
                *          D POINTS TO WORD AFTER AP1 ON STACK
                *
                ********************
                *
27160  030017   UNSPT STA D         SET STACK POINTER
                *
27161  070570         WWD A,I       GET RELATIVE AP3 FROM STACK
27162  021300         ADA AP2       MAKE AN ABSOLUTE ADDRESS
27163  031261         STA AP3
                *
27164  070570         WWD A,I       GET AP1
27165  021300         ADA AP2
27166  031263         STA AP1
                *
27167  170201         RET 1         D NOW POINTS TO WORD AFTER AP1
                *
                *
                ************************************************************
                *
                * AGLNO GET LINE #
                *
                *                 ENTRY:  B CONTAINS ADDR OF LINE
                *
                *                 EXIT:   LINE NO. IN LNO
                *
                ***************************
                *
27170  035732   GLNUM STB T18       SAVE ADDR
27171  000177         LDA P0        SET LNO = 0 INITIALLY
```

```
27172  031226         STA LNO
27173  005307         LDB FWUP      START SEARCH AT BEGGINNING OF PROGRAM
                *
27174  001277  GLN2   LDA END$      SEE IF PAST END OF PROGRAM
27175  170040         TCA
27176  020001         ADA B         ADD CURRENT ADDR
27177  172407         SAM GLN1      OK IF NEG RESULT
27200  072004         RZA GLERR     ERROR IF >0
27201  100001         LDA B,I       =0 SO END OF PROGRAM
27202  050053         AND B177      GET LAST LINE LINK
27203  072404         SZA GLRT      ERROR IF NOT ZERO
                *
27204  140404  GLERR JSM AERR1,I    ERROR, LINE BRIDGES MESSED UP
27205  030464         ASC 1,14
                *
27206  015732  GLN1   CPB T18       FOUND IT?
27207  170201  GLRT   RET 1         YES
27210  045226         ISZ LNO       NO KEEP SEARCHING
27211  100001         LDA B,I       GET LINE BRIDGE
27212  050053         AND B177      LOOK ONLY AT LINE LENGTH
27213  024000         ADB A         ADD TO CURRENT ADDRESS
27214  072470         SZA GLERR     ERROR IF LENGTH = 0
27215  066174         JMP GLN2
                *
                *

        ********GTO AND GSB ADJUSTING ROUTINES*********

                *
                *
                *
                *
                *
                *
                *      AJGTO ADJUSTS GTO AND GSB DESTINATIONS AFTER AN INSERT
                *      OR DELETE LINE OPERATION
                *
                *
                *      ON ENTRY : ENTRY AT AJINS IS FOR GTO MODIFICATION AFTER AN INSERT
                *                 ENTRY AT AJDEL IS FOR GTO MODIFICATION BEFORE A DELETE
                *                 T9 = LN1 IF THIS IS A INSERT
                *                 T7 = LN2 IF THIS IS A DELETE
                *                 ERRORS :
                *                                 ON DELETE THE DELETION OF A GTO'S
                *              DESTINATION IS ERROR 36
                *
                *
                *      ON EXIT : RET 1 IF THE GTOS AND GSBS ARE ADJUSTED
                *                 ELSE RETURN THROUGH AERR1
                *
                *
                *      TEMPORARIES USED : T11, T6, T7, T9, T2, T15, T17, LNO
                *
                *                     LKTMP+6 (DFLAG)
                *      ROUTINES CALLED : AERR1, ARLNO, ARLNF, AFCI, AFCC, AGLNO
                *
                *
                *
                *
                *      ADJUSTMENT CRITERIA :
                *
                *      FORMAT OF GTO/GSB :
                *
                *     ----- ----- ----- ----- ----- -----
                *     OPCODE  H.S. GTO      44     GTO # IF
                *     OCTAL   ADDRESS       42     <---- 44
                *      224=   (0 IF UNSET)  '44= NUMERIC
                *      231                  42= STRING FOLLOWS
                *
                *
                *      INSERT CASE :
                *
                *       INSERT OPERATES BY SCANNING THE PROGRAM 6 TIMES FOR EACH
                *      OF THE 6 GTO/GSB CODES. WHEN A GTO/GSB CODE IS FOUND, THE LINE
                *      NUMBER OF THE ASSOCIATED LINE IS CALCULATED, VIA SUBROUTINE,
                *      AS A REFERENCE. THE GTO/GSB DESTINATION IS ALSO GENERATED
                *      BY TAKING THE TWO BYTES AFTER THE 44 IS FOUND AND MAKING
                *      THESE TWO BYTES A NUMBER. THIS INFORMATION IS THE INPUT TO THE
                *      ADJUSTMENT ROUTINES WHICH DECIDE, BASED ON THE TYPE OF GTO/GSB
                *      ENCOUNTERED (+,-, ASB,) THE VALUE OF THE GTO/GSB, AND THE
                *      LINE NUMBER OF THE LINE CONTAINING THE GTO/GSB.
                *
                *      THE FOLLOWING RULES APPLY TO INSERTS :
                *
```

******GTO AND GSB ADJUSTING ROUTINES*******

```
                *     1). '+' RELATIVE : IF LN1>LNO AND LNO+K>=LN1 OR
                *     2). '-' RELATIVE : LN1<=LNO AND LNO-K<=LN1 OR
                *     3). ABSOLUTE    :  K<=LN1
                *     THEN K+1-->K, ELSE DO NO ADJUSTMENT
                *
                *
                *      DELETE CASE : A PRESCAN IS MADE OF THE PROGRAM, IF DFLAG =1.
                *     DURING THE PRESCAN , THE GTO/GSB DESTINATIONS ARE CHECKED TO
                *     BE SURE THAT WHEN THE DELETION TAKES PLACE (IT HASN'T YET) , THE
                *     DESTINATION OF SOME GTO/GSB WILL NOT DISAPPEAR, UNLESS
                *     THE SOURCE IS DELETED. IF ANY DESTINATIONS ARE DELETED,
                *     ERROR 36 IS GIVEN AND NO ADJUSTMENT OR DELETION IS DONE. IF
                *     THE PRESCAN IS SUCCESSFUL (ERRORLESS), THE ADJUSTMENT IS
                *     MADE AND THE LINES ARE DELETED
                *     THE SAME 6 PASSES THROUGH THE PROGRAM ARE MADE FOR THE 6
                *     GTO/GSB CODES AS FOR THE INSERT CASE.
                *     RULES FOR DELETIONS :
                *     IF NO '*' IS ENTERED WITH THE DEL
                *
                *     '+' RELATIVE : LNO<LN1, LN2<LNO+K, LN1<=LNO+K OR
                *     '-' RELATIVE : LN2<LNO, LN2>=LNO-K, LN1>LNO-K OR
                *         ABSOLUTE : LN2>=K
                *
                *     THEN ADJUST : K-(LN2-LN1+1) -> K
                *
                *     ERROR CONDITIONS OR NON-ADJUSTMENT CONDITIONS ARE THE
                *     REMAINING ALTERNATIVES.
                *
                *     IF DFLAG IS SET - PRESCAN - DO NO ADJUSTMENT, GIVE ERROR
                *     IF DFLAG IS CLEAR (NO '*' ) AND AN ERROR CONDITION OCCURS
                *     THEN ADJUST ARTIFICIALLY AS FOLLOWS :
                *
                *     '+' RELATIVE : LN1-LNO -> K
                *     '-' RELATIVE : LNO-(LN2+1) -> K
                *         ABSOLUTE : LN1 -> K
                *
                *
                *
                *
                *     THIS SECTION IS FOR  INSERTS
                *
27216   042413  AJINS JSM SETUP        SAVE THE NECESSARY VARIABLES
27217   042427  AJGT2 JSM TRLND        GET THE LINE INTO THE I/O BUFFER
27220   066401        JMP AJG30        RESTORE TEMP , TURN OFF RUN LIGHT RETURN
27221   042442        JSM FGTO         FIND THE NEXT GTOO
27222   066235        JMP AJGT4        A '-' FOUND
27223   066250        JMP AJGT6        A '+' FOUND
27224   174040        TCB              ABSOLUTE GTO/GSB
27225   025721        ADB T9           IS K>=LN1 ?
27226   174040        TCB
27227   176002        SBP *+2          SKIP IF YES
27230   066217        JMP AJGT2        NO SO CONTINUE
27231   005716  AJGT5 LDB T6           ADJUST GTO FOR INSERT
27232   024254        ADB P1
27233   042421        JSM ASLN         RESTOE  THE LINE
27234   066217        JMP AJGT2        OK TO CONTINUE
27235   005226  AJGT4 LDB LNO          GET LN1
27236   174040        TCB
27237   025721        ADB T9
27240   176057        SBP AJGT2        DO NOTHING HERE, LN1>LNO
27241   005716        LDB T6           GET THE GTO NUMBER
27242   174040        TCB              LNO -B<=LN1 = LN1-(LNO -B)>=0
27243   025226        ADB LNO
27244   174040        TCB
27245   025721        ADB T9
27246   176063        SBP AJGT5        SKIP IFTRUE
27247   066217  AJGT7 JMP AJGT2        NEED NOT ADJUST THIS GTO
27250   005721  AJGT6 LDB T9           IS LN1>LNO  ?
27251   174040        TCB
27252   025226        ADB LNO          IE. IS LNO -LN1<0
27253   176074        SBP AJGT7        NO IF SKIP
27254   001721        LDA T9           IS LNO +B>=LN1  =
27255   170040        TCA              LNO +B-LN1>=0
27256   021226        ADA LNO
27257   021716        ADA T6
27260   172467        SAM AJGT7        NO, DO NO ADJUSTMENT
27261   066231        JMP AJGT5        YES, AJUST GTO
                *
                *     THIS CODE IS FOR DELETIONS
                *
27262   042413  AJDEL JSM SETUP        SAVE THE NECESSARY VARIABLES
27263   042427  AJG32 JSM TRLND        GET NEXT GTO/GSB TYPE IN T11
27264   066401        JMP AJG30        RESTORE TEMPS, TURN OFF RUN LIGHT AND RETURN
27265   001721        LDA T9           IF GTO/GSB LINE IS INCLUDED-
```

******GTO AND GSB ADJUSTING ROUTINES*******

```
27266  170040        TCA            IN DELETED ECTION-NEED NOT
27267  021226        ADA LNO        PROCESS IT
27270  172405        SAM AJG31
27271  001226        LDA LNO        THAT IS IF LN1<=LNO<=LN2
27272  170040        TCA            IF TRUE GO ON TO NEXT LINE
27273  021717        ADA T7
27274  172067        SAP AJG32
27275  042442  AJG31 JSM FGTO       FIND THE NEXT GTO
27276  066323        JMP AJG11      WE HAVE A '-'
27277  066343        JMP AJG12      WE HAVE A '+'
27300  174040        TCB            K>LN2 =   /WE HAVE ABSOLUTE GTO GSB
27301  025717        ADB T7         LN2-K<0
27302  176406        SBM AJG10      SKIP IF TRUE, MUST ADJUST
27303  001721        LDA T9         IS K>=LN1 = K-LN1>=0 ?
27304  170040        TCA
27305  021716        ADA T6
27306  172455        SAM AJG32      SKIP IF FALSE
27307  066376        JMP ERGTA      ERROR-DESTINATION GONE
27310  001613  AJG10 LDA DFLAG      IF THIS FLAG IS SET WE DO NO ADJUSTMENT
               *                    THIS IS A PRESCAN
27311  073452        RLA AJG32      SKIP IF A PRESCAN
27312  001721        LDA T9         VALID GTO/GSB FOR DELETE
27313  170040        TCA
27314  021717        ADA T7         SO K=K-(LN2-LN1+1)
27315  020254        ADA P1
27316  170040        TCA
27317  005716        LDB T6
27320  024000        ADB A
27321  042421  AJG33 JSM ASLN       REPLACE ADJUSTED NUMBER IN LINE
27322  066263  AJG16 JMP AJG32      OK SO CONTINUE
27323  005226  AJG11 LDB LNO        IS LN2<LNO  ?
27324  174040        TCB            OR LN2-LNO <0 ?
27325  025717        ADB T7
27326  176074        SBP AJG16      SKIP IF NEED DO NO ADJUSTMENT
27327  005716        LDB T6         GET THE NUMBER
27330  174040        TCB            IS IS LN2>=LNO -K ?
27331  025226        ADB LNO        OR IS LN2-(LNO-K)>=0 ?
27332  174040        TCB
27333  025717        ADB T7
27334  176466        SBM AJG16      SKIP IF FALSE, DO NO ADJUSTMENT
27335  005716        LDB T6         GET THE NUMBER AGAIN
27336  025721        ADB T9         IS LN1 <= LNO -K ?
27337  174040        TCB            OR LNO -(K+LN1)>=0 ?
27340  025226        ADB LNO
27341  176447        SBM AJG10      SKIP IF OK TO ADJUST GTO OR GSB
27342  066363        JMP ERGTM      ERROR-DESTINATION GONE
27343  005717  AJG12 LDB T7         IS LNO <LN2 OR LNO -LN2<0 ?
27344  174040        TCB
27345  025226        ADB LNO
27346  176054        SBP AJG16      SKIP IF FALSE, DO NO ADJUSTMENT
27347  005721        LDB T9         GET THE LINE NUMBER
27350  174040        TCB            LN1<=LNO+K
27351  025716        ADB T6
27352  025226        ADB LNO
27353  176447        SBM AJG16      SKIP IF FALSE DO NO ADJUSTMENT
27354  005716        LDB T6         GET THE NUMBER AGAIN
27355  025226        ADB LNO        LN2<LNO +K  OR LN2-(LNO +K)<0
27356  174040        TCB
27357  025717        ADB T7
27360  176402        SBM *+2
27361  066371  AJG15 JMP ERGTP      ERROR-DESTINATION GONE
27362  066310        JMP AJG10
27363  042404  ERGTM JSM ERRR2      SEE IF WE ADJUST OR GIVE ERROR
27364  005717        LDB T7         ADJUST, SO LN-(LN2+1) -> K
27365  024254        ADB P1
27366  174040        TCB
27367  025226        ADB LNO
27370  066321        JMP AJG33
27371  042404  ERGTP JSM ERRR2      SEE IF WE ADJUST OR GIVE ERROR
27372  005226        LDB LNO        ADJUST, SO K=LN
27373  174040        TCB            K=LN1-LNO
27374  025721        ADB T9
27375  066321        JMP AJG33
27376  042404  ERGTA JSM ERRR2      SEEE IF WE ADJUST OR GIVE ERROR
27377  005721        LDB T9
27400  066321        JMP AJG33
               *
               *
27401  001731  AJG30 LDA T17
27402  031226        STA LNO
27403  164504        JMP ARNLF,I    TURN OFF THE RUN LIGHT, RETURN
27404  001613  ERRR2 LDA DFLAG      IF LSB IS SET WE GIVE ERROR BECAUSE GTO
               *                    GSB DESTINATION WILL BE GONE IF DELETE IS
               *                    ALLOWED
```

```
********GTO AND GSB ADJUSTING ROUTINES*********

27405   073021          SLA ASLN1
27406   001232   ERR36  LDA CFLAG          CLEAR FETCH BIT FOR UP ARROW ROUTINES
27407   073201          SLA *+1,C
27410   031232          STA CFLAG
27411   140404          JSM AERR1,I        GTO DESTINATION GONE
27412   031466          ASC 1,36
                 *
                 *
                 *      SETUP WILL TURN ON RUN LIGHT, SET VARIABLES TO CALL AFCI
                 *      AND AFCC, AND SAVE LNO
                 *
                 *
                 *
                 *
27413   140503   SETUP  JSM ARNLO,I        TURN ON THE RUN LIGHT
27414   001226          LDA LNO
27415   031731          STA T17
27416   000050          LDA B224
27417   004152          LDB M6             THIS IS TO GET ALL 6 GTO/GSB CODES
27420   164374          JMP AFCI,I         INITILIZE THE BYTE SEARCH ROUTINE
                 *
                 *
                 *
                 *      ASLN WILL REPLACE THE TWO BYTES THAT MAKE UP THE GTO/GSB
                 *      DESTINATION WITH THE NUMBER THAT IS IN THE B REGISTER
                 *
                 *      ON ENTRY : B HAS THE NUMBER TO REPLACE THE BYTES IN THE GTO/GSB
                 *                 D POINTS TO THE BYTE IMMEDIATELY AFTER THE SECOND
                 *                 BYTE OF THE GTO/GSB NUMBER IN THE COMPILED LINE
                 *
                 *      ON EXIT : THE GTO/GSB DESTINATION IS MODIFIED
                 *
                 *
                 *      TEMPORARIES USED : NONE
                 *
                 *      ROUTINES CALLED : NONE
                 *
                 *
                 *
27421   000001   ASLN   LDA B
27422   050045          AND B377           CLEAR THE H.O. BYTE
27423   074750          PBD A,D
27424   174507          SAR 8              GET THE H.O. BYTE
27425   074751          PBD B,D            REPLACE THE H.O. BYTE
27426   170201   ASLN1  RET 1
                 *
                 *      TRLIN FINDS THE NEXT GTO/GSB OF TYPE "44" IN THE PROGRAM AND KEEP
                 *      TRACK OF HERE AND LNO  IN THE PROCESS
                 *
                 *      ON ENTRY : D POINTS TO THE NEXT BYTE TO BE EXAMINED
                 *
                 *      ON EXIT : RET 1 IF END$ IS ENCOUNTERED
                 *                RET 2 IF A TYPE "44" GTO/GSB IS ENCOUNTERED
                 *                      THEN D POINTS TO FIRST BYTE AFTER THE GTO/GSB
                 *                      OPCODE
                 *
                 *      TEMPORARIES USED: T11, HERE, A, B, D, LNO ,
                 *
                 *      ROUTINES CALLED: NONE
                 *
                 *
27427   140375   TRLND  JSM AFCC,I         FIND THE NEXT BYTE OF TYPE IN T11
27430   170201          RET 1              RET 1 IMPLIES EOP FOUND
27431   005712          LDB T2             FIND THE LINE NUMBER OF ADDRESS IN T2
27432   035265          STB HERE           REMEMBER THIS ADDRESS
27433   140523          JSM AGLNO,I        GET THE LINE NUMBER OF THE LINE
27434   044017          ISZ D              LINE NUMBER RETURNED IN LNO
27435   074570          WBD A,I            GET TO THE DESTINATION BYTES
27436   074570          WBD A,I
27437   022463          ADA BM44           SEE IF WE HAVE A NUMERIC GTO/GSB
27440   072067          RZA TRLND          NON-NUMERIC SO SKIP
27441   170202   GTUP   RET 2              FOUND GTO/GSB
                 *
                 *
                 *
                 *
                 *
                 *      FTGO FORMS THE INTEGER NUMBER REPRESENTING THE GTO/GSB DESTINATIO
                 *      AND STORES IT IN T6, FGTO ALSO DET. THE TYPE OF GTO/GSB
                 *
                 *      ON ENTRY : D POINTS TO FIRST BYTE OF THE GTO/GSB DESTINATION
                 *           INTEGER
                 *
                 *      ON EXIT : RET 1 = GTO/GSB "-" ENCOUNTERED
                 *                RET 2 = GTO/GSB "+" ENCOUNTERED
```

```
                    *         RET 3 = NONE OF THE ABOVE=>GTO/GSB ABSOLUTE ENCOUNTERED
                    *         IN EACH CASE THE POINTER, D,POINTS AT THE
                    *         FIRST BYTE AFTER THE SECOND BYTE OF THE DEST. NUMBER
                    *
                    *
                    *    TEMORARIES USED : T6, T11
                    *
                    *    ROUTINES CALLED : NONE
                    *
                    *
27442  074571       FGTO  WRD B,I         MAKE NUMBER FROM TWO BYTES
27443  174607             SBL 8           AFTER "44" IN GTO/GSB
27444  074570             WRD A,I         FIELD
27445  060001             IOR B
27446  004000             LDB A
27447  035716             STB T6          SAVE IN T6 AND B FOR RETURN
27450  001714             LDA T4          MUST DETERMINE WHICH TYPE OF GTO/GSB
27451  022462             ADA BM224
27452  072454             SZA ASLN1       WE HAVE A GTO/GSB REL. -
27453  020257             ADA M1
27454  072465             SZA GTOP        WE HAVE A GTO RELATIVE "+"
27455  020257             ADA M1
27456  072450             SZA ASLN1       WE HAVE A GSB RELATIVE -
27457  020257             ADA M1
27460  072461             SZA GTOP        WE HAVE A GSB RELATIVE "+"
27461  170203             RET 3           HERE IF ABSOLUTE GTO OR GSB
                    *
                    *
                    *
                    *********************************************************
                    *
                    *  CONSTANTS
                    *
27462  177554       BM224 OCT -224
27463  177734       BM44  OCT -44
27464  177762       M14   DEC -14
27465  034460       DLIMT OCT 34460       BITS 9-0
                    *
                    *
                    *
                    *********************************************************
                    *
                    *    DEFINITIONS
                    *
                    *
       000221       NWWD  EQU B70K
       000263       MAXLN EQU FLAG
       000170       BUHM  EQU M256
       000122       B32   EQU P26
       000052       STPMS EQU B200
       000263       TRCMS EQU FLAG
       000077       COLLN EQU B72
       000053       EOL   EQU B177
       000177       KPA   EQU P0
       000116       QUOTE EQU B42
       000045       DCMND EQU B377
       000236       CTCNT EQU B2K
       077216       CST   EQU CSTMP
       077217       .WPRT EQU CSTMP+1
       077216       SIOCP EQU CST
       077220       M     EQU CST+2
       077221       PLADD EQU CST+3
       077223       TMP6  EQU CST+5
       077224       K     EQU CST+6
       077225       TMP2  EQU CST+7
       077226       LNO   EQU CST+8
       077227       TMP1  EQU CST+9
       077230       TMP5  EQU CST+10
       077231       TMP3  EQU CST+11
       077232       CFLAG EQU CST+12
       077233       TMP7  EQU CST+13
       077234       TMP4  EQU CST+14
       077235       SKEY  EQU CST+15
       077207       .WMOD EQU IOTMP+1
       077210       DTMP1 EQU IOTMP+2
       077211       DTMP2 EQU IOTMP+3
       077212       SPKN  EQU IOTMP+4
       077213       OLCP  EQU IOTMP+5
       077214       CRSP  EQU IOTMP+6
       077215       IOCP  EQU IOTMP+7
       000433       DISP  EQU ALDSP
       077613       DFLAG EQU LKTMP+6
                    *
```

******GTO AND GSB ADJUSTING ROUTINES*******

```
                 *************************************************************
                 *
      27777             ORG 27777B
      27777             BSS 1         CHECKSUM!!!!!!!!!!!!!!!!!!!!!!!!!!!
                 *
                 **********************
                 *
                 *
                        END
```

END OF PASS 2 NO ERRORS DETECTED

BASE-PAGE READ-WRITE-MEMORY

```
      76550             ORG 76550B
                        UNL
```

```
                 *
                 *****                     I/O ROM
                 *
                 *                                  (FINAL RELEASE VERSION)
                 *
                 *      USING BPAGE!
                 *
                        UNS
      32000             ORG 32000B
                 *
      32000  032030     DEF EXEC    EXECUTION LINK WORD
      32001  032053     DEF COMP    COMPILE LINK WORD
      32002  032103     DEF RCOMP   REVERSE COMPILE LINK WORD
      32003  177777     DEC -1      NO COMMAND TABLE
      32004  032110     DEF INIT    INITIALIZATION ROUTINE
      32005  000014     DEC 12      ROM ID=12
```

```
                 *
                 *  THE RELATIVE OP CODES ARE AS FOLLOWS:
                 *
                 *      1  FMT    FORMAT
                 *      2  WRT    WRITE
                 *      3  RED    READ
                 *      4  WTC    WRITE CONTROL
                 *      5  WTB    WRITE BYTE
                 *      6  RDB    READ BYTE
                 *      7  RDS    READ STATUS
                 *      8  CONV   CONVERSION TABLE
                 *      9  LIST#  LIST TO PERIPHERAL
```

FORMATTED I/O ROM

```
                 *
                 *    LINKS
                 *
      32006  033250        DEF GSCFN   LINK TO GET SELECT CODE/FMT NUMBER ROUTINE
      32007  033341        DEF BUSET   LINK TO SET UP THE HP-IB ROUTINE
      32010  033573        DEF REDST   LINK TO READ STATUS ROUTINE
      32011  032273        DEF ANFMT   LINK TO PROCESS NEXT FORMAT ROUTINE
      32012  033162        DEF ERDBI   LINK TO STACK A RESULT ROUTINE
      32013  032136  .RET1 DEF SLINK   ADDRESS OF A RET 1 (HELP ROUTINE)
      32014  033450        DEF SEND    ADDRESS OF NORMAL OUTPUT ROUTINE
      32015  033532        DEF READ    ADDRESS OF NORMAL INPUT ROUTINE
```

```
                 *
                 *    TABLE OF EXECUTION ROUTINE ADDRESSES
                 *
      32016  132016  ETBL  DEF *,I
      32017  032202        DEF EFMT
      32020  032532        DEF EWRT
```

```
32021  032702        DEF ERED
32022  033376        DEF EWTC
32023  032673        DEF EWTB
32024  033157        DEF ERDB
32025  033177        DEF ERDS
32026  033211        DEF ECONV
32027  033655        DEF ELIST


                *
                *   GENERAL EXECUTION ROUTER
                *
                *   ENTRY:  A CONTAINS THE ROM'S RELATIVE CODE
                *
32030  031717  EXEC  STA STMT     SAVE ORIGINAL RELATIVE CODE
32031  023016        ADA ETBL     CONSTRUCT AND
32032  031724        STA ASTMT    SAVE EXECUTION ADDRESS
32033  000016        LDA C
32034  031734        STA CSAVE    SAVE C POINTER
32035  043137        JSM PTSET    SET UP POINTERS TO STOLEN R/W
32036  141724        JSM ASTMT,I  GO TO THE EXECUTION ROUTINE
32037  001734        LDA CSAVE    RESTORE C VALUE
32040  030016        STA C
32041  164365        JMP AINTX,I  WHEN DONE, RETURN TO MAIN SYSTEM
                *
                *   MNEMONIC AND CODE TABLE FOR COMPILER
                *
                *   CODEWORD FORMAT:
                *      BITS 14-8 = CLASS (IMPLIED MULTIPLY)
                *      BITS  7-0 = TOKEN (PARSER DIRECTOR)
                *
32042  003041        OCT 3041     6 33 LIST# (LST)
32043  003052        OCT 3052     6 42 CONV  (SFG)
32044  004032        OCT 4032     8 26 RDS   (FCN)
32045  004032        OCT 4032     8 26 RDB   (FCN)
32046  003045        OCT 3045     6 37 WTB   (PRT)
32047  003052        OCT 3052     6 42 WTC   (SFG)
32050  003045        OCT 3045     6 37 RED   (PRT)
32051  003045        OCT 3045     6 37 WRT   (PRT)
32052  003070        OCT 3070     6 56 FMT   (FREE FIELD)
                *
32053  063155  COMP  DEC  26221   F   M
32054  072040        DEC  29728   T
32055  100567        DEC -32393   (1)  W
32056  071164        DEC  29300   R   T
32057  020202        DEC  08322       (2)
32060  071145        DEC  29285   R   E
32061  062040        DEC  25632   D
32062  101567        DEC -31881   (3)  W
32063  072143        DEC  29795   T   C
32064  020204        DEC  08324       (4)
32065  073564        DEC  30580   W   T
32066  061040        DEC  25120   B
32067  102562        DEC -31374   (5)  R
32070  062142        DEC  25698   D   B
32071  103162        DEC -31118   (6)  R
32072  062163        DEC  25715   D   S
32073  103543        DEC -30877   (7)  C
32074  067556        DEC  28526   O   N
32075  073040        DEC  30240   V
32076  104154        DEC -30612   (8)  L
32077  064563        DEC  26995   I   S
32100  072040        DEC  29728   T
32101  021611        OCT  21611   #  (9)
32102  100000        OCT 100000   *** END OF TABLE MARKER ***
                *
                *   REVERSE COMPILE TABLE
                *
                *   EACH BYTE OF THE REVERSE COMPILE TABLE SUPPLIES
                *   THE FOLLOWING INFORMATION:
                *      BITS 7-4 = PRIORITY
                *      BITS 3-0 = CLASS
                *
32103  000422  RCOMP OCT 000422    FMT   0,1    WRT   1,2
32104  011022        OCT 011022    RED   1,2    WTC   1,2
32105  011342        OCT 011342    WTB   1,2    RDB  14,2
32106  161022        OCT 161022    RDS  14,2    CONV  1,2
32107  011000        OCT 011000    LIST# 1,2


                *   THE FOLLOWING TABLE GIVES THE STRUCTURE OF THE
                *   ROM'S STOLEN WORDS, RELATIVE TO "FSPTR":
                *
```

```
                *      0-9     BYTE POINTERS TO "FMT N" FOR N=0,9
                *       10     BYTE POINTER TO EXECUTED FMT STATEMENT
                *       11     CVTBL  POINTER TO END OF CONVERSION TABLE
                *       12     SFEAT  SPECIAL FEATURES (EXTIO)
                *       13     HLINK  LINK TO HELP ROUTINES IN OTHER ROMS
                *       14     WRTIC  LINK TO SEND ROUTINE (WRITE INTERCEPT)
                *       15     REDIC  LINK TO READ ROUTINE (READ INTERCEPT)
                *       16     RUNLK  NEXT LINK IN "RUN" DAISEY CHAIN
                *       17     LODLK  NEXT LINK IN "LOAD" DAISEY CHAIN
                *    18-27     BYTE-PAIR CONVERSION TABLE (ASCII/CONVERTED)

                ********** NOTE ON ERRORS **********
                *
                *    THIS ROM WAS ORIGINALLY CALLED "FORMATTED I/O".
                *    THE NAME WAS CHANGED TO "GENERAL I/O" AND THUS,
                *    THE ERRORS ARE NOW GIVEN AS G1-G9.  PROGRAM
                *    LABLES AND COMMENTS, HOWEVER, ARE STILL IN TERMS
                *    OF F1-F9, DUE TO THE OLD NAME.
                *
                ************************************
                *
                *    INITIALIZATION
                *
                *    RESERVE 28 WORDS OF R/W MEMORY; SET NULL FORMAT
                *    FOR ALL FORMATS; SET UP RUN-LINK, LOAD-LINK, AND
                *    ROM'S INTERNAL LINKS.
                *
32110  001306   INIT  LDA FWAM     GET CURRENT STOLEN WORD BOUNDARY
32111  031045         STA FSPTR    AND SAVE AS ADDRESS OF THIS ROM'S WORDS
32112  071614         CLR 13       CLEAR FORMATS, CONVERSIONS, AND FEATURES
32113  020132         ADA P13      POINT TO LINKS AREA
32114  004000         LDB A
32115  002721         LDA IVALS    TRANSFER INITIAL VALUES
32116  071402         XFR 3
32117  024144         ADB P3       POINT TO END OF AREA
32120  001533         LDA RLINK
32121  130001         STA B,I      SAVE CURRENT LINK IN RUN CHAIN
32122  003144         LDA FRLNK    GET FMT RUN ROUTINE ADDRESS
32123  031533         STA RLINK    AND PUT IT IN THE CHAIN
32124  024254         ADB P1       POINT TO NEXT STOLEN LOCATION
32125  001530         LDA LOADL    GET THE CURRENT LINK IN THE LOAD
32126  130001         STA B,I      DAISEY CHAIN AND SAVE IT
32127  003154         LDA FLLNK    GET FMTIO LOAD LINK ADDRESS
32130  031530         STA LOADL    AND PUT IT IN THE CHAIN
32131  024134         ADB P11      POINT BEYOND STOLEN AREA
32132  035306         STB FWAM     AND SET THIS AS NEW BOUNDARY
32133  001062         LDA ROMWD
32134  060117         IOR B40      LOG IN FMTIO ROM  (BIT 5)
32135  031062         STA ROMWD
32136  170201   SLINK RET 1        INITIALIZATION COMPLETE

                *
                *    THIS ROUTINE SETS UP POINTERS TO STOLEN WORDS
                *    AND LINK WORDS FOR USE
                *
32137  001045   PTSET LDA FSPTR    GET STOLEN WORDS LOCATION
32140  020134         ADA P11      POINT TO FEATURES/LINKS
32141  006726         LDB .TREG    AND MOVE THEM INTO T-REGISTERS
32142  071404         XFR 5        WHERE THEY'RE MORE ACCESSABLE
32143  170201         RET 1
                *
                *    THIS ROUTINE SETS ALL FORMATS TO NULL
                *    WHENEVER A "RUN" IS EXECUTED, AND THEN
                *    CONTINUES ALONG THE DAISY CHAIN.
                *
32144  032145   FRLNK DEF *+1
32145  000257         LDA M1
32146  031610         STA KBFMT    RESET ANY PENDING KEYBOARD FORMATS
32147  001045         LDA FSPTR    GET ADDRESS OF START OF FORMAT TABLE
32150  071612         CLR 11       RESET FORMATS
32151  020127   CHAIN ADA P16      POINT TO NEXT RLINK IN CHAIN
32152  100000         LDA A,I      GET THE ADDRESS
32153  164000         JMP A,I      AND CONTINUE EXECUTION THERE.

32154  032155   FLLNK DEF *+1
32155  001045         LDA FSPTR    GET ADDRESS OF FORMAT POINTERS TABLE
32156  020136         ADA P9       POINT TO FORMAT 9
```

FORMATTED I/O ROM

```
32157  005063  FLLN0 LDB NPROG   GET LOAD KEYS/PROGRAM FLAG
32160  076410        SZB FLKEY   IF KEYS, GO TO KEY OFFSET ROUTINE
32161  104000        LDB A,I     GET NEXT FORMAT POINTER
32162  176601        SBM *+1,C   STRIP OF LEFT/RIGHT BIT (15)
32163  174040        TCB         MAKE NEGATIVE ABSOLUTE ADDRESS
32164  025706        ADB PROFS   ADD IN OFFSET TO NEW PROGRAM
32165  176011        SBP FLLN2   IF B>0, FORMAT WAS NOT REPLACED
32166  004177        LDB P0      ELSE, FORMAT IS GONE SO RESET
32167  067175        JMP FLLN1   AND GO TO FORMAT RESET
                    *
32170  104000  FLKEY LDB A,I     GET NEXT FORMAT POINTER
32171  016722        CPB .SFMT   IF STANDARD FORMAT,
32172  067176        JMP FLLN2   NO ADDRESS CORRECTION REQUIRED
32173  076403        SZB FLLN2   IF ZERO, NO FORMAT WAS SET
32174  025744        ADB KYOFS   ELSE, ADD IN KEY PROGRAM OFFSET
32175  134000  FLLN1 STB A,I     AND PUT BACK NEW ADDRESS
32176  011045  FLLN2 CPA FSPTR   DID WE JUST DO THE LAST ONE?
32177  072152        RIA CHAIN   YES; GET OUT
32200  020257        ADA M1      NO; POINT TO NEXT FORMAT POINTER
32201  067157        JMP FLLN0   AND GO AROUND AGAIN
```

FORMATTING ROUTINES

```
                    *
                    *   FORMAT STATEMENT EXECUTION
                    *
                    *   THIS SECTION SETS A POINTER TO THE PROPER FORMAT
                    *   STATEMENT IN THE FORMAT POINTER TABLE
                    *
32202  074560  EFMT  WBC A,I     BYPASS THE BEGINNING OF FORMAT CHARACTE
32203  042527        JSM CSAV    SAVE PTR TO FIRST FMT BYTE
32204  043466        JSM FNBLD   TRY TO BUILD A FORMAT NUMBER
                    *
32205  035720        STB FMT.N   SAVE B AS POSSIBLE FORMAT NUMBER
32206  005716        LDB T6      B = POINTER TO START OF FMT STATEMENT
32207  010107        CPA C.COM   DID COMMA TERMINATE FNBLD?
32210  004016        LDB C       YES; POINT TO SPECS FOLLOWING FMT N.
32211  010121        CPA C.EFM   EMPTY FORMAT?
32212  006722        LDB .SFMT   YES; USE STANDARD FORMAT
32213  000177        LDA P0
32214  015716        CPB T6      IS B STILL EQUAL TO CSAVE?
32215  031720        STA FMT.N   YES; THIS MUST BE FMT 0
32216  001720        LDA FMT.N   IN ANY CASE, GET FMT NUMBER
32217  020207        ADA M10
32220  172403        SAM *+3     IF FMT.N<10, ALL IS WELL
32221  140404  ER.F1 JSM AERR1,I OTHERWISE, ***** ERROR F1 *****
32222  043461        ASC 1,G1    BAD FORMAT REFERENCE
32223  001257        LDA CSTAT   CHECK CURRENT STATE
32224  073005        SLA EFMTP   IF LSB(A)=0, FORMAT IS IN PROGRAM
32225  001720        LDA FMT.N   ELSE, FMT IS FROM KEYBOARD EXECUTION
32226  031610        STA KBFMT   SO SAVE ITS NUMBER IN BASE PAGE WORD
32227  000135        LDA P10     AND SET THIS AS A SPECIAL FORMAT
32230  067232        JMP *+2     SKIP TO PROCESS AS DUMMY FMT 10
32231  001720  EFMTP LDA FMT.N   GET FORMAT NUMBER
32232  021045        ADA FSPTR   OFFSET TO FORM POINTER ADDRESS FOR SAVE
32233  134000        STB A,I     AND PUT BYTE POINTER IN STOLEN TABLE
                    *
                    *   THIS SECTION MOVES C TO END OF FMT + 1
                    *
32234  074760        WBC A,D     BACK UP POINTER IN CASE OF NULL FORMAT
32235  074560  GTEFM WBC A,I     LOOK AT NEXT CHARACTER
32236  010121        CPA C.EFM   IF IT WAS END OF FORMAT (34B)
32237  170203        RET 3       THEN EXIT (BYPASS C RESET)
32240  067235        JMP GTEFM   OTHERWISE, CONTINUE TO SCAN
                    *
                    *   THIS ROUTINE SETS UP INITIAL VALUES FOR
                    *   SCANNING THE FORMAT STATEMENT:
                    *
                    *   REP.C = 1
                    *   Z.CSP = 100000 (NO SUPRESSION SET)
                    *   .BFMT = C = START OF FORMAT
                    *
32241  001045  FMSET LDA FSPTR   GET LOCATION OF FORMAT POINTER TABLE
32242  005232        LDB CFLAG   CHECK THE CONTINUE FLAG
32243  174501        SBR 2       FOR THE RUN-DONE BIT (1 = FORMATS VALID)
32244  077402        RLB *+2     IF FORMATS VALID, GO ON
32245  071611        CLR 10      ELSE, RESET ALL FMTS EXCEPT KEYBOARD FMT
32246  004136        LDB P9
32247  141737        JSM HLINK,I GIVE EXTIO A CHANCE TO DO ITS FMSET
32250  005720        LDB FMT.N   GET THE FORMAT NUMBER
32251  000001        LDA B       AND KEEP IN A FOR LATER TEST
32252  015610        CPB KBFMT   IS THIS FORMAT PENDING FROM KEYBOARD?
32253  004135        LDB P10     YES; USE FMT 10 INSTEAD (KYBD FORMAT)
```

FORMATTING ROUTINES

```
32254  025045        ADB FSPTR   ADD IN OFFSET TO FORMAT TABLE
32255  104001        LDB B,I     GET TABLE ENTRY FOR FORMAT N
32256  076003        RZB *+3     IF NON-ZERO, FORMAT IS VALID
32257  072042        RZA ER,F1   IF NO FMT SET AND FMT.N >0, GIVE ERROR
32260  006722        LDB .SFMT   IF FMT.N=0, USE STANDARD FORMAT
32261  035720        STB .BFMT   SAVE AS STARTING ADDRESS OF FORMAT
32262  000254        LDA P1
32263  031732        STA REP.C   INITIALIZE REP.C TO 1
32264  000263  ZCSET LDA FLAG
32265  031726        STA Z.CSP   SET FOR NO SUPRESSION, # DATA SPECS = 0
32266  034016  CSET  STB C       SET BYTE POINTER FOR <SPEC> FETCH
32267  170201        RET 1       SETUP COMPLETE
                *
                *   THIS SECTION SCANS THE FORMAT FOR NEXT SPECIFICATION
                *
                *   IF TEXT SPEC, IT EXECUTES IT:
                *       X = SPACE      / = CR/LF      Z = SUPRESS CR/LF
                *       "......" = LITERAL
                *
                *   IF DATA SPEC, RETURNS TO CALLING ROUTINE
                *       F    = FIXED POINT
                *       E    = FLOATING POINT
                *       FZ   = FIXED POINT WITH LEADING ZEROS
                *       B    = BINARY
                *       C    = CHARACTER STRING

32270  001725  NFMT  LDA RW.SN   GET LAST SPEC TYPE
32271  055732        DSZ REP.C   IF REPEAT COUNT WAS 1, GET NEXT SPEC
32272  170201        RET 1       OTHERWISE, RETURN LAST SPEC
                *
                *   ENTRY TO BYPASS REP.C CHECK: FORCE NEXT SPEC
                *
32273  043466  ANFMT JSM FNBLD   GET REP.C IF ANY
32274  076004        RZB *+4     IF REPETITION COUNT >0, GO ON
32275  005715        LDB TS      WAS THE COUNT AN EXPLICIT ZERO?
32276  076027        RZB ER.F2   IF SO, REP.C=0 IS DUMB!
32277  004254        LDB P1      OTHERWISE, USE DEFAULT REP.C = 1
32300  035732        STB REP.C   AND SAVE IT
                *
                *   NOW CHECK CHARACTER WHICH TERMINATED NUMBER BUILDER
                *   TO DETERMINE TYPE OF <SPEC>
                *
32301  010121        CPA C.EFM   IF END OF FORMAT,
32302  067433        JMP E.EFM   GO TO END OF FORMAT ROUTINE
32303  004254        LDB P1      SET B=1 IN CASE <SPEC>="E"
32304  012731        CPA C.F     IF SPEC BEGINS WITH F
32305  067327        JMP S.F     SET UP NUMERIC OUTPUT
32306  010063        CPA C.E     IF "E",
32307  067335        JMP S.E     SET UP FLOATING SPEC
32310  010064        CPA C.C     IF "C",
32311  067361        JMP S.C     SET UP FOR STRING
32312  012730        CPA C.B     IF "B"
32313  067367        JMP S.B     SET UP FOR BINARY
32314  012732        CPA C.X     IF "X"
32315  067373        JMP E.X     EXECUTE SPACE ROUTINE
32316  010104        CPA C.LF    IF "/"
32317  067421        JMP E.LF    ECECUTE LINE FEED ROUTINE
32320  010116        CPA C.QT    IF LITERAL
32321  067402        JMP E.QT    EXECUTE A LITERAL
32322  012733        CPA C.Z     IF "Z"
32323  067425        JMP E.Z     SET TO SUPRESS CR/LF
                *
                *   NO VALID FORMAT RECOGNIZED
                *
32324  141737  FHELP JSM HLINK,I ASK FOR HELP
32325  140404  ER.F2 JSM AERR1,I NO LUCK! ***** ERROR F2 *****
32326  043462        ASC 1,G2    IMPROPER FORMAT SPECIFICATION
                *
                *   THIS SECTION PROCESSES SPECIFICATIONS FORM FORMAT
                *
                *   <SPEC> STARTS WITH "F" = F,FZ.
                *
32327  004177  S.F   LDB P0      B = 0 IF FZ
32330  074560        WBC A,I     LOOK AT NEXT CHARACTER
32331  012733        CPA C.Z     IF Z
32332  067335        JMP S.E     STORE TYPE 0
32333  074760        WBC A,D     OTHERWISE, BACK UP THE BYTE POINTER
32334  004145        LDB P2      AND SET FOR FIXED-TYPE FORMAT
                *
                *   AT THIS POINT, B = 0(FZ), 1(E), 2(F)
                *
32335  174700  S.E   RBR 1       B = FZ(000000), F(000001), E(100000)
32336  035727        STB FFFLG   SAVE TYPE IN FIX/FLT FLAG
```

```
32337  043514        JSM DW.D     DEMAND W.D
                *
                *   THIS SECTION SETS UP FWPRT FOR PROPER FORMATTING
                *
32340  001217        LDA .WPRT    GET CURRENT FIX/FLT SETTING JUST IN CASE
32341  005730        LDB DP       B=SPECIFIED DECIMAL POINT SETTING
32342  176406        SBM S.FI     IF B<0, USE CURRENT FIX/FLT SETTING
32343  024255        ADB M12      CHECK DP FOR RANGE (0,11)
32344  176004        SBP S.FI     IF DP>11, USE CURRENT FIX/FLT SETTING
32345  001730        LDA DP       IF IN RANGE, GET DP
32346  170603        SAL 4        PUT THIS SETTING IN FIX AND FLT BITS
32347  061730        IOR DP       OF WORD FOR NEW .WPRT
32350  050045  S.FI  AND B377     KEEP ONLY FIX/FLT SETTING VALUES
32351  061727        IOR FFFLG    AND SET FIX/FLT BIT (15) TO PROPER STATE
32352  060224        IOR B60K     SET BIT 14 TO PREVENT FLOAT REVERSION
32353  031216  S.NUM STA FWPRT    USE THIS FOR FXD/FLT INDICATOR
32354  001725        LDA RW.SN
32355  073201        SLA *+1,C    SET FOR NUMBER REQUIRED
32356  031725  S.RET STA RW.SN    AND SAVE FOR FUTURE USE
32357  045726        ISZ Z.CSP    LOG IN OCCURANCE OF DATA SPEC
32360  170201        RET 1        AND GET OUT
                *
                *   THIS SECTION SETS UP FOR STRING
                *
32361  043466  S.C   JSM FNBLD    GET REP.C
32362  035731        STB FW       SET FIELD WIDTH
32363  043522        JSM TRMCK    CHECK FOR PROPER TERMINATION
32364  001725        LDA RW.SN    GET TYPE WORD
32365  073301        SLA *+1,S
32366  067356        JMP S.RET
                *
                *   THIS SECTION SETS UP FOR FMT B (16-BIT BINARY NUMBER)
                *
32367  074560  S.B   WBC A,I      GET THE NEXT BYTE
32370  043522        JSM TRMCK    AND CHECK FOR PROPER TERMINATION
32371  000257        LDA M1       SET .WPRT FOR BINARY FORMAT
32372  067353        JMP S.NUM    AND EXIT THROUGH NUMERIC SPEC SETUP
                *
                *   PROCESS <SPEC> = X
                *
32373  000117  E.X   LDA P32      GET AN ASCII SPACE
32374  042417        JSM IO1C     AND READ/WRITE IT
32375  055732        DSZ REP.C    IF REPEAT COUNT > 1,
32376  067373        JMP E.X      LOOP UNTIL DONE
32377  074560        WBC A,I      GET NEXT CHARACTER FROM FMT
32400  043522  E.XTC JSM TRMCK    AND CHECK FOR PROPER TERMINATION
32401  067273        JMP ANFMT    IF OK, FORCE NEXT SPEC
                *
                *   PROCESS <SPEC> = "....."
                *
32402  000016  E.QT  LDA C        GET CURRENT FORMAT LOCATION
32403  031727        STA QTADD    AND SAVE IN CASE OF REPEAT COUNT
32404  001727  E.QTL LDA QTADD    GET ADDRESS OF START OF QUOTE
32405  030016        STA C        AND RESET BYTE POINTER FOR ANOTHER PASS
32406  074560  E.QTN WBC A,I      GET NEXT CHARACTER FROM LITERAL
32407  010116        CPA C.QT     IF QUOTE MARK
32410  067413        JMP DQTCK    CHECK FOR DOUBLE QUOTE
32411  042417  E.QTQ JSM IO1C     READ/WRITE ONE CHARACTER
32412  067406        JMP E.QTN    LOOP FOR NEXT CHARACTER
                *
32413  074560  DQTCK WBC A,I      LOOK AT CHARACTER FOLLOWING QUTOTE
32414  010116        CPA C.QT     IS IT ANOTHER QUOTE
32415  067411        JMP E.QTQ    YES, TAKE IT
32416  055732        DSZ REP.C    NO, MUST BE END. IF REP.C >1,
32417  067404        JMP E.QTL    THEN RESET TO START OF LITERAL
32420  067400        JMP E.XTC    DONE! EXIT THROUGH TERM CHECK
                *
                *   PROCESS <SPEC> = /
                *
32421  043446  E.LF  JSM ECRLF    READ/WRITE A CR/LF
32422  055732        DSZ REP.C    IF REPEAT COUNT > 1,
32423  067421        JMP E.LF     CONTINUE TO LOOP
32424  067377        JMP E.XTC-1  WHEN DONE, EXIT THROUGH TERM CHECK
                *
                *   PROCESS <SPEC> = Z
                *
32425  001726  E.Z   LDA Z.CSP    GET SUPRESSION FLAG
32426  172201        SAP *+1,C    CLEAR CR/LF BIT (15)
32427  031726        STA Z.CSP    PUT BACK SUPRESSION FLAG
32430  067377        JMP E.XTC-1  WHEN DONE, EXIT THROUGH TERM CHECK
```

```
                         *
                         *   THIS ROUTINE HANDLES AND END-OF-FORMAT
                         *
                         *   IF A CONVERSION SPEC WAS ENCOUNTERED, RESET TO START
                         *   OF FORMAT FOR RESCAN. OTHERWISE, TERMINATE RED/WRT.
                         *   IN ANY CASE, RED/WRT A CR/LF UNLESS SUPRESSION SET.
                         *
32431  031726  NOSUP STA Z.CSP    REPLACE SUPRESSION FLAG
32432  043446        JSM ECRLF    READ/WRITE A CR/LF
                         *
32433  001726  E.EFM LDA Z.CSP    GET SUPRESSION FLAG
32434  172675        SAM NOSUP,C  IF BIT(15) SET, DO A CR/LF
32435  072407        SZA EFMX     IF NO DATA SPECS, TERMINATE
32436  001721        LDA NPCNT    GET PARAMETER COUNT
32437  010254        CPA P1       LAST PARAMETER PROCESSED?
32440  067444        JMP EFMX     YES; DONE, SO GET OUT
32441  005720        LDB .BFMT    NO; GET POINTER TO BEGINNING OF FORMAT,
32442  043264        JSM ZCSET    AND RESET FOR ANOTHER SCAN
32443  067273        JMP ANFMT    GO FOR NEXT FORMAT
32444  054003  EFMX  DSZ R        CANCEL JSM TO THIS ROUTINE
32445  170201        RET 1
```

```
                         *
                         *   THIS ROUTINE READS/WRITES A CR/LF
                         *
32446  004135  ECRLF LDB P10
32447  141737        JSM HLINK,I  GIVE EXTIO A CHANCE TO EXPAND CR/LF
32450  001725        LDA RW.SN    GET THE READ/WRITE FLAG
32451  172405        SAM RCRLF    IF READ, GO TO READ CR/LF
32452  000132  WCRLF LDA A.CR     GET AN ASCII CR
32453  042421        JSM WRTAC    AND OUTPUT IT
32454  000135        LDA A.LF     GET AN ASCII LF
32455  066421        JMP WRTAC    AND OUTPUT IT (IMPLIED RETURN)
                         *
32456  000042  RCRLF LDA P511
32457  031714        STA T4       SET CUTOFF COUNT FOR OUTPUT-ONLY DEVICE
32460  042425  CKFLF JSM REDAC    READ NEXT CHARACTER
32461  010135        CPA A.LF     LINE FEED?
32462  170201        RET 1        YES; GET OUT
32463  055714        DSZ T4       NO; COUNT EXHAUSTED?
32464  067460        JMP CKFLF    NO; TRY AGAIN
32465  066004        JMP ER.F7    READ 511 CHARS WITH NO LF; GIVE ERROR
                         *
                         *   SUBROUTINE TO BUILD A NUMBER FROM FORMAT STATEMENT
                         *
                         *   ENTRY: C POINTS TO NEXT FORMAT CHARACTER
                         *    EXIT: B = INTEGER
                         *          A = CHARACTER TERMINATING NUMBER
                         *         T5 = COUNT OF EXPLICIT DIGITS FOUND
                         *
32466  004177  FNBLD LDB P0       INITIALIZE TO ZERO
32467  035712        STB T2       NUMBER BUILDING REGISTER
32470  035715        STB T5       COUNT OF DIGITS FOUND
32471  173201        SOC *+1,C    CLEAR OVERFLOW INDICATOR
32472  074560  FNBLN WBC A,I      GET THE NEXT CHARACTER FROM FORMAT
32473  042051        JSM DIGCK    IS IT A DIGIT?
32474  067502        JMP FNBL1    YES; PROCESS IT
32475  005715        LDB T5       NO; WERE THERE ANY DIGITS
32476  076002        RZB *+2      IF YES, RETURN THE VALUE BUILT
32477  141737        JSM HLINK,I  IF NO, TRY FOR VARIABLE VALUE
32500  005712        LDB T2       B = NUMBER BUILT
32501  170201        RET 1        DONE.
                         *
32502  045715  FNBL1 ISZ T5       LOG IN A DIGIT FOUND
32503  001712        LDA T2       GET THE NUMBER BUILT SO FAR (N)
32504  020000        ADA A
32505  020000        ADA A
32506  021712        ADA T2
32507  020000        ADA A
32510  021714        ADA T4       T4 = DIGIT JUST FOUND (D) IN RANGE [0,9]
32511  031712        STA T2       N = 10*N + D
32512  173060        SOC FNBLN    IF NO OVERFLOW, TRY FOR ANOTHER DIGIT
32513  067325        JMP ER.F2    OTHERWISE, GIVE BAD INTEGER ERROR
```

```
                         *
                         *   BUILD A NUMBER IN THE FORM W.D
                         *
                         *   ENTRY: C POINTS TO W.D IN FORMAT STATEMENT
                         *    EXIT: FW = W OR 0 (NO W GIVEN)
                         *          DP = D OR -1 (NO .D GIVEN)
                         *
```

FORMATTING ROUTINES

```
32514  043466  DW.D  JSM FNBLD   BUILD A NUMBER
32515  035731        STB FW      SAVE FIELD WIDTH
32516  004257        LDB M1      SET TO CURRENT FIX/FLT JUST IN CASE
32517  010105        CPA C.DP    DECIMAL POINT FOLLOWS?
32520  043466        JSM FNBLD   YES; BUILD D VALUE
32521  035730        STB DP      NO, USE -1; SAVE RESULT IN DP
                *
                *  CHECK FORMAT FOR PROPER TERMINATION
                *  <SPEC> MUST BE FOLLOWED BY COMMA OR END-OF-FORMAT
                *
32522  010107  TRMCK CPA C.COM   WAS TERMINATOR COMMA?
32523  170201        RET 1       YES; ALL IS WELL; GO BACK
32524  010121        CPA C.EFM   END OF FORMAT?
32525  067530        JMP F.END   YES; LOG THIS FACT
32526  004145        LDB P2      LOOKS BAD; SET UNRECOGNIZED TERMINATOR
32527  067324        JMP FHELP   AND ASK FOR HELP
                *
32530  074760  F.END WBC A,D     BACK UP SO SCAN WILL FIND EFM CHARACTER
32531  170201        RET 1       AND PROCESS THIS SPEC
```

WRITE EXECUTION

```
                *
                *  WRT <SC>,<FMT#>,<PARAMETER LIST>
                *
32532  000177  EWRT  LDA P0      SET FOR WRITE OPERATION
32533  042250        JSM GSCFN   AND SET UP SC, FMT#; CHECK HARDWARE
32534  043241        JSM FMSET   SET UP FORMAT FOR WRITE
32535  043270  WLOOP JSM NFMT    DEMAND NEXT FORMAT
32536  073002        SLA *+2     IF BIT(0)=0, NUMBER REQUIRED
32537  067645        JMP SWRT    OTHERWISE, DO A STRING WRITE
                *
                *  OUTPUT A NUMERIC ITEM
                *
32540  001216  NWRT  LDA FWPRT   LOOK AT FORMATTED .WPRT AND
32541  010257        CPA M1      IF IT IS -1,
32542  067653        JMP BWRT    OUTPUT UNDER BINARY FORMAT
32543  043604        JSM NPGET   TRY FOR NEXT PARAMETER
32544  010254        CPA P1      GOT IT; WAS IT STRING?
32545  067642        JMP FREST   YES; DO A FREE STRING
32546  001727        LDA FFFLG   LOOK AT <SPEC> TYPE
32547  072402        SZA *+2        IF A=0 (FZ SPEC) SET LEADING ZEROS
32550  000160        LDA M16        IF A#0 SET LEADING BLANKS
32551  020103        ADA B60
32552  031746        STA LCHR    SAVE ASCII CODE IN LEADING CHARACTER
32553  074570        WBD A,I     LOOK AT FIRST CHARACTER (-/SPACE)
32554  073006        SLA NWRTP   IF BLANK (BIT0=0), OK
32555  074770        WBD A,D     IF MINUS (BIT0=1), RESET D
32556  024254        ADB P1      RESET COUNT
32557  001727        LDA FFFLG   PARM. IS NEGATIVE; CHECK FOR FMT FZ
32560  072002        RZA NWRTP   IF NOT FZ FORMAT, GO ON
32561  067613        JMP ER.F3   DON'T ALLOW FZ FORMAT WITH MINUS NUMBER
32562  000071  NWRTP LDA A.E     SET FOR LC. E TO UC. E CONVERSION
32563  043635        JSM ESETN   AND SET NCC = COUNT + 1
32564  001731  SWRT1 LDA FW      A = FIELD WIDTH
32565  024257        ADB M1      B = #CHARACTERS
32566  174040        TCB
32567  024000        ADB A       B = FW - #CHARS
32570  176007        SBP NWRT1   IF B>=0, OUTPUT B LEADING CHARACTERS
32571  004000        LDB A       OTHERWISE, SET B = FW
32572  076405        SZB NWRT1   ALLOW FOR FREE-FIELD WIDTH
32573  000114        LDA C.DOL   GET ASCII $
32574  031746        STA LCHR    SET $ AS LEADING CHARACTER
32575  000254        LDA P1      A = #CHARACTERS, B = # LEADING CHARS
32576  031750        STA NCC     SET FOR NOTHING AFTER LEADING CHARACTER
32577  024254  NWRT1 ADB P1      B = NUMBER LEADING CHARACTERS + 1
32600  035747        STB LCNT    SAVE IN LEAD COUNT
32601  043617        JSM DLCHR   DUMP LEADING CHARACTERS
32602  043626        JSM DCSTR   DUMP THE CHARACTER STRING
32603  067535        JMP WLOOP   GO BACK FOR NEXT SPEC.
32604  000254  NPGET LDA P1      SET TO GET NEXT PARAMETER
32605  004505        LDB APGET   GET ADDRESS OF PARAMETER GET ROUTINE
32606  024145        ADB P2      OFFSET FOR ALTERNATE ENTRY
32607  140001        JSM B,I     AND GO THERE; MORE PARAMETERS?
32610  067433        JMP E.EFM   NO; EXIT THROUGH CR/LF CHECK
32611  055721        DSZ NPCNT   YES; BUMP PARAMETER COUNT
32612  176007        SBP DLRET   IF B>0, ALL OK SO RETURN
32613  140404  ER.F3 JSM AERR1,I ***** ERROR F3 *****
32614  043463        ASC 1,G3    BAD PARAMETER
```

```
                *
                *  ROUTINE TO DUMP LEADING CHARACTERS
                *
```

WRITE EXECUTION

```
                   *    LCHR = LEADING CHARACTER CODE (ASCII)
                   *    LCNT = LEADING CHARACTER COUNT + 1
                   *
32615  001746            LDA LCHR    GET ASCII CHARACTER
32616  042417            JSM IOIC    AND SEND IT
32617  055747      DLCHR DSZ LCNT    DO IT AGAIN?
32620  067615            JMP *-3     YES
32621  170201      DLRET RET 1       NO
                   *
                   *    ROUTINE TO DUMP A CHARACTER STRING
                   *
                   *    NCC  = NUMBER OF CHARACTER COUNT + 1
                   *    ECHR = CHARACTER TO DUMP FOR L.C. E
                   *
32622  074570      DCSTN WBD A,I     GET THE NEXT BYTE FROM THE STRING
32623  010063            CPA C.E     IS IT A L.C. E?
32624  001751            LDA ECHR    USE EITHER AN U.C. E OR A L.C. E
32625  042421            JSM WRTAC   OUTPUT THE CHARACTER
32626  055750      DCSTR DSZ NCC     MORE CHARACTERS IN THE STRING?
32627  067622            JMP DCSTN   YES; DUMP THE NEXT ONE
32630  170201            RET 1       NO; DONE.


32631  000254      BUMP1 LDA P1
32632  164607            JMP ABUMP,I

                   *
                   *    THIS ROUTINE SETS THE CHARACTER TO BE DUMPED
                   *    FOR AN "E", AND SAVES NCC = B+1
                   *
32633  000063      ESETS LDA C.E     STRING ENTRY; LEAVE L.C. "E" ALONE
32634  024254            ADB P1      ADD 1 TO B FOR NCC COUNT
32635  031751      ESETN STA ECHR    NUMERIC ENTRY; A=U.C. "E"
32636  035750            STB NCC     B = COUNT OF CHARACTERS + 1
32637  170201            RET 1
                   *
                   *    THIS ROUTINE OUTPUTS A FREE STRING FROM THE PARAMETER
                   *    LIST WHEN A NUMERIC ITEM WAS EXPECTED
                   *
32640  000177      FRESA LDA P0
32641  043605            JSM NPGET+1 RE-GET PARAMETER IN ASCII FORM
32642  043633      FREST JSM ESETS   SET ECHR AND NCC FOR STRING OUTPUT
32643  043626            JSM DCSTR   AND DUMP THE CHARACTER STRING
32644  067540            JMP NWRT    TRY AGAIN FOR A NUMERIC PARAMETER
                   *
                   *    OUTPUT A STRING
                   *
32645  043604      SWRT  JSM NPGET   FETCH THE NEXT PARAMETER
32646  072445            SZA ER.F3   IF A=0, NUMERIC ITEM. BAD SHOW!
32647  000117            LDA B40
32650  031746            STA LCHR    SET LEADING CHARACTER TO BLANK
32651  043633            JSM ESETS   SET ECHR AND NCC FOR STRING OUTPUT
32652  067564            JMP SWRT1   AND LET NUMERIC OUTPUT FINISH UP
                   *
                   *    OUTPUT A BINARY FORMATTED NUMBER
                   *
32653  043631      BWRT  JSM BUMP1   POINT TO NEXT PARAMETER
32654  043433            JSM E.EFM   IF NONE, LET E.EFM FINISH UP
32655  040751            JSM NGET    DEMAND NUMERIC VALUE
32656  067640            JMP FRESA   NON-NUMERIC; TRY FOR FREE STRING
32657  055721            DSZ NPCNT   DECREMENT PARAMETER COUNT
32660  043663            JSM BOFIX   MAKE AN INTEGER
32661  141740            JSM WRTIC,I AND SEND IT
32662  067535            JMP WLOOP   GO BACK FOR MORE
                   *
                   *    THIS ROUTINE MAKES A BINARY NUMBER FROM
                   *    FLOATING POINT NUMBER (OCT/DEC)
                   *
32663  000001      BOFIX LDA B       A POINTS TO NUMBER TO BE FIXED
32664  004141            LDB P6      SET FOR POSSIBLE OCTAL CONVERSION
32665  141737            JSM HLINK,I AND GIVE OCTAL ROUTINE A CHANCE
32666  040644            JSM FIXPT   IF NO HELP, CALL ON DECIMAL FIX-POINT
32667  173002            SOC *+2     IF NO OVERFLOW, GO ON
32670  067613      JERF3 JMP ER.F3   OTHERWISE, GIVE OVERFLOW ERROR
32671  000001            LDA B       A = B = RESULT
32672  170201            RET 1


                   *
                   *    WTB <SC>, <BYTE LIST>
                   *
```

WRITE EXECUTION

```
                        *      FAKE A "FMT Z, 65535B" AND LET EWRT PROCESS IT
                        *
32673   000177   EWTB   LDA P0       SET FOR OUTPUT OPERATION
32674   031726          STA Z.CSP    RESET FOR SUPRESS/NO DATA SPECS
32675   042250          JSM GSCFN    AND GET THE SELECT CODE
32676   000257          LDA M1
32677   031732          STA REP.C    SET FOR 65535 REPEATS OF "FMT B"
32700   031216          STA FWPRT    SET FORMAT ,WPRT TO "BINARY"
32701   067535          JMP WLOOP    ENTER "EWRT" AT NEXT FORMAT CALL
```

READ EXECUTION

```
                        *
                        *    RED <SC>,<FMT,N>, <VARIABLE LIST>
                        *
32702   000263   ERED   LDA FLAG     SET READ INDICATOR
32703   042250          JSM GSCFN    AND SET UP SELECT CODE, FORMAT NUMBER
32704   043241          JSM FMSET    INITIALIZE FORMAT
32705   031722          STA RTFLG    CLEAR READ-TERMINATE FLAG
                        *
                        *    FREE-FIELD READ = FMT Z, 32767 FZ*.0
                        *
                        *    SET Z=SUPRESS, DP=0, FW=0, REP.C=0
                        *
32706   002727          LDA .T14     SET POINTER TO TEMPS, JUST IN CASE
32707   016722          CPB .SFMT    IS THIS A FREE-FIELD FORMAT?
32710   071604          CLR 5        YES; DO FREE-FIELD SETUP
                        *
                        *    READ THE NEXT PARAMTER
                        *
32711   043270   RCONT  JSM NFMT     DEMAND NEXT FORMAT
32712   043631          JSM BUMP1    POINT TO NEXT PARAMETER
32713   043433          JSM E.EFM    LIST EXHAUSTED; FINISH UP
32714   055721          DSZ NPCNT    GOT IT; BUMP PARAMETER COUNT
32715   101272          LDA FAP1,I   GET TYPE (WHAT WORD)
32716   172005          SAP ER.F5    IF PARAMETER IS A CONSTANT, CAN'T READ!
32717   040751          JSM NGET     CHECK TYPE OF THIS PARAMETER
32720   066060          JMP SRED     NON-NUMERIC; TRY FOR A STRING
32721   001725          LDA RW.SN    NUMERIC; SEE IF FMT IS FOR A NUMERIC
32722   073013          SLA NRED     YES IT IS; DO A NUMERIC READ
32723   140404   ER.F5  JSM AERR1,I  ***** ERROR F5 *****
32724   043465          ASC 1,G5     WRONG READ PARAMETER TYPE
```

```
                        *
                        *    ROUTINES TO ABORT SINGLE PARAMETER OR READ LIST
                        *
32725   043733   REDX   JSM REDXX    SET FLAG 13 TO TELL PARAMETER ABORTED
32726   001722   RLOOP  LDA RTFLG    CHECK THE READ-TERMINATE FLAG
32727   073062          SLA RCONT    IF CLEAR, GO ON TO READ NEXT PARAMETER
32730   001721          LDA NPCNT    ELSE, SEE IF ALL PARAMS. DONE
32731   010254          CPA P1       IF READ/WRITE LIST COMPLETED
32732   170201          RET 1        DON'T SET FLAG 13
32733   004132   REDXX  LDB P13      SET B FOR FLAG 13 SETTING
32734   164376          JMP ASFG,I   SET THE FLAG (IMPLIED RETURN)
                        *
                        *    INPUT A NUMERIC ITEM
                        *
32735   001216   NRED   LDA FWPRT
32736   010257          CPA M1       IS FXD/FLT FLAG = -1?
32737   066144          JMP BRED     YES; THIS IS A BINARY READ
                        *
32740   000305          LDA ASTAK
32741   030017          STA D        SET TO USE CSTAK FOR INPUT BUFFER
32742   001731          LDA FW
32743   031747          STA TFW      SET TEMP-FW FOR COUND DOWN
32744   042527          JSM CSAV     SAVE C SINCE ANUMB WILL KILL IT
32745   042025          JSM REDFC    READ FIRST INPUT CHARACTER
32746   010107          CPA C.COM    IS IT A ","?
32747   067725          JMP REDX     YES; ABORT THIS PARAMETER
32750   010135   NRED0  CPA A.LF     LINE FEED (12B)?
32751   067725          JMP REDX     NO NUMERIC DATA FOUND; SKIP THIS VALUE
32752   172477          SAM *-1      FW RAN OUT BEFORE NUMERIC DATA
32753   042045          JSM NSTCK    GOT BYTE; NUMERIC TYPE?
32754   067757          JMP NRED1    YES; START NUMBER BUFFER
32755   042021          JSM REDNC    NO; TRY THE NEXT CHARACTER
32756   067750          JMP NRED0    AND TEST IT
                        *
32757   042015   NRED1  JSM STK1C    STACK A NUMERIC TYPE CHARACTER AND READ
32760   172405          SAM NRBLS    IF FW EXHAUSTED, GO TO NUMBER SCANNER
```

```
32761  005731         LDB FW       FREE FIELD READ?
32762  076075         RZB NRED1    NO; KEEP READING
32763  042035         JSM NUMCK    YES; STILL READING NUMERIC TYPES?
32764  067757         JMP NRED1    YES; CONTINUE UNTIL NON-NUMERIC TYPE
32765  074550  NRBLS  PBD A,I      STACK A DELIMITER IN CASE FW ENDED READ
32766  004325         LDB ASTKF
32767  034016         STB C        SET C TO START OF BUFFER
32770  000177         LDA P0
32771  031751         STA MSGN     RESET THE MANTISSA-SIGN INDICATOR
32772  074560  NRBL1  WBC A,I      CHECK THE FIRST BYTE READ
32773  042047         JSM DDPCK    WAS IT A DIGIT OR DECIMAL POINT?
32774  066002         JMP NRBLD    YES; GO TO THE NUMBER BUILDER
32775  010106         CPA A,MIN    NO; A MINUS SIGN?
32776  045751         ISZ MSGN     YES; LOG IN A MINUS SIGN
32777  042041         JSM NUMDK    NO; WAS IT AN "E"?
33000  067772         JMP NRBL1    NO; GO ON CHECKING
33001  066004         JMP ER,F7    YES; THAT WILL NEVER DO; GIVE ERROR.
                *
33002  031240  NRBLD  STA BCD      "NUMB" EXPECTS FIRST CHARACTER HERE
33003  140352         JSM ANUMB,I  AND CALL ON THE NUMBER BUILDER
33004  140404  ER,F7  JSM AERR1,I  NUMBER BUILDER CAME UP CRAPS; ERROR F7
33005  043467         ASC 1,G7     BAD INPUT DATA
33006  000021         LDA AR2+1    LOOK AT FIRST MANTISSA WORD
33007  072404         SZA NRBLP    IF ZERO, SKIP "-" CHECK TO AVOID "-0"
33010  001751         LDA MSGN     CHECK THE MANTISSA-SIGN INDICATOR
33011  073002         SLA *+2      IF POSITIVE, GO ON
33012  044020         ISZ AR2      IF NEGATIVE, SET MANTISSA SIGN
33013  042523  NRBLP  JSM CGET     IT IS SAFE TO RESTORE C NOW
33014  066146         JMP BRED1    AND EXIT THROUGH STORAGE ROUTINE
                *
                *   THIS ROUTINE SAVES A CHARACTER AND READS ANOTHER ONE
                *
                *   ON EXIT, A IS THE CODE READ UNLESS TFW IS EXHAUSTED,
                *   IN WHICH CASE A = -1.
                *
33015  004017  S KIC  LDB D        LOOK AT BUFFER POINTER
33016  016742         CPB ASLMM    END OF BUFFER?
33017  066004         JMP ER,F7    YES; ERROR (160 NUMERICS IS RIDICULOUS)
33020  074550         PBD A,I      NO; SAVE THIS CHARACTER
                *
33021  000257  REDNC  LDA M1       SET TO END-OF-FIELD (EOF) JUST IN CASE
33022  055747         DSZ TFW      IF FIELD WIDTH NOT EXHAUSTED,
33023  066025         JMP REDFC    READ A CHARACTER
33024  170201         RET 1        OTHERWISE, RETURN WITH -1
33025  042425  REDFC  JSM REDAC    INPUT THE NEXT CHARACTER
33026  010132         CPA A,CR     ASCII CR?
33027  066025         JMP REDFC    YES; IGNORE THIS CHARACTER
33030  010136         CPA A,SKP    ASCII SKIP CODE?
33031  067446         JMP ECRLF    READ TO NEXT RECORD AND RETURN WITH A,LF
33032  010135         CPA A,LF     LINE FEED WITHOUT PRECEEDING SKIP?
33033  045722         ISZ RTFLG    YES; SET READ TERMINATE FLAG!
33034  170201         RET 1        RETURN WITH A = CHARACTER

                *
                *   THIS ROUTINE CHECKS FOR "NUMERIC" TYPE CHARACTERS
                *
                *   0-9, DECIMAL POINT, E, +, AND - ARE ALLOWED CHARACTERS
                *   ALL OTHERS ARE NON-NUMERIC AND ACT AS DELIMITERS
                *
33035  010071  NUMCK  CPA A,E      ASCII E?
33036  000063         LDA C,E
33037  010063         CPA C,E      ALLOW L.C. OR U.C. "E" FOR EXPONENT
33040  170201         RET 1
33041  010117  NUMDK  CPA B40      BLANK?
33042  170201         RET 1
33043  010110         CPA A,PLS    ASCII +?
33044  170201         RET 1
33045  010106  NSTCK  CPA A,MIN    ASCII -?
33046  170201         RET 1
33047  010105  DDPCK  CPA C,DP     ASCII .?
33050  170201         RET 1
33051  004000  DIGCK  LDB A
33052  024163         ADB M48      B = A-48
33053  035714         STB T4       T4 = DIGIT IN RANGE [0,9]
33054  176403         SBM *+3      IF B<0, A;[0,47], NOT AN DIGIT
33055  024207         ADB M10      B = A-58
33056  176472         SBM DIGCK-1  IF B>0, A>58, NOT A DIGIT
33057  170202         RET 2        NON-NUMERIC TYPE; RET P+2
                *
                *   INPUT A STRING ITEM
                *
33060  101272  SRED   LDA FAP1,I   GET THE TYPE WORD FOR THIS PARAMETER
33061  012743         CPA STR,S    IS IT A SIMPLE STRING?
33062  066070         JMP SRED0    YES; PROCESS IT
```

```
33063  012744         CPA STR.A   IS IT A SIMPLE STRING FROM AN ARRAY?
33064  066070         JMP SRED0   YES! PROCESS IT
33065  004132         LDB P13     NONE OF THE ABOVE! SET FOR SUBSCRIPTED
33066  141737         JSM HLINK.I STRING TYPE AND ASK FOR HELP
33067  067723         JMP ER.F5   NONE! GIVE BAD READ PARAMETER ERROR
                *
33070  005272  SRED0  LDB FAP1    GET STACK POINTER
33071  024145         ADB P2      POINT TO WHERE WORD
33072  100001         LDA B.I     GET BYTE POINTER TO FIRST CHARACTER
33073  030017         STA D       AND SET UP D FOR CHARACTER STUFFING
33074  074770         WBD A.D     BACK UP POINTER SINCE PBD INCRMS. FIRST
33075  024145         ADB P2      POINT TO POINTER TO CURRENT LENGTH
33076  100001         LDA B.I     GET THE POINTER
33077  031746         STA .LEN    AND SAVE THIS POINTER TO UPDATE LENGTH
33100  071600         CLR 1       SET STRING LENGTH TO ZERO
33101  024254         ADB P1      POINT TO POINTER TO ORGANIZATION DATA
33102  100001         LDA B.I
33103  020145         ADA P2
33104  100000         LDA A.I     A = LEN (DIMENSIONED LENGTH)
33105  031750         STA R.LIM   SET THIS AS INITIAL READ COUNT LIMIT
                *
                *   THIS SECTION SETS UP FOR STRING READ
                *
                *   FREE STRING (RW.SN=EVEN):  R.LIM=LEN    R.AFT=1
                *   FREE FIELD  (FW=0)      :  R.LIM=LEN    R.AFT=1
                *   FORMATTED. FW>L         :  R.LIM=LEN    R.AFT=FW-LEN+1
                *   FORMATTED. FW<L         :  R.LIM=FW     R.AFT=1
                *
33106  004177         LDB P0
33107  035751         STB FFR     SET INITIALLY TO FREE-FIELD READ
33110  001725         LDA RW.SN   IS THIS A FREE-STRING (NUMBER EXPECTED)?
33111  073012         SLA SRED1   YES! R.LIM IS OK! SET R.AFT=1
33112  001731         LDA FW      NO! SET A = FW
33113  072410         SZA SRED1   IF FW=0, R.LIM IS OK! SET R.AFT=1
33114  045751         ISZ FFR     NO! SET TO FORMATTED READ
33115  005750         LDB R.LIM   A = FW
33116  174040         TCB
33117  024000         ADB A       B = FW - LEN
33120  176003         SBP SRED1   IF FW>=LEN. R.LIM IS OK! SET R.AFT
33121  031750         STA R.LIM   OTHERWISE. SET R.LIM = FW
33122  004177         LDB P0      AND R.AFT = 1
33123  024254  SRED1  ADB P1      OFFSET COUNT BY 1 FOR DSZ COUNTDOWN
33124  035747         STB R.AFT   SET NUMBER OF BYTES TO BYPASS AFTER READ
                *
33125  042425  SREDN  JSM REDAC   READ THE NEXT BYTE FROM THE PERIPHERAL
33126  005751         LDB FFR     IS THIS A FREE-FIELD READ
33127  077405         RLB SREDC   NO! ONLY TERMINATE ON R.LIM
33130  010132         CPA A.CR    YES! WAS CHARACTER A CARRIAGE-RETURN?
33131  066125         JMP SREDN   IF SO. FREE-FIELD IGNORES THEM
33132  010135         CPA A.LF    WAS THE CHARACTER A LINE-FEED?
33133  067712  SREDF  JMP RCONT+1 YES! TERMINATE AND TRY AGAIN FOR NUMERIC
                *
33134  074550  SREDC  PBD A.I     PUT THE CHARACTER IN THE STRING
33135  145746         ISZ .LEN.I  INCREMENT THE CURRENT LENGTH COUNT
33136  055750         DSZ R.LIM   HAVE WE READ TO THE LIMIT?
33137  066125         JMP SREDN   NO! READ THE NEXT STRING CHARACTER
33140  043617         JSM DLCHR   YES! READ PAST ANY REMAINING FIELD-WIDTH
33141  005725         LDB RW.SN   CHECK WHETHER THIS WAS FREE-FIELD
33142  077071         SLB SREDF   IT WAS. SO TRY AGAIN FOR NUMERIC
33143  067726         JMP RLOOP   IT WAS FORMATTED. SO GO TO NEXT FORMAT
                *
                *   INPUT A BINARY FORMATTED NUMBER
                *
33144  141741  BRED   JSM REDIC.I READ ONE BYTE
33145  042153         JSM BOFLT   MAKE A FULL-PRECISION NUMBER
33146  005272  BRED1  LDB FAP1
33147  040616         JSM ABSAD+1
33150  000127         LDA ADR2    SET UP SOURCE AND DESTINATIONS
33151  071403         XFR 4       AND SAVE RESULT
33152  067726         JMP RLOOP   GO BACK FOR MORE

                *
                *  BUILD A DECIMAL OR OCTAL FLOATING NUMBER
                *
33153  004142  BOFLT  LDB P5      SET FOR POSSIBLE OCTAL CONVERSION
33154  141737         JSM HLINK.I AND GIVE OCTAL ROUTINE A CRACK
33155  004000         LDB A       B IS VALUE TO FLOAT
33156  164563         JMP AFLTP.I EXIT THROUGH FLOAT-POINT ROUTINE
                *
                *   RDB (<SC>)       FUNCTION
                *
33157  000263  ERDB   LDA FLAG
33160  042250         JSM GSCFN   BUILD AND SET UP SELECT CODE
```

READ EXECUTION

```
33161  141741         JSM REDIC,I READ A BYTE
33162  042153  ERDB1  JSM BOFLT   BUILD A FLOATING NUMBER
33163  000127         LDA ADR2
33164  004340         LDB ARES
33165  071403         XFR 4       PUT THE RESULT IN RES
33166  054003         DSZ R       CANCEL MAIN EXECUTION RETURN
33167  001734         LDA CSAVE
33170  030016         STA C       AND RESTORE VALUE OF C
33171  055721         DSZ NPCNT   HOW MANY FUNCTION PARAMETERS?
33172  067613         JMP ER.F3   MORE THAN ONE! GIVE ERROR!
33173  005272         LDB FAP1    GET THE STACK POINTER
33174  040616         JSM ABSAD+1 FORM ADDRESS OF BOTTOM OF STACK
33175  031263         STA AP1     AND RESET AP1
33176  164366         JMP ARAP,I  CAUSE I'M GOING OUT THE BACK DOOR.

                      *
                      *   RDS (<SC>)       FUNCTION
                      *
33177  000257  ERDS   LDA M1      SET TO BYPASS BUS SETUP
33200  042250         JSM GSCFN   BUILD AND SET UP SELECT CODE
33201  005723         LDB DN.SC   LOOK AT THE CARD TYPE SPECIFIED
33202  176003         SBP *+3     IF CARD STATUS REQUIRED, GO ON
33203  004144         LDB P3      ELSE, SET FOR HP-IB SERIAL POLL
33204  066302         JMP SHELP   AND GO TO EXTIO (OR ERROR F4)
33205  172255         SAP ERDB1,C IF GPIO CARD, RETURN STATUS BYTE
33206  004143         LDB P4      GIVE EXTIO A CHANCE TO RETURN
33207  141737         JSM HLINK,I EXTENDED HP-IB STATUS BYTES
33210  066162         JMP ERDB1,  AND RETURN VALUE OF MAIN STATUS BYTE
```

CONVERSION-TYPE STATEMENTS

```
                      *
                      *   CONV <ASCII>,<FOREIGN>, ... <ASCII>,<FOREIGN>
                      *
                      *   SET UP CODE CONVERSION TABLE
                      *
33211  000177  ECONV  LDA P0
33212  042236         JSM ECONX   CLEAR CONVERSION WORD TO NULL
33213  024141         ADB P6      FORM ADDRESS OF START CONVERSION TABLE
33214  034017         STB D       AND SET D TO PLACE BYTES
33215  140610         JSM ACOUN,I HOW MANY PARAMETERS?
33216  072420         SZA ECONX   NONE! CLEAR CONV FLAG AND GET OUT
33217  073003         SLA *+3     AN EVEN NUMBER, SO GO ON
33220  140404  ER.F6  JSM AERR1,I ODD NUMBER! ***** ERROR F6 *****
33221  043466         ASC 1,G6    IMPROPER CONVERSION PARAMETER
33222  022736         ADA M21     IF NUMBER OF PARAMETERS > 20,
33223  172075         SAP ER.F6   GIVE ERROR (TABLE ONLY HOLDS 10 PAIRS)
                      *
33224  040751  ECONL  JSM NGET    DEMAND A NUMERIC VALUE
33225  066220         JMP ER.F6   NON-NUMERIC, GIVE ERROR G6
33226  043663         JSM BOFIX   MAKE INTEGER USING DEC/OCT FLAG
33227  074551         PBD B,I     PLACE THE BYTE IN CONV TABLE
33230  174506         SBR 7       MORE THAN SEVEN BITS?
33231  076067         RZB ER.F6   YES! NOT ALLOWED
33232  043631         JSM BUMP1   TRY FOR ANOTHER PARAMETER
33233  066235         JMP *+2     NONE! TABLE COMPLETE
33234  066224         JMP ECONL   MORE! LOOP TO BUILD TABLE
33235  000017         LDA D       GET ADDRESS OF LAST TABLE ENTRY
33236  004134  ECONX  LDB P11     SET TO SAVE ADDRESS IN CVTBL (STOLEN)
33237  025045         ADB FSPTR
33240  130001         STA B,I     SET CVTBL WITH CONTENTS OF A
33241  170201         RET 1       DONE! GET OUT

33242  031723  SCRDS  STA DN.SC   SAVE A AS SELECT CODE/DEVICE NUMBER
33243  030011         STA PA      AND SET THE PERIPHERAL ADDRESS REGISTER
33244  050045         AND B377    KEEP ONLY THE SELECT CODE PART
33245  020161         ADA M17     IS IT IN THE RANGE [0,16]?
33246  172035         SAP ER.F4   NO! GIVE BAD SC ERROR
33247  066573         JMP REDST   YES, EXIT THROUGH READ-STATUS ROUTINE
                      *
                      *   THIS ROUTINE DOES THE INITIAL SELECT-CODE SETUP
                      *
                      *   ALLOWED SC FORMATS:  S.F, SS.F, SDD.F, SSDD.F
                      *   WHERE SS=SELECT CODE, DD=DEVICE NUMBER (HPIB)
                      *   AND .F=FORMAT REFERENCE NUMBER
                      *
                      *   ENTRY:  A = 0 (WRITE), 100000 (READ), 177777 (STATUS)
                      *
```

SELECT CODE SET UP ROUTINES

```
                    *   ON EXIT:  DN.SC = GPIO/HPIB FLAG (BIT 15)
                    *                     DEVICE NUMBER (BITS 14-8)
                    *                     SELECT CODE (BITS 7-0)
                    *             FMT.N = FORMAT NUMBER
                    *
                    *   HARDWARE CHECKED FOR VALID CONFIGURATION AND SET
                    *
33250  031725  GS:FN STA RW.SN    SAVE READ/WRITE FLAG
33251  140610        JSM ACOUN,I SET TO FIRST PARAMETER
33252  035721        STB NPCNT    SAVE NUMBER OF PARAMETERS
33253  040751        JSM NGET     DEMAND A NUMERIC VALUE
33254  172325        SAP HLP11,S  IF NON-NUMERIC, ASK FOR HELP
33255  000001  GSCX  LDA B        A = ADDRESS OF SC PARAMETER
33256  004127        LDB ADR2     TRANSFER PARAMETER TO AR2-REGISTER
33257  071403        XFR 4
33260  000020        LDA AR2      LOOK AT THE EXPOPNENT WORD
33261  073422        RLA ER.F4    IF MANTISSA IS NEGATIVE, GIVE ERROR
33262  170405        AAR 6        A = EXPONENT (E)
33263  020254        ADA P1       A = (E+1)
33264  004132        LDB P13      SE! FOR 13 SHIFTS JUST IN CASE
33265  172405        SAM GSCF1    IF E<-1, SC=0.0 SO USE 13 SHIFTS
33266  170040        TCA
33267  020133        ADA P12      ELSE, SET A = 11-E
33270  004000        LDB A        INTO B AS NUMBER OF PLACES TO SHIFT
33271  176412        SBM ER.F4    IF B<0, E>11! TOO BIG, GIVE ERROR
33272  000177  GSCF1 LDA P0       SET TO SHIFT IN ZEROS
33273  031733        STA EXTBA    CLEAR EXTENDED BUS ADDRESSING (FOR EXTIC
33274  075500        MRY          POSITION DP TO FOLLOW DIGIT 12
33275  031720        STA FMT.N    ANY DIGIT AFTER DP IS FORMAT NUMBER
33276  000001        LDA B        A = 11-E (PLACES SHIFTED)
33277  174502        SBR 3        SEE IF #SHIFTS WAS LESS THAN 8
33300  076005        RZB GSCF2    NO, WE HAD 4 DIGITS OR LESS
33301  004134  HLP11 LDB P11      AND CALL ON EXTIO FOR HELP
33302  141737  SHELP JSM HLINK,I THROUGH THE HELP LINK WORD
33303  140404  ER.F4 JSM AERR1,I NO HELP, GIVE ***** ERROR F4 *****
33304  043464        ASC 1,G4     BAD SELECT CODE PARAMETER
33305  000023  GSCF2 LDA AR2+3    GET 4-DIGITS OF SC PARAMETER
33306  030021        STA AR2+1    SET THEM FOR THE NUMBER BUILDER
33307  042372        JSM BLD2D    BUILD AN INTEGER OUT OF FIRST 2 DIGITS
33310  035723        STB DN.SC    AND SAVE THESE FOR NOW
33311  042372        JSM BLD2D    BUILD AN INTEGER OUT OF NEXT 2 DIGITS
33312  000001        LDA B        A = LOW DIGITS
33313  005723        LDB DN.SC    B = HIGH DIGITS
33314  076013        RZB GSC2     IF B>0, THIS IS 3- OR 4-DIGIT SC (HPIB)
                    *
                    *   2-DIGIT SC (GPIO)
                    *
33315  042242        JSM SCRDS    CHECK SELECT CODE AND READ STATUS
33316  077422        RLB GSC1     IF READ STATUS ONLY, QUIT HERE
33317  042650        JSM CKPA     WHAT IS THE PA SET TO?
33320  066517        JMP SENDI    PA=0: EXIT THROUGH BUFFER SETUP
33321  066303  JERF4 JMP ER.F4    PA=1: DON'T ALLOW RED/WRT TO CASSETTE
33322  001745        LDA STBYT    PA>1: GET THE STATUS BYTE
33323  172403        SAM JERF9      IF HP-IB CARD, NOT RIGHT!
33324  050103        AND B60      KEEP ONLY THE IDENTIFIER BITS (5-4)
33325  072013        RZA GSC1     IF CARD IS THERE, DONE.
33326  066364  JERF9 JMP ER.F9    NO CARD, OR TYPE 00 (NON-STANDARD) CARC
                    *
                    *   4-DIGIT SC (HPIB)
                    *
33327  020162  GSC2  ADA M32      IS DN IN RANGE (0,31)?
33330  172071        SAP JERF4    NO! GIVE ERROR
33331  020117        ADA P32      YES! RESTORE A = DN
33332  170607        SAL 8        POSITION DN BITS
33333  060001        IOR B        INCLUDE SC BITS
33334  062740        IOR BSMSK    AND SET HPIB FLAG BITS
33335  042242        JSM SCRDS    CHECK SC AND READ STATUS
33336  172026        SAP ER.F9    IF NOBODY OR GPIO, CONFIGURATION ERROR
33337  014257        CPB M1       IF RW.SN=-1, SKIP BUS SETUP
33340  170201  GSC1  RET 1        AND GET OUT
                    *
                    *   THIS SECTION SETS UP THE HPIB BY
                    *
                    *     SEND UNIVERSAL UNLISTEN COMMAND
                    *     DECLAIR CALCULATOR TALKER/LISTNER (BASED ON RW.SN)
                    *     DECLARE DEVICE AS  LISTNER/TALKER
                    *
33341  001723  BUSET LDA DN.SC    LOOK AT THE GPIO/HP-IB FLAG
33342  004133        LDB P12      SET B FOR HELP LINK, JUST IN CASE
33343  141737        JSM HLINK,I GIVE EXTIO CHANCE FOR SECONDARY ADDRESS
33344  170507        SAR 8        KEEP ONLY DEVICE NUMBER HALF
33345  012737        CPA NOSET    IF DN=31 (11011111)
33346  170201        RET 1        LEAVE THE BUS SETUP AS IS
33347  030022        STA AR2+2    DN<31: SAVE TALK ADDRESS FOR LATER
33350  000074        LDA UNL      GET UNIVERSAL UNLISTEN COMMAND
```

SELECT CODE SET UP ROUTINES

```
33351   042366          JSM BUSR6    AND SEND IT
33352   001743          LDA BUSDN    GET HP-IB'S BUS DEVICE NUMBER
33353   176002          SBP *+2      IF WRITE, THIS IS ALREADY TALK ADDRESS
33354   020066          ADA B140     OTHERWISE, FORM A LISTEN ADDRESS
33355   042366          JSM BUSR6    AND SEND IT
33356   000022          LDA AR2+2    GET SPECIFIED DEVICE NUMBER
33357   176402          SBM *+2      IF READ, THIS IS ALREADY TALK ADDRESS
33360   020066          ADA B140     OTHERWISE, FORM A LISTEN ADDRESS
33361   042366          JSM BUSR6    SEND IT
33362   042627          JSM WAIT     BUS IS CONFIGURED! WAIT FOR READY
33363   076206          SSS BUSRT    AND IF STATUS SET, ALL WENT WELL
33364   140404   ER.F9  JSM AERR1,I  IF NOT, ***** ERROR F9 *****
33365   043471          ASC 1,G9     IMPROPER HARDWARE CONFIGURATION
                 *
                 *  SEND A COMMAND TO THE HPIB
                 *
33366   042627   BUSR6  JSM WAIT     WAIT FOR BUS TO GO READY
33367   030006   EWTC1  STA R6       OUTPUT CONTROL BYTE
33370   005725   RDSTX  LDB RW.SN    AND B = READ/WRITE FLAG
33371   170201   BUSRT  RET 1        FOR NEXT PASS
```

```
                 *
                 *  BUILD A 2-DIGIT NUMBER FROM AR2
                 *
33372   000145   BLD2D  LDA P2
33373   031711          STA T1       SET FOR 2-DIGITS LEFT TO BUILD
33374   004177          LDB P0       INITIALIZE THE ACCUMULATOR
33375   064664          JMP FI2      AND LET "FIXPT" FINISH UP
                 *
                 *   WTC <SC>, <BYTE>
                 *
33376   000257   EWTC   LDA M1       SET FOR CHECK ONLY
33377   042250          JSM GSCFN    BUILD AND SET UP SELECT CODE
33400   172464          SAM ER.F9    DO NOT ALLOW WTC TO HP-IB CARD
33401   072463          SZA ER.F9    NO CARD PLUGGED IN
33402   043631          JSM BUMP1    POINT TO BYTE PARAMETER
33403   067613          JMP ER.F3    NO PARAMETER; GIVE ERROR
33404   040751          JSM NGET     FETCH THE PARAMETER
33405   067613          JMP ER.F3    NON-NUMERIC
33406   043663          JSM BOFIX    MAKE A FIX-POINT NUMBER
33407   052741          AND CMASK    MASK OUT INTERRUPT RELATED BITS (7-4)
33410   042650          JSM CKPA     CHECK THE PERIPHERAL ADDRESS
33411   066463          JMP EWTC0    PA=0; SET ALTERNATE KDP CHIP BY R7 OUT
33412   066303          JMP ER.F4    PA=1; CANNOT WRITE CONTROL TO CASSETTE!
33413   030005          STA R5       PA>1; OUTPUT CONTROL REGISTER
33414   050170          AND LMASK    ANY BITS IN LEFT BYTE?
33415   072454          SZA BUSRT    NO; WE ARE DONE; GET OUT.
33416   066367          JMP EWTC1    YES; SEND SECONDARY DATA THROUGH R6
```

GENERAL INPUT/OUTPUT ROUTINES

```
                 *
                 *  GENERAL INPUT/OUTPUT ROUTER
                 *
                 *  ENTRY:  OUTPUT CODE IN A
                 *  EXIT:   INPUT CODE IN A
                 *
                 *    IOIC:  INPUT/UOTPUT BASED ON CURRENT READ/WRITE FLAG
                 *   WRTAC:  OUTPUT A THROUGH CONVERSION TABLE
                 *   REDAC:  INPUT THROUGH CONVERSION TABLE TO A
                 *
33417   005725   IOIC   LDB RW.SN    LOOK AT READ/WRITE FLAG
33420   176405          SBM REDAC    IF BIT(15) SET, READ
                 *
33421   005735   WRTAC  LDB CVTBL    CHECK FOR CONVERSION
33422   076402          SZB WRTA     IF ZERO, NO CONVERSION ACTIVE
33423   042431          JSM CVSCH    IF NOT, SEARCH CONV TABLE
33424   165740   WRTA   JMP WRTIC,I  GO TO SEND ROUTINE THROUGH LINK WORD
                 *
33425   141741   REDAC  JSM REDIC,I  GO TO READ ROUTINE THROUGH LINK WORD
33426   050053          AND B177     KEEP ONLY 7 BITS
33427   005735          LDB CVTBL    CHECK FOR CONVERSION
33430   076412          SZB CVRET    IF ZERO, NO CONVERSION ACTIVE
33431   005045   CVSCH  LDB FSPTR
33432   024125          ADB P18      FORM ADDRESS OF START OF CONV TABLE
33433   035711          STB CVTBS    SET TABLE POINTER
33434   105711   CVNXT  LDB CVTBS,I  GET NEXT TABLE ENTRY
```

GENERAL INPUT/OUTPUT ROUTINES

```
03202000 33435  174507         SBR 8        KEEP ONLY "CONVERT FROM" CODE
03203000 33436  014000         CPB A        DOES IT MATCH BYTE IN A?
03204000 33437  066445         JMP CVMAT    YES! WE HAVE A MATCH
03205000 33440  005711         LDB CVTBS    CHECK POINTER
03206000 33441  015735         CPB CVTBL    WAS THAT THE LAST ENTRY?
03207000 33442  170201   CVRET RET 1        YES! LEAVE A ALONE AND GET OUT
03208000 33443  045711         ISZ CVTBS    NO! BUMP TABLE POINTER
03209000 33444  066434         JMP CVNXT    AND TEST THE NEXT ENTRY
03210000 33445  101711   CVMAT LDA CVTBS,I  RECOVER THE PAIR THAT MATCHED
03211000 33446  050053         AND B177     KEEP THE CONVERTED-CODE BYTE ONLY
03212000 33447  170201         RET 1        AND RETURN WITH THIS VALUE
03214000                 *
03215000                 *  GENERAL OUTPUT ROUTINE
03216000                 *
03217000 33450  031714   SEND  STA T4       SAVE OUTPUT CODE
03218000 33451  004011         LDB PA       LOOK AT SC
03219000 33452  076416         SZB SEND0    IF SC=0, GO TO PRT/DSP INTERNAL
03220000                 *
03221000                 *  PERIPHERAL SEND ROUTINE
03222000                 *
03223000 33453  076202   SENDP SSS *+2      IF STATUS SET, ALL IS WELL
03224000 33454  042623         JSM PDNCK    OTHERWISE, CHECK FOR DOWN PERIPHERAL
03225000 33455  005723         LDB DN.SC    LOOK AT DEVICE NUMBER
03226000 33456  176407         SBM WHPIB    IF BIT 15 SET, USE HP-IB PROTOCOL
03227000 33457  004005         LDB R5       GET GPIO STATUS BYTE
03228000 33460  174501         SBR 2
03229000 33461  042553         JSM INVDC    INVERT DATA IF INVERT BIT SET
03230000 33462  042465         JSM WHPIB    CALL SR TO OUTPUT DATA
03231000 33463  030007   EWTC0 STA R7
03232000 33464  170201         RET 1

03234000 33465  042627   WHPIB JSM WAIT     WAIT FNR READY
03235000 33466  030004         STA R4       OUTPUT DATA BYTE
03236000 33467  170201         RET 1
03238000                 *
03239000                 *  INTERNAL PRINTER/DISPLAY SEND ROUTINE
03240000                 *
03241000 33470  010132   SEND0 CPA A.CH     IF CARRIAGE RETURN
03242000 33471  170201         RET 1        IGNORE IT
03243000 33472  042525         JSM DCSAV    SAVE CURRENT C & D REGISTERS
03244000 33473  005722         LDB .IOBL    GET POINTER TO I/O BUFFER
03245000 33474  014315         CPB AIBFM    IS THIS THE FIRST CHARACTER?
03246000 33475  140450         JSM ACLBI,I  YES! CLEAR THE BUFFER
03247000 33476  001714         LDA T4       RECOVER OUTPUT BYTE
03248000 33477  010135         CPA A.LF     IS IT A LINE FEED?
03249000 33500  066511         JMP SENDB    YES! DUMP THE BUFFER
03250000 33501  005722         LDB .IOBL    GET POINTER TO IOBUF
03251000 33502  014316         CPB AIBFL    IF IT POINTS TO LAST WORD
03252000 33503  170201         RET 1        BUFFER IS FULL
03253000 33504  034017         STB D        IF NOT, SET UP FOR NEXT PLACE
03254000 33505  074550         PBD A,I      NO! STACT IT ON THE BUFFER
03255000 33506  004017         LDB D        GET UPDATED D
03256000 33507  035722         STB .IOBL    AND UPDATE BUFFER POINTER
03257000 33510  066521         JMP DCGET    AND RESTORE C AND D
03258000                 *
03259000 33511  001723   SENDB LDA DN.SC    CHECK THE PRINT/DISP FLAG
03260000 33512  072003         RZA SND16    IF SC=16, SEND TO PRINTER
03261000 33513  140433         JSM ALDSP,I  IF SC=0, SEND TO DISPLAY
03262000 33514  066517         JMP SENDI    RESET C, D, AND .IOBL
03263000 33515  140444   SND16 JSM A.PRN,I  SEND IOBUF TO PRINTER
03264000 33516  040710         JSM EOLIO    CLEAR IOBUF TO LAZY-T
03265000 33517  004315   SENDI LDB AIBFM
03266000 33520  035722         STB .IOBL    RESET POINTER TO IOBUF
03267000 33521  005715   DCGET LDB T5
03268000 33522  034017         STB D        RESET D
03269000 33523  005716   CGET  LDB T6
03270000 33524  067266         JMP CSET     RESET C

03272000 33525  004017   DCSAV LDB D
03273000 33526  035715         STB T5
03274000 33527  004016   CSAV  LDB C
03275000 33530  035716         STB T6
03276000 33531  170201         RET 1
03278000                 *
03279000                 *  GENERAL INPUT ROUTINE
03280000                 *
03281000 33532  004011   READ  LDB PA       GET SELECT CODE
03282000 33533  076005         RZB READ1    IF SC>0, DO NORMAL READ
03283000 33534  001717         LDA STMT     IF SC=0, SEE IF THIS IS A RDB(0)
```

```
33535  010141         CPA P6       RDB TYPE?
33536  066562         JMP RDB0     YES; EXECUTE RDB0 ROUTINE
33537  066303         JMP ER.F4    READ FROM SC=0 NOT ALLOWED
33540  001723  READ1  LDA DN.SC    CHECK GPIO/HPIB FLAG
33541  076202         SSS *+2      MAKE SURE DEVICE IS WELL
33542  042623         JSM PDNCK    IF NO, CHECK FOR DOWN PERIPHERAL
33543  042627         JSM WAIT
33544  172412         SAM RHPIB    IF HP-IB, DO HP-IB INPUT PROTOCOL
33545  000004         LDA R4       DEMAND A DATA BYTE
33546  030007         STA R7       AND TRIGGER COMMAND
33547  042627         JSM WAIT     WAIT FOR READY
33550  000004         LDA R4       AND TAKE IN BYTE
33551  004005         LDB R5       GET GPIO STATUS BYTE
33552  174502         SBR 3
33553  077002  INVDC  SLB *+2      IF INVERT INPUT DATA BIT SET,
33554  170140         CMA          INVERT BITS IN A
33555  170201         RET 1
               *
33556  000004  RHPIB  LDA R4       REQUEST DATA BYTE
33557  042627         JSM WAIT     WAIT FOR READY FLAG
33560  000006         LDA R6       PULL IN GOOD DATA
33561  170201         RET 1

               *
               *     THIS ROUTINE DOES A RDB(0) BY WAITING FOR A KEY TO BE
               *     PRESSED AND THEN RETURNING ITS KEY-CODE
               *
33562  002570  RDB0   LDA RBINT    GET ADDRESS OF RDB INTERRUPT ROUTINE
33563  005440         LDB ITABL    SAVE CURRENT KEYBOARD SERVICE ADDRESS
33564  031440         STA ITABL    PUT INTERCEPT ADDRESS IN TABLE
33565  066565         JMP *        HOLD HERE FOR INTERRUPT
33566  035440         STB ITABL    WHEN INTERRUPT IS SERVICED, PUT BACK
33567  170201         RET 1        KEYBOARD SERVICE ADDRESS AND RETURN
               *
               *     THIS ROUTINE SERVICES THE KEYBOARD INTERRUPT
               *
33570  033571  RBINT  DEF *+1
33571  000004         LDA R4       ON INTERRUPT, TAKE IN NEW KEYCODE
33572  170301         RET 1,P      AND RETURN TO INSTRUCTION AFTER "JMP *"
               *
               *     READ STATUS
               *
               *     THIS ROUTINE CHECKS STATUS OF AN INTERFACE CARD
               *     EXIT CONDITIONS:
               *
               *      A = 0 : NOBODY HOME
               *      A > 0 : GPIO CARD, A = STATUS BYTE
               *      A < 0 : HPIB CARD, A = STATUS BYTE
               *                         BUSDN = CALCULATOR BUS ADDRESS
               *
               *
33573  070430  REDST  DIR          THIS MUST TAKE <100USEC FOR HP-IB
33574  000005         LDA R5       READ THE STATUS BYTE (OR HP-IB DEMAND)
33575  042650         JSM CKPA     CHECK THE PA REGISTER
33576  066607         JMP REDSR    PA=0; DO NO MORE
33577  066607         JMP REDSR    PA=1; DO NO MORE
33600  004000         LDB A        KEEP A COPY FOR RETURNING
33601  050103         AND B60      MASK TO KEEP ONLY CARD-TYPE BITS
33602  010103         CPA B60      IF TYPE BITS=3, THIS IS HP-IB
33603  066612         JMP HPRDS    SO DO HP-IB STATUS PROTOCOL
33604  000001         LDA B        A=STATUS BYTE
33605  076602  REDSS  SSC *+2      IF STATUS BIT IS SET,
33606  060044         IOR B400     SET BIT(8) OF STATUS WORD
33607  070420  REDSR  EIR          IF NO, GPIO; RE-ENABLE INTERRUPT
33610  031745         STA STBYT    SAVE THE STATUS BYTE
33611  066370         JMP RDSTX    AND GO BACK  (IMPLIED RETURN)
               *
               *     HPIB RETURNS ITS BUS ADDRESS AND UP TO 3 STATUS BYTES
               *
33612  042627  HPRDS  JSM WAIT     WAIT FOR HPIB TO GET STATUS
33613  000005         LDA R5
33614  004336         LDB AOP1     GET ADDRESS OF STATUS BYTE STACK
33615  014337  HPRNS  CPB AOP2     DID WE GET THE FOURTH ONE?
33616  172371         SAP REDSR,S  YES; SET HP-IB BIT (15) AND EXIT.
33617  072600         SFC *        NO; WAIT FOR READY INDICATION
33620  000006         LDA R6       AND GET NEXT STATUS BYTE
33621  130001         STA B,I      PUT IT ON THE STACK
33622  076173         RIB HPRNS    BUMP POINTER IN B AND GO AGAIN
               *
               *     IF STATUS IS CLEAR, GIVE AN ERROR AFTER GIVING
               *     HELP-LINK A CHANCE TO CORRECT THE PROBLEM
               *
```

GENERAL INPUT/OUTPUT ROUTINES

```
33623  004137  PDNCK LDB P8       SET FOR DOWN PERIPHERAL
33624  141737        JSM HLINK,I  AND TRY FOR HELP
33625  140404  ER.F8 JSM AERR1,I  IF NONE, GIVE  ***** ERROR F8 *****
33626  043470        ASC 1,G8     PERIPHERAL DOWN.


                     *
                     *    THIS ROUTINE WAITS FOR A BUSY DEVICE TO GO READY
                     *
                     *    AFTER GIVING HELP-LINK A CHANCE FOR EXTENDED OPTIONS
                     *    IT WILL UNCONDITIONALLY WAIT FOR APPROXIMATELY TWO
                     *    SECONDS FOR DEVICE TO GO READY.  THEN IT WILL
                     *    CONTINUE TO WAIT, BUT WILL NOW ABORT ON SEEING THE
                     *    STOP KEY PRESSED.
                     *
33627  005257  WAIT  LDB CSTAT    IF RED/WRT IS FROM KEYBOARD,
33630  077413        RLB WAITS    SKIP 2-SECOND GRACE PERIOD
33631  072216        SFS WAITR    IF FLAG IS SET (READY), RETURN AT ONCE.
33632  004140        LDB P7       SET FOR WAIT INTERCEPT
33633  141737        JSM HLINK,I  AND GIVE HELP-LINK A CHANCE TO EXTEND
33634  004234        LDB B4K      THE WAIT OPTIONS! IF NO HELP,
33635  035711        STB T1       SET TIME CONSTANT 1
33636  004170  WAITC LDB M256     SET TIME CONSTANT 2
33637  072210        SFS WAITR    IF DEVICE HAS COME READY, EXIT WAIT
33640  076177        RIB *-1      ELSE, CONTINUE TO COUNT DOWN CONSTANT 2
33641  055711        DSZ T1       THEN COUNT DOWN CONSTANT 1
33642  066636        JMP WAITC    UNTIL IT TOO GOES TO ZERO
33643  005206  WAITS LDB IOTMP    TIME IS UP! BEGIN TO MONITOR KEY-FLAG
33644  014254        CPB P1       STOP KEY PRESSED?
33645  066625        JMP ER.F8    YES! ABORT AND GIVE USER INDICATION
33646  072675        SFC WAITS    NO; CONTINUE TO WAIT IF STILL BUSY
33647  170201  WAITR RET 1        FINALLY READY! EXIT


                     *
                     *    CHECK PA-REGISTER FOR VALUE OF 0, 1, OR >1
                     *
33650  004011  CKPA  LDB PA       GET THE PERIPHERAL ADDRESS
33651  076476        SZB WAITR    IF PA=0, RETURN P+1
33652  014254        CPB P1       IF PA=1, RETURN P+2
33653  170202        RET 2
33654  170203        RET 3        IF PA>1, RETURN P+3
```

PERIPHERAL LISTER

```
                     *
                     *    LIST #<SC>, <START LINE>, <END LINE>
                     *
33655  000177  ELIST LDA P0       SET FOR WRITE OPERATION
33656  042250        JSM GSCFN    SET UP SELECT CODE PARAMETER
33657  043631        JSM BUMP1    MAKE FAP1 POINT TO LINE# PARAMETER(S)
33660  000000        LDA A        NOOP! RETURNS HERE IF NO LINE NUMBERS
33661  004566        LDB ALST     GET ADDRESS OF MAINFRAME LIST ROUTINE
33662  134003        STB R,I      AND MAKE IT THE RETURN DESTINATION
33663  005734        LDB CSAVE
33664  034016        STB C        RESTORE VALUE OF C
33665  006674        LDB APLST    B = ADDRESS OF PERIPHERAL LIST ROUTINE
33666  000011        LDA PA       CHECK THE PERIPHERAL ADDRESS CODE
33667  010177        CPA P0       IS SELECT CODE 0 OR 16?
33670  007013        LDB .RET1    YES! DUMMY SHOULD HAVE USED LIST!!!
33671  001721        LDA NPCNT    GET COUNT OF PARAMETERS
33672  020257        ADA M1       TAKE OFF 1 FOR SELECT CODE PARAMETER
33673  170202        RET 2        AND GO TO LIST ROUTINE FOR EXECUTION
                     *
                     *  EACH LINE COMES HERE FOR OUTPUT TO PERIPHERAL
                     *
33674  033675  APLST DEF *+1
33675  031732        STA REP.C    A = 0(LINE), >0(CHECKSUM), -3(CR/LF)
33676  072403        SZA PLST1    IF PROGRAM LINE, DUMP UNCONDITIONALLY
33677  001720        LDA FMT.N    ELSE, SEE IF FMT.N WAS GIVEN
33700  072020        RZA PLSTR    IF YES, SUPRESS CKSUM AND CR/LF'S
33701  043137  PLST1 JSM PTSET    RESET LINKS IN CASE STRING ROM WAS CALL
33702  000214        LDA EOLB     GET AN END-OF-LINE CHARACTER
33703  130316        STA AIBFL,I  AND TERMINATE IOBUFF IN CASE OF CKSUM
33704  000314        LDA AIBFX    GET ADDRESS OF START OF I/O BUFFER
33705  030017        STA D        AND SET BYTE POINTER
33706  001732        LDA REP.C    CHECK TYPE INDICATOR
```

```
03441000 33707  172406        SAM PLST3    IF LEADER, DUMP 3 CR/LF'S
03442000 33710  074570  PLSTC WBD A,I      GET NEXT BYTE OF LINE
03443000 33711  010053        CPA EOL      END OF LINE MARKER?
03444000 33712  066717        JMP PLSTE    YES! FINISH UP
03445000 33713  042421        JSM WRTAC    OUTPUT THE CHARACTER
03446000 33714  066710        JMP PLSTC    GO BACK FOR MORE CHARACTERS
03447000 33715  043446  PLST3 JSM ECRLF    PROVIDE 3 CR/LF'S FOR LEADER/TRAILER
03448000 33716  043446        JSM ECRLF
03449000 33717  043446  PLSTE JSM ECRLF    OUTPUT A CR/LF TO END LINE
03450000 33720  170202  PLSTR RET 2        AND RETURN P+2 TO LIST ROUTINE
```

CONSTANTS AND EQUATES

```
03452000                *
03453000                *   CONSTANTS
03454000                *
03455000 33721  032013  IVALS DEF .RET1     INITIAL VALUES OF LINK WORDS
03456000 33722  033723  .SFMT DEF *+1       POINTER TO STANDARD FORMAT FOR WRITE
03457000 33723  016064        OCT 16064       #  4
03458000 33724  063061        OCT 63061       F  1
03459000 33725  034034        OCT 34034       8  #     (#=34B = FMT DELIMITER)
03460000 33726  077735  .TREG DEF T21
03461000 33727  077726  .T14  DEF T14
03462000        000121  C.EFM EQU B34       END OF FORMAT CHARACTER
03463000        000107  C.COM EQU B54       ASCII COMMA
03464000        000105  C.DP  EQU B56       ASCII DECIMAL POINT
03465000 33730  000142  C.B   OCT 142       B  BINARY
03466000 33731  000146  C.F   OCT 146       F  F,FZ
03467000        000063  C.E   EQU B145      E  EXPONENT
03468000        000064  C.C   EQU P99       C  CHARACTERS
03469000 33732  000170  C.X   OCT 170       X  SPACE
03470000        000104  C.LF  EQU B57       /  CR/LF
03471000        000116  C.QT  EQU B42       "  LITERAL
03472000 33733  000172  C.Z   OCT 172       Z  SUPRESS CR/LF
03473000        000132  A.CR  EQU P13       ASCII CR
03474000        000135  A.LF  EQU P10       ASCII LF
03475000        000114  C.DOL EQU B44       ASCII $
03476000 33734  001750  P1000 DEC 1000
03477000 33735  000025  P21   DEC 21
03478000 33736  177753  M21   DEC -21
03479000        000074  UNL   EQU B77       HP-IB UNIVERSAL UNLISTEN COMMAND
03480000 33737  000337  NOSET OCT 337       DN=31 BYPASS INDICATOR
03481000        000023  AR2M3 EQU 23B       AR2 MANTISSA WORD #3
03482000        000053  EOL   EQU B177      END-OF-LINE INDICATOR
03483000        077226  LNO   EQU CSTMP+8   LINE NUMBER FOR INTERPRETER
03484000        077223  TMP6  EQU CSTMP+5
03485000        077206  .WKC  EQU IOTMP     KEY-CODE FROM KEYBOARD
03486000        000071  A.E   EQU P69       ASCII E
03487000        000325  ASTKF EQU ACSTF
03488000        000106  A.MIN EQU B55       ASCII MINUS SIGN
03489000        000110  A.PLS EQU B53       ASCII PLUS SIGN
03490000        000136  A.SKP EQU P9        ASCII SKIP CODE
03491000        000170  LMASK EQU M256      MASK TO KEEP LEFT BYTE
03492000 33740  140000  BSMSK OCT 140000    HP-IB TALK MASK
03493000 33741  177457  CMASK OCT 177457    BIT MASK FOR WTC
03494000 33742  077015  ASLMM DEF CSTAK+78
03495000        077744  KYOFS EQU OP1+2     KEY-PROGRAM OFFSET
03496000        077706  PROFS EQU CATMP+8   PROGRAM OFFSET
03497000        077232  CFLAG EQU CSTMP+12
03498000 33743  154000  STR.S OCT 154000 TYPE WORD: ENTIRE SIMPLE STRING
03499000 33744  155400  STR.A OCT 155400 TYPE WORD: ENTIRE STRING FROM ARRAY
03500000                *
03502000                *
03503000                *   EQUATES
03504000                *
03505000        077045  FSPTR EQU STEAL+3 POINTER TO ROM'S STOLEN WORDS
03506000                *
03507000        077711  CVTBS EQU T1        TEMPORARY FOR CONVERSION TABLE SEARCH
03508000        077717  STMT  EQU T7        ROM'S OP-CODE FOR EXECUTINE STATEMENT
03509000        077720  .BFMT EQU T8        POINTER TO BEGINNING OF FMT FOR RESCAN
03510000        077721  NPCNT EQU T9        NUMBER-OF-PARAMETERS COUNT
03511000        077722  .IOBL EQU T10       POINTER TO START OF I/O BUFFER
03512000        077723  DN.SC EQU T11       DEVICE NUMBER/SELECT CODE INDICATOR
03513000        077724  ASTMT EQU T12       ADDRESS OF STATEMENT BEING EXECUTED
03514000        077725  RW.SN EQU T13       READ/WRITE, STRING/NUMBER INDICATOR
03515000        077726  Z.CSP EQU T14       SUPRESSION/SPEC COUNT INDICATOR
03516000        077727  FFFLG EQU T15       FIX/FLT FLAG
03517000        077730  DP    EQU T16       DECIMAL POINT SETTING FROM  W.D
03518000        077731  FW    EQU T17       FIELD-WIDTH SPECIFICATION FROM W.D
03519000        077732  REP.C EQU T18       REPETITION COUNT
03520000        077733  EXTBA EQU T19       EXTENDED BUS ADDRESSING INDICATOR
```

CONSTANTS AND EQUATES

```
03521000         077734  CSAVE EQU T20      SAVED C-VALUE FOR RETURN TO INTERPRETER
03522000         077735  CVTBL EQU T21      ACTIVE CONVERSION TABLE INDICATOR
03523000         077736  SFEAT EQU T22      SPECIAL FEATURES INDICATOR (FOR EXTIO)
03524000         077737  HLINK EQU T23      HELP LINK WORD (EXTIO AND OTHER ROMS)
03525000         077740  WRTIC EQU T24      WRITE LINK WORD (GENERAL OUTPUT INTERCEE
03526000         077741  REDIC EQU T25      READ LINK WORD (GENERAL INPUT INTERCEPT)
03527000         077743  BUSDN EQU OP1+1    CALCULATOR'S DEVICE NUMBER ON HP-IB
03528000         077745  STBYT EQU OP1+3    MAIN STATUS BYTE FROM HP-IB OR GPIO
03529000         077746  LCHR  EQU OP2      LEADING CHARACTER FOR FORMATTED OUTPUT
03530000         077747  LCNT  EQU OP2+1    LEADING CHARACTER COUNT
03531000         077750  NCC   EQU OP2+2    NUMBER OF CHARACTERS COUNT
03532000         077751  ECHR  EQU OP2+3    CHARACTER TO REPLACE L.C. "E" FOR OUTPUT
03533000         077747  TFW   EQU LCNT     TEMPORARY FIELD-WIDTH FOR COUNT DOWN
03534000         077722  RTFLG EQU .IOBL    READ TERMINATE FLAG
03535000         077746  .LEN  EQU LCHR     POINTER TO STRING LENGTH REGISTER
03536000         077750  R.LIM EQU NCC      READ LIMIT FOR STRING INPUT
03537000         077747  R.AFT EQU LCNT     NUMBER OF CHARACTERS TO READ AFTER INPUT
03538000         077751  FFR   EQU ECHR     FREE-FIELD READ INDICATOR
03539000         077751  MSGN  EQU ECHR     MANTISSA SIGN FOR NUMERIC INPUT
03540000         077724  DN    EQU ASTMT    DEVICE NUMBER ON HP-IB FOR BUSET
03541000         077727  QTADD EQU FFFLG    BEGINNING OF QUOTE ADDRESS FOR RESTART
03542000         077720  FMT.N EQU .BFMT    FORMAT NUMBER
03543000         077217  .WPRT EQU CSTMP+1  MAINFRAME FIX/FLT INDICATOR
03544000         077216  FWPRT EQU CSTMP    FORMATTED FIX/FLT INDICATOR
```

```
03546000 33777              ORG 33777B
03547000 33777              BSS 1        ********** CHECKSUM WORD **********
03548000        *
03549000                    END      ***** END OF FMTIO ROM *****

END OF PASS 2 NO ERRORS DETECTED
```

Referring to FIG. 2, there is shown a calculator keyboard. The standard Alphanumeric keys having upper and lower cases are used to enter numbers, commands, and statements. The rest of the keyboard is divided into System Command keys, Display Control keys, Line and Character editing keys, Special function keys having upper and lower case functions and Calculator Control keys.

SYSTEM COMMAND KEYS

Figure 3:
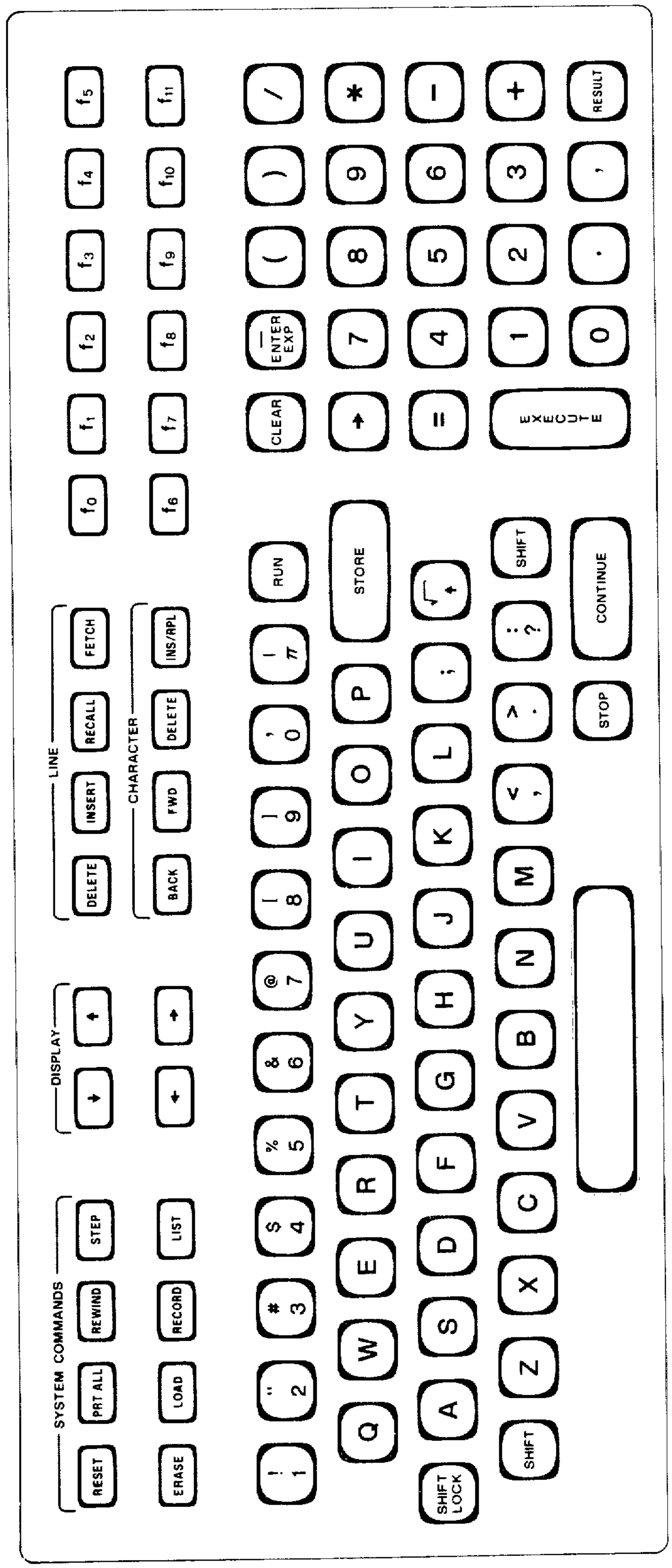
FIG. 3 is a plan view of the keyboard input unit employed in the programmable calculator of FIG. 1.

Referring to the upper left portion of FIG. 3, the System Command keys are shown. A RESEt key returns the calculator and I/O cards to the power-on state without erasing programs on variables. RESET is executed automatically when it is pressed. All calculator activity is aborted and the line number of the current location in a program is displayed if a program is running. The RESET key is used to reset the calculator when no other key will bring the calculator to a ready state. Referring to FIG. 155, a flow chart illustrating the RESET subroutine is shown.

A print all key labelled PRT ALL, sets a print all mode on or off. When it is pressed once, the word "on" appears in the display. When it is pressed again, the word "off" appears in the display. In print all mode, executed lines and stored lines are printed. Displayed results are also printed. While a program is running in print all mode, all displayed messages and error messages are printed.

A REWIND key rewinds the tape cartridge to its beginning. Other statements and commands can be executed immediately without waiting for a cassette to completely rewind. If REWIND is pressed while a program is running or while a line is executing from the keyboard, the cartridge rewinds at the end of the current line.

A STEP key is used for stepping through a program, one line at a time. Each time it is pressed, another program line is executed. The line number of the next line to be executed is displayed. The first time STEP is pressed after running a program, the line number of the line to be executed is displayed. The next time STEP is pressed, that line is executed.

An ERASE key is used to erase all or part of the read/write memory, for example:

| | | | |
|---|---|---|---|
| ERASE | A | EXECUTE | Erases the entire calculator memory. |
| ERASE | V | EXECUTE | Erases the variables only. |
| ERASE | K | EXECUTE | Erases all the special function keys. |
| ERASE | EXECUTE | | Erases the program and variables. |
| ERASE | fn | | Erases the special function key represented by "n." |

A LOAD Key is used to load programs and data from the tape cartridge. For example:

| | | | |
|---|---|---|---|
| LOAD | 3 | EXECUTE | Loads the program from file 3 into the calculator. |

The display shows ldf (for "load file") when this key is pressed.

A RECORD key is used to record programs and data on the tape cartridge. Before recording on the tape cartridge, files must be marked. Assuming, for example that the files have been marked, a user actuates the sequence

| | | |
|---|---|---|
| RECORD 6 | EXECUTE | To record the calculator program on file 6 of the tape cartridge. |

A LIST key is used to list programs, sections of programs, all special function keys, or individual special function keys. For example:

| | | | |
|---|---|---|---|
| LIST | EXECUTE | | Lists the entire program. |
| LIST | K | EXECUTE | Lists all defined special function keys in numerical order. |
| LIST | $f_4$ | | Lists special function key, "$f_4$." |
| LIST | 9, 1 3 | EXECUTE | Lists the program from line 9 to 13, inclusive. |

A flow chart illustrating the LIST subroutine is shown in FIG. 156A-B.

DISPLAY CONTROL KEYS

Referring to the top central portion of FIG. 156A–B, the Display Control keys are shown. An Up Arrow key ↑ moves the line with the next lower-valued line number into the display. If a stop is executed from a program, or if a line number is in the display, Up Arrow brings that line into the display. After a program error, the Up Arrow key ↑ brings the line containing the error into the display for editing. This key is used in live keyboard mode, explained in greater detail hereinafter, to display the line being typed-in for about one second. By holding Up Arrow down, the display remains.

A Down Arrow key ↓ moves the line with the next higher-valued line number into the display. If there are no more lines in the program, Down Arrow clears the display and allows new program lines to be appended to the end of the program. This key is also used to display the line being typed-in for about one second in live keyboard mode. By holding Down Arrow down, the display remains.

A Left Arrow key ← moves the line in the display to the left. A Right Arrow key → moves the line to the right. These allow all the characters in a line to be displayed. Each time one is pressed, the displayed line moves a quarter of the display size, 8 characters for a 32-character display, for example. If a cursor is in the display, it remains in the same place when the Left Arrow key is pressed.

EDITING KEYS

Referring to the top central portion of FIG. 3, the Editing keys are shown. There are two types of editing keys; Line Editing keys and Character Editing keys.

Line Editing Keys

A FETCH key is used to bring program lines into the display and to fetch special functions keys. For example:

| | | | |
|---|---|---|---|
| FETCH | 2 0 | EXECUTE | Brings line 20 into the display. |
| FETCH | $f_4$ | | Accesses special function key $f_4$. If $f_4$ is defined, its definition is displayed. Otherwise, "$f_4$" is displayed. |

A line DELETE key is used to delete the program line in the display from the read/write memory. If no program line is in the display, the calculator beeps and the DELETE key is ignored. To delete a program line, a user fetches the line into the display and presses DELETE. When a line is deleted from a program, the address of all relative and absolute go to and go sub statements are renumbered to reflect the deletion.

The INSERT line key is used to insert a new line in front of a fetched line. The fetch command, the Up Arrow, or Down Arrow keys are used to fetch a line into the display. For example:

| | | | |
|---|---|---|---|
| Press: | FETCH 2 0 | EXECUTE | Brings line 20 into the display. |
| Type-in: | prt "A+",35 | | |
| Press: | INSERT | | This inserts the typed-in line in place of old line 20. All higher numbered lines and old line 20 are incremented by one. |

when a line is inserted into a program, the branching addressing of all relative and absolute go to and go sub statements are renumbered to reflect the insertion. The line number assigned to the new line is the same line number used in the fetch command.

A RECALL key is used to bring back into the display, one of the two previous keyboard entries. Recall can be used in live keyboard mode, and in an enter (ent) statement. Recall also can be used after errors resulting from a keyboard operation to recall the line containing the error. For many errors, a flashing cursor indicates the location of the error in the line.

Referring to FIG. 157 a flow chart illustrating the positioning of the flashing cursor at the location of a syntax error is shown. When the user enters a line to be stored or executed, the line is read from left to right. If an error is detected, the reading process is stopped at the location of the error.

There are cases where the pointer used by the reading process is pointing to a blank space. In this event, an attempt is made to move the error cursor to some non-blank character. First the cursor is moved to the right until a non-blank character or the end of the line is found. If the end of the line is found, the cursor is moved back to the left until a non-blank character is found.

Referring to FIG. 158A, double buffering allows the user to observe the last two lines that were stored or executed from the keyboard. These lines are stored in a two level stack and are brought into the display by the RECALL key. Pressing the RECALL key recalls the most recent keyboard line, and a consecutive RECALL brings the previous keyboard line into the display. Additional RECALL's cause the two keyboard lines to be displayed alternately.

Referring to FIG. 158B, there is shown a diagram of the buffering scheme employed. As characters are typed, they are entered into the I/O buffer and displayed. When the line is executed, the KBD buffer is transferred to the REB buffer and the I/O buffer is transferred to the KBD buffer. The result of the executed line is placed in the I/O buffer and displayed.

When the RECALL key is pressed, the KBD buffer is transferred to the I/O buffer and displayed. Consecutive pressings of the RECALL key causes the KBD and KEB buffers to be swapped, and the new contents of the KBD buffer to be transferred to the I/O buffer and displayed Referring to FIG. 158B, consecutive pressings of the EXECUTE, STORE or INSERT line keys cause the line in the KBD buffer to be re-executed or stored, but the buffers are not transferred. Also, if one of these keys are pressed after a line has been recalled, the contents of the KBD buffer are executed or stored, and the buffers are again not transferred. The buffering scheme thereby stacks the last two different lines that were executed or stored.

The Character Editing Keys

Lines which are fetched into the display using the ↑ Up Arrow, ↓ Down Arrow, RECALL or FETCH command, and lines which are typed into the display can be edited using the character editing keys. Two flashing cursors are associated with these keys: the replace cursor and the insert cursor.

A BACK key moves the flashing replace cursor or the flashing insert cursor from its current position in the line in the display toward the beginning (left) of the line. If the cursor is not visible, BACK causes the cursor to appear on the right-most character in the line.

A forward key labelled FWD moves the flashing replace cursor or the flashing insert cursor from its current position in the line in the display, towards the last character in the line. For a line which has just been fetched into the display, pressing FWD causes the flashing cursor to appear on the left-most character in the display.

A character delete key, labelled DELETE, is used to delete individual characters which are under the insert or replace cursor. This is not the same key as the line delete key explained previously.

An insert/replace key labelled INS/RPL is used to change the flashing replace cursor to a flashing insert cursor and vice versa. When the insert cursor is flashing, any characters entered from the keyboard are inserted to the left of the cursor.

When the replace cursor is flashing, any character entered replaces the existing display character at the location of the cursor.

Referring to FIG. 159A–L, a detailed flow chart illustrating the line editing subroutines is shown. The user can type and edit 80-character lines from the keyboard as described hereinbefore. As the keys are typed, they are placed in the I/O buffer at a position indicated by the I/O buffer pointer. This buffer is displayed after each keystroke, so that the new characters can be seen.

Figure 159A:
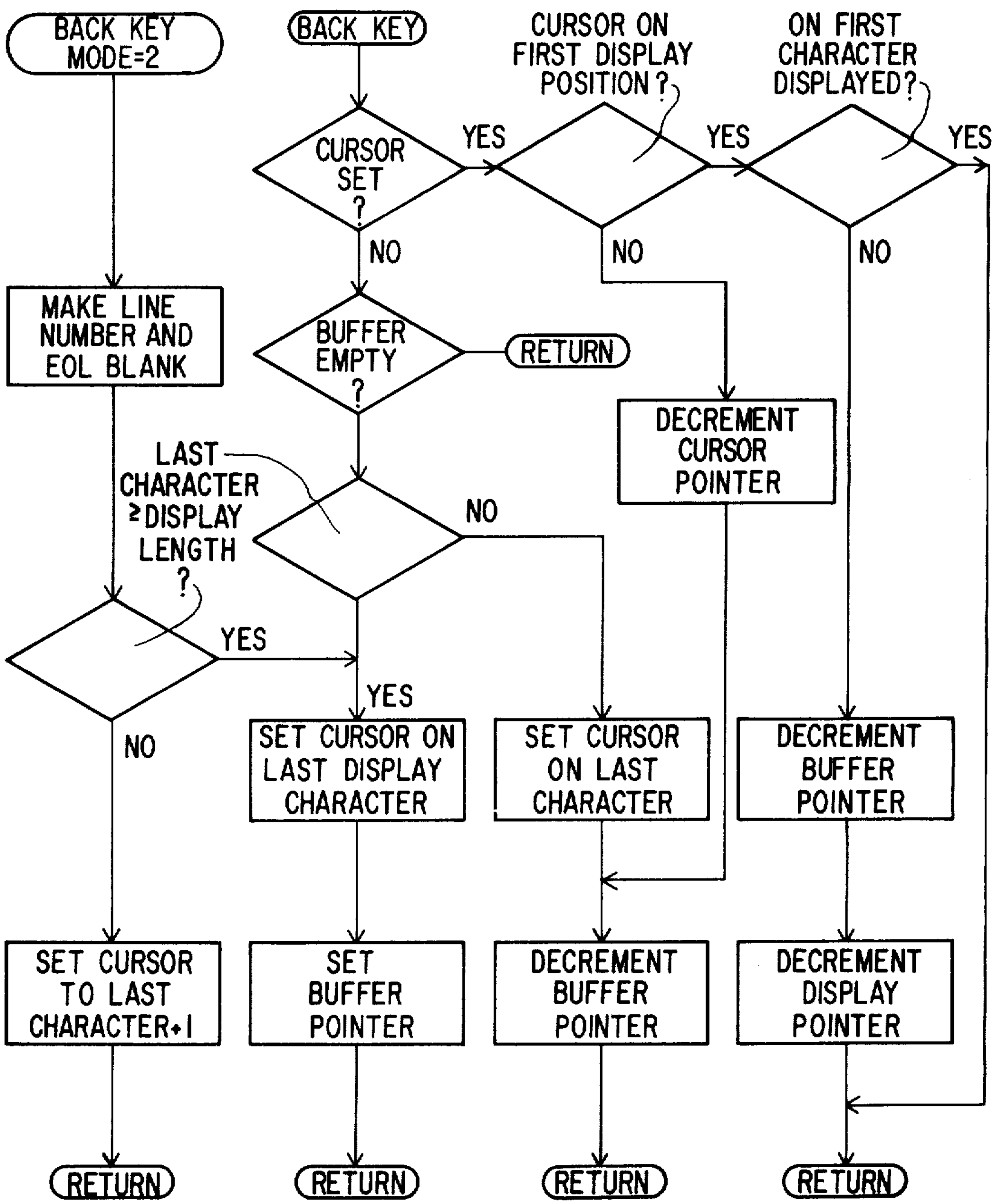
Figure 159B:
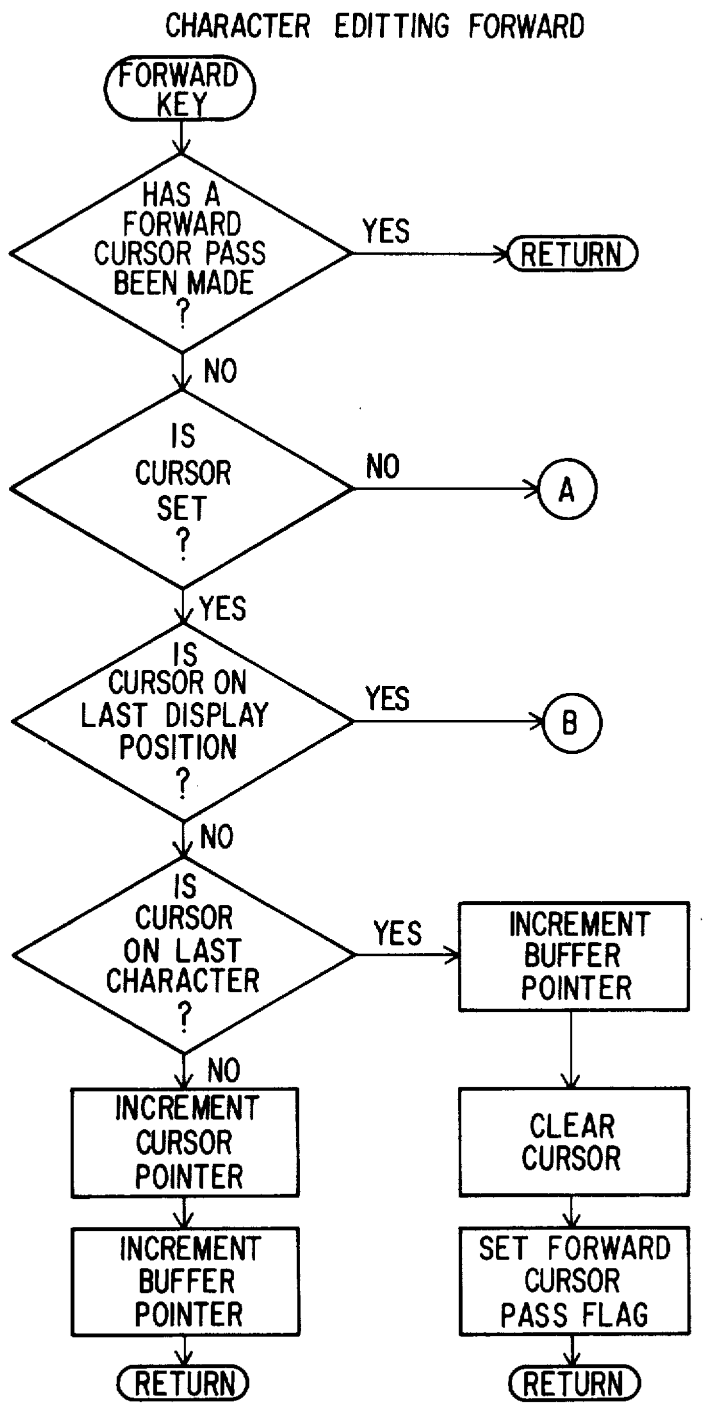
Figure 159C:
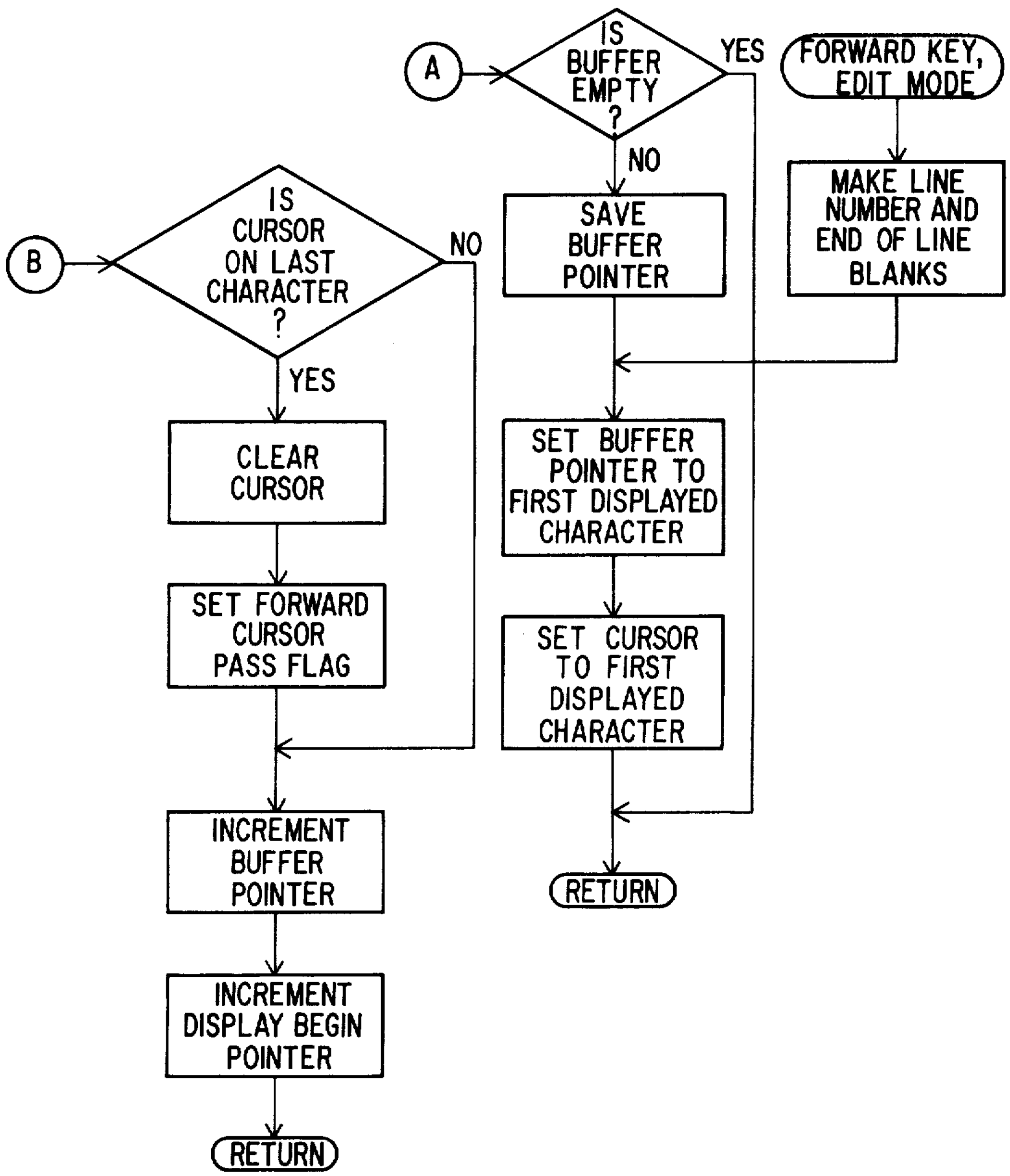
Figure 159D:
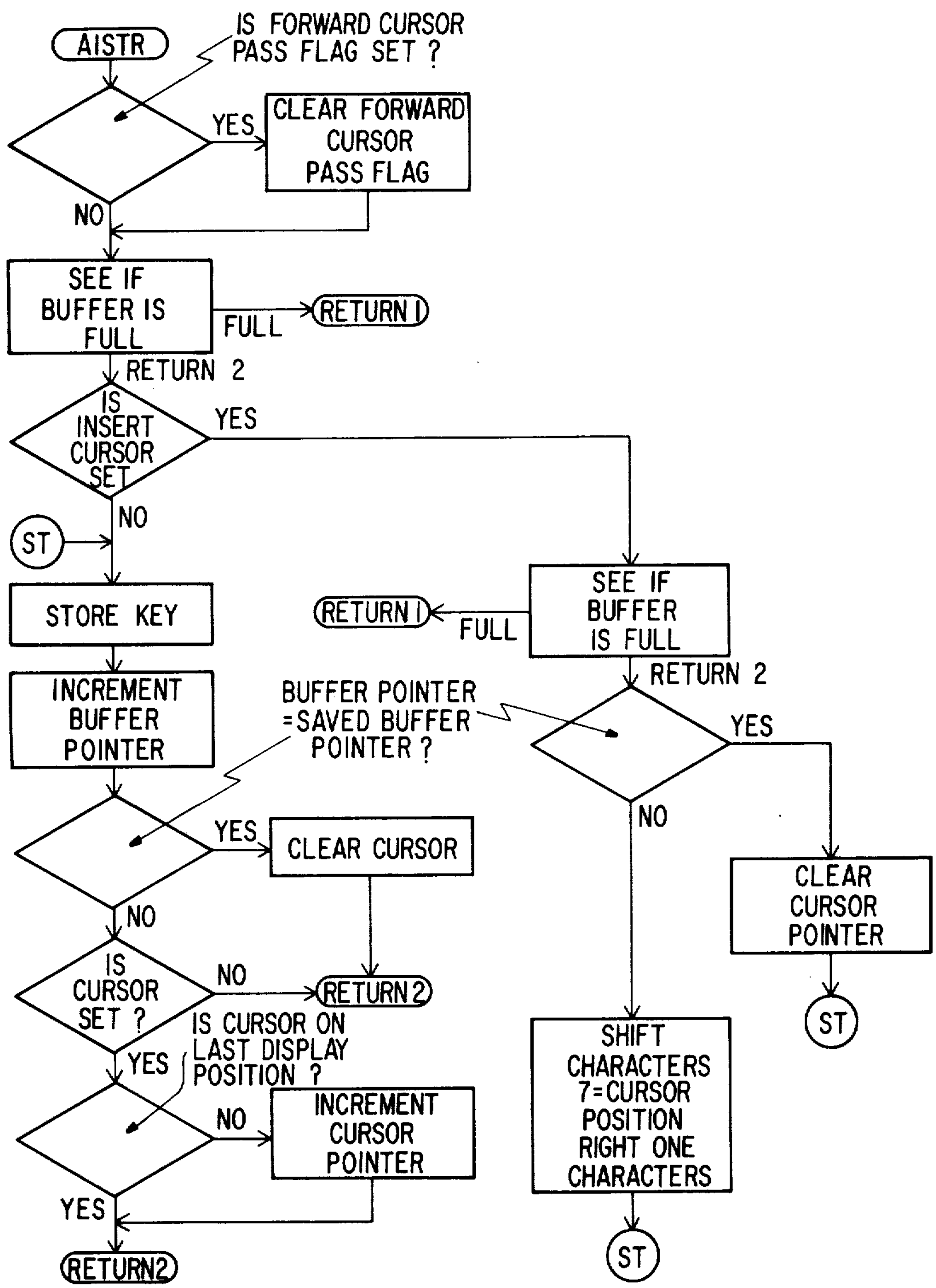
Figure 159E:
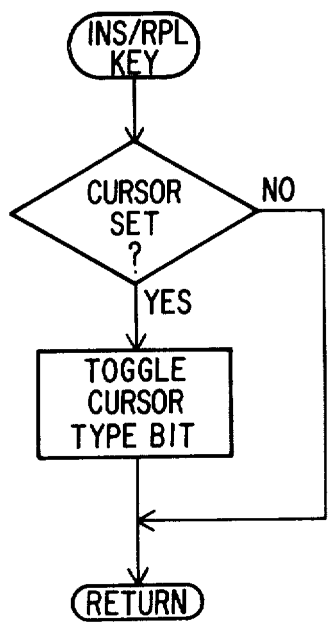

Referring to FIG. 159A, if the back key is pressed, the I/O buffer pointer is decremented and the cursor pointer is set to the position indicated by the buffer pointer. Referring to FIG. 159B–D, pressing the forward kay causes these two pointers to be incremented. The INS/RPL key toggles the cursor type flag as shown in FIG. 159E. The displayed cursor is then changed from the replace to the insert cursor or viceversa.

Figure 159F:
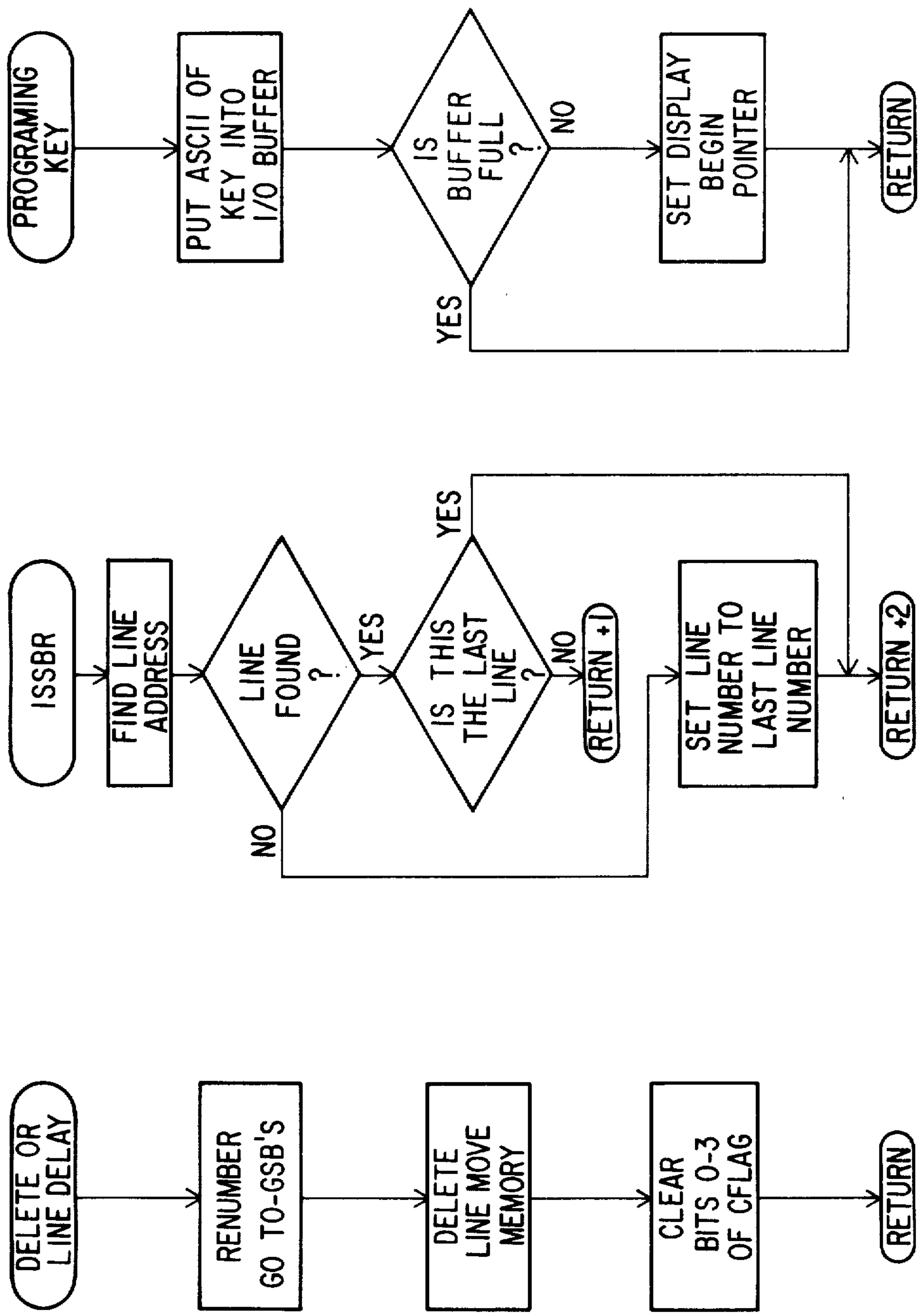

Referring to FIG. 159F, if a programming key is pressed when the replace cursor is set, the key is placed in the I/O buffer at the position of the buffer pointer, and both the buffer and the cursor pointers are incremented. If the insert cursor was set, the character at the position of the buffer pointer and those to the right of the pointer are shifted right one character position. A normal replace sequence is then performed.

Figure 159G:
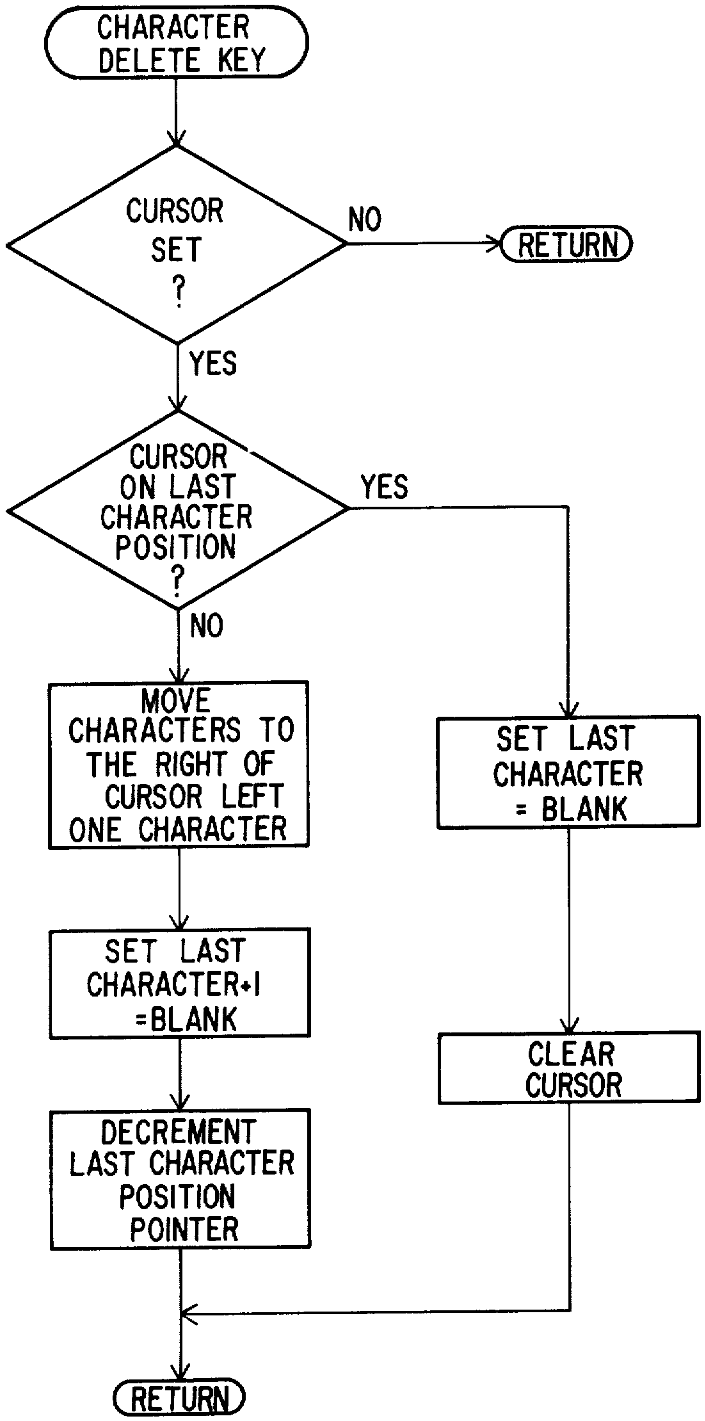

The delete character key routine illustrated by a flow chart in FIG. 159G shifts the characters to the right of the cursor pointer left one character. This shift overwrites the character under the cursor thereby deleting it from the display.

Figure 159H:
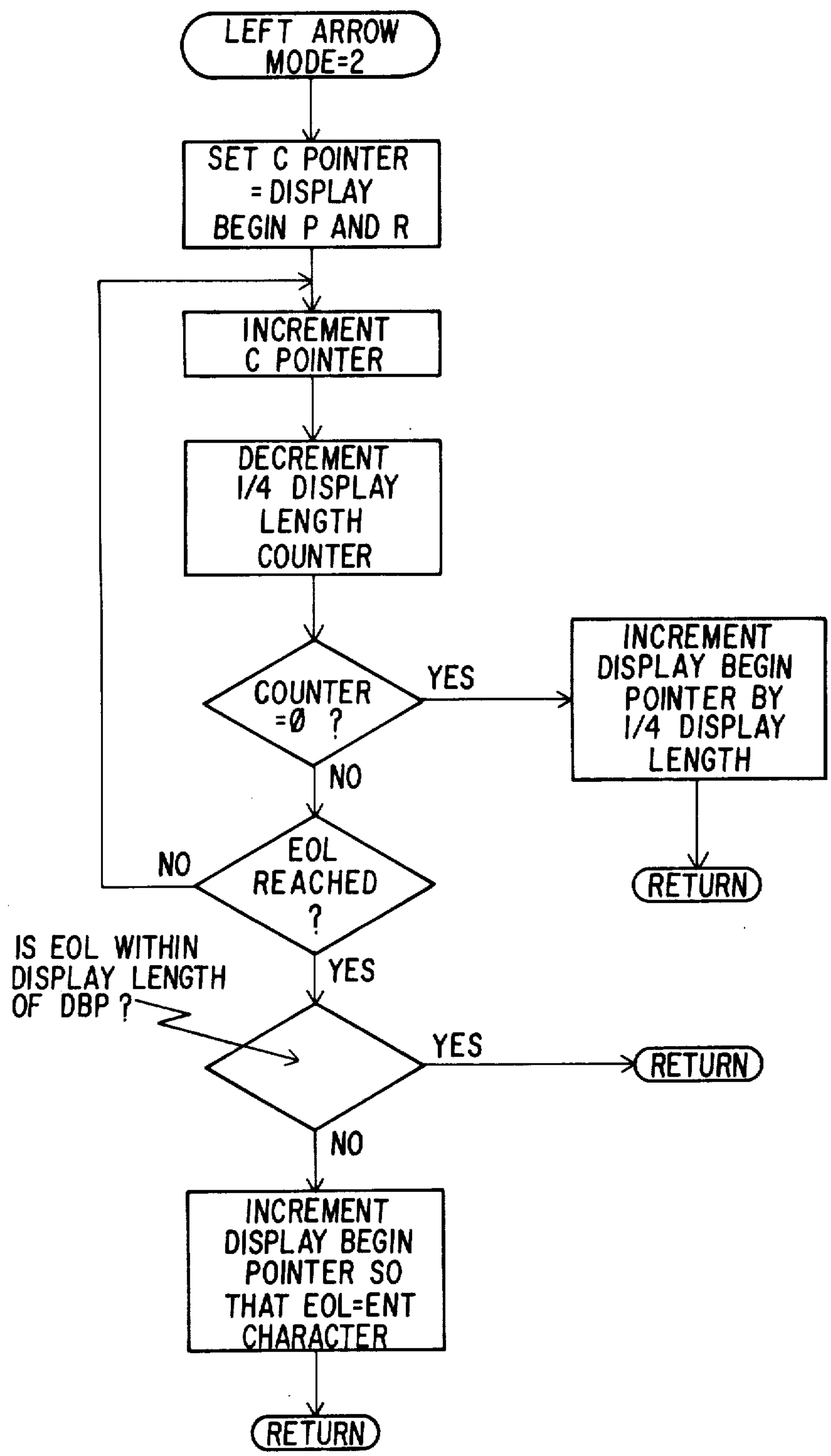
Figure 159I:
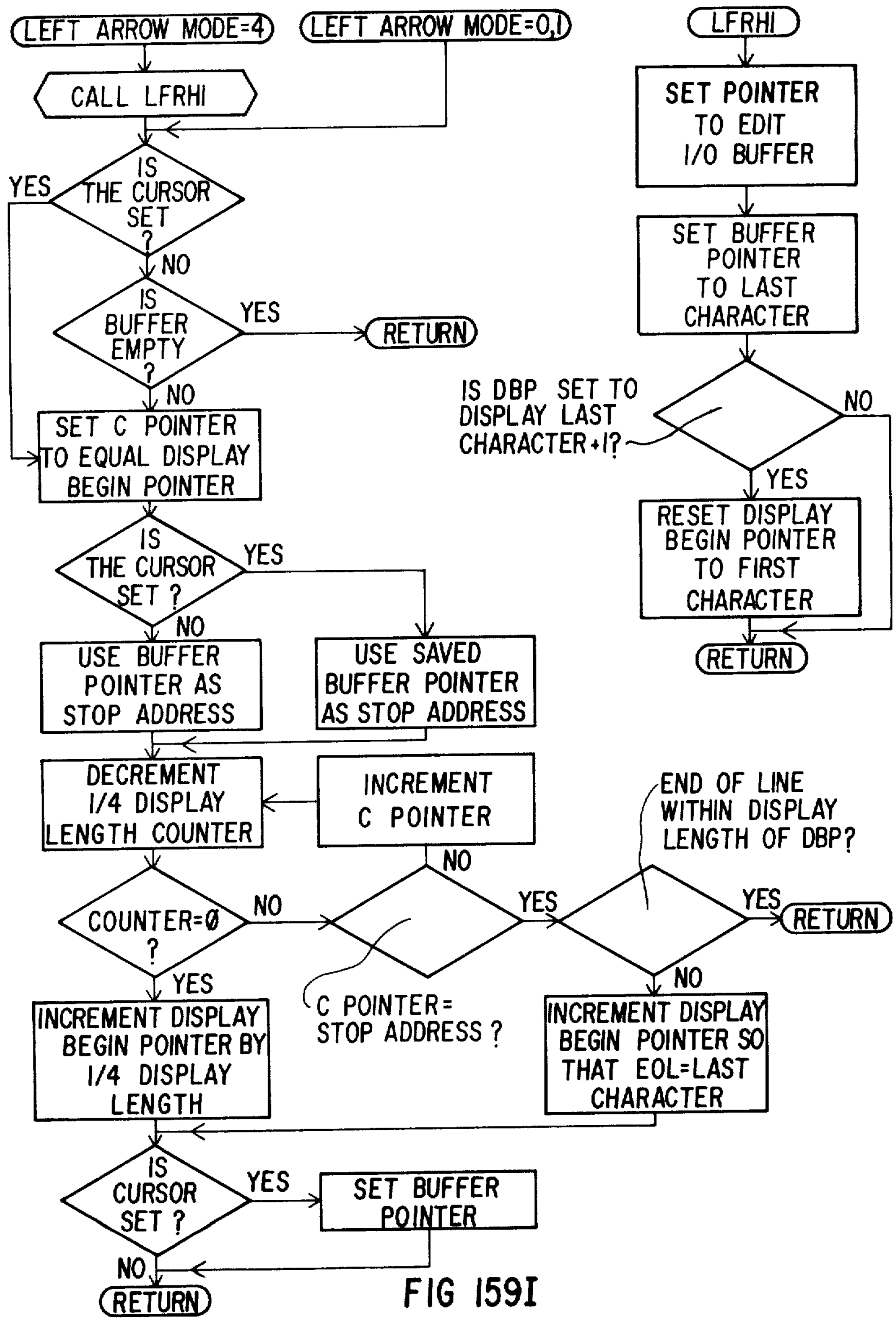
Figure 159J:
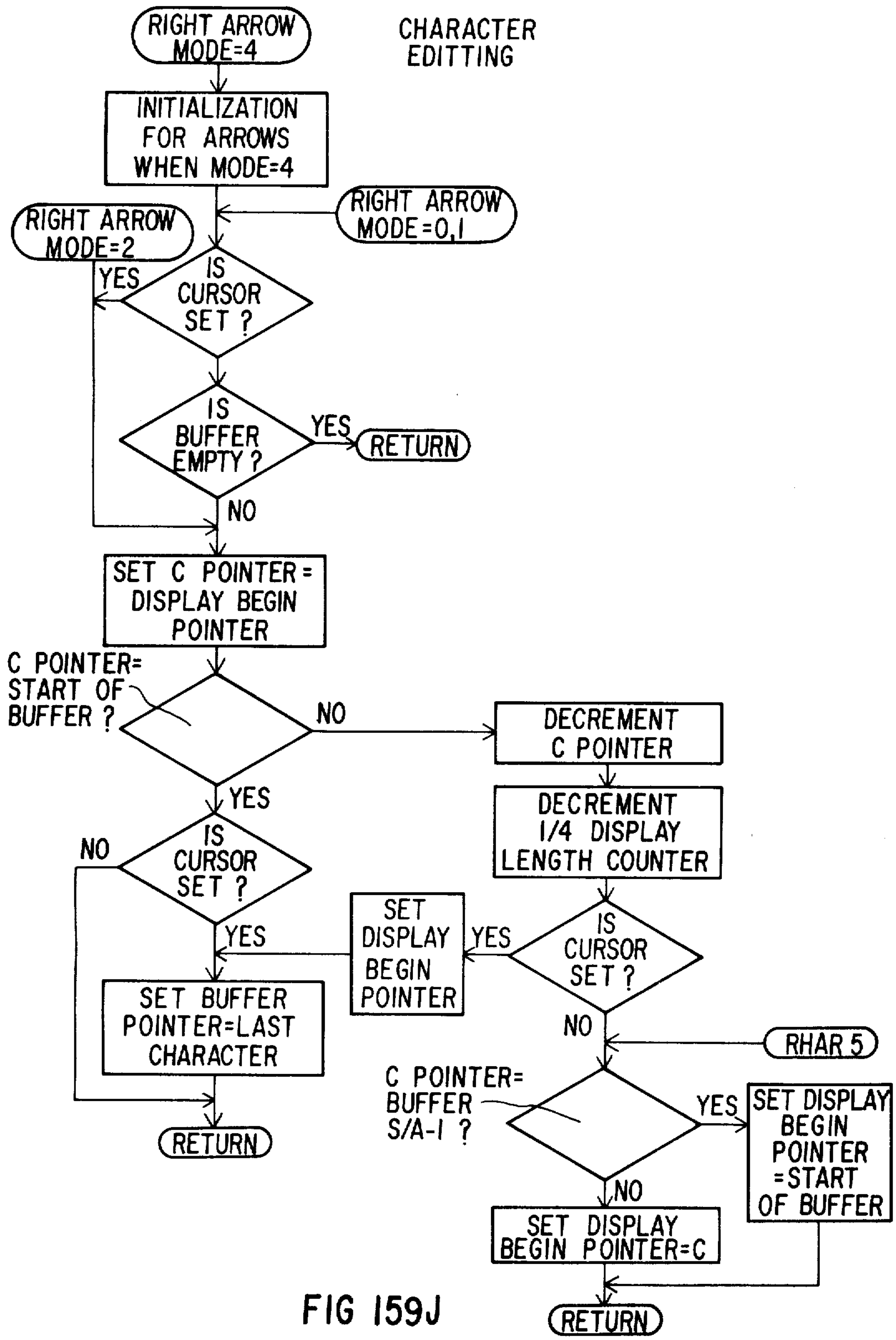

Referring to FIGS. 159H and 159I, left arrow routines illustrated therein increment the buffer pointer and the display begin pointer by one-fourth of the display size. Referring to FIG. 159J, the right arrow routines illustrated therein decrement these pointers by the same amount.

Figure 159K:
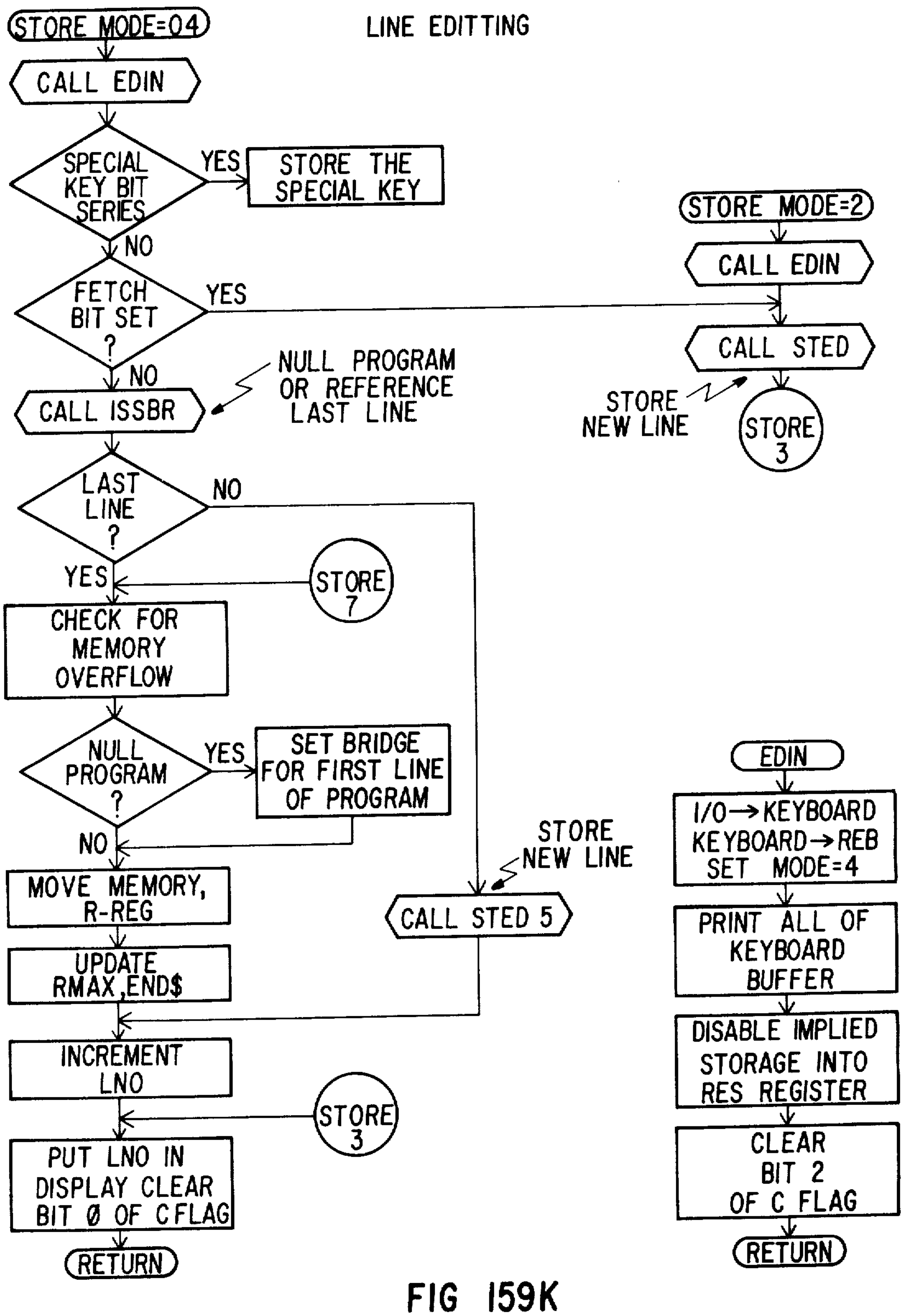
Figure 159L:
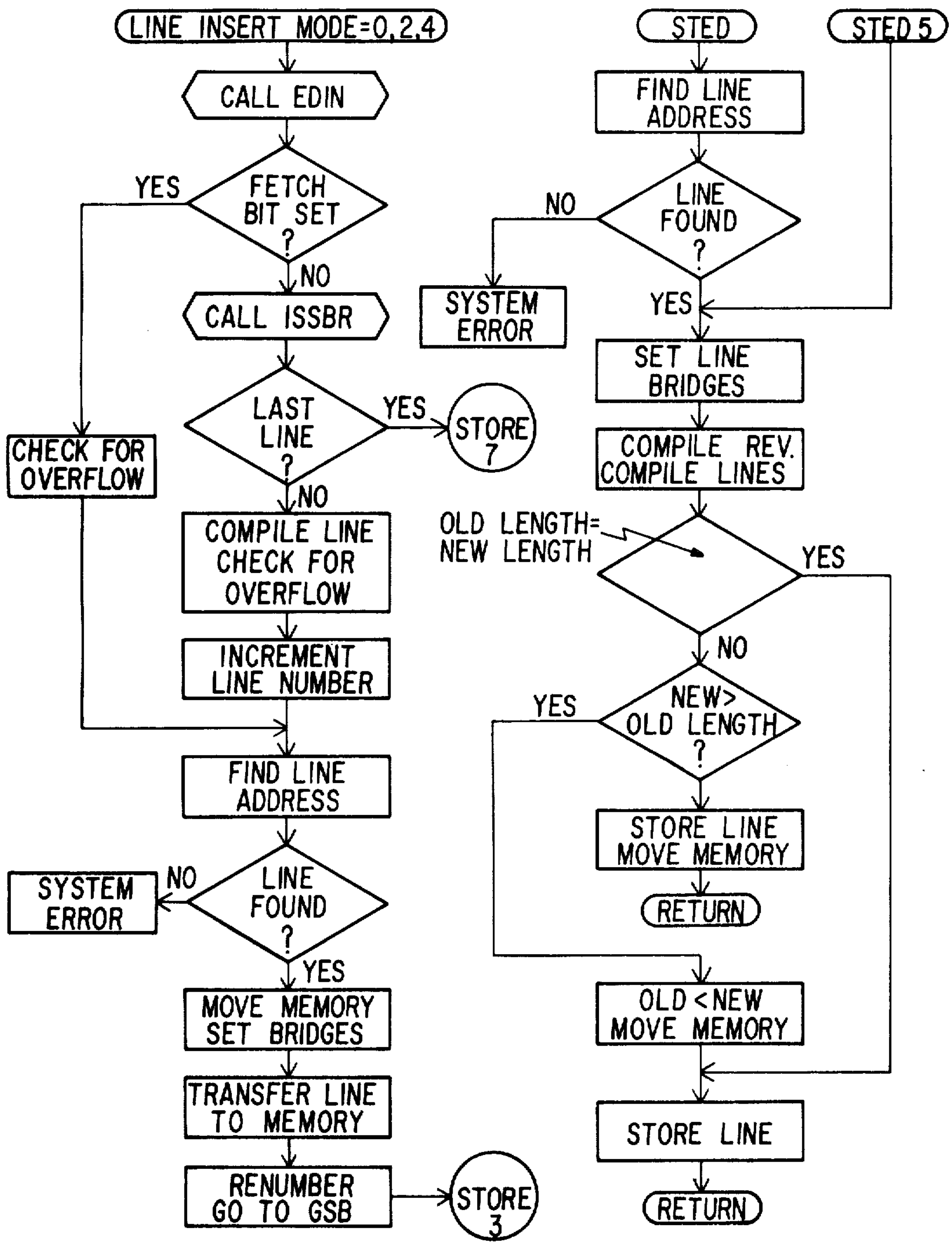

Referring to FIG. 159K, once a program has been stored, the line editing keys are used to insert delete, or modify in the program. To modify a line, the line must first be brought into the display by the fetch command, or the up or down arrow keys. The user then edits the line and stores it thereby replacing the old line. Referring to FIG. 159L, in order to insert a line in the program, the line that is to follow the inserted line is fetched. The new line is then typed. This line is inserted into the program by pressing the line insert key.

Lines can be deleted from the stored program by the delete command or the line delete key. To delete a line using the line delete key, the line must first be brought into the display. The pressing of the line delete key will then delete this line from the program.

CALCULATOR CONTROL KEYS

Referring to the lower left and lower central portions of FIG. 3, the Calculator Control keys are shown. A RUN key runs the program in the calculator from line zero. This key is an immediate execute key which means that "run" is executed automatically when the key is pressed. All variables, flags, and subroutine pointers are cleared when the run key is pressed. A red indicator at the left end of the display indicates a running program.

A STORE key stores individual program lines. Also, when a special function key is fetched and defined, STORE is used to store the key's definition. A program ine can be a single statement or several statements eparated by semicolons. When an error occurs in storng a line, RECALL brings that line into the display. A lashing cursor usually shows where the error was enountered in the line.

The SHIFT or SHIFT LOCK keys shown in the ower left portion of FIG. 3 are used to obtain shifted eyboard characters such as #, √ and the like. When SHIFT LOCK is pressed, a small light above the shift ock key lights. To release SHIFT LOCK a user presses SHIFT.

Referring to the lower central portion of FIG. 3, a STOP key terminates the execution of a program at the nd of the current line. The number of the next line to e executed in the program is displayed. When STOP is ressed, enter, list, tlist, and wait statements are aborted ut the rest of the line is executed. When STOP is ressed in an enter statement, flag 13 is set and the enter tatement is terminated.

If STOP is pressed while doing a live keyboard opertion, the operation is stopped, but the program contines. Pressing STOP a second time stops the program.

Referring to the right lower portion of FIG. 3, an EXXECUTE key executes the single or multi-statenent line which is in the display. The two most recently xecuted (or stored) keyboard entries are temporarily tored and can be recalled by pressing RECALL once r twice. The result of a numeric keyboard operation which is not asigned to a variable is stored in Result. Pressing EXECUTE displays the result, and stores the esult in Result. Pressing the execute key again repeats he same operation.

Although multiple expressions are allowed, only the esult of the last expression in the line is stored in Result. In print-all mode, both results are printed.

Referring to the lower central portion of FIG. 3, a CONTINUE key is used to automatically continue a program from where it was stopped. When a line numer is in the display, CONTINUE continues from that ine number, except after RESET has been pressed, or fter editing the program. In an enter statement, CONTINUE is pressed after entering data. If no data is enered and CONTINUE is pressed, the variable maintains its previous value and flag 13 is set. When an error occurs in a program, pressing CONTINUE causes the program to continue execution at program line zero.

Referring to the lower right portion of FIG. 3, a RESULT key is used to access the result of a numeric keyboard operation which was not assigned to a variable. A value which is stored in result is also displayed.

The value in result can be assigned to variables. For example:

| | | |
|---|---|---|
| es→A | EXECUTE | Store result in A. |
| i/res→B | EXECUTE | Store 5 divided by result in B. |

In a program, values cannot be assigned to result; but the value in result can be assigned to variables or used in computations. For example:

| | |
|---|---|
| 1: res + 2 → A | This assigns the value of result +2 to a variable, A. |

Referring to the central right portion of FIG. 3, a clear key is shown. The CLEAR key clears the display. If the CLEAR key is pressed while in the enter mode, a question mark (?) appears in the display, indicating that an entry is still expected. If this key is pressed after a special function key has been fetched, the key number (e.g., $f_8$) appears in the display.

The Assignment Operator key is located below the CLEAR key and is used to assign values to variables. The Assignment Operator key is labelled → but is not the same as the similarly labelled right arrow key used for display control described hereinbefore. For example:

| | | |
|---|---|---|
| $\sqrt{5}$ → X | EXECUTE | This stores the square root of 5 in x. |

To enter the approximate value of π the Π key located to the immediate left of the RUN key is pressed. The value entered is 3.14159265360.

The ENTER EXP key located to the immediate right of the RUN key enters a lower case e, into the display, representing an exponent of base 10. The unshifted E key can also be used in place of ENTER EXP.

SPECIAL FUNCTION KEYS

There are 24 special function keys, 12 unshifted and 12 shifted. Referring to the upper right portion of FIG. 3, the special function keys are labelled $f_0$ through $f_{11}$ and can be used as typing aids, one line immediate execute keys or as immediate continue keys.

To define a special function key a user presses the FETCH key and the special function key to be defined. Then he enters a line in the display. He presses the STORE key to store the definition of the key and to exit key mode.

If a user decides that he is not going to store anything under a key, the STOP key can also be used to exit key mode. For example:

| | |
|---|---|
| Press: FETCH | "$f_0$" is displayed if the key was not previously defined. |
| Type-in: prt | Enters "prt" in the display. |
| Press: STORE | This stores "prt" under $f_0$, for use as a typing aid. |

Immediate Execute Keys

If a line which is stored under a special function key is preceded by an asterisk, it is an immediate execute key. The asterisk key is shown in the right portion of FIG. 3. When the key is pressed, the contents corresponding to the special function key are appended to the display and the line in the display is executed automatically. For example:

| | |
|---|---|
| Press: FETCH SHIFT $f_1$ | Accesses $f_{13}$ (shifted $f_1$). |
| Type-in: *prt "π", π | The asterisk makes this an immediate execute key. |
| Press: STORE | This stores the line entered in the display under $f_{13}$. |

Whenever SHIFT $f_1$ is pressed and the display is clear, the literal "π", followed by its approximate value is printed automatically.

Immediate Continue Keys

If a line to be stored as a special function key is preceded by a slash (/), it is an immediate continue key for use with the enter statement. The slash key is shown in the right portion of FIG. 3. When the slash key is pressed, the contents of the key are appended to the display and the continue command is executed automatically. Immediate continue keys are used to enter often used values in enter statements. For example:

| | |
|---|---|
| Press: FETCH $f_5$ | Fetches special function key $f_5$. |
| Type-in: /2.71828182846 | This enters the approximate value of e, the base of the natural logarithms, into the display. |
| Press: STORE | This stores the line in the display under $f_5$. |

Whenever an enter statement is waiting for a value and the $f_5$ key is pressed, the approximate value for *e* (i.e., 2.71828182846) is entered and the program continues.

Keys with Multiple Statements

By separating statements using semicolons, several statements are stored under one special function key. As an example, suppose a user wants to convert inches to centimeters. The following line is stored under special function key, $f_1$.

Press: FETCH $f_1$

Type-in: *→R; dsp R, "in.+", 2.54R, "cm."

Press: STORE

Then key-in a number, such as 6, and press $f_1$. The display will show:

6.00 in. + 15.2 cm.

PROGRAMMING STATEMENTS, FUNCTIONS, AND OPERATORS

The statements, functions, and operators explained herein are all programmable and can also be executed in calculator mode.

Statements can be programmed or executed. Operators and functions must be part of a statement in order to be programmed. This means that operations, such as 10+32 or $\sqrt{63}$, which can be executed from the keyboard, must be part of a statement <u>in</u> order to be programmed. Thus, 10+32→X or $\sqrt{63}$ → B, are valid statements.

SYNTAX CONVENTIONS

The instructions explained hereinafter use the syntax conventions shown in the table below.

FORMAL SYNTAX CONVENTIONS

| | |
|---|---|
| array | The array name with an asterisk in brackets specifies an entire array (i.e.: R[*]). |
| brackets [] | items within brackets are optional. |
| coloring | colored items or colored items in dot matrix must appear as shown. |
| character | a letter, a number, or a symbol. |
| constant | a number within the storage range of the calculator. |
| expression | a constant (like 16.4), a variable (i.e.: X or B[8] or r3) or an expression such as (8 ↑ 4 or 6<A+B). |
| integer | an integer constant from −32768 through 32767 (i.e.: −10 or 301). |
| letter | an alphabetic character from a through z and from A through Z. |
| line number | an integer from 0 through 32767. |
| n | an integer from 0 through 15. |
| text | a series of characters within quotation marks. |
| variable | a simple variable (i.e.: A or Q), an array variable (i.e.: E[5]), or an r-variable (i.e.: r12). |
| absolute or labelled go sub | gsb line number or label. |
| absolute or labelled go to | gto line number or label. |
| absolute value | abs expression |
| addition | expression + expression |
| and | expression and expression |
| arccosine | acs expression |
| arcsine | asn expression |
| arctangent | atn expression |
| assignment | expression → variable |
| auto verify disable | avd |
| auto verify enable | ave |
| base ten logarithm | log expression |
| beep | beep |
| clear flag | cfg [n][ , n]... |
| complement flag | cmf [n][ , n]... |
| continue | cont [line number or lable] |
| cosine | cos expression |
| degrees | deg |

-continued

| | |
|---|---|
| delete | del line number [ , line number][ ,* ] |
| digit rounding | drnd (expression , expression ) |
| dimension | dim ______ |
| display | dsp [text or expression [ , text or expression]...] |
| division | expression / expression |
| end | end |
| enter | ent [text , ] variable [ , [text , ] variable...] |
| enter print | enp [text , ]variable[ ,[text , ] variable...] |
| equal to | expression = expression |
| erase | erase [a or k or v or special function key] |
| erase tape | ert expression |
| exclusive or | expression xor expression |
| exponential | exp expression |
| exponentiation | expression ↑ expression |
| fetch | fetch [line number] |
| find file | fdf [expression] |
| fixed | fxd [expression] |
| flag | flg n |
| float | flt [expression] |
| fraction | frc expression |
| grads | grad |
| greater than | expression > expression |
| greater than or equal to | expression > = expression<br>expression = > expression |
| identify file | idf [variable[ , variable[ , variable [ , variable[ , variable]]]]] |
| implied multiply | ( expression ) ( expression ) |
| integer | int expression |
| jump | jmp expression |
| less than | expression < expression |
| less than or equal to | expression < = expression<br>expression = < expression |
| list program | list [line number[ , line number] |
| list special function key | list special function key |
| list special function keys | list k |
| live keyboard disable | lkd |
| live keyboard enable | lke |
| load binary | ldb [expression] |
| load file (data) | ldf [expression[ , variable [ , variable...]]] |
| load file (program) | ldf [expression[ , expression[,expression]]] |
| load keys | ldk [expression] |
| load memory | ldm [expression] |
| load program | ldp [expression[ , expression[ , expression]]] |
| mark | mrk expression , expression[, variable] |
| maximum value | max (expression or array[ , expression or array]...) |
| minimum value | min ( expression or array[ , expression or array]...) |
| modulus | expression mod expression |
| multiplication | expression * expression |
| natural logarithm (base e) | ln expression |
| normal | nor [line number[ , line number]] |
| not | not expression |
| not equal to | expression # expression<br>expression < > expression<br>expression > < expression |
| or | expression or expression |
| power of ten rounding | prnd ( expression , expression ) |
| print | prt [text or expression[ , text or expression]...] |
| radians | rad |
| random number | rnd [ — ] expression |
| record file (data) | rcf [expression[ , variable[ , variable...]]] |
| record file (program) | rcf [expression[ , constant[ , expression]]] |
| record keys | rck [expression] |
| record memory | rcm [expression] |
| relative go sub | gsb + line number<br>gsb − line number |
| relative go to | gto + line number<br>gto − line number |
| return | ret |
| rewind | rew |
| run | run [line number or label] |
| set flag | sfg [n][ , n]... |
| set select code | ssc expression |
| sign | sgn expression |
| sine | sin expression |
| space | spc [expression] |
| square root | √ expression |
| stop | stp [line number[ , line number]] |
| subtraction (negative) | [expression] − expression |
| tangent | tan expression |
| tape list | tlist |
| ten to the power | tn ↑ expression |
| trace | trc [line number[ , line number]] |

-continued

| | |
|---|---|
| track | trk expression |
| units (angular) | units |
| verify | vfy [variable] |
| wait | wait expression |

The calculator uses three types of variables: simple variables, array variables, and r-variables. As variables are allocated, they are initially assigned the value 0.

Simple Variables

There are twenty-six simple variables, A through Z. A simple variable must appear in upper case. Each simple variable can be assigned one value. Simple variables may appear in a dimension (dim) statement to reserve memory for them, but this is not required.

| Examples: | |
|---|---|
| ϕ: dim A | Reserves 1 memory location for the simple variable A. This line is not required. |
| 1: 12 → A | Assigns the value 12 to A. |
| 2: prt A | Prints the value of A on the printer. |

Array Variables

There are twenty-six arrays, named A through Z. Array names are followed by square brackets which enclose the subscripts of the array.

An array must be declared in a dimension statement. This reserves memory for the array, and initializes all elements in the array to zero. Each subscript of an array can be specified either by specifying the upper bound, in which case the lower bound is assumed to be one, or by specifying both the upper and lower bounds as more fully described hereinafter.

An array can have any size and any number of subscripts within the limits of the calculator memory size and line length.

| Ex. 1: | |
|---|---|
| ϕ: dim Q[10,10] | Reserves 100 memory locations for array Q. |
| 1: 3→Q[1,1] | Q[1,1] is assigned the value 3. |
| 2: 5→Q | The value 5 is assigned to the simple variable [. There is no connection between the simple variable Q and array Q[10,10]. |
| 3: 2→Q[1,Q] | Q[1,Q] is assigned the value 2. |
| Ex. 2: | |
| ϕ: 7→Z | 7 is assigned to Z. |
| 1: dim X[−4:ϕ,Z] | X is dimensioned by a 5 by 7 array. The lower and upper bound of the first array dimension are specified. |
| 2: 3.4→X[−4,1] | Assigns values. |
| 3: ϕ→X[ϕ,Z] | |

r-variables r-variables are specified by a lower case r followed by a value or expression. When an r-variable is encountered, memory is reserved for all lower-valued r-variables which have not been allocated. As r-variables are allocated, they are assigned the value 0. Thus if r10 is assigned a value, r0 through r9 are automatically allocated and assigned the value zero if they have not been previously allocated.

r-variables are stored in a different area in memory which is not contiguous with array or simple variables. Due to this, r-variables cannot be mixed with simple or array variables in record file (rcf) and load file (ldf) statements, rcf and ldf statements being more fully described hereinafter. Also, r-variables cannot appear in a dimension statement.

| Examples: | |
|---|---|
| ϕ: 4→rϕ | 4 is assigned to r-variable 0. |
| 1: 2→rrϕ | 2 is assigned to r-variable 4. rϕ=4, therefore 2 → r4. This is known as indirect storage. |

Figure 160A:
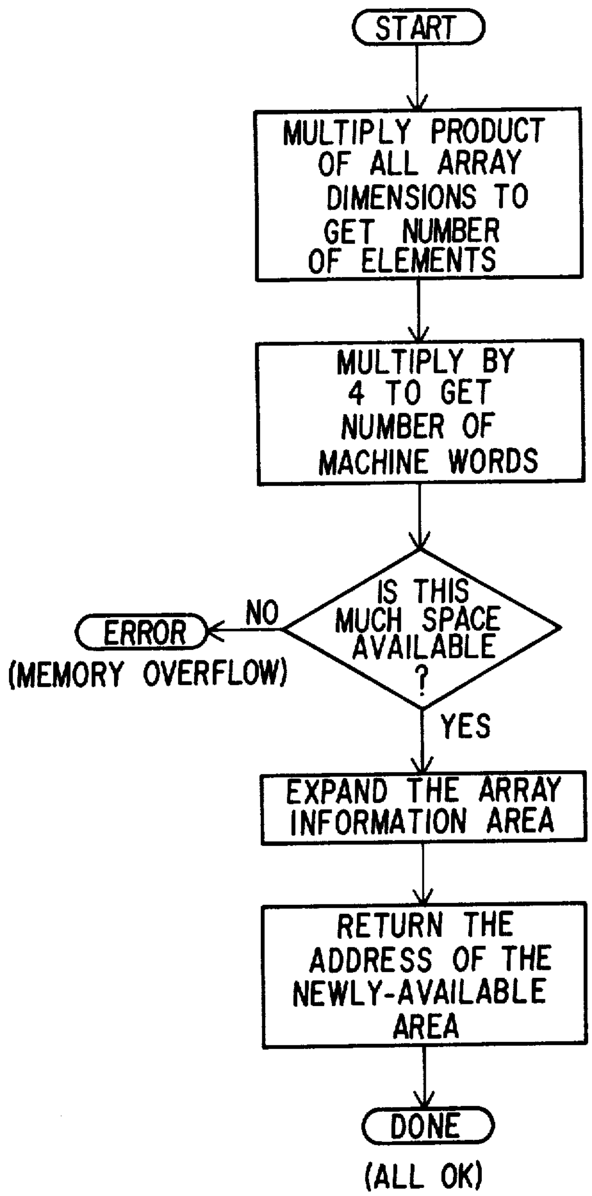

Arrays are allocated dynamically by providing an expandable region in read-write-memory to hold the array information. Referring to FIG. 160A, the total space requirements for the new array are calculated and checked against available unused read-write-memory at the time the calculator user's program requests that the array be made present. If the new array will fit, the region designated to hold array information is expanded and the new space thus obtained is reserved for the new array or an error message is emitted.

MULTI-DIMENSIONAL ARRAYS, VARIABLE BOUNDS

Since read-write-memory is essentially a one-dimensional storage medium, the elements of a multi-dimensional array are mapped into a linear sequence of consecutive storage locations.

The bounds being specifiable at run-time falls out naturally, because the DIM statement is executed as part of the program as opposed to being statically examined before the program is run.

Algorithm for Subscript Address Calculations

Let the array have the declaration:

dim $A[L_1:U_1,L_2:U_2, \ldots ,L_N:U_N]$

Define $D_k = U_k - L_k + 1 \qquad Q_k = -L_k$

Figure 160B:
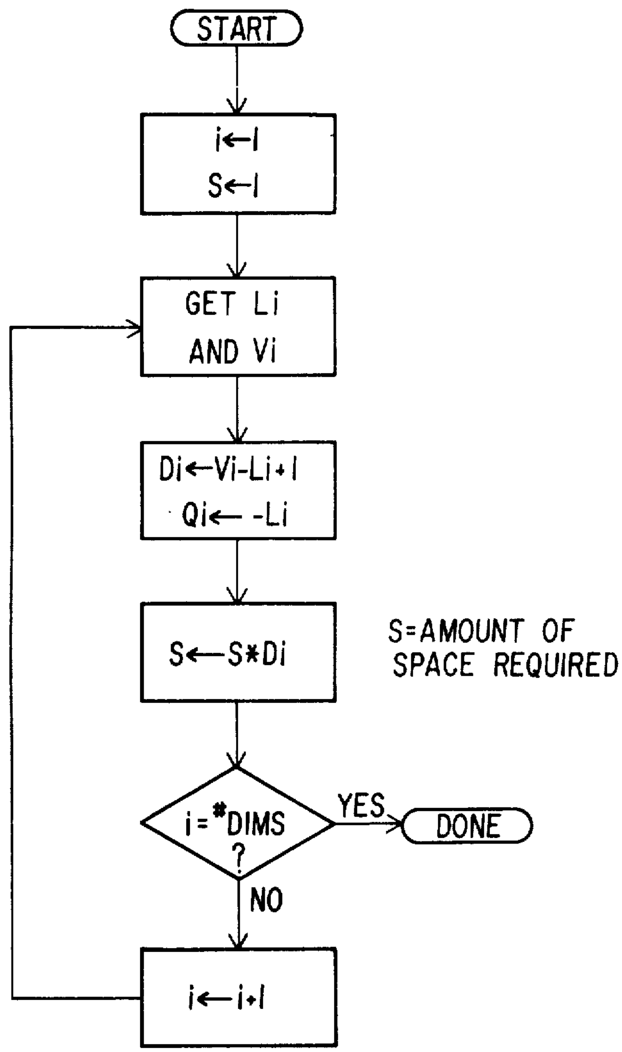

Then $$S = \prod_{i=1}^{N} D_i$$

is the number of elements. FIG. 160B is a flow chart illustrating the subroutine for calculation of $D_k$ and $Q_k$.

Let the reference be of the form:

$A[X_1, X_2, \text{---}, X_N]$

Figure 160C:
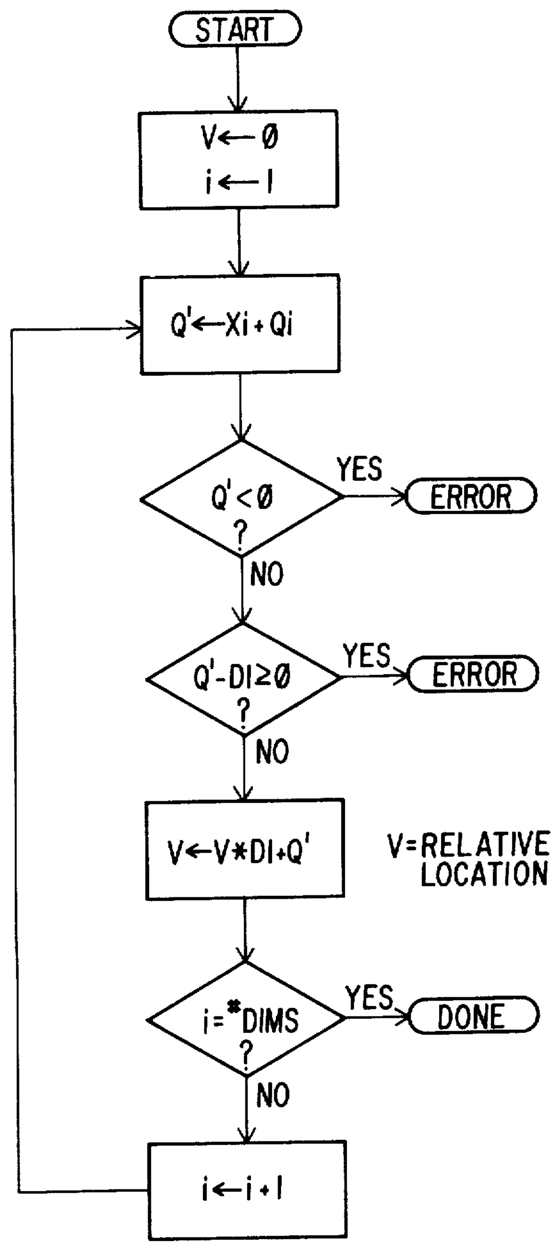

Then the iterative calculation:

V = 0
FOR I = 1 to N
$Q' = X_I + Q_I$
2F $Q' < 0$ or $Q' - D_I \geqq 0$ Then out-of-bounds
$V = V{*}D_I + Q'$
NEXT I will calculate the relative location of the element. FIG. 160C is a flow chart of the subroutine for calculating the relative location of $[X_1, X_2 \ldots, X_N]$.

Due to the fact that the $X_I$ are stacked in order of increasing I, the optimum algorithm will process them in order of decreasing I. This has the same effect as the leftmost subscript varying the most rapidly. This is consistent with IBM Fortran IV and HP 2100-series Fortran IV.

Figure 160D:
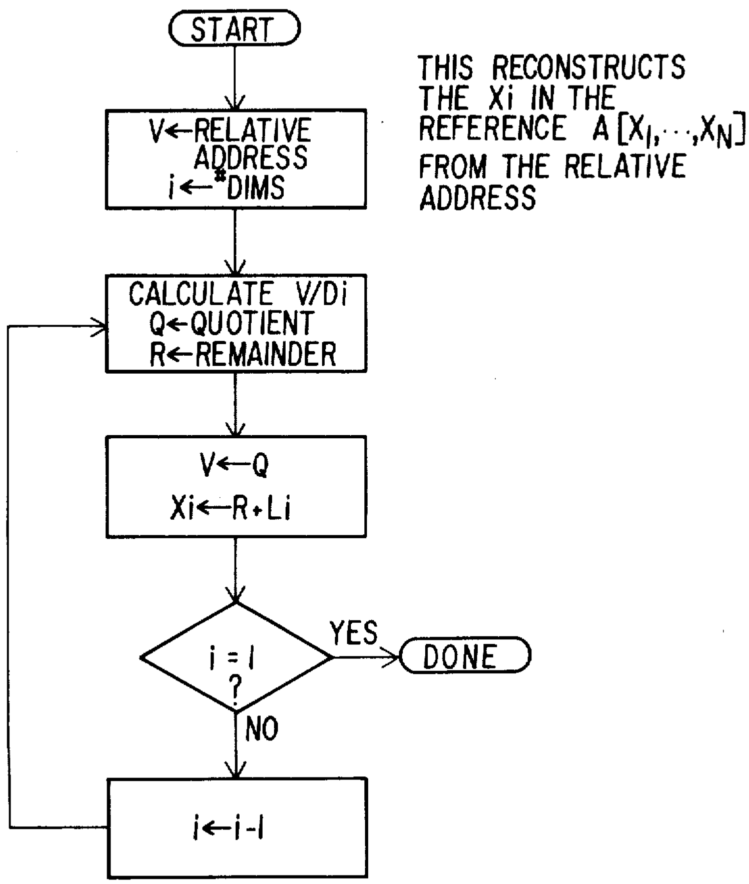

In the case of a simple variable, the address and the variable correspond uniquely, so the name of the variable is known immediately. In the case of an array variable, the actual subscripts of the array must be reconstructed from the address given. Since the address was arrived at originally from a simple iterative calculation, the inverse of this iteration reproduces the desired subscripts. Referring to FIG. 160D, a flow chart of the subroutine for reconstructing the $X_i$ in the reference $A[X_I, \ldots X_N]$ from the relative address is shown.

The subscript address iteration is of the form:

$V_{new} = V_{old} {}^*D_I + (X_I\text{-}L_I)$ $V_{new}$, $D_I$, $L_I$ is known and $V_{old}$ and $X_I$ is to be determined.

The division algorithm gives:

$V_{new}/D_I = V_{old} + (X_I - L_I)/D_I$ hence the quotient is the $V_{old}$, and since it is known that the starting $V_{new}$ was in-bounds, from the bounds conditions:

$(S_I - L_I) = Q'_I, Q_I' \geqq O, Q_I' < D_I$ the remainder is the $(X_I - L_I)$. The algorithm is V = relative element
FOR I = N to 1
calculate $V/D_I$ = Quotient + Remainder/$D_I$
V ← Quotient
subscript = Remainder + $L_I$
NEXT I

NUMBER FORMATS

Numbers can be displayed or printed in floating-point format (scientific notation) or in fixed format. The calculator's internal representation of numbers is unaffected by number formats, therefore, accuracy is not changed.

When the calculator is turned on, RESET is pressed, or erase *a* is executed, the number format is fixed 2 (fxd2), except for very large numbers. Then, the calculator temporarily reverts to float 9.

THE FIXED STATEMENT

Syntax:

fxd number of decimal places

The fixed (fxd) statement sets the format for printing or displaying numbers. In fixed format, the number of digits to appear to the right of the decimal point is specified. Fixed 0 through fixed 11 can be specified.

When a number is too large to fit in the fixed format, the number format temporarily reverts to the previously set floating-point format. Thus, for any number A:

$A = N * 10^E$ where: $1 \leqq N < 10$, or N=0

The nuumber reverts to the previously set floating format if:

$D + E \geqq 14$ where:

D = Number of decimal places specified in the fixed statement.

E = exponent of the number.

For numbers too small to fit in the fixed format setting, zeros are printed or displayed for all decimal places with a minus sign if the number is negative.

Two distinct rounding functions are available to the user. prnd is used to round a number to a specified power of ten. For example, dollar figures can be rounded to the nearest penny or $10^{-2}$. The user specifies the number to be rounded and the power of ten is the argument list as follows:

prnd (43.271, −2) which results in a value of 43.27.

The other rounding function, drnd, is used to round a number to a specified precision indicated by the number of digits to be retained. The number to be rounded is represented as:

$\pm$ D1.D2 D3 ... D12 $*10^{exponent}$

The user specifies the argument and the number of digits to be retained in the argument list as follows:

drnd (−127.3276,6) which results in a value of −127.328.

In each rounding function one or both arguments may be any valid arithmetic expression. Referring to FIG. 161, a flow chart of the prnd and drnd function is given.

THE FLOAT STATEMENT

Syntax:

flt number of decimal places

The float (flt) statement sets floating point format which is scientific notation. When working with very large or very small numbers, floating point format is most convenient. Float 0 through float 11 can be specified.

A number output in floating point format has the form:

−D.D...D e−DD

The first non-zero digit of a number is the first digit displayed. If the number is negative, a minus sign precedes tthis digit; if the number is positive or zero, a space precedes this digit. A decimal point follows the first digit; except in flt O. Some digits may follow the decimal point; the number of digits being determined by the specified floating point format (e.g., in float-5, five digits follow the decimal point).

When the character "e" appears, followed by a minus sign or space (for non-negative exponents) and two-digits, the two digits represent the exponent as a positive or negative power of ten.

ROUNDING

A number is rounded before being displayed or printed if there are more digits to the right of the decimal point than the number format allows. The rounding is performed as follows: The first excess digit is checked; if its value is 5 or greater, the digit immediately preceding it is incremented by one; if its value is less than 5, the digit is truncated.

THE DISPLAY STATEMENT dsp [any combination of text or expressions]

The display (dsp) statement displays values or text on the calculator display. Commas are used to separate variables or text. The number of characters that can be viewed at one time is limited by the display size but all characters can be displayed and viewed using the display control keys, Left Arrow key and Right Arrow key.

Values and text which are displayed remain in the display until another display operation clears it, or until a print statement is executed.

Displaying Quotes

Quotes are used to indicate text. To display quotes within text, it is necessary to press the quote key twice for each quote to be displayed.

Figure 162:
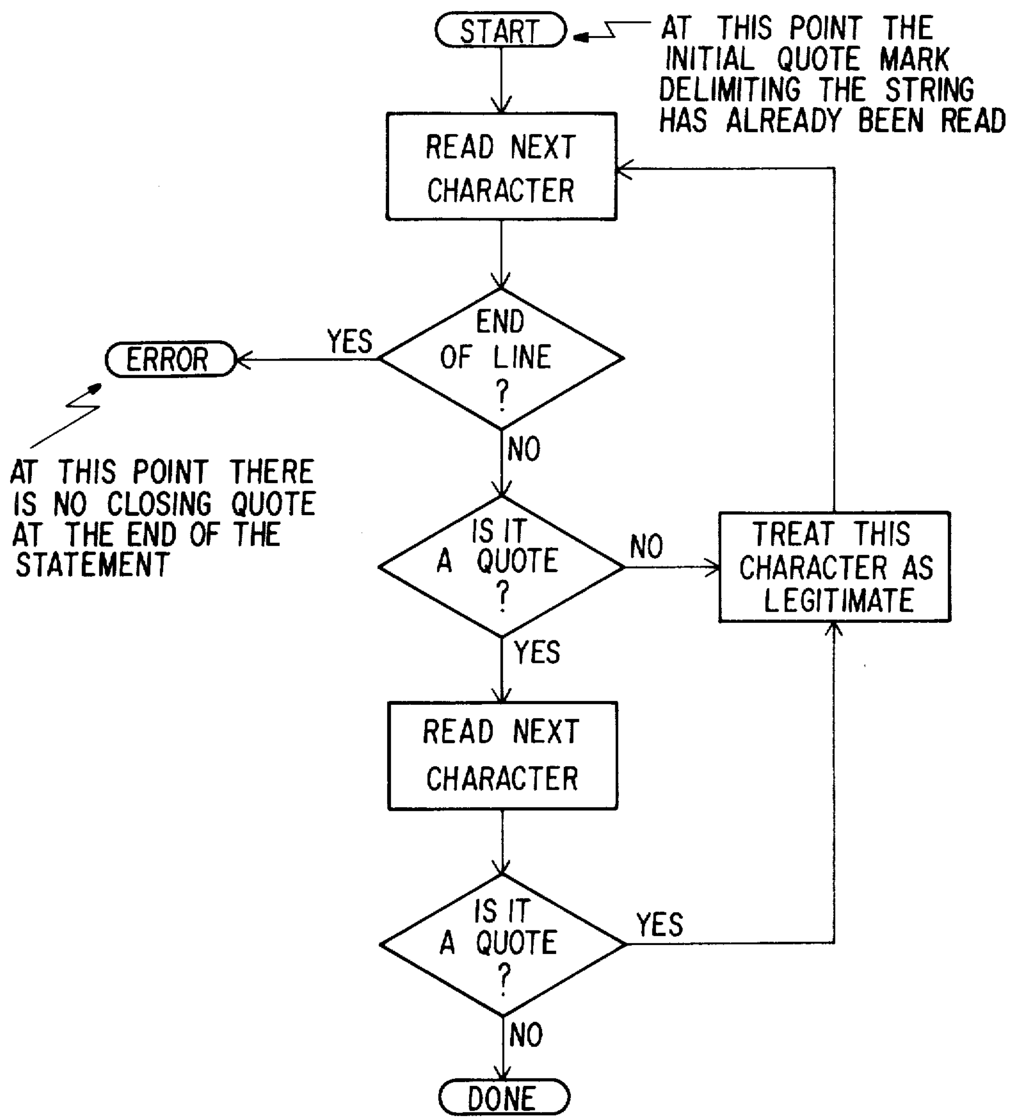
Figure 163A:
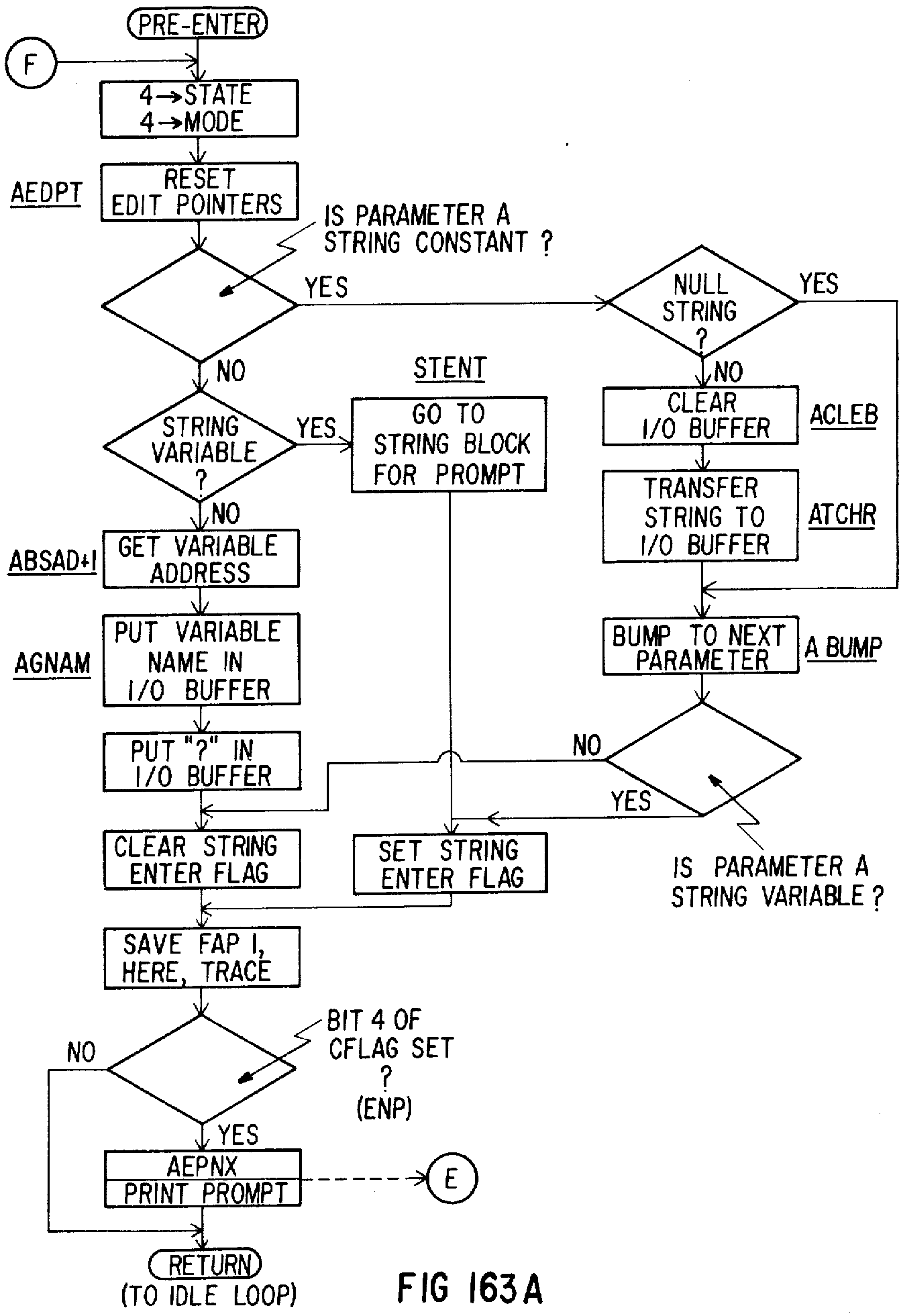
Figure 163B:
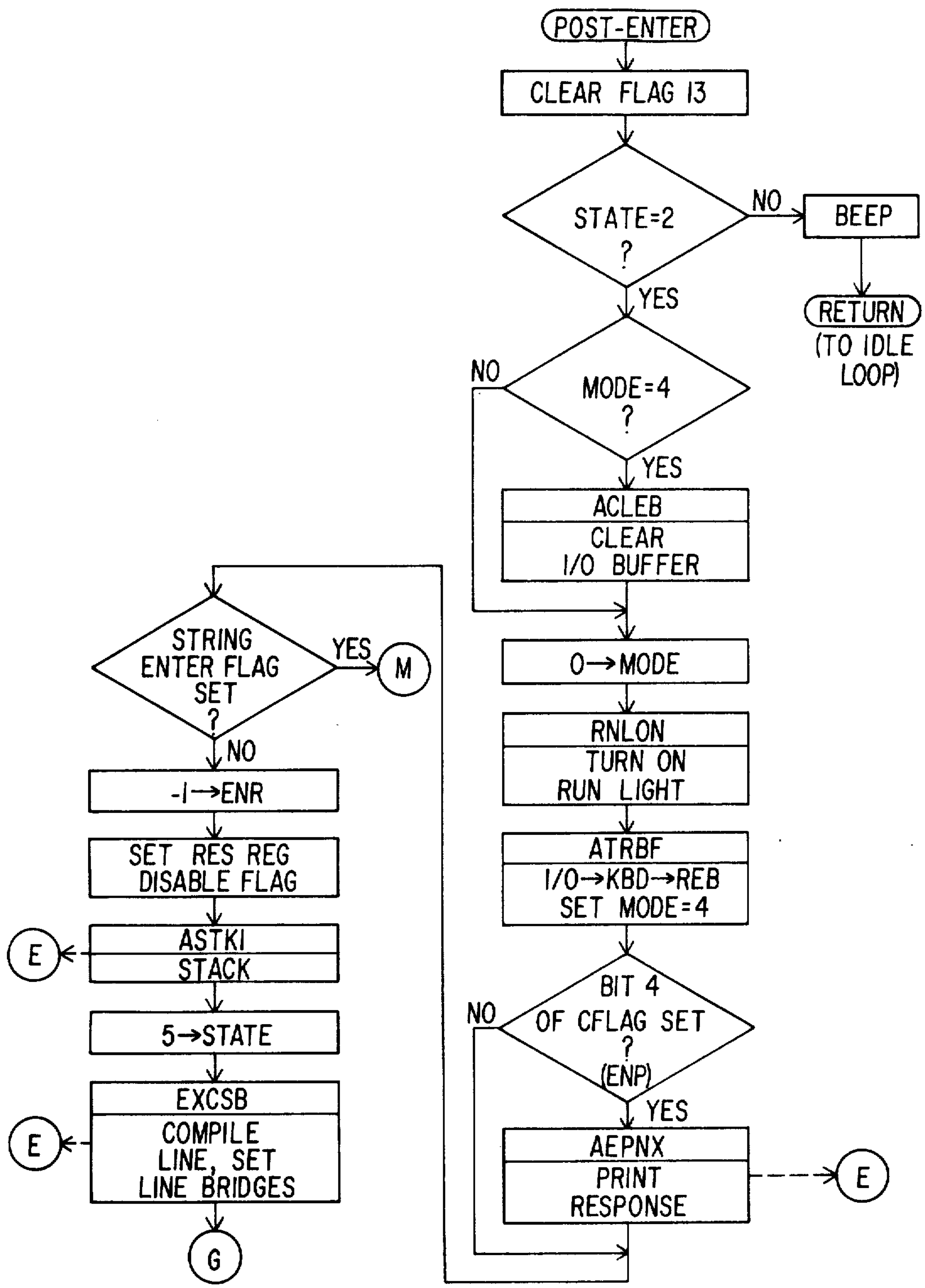
Figure 163C:
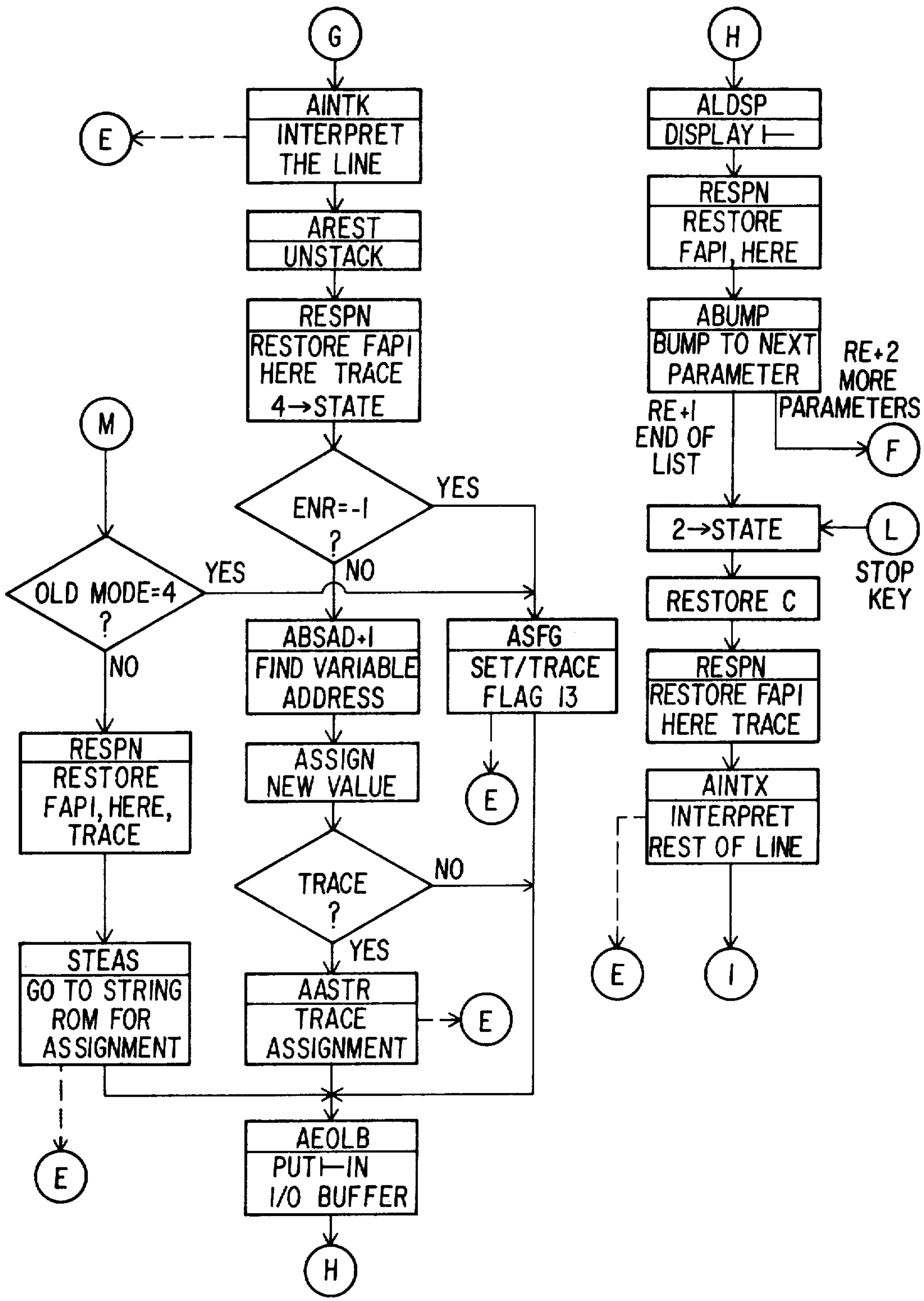
Figure 163D:
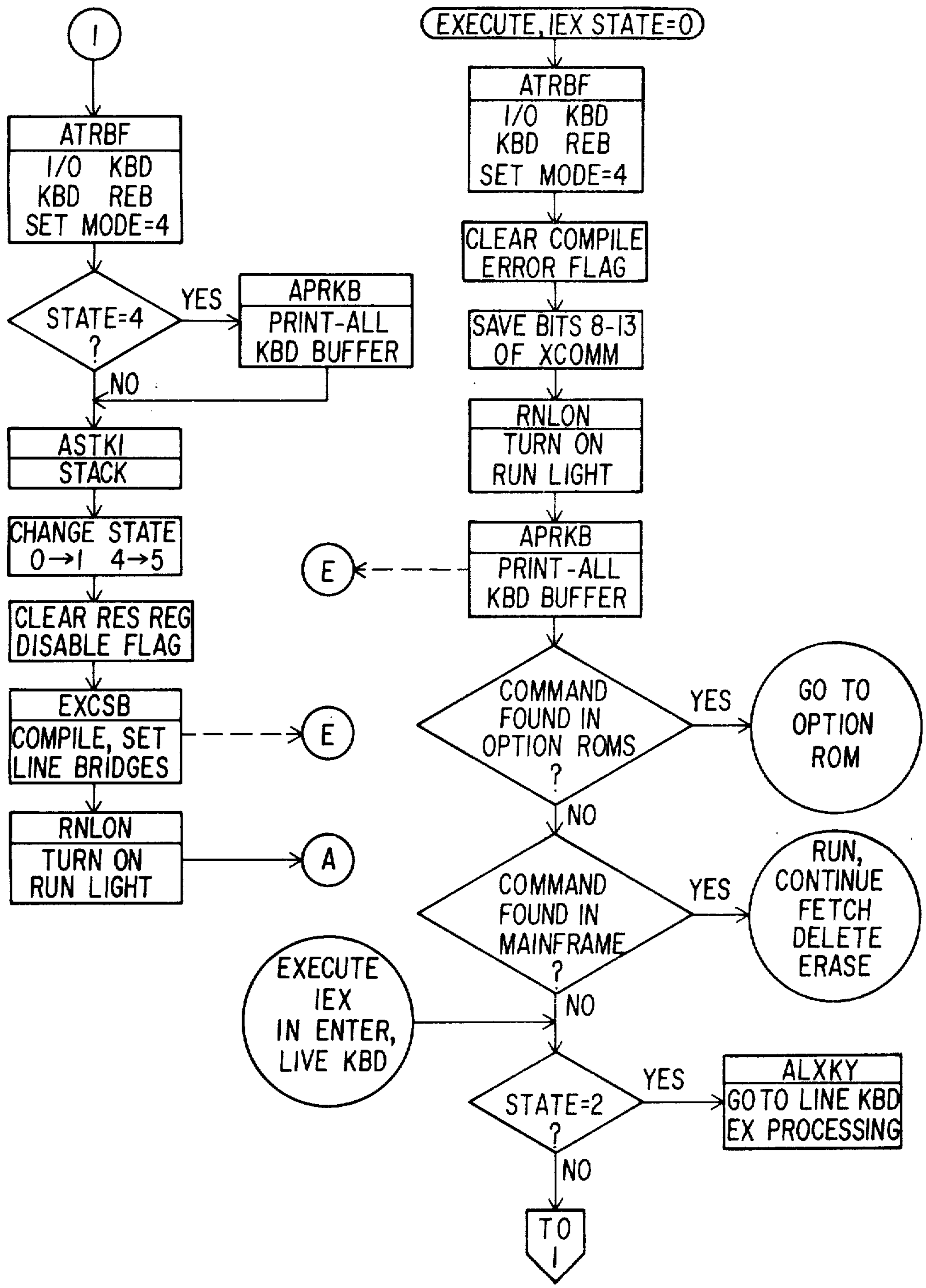
Figure 163E:
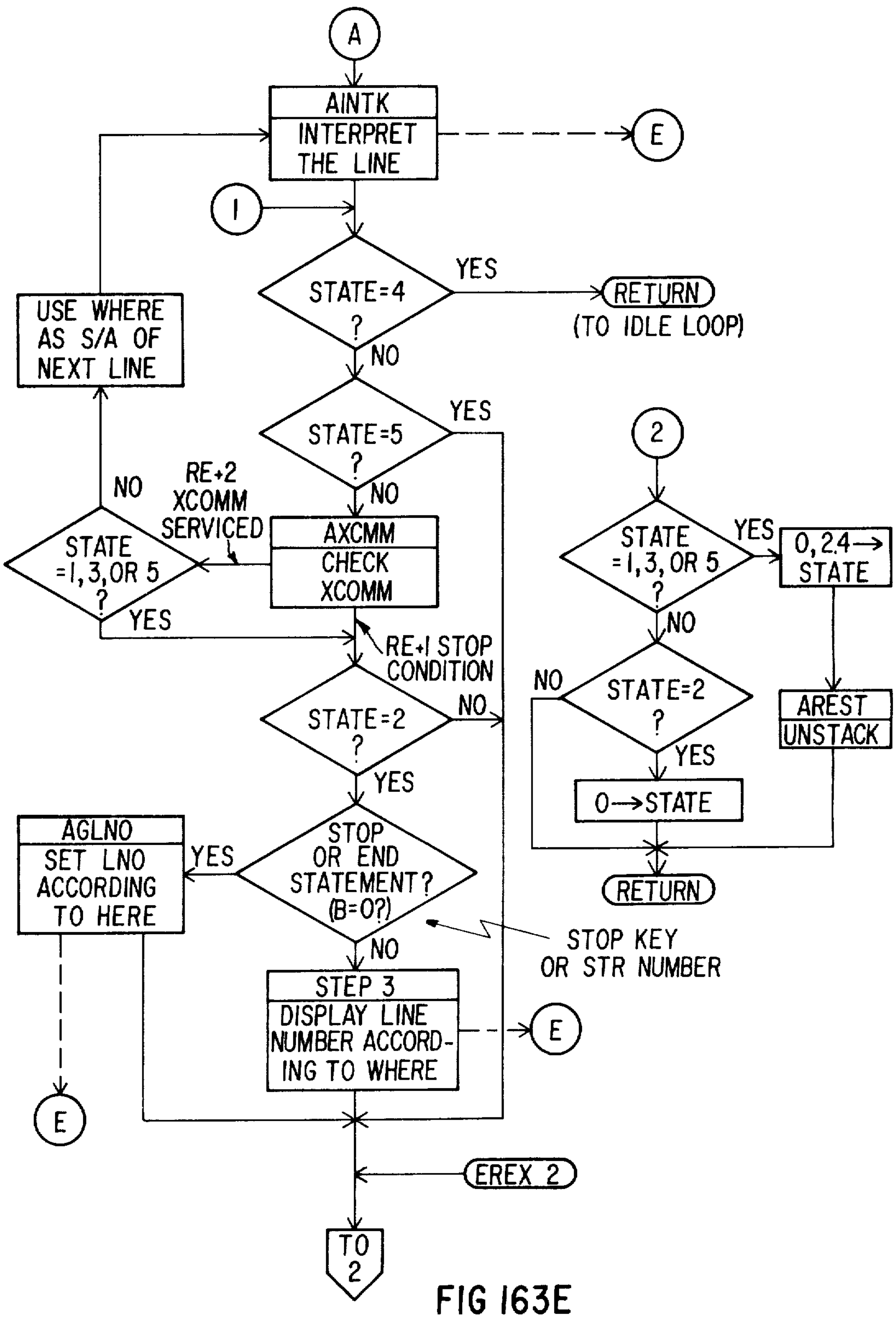
Figure 163F:
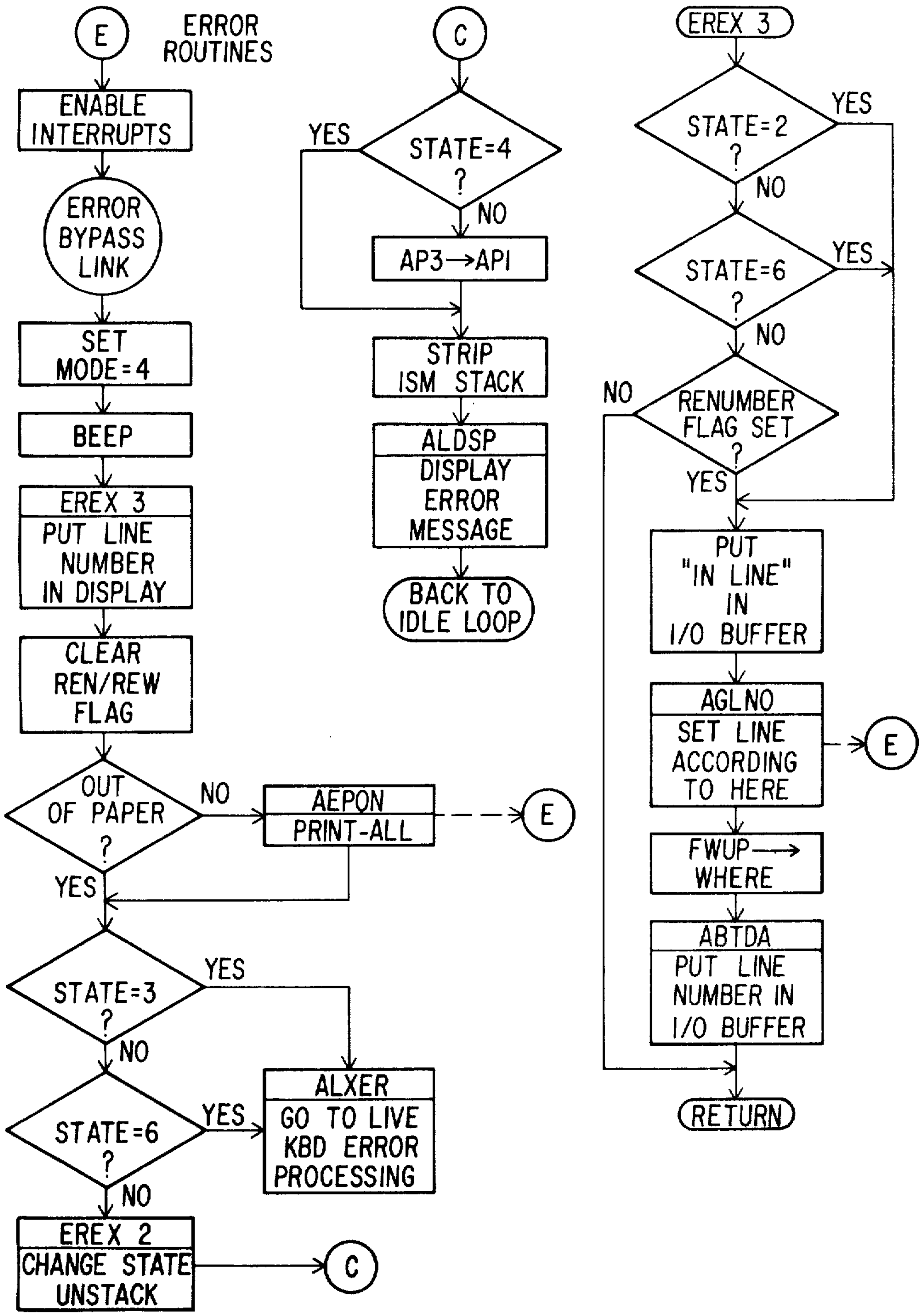

Example 1:

Enter: dsp "Say" "Hi""to her."
Press: EXECUTE
Display: Say "Hi" to her. FIG. 162 is a flow chart of the quote recognition subroutine which allows a user to place a quote mark inside a string delimited by quote marks.

THE PRINT STATEMENT

Syntax:
prt [any combination of text or expressions]

The print (prt) statement is used to print values or text on the calculator printer.

Examples:

| Statement | Output | |
|---|---|---|
| prt 6 | | 6.ϕϕ |
| prt "One",1 | One | 1.ϕϕ |
| prt "This one" | This one | |

If an expression is to be printed, such as:
prt 6*7→X
the expression is evaluated and the equivalent value is printed (and also stored in X in this example).

If no value or text is specified, such as:
prt
then no operation takes place.

When printing lines of text and values, the printout follows this format:

A literal followed by a numeric is printed on the same line if it fits; otherwise the literal is printed and the numer is printed on the next line.

Literals separated by commas begin on a new line and fold over on successive lines if they are longer than 16 characters.

Numerics separated by commas are printed one per line unless the format is flt 10 or flt 11 which require two lines.

THE ENTER STATEMENT

Syntax:
end [prompt , ] variable [, [prompt , ] variable ...]

The enter (ent) statement is used to assign values to variables from the keyboard as a program runs. The variable can be a simple variable, array variable, or an *r*-variable.

When an enter statement is encountered in a program, a user keys in a number and presses CONTINUE.

When many items are entered from the keyboard, it is often helpful to have a message called a "prompt" displayed representing the variable being assigned a value. For instance:

| Example | Display |
|---|---|
| ϕ: ent "Amount", A | Amount |
| 1: ent "Temperat ure",T | Temperature |

If no literal prompt is given, the calculator uses the name of the variable as the prompt.

If a null quote field is given as a prompt, such as 10: ent"",A the calculator retains any previously displayed message, unless a print operation is between the display statement and the enter statement. This is useful for variable prompts using the display statement. For example:

6:
7: 1974→Y; fxd 0
8: dsp "Aug,", Y
9: ent "",A
10:

The display shows Aug, 1974 when a value is to be entered for "A".

A user can calculate values from the keyboard while the program waits in the enter statement. This is done simply by entering the calculation and pressing the EXECUTE key. If the value to be entered is the result of the "execute" operation, a user presses RECALL or RESULT (for numerics) then presses CONTINUE. Pressing EXECUTE immediately followed by pressing CONTINUE causes a default condition as if CONTINUE were pressed without entering a value.

A user can also enter expressions such as $\sqrt{5}$, and press CONTINUE. The calculation is performed automatically before the result is entered.

Complex lines can be entered as the response to an enter statement. For example, assume the following program is entered by a user.

0: ent B
1: ent A
2: prt A
3: end

When the display is "B?" a user enters a value for B. Then when the display is "A?" a user enters 20; if B>20; 40. The user then presses CONTINUE. If the value that is entered for B is greater than 20, then "40"is printed, otherwise "20" is printed.

If CONTINUE is pressed without entering a value, the variable maintains is previous value and flag 13 is set.

To terminate a program during an enter statement, a user presses STOP. The program line is completed before the calculator stops.

Commands are not allowed during an enter statement.

Referring to FIGS. 163A–F, the string constant prompts and the addresses of the enter variables are placed on the execution stack and the pre-enter routines are called when the statement is executed by the interpreter. These routines take the information off the stack and calculate the prompt that should be displayed. When the interpreter executes an enterprint statement (enp), it sets a bit in CFLAG so that the pre-enter routine will print as well as display the prompt.

After the prompt is constructed and placed in the I/O buffer, control is transferred back to the main idle loop. The user can then type characters using the normal I/O buffer editing routines. If the execute key is pressed, the normal execution loop is used to execute the line in the I/O buffer.

When the continue key is pressed, the post-enter routines are called ti interpret the entered line and assign the resulting value to the enter variable. If nothing is entered, or if no result is obtained from the line, the enter variable is left unchanged and flag 13 is set. After the line is processed, the next enter variable is taken from the execution stack, and the process is repeated. After the parameter list is exhausted, control is transferred back to the interpreter to continue processing the rest of the user program.

THE ENTER PRINT STATEMENT

Syntax:
enp [prompt , ]variable [ , [prompt , ] variable...]

The enter print (enp) statement is the same as the enter statement except that prompts and the entered values are printed and displayed as they are encountered.

For example, assume the following short program is entered to calculate the area of a circle:

0: enp "radius",
  R
1: πRR→A
2: prt "area",A
3: end

If 2 is entered for R when the program is run, the print-out will be:

radius
2
area 12.57

THE SPACE STATEMENT

Syntax:
spc [number of lines]

The space (spc) statement causes the printer to output the number of blank lines indicated by the expression. The number of lines can be an expression with a range of 0 through 32767. If no parameter is specified, one blank line is output.

Examples

| | |
|---|---|
| spc A + B | Space the number of lines specified by A + B. |
| spc 5 | Space 5 lines. |
| spc | Space one line. |

THE BEEP STATEMENT

Syntax:
beep

The beep statement causes the calculator to output an audible sound.

Example:

The calculator normally beeps, displays error 67, and stops when the argument of the square root (√ ) function is negative. In the following short program the value entered for A is tested. If it is negative, the calculator still beeps and displays a message, but the program continues entering values.

0: fxd 4
1: "beg.":ent
"Argument",A
2: if A>0;gto
  "error"
3: prt rA;gto
  "beg."
4: "error":beep
5: dsp "r of
  neg. no."
6: wait 2000;
  gto "beg."

THE WAIT STATEMENT

Syntax:
wait number of milliseconds

The wait statement causes a program to pause the specified number of milliseconds. The wait statement is often used with the display or enter statements to display a message for a specified time. The number of milliseconds can be an expression.

Since the wait statement takes time to be executed, small values in the wait statement are actually longer than a millisecond.

The maximum wait is around 32 seconds which is specified by the value of 32767.

Examples:

| | |
|---|---|
| wait 2000 | pause for 2 seconds |
| wait (2*I) | pause for (2*I) milliseconds |

BINARY I/O OPERATIONS

Binary I/O operations are available to read and write individual data characters, and to transmit or receive control information using interface status lines. Binary I/O operations do not reference format or conversion statements. The data I/O modes and status line meanings are determined by the interface card.

THE WRITE BINARY STATEMENT

Syntax:
wtb select code,$expression_1$,$expression_2$,...

This statement outputs the 16-bit binary-equivalent result of each expression in the list. The usable range for each expression is an integer from 32767 through −32768. If the interface handles data in an 8-bit fashion, such as the HP-IB Interface or the byte mode with the HP 98032A, only the eight least-significant bits of each integer are output.

THE READ BINARY FUNCTION

Syntax:
rdb [select code]

Read binary is a function that inputs one 16-bit character and stores its integer-decimal value. If the interface handles data in an 8-bit fashion, only the eight least-significant bits are read.

Referring to FIG. 164, a flow chart of the read binary subroutine is shown. A user places the calculator in a special input mode in which the next key pressed, except for the RESET key, terminates the mode and returns the key code for that key to the program. Using the select code 0 for the calculator keyboard and display, as discussed hereinafter, the syntax is rdb(0). The keycode for the next user actuated key is returned for the value of the function thereby allowing a user to redefine one or more of the keyboard keys.

THE READ STATUS FUNCTION

Syntax:
rds [select code]

This function reads the current status information transmitted from the specified device and returns a decimal equivalent number.

KDP Status Bits

Status information from the calculator's keyboard, display and printer is combined into an 8-bit byte. Although most of the bits are primarily for internal use only, two bits, bits 1 and 2, have programming uses in that Bit 1 indicates "1" whenever the printer is out of paper and Bit 2 indicates "1" whenever the printer is busy.

THE WRITE CONTROL STATEMENT

Syntax:
wtc (select code),expression

This statement outputs a binary number to control functions on the Interface Card. One number is allowed with each statement. Control bits 0, 1 and 5 are used to drive interface output lines CTL0, CTL1, and RESET. CLT0 and CTL1 are optional peripheral control lines, while RESET is used to initialize the peripheral to its power-up state. A preset signal is automatically given when the calculator is switched on or when RESET is pressed. The interface ignores bits 2 and 3. Bits 4, 6 and 7 are usable when the Extended I/O ROM is in use.

HP INTERFACE BUS

The HP Interface Bus, HP-IB hereafter, is described in U.S. Pat. No. 3,810,103 and in the January, 1975, Hewlett-Packard Journal, Vol. 26, Number 5. It has a serial-byte bus structure which permits bi-directional communication between multiple devices. When a controller such as a calculator is used, up to 14 HP-IB compatible devices can be controlled via one interface card.

Instruments are controlled or programmed and data transmitted between devices on the bus. This is possible since each device connected to the bus has the potential of being a "talker" (sends data) or a "listener" (receives data) and has a unique talk and/or listen address by which a controller interrogates or communicates with the instrument. A unique threewire handshake technique allows the communication to take place at a speed determined only by the specific instruments being addressed. Slower devices will not slow down the communication speed of the bus as long as they are not addressed.

The interface system consists of 16 lines which are used to carry all data and control information. The bus structure is organized into three sets of signal lines: data bus, 8 signal lines; handshake or control, 3 signal lines, and general interface management, 5 signal lines.

The data bus carries 8-bit data and control messages in bit parallel, byte serial form. The messages are transmitted bi-directionally and asynchronously. The handshake and management lines are used to control data transfer and timing on the bus. When the General I/O ROM is used, the handshake and management lines are controlled automatically, permitting the calculator to communicate with one instrument at a time. For complete control of all bus functions, the Extended I/O ROM is required.

THE STOP STATEMENT

Syntax:
stp

The stop statement stops program execution at the end of the line in which it is executed. Executing the stop statement in a keyboard line stops the keyboard line only.

When the stop statement is executed in a program, the line number of the next line to be executed is displayed. Pressing the CONTINUE key continues the program from the line number in the display. Pressing the STEP key "steps" from the displayed line number one line at a time. If any editing is performed after the program stops, pressing the CONTINUE key causes the program to continue from line O.

The stop statement can also be used for editing.

THE END STATEMENT

Syntax:
end

The end statement is usually the last line in a program. It causes the program to stop. The end statement resets the program line counter to line 0 and resets all go sub return pointers as explained more fully hereafter. The end statement cannot be executed during an enter statement, no can it be executed in live keyboard mode.

HIERARCHY

In a statement containing functions, arithmetic operations, relational operations, logical operations, imbedded assignments, or flag operations, there is an order in which the statement is executed. This order is called the hierarchy, which is for the preferred embodiment:

| | |
|---|---|
| highest priority | functions, flag references, r-registers |
| | ↑ (exponentiation) |
| | implied multiply |
| | unary minus |
| | * / mod |
| | + − |
| | all relational operators (=,>,<,<=,>=,#) |
| | not |
| | and |
| lowest priority | or xor |

Expressions within parenthesis are given highest priority. Expressions within innermost parenthesis are evaluated first. If an assignment is within parenthesis, this rule does not always hold true. If operations are on the same level in the hierarchy, then they are evaluated from left to right as in : A*B*C*D.

SIGNIFICANT DIGITS

All numbers are stored internally with 12 significant digits regardless of the number format being used.

OPERATORS

The four groups of mathematical or logical symbols, called operators, are: the assignment operator, arithmetic operators, relational operators, and logical operators.

Assignment Operator

Syntax:
expression → variable

The assignment key, labelled → and shown below the CLEAR key in FIG. 3, is used to assign values to variables.

Examples:

| | |
|---|---|
| 1.4 → A | The value 1.4 is assigned to the variable A. |
| B → A | The value of B is assigned to the variable A. |

To assign the same value to many variables, the assignment operator is used as in this example:

32 →A → B→ X → r4

Multiple assignments can also take the form:

(25→ A) +1 →B which is the same as 25→ A ; A +1→ B

It should be noted that 25→ A +1→ B is not allowed; parenthesis are required for imbedded assignments.

Assignments can be imbedded within a statement such as if (A+1→ A) >5.

This allows the assignment and the comparison to be made in a single statement.

Arithmetic Operators

The six arithmetic operators are given below:

| Key label | Function | Example |
|---|---|---|
| + | Add (if unary, no operation) | A+B or +A |
| − | Subtract (if nuary, change sign) | A−B or −A |
| | Multiply | A*B |
| | Divide | A÷B |
| ↑ | Exponentiate | $A^B$ |
| mod | Modulus | A mod B is the remainder of A÷B when A and B are integers. A−int (A/B)*B |

In addition to the "*" symbol for multiplication, implied multiplication is also possible. In the following instances, implied multiplication takes place:

- Two variables together (i.e.: AB).
- A variable next to a value (i.e.: 5A).
- A variable or value next to parenthesis [i.e.: 5(A+B)].
- Parenthesis next to parenthesis [i.e.: (A+B)(X+Y)].
- A variable, value, or parenthesis preceding a function name (i.e.: 32 sinA).

For example:

| | |
|---|---|
| AB → X | A times B is stored in X. |
| 2C → R | 2 times C is stored in R. |
| X5 → Y | X times 5 is stored in Y |
| (5)5→ X | 5 times 5 is stored in X. |
| A(B+C)→ B | A times the sum B+C is stored in B. |
| (D+F)(R+T)→ T | The sum of D+F times the sum of R+T is stored in T. |
| 5 abs B | 5 times the absolute value of B. |

Relational Operators

There are six relational operators shown in the following table.

| Key label | Function |
|---|---|
| = | equal to |
| > | Greater than |
| < | less than |
| => or >= | greater than or equal to |
| =< or <= | less than or equal to |
| # or <> or >< | not equal to |

The result of a relational operation is either a one if the relation is true or a zero if it is false. Thus if A is less than B, then the relational expression A >= B, is true and results in a value of one. All comparisons are made to 12 significant digits.

The relational operators can be used in assignment statements, if statements and other statements which allow expressions as arguments. For example:

| | |
|---|---|
| A=B → C | Assignment statement. If A and B are equal, a 1 is stored in C; otherwise, a 0 is stored in C. |
| if A>B;... | If statement. If A is greater than B, then continue in the line; but if A is less than or equal to B, go to the next line. |
| jmp A>3 | Jump statement. If A is greater than 3, jump 1 line, otherwise jump to the beginning of the line (jmp 0). |
| prt A*(A>B)+B*(A<B) | Print statement. If A is greater than B, A is printed. If A is less than B, then B is printed. If A equals B, then "0" is printed. |

Logical Operators

The four logical operators, AND, OR, XOR (exclusive or), and NOR, are useful for evaluating Boolean expressions. Any value other than zero, false, is evaluated as true. The result of a logical operation is either zero or one as shown in the table below.

| Operation | Syntax | truth table | | |
|---|---|---|---|---|
| AND | expression and expression | A | B | A and B |
| | | F | F | 0 |
| | | F | T | 0 |
| | | T | F | 0 |
| | | T | T | 1 |
| OR | expression or expression | A | B | A or B |
| | | F | F | 0 |
| | | F | T | 1 |
| | | T | F | 1 |
| | | F | F | 1 |
| XOR (exclusive OR) | expression xor expression | A | B | AxorB |
| | | F | F | 0 |
| | | F | T | 1 |
| | | T | F | 1 |
| | | T | T | 0 |
| NOT | not expression | A | | not A |
| | | F | | 1 |
| | | T | | 0 |

MATH FUNCTIONS AND STATEMENTS

Simple or complex problems are solved using the nineteen math functions and four math statements which are explained hereinafter and the six math operators explained hereinbefore.

Parenthesis are necessary when a "+" or "−" sign precedes the argument. In the following examples of Functions, parenthesis are shown only where they are required.

| Syntax | Description | Examples (fxd 5) |
|---|---|---|
| √ expression | The square root function returns the square root of an expression which is non-negative. | $\sqrt{64}$ = 8.00000<br>$\sqrt{\pi}$ = 1.77245 |
| abs expression | The absolute value function determines the absolute value of the expression. | abs (−3.09) - 3.09000<br>abs 330.1 - 330.10000 |
| sgn expression | The sign function returns a −1 for negative expression, 0 if the expression equals 0, and 1 for a positive expression. | sgn (−18) = −1.00000<br>sgn 0 = 0.00000<br>sgn 34 = 1.00000 |
| int expression | The integer function returns the largest integer less than or equal to the expression. This is often referred to as the "floor" integer | int 2.718 = 2.00000<br>int (−3.24) = 04.00000 |

-continued

| Syntax | Description | Examples (fxd 5) |
|---|---|---|
| | value of the expression (see programming hints). | |
| frc expression | The fraction function gives the fractional part of a number. It is defined by: <expression> −int <expression> | frc 2.718 = .71800<br>frc (−3.24) = .76000 |
| prnd (expression, rounding specification | The power-of-ten rounding function returns the value of the argument rounded to the power-of-ten position indicated by the rounding specification. The argument remains unchanged. | prnd (127.375, -2) = 127.38000<br>127.375 is rounded to the nearest hundredth $10^{-2}$). |
| drnd (expression, number of digits) | The digit round function rounds the argument to the number of digits specified. The leftmost significant digit is digit number 1. The argument remains unchanged. | drnd (73.0625,5 = 73.06300<br>drnd (−65023,1) = −70000.00000<br>drnd (.055,1) = 0.6000 |
| min (list of expressions and arrays) | The min function returns the smallest value in the list. An entire array can be specified by using an asterisk, such as B[*]. | 0: dim A[3];2→A[1]<br>1: 9→A[2];3→A[3]<br>min (A[*]) = 2.00000<br>min (2,−3,−3,4) = 3.00000 |
| max (list of expressions and arrays) | The max function returns the largest value in the list. An entire array can be specified by using an asterisk, such as B[*]. | 0: dim A[3]; 2→A[1]<br>1: 9→A[2]; 3→A[3]<br>max (A[*]) = 9.00000<br>max (5,4,−3,8) = 8.00000 |
| rnd expression | The random number function generates a pseudo-random number in the range 0≦ rnd expression <1. The starting seed for the function is π/180 (which is .0174532925200). This seed is initialized when the calculator is turned on, erase a is executed, or RESET is pressed. If the expression is negative, then the expression becomes the new seed. To obtain other good seeds, use an expression between 0 and −1: The more non-zero digits in the value, the better. Last digits of 1,3,7 or 9 are preferable. | rnd 1 = .67822<br>rnd (−.827) = .50700 |

Exponential and Logarithmic Functions

The math errors and default values associated with the log, and ln (natural log) functions are explained in detail hereinafter in the section on Math Errors.

| Syntax | Description | Examples (fxd 5) |
|---|---|---|
| ln expression | The natural logarithm function calculates the logarithm (base e) of a positive valued expression | ln 8001 = 8.98732<br>ln .0026 = −5.95224 |
| exp expression | The exponential function raises the constant, naperian $e_1$ to the power of the computed expression The range of the argument is from −227.95 through 230.25. | exp 1 = 2.71828<br>exp (−3) = .04979 |
| log expression | The common logarithm function calculates the logarithm (base 10) of a positive valued expression. | log 305.2 = 2.48458<br>log .0049 = −2.30980 |
| tn ↑ expression | The ten to the power function raises the constant, 10, to the power of the computed expression. The range of the argument is from −99.0000000002 through 99.9999999997. This function executes faster than 10 ↑ expression. | 5 tn ↑ 2 = 500.00000<br>tn ↑ (−3) = .00100 |

Trigonometric Functions and Statements

The six trigonometric functions are all calculated in the currently set angular units. Three trigonometric statements explained in this section are used to set the angular units. Math errors and default values associated with the tan, asn, and acs functions are covered in detail hereinafter in the section on Math Errors.

Referring to FIG. 164, a flow chart illustrating how the calculator prescales trigonometric arguments is shown. The calculator reduces arguments to the first octant (0–45°) from any original value. The argument is reduced in its own units, that is in degrees, radians, or grads. First the argument is reduced to the unit circle (0–360°) by eliminating all full multiples of 360. The remainder is then reduced to the first octant and converted to radians.

Degrees are set when the calculator is switched on, erase a is executed, or RESET is pressed. To change the angular units, a user executes one of the following statements;

69 corresponds to ln or log of a neative number. The default is in (abs(argument)) or log (abs(argument)), respectively. For example:

ln (−301) = 5.70711

| Syntax | Description |
|---|---|
| deg | Specifies degrees for all calculations which involve angles. A degree is 1/360th of a circle. |
| rad | Specifies radians for all calculations which involve angles. There are 2π radians in a circle. |
| grad | Specifies grads for all calculations which involve angles. A grad is 1/400th of a circle. |
| units | Displays the current angular units |

| Syntax | Description | Examples (fxd 5) |
|---|---|---|
| sin expression | The sine function determines the sine of the angle represented by the expression in the current angular units. | deg; sin 45 = 0.70711<br>rad; sin (π/6) = 0.50000<br>grad; sin (−70) = −0.89101 |
| cos expression | The cosine function determines the cosine of the angle represented by the expression in the current angular units. | deg; cos 45 = .70711<br>rad; cos (π/6) = .86603<br>grad; cos (−70) = .45399 |
| tan expression | The tangent function determines the tangent of the angle represented by the expression in the current angular units. | deg; tan 45 = 1.00000<br>rad; tan (π/4) = 1.00000<br>grad; tan 50 = 1.00000 |
| asn expression | The arc sine function returns the principal value of the arcsine of the expression in the current angular units. The range of the argument is −1 through +1. The range of the result is −π/2 to +π/2(radians). | deg; asn .8 = 53.13010<br>rad; asn .8 = 0.92730<br>grad; asn .8 = 59.03345 |
| acs expression | The arccosine function returns the principal value of the arccosine of the expression in the current angular units. The range of the argument is −1 through +1. The range of the result is 0 to π (radians). | deg; acs (−.4) = 113.57818<br>rad; asn .8 = 1.98231<br>grad; acs (−.4) = 126.19798 |
| atn expression | The arctnagent function calculates the principal value of the arctangent of the expression in the current angular units. The range of the result is −π/2 to +π/2 (radians). | deg; atn 20 = 87.13759<br>rad; atn 20 = 1.52084<br>grad; atn 20 = 96.81955 |

MATH ERRORS

The numerals 66 through 76 are automatically displayed in response to the occurrence of a math error and flag 15 is set. When flag 14 is set, math operations which normally cause an error to be displayed, result in a default value.

When printing, displaying or storing default values of ± 9.99999999999e511, the value is automatically converted to ± 9.99999999999399.

66 is displayed in response to division by zero. The default value is 9.99999999999e511 if the dividend is negative. For example:

−9.5/0 = −9.999999999993511

A mod B with B equal to zero. The default value is 0. For example.

32 mod 0 = 0

67 corresponds to the square root of a negative number. The default value is √(abs(argument)). For example:

√(−36) = 6.

68 corresponds to the: tangent of (n*π/2 radians; tangent of (n*90°); tangent of (n*100 grads); wherein n is an odd integer. The default value is 9.99999999999e511 if n is positive; and −9.99999999999e511 if n is negative.

log (−.001) = −3.00000

70 corresponds to ln or log of zero. The default value is −9.99999999999e511.

71 corresponds to asn or acs of a number less than −1 or greater than 1. The default value is (asn (sgn(argument)) or acs (sgn)argument)), respectively. For example (in degrees):

asn (−10) = asn (−1) = −90 acs (1.6) = acs (1) = 0

72 corresponds to a negative base to a non-integer power. The default value is (abs(base)) ↑ (non-integer power). For example:

(−36) ↑ (.5) = 6

73 corresponds to zero to the zero power (0 ↑ 0). The default value is 1.

74 represents full-precision overflow. The default value is 9.99999999999e99 or −9.99999999999e99.

75 represents full-precision underflow. The default value is zero. For example:

(1e−66) * (4e−35) → A

A will equal 0

76 represents an intermediate result underflow. The default value is 9.99999999999e511 or −9.99999999999e511. For example:

(1e 99) ↑ 6 = 9.99999999999e511

(−13 99) ↑ 6 = −9.99999999999e511

77 represents an intermediate result underflow. The default value is zero. For example:

(1e−10) ↑ 60 = 0

BRANCHING STATEMENTS

There are three statements used for branching: the go to (gto) statement, the jump (jmp) statement, and the go sub (gsb) statement.

The following three types of branching may be used for both go to and go sub statements:

| | |
|---|---|
| Absolute Branching - | branch to a specified line number (such as gto 10). |
| Relative Branching - | branch forward or backward in the program specified number of lines relative to the current line (such as gsb - 3). |
| Labelled Branching - | branch to an indicated label (such as gto "First"). |

Line Renumbering

Line numbers are automatically renumbered when a program line is inserted or deleted. As lines are inserted or deleted in a program, the line number of any relative or absolute go to or go sub statements is changed to reflect the insertion or deletion. The entire program is checked before any deletion is made. If the line being deleted is the destination of a relative or absolute go to or go sub statement, an error is displayed and no deletion occurs unless an asterisk (*) is used in the delete commmand, the delete command being more fully described hereinafter.

Labels

Labels are characters within quotes located at the beginning of a line, after a gto or gsb statement, or after a run or continue command. Labels at the beginning of a line must be followed by a colon.

Labels are used for branching, the label in the gto or gsb statement is compared to the line labels in the program until a match is found. Then, at the end of the line, a branch is made to the line containing the label. When a branch is made to a label, the program is scanned beginning at line O until a matching label is found.

THE GO TO STATEMENT

The go to (gto) statement causes program control to transfer to the location indicated. There are three types of branching used with the gto statement, absolute, relative, and labelled.

Absolute Go To

Syntax:

gto    line number

An absolute go to statement is used to branch to the indicated line number. The line number must be a number. Inserting an absolute go to statement at line zero causes the line number of the go to statement to be incremented by one.

When an absolute go to statement is executed from the keyboard, the program line counter is set to the specified line number. To view the line, a user presses the ↑ Display key.

Relative Go To

Syntax:

gto + number of lines gto − number of lines

A relative go to statement is used to branch forward (+) or backward (−) the specified number of lines, relative to the current line number. The line number must be a value.

Labelled Go To

Syntax:

gto    label

A labelled go to statement is used to branch to the indicated label (see section on labels). This is the most convenient type of branching since no line numbers have to be considered.

Example:

gto "beg."    go to the line labelled by "beg."

Multiple Go To Statements

Multiple go to statements in a line are used for N-way branching, described hereinafter, when used with an if statement.

THE JUMP STATEMENT

Syntax:

jmp    number of lines

The jump (jmp) statement allows branching from the current line number by the number of lines specified. This statement is similar to the relative go to statement except that the number of lines can be an expression. If the number of lines is positive, the branch is forward in the program. If the number of lines is zero, the branch is to the beginning of the current line. If the number of lines is negative, the branch is backward in the program. If the number of lines is not an integer, then it is rounded as follows:

- The value is rounded to the next greater integer if the fractional part is 0.5 or larger.
- The fractional part is truncated if its value is less than 0.5.

The jump statement executes slower than the go to statement.

The jump statement can only be at the end of a line, otherwise error ϕ7 is displayed.

THE GO TO SUBROUTINE AND RETURN STATEMENTS

The go to subroutine (gsb) statement allows branching to subroutine portions of a program. A return pointer is set up when the go sub statement is executed. The return pointer points to the line below the line containing the go sub statement. The return (ret) statement returns the program execution to the pointer location. The return statement must be the last statement executed in the subroutine and must be the last statement in a line. The depth of go sub nesting is limited only by the amount of available memory.

There are three types of go sub statements: absolute, relative, and labelled.

Absolute Go Sub

Syntax:

gsb    line number

An absolute go sub statement is used to go to the subroutine at the specified line number. The line number must be a number.

Inserting a gsb line number at line zero causes the line number of the go sub statement to be incremented by one.

Relative Go Sub

Syntax:
gsb + number of lines
gsb − number of lines

A relative go sub statement provides forward (+) or backward (−) subroutine branching the specified number of lines, relative to the current line number. The number of lines must be a number.

Labelled Go Sub

Syntax:
gsb    label

A labelled go sub statement is used to branch to the subroutine at the indicated label. This is the most convenient form of go sub branching since no line numbers need to be considered.

When branching to a label, a comparison is made on all characters in the label.

Multiple Go Sub Statements

Multiple go sub statements in a line are used for N-way branching when used with the if statement, described hereinafter.

The gsb statement is useful where the same routine will be done many times in a program and called from different places in the main program.

Calculated Gosub Branching

Using the jump statement and the go sub statement, calculated branching to subroutines is possible. This form of subroutine branching is called the calculated go sub and has the form:

gsb    line number, number of lines, or label; jmp expression

The line number or label in the gsb is ignored and the calculator branches to the subroutine designated by the computed jump expression. If a 3 is entered in line zero of the following program, for example, the program branches to the subroutine at line 4.

```
0: ent N
1: gsb "X";jmp N
2: prt "end"
3: "X":end
4: prt "subl";
   ret
5: prt "sub2";
   ret
6: prt "sub3";
   ret
```

The calculator automatically adjusts the gto and gsb destinations when program lines are inserted or deleted so that gto xx or gsb xx statement line number (xx) always point at the same line regardless of lines being inserted or deleted in the program.

This feature is desirable since all line numbers in a program are implicit. Therefore if a line is inserted, all lines after that line are associated with a line number one greater than before the insert.

This feature operates under the following editing operations:

| | |
|---|---|
| 1- | FETCH line no.<br>EXECUTE<br>enter line from keyboard<br>INSERT |
| 2- | FETCH line no.<br>DELETE |
| 3- | del <line no.1>[,line no.2][,*]<br>EXECUTE |

Referring to FIG. 166, detailed flow charts are given illustrating the manner in which the calculator adjusts gto and gsb destinations. If an attempt is made to delete lines, the first step is to prescan the program to be sure that none of the gto or gsb statements reference the deleted lines. If the deleted lines are referenced, an error is given and the delete operation is terminated before any lines are deleted or any gto/gsb's are adjusted.

If the lines that are to be deleted are not gto/gsb destinations, then the adjustment is made and the deletion takes place. If the deletion is "del line no. 1,*"or" to del line no.1, line no.2,*", no prescan is made nor are any errors generated. All gto/gsb's whose destinations are deleted have their destinations adjusted to point at the first line after the deleted section.

THE IF STATEMENT

Syntax:
if    expression

The if statement is used to branch based on a logical decision. When an if statement is encountered, the expression following it is evaluated. If the computed expression is zero (false), program control resumes at the next program line (unless the preceding statement was a go to or go sub statement as explained hereinafter under n-way branching. If the computed expression is any other value, it is considered true, and the program continues in the same line. The if statement is nost often used with expressions containing relational operators or flags.

N-WAY BRANCHING

The if statement used with a go to or go sub statement makes it possible to branch to any of several locations. This type of branching is referred to as n-way branching, and has the following forms:

gto... ; if... ; gto...
or
gsb... ; if... ; gsb...

If the first if statement is false, then the branch is determined by the first go to or go sub statement. If the first if statement is true, the second go to or go sub statement determines the branch.

FLAGS

Flags are programmable indicators that can have a value of one or zero. When a flag is set, its value is one; when it s cleared, its value is zero. A flag's value can be complemented by the complement flag (cmf) statement. There are 16 flags, numbered 0 through 15. The following flags can have special meanings:

Flag 13 — is automatically set if the continue key is pressed without entering data in an enter statement or if the stop key is pressed in an enter statement. Flag 13 is automatically cleared when data is supplied in an enter statement.

Flag 14 — when flag 14 is set, the calculator ignores math errors such as division by zero and supplies a default value.

Flag 15 — is automatically set whenever a math error occurs, regardless of the state of flag 14.

THE SET FLAG STATEMENT

Syntax:

sfg [flag number,...]

The set flag (sfg) statement sets the value of the specified flags in the list to one. The flag number can be a value or an expression. If sfg is executed alone, all flags (0 through 15) are set.

Examples:

| | |
|---|---|
| sfg 2 | Set flag 2. |
| sfg (A+1) | Set the flag designated by (A+1). |
| sfg 1,X | Set flag 1 and the flag designated by X. |

THE CLEAR FLAG STATEMENT

Syntax:

cfg [flag number,...]

The clear flag (cfg) statement clears the specified flags in the list to zero. The flag number can be a value or expression. If cfg alone is executed, all flags (0 through 15) are cleared.

Examples:

| | |
|---|---|
| cfg 14 | Clear flag 14. |
| cfg (flg 2) | Clear the flag designated by the value of flag 2 (either flag one or flag zero will be cleared). |
| cfg 11, 12 | Clear flags 11 and 12. |

THE COMPLEMENT FLAG STATEMENT

Syntax:

cmf [flag number,...]

The complement flag (cmf) statement changes the value of the flags specified. If a set flag is complemented, its new value is zero. If a cleared flag is complemented, its new value is one. A value or expression can be used for the flag number. To complement flags 0 through 15, the complement flag statement without parameters is executed.

Examples:

| | |
|---|---|
| cmf 1 | Complement flag 1. |
| cmf (X−1) | Complement the flag designated by (X−1). |
| cmf 3,4,5 | Complement flags 3,4, and 5. |

THE FLAG FUNCTION

Syntax:

flg flag number

The flag (flg) function is used to check the value of a flag. The result of the flag function is zero or one. One indicates a set flag; zero indicates a cleared flag. Examples:

| | | |
|---|---|---|
| 4: | if flg2;jmp 5 | If flag 2 is set, jump 5 lines. |
| 5: | flg15→A | If flag 15, is set 1→A; if flag 15 is cleared, 0→A. |

THE DIMENSION STATEMENT dim item [ , item, ...]

item may be: simple variable array variable [subscript [ , subscript, ...]]

The dimension (dim) statement reserves memory for simple and array variables, and initializes the indicated variables to zero. r-variables are not allowed in a dimension statement.

Variables in the list allocate memory in the order that they appear if they have not already been allocated. Thus, all the variables dimensioned in any one dimension statement are stored in a contiguous block of memory.

In the dimension statement, the subscripts of an array can e specified by an expression. For example:

0: ent N,I,r2

1: dim A[N,I],

B[r2],C[3,2*N]

Dimension statements may appear anywhere in a program but the same dimension statement can only be executed once. The number of dimension statements is limited by memory size. The number of subscripts and the size of subscripts is limited by memory size and line length.

Specifying Bounds for Subscripts

The upper and lower bounds for the subscripts of an array can be specified. The lower bound must be specified before the upper bound and separated by a colon. For example:

0: dim S[−3:0,

4:6]

The above statement reserves the same amount of memory as:

0: dim X[4,3]

The elements of array, S, are referenced as:

| | | |
|---|---|---|
| S[−3,4] | S[−3,5] | S[−3,6] |
| S[−2,4] | S[−2,5] | S[−2,6] |
| S[−1,4] | S[−1,5] | S[−1,6] |
| S[0,4] | S[−,5] | S[0,6] |

If a lower bound is not specified, as in X[4,3], it is assumed to be 1, the same as X[1:4:4,1:3].

THE CLEAR SIMPLE VARIABLES STATEMENT

Syntax:

csv

The clear simple variables (csv) statement clears any allocated simple variables from A through Z to zero. The clear simple variables statement does not de-allocate variables. Therefore, an error results when the following line is executed:

7→A; CSV; dim A

THE LIST STATEMENT

Syntax:

list [line number 1 [, line number 2]]

list special function key list k

The list statement is used to obtain a printed listing of a program, section of a program, or special keys. If no parameter follows the list statement, the entire program is listed. If one line number is specified, the program is listed from that line to the end. If two line numbers ae specified, then the program segment between the two line numbers, inclusive, is listed. To list all the special function keys, execute lisk k (for list keys). When list is followed by pressing an individual special function key, then only that key is listed. The list statement must be stored as the last statement in a line.

Examples:

| | |
|---|---|
| list | Lists the entire program. |
| list 10,15 | List lines 10 through 15 |
| list 4,4 | List line 4. |

-continued

| | |
|---|---|
| list k | List the special function keys. |
| list f12 | List special function key $f_{12}$ (shift $f_0$). |

At the end of a listing, a checksum is printed. This checksum is useful for detecting interchanged or omitted lines and characters. This is because any difference in the programs generates a different checksum. In the following two programs, only the characters "rt" in line 1 are interchanged. Note that the checksums are different, the checksums being the bottom five digit numbers preceded by an asterisk.

```
ϕ: ent N                ϕ: ent N
1: prt "sprt.           1: prt "sptr.
 of ",N                  of",N
2: prt "                2: prt "
 is",rN                  is",rN
3: end                  3: end
*3ϕ418                  *3ϕ414
```

Used and Remaining Memory

After a list operation, two values are displayed. The first value is the total length of the program in bytes where a byte is 8 bits. To store the program, a file must be marked at least that long. The second value is the remaining memory in bytes.

EDITING

The first step in editing is to find the lines which require changes. This is done in several ways. One way is to step through a program by pressing the step key one time for each line to be executed and checking the results after each executed program line.

Another way is to use the trace (trc), stop (stp), and normal (nor) statements. When program lines are traced, variables and flags which are assigned values are printed. This allows a user to monitor program activity in individual program lines. Using the stop statement, the program is stopped whenever a specified program line is encountered. The normal statement is used to terminate tracing and stopping. More information on the stop, trace and normal statements is explained hereinafter under editing statements.

To modify characters within a line, a user presses the FETCH key followed by the line number of the line requiring the change and then presses the execute key. The line will appear in the display. A user next presses either BACK if the change is closer to the end of the display or FWD is the change is closer to the front. Once a flashing cursor is over the location needing correction, a user either inserts characters, deletes characters, or writes over the existing characters. To insert characters, the INS/RPL key is pressed. This changes the flashing cursor to a flashing insert cursor. Characters are inserted at the left of this cursor. To delete characters, the DELETE key is pressed for each character to be deleted.

To modify lines within a program, the FETCH key or the ↑ and ↓ keys are used to bring the line into the display. To delete the line, the line DELETE key is pressed.

If the line being deleted is a line referenced by a relative or absolute go to or go sub statement, an error 36 will occur. A user can either execute the delete (del) command with the optional asterisk (*) parameter, explained more fully hereinafter, or adjust the line reference in the go to or go sub statement accessing that line.

To insert a line, a user fetches the line where the inserted line is to be located, types the line into the display and presses the line INSERT key to store it. All the lines from the fetched line on are automatically renumbered (incremented by one). The line reference of go to or go sub statements are also incremented if necessary.

EDITING STATEMENTS

The trace (trc) statement, stop (stp) statement, and normal (nor) statement are also used for editing programs. The three statements have dual roles in that their action depends upon whether any parameters are specified.

THE TRACE STATEMENT

Syntax:

trc [beginning line number [, ending line number ]]

The trace (trc) statement monitors the activity of a running program. In trace mode, line numbers, any value assignments, and flags are printed as encountered in a running program.

An entire program, sections of a program, or individual lines in a program can be traced. To trace an entire program, the first line number is set to 0 and the second line number is set greater than or equal to the line number of the last line in the program. To trace a block of line numbers, trc followed by the beginning and ending line number in the block is executed. To trace a single line, trc followed by that one line number is executed.

The trace statement, when followed by parameters, sets a trace flag at each indicated line of the program. When the normal (nor) statement is executed without parameters, these line trace flags remain set, but trace mode is disabled. By executing the trace statement again, those flagged lines again are traced. To clear the line flags, the normal statement followed by the line numbers of the lines which are traced is used.

Example: Assume the following program is entered.

| | |
|---|---|
| ϕ: trc 1,12 | Traces lines 1 through 12. |
| nor | Disables tracing. |
| trc | Traces lines 1 through 12. |
| nor 3 | Clears trace flag at line 3; and tracing continues on lines 1, 2, and 4–12. |
| nor | Disables tracing. |

THE STOP STATEMENT

Syntax:

stp line number [, line number]

This stop (stp) statement is used to set stop flags at the beginning of program lines. When a program reaches a line with a stop flag set (and when the master flag is set), the program stops at the beginning of that line.

When only the first line number is specified, a stop flag at the beginning of that line is set. If the program reaches the beginning of that line, execution stops. When a block of lines is specified by two line numbers, the stop flags at the beginning of all the lines in that block are set. If execution reaches any line in that block the program stops at the beginning of that line.

The normal statement followed by a line number or two line numbers clears the individual line stop flags.

THE NORMAL STATEMENT

Syntax:

nor [line number 1 [ , line number 2]]

The normal (nor) statement clears stop and trace flags. Tracing and stopping are terminated if nor is executed without line numbers, but individual stop and trace flags are not cleared on the program lines. The trace or stop flag at a line is cleared and overall tracing continues if nor is followed by the line number. When nor is followed by two line numbers, the trace and stop line flags of all the lines in the block are cleared.

All the trace and stop line flags are cleared if nor is followed by the beginning and ending line numbers of the program.

OPERATION OF TRACE, STOP, AND NORMAL

To effectively use the trace, stop, and normal statements, the internal operation should be understood. There is one master flag which enables and disables overall tracing and stopping. In addition, each line has two flags. The trace flag enables and disables tracing of the line. The stop flag enables and disables selective stopping at the line.

Executing any of the following statements sets the master flag which enables tracing and selective stopping:

stp with parameters
trc with parameters
trc without parameters

The normal (nor) statement without parameters clears the master flag which disables tracing and stopping.

The line trace flags are set by executing trc with parameters. The line stop flags are set by executing stp with parameters. The line trace and stop flags are cleared by executing nor with parameters.

The trace and stop flags are recorded on the tape cartridge by including the optional debug ("DB") parameter in the record file (rcf) statement as explained more fully hereinafter.

COMMANDS

Commands differ from statements in that they can only be executed from the keyboard. Commands cannot be stored as part of a program.

THE RUN COMMAND

Syntax:

run [line number or label]

The run command clears all variables, flags, and return pointers to go subs, then starts program execution. If a line number is specified, the program begins execution at the specified line number. If a label is specified, execution begins at the specified label in the program.

THE CONTINUE COMMAND

Syntax:

cont [line number or label]

The continue (cont) command continues the program without altering variables, flags, or go sub return pointers. If no line number is specified, the program continues from the current position of the program line counter. If a line number is specified, the program continues at that line. If an edit or error has taken place since a previous "run" or "continue", continue without parameters causes execution at line 0.

THE DELETE LINE COMMAND

Sytax:

del line number 1 [ , line number 2][,*]

The delete (del) command is used to delete lines or sections of programs. When one line number is specified, only that line is deleted. When two line numbers are specified, all lines in the block are deleted. del 0, 9999 is executed to delete an entire program, and leave the variables.

Examples:

| | |
|---|---|
| del 28 | Delete line 28. |
| del 13, 20 | Delete lines 13 through 20. |
| del 18, 9999 | Delete program from line 18 to the end (this does not affect variables). |

If the optional asterisk (*) parameter is specified, any go to or go sub statements which reference delected lines are adjusted to reference the first line after the delected section.

THE ERASE COMMAND

Syntax:

erase [a or v or k or special function key]

The erase command is used to erase programs, variables, and special function keys as shown below.

| Command | Meaning |
|---|---|
| erase | Erases program and variables when executed. |
| erase a | Erases all when executed. |
| erase v | Erases all variables when executed. |
| erase k | Erases all special function keys when executed. |
| erase fn | Erases the special function key indicated by fn. |

THE FETCH COMMAND

Syntax:

fetch [line number or special function key]

The fetch command brings individual program lines into the display. This is useful for editing lines or for viewing individual program lines. Fetching a special function key displays the definition of the key or "f" followed by the key number if the key is undefined. Executing fetch alone, fetches line 0.

LIVE KEYBOARD

The calculator's live keyboard mode provides additional power for executing single or multi-statement lines while a program is running. Among other things, a user can perform math operations, monitor program activity, and alter program flow in live keyboard mode. Two statements described hereinafter permit the live keyboard mode to be turned on or off. While a program is running, a live keyboard operation is executed by keying the live keyboard operation into the display and pressing the execute key. At the end of the current program line, the live keyboard line is executed, the live keyboard operation being executed entirely before the program continues.

If the running program uses the display, keys which are pressed in live keyboard mode will disappear from the display but the line which is typed in is saved and is viewed by pressing RECALL.

If the running program continually uses the display, keys which are typed in will keep disappearing, even if RECALL is pressed. A user presses either ↑ or ↓ to view the line for about one second. When either of these keys is held down, the display remains and the running program halts until the key is released. For example, assume the following program is running in the calculator:

0: dps "Live Keyboard"; wait 100
1: gto 0

When the following line is entered from live keyboard, it will not be visible:

prt ($\sqrt{25}$→A)

By pressing ↑ or ↓ the line will be displayed for about one second.

When the execute key is pressed, the line will be executed and 5 will be stored in A and printed.

Results of calculations performed in live keyboard disappear from the display if a running program uses the display. A special function key can be defined to preserve the displayed result long enough to be viewed as in this example:

press: FETCH $f_0$
type-in: *; wait 1000
press: STORE

If a user, for example, types in a calculation such as 5*6, and presses $f_0$ instead of the execute key, the result of the calculation remains in the display for about one second.

LIVE KEYBOARD MATH

Any math operations can be executed from live keyboard. Thus, when a program is running and a few figures need to be calculated, a user merely keys in the operation and presses execute.

STATEMENTS IN LIVE KEYBOARD

If a user desires a listing of the current program, he presses the LIST key then presses execute.

To check a variable in the program, a user keys in the variable name, such as A or B[4] and presses execute. The value of the variable will be displayed.

To change a variable from live keyboard, one enters the new value and assigns it to the variable to be changed. For example, to reset a counter such as C + 1 → C to 0, a user keys in 0 → C and presses execute.

SUBROUTINES FROM LIVE KEYBOARD

Parts of a program can be executed from live keyboard as subroutines using the gsb statement. For example, the following section of a running program is used to calculate the factorial of a number, N.

```
11: "factorial":
12: if frc(N)>0
  or N>0;prt N,
  "no factorial";
  ret
13: if N=0;prt
  N,"factorial=",
  1;ret
14: 1→C→F
15: if C=N+1;
  prt N,"factoria
  1=",F;ret
16: C*F→F;C+1→C;
  gto 15
```

By assigning a value to N (such as 4 → N), and then executing gsb "factorial" from live keyboard, the values of N and N factorial are printed, and the program continues.

Control is returned to the display in live keyboard mode whenever return (ret), stop (stp), including stop flags, or end is executed after the gsb statement, but the main program continues running. A second stop will stop the main program.

SPECIAL FUNCTION KEYS IN LIVE KEYBOARD

Although the special function keys $f_0$ through $f_{23}$ cannot be defined from live keyboard, they can be used from live keyboard. In the following example, the special function keys are used to alter the flow of a running program.

Assume, for example, the special function keys are defined as follows:

| f0 : | f1 : | f2 : |
|---|---|---|
| * → F | *2 → F | *3 → F |

Assume further that the program is:

```
0: "wait":dsp
  "waiting";wait
  500;jmp F
1: gto "first"
2: gto "second"
3: gto "third"
4: "first":prt
  "first";0→F;
  gto "wait"
5: "second":prt
  "second";0→F;
  gto "wait"
6: "third":prt
"third";o→F;
  gto "wait"
```

When the program is run, "waiting" is displayed until one of the immediate execute special function keys is pressed and the program then branches to the line where either "first", "second", or "third" is printed. Although this is a simple example, it shows how program flow is altered in live keyboard mode.

ERRORS IN LIVE KEYBOARD

Commands are not allowed in live keyboard mode. Commands executed in live keyboard cause error 3 to be displayed. Also, the following keys cause an audible beep when pressed and are ignored in live keyboard mode:

| STEP | LINE DELETE | INSERT | RUN | STORE | CONTINUE |
|---|---|---|---|---|---|

The go to and end statements cause error 9 to be displayed in live keyboard mode. The following cartridge statements, described more fully hereinafter, are not allowed in live keyboard mode: load program (1dp), load key (1dk), and load file (1df) of a program file.

THE LIVE KEYBOARD ENABLE STATEMENT

Syntax:
lke

Live keyboard enable (lke) turns on the live keyboard. The calculator is in live keyboard mode when it is turned on and when RESET is pressed. To disable live keyboard, the live keyboard disable (lkd) statement is used.

Example:

lke Enable live keyboard.

THE LIVE KEYBOARD DISABLE STATEMENT

Syntax:

lkd

The live keyboard disable (lkd) turns off the live keyboard. This is useful when a program is running which the user doesn't want disturbed. A user can execute a live keyboard enable (lke) statement from a program to enable live keyboard when this statement is executed.

Referring to FIGS. 176A–B, the keys typed by the user during live keyboard are entered into the KBD buffer under interrupt control. The normal I/O buffer editing routines are utilized by setting editing pointers to edit the KBD buffer during the processing of the live keyboard key. The use of the KBD during live keyboard allows the running program to use the I/O buffer for normal programmed I/O without interfering with the live keyboard line that is being edited.

Referring to FIGS. 168A–B, any error that occurs during the processing of a live keyboard key is trapped using the error by-pass link, so that the normal operation of the running program is not affected.

Referring to FIGS. 169A–B, a bit is set in the interpreter communication word (XCOMM) if the live keyboard key was the execute key, or a special key with an immediate execute character. At the end of each program line, the interpreter checks XCOMM and returns if any bit is set. AXCMM is then called to process the bits in XCOMM. If the live keyboard bit is set (bit 14), the live keyboard execution routines are called. These routines save the necessary pointers to enable the resumption of the current user program, and call the interpreter to execute the line in the KBD buffer. After the line is executed, the pointers are restored and the execution of the running program is resumed.

Errors encountered during the execution of a live keyboard line are detected by the error routines. Live keyboard execution clean-up is performed when an error occurs so that the user program is not affected by live keyboard errors.

GSB IN LIVE KEYBOARD MODE

The user can execute a line that contains a subroutine call from the keyboard while a program is running. The processing of this line is the same as the normal live keyboard execution except that the interpreter changes the state of the system during the execution of the subroutine. The state of the system is indicated by the word CSTAT. The values that CSTAT can have are as follows:

0. idle or key entry
1. execution of a keyboard line
2. running a program
3. live keyboard execution
4. enter statement-waiting or key entry
5. execution of a line during an enter statement
6. execution of a subroutine from live keyboard.

The state is changed from 2 to 3 by the live keyboard processing routines and from 3 to 6 by the interpreter when it encounters a subroutine call.

Referring to FIG. 169B, the live keyboard execution routines utilize an interpreter (AINTK)-XCOMM service routine (AXCMM) loop similar to that of the normal execution loop. Thus, the execution of a live keyboard subroutine is essentially the same as the execution of a user program, except that the state is 6 rather than 2. This state value of 6 is used by the error routines to trap the live keyboard errors and by the keyboard interrupt service routine to disable live keyboard.

TAPE CARTRIDGE OPERATIONS

Figure 170A:
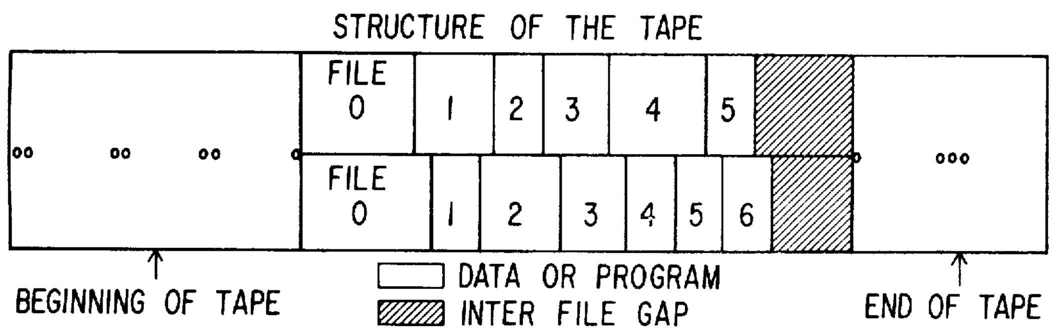

Referring to FIGS. 170A–D, the information structure of a tape is shown. FIG. 170A shows the format for an individual file on the tape. All files that are recorded are made up of partitions of length greater than or equal to 256 bytes to allow a user recovery of at least part of his file if a read error occurs on attempting to read the file.

The following file types have partitions of length 256 bytes exactly: (1) key files, (2) memory files, (3) binary program files, (4) and data files, including numeric data or string data.

User program files are unique in that the partition length is such that a partition is always made up of some integral number of complete program lines. This feature allows the user to recover complete program lines from those partitions that are correctly read if a read error occurs.

Figure 170B:
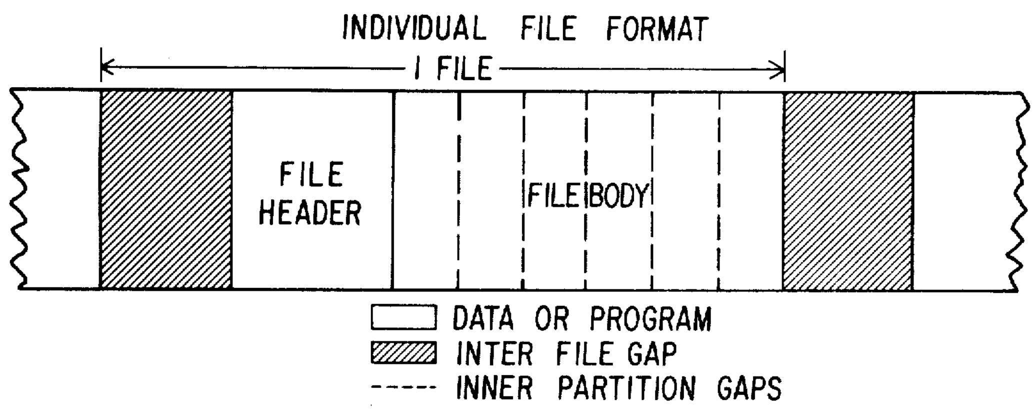

While a file is being recorded, a routine illustrated by the flow charts shown in FIGS. 171A–B is called as the cassette hardware writes the inner partition gaps illustrated in FIG. 170B. The length of the next partition is calculated in bytes and the last partition is determined. This routine execution is simply a matter of returning 256 in all cases except program (user) files. If the file is user programmed, the partition length is calculated by adding line lengths until the count is ≧ 256 bytes.

Referring to the flow chart shown in FIGS. 172A–B, in loading there are two special cases. One is numeric data in which the first single floating point number in a partition is filled with code that will list or display ?.??????????e00, if the calculator is in flt 11, for example, thereby indicating that this partition of data is questionable if an error occurs in the partition.

The other special case is user programming. An entire partition of lines is replaced in memory by a single line of stars, "*******", if an error is detected while loading that particular partition. Thus a user can determine from the lines surrounding this line of stars which lines need to be replaced.

At the end of an erroneous load a routine is invoked which determines where the end of the program is, since the current size information in the file header is useless in an error situation. This routine then goes on to patch up line bridges, illustrated in FIG. 173, that are also in error since several lines have been replaced by a single line of stars and the program itself has shrunk.

The following program is run to initialize a new tape cartridge:

```
0: trk 0;rew;
   mrk 1,1;ert 0
1: trk 1;rew;
   mrk 1,1;ert 0
2: end
```

This program marks one null file on track 0 and track 1 as file 0. Then, each track is erased except for the single null file on each track. This insures that no residue noise from the manufacturing process remains on the tape.

POSITIONING THE TAPE

The tape position is unknown whenever a tape cartridge is inserted into the tape drive, the track changed, RESET pressed, or erase a executed. Any tape cartridge statement except identify file (idf) (without parameters) and mark (mrk) will position the tape for the system. Once the tape is positioned, both mrk and idf can be used. The lowest file number on each track is file zero.

THE REWIND STATEMENT

Syntax:
rew

The rewind (rew) statement is used to rewind the tape cartridge to its beginning. This statement has the same function as the rewind key.

Rewinding the tape is a parallel process and other operations can take place while the tape rewinds.

THE TRACK STATEMENT

Syntax:
trk track number

The track (trk) statement sets track 0 or track 1 of the tape cartridge. When the track statement is executed, any following cassette operations are performed on that track. Track 0 is automatically set whenever the machine is switched on, RESET is pressed, or erase a is executed. The track does not change when the cartridge is removed. The track number can be an expression with a value of 0 or 1.

Unless a subsequent track statement specifies track 1, cassette operations will be performed on track 0.

THE ERASE TAPE STATEMENT

Syntax:
ert file number

The erase tape (ert) statement is used to erase everything on the current track starting from the file number specified following a mark statement, described hereinafter. After the erase operation, the tape is positioned at the file specified and one null file is marked. The null file is used as a starting point when marking more files.

The file number can be an expression.

Figure 170C:
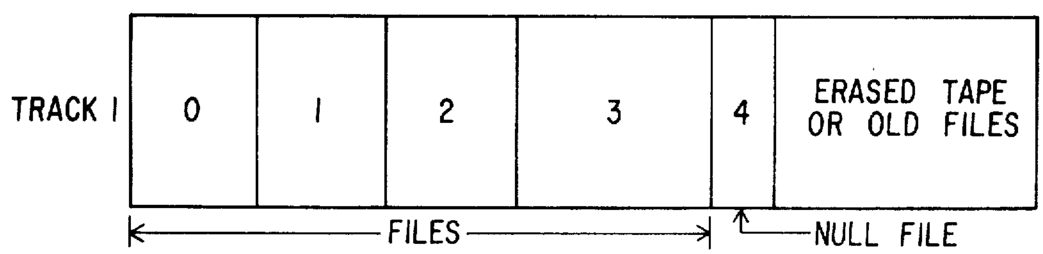

Example:

Assume a cassette has the structure shown in FIG. 170C on track 1:

To erase everything on track 1 beginning at file 3 to the end, the following program is used:

0: trk 1
1: ert 3
2: end

Figure 170D:
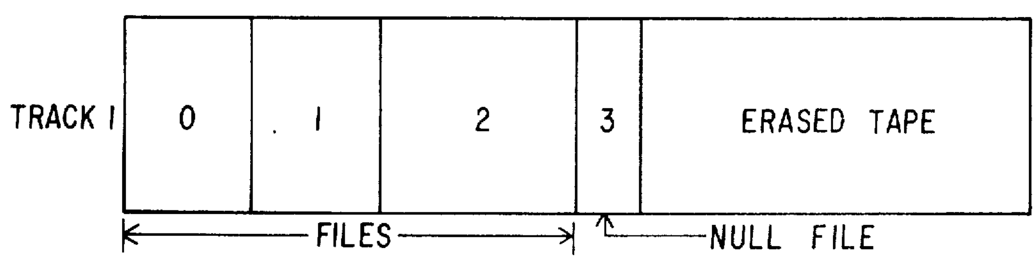

After running this program, the tape's structure is as shown in FIG. 170D.

Track 0 is not altered.

THE IDENTIFY FILE STATEMENT

Syntax:
idf [ file number [ , file type [ , current file size [ , absolute file size [ , track number ]]]]]

The identify file (idf) statement is used to identify the parameters of the next file in the forward direction. All five of the parameters are return variables whereby a value is returned to the variable specified when the statement is executed. All of the parameters are optional. If one variable is specified, such as: idf A, then only the file number is returned. Two variables must be specified to get the file type; three variables to get the current file size in bytes; four variables to get the absolute file size in bytes; and five variables to get the track number.

The file type can be one of the following:

| | |
|---|---|
| 0 | null file |
| 1 | binary program |
| 2 | numeric data |
| 3 | string or string and numerics (String ROM required) |
| 4 | memory file (from rcm statement) |
| 5 | key file |
| 6 | program file |

The return parameters can be any variable type (simple, array, or r-variable). If the tape position is unknown, at least one return variable must be specified or error 45 will occur. At the end of the identify file statement, the tape is positioned before the file's header.

Example:

| | |
|---|---|
| idf A,B,C,D,E | Identify the current file and return the file number, file type, current file size, absolute file size, and track number to A,B,C,D, and E, respectively. |

THE FIND FILE STATEMENT

Syntax:
fdf [ file number ]

The find file (fdf) statement is used to find the specified file on the current track of the tape cartridge. The tape is positioned at the beginning of the file specified. The file number can be an expression. The find file statement without parameters finds file 0. If a file number which does not exist is specified, the next cartridge statement executed [except find file (fdf) or rewind (rew)] results in error 65.

Other statements can be executed while the find file statement is executing.

Examples:

| | |
|---|---|
| fdf 8 | Find file 8. |
| fdf A[3] | Find the file specified by the value of A[3]. |

THE SET SELECT CODE STATEMENT

Syntax:
ssc select code

The set select code (ssc) statement is used to specify the select code of an external tape drive. Select code 1 specifies the select code of the internal tape drive, which is automatically set when the power is switched on, erase *a* is executed or RESET is pressed.

THE TAPE LIST STATEMENT

Syntax:
tlist

The tape list (tlist) statement is used to identify the files on the tape cartridge. The tape's current position and track, file number, file type, current file size in bytes, and absolute file size are automatically printed. The file type can be one of the following.

| | |
|---|---|
| 0 | null file |
| 1 | binary program |
| 2 | numeric data |
| 3 | string or mixed string and numeric data |

-continued

| | |
|---|---|
| | (the String ROM must be present or loading this file will display error 50.) |
| 4 | memory file (from rcm statement) |
| 5 | key file |
| 6 | program file |

If the stop key is pressed while a tlist is being executed, the tlist terminates. Otherwise it will halt when the null file is reached.

A convenient way to determine the current track setting is to execute "tlist" then press the STOP key,.

THE MARK STATEMENT

Syntax:

mark number of files, file size in bytes [ , return variable]

The mark (mrk) statement reserves file space on the tape cartridge. One file more than the number of files specified is marked. This file is the null file and is used as the starting point when marking more files. The null file has an absolute size of zero. Although it is not required, it is a good idea to execute the erase tape (ert) statement following the mark statement to clear the current track beginning at the null file. This should be done to avoid problems with accidental access of invalid files on the tape cartridge. The file size is specified in bytes. If an odd number of bytes is specified, one more byte is automatically marked. For example, if 111 bytes are specified, 112 bytes are marked.

In order to mark files, the position of the tape must be known. If the position is unknown, execute a find file (fdf) statement to position the tape where you are going to start marking.

The number of files and the file size can both be expressions. If a return variable is specified, the file number of the last usable file marked is stored in it. If the value of the return variable is positive, all the files specified are marked. If the value is negative, an end-of-tape (eot) condition occurred before all the requested files were marked.

Example:

A tape is to be re-marked for 3 files with a length of 320 bytes each on track 0. The following short program performs this operation.

| | |
|---|---|
| 0: rew | Rewind the cassette. |
| 1: trk 0 | Set to track 0. |
| 2: mrk 3,320,X | Mark 3 files, 320 bytes long. |
| 3: ert X+1 | Erase the rest of track 0. |
| 4: end | End the program. |

DETERMINING SIZE TO MARK A FILE

When marking a file for a program which is currently in the calculator, a user executes a "list 9999." The number in the left hand portion of the display is exactly the number of bytes needed to record the program. It is advisable to mark the file larger so that any future program changes that may increase the program size can still be accommodated on the file.

Data files require 8 bytes for each data element to be recorded. For example, to record data which is stored in the variables A and B, mark a file 16 bytes long.

Special function key files require 1 byte for each character under the keys, plus 2 bytes for each defined key. If the number of bytes for each key is odd, a user adds one byte. The sum is the minimum size to mark the file.

For a memory file (using rcm) a user marks the file for the size of available calculator memory.

THE RECORD FILE STATEMENT

The record file (rcf) statement is used to store both data and programs. The syntax for each is explained below.

RECORDING PROGRAMS

Syntax:

rcf [ file number [, beginning line number [ , ending line number ]]] [ , "SE" or "DB" ]

To record a program or a section of a program the record file (rcf) statement is used. The file is assumed to be file zero if no file number is specified. The entire program is recorded on the specified file if no line numbers are specified. The program from a line number to the end is recorded if the beginning line number is specified. A program section is recorded from the first line number to the second line number, inclusive, if both line numbers are specified.

The file number and ending line number parameters can both be expressions, but the beginning line number must be a number. If "SE" (for secure) follows at the end of a statement, the program is secured when stored on tape. When the secured program is loaded back into the calculator, the program cannot be listed or displayed, but can be re-recorded on a tape cartridge.

When "DB" (for debug) follows at the end of a statement, any trace or stop flags are stored with the program.

The tape file must be marked before recording a program. The file size must be greater than or equal to the size of the program being recorded.

Example:

7: rcf 8,3 Record the program on file 8, starting at line 3 through the end.

RECORDING DATA

Syntax:

rcf file number, data list

The record file (rcf) statement is used to record data. The list can consist of simple variables, array variables, or r-variables. But, r-variables cannot be mixed with simple and array variables in the same statement. The file number can be an expression.

To record an entire array, the array name is followed by an asterisk in brackets. For example:

S[*] Refers to the entire S array.

Simple and array variables must be contiguous in the calculator memory. That means that they must appear in the data list in the same order as allocated. If the variables appear in a dimension (dim) statement, they must appear in the same order in the rcf statement.

Example:

| | |
|---|---|
| 0: dim A[10,10] | The array A is allocated 100 variables (800 bytes). |
| 1: 0→X | The variable X is allocated 1 variable (8 bytes). |
| 2: X+1→X | Doesn't affect memory allocated to X. |
| 3: 1→I | The variable I is allocated 1 variable (8 bytes). |
| 4: rcf 5,A[*],X, | The array A, and variables X and I are recorded in the same order as allocated (contiguously) on file 5 (total of 102 numbers or 816 bytes). |

If r-variable is specified in the data list, all r-variables from $r_0$ to that r-variable are recorded. If two r-variables are specified, all r-variables from the first through the second are recorded.

Considerations for Recording Data

The variables listed must be listed in the same order as they are allocated in memory when recording data on a tape cartridge.

Example:

```
0: ent A
1: 2*A→B
2: dim C,X,Y,Z,
   .
   .
15: rfc A,B,C,X,
    Y,Z
```

In the above example program, the variables A and B are allocated outside a dimension statement. Variables C,X,Y, and Z are allocated in a dimension statement. Line 15 would cause error 56 to be displayed if B were allocated before A in the program since the variables must be listed in the same order as they are allocated. It is sometimes difficult to know the order in which variables are allocated because lines are not necessarily executed in numerical order. It is strongly recommended that when variables are to be recorded on a single file they be allocated in a dimension statement.

THE LOAD PROGRAM STATEMENT

Syntax:

ldp [file number [ , line number$_1$ [ , line number$_2$]]]

The load program (ldp) statement is used to load a program from a specified file on the current track and run it automatically. The automatic run implies that all variables are erased, all go sub return pointers are cleared, and all flags are cleared.

When a file number only is given, the program is loaded from that file, beginning at line zero, and the program automatically runs from line zero. When the file number and the first line number are specified, the program is loaded from that file, beginning at the specified line number and runs from that line number. When all three parameters are specified, the program is loaded from the specified file number beginning at the first specified line number and begins running at the second specified line number. If no parameters are specified, zeros are assumed for all three. All three parameters can be expressions.

This statement is not allowed in live keyboard mode or during an enter statement.

Examples:

| | |
|---|---|
| ldp 2 EXECUTE | Load the program from file 2 beginning at line 0 and run from line 0. |
| ldp 8,2 EXECUTE | Load the program from file 8 beginning at line 2 and run from line 2. |
| ldp 16,3,0 EXECUTE | Load the program from file 16 beginning at line 3 and run from line 0. |

THE LOAD FILE STATEMENT

The load file (ldf) statement is used to load both data and program files into the calculator memory.

LOADING PROGRAMS

Syntax:

ldf [file number [ , line number$_1$ [ , line number$_2$]]]

The load file (ldf) statement loads programs from a specified file on the current track into the calculator memory.

This statement is executed from the keyboard as follows. The program on file zero is loaded, beginning at line 0 if no parameters are given.

The file identified by a file number is loaded beginning at line 0 when the file number is given. If the file number and a line number are specified, then that file is loaded beginning at the specified line number. When all three parameters are given, the specified file is loaded beginning at the first line number, and the program automatically continues at the second line number with all variables being preserved.

This statement is executed in a program as follows: When no parameters are specified, the program on file zero is loaded beginning at line zero and the program automatically continues at line zero. When the file number is specified, then the program is loaded from the specified file beginning at line zero and continues at line zero. When the file number and a line number are given, the specified file is loaded beginning at the specified line number and the program continues from that line number. When all three parameters are given, the statement is executed the same as from the keyboard. That is, a "continue" is performed from the second line number. All three parameters can be expressions.

This statement is not allowed in live keyboard to load a program file or during an enter statement.

LOADING DATA

Syntax:

ldf [ file number [ , data list ]]

The load file (ldf) statement loads data from the specified file on the current track. The data list contains the names of variables separated by commas. Simple and array variables cannot be in the same ldf statement as r-variables.

If no list is specified, data begins filling the r-variables from $r_0$ until all the data has been loaded. If one r-variable is specified, the data beings filling r-variables from that r-variable until all the data has been loaded into higher r-variables. If two r-variables are specified, the data starts filling from the first location specified (lower r-variable) to the second, higher, r-variable. If there is more data than available or specified r-variables, no data is loaded.

When simple or array variables are specified, data begins filling the first variable until all variables have assigned values. If there is more data than variables, no data is loaded. If there is less data than variables, the data is loaded until all data is used. Variables must be contiguous.

Examples:

| | |
|---|---|
| ldf 4,r0,r10 | Load data file 4 starting from $r_0$ to $r_{10}$. |
| ldf r12,a,b[*] | Load the data file designated by $r_{12}$ into the variable A and array B. |

While that part of memory to be recorded or loaded is uniquely specified by the rcf or ldp statements, the ldf statement will cause loading into program area or variable area depending on the file accessed, not on the ldf statement itself.

Array and r-variable Storage r-variables are recorded in the opposite order of array variables. Thus, if r-variables are recorded, then loaded back into an array, they will be in the opposite order.

THE RECORD KEYS STATEMENT

Syntax:
rck [file number]

The record keys (rck) statement is used to record all the special function keys on the specified file on the current track. If the file number is omitted, file zero is assumed. The file number can be an expression. The specified file must be marked before the record keys statement is executed.

Examples:

| | |
|---|---|
| rck 2 | Record the special function keys on file 2. |
| rdk A[12] | Record the special function keys on the file designated by the 12th element of array A. |

THE LOAD KEYS STATEMENT

Syntax:
ldk [ file number ]

The load keys (ldk) statement is used to load the special function keys exactly as they were recorded from the specified file on the current track. If the file number is omitted, file zero is assumed. The file number can be an expression. Executing the load keys statement from the keyboard causes go sub return pointers to be reset and causes the program counter to reset to line zero. This statement is not allowed in live keyboard or during an enter statement.

Example:
ldk 4 Load the special function keys from file 4.

THE LOAD MEMORY STATEMENT

Syntax:
ldm [file number]

The load memory (ldm) statement is used to load a previously recorded memory file. When the load operation is complete, the calculator is in the same state it was in when memory was recorded.

If a program was running when the record memory (rcm) statement was executed, that program will continue with the next statement after the record memory (rcm) statement when the load memory statement is executed.

The record memory and load memory statements are especially useful when executed from live-keyboard or from a special function key to "freeze" the state of the system without interrupting the running program.

The file number can be an expression.

Referring to FIG. 174, a flow chart of the ldm subroutine is shown.

THE RECORD MEMORY STATEMENT

Syntax:
rcm [file number ]

The record memory (rcm) statement records the entire read-write memory in its current state on the specified file on the current track of the tape cartridge.

If the file number is omitted, file 0 is assumed. The file number can be an expression.

Referring to FIG. 175, a flow chart of the rcm subroutine is shown. The record memory statement records all user read/write memory space, variable area, and enough system and optional memory to insure that the calculator system can be brought back to the state it was at rcm upon the execution of the corresponding ldm statement. Also recorded is a special "ROM present" indicator to allow the ldm statement to guarantee that the option ROMs are the same. Likewise, the ldm statement loads the enter read/write memory space and places the calculator system in the same stte it was at rcm.

The statements rcm and ldm are executable in all calculator states, i.e. during program execution, idle (keyboard entry), live keyboard, and when a program stops for an ent statement.

This feature is particularly useful to provide a backup of the system periodically during a long program execution for example, or in case of power failure or the like. It is also convenient if done during live keyboard to "freeze" the system state at a particular point during execution.

At the termination of the execution of ldm the calculator is in the same execution state as it was at the end of the corresponding rcm statement that created the tape file.

On ldm a check is made by the calculator of all option ROMs present on the system to be sure they are the same as the option ROMs on the system when the rcm statement was executed. If this test fails, the user is told via one of two displayed error messages. One of these says that the ROM whose load number is displayed is present now but was not at rcm time. The other message says that the ROM whose load number is displayed was present at rcm time but is not present now. This is accomplished by requiring each ROM to set a bit in a rom-word (ROMWD) when they are initialzed. This rom-word is recorded in a special word in the record head of the memory file at rcm time. At ldm time the rom-word in the recore head is compared, bit by bit, against the corresponding rom-word in memory to determine the presence or absence of ROMs. If a difference is encountered, the operation is aborted. This guarantees that the calculator will work properly after ldm,

THE LOAD BINARY PROGRAM STATEMENT

Syntax:
ldb [<file number>]

The load binary program (ldb) statement loads binary programs, a binary program being a machine language program which cannot be listed or displayed, into the calculator's read/write memory from the specified file on the current track of the tape cartridge. Binary programs can be loaded over other binary programs of equal or greater length at any time.

If no file number is specified, file 0 is assumed. The file number can be an expression.

Example:
ldb 2 Load the binary program from file 2.

Certain rules must be followed when loading binary programs since binary programs occupy a special place in memory.

Any binary program can be loaded at any time from the keyboard or a running program if no simple or array variables are allocated provided there is room in memory for it.

Once simple or array variables are allocated, a binary program cannot be loaded unless space has been allocated for it by a previous binary program load.

It is suggested that before any simple or array variables are refereced, the largest binary program file that the program will need be loaded so that variables can be allocated and binary programs loaded without concern about room for the binary program.

FILE VERIFICATION

File verification is used to compare a tape file against the calculator memory to detect recording errors without losing the information in memory.

File verification requires a stronger tape signal than load thereby increasing confidence that a file will load properly at a later time.

The calculator returns to automatic file verification when the calculator is turned on, erase a executed, or RESET pressed. The auto verify disable (avd) statement turns file verification off and the auto verify enable (ave) statement turns automatic file verification on. The verify (vfy) statement allows one to verify files repeatedly under program control.

When the calculator is in auto-verify mode, all record statements are followed by an automatic verify operation.

THE VERIFY STATEMENT

Syntax:
vfy [return variable]

The verify (vfy) statement is used to compare tape files with the calculator memory. The value of the return variable is 0 after the operation if the calculator memory is identical to the tape file. The return variable is one if the two are different. Error 44 occurs if the memory and tape file are not identical and no return variable is specified.

The return variable can be either a simple, array, or r-variable.

The verify statement provides added user confidence in a recording, even though a record operation is usually followed by an automatic verification.

This statement is also useful when a badly worn tape is being used. In this case, a user preferably turns off auto-verify and uses the verify statement. If the verify fails, the user performs the record operation again.

TAPE CARTRIDGE ERRORS

When an error 46 is displayed, a user should first clean the tape head and drive wheel and execute the statement which caused the error again a few times. If an error still occurs, the next step depends on the type of file being loaded.

If an error 46 is displayed while loading a program file, one or more program lines may be lost. The place where this error occurred is indicated by a line of asterisks (*) inserted in the program at the place where the program lines are missing. These lines can be replaced by referring to a previous listing. Go to and go sub statement addresses are adjusted during this editing. Thus, it may be necessary to readjust the to to and go sub addresses after inserting the lost lines.

If an error 46 is displayed while loading numeric data, the partitions in question are marked by a single number in that partition being replaced by "?.???" (in float 11 format). A partition in a numeric data file always contains 32 numbers. With one entry replaced by "?.???", there are 31 numbers remaining which may be incorrect. For r-variables, the 31 higher numbered r-variables may be incorrect. For simple and array variables, a user should determine the order in which the variables in question were allocated. From the element that is replaced by "?.???", a user preferably searches from right to left in the dimension statement to locate the error. For an array, the first element in the lost partition will have the largest subscripts. Decreasing the leftmost subscript first for an array reveals the missing values.

File Header Read Error

If a file head read error (error 47) occurs, a user should preferably procede as follows:

1. Clean the tape head and drive wheel.
2. Execute the statement that caused the error again.
3. If, after steps 1 and 2, the error still occurs, a user should remark the tape-file header. Remarking a file header, however, is a "last resort" operation. All data and programs on a file with a re-marked header is lost and that file can no longer be used.

To remark the head of file N (file which cannot be loaded) a user executes:

| | |
|---|---|
| fdf N-1 | Positions the tape. |
| mrk 0,0 | Re-marks file header. |

for file 0, execute:

| | |
|---|---|
| rew | Positions the tape. |
| mrk 0,0 | Re-marks file header. |

After the file header has been re-marked the absolute size of the file is 2 bytes.

Error Messages

When an error occurs, the calculator makes a soft beep and the word "error" followed by a number appears in the display. The number references an error message that will help pinpoint the cause of the error.

If an error message is displayed during an attempt to run a program, the program line number where the error occurs is referenced.

A complete list of the error messages is given in the Table below.

ERRORS

An error in a program resets the program counter to line 0. Pressing CONTINUE will continue the program from line 0.

00 System error.

01 Unexpected peripheral interrupt. Only occurs when a peripheral is being used. Press reset key to recover.

02 Unterminated text. The line of text must have an ending quote. This error results in a cursor being displayed showing the location of the error.

03 Mnemonic is unknown. This error is usually caused by typing errors, such as go to instead of gto; or by executing a command in live-keyboard mode or in an enter statement. This error results in a cursor being displayed showing the location of the error.

04 System is secured. This error is generally caused by trying to list or fetch lines in a secured program.

05 Operation not allowed — line cannot be stored or executed with line number. This can be caused by pressing execute, store, or line insert with a fetched line in the display.

06 Syntax error in number. A cursor showing the location of the error is displayed.

07 Syntax error in input line. For example: gto prt 5. A cursor showing the location of the error is displayed.

[ Internal representation of the line is too long (gives cursor sometimes).

09 The go to (gto), go sub (gsb) or end statement is not allowed in the present context. For example, executing an end statement during an ent statement.

10 The go to or go sub statement requires an integer. For example:

gto 23.4 is not allowed

A cursor showing the location of the error is displayed.

11 Integer out of range or integer required. Must be between −32768 or +32767. For example:

| | |
|---|---|
| spc 50000 | integer out of range |
| del A | integer required. |

12 The line cannot be stored. It can only be executed. For example:

| | | |
|---|---|---|
| 2 + 2 | EXECUTE | is OK, but |
| 2 + 2 | STORE | is not allowed |

A cursor showing the location of the error is displayed.

13 Enter (ent) statement is not allowed in present context. For example, ent X is not allowed from the keyboard; only from a program.

14 Program structure destroyed. This can be caused by pressing the reset key while a program is being modified or shifted. It is advisable to record data ten execute erase a to recover.

15 Printer out of paper or printer failure.

16 The String ROM is not present for a string comparison or an argument in a relational comparison is not allowed. For example, if the String ROM is not in the calculator:

if "B" < "A"

results in error 16.

17 Parameter is out of range. For example:

wait −5 fxd 15

18 Parameter is not allowed. For example:

erase Z

19 Bad line number. For example:

del 10,5

20 A ROM is missing. As a result, the line cannot be reconstructed. This error usually occurs when FETCH ↑, ↓ or list is executed.

21 Line is too long to store. This can occur when blanks or parenthesis are automatically added. For example, parenthesis are automatically added when storing the line: tan 2 → A, which will appear in a listing as: tan (2) → A.

22 Dimension specification is not allowed. For example, this error occurs when the lower bound of an array is greater than the upper bound. If the String ROM is not in the calculator and a string is dimensioned, this error results.

23 The simple variable has already been allocted. For example:

2 → X. dim A[5], X

24 The array has already been dimensioned. For example:

dim A[4], B[5], A[6]

25 Dimensions of array disagree with subscripts. For example:

dim X[2,7]; 1 → X[5]

26 Subscripts of array are out of bounds. For example:

dim A[12]; 2 → A[58]

27 Undefined array. The array must first appear in a dimension (dim) statement.

28 The return (ret) statement has no matching gsb statement.

29 The line cannot be executed because a ROM is missing. For example; the plt statement is attempted with no Plotter ROM present in the calculator.

30 Special function key has not been defined.

31 Nonexistent program line. For example, gto 900 in a 5 line program.

32 The data type is not allowed. A number is required.

33 Data types don't match in an assignment statement.

34 Display overflow due to pressing a special function key.

Only 80 characters can be entered into the display.

35 Flag reference not allowed. There is no such flag. For example:

sfg 18

36 Attempt to delete the destination of a gto or gsb statement. Operation not performed.

37 Display buffer overflow caused by display (dsp) statement.

38 Insufficient memory for go sub (gsb) statement.

39 Insufficient memory for variable allocation or binary program. No allocation takes place.

40 Insufficient memory for operation as in, for example, storing a line with insufficient memory.

41 No cartridge is in the tape transport.

42 Tape cartridge is write protected. A user should slide record tab to other position for recording.

43 Unexpected Beginning-Of-Tape (BOT) marker, or End-Of-Tape (EOT) marker encountered; or a tape transport failure.

44 File verification has failed.

45 Attempted execution of idf statement without parameters when tape position is unkown, or mrk statement when tape position is unknown.

46 Read error of file body. The partition containing the error is lost.

47 Read error of file head.

48 The End-Of-Tape (EOT) was encountered before the specified number of files were marked.

49 File is too small.

50 The 1df statement for a program file must be the last statement in the line.

51 A ROM is present but was not when the record memory (rcm) statement was executed. A user should remove the ROM indicated by one of the numbers below and re-execute the load memory (1dm) statement.

| Number | ROM |
|---|---|
| 1 | Binary Program |
| 6 | String |
| 8 | Extended I/O |
| 9 | Advanced Programming |
| 10 | Matrix |
| 11 | Plotter |
| 12 | General I/O |

52 The ROM indicated by a number from the previous table was present when the record memory (rcm) statement was executed, but is now missing. A user should insert the indicated ROM and re-execute the load memory (1dm) statement.

53 File number or mrk parameter is negative. For example:

mrk −12,300

54 Binary program to be loaded is larger than the allocated memory for the present binary program and variables.

55 Illegal or missing parameter in one of the cartridge statements.

56 Data list is not contiguous in memory for one of the cartridge statements.

57 Improper file type. For instance, this can occur when trying to load a program from a data file or key file.

58 Invalid parameter on rcf statement; "SE" or "DB" expected.

59 Attempt to record a program, data, or special function keys which do not exist.

60 Attempt to load an empty file or the null file (type=0).

61 Parameter out of range in the track (trk) or set select code (ssc) statements. Track 0 or 1, and select codes 1 through 15 are allowed.

62 Specified memory space is smaller than cartridge file size.

63 Cartridge load operation would overlay gsb return address in program; load not executed.

64 Attempt to execute 1dk, 1df (program file), or 1dp during live keyboard or enter statement.

65 File not found. File specified in the previous find file (fdf) statement does not exist.

66 Division by zero. Default = + or −9.99999999999e511. A mod B with B equal to zero. Default = 0.

67 Square root of a negative number.

Default = √(abs(argument)).

68 Tan (n*π/2 radians);
Tan (n*90°);
Tan (n*100 grads);
where *n* is an odd integer.

Default= +9.99999999999e511, for n>0.

Default= −9.99999999999e511, for n<0.

69 ln or log of a negative number. Default = ln (abs(argument)) or log (abs(argument)).

70 ln or log of zero. Default = −9.99999999999e511.

71 adn or acs of number less than −1 or greater than +1. Default = asn (sgn(argument)) or acs (sgn(argument)).

72 Negative base to a non-integer power. Default = (abs(base)) ↑ (non-integer power).

73 Zero to the zero power (0 ↑ 0). Default = 1.

74 Full-precision overflow. Default = + or −9.99999999999e99).

75 Full-precision underflow. Default = 0.

76 Intermediate result overflow. Default = + or −9.99999999999e511.

77 Intermediate result underflow. Default = 0.

FORMATTED I/O OPERATIONS

Referring to FIG. 4, the I/O Bus transfers data between the calculator processor and peripheral devices. All incoming data is transferred through the processor before it is stored in memory.

As shown in FIG. 4 each external device is connected to the calculator via an appropriate interface card and cable. An interface card plugs into any of the I/O slots in the calculator's back panel. Plug-in ROM cards become part of the calculator's memory.

ROMs which can be used with the calculator include, for example, a String ROM, an Advanced Programming ROM, a Matrix ROM, a Plotter ROM, a General I/O ROM and an Extended I/O ROM.

The String ROM enables the calculator to recognize and operate on letters and words ("strings") in much the same way that it recognizes and operates on numbers. Some of the capabilities which are provided include: single strings and string arrays, numerical value of a string of digits, concatenation, displaying or printing all special characters, and packing and unpacking floating point numbers in strings.

The Advanced Programming ROM extends the programming capabilities of the Calculator. For/next looping, split and integer precision number storage, multiparameter functions and subroutines, and the cross reference statement are some of the operations provided by the Advanced Programming ROM.

The Matrix ROM extends the language to include statements for manipulating matrices and arrays. Addition, subtraction, multiplication, and division of arrays, as well as inversion, transposition, and determinants of matrices are some of the capabilities provided by this ROM.

The Plotter ROM enables the Calculator to control a plotter. Axes can be drawn and labelled; functions can be plotted; and with a unique "typewriter" mode, characters of varying size can be printed. More than one plotter can be operated at the same time.

The General I/O ROM provides basic I/O capability with formatting. Peripherals can be controlled using this ROM. Basic control of the HP-Interface Bus, explained in greater detail hereinafter and referred to hereafter as HP-IB, and status checking are also provided.

The Extended I/O ROM extends the I/O capability of the calculator by providing complete HP-IB control.

Features include Bit manipulation and testing, autostarting, error trapping, and interrupt service routines.

GENERAL I/O ROM

The General I/O ROM operations are given below:

| Operaton | Description |
|---|---|
| Write | Output data or character strings to specified device. |
| Read | Request and input data or character strings. |
| Format | Specify numeric specs and edit specs for both read and write statements. |
| Conversion | Set up a character conversion table for read and write statements. |
| Write Binary | Output 16-bit binary numbers. |
| Read Binary | Input 16-bit binary numbers. |
| Write Control | Output binary status codes via an Interface Card. |
| Read Status | Check interface or peripheral status information. |
| List | Output program listings to external device. |

External devices share the same I/O bus used by internal peripheral devices and internal peripherals respond to some General I/O operations in addition to their specific commands. Since all external devices are "party-lined" on the same bus, each device is assigned a unique address, or select code, so that the correct device responds to each I/O operation.

For all external peripherals, the select code is an integer number from 2 through 15 which is specified in each I/O operation and decoded by the corresponding interface card. Two digits are added to the select code parameter to address peripherals via a Hewlett-Packard Interface Bus, described for example in the January, 1975, Hewlett-Packard Journal, Vol. 26, Number 5, and in U.S. Pat. No. 3,810,103 entitled Data Transfer Control Apparatus, issued May 7, 1974. Each interface card has a switch permitting the user to set any one of the codes. A list of preferred assignment codes for use with typical peripheral devices is given below.

| SELECT CODE | ASSIGNMENT | EXAMPLE HEWLETT-PACKARD PERIPHERAL DEVICES |
|---|---|---|
| 0 | Calculator Keyboard and Display | — |
| 1 | Calculator Tape Drive | — |
| 2 | Paper Tape Punch | HP 9884A,98032A Interface |
| 3 | Paper Tape Reader | HP 9883A |
| 4 | Digitizer | HP 9864A |
| 5 | Plotter | HP 9862A |
| 6 | Printer | HP 9866B, HP 9871A |
| 7 | HP-Interface Bus | HP 98034A Interface |
| 8 through 15 | Unassigned | special peripherals |
| 16 | Calculator Printer | — |

Each internal peripheral has a fixed select code which is automatically specified by standard calculator statements (display, print, etc.). Both the display and the keyboard respond to select code 0, the tape drive responds to select code 1, and the printer responds to select code 16.

The select code can be specified in the form of either a constant, a variable, or an expression.

Input-Output Format

The I/O bus connecting the processor with internal and external peripherals contains 16 lines. Data is transmitted in a 16-bit parallel, character-serial fashion at certain times, while interface or peripheral status codes are transmitted at other times. The I/O operations send and receive data in standard 8-bit ASCII code. The calculator sends and receives one 8-bit character at a time. The parity (most-significant) bit is not used with formatted I/O operations.

Peripheral Interrupt

Since the General I/O ROM is intended for use in systems where the calculator is the controlling device, there is no provision for peripheral interrupt operation, for example whereby, an external device can call for an I/O operation, or the like. The calculator must be in complete control of each device while that device is involved in data transfer.

THE WRITE STATEMENT

Syntax:

wrt select code [.format no.], $parameter_1$, $parameter_2$, . . .

The write statement outputs the characters, signs, and decimal point of each parameter to the peripheral specified by the select code. Each parameter in the list can consist of either a numeric expression, text, or a string name (when the String ROM is in use). The value of each parameter is output in a free-field format, unless a format statement is in effect. The format number parameter can be an integer from 0 to 9 and references a similarly numbered format statement, described hereinafter.

Delimiters

A delimiter is a character that is used to either separate one expression from another inside a list or to terminate a list. The space (sp) and the carriage-return line-feed (CR/LF) are delimiters that are automatically output during the execution of each write statement. The space is used to separate items within the list, and the CR/LF is used to terminate the list.

Free-Field (Default) Format

The free-field output format is automatically set whenever either the calculator is switched on, or RESET is pressed. Each write statement references the free-field format until a format statement is executed and then the specifications in the format statement override free-field.

The free-field format causes each numeric expression to be output and right justified in an 18-character field. A CR/LF is given after each four expressions are output and again after the last parameter is output. The form in which expressions appear is determined by the current fixed or float setting. A number that is too large to be output under the current fixed-point specification is output under the previous floating-point specification Characters within quotes and strings are output as "free text" wherein the 18-character fields are not used.

THE READ STATEMENT

Syntax:

red select code[.format no.], $parameter_1$-,$parameter_2$, . . .

The read statement inputs and stores data from a specified peripheral. The calculator keyboard can not be used to input data with the read statement. The number of parameters in the list indicates how many data items to read. Each parameter consists of either a variable name or a string variable name if the String ROM is in use. Each numeric data item consists of the digits 0 through 9, plus and minus signs, a decimal point, and an "E" character. All other characters are treated as input delimiters. The data item itself assumes the same form as any number entered from the keyboard.

The format number parameter can be used to reference any of ten format statements. If a format number is not specified, and if a format statement has not been previously executed, a free-field input format is automatically used.

Free-Field Format

The free-field input format is set whenever either the calculator is switched on or RESET is pressed. Using free-field allows reading numerical data in virtually any form, provided that each item is followed by at least one non-numeric character delimiter. For each parameter in the list, the calculator ignores all input non-numeric character delimiters until one of the characters listed above is read. Then, after reading the data item, reading any non-numeric character terminates and stores the data item.

The calculator cannot input non-numeric characters unless a string variable is specified when free-field is used. All characters are input until either the dimensional string length is filled or a CR/LF is read. Reading a CR/LF automatically terminates the read operation. All non-numeric characters preceding a data item (except "E") are ignored.

Reading successive commas causes the corresponding variable to be skipped and flag 13 to be set. A SKP (HT) causes the calculator to skip all characters until a LF has been read. Whenever a LF is read (and it does not correspond to a preceding HT) the statement is terminated and flag 13 is set. An upper- or lower-case "E" character, when part of any of the following forms, causes the preceding data item to be raised by the power of 10 indicated: (data item)E(one or two digits); (data item)E(a + or -and one or two digits); (data item)E(a space and one or two digits). For example, any of the following data items will be read as the number "1234".

1.234E3

1.234E 3

1.234E+3

The CR is always ignored (skipped over) during a read operation.

FORMAT STATEMENTS

Use of format statements provides the most-flexible and complete control of write and read statements. A format statement must be programmed before the I/O statement referencing it and provides a list of specifications for use by the I/O statement. As the I/O statement is executed, it references the last-encountered unnumbered format statement rather than free-field.

The Format Syntax

Syntax:

fmt [format no.,] $spec_1$,$spec_2$, . . .

The format number parameter is used to identify the statement for successive write or read statements. Each format number must be an integer from 0 to 9. If the format number is not specified, format number 0 is assumed.

Output Numeric Specifications

Numeric specifications determine the form in which each numeric parameter is output. A numeric specification determines whether the number is output in fixed point or floating point, the number of digits to the right of the decimal point, and the field width in which the number appears.

These numeric specifications are available:

Syntax:

| | |
|---|---|
| [r]fw.d | Specifies fixed-point format. |
| [r]ew.d | Specifies exponential (scientific) format. |
| [r]fzw.d | Specifies fixed-point format with leading zeros in each field. |

w indicates total field width (in characters). If w is omitted, leading spaces are deleted from the field.
d indicates the number of digits to the right of the decimal point. If d is omitted, the current fxd or flt setting is used.
r is an optional repeat factor.
(w,d, and r must be constants).

A numeric specification such as f8.2 specifies a fixed-point number with two digits to the right of the decimal point. The number appears (right-justified) in an eight-character field. If d is 0, the decimal point is not output. A number output under a numeric specification is always rounded according to the number of decimal places specified.

Some guidelines should be observed in selecting w and d. Signs, decimal points, and exponents are part of the number and must fit in the field width specified by w. For floating-point outputs, w should be greater than or equal to d+7.

In general, if a fixed-point specification cannot be met, either because w is not large enough or because the number is simply too large, the field is filled with dollar signs.

Output Edit Specifications

Edit specifications are used to control the placement of output data and to output character strings:

Syntax:

| | |
|---|---|
| [r]X | Outputs a blank character space. |
| [r]/ | Outputs a CR/LF for a printer. |
| [r]"text" | Outputs the ASCII characters within quotes. |
| Z | Suppresses the automatic CR/LF output after each write statement. |
| [r]b | Outputs the binary equivalent of the corresponding decimal number in the write statement. |
| [r]cw | Specifies the field width for a string variable to be output. |

Any combination of specifications can appear in the same format statement when each item is separated by a comma. Most of the specifications can be duplicated *r* number of times by using the repeat factor.

Input Numeric Specifications

Numeric specifications are used to determine which characters are input from a data input string, and in what form the data will appear. When a format statement is referenced by a read statement, the read operation is not terminated until a LF character is read (unless the edit specification Z is used as discussed above). A general input conversion specification syntax is:

| | |
|---|---|
| [r]f w | r is the number of consecutive times the specification is to be used (if r is 1 it may be omitted). w is the width of the data field to be read. |

A numeric specification such as f10 for example calls for reading ten numeric characters; all non-numerics which precede a numeric are counted but not entered. If an "E" is read, a number of the form 1E dd is entered.

Input Edit Specifications

The following edit specifications can be used to increase input format flexibility:

Automatic Delimiter Syntax fmt z, f w

This spec causes the calculator to read only the number of characters specified in the next conversion spec. The READ operation is automatically terminated after the characters are read, without the need of a LF character.

Skip Character Syntax fmt [r] x

This spec causes the calculator to skip (not count) r number of characters.

Skip Data Syntax fmt [r]/

The calculator skips all data which precedes r number of CR/LF characters.

Input Strings Syntax fmt [r]c w

The calculator inputs w number of characters into a specified string variable (String ROM). All characters are entered until either the string is filled, or w characters are read, or a LF is read.

THE CONVERSION STATEMENT

Syntax:

conv [$code_1$, $code_2$[,$code_3$,$code_4$]], . . .

The conversion statement sets up a character replacement table for use with read and write statements. Up to 10 pairs of decimal codes can be specified at a time. Each new conversion statement cancels the previous table and sets up the new one. A conversion statement with no parameters cancels any previous table.

THE LIST STATEMENT

A select code parameter can be used with the list statement when the General I/O ROM is plugged in, enabling program listings on a peripheral output device. The new list syntax is:

list [#select code][,line no.]

THE BUS CARD

The Interface provides HP-IB capability for the Calculator. The bus card buffers all data and control instructions between the calculator and instruments on the bus. The interface is preset to respond to select code 7.

Each instrument on the bus is connected, for example, through a 16-wire cable.

HP-IB ADDRESSES

The General I/O ROM provides simplified control of instruments via the HP-IB by using a select code parameter containing a three- or four-digit integer. Referring to FIG. 176, a flow chart for the HP-IB Transparency Routine is given. The first one or two digits specifies the bus card select code, while the last two digits represent the address of the instrument on the bus.

Instruments having HP-IB capability are assigned unique 7-bit ASCII characters for talker and listener addresses. The calculator uses the address characters to indicate which instrument is to talk (send data) or listen (receive data). For example, here are the addresses preferably assigned for some Hewlett-Packard instruments:

| Hewlett-Packard Instrument Type | HP-IB Address Talker | Listener |
|---|---|---|
| 98034A Interface | U | 5 |
| 3490A Multimeter | V | 6 |
| 9871A (Opt. 001) Printer | | ! |
| 59309A Digital Clock | P | φ |

The 9871A Printer is only a listener; it does not transmit data, so it has no talker address.

Using an ASCII tale the five least-significant bits of each character's binary form are converted to a decimal value:

| Hewlett-Packard Instrument | Address Character | 5-bit Value |
|---|---|---|
| 98034A Interface | U | 21 |
| | 5 | 21 |
| 3490A Multimeter | V | 22 |
| | 6 | 22 |
| 9871A Printer | ! | 1 |
| 59309A Clock | P | 16 |
| | φ | 16 |

The 5-bit value for talker-listener instruments is the same number.

These numbers are used as the HP-IB address code in select code parameters of General I/O operations. The HP-IB address code must always contain two digits; if the 5-bit value is a one-digit number (e.g., 9), a leading zero must be used (e.g., 09).

This addressing method permits using General I/O operations via the HP-IB.

Instruments designated as listeners on the bus are controlled by using write and write binary statements. The address-code parameter just described must be used in each I/O operation.

For most applications, read and format statements are used to input data via the HP-IB. The format statement must be appropriate to the data string that the device sends to the calculator.

Many devices output leading non-numeric characters in their output data strings. The format statement must account for any leading non-numeric characters so that the read statement can interpret the numeric information.

GENERAL I/O ERROR MESSAGES

In case of error, the calculator displays one of the following error messages.

error G1 Incorrect Format Numbers:
. Format number in format statement >9.
. Referenced format number not set.

error G2 Referenced Format Statement has an error:
. Incorrect format specification.
. Numeric overflow in format statement.

error G3 Incorrect I/O Parameters:
. Parameter not number or string.
. Negative parameter with fZ numeric specification.
. Numeric parameter with credit specification.
. Binary parameter >(± 32767).
. More than one parameter for read binary or read status function.
. Missing a non-numeric parameter for write control statement.

error G4 Incorrect Select Code:

-continued

. Select code is non-numeric or >4 digits.
. Select code is >2 digits for read status.
. Select code is not in range from 0 through 16.
. Select code 1 allowed only for read status.
. HP-IB address not in range from 0 through 31.
. Read from select code φ not allowed.

error G5 Incorrect Read Parameter:
. Constant in read list.
. String not filed by read operation.
. Numeric parameter references c format specification.

error G6 Incorrect Numeric (format) Specification.

error G7 Unacceptable Input Data:
. More than one decimal point or "E" read.
. 511 characters read without LF.
. E with no leading digit.
. More than 158 numeric characters read.

error G3 Perpheral Device Down:
. Incorrect status bits.
. STOP cancelled operation.

error G9 Interface Hardware Problem:
. Improper HP-IB operation.
. Empty I/O slot.
. Wrong select code set on 98032A card.
. Write Control addressed to wrong card.

GENERAL I/O SYNTAX

The following are the general Syntax Conventions used:

| | |
|---|---|
| rackets [ ] | Items within brackets are optional. |
| oloring | Colored items must appear as shown. |
| xpression | A constant (like 16.4), a variable (like X or B[8]or r3) or an expression like |
| elect code format | ↑ 4 or 6<A+B). cc[dd] cc = device or interface select code. dd = optional HP-IB address code (Must be two digits). |
| ext | A series of characters within quotation marks. |
| ariable. | A simple variable (e.g., A or Q), an array variable (e.g., E[5]), an r-variable (e.g., 412), or a string variable name (A$). |

| tatement | Syntax |
|---|---|
| onversion | conv[$code_1$, $code_2$[,$code_3$,$code_4$]], . . . Ten pairs of ASCII-decimal codes are allowed. |
| ormat | fmt[format no.,] $spec_1$[,$spec_2$],]]] C≦ format no. ≦ |
| ist | list[#select code] Other list parameters remain as defined. |
| ead | red select code [,format no.],$variable_1$ [,$variable_2$], . . . |
| ead Binary function) | rdb(select code) |
| ead Status function) | rds(select code) |
| Vrite | wrt select code [,format no.],expression or $text_1$ [,expression or $text_2$], . . . |
| Vrite Binary | wtb select code,$expression_1$[,$expression_2$], . . . |
| Vrite Control | wtc select code,expression |

We claim:

1. An electronic calculator comprising:

memory means including a first area for storing a program of one or more lines of one or more alphanumeric statements per line and a second area for storing a single line of one or more alphanumeric statements;

keyboard input means for entering one or more lines of one or more alphanumeric statements per line into the memory means;

processing means coupled to said memory means and keyboard input means for executing lines of one or more alphanumeric statements per line; and output display means coupled to said processing means for visually displaying alphanumeric information, including the results of execution of lines of alphanumeric statements, to the user;

said keyboard input means including a run control key for initiating execution by said processing means of a program of one or more lines of alphanumeric statements stored in said first area of said memory means; and an execute control key for initiating execution by said processing means of a single line of one or more alphanumeric statements entered from said keyboard input means and stored in said second area of said memory means;

said processing means including logic means operative for enabling entry of a line of one or more alphanumeric statements from said keyboard input means during execution of a program stored in said first area of said memory means, said logic means further including means responsive to subsequent actuation of said execute control key, during execution of said program, for temporarily halting execution of said program, for initiating execution by said processing means of said entered line of one or more alphanumeric statements and for causing the results to be visually displayed on said output display means, said logic means further including means responsive to an indication by said processing means that execution of said entered line has been completed for causing said processing means to resume execution of said program.

2. An electronic calculator as in claim 1 wherein:

said keyboard input means includes one or more keys for entering a list statement;

said calculator includes printer means coupled to said processing means for printing one or more lines of alphanumeric statements; and said logic means is operative for enabling entry of the list statement from said keyboard input means into said second area of said memory means during execution of a program stored in said first area of said memory means, said logic means further including means responsive to subsequent actuation of said execute control key, during execution of said program, for temporarily halting execution of said program, for initiating execution by said processing means of the list statement to cause the lines of alphanumeric statements comprising said program to be printed by said printer means and for then causing said processing means to resume execution of said program.

3. An electronic calculator as in claim 1 wherein:

said keyboard input means includes one or more keys for entering a program variable assignment statement; and said logic means is operative for enabling entry of the program variable assignment statement during execution of a program stored in said first area of said memory means, said logic means further including means responsive to subsequent actuation of said execute control key, during execution of said program, for temporarily halting execution of said program, for initiating exeuction by said processing means of the program variable assignment statement to cause a designated numeric value to be associated with a selected program variable and for then causing said processing means to resume execution of said program.

4. An electronic calculator as in claim 1 wherein:

said keyboard input means includes one or more keys for entering a program variable interrogation statement; and said logic means is operative for enabling entry of the program variable interrogation statement during execution of a program stored in said first area of said memory means, said logic means further including means responsive to subsequent actuation of said execute control key, during execution of said program, for temporarily halting execution of said program, for initiating execution by said processing means of the program variable interrogation statement to cause the current value of a selected program variable to be visually displayed on said output display means, and for then causing said processing means to resume execution of said program.

5. An electronic calculator as in claim 1 wherein said second area of said memory means comprises buffer storage means for temporarily storing the single line of one or more alphanumeric statements entered from said keyboard input means during execution of a program stored in said first area of said memory means;

said keyboard input means includes a plurality of alphanumeric keys, each associated with an alphanumeric character, for entering lines of one or more alphanumeric statements;

said output display means is operative for visually displaying said single line of one or more alphanumeric statements as it is being entered from said keyboard input means during execution of a program stored in said first memory means; and said logic means is responsive to actuation of any one of said alphanumeric keys during execution by said processing means of a program stored in said first area of said memory means for momentarily interrupting execution of said program by said processing means to permit entry of the associated alphanumeric character into said buffer storage means.

6. An electronic calculator as in claim 5 wherein said logic means is responsive to actuation of said execute control key, during execution by said processing means of the program stored in said first area of said memory means, for momentarily interrupt execution of that program and for initiating execution by said processing means of the single line of one or more alphanumeric statements then stored in said buffer storage means.

7. An electronic calculator as in claim 1 wherein said logic means is responsive to execution by said processing means of a keyboard disable statement stored in said second area of said memory means or stored as part of a program in said first area of said memory means for subsequently inhibiting the entry of alphanumeric statements from said keyboard input means during the time that a program stored in said first area of said memory means is being executed.

8. An electronic calculator as in claim 7 wherein said logic means is responsive to execution by said processing means of a keyboard enable statement, stored as part of a program in said first area of said memory means, following execution of a keyboard disable statement for subsequently enabling the entry of alphanumeric statements from said keyboard input means during the time that a program stored in said first area of said memory means is being executed.

* * * * *

UNITED STATES PATENT AND TRADEMARK OFFICE

CERTIFICATE OF CORRECTION

PATENT NO. : 4,075,679 Page 1 of 7

DATED : February 21, 1978

INVENTOR(S) : Chris J. Christopher et al

It is certified that error appears in the above–identified patent and that said Letters Patent are hereby corrected as shown below:

Column 1, line 15, "driven" should be --given--;

Column 4, line 46, "languagte" should be --language--;

Column 6, line 35, "01" should be --Ø1--;

Column 6, line 48, "24A-B" should be --25A-B--;

Column 7, delete lines 53-55;

Column 7, line 66, "25-B" should be --25A-B--;

Column 11, line 48, "FIG. 172" should be --FIG. 162--;

Column 12, line 37, "astored" should be --stored--;

Column 14, line 13, "reducnbg" should be --reducing--;

Column 14, line 59, "FIG. 15" should be --FIG. 16--;

Column 15, line 20, "perpheral" should be --peripheral--;

Column 15, lines 61 and 62,""memory cycle"]" should be --"memory cycle"--;

Column 16, line 44, "BOC'S" should be --BPC'S--;

Column 16, line 44, "evolve" should be --involve--;

Column 17, line 58, "77000 -" should be --$77000_8$- --;

Column 19, line 28, "operated" should be --operand--;

UNITED STATES PATENT AND TRADEMARK OFFICE
CERTIFICATE OF CORRECTION

PATENT NO. 4,075,679      Page 2 of 7

DATED : February 21, 1978

INVENTOR(S) : Chris J. Christopher et al

It is certified that error appears in the above–identified patent and that said Letters Patent are hereby corrected as shown below:

Column 19, line 45, "such" should be --much--;

Column 20, line 16, "(1)" should be --(I)--;

Column 23, line 21, "egister" should be --register--;

Column 24, lines 20, 22, 23, 25, and 31, "1OC" should be --IOC--;

Column 24, line 34, "requiest" should be --request--;

Column 26, line 62, "addreses" should be --addresses--;

Column 27, line 32, "PBC" should be --BPC--;

Column 27, line 43, "1OC" should be --IOC--;

Column 28, line 22, "Is" should be --is--;

Column 29, lines 15 and 16, "PAO" should be --PAØ--;

Column 31, line 43, "righr" should be --right--;

Column 39, line 23, "as" should be --an--;

Column 44, line 4, "<AR2>+((<AR1>" should be --<AR2>+((<AR1>)--;

Column 44, line 4, "+DC→AR" should be --+DC→AR2--;

Column 47, line 68, "U20 an U21" should be --U20 and U21--;

Column 49, lines 28 and 54, "Bit 0" should be --Bit Ø--;

UNITED STATES PATENT AND TRADEMARK OFFICE

CERTIFICATE OF CORRECTION

PATENT NO. : 4,075,679

DATED : February 21, 1978

INVENTOR(S) : Chris J. Christopher et al

It is certified that error appears in the above-identified patent and that said Letters Patent are hereby corrected as shown below:

Column 49, line 58, "set" should be --sets--;

Column 49, line 65, "is JK" should be --is a JK--;

Column 50, line 7, "switches on" should be --switches used on--;

Column 50, line 47, "bit 0" should be --bit Ø--;

Column 50, line 47, "(IODO)" should be --(IODØ)--;

Column 51, line 26, "Reet" should be --Reset--;

Column 51, line 54, "is sent the KDP" should be --is sent to the KDP--;

Column 51, line 67, "th" should be --the--;

Column 52, line 11, "ime" should be --time--;

Column 54, line 4, "not" should be --dot--;

Column 54, line 20, "cl0ck" should be --clock--;

Column 55, line 60, "AO" should be --AØ--;

Column 55, lines 61 and 63, "BO" should be --BØ--;

Column 57, line 64, "IODO" should be --IODØ--;

Column 58, line 63, "G" should be --GO--;

Column 61, line 26, "O" should be --Ø--;

UNITED STATES PATENT AND TRADEMARK OFFICE

CERTIFICATE OF CORRECTION

PATENT NO. : 4,075,679

DATED : February 21, 1978

INVENTOR(S) : Chris J. Christopher et al

It is certified that error appears in the above-identified patent and that said Letters Patent are hereby corrected as shown below:

Column 61, line 56, "U10" should be --U19--;

Column 597, line 35, "FIG. 2" should be --FIG. 3--;

Column 597, line 47, "RESEt" should be --RESET--;

Column 597, line 49, "on" should be --or--;

Column 600, line 37, "when" should be --When--;

Column 602, line 11, "kay" should be --key--;

Column 603, line 25, "EXXECUTE" should be --EXECUTE--;

Column 609, line 62, "value 0" should be --value Ø--;

Column 609, line 62, "r10" should be --r1Ø--;

Column 609, line 63, "r0" should be --rØ--;

Column 610, line 56, "V=0" should be --V=Ø--;

Column 611, line 65, "prnd" should be --Prnd--;

Column 612, line 24, "Float 0" should be --Float Ø--;

Column 612, line 31, "tthis" should be --this--;

Column 613, line 42, "end" should be --ent--;

Column 614, line 33, "maintains is" should be --maintains its--;

UNITED STATES PATENT AND TRADEMARK OFFICE
CERTIFICATE OF CORRECTION

PATENT NO. : 4,075,679

DATED : February 21, 1978

INVENTOR(S) : Chris J. Christopher et al

It is certified that error appears in the above-identified patent and that said Letters Patent are hereby corrected as shown below:

Column 614, line 56, "ti" should be --to--;

Column 617, line 3, "O" should be --Ø--;

Column 617, lines 4 and 5, "CTLO" should be --CTLØ--;

Column 619, line 50, "A>=B" should be --A<=B--;

Column 622, line 63, "(0-45$^{o}$)" should be --(Ø-45$^{o}$)--;

Column 622, line 66, "(0-360$^{o}$)" should be --(Ø-360$^{o}$)--;

Column 623, line 52, "9.99999999999399" should be --9.99999999999e99--;

Column 623, line 56, "9.999999999993511" should be --9.99999999999e511--;

Column 624, line 1, "neative" should be --negative--;

Column 628, line 52, "s" should be --is--;

Column 628, line 54, "O" should be --Ø--;

Column 629, line 18, "O" should be --Ø--;

Column 629, line 36, "O" should be --Ø--;

Column 630, line 16, "Specifying Bounds for Subscripts" should be underscored;

Column 630, line 35, "X[1:4:4,1:3] should be --X[1:4,1:3]--;

Column 630, line 57, "ae" should be --are--;

UNITED STATES PATENT AND TRADEMARK OFFICE
CERTIFICATE OF CORRECTION

PATENT NO. : 4,075,679

DATED : February 21, 1978

INVENTOR(S) : Chris J. Christopher et al

It is certified that error appears in the above-identified patent and that said Letters Patent are hereby corrected as shown below:

Column 633, line 68, "0" should be --Ø--;

Column 635, line 7, "dps" should be --dsp--;

Column 637, line 15, "176A-B" should be --167A-B--;

Column 644, line 46, "beings" should be --begins--;

Column 645, line 22, "rdk A[12]" should be --rck A[12]--;

Column 646, line 41, "recore" should be --record--;

Column 649, line 10, "[" should be --08--;

Column 649, line 41, "ten" should be --then--;

Column 650, line 23, "allocted" should be --allocated--;

Column 653, line 57, "0" should be --Ø--;

Column 656, line 67, "f10" should be --f1Ø--;

Column 659, line 14, "error G3" should be --error G8--;

Column 659, line 66, the semicolon should be a comma;

Column 660, line 13, after "statement" insert --stored in said second area of said memory means,--;

Column 661, line 23, after "first" insert --area of said--; and

UNITED STATES PATENT AND TRADEMARK OFFICE
CERTIFICATE OF CORRECTION

PATENT NO. : 4,075,679

DATED : February 21, 1978

INVENTOR(S) : Chris J. Christopher et al

It is certified that error appears in the above-identified patent and that said Letters Patent are hereby corrected as shown below:

Column 662, lines 7 and 8, cancel "interrupt execution of that program" and substitute --interrupting execution of said program by said processing means--.

Signed and Sealed this

*Twenty-fifth* Day of *March 1980*

[SEAL]

*Attest:*

SIDNEY A. DIAMOND

*Attesting Officer* *Commissioner of Patents and Trademarks*